US010067645B2

(12) United States Patent
King et al.

(10) Patent No.: US 10,067,645 B2
(45) Date of Patent: Sep. 4, 2018

(54) DEVICES, METHODS, AND GRAPHICAL USER INTERFACES FOR MANIPULATING USER INTERFACE OBJECTS WITH VISUAL AND/OR HAPTIC FEEDBACK

(71) Applicant: Apple Inc., Cupertino, CA (US)

(72) Inventors: Nicholas V. King, San Jose, CA (US); Sebastian J. Bauer, San Francisco, CA (US); Imran A. Chaudhri, San Francisco, CA (US); Alan C. Dye, San Francisco, CA (US); Christopher P. Foss, San Francisco, CA (US); Jonathan Ive, San Francisco, CA (US); Behkish J. Manzari, San Francisco, CA (US); Henrique D. Penha, San Francisco, CA (US); Daniel T. Preston, San Jose, CA (US); Christopher I. Wilson, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 245 days.

(21) Appl. No.: 14/871,227

(22) Filed: Sep. 30, 2015

(65) Prior Publication Data

US 2016/0259518 A1 Sep. 8, 2016

Related U.S. Application Data

(63) Continuation of application No. 14/869,899, filed on Sep. 29, 2015, now Pat. No. 9,632,664.

(Continued)

(51) Int. Cl.

*G06F 3/0482* (2013.01)
*G06F 3/0481* (2013.01)

(Continued)

(52) U.S. Cl.

CPC ............ *G06F 3/0482* (2013.01); *G06F 3/016* (2013.01); *G06F 3/0416* (2013.01);

(Continued)

(58) Field of Classification Search

CPC ..... G06F 3/048; G06F 3/04883; G06F 3/0488

See application file for complete search history.

(56) References Cited

U.S. PATENT DOCUMENTS

| | | |
|---|---|---|
| 4,864,520 A | 9/1989 | Setoguchi et al. |
| 5,184,120 A | 2/1993 | Schultz |

(Continued)

FOREIGN PATENT DOCUMENTS

| | | |
|---|---|---|
| AU | 2016100649 A4 | 6/2016 |
| CN | 1808362 A | 7/2006 |

(Continued)

OTHER PUBLICATIONS

Boring, "The Fat Thumb: Using the Thumb's Contact Size for Single-Handed Mobile Interaction", https://www.youtube.com/watch?v=E9vGU5R8nsc&feature=youtu.be, Jun. 14, 2012, 2 pages.

(Continued)

*Primary Examiner* — Amy M Levy

(74) *Attorney, Agent, or Firm* — Morgan, Lewis & Bockius LLP

(57) ABSTRACT

In accordance with some embodiments, a method is performed at an electronic device. The device displays a first user interface including a background with a first appearance and foreground objects. While displaying the first user interface, the device detects a first input while a first focus selector is at a location in the first user interface that corresponds to the background of the first user interface. In response, if the contact has a characteristic intensity above a first intensity threshold, the device dynamically changes the background without changing the foreground objects, (Continued)

wherein the dynamic change in the background is based on the characteristic intensity of the contact. While dynamically changing the background, detecting termination of the first input; and, in response, the device reverts the background back to the first appearance of the background.

23 Claims, 513 Drawing Sheets

Related U.S. Application Data

(60) Provisional application No. 62/215,722, filed on Sep. 8, 2015, provisional application No. 62/213,609, filed on Sep. 2, 2015, provisional application No. 62/203,387, filed on Aug. 10, 2015, provisional application No. 62/215,696, filed on Sep. 8, 2015, provisional application No. 62/213,606, filed on Sep. 2, 2015, provisional application No. 62/183,139, filed on Jun. 22, 2015, provisional application No. 62/172,226, filed on Jun. 7, 2015, provisional application No. 62/129,954, filed on Mar. 8, 2015.

(51) Int. Cl.

| | |
|---|---|
| ***G06T 13/80*** | (2011.01) |
| ***G06F 3/041*** | (2006.01) |
| ***H04L 29/08*** | (2006.01) |
| ***G06F 3/0488*** | (2013.01) |
| ***G06F 3/0485*** | (2013.01) |
| ***G06F 3/0483*** | (2013.01) |
| ***G06F 3/0484*** | (2013.01) |
| ***G06F 3/01*** | (2006.01) |
| ***G06T 11/00*** | (2006.01) |
| *G06F 11/00* | (2006.01) |

(52) U.S. Cl.

CPC .......... *G06F 3/0481* (2013.01); *G06F 3/0483* (2013.01); *G06F 3/0485* (2013.01); *G06F 3/0488* (2013.01); *G06F 3/04817* (2013.01); *G06F 3/04842* (2013.01); *G06F 3/04883* (2013.01); *G06T 11/001* (2013.01); *G06T 13/80* (2013.01); *H04L 67/32* (2013.01); *G06F 2203/04104* (2013.01); *G06F 2203/04806* (2013.01); *G06F 2203/04808* (2013.01); *G06T 2200/24* (2013.01)

(56) References Cited

U.S. PATENT DOCUMENTS

| | | | |
|---|---|---|---|
| 5,374,787 | A | 12/1994 | Miller et al. |
| 5,428,730 | A | 6/1995 | Baker et al. |
| 5,463,722 | A | 10/1995 | Venolia |
| 5,510,813 | A | 4/1996 | Makinwa et al. |
| 5,555,354 | A | 9/1996 | Strasnick et al. |
| 5,559,301 | A | 9/1996 | Bryan, Jr. et al. |
| 5,710,896 | A | 1/1998 | Seidl |
| 5,717,438 | A | 2/1998 | Kim et al. |
| 5,793,360 | A | 8/1998 | Fleck et al. |
| 5,793,377 | A | 8/1998 | Moore |
| 5,801,692 | A | 9/1998 | Muzio et al. |
| 5,805,144 | A | 9/1998 | Scholder et al. |
| 5,805,167 | A | 9/1998 | Van Cruyningen |
| 5,809,267 | A | 9/1998 | Moran et al. |
| 5,819,293 | A | 10/1998 | Comer et al. |
| 5,825,352 | A | 10/1998 | Bisset et al. |
| 5,844,560 | A | 12/1998 | Crutcher et al. |
| 5,872,922 | A | 2/1999 | Hogan et al. |
| 5,946,647 | A | 8/1999 | Miller et al. |
| 6,002,397 | A | 12/1999 | Jaaskelainen, Jr. |
| 6,031,989 | A | 2/2000 | Cordell |
| 6,088,019 | A | 7/2000 | Rosenberg |
| 6,088,027 | A | 7/2000 | Konar et al. |
| 6,111,575 | A | 8/2000 | Martinez et al. |
| 6,121,960 | A | 9/2000 | Carroll et al. |
| 6,208,329 | B1 | 3/2001 | Ballare |
| 6,208,340 | B1 | 3/2001 | Amin et al. |
| 6,219,034 | B1 | 4/2001 | Elbing et al. |
| 6,243,080 | B1 | 6/2001 | Molne |
| 6,252,594 | B1 | 6/2001 | Xia et al. |
| 6,396,523 | B1 | 5/2002 | Segal et al. |
| 6,429,846 | B2 | 8/2002 | Rosenberg et al. |
| 6,448,977 | B1 | 9/2002 | Braun et al. |
| 6,459,442 | B1 | 10/2002 | Edwards et al. |
| 6,489,978 | B1 | 12/2002 | Gong et al. |
| 6,512,530 | B1 | 1/2003 | Rzepkowski et al. |
| 6,563,487 | B2 | 5/2003 | Martin et al. |
| 6,567,102 | B2 | 5/2003 | Kung |
| 6,583,798 | B1 | 6/2003 | Hoek et al. |
| 6,590,568 | B1 | 7/2003 | Astala et al. |
| 6,661,438 | B1 | 12/2003 | Shiraishi et al. |
| 6,735,307 | B1 | 5/2004 | Volckers |
| 6,750,890 | B1 | 6/2004 | Sugimoto |
| 6,822,635 | B2 | 11/2004 | Shahoian et al. |
| 6,906,697 | B2 | 6/2005 | Rosenberg |
| 6,919,927 | B1 | 7/2005 | Hyodo |
| 7,138,983 | B2 | 11/2006 | Wakai et al. |
| 7,312,791 | B2 | 12/2007 | Hoshino et al. |
| 7,411,575 | B2 | 8/2008 | Hill et al. |
| 7,479,949 | B2 | 1/2009 | Jobs et al. |
| 7,533,352 | B2 | 5/2009 | Chew et al. |
| 7,552,397 | B2 | 6/2009 | Holecek et al. |
| 7,577,530 | B2 | 8/2009 | Vignalou-Marche |
| 7,614,008 | B2 | 11/2009 | Ording |
| 7,619,616 | B2 | 11/2009 | Rimas Ribikauskas et al. |
| 7,629,966 | B2 | 12/2009 | Anson |
| 7,656,413 | B2 | 2/2010 | Khan et al. |
| 7,683,889 | B2 | 3/2010 | Rimas Ribikauskas et al. |
| 7,743,348 | B2 | 6/2010 | Robbins et al. |
| 7,760,187 | B2 | 7/2010 | Kennedy |
| 7,797,642 | B1 | 9/2010 | Karam et al. |
| 7,801,950 | B2 | 9/2010 | Eisenstadt et al. |
| 7,812,826 | B2 | 10/2010 | Ording et al. |
| 7,890,862 | B2 | 2/2011 | Kompe et al. |
| 7,903,090 | B2 | 3/2011 | Soss et al. |
| 7,952,566 | B2 | 5/2011 | Poupyrev et al. |
| 7,956,847 | B2 | 6/2011 | Christie |
| 7,973,778 | B2 | 7/2011 | Chen |
| 8,040,142 | B1 | 10/2011 | Bokma et al. |
| 8,059,104 | B2 | 11/2011 | Shahoian et al. |
| 8,106,856 | B2 | 1/2012 | Matas et al. |
| 8,125,440 | B2 | 2/2012 | Guyot-Sionnest et al. |
| 8,125,492 | B1 | 2/2012 | Wainwright et al. |
| RE43,448 | E | 6/2012 | Kimoto et al. |
| 8,209,628 | B1 | 6/2012 | Davidson |
| 8,271,900 | B2 | 9/2012 | Walizaka et al. |
| 8,363,020 | B2 | 1/2013 | Li et al. |
| 8,390,583 | B2 | 3/2013 | Forutanpour et al. |
| 8,423,089 | B2 | 4/2013 | Song et al. |
| 8,446,376 | B2 | 5/2013 | Levy et al. |
| 8,453,057 | B2 | 5/2013 | Stallings et al. |
| 8,456,431 | B2 | 6/2013 | Victor |
| 8,466,889 | B2 | 6/2013 | Tong et al. |
| 8,482,535 | B2 | 7/2013 | Pryor |
| 8,504,946 | B2 | 8/2013 | Williamson et al. |
| 8,508,494 | B2 | 8/2013 | Moore |
| 8,542,205 | B1 | 9/2013 | Keller |
| 8,553,092 | B2 | 10/2013 | Tezuka et al. |
| 8,581,870 | B2 | 11/2013 | Bokma et al. |
| 8,587,542 | B2 | 11/2013 | Moore |
| 8,593,415 | B2 | 11/2013 | Han et al. |
| 8,593,420 | B1 | 11/2013 | Buuck |
| 8,625,882 | B2 | 1/2014 | Backlund et al. |
| 8,638,311 | B2 | 1/2014 | Kang et al. |
| 8,665,227 | B2 | 3/2014 | Gunawan |
| 8,669,945 | B2 | 3/2014 | Coddington |
| 8,698,765 | B1 | 4/2014 | Keller |
| 8,717,305 | B2 | 5/2014 | Williamson et al. |
| 8,743,069 | B2 | 6/2014 | Morton et al. |
| 8,769,431 | B1 | 7/2014 | Prasad |

(56) References Cited

U.S. PATENT DOCUMENTS 8,773,389 B1 7/2014 Freed
8,788,964 B2 7/2014 Shin et al.
8,793,577 B2 7/2014 Schellingerhout et al.
8,799,816 B2 8/2014 Wells et al.
8,816,989 B2 8/2014 Nicholson et al.
8,854,316 B2 10/2014 Shenfield
8,872,729 B2 10/2014 Lyons et al.
8,872,773 B2 10/2014 Mak et al.
8,875,044 B2 10/2014 Ozawa et al.
8,881,062 B2 11/2014 Kim et al.
8,914,732 B2 12/2014 Jun et al.
8,952,987 B2 2/2015 Momeyer et al.
8,959,430 B1 2/2015 Spivak et al.
8,976,128 B2 3/2015 Moore
9,026,932 B1 5/2015 Dixon
9,030,419 B1 5/2015 Freed
9,030,436 B2 5/2015 Ikeda
9,046,999 B1 6/2015 Teller et al.
9,063,563 B1 6/2015 Gray et al.
9,069,460 B2 6/2015 Moore
9,086,755 B2 7/2015 Cho et al.
9,092,058 B2 7/2015 Kasahara et al.
9,098,188 B2 8/2015 Kim
9,104,260 B2 8/2015 Marsden et al.
9,116,571 B2 8/2015 Zeliff et al.
9,122,364 B2 9/2015 Kuwabara et al.
9,146,914 B1 9/2015 Dhaundiyal
9,148,618 B2 9/2015 Matas et al.
9,164,779 B2 10/2015 Brakensiek et al.
9,170,607 B2 10/2015 Bose et al.
9,170,649 B2 10/2015 Ronkainen
9,218,105 B2 12/2015 Mansson et al.
9,244,562 B1 1/2016 Rosenberg et al.
9,244,576 B1 1/2016 Vadagave et al.
9,244,601 B2 1/2016 Kim et al.
9,246,487 B2 1/2016 Casparian et al.
9,262,002 B2 2/2016 Momeyer et al.
9,304,668 B2 4/2016 Rezende et al.
9,307,112 B2 4/2016 Molgaard et al.
9,349,552 B2 5/2016 Huska et al.
9,361,018 B2 6/2016 Defazio et al.
9,389,718 B1 7/2016 Letourneur
9,389,722 B2 7/2016 Matsuki et al.
9,400,581 B2 7/2016 Bokma et al.
9,405,367 B2 8/2016 Jung et al.
9,417,754 B2 8/2016 Smith
9,423,938 B1 8/2016 Morris
9,436,344 B2 9/2016 Kuwabara et al.
9,448,694 B2 9/2016 Sharma et al.
9,451,230 B1 9/2016 Henderson et al.
9,471,145 B2 10/2016 Langlois et al.
9,477,393 B2 10/2016 Zambetti et al.
9,542,013 B2 1/2017 Dearman et al.
9,547,525 B1 1/2017 Trainor et al.
9,569,093 B2 2/2017 Lipman et al.
9,600,114 B2 3/2017 Milam et al.
9,600,116 B2 3/2017 Tao et al.
9,612,741 B2 4/2017 Brown et al.
9,671,943 B2 6/2017 Van der Velden
9,733,716 B2 8/2017 Shaffer
9,760,241 B1 * 9/2017 Lewbel ............... G06F 3/04812
2001/0024195 A1 9/2001 Hayakawa et al.
2001/0045965 A1 11/2001 Orbanes et al.
2002/0008691 A1 1/2002 Hanajima et al.
2002/0015064 A1 2/2002 Robotham et al.
2002/0109678 A1 8/2002 Marmolin et al.
2002/0140680 A1 10/2002 Lu
2002/0140740 A1 10/2002 Chen
2002/0180763 A1 12/2002 Kung
2002/0186257 A1 12/2002 Cadiz et al.
2003/0001869 A1 1/2003 Nissen
2003/0086496 A1 5/2003 Zhang et al.
2003/0112269 A1 6/2003 Lentz et al.
2003/0117440 A1 6/2003 Hellyar et al.
2003/0122779 A1 7/2003 Martin et al.
2003/0151589 A1 8/2003 Bensen et al.
2003/0184574 A1 10/2003 Phillips et al.
2003/0189552 A1 10/2003 Chuang et al.
2003/0189647 A1 10/2003 Kang
2003/0206169 A1 11/2003 Springer et al.
2003/0222915 A1 12/2003 Marion et al.
2004/0021643 A1 2/2004 Hoshino et al.
2004/0056849 A1 3/2004 Lohbihler et al.
2004/0108995 A1 6/2004 Hoshino et al.
2004/0138849 A1 7/2004 Schmidt et al.
2004/0150631 A1 8/2004 Fleck et al.
2004/0150644 A1 8/2004 Kincaid et al.
2004/0174399 A1 9/2004 Wu et al.
2004/0219969 A1 11/2004 Casey et al.
2004/0267877 A1 12/2004 Shiparo et al.
2005/0012723 A1 1/2005 Pallakoff
2005/0039141 A1 2/2005 Burke et al.
2005/0091604 A1 4/2005 Davis
2005/0110769 A1 5/2005 DaCosta et al.
2005/0114785 A1 5/2005 Finnigan et al.
2005/0125742 A1 6/2005 Grotjohn et al.
2005/0132297 A1 6/2005 Milic-Frayling et al.
2005/0134578 A1 6/2005 Chambers et al.
2005/0183017 A1 8/2005 Cain
2005/0190280 A1 9/2005 Haas et al.
2005/0204295 A1 9/2005 Voorhees et al.
2005/0223338 A1 10/2005 Partanen
2005/0229112 A1 10/2005 Clay et al.
2005/0289476 A1 12/2005 Tokkonen
2006/0022955 A1 2/2006 Kennedy
2006/0022956 A1 2/2006 Lengeling et al.
2006/0026536 A1 2/2006 Hotelling et al.
2006/0031776 A1 2/2006 Glein et al.
2006/0036971 A1 2/2006 Mendel et al.
2006/0059436 A1 3/2006 Nurmi
2006/0067677 A1 3/2006 Tokiwa et al.
2006/0101347 A1 5/2006 Runov et al.
2006/0109252 A1 5/2006 Kolmykov-Zotov et al.
2006/0109256 A1 5/2006 Grant et al.
2006/0119586 A1 6/2006 Grant et al.
2006/0132455 A1 6/2006 Rimas-Ribikauskas et al.
2006/0132456 A1 6/2006 Anson
2006/0132457 A1 6/2006 Rimas-Ribikauskas et al.
2006/0136834 A1 6/2006 Cao et al.
2006/0136845 A1 6/2006 Rimas-Ribikauskas et al.
2006/0161861 A1 7/2006 Holecek et al.
2006/0161870 A1 7/2006 Hotelling et al.
2006/0190834 A1 8/2006 Marcjan
2006/0195438 A1 8/2006 Galuten
2006/0197753 A1 9/2006 Hotelling
2006/0212812 A1 9/2006 Simmons et al.
2006/0213754 A1 9/2006 Jarrett et al.
2006/0224989 A1 10/2006 Pettiross et al.
2006/0233248 A1 10/2006 Rynderman et al.
2006/0274042 A1 12/2006 Krah et al.
2006/0274086 A1 12/2006 Forstall et al.
2006/0277469 A1 12/2006 Chaudhri et al.
2006/0282778 A1 12/2006 Barsness et al.
2006/0284858 A1 12/2006 Rekimoto
2006/0290681 A1 12/2006 Ho et al.
2007/0024595 A1 2/2007 Baker et al.
2007/0024646 A1 2/2007 Saarinen et al.
2007/0080953 A1 4/2007 Lii
2007/0113681 A1 5/2007 Nishimura et al.
2007/0120835 A1 5/2007 Sato
2007/0124699 A1 5/2007 Michaels
2007/0152959 A1 7/2007 Peters
2007/0157173 A1 7/2007 Klein et al.
2007/0168369 A1 7/2007 Bruns
2007/0168890 A1 7/2007 Zhao et al.
2007/0176904 A1 8/2007 Russo
2007/0182999 A1 8/2007 Anthony et al.
2007/0186178 A1 8/2007 Schiller
2007/0222768 A1 9/2007 Geurts et al.
2007/0229455 A1 10/2007 Martin et al.
2007/0229464 A1 10/2007 Hotelling et al.
2007/0236450 A1 10/2007 Colgate et al.
2007/0236477 A1 10/2007 Ryu et al.
2007/0245241 A1 10/2007 Bertram et al.

(56) References Cited

U.S. PATENT DOCUMENTS

| | | | |
|---|---|---|---|
| 2007/0257821 | A1 | 11/2007 | Son et al. |
| 2007/0270182 | A1 | 11/2007 | Gulliksson et al. |
| 2007/0294295 | A1 | 12/2007 | Finkelstein et al. |
| 2007/0299923 | A1 | 12/2007 | Skelly et al. |
| 2008/0001924 | A1 | 1/2008 | dos los Reyes et al. |
| 2008/0010610 | A1 | 1/2008 | Lim et al. |
| 2008/0024459 | A1 * | 1/2008 | Poupyrev ................ G06F 3/016 345/173 |
| 2008/0034306 | A1 | 2/2008 | Ording |
| 2008/0034331 | A1 | 2/2008 | Josephsoon et al. |
| 2008/0036743 | A1 | 2/2008 | Westerman et al. |
| 2008/0051989 | A1 | 2/2008 | Welsh |
| 2008/0052945 | A1 | 3/2008 | Matas et al. |
| 2008/0066010 | A1 | 3/2008 | Brodersen et al. |
| 2008/0094367 | A1 | 4/2008 | Van De Ven et al. |
| 2008/0094398 | A1 | 4/2008 | Ng et al. |
| 2008/0106523 | A1 | 5/2008 | Conrad |
| 2008/0109753 | A1 | 5/2008 | Karstens |
| 2008/0136790 | A1 | 6/2008 | Hio |
| 2008/0155415 | A1 | 6/2008 | Yoon et al. |
| 2008/0163119 | A1 | 7/2008 | Kim et al. |
| 2008/0168395 | A1 | 7/2008 | Ording et al. |
| 2008/0168403 | A1 | 7/2008 | Westerman et al. |
| 2008/0168404 | A1 | 7/2008 | Ording |
| 2008/0202824 | A1 | 8/2008 | Philipp et al. |
| 2008/0204427 | A1 | 8/2008 | Heesemans et al. |
| 2008/0219493 | A1 | 9/2008 | Tadmor |
| 2008/0222569 | A1 | 9/2008 | Champion et al. |
| 2008/0244448 | A1 | 10/2008 | Goering et al. |
| 2008/0259046 | A1 | 10/2008 | Carsanaro |
| 2008/0263452 | A1 | 10/2008 | Tomkins |
| 2008/0284866 | A1 | 11/2008 | Mizutani |
| 2008/0294984 | A1 | 11/2008 | Ramsay et al. |
| 2008/0297475 | A1 | 12/2008 | Woolf et al. |
| 2008/0303799 | A1 | 12/2008 | Schwesig et al. |
| 2008/0307335 | A1 | 12/2008 | Chaudhri et al. |
| 2008/0307359 | A1 | 12/2008 | Louch et al. |
| 2008/0320419 | A1 | 12/2008 | Matas et al. |
| 2009/0007017 | A1 | 1/2009 | Anzures et al. |
| 2009/0037846 | A1 | 2/2009 | Spalink et al. |
| 2009/0046110 | A1 | 2/2009 | Sadler et al. |
| 2009/0058828 | A1 | 3/2009 | Jiang et al. |
| 2009/0061837 | A1 | 3/2009 | Chaudhri et al. |
| 2009/0066668 | A1 | 3/2009 | Kim et al. |
| 2009/0073118 | A1 | 3/2009 | Yamaji et al. |
| 2009/0075738 | A1 | 3/2009 | Pearce |
| 2009/0083665 | A1 | 3/2009 | Anttila et al. |
| 2009/0085878 | A1 | 4/2009 | Heubel et al. |
| 2009/0085881 | A1 | 4/2009 | Keam |
| 2009/0085886 | A1 | 4/2009 | Huang et al. |
| 2009/0089293 | A1 | 4/2009 | Garritano et al. |
| 2009/0100343 | A1 | 4/2009 | Lee et al. |
| 2009/0102804 | A1 | 4/2009 | Wong et al. |
| 2009/0102805 | A1 | 4/2009 | Meijer et al. |
| 2009/0140985 | A1 | 6/2009 | Liu |
| 2009/0158198 | A1 | 6/2009 | Hayter et al. |
| 2009/0160793 | A1 | 6/2009 | Rekimoto |
| 2009/0160814 | A1 | 6/2009 | Li et al. |
| 2009/0167507 | A1 | 7/2009 | Maenpaa |
| 2009/0167508 | A1 | 7/2009 | Fadell et al. |
| 2009/0167704 | A1 | 7/2009 | Terlizzi et al. |
| 2009/0169061 | A1 | 7/2009 | Anderson et al. |
| 2009/0187824 | A1 | 7/2009 | Hinckley et al. |
| 2009/0198767 | A1 | 8/2009 | Jakobson et al. |
| 2009/0219294 | A1 | 9/2009 | Young et al. |
| 2009/0225037 | A1 | 9/2009 | Williamson et al. |
| 2009/0228842 | A1 | 9/2009 | Westerman et al. |
| 2009/0237374 | A1 | 9/2009 | Li et al. |
| 2009/0247112 | A1 | 10/2009 | Lundy et al. |
| 2009/0247230 | A1 | 10/2009 | Lundy et al. |
| 2009/0256947 | A1 | 10/2009 | Ciurea et al. |
| 2009/0259975 | A1 | 10/2009 | Asai et al. |
| 2009/0267906 | A1 | 10/2009 | Schroderus |
| 2009/0276730 | A1 | 11/2009 | Aybes et al. |
| 2009/0280860 | A1 | 11/2009 | Dahlke |

| | | | |
|---|---|---|---|
| 2009/0282360 | A1 | 11/2009 | Park et al. |
| 2009/0288032 | A1 | 11/2009 | Chang et al. |
| 2009/0293009 | A1 | 11/2009 | Meserth et al. |
| 2009/0303187 | A1 | 12/2009 | Pallakoff |
| 2009/0307633 | A1 | 12/2009 | Haughay, Jr. et al. |
| 2009/0322893 | A1 | 12/2009 | Stallings et al. |
| 2010/0007926 | A1 | 1/2010 | Imaizumi et al. |
| 2010/0011304 | A1 | 1/2010 | Van Os |
| 2010/0013613 | A1 | 1/2010 | Weston |
| 2010/0013777 | A1 | 1/2010 | Baudisch et al. |
| 2010/0017710 | A1 | 1/2010 | Kim et al. |
| 2010/0026640 | A1 | 2/2010 | Kim et al. |
| 2010/0026647 | A1 | 2/2010 | Abe et al. |
| 2010/0039446 | A1 | 2/2010 | Hillis et al. |
| 2010/0044121 | A1 | 2/2010 | Simon et al. |
| 2010/0057235 | A1 | 3/2010 | Wang et al. |
| 2010/0058231 | A1 | 3/2010 | Duarte et al. |
| 2010/0070908 | A1 | 3/2010 | Mori et al. |
| 2010/0073329 | A1 | 3/2010 | Raman et al. |
| 2010/0083116 | A1 | 4/2010 | Akifusa et al. |
| 2010/0085302 | A1 | 4/2010 | Fairweather et al. |
| 2010/0085314 | A1 | 4/2010 | Kwok |
| 2010/0085317 | A1 | 4/2010 | Park et al. |
| 2010/0088596 | A1 | 4/2010 | Griffin et al. |
| 2010/0088639 | A1 | 4/2010 | Yach et al. |
| 2010/0110082 | A1 | 5/2010 | Myrick et al. |
| 2010/0111434 | A1 | 5/2010 | Madden |
| 2010/0127983 | A1 | 5/2010 | Irani et al. |
| 2010/0128002 | A1 | 5/2010 | Stacy et al. |
| 2010/0138776 | A1 | 6/2010 | Korhonen |
| 2010/0148999 | A1 | 6/2010 | Casparian et al. |
| 2010/0149096 | A1 | 6/2010 | Migos et al. |
| 2010/0153879 | A1 | 6/2010 | Rimas-Ribikauskas et al. |
| 2010/0156813 | A1 | 6/2010 | Duarte et al. |
| 2010/0156818 | A1 | 6/2010 | Burrough et al. |
| 2010/0156823 | A1 | 6/2010 | Paleczny et al. |
| 2010/0156825 | A1 | 6/2010 | Sohn et al. |
| 2010/0171713 | A1 | 7/2010 | Kwok et al. |
| 2010/0175023 | A1 | 7/2010 | Gatlin et al. |
| 2010/0180225 | A1 | 7/2010 | Chiba et al. |
| 2010/0199227 | A1 | 8/2010 | Xiao et al. |
| 2010/0211872 | A1 | 8/2010 | Rolston et al. |
| 2010/0214239 | A1 | 8/2010 | Wu |
| 2010/0225604 | A1 | 9/2010 | Homma et al. |
| 2010/0231534 | A1 | 9/2010 | Chaudhri et al. |
| 2010/0235726 | A1 | 9/2010 | Ording et al. |
| 2010/0235746 | A1 | 9/2010 | Anzures |
| 2010/0251168 | A1 | 9/2010 | Fujita et al. |
| 2010/0271312 | A1 | 10/2010 | Alameh et al. |
| 2010/0271500 | A1 | 10/2010 | Park et al. |
| 2010/0277419 | A1 | 11/2010 | Ganey et al. |
| 2010/0277496 | A1 | 11/2010 | Kawanishi et al. |
| 2010/0281379 | A1 | 11/2010 | Meaney et al. |
| 2010/0281385 | A1 | 11/2010 | Meaney et al. |
| 2010/0289807 | A1 | 11/2010 | Yu et al. |
| 2010/0302177 | A1 | 12/2010 | Kim et al. |
| 2010/0302179 | A1 | 12/2010 | Ahn et al. |
| 2010/0306702 | A1 | 12/2010 | Warner |
| 2010/0308983 | A1 | 12/2010 | Conte et al. |
| 2010/0309147 | A1 | 12/2010 | Fleizach et al. |
| 2010/0313124 | A1 | 12/2010 | Privault et al. |
| 2010/0313156 | A1 | 12/2010 | Louch et al. |
| 2010/0313158 | A1 | 12/2010 | Lee et al. |
| 2010/0313166 | A1 | 12/2010 | Nakayama et al. |
| 2010/0315417 | A1 | 12/2010 | Cho et al. |
| 2010/0315438 | A1 | 12/2010 | Horodezky et al. |
| 2010/0321301 | A1 | 12/2010 | Casparian et al. |
| 2010/0325578 | A1 | 12/2010 | Mital et al. |
| 2011/0010626 | A1 | 1/2011 | Fino et al. |
| 2011/0018695 | A1 | 1/2011 | Bells et al. |
| 2011/0035145 | A1 | 2/2011 | Yamasaki |
| 2011/0050576 | A1 | 3/2011 | Forutanpour et al. |
| 2011/0050588 | A1 | 3/2011 | Li et al. |
| 2011/0050591 | A1 | 3/2011 | Kim et al. |
| 2011/0050594 | A1 | 3/2011 | Kim et al. |
| 2011/0050629 | A1 | 3/2011 | Homma et al. |
| 2011/0050630 | A1 | 3/2011 | Ikeda |
| 2011/0050653 | A1 | 3/2011 | Miyazawa et al. |
| 2011/0054837 | A1 | 3/2011 | Ikeda |

(56) References Cited

U.S. PATENT DOCUMENTS

2011/0055135 A1 3/2011 Dawson et al.
2011/0055741 A1 3/2011 Jeon et al.
2011/0057886 A1 3/2011 Ng et al.
2011/0057903 A1 3/2011 Yamano et al.
2011/0061029 A1 3/2011 Yeh et al.
2011/0063248 A1 3/2011 Yoon
2011/0069012 A1 3/2011 Martensson
2011/0069016 A1 3/2011 Victor
2011/0074697 A1 3/2011 Rapp et al.
2011/0080350 A1 4/2011 Almalki et al.
2011/0084910 A1 4/2011 Almalki et al.
2011/0087982 A1 4/2011 McCann et al.
2011/0087983 A1 4/2011 Shim
2011/0093815 A1 4/2011 Gobeil
2011/0093817 A1 4/2011 Song et al.
2011/0107272 A1 5/2011 Aquilar
2011/0116716 A1 5/2011 Kwon et al.
2011/0119610 A1 5/2011 Hackborn et al.
2011/0126139 A1 5/2011 Jeong et al.
2011/0138295 A1 6/2011 Momchilov et al.
2011/0141031 A1 6/2011 McCullough et al.
2011/0141052 A1 6/2011 Bernstein et al.
2011/0144777 A1 6/2011 Firkins et al.
2011/0145752 A1 6/2011 Fagans
2011/0145753 A1 6/2011 Prakash
2011/0145764 A1 6/2011 Higuchi et al.
2011/0149138 A1 6/2011 Watkins
2011/0163971 A1 7/2011 Wagner et al.
2011/0164042 A1 7/2011 Chaudhri
2011/0167369 A1 7/2011 van Os
2011/0169765 A1 7/2011 Aono
2011/0175830 A1 7/2011 Miyazawa et al.
2011/0179368 A1 7/2011 King et al.
2011/0179381 A1 7/2011 King
2011/0181538 A1 7/2011 Aono
2011/0185299 A1 7/2011 Hinckley et al.
2011/0185300 A1 7/2011 Hinckley et al.
2011/0185316 A1 7/2011 Reid et al.
2011/0193788 A1 8/2011 King et al.
2011/0193809 A1 8/2011 Walley et al.
2011/0193881 A1 8/2011 Rydenhag
2011/0197160 A1 8/2011 Kim et al.
2011/0201387 A1 8/2011 Paek et al.
2011/0202834 A1 8/2011 Mandryk et al.
2011/0202853 A1 8/2011 Mujkic
2011/0202879 A1 8/2011 Stovicek et al.
2011/0205163 A1 8/2011 Hinckley et al.
2011/0209088 A1 8/2011 Hinckley et al.
2011/0209093 A1 8/2011 Hinckley et al.
2011/0209097 A1 8/2011 Hinckley et al.
2011/0209099 A1 8/2011 Hinckley et al.
2011/0209104 A1 8/2011 Hinckley et al.
2011/0210931 A1 9/2011 Shai
2011/0215914 A1 9/2011 Edwards
2011/0221684 A1 9/2011 Rydenhag
2011/0221776 A1 9/2011 Shimotani et al.
2011/0231789 A1 9/2011 Bukurak et al.
2011/0238690 A1 9/2011 Arrasvouri et al.
2011/0239110 A1 9/2011 Garrett et al.
2011/0242029 A1 10/2011 Kasahara et al.
2011/0246877 A1 10/2011 Kwak et al.
2011/0248916 A1 10/2011 Griffin et al.
2011/0248948 A1 10/2011 Griffin et al.
2011/0252346 A1 10/2011 Chaudhri
2011/0252357 A1 10/2011 Chaudhri
2011/0252362 A1 10/2011 Cho et al.
2011/0258537 A1 10/2011 Rives et al.
2011/0263298 A1 10/2011 Park
2011/0267530 A1 11/2011 Chun
2011/0279381 A1 11/2011 Tong et al.
2011/0279395 A1 11/2011 Kuwabara et al.
2011/0279852 A1 11/2011 Oda et al.
2011/0285656 A1 11/2011 Yaksick et al.
2011/0285659 A1 11/2011 Kuwabara et al.
2011/0291945 A1 12/2011 Ewing, Jr. et al.
2011/0291951 A1 12/2011 Tong
2011/0296334 A1 12/2011 Ryu et al.
2011/0296351 A1 12/2011 Ewing, Jr. et al.
2011/0304559 A1 12/2011 Pasquero
2011/0304577 A1 12/2011 Brown et al.
2011/0310049 A1 12/2011 Homma et al.
2012/0005622 A1 1/2012 Park et al.
2012/0011437 A1 1/2012 James et al.
2012/0013541 A1 1/2012 Boka et al.
2012/0013542 A1 1/2012 Shenfield
2012/0019448 A1 1/2012 Pitkanen et al.
2012/0026110 A1 2/2012 Yamano
2012/0036441 A1 2/2012 Basir et al.
2012/0036556 A1 2/2012 LeBeau et al.
2012/0038580 A1 2/2012 Sasaki
2012/0044153 A1 2/2012 Arrasvouri et al.
2012/0056837 A1 3/2012 Park et al.
2012/0056848 A1 3/2012 Yamano et al.
2012/0062564 A1 3/2012 Miyashita et al.
2012/0062604 A1 3/2012 Lobo
2012/0062732 A1 3/2012 Marman et al.
2012/0066630 A1 3/2012 Kim et al.
2012/0066648 A1 3/2012 Rolleston et al.
2012/0081375 A1 4/2012 Robert et al.
2012/0084689 A1 4/2012 Ledet et al.
2012/0084713 A1 4/2012 Desai et al.
2012/0089932 A1 4/2012 Kano et al.
2012/0089942 A1 4/2012 Gammon
2012/0089951 A1 4/2012 Cassidy
2012/0096393 A1 4/2012 Shim et al.
2012/0096400 A1 4/2012 Cho
2012/0098780 A1 4/2012 Fujisawa et al.
2012/0102437 A1 4/2012 Worley et al.
2012/0105358 A1* 5/2012 Momeyer ............. G06F 3/0414 345/174
2012/0105367 A1 5/2012 Son et al.
2012/0106852 A1 5/2012 Khawand et al.
2012/0113007 A1 5/2012 Koch et al.
2012/0113023 A1 5/2012 Koch et al.
2012/0126962 A1 5/2012 Ujii et al.
2012/0131495 A1 5/2012 Goossens et al.
2012/0139864 A1 6/2012 Sleeman et al.
2012/0146945 A1 6/2012 Miyazawa et al.
2012/0147052 A1 6/2012 Homma et al.
2012/0154328 A1 6/2012 Kono
2012/0159380 A1 6/2012 Kocienda et al.
2012/0169646 A1 7/2012 Berkes et al.
2012/0169716 A1 7/2012 Mihara
2012/0176403 A1 7/2012 Cha et al.
2012/0179967 A1 7/2012 Hayes
2012/0182226 A1 7/2012 Tuli
2012/0183271 A1 7/2012 Forutanpour et al.
2012/0206393 A1 8/2012 Hillis et al.
2012/0216114 A1 8/2012 Privault et al.
2012/0218203 A1 8/2012 Kanki
2012/0235912 A1 9/2012 Laubach
2012/0240044 A1 9/2012 Johnson et al.
2012/0249575 A1 10/2012 Krolczyk et al.
2012/0249853 A1 10/2012 Krolczyk et al.
2012/0256846 A1 10/2012 Mak
2012/0256847 A1 10/2012 Mak et al.
2012/0256857 A1 10/2012 Mak
2012/0257071 A1 10/2012 Prentice
2012/0260220 A1 10/2012 Griffin
2012/0274591 A1 11/2012 Rimas-Ribikauskas et al.
2012/0274662 A1* 11/2012 Kim ...................... G06F 3/0488 345/650
2012/0284673 A1 11/2012 Lamb et al.
2012/0293449 A1 11/2012 Dietz
2012/0293551 A1 11/2012 Momeyer et al.
2012/0297041 A1 11/2012 Momchilov
2012/0304108 A1 11/2012 Jarrett et al.
2012/0304132 A1 11/2012 Sareen et al.
2012/0304133 A1 11/2012 Nan et al.
2012/0306748 A1 12/2012 Fleizach et al.
2012/0306764 A1 12/2012 Kamibeppu
2012/0306765 A1 12/2012 Moore
2012/0306766 A1 12/2012 Moore
2012/0306772 A1 12/2012 Tan et al.

(56) References Cited

U.S. PATENT DOCUMENTS

2012/0306778 A1 12/2012 Wheeldreyer et al.
2012/0306927 A1 12/2012 Lee et al.
2012/0311429 A1 12/2012 Decker et al.
2012/0311437 A1 12/2012 Weeldreyer et al.
2012/0311498 A1 12/2012 Kluttz et al.
2012/0311504 A1 12/2012 van Os et al.
2013/0002561 A1 1/2013 Wakasa
2013/0016042 A1 1/2013 Makinen et al.
2013/0016122 A1 1/2013 Bhatt et al.
2013/0019158 A1 1/2013 Watanabe
2013/0019174 A1 1/2013 Gil et al.
2013/0031514 A1 1/2013 Gabbert
2013/0036386 A1 2/2013 Park et al.
2013/0044062 A1 2/2013 Bose et al.
2013/0047100 A1 2/2013 Kroeger et al.
2013/0050131 A1 2/2013 Lee et al.
2013/0050143 A1 2/2013 Kim et al.
2013/0061172 A1 3/2013 Huang et al.
2013/0063389 A1 3/2013 Moore
2013/0067383 A1 3/2013 Kataoka et al.
2013/0067513 A1 3/2013 Takami
2013/0067527 A1 3/2013 Ashbook et al.
2013/0074003 A1 3/2013 Dolenc
2013/0077804 A1 3/2013 Glebe et al.
2013/0082824 A1 4/2013 Colley
2013/0086056 A1 4/2013 Dyor et al.
2013/0093691 A1 4/2013 Moosavi
2013/0093764 A1 4/2013 Andersson et al.
2013/0097520 A1 4/2013 Lewin et al.
2013/0097521 A1 4/2013 Lewin et al.
2013/0097534 A1 4/2013 Lewin et al.
2013/0097539 A1 4/2013 Mansson et al.
2013/0097556 A1 4/2013 Louch
2013/0097562 A1 4/2013 Kermoian et al.
2013/0111398 A1 5/2013 Lu et al.
2013/0113715 A1 5/2013 Grant et al.
2013/0113720 A1 5/2013 Van Eerd et al.
2013/0120278 A1 5/2013 Cantrell
2013/0120295 A1 5/2013 Kim et al.
2013/0120306 A1 5/2013 Furukawa
2013/0135243 A1 5/2013 Hirsch et al.
2013/0135499 A1 5/2013 Song
2013/0141364 A1 6/2013 Lynn et al.
2013/0141396 A1 6/2013 Lynn et al.
2013/0145313 A1 6/2013 Roh et al.
2013/0154948 A1 6/2013 Schediwy et al.
2013/0154959 A1 6/2013 Lindsay et al.
2013/0155018 A1 6/2013 Dagdeviren
2013/0159893 A1 6/2013 Lewis et al.
2013/0162603 A1 6/2013 Peng et al.
2013/0162667 A1 6/2013 Eskolin et al.
2013/0169549 A1 7/2013 Seymour et al.
2013/0174049 A1 7/2013 Townsend et al.
2013/0174089 A1 7/2013 Ki
2013/0174094 A1 7/2013 Heo et al.
2013/0174179 A1 7/2013 Park et al.
2013/0179840 A1 7/2013 Fisher et al.
2013/0191791 A1 7/2013 Rydenhag et al.
2013/0194217 A1 8/2013 Lee et al.
2013/0198690 A1 8/2013 Barsoum et al.
2013/0212515 A1 8/2013 Eleftheriou
2013/0212541 A1 8/2013 Dolenc et al.
2013/0215079 A1 8/2013 Johnson et al.
2013/0222274 A1 8/2013 Mori et al.
2013/0222671 A1 8/2013 Tseng et al.
2013/0227419 A1 8/2013 Lee et al.
2013/0227450 A1* 8/2013 Na .......................... G06F 3/048 715/764
2013/0232402 A1 9/2013 Lu et al.
2013/0234929 A1 9/2013 Libin
2013/0239057 A1 9/2013 Ubillos et al.
2013/0249814 A1 9/2013 Zeng
2013/0257793 A1 10/2013 Zeliff et al.
2013/0257817 A1 10/2013 Yliaho
2013/0265246 A1 10/2013 Tae
2013/0268875 A1 10/2013 Han et al.
2013/0278520 A1 10/2013 Weng et al.
2013/0305184 A1 11/2013 Kim et al.
2013/0307792 A1 11/2013 Andres et al.
2013/0321340 A1 12/2013 Seo et al.
2013/0321457 A1 12/2013 Bauermeister et al.
2013/0325342 A1 12/2013 Pylappan et al.
2013/0326420 A1 12/2013 Liu et al.
2013/0326421 A1 12/2013 Jo
2013/0328770 A1 12/2013 Parham
2013/0332836 A1 12/2013 Cho
2013/0332892 A1 12/2013 Matsuki
2013/0339909 A1 12/2013 Ha
2014/0002355 A1 1/2014 Lee et al.
2014/0002374 A1 1/2014 Hunt et al.
2014/0002386 A1 1/2014 Rosenberg et al.
2014/0026098 A1 1/2014 Gilman
2014/0028571 A1 1/2014 St. Clair
2014/0028601 A1 1/2014 Moore
2014/0049491 A1 2/2014 Nagar et al.
2014/0055367 A1 2/2014 Dearman et al.
2014/0055377 A1 2/2014 Kim
2014/0059460 A1 2/2014 Ho
2014/0059485 A1 2/2014 Lehrian et al.
2014/0063316 A1 3/2014 Lee et al.
2014/0063541 A1 3/2014 Yamazaki
2014/0072281 A1 3/2014 Cho et al.
2014/0072283 A1 3/2014 Cho et al.
2014/0078318 A1 3/2014 Alameh
2014/0078343 A1 3/2014 Dai et al.
2014/0082536 A1 3/2014 Costa et al.
2014/0092025 A1 4/2014 Pala et al.
2014/0092030 A1 4/2014 Van der Velden
2014/0108936 A1 4/2014 Khosropour et al.
2014/0109016 A1 4/2014 Ouyang et al.
2014/0111456 A1 4/2014 Kashiwa et al.
2014/0111670 A1 4/2014 Lord et al.
2014/0118268 A1 5/2014 Kuscher
2014/0139471 A1 5/2014 Matsuki
2014/0152581 A1 6/2014 Case et al.
2014/0157203 A1 6/2014 Jeon et al.
2014/0160063 A1 6/2014 Yairi et al.
2014/0160073 A1 6/2014 Matsuki
2014/0164955 A1 6/2014 Thiruvidam et al.
2014/0164966 A1 6/2014 Kim et al.
2014/0165006 A1 6/2014 Chaudhri et al.
2014/0168093 A1 6/2014 Lawrence
2014/0168153 A1 6/2014 Deichmann et al.
2014/0173517 A1 6/2014 Chaudhri
2014/0184526 A1 7/2014 Cho
2014/0201660 A1 7/2014 Clausen et al.
2014/0208271 A1* 7/2014 Bell ...................... G06F 3/0488 715/836
2014/0210753 A1 7/2014 Lee et al.
2014/0210758 A1 7/2014 Park et al.
2014/0210760 A1 7/2014 Aberg et al.
2014/0210798 A1 7/2014 Wilson
2014/0229888 A1 8/2014 Ko et al.
2014/0237408 A1 8/2014 Ohlsson et al.
2014/0245202 A1 8/2014 Yoon et al.
2014/0245367 A1 8/2014 Sasaki et al.
2014/0267114 A1 9/2014 Lisseman et al.
2014/0267135 A1 9/2014 Chhabra
2014/0267362 A1 9/2014 Kocienda et al.
2014/0282084 A1 9/2014 Murarka et al.
2014/0282214 A1 9/2014 Shirzadi et al.
2014/0300569 A1 10/2014 Matsuki et al.
2014/0304651 A1 10/2014 Johansson et al.
2014/0306897 A1 10/2014 Cueto
2014/0306899 A1 10/2014 Hicks
2014/0310638 A1 10/2014 Lee et al.
2014/0313130 A1 10/2014 Yamano et al.
2014/0333551 A1 11/2014 Kim et al.
2014/0333561 A1 11/2014 Bull et al.
2014/0344765 A1 11/2014 Hicks et al.
2014/0354845 A1 12/2014 Molgaard et al.
2014/0354850 A1 12/2014 Kosaka et al.
2014/0359438 A1 12/2014 Matsuki
2014/0359528 A1 12/2014 Murata

(56) References Cited

U.S. PATENT DOCUMENTS

2014/0365945 A1 12/2014 Karunamuni et al.
2014/0380247 A1 12/2014 Tecarro et al.
2015/0015763 A1 1/2015 Lee et al.
2015/0020036 A1 1/2015 Kim et al.
2015/0026584 A1 1/2015 Kobayakov et al.
2015/0026592 A1 1/2015 Mohammed et al.
2015/0029149 A1 1/2015 Andersson et al.
2015/0033184 A1 1/2015 Kim et al.
2015/0042588 A1 2/2015 Park
2015/0046876 A1 2/2015 Goldenberg
2015/0049033 A1 2/2015 Kim et al.
2015/0058723 A1 2/2015 Cieplinski et al.
2015/0062046 A1 3/2015 Cho et al.
2015/0062052 A1 3/2015 Bernstein et al.
2015/0062068 A1 3/2015 Shih et al.
2015/0067495 A1 3/2015 Bernstein et al.
2015/0067496 A1 3/2015 Missig et al.
2015/0067497 A1 3/2015 Cieplinski et al.
2015/0067513 A1 3/2015 Zambetti et al.
2015/0067519 A1 3/2015 Missig et al.
2015/0067534 A1 3/2015 Choi et al.
2015/0067559 A1 3/2015 Missig et al.
2015/0067560 A1 3/2015 Cieplinski et al.
2015/0067596 A1 3/2015 Brown et al.
2015/0067601 A1 3/2015 Bernstein et al.
2015/0067602 A1 3/2015 Bernstein et al.
2015/0067605 A1 3/2015 Zambetti et al.
2015/0071547 A1 3/2015 Keating et al.
2015/0116205 A1 4/2015 Westerman et al.
2015/0121218 A1 4/2015 Kim et al.
2015/0121225 A1 4/2015 Somasundaram et al.
2015/0067563 A1 5/2015 Bernstein et al.
2015/0128092 A1 5/2015 Lee et al.
2015/0135109 A1 5/2015 Zambetti et al.
2015/0138126 A1 5/2015 Westerman
2015/0138155 A1 5/2015 Bernstein et al.
2015/0139605 A1 5/2015 Wiklof
2015/0143273 A1 5/2015 Bernstein et al.
2015/0143284 A1 5/2015 Bennett et al.
2015/0149899 A1 5/2015 Bernstein et al.
2015/0149964 A1 5/2015 Bernstein et al.
2015/0149967 A1 5/2015 Bernstein et al.
2015/0153897 A1 6/2015 Huang et al.
2015/0153929 A1 6/2015 Bernstein et al.
2015/0160729 A1 6/2015 Nakagawa
2015/0185840 A1 7/2015 Golyshko et al.
2015/0193099 A1 7/2015 Murphy
2015/0193951 A1 7/2015 Lee et al.
2015/0205495 A1 7/2015 Koide et al.
2015/0234446 A1 8/2015 Nathan et al.
2015/0234493 A1 8/2015 Parivar et al.
2015/0253866 A1 9/2015 Amm et al.
2015/0268786 A1 9/2015 Kitada
2015/0268813 A1 9/2015 Bos
2015/0321607 A1 11/2015 Cho et al.
2015/0332107 A1 11/2015 Paniaras
2015/0378519 A1 12/2015 Brown et al.
2015/0378982 A1 12/2015 McKenzie et al.
2015/0381931 A1 12/2015 Uhma et al.
2016/0004393 A1 1/2016 Faaborg et al.
2016/0004427 A1 1/2016 Zambetti et al.
2016/0004428 A1 1/2016 Bernstein et al.
2016/0004429 A1 1/2016 Bernstein et al.
2016/0004430 A1 1/2016 Missig et al.
2016/0004431 A1 1/2016 Bernstein et al.
2016/0004432 A1 1/2016 Bernstein et al.
2016/0011771 A1 1/2016 Cieplinski
2016/0019718 A1 1/2016 Mukkamala et al.
2016/0021511 A1 1/2016 Jin et al.
2016/0041750 A1 2/2016 Cieplinski et al.
2016/0048326 A1 2/2016 Kim et al.
2016/0062466 A1 3/2016 Moussette et al.
2016/0062619 A1 3/2016 Reeve et al.
2016/0070401 A1 3/2016 Kim et al.
2016/0132139 A1 5/2016 Du et al.
2016/0188181 A1* 6/2016 Smith .................... G06F 3/048 715/765
2016/0196028 A1 7/2016 Kenney et al.
2016/0210025 A1 7/2016 Bernstein et al.
2016/0224220 A1 8/2016 Ganguly
2016/0259412 A1 9/2016 Flint et al.
2016/0259413 A1 9/2016 Anzures et al.
2016/0259495 A1 9/2016 Butcher et al.
2016/0259496 A1 9/2016 Butcher et al.
2016/0259497 A1 9/2016 Foss et al.
2016/0259498 A1 9/2016 Foss et al.
2016/0259499 A1 9/2016 Kocienda et al.
2016/0259516 A1 9/2016 Kudurshian et al.
2016/0259517 A1 9/2016 Butcher et al.
2016/0259519 A1 9/2016 Foss et al.
2016/0259527 A1 9/2016 Kocienda et al.
2016/0259528 A1 9/2016 Foss et al.
2016/0259536 A1 9/2016 Kudurshian et al.
2016/0259548 A1 9/2016 Ma
2016/0274686 A1 9/2016 Ruiz et al.
2016/0274728 A1 9/2016 Luo et al.
2016/0274761 A1 9/2016 Ruiz et al.
2016/0283054 A1 9/2016 Suzuki
2016/0320906 A1 11/2016 Bokma et al.
2016/0334960 A1 11/2016 Brown et al.
2016/0357305 A1 12/2016 Wells et al.
2016/0357368 A1 12/2016 Federighi et al.
2016/0357389 A1 12/2016 Dakin et al.
2016/0357390 A1 12/2016 Federighi et al.
2016/0357404 A1 12/2016 Alonso Ruiz et al.
2016/0360116 A1 12/2016 Penha et al.
2017/0045981 A1 2/2017 Karunamuni et al.
2017/0046039 A1 2/2017 Karunamuni et al.
2017/0046058 A1 2/2017 Karunamuni et al.
2017/0046059 A1 2/2017 Karunamuni et al.
2017/0046060 A1 2/2017 Karunamuni et al.
2017/0075520 A1 3/2017 Bauer et al.
2017/0075562 A1 3/2017 Bauer et al.
2017/0075563 A1 3/2017 Bauer et al.
2017/0109011 A1 4/2017 Jiang
2017/0139565 A1 5/2017 Choi
2018/0024681 A1 1/2018 Bernstein et al.

FOREIGN PATENT DOCUMENTS

CN 101118469 A 2/2008
CN 101202866 A 6/2008
CN 101222704 A 7/2008
CN 101320303 A 12/2008
CN 100524183 8/2009
CN 101593077 A 12/2009
CN 101809526 A 8/2010
CN 102004593 A 4/2011
CN 102112946 A 6/2011
CN 102160021 A 8/2011
CN 102349038 A 2/2012
CN 102385478 A 3/2012
CN 102438092 A 5/2012
CN 102483677 A 5/2012
CN 102646013 A 8/2012
CN 102662573 A 9/2012
CN 102841677 A 12/2012
CN 103097992 A 5/2013
DE 100 59 906 A1 6/2002
EP 0 859 307 A1 3/1998
EP 0 880 090 A2 11/1998
EP 1 028 583 A1 8/2000
EP 1 406 150 A1 4/2004
EP 1 674 977 A2 6/2006
EP 1 882 902 A1 1/2008
EP 2 000 896 A2 12/2008
EP 2 017 701 A1 1/2009
EP 2 028 583 A2 2/2009
EP 2 141 574 A2 1/2010
EP 2 175 357 A1 4/2010
EP 2 196 893 A2 6/2010
EP 2 214 087 A1 8/2010
EP 2 226 715 A2 9/2010
EP 2 299 351 A2 3/2011

(56) References Cited

FOREIGN PATENT DOCUMENTS

EP 2 302 496 A1 3/2011
EP 2 375 309 A1 10/2011
EP 2 375 314 A1 10/2011
EP 2 386 935 A1 11/2011
EP 2 407 868 A1 1/2012
EP 2 420 924 A2 2/2012
EP 2 426 580 A2 3/2012
EP 2 447 818 A1 5/2012
EP 2 527 966 A2 11/2012
EP 2 530 677 A2 12/2012
EP 2 541 376 A1 1/2013
EP 2 555 500 A1 2/2013
EP 2 615 535 A1 7/2013
EP 2 631 737 A1 8/2013
EP 2 674 846 A2 12/2013
EP 2 733 578 A2 5/2014
EP 2 808 764 A1 12/2014
EP 2 809 058 A1 12/2014
EP 2 813 938 A1 12/2014
GB 2 402 105 A 12/2004
JP 58-182746 10/1983
JP H06-161647 A 6/1994
JP H07-98769 A 4/1995
JP H07-151512 A 6/1995
JP H08-227341 A 9/1996
JP H09-269883 A 10/1997
JP H09-330175 A 12/1997
JP H11-203044 A 7/1999
JP 2001-202192 A 7/2001
JP 2002-149312 A 5/2002
JP 2003-157131 A 5/2003
JP 2003-186597 A 7/2003
JP 2004-054861 A 2/2004
JP 2004-062648 A 2/2004
JP 2004-070492 A 3/2004
JP 2004-086733 A 3/2004
JP 2005-031786 A 2/2005
JP 2005-092386 A 4/2005
JP 2005-135106 A 5/2005
JP 2005-157842 A 6/2005
JP 2005-196810 A 7/2005
JP 2006-185443 A 7/2006
JP 2007-116384 A 5/2007
JP 2007-264808 A 10/2007
JP 2008-009759 A 1/2008
JP 2008-015890 A 1/2008
JP 2008-033739 A 2/2008
JP 2008-516348 A 5/2008
JP 2008-146453 A 6/2008
JP 2008-537615 9/2008
JP 2008-305174 A 12/2008
JP 2009-500761 1/2009
JP 2009-211704 A 9/2009
JP 2009-217543 A 9/2009
JP 2010-009321 A 1/2010
JP 2010-503130 A 1/2010
JP 2010-055274 A 3/2010
JP 2010-097353 A 4/2010
JP 2010-146507 A 7/2010
JP 2010-152716 A 7/2010
JP 2010-176174 A 8/2010
JP 2010-176337 A 8/2010
JP 2010-181934 A 8/2010
JP 2010-541071 A 12/2010
JP 2011-501307 A 1/2011
JP 2011-048666 A 3/2011
JP 2011-048686 A 3/2011
JP 2011-048762 A 3/2011
JP 2011-048832 A 3/2011
JP 2011-053831 A 3/2011
JP 2011-053972 A 3/2011
JP 2011-053973 A 3/2011
JP 2011-053974 A 3/2011
JP 2011-059821 A 3/2011
JP 2011-070342 A 4/2011
JP 2011-100290 A 5/2011
JP 2011-107823 A 6/2011
JP 2011-123773 A 6/2011
JP 2011-141868 A 7/2011
JP 2011-192179 A 9/2011
JP 2011-192215 A 9/2011
JP 2011-242386 A 12/2011
JP 2011-253556 A 12/2011
JP 2011-257941 A 12/2011
JP 2011-530101 A 12/2011
JP 2012-027940 A 2/2012
JP 2012-043266 A 3/2012
JP 2012-043267 A 3/2012
JP 2012-053754 3/2012
JP 2012-053926 A 3/2012
JP 2012-073873 A 4/2012
JP 2012-509605 A 4/2012
JP 2012-093820 A 5/2012
JP 2012-123564 A 6/2012
JP 2012-128825 A 7/2012
JP 2013-030050 A 2/2013
JP 2013-058149 A 3/2013
JP 2013-080521 A 5/2013
JP 2013-529339 A 7/2013
JP 2013-542488 A 11/2013
JP 2014-130567 A 7/2014
JP 2014-140112 A 7/2014
JP 2014-519109 A 8/2014
JP 2015-153420 A 8/2015
KR 2006-0071353 A 6/2006
KR 2008-0045143 A 4/2008
KR 2008-0054346 A 6/2008
KR 2010 0133246 A 12/2010
KR 2011 0086501 A 7/2011
KR 20120103670 A 9/2012
KR 2013 0099647 A 9/2013
KR 2014 0016495 A 2/2014
KR 2014 0043760 A 4/2014
KR 2014 0079110 A 6/2014
KR 20150021977 A 3/2015
WO WO 2005/106637 A2 11/2005
WO WO 2006/013485 A2 2/2006
WO WO 2006/042309 A1 4/2006
WO WO 2006/094308 A2 9/2006
WO WO 2007/121557 A1 11/2007
WO WO 2008/030976 A2 3/2008
WO WO 2008/064142 A2 5/2008
WO WO 2009/155981 A1 12/2009
WO WO 2009/158549 A2 12/2009
WO WO 2010/013876 A1 2/2010
WO WO 2010/090010 A1 8/2010
WO WO 2010/122813 A1 10/2010
WO WO 2011/024389 A1 3/2011
WO WO 2011/024465 A1 3/2011
WO WO 2011/093045 A1 8/2011
WO WO 2011/105009 A1 9/2011
WO WO 2011/108190 A1 9/2011
WO WO 2011/115187 A1 9/2011
WO WO 2011/121375 A1 10/2011
WO WO 2012/021417 A1 2/2012
WO WO 2012/037664 3/2012
WO WO 2012/096804 A2 7/2012
WO WO 2012/108213 A1 8/2012
WO WO 2012/114760 A1 8/2012
WO WO 2012/150540 A2 11/2012
WO WO 2013/169299 A1 11/2013
WO WO 2013/169300 A1 11/2013
WO WO 2013/169845 A1 11/2013
WO WO 2013/169849 A2 11/2013
WO WO 2013/169851 A2 11/2013
WO WO 2013/169853 A1 11/2013
WO WO 2013/169854 A2 11/2013
WO WO 2013/169870 A1 11/2013
WO WO 2013/169875 A2 11/2013
WO WO 2013/169877 A2 11/2013
WO WO 2013/169882 A2 11/2013
WO WO 2013/173838 A2 11/2013
WO WO-2013169870 A1 * 11/2013 ........... G06F 3/0416
WO WO 2014/105275 A1 7/2014

(56) References Cited

FOREIGN PATENT DOCUMENTS

| | | | |
|---|---|---|---|
| WO | WO 2014/105276 | A1 | 7/2014 |
| WO | WO 2014/105277 | A1 | 7/2014 |
| WO | WO 2014/105278 | A1 | 7/2014 |
| WO | WO 2014/105279 | A1 | 7/2014 |
| WO | WO 2014/129655 | A1 | 8/2014 |
| WO | WO 2014/149473 | A1 | 9/2014 |
| WO | WO 2014/200733 | A1 | 12/2014 |
| WO | WO 2016/200584 | A2 | 12/2016 |

OTHER PUBLICATIONS

Gurman, "Force Touch on iPhone 6S Revealed: Expect Shortcuts, Faster Actions, iOS", 9To5Mac Aug. 10, 2015, 31 pages.
Rekimoto, et al., "SmartPad: A Finger-Sensing Keypad for Mobile Interaction", CHI 2003, Ft. Lauderdale, Florida, ACM 1-58113-637—Apr. 5-10, 2003, 2 pages.
Wilson, et al., "Augmenting Tactile Interaction with Pressure-Based Input", School of Computing Science, Glasgow, UK, Nov. 15-17, 2011, 2 pages.
Zylom, "House Secrets", http://game.zylom.com/servlet/Entry?g=38&s=19521&nocache=1438641323066, Aug. 3, 2015, 1 page.
Office Action, dated Apr. 7, 2016, received in Danish Patent Application No. 201500597, which corresponds with U.S. Appl. No. 14/871,227, 7 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
iPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kiener, "Force Touch on iPhone", https://www.youtube.com/watch?v=CEMmnsU5fC8, Aug. 4, 2015, 4 pages.
Kost, "LR3—Deselect All Images But One", Julieanne Kost's Blog, blogs.adobe.com/jkost/2011/12/lr3-deselect-all-images-but-one.html, Dec. 22, 2011, 1 page.
Kumar, "How to Enable Ripple Effect on Lock Screen of Galaxy S2", YouTube, http, http://www.youtube.com/watch?v+B9-4M5abLXA, Feb. 12, 2013, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Microsoft, "Lumia—How to Personalize Your Start Screen", https://www.youtube.com/watch?v=6GI5Z3TrSEs, Nov. 11, 2014, 3 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Phonebuff, "How to Pair Bluetooth on the iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Mar. 15, 2017, received in U.S. Appl. No. 14/535,671, 13 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Office Action, dated Sep. 13, 2016, received in Japanese Patent Application No. 2015-547948, which corresponds with U.S. Appl. No. 14/536,426, 5 pages.
Office Action, dated Feb. 24, 2017, received in Korean Patent Application No. 10-2015-7018851, which corresponds with U.S. Appl. No. 14/536,426, 3 pages.
Office Action, dated Apr. 5, 2017, received in U.S. Appl. No. 14/536,367, 16 pages.
Certificate of Grant, dated Sep. 15, 2016, received in Australian Patent Australian Patent Application No. 2013259606, which corresponds with U.S. Appl. No. 14/536,426, 1 page.
Office Action, dated May 15, 2017, received in Australian Patent Application No. 2016216580, which corresponds with U.S. Appl. No. 14/536,426, 3 pages.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Jan. 3, 2017, received in Australian Patent Application No. 2016201451, which corresponds with U.S. Appl. No. 14/608,926, 3 pages.
Office Action, dated May 4, 2017, received in Chinese Patent Application No. 201380068414.1, which corresponds with U.S. Appl. No. 14/608,926, 5 pages.
Office Action, dated Nov. 11, 2016, received in European Patent Application No. 13795392.3, which corresponds with U.S. Appl. No. 14/608,926, 6 pages.
Notice of Allowance, dated Jan. 17, 2017, received in Japanese Patent Application No. 2015-549392, which corresponds with U.S. Appl. No. 14/608,926, 2 pages.

(56) References Cited

OTHER PUBLICATIONS

Patent, dated Feb. 17, 2017, received in Japanese Patent Application No. 2015-549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Notice of Allowance, dated May 12, 2017, received in U.S. Appl. No. 14/608,942, 10 pages.
Office Action, dated Mar. 29, 2017, received in Australian patent Application No. 2016201303, which corresponds with U.S. Appl. No. 14/608,942, 3 pages.
Office Action, dated Oct. 7, 2016, received in European Patent Application No. 13798464.7, which corresponds with U.S. Appl. No. 14/608,942, 7 pages.
Notice of Allowance, dated May 12, 2017, received in Japanese Patent Application No. 2015-549393, which corresponds with U.S. Appl. No. 14/608,942, 5 pages.
Office Action, dated Feb. 24, 2017, received in Korean Patent Application No. 2015-7018448, which corresponds with U.S. Appl. No. 14/608,942, 4 pages.
Notice of Allowance, dated Feb. 1, 2017, received in U.S. Appl. No. 14/536,203, 9 pages.
Certificate of Grant, dated Oct. 21, 2016, received in Australian Patent Application No. 2013259630, which corresponds with U.S. Appl. No. 14/536,203, 3 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Feb. 6, 2017, received in Korean Patent Application No. 2016-7033834, which corresponds with U.S. Appl. No. 14/536,203, 4 pages.
Office Action, dated Oct. 20, 2016, received in U.S. Appl. No. 14/536,247, 10 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Certificate of Grant, dated Oct. 21, 2016, received in Australian Patent Application No. 2013259637, which corresponds with U.S. Appl. No. 14/536,267, 3 pages.
Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Notice of Allowance, dated Sep. 26, 2016, received in Japanese Patent Application No. 2015-511652, which corresponds with U.S. Appl. No. 14/536,267, 5 pages.
Office Action, dated Mar. 3, 2017, received in Japanese Patent Application No. 2016-125839, which corresponds with U.S. Appl. No. 14/536,267, 6 pages.
Notice of Allowance, dated Sep. 1, 2016, received in Korean Patent Application No. 2014-7034530, which corresponds with U.S. Appl. No. 14/536,267, 3 pages.
Office Action, dated Jan. 5, 2017, received in Korean Patent Application No. 2016-7029533, which corresponds with U.S. Appl. No. 14/536,267, 2 pages.
Office Action, dated Apr. 7, 2017, received in U.S. Appl. No. 14/536,291, 11 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Aug. 22, 2016, received in European Patent Application No. 13724107.1, which corresponds with U.S. Appl. No. 14/536,291, 7 pages.
Office Action, dated Mar. 23, 2017, received in European Patent Application No. 13724107.1, which corresponds with U.S. Appl. No. 14/536,291, 8 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015/550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Nov. 4, 2016, received in Korean Patent Application No. 10-2015-7019984, which corresponds with U.S. Appl. No. 14/608,985, 8 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Office Action, dated May 15, 2017, received in Japanese Patent Application No. 2016-558331, which corresponds with U.S. Appl. No. 14/864,737, 5 pages.
Office Action, dated May 18, 2017, received in Dutch Patent Application No. 2016452, which corresponds with U.S. Appl. No. 14/864,737, 22 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Patent, dated Nov. 2, 2016, received in Australian Patent Application No. 2016100254, which corresponds with U.S. Appl. No. 14/866,981, 1 page.
Patent, dated Sep. 28, 2016, received in Chinese Patent Application No. 201620176169.7, which corresponds with U.S. Appl. No. 14/866,981, 4 pages.

(56) References Cited

OTHER PUBLICATIONS

Office Action, dated Dec. 5, 2016, received in Danish Patent Application No. 201500575, which corresponds with U.S. Appl. No. 14/866,981, 3 pages.
Office Action, dated Jul. 5, 2016, received in Chinese Patent Application No. 201620186008.6, which corresponds with U.S. Appl. No. 14/866,159, 3 pages.
Office Action, dated Sep. 27, 2016, received in Danish Patent Application No. 201500574, which corresponds with U.S. Appl. No. 14/866,159, 4 pages.
Office Action, dated Mar. 14, 2017, received in Danish Patent Application No. 201500574, which corresponds with U.S. Appl. No. 14/866,159, 5 pages.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Office Action, dated Sep. 2, 2016, received in Danish Patent Application No. 201500588, which corresponds with U.S. Appl. No. 14/868,078, 4 pages.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Office Action, dated May 18, 2017, received in Dutch Patent Application No. 2016376, which corresponds with U.S. Appl. No. 14/868,078, 15 pages.
Notice of Allowance, dated Nov. 14, 2016, received in U.S. Appl. No. 14/863,432, 7 pages.
Notice of Allowance, dated Apr. 27, 2017, received in U.S. Appl. No. 14/863,432, 7 pages.
Office Action, dated Aug. 19, 2016, received in Australian Patent Application No. 2016100647, which corresponds with U.S. Appl. No. 14/863,432, 5 pages.
Notice of Allowance, dated Jan. 12, 2017, received in Chinese Patent Application No. 201620470063.8, which corresponds with U.S. Appl. No. 14/863,432, 1 page.
Office Action and Additional Search Report, dated Oct. 7, 2016, received in Danish Patent Application No. 201500582, which corresponds with U.S. Appl. No. 14/863,432, 6 pages.
Office Action, dated May 18, 2017, received in Dutch Patent Application No. 2016801, which corresponds with U.S. Appl. No. 14/863,432, 34 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Final Office Action, dated Sep. 16, 2016, received in U.S. Appl. No. 14/866,489, 24 pages.
Notice of Allowance, dated Apr. 27, 2017, received in U.S. Appl. No. 16/866,489, 27 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Office Action, dated Apr. 13, 2017, received in U.S. Appl. No. 14/866,992, 34 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Office Action, dated May 2, 2017, received in U.S. Appl. No. 14/856,517, 34 pages.
Office Action, dated May 18, 2017, received in U.S. Appl. No. 14/856,519, 35 pages.
Notice of Allowance, dated Oct. 24, 2016, received in U.S. Appl. No. 14/857,645, 6 pages.
Office Action, dated Mar. 31, 2017, received in U.S. Appl. No. 14/857,700, 14 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Office Action, dated May 5, 2017, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Notice of Allowance, dated Apr. 20, 2017, received in U.S. Appl. No. 14/864,601, 13 pages.
Notice of Allowance, dated Jan. 31, 2017, received in U.S. Appl. No. 14/864,627, 7 pages.
Office Action, dated Oct. 7, 2016, received in Danish Patent Application No. 201500585, which corresponds with U.S. Appl. No. 14/864,627, 3 pages.
Office Action, dated May 4, 2017, received in Danish Patent Application No. 201500585, which corresponds with U.S. Appl. No. 14/864,627, 4 pages.
Certificate of Examination, dated Dec. 8, 2016, received in Australian Patent Application No. 2016100292, which corresponds with U.S. Appl. No. 14/866,361, 1 page.
Office Action, dated Oct. 28, 2016, received in Danish Patent Application No. 201500579, which corresponds with U.S. Appl. No. 14/866,361, 3 pages.
Office Action, dated Oct. 19, 2016, received in Chinese Patent Application No. 2016201470246.X, which corresponds with U.S. Appl. No. 14/866,987, 4 pages.

(56) References Cited

OTHER PUBLICATIONS

Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Office Action, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Office Action, dated Apr. 13, 2017, received in Australian Patent Application No. 2016101431, which corresponds with U.S. Appl. No. 14/871,227, 4 pages.
Patent, dated Sep. 26, 2016, received in Danish Patent Application No. 201500597, which corresponds with U.S. Appl. No. 14/871,227, 7 pages.
Office Action, dated Mar. 24, 2017, received in Japanese Patent Application No. 2016-533201, which corresponds with U.S. Appl. No. 14/871,227, 6 pages.
Office Action, dated Oct. 14, 2016, received in Australian Patent Application No. 2016101437, which corresponds with U.S. Appl. No. 14/871,336, 2 pages.
Office Action, dated Apr. 11, 2017, received in Australian Patent Application No. 2016101437, which corresponds with U.S. Appl. No. 14/871,336, 4 pages.
Office Action, dated Oct. 18, 2016, received in Danish Patent Application No. 201500601, which corresponds with U.S. Appl. No. 14/871,336, 3 pages.
Notice of Allowance, dated Mar. 23, 2017, received in Danish Patent Application No. 201500601, which corresponds with U.S. Appl. No. 14/871,336, 2 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Office Action, dated Mar. 13, 2017, received in Japanese Patent Application No. 2016-183289, which corresponds with U.S. Appl. No. 14/871,462, 5 pages.
Final Office Action, dated Sep. 28, 2016, received in U.S. Appl. No. 14/867,823, 31 pages.
Office Action, dated May 11, 2017, received in U.S. Appl. No. 14/867,823, 42 pages.
Office Action, dated Sep. 7, 2016, received in Danish Patent Application No. 201500594, which corresponds with U.S. Appl. No. 14/867,823, 4 pages.
Office Action, dated May 15, 2017, received in Danish Patent Application No. 201500594, which corresponds with U.S. Appl. No. 14/867,823, 4 pages.
Final Office Action, dated Nov. 2, 2016, received in U.S. Appl. No. 14/867,892, 48 pages.
Office Action, dated Sep. 14, 2016, received in Danish Patent Application No. 201500598, which corresponds with U.S. Appl. No. 14/867,892, 4 pages.
Office Action, dated May 4, 2017, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Office Action, dated Sep. 26, 2016, received in Danish Patent Application No. 201500581, which corresponds with U.S. Appl. No. 14/867,990, 5 pages.
Office Action, dated May 3, 2017, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Final Office Action, dated May 1, 2017, received in U.S. Appl. No. 15/136,782, 18 pages.
Office Action, dated May 23, 2017, received in Danish Patent Application No. 201770190, which corresponds with U.S. Appl. No. 15/136,782, 7 pages.
Office Action, dated Jan. 20, 2017, received in U.S. Appl. No. 15/231,745, 21 pages.
Office Action and Search Report, dated Oct. 17, 2016, received in Danish Patent Application No. 201670587, which corresponds with U.S. Appl. No. 15/231,745, 9 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.

(56) References Cited

OTHER PUBLICATIONS

Office Action and Search Report, dated Oct. 12, 2016, received in Danish Patent Application No. 201670593, which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
Sood, "MultitaskingGestures", http://cydia.saurik.com/package/org.thebigboxx.multitaskinggestures/, Mar. 3, 2014, 2 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
YouTube, "Multitasking Gestures: Zephyr Like Gestures on iOS", https://www.youtube.com/watch?v=Jcod-f7Lw0I, Jan. 27, 2014, 3 pages.
YouTube, "Recentz—Recent Apps in a Tap", https://www.youtube.com/watch?v=qailSHRgsTo, May 15, 2015, 1 page.
Office Action, dated Jun. 29, 2017, received in U.S. Appl. No. 14/608,895, 30 pages.
Patent, dated May 12, 2017, received in Japanese Patent Application No. 2015-547948, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated Aug. 21, 2017, received in European Patent Application No. 15183980.0, which corresponds with U.S. Appl. No. 14/536,426, 3 pages.
Final Office Action, dated Aug. 25, 2017, received in U.S. Appl. No. 14/536,464, 30 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Aug. 22, 2017, received in Korean Patent Application No. 2017-7018250, which corresponds with U.S. Appl. No. 14/608,926, 2 pages.
Patent, dated May 26, 2017, received in European Patent Application No. 13724102.2, which corresponds with U.S. Appl. No. 14/536,646, 1 page.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015-511646, which corresponds with U.S. Appl. No. 14/536,141, 3 pages.
Office Action, dated Jun. 16, 2017, received in Chinese Patent Application No. 201380068295.X, which corresponds with U.S. Appl. No. 14/608,942, 6 pages.
Patent, dated Jun. 16, 2017, received in Japanese Patent Application No. 2015-549393, which corresponds with U.S. Appl. No. 14/608,942, 3 pages.
Office Action, dated Jul. 17, 2017, received in U.S. Appl. No. 14/536,166, 19 pages.
Office Action, dated Jul. 4, 2017, received in Australian Patent Application No. 2016238917, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.
Notice of Allowance, dated Sep. 1, 2017, received in Korean Patent Application No. 2016-7029533, which corresponds with U.S. Appl. No. 14/536,267, 4 pages.
Office Action, dated Jul. 21, 2017, received in Australian Patent Application No. 2016216658, which corresponds with U.S. Appl. No. 14/536,291, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Office Action, dated Jul. 21, 2017, received in Australian Patent Application No. 2016247194, which corresponds with U.S. Appl. No. 14/536,648, 3 pages.
Notice of Allowance, dated Jul. 10, 2017, received in U.S. Appl. No. 14/609,042, 8 pages.
Notice of Allowance, dated Jun. 19, 2017, received in U.S. Appl. No. 14/864,737, 8 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.

(56) References Cited

OTHER PUBLICATIONS

Office Action, dated Jun. 12, 2017, received in Danish Patent Application No. 201500582, which corresponds with U.S. Appl. No. 14/863,432, 5 pages.
Grant, dated Jul. 21, 2017, received in Dutch Patent Application No. 2016801, which corresponds with U.S. Appl. No. 14/871,227, 8 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Patent, dated Aug. 18, 2017, received in Japanese Patent Application No. 2016558214, which corresponds with U.S. Appl. No. 14/866,511, 3 pages.
Notice of Allowance, dated Apr. 27, 2017, received in U.S. Appl. No. 14/866,489, 27 pages.
Notice of Allowance, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated Sep. 5, 2017, received in Danish Patent Application No. 201500593, which corresponds with U.S. Appl. No. 14/866,992, 6 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated Jun. 15, 2017, received in Danish Patent Application No. 201500579, which corresponds with U.S. Appl. No. 14/866,361, 2 pages.
Office Action, dated Jul. 31, 2017, received in Japanese Patent Application No. 2017126445, which corresponds with U.S. Appl. No. 14/866,987, 6 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Sep. 1, 2017, received in U.S. Appl. No. 14/870,754, 22 pages.
Office Action, dated Sep. 1, 2017, received in U.S. Appl. No. 14/870,988, 14 pages.
Office Action, dated Aug. 4, 2017, received in Japanese Patent Application No. 2016-533201, which corresponds with U.S. Appl. No. 14/871,227, 6 pages.
Office Action, dated Apr. 20, 2017, received in Chinese Patent Application No. 201621044346.2, which corresponds with U.S. Appl. No. 14/871,462, 3 pages.
Office Action, dated Jul. 6, 2017, received in U.S. Appl. No. 14/867,892, 55 pages.
Final Office Action, dated Aug. 18, 2017, received in U.S. Appl. No. 14/869,873, 20 pages.
Final Office Action, dated Jun. 2, 2017, received in U.S. Appl. No. 15/081,771, 17 pages.
Office Action, dated Aug. 29, 2017, received in Korean Patent Application No. 2017-7014536, which corresponds with U.S. Appl. No. 15/081,771, 5 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Office Action, dated Aug. 30, 2017, received in U.S. Appl. No. 15/655,749, 22 pages.
Search Report, dated Apr. 13, 2017, received in Dutch Patent Application No. 2016452, which corresponds with U.S. Appl. No. 14/864,737, 22 pages.
Search Report, dated Jun. 22, 2017, received in Dutch Patent Application No. 2016375, which corresponds with U.S. Appl. No. 14/866,981, 17 pages.
Search Report, dated Apr. 13, 2017, received in Dutch Patent Application No. 2016376, which corresponds with U.S. Appl. No. 14/868,078, 15 pages.
Search Report, dated Jun. 19, 2017, received in Dutch Patent Application No. 2016377, which corresponds with U.S. Appl. No. 14/866,159, 13 pages.
Search Report, dated Apr. 18, 2017, received in Dutch Patent Application No. 2016801, which corresponds with U.S. Appl. No. 14/863,432, 34 pages.
Extended European Search Report, dated Jun. 22, 2017, received in European Patent Application No. 16189421.7, which corresponds with U.S. Appl. No. 14/866,987, 7 pages.
Extended European Search Report, dated Sep. 11, 2017, received in European Patent Application No. 17163309.2, which corresponds with U.S. Appl. No. 14/866,987, 8 pages.
Extended European Search Report, dated Jun. 8, 2017, received in European Patent Application No. 16189425.8, which corresponds with U.S. Appl. No. 14/866,989, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
Azundris, "A Fire in the Sky," http://web.archive.org/web/20140722062639/http://blog.azundrix.com/archives/168-A-fire-in-the-sky.html, Jul. 22, 2014, 8 pages.
b-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.
cvil.ly—a design blog, Interesting Touch Interactions on Windows 8, http://cvil.ly/2011/06/04/interesting-touch-interactions-on-windows-8/, Jun. 4, 2011, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", IP.COM Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.

(56) References Cited

OTHER PUBLICATIONS

Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Forlines, et al., "Glimpse: a Novel Input Model for Multi-level Devices", Chi '05 Extended Abstracts on Human Factors in Computing Systems, Apr. 2, 2005, 4 pages.
IBM et al., "Pressure-Sensitive Icons", IBM Technical Disclosure Bulletin, vol. 33, No. 1B, Jun. 1, 1990, 3 pages.
iCIMS Recruiting Software, "Blackberry Playbook Review," http://www.tested.com/tech.tablets/5749-blackberry-playbook-review/, 2015, 11 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kronfli, "HTC Zoe Comes to Goole Play, Here's Everthing You Need to Know," Know Your Mobile, http://www.knowyourmobile.com/htc/htc-one/19550/what-htc-zoe, Aug. 14, 2014, 5 pages.
Laurie, "The Power of the Right Click," http://vlaurie.com/right-click/customize-context-menu.html, 2002-2016, 3 pages.
McRitchie, "Internet Explorer Right-Click Menus," http://web.archive.org/web-201405020/http:/dmcritchie.mvps.org/ie/rightie6.htm, May 2, 2014, 10 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Minsky, "Computational Haptics The Sandpaper System for Synthesizing Texture for a Force-Feedback Display," Massachusetts Institute of Technology, Jun. 1978, 217 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
O'Hara, et al., "Pressure-Sensitive Icons", IP.COM Journal, IP.COM Inc., West Henrietta, NY, US, Jun. 1, 1990, 2 Pages.
Pallenberg, "Wow, the new iPad had gestures." https://plus.google.com/+SaschaPallenberg/posts/aaJtJogu8ac, Mar. 7, 2012, 2 pages.
PoliceOne.com, "COBAN Technoligies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One_(M7), Mar. 2013, 20 pages.
Wikipedia, "Mobile Ad Hoc Network," Wikipedia, the free encyclopedia, http://en.wikipedia.org/wiki/Mobile_ad_hoc_network, Mays 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.
YouTube, "Blackberry Playbook bezel interaction," https://www.youtube.com/watch?v=YGkzFqnOwXI, Jan. 10, 2011, 2 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Jul. 21, 2016, received in European Patent Application No. 13795391.5, which corresponds with U.S. Appl. No. 14/536,426, 9 pages.
Office Action, dated Dec. 17, 2015, received in U.S. Appl. No. 14/536,426, 28 pages.
Final Office Action, dated May 6, 2016, received in U.S. Appl. No. 14/536,426, 23 pages.
Office Action, dated Jul. 15, 2015, received in Australian Patent Application No. 2013259606, which corresponds with U.S. Appl. No. 14/536,426, 3 pages.
Notice of Allowance, dated May 23, 2016, received in Australian Patent Application No. 2013259606, which corresponds with U.S. Appl. No. 14/536,426, 3 pages.
Office Action, dated Nov. 18, 2015, received in Australian Patent Application No. 2015101231, which corresponds with U.S. Appl. No. 14/536,426, 3 pages.
Decision to Grant, dated Jul. 14, 2016, received in European Patent Application No. 13724100.6, which corresponds with U.S. Appl. No. 14/536,426, 1 page.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.

(56) References Cited

OTHER PUBLICATIONS

Notice of Allowance, dated Mar. 30, 2016, received in Australian Patent Application No. 2013368441, which corresponds with U.S. Appl. No. 14/608,926, 1 page.
Certificate of Grant, dated Jul. 29, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Office Action, dated May 12, 2016, received in Korean Patent Application No. 10-2015-7018853, which corresponds with U.S. Appl. No. 14/608,926, 4 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Office Action, dated Feb. 29, 2016, received in Japanese Patent Application No. 2015-511645, which corresponds with U.S. Appl. No. 14/536,646, 5 pages.
Office Action, dated Aug. 27, 2015, received in Australian Patent Application No. 2013259614, which corresponds with U.S. Appl. No. 14/536,141, 4 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Certificate of Grant, dated Jul. 7, 2016, received in Australian Patent Application No. 2013368443, which corresponds with U.S. Appl. No. 14/536,141, 3 pages.
Office Action, dated Jul. 4, 2016, received in Japanese Patent Application No. 2015-549393, which corresponds with U.S. Appl. No. 14/536,141, 4 pages.
Office Action, dated Apr. 5, 2016, received in Korean Patent Application No. 10-2015-7018448, which corresponds with U.S. Appl. No. 14/536,141, 6 pages.
Office Action, dated Aug. 1, 2016, received in U.S. Appl. No. 14/536,203, 14 pages.
Office Action, dated Jul. 9, 2015, received in Australian Patent Application No. 2013259630, which corresponds with U.S. Appl. No. 14/536,203, 3 pages.
Notice of Allowance, dated Jun. 15, 2016, received in Australian Patent Applicatin No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Office Action, dated Dec. 4, 2015, received in Korean Patent Application No. 2014-7034520, which corresponds with U.S. Appl. No. 14/536,203, 4 pages.
Office Action, dated Jul. 22, 2016, received in European Office Action No. 13798465.4, which corresponds with U.S. Appl. No. 14/608,965, 8 pages.
Office Action, dated Aug. 10, 2015, received in Australian Patent Application No. 2013259637, which corresponds with U.S. Appl. No. 14/536,267, 3 pages.
Notice of Allowance, dated Jun. 28, 2016, received in Australian Patent Application No. 2013259637, which corresponds with U.S. Appl. No. 14/536,267, 3 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Aug. 18, 2015, received in Australian Patent Application No. 2013259642, which corresponds with U.S. Appl. No. 14/536,291, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in AustralianPatent Application No. 2013259642, which corresponds with U.S. Appl. No. 14/536,291, 4 pages.
Office Action, dated Jan. 7, 2016, received in European Patent Application No. 13724107.1, which corresponds with U.S. Appl. No. 14/536,291, 11 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.
Office Action, dated Mar. 31, 2016, received in U.S. Appl. No. 14/864,737, 17 pages.
Notice of Allowance, dated Jul. 1, 2016, received in Chinese Patent Application No. 201620214376.7, which correresponds with U.S. Appl. No. 14/864,737, 3 pages.
Patent, dated Aug. 3, 2016, received in Chinese Patent Application No. 201620214376.7, which correresponds with U.S. Appl. No. 14/864,737, 5 pages.
Certificate of Registration, dated Jun. 20, 2016, received in German Patent Application No. 202016001845.1, which correresponds with U.S. Appl. No. 14/864,737, 3 pages.
Office Action, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.

(56) References Cited

OTHER PUBLICATIONS

Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Certificate of Registration, dated Jun. 20, 2016, received in German Patent Application No. 202016001514.2, which corresponds with U.S. Appl. No. 14/864,737, 3 pages.
Office Action, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Certificate of Registration, dated Jun. 16, 2016, received in German Patent No. 202016001483.9, which corresponds with U.S. Appl. No. 14/866,159, 3 pages.
Office Action, dated Mar. 9, 2016, received in Danish Patent Application No. 201500574, which corresponds with U.S. Appl. No. 14/866,159, 11 pages.
Innovation Patent Certificate, dated Aug. 4, 2016, received in Australian Patent Appliction No. 2016101201, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action, dated Mar. 30, 2016, received in Australian Patent Application No. 201500588, which corresponds with U.S. Appl. No. 14/868,078, 9 pages.
Office Action, dated May 9, 2016, received in U.S. Appl. No. 14/863,432, 26 pages.
Office Action, dated Apr. 4, 2016, received in Danish Patent Application No. 201500582, which corresponds with U.S. Appl. No. 14/863,432, 10 pages.
Patent, dated Aug. 8, 2016, received in Australian Patent Application 2016100653,corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.
Notice of Allowance, dated Jun. 8, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Office Action, dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Nov. 30, 2015, received in U.S. Appl. No. 14/845,217, 24 pages.
Final Office Acton, dated Apr. 22, 2016, received in U.S. Appl. No. 14/845,217, 36 pages.
Office Action, dated Feb. 3, 2016, received in U.S. Appl. No. 14/856,517, 36 pages.
Final Office Action, dated Jul. 13, 2016, received in U.S. Appl. No. 14/856,517, 30 pages.
Office Action, dated Feb. 11, 2016, received in U.S. Appl. No. 14/856,519, 34 pages.
Final Office Action, dated Jul. 15, 2016, received in U.S. Appl. No. 14/856,519, 31 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Office Action, dated Jan. 25, 2016, received in U.S. Appl. No. 14/864,580, 29 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Apr. 7, 2016, received in Danish Patent Application No. 201500579, which corresponds with U.S. Appl. No. 14/866,361, 10 pages.
Patent, dated Aug. 8, 2016, received in Australian Patent Application No. 2016100649, which corresponds with U.S. Appl. No. 14/866,987, 1 page.
Office Action, dated Mar. 22, 2016, received in Danish Patent Application No. 201500587, which corresponds with U.S. Appl. No. 14/866,987, 8 pages.
Notice of Allowance, dated Jun. 10, 2016, received in Danish Patent Application No. 201500587, which corresponds with U.S. Appl. No. 14/866,987, 2 pages.
Certificate of Exam, dated Jul. 21, 2016, received in Australian Patent Application No. 2016100652, which corresponds with U.S. Appl. No. 14/866,989, 1 page.
Office Action, dated Apr. 1, 2016, received in Danish Patent Application No. 201500589, which corresponds with U.S. Appl. No. 14/866,989, 8 pages.
Notice of Allowance, dated Jun. 10, 2016, received in Danish Patent Application No. 201500589, which corresponds with U.S. Appl. No. 14/866,989, 2 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.

(56) References Cited

OTHER PUBLICATIONS

Office Action, dated Apr. 6, 2016, received in Danish Patent Application No. 201500596, which corresponds with U.S. Appl. No. 14/870,882, 7 pages.
Office Action, dated Jun. 9, 2016, received in Danish Patent Application No. 201500596, which corresponds with U.S. Appl. No. 14/870,882, 9 pages.
Notice of Allowance, dated Jun. 21, 2016, received in Danish Patent Application No. 201500597, which corresponds with U.S. Appl. No. 14/871,227, 2 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated May 10, 2016, received in U.S. Appl. No. 14/867,892, 28 pages.
Office Action, dated Mar. 21, 2016, received in Danish Patent Application No. 201500598, which corresponds with U.S. Appl. No. 14/867,892, 9 pages.
Office Action, dated May 23, 2016, received in Australian Patent Application No. 2016100253, which corresponds with U.S. Appl. No. 14/867,990, 5 pages.
Certificate of Registration, dated Jun. 16, 2016, received in German Patent No. 202016001489.8, which corresponds with U.S. Appl. No. 14/867,990, 3 pages.
Office Action, dated Mar. 18, 2016, received in Danish Patent Application No. 201500581, which corresponds with U.S. Appl. No. 14/867,990, 9 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
International Search Report and Written Opinion dated Jan. 8, 2014, received in International Application No. PCT/US2013/040108, which corresponds to U.S. Appl. No. 14/536,291, 30 pages.

(56) References Cited

OTHER PUBLICATIONS

International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion, dated Apr. 25, 2016, received in International Patent Application No. PCT/US2016/018758, which corresponds with U.S. Appl. No. 14/866,159, 15 pages.
International Search Report and Written Opinion, dated Jul. 21, 2016, received in International Patent Application No. PCT/US2016/019913, which corresponds with U.S. Appl. No. 14/868,078, 16 pages.
MacKenzie et al., "The Tactile Touchpad", Chi '97 Extended Abstracts on Human Factors in Computing Systems Looking to the Future, Chi '97, Mar. 22, 1997, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "Android Lollipop Lock-Screen Notification Tips", https://www.youtube.com/watch?v=LZTxHBOwzIU, Nov. 13, 2014, 3 pages.
YouTube, "HTC One Favorite Camera Features", http://www.youtube.com/watch?v=sUYHfcjl4RU, Apr. 28, 2013, 3 pages.
Office Action, dated Nov. 30, 2017, received in U.S. Appl. No. 14/535,671, 21 pages.
Final Office Action, dated Feb. 22, 2018, received in U.S. Appl. No. 14/608,895, 20 pages.
Final Office Action, dated Feb. 26, 2018, received in U.S. Appl. No. 14/536,235, 13 pages.
Notice of Allowance, dated Nov. 30, 2017, received in U.S. Appl. No. 14/536,367, 9 pages.
Certificate of Grant, dated Nov. 10, 2017, received in Hong Kong Patent Application No. 15107535.0, which corresponds with U.S. Appl. No. 14/536,426, 2 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Feb. 12, 2018, received in U.S. Appl. No. 14/536,464, 33 pages.
Notice of Acceptance, dated Dec. 20, 2017, received in Australian Patent Application No. 2016201451, which corresponds with U.S. Appl. No. 14/608,926, 3 pages.
Notice of Allowance, dated Feb. 8, 2018, received in Chinese Patent Application No. 201380068414.1, which corresponds with U.S. Appl. No. 14/608,926, 2 pages.
Oral Summons, dated Feb. 13, 2017, received in European Patent Application No. 13795392.3, which corresponds with U.S. Appl. No. 14/608,926, 11 pages.
Notice of Allowance, dated Dec. 29, 2017, received in Korean Patent Application No. 2017-7018250, which corresponds with U.S. Appl. No. 14/608,926, 3 pages.
Office Action, dated Feb. 2, 2018, received in Chinese Patent Application No. 201380035893.7, which corresponds with U.S. Appl. No. 14/536,141, 5 pages.
Office Action, dated Mar. 7, 2018, received in Australian patent Application No. 2016201303, which corresponds with U.S. Appl. No. 14/608,942, 3 pages.
Notice of Allowance, dated Feb. 28, 2018, received in U.S. Appl. No. 14/536,166, 5 pages.
Office Action, dated Dec. 6, 2017, received in European Patent Application No. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Patent, dated Feb. 16, 2018, received in Japanese Patent Application No. 2016173113, which corresponds with U.S. Appl. No. 14/536,203, 3 pages.
Patent, dated Jan. 23, 2018, received in Korean Patent Application No. 2016-7033834, which corresponds with U.S. Appl. No. 14/536,203, 4 pages.
Notice of Allowance, dated Nov. 22, 2017, received in U.S. Appl. No. 14/536,247, 6 pages.
Notice of Acceptance, dated Feb. 27, 2018, received in Australian Patent Application No. 2016204411, which corresponds with U.S. Appl. No. 14/536,267, 3 pages.
Notice of Allowance, dated Jan. 29, 2018, received in Chinese Patent Application No. 201380035968.1, which corresponds with U.S. Appl. No. 14/536,267, 3 pages.
Office Action, dated Jan. 25, 2018, received in European Patent Application No. 13724106.3, which corresponds with U.S. Appl. No. 14/536,267, 5 pages.
Notice of Allowance, dated Nov. 17, 2017, received in Japanese Patent Application No. 2016-125839, which corresponds with U.S. Appl. No. 14/536,267, 5 pages.
Patent, dated Dec. 1, 2017, received in Korean Patent Application No. 2016-7029533, which corresponds with U.S. Appl. No. 14/536,267, 2 pages.
Notice of Allowance, dated Dec. 1, 2017, received in U.S. Appl. No. 14/536,291, 19 pages.
Patent, dated Dec. 8, 2017, received in Chinese Patent Application No. 201380068399.0, which corresponds with U.S. Appl. No. 14/608,985, 4 pages.
Patent, dated Dec. 19, 2017, received in Korean Patent Application No. 2015-7019984, which corresponds with U.S. Appl. No. 14/608,985, 3 pages.
Notice of Allowance, dated Mar. 14, 2018, received in U.S. Appl. No. 14/536,296, 8 pages.
Office Action, dated Feb. 14, 2018, received in Korean Patent Application No. 2017-7030129, which corresponds with U.S. Appl. No. 14/864,737, 17 pages.
Patent, Nov. 16, 2017, received in Dutch Patent Application No. 2016375, which corresponds with U.S. Appl. No. 14/866,981, 2 pages.
Office Action, dated Dec. 15, 2017, received in U.S. Appl. No. 14/866,159, 35 pages.
Office Action, dated Jan. 10, 2018, received in Danish Patent Application No. 201500574, which corresponds with U.S. Appl. No. 14/866,159, 2 pages.
Certificate of Grant, dated Jan. 3, 2018, received in Australian Patent Application No. 2016229421, which corresponds with U.S. Appl. No. 14/868,078, 1 page.
Office Action, dated Nov. 24, 2017, received in European Patent Application No. 16727900.9, which corresponds with U.S. Appl. No. 14/866,511, 5 pages.
Office Action, dated Jan. 29, 2018, received in Danish Patent Application No. 201500592, which corresponds with U.S. Appl. No. 14/869,899, 2 pages.
Office Action, dated Dec. 14, 2017, received in Danish Patent Application No. 201670594, which corresponds with U.S. Appl. No. 14/869,899, 3 pages.
Office Action, dated Jan. 29, 2018, received in U.S. Appl. No. 14/866,992, 44 pages.

(56) References Cited

OTHER PUBLICATIONS

Office Action, dated Jan. 19, 2018, received in Australian Patent Application No. 201761478, which corresponds with U.S. Appl. No. 14/866,992, 6 pages.
Office Action, dated Feb. 12, 2018, received in U.S. Appl. No. 15/009,661, 36 pages.
Office Action, dated Jan. 18, 2018, received in U.S. Appl. No. 15/009,676, 21 Pages.
Office Action, dated Mar. 13, 2018, received in U.S. Appl. No. 15/009,688, 10 pages.
Notice of Allowance, dated Jan. 31, 2018, received in U.S. Appl. No. 14/856,519, 9 pages.
Final Office Action, dated Nov. 16, 2017, received in U.S. Appl. No. 14/856,520, 41 pages.
Notice of Allowance, dated Feb. 9, 2018, received in U.S. Appl. No. 14/856,522, 9 pages.
Office Action, dated Nov. 30, 2017, received in U.S. Appl. No. 14/857,636, 19 pages.
Office Action, dated Jan. 17, 2018, received in Australian Patent Application No. 2017202816, which corresponds with U.S. Appl. No. 14/857,636, 3 pages.
Office Action, dated Dec. 1, 2017, received in U.S. Appl. No. 14/857,663, 15 pages.
Notice of Allowance, dated Feb. 12, 2018, received in U.S. Appl. No. 14/857,700, 13 pages.
Office Action, dated Dec. 15, 2017, received in Danish Patent Application No. 201500584, which corresponds with U.S. Appl. No. 14/864,580, 4 pages.
Office Action, dated Dec. 15, 2017, received in Danish Patent Application No. 201500585, which corresponds with U.S. Appl. No. 14/864,627, 5 pages.
Office Action, dated Jan. 4, 2018, received in Danish Patent Application No. 201500579, which corresponds with U.S. Appl. No. 14/866,361, 2 pages.
Notice of Allowance, dated Mar. 16, 2018, received in Danish Patent Application No. 201500579, which corresponds with U.S. Appl. No. 14/866,361, 2 pages.
Office Action, dated Jan. 22, 2018, received in U.S. Appl. No. 14/866,987, 22 pages.
Notice of Allowance, dated Mar. 6, 2018, received in Japanese Patent Application No. 2017-126445, which corresponds with U.S. Appl. No. 14/866,987, 5 pages.
Office Action, dated Nov. 29, 2017, received in U.S. Appl. No. 14/866,989, 31 pages.
Office Action, dated Feb. 26, 2018, received in Australian Patent Application No. 2017201079, which corresponds with U.S. Appl. No. 14/866,989, 6 pages.
Notice of Allowance, dated Feb. 5, 2018, received in Japanese Patent Application No. 2016-233450, which corresponds with U.S. Appl. No. 14/866,989, 5 pages.
Office Action, dated Jan. 29, 2018, received in Danish Patent Application No. 201500595, which corresponds with U.S. Appl. No. 14/871,236, 2 pages.
Final Office Action, dated Mar. 9, 2018, received in U.S. Appl. No. 14/870,754, 19 pages.
Patent, dated Jan. 29, 2018, received in Danish Patent Application No. 201500596, which corresponds with U.S. Appl. No. 14/870,882, 4 pages.
Final Office Action, dated Feb. 16, 2018, received in U.S. Appl. No. 14/870,988, 18 pages.
Notice of Allowance, dated Jan. 4, 2018, received in Japanese Patent Application No. 2016-533201, which corresponds with U.S. Appl. No. 14/871,227, 4 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Final Office Action, dated Mar. 15, 2018, received in U.S. Appl. No. 14/871,336, 23 pages.
Patent, dated Oct. 30, 2017, Danish Patent Application No. 201500601, which corresponds with U.S. Appl. No. 14/871,336, 5 pages.
Final Office Action, dated Nov. 29, 2017, received in U.S. Appl. No. 14/867,823, 47 pages.
Office Action, dated Jan. 23, 2018, received in Danish Patent Application No. 201500594, which corresponds with U.S. Appl. No. 14/867,823, 8 pages.
Final Office Action, dated Dec. 14, 2017, received in U.S. Appl. No. 14/867,892, 53 pages.
Notice of Allowance, dated Jan. 26, 2018, received in Danish Patent Application No. 201500598, which corresponds with U.S. Appl. No. 14/867,892, 2 pages.
Office Action, dated Feb. 28, 2018, received in U.S. Appl. No. 14/869,261, 26 pages.
Office Action, dated Jan. 23, 2018, received in U.S. Appl. No. 14/869,855, 24 pages.
Office Action, dated Jan. 18, 2018, received in U.S. Appl. No. 14/869,873, 25 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Office Action, dated Feb. 19, 2018, received in Danish Patent Application No. 201500581, which corresponds with U.S. Appl. No. 14/867,990, 4 pages.
Office Action, dated Dec. 12, 2017, received in U.S. Appl. No. 15/009,668, 32 pages.
Notice of Allowance, dated Dec. 4, 2017, received in U.S. Appl. No. 15/081,771, 10 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Office Action, dated Jan. 8, 2018, received in Danish Patent Application No. 201770190, which corresponds with U.S. Appl. No. 15/136,782, 2 pages.
Office Action, dated Feb. 22, 2018, received in Danish Patent Application No. 201670587, which corresponds with U.S. Appl. No. 15/231,745, 4 pages.
Office Action, dated Jan. 10, 2018, received in Danish Patent Application No. 201670590, which corresponds with U.S. Appl. No. 15/231,745, 2 pages.
Office Action, dated Jan. 30, 2018, received in Danish Patent Application No. 201670592, which corresponds with U.S. Appl. No. 15/231,745, 2 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345, 3 pages.
Office Action, dated Feb. 7, 2018, received in Danish Patent Application No. 201770709, 2 pages.
Office Action, dated Mar. 7, 2018, received in U.S. Appl. No. 15/482,618, 7 pages.
Notice of Allowance, dated Dec. 21, 2017, received in U.S. Appl. No. 15/723,069, 7 pages.
Extended European Search Report, dated Nov. 24, 2017, received in European Patent Application No. 17186744.3, which corresponds with U.S. Appl. No. 14/536,291, 10 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.

(56) References Cited

OTHER PUBLICATIONS

Extended European Search Report, dated Mar. 2, 2018, received in European Patent Application No. 17206374.5, which corresponds with U.S. Appl. No. 15/272,343, 11 pages.
Anonymous, "Google Android 5.0 Release Date, Specs and Editors Hands On Review—CNET", http://www.cnet.com/products/google-an-android-5-0-lollipop/, Mar. 12, 2015, 10 pages.
Certificate of Grant, dated Apr. 29, 2017, received in Australian Patent Application No. 2013368440, which corresponds with U.S. Appl. No. 14/536,426, 3 pages.
Office Action, dated Nov. 6, 2017, received in Chinese Patent Application No. 201380068493.6, which corresponds with U.S. Appl. No. 14/608,895, 5 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Office Action, dated Sep. 25, 2017, received in U.S. Appl. No. 14/536,644, 29 pages.
Office Action, dated Oct. 19, 2017, received in U.S. Appl. No. 14/608,926, 14 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.
Notice of Allowance, dated Sep. 20, 2017, received in U.S. Appl. No. 14/536,141, 10 pages.
Office Action, dated Oct. 25, 2017, received in Chinese Patent Application No. 201380035977.0, which corresponds with U.S. Appl. No. 14/536,203, 5 pages.
Notice of Allowance, dated Oct. 30, 2017, received in Korean Patent Application No. 2016-7033834, which corresponds with U.S. Appl. No. 14/536,203, 5 pages.
Office Action, dated Oct. 20, 2017, received in U.S. Appl. No. 14/608,965, 14 pages.
Office action, dated Oct. 11, 2017, received in Chinese Patent Application No. 201380074060.1, which corresponds with U.S. Appl. No. 14/608,965, 5 pages.
Notice of Allowance, dated Nov. 9, 2017, received in U.S. Appl. No. 14/536,267, 8 pages.
Office Action, dated Sep. 13, 2017, received in European Patent Application No. 16177863.4, which corresponds with U.S. Appl. No. 14/536,267, 6 pages.
Office Action, dated Oct. 23, 2017, received in Chinese Patent Application No. 201380035986.X, which corresponds with U.S. Appl. No. 14/536,291, 9 pages.
Office Action, dated Oct. 19, 2017, received in U.S. Appl. No. 14/608,985, 13 pages.
Notice of Allowance, dated Sep. 19, 2017, received in Chinese Patent Application No. 201380068399.0, which corresponds with U.S. Appl. No. 14/608,985, 3 pages.
Summons, dated Oct. 6, 2017, received in European Patent Application No. 13811032.5, which corresponds with U.S. Appl. No. 14/608,985, 6 pages.
Notice of Allowance, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.
Office Action, dated Oct. 6, 2017, received in U.S. Appl. No. 14/868,078, 40 pages.
Notice of Allowance, dated Sep. 1, 2017, received in Australian Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Notice of Allowance, dated Oct. 4, 2017, received in U.S. Appl. No. 14/866,511, 37 pages.
Final Office Action, dated Oct. 3, 2017, received in U.S. Appl. No. 14/866,992, 37 pages.
Final Office Action, dated Oct. 4, 2017, received in U.S. Appl. No. 14/856,517, 33 pages. Final Office Action, dated Nov. 15, 2017, received in U.S. Appl. No. 14/856,519, 31 pages.
Final Office Action, dated Nov. 15, 2017, received in U.S. Appl. No. 14/856,519, 31 pages.
Office Action, dated Sep. 22, 2017, received in Japanese Patent Application No. 2017-029201, which corresponds with U.S. Appl. No. 14/857,636 8 pages.
Final Office Action, dated Oct. 11, 2017, received in U.S. Appl. No. 14/857,700, 13 pages.
Notice of Allowance, dated Sep. 29, 2017, received in Danish Patent Application No. 201670463, which corresponds with U.S. Appl. No. 14/866,987, 2 pages.
Patent, dated Nov. 6, 2017, received in Danish Patent Application No. 201670463, which corresponds with U.S. Appl. No. 14/866,987, 6 pages.
Notice of Allowance, dated Sep. 22, 2017, received in Japanese Patent Application No. 2016-233449, which corresponds with U.S. Appl. No. 14/866,987, 5 pages.
Patent, dated Oct. 27, 2017, received in Japanese Patent Application No. 2016-233449, which corresponds with U.S. Appl. No. 14/866,987, 3 pages.
Office Action, dated Nov. 14, 2017, received in U.S. Appl. No. 14/870,882, 25 pages.
Notice of Allowance, dated Oct. 31, 2017, received in Danish Patent Application No. 201500596, which corresponds with U.S. Appl. No. 14/870,882, 2 pages.
Office Action, dated Oct. 16, 2017, received in Australian Patent Application No. 2016203040, which corresponds with U.S. Appl. No. 14/871,227, 5 pages.
Office Action, dated Oct. 26, 2017, received in U.S. Appl. No. 14/871,336, 22 pages.
Office Action, dated Oct. 16, 2017, received in U.S. Appl. No. 14/871,462, 26 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Nov. 13, 2017, received in Japanese Patent Application No. 2016-183289, which corresponds with U.S. Appl. No. 14/871,462, 5 pages.
Office Action, dated Oct. 31, 2017, received in Danish Patent Application No. 201500598, which corresponds with U.S. Appl. No. 14/867,892, 2 pages.
Final Office Action, dated Oct. 10, 2017, received in U.S. Appl. No. 14/869,855, 16 pages.
Notice of Allowance, dated Oct. 20, 2017, received in U.S. Appl. No. 15/136,782, 9 pages.
Notice of Allowance, dated Jul. 6, 2017, received in U.S. Appl. No. 15/231,745, 18 pages.

(56) References Cited

OTHER PUBLICATIONS

Patent, dated Oct. 30, 2017, received in Danish Patent Application No. 201670593, which corresponds with U.S. Appl. No. 15/231,745, 3 pages.
Office Action, dated Oct. 16, 2017, received in Danish Patent Application No. 201770710, 10 pages.
Office Action, dated Oct. 31, 2017, received in U.S. Appl. No. 15/723,069, 7 pages.
Extended European Search Report, dated Oct. 17, 2017, received in European Patent Application No. 17184437.6, Which corresponds with U.S. Appl. No. 14/868,078, 8 pages.
Extended European Search Report, dated Oct. 10, 2017, received in European Patent Application No. 17188507.2, which corresponds with U.S. Appl. No. 14/866,361, 9 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Easton-Ellett, "Three Free Cydia Utilies to Remove iOS Notification Badges", http://www.ijailbreak.com/cydia/three-free-cydia-utilies-to-remove-ios-notification-badges, Apr. 14, 2012, 2 pages.
iPhoneHacksTV, "Confero allows you to easily manage your Badge notifications—iPhone Hacks", youtube, https://wwwyoutube.com/watch?v=JCk61pnL4SU, Dec. 26, 2014, 3 pages.
Mahdi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
Office Action, dated Mar. 9, 2018, received in European Patent Application No. 13795391.5, which corresponds with U.S. Appl. No. 14/536,426, 4 pages.
Notice of Allowance, dated May 16, 2018, received in U.S. Appl. No. 14/536,367, 5 pages.
Office Action, dated May 8, 2018, received in Australian Patent Application No. 2016216580, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Notice of Allowance, dated May 10, 2018, received in Chinese Patent Application No. 201380035982.1, which corresponds with U.S. Appl. No. 14/536,426, 2 pages.
Intention to Grant, dated Mar. 9, 2018, received in European Patent Application No. 15183980.0, which corresponds with U.S. Appl. No. 14/536,426, 5 pages.
Final Office Action, dated May 3, 2018, received in U.S. Appl. No. 14/536,644, 28 pages.
Certificate of Grant, dated May 3, 2018, received in Australian Patent Application No. 2016201451, which corresponds with U.S. Appl. No. 14/608,926, 1 page.
Patent, dated May 4, 2018, received in Chinese Patent Application No. 201380068414.1, which corresponds with U.S. Appl. No. 14/608,926, 4 pages.
Patent, dated Apr. 27, 2018, received in Japanese Patent Application No. 2017-024234, which corresponds with U.S. Appl. No. 14/608,926, 3 pages.
Office Action, dated Apr. 9, 2018, received in European Patent Application No. 13726053.5, which corresponds with U.S. Appl. No. 14/536,141, 9 pages.
Office Action, dated Mar. 28, 2018, received in Chinese Patent Application No. 201380068295.X, which corresponds with U.S. Appl. No. 14/608,942, 5 pages.
Notice of Allowance, dated Apr. 4, 2018, received in Chinese Patent Application No. 201380035977.0, which corresponds with U.S. Appl. No. 14/536,203, 3 pages.
Oral Proceedings, dated Mar. 7, 2018, received in European Office Action No. 13798465.4, which corresponds with U.S. Appl. No. 14/608,965, 5 pages.
Notice of Allowance, dated Jun. 1, 2018, received in U.S. Appl. No. 14/536,267, 5 pages.
Patent, dated Apr. 20, 2018, received in Chinese Patent Application No. 201380035968.1, which corresponds with U.S. Appl. No. 14/536,267, 4 pages.
Notice of Allowance, dated Mar. 20, 2018, received in U.S. Appl. No. 14/536,291, 5 pages.
Office Action, dated Mar. 20, 2018, received in U.S. Appl. No. 14/609,006, 13 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Notice of Allowance, dated May 18, 2018, received in U.S. Appl. No. 14/866,159, 8 pages.
Notice of Allowance, dated Mar. 21, 2018, received in Danish Patent Application No. 201500574, which corresponds with U.S. Appl. No. 14/866,159, 2 pages.
Patent, dated May 22, 2018, received in Danish Patent Application No. 201500574, which corresponds with U.S. Appl. No. 14/866,159, 2 pages.
Notice of Allowance, dated May 24, 2018, received in U.S. Appl. No. 14/868,078, 6 pages.
Office Action, dated Apr. 25, 2018, received in European Patent Application No. 16708916.8, which corresponds with U.S. Appl. No. 14/868,078, 6 pages.
Office Action, dated May 24, 2018, received in European Patent Application No. 16727900.9, which corresponds with U.S. Appl. No. 14/866,511, 7 pages.
Notice of Allowance, dated Apr. 24, 2018, received in Danish Patent Application No. 201500592, which corresponds with U.S. Appl. No. 14/869,899, 2 pages.
Patent, dated May 28, 2018, received in Danish Patent Application No. 201500592, which corresponds with U.S. Appl. No. 14/869,899, 2 pages.
Office Action, dated May 1, 2018, received in Danish Patent Application No. 201670594, which corresponds with U.S. Appl. No. 14/869,899, 2 pages.
Office Action, dated Mar. 26, 2018, received in Australian Patent Application No. 2016304890, which corresponds with U.S. Appl. No. 14/866,992, 3 pages.
Notice of Allowance, dated May 2, 2018, received in U.S. Appl. No. 14/856,519, 10 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Grant of Patent, dated Apr. 16, 2018, received in Dutch Patent Application No. 2019215, 2 pages.
Patent, dated May 22, 2018, received in Danish Patent Application No. 201500579, which corresponds with U.S. Appl. No. 14/866,361, 2 pages.
Office Action, dated May 7, 2018, received in European Patent Application No. 16189421.7, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Patent, dated Mar. 9, 2018, received in Japanese Patent Application No. 2016-233450, which corresponds with U.S. Appl. No. 14/866,989, 4 pages.
Notice of Allowance, dated Apr. 26, 2018, received in Danish Patent Application No. 201500595, which corresponds with U.S. Appl. No. 14/871,236, 2 pages.

(56) References Cited

OTHER PUBLICATIONS

Final Office Action, dated Apr. 20, 2018, received in U.S. Appl. No. 14/870,882, 7 pages.
Office Action, dated Jun. 1, 2018, received in Japanese Patent Application No. 2018-062161, which corresponds with U.S. Appl. No. 15/136,782, 5 pages.
Office Action, dated Apr. 2, 2018, received in Japanese Patent Application No. 2018-020324, which corresponds with U.S. Appl. No. 14/874,336, 4 pages.
Notice of Allowance, dated Apr. 18, 2018, received in U.S. Appl. No. 14/867,823, 10 pages.
Office Action, dated Apr. 24, 2018, received in U.S. Appl. No. 14/867,892, 63 pages.
Notice of Allowance, dated May 31, 2018, received in U.S. Appl. No. 14/869,855, 10 pages.
Final Office Action, dated May 23, 2018, received in U.S. Appl. No. 14/869,873, 18 pages.
Notice of Allowance, dated Mar. 30, 3018, received in U.S. Appl. No. 14/867,990, 5 pages.
Office Action, dated Apr. 19, 2018, received in U.S. Appl. No. 14/869,703, 19 pages.
Office Action, dated May 4, 2018, received in Australian Patent Application No. 2018202855, which corresponds with U.S. Appl. No. 15/136,782, 3 pages.
Notice of Allowance, dated Mar. 19, 2018, received in Danish Patent Application No. 201770190, which corresponds with U.S. Appl. No. 15/136,782, 2 pages.
Patent, dated May 22, 2018, received in Danish Patent Application No. 201770190, which corresponds with U.S. Appl. No. 15/136,782, 2 pages.
Office Action, dated Apr. 11, 2018, received in Danish Patent Application No. 201670591, which corresponds with U.S. Appl. No. 15/231,745, 3 pages.
Notice of Allowance, dated Mar. 27, 2018, received in Danish Patent Application No. 201670592, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Office Action, dated Apr. 20, 2018, received in European Patent Application No. 16756862.5, which corresponds with U.S. Appl. No. 15/272,345, 15 pages.
Office Action, dated Apr. 23, 2018, received in U.S. Appl. No. 15/499,691, 29 pages.
Final Office Action, dated May 10, 2018, received in U.S. Appl. No. 15/655,749, 19 pages.
Extended European Search Report, dated May 30, 2018, received in International Patent Application No. 18155939.4, which corresponds with U.S. Appl. No. 15/272,327, 8 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new] WMP12 with Taskbar Toolbar for Windows 7—Windows Customization—WinMatrix", http://www.winmatrix.com/forums/index/php?/topic/25528-new-wmp12-with-taskbar-toolbar-for-windows-7, Jan. 27. 2013, 6 pages.
Oh, et al., "Moving Objects with 2D Input Devices in CAD Systems and Destop Virtual Environments" Proceedings of Graphics interface 2005, 8 pages, May 2005.
Stewart, et al., "Characteristics of Pressure-Based Input for Mobile Devices", Proceedings of the SIGCHI Conference on Human Factors in Computing Systems, Apr. 2010, 10 pages.
International Preliminary Report on Patentability, dated Sep. 12, 2017, received in International Patent Application No. PCT/US2016/021400, which corresponds with U.S. Appl. No. 14/869,899, 39 pages.
International Preliminary Report on Patentability, dated Feb. 13, 2018, received in International Patent Application No. PCT/US2016/046407, which corresponds with U.S. Appl. No. 15/009,688, 20 pages.

* cited by examiner

Figure 5B
206
Portable Multifunction Device 100
Speaker 111
Optical Sensor 164
Proximity Sensor 166
500
208
208
402
9:26 PM 404
42%
406
Sunday
14
Music 480
Calendar 426
Photos 428
Calculator 482
Videos 432
Stocks 434
Maps 436
Weather 438
Clock 440
Workout 442
Notes 444
Settings 446
7
App Store 484
Camera 430
Voice Memos 486
Networking 488
4
6
4
Phone 416
Mail 418
Safari 420
Messages 424
Touch Screen 112
Microphone 113
Accelerometer(s) 168
502
204
ITD
ITL
ITH
IT0
Intensity of Contact 502

Figure 5J
206
Portable Multifunction Device 100
Speaker 111
Optical Sensor 164
Proximity Sensor 166
500
208
208
402
9:26 PM
404
42%
406
Sunday
14
Music 480
Calendar 426
Photos 428
Calculator 482
280
73°
Videos 432
Stocks 434
Maps 436
Weather 438
Clock 440
Workout 442
Notes 444
Settings 446
7
F S V
T B W
L
App Store 484
Camera 430
Voice Memos 486
Networking 488
4
6
4
N
Phone 416
Mail 418
Safari 420
Messages 424
Touch Screen 112
Microphone 113
Accelerometer(s) 168
518
204
ITD
ITL
ITH
IT0
Intensity of Contact 518

Figure 5N
206
Portable Multifunction Device 100
Speaker 111
Optical Sensor 164
Proximity Sensor 166
500
208
208
402
9:26 PM 404
42%
406
Sunday
14
Music 480
Calendar 426
Photos 428
Calculator 482
Videos 432
Stocks 434
280
Maps 436
73°
Weather 438
Clock 440
Workout 442
Notes 444
Settings 446
7
App Store 484
Camera 430
Voice Memos 486
Networking 488
4
6
4
Phone 416
Mail 418
Safari 420
Messages 424
Touch Screen 112
Microphone 113
Accelerometer(s) 168
204
ITD
ITL
ITH
IT0
Intensity of Contact 518

Figure 5O
206
Portable Multifunction Device 100
Speaker 111
Optical Sensor 164
Proximity Sensor 166
500
208
208
402
9:26 PM
404
42%
406
Sunday
14
Music 480
Calendar 426
Photos 428
Calculator 482
280
73°
Videos 432
Stocks 434
Maps 436
Weather 438
Clock 440
Workout 442
Notes 444
Settings 446
7
520
App Store 484
Camera 430
Voice Memos 486
Networking 488
4
6
4
Phone 416
Mail 418
Safari 420
Messages 424
Touch Screen 112
Microphone 113
Accelerometer(s) 168
204
$IT_D$
$IT_L$
$IT_H$
$IT_0$
Intensity of Contact 520

Figure 5S
206
Portable Multifunction Device 100
Speaker 111
Optical Sensor 164
Proximity Sensor 166
500
208
208
402
9:26 PM 404
42%
406
4
Music 480
Messages 424
Photos 428
Calculator 482
524
Videos 432
Stocks 434
Maps 436
Weather 438
Clock 440
Workout 442
Notes 444
Settings 446
7
App Store 484
Camera 430
Voice Memos 486
Networking 488
4
6
Phone 416
Mail 418
Safari 420
Sunday
14
Calendar 426
Touch Screen 112
Microphone 113
Accelerometer(s) 168
204
$IT_D$
$IT_L$
$IT_H$
$IT_0$
Intensity of Contact 524

Figure 7R
206
Portable Multifunction Device 100
Speaker 111
Optical Sensor 164
Proximity Sensor 166
700
208
208
402
9:26 PM
404
42%
406
707
702
Inbox (359)
Cancel
New Event
Add
Godfrey's invitation
Location
All-day
Starts
Mar. 14, 1915
3:14 PM
722
Ends
4:14 PM
Q W E R T Y U I O P
A S D F G H J K L
Z X C V B N M
123
space
return
ITD
ITL
ITH
IT0
Touch Screen 112
Microphone 113
Accelerometer(s) 168
204
Intensity of Contact 722

Figure 8G
206
Portable Multifunction Device 100
Speaker 111
Optical Sensor 164
Proximity Sensor 166
800
208
208
402
804
406
42%
802
9:26
Sunday, March 14
810
808
806
Touch Screen 112
Microphone 113
Accelerometer(s) 168
204
IT_D
IT_L
IT_H
IT_0
Intensity of Contact 812

Figure 8V
206
Portable Multifunction Device 100
Speaker 111
Optical Sensor 164
Proximity Sensor 166
208
208
800
402
804
406
42%
802
9:26
810
Sunday, March 14
830
808
806
Touch Screen 112
Microphone 113
Accelerometer(s) 168
204
ITD
ITL
ITH
IT0
Intensity of Contact 830

Figure 8W
206
Portable Multifunction Device 100
Speaker 111
Optical Sensor 164
Proximity Sensor 166
800
208
208
402
804
406
42%
802
9:26
Sunday, March 14
810
830
808
806
Touch Screen 112
Microphone 113
Accelerometer(s) 168
204
$IT_D$
$IT_L$
$IT_H$
$IT_0$
Intensity of Contact 830

Figure 9A
206
Portable Multifunction Device 100
Speaker 111
Optical Sensor 164
Proximity Sensor 166
800
208
208
402
804
406
42%
802
9:26
Sunday, March 14
810
808
806
Touch Screen 112
Microphone 113
Accelerometer(s) 168
204

Figure 9H
206
Portable Multifunction Device 100
Speaker 111
Optical Sensor 164
Proximity Sensor 166
800
208
208
402
804
406
42%
802
9:26
810
Sunday, March 14
906
808
806
Touch Screen 112
Microphone 113
Accelerometer(s) 168
204
$IT_D$
$IT_L$
$IT_H$
$IT_0$
Intensity of Contact 906

Figure 9O
Portable Multifunction Device 100
206
Speaker 111
Optical Sensor 164
Proximity Sensor 166
800
208
208
402
804
406
42%
802
9:26
810
Sunday, March 14
Sunday
14
Send course description to… in 5m
1 University Dr., Gottingen, Lower Saxony
Registrar@uni.goettingen.edu
908
ITD
ITL
ITH
IT0
808
806
Touch Screen 112
Microphone 113
Accelerometer(s) 168
204
Intensity of Contact 910

Figure 10D
206
Portable Multifunction Device 100
Speaker 111
Optical Sensor 164
Proximity Sensor 166
800
208
208
402
804
406
42%
802
810
9:26
1006
1008
1010
1012
1014
1016
1018
1020
1022
1024
Touch Screen 112
Microphone 113
Accelerometer(s) 168
204
ITD
ITL
ITH
IT0
Intensity of Contact 1002

Figure 10H
206
Portable Multifunction Device 100
Speaker 111
Optical Sensor 164
Proximity Sensor 166
800
208
208
402
804
406
42%
802
810
9:26
1006
1008
1010
1012
1014
1016
1030
1018
1020
1022
1024
Touch Screen 112
Microphone 113
Accelerometer(s) 168
204
ITD
ITL
ITH
IT0
Intensity of Contact 1030

Figure 11B
206
Portable Multifunction Device 100
Speaker 111
Optical Sensor 164
Proximity Sensor 166
1100
208
208
402
9:26 PM
404
42%
406
Sunday
14
Music 480
Calendar 426
Photos 428
Calculator 482
280
73°
Videos 432
Stocks 434
Maps 436
Weather 438
Clock 440
Workout 442
Notes 444
Settings 446
7
App Store 484
Camera 430
Voice Memos 486
Networking 488
4
6
4
Phone 416
Mail 418
Safari 420
Messages 424
Touch Screen 112
Microphone 113
Accelerometer(s) 168
204
1102
$IT_D$
$IT_L$
$IT_H$
$IT_0$
Intensity of Contact 1102

Figure 11K
206
Portable Multifunction Device 100
Speaker 111
Optical Sensor 164
Proximity Sensor 166
1100
208
208
402
9:26 PM
404
42%
406
Sunday
14
Music 480
Calendar 426
Photos 428
Calculator 482
Videos 432
Stocks 434
280
Maps 436
73°
Weather 438
Clock 440
Workout 442
Notes 444
Settings 446
7
App Store 484
Camera 430
Voice Memos 486
Networking 488
4
Phone 416
6
Mail 418
Safari 420
4
Messages 424
Touch Screen 112
1124
Microphone 113
Accelerometer(s) 168
204
ITD
ITL
ITH
IT0
Intensity of Contact 1124

Figure 11O
206
Portable Multifunction Device 100
Speaker 111
Optical Sensor 164
Proximity Sensor 166
1100
208
208
402
9:26 PM
404
42%
406
Sunday
14
73°
280
Music 480
Calendar 426
Photos 428
Calculator 482
Videos 432
Stocks 434
Maps 436
Weather 438
Clock 440
Workout 442
Notes 444
Settings 446
7
App Store 484
Camera 430
Voice Memos 486
Networking 488
4
6
4
Phone 416
Mail 418
Safari 420
Messages 424
Touch Screen 112
Microphone 113
Accelerometer(s) 168
204
1130
$IT_D$
$IT_L$
$IT_H$
$IT_0$
Intensity of Contact 1130

Figure 11Q
206
Portable Multifunction Device 100
Speaker 111
Optical Sensor 164
Proximity Sensor 166
1100
208
208
402
9:26 PM
404
42%
406
Sunday
14
Music 480
Calendar 426
Photos 428
Calculator 482
280
73°
Videos 432
Stocks 434
Maps 436
Weather 438
Clock 440
Workout 442
Notes 444
Settings 446
7
App Store 484
Camera 430
Voice Memos 486
Networking 488
4
6
4
Phone 416
Mail 418
Safari 420
Messages 424
Touch Screen 112
Microphone 113
Accelerometer(s) 168
1134
204
$IT_D$
$IT_L$
$IT_H$
$IT_0$
Intensity of Contact 1134

Figure 11Z
206
Portable Multifunction Device 100
Speaker 111
Optical Sensor 164
Proximity Sensor 166
1100
208
208
402
9:26 PM
404
42%
406
Sunday
14
Music 480
Calendar 426
Photos 428
Calculator 482
280
73°
Videos 432
Stocks 434
Maps 436
Weather 438
Clock 440
Workout 442
Notes 444
Settings 446
7
App Store 484
Camera 430
Voice Memos 486
Networking 488
4
6
4
Phone 416
Mail 418
Safari 420
Messages 424
Touch Screen 112
Microphone 113
Accelerometer(s) 168
204
$IT_D$
$IT_L$
$IT_H$
$IT_0$
Intensity of Contact 1140

Figure 13A:
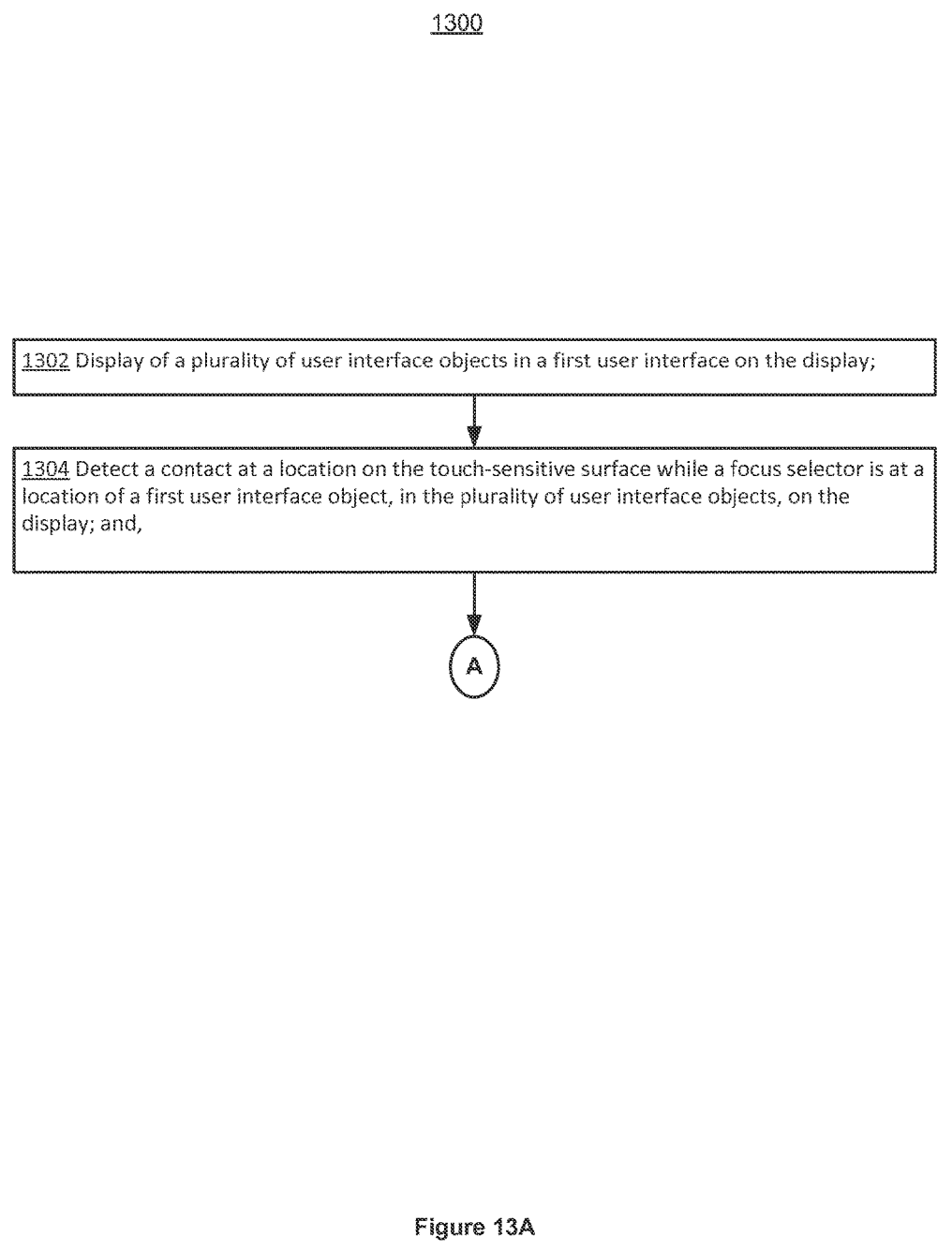

1300

1302 Display of a plurality of user interface objects in a first user interface on the display;

↓

1304 Detect a contact at a location on the touch-sensitive surface while a focus selector is at a location of a first user interface object, in the plurality of user interface objects, on the display; and,

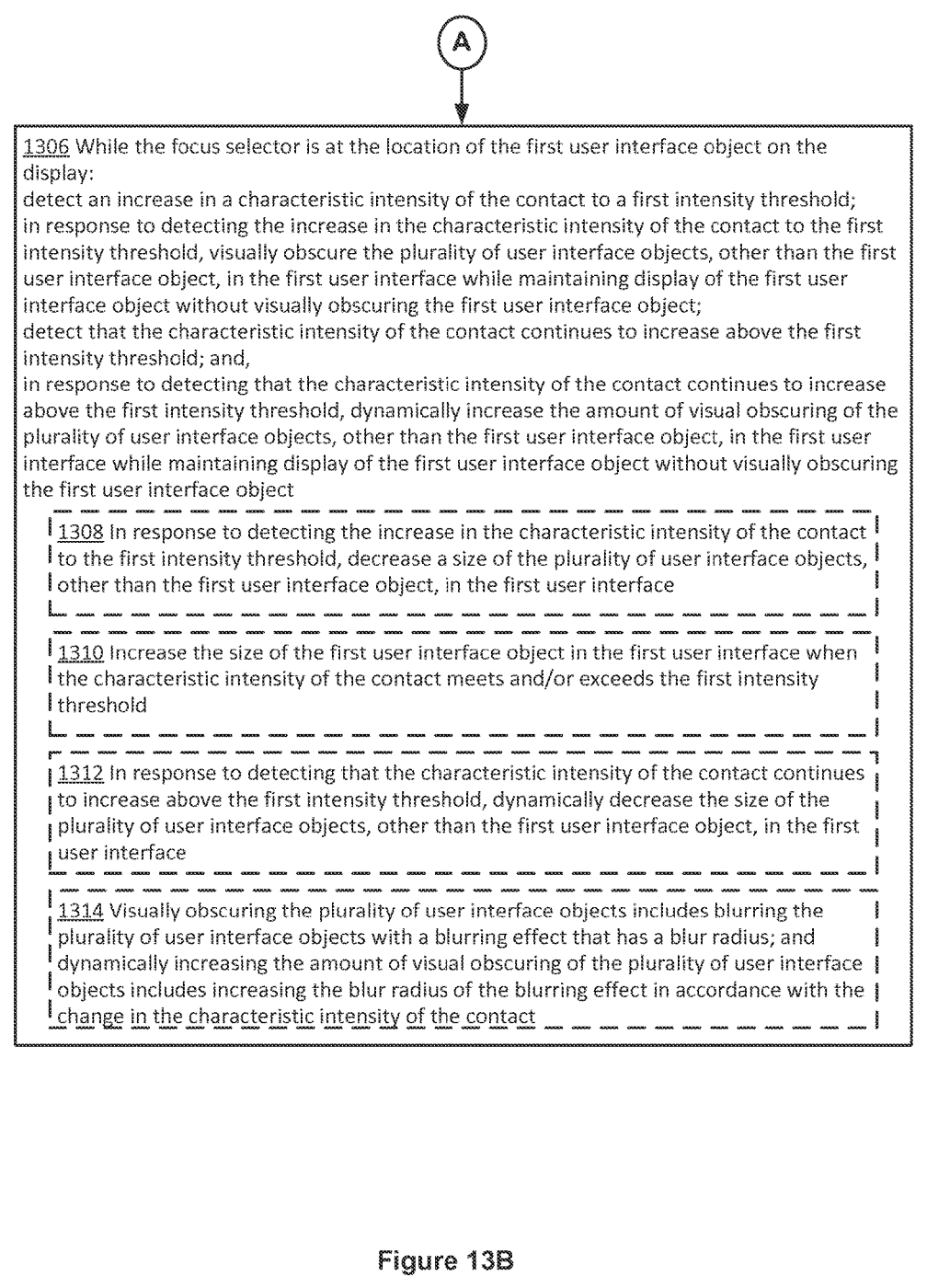

1306 While the focus selector is at the location of the first user interface object on the display:
detect an increase in a characteristic intensity of the contact to a first intensity threshold;
in response to detecting the increase in the characteristic intensity of the contact to the first intensity threshold, visually obscure the plurality of user interface objects, other than the first user interface object, in the first user interface while maintaining display of the first user interface object without visually obscuring the first user interface object;
detect that the characteristic intensity of the contact continues to increase above the first intensity threshold; and,
in response to detecting that the characteristic intensity of the contact continues to increase above the first intensity threshold, dynamically increase the amount of visual obscuring of the plurality of user interface objects, other than the first user interface object, in the first user interface while maintaining display of the first user interface object without visually obscuring the first user interface object 1308 In response to detecting the increase in the characteristic intensity of the contact to the first intensity threshold, decrease a size of the plurality of user interface objects, other than the first user interface object, in the first user interface 1310 Increase the size of the first user interface object in the first user interface when the characteristic intensity of the contact meets and/or exceeds the first intensity threshold 1312 In response to detecting that the characteristic intensity of the contact continues to increase above the first intensity threshold, dynamically decrease the size of the plurality of user interface objects, other than the first user interface object, in the first user interface 1314 Visually obscuring the plurality of user interface objects includes blurring the plurality of user interface objects with a blurring effect that has a blur radius; and dynamically increasing the amount of visual obscuring of the plurality of user interface objects includes increasing the blur radius of the blurring effect in accordance with the change in the characteristic intensity of the contact

Figure 13B

Figure 13C:
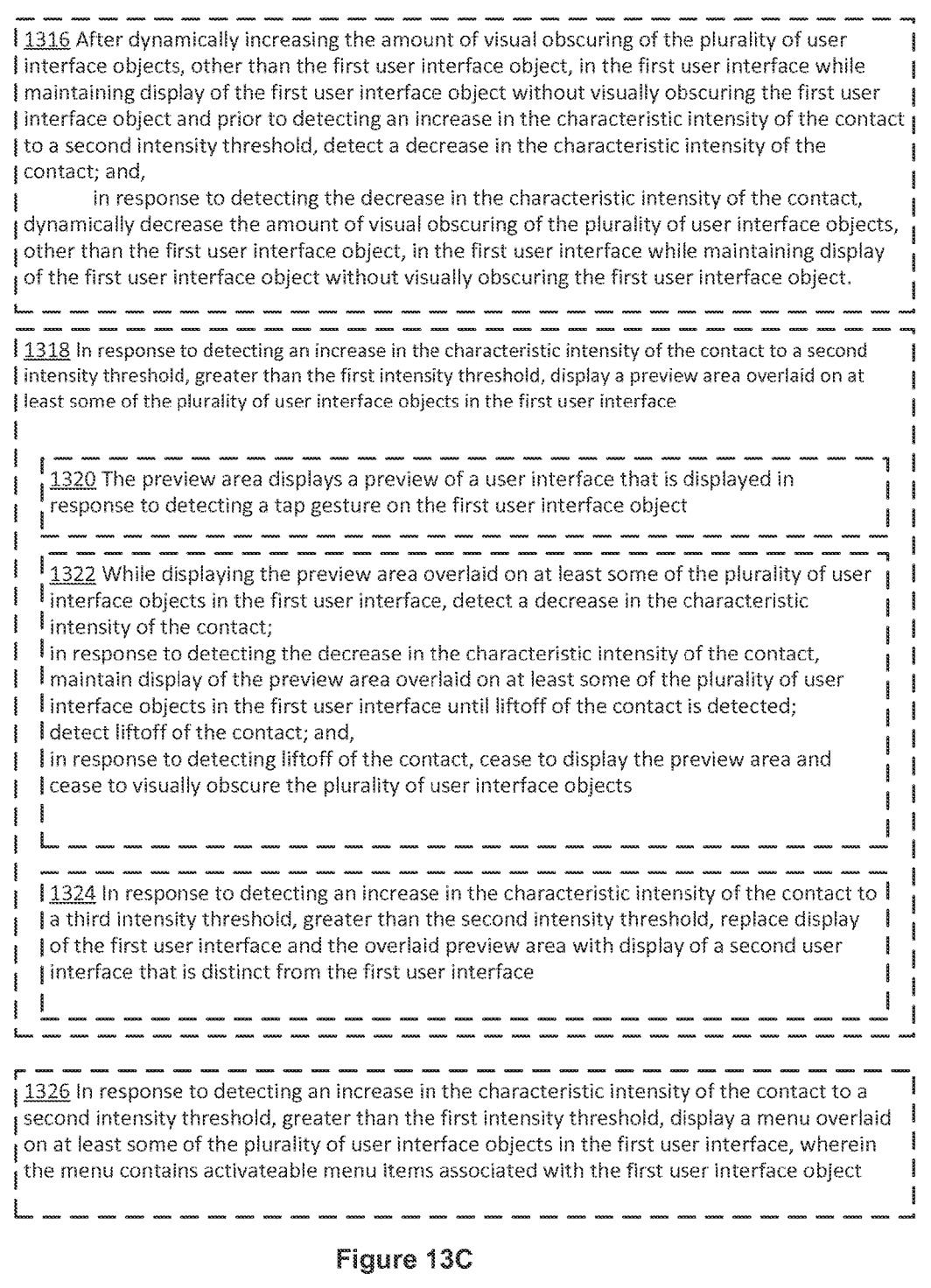

1316 After dynamically increasing the amount of visual obscuring of the plurality of user interface objects, other than the first user interface object, in the first user interface while maintaining display of the first user interface object without visually obscuring the first user interface object and prior to detecting an increase in the characteristic intensity of the contact to a second intensity threshold, detect a decrease in the characteristic intensity of the contact; and, in response to detecting the decrease in the characteristic intensity of the contact, dynamically decrease the amount of visual obscuring of the plurality of user interface objects, other than the first user interface object, in the first user interface while maintaining display of the first user interface object without visually obscuring the first user interface object.

1318 In response to detecting an increase in the characteristic intensity of the contact to a second intensity threshold, greater than the first intensity threshold, display a preview area overlaid on at least some of the plurality of user interface objects in the first user interface 1320 The preview area displays a preview of a user interface that is displayed in response to detecting a tap gesture on the first user interface object 1322 While displaying the preview area overlaid on at least some of the plurality of user interface objects in the first user interface, detect a decrease in the characteristic intensity of the contact;
in response to detecting the decrease in the characteristic intensity of the contact, maintain display of the preview area overlaid on at least some of the plurality of user interface objects in the first user interface until liftoff of the contact is detected;
detect liftoff of the contact; and,
in response to detecting liftoff of the contact, cease to display the preview area and cease to visually obscure the plurality of user interface objects 1324 In response to detecting an increase in the characteristic intensity of the contact to a third intensity threshold, greater than the second intensity threshold, replace display of the first user interface and the overlaid preview area with display of a second user interface that is distinct from the first user interface 1326 In response to detecting an increase in the characteristic intensity of the contact to a second intensity threshold, greater than the first intensity threshold, display a menu overlaid on at least some of the plurality of user interface objects in the first user interface, wherein the menu contains activateable menu items associated with the first user interface object

Figure 15B:
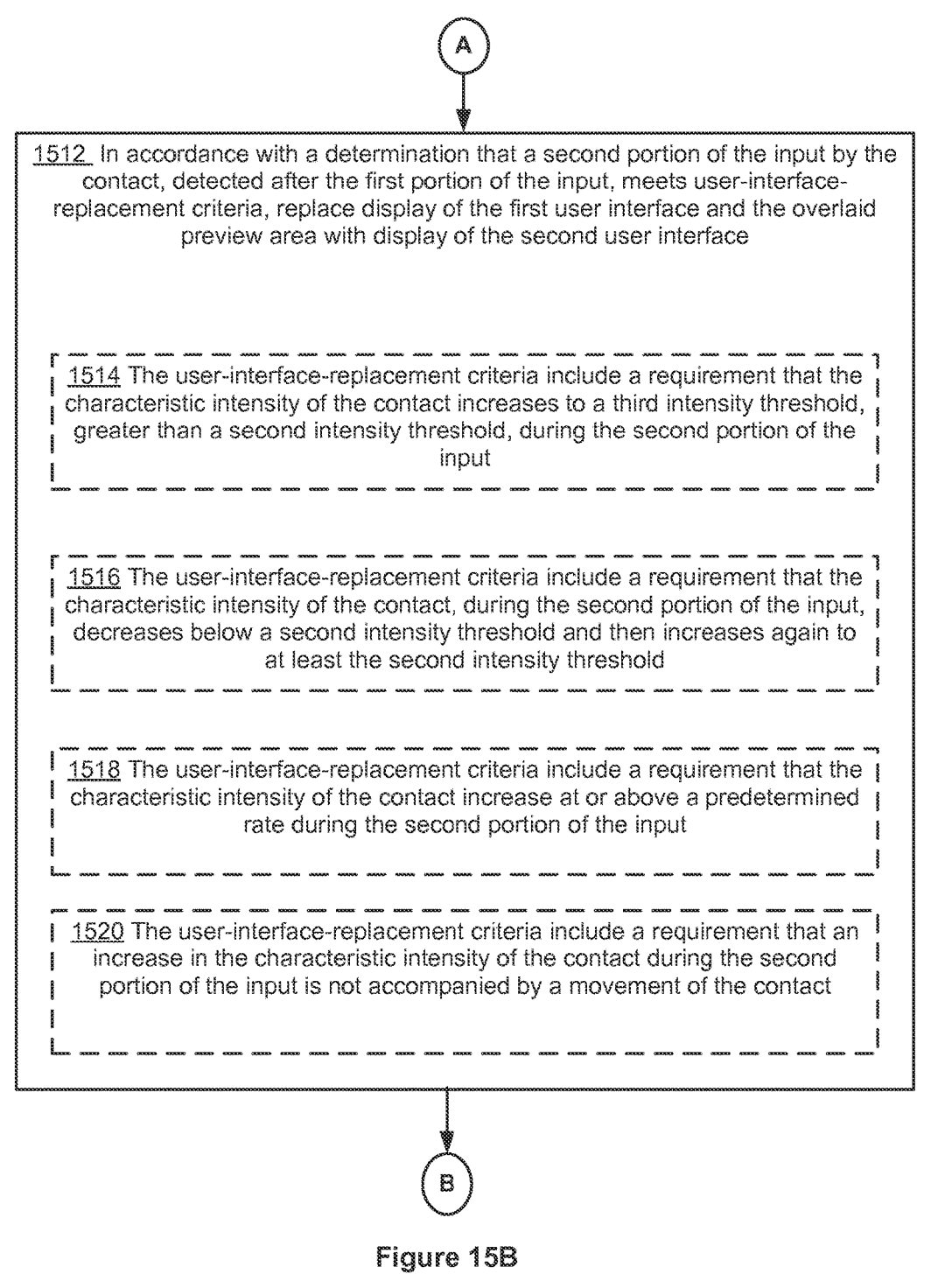

1512 In accordance with a determination that a second portion of the input by the contact, detected after the first portion of the input, meets user-interface-replacement criteria, replace display of the first user interface and the overlaid preview area with display of the second user interface 1514 The user-interface-replacement criteria include a requirement that the characteristic intensity of the contact increases to a third intensity threshold, greater than a second intensity threshold, during the second portion of the input 1516 The user-interface-replacement criteria include a requirement that the characteristic intensity of the contact, during the second portion of the input, decreases below a second intensity threshold and then increases again to at least the second intensity threshold 1518 The user-interface-replacement criteria include a requirement that the characteristic intensity of the contact increase at or above a predetermined rate during the second portion of the input 1520 The user-interface-replacement criteria include a requirement that an increase in the characteristic intensity of the contact during the second portion of the input is not accompanied by a movement of the contact

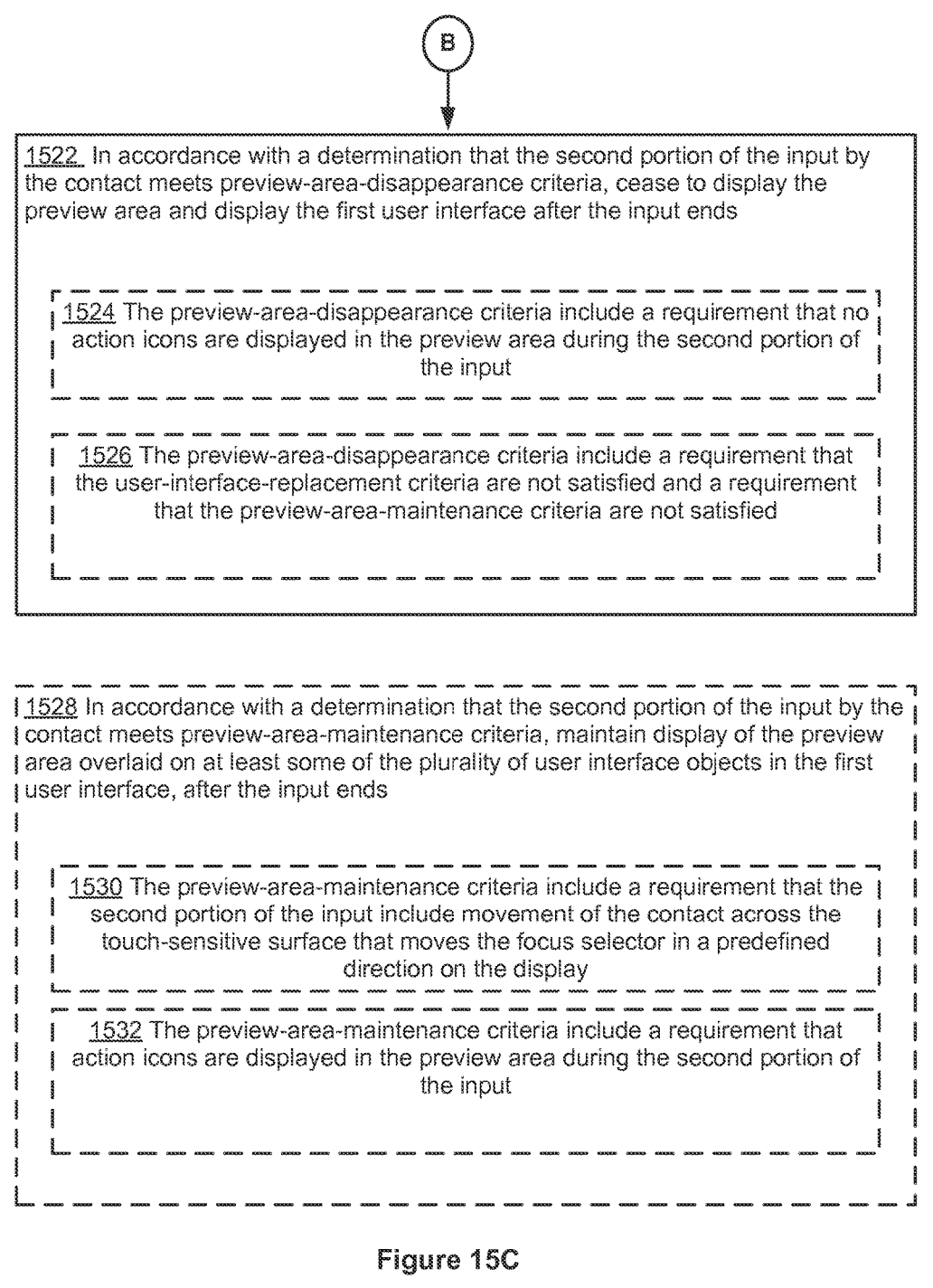

1522 In accordance with a determination that the second portion of the input by the contact meets preview-area-disappearance criteria, cease to display the preview area and display the first user interface after the input ends 1524 The preview-area-disappearance criteria include a requirement that no action icons are displayed in the preview area during the second portion of the input 1526 The preview-area-disappearance criteria include a requirement that the user-interface-replacement criteria are not satisfied and a requirement that the preview-area-maintenance criteria are not satisfied 1528 In accordance with a determination that the second portion of the input by the contact meets preview-area-maintenance criteria, maintain display of the preview area overlaid on at least some of the plurality of user interface objects in the first user interface, after the input ends 1530 The preview-area-maintenance criteria include a requirement that the second portion of the input include movement of the contact across the touch-sensitive surface that moves the focus selector in a predefined direction on the display 1532 The preview-area-maintenance criteria include a requirement that action icons are displayed in the preview area during the second portion of the input

Figure 15C

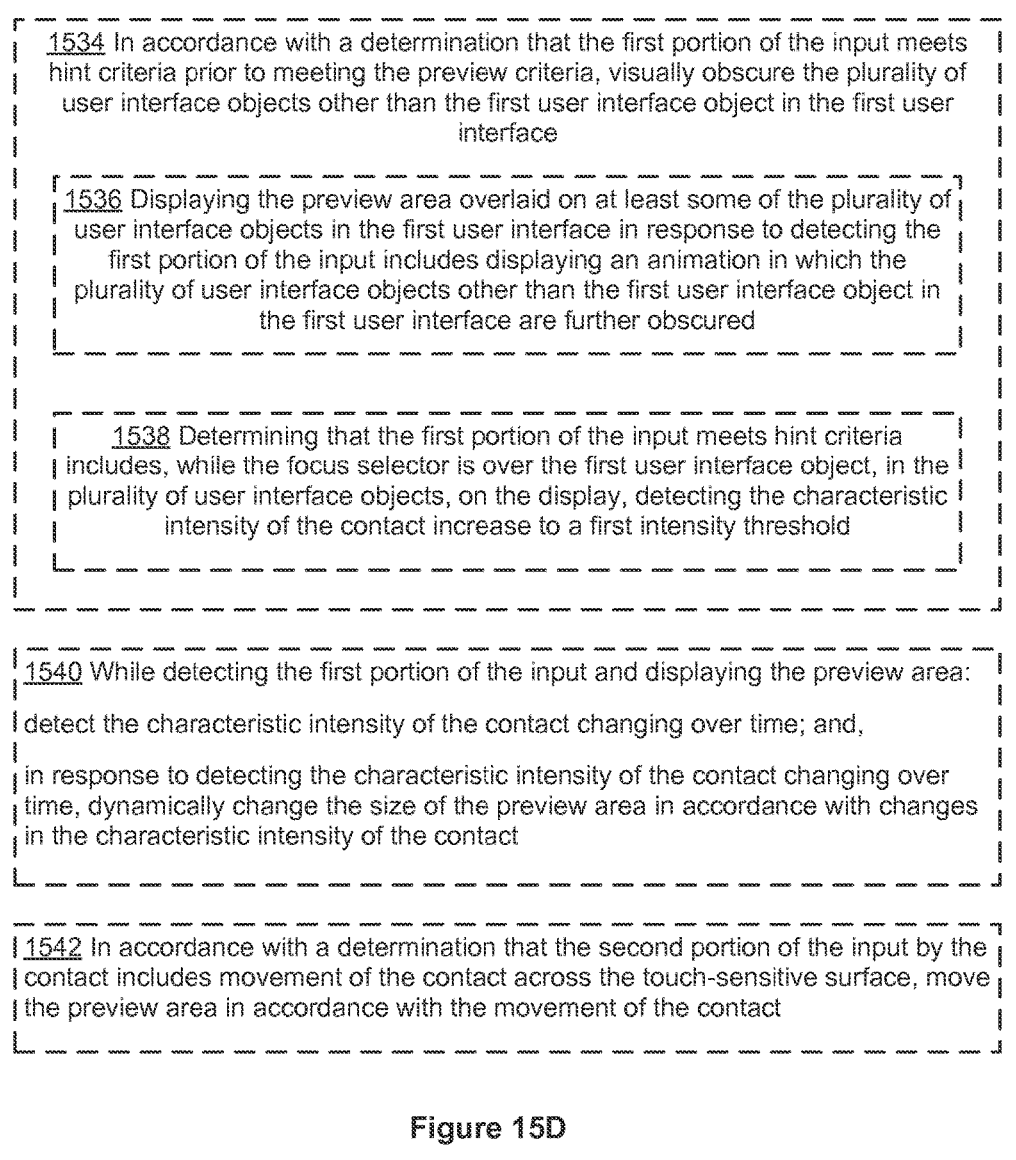

1534 In accordance with a determination that the first portion of the input meets hint criteria prior to meeting the preview criteria, visually obscure the plurality of user interface objects other than the first user interface object in the first user interface 1536 Displaying the preview area overlaid on at least some of the plurality of user interface objects in the first user interface in response to detecting the first portion of the input includes displaying an animation in which the plurality of user interface objects other than the first user interface object in the first user interface are further obscured 1538 Determining that the first portion of the input meets hint criteria includes, while the focus selector is over the first user interface object, in the plurality of user interface objects, on the display, detecting the characteristic intensity of the contact increase to a first intensity threshold 1540 While detecting the first portion of the input and displaying the preview area:

detect the characteristic intensity of the contact changing over time; and, in response to detecting the characteristic intensity of the contact changing over time, dynamically change the size of the preview area in accordance with changes in the characteristic intensity of the contact 1542 In accordance with a determination that the second portion of the input by the contact includes movement of the contact across the touch-sensitive surface, move the preview area in accordance with the movement of the contact

Figure 15D

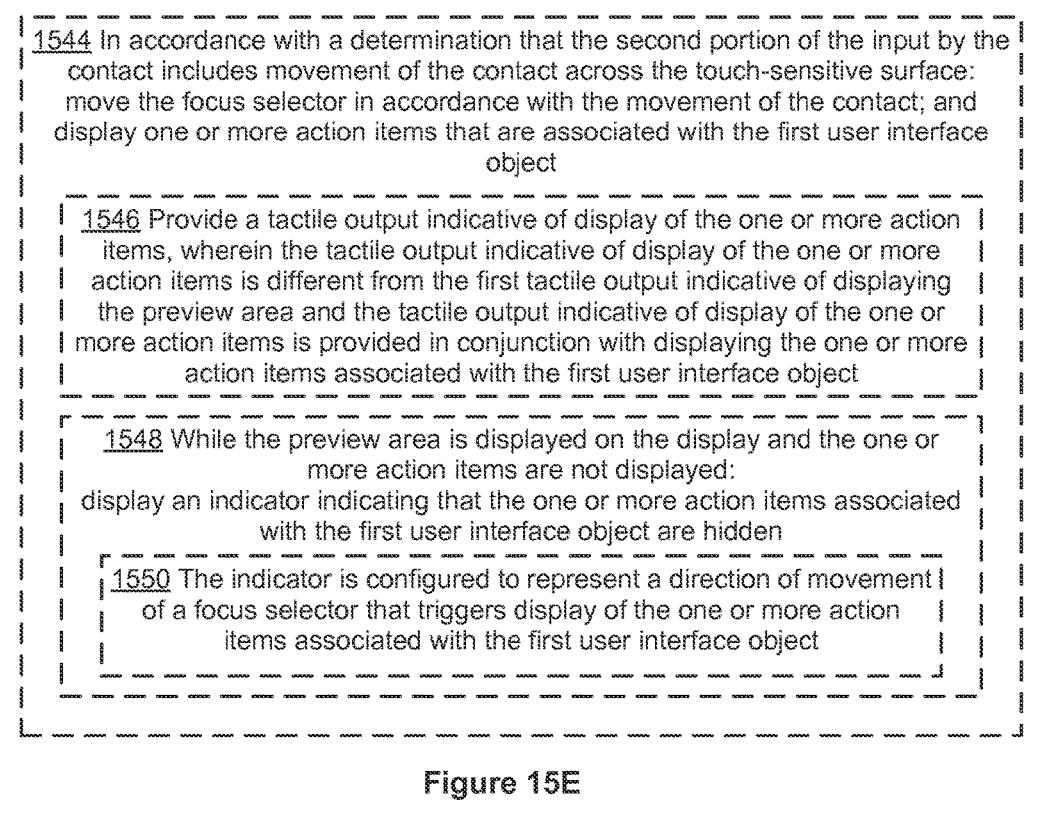

1544 In accordance with a determination that the second portion of the input by the contact includes movement of the contact across the touch-sensitive surface: move the focus selector in accordance with the movement of the contact; and display one or more action items that are associated with the first user interface object 1546 Provide a tactile output indicative of display of the one or more action items, wherein the tactile output indicative of display of the one or more action items is different from the first tactile output indicative of displaying the preview area and the tactile output indicative of display of the one or more action items is provided in conjunction with displaying the one or more action items associated with the first user interface object 1548 While the preview area is displayed on the display and the one or more action items are not displayed:
display an indicator indicating that the one or more action items associated with the first user interface object are hidden 1550 The indicator is configured to represent a direction of movement of a focus selector that triggers display of the one or more action items associated with the first user interface object

Figure 15E

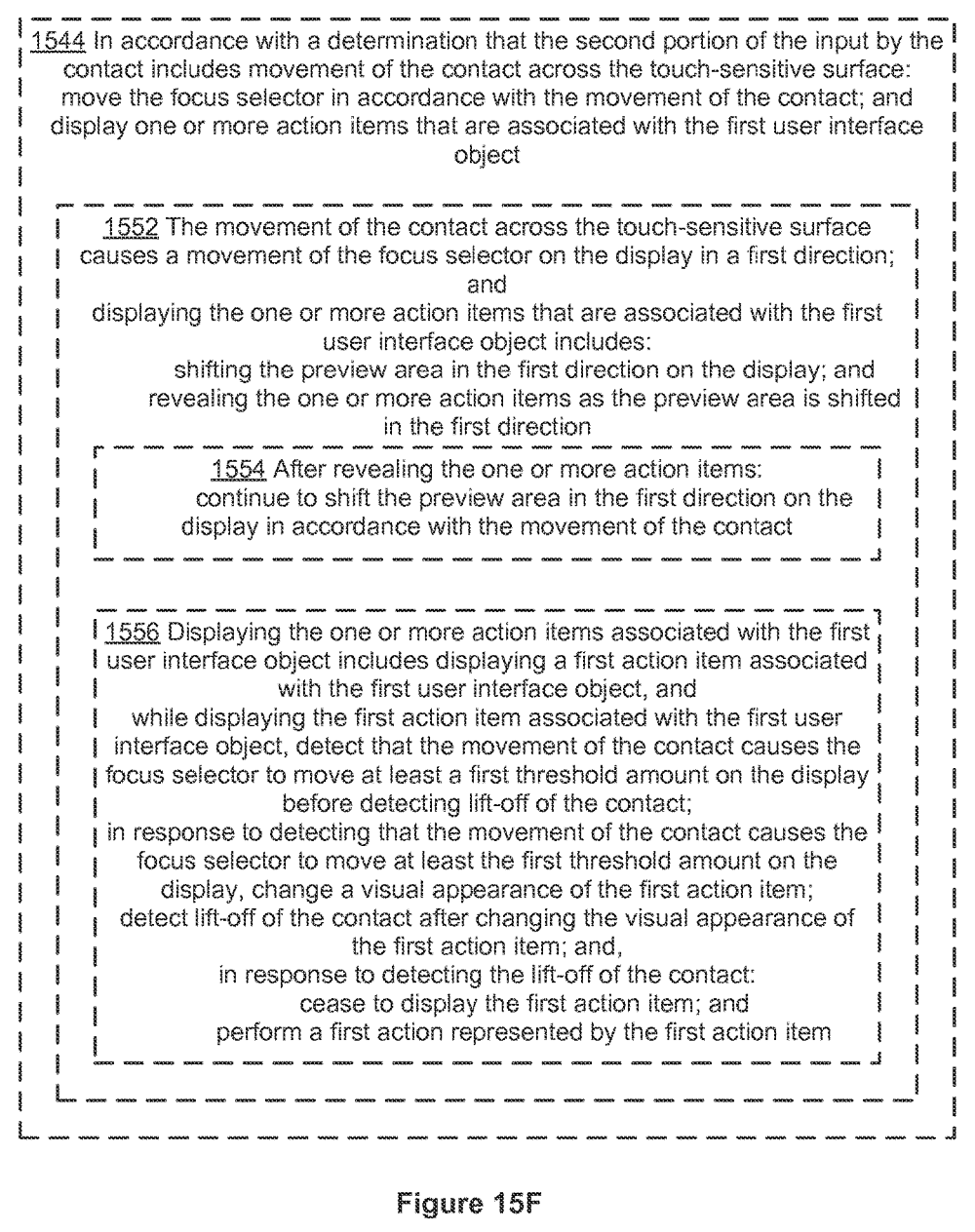

1544 In accordance with a determination that the second portion of the input by the contact includes movement of the contact across the touch-sensitive surface:
move the focus selector in accordance with the movement of the contact; and
display one or more action items that are associated with the first user interface object 1552 The movement of the contact across the touch-sensitive surface causes a movement of the focus selector on the display in a first direction; and
displaying the one or more action items that are associated with the first user interface object includes:
shifting the preview area in the first direction on the display; and
revealing the one or more action items as the preview area is shifted in the first direction 1554 After revealing the one or more action items:
continue to shift the preview area in the first direction on the display in accordance with the movement of the contact 1556 Displaying the one or more action items associated with the first user interface object includes displaying a first action item associated with the first user interface object, and
while displaying the first action item associated with the first user interface object, detect that the movement of the contact causes the focus selector to move at least a first threshold amount on the display before detecting lift-off of the contact;
in response to detecting that the movement of the contact causes the focus selector to move at least the first threshold amount on the display, change a visual appearance of the first action item;
detect lift-off of the contact after changing the visual appearance of the first action item; and,
in response to detecting the lift-off of the contact:
cease to display the first action item; and
perform a first action represented by the first action item

Figure 15F

Figure 15G:
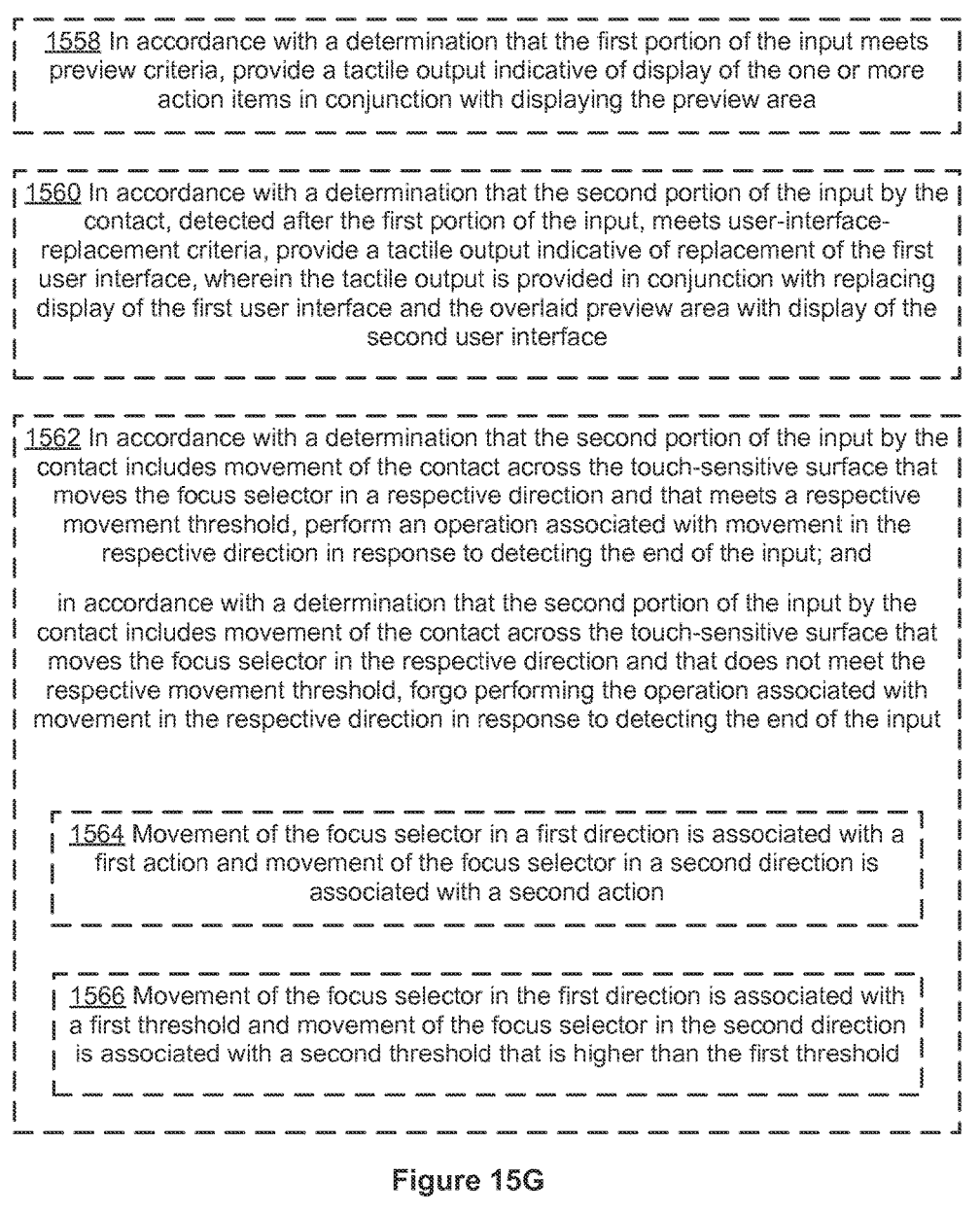

1558 In accordance with a determination that the first portion of the input meets preview criteria, provide a tactile output indicative of display of the one or more action items in conjunction with displaying the preview area 1560 In accordance with a determination that the second portion of the input by the contact, detected after the first portion of the input, meets user-interface-replacement criteria, provide a tactile output indicative of replacement of the first user interface, wherein the tactile output is provided in conjunction with replacing display of the first user interface and the overlaid preview area with display of the second user interface 1562 In accordance with a determination that the second portion of the input by the contact includes movement of the contact across the touch-sensitive surface that moves the focus selector in a respective direction and that meets a respective movement threshold, perform an operation associated with movement in the respective direction in response to detecting the end of the input; and in accordance with a determination that the second portion of the input by the contact includes movement of the contact across the touch-sensitive surface that moves the focus selector in the respective direction and that does not meet the respective movement threshold, forgo performing the operation associated with movement in the respective direction in response to detecting the end of the input 1564 Movement of the focus selector in a first direction is associated with a first action and movement of the focus selector in a second direction is associated with a second action 1566 Movement of the focus selector in the first direction is associated with a first threshold and movement of the focus selector in the second direction is associated with a second threshold that is higher than the first threshold

Figure 17A:
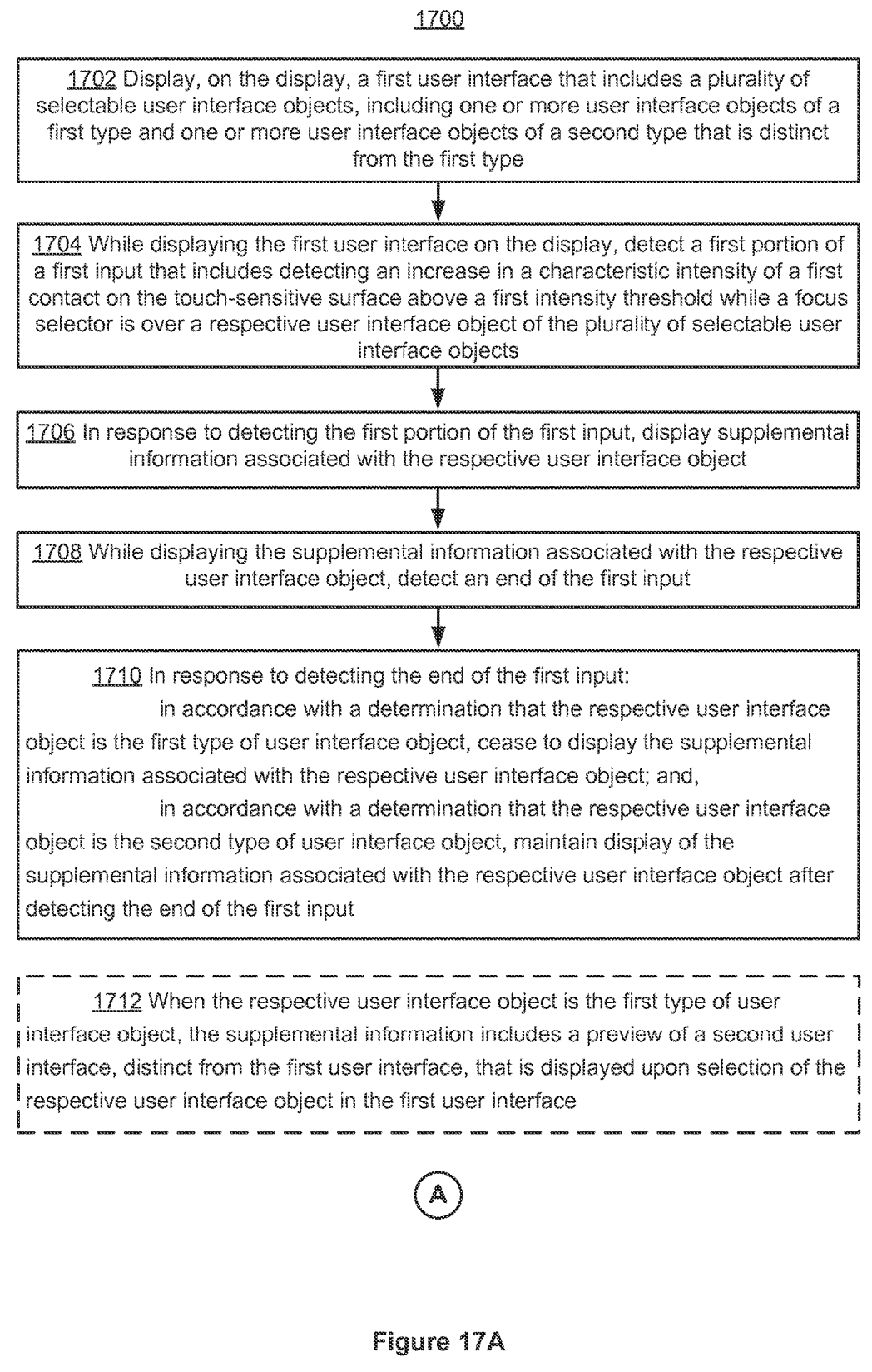

1702 Display, on the display, a first user interface that includes a plurality of selectable user interface objects, including one or more user interface objects of a first type and one or more user interface objects of a second type that is distinct from the first type

↓

1704 While displaying the first user interface on the display, detect a first portion of a first input that includes detecting an increase in a characteristic intensity of a first contact on the touch-sensitive surface above a first intensity threshold while a focus selector is over a respective user interface object of the plurality of selectable user interface objects

↓

1706 In response to detecting the first portion of the first input, display supplemental information associated with the respective user interface object

↓

1708 While displaying the supplemental information associated with the respective user interface object, detect an end of the first input

↓

1710 In response to detecting the end of the first input:

in accordance with a determination that the respective user interface object is the first type of user interface object, cease to display the supplemental information associated with the respective user interface object; and, in accordance with a determination that the respective user interface object is the second type of user interface object, maintain display of the supplemental information associated with the respective user interface object after detecting the end of the first input 1712 When the respective user interface object is the first type of user interface object, the supplemental information includes a preview of a second user interface, distinct from the first user interface, that is displayed upon selection of the respective user interface object in the first user interface (A)

Figure 17A (A)

Figure 17B:
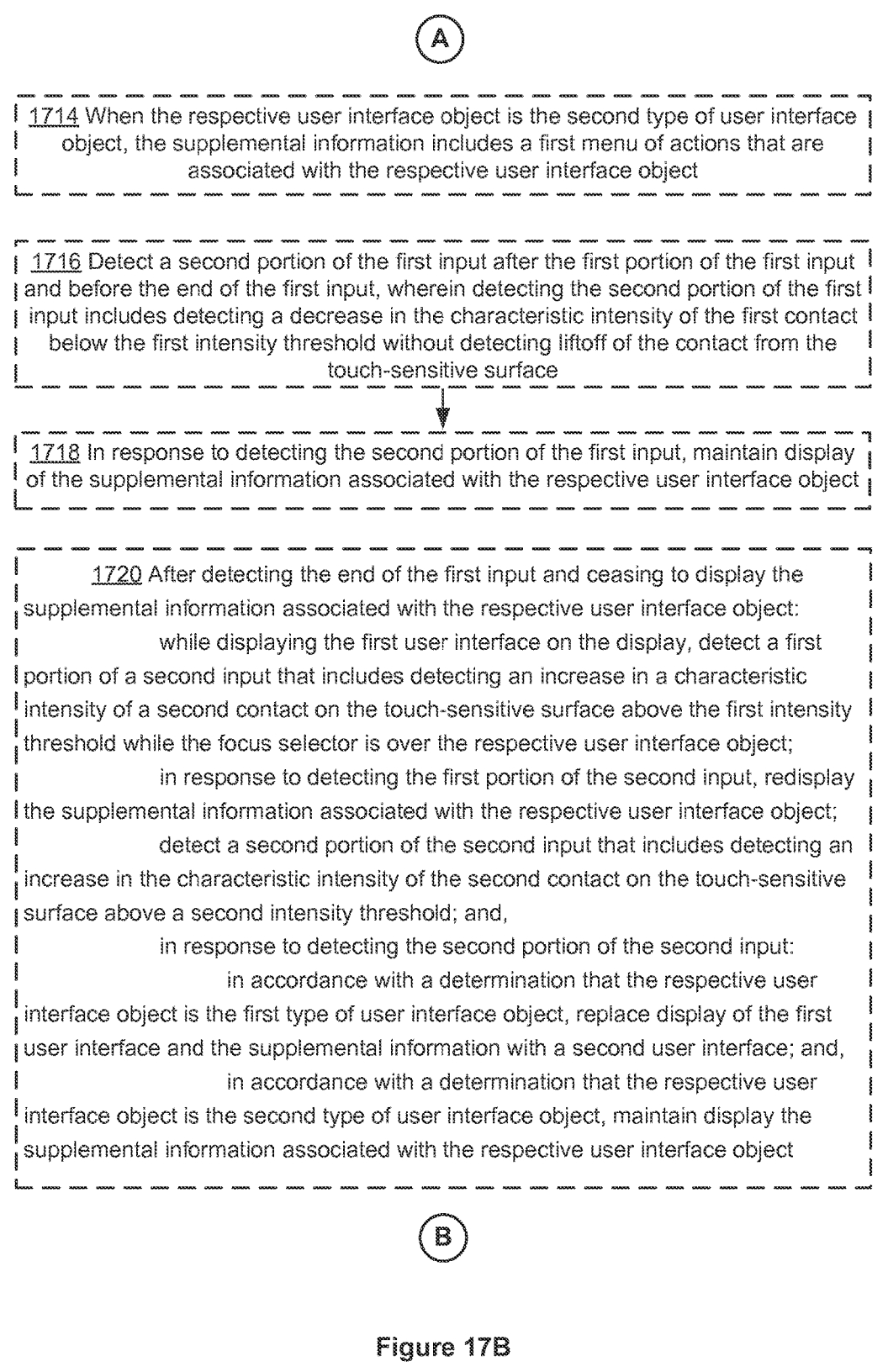

1714 When the respective user interface object is the second type of user interface object, the supplemental information includes a first menu of actions that are associated with the respective user interface object 1716 Detect a second portion of the first input after the first portion of the first input and before the end of the first input, wherein detecting the second portion of the first input includes detecting a decrease in the characteristic intensity of the first contact below the first intensity threshold without detecting liftoff of the contact from the touch-sensitive surface

↓

1718 In response to detecting the second portion of the first input, maintain display of the supplemental information associated with the respective user interface object 1720 After detecting the end of the first input and ceasing to display the supplemental information associated with the respective user interface object:

while displaying the first user interface on the display, detect a first portion of a second input that includes detecting an increase in a characteristic intensity of a second contact on the touch-sensitive surface above the first intensity threshold while the focus selector is over the respective user interface object;

in response to detecting the first portion of the second input, redisplay the supplemental information associated with the respective user interface object;

detect a second portion of the second input that includes detecting an increase in the characteristic intensity of the second contact on the touch-sensitive surface above a second intensity threshold; and, in response to detecting the second portion of the second input:

in accordance with a determination that the respective user interface object is the first type of user interface object, replace display of the first user interface and the supplemental information with a second user interface; and, in accordance with a determination that the respective user interface object is the second type of user interface object, maintain display the supplemental information associated with the respective user interface object (B)

Figure 17B (B)

Figure 17C:
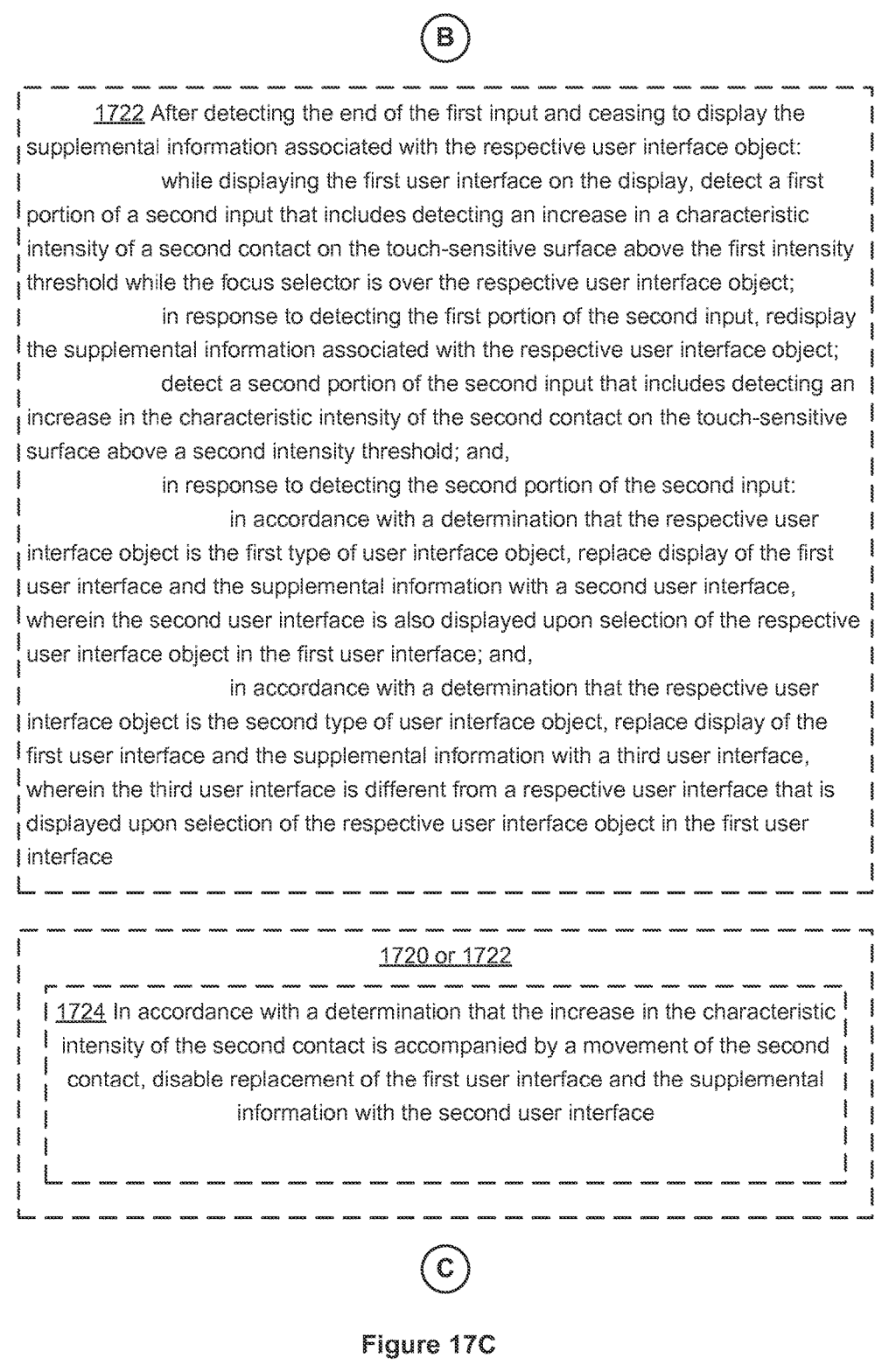

1722 After detecting the end of the first input and ceasing to display the supplemental information associated with the respective user interface object:

while displaying the first user interface on the display, detect a first portion of a second input that includes detecting an increase in a characteristic intensity of a second contact on the touch-sensitive surface above the first intensity threshold while the focus selector is over the respective user interface object;

in response to detecting the first portion of the second input, redisplay the supplemental information associated with the respective user interface object;

detect a second portion of the second input that includes detecting an increase in the characteristic intensity of the second contact on the touch-sensitive surface above a second intensity threshold; and, in response to detecting the second portion of the second input:

in accordance with a determination that the respective user interface object is the first type of user interface object, replace display of the first user interface and the supplemental information with a second user interface, wherein the second user interface is also displayed upon selection of the respective user interface object in the first user interface; and, in accordance with a determination that the respective user interface object is the second type of user interface object, replace display of the first user interface and the supplemental information with a third user interface, wherein the third user interface is different from a respective user interface that is displayed upon selection of the respective user interface object in the first user interface 1720 or 1722

1724 In accordance with a determination that the increase in the characteristic intensity of the second contact is accompanied by a movement of the second contact, disable replacement of the first user interface and the supplemental information with the second user interface (C)

Figure 17D:
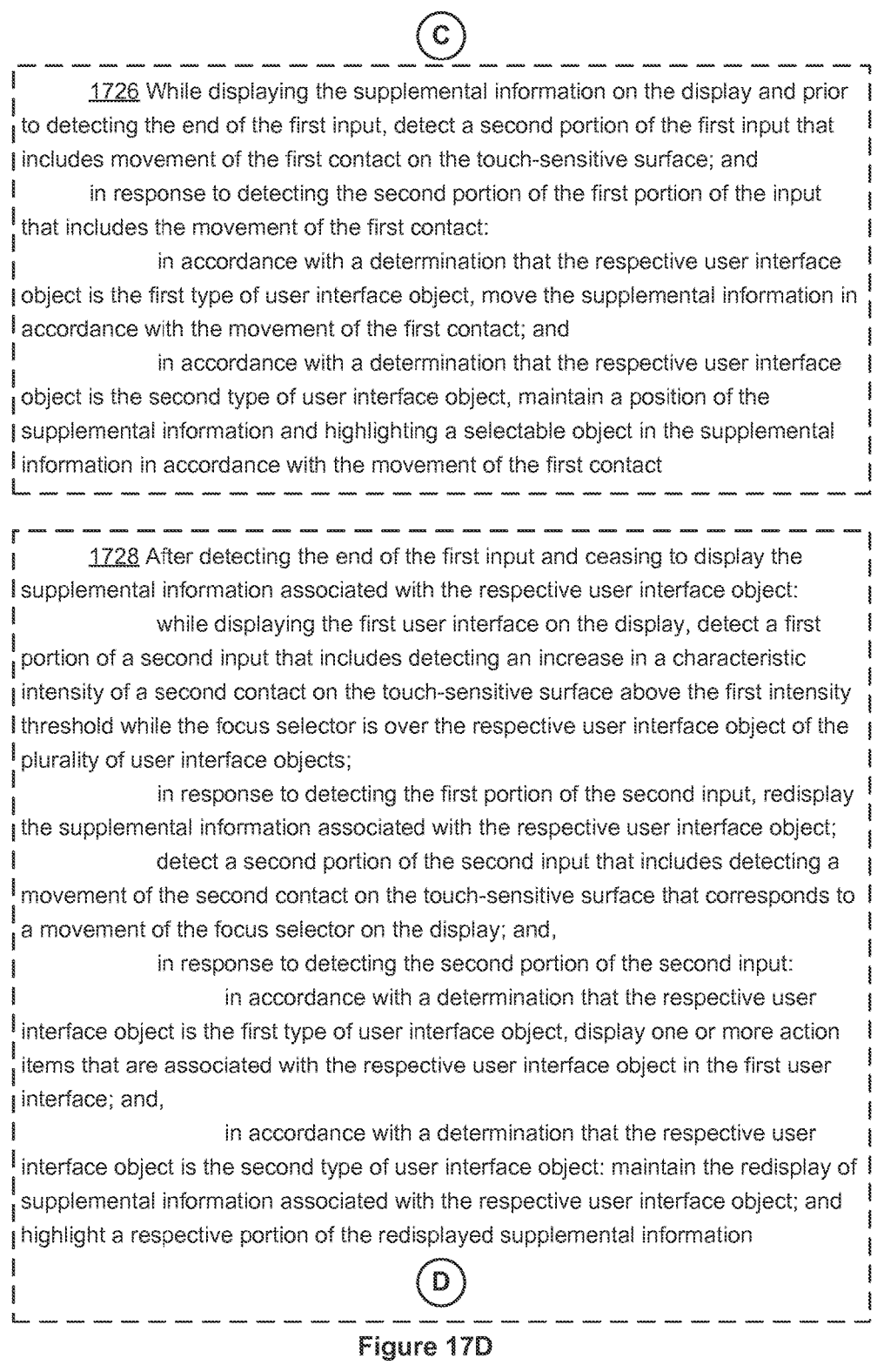

1726 While displaying the supplemental information on the display and prior to detecting the end of the first input, detect a second portion of the first input that includes movement of the first contact on the touch-sensitive surface; and in response to detecting the second portion of the first portion of the input that includes the movement of the first contact:

in accordance with a determination that the respective user interface object is the first type of user interface object, move the supplemental information in accordance with the movement of the first contact; and in accordance with a determination that the respective user interface object is the second type of user interface object, maintain a position of the supplemental information and highlighting a selectable object in the supplemental information in accordance with the movement of the first contact 1728 After detecting the end of the first input and ceasing to display the supplemental information associated with the respective user interface object:

while displaying the first user interface on the display, detect a first portion of a second input that includes detecting an increase in a characteristic intensity of a second contact on the touch-sensitive surface above the first intensity threshold while the focus selector is over the respective user interface object of the plurality of user interface objects;

in response to detecting the first portion of the second input, redisplay the supplemental information associated with the respective user interface object;

detect a second portion of the second input that includes detecting a movement of the second contact on the touch-sensitive surface that corresponds to a movement of the focus selector on the display; and, in response to detecting the second portion of the second input:

in accordance with a determination that the respective user interface object is the first type of user interface object, display one or more action items that are associated with the respective user interface object in the first user interface; and, in accordance with a determination that the respective user interface object is the second type of user interface object: maintain the redisplay of supplemental information associated with the respective user interface object; and highlight a respective portion of the redisplayed supplemental information

Figure 17E:
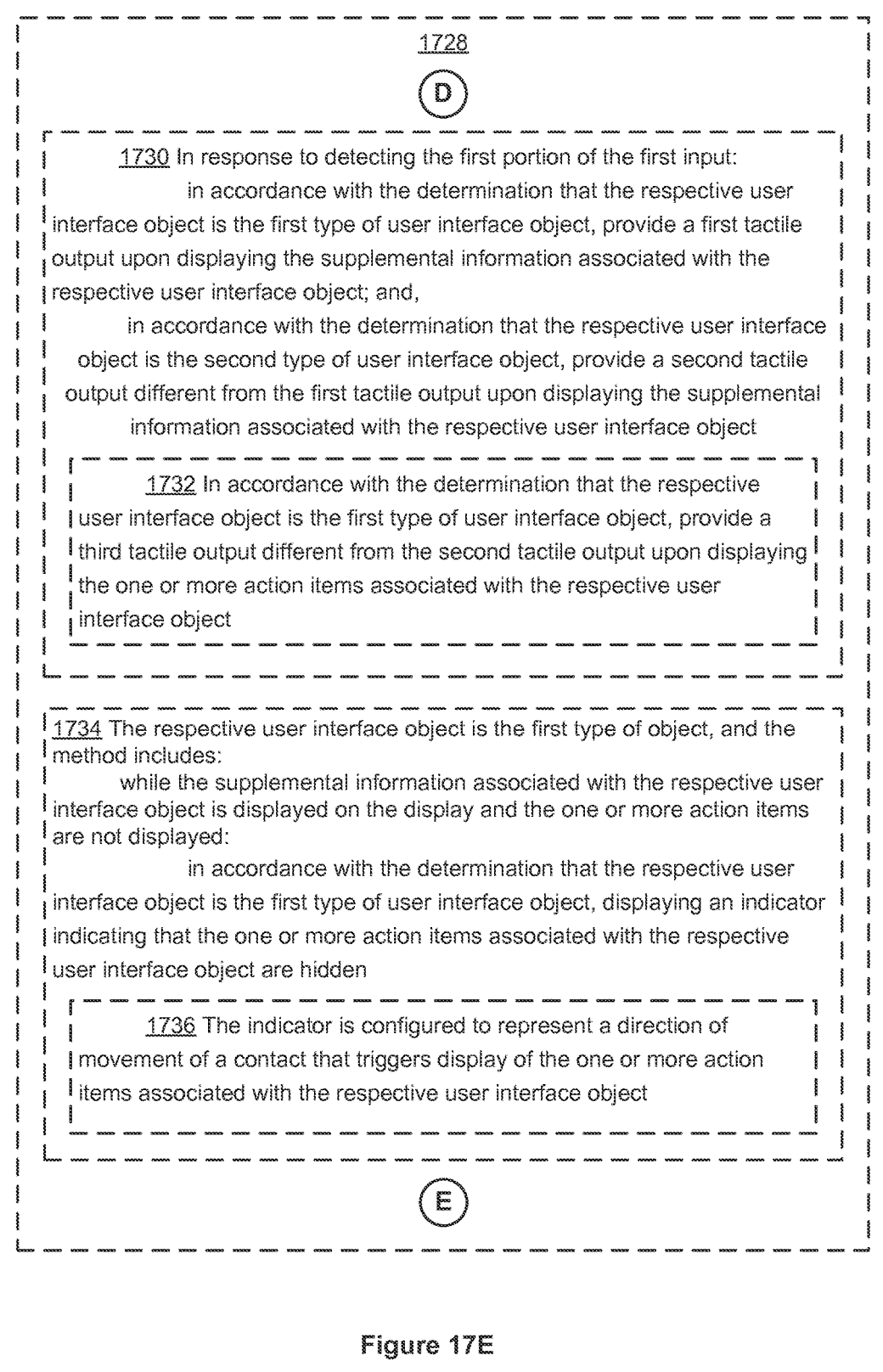

1730 In response to detecting the first portion of the first input:

in accordance with the determination that the respective user interface object is the first type of user interface object, provide a first tactile output upon displaying the supplemental information associated with the respective user interface object; and, in accordance with the determination that the respective user interface object is the second type of user interface object, provide a second tactile output different from the first tactile output upon displaying the supplemental information associated with the respective user interface object 1732 In accordance with the determination that the respective user interface object is the first type of user interface object, provide a third tactile output different from the second tactile output upon displaying the one or more action items associated with the respective user interface object 1734 The respective user interface object is the first type of object, and the method includes:

while the supplemental information associated with the respective user interface object is displayed on the display and the one or more action items are not displayed:

in accordance with the determination that the respective user interface object is the first type of user interface object, displaying an indicator indicating that the one or more action items associated with the respective user interface object are hidden 1736 The indicator is configured to represent a direction of movement of a contact that triggers display of the one or more action items associated with the respective user interface object

Figure 17F:
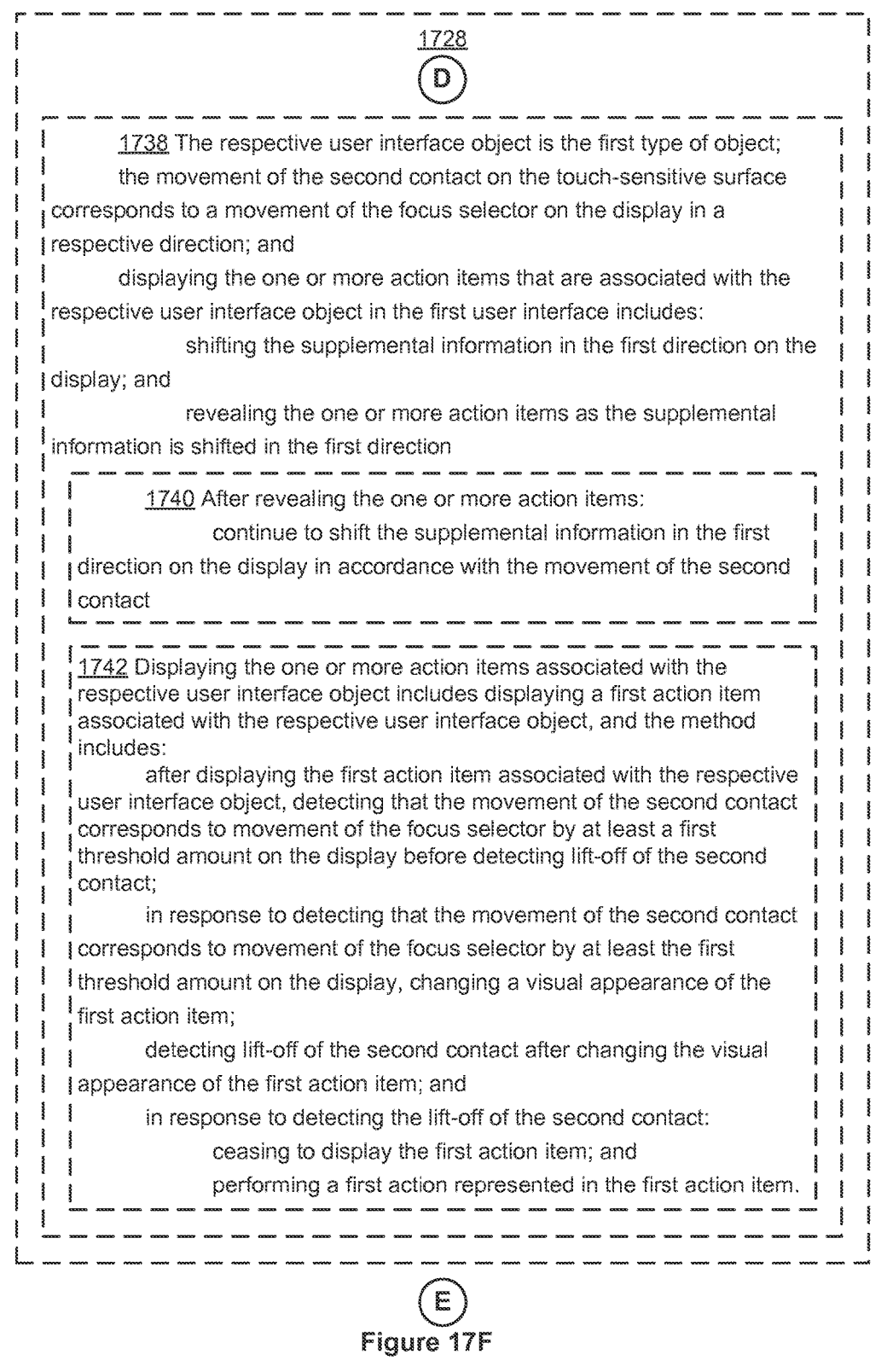

1738 The respective user interface object is the first type of object;

the movement of the second contact on the touch-sensitive surface corresponds to a movement of the focus selector on the display in a respective direction; and displaying the one or more action items that are associated with the respective user interface object in the first user interface includes:

shifting the supplemental information in the first direction on the display; and revealing the one or more action items as the supplemental information is shifted in the first direction 1740 After revealing the one or more action items:

continue to shift the supplemental information in the first direction on the display in accordance with the movement of the second contact 1742 Displaying the one or more action items associated with the respective user interface object includes displaying a first action item associated with the respective user interface object, and the method includes:

after displaying the first action item associated with the respective user interface object, detecting that the movement of the second contact corresponds to movement of the focus selector by at least a first threshold amount on the display before detecting lift-off of the second contact;

in response to detecting that the movement of the second contact corresponds to movement of the focus selector by at least the first threshold amount on the display, changing a visual appearance of the first action item;

detecting lift-off of the second contact after changing the visual appearance of the first action item; and in response to detecting the lift-off of the second contact:

ceasing to display the first action item; and performing a first action represented in the first action item.

Figure 17G:
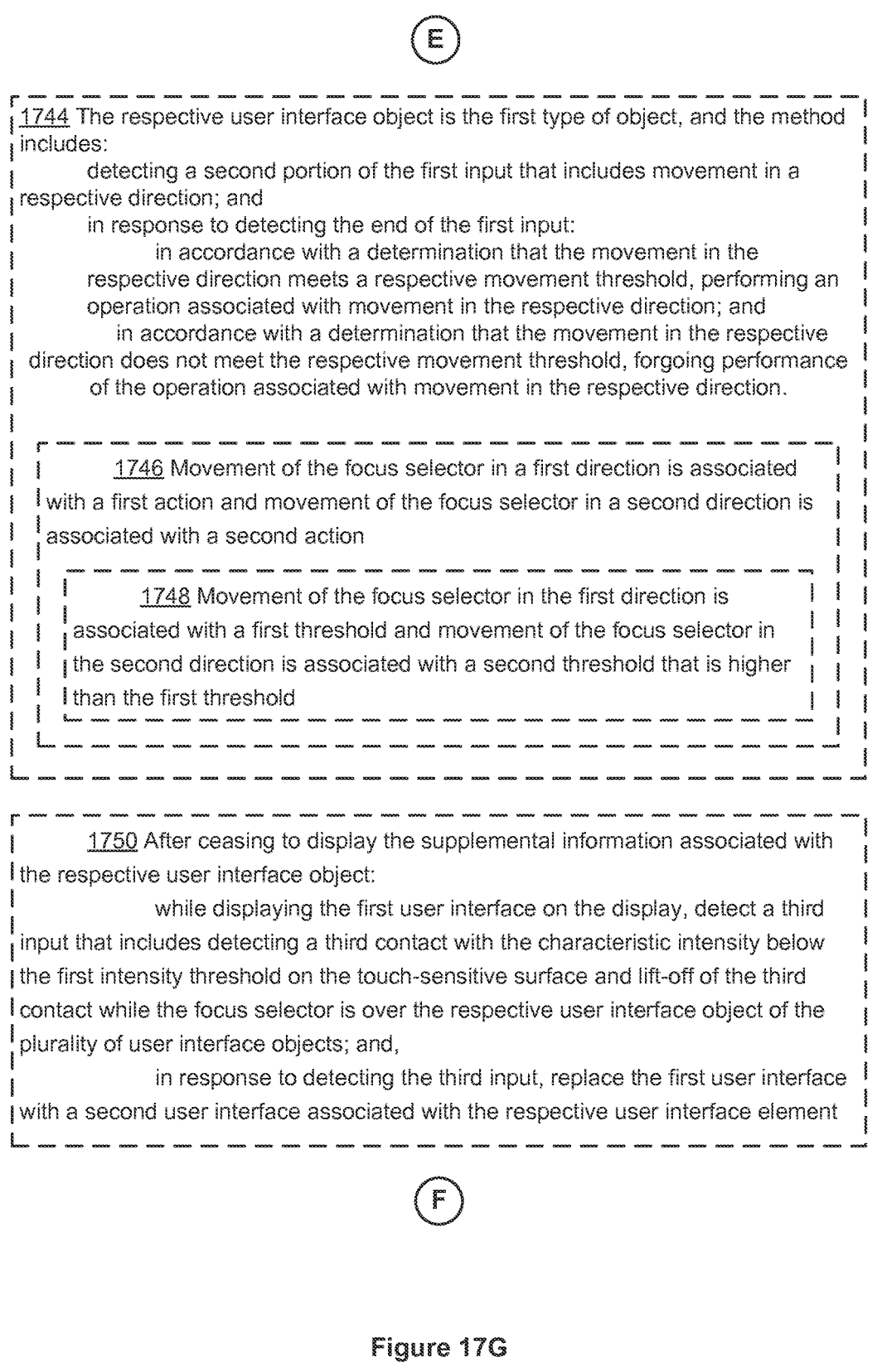

1744 The respective user interface object is the first type of object, and the method includes:

detecting a second portion of the first input that includes movement in a respective direction; and in response to detecting the end of the first input:

in accordance with a determination that the movement in the respective direction meets a respective movement threshold, performing an operation associated with movement in the respective direction; and in accordance with a determination that the movement in the respective direction does not meet the respective movement threshold, forgoing performance of the operation associated with movement in the respective direction.

1746 Movement of the focus selector in a first direction is associated with a first action and movement of the focus selector in a second direction is associated with a second action 1748 Movement of the focus selector in the first direction is associated with a first threshold and movement of the focus selector in the second direction is associated with a second threshold that is higher than the first threshold 1750 After ceasing to display the supplemental information associated with the respective user interface object:

while displaying the first user interface on the display, detect a third input that includes detecting a third contact with the characteristic intensity below the first intensity threshold on the touch-sensitive surface and lift-off of the third contact while the focus selector is over the respective user interface object of the plurality of user interface objects; and, in response to detecting the third input, replace the first user interface with a second user interface associated with the respective user interface element

Figure 17H:
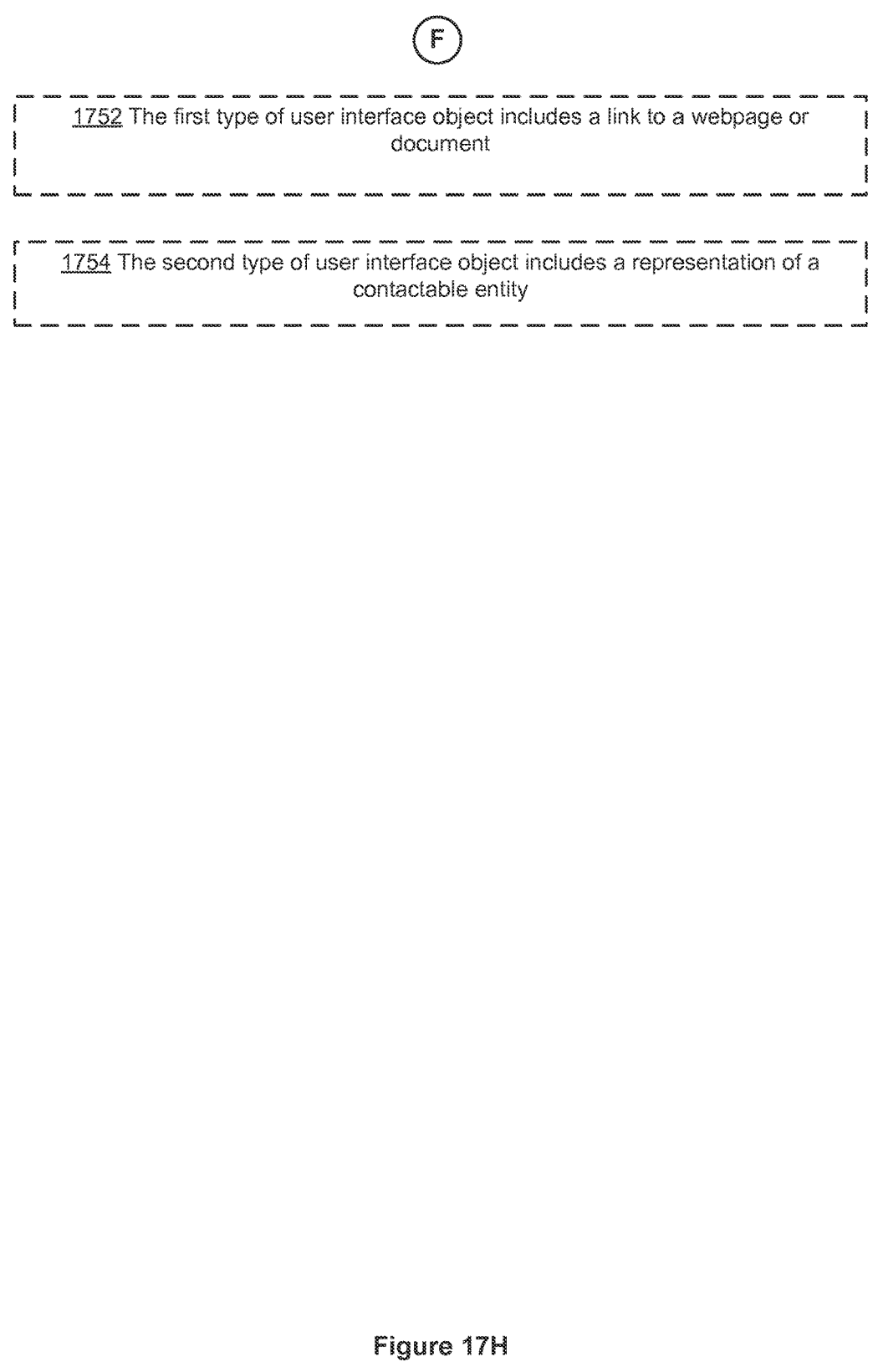

1752 The first type of user interface object includes a link to a webpage or document 1754 The second type of user interface object includes a representation of a contactable entity

Figure 19A:
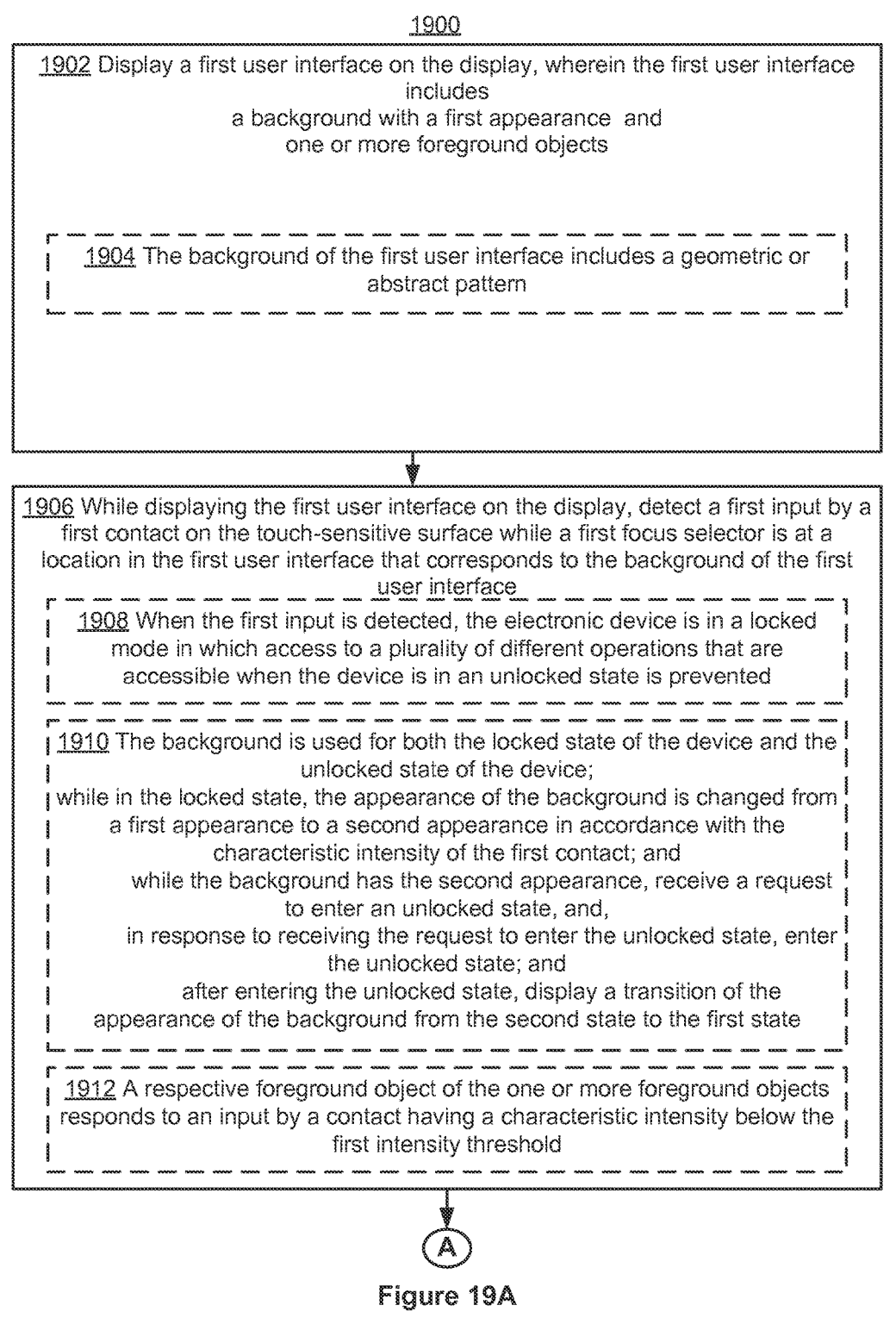

1902 Display a first user interface on the display, wherein the first user interface includes
a background with a first appearance and
one or more foreground objects 1904 The background of the first user interface includes a geometric or abstract pattern 1906 While displaying the first user interface on the display, detect a first input by a first contact on the touch-sensitive surface while a first focus selector is at a location in the first user interface that corresponds to the background of the first user interface 1908 When the first input is detected, the electronic device is in a locked mode in which access to a plurality of different operations that are accessible when the device is in an unlocked state is prevented 1910 The background is used for both the locked state of the device and the unlocked state of the device;
while in the locked state, the appearance of the background is changed from a first appearance to a second appearance in accordance with the characteristic intensity of the first contact; and
while the background has the second appearance, receive a request to enter an unlocked state, and,
in response to receiving the request to enter the unlocked state, enter the unlocked state; and
after entering the unlocked state, display a transition of the appearance of the background from the second state to the first state 1912 A respective foreground object of the one or more foreground objects responds to an input by a contact having a characteristic intensity below the first intensity threshold

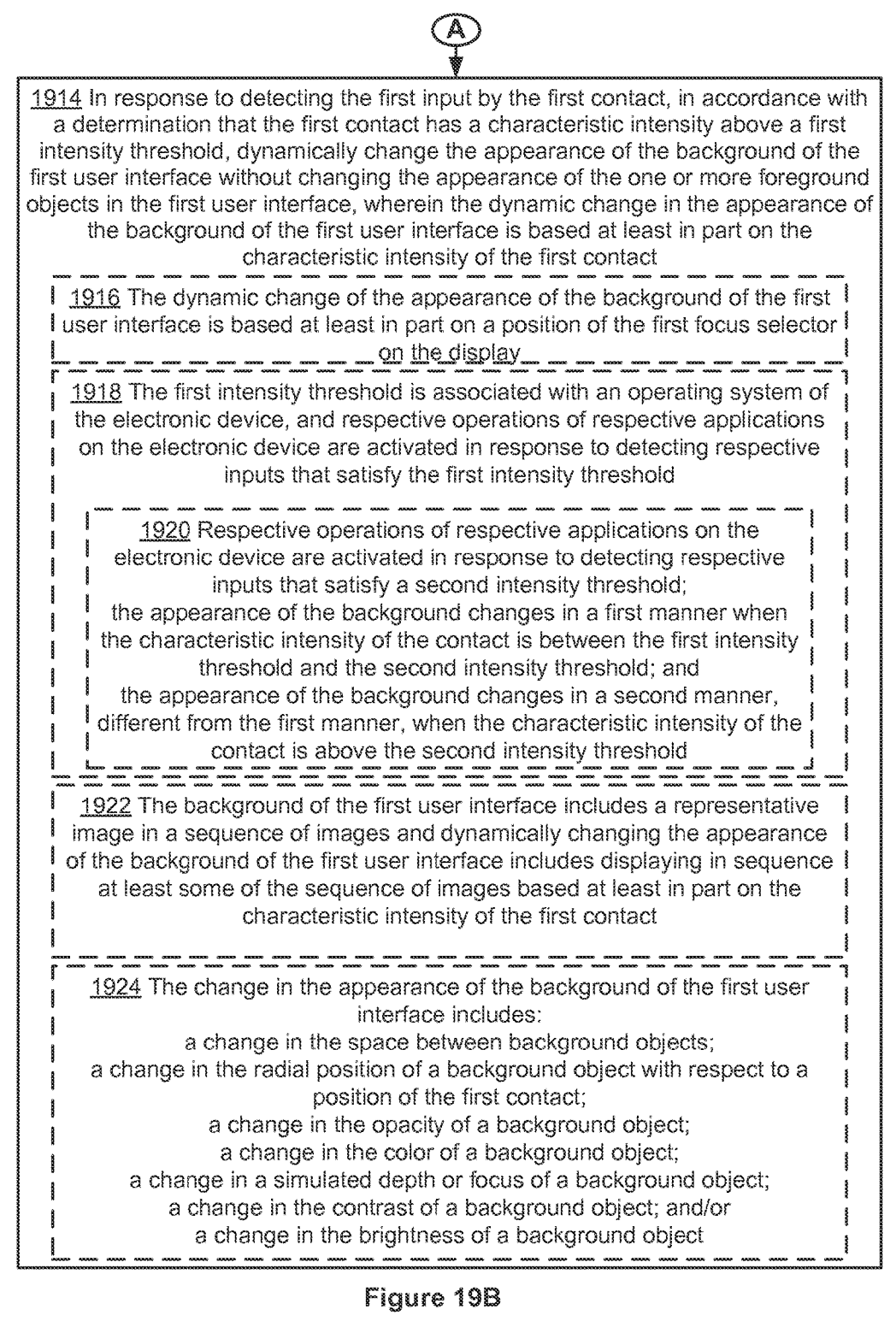

1914 In response to detecting the first input by the first contact, in accordance with a determination that the first contact has a characteristic intensity above a first intensity threshold, dynamically change the appearance of the background of the first user interface without changing the appearance of the one or more foreground objects in the first user interface, wherein the dynamic change in the appearance of the background of the first user interface is based at least in part on the characteristic intensity of the first contact 1916 The dynamic change of the appearance of the background of the first user interface is based at least in part on a position of the first focus selector on the display 1918 The first intensity threshold is associated with an operating system of the electronic device, and respective operations of respective applications on the electronic device are activated in response to detecting respective inputs that satisfy the first intensity threshold 1920 Respective operations of respective applications on the electronic device are activated in response to detecting respective inputs that satisfy a second intensity threshold;
the appearance of the background changes in a first manner when the characteristic intensity of the contact is between the first intensity threshold and the second intensity threshold; and
the appearance of the background changes in a second manner, different from the first manner, when the characteristic intensity of the contact is above the second intensity threshold 1922 The background of the first user interface includes a representative image in a sequence of images and dynamically changing the appearance of the background of the first user interface includes displaying in sequence at least some of the sequence of images based at least in part on the characteristic intensity of the first contact 1924 The change in the appearance of the background of the first user interface includes:
a change in the space between background objects;
a change in the radial position of a background object with respect to a position of the first contact;
a change in the opacity of a background object;
a change in the color of a background object;
a change in a simulated depth or focus of a background object;
a change in the contrast of a background object; and/or
a change in the brightness of a background object

Figure 19B

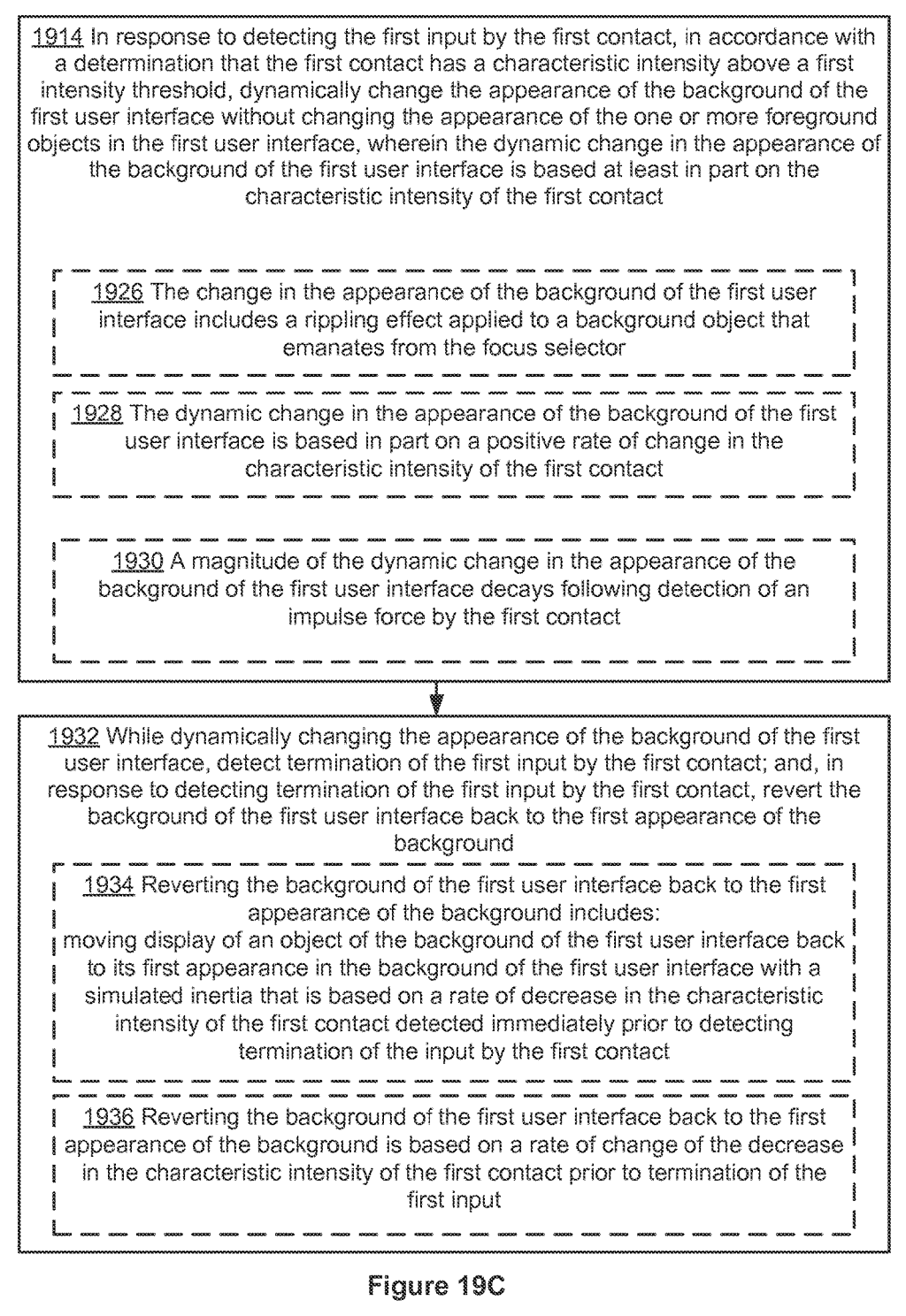

1914 In response to detecting the first input by the first contact, in accordance with a determination that the first contact has a characteristic intensity above a first intensity threshold, dynamically change the appearance of the background of the first user interface without changing the appearance of the one or more foreground objects in the first user interface, wherein the dynamic change in the appearance of the background of the first user interface is based at least in part on the characteristic intensity of the first contact 1926 The change in the appearance of the background of the first user interface includes a rippling effect applied to a background object that emanates from the focus selector 1928 The dynamic change in the appearance of the background of the first user interface is based in part on a positive rate of change in the characteristic intensity of the first contact 1930 A magnitude of the dynamic change in the appearance of the background of the first user interface decays following detection of an impulse force by the first contact 1932 While dynamically changing the appearance of the background of the first user interface, detect termination of the first input by the first contact; and, in response to detecting termination of the first input by the first contact, revert the background of the first user interface back to the first appearance of the background 1934 Reverting the background of the first user interface back to the first appearance of the background includes:
moving display of an object of the background of the first user interface back to its first appearance in the background of the first user interface with a simulated inertia that is based on a rate of decrease in the characteristic intensity of the first contact detected immediately prior to detecting termination of the input by the first contact 1936 Reverting the background of the first user interface back to the first appearance of the background is based on a rate of change of the decrease in the characteristic intensity of the first contact prior to termination of the first input

Figure 19C

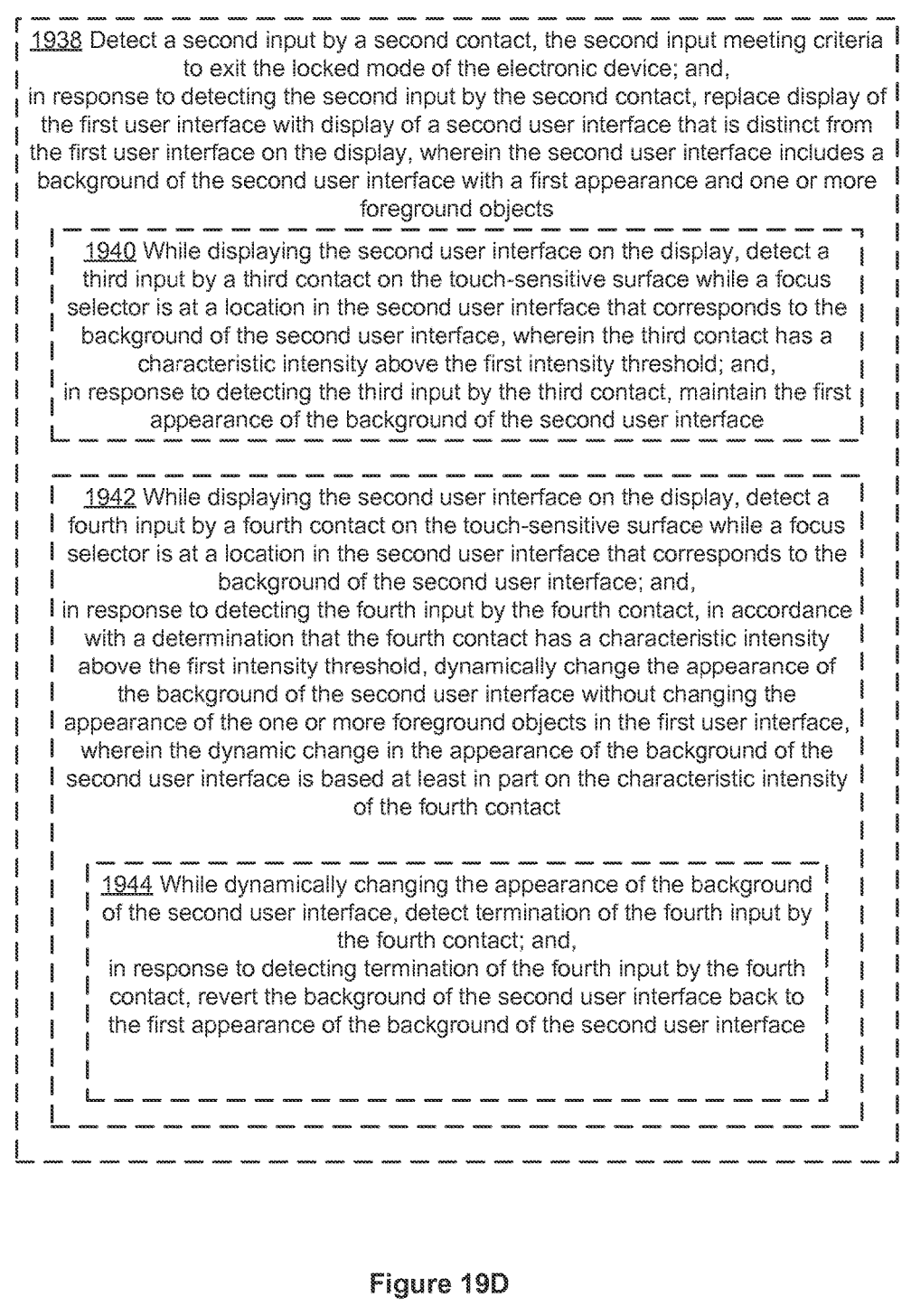

1938 Detect a second input by a second contact, the second input meeting criteria to exit the locked mode of the electronic device; and,
in response to detecting the second input by the second contact, replace display of the first user interface with display of a second user interface that is distinct from the first user interface on the display, wherein the second user interface includes a background of the second user interface with a first appearance and one or more foreground objects 1940 While displaying the second user interface on the display, detect a third input by a third contact on the touch-sensitive surface while a focus selector is at a location in the second user interface that corresponds to the background of the second user interface, wherein the third contact has a characteristic intensity above the first intensity threshold; and,
in response to detecting the third input by the third contact, maintain the first appearance of the background of the second user interface 1942 While displaying the second user interface on the display, detect a fourth input by a fourth contact on the touch-sensitive surface while a focus selector is at a location in the second user interface that corresponds to the background of the second user interface; and,
in response to detecting the fourth input by the fourth contact, in accordance with a determination that the fourth contact has a characteristic intensity above the first intensity threshold, dynamically change the appearance of the background of the second user interface without changing the appearance of the one or more foreground objects in the first user interface, wherein the dynamic change in the appearance of the background of the second user interface is based at least in part on the characteristic intensity of the fourth contact 1944 While dynamically changing the appearance of the background of the second user interface, detect termination of the fourth input by the fourth contact; and,
in response to detecting termination of the fourth input by the fourth contact, revert the background of the second user interface back to the first appearance of the background of the second user interface

Figure 19D

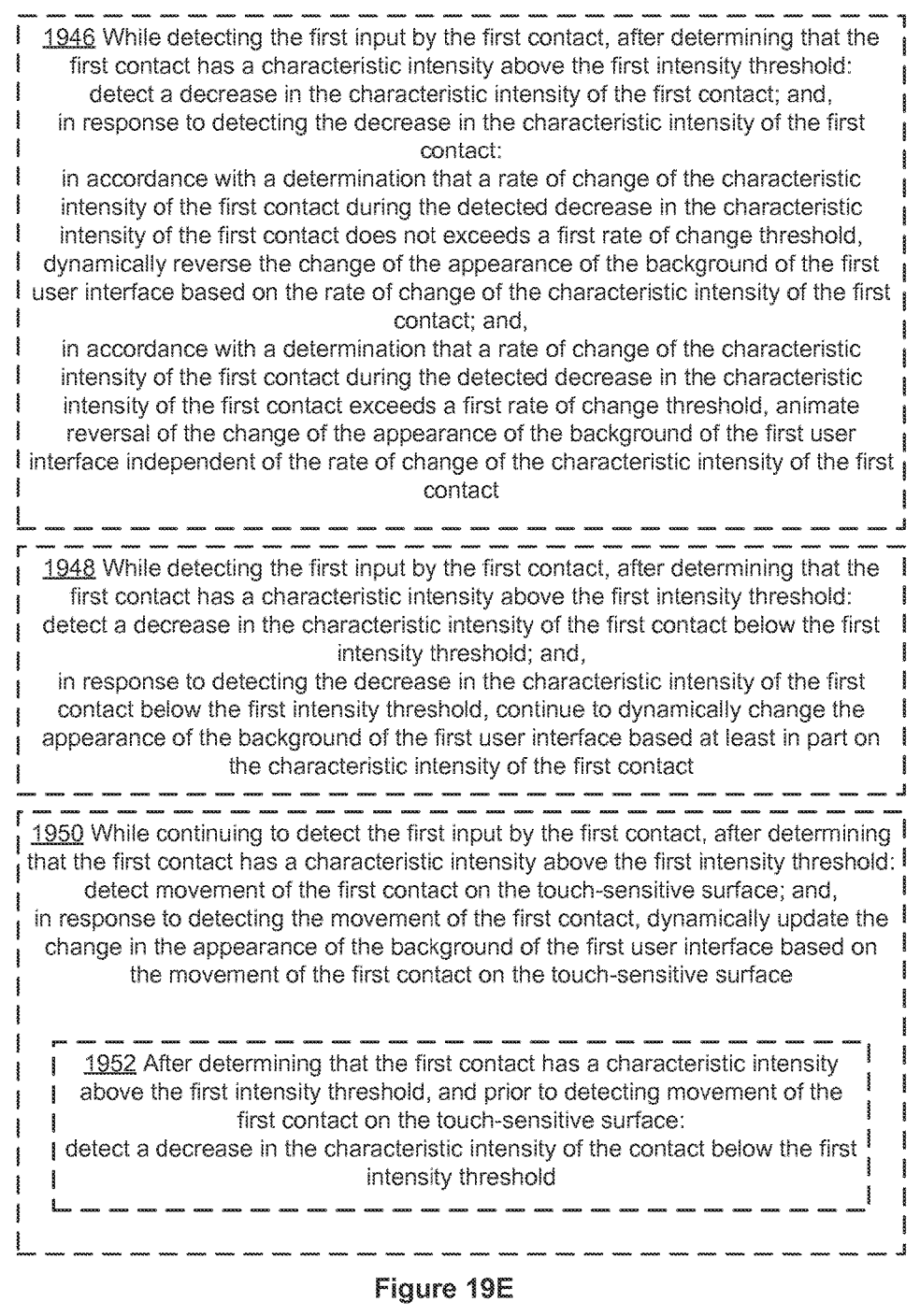

1946 While detecting the first input by the first contact, after determining that the first contact has a characteristic intensity above the first intensity threshold: detect a decrease in the characteristic intensity of the first contact; and, in response to detecting the decrease in the characteristic intensity of the first contact: in accordance with a determination that a rate of change of the characteristic intensity of the first contact during the detected decrease in the characteristic intensity of the first contact does not exceeds a first rate of change threshold, dynamically reverse the change of the appearance of the background of the first user interface based on the rate of change of the characteristic intensity of the first contact; and, in accordance with a determination that a rate of change of the characteristic intensity of the first contact during the detected decrease in the characteristic intensity of the first contact exceeds a first rate of change threshold, animate reversal of the change of the appearance of the background of the first user interface independent of the rate of change of the characteristic intensity of the first contact 1948 While detecting the first input by the first contact, after determining that the first contact has a characteristic intensity above the first intensity threshold: detect a decrease in the characteristic intensity of the first contact below the first intensity threshold; and, in response to detecting the decrease in the characteristic intensity of the first contact below the first intensity threshold, continue to dynamically change the appearance of the background of the first user interface based at least in part on the characteristic intensity of the first contact 1950 While continuing to detect the first input by the first contact, after determining that the first contact has a characteristic intensity above the first intensity threshold: detect movement of the first contact on the touch-sensitive surface; and, in response to detecting the movement of the first contact, dynamically update the change in the appearance of the background of the first user interface based on the movement of the first contact on the touch-sensitive surface 1952 After determining that the first contact has a characteristic intensity above the first intensity threshold, and prior to detecting movement of the first contact on the touch-sensitive surface: detect a decrease in the characteristic intensity of the contact below the first intensity threshold

Figure 19E

1954 In response to detecting the input by the first contact, in accordance with the determination that the first contact has a characteristic intensity above the first intensity threshold, change an aspect of the appearance of the background of the first user interface without changing the appearance of a respective foreground object of the one or more foreground objects in the first user interface, wherein the change of the aspect of the appearance of the background of the first user interface is independent of the position of the focus selector in the background 1956 While detecting the first input by the first contact on the touch-sensitive surface, detect a second input by a second contact on the touch-sensitive surface while a second focus selector is at a location in the first user interface that corresponds to the background of the user interface;
in response to detecting the second input by the second contact:
in accordance with a determination that the second contact does not have a characteristic intensity above the first intensity threshold, dynamically change the appearance of the background of the first user interface without changing the appearance of a respective foreground object of the one or more foreground objects in the first user interface, wherein the dynamic change in the appearance of the background of the first user interface is based at least in part on the characteristic intensity of the first contact; and,
in accordance with a determination that the second contact has a characteristic intensity above the first intensity threshold, dynamically change the appearance of the background of the first user interface without changing the appearance of a respective foreground object of the one or more foreground objects in the first user interface, wherein the dynamic change in the appearance of the background of the first user interface is based at least in part on
the characteristic intensity of the first contact,
the characteristic intensity of the second contact, and
positions of the first and second focus selectors on the display;
while dynamically changing the appearance of the background of the first user interface, detect termination of the first input by the first contact and termination of the second input by the second contact; and,
in response to detecting termination of the first input by the first contact and termination of the second input by the second contact, revert the background of the first user interface back to the first appearance of the background 1958 In response to detecting the first input by the first contact on the touch-sensitive surface, in accordance with a determination that the first input does not have a characteristic intensity above the first intensity threshold, maintain the first appearance of the background of the first user interface

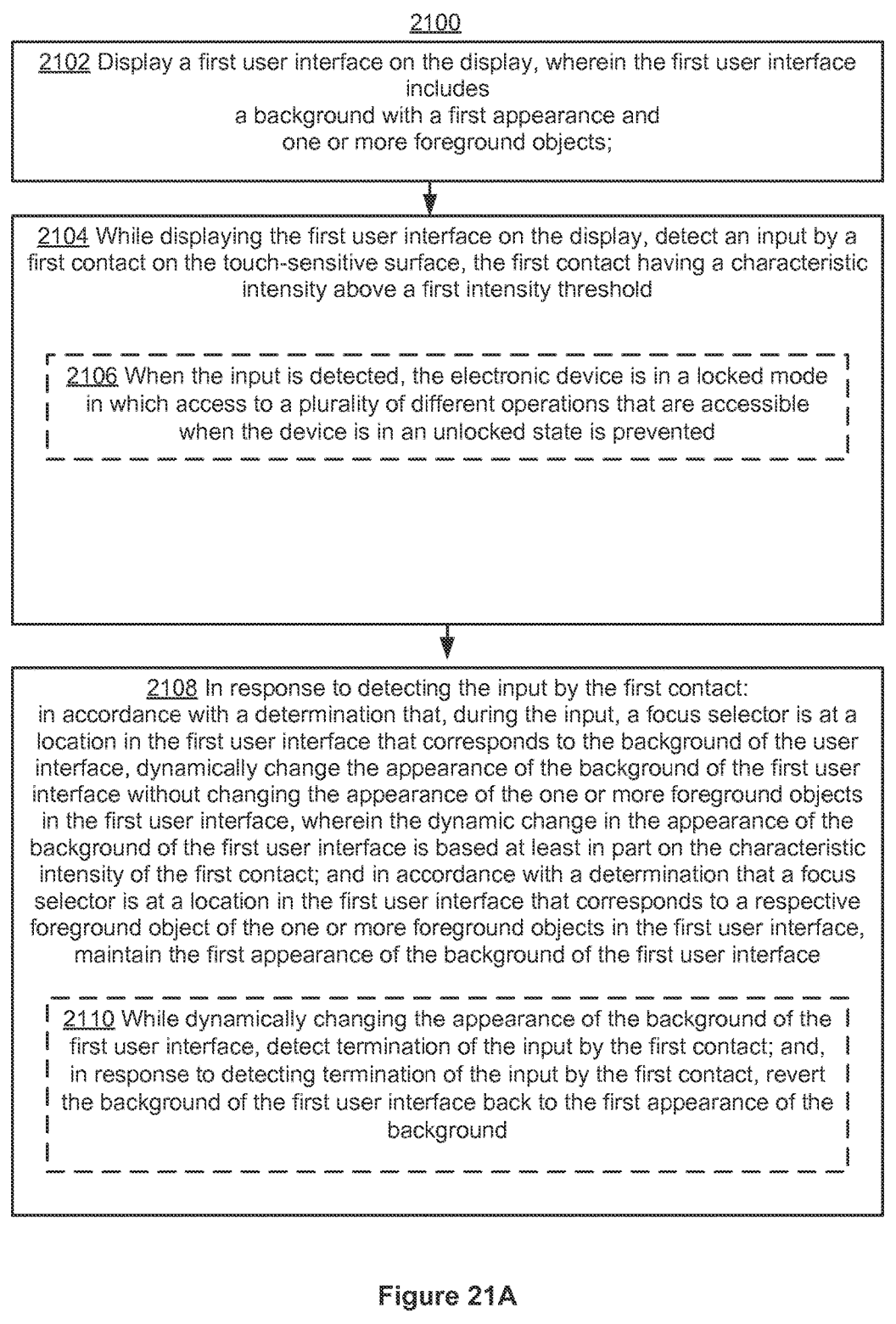

2102 Display a first user interface on the display, wherein the first user interface includes
a background with a first appearance and
one or more foreground objects;

2104 While displaying the first user interface on the display, detect an input by a first contact on the touch-sensitive surface, the first contact having a characteristic intensity above a first intensity threshold 2106 When the input is detected, the electronic device is in a locked mode in which access to a plurality of different operations that are accessible when the device is in an unlocked state is prevented 2108 In response to detecting the input by the first contact:
in accordance with a determination that, during the input, a focus selector is at a location in the first user interface that corresponds to the background of the user interface, dynamically change the appearance of the background of the first user interface without changing the appearance of the one or more foreground objects in the first user interface, wherein the dynamic change in the appearance of the background of the first user interface is based at least in part on the characteristic intensity of the first contact; and in accordance with a determination that a focus selector is at a location in the first user interface that corresponds to a respective foreground object of the one or more foreground objects in the first user interface, maintain the first appearance of the background of the first user interface 2110 While dynamically changing the appearance of the background of the first user interface, detect termination of the input by the first contact; and, in response to detecting termination of the input by the first contact, revert the background of the first user interface back to the first appearance of the background

Figure 21A

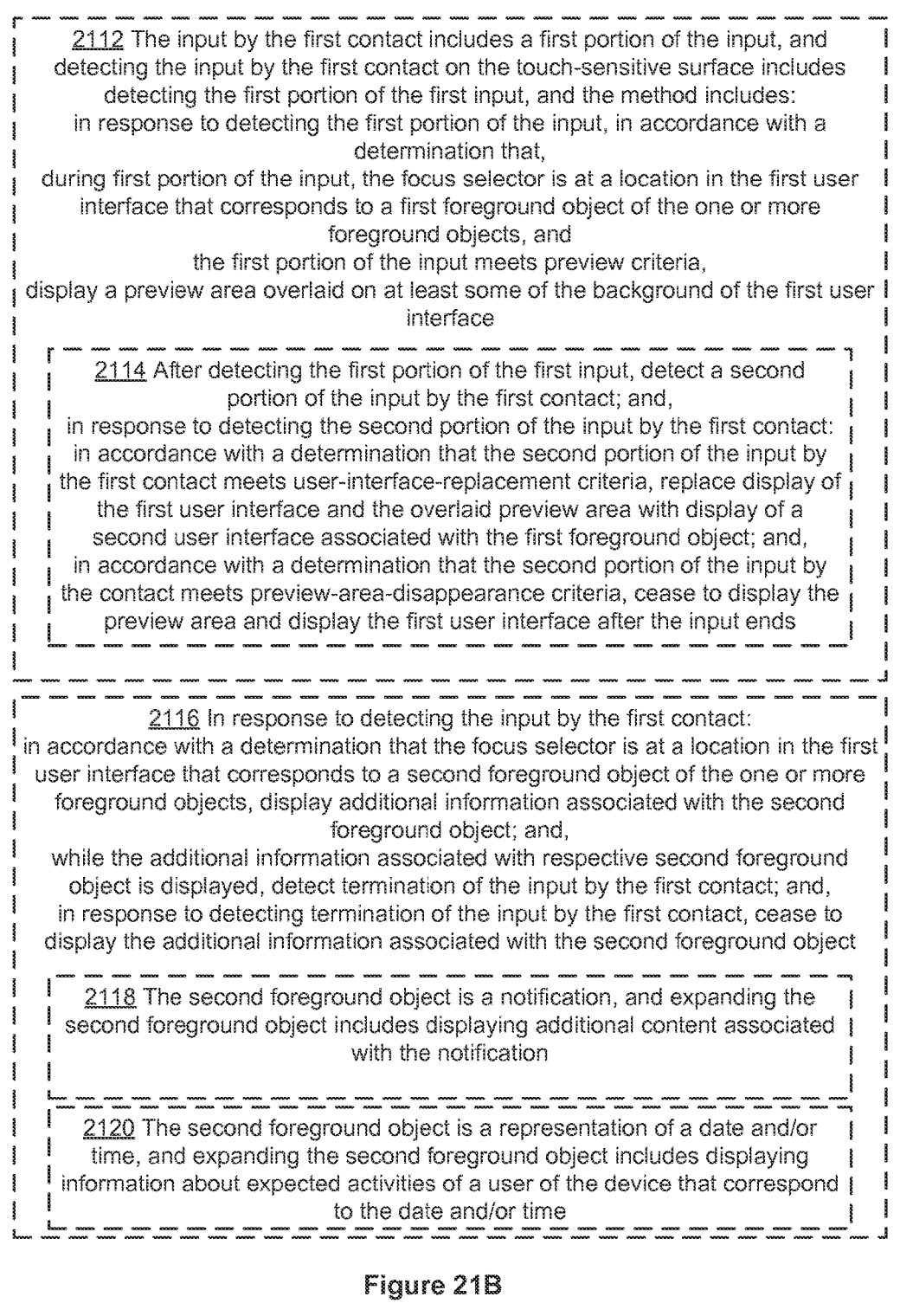

2112 The input by the first contact includes a first portion of the input, and detecting the input by the first contact on the touch-sensitive surface includes detecting the first portion of the first input, and the method includes:
in response to detecting the first portion of the input, in accordance with a determination that,
during first portion of the input, the focus selector is at a location in the first user interface that corresponds to a first foreground object of the one or more foreground objects, and
the first portion of the input meets preview criteria,
display a preview area overlaid on at least some of the background of the first user interface 2114 After detecting the first portion of the first input, detect a second portion of the input by the first contact; and,
in response to detecting the second portion of the input by the first contact:
in accordance with a determination that the second portion of the input by the first contact meets user-interface-replacement criteria, replace display of the first user interface and the overlaid preview area with display of a second user interface associated with the first foreground object; and,
in accordance with a determination that the second portion of the input by the contact meets preview-area-disappearance criteria, cease to display the preview area and display the first user interface after the input ends 2116 In response to detecting the input by the first contact:
in accordance with a determination that the focus selector is at a location in the first user interface that corresponds to a second foreground object of the one or more foreground objects, display additional information associated with the second foreground object; and,
while the additional information associated with respective second foreground object is displayed, detect termination of the input by the first contact; and,
in response to detecting termination of the input by the first contact, cease to display the additional information associated with the second foreground object 2118 The second foreground object is a notification, and expanding the second foreground object includes displaying additional content associated with the notification 2120 The second foreground object is a representation of a date and/or time, and expanding the second foreground object includes displaying information about expected activities of a user of the device that correspond to the date and/or time

Figure 21B

Figure 21C:
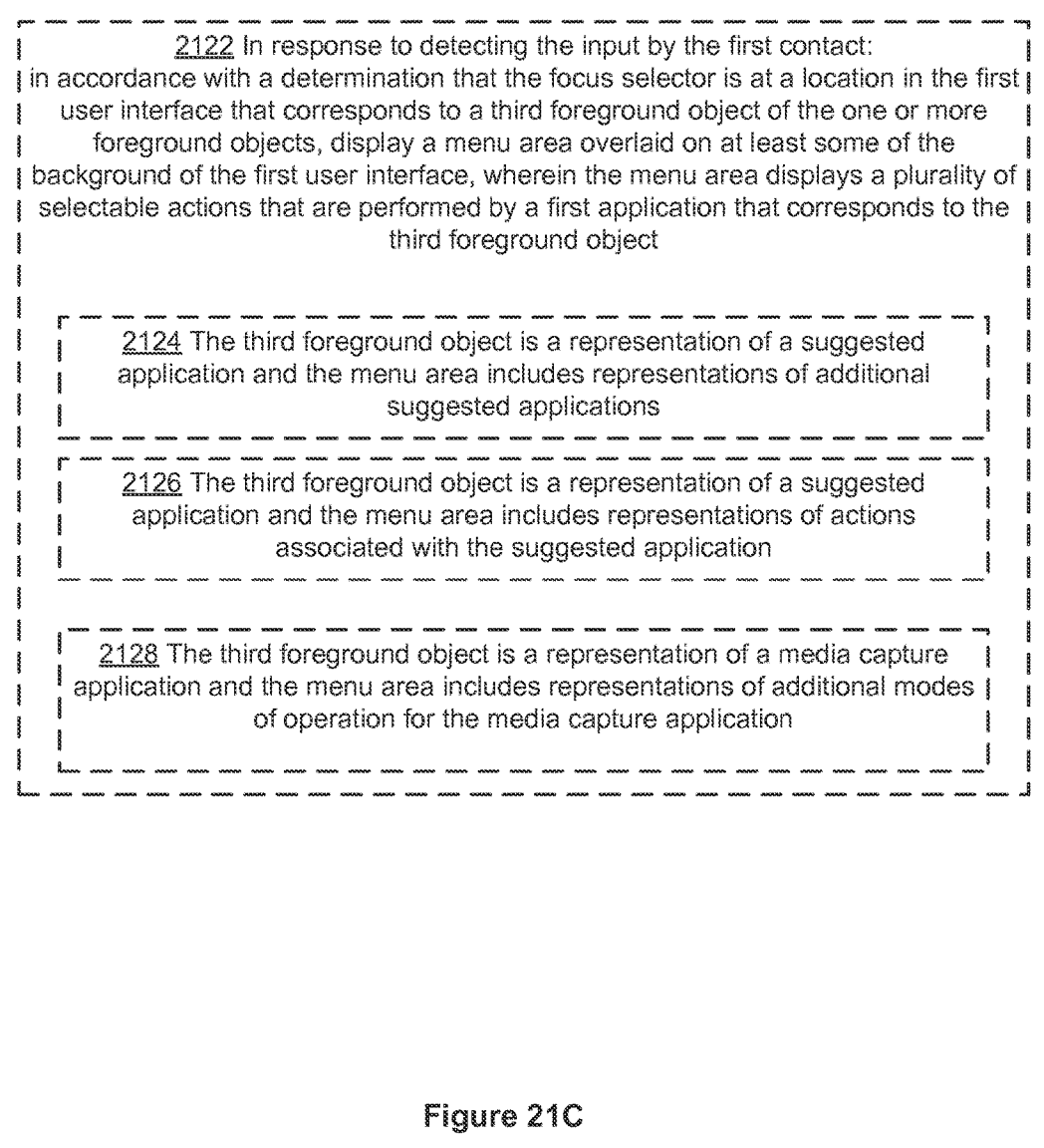

2122 In response to detecting the input by the first contact: in accordance with a determination that the focus selector is at a location in the first user interface that corresponds to a third foreground object of the one or more foreground objects, display a menu area overlaid on at least some of the background of the first user interface, wherein the menu area displays a plurality of selectable actions that are performed by a first application that corresponds to the third foreground object 2124 The third foreground object is a representation of a suggested application and the menu area includes representations of additional suggested applications 2126 The third foreground object is a representation of a suggested application and the menu area includes representations of actions associated with the suggested application 2128 The third foreground object is a representation of a media capture application and the menu area includes representations of additional modes of operation for the media capture application

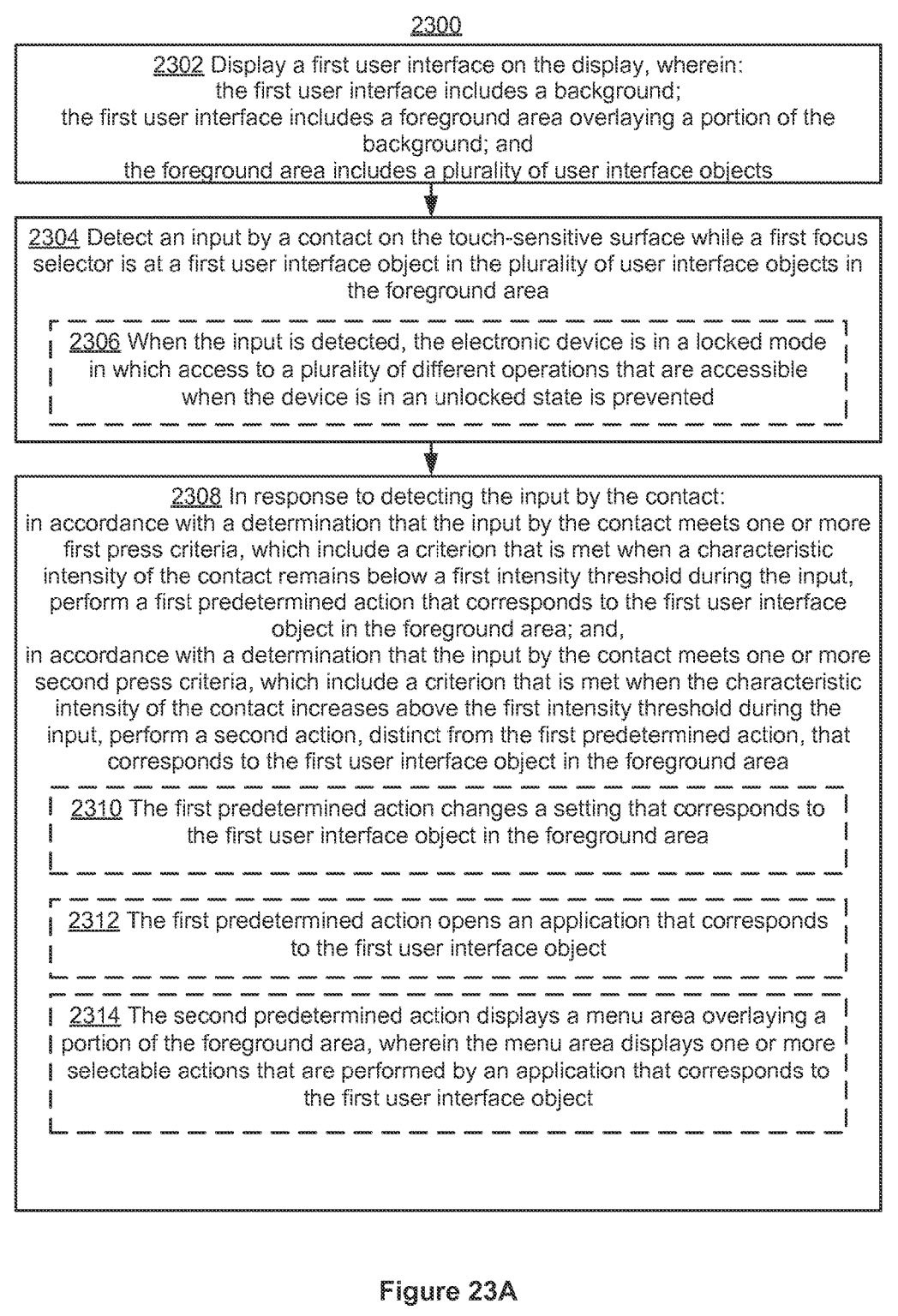

2302 Display a first user interface on the display, wherein:
the first user interface includes a background;
the first user interface includes a foreground area overlaying a portion of the background; and
the foreground area includes a plurality of user interface objects 2304 Detect an input by a contact on the touch-sensitive surface while a first focus selector is at a first user interface object in the plurality of user interface objects in the foreground area 2306 When the input is detected, the electronic device is in a locked mode in which access to a plurality of different operations that are accessible when the device is in an unlocked state is prevented 2308 In response to detecting the input by the contact:
in accordance with a determination that the input by the contact meets one or more first press criteria, which include a criterion that is met when a characteristic intensity of the contact remains below a first intensity threshold during the input, perform a first predetermined action that corresponds to the first user interface object in the foreground area; and,
in accordance with a determination that the input by the contact meets one or more second press criteria, which include a criterion that is met when the characteristic intensity of the contact increases above the first intensity threshold during the input, perform a second action, distinct from the first predetermined action, that corresponds to the first user interface object in the foreground area 2310 The first predetermined action changes a setting that corresponds to the first user interface object in the foreground area 2312 The first predetermined action opens an application that corresponds to the first user interface object 2314 The second predetermined action displays a menu area overlaying a portion of the foreground area, wherein the menu area displays one or more selectable actions that are performed by an application that corresponds to the first user interface object

Figure 23A

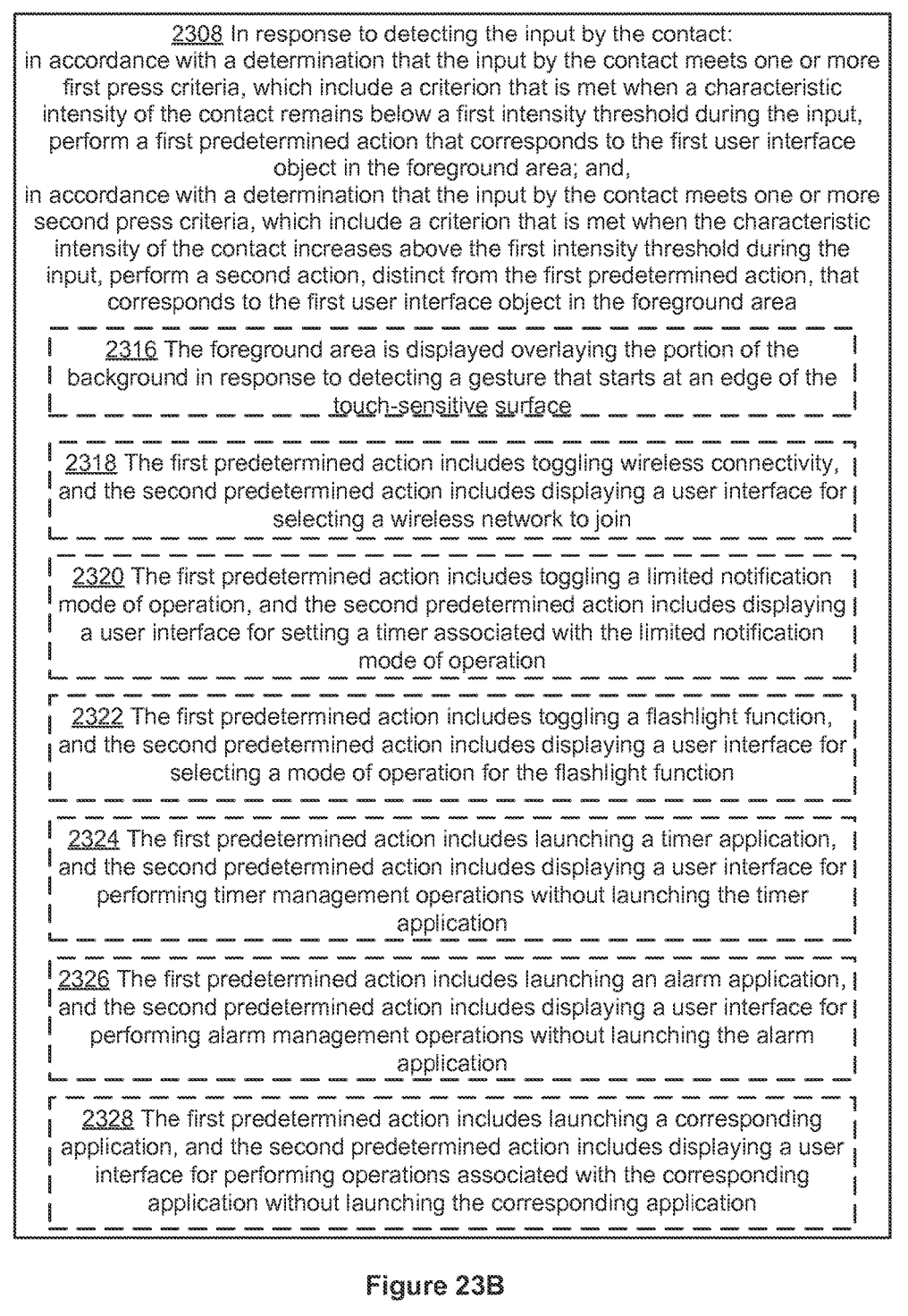

2308 In response to detecting the input by the contact:
in accordance with a determination that the input by the contact meets one or more first press criteria, which include a criterion that is met when a characteristic intensity of the contact remains below a first intensity threshold during the input, perform a first predetermined action that corresponds to the first user interface object in the foreground area; and,
in accordance with a determination that the input by the contact meets one or more second press criteria, which include a criterion that is met when the characteristic intensity of the contact increases above the first intensity threshold during the input, perform a second action, distinct from the first predetermined action, that corresponds to the first user interface object in the foreground area 2316 The foreground area is displayed overlaying the portion of the background in response to detecting a gesture that starts at an edge of the touch-sensitive surface 2318 The first predetermined action includes toggling wireless connectivity, and the second predetermined action includes displaying a user interface for selecting a wireless network to join 2320 The first predetermined action includes toggling a limited notification mode of operation, and the second predetermined action includes displaying a user interface for setting a timer associated with the limited notification mode of operation 2322 The first predetermined action includes toggling a flashlight function, and the second predetermined action includes displaying a user interface for selecting a mode of operation for the flashlight function 2324 The first predetermined action includes launching a timer application, and the second predetermined action includes displaying a user interface for performing timer management operations without launching the timer application 2326 The first predetermined action includes launching an alarm application, and the second predetermined action includes displaying a user interface for performing alarm management operations without launching the alarm application 2328 The first predetermined action includes launching a corresponding application, and the second predetermined action includes displaying a user interface for performing operations associated with the corresponding application without launching the corresponding application

Figure 23B

Figure 23C:
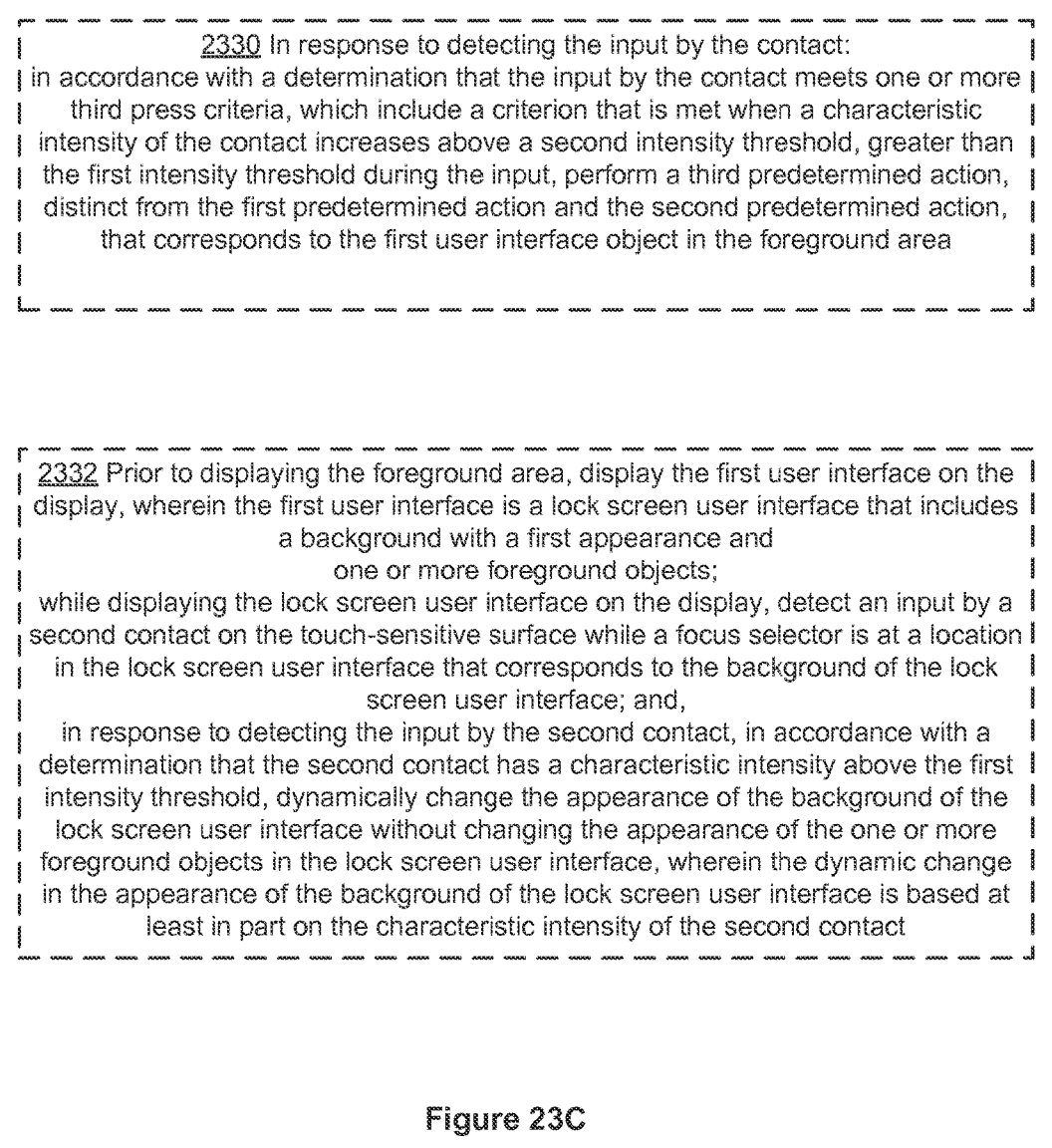

2330 In response to detecting the input by the contact:
in accordance with a determination that the input by the contact meets one or more third press criteria, which include a criterion that is met when a characteristic intensity of the contact increases above a second intensity threshold, greater than the first intensity threshold during the input, perform a third predetermined action, distinct from the first predetermined action and the second predetermined action, that corresponds to the first user interface object in the foreground area 2332 Prior to displaying the foreground area, display the first user interface on the display, wherein the first user interface is a lock screen user interface that includes a background with a first appearance and one or more foreground objects;
while displaying the lock screen user interface on the display, detect an input by a second contact on the touch-sensitive surface while a focus selector is at a location in the lock screen user interface that corresponds to the background of the lock screen user interface; and,
in response to detecting the input by the second contact, in accordance with a determination that the second contact has a characteristic intensity above the first intensity threshold, dynamically change the appearance of the background of the lock screen user interface without changing the appearance of the one or more foreground objects in the lock screen user interface, wherein the dynamic change in the appearance of the background of the lock screen user interface is based at least in part on the characteristic intensity of the second contact

Figure 25A:
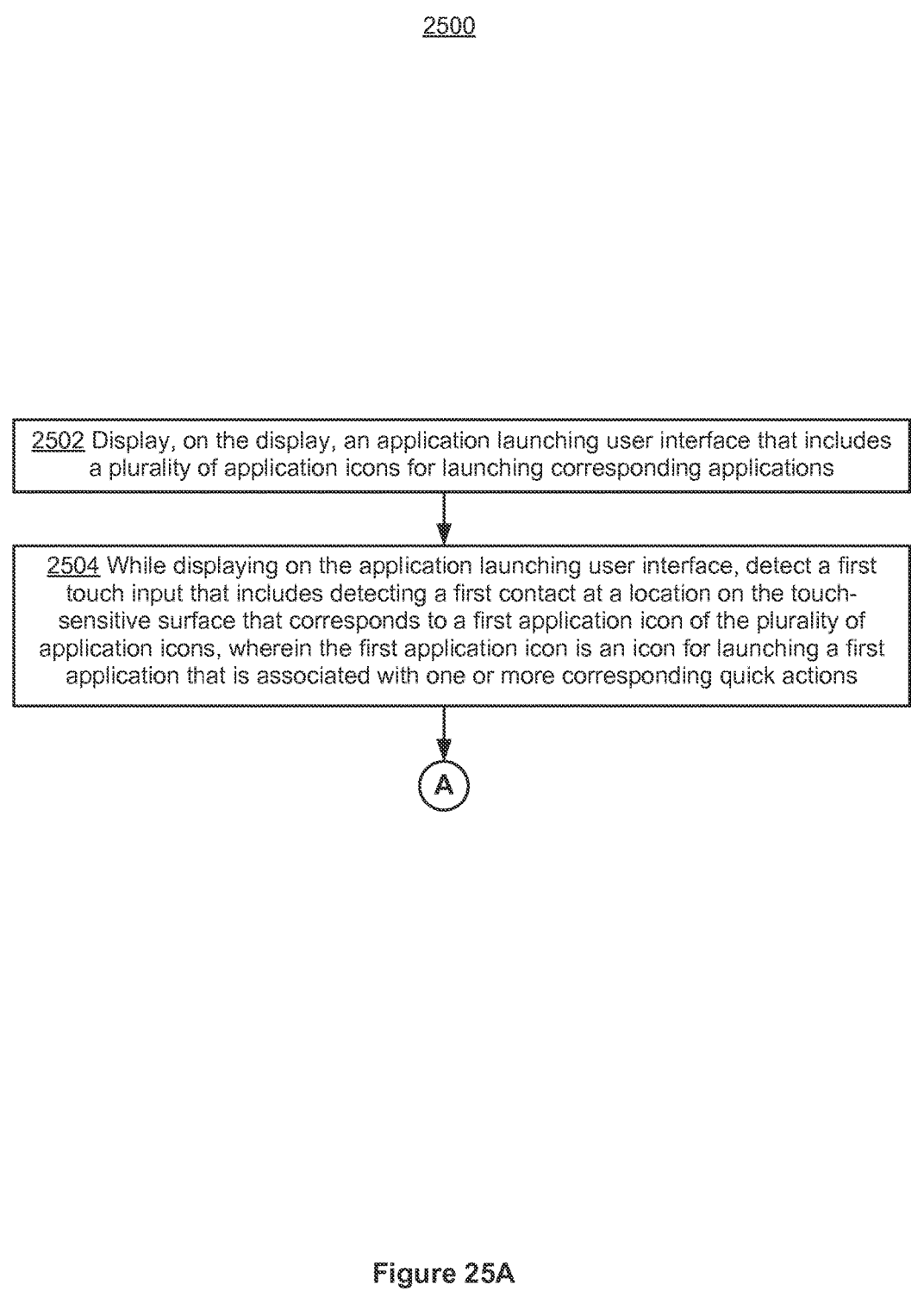

2502 Display, on the display, an application launching user interface that includes a plurality of application icons for launching corresponding applications 2504 While displaying on the application launching user interface, detect a first touch input that includes detecting a first contact at a location on the touch-sensitive surface that corresponds to a first application icon of the plurality of application icons, wherein the first application icon is an icon for launching a first application that is associated with one or more corresponding quick actions

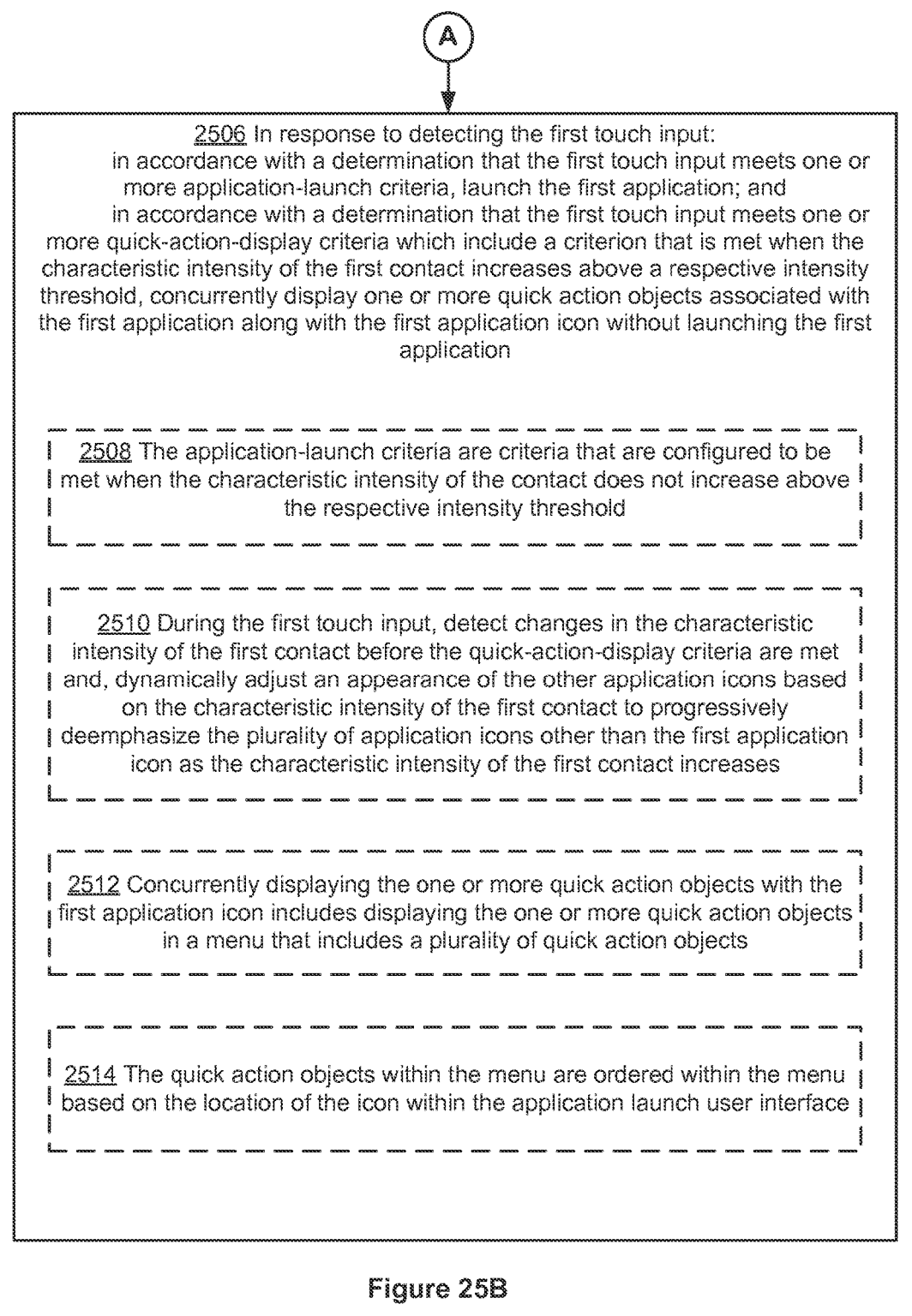

2506 In response to detecting the first touch input:
in accordance with a determination that the first touch input meets one or more application-launch criteria, launch the first application; and
in accordance with a determination that the first touch input meets one or more quick-action-display criteria which include a criterion that is met when the characteristic intensity of the first contact increases above a respective intensity threshold, concurrently display one or more quick action objects associated with the first application along with the first application icon without launching the first application 2508 The application-launch criteria are criteria that are configured to be met when the characteristic intensity of the contact does not increase above the respective intensity threshold 2510 During the first touch input, detect changes in the characteristic intensity of the first contact before the quick-action-display criteria are met and, dynamically adjust an appearance of the other application icons based on the characteristic intensity of the first contact to progressively deemphasize the plurality of application icons other than the first application icon as the characteristic intensity of the first contact increases 2512 Concurrently displaying the one or more quick action objects with the first application icon includes displaying the one or more quick action objects in a menu that includes a plurality of quick action objects 2514 The quick action objects within the menu are ordered within the menu based on the location of the icon within the application launch user interface

Figure 25B

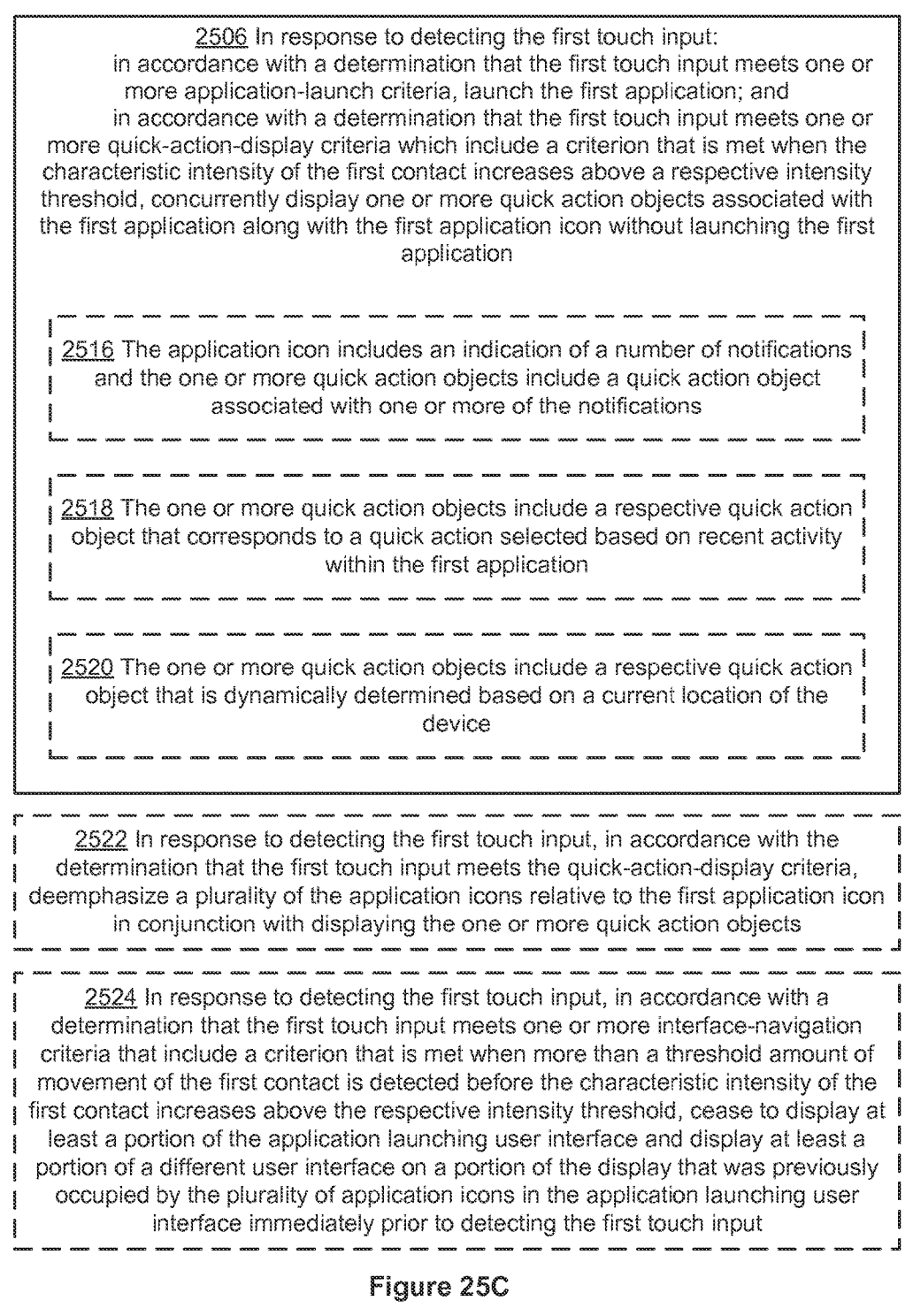

2506 In response to detecting the first touch input:
in accordance with a determination that the first touch input meets one or more application-launch criteria, launch the first application; and
in accordance with a determination that the first touch input meets one or more quick-action-display criteria which include a criterion that is met when the characteristic intensity of the first contact increases above a respective intensity threshold, concurrently display one or more quick action objects associated with the first application along with the first application icon without launching the first application 2516 The application icon includes an indication of a number of notifications and the one or more quick action objects include a quick action object associated with one or more of the notifications 2518 The one or more quick action objects include a respective quick action object that corresponds to a quick action selected based on recent activity within the first application 2520 The one or more quick action objects include a respective quick action object that is dynamically determined based on a current location of the device 2522 In response to detecting the first touch input, in accordance with the determination that the first touch input meets the quick-action-display criteria, deemphasize a plurality of the application icons relative to the first application icon in conjunction with displaying the one or more quick action objects 2524 In response to detecting the first touch input, in accordance with a determination that the first touch input meets one or more interface-navigation criteria that include a criterion that is met when more than a threshold amount of movement of the first contact is detected before the characteristic intensity of the first contact increases above the respective intensity threshold, cease to display at least a portion of the application launching user interface and display at least a portion of a different user interface on a portion of the display that was previously occupied by the plurality of application icons in the application launching user interface immediately prior to detecting the first touch input

Figure 25C

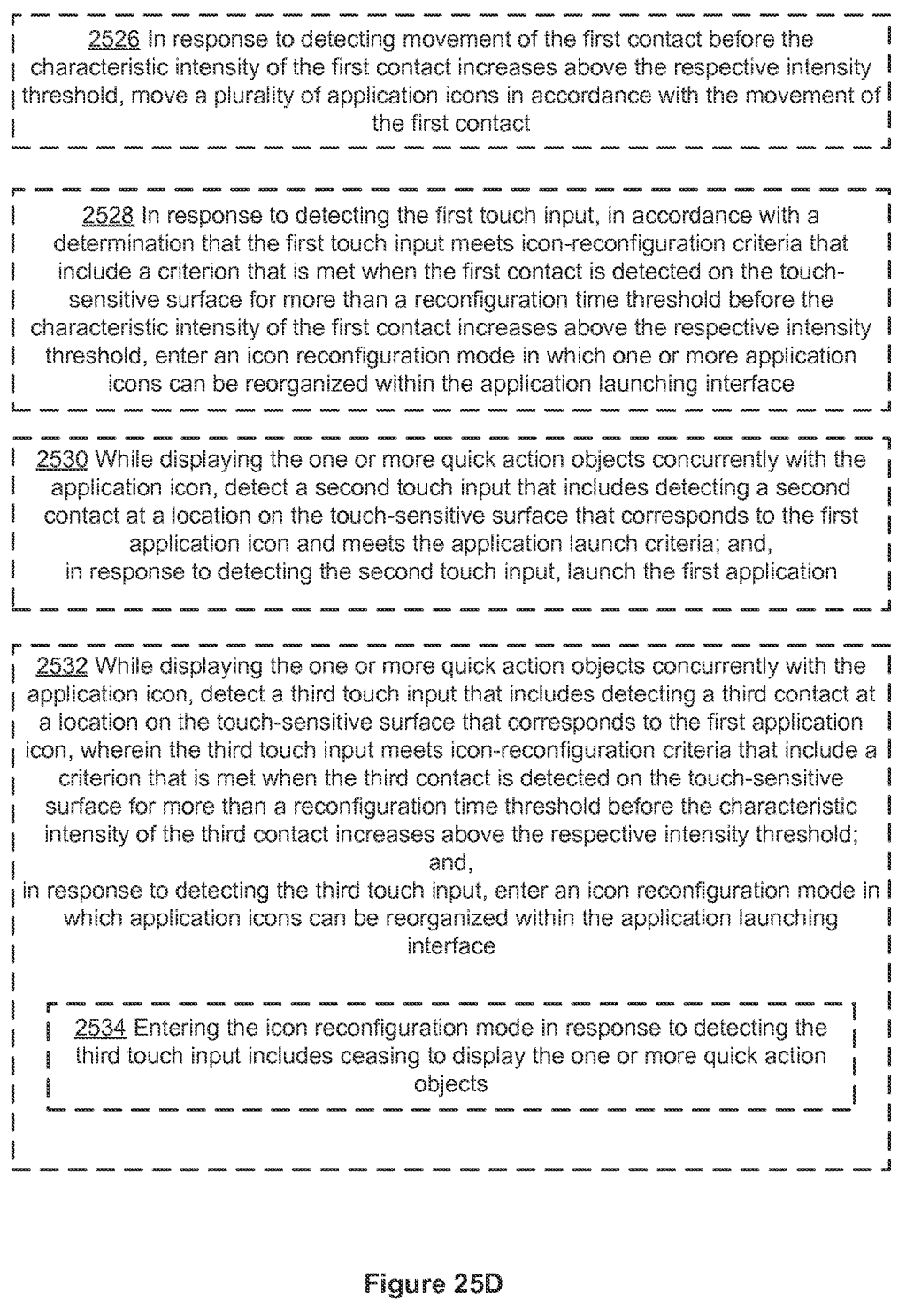

2526 In response to detecting movement of the first contact before the characteristic intensity of the first contact increases above the respective intensity threshold, move a plurality of application icons in accordance with the movement of the first contact 2528 In response to detecting the first touch input, in accordance with a determination that the first touch input meets icon-reconfiguration criteria that include a criterion that is met when the first contact is detected on the touch-sensitive surface for more than a reconfiguration time threshold before the characteristic intensity of the first contact increases above the respective intensity threshold, enter an icon reconfiguration mode in which one or more application icons can be reorganized within the application launching interface 2530 While displaying the one or more quick action objects concurrently with the application icon, detect a second touch input that includes detecting a second contact at a location on the touch-sensitive surface that corresponds to the first application icon and meets the application launch criteria; and,
in response to detecting the second touch input, launch the first application 2532 While displaying the one or more quick action objects concurrently with the application icon, detect a third touch input that includes detecting a third contact at a location on the touch-sensitive surface that corresponds to the first application icon, wherein the third touch input meets icon-reconfiguration criteria that include a criterion that is met when the third contact is detected on the touch-sensitive surface for more than a reconfiguration time threshold before the characteristic intensity of the third contact increases above the respective intensity threshold; and,
in response to detecting the third touch input, enter an icon reconfiguration mode in which application icons can be reorganized within the application launching interface 2534 Entering the icon reconfiguration mode in response to detecting the third touch input includes ceasing to display the one or more quick action objects

Figure 25D

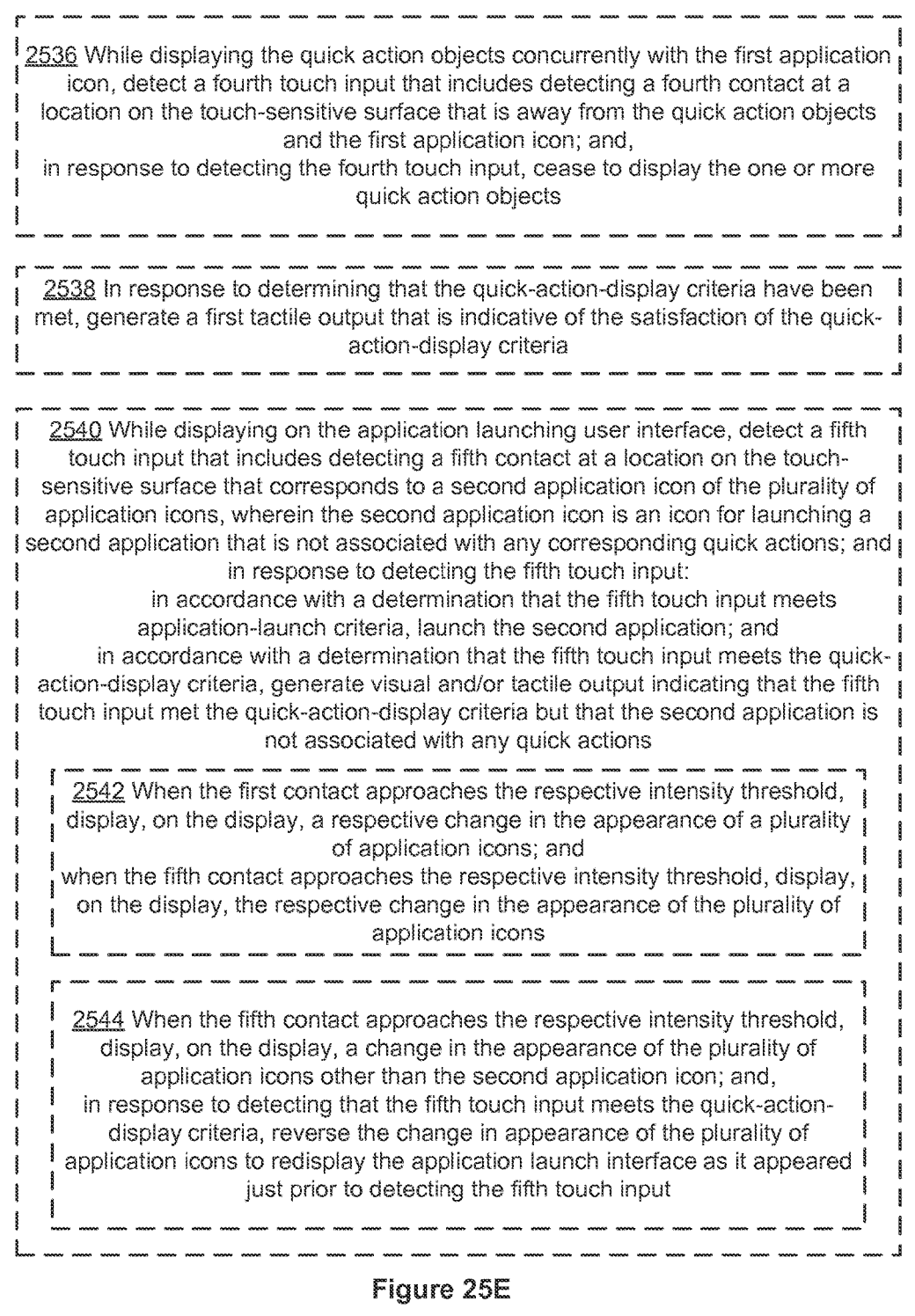

2536 While displaying the quick action objects concurrently with the first application icon, detect a fourth touch input that includes detecting a fourth contact at a location on the touch-sensitive surface that is away from the quick action objects and the first application icon; and,
in response to detecting the fourth touch input, cease to display the one or more quick action objects 2538 In response to determining that the quick-action-display criteria have been met, generate a first tactile output that is indicative of the satisfaction of the quick-action-display criteria 2540 While displaying on the application launching user interface, detect a fifth touch input that includes detecting a fifth contact at a location on the touch-sensitive surface that corresponds to a second application icon of the plurality of application icons, wherein the second application icon is an icon for launching a second application that is not associated with any corresponding quick actions; and
in response to detecting the fifth touch input:
in accordance with a determination that the fifth touch input meets application-launch criteria, launch the second application; and
in accordance with a determination that the fifth touch input meets the quick-action-display criteria, generate visual and/or tactile output indicating that the fifth touch input met the quick-action-display criteria but that the second application is not associated with any quick actions 2542 When the first contact approaches the respective intensity threshold, display, on the display, a respective change in the appearance of a plurality of application icons; and
when the fifth contact approaches the respective intensity threshold, display, on the display, the respective change in the appearance of the plurality of application icons 2544 When the fifth contact approaches the respective intensity threshold, display, on the display, a change in the appearance of the plurality of application icons other than the second application icon; and,
in response to detecting that the fifth touch input meets the quick-action-display criteria, reverse the change in appearance of the plurality of application icons to redisplay the application launch interface as it appeared just prior to detecting the fifth touch input

Figure 25E

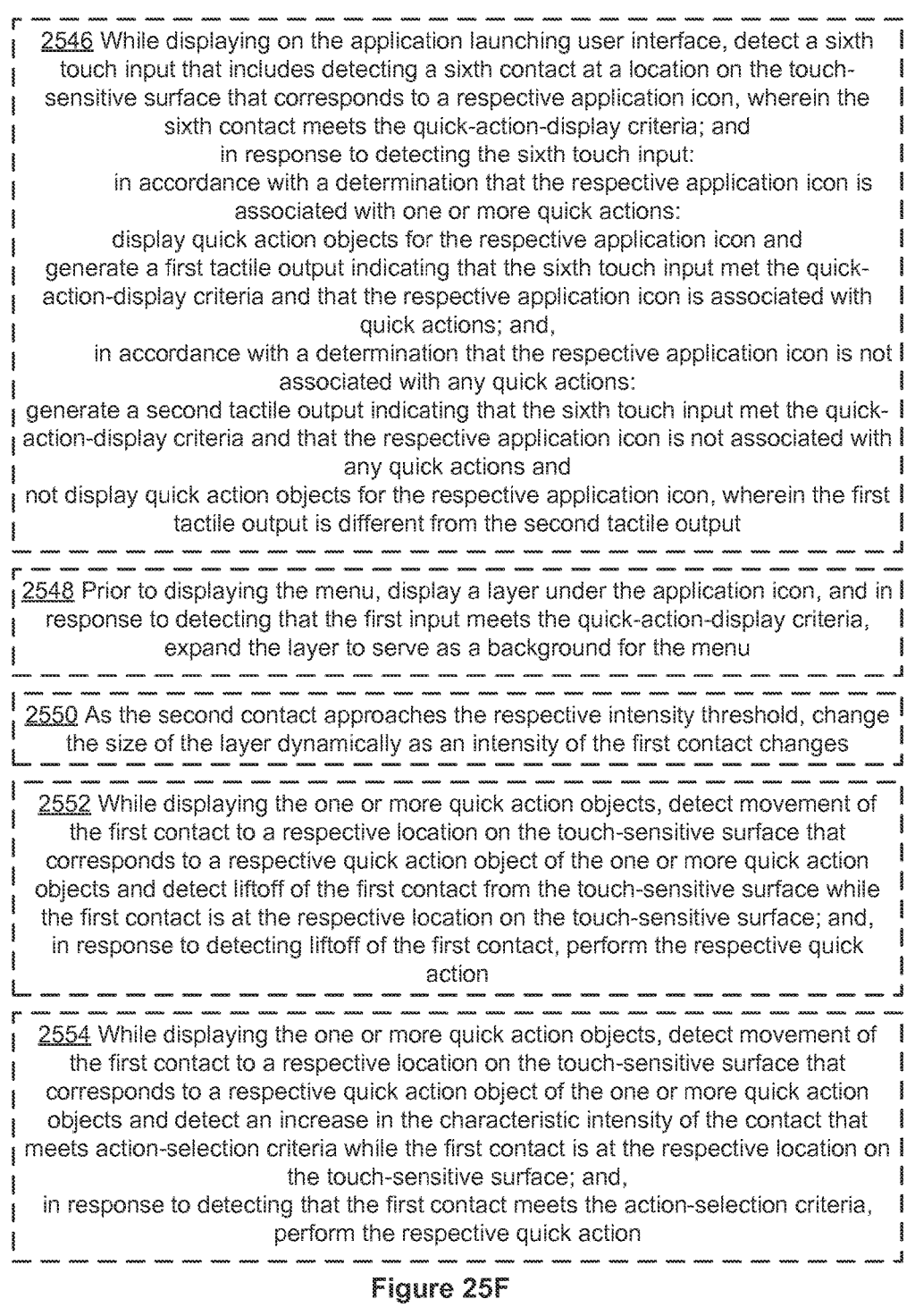

2546 While displaying on the application launching user interface, detect a sixth touch input that includes detecting a sixth contact at a location on the touch-sensitive surface that corresponds to a respective application icon, wherein the sixth contact meets the quick-action-display criteria; and
in response to detecting the sixth touch input:
in accordance with a determination that the respective application icon is associated with one or more quick actions:
display quick action objects for the respective application icon and
generate a first tactile output indicating that the sixth touch input met the quick-action-display criteria and that the respective application icon is associated with quick actions; and,
in accordance with a determination that the respective application icon is not associated with any quick actions:
generate a second tactile output indicating that the sixth touch input met the quick-action-display criteria and that the respective application icon is not associated with any quick actions and
not display quick action objects for the respective application icon, wherein the first tactile output is different from the second tactile output 2548 Prior to displaying the menu, display a layer under the application icon, and in response to detecting that the first input meets the quick-action-display criteria, expand the layer to serve as a background for the menu 2550 As the second contact approaches the respective intensity threshold, change the size of the layer dynamically as an intensity of the first contact changes 2552 While displaying the one or more quick action objects, detect movement of the first contact to a respective location on the touch-sensitive surface that corresponds to a respective quick action object of the one or more quick action objects and detect liftoff of the first contact from the touch-sensitive surface while the first contact is at the respective location on the touch-sensitive surface; and,
in response to detecting liftoff of the first contact, perform the respective quick action 2554 While displaying the one or more quick action objects, detect movement of the first contact to a respective location on the touch-sensitive surface that corresponds to a respective quick action object of the one or more quick action objects and detect an increase in the characteristic intensity of the contact that meets action-selection criteria while the first contact is at the respective location on the touch-sensitive surface; and,
in response to detecting that the first contact meets the action-selection criteria, perform the respective quick action

Figure 25F

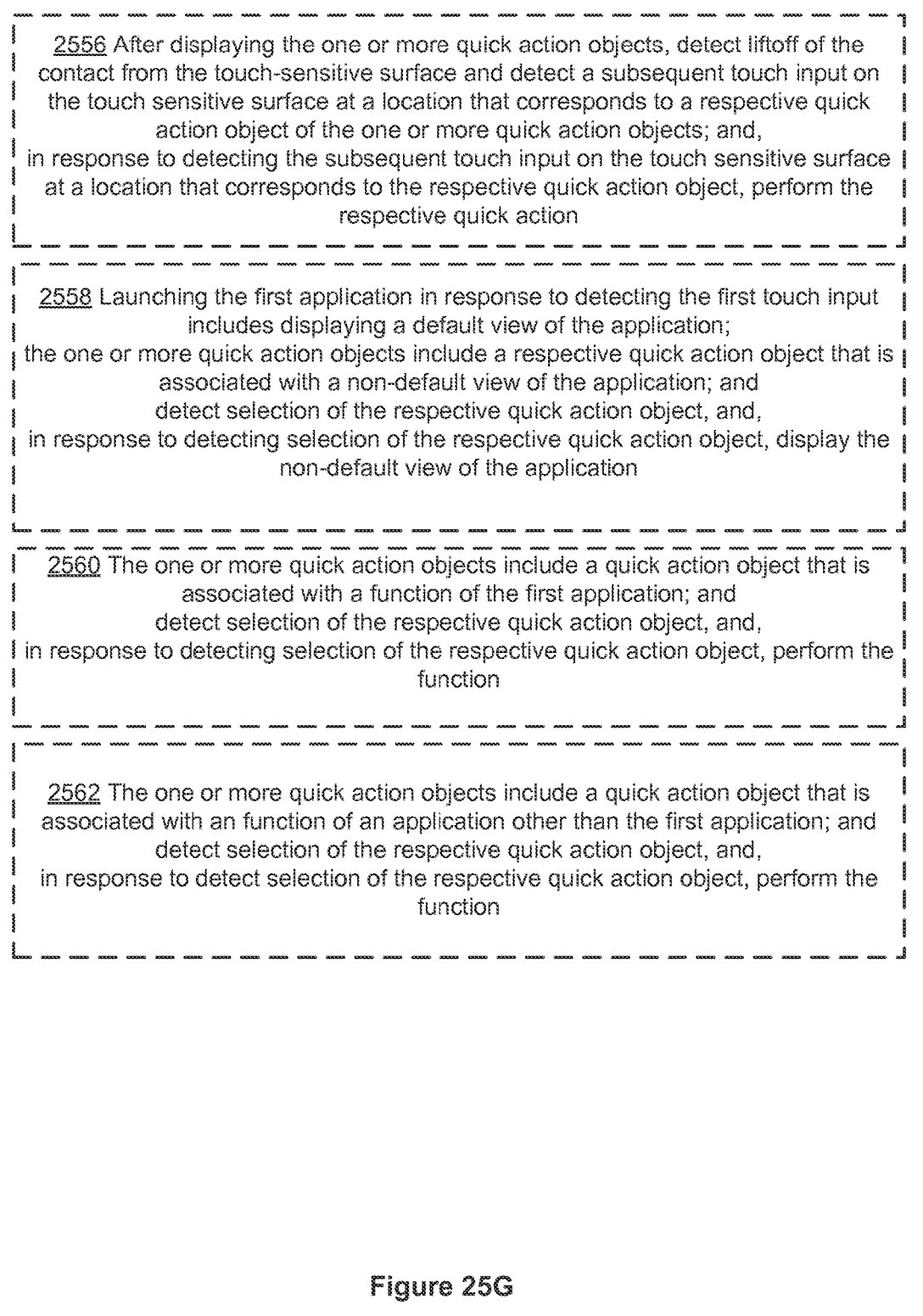

2556 After displaying the one or more quick action objects, detect liftoff of the contact from the touch-sensitive surface and detect a subsequent touch input on the touch sensitive surface at a location that corresponds to a respective quick action object of the one or more quick action objects; and,
in response to detecting the subsequent touch input on the touch sensitive surface at a location that corresponds to the respective quick action object, perform the respective quick action 2558 Launching the first application in response to detecting the first touch input includes displaying a default view of the application;
the one or more quick action objects include a respective quick action object that is associated with a non-default view of the application; and
detect selection of the respective quick action object, and,
in response to detecting selection of the respective quick action object, display the non-default view of the application 2560 The one or more quick action objects include a quick action object that is associated with a function of the first application; and
detect selection of the respective quick action object, and,
in response to detecting selection of the respective quick action object, perform the function 2562 The one or more quick action objects include a quick action object that is associated with an function of an application other than the first application; and
detect selection of the respective quick action object, and,
in response to detect selection of the respective quick action object, perform the function

Figure 25G

Figure 25H:
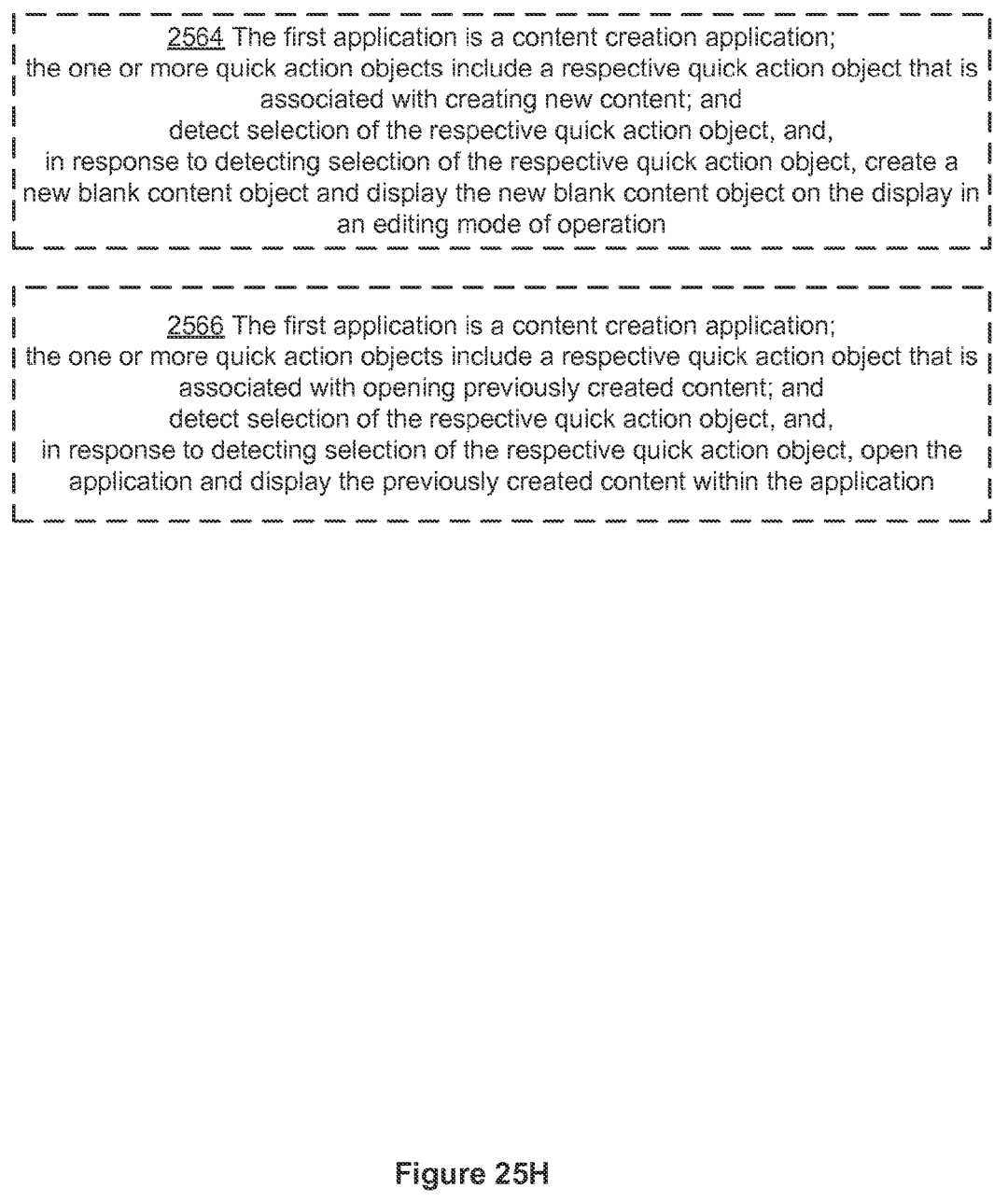

2564 The first application is a content creation application;
the one or more quick action objects include a respective quick action object that is associated with creating new content; and
detect selection of the respective quick action object, and,
in response to detecting selection of the respective quick action object, create a new blank content object and display the new blank content object on the display in an editing mode of operation 2566 The first application is a content creation application;
the one or more quick action objects include a respective quick action object that is associated with opening previously created content; and
detect selection of the respective quick action object, and,
in response to detecting selection of the respective quick action object, open the application and display the previously created content within the application

Figure 27A:
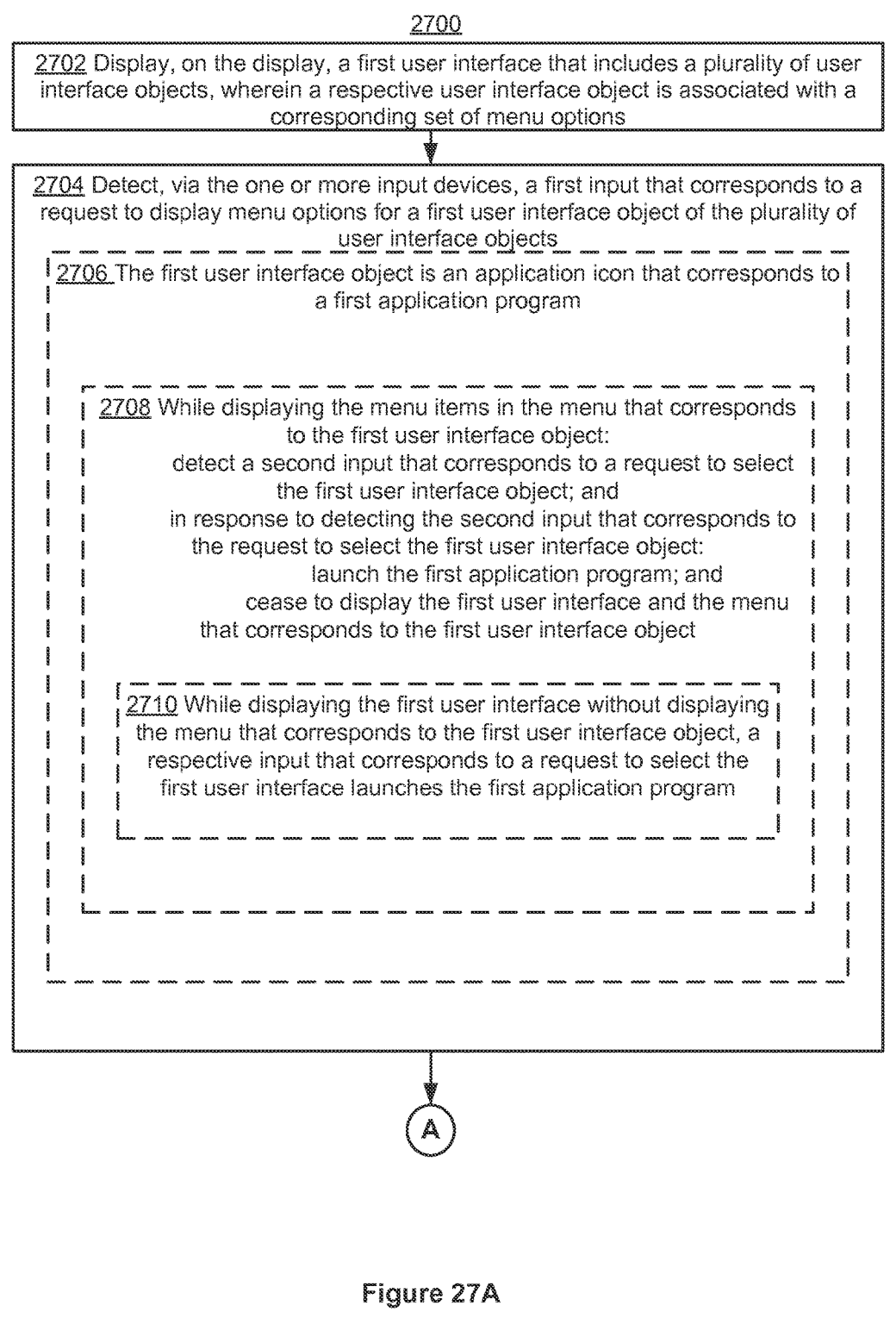

2702 Display, on the display, a first user interface that includes a plurality of user interface objects, wherein a respective user interface object is associated with a corresponding set of menu options 2704 Detect, via the one or more input devices, a first input that corresponds to a request to display menu options for a first user interface object of the plurality of user interface objects 2706 The first user interface object is an application icon that corresponds to a first application program 2708 While displaying the menu items in the menu that corresponds to the first user interface object:
detect a second input that corresponds to a request to select the first user interface object; and
in response to detecting the second input that corresponds to the request to select the first user interface object:
launch the first application program; and
cease to display the first user interface and the menu that corresponds to the first user interface object 2710 While displaying the first user interface without displaying the menu that corresponds to the first user interface object, a respective input that corresponds to a request to select the first user interface launches the first application program

Figure 27B:
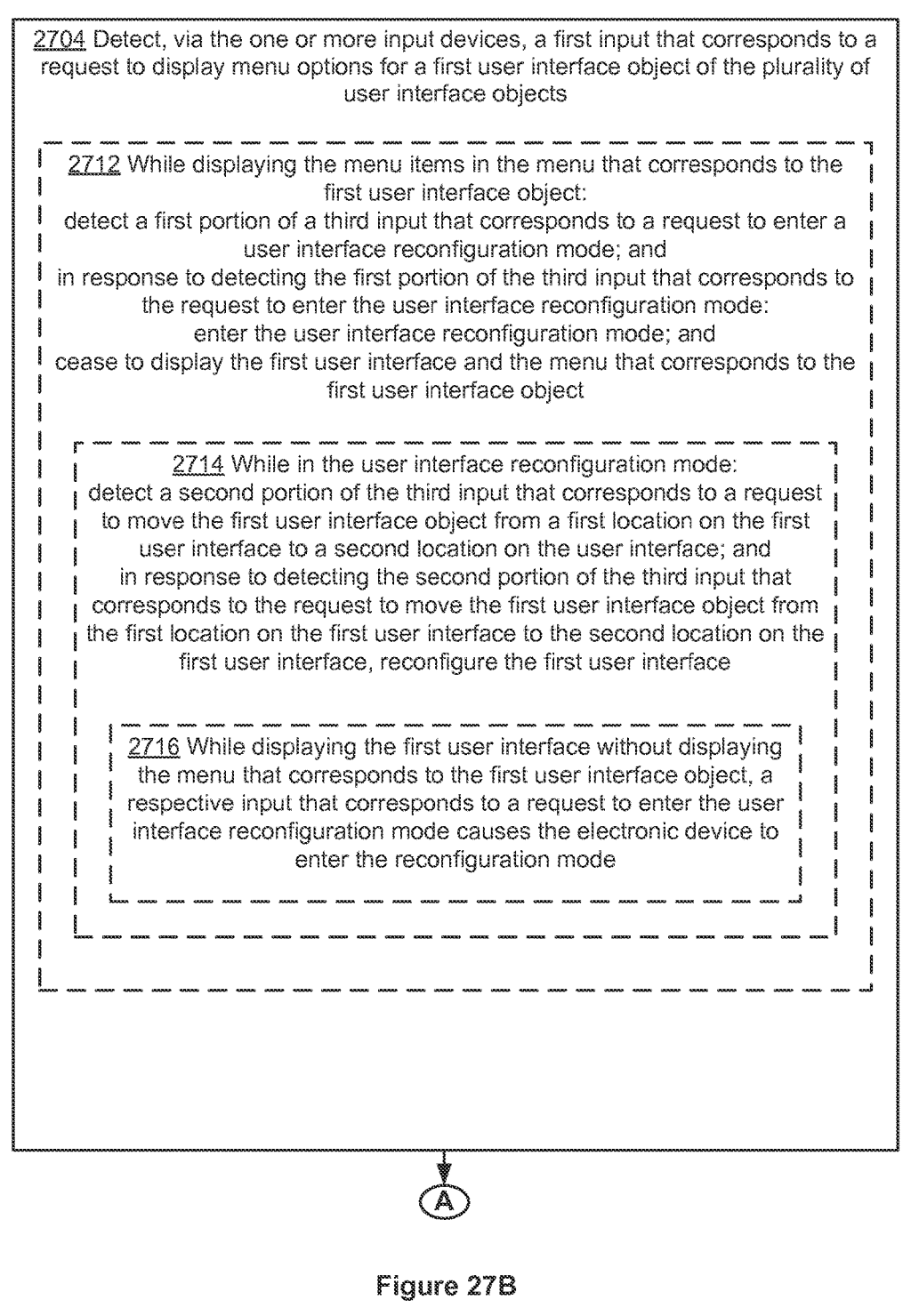

2704 Detect, via the one or more input devices, a first input that corresponds to a request to display menu options for a first user interface object of the plurality of user interface objects 2712 While displaying the menu items in the menu that corresponds to the first user interface object:
detect a first portion of a third input that corresponds to a request to enter a user interface reconfiguration mode; and
in response to detecting the first portion of the third input that corresponds to the request to enter the user interface reconfiguration mode:
enter the user interface reconfiguration mode; and
cease to display the first user interface and the menu that corresponds to the first user interface object 2714 While in the user interface reconfiguration mode:
detect a second portion of the third input that corresponds to a request to move the first user interface object from a first location on the first user interface to a second location on the user interface; and
in response to detecting the second portion of the third input that corresponds to the request to move the first user interface object from the first location on the first user interface to the second location on the first user interface, reconfigure the first user interface 2716 While displaying the first user interface without displaying the menu that corresponds to the first user interface object, a respective input that corresponds to a request to enter the user interface reconfiguration mode causes the electronic device to enter the reconfiguration mode

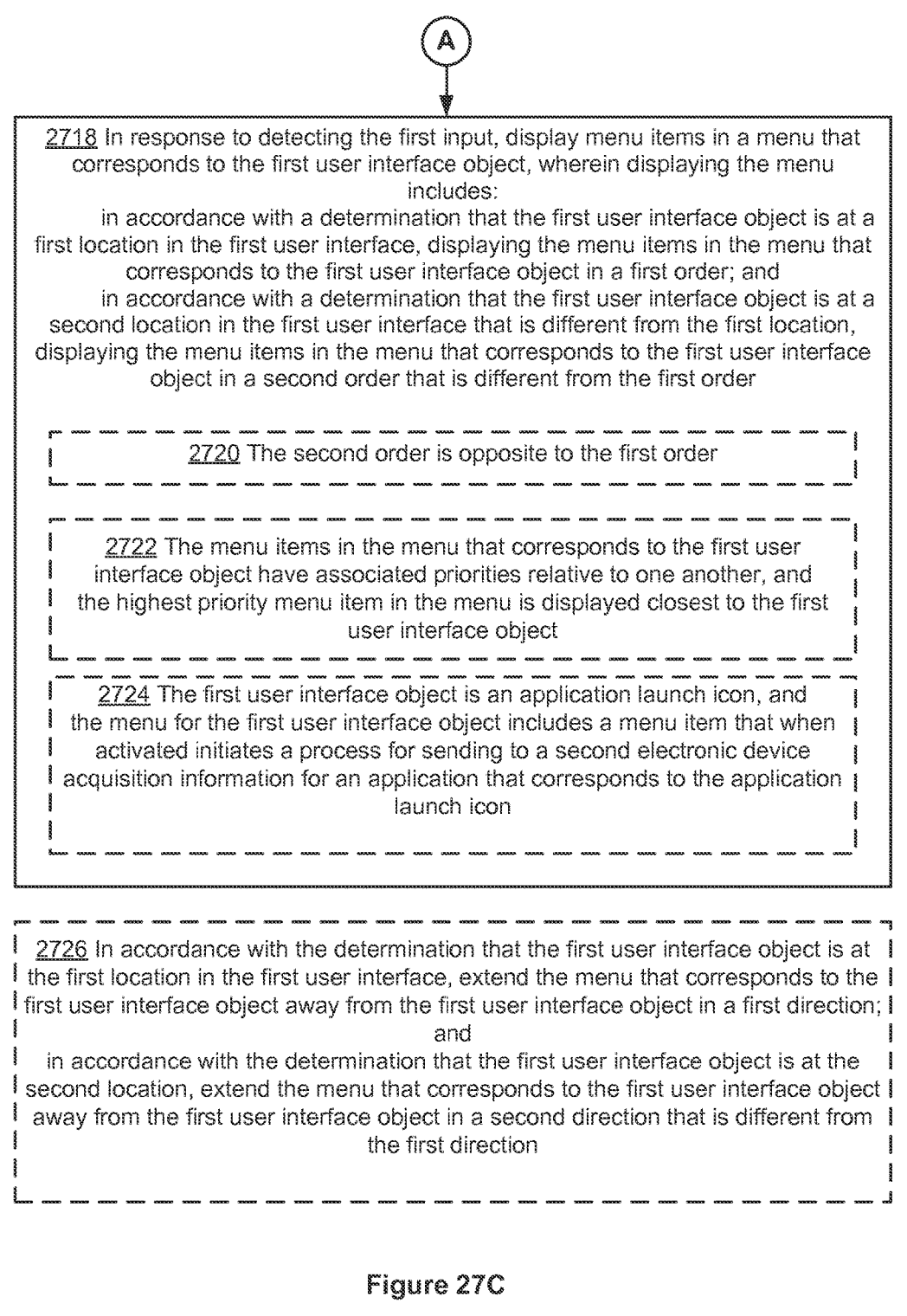

2718 In response to detecting the first input, display menu items in a menu that corresponds to the first user interface object, wherein displaying the menu includes:

in accordance with a determination that the first user interface object is at a first location in the first user interface, displaying the menu items in the menu that corresponds to the first user interface object in a first order; and in accordance with a determination that the first user interface object is at a second location in the first user interface that is different from the first location, displaying the menu items in the menu that corresponds to the first user interface object in a second order that is different from the first order 2720 The second order is opposite to the first order 2722 The menu items in the menu that corresponds to the first user interface object have associated priorities relative to one another, and the highest priority menu item in the menu is displayed closest to the first user interface object 2724 The first user interface object is an application launch icon, and the menu for the first user interface object includes a menu item that when activated initiates a process for sending to a second electronic device acquisition information for an application that corresponds to the application launch icon 2726 In accordance with the determination that the first user interface object is at the first location in the first user interface, extend the menu that corresponds to the first user interface object away from the first user interface object in a first direction; and in accordance with the determination that the first user interface object is at the second location, extend the menu that corresponds to the first user interface object away from the first user interface object in a second direction that is different from the first direction

Figure 27C

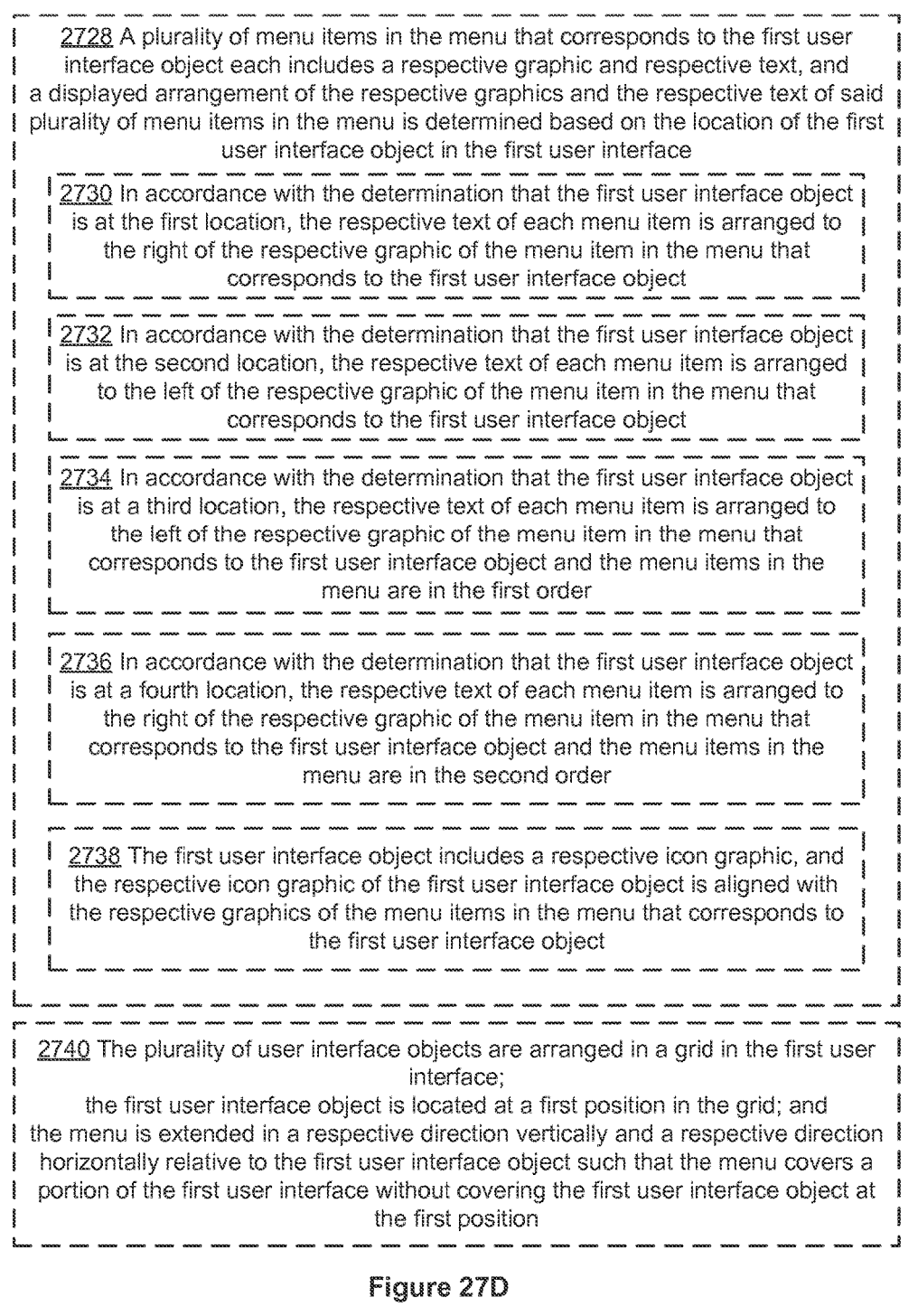

2728 A plurality of menu items in the menu that corresponds to the first user interface object each includes a respective graphic and respective text, and a displayed arrangement of the respective graphics and the respective text of said plurality of menu items in the menu is determined based on the location of the first user interface object in the first user interface 2730 In accordance with the determination that the first user interface object is at the first location, the respective text of each menu item is arranged to the right of the respective graphic of the menu item in the menu that corresponds to the first user interface object 2732 In accordance with the determination that the first user interface object is at the second location, the respective text of each menu item is arranged to the left of the respective graphic of the menu item in the menu that corresponds to the first user interface object 2734 In accordance with the determination that the first user interface object is at a third location, the respective text of each menu item is arranged to the left of the respective graphic of the menu item in the menu that corresponds to the first user interface object and the menu items in the menu are in the first order 2736 In accordance with the determination that the first user interface object is at a fourth location, the respective text of each menu item is arranged to the right of the respective graphic of the menu item in the menu that corresponds to the first user interface object and the menu items in the menu are in the second order 2738 The first user interface object includes a respective icon graphic, and the respective icon graphic of the first user interface object is aligned with the respective graphics of the menu items in the menu that corresponds to the first user interface object 2740 The plurality of user interface objects are arranged in a grid in the first user interface;
the first user interface object is located at a first position in the grid; and
the menu is extended in a respective direction vertically and a respective direction horizontally relative to the first user interface object such that the menu covers a portion of the first user interface without covering the first user interface object at the first position

Figure 27D

Figure 27E:
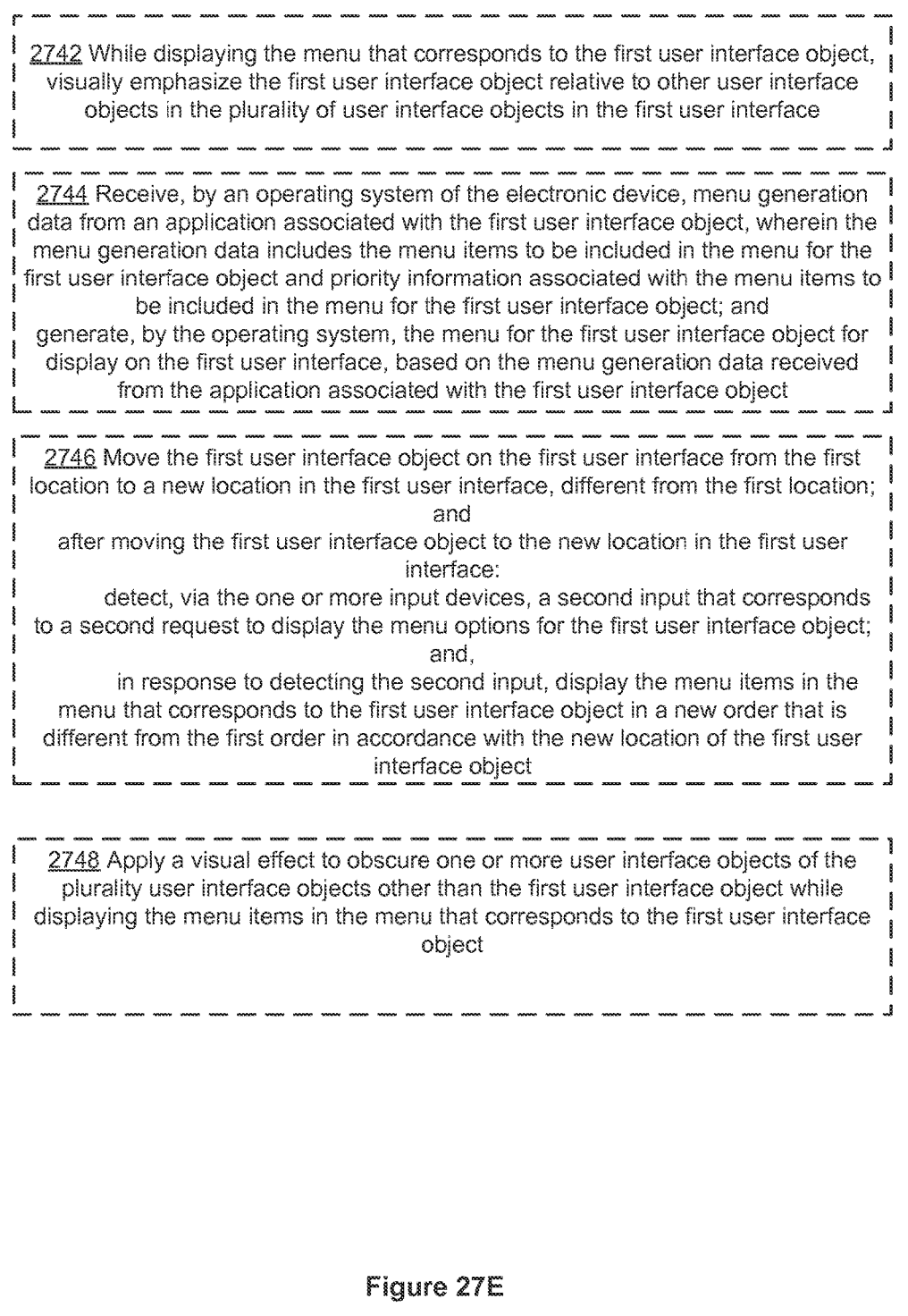

2742 While displaying the menu that corresponds to the first user interface object, visually emphasize the first user interface object relative to other user interface objects in the plurality of user interface objects in the first user interface 2744 Receive, by an operating system of the electronic device, menu generation data from an application associated with the first user interface object, wherein the menu generation data includes the menu items to be included in the menu for the first user interface object and priority information associated with the menu items to be included in the menu for the first user interface object; and
generate, by the operating system, the menu for the first user interface object for display on the first user interface, based on the menu generation data received from the application associated with the first user interface object 2746 Move the first user interface object on the first user interface from the first location to a new location in the first user interface, different from the first location; and
after moving the first user interface object to the new location in the first user interface:
detect, via the one or more input devices, a second input that corresponds to a second request to display the menu options for the first user interface object; and,
in response to detecting the second input, display the menu items in the menu that corresponds to the first user interface object in a new order that is different from the first order in accordance with the new location of the first user interface object 2748 Apply a visual effect to obscure one or more user interface objects of the plurality user interface objects other than the first user interface object while displaying the menu items in the menu that corresponds to the first user interface object

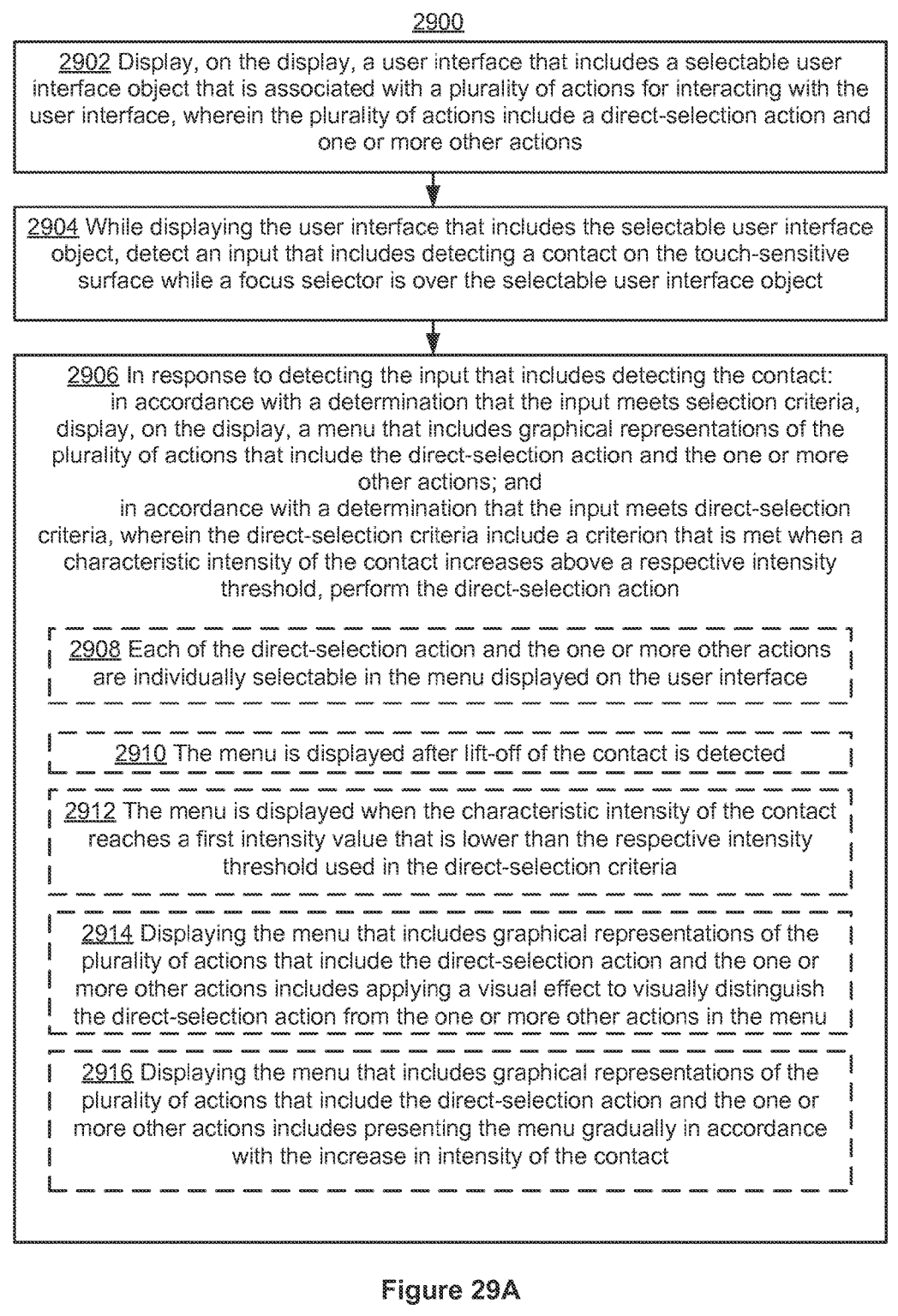

2902 Display, on the display, a user interface that includes a selectable user interface object that is associated with a plurality of actions for interacting with the user interface, wherein the plurality of actions include a direct-selection action and one or more other actions

↓

2904 While displaying the user interface that includes the selectable user interface object, detect an input that includes detecting a contact on the touch-sensitive surface while a focus selector is over the selectable user interface object

↓

2906 In response to detecting the input that includes detecting the contact:

in accordance with a determination that the input meets selection criteria, display, on the display, a menu that includes graphical representations of the plurality of actions that include the direct-selection action and the one or more other actions; and in accordance with a determination that the input meets direct-selection criteria, wherein the direct-selection criteria include a criterion that is met when a characteristic intensity of the contact increases above a respective intensity threshold, perform the direct-selection action 2908 Each of the direct-selection action and the one or more other actions are individually selectable in the menu displayed on the user interface 2910 The menu is displayed after lift-off of the contact is detected 2912 The menu is displayed when the characteristic intensity of the contact reaches a first intensity value that is lower than the respective intensity threshold used in the direct-selection criteria 2914 Displaying the menu that includes graphical representations of the plurality of actions that include the direct-selection action and the one or more other actions includes applying a visual effect to visually distinguish the direct-selection action from the one or more other actions in the menu 2916 Displaying the menu that includes graphical representations of the plurality of actions that include the direct-selection action and the one or more other actions includes presenting the menu gradually in accordance with the increase in intensity of the contact

Figure 29A

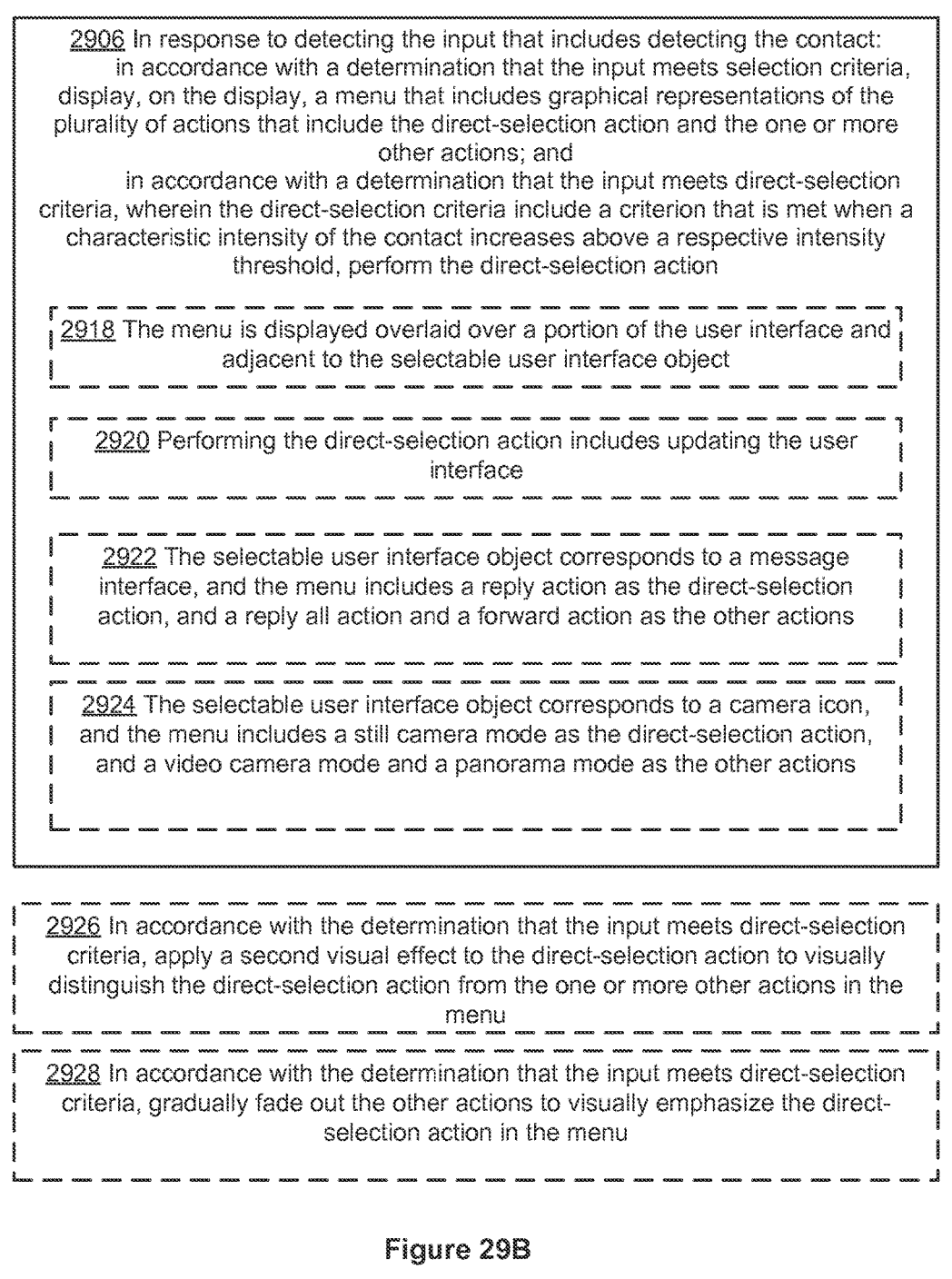

2906 In response to detecting the input that includes detecting the contact:
in accordance with a determination that the input meets selection criteria, display, on the display, a menu that includes graphical representations of the plurality of actions that include the direct-selection action and the one or more other actions; and
in accordance with a determination that the input meets direct-selection criteria, wherein the direct-selection criteria include a criterion that is met when a characteristic intensity of the contact increases above a respective intensity threshold, perform the direct-selection action 2918 The menu is displayed overlaid over a portion of the user interface and adjacent to the selectable user interface object 2920 Performing the direct-selection action includes updating the user interface 2922 The selectable user interface object corresponds to a message interface, and the menu includes a reply action as the direct-selection action, and a reply all action and a forward action as the other actions 2924 The selectable user interface object corresponds to a camera icon, and the menu includes a still camera mode as the direct-selection action, and a video camera mode and a panorama mode as the other actions 2926 In accordance with the determination that the input meets direct-selection criteria, apply a second visual effect to the direct-selection action to visually distinguish the direct-selection action from the one or more other actions in the menu 2928 In accordance with the determination that the input meets direct-selection criteria, gradually fade out the other actions to visually emphasize the direct-selection action in the menu

Figure 29B

Figure 29C:
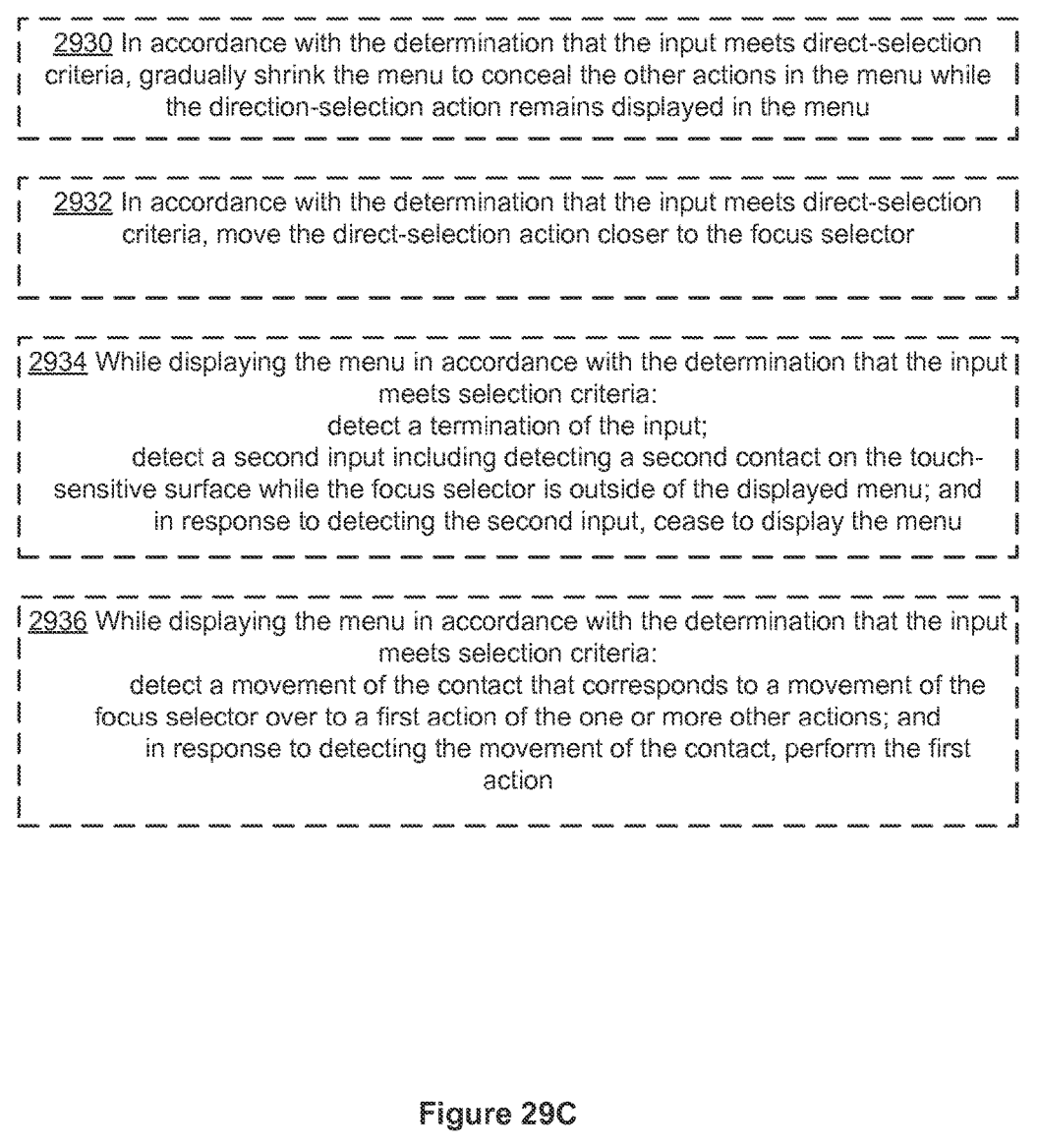

2930 In accordance with the determination that the input meets direct-selection criteria, gradually shrink the menu to conceal the other actions in the menu while the direction-selection action remains displayed in the menu 2932 In accordance with the determination that the input meets direct-selection criteria, move the direct-selection action closer to the focus selector 2934 While displaying the menu in accordance with the determination that the input meets selection criteria:
detect a termination of the input;
detect a second input including detecting a second contact on the touch-sensitive surface while the focus selector is outside of the displayed menu; and
in response to detecting the second input, cease to display the menu 2936 While displaying the menu in accordance with the determination that the input meets selection criteria:
detect a movement of the contact that corresponds to a movement of the focus selector over to a first action of the one or more other actions; and
in response to detecting the movement of the contact, perform the first action

Figure 31A
206
Portable Multifunction Device 100
Speaker 111
Optical Sensor 164
Proximity Sensor 166
400
208
208
402
9:26 PM
404
42%
406
Inbox (359)
From: Harold Godfrey
To: David Hilbert
Godfrey's invitation is waiting for your acceptance
March 14, 1915 at 3:04 PM
ConnectedTo
Harold Godfrey invited you to join ConnectedTo.com 5 days ago. Would yo like to be associated with Harold?
3106
Integrate Us
Subtract
3104
Harold Godfrey
ITD
ITL
ITH
IT0
Touch Screen 112
Microphone 113
Accelerometer(s) 168
204
Intensity of Contact 3102

Figure 31C
206
Portable Multifunction Device 100
Speaker 111
Optical Sensor 164
Proximity Sensor 166
400
208
208
402
9:26 PM
404
42%
406
Inbox (359)
From: Harold Godfrey
3108
To: David Hilbert
3104
Godfrey's invitation is waiting for your acceptance
March 14, 1915 at 3:04 PM
ConnectedTo
Harold Godfrey invited you to join ConnectedTo.com 5 days ago. Would you like to be associated with Harold?
Integrate Us
Subtract
Harold Godfrey
Touch Screen 112
Microphone 113
Accelerometer(s) 168
204
$IT_D$
$IT_L$
$IT_H$
$IT_0$
Intensity of Contact 3102

Figure 31F
206
Portable Multifunction Device 100
Speaker 111
Optical Sensor 164
Proximity Sensor 166
400
208
208
402
9:26 PM
404
42%
406
Message
Sender
Edit
3126
Harold Godfrey
3104
mobile
650-776-6671
FaceTime
other
hgodfrey@institution.com
Add to VIP
Touch Screen 112
Microphone 113
Accelerometer(s) 168
204
IT_D
IT_L
IT_H
IT_0
Intensity of Contact 3102

Figure 31K
206
Portable Multifunction Device 100
Speaker 111
Optical Sensor 164
Proximity Sensor 166
400
208
208
402
9:26 PM
404
42%
406
Inbox (359)
From: Harold Godfrey
To: David Hilbert
Godfrey's invitation is waiting for your acceptance
March 14, 1915 at 3:04 PM
ConnectedTo
3116
3104
Integrate Us
Subtract
Harold Godfrey
Touch Screen 112
Microphone 113
Accelerometer(s) 168
204
IT<sub>D</sub>
IT<sub>L</sub>
IT<sub>H</sub>
IT<sub>0</sub>
Intensity of Contact 3102

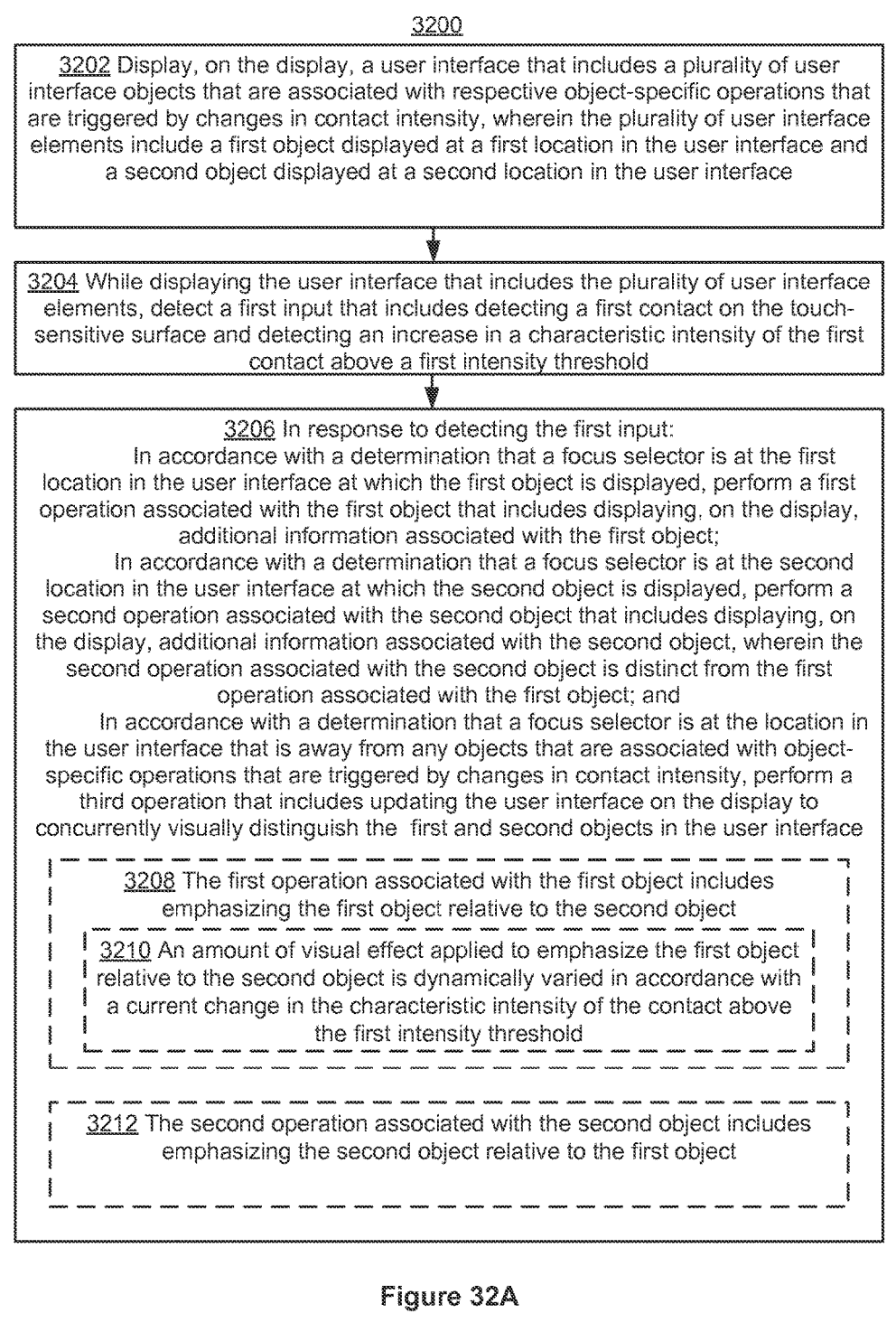

3202 Display, on the display, a user interface that includes a plurality of user interface objects that are associated with respective object-specific operations that are triggered by changes in contact intensity, wherein the plurality of user interface elements include a first object displayed at a first location in the user interface and a second object displayed at a second location in the user interface

↓

3204 While displaying the user interface that includes the plurality of user interface elements, detect a first input that includes detecting a first contact on the touch-sensitive surface and detecting an increase in a characteristic intensity of the first contact above a first intensity threshold

↓

3206 In response to detecting the first input:

In accordance with a determination that a focus selector is at the first location in the user interface at which the first object is displayed, perform a first operation associated with the first object that includes displaying, on the display, additional information associated with the first object;

In accordance with a determination that a focus selector is at the second location in the user interface at which the second object is displayed, perform a second operation associated with the second object that includes displaying, on the display, additional information associated with the second object, wherein the second operation associated with the second object is distinct from the first operation associated with the first object; and In accordance with a determination that a focus selector is at the location in the user interface that is away from any objects that are associated with object-specific operations that are triggered by changes in contact intensity, perform a third operation that includes updating the user interface on the display to concurrently visually distinguish the first and second objects in the user interface 3208 The first operation associated with the first object includes emphasizing the first object relative to the second object 3210 An amount of visual effect applied to emphasize the first object relative to the second object is dynamically varied in accordance with a current change in the characteristic intensity of the contact above the first intensity threshold 3212 The second operation associated with the second object includes emphasizing the second object relative to the first object

Figure 32A

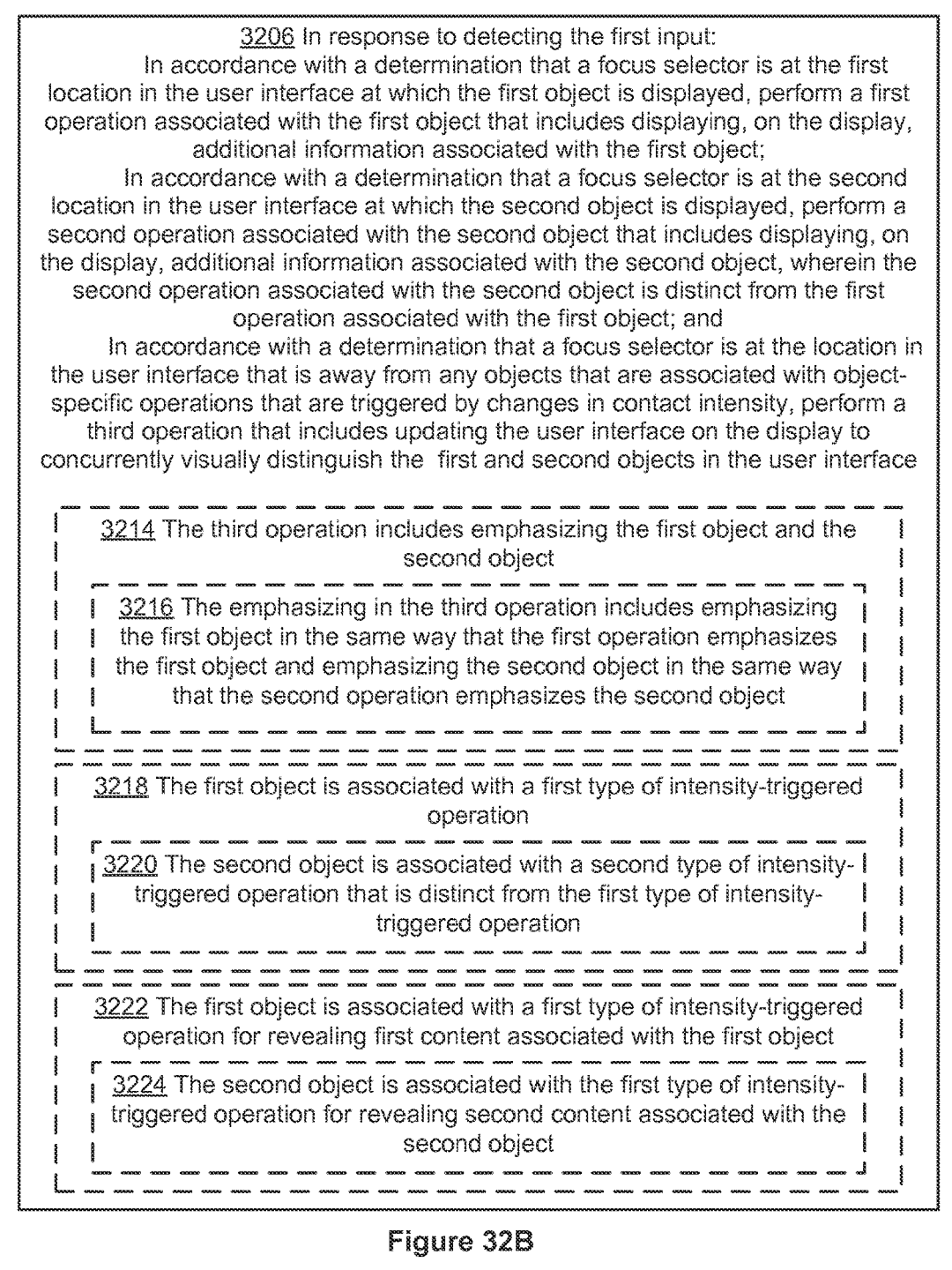

3206 In response to detecting the first input:
In accordance with a determination that a focus selector is at the first location in the user interface at which the first object is displayed, perform a first operation associated with the first object that includes displaying, on the display, additional information associated with the first object;
In accordance with a determination that a focus selector is at the second location in the user interface at which the second object is displayed, perform a second operation associated with the second object that includes displaying, on the display, additional information associated with the second object, wherein the second operation associated with the second object is distinct from the first operation associated with the first object; and
In accordance with a determination that a focus selector is at the location in the user interface that is away from any objects that are associated with object-specific operations that are triggered by changes in contact intensity, perform a third operation that includes updating the user interface on the display to concurrently visually distinguish the first and second objects in the user interface 3214 The third operation includes emphasizing the first object and the second object 3216 The emphasizing in the third operation includes emphasizing the first object in the same way that the first operation emphasizes the first object and emphasizing the second object in the same way that the second operation emphasizes the second object 3218 The first object is associated with a first type of intensity-triggered operation 3220 The second object is associated with a second type of intensity-triggered operation that is distinct from the first type of intensity-triggered operation 3222 The first object is associated with a first type of intensity-triggered operation for revealing first content associated with the first object 3224 The second object is associated with the first type of intensity-triggered operation for revealing second content associated with the second object

Figure 32B

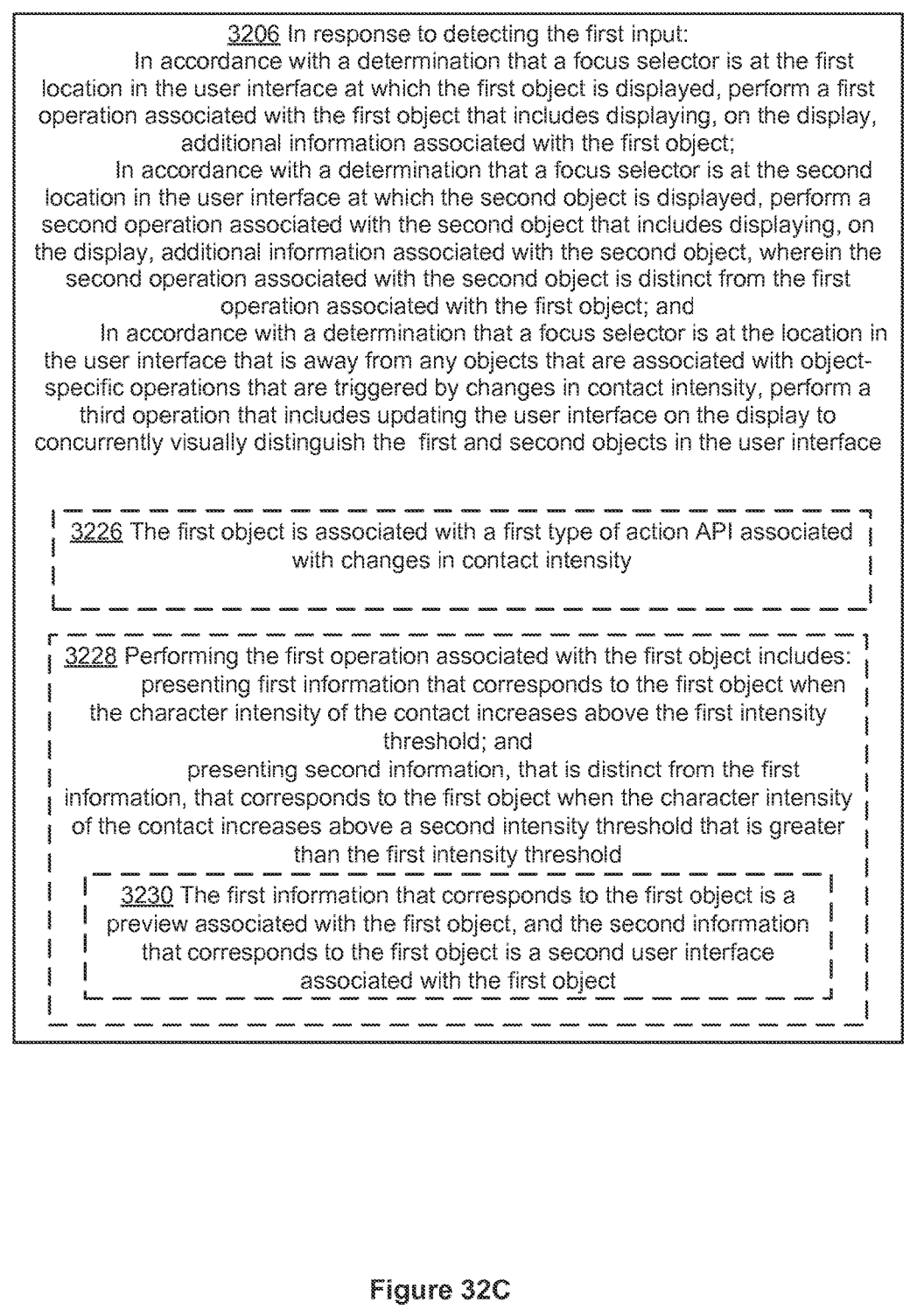

3206 In response to detecting the first input:

In accordance with a determination that a focus selector is at the first location in the user interface at which the first object is displayed, perform a first operation associated with the first object that includes displaying, on the display, additional information associated with the first object;

In accordance with a determination that a focus selector is at the second location in the user interface at which the second object is displayed, perform a second operation associated with the second object that includes displaying, on the display, additional information associated with the second object, wherein the second operation associated with the second object is distinct from the first operation associated with the first object; and In accordance with a determination that a focus selector is at the location in the user interface that is away from any objects that are associated with object-specific operations that are triggered by changes in contact intensity, perform a third operation that includes updating the user interface on the display to concurrently visually distinguish the first and second objects in the user interface 3226 The first object is associated with a first type of action API associated with changes in contact intensity 3228 Performing the first operation associated with the first object includes:

presenting first information that corresponds to the first object when the character intensity of the contact increases above the first intensity threshold; and presenting second information, that is distinct from the first information, that corresponds to the first object when the character intensity of the contact increases above a second intensity threshold that is greater than the first intensity threshold 3230 The first information that corresponds to the first object is a preview associated with the first object, and the second information that corresponds to the first object is a second user interface associated with the first object

Figure 32C

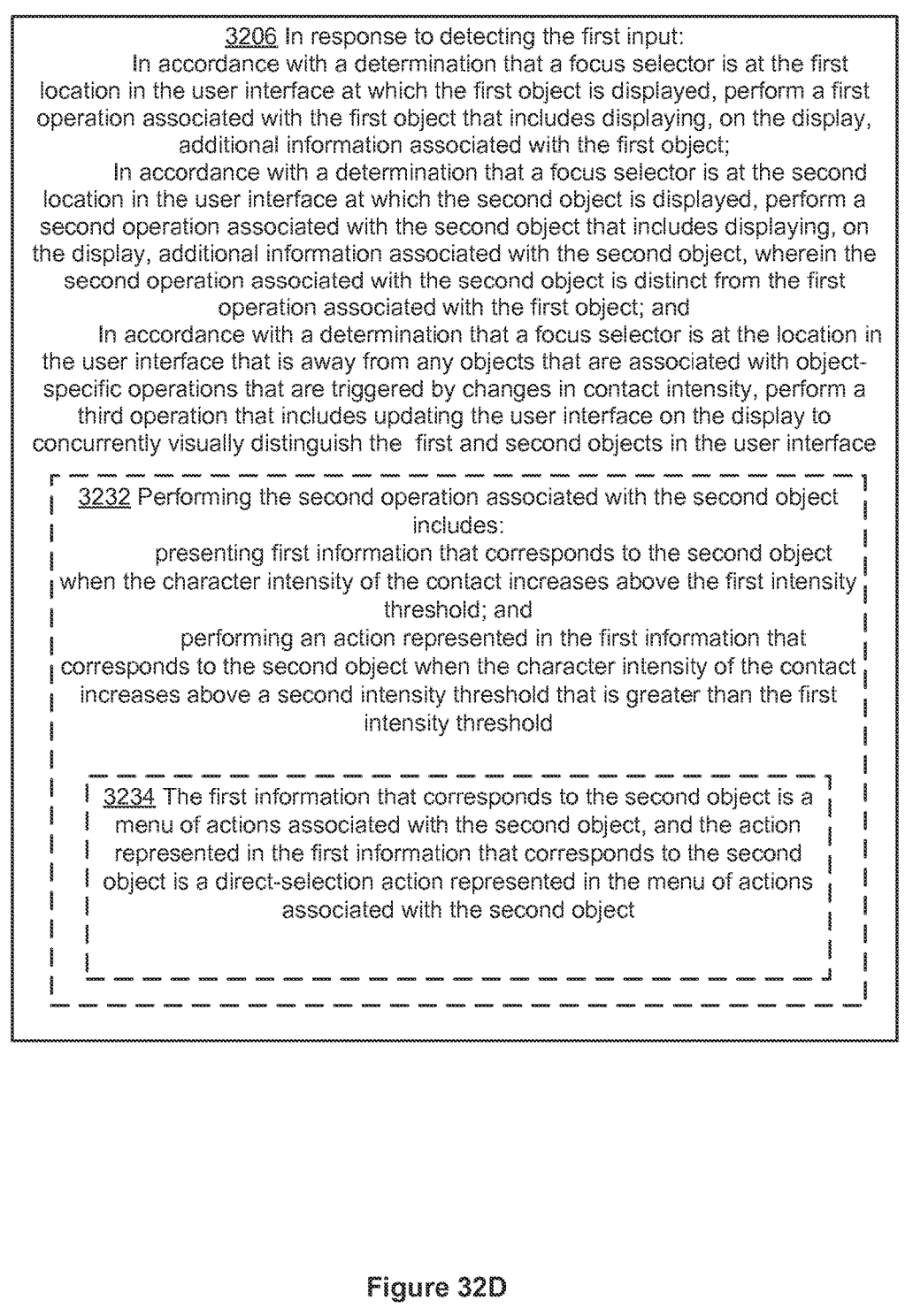

3206 In response to detecting the first input:
In accordance with a determination that a focus selector is at the first location in the user interface at which the first object is displayed, perform a first operation associated with the first object that includes displaying, on the display, additional information associated with the first object;
In accordance with a determination that a focus selector is at the second location in the user interface at which the second object is displayed, perform a second operation associated with the second object that includes displaying, on the display, additional information associated with the second object, wherein the second operation associated with the second object is distinct from the first operation associated with the first object; and
In accordance with a determination that a focus selector is at the location in the user interface that is away from any objects that are associated with object-specific operations that are triggered by changes in contact intensity, perform a third operation that includes updating the user interface on the display to concurrently visually distinguish the first and second objects in the user interface 3232 Performing the second operation associated with the second object includes:
presenting first information that corresponds to the second object when the character intensity of the contact increases above the first intensity threshold; and
performing an action represented in the first information that corresponds to the second object when the character intensity of the contact increases above a second intensity threshold that is greater than the first intensity threshold 3234 The first information that corresponds to the second object is a menu of actions associated with the second object, and the action represented in the first information that corresponds to the second object is a direct-selection action represented in the menu of actions associated with the second object

Figure 32D

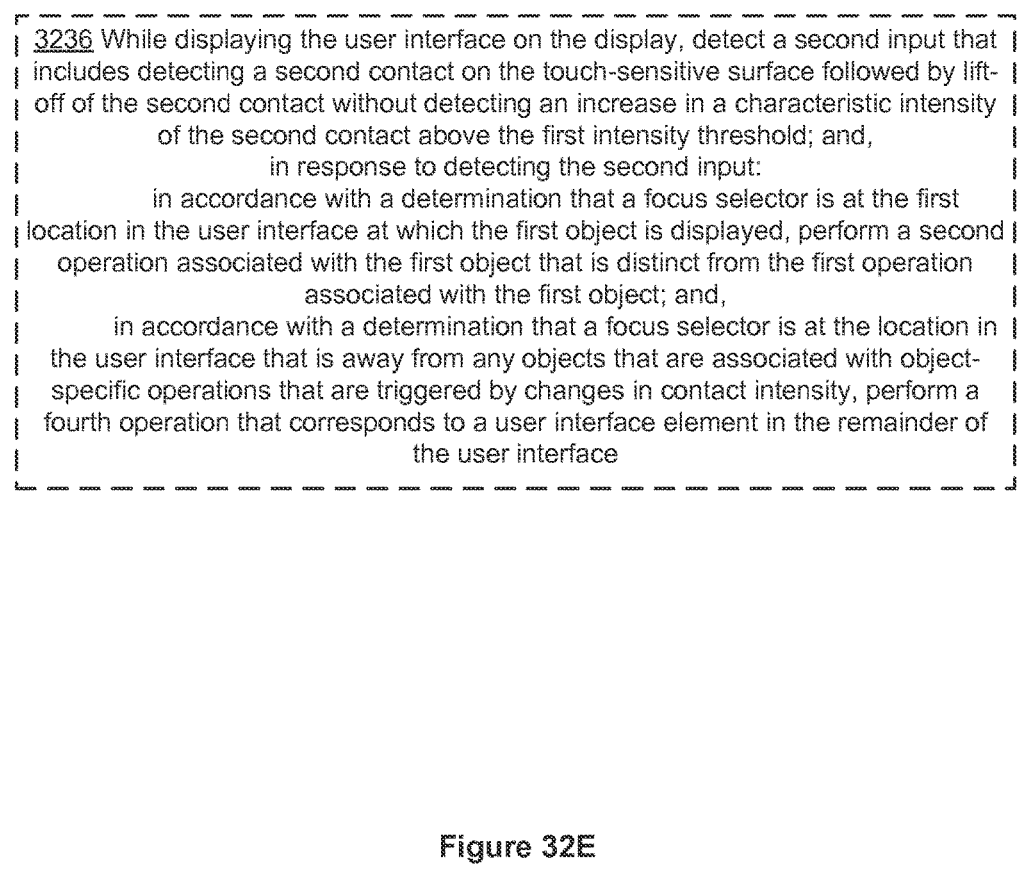

3236 While displaying the user interface on the display, detect a second input that includes detecting a second contact on the touch-sensitive surface followed by lift-off of the second contact without detecting an increase in a characteristic intensity of the second contact above the first intensity threshold; and,
in response to detecting the second input:
in accordance with a determination that a focus selector is at the first location in the user interface at which the first object is displayed, perform a second operation associated with the first object that is distinct from the first operation associated with the first object; and,
in accordance with a determination that a focus selector is at the location in the user interface that is away from any objects that are associated with object-specific operations that are triggered by changes in contact intensity, perform a fourth operation that corresponds to a user interface element in the remainder of the user interface

Figure 32E

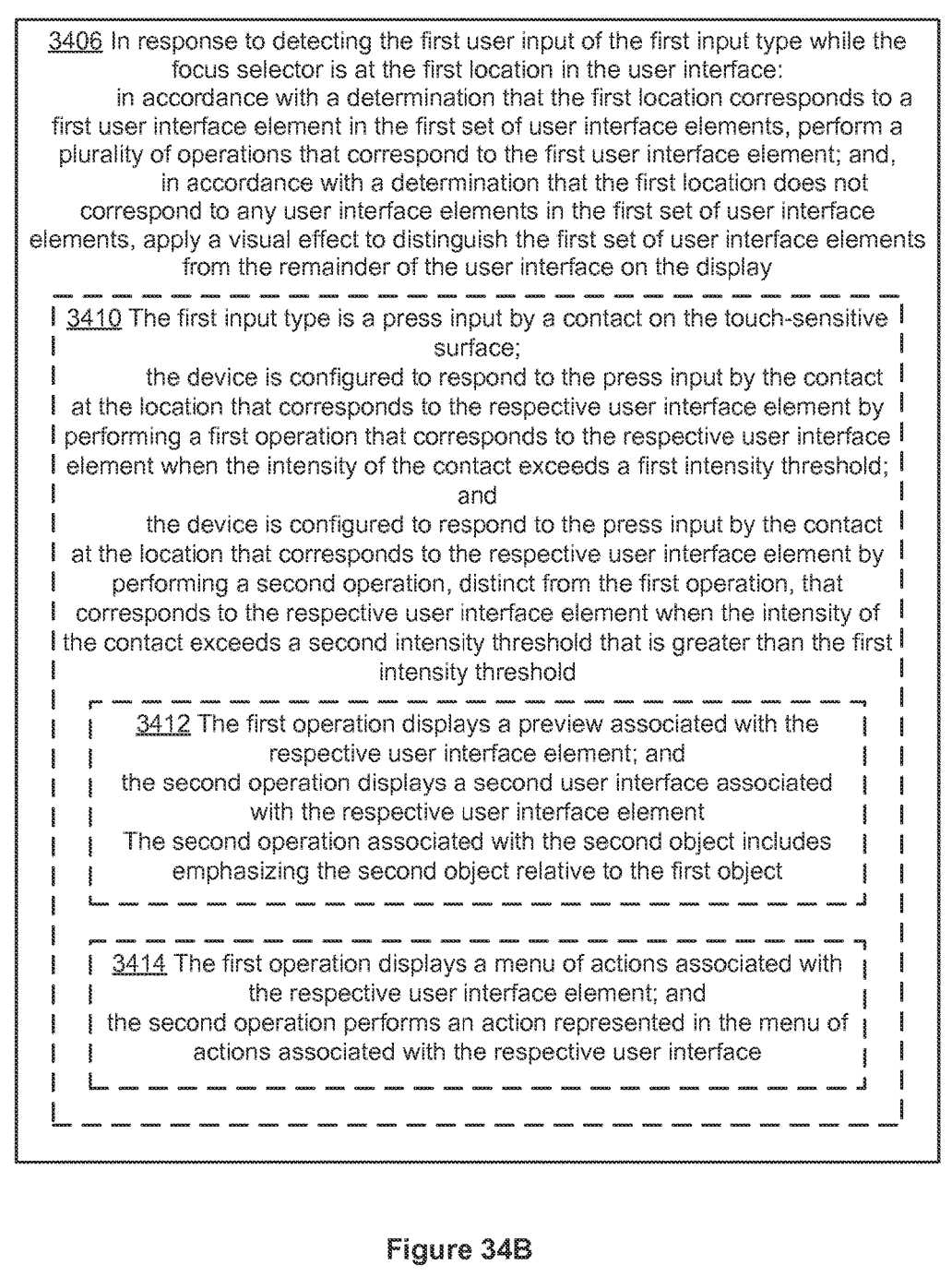

3406 In response to detecting the first user input of the first input type while the focus selector is at the first location in the user interface:
in accordance with a determination that the first location corresponds to a first user interface element in the first set of user interface elements, perform a plurality of operations that correspond to the first user interface element; and,
in accordance with a determination that the first location does not correspond to any user interface elements in the first set of user interface elements, apply a visual effect to distinguish the first set of user interface elements from the remainder of the user interface on the display 3410 The first input type is a press input by a contact on the touch-sensitive surface;
the device is configured to respond to the press input by the contact at the location that corresponds to the respective user interface element by performing a first operation that corresponds to the respective user interface element when the intensity of the contact exceeds a first intensity threshold; and
the device is configured to respond to the press input by the contact at the location that corresponds to the respective user interface element by performing a second operation, distinct from the first operation, that corresponds to the respective user interface element when the intensity of the contact exceeds a second intensity threshold that is greater than the first intensity threshold 3412 The first operation displays a preview associated with the respective user interface element; and
the second operation displays a second user interface associated with the respective user interface element
The second operation associated with the second object includes emphasizing the second object relative to the first object 3414 The first operation displays a menu of actions associated with the respective user interface element; and
the second operation performs an action represented in the menu of actions associated with the respective user interface

Figure 34B

Figure 34C:
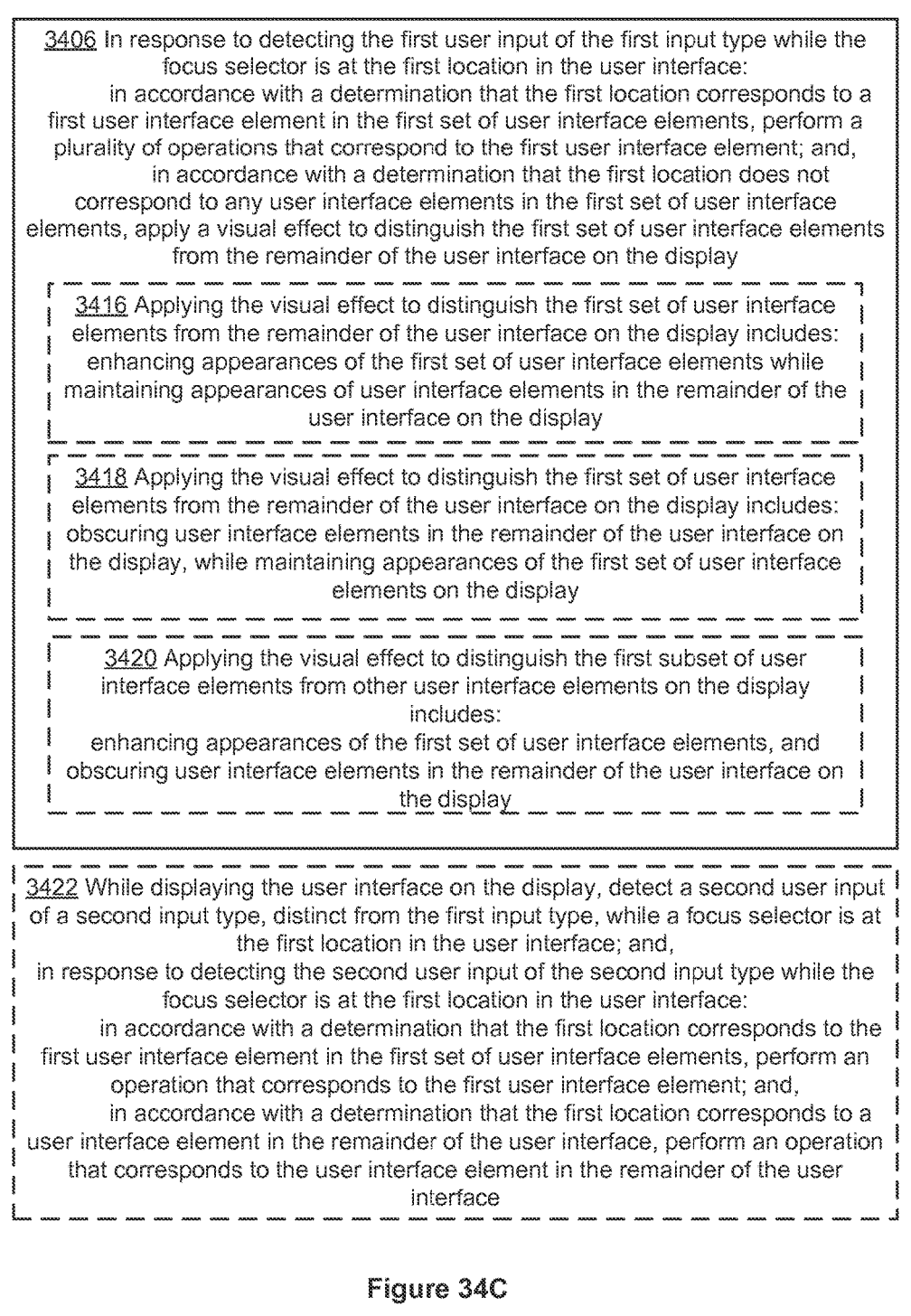

3406 In response to detecting the first user input of the first input type while the focus selector is at the first location in the user interface:
in accordance with a determination that the first location corresponds to a first user interface element in the first set of user interface elements, perform a plurality of operations that correspond to the first user interface element; and,
in accordance with a determination that the first location does not correspond to any user interface elements in the first set of user interface elements, apply a visual effect to distinguish the first set of user interface elements from the remainder of the user interface on the display 3416 Applying the visual effect to distinguish the first set of user interface elements from the remainder of the user interface on the display includes: enhancing appearances of the first set of user interface elements while maintaining appearances of user interface elements in the remainder of the user interface on the display 3418 Applying the visual effect to distinguish the first set of user interface elements from the remainder of the user interface on the display includes: obscuring user interface elements in the remainder of the user interface on the display, while maintaining appearances of the first set of user interface elements on the display 3420 Applying the visual effect to distinguish the first subset of user interface elements from other user interface elements on the display includes:
enhancing appearances of the first set of user interface elements, and obscuring user interface elements in the remainder of the user interface on the display 3422 While displaying the user interface on the display, detect a second user input of a second input type, distinct from the first input type, while a focus selector is at the first location in the user interface; and,
in response to detecting the second user input of the second input type while the focus selector is at the first location in the user interface:
in accordance with a determination that the first location corresponds to the first user interface element in the first set of user interface elements, perform an operation that corresponds to the first user interface element; and,
in accordance with a determination that the first location corresponds to a user interface element in the remainder of the user interface, perform an operation that corresponds to the user interface element in the remainder of the user interface

Figure 37B:
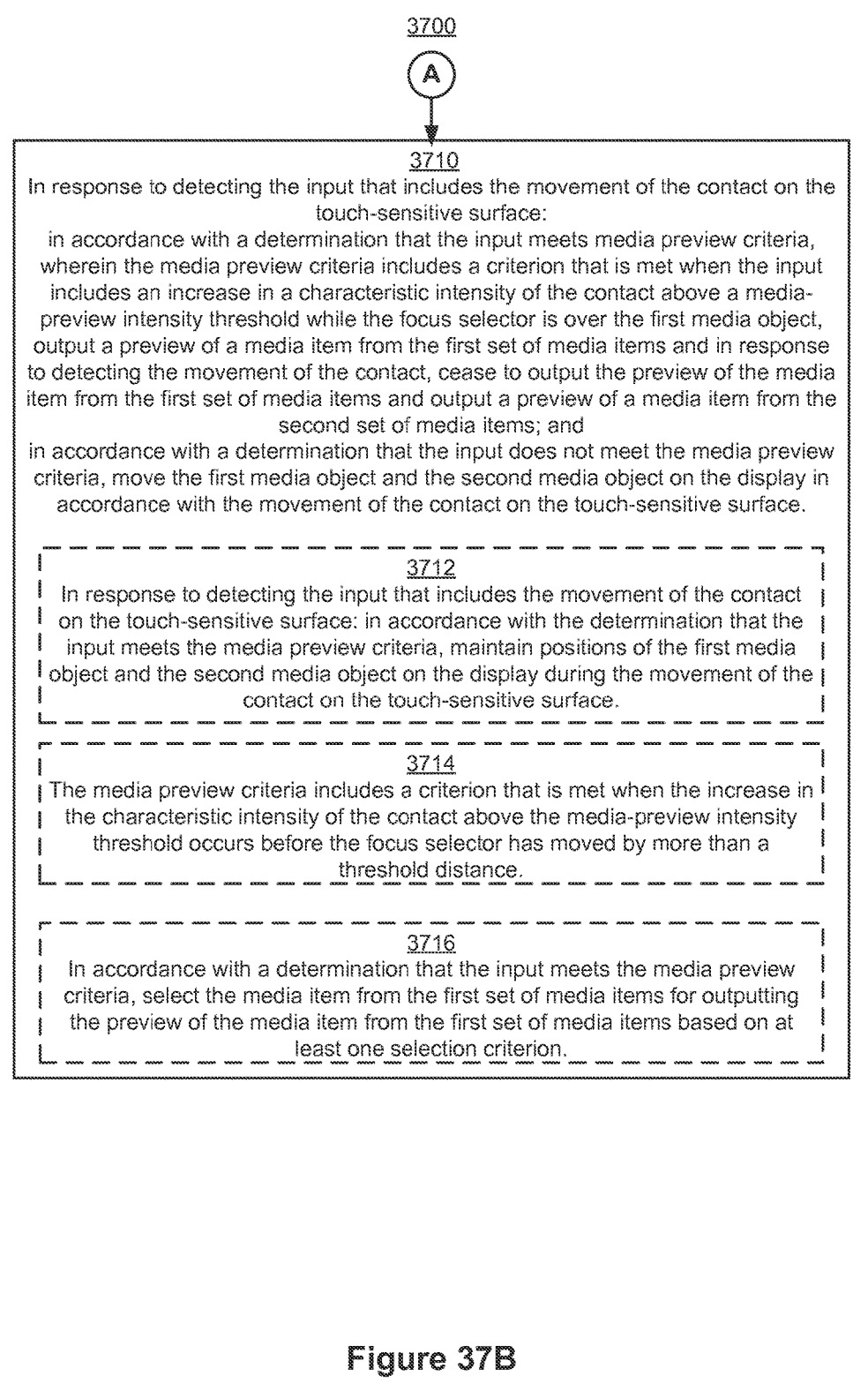

3710
In response to detecting the input that includes the movement of the contact on the touch-sensitive surface:
in accordance with a determination that the input meets media preview criteria, wherein the media preview criteria includes a criterion that is met when the input includes an increase in a characteristic intensity of the contact above a media-preview intensity threshold while the focus selector is over the first media object, output a preview of a media item from the first set of media items and in response to detecting the movement of the contact, cease to output the preview of the media item from the first set of media items and output a preview of a media item from the second set of media items; and
in accordance with a determination that the input does not meet the media preview criteria, move the first media object and the second media object on the display in accordance with the movement of the contact on the touch-sensitive surface.

3712
In response to detecting the input that includes the movement of the contact on the touch-sensitive surface: in accordance with the determination that the input meets the media preview criteria, maintain positions of the first media object and the second media object on the display during the movement of the contact on the touch-sensitive surface.

3714
The media preview criteria includes a criterion that is met when the increase in the characteristic intensity of the contact above the media-preview intensity threshold occurs before the focus selector has moved by more than a threshold distance.

3716
In accordance with a determination that the input meets the media preview criteria, select the media item from the first set of media items for outputting the preview of the media item from the first set of media items based on at least one selection criterion.

Figure 37C:
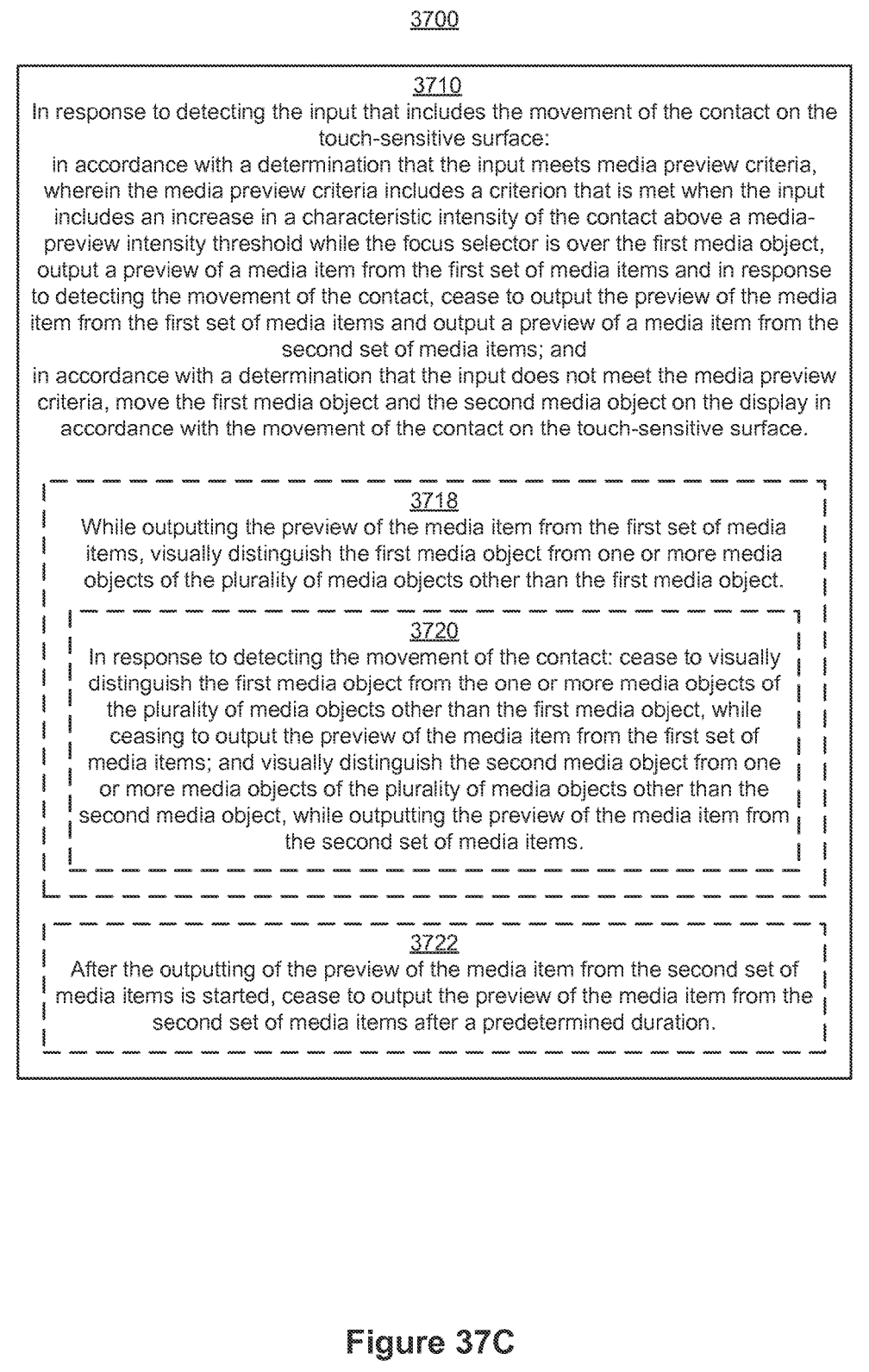

3710
In response to detecting the input that includes the movement of the contact on the touch-sensitive surface:
in accordance with a determination that the input meets media preview criteria, wherein the media preview criteria includes a criterion that is met when the input includes an increase in a characteristic intensity of the contact above a media-preview intensity threshold while the focus selector is over the first media object, output a preview of a media item from the first set of media items and in response to detecting the movement of the contact, cease to output the preview of the media item from the first set of media items and output a preview of a media item from the second set of media items; and
in accordance with a determination that the input does not meet the media preview criteria, move the first media object and the second media object on the display in accordance with the movement of the contact on the touch-sensitive surface.

3718
While outputting the preview of the media item from the first set of media items, visually distinguish the first media object from one or more media objects of the plurality of media objects other than the first media object.

3720
In response to detecting the movement of the contact: cease to visually distinguish the first media object from the one or more media objects of the plurality of media objects other than the first media object, while ceasing to output the preview of the media item from the first set of media items; and visually distinguish the second media object from one or more media objects of the plurality of media objects other than the second media object, while outputting the preview of the media item from the second set of media items.

3722
After the outputting of the preview of the media item from the second set of media items is started, cease to output the preview of the media item from the second set of media items after a predetermined duration.

Figure 37D:
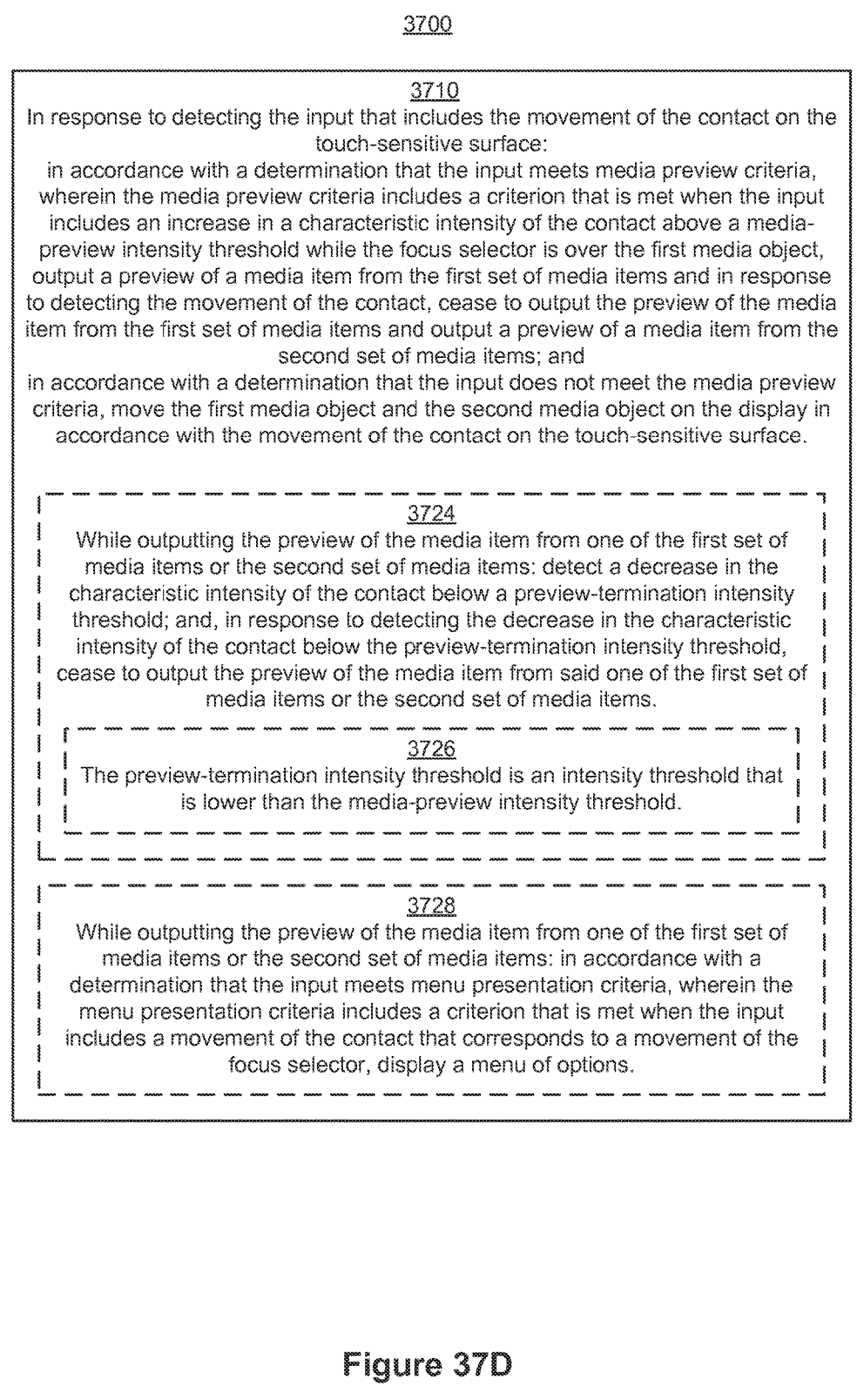

3710
In response to detecting the input that includes the movement of the contact on the touch-sensitive surface:
in accordance with a determination that the input meets media preview criteria, wherein the media preview criteria includes a criterion that is met when the input includes an increase in a characteristic intensity of the contact above a media-preview intensity threshold while the focus selector is over the first media object, output a preview of a media item from the first set of media items and in response to detecting the movement of the contact, cease to output the preview of the media item from the first set of media items and output a preview of a media item from the second set of media items; and
in accordance with a determination that the input does not meet the media preview criteria, move the first media object and the second media object on the display in accordance with the movement of the contact on the touch-sensitive surface.

3724
While outputting the preview of the media item from one of the first set of media items or the second set of media items: detect a decrease in the characteristic intensity of the contact below a preview-termination intensity threshold; and, in response to detecting the decrease in the characteristic intensity of the contact below the preview-termination intensity threshold, cease to output the preview of the media item from said one of the first set of media items or the second set of media items.

3726
The preview-termination intensity threshold is an intensity threshold that is lower than the media-preview intensity threshold.

3728
While outputting the preview of the media item from one of the first set of media items or the second set of media items: in accordance with a determination that the input meets menu presentation criteria, wherein the menu presentation criteria includes a criterion that is met when the input includes a movement of the contact that corresponds to a movement of the focus selector, display a menu of options.

Figure 37E:
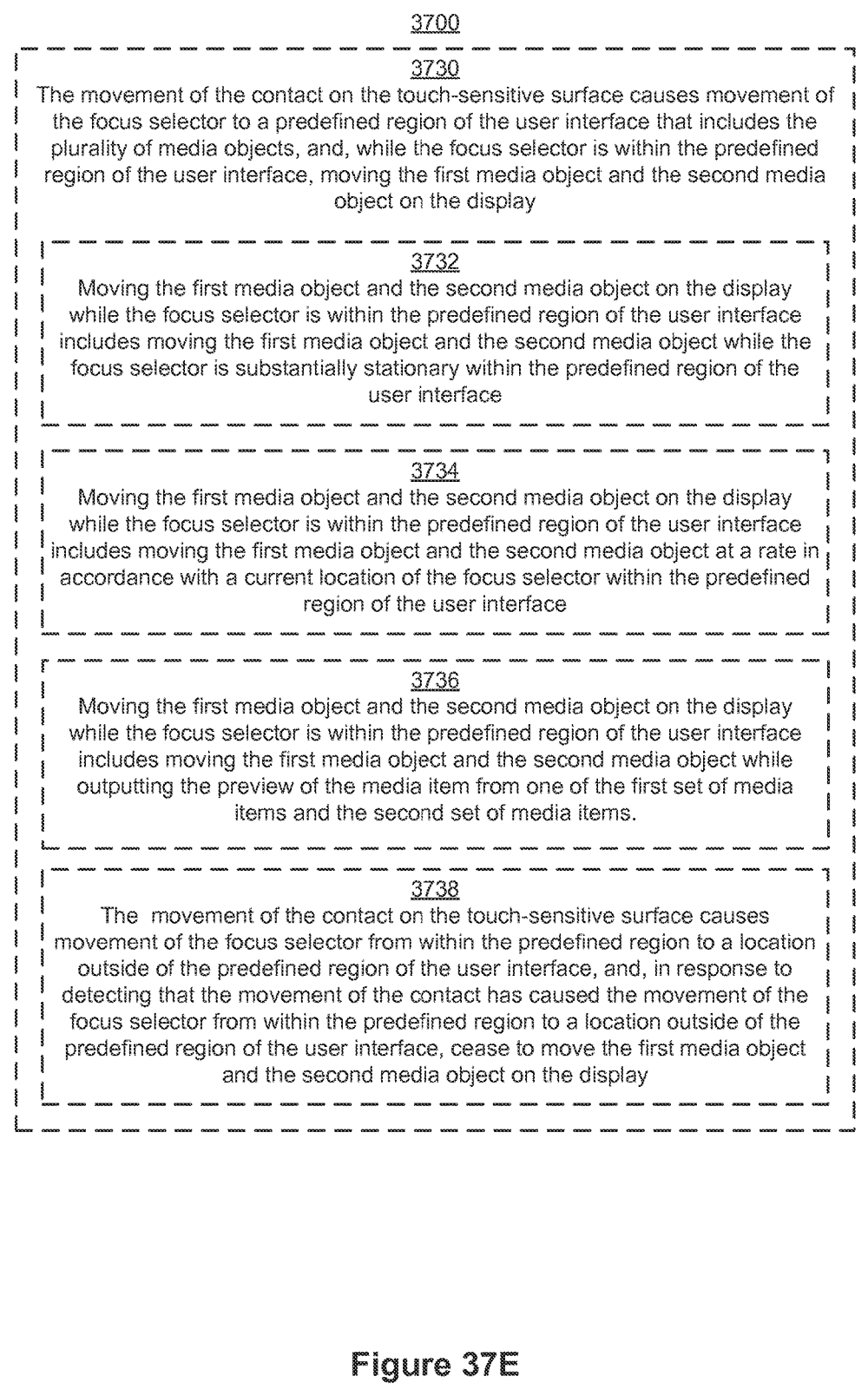

3730
The movement of the contact on the touch-sensitive surface causes movement of the focus selector to a predefined region of the user interface that includes the plurality of media objects, and, while the focus selector is within the predefined region of the user interface, moving the first media object and the second media object on the display 3732
Moving the first media object and the second media object on the display while the focus selector is within the predefined region of the user interface includes moving the first media object and the second media object while the focus selector is substantially stationary within the predefined region of the user interface 3734
Moving the first media object and the second media object on the display while the focus selector is within the predefined region of the user interface includes moving the first media object and the second media object at a rate in accordance with a current location of the focus selector within the predefined region of the user interface 3736
Moving the first media object and the second media object on the display while the focus selector is within the predefined region of the user interface includes moving the first media object and the second media object while outputting the preview of the media item from one of the first set of media items and the second set of media items.

3738
The movement of the contact on the touch-sensitive surface causes movement of the focus selector from within the predefined region to a location outside of the predefined region of the user interface, and, in response to detecting that the movement of the contact has caused the movement of the focus selector from within the predefined region to a location outside of the predefined region of the user interface, cease to move the first media object and the second media object on the display

Figure 37F:
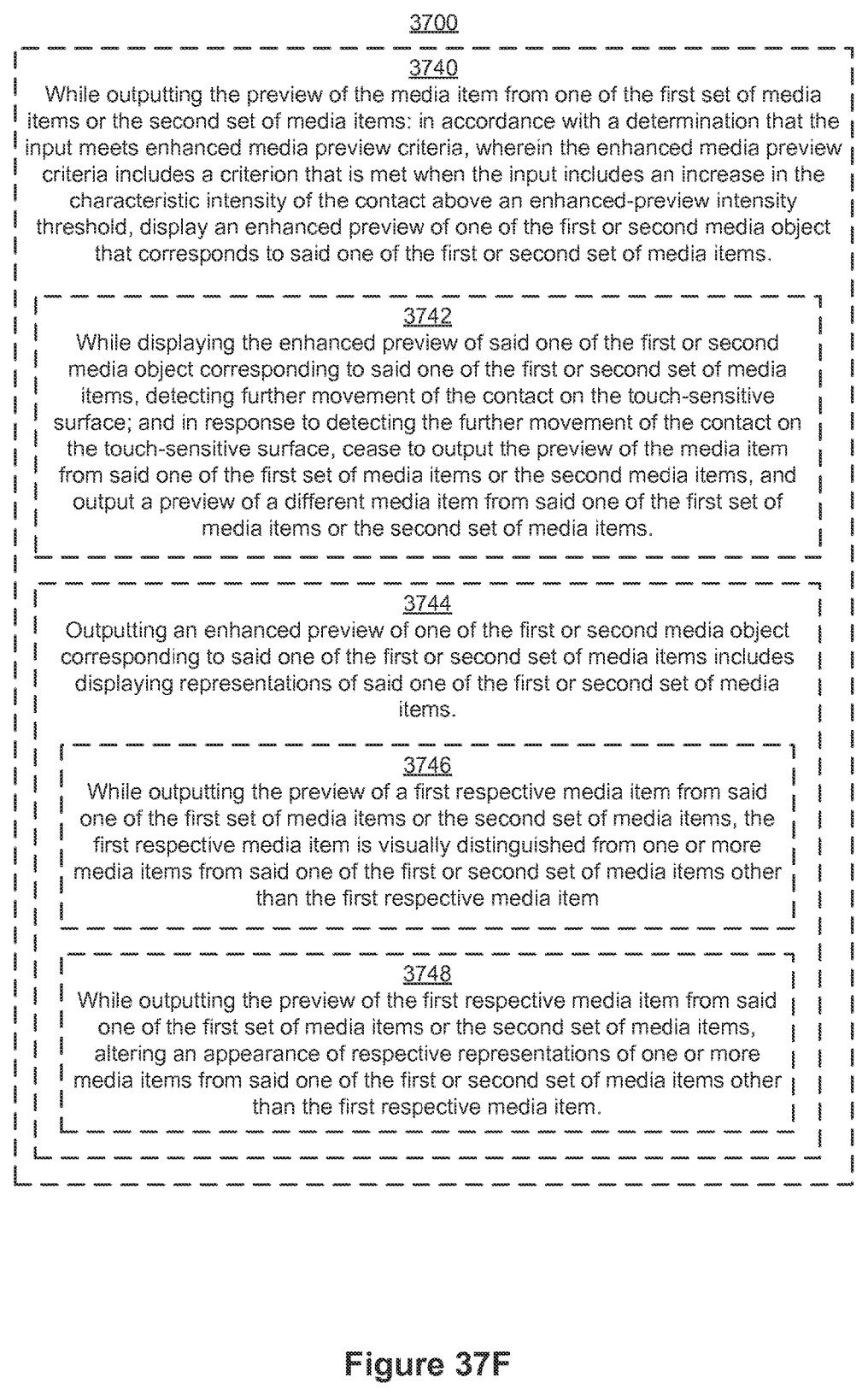

3740
While outputting the preview of the media item from one of the first set of media items or the second set of media items: in accordance with a determination that the input meets enhanced media preview criteria, wherein the enhanced media preview criteria includes a criterion that is met when the input includes an increase in the characteristic intensity of the contact above an enhanced-preview intensity threshold, display an enhanced preview of one of the first or second media object that corresponds to said one of the first or second set of media items.

3742
While displaying the enhanced preview of said one of the first or second media object corresponding to said one of the first or second set of media items, detecting further movement of the contact on the touch-sensitive surface; and in response to detecting the further movement of the contact on the touch-sensitive surface, cease to output the preview of the media item from said one of the first set of media items or the second media items, and output a preview of a different media item from said one of the first set of media items or the second set of media items.

3744
Outputting an enhanced preview of one of the first or second media object corresponding to said one of the first or second set of media items includes displaying representations of said one of the first or second set of media items.

3746
While outputting the preview of a first respective media item from said one of the first set of media items or the second set of media items, the first respective media item is visually distinguished from one or more media items from said one of the first or second set of media items other than the first respective media item 3748
While outputting the preview of the first respective media item from said one of the first set of media items or the second set of media items, altering an appearance of respective representations of one or more media items from said one of the first or second set of media items other than the first respective media item.

Figure 37G:
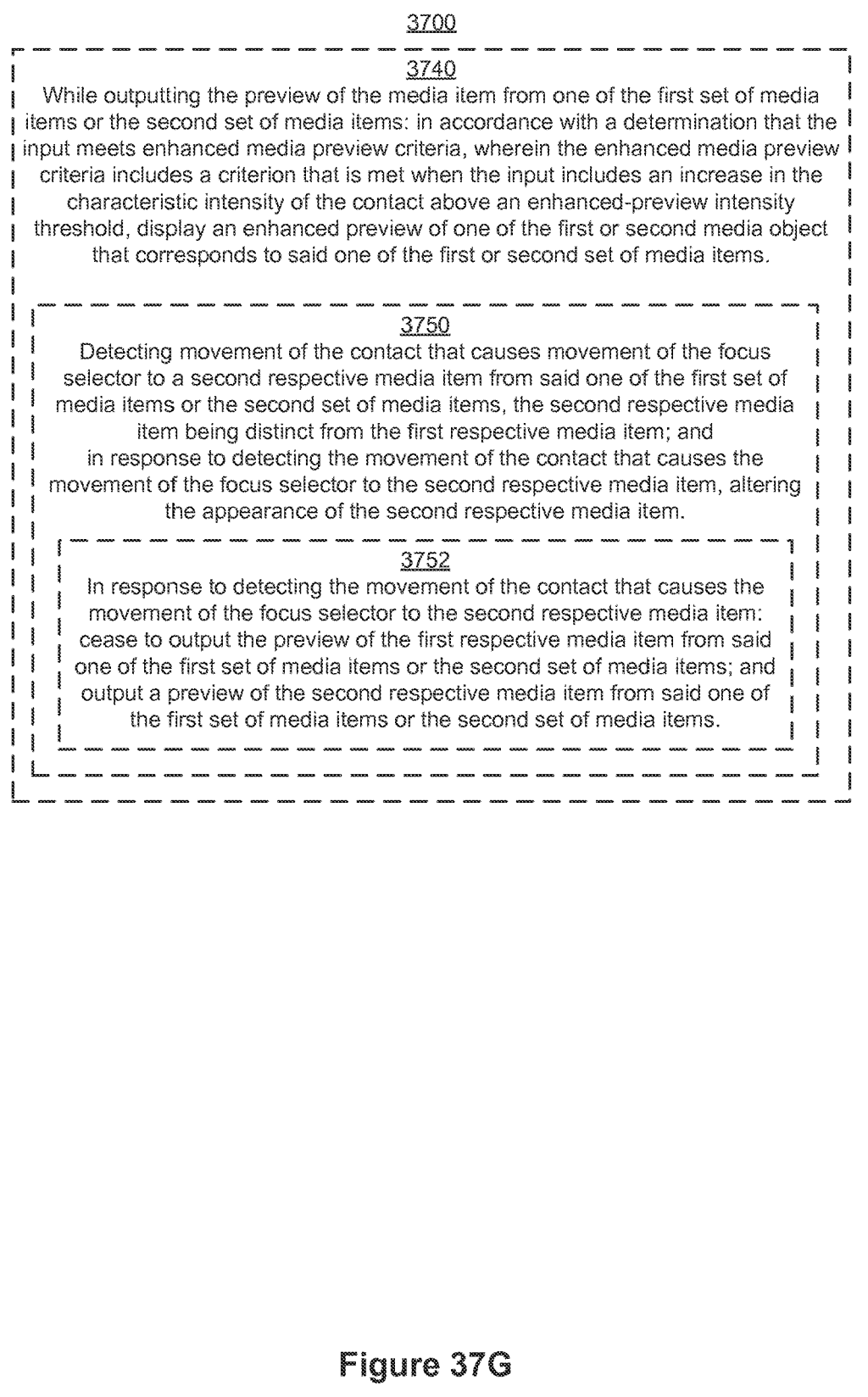

3740
While outputting the preview of the media item from one of the first set of media items or the second set of media items: in accordance with a determination that the input meets enhanced media preview criteria, wherein the enhanced media preview criteria includes a criterion that is met when the input includes an increase in the characteristic intensity of the contact above an enhanced-preview intensity threshold, display an enhanced preview of one of the first or second media object that corresponds to said one of the first or second set of media items.

3750
Detecting movement of the contact that causes movement of the focus selector to a second respective media item from said one of the first set of media items or the second set of media items, the second respective media item being distinct from the first respective media item; and
in response to detecting the movement of the contact that causes the movement of the focus selector to the second respective media item, altering the appearance of the second respective media item.

3752
In response to detecting the movement of the contact that causes the movement of the focus selector to the second respective media item:
cease to output the preview of the first respective media item from said one of the first set of media items or the second set of media items; and
output a preview of the second respective media item from said one of the first set of media items or the second set of media items.

Figure 37H:
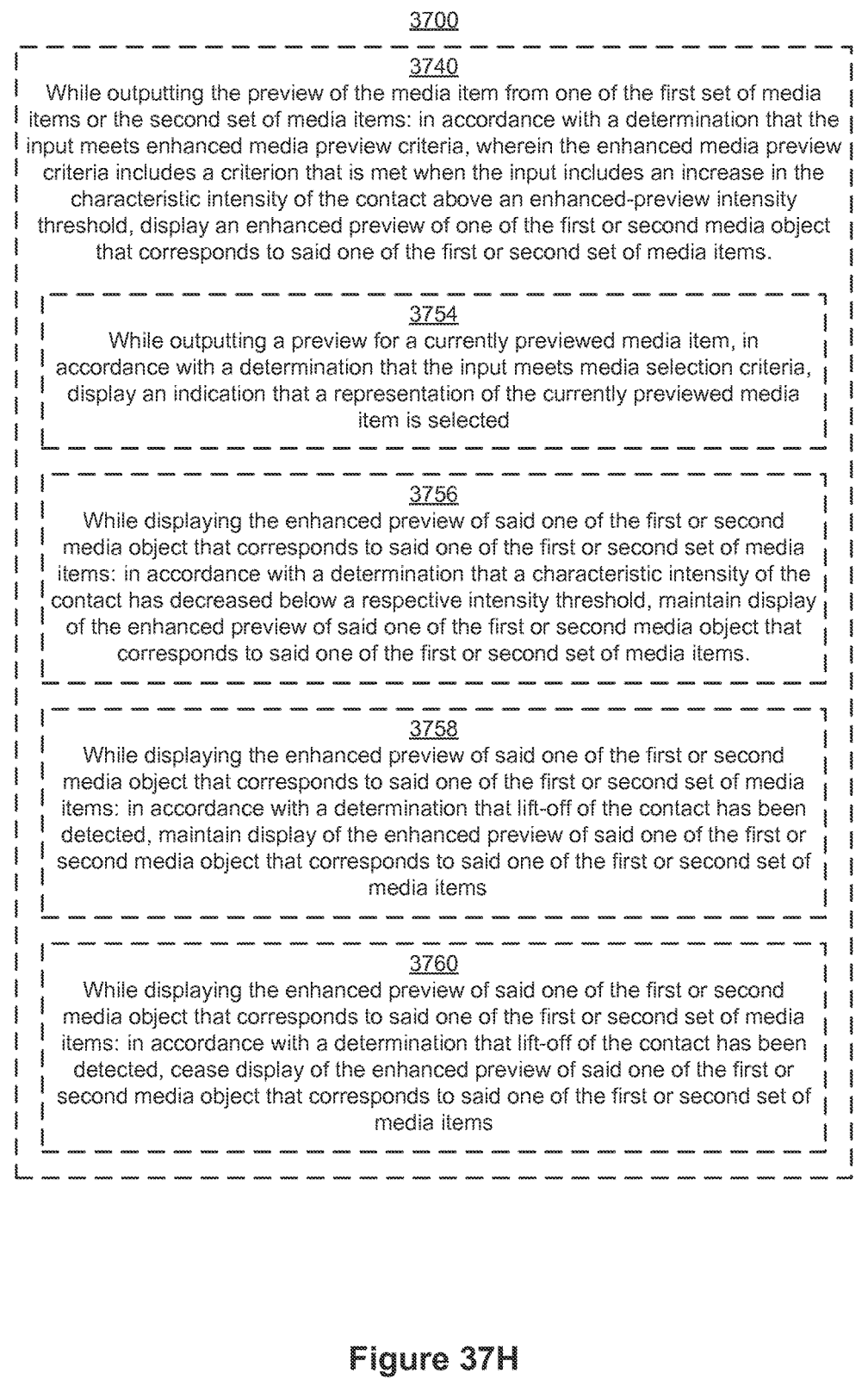

3740
While outputting the preview of the media item from one of the first set of media items or the second set of media items: in accordance with a determination that the input meets enhanced media preview criteria, wherein the enhanced media preview criteria includes a criterion that is met when the input includes an increase in the characteristic intensity of the contact above an enhanced-preview intensity threshold, display an enhanced preview of one of the first or second media object that corresponds to said one of the first or second set of media items.

3754
While outputting a preview for a currently previewed media item, in accordance with a determination that the input meets media selection criteria, display an indication that a representation of the currently previewed media item is selected 3756
While displaying the enhanced preview of said one of the first or second media object that corresponds to said one of the first or second set of media items: in accordance with a determination that a characteristic intensity of the contact has decreased below a respective intensity threshold, maintain display of the enhanced preview of said one of the first or second media object that corresponds to said one of the first or second set of media items.

3758
While displaying the enhanced preview of said one of the first or second media object that corresponds to said one of the first or second set of media items: in accordance with a determination that lift-off of the contact has been detected, maintain display of the enhanced preview of said one of the first or second media object that corresponds to said one of the first or second set of media items 3760
While displaying the enhanced preview of said one of the first or second media object that corresponds to said one of the first or second set of media items: in accordance with a determination that lift-off of the contact has been detected, cease display of the enhanced preview of said one of the first or second media object that corresponds to said one of the first or second set of media items

Figure 40A:
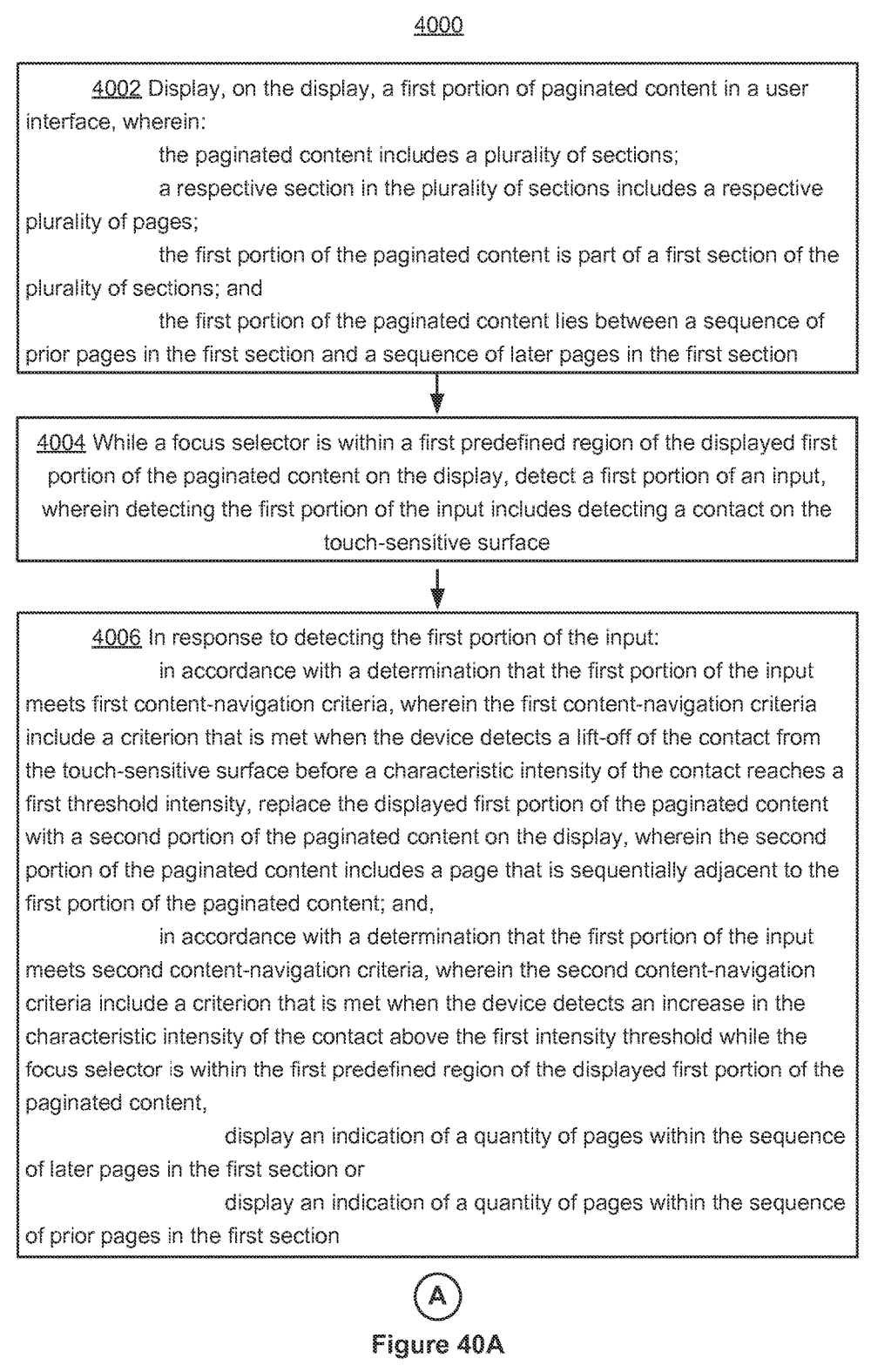

4002 Display, on the display, a first portion of paginated content in a user interface, wherein:

the paginated content includes a plurality of sections;

a respective section in the plurality of sections includes a respective plurality of pages;

the first portion of the paginated content is part of a first section of the plurality of sections; and the first portion of the paginated content lies between a sequence of prior pages in the first section and a sequence of later pages in the first section

↓

4004 While a focus selector is within a first predefined region of the displayed first portion of the paginated content on the display, detect a first portion of an input, wherein detecting the first portion of the input includes detecting a contact on the touch-sensitive surface

↓

4006 In response to detecting the first portion of the input:

in accordance with a determination that the first portion of the input meets first content-navigation criteria, wherein the first content-navigation criteria include a criterion that is met when the device detects a lift-off of the contact from the touch-sensitive surface before a characteristic intensity of the contact reaches a first threshold intensity, replace the displayed first portion of the paginated content with a second portion of the paginated content on the display, wherein the second portion of the paginated content includes a page that is sequentially adjacent to the first portion of the paginated content; and, in accordance with a determination that the first portion of the input meets second content-navigation criteria, wherein the second content-navigation criteria include a criterion that is met when the device detects an increase in the characteristic intensity of the contact above the first intensity threshold while the focus selector is within the first predefined region of the displayed first portion of the paginated content, display an indication of a quantity of pages within the sequence of later pages in the first section or display an indication of a quantity of pages within the sequence of prior pages in the first section (A)

Figure 40B:
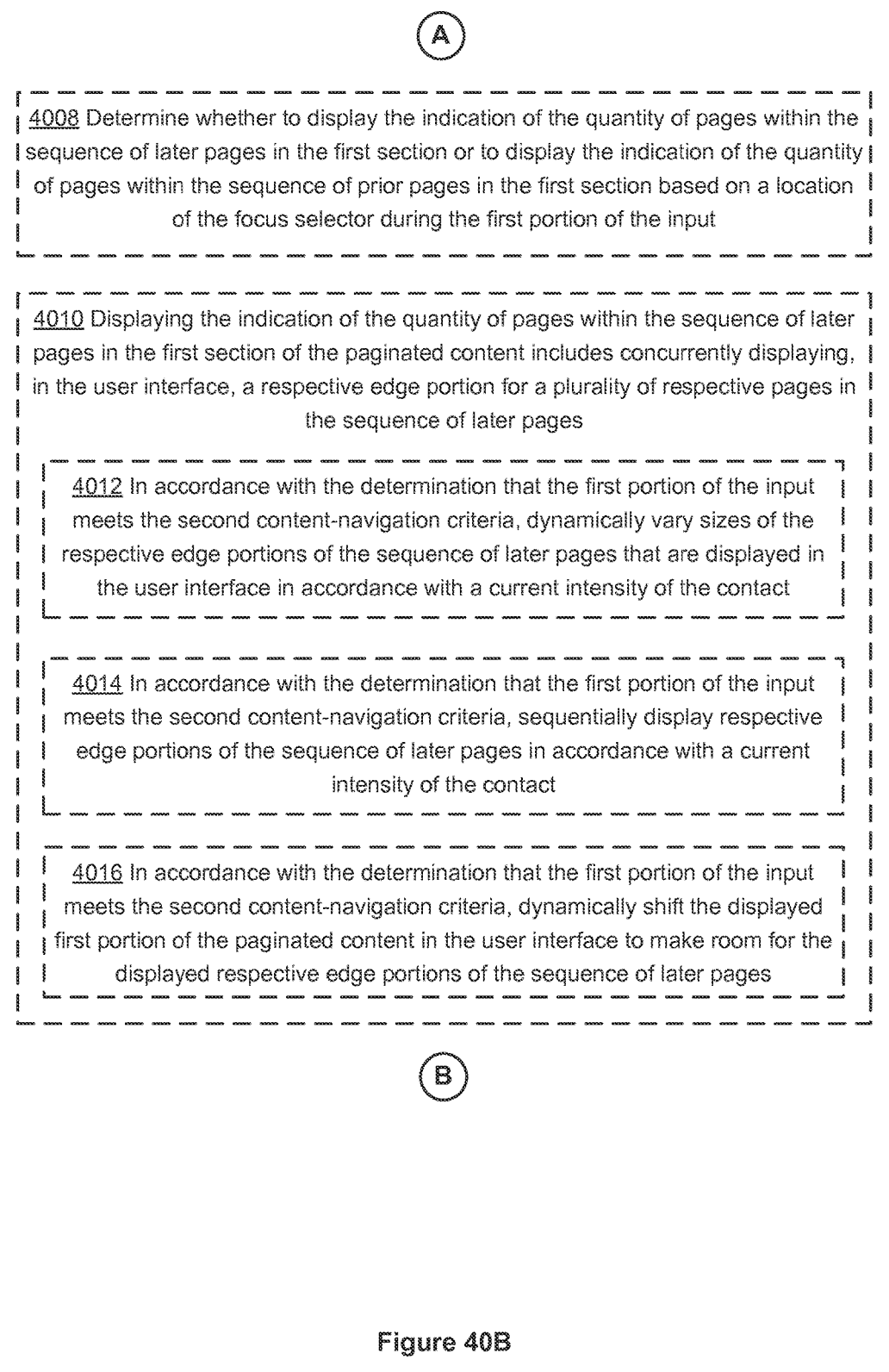

4008 Determine whether to display the indication of the quantity of pages within the sequence of later pages in the first section or to display the indication of the quantity of pages within the sequence of prior pages in the first section based on a location of the focus selector during the first portion of the input 4010 Displaying the indication of the quantity of pages within the sequence of later pages in the first section of the paginated content includes concurrently displaying, in the user interface, a respective edge portion for a plurality of respective pages in the sequence of later pages 4012 In accordance with the determination that the first portion of the input meets the second content-navigation criteria, dynamically vary sizes of the respective edge portions of the sequence of later pages that are displayed in the user interface in accordance with a current intensity of the contact 4014 In accordance with the determination that the first portion of the input meets the second content-navigation criteria, sequentially display respective edge portions of the sequence of later pages in accordance with a current intensity of the contact 4016 In accordance with the determination that the first portion of the input meets the second content-navigation criteria, dynamically shift the displayed first portion of the paginated content in the user interface to make room for the displayed respective edge portions of the sequence of later pages (B)

Figure 40B (B)

Figure 40C:
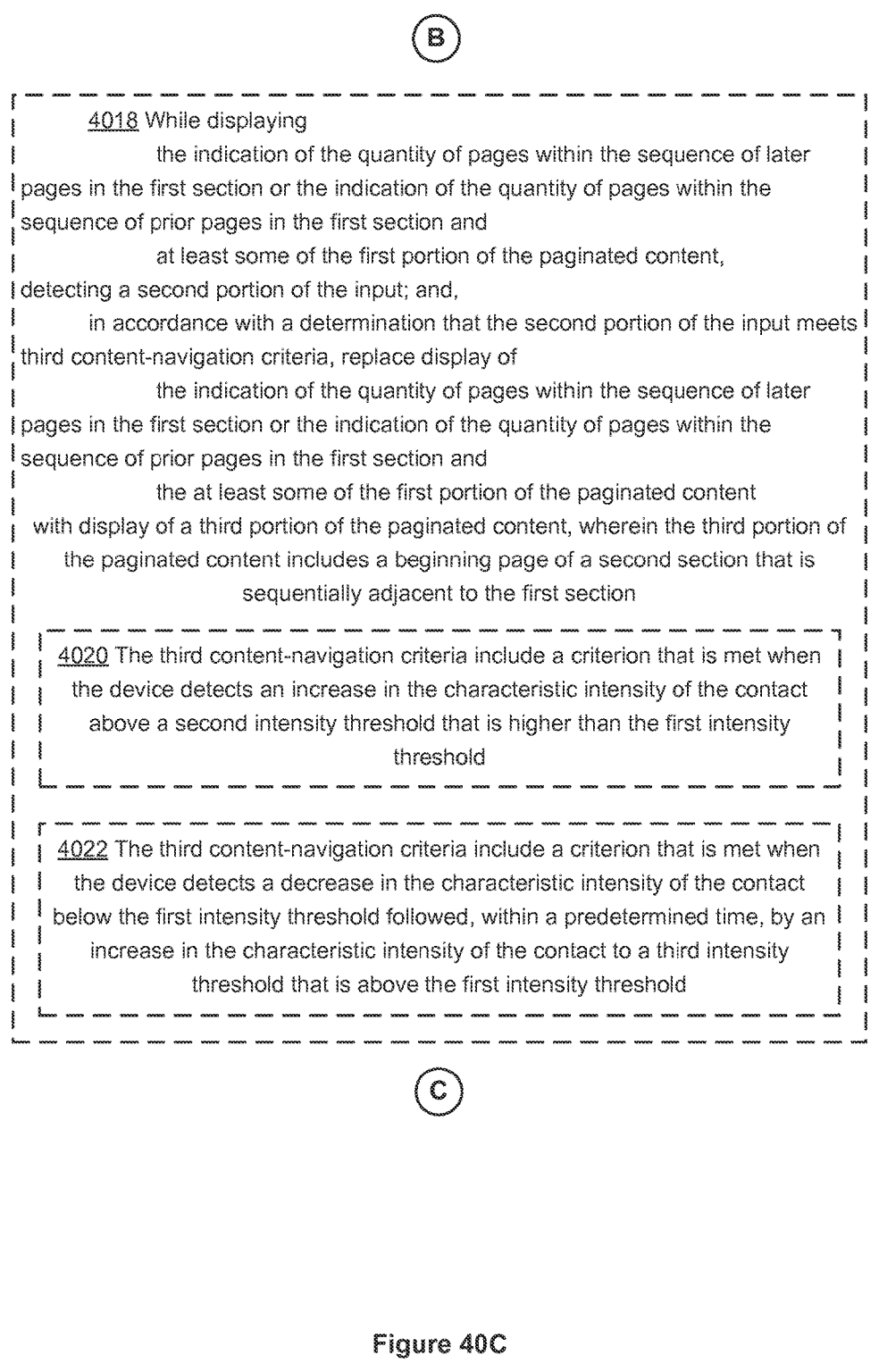

4018 While displaying
the indication of the quantity of pages within the sequence of later pages in the first section or the indication of the quantity of pages within the sequence of prior pages in the first section and
at least some of the first portion of the paginated content,
detecting a second portion of the input; and,
in accordance with a determination that the second portion of the input meets third content-navigation criteria, replace display of
the indication of the quantity of pages within the sequence of later pages in the first section or the indication of the quantity of pages within the sequence of prior pages in the first section and
the at least some of the first portion of the paginated content
with display of a third portion of the paginated content, wherein the third portion of the paginated content includes a beginning page of a second section that is sequentially adjacent to the first section 4020 The third content-navigation criteria include a criterion that is met when the device detects an increase in the characteristic intensity of the contact above a second intensity threshold that is higher than the first intensity threshold 4022 The third content-navigation criteria include a criterion that is met when the device detects a decrease in the characteristic intensity of the contact below the first intensity threshold followed, within a predetermined time, by an increase in the characteristic intensity of the contact to a third intensity threshold that is above the first intensity threshold (C)

Figure 40C (C)

4024 While displaying the indication of the quantity of pages within the sequence of later pages in the first section or the indication of the quantity of pages within the sequence of prior pages in the first section and at least some of the first portion of the paginated content, detecting a second portion of the input; and, in accordance with a determination that the second portion of the input meets fourth content-navigation criteria, wherein the fourth content-navigation criteria include a criterion that is met when the device detects a decrease in the characteristic intensity of the contact below the first intensity threshold followed by a lift off of the contact:

Figure 40D:
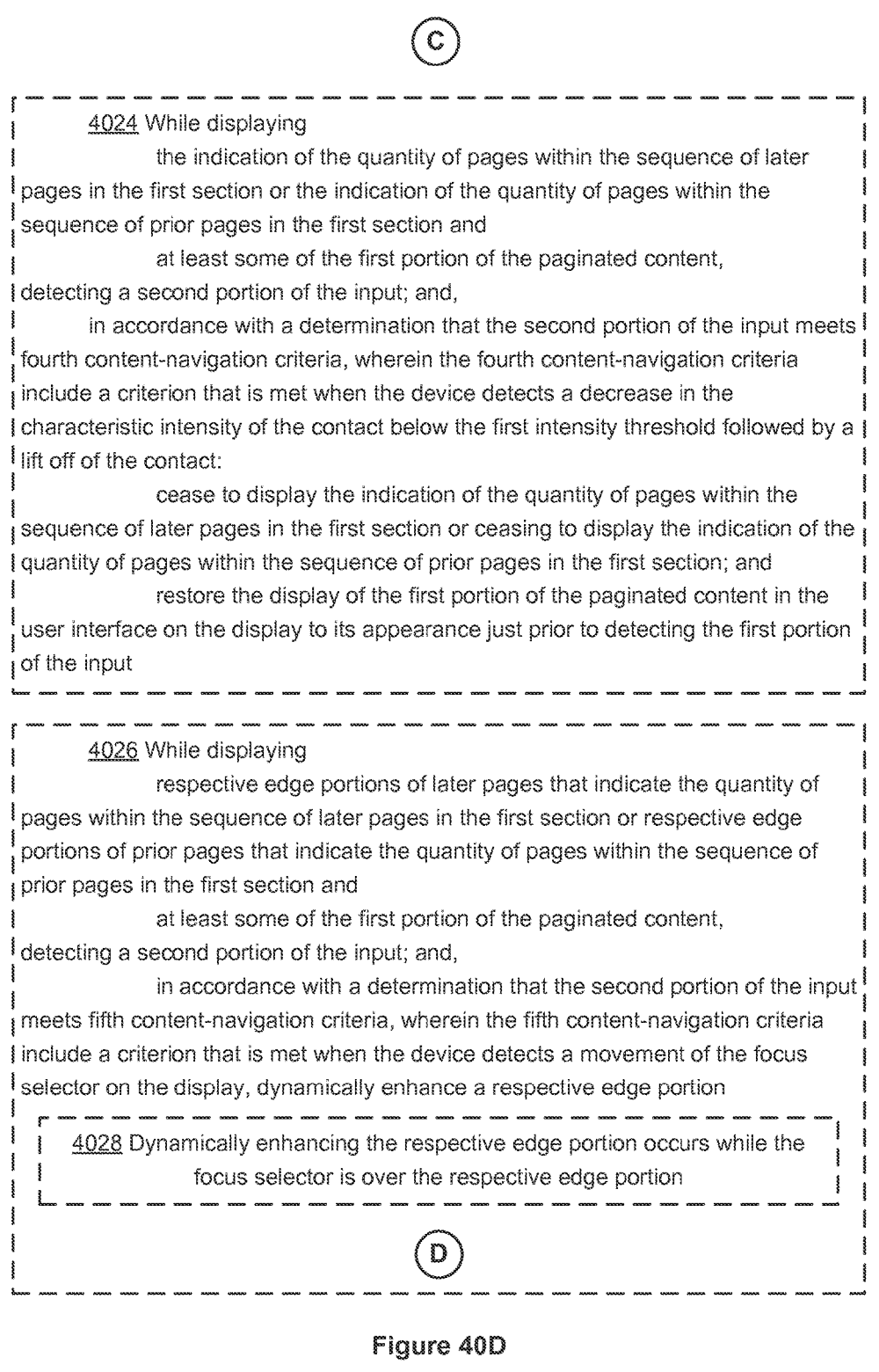

cease to display the indication of the quantity of pages within the sequence of later pages in the first section or ceasing to display the indication of the quantity of pages within the sequence of prior pages in the first section; and restore the display of the first portion of the paginated content in the user interface on the display to its appearance just prior to detecting the first portion of the input 4026 While displaying respective edge portions of later pages that indicate the quantity of pages within the sequence of later pages in the first section or respective edge portions of prior pages that indicate the quantity of pages within the sequence of prior pages in the first section and at least some of the first portion of the paginated content, detecting a second portion of the input; and, in accordance with a determination that the second portion of the input meets fifth content-navigation criteria, wherein the fifth content-navigation criteria include a criterion that is met when the device detects a movement of the focus selector on the display, dynamically enhance a respective edge portion 4028 Dynamically enhancing the respective edge portion occurs while the focus selector is over the respective edge portion (D)

Figure 40E:
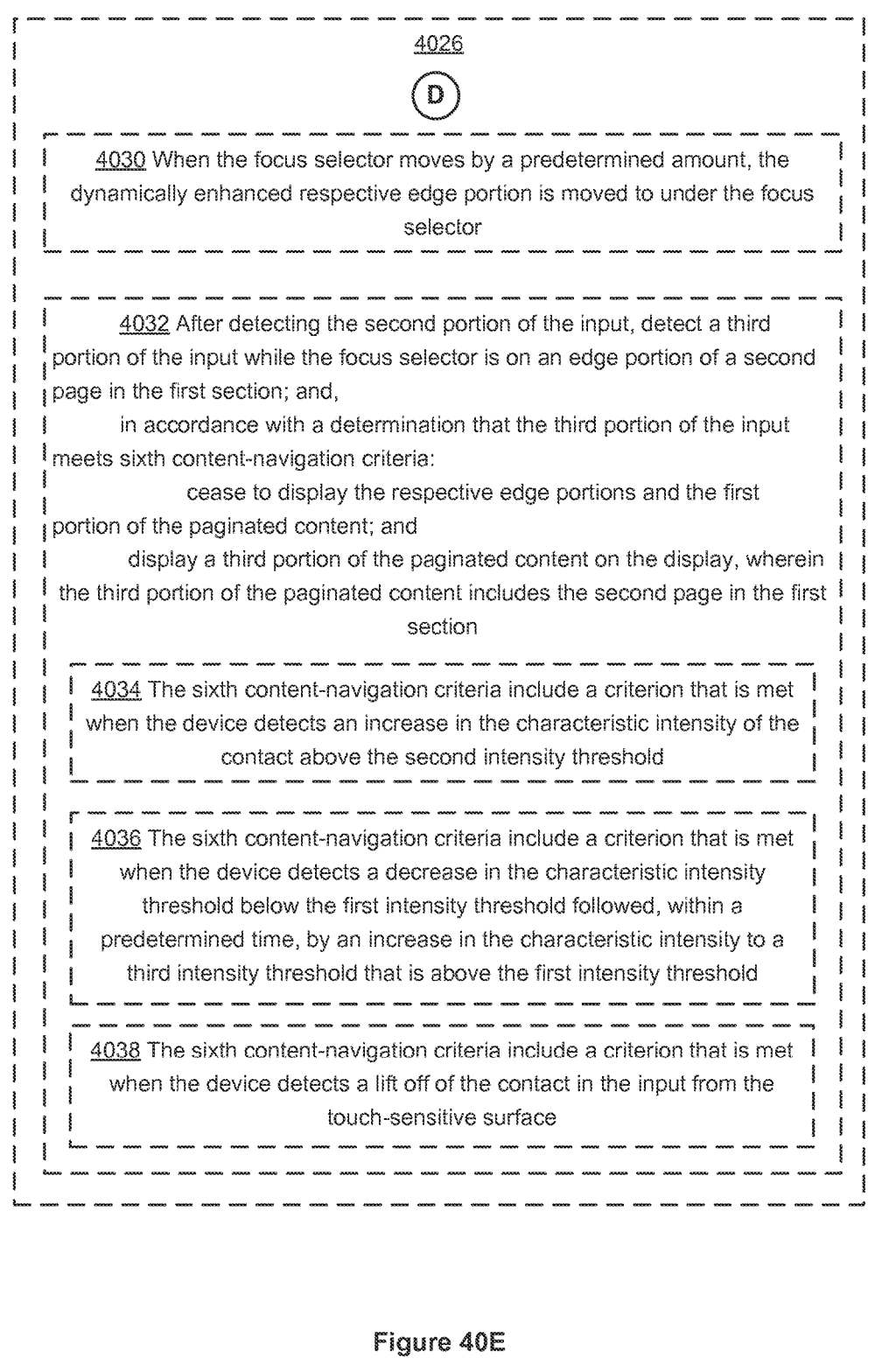

4030 When the focus selector moves by a predetermined amount, the dynamically enhanced respective edge portion is moved to under the focus selector 4032 After detecting the second portion of the input, detect a third portion of the input while the focus selector is on an edge portion of a second page in the first section; and, in accordance with a determination that the third portion of the input meets sixth content-navigation criteria:

cease to display the respective edge portions and the first portion of the paginated content; and display a third portion of the paginated content on the display, wherein the third portion of the paginated content includes the second page in the first section 4034 The sixth content-navigation criteria include a criterion that is met when the device detects an increase in the characteristic intensity of the contact above the second intensity threshold 4036 The sixth content-navigation criteria include a criterion that is met when the device detects a decrease in the characteristic intensity threshold below the first intensity threshold followed, within a predetermined time, by an increase in the characteristic intensity to a third intensity threshold that is above the first intensity threshold 4038 The sixth content-navigation criteria include a criterion that is met when the device detects a lift off of the contact in the input from the touch-sensitive surface

Figure 43A:
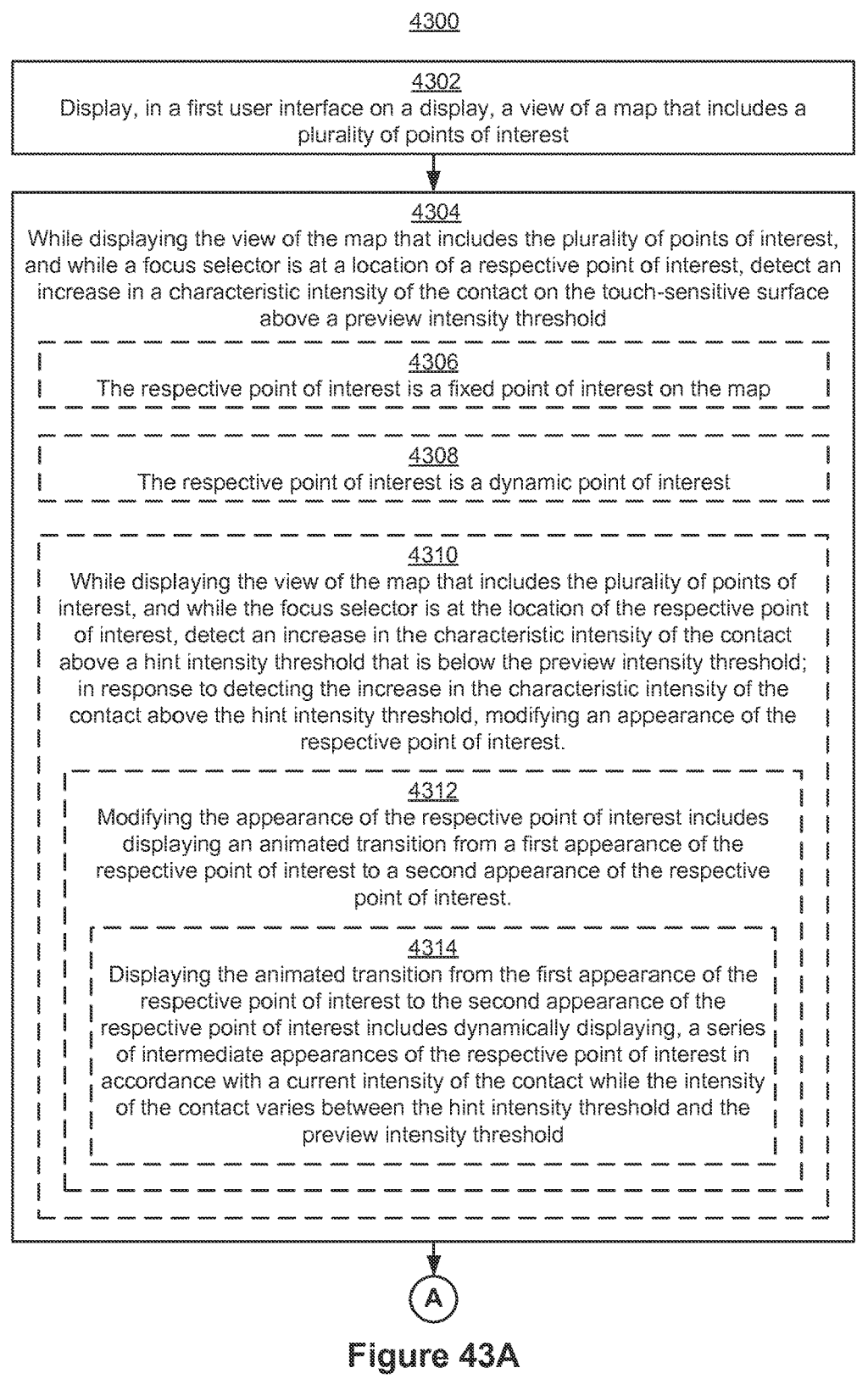

4302
Display, in a first user interface on a display, a view of a map that includes a plurality of points of interest 4304
While displaying the view of the map that includes the plurality of points of interest, and while a focus selector is at a location of a respective point of interest, detect an increase in a characteristic intensity of the contact on the touch-sensitive surface above a preview intensity threshold 4306
The respective point of interest is a fixed point of interest on the map 4308
The respective point of interest is a dynamic point of interest 4310
While displaying the view of the map that includes the plurality of points of interest, and while the focus selector is at the location of the respective point of interest, detect an increase in the characteristic intensity of the contact above a hint intensity threshold that is below the preview intensity threshold; in response to detecting the increase in the characteristic intensity of the contact above the hint intensity threshold, modifying an appearance of the respective point of interest.

4312
Modifying the appearance of the respective point of interest includes displaying an animated transition from a first appearance of the respective point of interest to a second appearance of the respective point of interest.

4314
Displaying the animated transition from the first appearance of the respective point of interest to the second appearance of the respective point of interest includes dynamically displaying, a series of intermediate appearances of the respective point of interest in accordance with a current intensity of the contact while the intensity of the contact varies between the hint intensity threshold and the preview intensity threshold

Figure 43B:
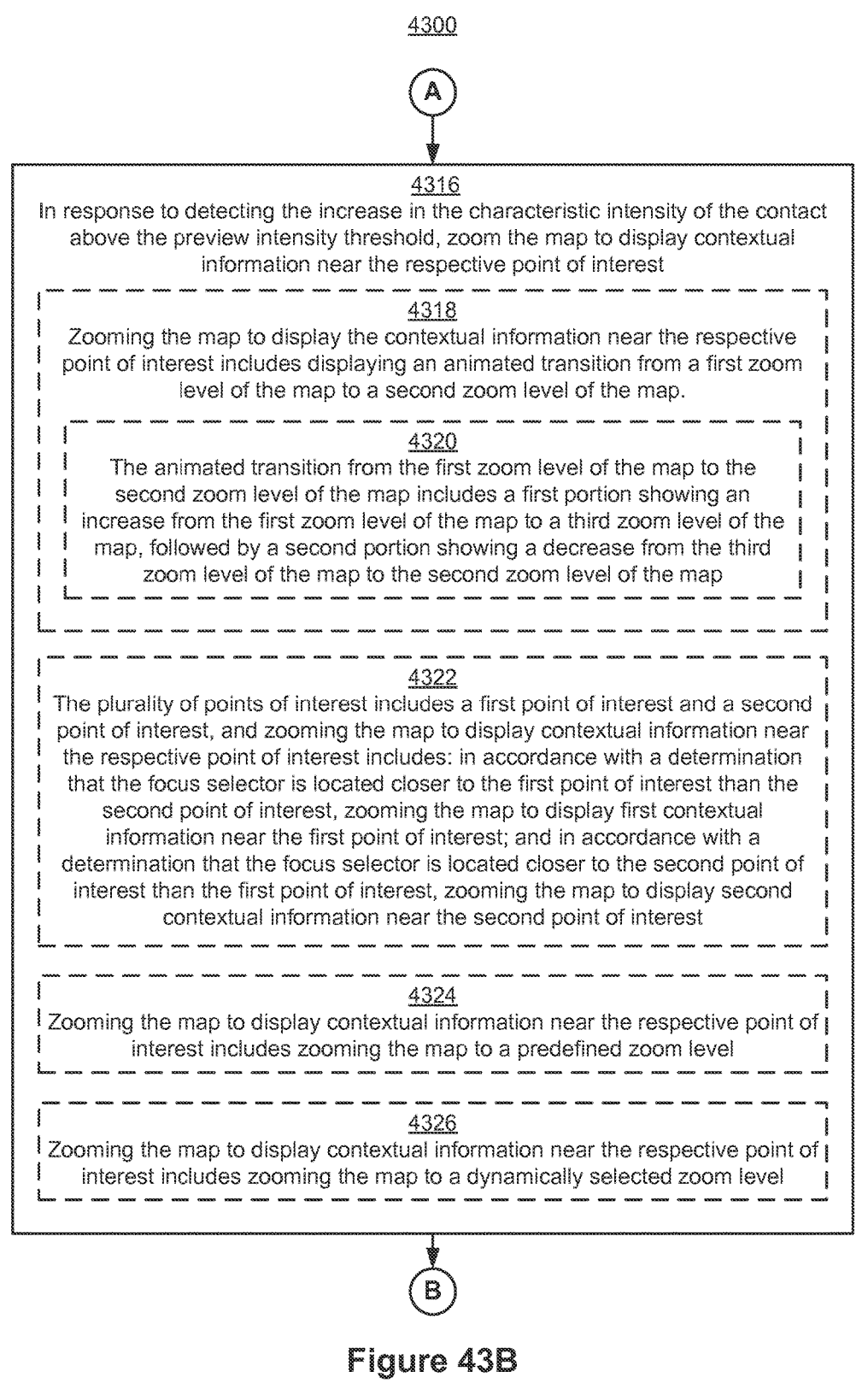

4316
In response to detecting the increase in the characteristic intensity of the contact above the preview intensity threshold, zoom the map to display contextual information near the respective point of interest 4318
Zooming the map to display the contextual information near the respective point of interest includes displaying an animated transition from a first zoom level of the map to a second zoom level of the map.

4320
The animated transition from the first zoom level of the map to the second zoom level of the map includes a first portion showing an increase from the first zoom level of the map to a third zoom level of the map, followed by a second portion showing a decrease from the third zoom level of the map to the second zoom level of the map 4322
The plurality of points of interest includes a first point of interest and a second point of interest, and zooming the map to display contextual information near the respective point of interest includes: in accordance with a determination that the focus selector is located closer to the first point of interest than the second point of interest, zooming the map to display first contextual information near the first point of interest; and in accordance with a determination that the focus selector is located closer to the second point of interest than the first point of interest, zooming the map to display second contextual information near the second point of interest 4324
Zooming the map to display contextual information near the respective point of interest includes zooming the map to a predefined zoom level 4326
Zooming the map to display contextual information near the respective point of interest includes zooming the map to a dynamically selected zoom level (B)

Figure 43C:
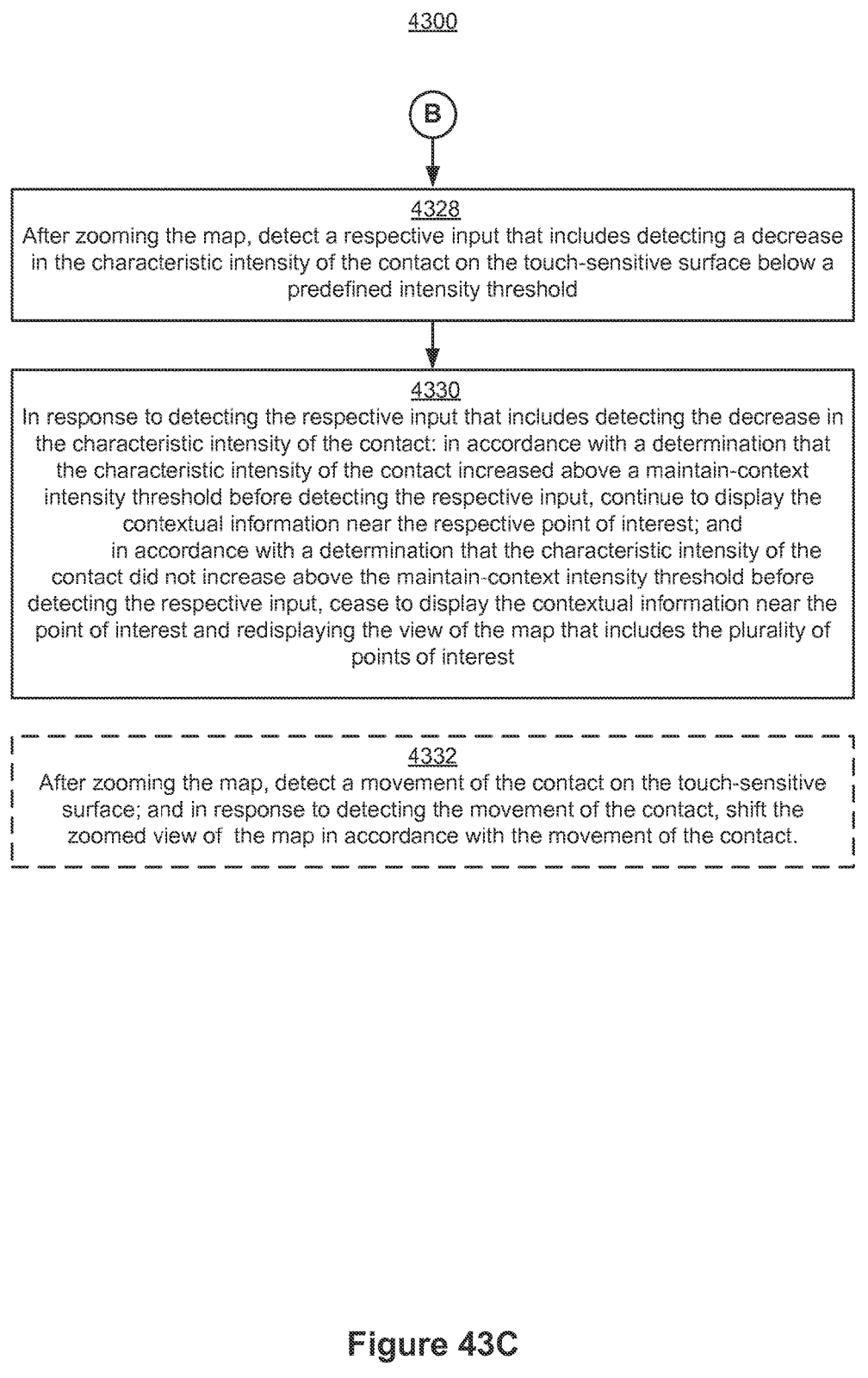

4328
After zooming the map, detect a respective input that includes detecting a decrease in the characteristic intensity of the contact on the touch-sensitive surface below a predefined intensity threshold 4330
In response to detecting the respective input that includes detecting the decrease in the characteristic intensity of the contact: in accordance with a determination that the characteristic intensity of the contact increased above a maintain-context intensity threshold before detecting the respective input, continue to display the contextual information near the respective point of interest; and
in accordance with a determination that the characteristic intensity of the contact did not increase above the maintain-context intensity threshold before detecting the respective input, cease to display the contextual information near the point of interest and redisplaying the view of the map that includes the plurality of points of interest 4332
After zooming the map, detect a movement of the contact on the touch-sensitive surface; and in response to detecting the movement of the contact, shift the zoomed view of the map in accordance with the movement of the contact.

Figure 43D:
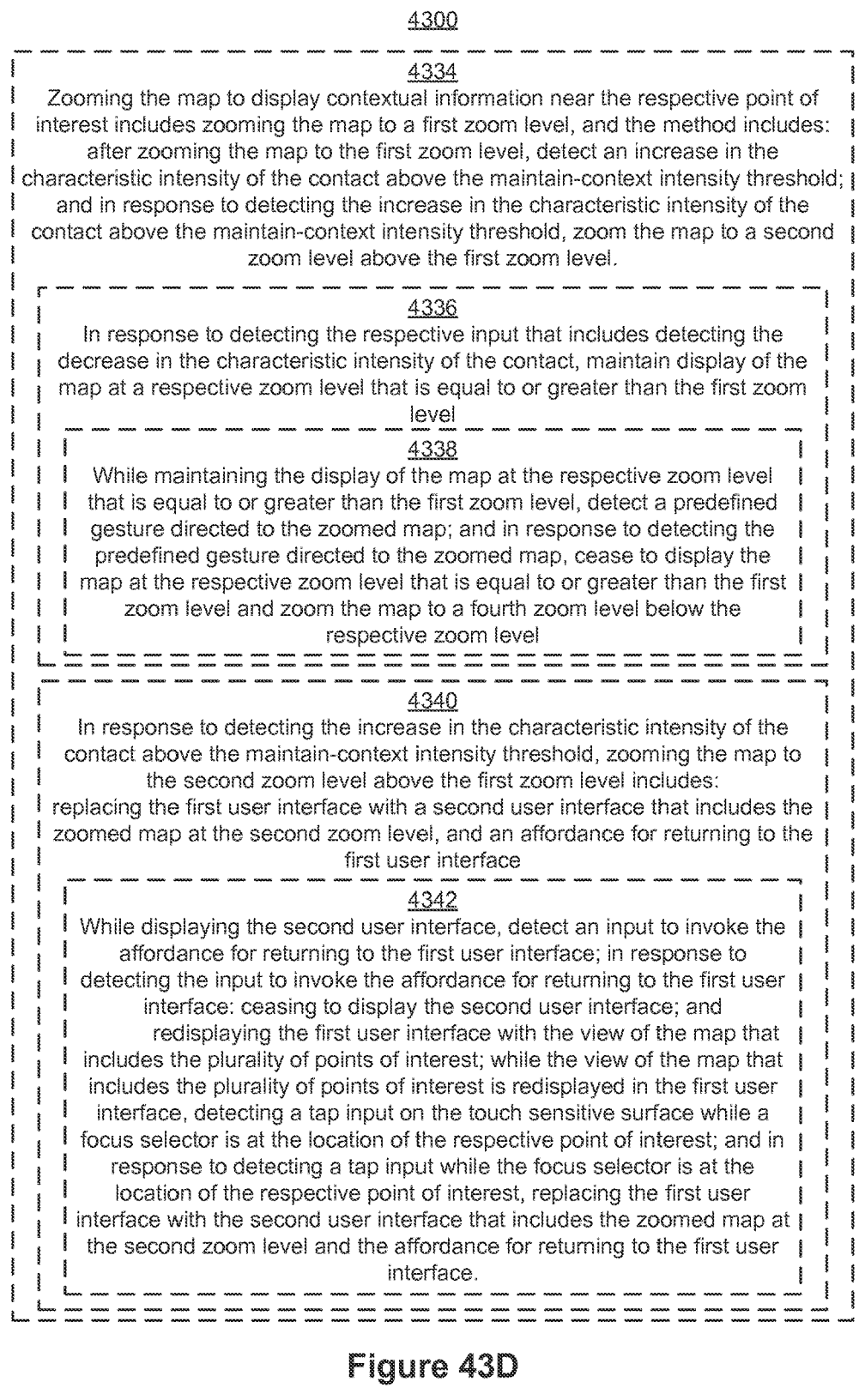

4334
Zooming the map to display contextual information near the respective point of interest includes zooming the map to a first zoom level, and the method includes: after zooming the map to the first zoom level, detect an increase in the characteristic intensity of the contact above the maintain-context intensity threshold; and in response to detecting the increase in the characteristic intensity of the contact above the maintain-context intensity threshold, zoom the map to a second zoom level above the first zoom level.

4336
In response to detecting the respective input that includes detecting the decrease in the characteristic intensity of the contact, maintain display of the map at a respective zoom level that is equal to or greater than the first zoom level 4338
While maintaining the display of the map at the respective zoom level that is equal to or greater than the first zoom level, detect a predefined gesture directed to the zoomed map; and in response to detecting the predefined gesture directed to the zoomed map, cease to display the map at the respective zoom level that is equal to or greater than the first zoom level and zoom the map to a fourth zoom level below the respective zoom level 4340
In response to detecting the increase in the characteristic intensity of the contact above the maintain-context intensity threshold, zooming the map to the second zoom level above the first zoom level includes: replacing the first user interface with a second user interface that includes the zoomed map at the second zoom level, and an affordance for returning to the first user interface 4342
While displaying the second user interface, detect an input to invoke the affordance for returning to the first user interface; in response to detecting the input to invoke the affordance for returning to the first user interface: ceasing to display the second user interface; and redisplaying the first user interface with the view of the map that includes the plurality of points of interest; while the view of the map that includes the plurality of points of interest is redisplayed in the first user interface, detecting a tap input on the touch sensitive surface while a focus selector is at the location of the respective point of interest; and in response to detecting a tap input while the focus selector is at the location of the respective point of interest, replacing the first user interface with the second user interface that includes the zoomed map at the second zoom level and the affordance for returning to the first user interface.

Figure 46A:
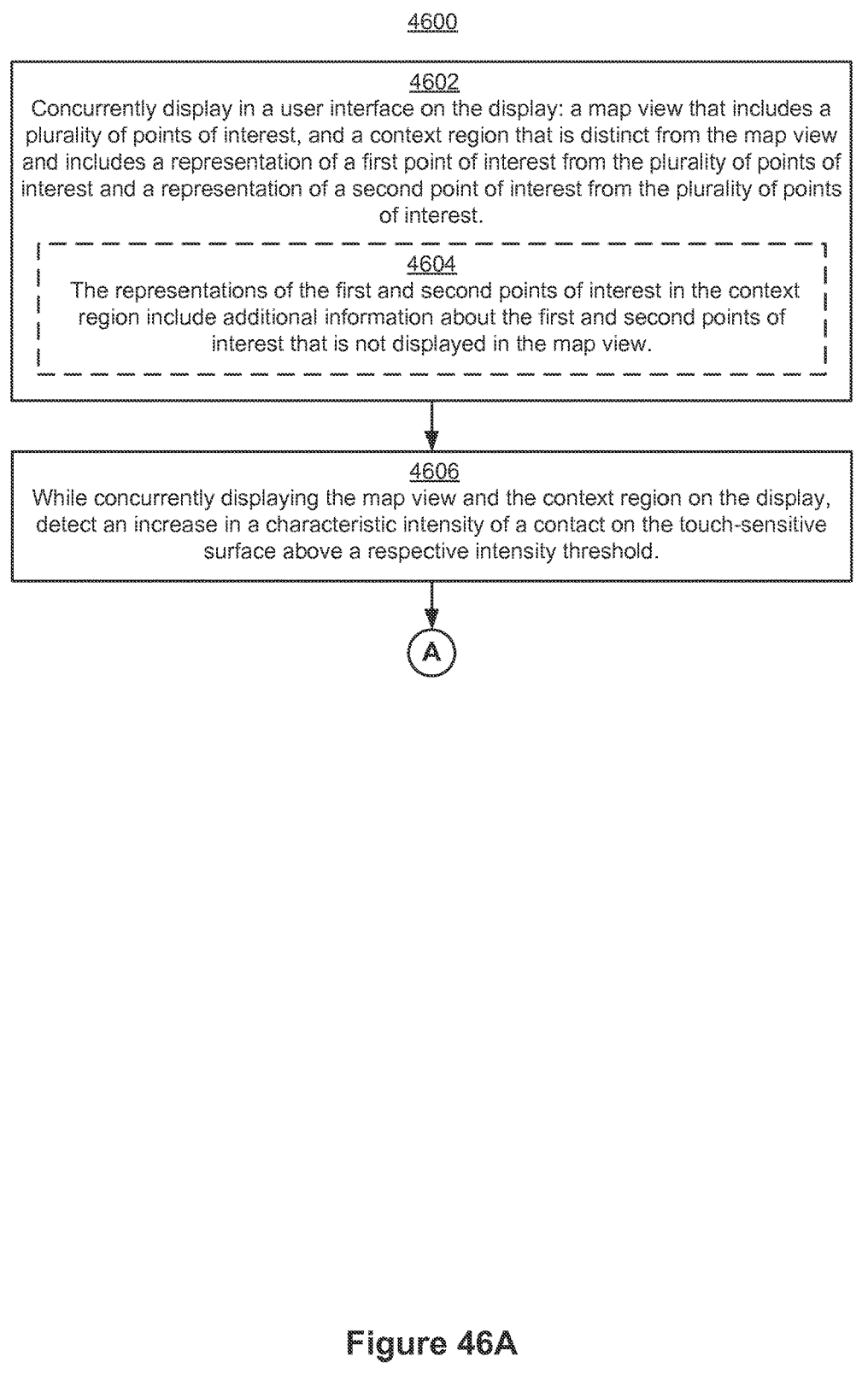

4602
Concurrently display in a user interface on the display: a map view that includes a plurality of points of interest, and a context region that is distinct from the map view and includes a representation of a first point of interest from the plurality of points of interest and a representation of a second point of interest from the plurality of points of interest.

4604
The representations of the first and second points of interest in the context region include additional information about the first and second points of interest that is not displayed in the map view.

4606
While concurrently displaying the map view and the context region on the display, detect an increase in a characteristic intensity of a contact on the touch-sensitive surface above a respective intensity threshold.

Figure 46B:
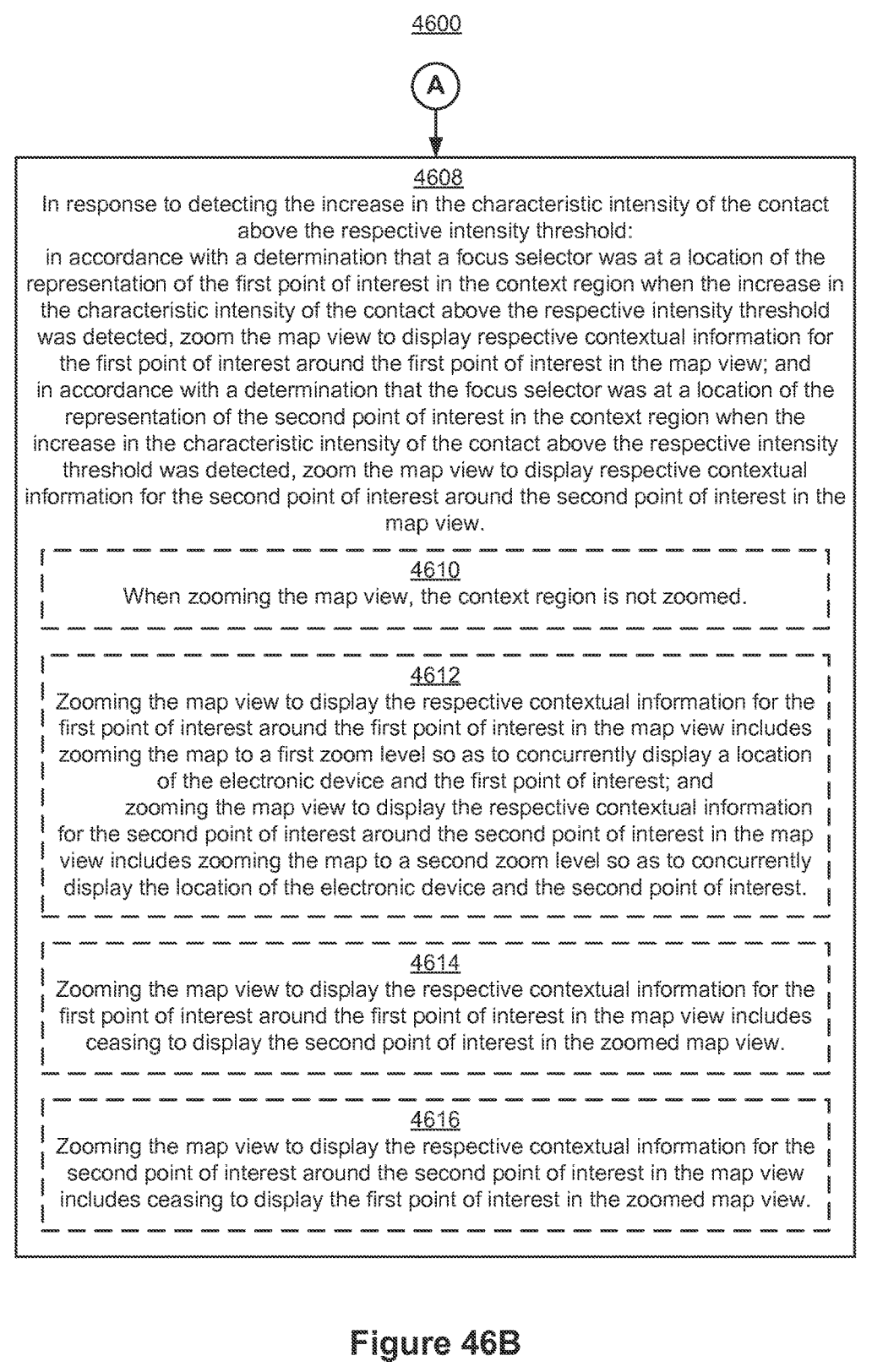

4608
In response to detecting the increase in the characteristic intensity of the contact above the respective intensity threshold:
in accordance with a determination that a focus selector was at a location of the representation of the first point of interest in the context region when the increase in the characteristic intensity of the contact above the respective intensity threshold was detected, zoom the map view to display respective contextual information for the first point of interest around the first point of interest in the map view; and
in accordance with a determination that the focus selector was at a location of the representation of the second point of interest in the context region when the increase in the characteristic intensity of the contact above the respective intensity threshold was detected, zoom the map view to display respective contextual information for the second point of interest around the second point of interest in the map view.

4610
When zooming the map view, the context region is not zoomed.

4612
Zooming the map view to display the respective contextual information for the first point of interest around the first point of interest in the map view includes zooming the map to a first zoom level so as to concurrently display a location of the electronic device and the first point of interest; and
zooming the map view to display the respective contextual information for the second point of interest around the second point of interest in the map view includes zooming the map to a second zoom level so as to concurrently display the location of the electronic device and the second point of interest.

4614
Zooming the map view to display the respective contextual information for the first point of interest around the first point of interest in the map view includes ceasing to display the second point of interest in the zoomed map view.

4616
Zooming the map view to display the respective contextual information for the second point of interest around the second point of interest in the map view includes ceasing to display the first point of interest in the zoomed map view.

Figure 46C:
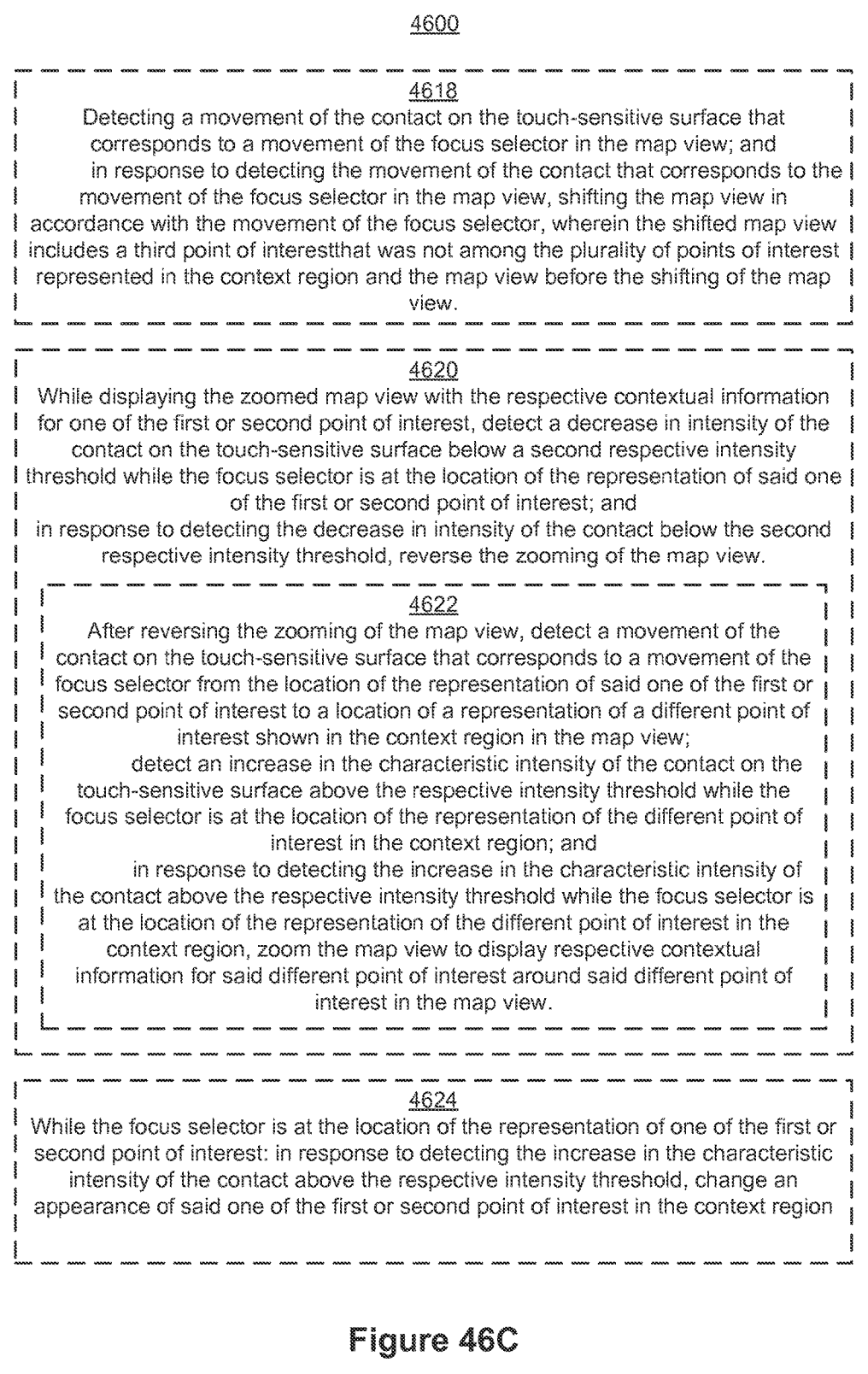

4618
Detecting a movement of the contact on the touch-sensitive surface that corresponds to a movement of the focus selector in the map view; and
in response to detecting the movement of the contact that corresponds to the movement of the focus selector in the map view, shifting the map view in accordance with the movement of the focus selector, wherein the shifted map view includes a third point of interestthat was not among the plurality of points of interest represented in the context region and the map view before the shifting of the map view.

4620
While displaying the zoomed map view with the respective contextual information for one of the first or second point of interest, detect a decrease in intensity of the contact on the touch-sensitive surface below a second respective intensity threshold while the focus selector is at the location of the representation of said one of the first or second point of interest; and
in response to detecting the decrease in intensity of the contact below the second respective intensity threshold, reverse the zooming of the map view.

4622
After reversing the zooming of the map view, detect a movement of the contact on the touch-sensitive surface that corresponds to a movement of the focus selector from the location of the representation of said one of the first or second point of interest to a location of a representation of a different point of interest shown in the context region in the map view;
detect an increase in the characteristic intensity of the contact on the touch-sensitive surface above the respective intensity threshold while the focus selector is at the location of the representation of the different point of interest in the context region; and
in response to detecting the increase in the characteristic intensity of the contact above the respective intensity threshold while the focus selector is at the location of the representation of the different point of interest in the context region, zoom the map view to display respective contextual information for said different point of interest around said different point of interest in the map view.

4624
While the focus selector is at the location of the representation of one of the first or second point of interest: in response to detecting the increase in the characteristic intensity of the contact above the respective intensity threshold, change an appearance of said one of the first or second point of interest in the context region

Figure 46D:
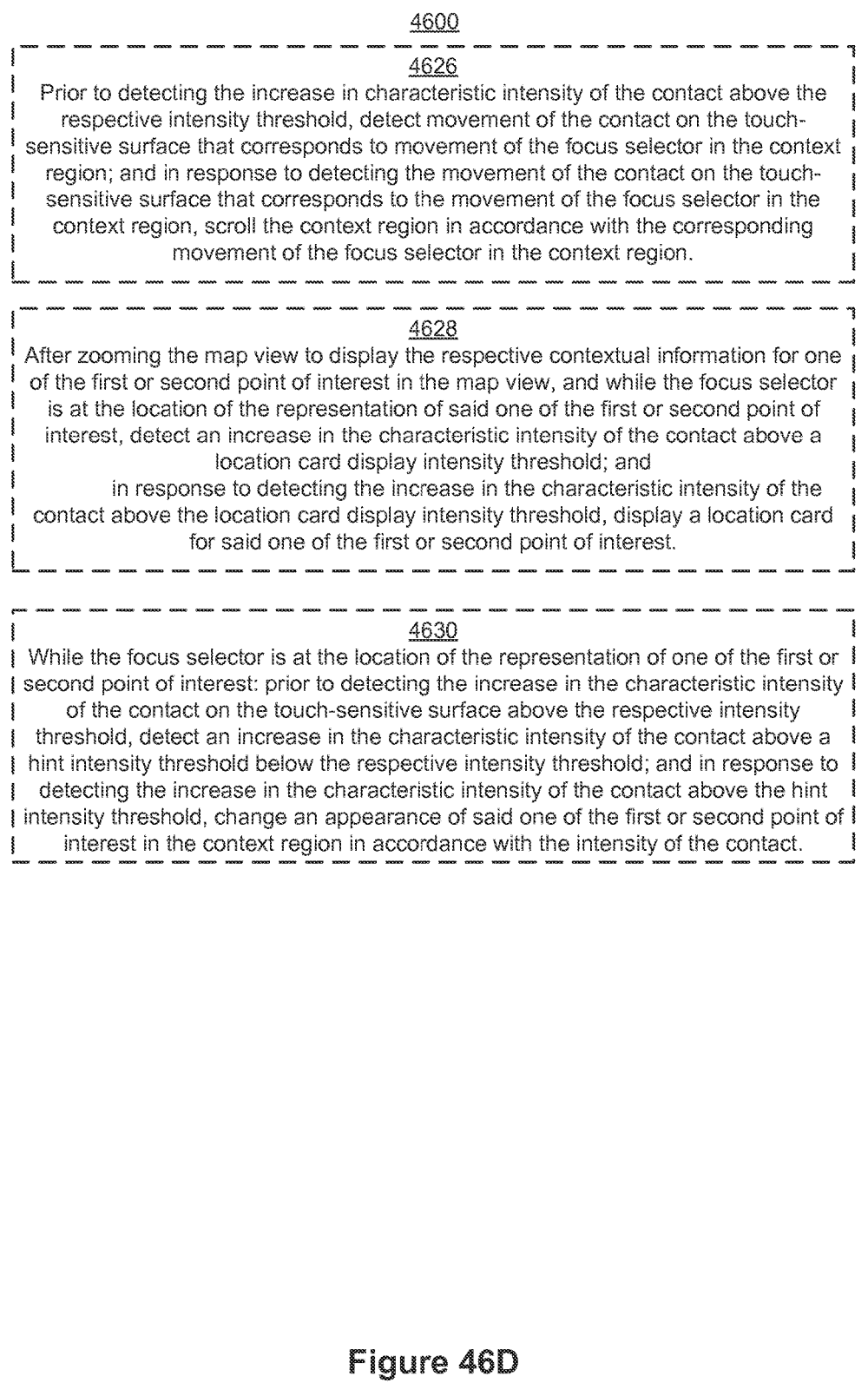

4626
Prior to detecting the increase in characteristic intensity of the contact above the respective intensity threshold, detect movement of the contact on the touch-sensitive surface that corresponds to movement of the focus selector in the context region; and in response to detecting the movement of the contact on the touch-sensitive surface that corresponds to the movement of the focus selector in the context region, scroll the context region in accordance with the corresponding movement of the focus selector in the context region.

4628
After zooming the map view to display the respective contextual information for one of the first or second point of interest in the map view, and while the focus selector is at the location of the representation of said one of the first or second point of interest, detect an increase in the characteristic intensity of the contact above a location card display intensity threshold; and
in response to detecting the increase in the characteristic intensity of the contact above the location card display intensity threshold, display a location card for said one of the first or second point of interest.

4630
While the focus selector is at the location of the representation of one of the first or second point of interest: prior to detecting the increase in the characteristic intensity of the contact on the touch-sensitive surface above the respective intensity threshold, detect an increase in the characteristic intensity of the contact above a hint intensity threshold below the respective intensity threshold; and in response to detecting the increase in the characteristic intensity of the contact above the hint intensity threshold, change an appearance of said one of the first or second point of interest in the context region in accordance with the intensity of the contact.

Figure 49A:
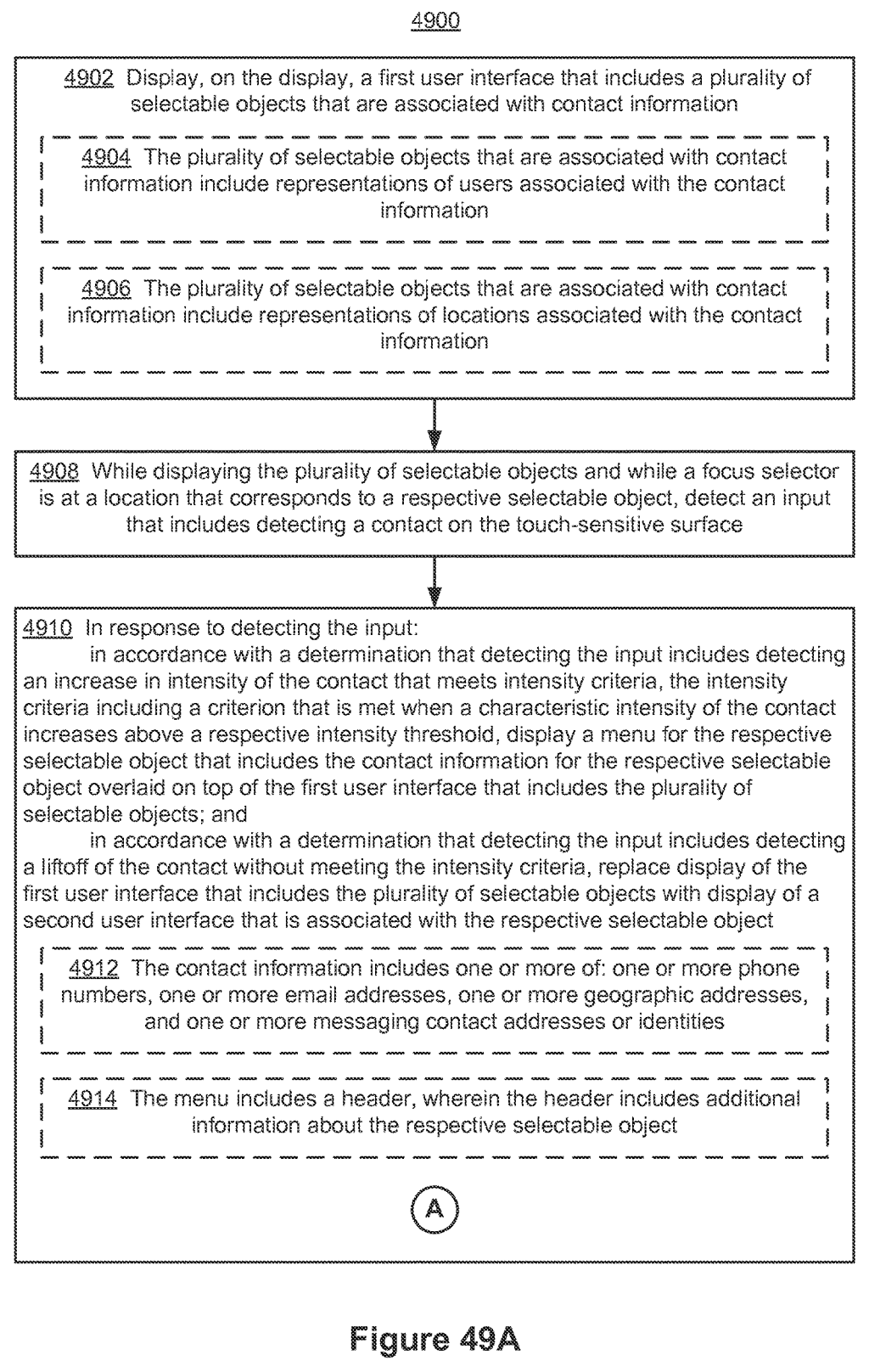

4902 Display, on the display, a first user interface that includes a plurality of selectable objects that are associated with contact information 4904 The plurality of selectable objects that are associated with contact information include representations of users associated with the contact information 4906 The plurality of selectable objects that are associated with contact information include representations of locations associated with the contact information

↓

4908 While displaying the plurality of selectable objects and while a focus selector is at a location that corresponds to a respective selectable object, detect an input that includes detecting a contact on the touch-sensitive surface

↓

4910 In response to detecting the input:

in accordance with a determination that detecting the input includes detecting an increase in intensity of the contact that meets intensity criteria, the intensity criteria including a criterion that is met when a characteristic intensity of the contact increases above a respective intensity threshold, display a menu for the respective selectable object that includes the contact information for the respective selectable object overlaid on top of the first user interface that includes the plurality of selectable objects; and in accordance with a determination that detecting the input includes detecting a liftoff of the contact without meeting the intensity criteria, replace display of the first user interface that includes the plurality of selectable objects with display of a second user interface that is associated with the respective selectable object 4912 The contact information includes one or more of: one or more phone numbers, one or more email addresses, one or more geographic addresses, and one or more messaging contact addresses or identities 4914 The menu includes a header, wherein the header includes additional information about the respective selectable object

Figure 49B:
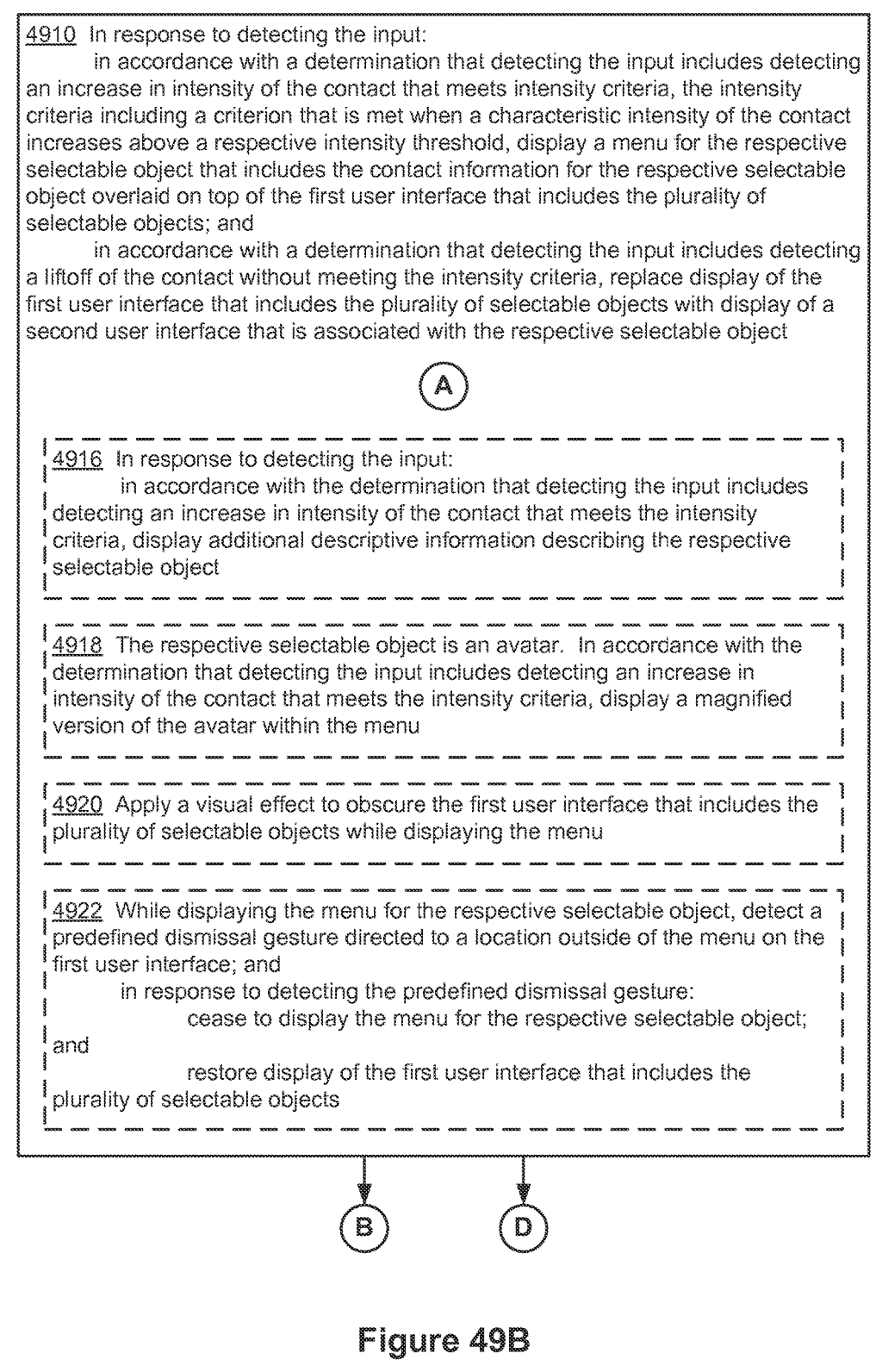

4910 In response to detecting the input:
in accordance with a determination that detecting the input includes detecting an increase in intensity of the contact that meets intensity criteria, the intensity criteria including a criterion that is met when a characteristic intensity of the contact increases above a respective intensity threshold, display a menu for the respective selectable object that includes the contact information for the respective selectable object overlaid on top of the first user interface that includes the plurality of selectable objects; and
in accordance with a determination that detecting the input includes detecting a liftoff of the contact without meeting the intensity criteria, replace display of the first user interface that includes the plurality of selectable objects with display of a second user interface that is associated with the respective selectable object (A)

4916 In response to detecting the input:
in accordance with the determination that detecting the input includes detecting an increase in intensity of the contact that meets the intensity criteria, display additional descriptive information describing the respective selectable object 4918 The respective selectable object is an avatar. In accordance with the determination that detecting the input includes detecting an increase in intensity of the contact that meets the intensity criteria, display a magnified version of the avatar within the menu 4920 Apply a visual effect to obscure the first user interface that includes the plurality of selectable objects while displaying the menu 4922 While displaying the menu for the respective selectable object, detect a predefined dismissal gesture directed to a location outside of the menu on the first user interface; and
in response to detecting the predefined dismissal gesture:
cease to display the menu for the respective selectable object; and
restore display of the first user interface that includes the plurality of selectable objects (B) (D)

Figure 49C:
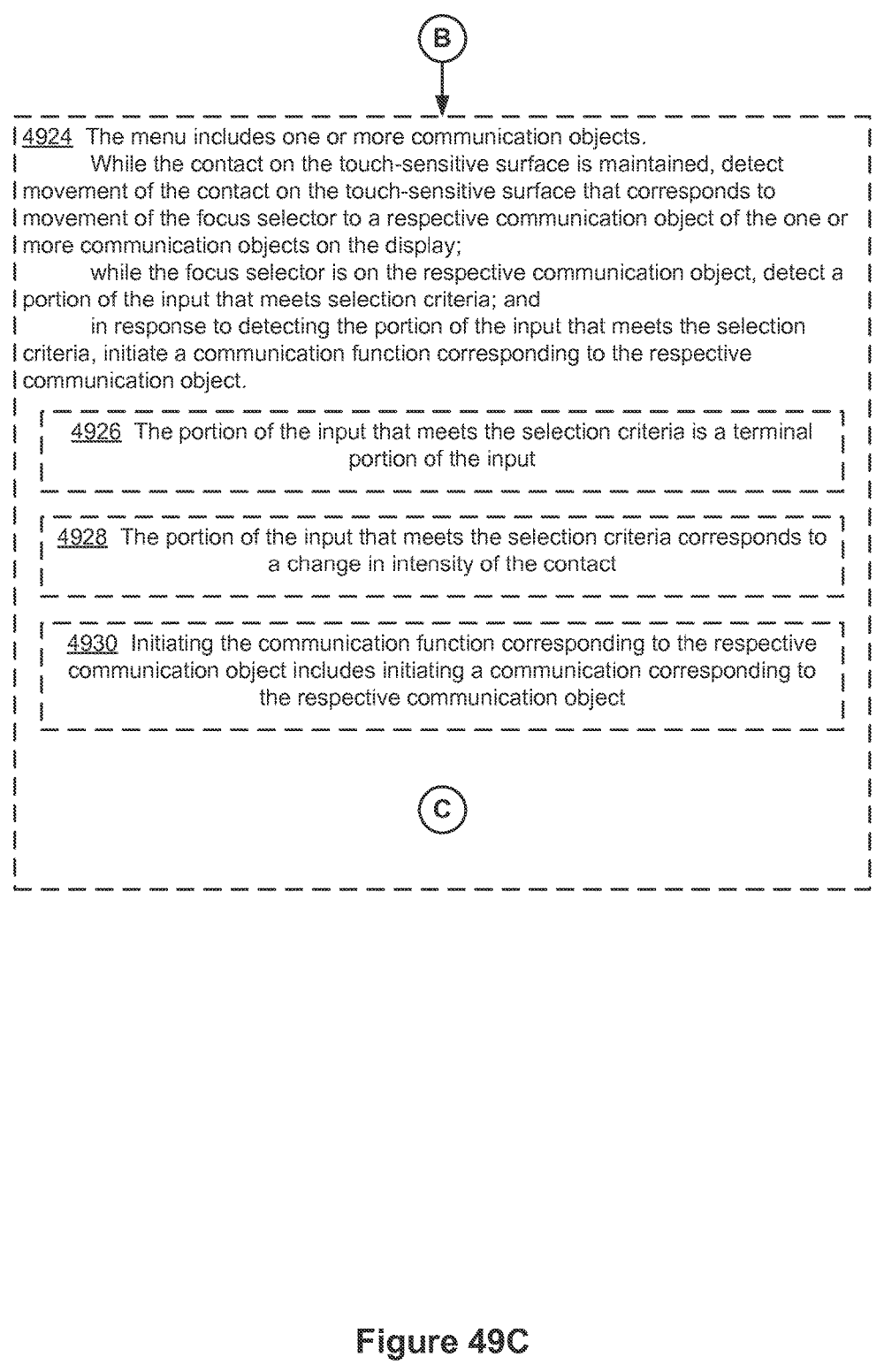

4924 The menu includes one or more communication objects.

While the contact on the touch-sensitive surface is maintained, detect movement of the contact on the touch-sensitive surface that corresponds to movement of the focus selector to a respective communication object of the one or more communication objects on the display;

while the focus selector is on the respective communication object, detect a portion of the input that meets selection criteria; and in response to detecting the portion of the input that meets the selection criteria, initiate a communication function corresponding to the respective communication object.

4926 The portion of the input that meets the selection criteria is a terminal portion of the input 4928 The portion of the input that meets the selection criteria corresponds to a change in intensity of the contact 4930 Initiating the communication function corresponding to the respective communication object includes initiating a communication corresponding to the respective communication object

Figure 49D:
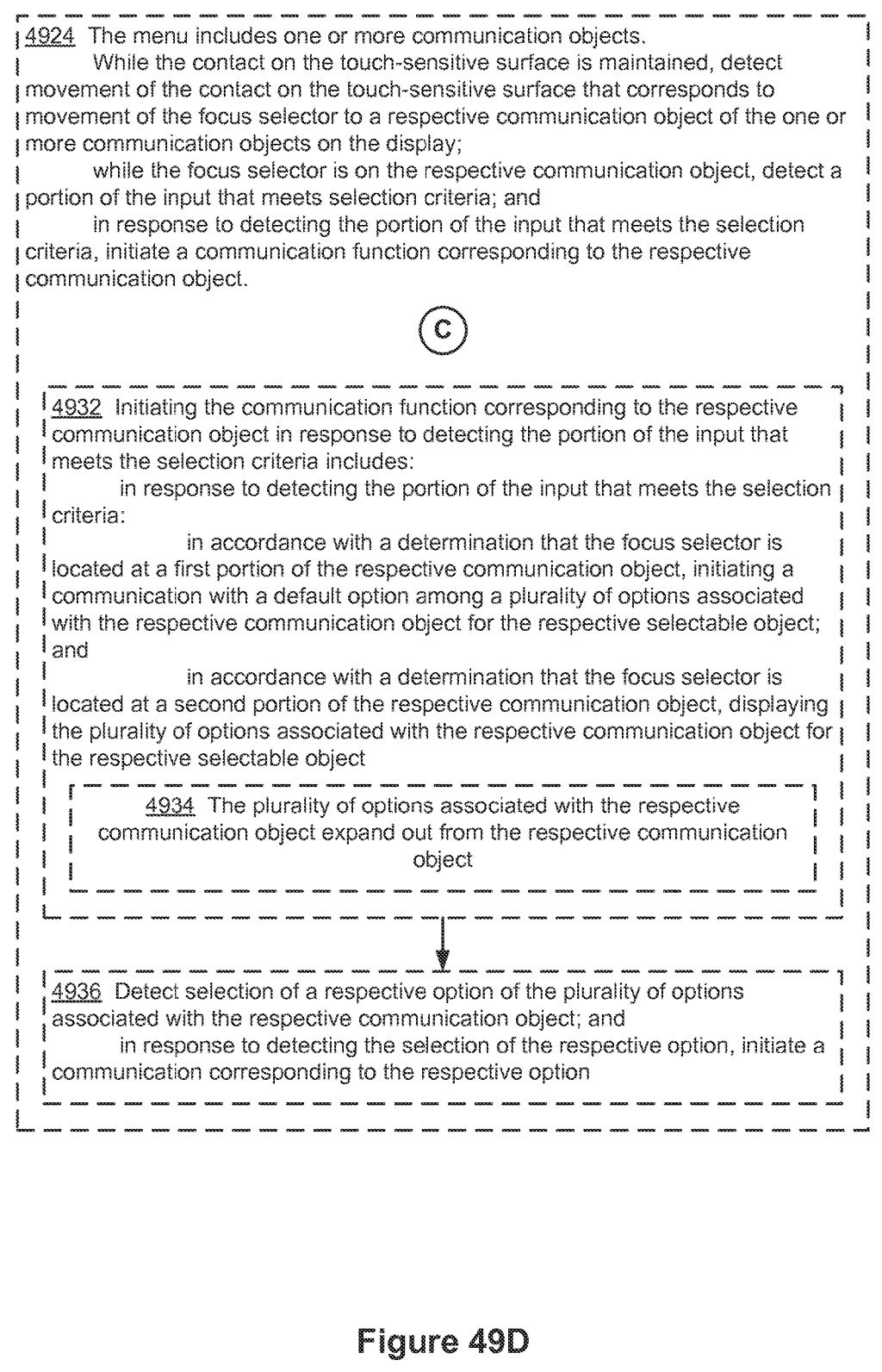

4924 The menu includes one or more communication objects.

While the contact on the touch-sensitive surface is maintained, detect movement of the contact on the touch-sensitive surface that corresponds to movement of the focus selector to a respective communication object of the one or more communication objects on the display;

while the focus selector is on the respective communication object, detect a portion of the input that meets selection criteria; and in response to detecting the portion of the input that meets the selection criteria, initiate a communication function corresponding to the respective communication object.

(C)

4932 Initiating the communication function corresponding to the respective communication object in response to detecting the portion of the input that meets the selection criteria includes:

in response to detecting the portion of the input that meets the selection criteria:

in accordance with a determination that the focus selector is located at a first portion of the respective communication object, initiating a communication with a default option among a plurality of options associated with the respective communication object for the respective selectable object; and in accordance with a determination that the focus selector is located at a second portion of the respective communication object, displaying the plurality of options associated with the respective communication object for the respective selectable object 4934 The plurality of options associated with the respective communication object expand out from the respective communication object 4936 Detect selection of a respective option of the plurality of options associated with the respective communication object; and in response to detecting the selection of the respective option, initiate a communication corresponding to the respective option

Figure 49E:
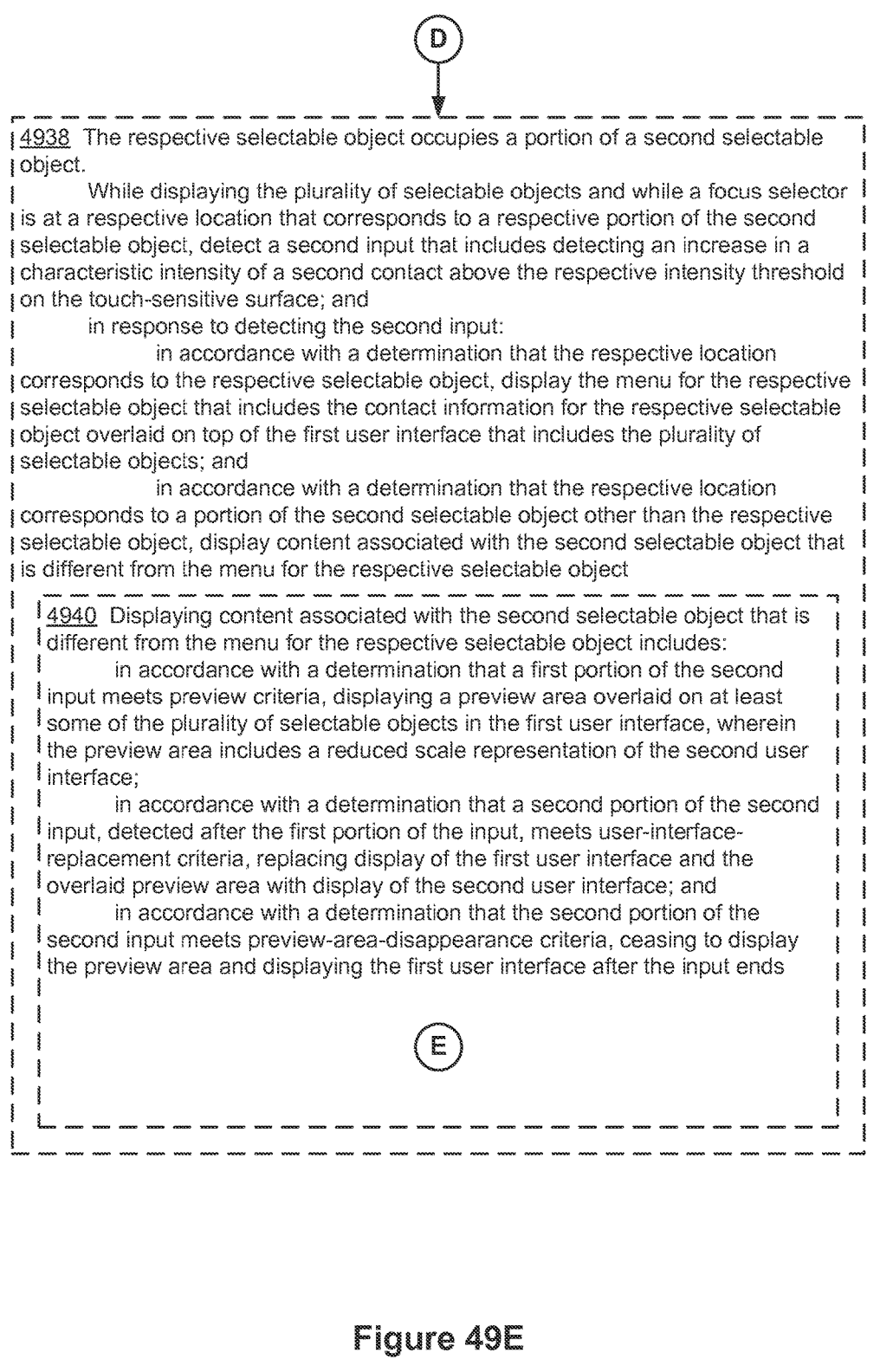

4938 The respective selectable object occupies a portion of a second selectable object.

While displaying the plurality of selectable objects and while a focus selector is at a respective location that corresponds to a respective portion of the second selectable object, detect a second input that includes detecting an increase in a characteristic intensity of a second contact above the respective intensity threshold on the touch-sensitive surface; and in response to detecting the second input:

in accordance with a determination that the respective location corresponds to the respective selectable object, display the menu for the respective selectable object that includes the contact information for the respective selectable object overlaid on top of the first user interface that includes the plurality of selectable objects; and in accordance with a determination that the respective location corresponds to a portion of the second selectable object other than the respective selectable object, display content associated with the second selectable object that is different from the menu for the respective selectable object 4940 Displaying content associated with the second selectable object that is different from the menu for the respective selectable object includes:

in accordance with a determination that a first portion of the second input meets preview criteria, displaying a preview area overlaid on at least some of the plurality of selectable objects in the first user interface, wherein the preview area includes a reduced scale representation of the second user interface;

in accordance with a determination that a second portion of the second input, detected after the first portion of the input, meets user-interface-replacement criteria, replacing display of the first user interface and the overlaid preview area with display of the second user interface; and in accordance with a determination that the second portion of the second input meets preview-area-disappearance criteria, ceasing to display the preview area and displaying the first user interface after the input ends

4940 Displaying content associated with the second selectable object that is different from the menu for the respective selectable object includes:

in accordance with a determination that a first portion of the second input meets preview criteria, displaying a preview area overlaid on at least some of the plurality of selectable objects in the first user interface, wherein the preview area includes a reduced scale representation of the second user interface;

in accordance with a determination that a second portion of the second input, detected after the first portion of the input, meets user-interface-replacement criteria, replacing display of the first user interface and the overlaid preview area with display of the second user interface; and in accordance with a determination that the second portion of the second input meets preview-area-disappearance criteria, ceasing to display the preview area and displaying the first user interface after the input ends

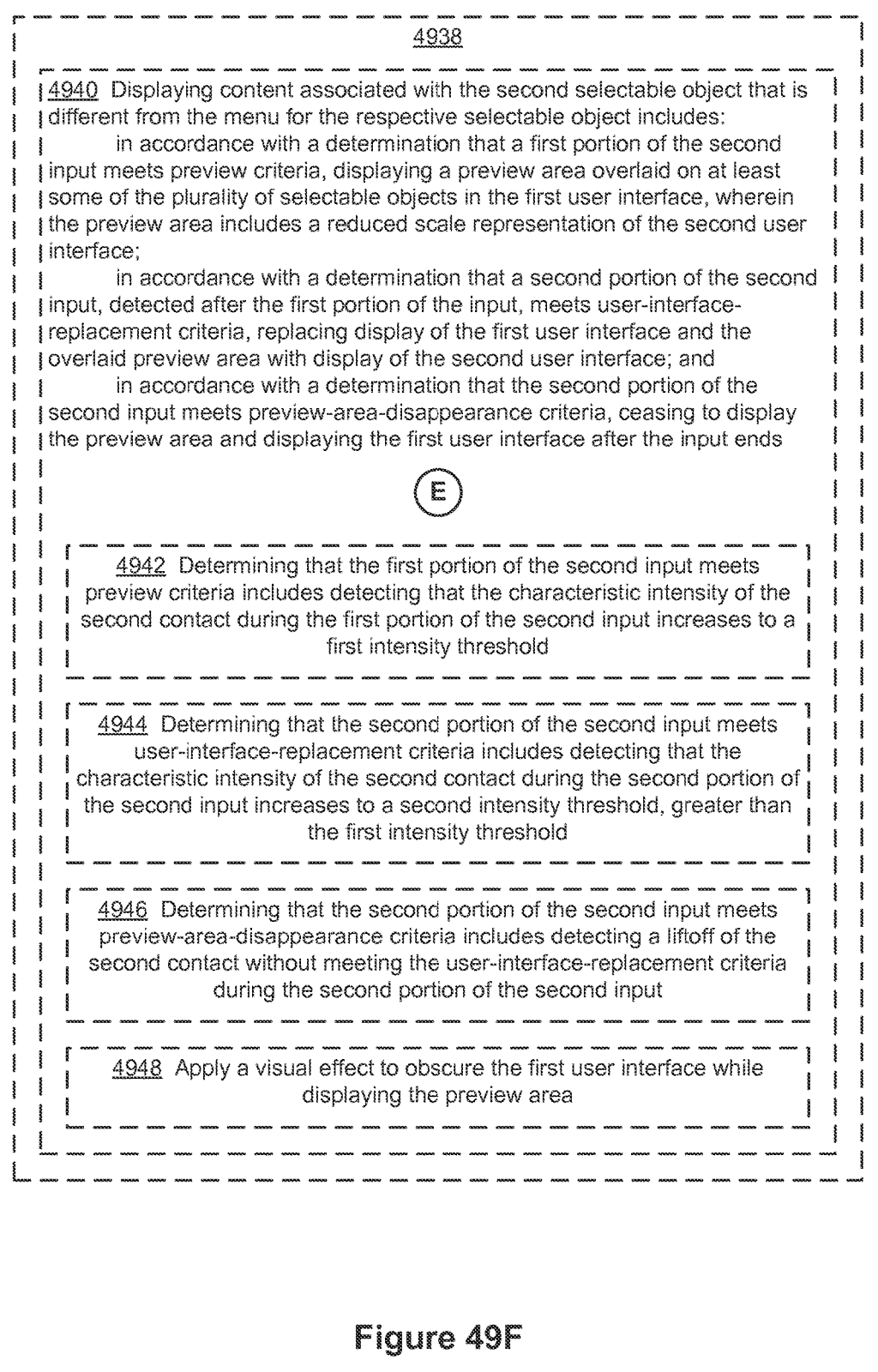

E

4942 Determining that the first portion of the second input meets preview criteria includes detecting that the characteristic intensity of the second contact during the first portion of the second input increases to a first intensity threshold 4944 Determining that the second portion of the second input meets user-interface-replacement criteria includes detecting that the characteristic intensity of the second contact during the second portion of the second input increases to a second intensity threshold, greater than the first intensity threshold 4946 Determining that the second portion of the second input meets preview-area-disappearance criteria includes detecting a liftoff of the second contact without meeting the user-interface-replacement criteria during the second portion of the second input 4948 Apply a visual effect to obscure the first user interface while displaying the preview area

Figure 49F

DEVICES, METHODS, AND GRAPHICAL USER INTERFACES FOR MANIPULATING USER INTERFACE OBJECTS WITH VISUAL AND/OR HAPTIC FEEDBACK

RELATED APPLICATIONS

This application is a continuation of U.S. application Ser. No. 14/869,899, filed Sep. 29, 2015, which claims priority to: (1) U.S. Provisional Application Ser. No. 62/215,722, filed Sep. 8, 2015, entitled "Devices, Methods, and Graphical User Interfaces for Manipulating User Interface Objects with Visual and/or Haptic Feedback"; (2) U.S. Provisional Application Ser. No. 62/213,609, filed Sep. 2, 2015, entitled "Devices, Methods, and Graphical User Interfaces for Manipulating User Interface Objects with Visual and/or Haptic Feedback"; (3) U.S. Provisional Application Ser. No. 62/203,387, filed Aug. 10, 2015, entitled "Devices, Methods, and Graphical User Interfaces for Manipulating User Interface Objects with Visual and/or Haptic Feedback"; (4) U.S. Provisional Application Ser. No. 62/215,696, filed Sep. 8, 2015, entitled "Devices and Methods for Navigating Between User Interfaces"; (5) U.S. Provisional Application Ser. No. 62/213,606, filed Sep. 2, 2015, entitled "Devices and Methods for Navigating Between User Interfaces"; and (6) U.S. Provisional Application Ser. No. 62/172,226, filed Jun. 7, 2015, entitled "Devices and Methods for Navigating Between User Interfaces," all of which are incorporated by reference herein in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interfaces on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, and control elements such as buttons and other graphics.

A user will, in some circumstances, need to perform such manipulations on user interface objects in a file management program (e.g., Finder from Apple Inc. of Cupertino, Calif.), a messaging application (e.g., Messages from Apple Inc. of Cupertino, Calif.), an image management application (e.g., Photos from Apple Inc. of Cupertino, Calif.), a camera application (e.g., Camera from Apple Inc. of Cupertino, Calif.), a map application (e.g., Maps from Apple Inc. of Cupertino, Calif.), a note taking application (e.g., Notes from Apple Inc. of Cupertino, Calif.), digital content (e.g., videos and music) management applications (e.g., Music and iTunes from Apple Inc. of Cupertino, Calif.), a news application (e.g., News from Apple Inc. of Cupertino, Calif.), a phone application (e.g., Phone from Apple Inc. of Cupertino, Calif.), an email application (e.g., Mail from Apple Inc. of Cupertino, Calif.), a browser application (e.g., Safari from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a spreadsheet application (e.g., Numbers from Apple Inc. of Cupertino, Calif.), a reader application (e.g., iBooks from Apple Inc. of Cupertino, Calif.), a video making application (e.g., iMovie from Apple Inc. of Cupertino, Calif.), and/or geo location applications (e.g., Find Friends and Find iPhone from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a touch-sensitive surface and a display. The device includes one or more sensors to detect intensity of contacts with the touch-sensitive surface. The device displays a plurality of user interface objects in a first user interface on the display. The device detects a contact at a location on the touch-sensitive surface while a focus selector is at a location of a first user interface object, in the plurality of user interface objects, on the display. While the focus selector is at the location of the first user interface object on the display, the device detects an increase in a characteristic intensity of the contact to a first intensity threshold; in response to detecting the increase in the characteristic intensity of the contact to the first intensity threshold, the device visually obscures the plurality of user interface objects, other than the first user interface object, in the first user interface while maintaining display of the first user interface object without visually obscuring the first user interface object; the device detects that the characteristic intensity of the contact continues to increase above the first intensity threshold; and, in response to detecting that the characteristic intensity of the contact continues to increase above the first intensity threshold, the device dynamically increases the amount of visual obscuring of the plurality of user interface objects, other than the first user interface object, in the first user interface while maintaining display of the first user interface object without visually obscuring the first user interface object.

In accordance with some embodiments, an electronic device includes a display unit configured to display user interface objects; a touch-sensitive surface unit configured to receive contacts; one or more sensor units configured to detect intensity of contacts with the touch-sensitive surface unit; and a processing unit coupled to the display unit, the touch-sensitive surface unit and the one or more sensor units. The processing unit is configured to enable display of a plurality of user interface objects in a first user interface on the display unit; detect a contact at a location on the touch-sensitive surface unit while a focus selector is at a location of a first user interface object, in the plurality of user interface objects, on the display unit; and, while the focus selector is at the location of the first user interface object on the display unit: detect an increase in a characteristic intensity of the contact to a first intensity threshold; in response to detecting the increase in the characteristic intensity of the contact to the first intensity threshold, visually obscure the plurality of user interface objects, other than the first user interface object, in the first user interface while maintaining display of the first user interface object without visually obscuring the first user interface object; detect that the characteristic intensity of the contact continues to increase above the first intensity threshold; and, in response to detecting that the characteristic intensity of the contact continues to increase above the first intensity threshold, dynamically increase the amount of visual obscuring of the plurality of user interface objects, other than the first user interface object, in the first user interface while maintaining display of the first user interface object without visually obscuring the first user interface object.

In accordance with some embodiments, a method is performed at an electronic device with a touch-sensitive surface and a display. The device includes one or more sensors to detect intensity of contacts with the touch-sensitive surface. The device displays a plurality of user interface objects in a first user interface on the display. The device detects an input by a contact while a focus selector is over a first user interface object, in the plurality of user interface objects, on the display. In accordance with a determination that the input meets selection criteria, the device displays a second user interface that is distinct from the first user interface in response to detecting the input. In accordance with a determination that a first portion of the input meets preview criteria, the device displays a preview area overlaid on at least some of the plurality of user interface objects in the first user interface in response to detecting the first portion of the input, wherein the preview area includes a reduced scale representation of the second user interface. In accordance with a determination that a second portion of the input by the contact, detected after the first portion of the input, meets user-interface-replacement criteria, the device replaces display of the first user interface and the overlaid preview area with display of the second user interface. In accordance with a determination that the second portion of the input by the contact meets preview-area-disappearance criteria, the device ceases to display the preview area and displays the first user interface after the input ends.

In accordance with some embodiments, an electronic device includes a display unit configured to display user interface objects; a touch-sensitive surface unit configured to receive contacts; one or more sensor units configured to detect intensity of contacts with the touch-sensitive surface unit; and a processing unit coupled to the display unit, the touch-sensitive surface unit and the one or more sensor units. The processing unit is configured to enable display of a plurality of user interface objects in a first user interface on the display unit. The processing unit is configured to detect an input by a contact while a focus selector is over a first user interface object, in the plurality of user interface objects, on the display unit. In accordance with a determination that the input meets selection criteria, the processing unit is configured to enable display of a second user interface that is distinct from the first user interface in response to detecting the input. In accordance with a determination that a first portion of the input meets preview criteria, the processing unit is configured to enable display of a preview area overlaid on at least some of the plurality of user interface objects in the first user interface in response to detecting the first portion of the input, wherein the preview area includes a reduced scale representation of the second user interface. In accordance with a determination that a second portion of the input by the contact, detected after the first portion of the input, meets user-interface-replacement criteria, the processing unit is configured to replace display of the first user interface and the overlaid preview area with display of the second user interface. In accordance with a determination that the second portion of the input by the contact meets preview-area-disappearance criteria, the processing unit is configured to cease to display the preview area and enable display of the first user interface after the input ends.

In accordance with some embodiments, a method is performed at an electronic device with a touch-sensitive surface and a display. The device includes one or more sensors to detect intensity of contacts with the touch-sensitive surface. The device displays a plurality of user interface objects in a first user interface on the display. The device detects a first portion of a press input by a contact at a location on the touch-sensitive surface that corresponds to a location of a first user interface object, in the plurality of user interface objects, on the display. While detecting the first portion of the press input by the contact at the location on the touch-sensitive surface that corresponds to the location of the first user interface object, in the plurality of user interface objects, on the display, the device selects the first user interface object and detects the intensity of the contact increase to a second intensity threshold. In response to detecting the intensity of the contact increase to the second intensity threshold, the device displays in the first user interface a preview area overlaid on at least some of the plurality of user interface objects. After detecting the first portion of the press input, the device detects a second portion of the press input by the contact. In response to detecting the second portion of the press input by the contact, in accordance with a determination that the second portion of the press input by the contact meets user-interface-replacement criteria, the device replaces display of the first user interface with a second user interface that is distinct from the first user interface. In accordance with a determination that the second portion of the press input by the contact meets preview-area-maintenance criteria, the device maintains display, after the press input ends, of the preview area overlaid on at least some of the plurality of user interface objects in the first user interface. In accordance with a determination that the second portion of the press input by the contact meets preview-area-disappearance criteria, the device ceases to display to the preview area and maintains display, after the press input ends, of the first user interface.

In accordance with some embodiments, a method is performed at an electronic device with a display, a touch-sensitive surface, and one or more sensors to detect intensity of contacts with the touch-sensitive surface. The method includes displaying, on the display, a first user interface that includes a plurality of selectable user interface objects, including one or more user interface objects of a first type and one or more user interface objects of a second type that is distinct from the first type. While displaying the first user interface on the display, the device detects a first portion of a first input that includes detecting an increase in a characteristic intensity of a first contact on the touch-sensitive surface above a first intensity threshold while a focus selector is over a respective user interface object of the plurality of selectable user interface objects. In response to detecting the first portion of the first input, the device displays supplemental information associated with the respective user interface object. While displaying the supplemental information associated with the respective user interface object, the device detects an end of the first input. In response to detecting the end of the first input: in accordance with a determination that the respective user interface object is the first type of user interface object, the device ceases to display the supplemental information associated with the respective user interface object; and, in accordance with a determination that the respective user interface object is the second type of user interface object, the device maintains display of the supplemental information associated with the respective user interface object after detecting the end of the first input.

In accordance with some embodiments, an electronic device includes a display unit configured to display content items, a touch-sensitive surface unit configured to receive user inputs, one or more sensor units configured to detect intensity of contacts with the touch-sensitive surface unit, and a processing unit coupled to the display unit, the touch-sensitive surface unit and the one or more sensor units. The processing unit is configured to: enable display, on the display unit, of a first user interface that includes a plurality of selectable user interface objects, including one or more user interface objects of a first type and one or more user interface objects of a second type that is distinct from the first type; while the first user interface is displayed on the display unit, detect a first portion of a first input that includes detecting an increase in a characteristic intensity of a first contact on the touch-sensitive surface above a first intensity threshold while a focus selector is over a respective user interface object of the plurality of selectable user interface objects; in response to detecting the first portion of the first input, enable display of supplemental information associated with the respective user interface object; while the supplemental information associated with the respective user interface object is displayed, detect an end of the first input; and, in response to detecting the end of the first input: in accordance with a determination that the respective user interface object is the first type of user interface object, cease to enable display of the supplemental information associated with the respective user interface object; and, in accordance with a determination that the respective user interface object is the second type of user interface object, maintaining display of the supplemental information associated with the respective user interface object after detecting the end of the first input.

In accordance with some embodiments, a method is performed at an electronic device with a display, a touch-sensitive surface, and one or more sensors to detect intensity of contacts with the touch-sensitive surface. The device displays a first user interface on the display, wherein the first user interface includes a background with a first appearance and one or more foreground objects. While displaying the first user interface on the display, the device detects a first input by a first contact on the touch-sensitive surface while a first focus selector is at a location in the first user interface that corresponds to the background of the first user interface. In response to detecting the first input by the first contact, in accordance with a determination that the first contact has a characteristic intensity above a first intensity threshold, the device dynamically changes the appearance of the background of the first user interface without changing the appearance of the one or more foreground objects in the first user interface, wherein the dynamic change in the appearance of the background of the first user interface is based at least in part on the characteristic intensity of the first contact. While dynamically changing the appearance of the background of the first user interface, detecting termination of the first input by the first contact; and, in response to detecting termination of the first input by the first contact, the device reverts the background of the first user interface back to the first appearance of the background.

In accordance with some embodiments, an electronic device includes a display unit configured to display user interfaces, backgrounds and foreground objects, a touch-sensitive surface unit configured to receive user inputs, one or more sensor units configured to detect intensity of contacts with the touch-sensitive surface unit, and a processing unit coupled to the display unit, the touch-sensitive surface unit and the one or more sensor units. The processing unit is configured to enable display of a first user interface on the display, wherein the first user interface includes a background with a first appearance and one or more foreground objects. While displaying the first user interface on the display, the processing unit is configured to detect a first input by a first contact on the touch-sensitive surface unit while a first focus selector is at a location in the first user interface that corresponds to the background of the first user interface. In response to detecting the first input by the first contact, in accordance with a determination that the first contact has a characteristic intensity above a first intensity threshold, the processing unit is configured to dynamically change the appearance of the background of the first user interface without changing the appearance of the one or more foreground objects in the first user interface, wherein the dynamic change in the appearance of the background of the first user interface is based at least in part on the characteristic intensity of the first contact. While dynamically changing the appearance of the background of the first user interface, detect termination of the first input by the first contact; and, in response to detecting termination of the first input by the first contact, the processing unit is configured to revert the background of the first user interface back to the first appearance of the background.

In accordance with some embodiments, a method is performed at an electronic device with a display, a touch-sensitive surface, and one or more sensors to detect intensity of contacts with the touch-sensitive surface. The device display a first user interface on the display, wherein the first user interface includes a background with a first appearance and one or more foreground objects. While displaying the first user interface on the display, the device detects an input by a first contact on the touch-sensitive surface, the first contact having a characteristic intensity above a first intensity threshold. In response to detecting the input by the first contact, in accordance with a determination that, during the input, a focus selector is at a location in the first user interface that corresponds to the background of the user interface, the device dynamically changes the appearance of the background of the first user interface without changing the appearance of the one or more foreground objects in the first user interface, wherein the dynamic change in the appearance of the background of the first user interface is based at least in part on the characteristic intensity of the first contact; and, in accordance with a determination that a focus selector is at a location in the first user interface that corresponds to a respective foreground object of the one or more foreground objects in the first user interface, the device maintains the first appearance of the background of the first user interface.

In accordance with some embodiments, an electronic device includes a display unit configured to display user interfaces, backgrounds and foreground objects, a touch-sensitive surface unit configured to receive user inputs, one or more sensor units configured to detect intensity of contacts with the touch-sensitive surface unit, and a processing unit coupled to the display unit, the touch-sensitive surface unit and the one or more sensor units. The processing unit is configured to enable display of a first user interface on the display unit, wherein the first user interface includes a background with a first appearance and one or more foreground objects. While displaying the first user interface on the display unit, the processing unit is configured to detect an input by a first contact on the touch-sensitive surface unit, the first contact having a characteristic intensity above a first intensity threshold. In response to detecting the input by the first contact, in accordance with a determination that, during the input, a focus selector is at a location in the first user interface that corresponds to the background of the user interface, the processing unit is configured to dynamically change the appearance of the background of the first user interface without changing the appearance of the one or more foreground objects in the first user interface, wherein the dynamic change in the appearance of the background of the first user interface is based at least in part on the characteristic intensity of the first contact. In accordance with a determination that a focus selector is at a location in the first user interface that corresponds to a respective foreground object of the one or more foreground objects in the first user interface, the processing unit is configured to maintain the first appearance of the background of the first user interface.

In accordance with some embodiments, a method is performed at an electronic device with a display, a touch-sensitive surface, and one or more sensors to detect intensity of contacts with the touch-sensitive surface. The device displays a first user interface on the display, wherein: the first user interface includes a background; the first user interface includes a foreground area overlaying a portion of the background; and the foreground area includes a plurality of user interface objects. The device detects an input by a contact on the touch-sensitive surface while a first focus selector is at a first user interface object in the plurality of user interface objects in the foreground area. In response to detecting the input by the contact, in accordance with a determination that the input by the contact meets one or more first press criteria, which include a criterion that is met when a characteristic intensity of the contact remains below a first intensity threshold during the input, the device performs a first predetermined action that corresponds to the first user interface object in the foreground area; and, in accordance with a determination that the input by the contact meets one or more second press criteria, which include a criterion that is met when the characteristic intensity of the contact increases above the first intensity threshold during the input, the device performs a second action, distinct from the first predetermined action, that corresponds to the first user interface object in the foreground area.

In accordance with some embodiments, an electronic device includes a display unit configured to display user interfaces and user interface objects, a touch-sensitive surface unit configured to receive user inputs, one or more sensor units configured to detect intensity of contacts with the touch-sensitive surface unit, and a processing unit coupled to the display unit, the touch-sensitive surface unit and the one or more sensor units. The processing unit is configured to enable display of a first user interface on the display unit, wherein the first user interface includes a background with a first appearance and one or more foreground objects. While displaying the first user interface on the display unit, the processing unit is configured to detect an input by a first contact on the touch-sensitive surface unit, the first contact having a characteristic intensity above a first intensity threshold. In response to detecting the input by the first contact, in accordance with a determination that, during the input, a focus selector is at a location in the first user interface that corresponds to the background of the user interface, the processing unit is configured to dynamically change the appearance of the background of the first user interface without changing the appearance of the one or more foreground objects in the first user interface, wherein the dynamic change in the appearance of the background of the first user interface is based at least in part on the characteristic intensity of the first contact. In accordance with a determination that a focus selector is at a location in the first user interface that corresponds to a respective foreground object of the one or more foreground objects in the first user interface, the processing unit is configured to maintain the first appearance of the background of the first user interface.

In accordance with some embodiments, a method is performed at an electronic device with a display, a touch-sensitive surface, and one or more sensors to detect intensity of contacts with the touch-sensitive surface. The device displays, on the display, an application launching user interface that includes a plurality of application icons for launching corresponding applications. While displaying on the application launching user interface, the device detects a first touch input that includes detecting a first contact at a location on the touch-sensitive surface that corresponds to a first application icon of the plurality of application icon. The first application icon is an icon for launching a first application that is associated with one or more corresponding quick actions. In response to detecting the first touch input in accordance with a determination that the first touch input meets one or more application-launch criteria, the device launches the first application. In accordance with a determination that the first touch input meets one or more quick-action-display criteria which include a criterion that is met when the characteristic intensity of the first contact increases above a respective intensity threshold, the device concurrently displays one or more quick action objects associated with the first application along with the first application icon without launching the first application.

In accordance with some embodiments, an electronic device includes a display unit configured to display user interface objects, a touch-sensitive surface unit configured to receive user inputs, one or more sensor units configured to detect intensity of contacts with the touch-sensitive surface unit, and a processing unit coupled to the display unit, the touch-sensitive surface unit and the one or more sensor units. The processing unit is configured to enable display of, on the display unit, an application launching user interface that includes a plurality of application icons for launching corresponding applications. While displaying on the application launching user interface, the processing unit is configured to detect a first touch input that includes detecting a first contact at a location on the touch-sensitive surface unit that corresponds to a first application icon of the plurality of application icons, wherein the first application icon is an icon for launching a first application that is associated with one or more corresponding quick actions. In response to detecting the first touch input, in accordance with a determination that the first touch input meets one or more application-launch criteria, the processing unit is configured to launch the first application. In accordance with a determination that the first touch input meets one or more quick-action-display criteria which include a criterion that is met when the characteristic intensity of the first contact increases above a respective intensity threshold, the processing unit is configured to concurrently enable display of one or more quick action objects associated with the first application along with the first application icon without launching the first application.

In accordance with some embodiments, a method is performed at an electronic device with a display and one or more input devices. The electronic device displays, on the display, a first user interface that includes a plurality of user interface objects, wherein a respective user interface object is associated with a corresponding set of menu options. The device detects, via the one or more input devices, a first input that corresponds to a request to display menu options for a first user interface object of the plurality of user interface objects. In response to detecting the first input, the device displays menu items in a menu that corresponds to the first user interface object. Displaying the menu includes, in accordance with a determination that the first user interface object is at a first location in the first user interface, displaying the menu items in the menu that corresponds to the first user interface object in a first order; and in accordance with a determination that the first user interface object is at a second location in the first user interface that is different from the first location, displaying the menu items in the menu that corresponds to the first user interface object in a second order that is different from the first order.

In accordance with some embodiments, an electronic device includes a display unit configured to display content items, one or more input devices configured to receive user inputs, and a processing unit coupled to the display unit and the one or more input devices. The processing unit is configured to enable display of, on the display unit, a first user interface that includes a plurality of user interface objects, wherein a respective user interface object is associated with a corresponding set of menu options. The processing unit is configured to detect, via the one or more input devices, a first input that corresponds to a request to display menu options for a first user interface object of the plurality of user interface objects. In response to detecting the first input, enable display of menu items in a menu that corresponds to the first user interface object. Displaying the menu includes, in accordance with a determination that the first user interface object is at a first location in the first user interface, displaying the menu items in the menu that corresponds to the first user interface object in a first order, and in accordance with a determination that the first user interface object is at a second location in the first user interface that is different from the first location, displaying the menu items in the menu that corresponds to the first user interface object in a second order that is different from the first order.

In accordance with some embodiments, a method is performed at an electronic device with a display, a touch-sensitive surface, and one or more sensors to detect intensity of contacts with the touch-sensitive surface. The device displays, on the display, a user interface that includes a selectable user interface object that is associated with a plurality of actions for interacting with the user interface, wherein the plurality of actions include a direct-selection action and one or more other actions. While displaying the user interface that includes the selectable user interface object, the device detects an input that includes detecting a contact on the touch-sensitive surface while a focus selector is over the selectable user interface objects. In response to detecting the input that includes detecting the contact: in accordance with a determination that the input meets selection criteria, the device displays, on the display, a menu that includes graphical representations of the plurality of actions that include the direct-selection action and the one or more other actions; and in accordance with a determination that the input meets direct-selection criteria, wherein the direct-selection criteria include a criterion that is met when a characteristic intensity of the contact increases above a respective intensity threshold, the device performs the direct-selection action.

In accordance with some embodiments, an electronic device includes a display unit configured to display content items, a touch-sensitive surface unit configured to receive user inputs, one or more sensor units configured to detect intensity of contacts with the touch-sensitive surface unit, and a processing unit coupled to the display unit, the touch-sensitive surface unit and the one or more sensor units. The processing unit is configured to enable display of, on the display unit, a user interface that includes a selectable user interface object that is associated with a plurality of actions for interacting with the user interface, wherein the plurality of actions include a direct-selection action and one or more other actions. While displaying the user interface that includes the selectable user interface object, the processing unit is configured to detect an input that includes detecting a contact on the touch-sensitive surface unit while a focus selector is over the selectable user interface objects. In response to detecting the input that includes detecting the contact: in accordance with a determination that the input meets selection criteria, the processing unit is configured to enable display of, on the display unit, a menu that includes graphical representations of the plurality of actions that include the direct-selection action and the one or more other actions; and in accordance with a determination that the input meets direct-selection criteria, wherein the direct-selection criteria include a criterion that is met when a characteristic intensity of the contact increases above a respective intensity threshold, the processing unit is configured to perform the direct-selection action.

There is a need for electronic devices with improved methods and interfaces for teaching new user interface capabilities and features to the user, such as new contact-intensity based capabilities and features. Such methods and interfaces optionally complement or replace conventional methods for teaching new user interface capabilities and features to the user. Such methods reduce the number, extent, and/or nature of the inputs from a user and produce a more efficient human-machine interface. For battery-operated devices, such methods and interfaces conserve power and increase the time between battery charges In accordance with some embodiments, a method is performed at an electronic device with a display, a touch-sensitive surface, and one or more sensors to detect intensity of contacts with the touch-sensitive surface. The device displays, on the display, a user interface that includes a plurality of user interface objects that are associated with respective object-specific operations that are triggered by changes in contact intensity, wherein the plurality of user interface elements include a first object displayed at a first location in the user interface and a second object displayed at a second location in the user interface. While displaying the user interface that includes the plurality of user interface elements, the device detects a first input that includes detecting a first contact on the touch-sensitive surface and detecting an increase in a characteristic intensity of the first contact above a first intensity threshold. In response to detecting the first input: in accordance with a determination that a focus selector is at the first location in the user interface at which the first object is displayed, the device performs a first operation associated with the first object that includes displaying, on the display, additional information associated with the first object; in accordance with a determination that a focus selector is at the second location in the user interface at which the second object is displayed, the device performs a second operation associated with the second object that includes displaying, on the display, additional information associated with the second object, wherein the second operation associated with the second object is distinct from the first operation associated with the first object; and in accordance with a determination that a focus selector is at the location in the user interface that is away from any objects that are associated with object-specific operations that are triggered by changes in contact intensity, the device performs a third operation that includes updating the user interface on the display to concurrently visually distinguish the first and second objects in the user interface.

In accordance with some embodiments, an electronic device includes a display unit configured to display user interfaces and user interface objects, a touch-sensitive surface unit configured to receive user inputs, one or more sensor units configured to detect intensity of contacts with the touch-sensitive surface unit, and a processing unit coupled to the display unit, the touch-sensitive surface unit and the one or more sensor units. The processing unit is configured to: enable display of, on the display unit, a user interface that includes a plurality of user interface objects that are associated with respective object-specific operations that are triggered by changes in contact intensity, wherein the plurality of user interface elements include a first object displayed at a first location in the user interface and a second object displayed at a second location in the user interface; while displaying the user interface that includes the plurality of user interface elements, detect a first input that includes detecting a first contact on the touch-sensitive surface unit and detecting an increase in a characteristic intensity of the first contact above a first intensity threshold; and in response to detecting the first input: in accordance with a determination that a focus selector is at the first location in the user interface at which the first object is displayed, perform a first operation associated with the first object that includes displaying, on the display unit, additional information associated with the first object; in accordance with a determination that a focus selector is at the second location in the user interface at which the second object is displayed, perform a second operation associated with the second object that includes displaying, on the display unit, additional information associated with the second object, wherein the second operation associated with the second object is distinct from the first operation associated with the first object; and in accordance with a determination that a focus selector is at the location in the user interface that is away from any objects that are associated with object-specific operations that are triggered by changes in contact intensity, perform a third operation that includes updating the user interface on the display unit to concurrently visually distinguish the first and second objects in the user interface.

In accordance with some embodiments, a method is performed at an electronic device with a display, a touch-sensitive surface, and one or more sensors to detect intensity of contacts with the touch-sensitive surface. The device displays a user interface on the display, wherein the user interface includes a first set of user interface elements; for a respective user interface element in the first set of user interface elements, the device is configured to respond to user input of a first input type at a location that corresponds to the respective user interface element by performing a plurality of operations that correspond to the respective user interface element; and, for a remainder of the user interface, the device is not configured to respond to user input of the first input type at a location that corresponds to a user interface element in the remainder of the user interface by performing a plurality of operations that correspond to the user interface element in the remainder of the user interface. The device detects a first user input of the first input type while a focus selector is at a first location in the user interface. In response to detecting the first user input of the first input type while the focus selector is at the first location in the user interface, in accordance with a determination that the first location corresponds to a first user interface element in the first set of user interface elements, the device performs a plurality of operations that correspond to the first user interface element; and, in accordance with a determination that the first location does not correspond to any user interface elements in the first set of user interface elements, the device applies a visual effect to distinguish the first set of user interface elements from the remainder of the user interface on the display.

In accordance with some embodiments, an electronic device includes a display unit configured to display user interfaces and user interface elements, a touch-sensitive surface unit configured to receive user inputs, one or more sensor units configured to detect intensity of contacts with the touch-sensitive surface unit, and a processing unit coupled to the display unit, the touch-sensitive surface unit and the one or more sensor units. The processing unit is configured to enable display of a user interface on the display unit, wherein the user interface includes a first set of user interface elements; for a respective user interface element in the first set of user interface elements, the device is configured to respond to user input of a first input type at a location that corresponds to the respective user interface element by performing a plurality of operations that correspond to the respective user interface element; and, for a remainder of the user interface, the device is not configured to respond to user input of the first input type at a location that corresponds to a user interface element in the remainder of the user interface by performing a plurality of operations that correspond to the user interface element in the remainder of the user interface. The processing unit is configured to detect a first user input of the first input type while a focus selector is at a first location in the user interface; and in response to detecting the first user input of the first input type while the focus selector is at the first location in the user interface, in accordance with a determination that the first location corresponds to a first user interface element in the first set of user interface elements, perform a plurality of operations that correspond to the first user interface element, and in accordance with a determination that the first location does not correspond to any user interface elements in the first set of user interface elements, apply a visual effect to distinguish the first set of user interface elements from the remainder of the user interface on the display unit.

Thus, electronic devices with displays, touch-sensitive surfaces and one or more sensors to detect intensity of contacts with the touch-sensitive surface are provided with fast, efficient methods and interfaces that indicate which user interface elements have contact intensity based capabilities and features, thereby increasing the effectiveness, efficiency, and user satisfaction with such devices. Such methods and interfaces may complement or replace conventional methods for teaching new capabilities and functionalities (e.g., force or pressure sensitive user interface elements) to the user.

There is a need for electronic devices with improved methods and interfaces for previewing media content. Such methods and interfaces optionally complement or replace conventional methods for previewing media content. Such methods reduce the number, extent, and/or nature of the inputs from a user and produce a more efficient human-machine interface. For battery-operated devices, such methods and interfaces conserve power and increase the time between battery charges In accordance with some embodiments, a method is performed at an electronic device with a display, a touch-sensitive surface, and one or more sensors for detecting intensity of contacts on the touch-sensitive surface. The method includes displaying, on the display, a user interface that includes a plurality of media objects that include a first media object that represents a first set of one or more media items and a second media object that represents a second set of one or more media items, wherein the first set of media items is different from the second set of media items. The method further includes, while a focus selector is over the first media object, detecting an input that includes movement of a contact on the touch-sensitive surface. The method further includes, in response to detecting the input that includes the movement of the contact on the touch-sensitive surface: in accordance with a determination that the input meets media preview criteria, wherein the media preview criteria includes a criterion that is met when the input includes an increase in a characteristic intensity of the contact above a media-preview intensity threshold while the focus selector is over the first media object, outputting a preview of a media item from the first set of media items and, in response to detecting the movement of the contact, ceasing to output the preview of the media item from the first set of media items, and outputting a preview of a media item from the second set of media items; and, in accordance with a determination that the input does not meet the media preview criteria, moving the first media object and the second media object on the display in accordance with the movement of the contact on the touch-sensitive surface.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. While a focus selector is over the first media object, detect an input that includes movement of a contact on the touch-sensitive surface. The processing unit is configured to enable display, on the display unit, of a user interface that includes a plurality of media objects that include a first media object that represents a first set of one or more media items and a second media object that represents a second set of one or more media items, wherein the first set of media items is different from the second set of media items. The processing unit is configured to, while a focus selector is over the first media object, detect an input that includes movement of a contact on the touch-sensitive surface; and in response to detecting the input that includes the movement of the contact on the touch-sensitive surface: in accordance with a determination that the input meets media preview criteria, wherein the media preview criteria includes a criterion that is met when the input includes an increase in a characteristic intensity of the contact above a media-preview intensity threshold while the focus selector is over the first media object, output a preview of a media item from the first set of media items, and, in response to detecting the movement of the contact, cease to output the preview of the media item from the first set of media items and output a preview of a media item from the second set of media items; and, in accordance with a determination that the input does not meet the media preview criteria, move the first media object and the second media object on the display in accordance with the movement of the contact on the touch-sensitive surface.

Thus, electronic devices with displays, touch-sensitive surfaces and one or more sensors to detect intensity of contacts with the touch-sensitive surface are provided with faster, more efficient methods and interfaces for previewing media content, thereby increasing the effectiveness, efficiency, and user satisfaction with such devices. Such methods and interfaces may complement or replace conventional methods for previewing media content.

In accordance with some embodiments, a method is performed at an electronic device with a display, a touch-sensitive surface, and one or more sensors to detect intensity of contacts with the touch-sensitive surface. The method includes: displaying, on the display, a first portion of paginated content in a user interface, wherein: the paginated content includes a plurality of sections; a respective section in the plurality of sections includes a respective plurality of pages; the first portion of the paginated content is part of a first section of the plurality of sections; and the first portion of the paginated content lies between a sequence of prior pages in the first section and a sequence of later pages in the first section; while a focus selector is within a first predefined region of the displayed first portion of the paginated content on the display, detecting a first portion of an input, wherein detecting the first portion of the input includes detecting a contact on the touch-sensitive surface; in response to detecting the first portion of the input: in accordance with a determination that the first portion of the input meets first content-navigation criteria, wherein the first content-navigation criteria include a criterion that is met when the device detects a lift-off of the contact from the touch-sensitive surface before a characteristic intensity of the contact reaches a first threshold intensity, replacing the displayed first portion of the paginated content with a second portion of the paginated content on the display, wherein the second portion of the paginated content includes a page that is sequentially adjacent to the first portion of the paginated content; and, in accordance with a determination that the first portion of the input meets second content-navigation criteria, wherein the second content-navigation criteria include a criterion that is met when the device detects an increase in the characteristic intensity of the contact above the first intensity threshold while the focus selector is within the first predefined region of the displayed first portion of the paginated content, displaying an indication of a quantity of pages within the sequence of later pages in the first section or displaying an indication of a quantity of pages within the sequence of prior pages in the first section.

In accordance with some embodiments, an electronic device includes a display unit configured to display content items, a touch-sensitive surface unit configured to receive user inputs, one or more sensor units configured to detect intensity of contacts with the touch-sensitive surface unit, and a processing unit coupled to the display unit, the touch-sensitive surface unit and the one or more sensor units. The processing unit is configured to: enable display, on the display, of a first portion of paginated content in a user interface, wherein: the paginated content includes a plurality of sections; a respective section in the plurality of sections includes a respective plurality of pages; the first portion of the paginated content is part of a first section of the plurality of sections; and the first portion of the paginated content lies between a sequence of prior pages in the first section and a sequence of later pages in the first section; while a focus selector is within a first predefined region of the displayed first portion of the paginated content on the display, detect a first portion of an input, wherein detecting the first portion of the input includes detecting a contact on the touch-sensitive surface; in response to detecting the first portion of the input: in accordance with a determination that the first portion of the input meets first content-navigation criteria, wherein the first content-navigation criteria include a criterion that is met when the device detects a lift-off of the contact from the touch-sensitive surface before a characteristic intensity of the contact reaches a first threshold intensity, replace the displayed first portion of the paginated content with a second portion of the paginated content on the display, wherein the second portion of the paginated content includes a page that is sequentially adjacent to the first portion of the paginated content; and, in accordance with a determination that the first portion of the input meets second content-navigation criteria, wherein the second content-navigation criteria include a criterion that is met when the device detects an increase in the characteristic intensity of the contact above the first intensity threshold while the focus selector is within the first predefined region of the displayed first portion of the paginated content, enable display of an indication of a quantity of pages within the sequence of later pages in the first section or enable display of an indication of a quantity of pages within the sequence of prior pages in the first section.

There is a need for electronic devices with improved methods and interfaces for displaying contextual information associated with a point of interest in a map. Such methods and interfaces optionally complement or replace conventional methods for displaying contextual information associated with a point of interest in a map. Such methods reduce the number, extent, and/or nature of the inputs from a user and produce a more efficient human-machine interface. For battery-operated devices, such methods and interfaces conserve power and increase the time between battery charges In accordance with some embodiments, a method is performed at an electronic device with a display, a touch-sensitive surface, and one or more sensors for detecting intensity of contacts on the touch-sensitive surface. The method includes, displaying, in a first user interface on the display, a view of a map that includes a plurality of points of interest. The method further includes, while displaying the view of the map that includes the plurality of points of interest, and while a focus selector is at a location of a respective point of interest, detecting an increase in a characteristic intensity of the contact on the touch-sensitive surface above a preview intensity threshold. The method further includes, in response to detecting the increase in the characteristic intensity of the contact above the preview intensity threshold, zooming the map to display contextual information near the respective point of interest. The method further includes, after zooming the map, detecting a respective input that includes detecting a decrease in the characteristic intensity of the contact on the touch-sensitive surface below a predefined intensity threshold; and in response to detecting the respective input that includes detecting the decrease in the characteristic intensity of the contact: in accordance with a determination that the characteristic intensity of the contact increased above a maintain-context intensity threshold before detecting the respective input, continuing to display the contextual information near the respective point of interest; and, in accordance with a determination that the characteristic intensity of the contact did not increase above the maintain-context intensity threshold before detecting the respective input, ceasing to display the contextual information near the point of interest and redisplaying the view of the map that includes the plurality of points of interest.

In accordance with some embodiments, an electronic device includes a display unit; a touch-sensitive surface unit; one or more sensor units for detecting intensity of contacts on the touch-sensitive surface unit; and a processing unit coupled to the display unit, the touch-sensitive surface unit, and the one or more sensor units. The processing unit configured to: enable display, in a first user interface on the display unit, of a view of a map that includes a plurality of points of interest; while enabling display of the view of the map that includes the plurality of points of interest, and while a focus selector is at a location of a respective point of interest, detect an increase in a characteristic intensity of the contact on the touch-sensitive surface above a preview intensity threshold; in response to detecting the increase in the characteristic intensity of the contact above the preview intensity threshold, zoom the map to display contextual information near the respective point of interest; after zooming the map, detect a respective input that includes detecting a decrease in the characteristic intensity of the contact on the touch-sensitive surface below a predefined intensity threshold; and in response to detecting the respective input that includes detecting the decrease in the characteristic intensity of the contact: in accordance with a determination that the characteristic intensity of the contact increased above a maintain-context intensity threshold before detecting the respective input, continue to enable display of the contextual information near the respective point of interest; and in accordance with a determination that the characteristic intensity of the contact did not increase above the maintain-context intensity threshold before detecting the respective input, cease to enable display of the contextual information near the point of interest and redisplay the view of the map that includes the plurality of points of interest.

Thus, electronic devices with displays, touch-sensitive surfaces and one or more sensors to detect intensity of contacts with the touch-sensitive surface are provided with faster, more efficient methods and interfaces for displaying contextual information associated with a point of interest in a map, thereby increasing the effectiveness, efficiency, and user satisfaction with such devices. Such methods and interfaces may complement or replace conventional methods for displaying contextual information associated with a point of interest in a map.

There is a need for electronic devices with improved methods and interfaces for zooming a map to display contextual information near a point of interest. Such methods and interfaces optionally complement or replace conventional methods for zooming a map. Such methods reduce the number, extent, and/or nature of the inputs from a user and produce a more efficient human-machine interface. For battery-operated devices, such methods and interfaces conserve power and increase the time between battery charges In accordance with some embodiments, a method is performed at an electronic device with a display, a touch-sensitive surface, and one or more sensors for detecting intensity of contacts on the touch-sensitive surface. The method includes: concurrently displaying in a user interface on the display: a map view that includes a plurality of points of interest, and a context region that is distinct from the map view and includes a representation of a first point of interest from the plurality of points of interest and a representation of a second point of interest from the plurality of points of interest. The method further includes, while concurrently displaying the map view and the context region on the display, detecting an increase in a characteristic intensity of a contact on the touch-sensitive surface above a respective intensity threshold. The method further includes, in response to detecting the increase in the characteristic intensity of the contact above the respective intensity threshold: in accordance with a determination that a focus selector was at a location of the representation of the first point of interest in the context region when the increase in the characteristic intensity of the contact above the respective intensity threshold was detected, zooming the map view to display respective contextual information for the first point of interest around the first point of interest in the map view; and in accordance with a determination that the focus selector was at a location of the representation of the second point of interest in the context region when the increase in the characteristic intensity of the contact above the respective intensity threshold was detected, zooming the map view to display respective contextual information for the second point of interest around the second point of interest in the map view.

In accordance with some embodiments, an electronic device includes a display unit; a touch-sensitive surface unit; one or more sensor units for detecting intensity of contacts on the touch-sensitive surface; and a processing unit coupled to the display unit, the touch-sensitive surface unit, and the one or more sensor units, the processing unit configured to: enable concurrent display, in a user interface on the display unit, of: a map view that includes a plurality of points of interest, and a context region that is distinct from the map view and includes a representation of a first point of interest from the plurality of points of interest and a representation of a second point of interest from the plurality of points of interest; while enabling concurrent display of the map view and the context region on the display unit, detect an increase in a characteristic intensity of a contact on the touch-sensitive surface unit above a respective intensity threshold; and in response to detecting the increase in the characteristic intensity of the contact above the respective intensity threshold: in accordance with a determination that a focus selector was at a location of the representation of the first point of interest in the context region when the increase in the characteristic intensity of the contact above the respective intensity threshold was detected, zoom the map view to display respective contextual information for the first point of interest around the first point of interest in the map view; and in accordance with a determination that the focus selector was at a location of the representation of the second point of interest in the context region when the increase in the characteristic intensity of the contact above the respective intensity threshold was detected, zoom the map view to display respective contextual information for the second point of interest around the second point of interest in the map view.

Thus, electronic devices with displays, touch-sensitive surfaces and one or more sensors to detect intensity of contacts with the touch-sensitive surface are provided with faster, more efficient methods and interfaces for zooming a map, thereby increasing the effectiveness, efficiency, and user satisfaction with such devices. Such methods and interfaces may complement or replace conventional methods for zooming a map.

There is a need for electronic devices with improved methods and interfaces for displaying and using a menu that includes contact information. Such methods and interfaces optionally complement or replace conventional methods for displaying and using a menu that includes contact information. Such methods reduce the number, extent, and/or nature of the inputs from a user and produce a more efficient human-machine interface. For battery-operated devices, such methods and interfaces conserve power and increase the time between battery charges In accordance with some embodiments, a method is performed at an electronic device with a display, a touch-sensitive surface, and one or more sensors to detect intensity of contacts with the touch-sensitive surface. The method includes: displaying, on the display, a first user interface that includes a plurality of selectable objects that are associated with contact information; while displaying the plurality of selectable objects and while a focus selector is at a location that corresponds to a respective selectable object, detecting an input that includes detecting a contact on the touch-sensitive surface; and in response to detecting the input: in accordance with a determination that detecting the input includes detecting an increase in intensity of the contact that meets intensity criteria, the intensity criteria including a criterion that is met when a characteristic intensity of the contact increases above a respective intensity threshold, displaying a menu for the respective selectable object that includes the contact information for the respective selectable object overlaid on top of the first user interface that includes the plurality of selectable objects; and in accordance with a determination that detecting the input includes detecting a liftoff of the contact without meeting the intensity criteria, replacing display of the first user interface that includes the plurality of selectable objects with display of a second user interface that is associated with the respective selectable object.

In accordance with some embodiments, an electronic device includes a display unit configured to display a user interface; a touch-sensitive surface unit configured to receive user inputs; one or more sensor units configured to detect intensity of contacts with the touch-sensitive surface unit; and a processing unit coupled to the display unit, the touch-sensitive surface unit and the one or more sensor units. The processing unit is configured to: enable display, on the display unit, of a first user interface that includes a plurality of selectable objects that are associated with contact information; while enabling display of the plurality of selectable objects and while a focus selector is at a location that corresponds to a respective selectable object, detect an input that includes detecting a contact on the touch-sensitive surface unit; and in response to detecting the input: in accordance with a determination that detecting the input includes detecting an increase in intensity of the contact that meets intensity criteria, the intensity criteria including a criterion that is met when a characteristic intensity of the contact increases above a respective intensity threshold, enable display of a menu for the respective selectable object that includes the contact information for the respective selectable object overlaid on top of the first user interface that includes the plurality of selectable objects; and in accordance with a determination that detecting the input includes detecting a liftoff of the contact without meeting the intensity criteria, replace display of the first user interface that includes the plurality of selectable objects with display of a second user interface that is associated with the respective selectable object.

Thus, electronic devices with displays, touch-sensitive surfaces, and one or more sensors to detect intensity of contacts with the touch-sensitive surface are provided with faster, more efficient methods and interfaces for displaying a menu that includes contact information, thereby increasing the effectiveness, efficiency, and user satisfaction with such devices. Such methods and interfaces may complement or replace conventional methods for displaying a menu that includes contact information.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for manipulating user interfaces, thereby increasing the effectiveness, efficiency, and user satisfaction with such devices. Such methods and interfaces may complement or replace conventional methods for manipulating user interfaces.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 13A-13C are flow diagrams illustrating a method of visually obscuring some user interface objects in accordance with some embodiments.

FIGS. 15A-15G are flow diagrams illustrating a method of navigating between a first user interface and a second user interface in accordance with some embodiments.

FIGS. 17A-17H are flow diagrams illustrating a method of providing supplemental information (e.g., previews and menus) in accordance with some embodiments.

FIGS. 19A-19F are flow diagrams illustrating a method of dynamically changing a background of a user interface in accordance with some embodiments.

FIGS. 21A-21C are flow diagrams illustrating a method of dynamically changing a background of a user interface in accordance with some embodiments.

FIGS. 23A-23C are flow diagrams illustrating a method of toggling between different actions based on input contact characteristics in accordance with some embodiments.

FIGS. 25A-25H are flow diagrams illustrating a method of launching an application or displaying a quick action menu in accordance with some embodiments.

FIGS. 27A-27E are flow diagrams illustrating a method of displaying a menu with a list of items arranged based on a location of a user interface object in accordance with some embodiments.

FIGS. 29A-29C are flow diagrams illustrating a method of selecting a default option from a menu or displaying a menu of options in accordance with some embodiments.

FIGS. 32A-32E are flow diagrams illustrating a method of visually distinguishing intensity sensitive objects in a user interface in accordance with some embodiments.

FIGS. 34A-34C are flow diagrams illustrating a method of visually distinguishing objects in a user interface in accordance with some embodiments.

FIGS. 37A-37H are flow diagrams illustrating a method of previewing media content in accordance with some embodiments.

FIGS. 40A-40E are flow diagrams illustrating a method of navigating paginated content in accordance with some embodiments.

FIGS. 43A-43D are flow diagrams illustrating a method of displaying contextual information associated with a point of interest in a map in accordance with some embodiments.

FIGS. 46A-46D are flow diagrams illustrating a method of zooming a map to display contextual information near a point of interest in accordance with some embodiments.

FIGS. 49A-49F are flow diagrams illustrating a method of displaying a menu that includes contact information in accordance with some embodiments.

DESCRIPTION OF EMBODIMENTS

Figure 1A:
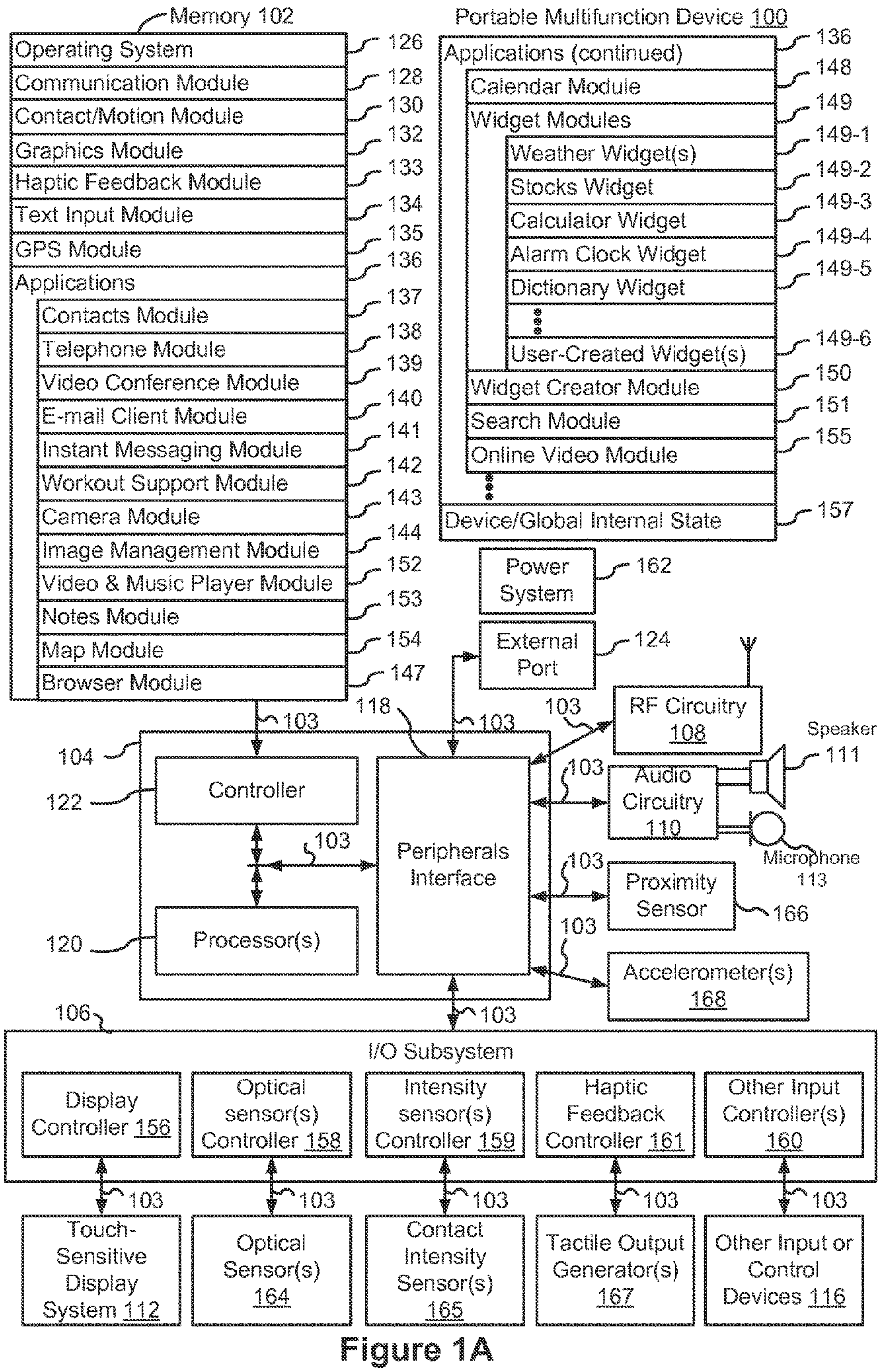
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user.

In some embodiments, in a system where a trackpad or touch-screen display is sensitive to a range of contact intensity that includes more than one or two specific intensity values (e.g., more than a simple on/off, binary intensity determination), the user interface provides responses (e.g., visual and/or tactile cues) that are indicative of the intensity of the contact within the range. This provides a user with a continuous response to the force or pressure of a user's contact, which provides a user with visual and/or haptic feedback that is richer and more intuitive. For example, such continuous force responses give the user the experience of being able to press lightly to preview an operation and/or press deeply to push to a predefined user interface state corresponding to the operation.

In some embodiments, for a device with a touch-sensitive surface that is sensitive to a range of contact intensity, multiple contact intensity thresholds are monitored by the device and different responses are mapped to different contact intensity thresholds.

In some embodiments, for a device with a touch-sensitive surface that is sensitive to a range of contact intensity, the device provides additional functionality by allowing users to perform complex operations with a single continuous contact.

In some embodiments, for a device with a touch-sensitive surface that is sensitive to a range of contact intensity, the device provides additional functionality that complements conventional functionality. For example, additional functions provided by intensity-based inputs (e.g., user interface previews and/or navigation shortcuts provided by light-press and/or deep-press gestures) are seamlessly integrated with conventional functions provided by conventional tap and swipe gestures. A user can continue to use conventional gestures to perform conventional functions (e.g., tapping on an application icon on a home screen to launch the corresponding application), without accidentally activating the additional functions. Yet it is also simple for a user to discover, understand, and use the intensity-based inputs and their added functionality (e.g., pressing on an application icon on a home screen to bring up a quick action menu for the application and then lifting off on a menu item to perform an action within the application).

A number of different approaches for manipulating user interfaces are described herein. Using one or more of these approaches (optionally in conjunction with each other) helps to provide a user interface that intuitively provides users with additional information and functionality. Using one or more of these approaches (optionally in conjunction with each other) reduces the number, extent, and/or nature of the inputs from a user and provides a more efficient human-machine interface. This enables users to use devices that have touch-sensitive surfaces faster and more efficiently. For battery-operated devices, these improvements conserve power and increase the time between battery charges.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
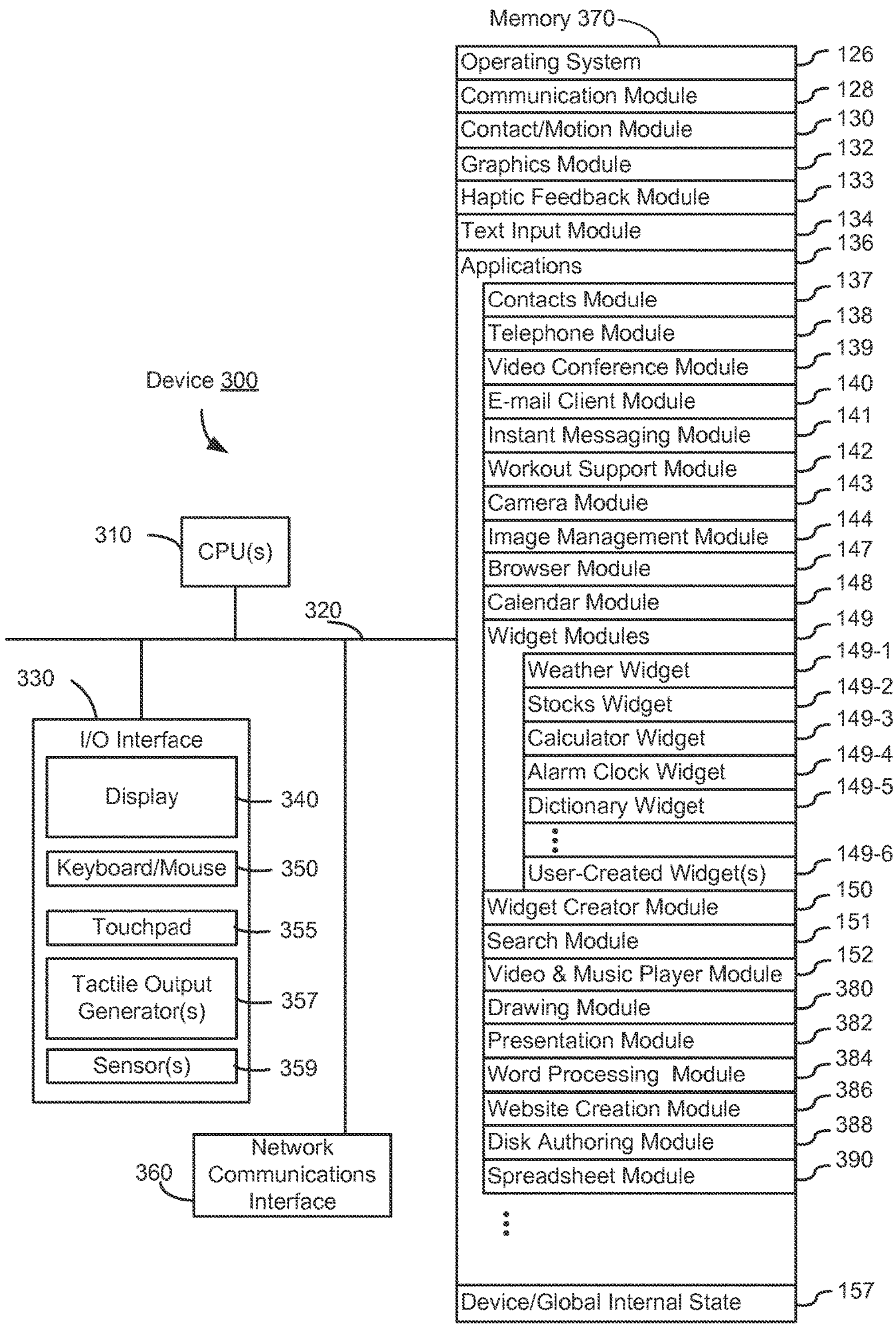
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
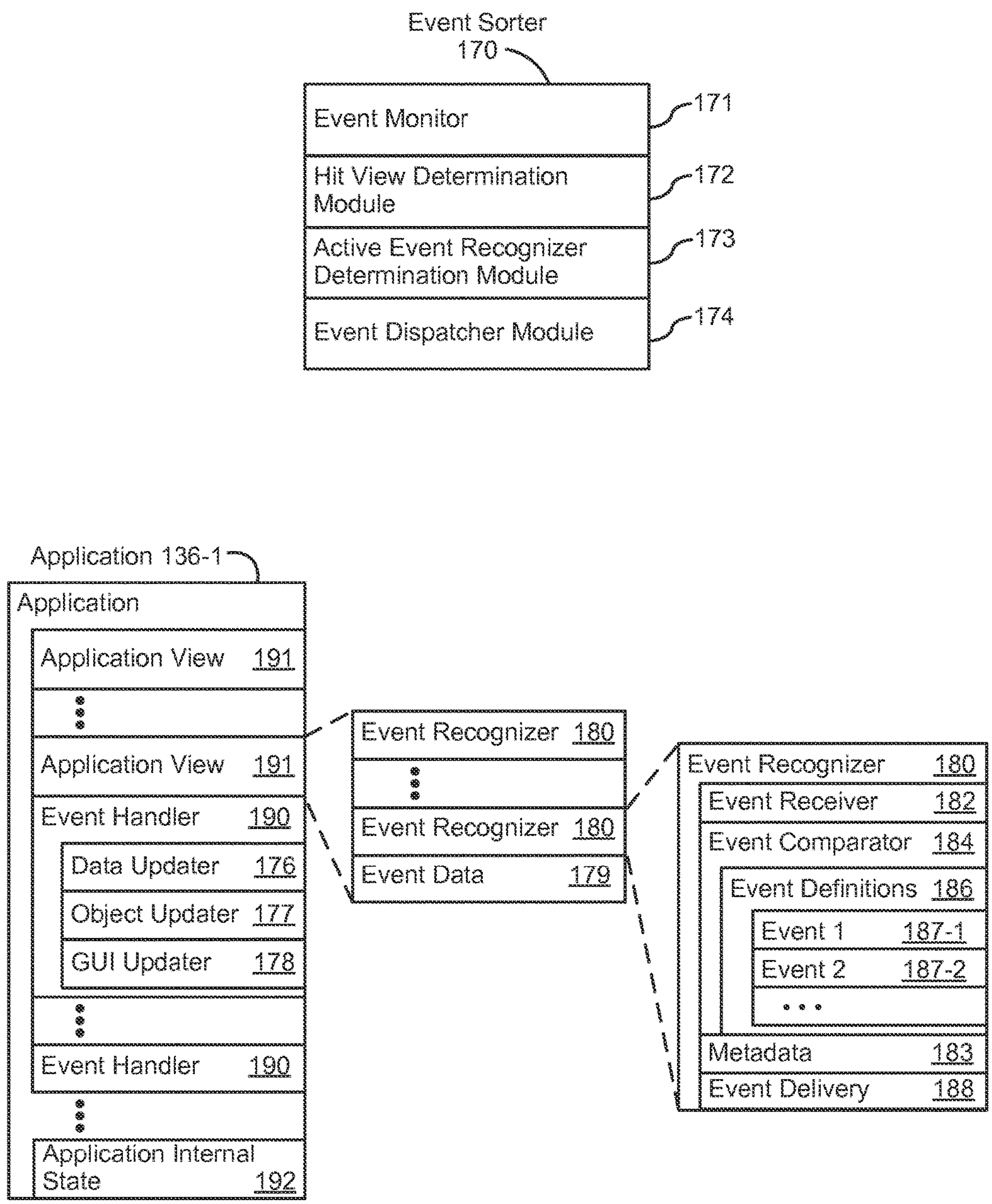
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
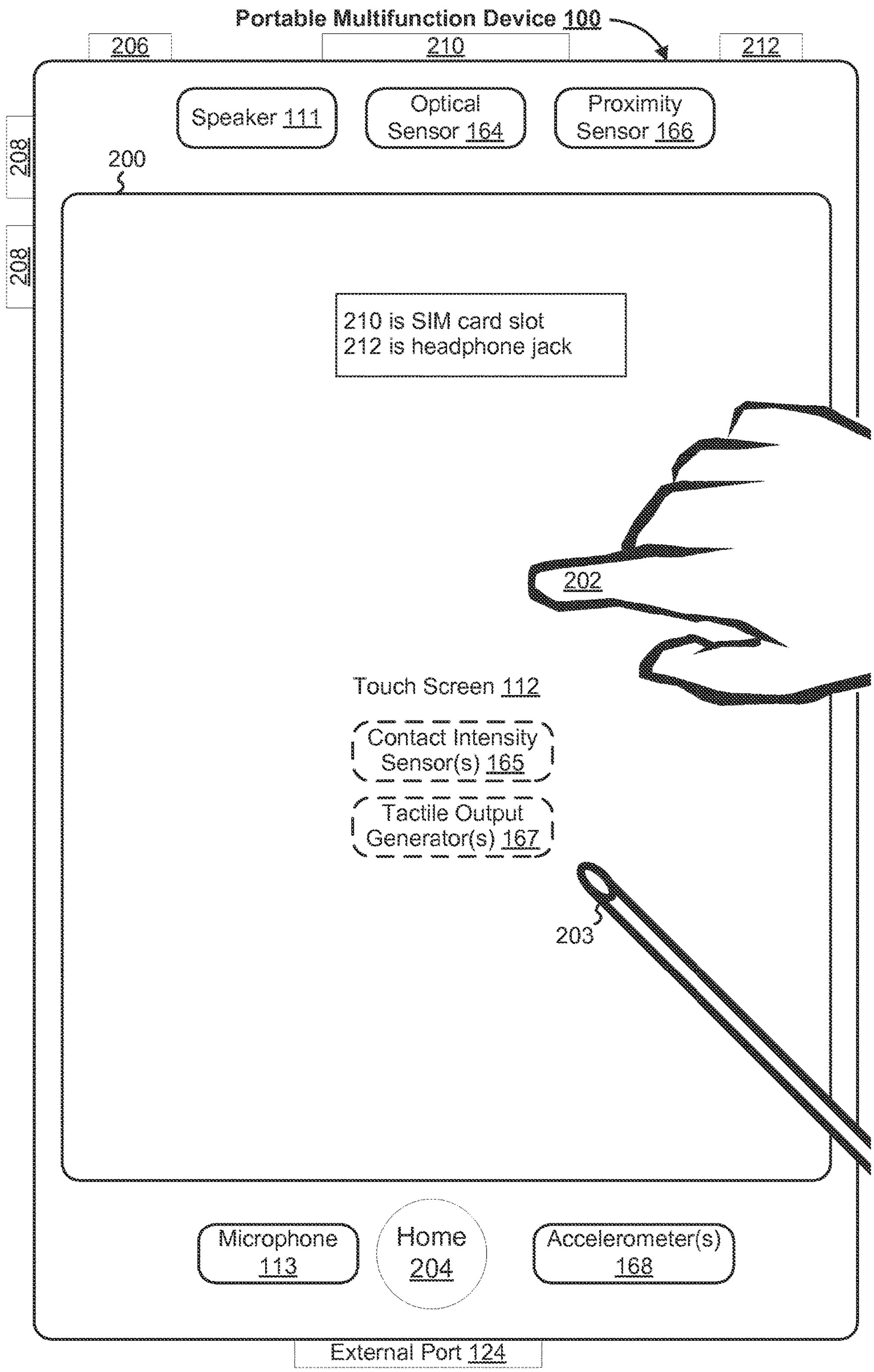
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
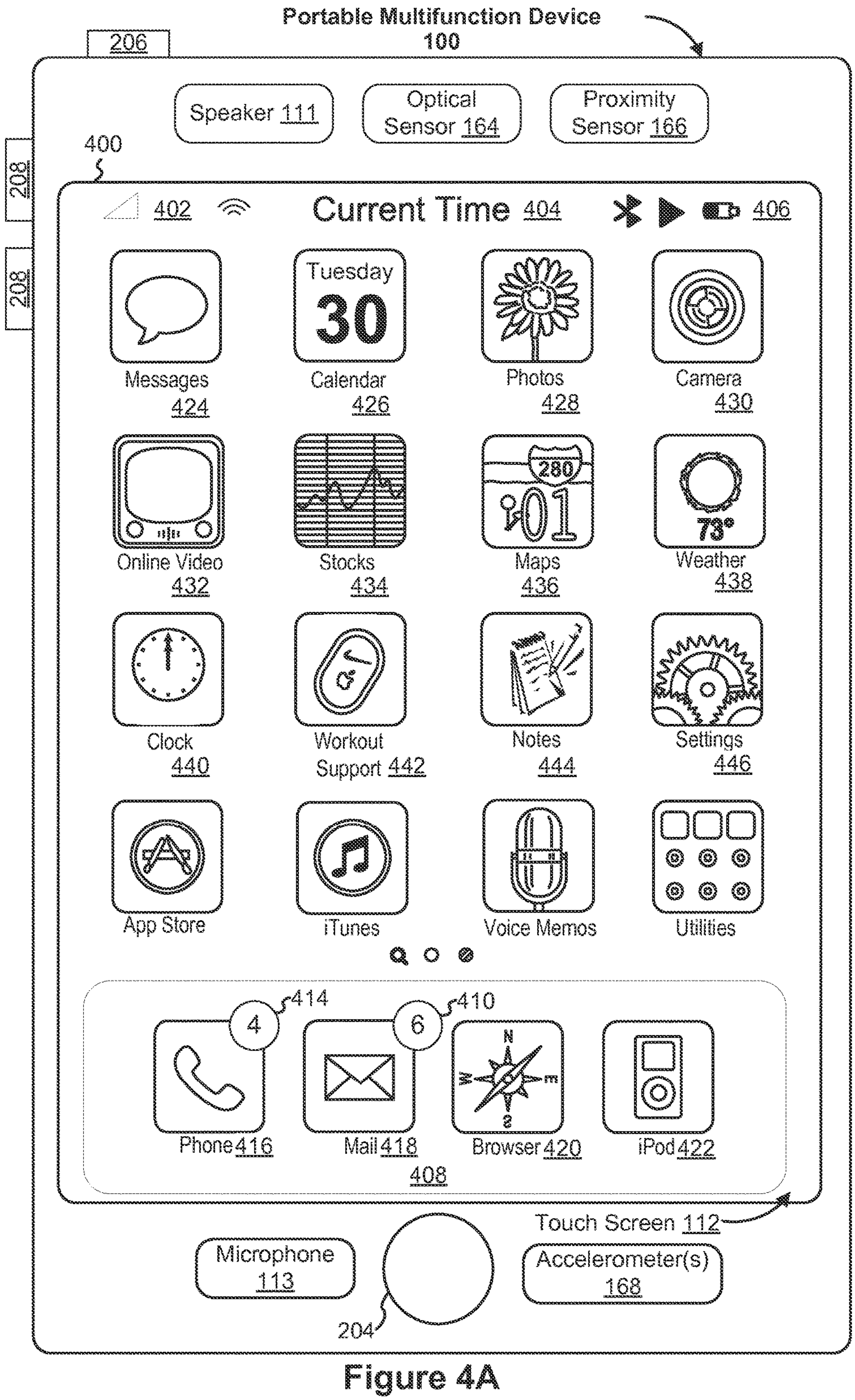
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:

- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Map;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
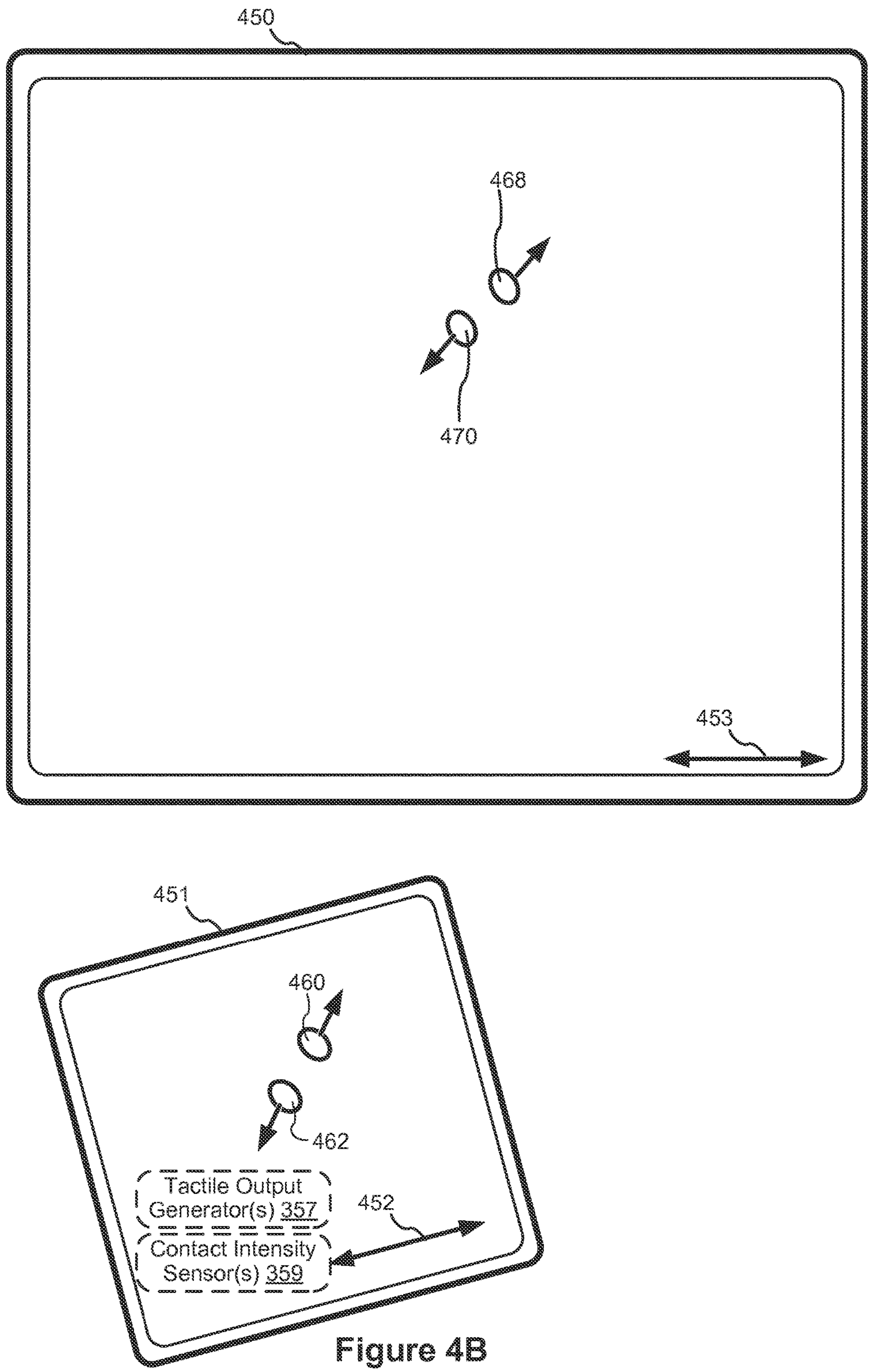
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 4C:
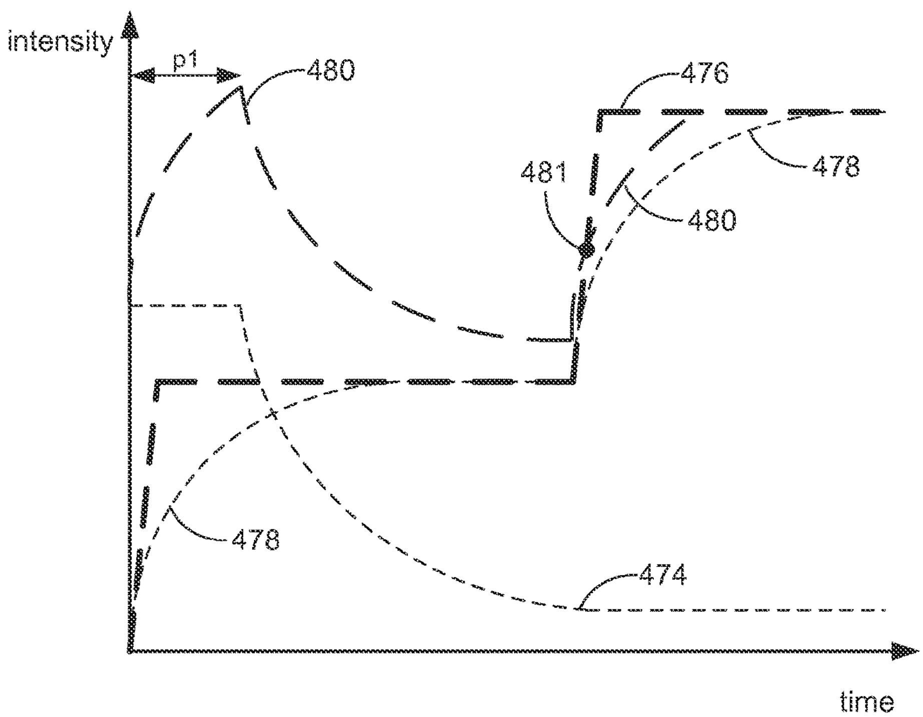
FIGS. 4C-4E illustrate exemplary dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
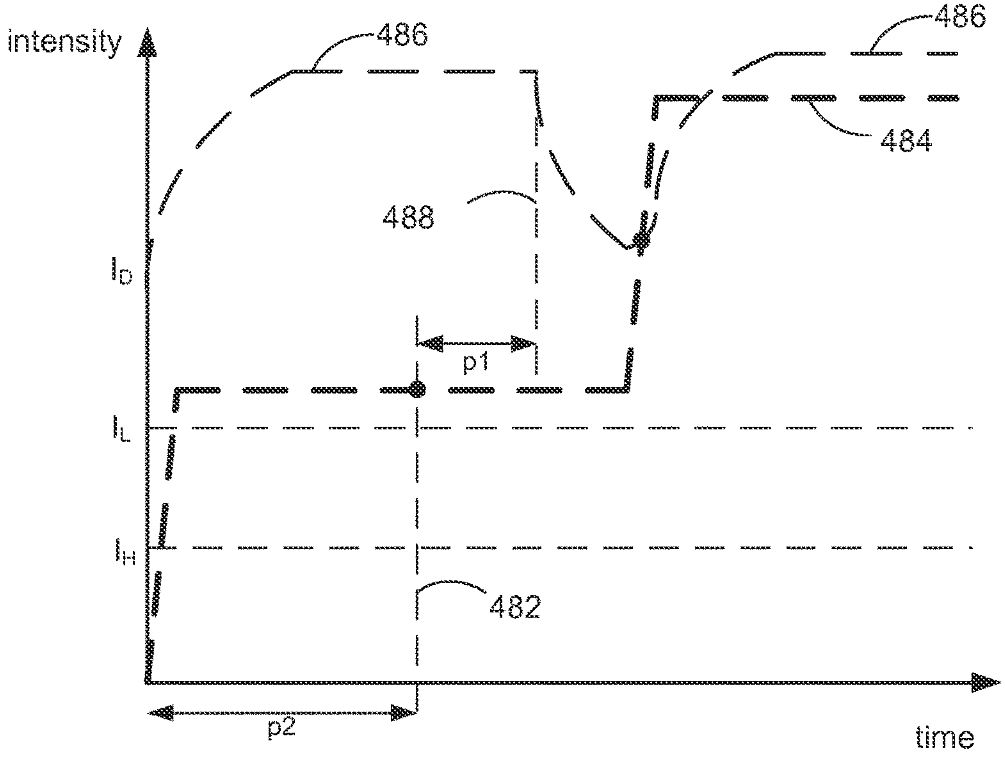

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
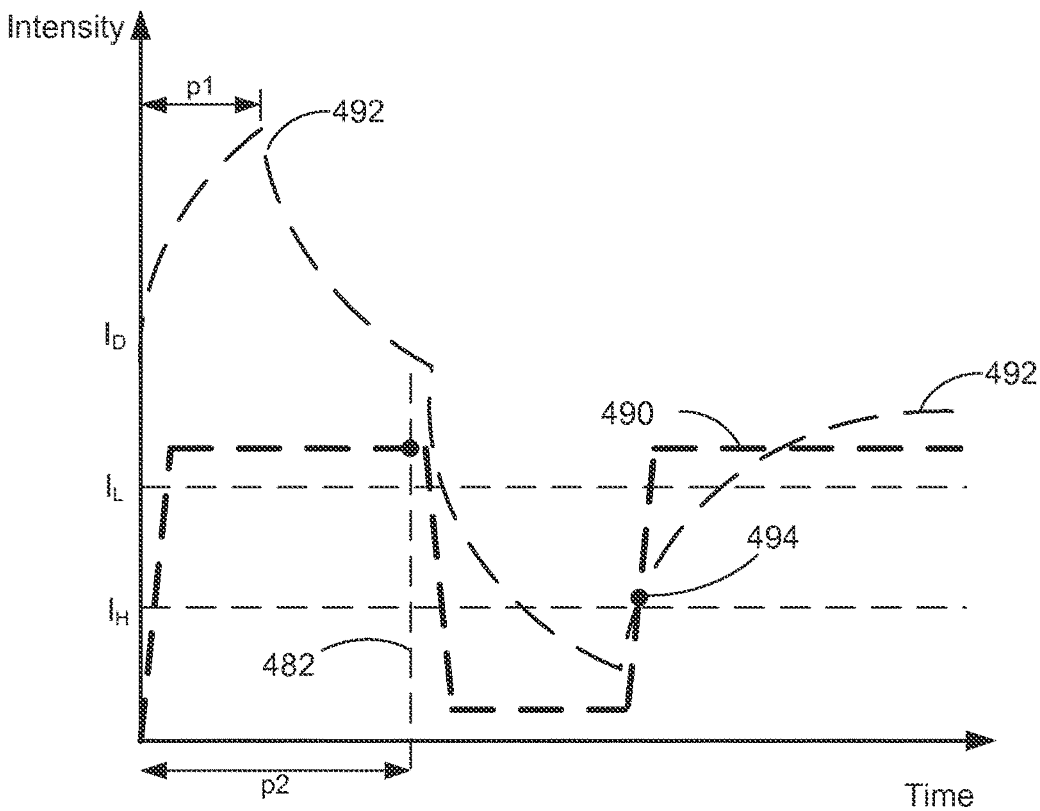

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5A:
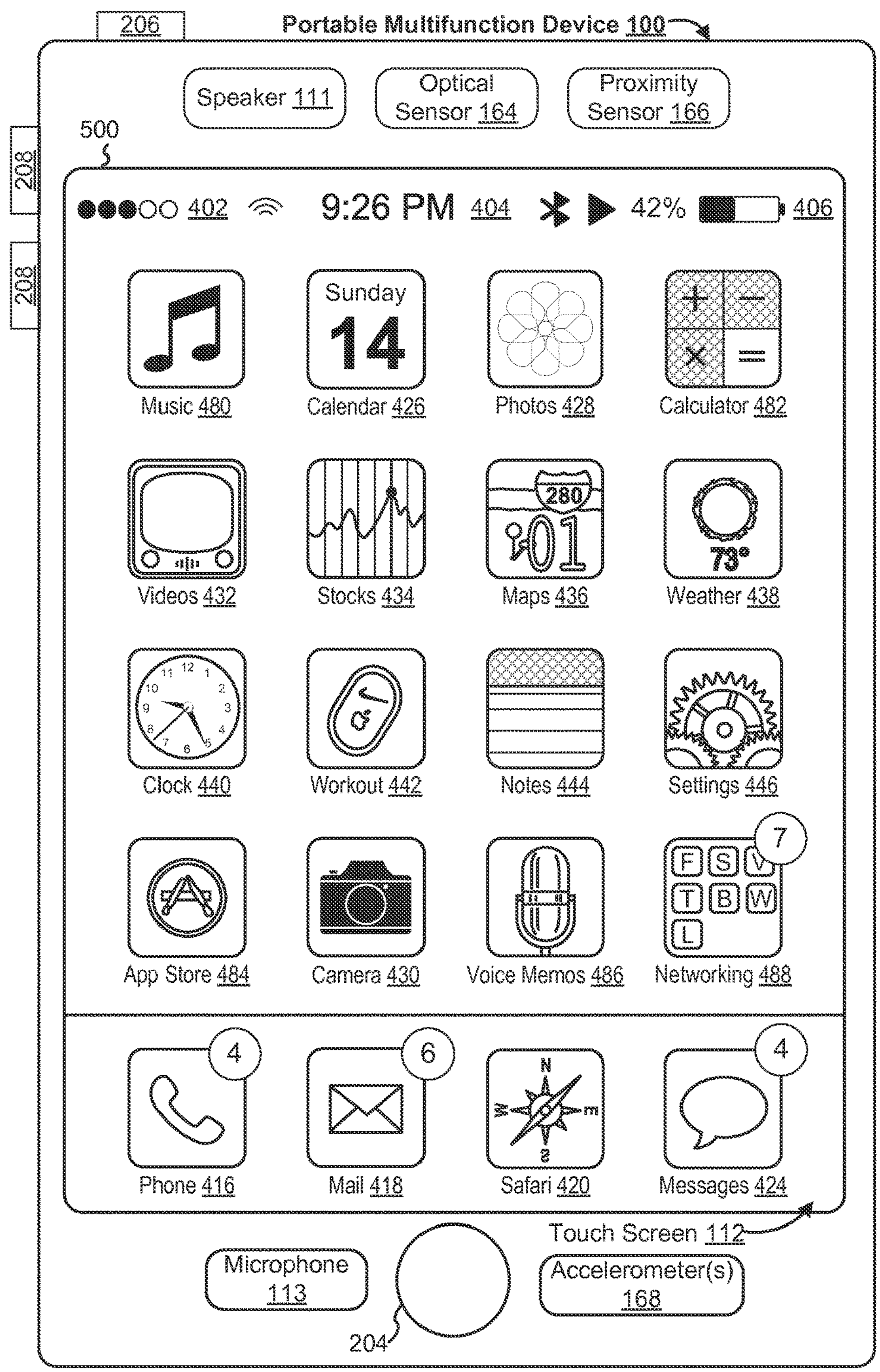
FIGS. 5A-5AW illustrate exemplary user interfaces for quickly invoking one of several actions associated with a respective application, without having to first activate the respective application, in accordance with some embodiments.

FIGS. 5A-5AW illustrate exemplary user interfaces for quickly invoking one of several actions associated with a respective application, without having to first activate the respective application, in accordance with some embodiments. In some embodiments, this is achieved by providing the user with menus containing quick action items (e.g., "quick action menus") for respective applications, upon detection of a user input that is distinguishable from conventional user inputs used to launch applications (e.g., based on the amount of force the user applies). In some embodiments, the user interface provides feedback (e.g., visual, audible, and/or tactile feedback) when a user is close to invoking a quick action menu (e.g., as a user input approaches an intensity threshold). This allows the user to modify their input to avoid inadvertent activation of the quick action menu. This also assists the user in determining how much force is necessary to invoke the quick action menu. Exemplary quick action functions are provided in Appendix A.

The user interfaces in these figures are used to illustrate the processes described below. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 5A-5G, 5I-5W, 5Y-5AA, 5AC-5AJ, and 5AL-5AW illustrate exemplary user interfaces for a home screen displaying a plurality of application launch icons (e.g., icons 480, 426, 428, 482, 432, 434, 436, 438, 440, 442, 444, 446, 484, 430, 486, 488, 416, 418, 420, and 424). Each of the launch icons is associated with an application that is activated (e.g., "launched") on the electronic device 100 upon detection of an application-launch input (e.g., a tap gesture having a maximum intensity below a threshold for invoking the quick action menu). Some of the launch icons are also associated with corresponding quick action menus, which are activated on the electronic device upon detection of a quick-action-display input (e.g., a force-press gesture having a maximum intensity at or above the threshold for invoking the quick action menu).

Figure 5B:
Figure 5C:
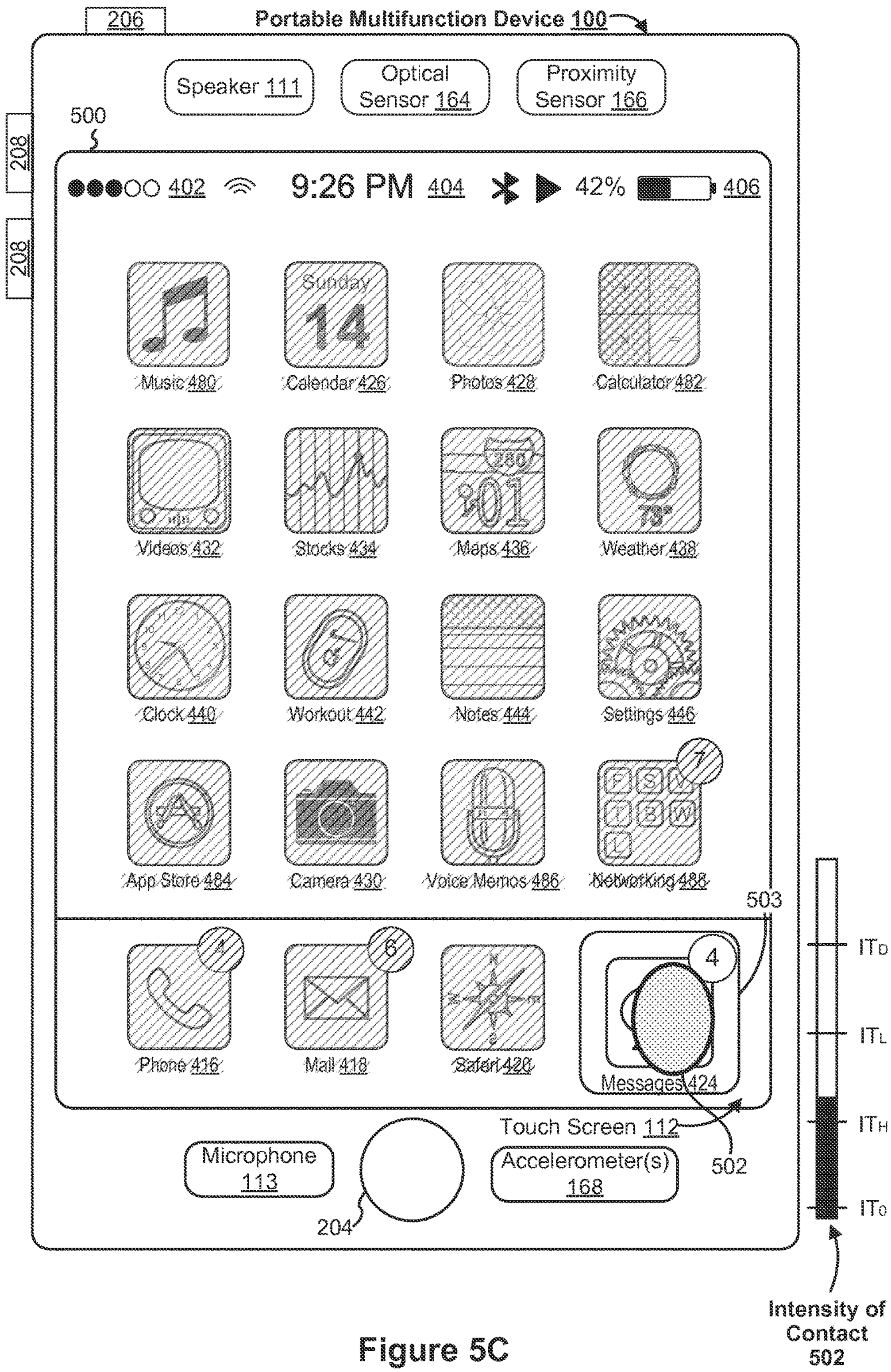
Figure 5D:
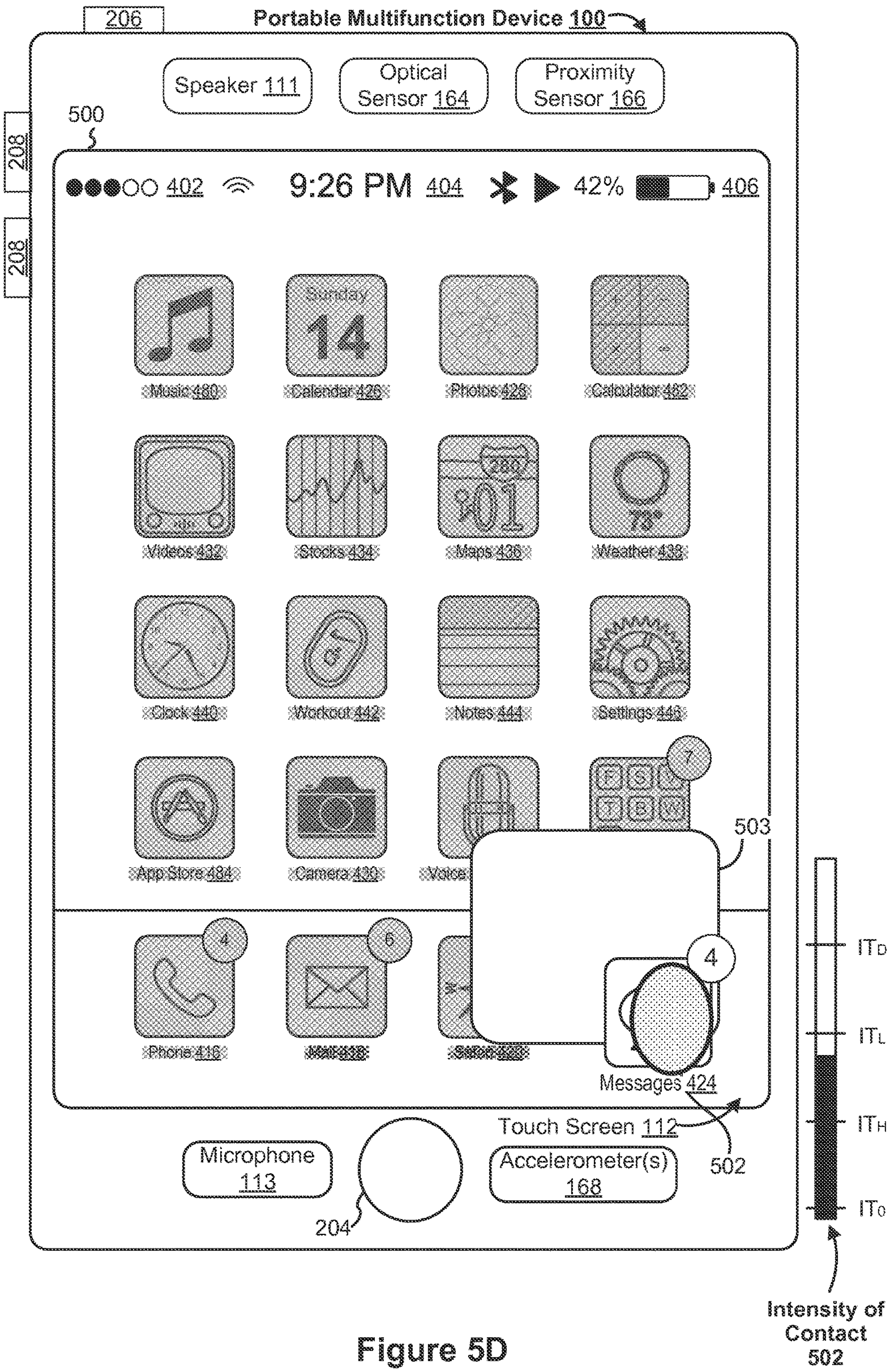

FIGS. 5A-5H illustrate an embodiment where the user calls up a quick action display menu and invokes an action for responding to a recent message, from a home screen of the electronic device 100. FIG. 5A illustrates a home screen user interface 500 displaying application launch icons for several applications, including messages icon 424 for activating a messaging application. The device detects contact 502 on the messages icon 424 in FIG. 5B, with an intensity below the intensity threshold needed to invoke the quick-action menu (e.g., $IT_L$). In FIG. 5C, the intensity of contact 502 increases above a "hint" threshold (e.g., $IT_H$), but remains below the intensity threshold needed to invoke the quick-action menu. The device indicates that the user is approaching the intensity needed to call up the quick action menu by starting to blur and push the other launch icons back in virtual z-space (e.g., away from the screen) and by providing hint graphic 503 that appears to grow out from under messages icon 424. As illustrated in FIG. 5D, the icon blurring, icon movement back in z-space, and hint graphic are dynamically responsive to increasing contact 502 intensity below the quick-action menu threshold (e.g., $IT_L$). Hint graphic 503 continues to grow, and begins migrating out from under messages icon 424.

Figure 5E:
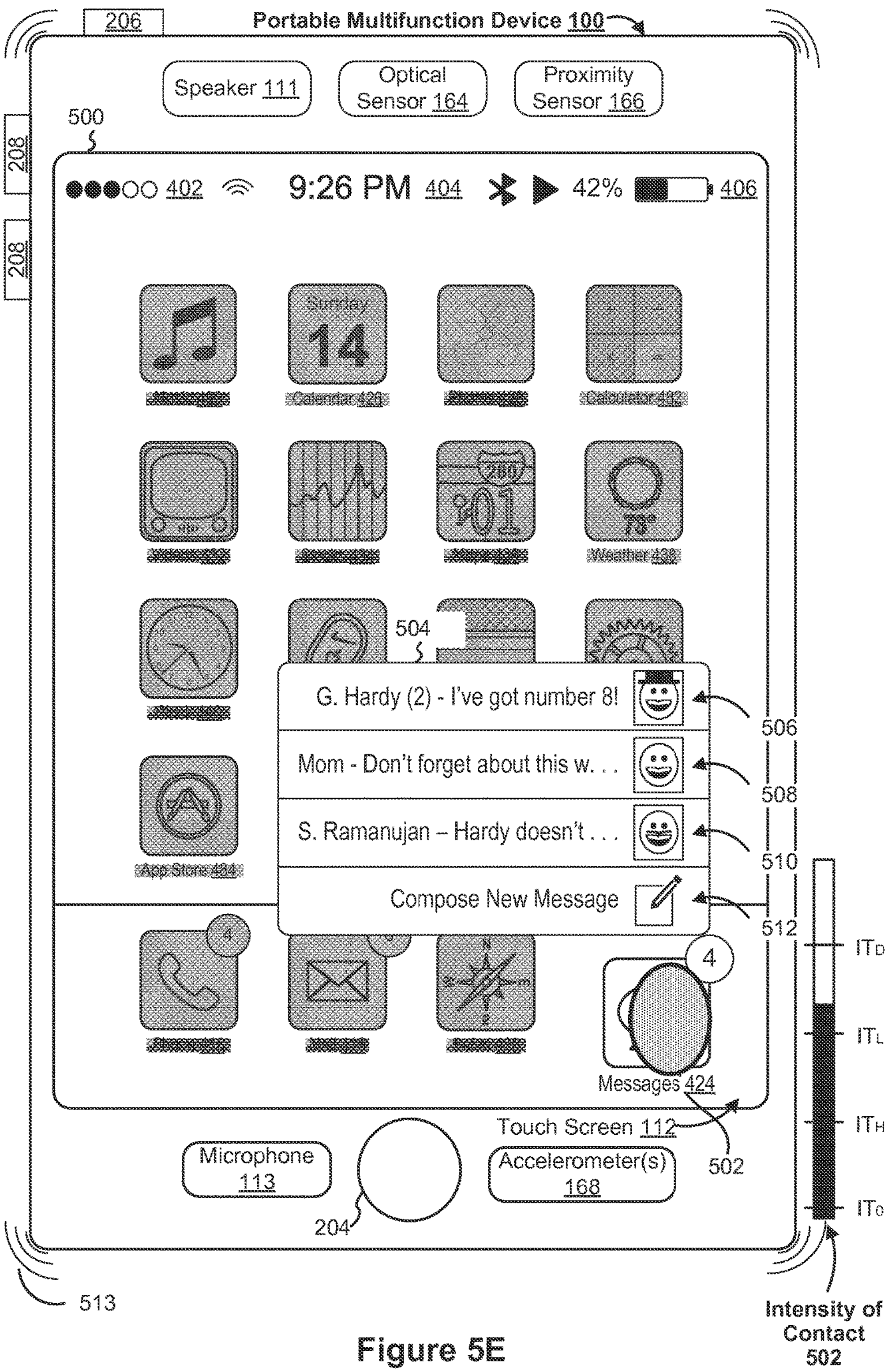
Figure 5F:
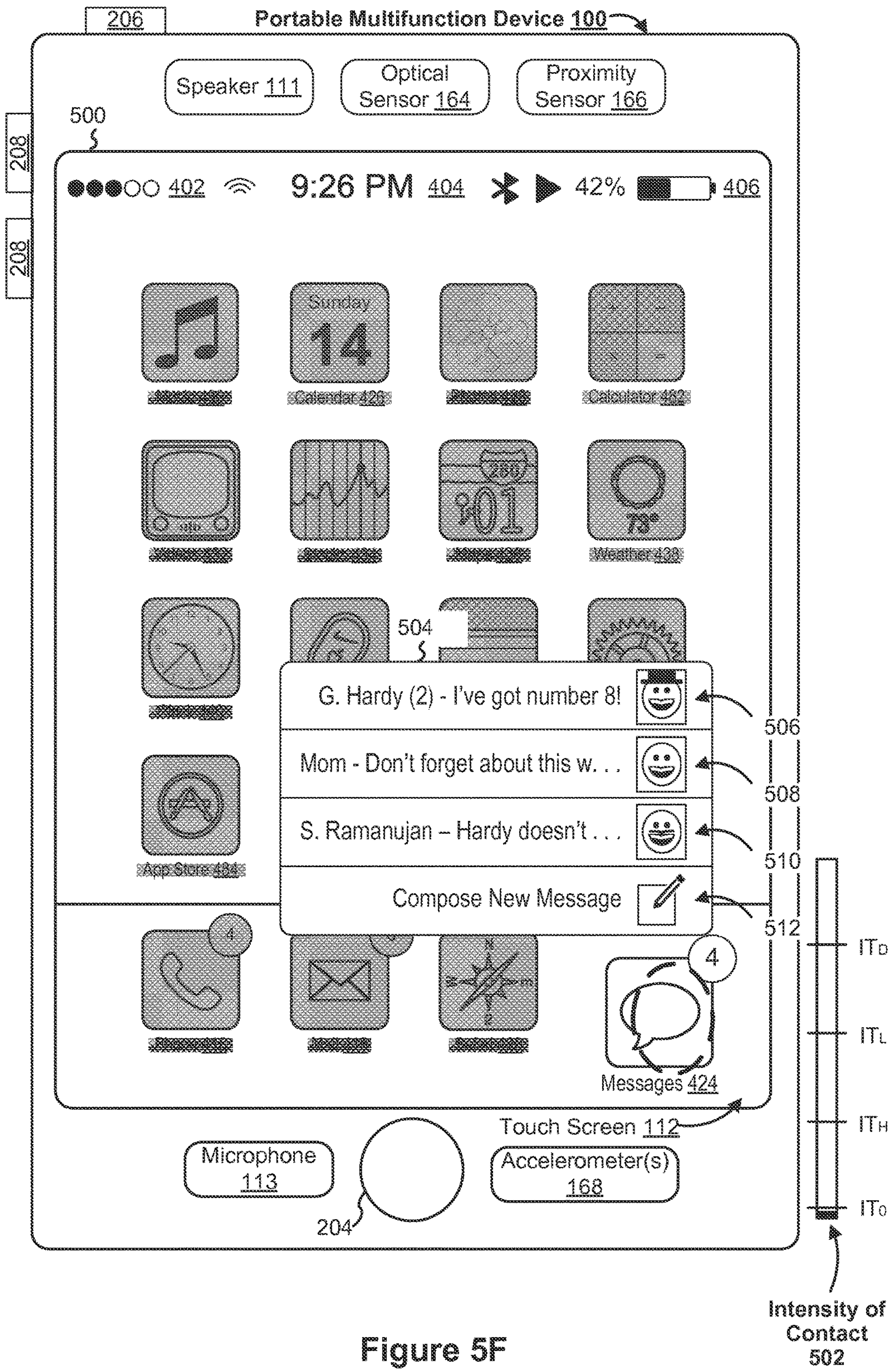
Figure 5G:
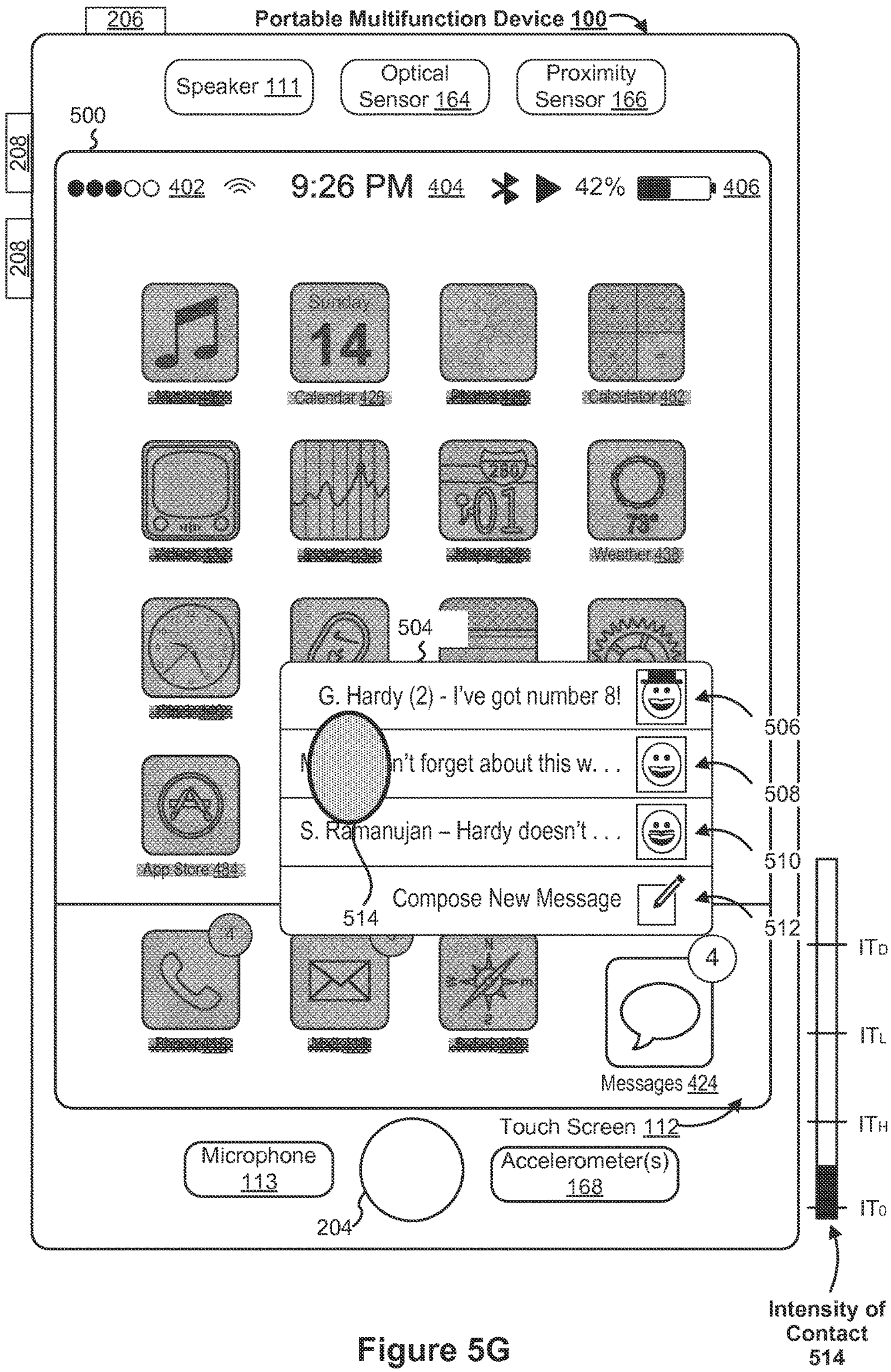
Figure 5H:
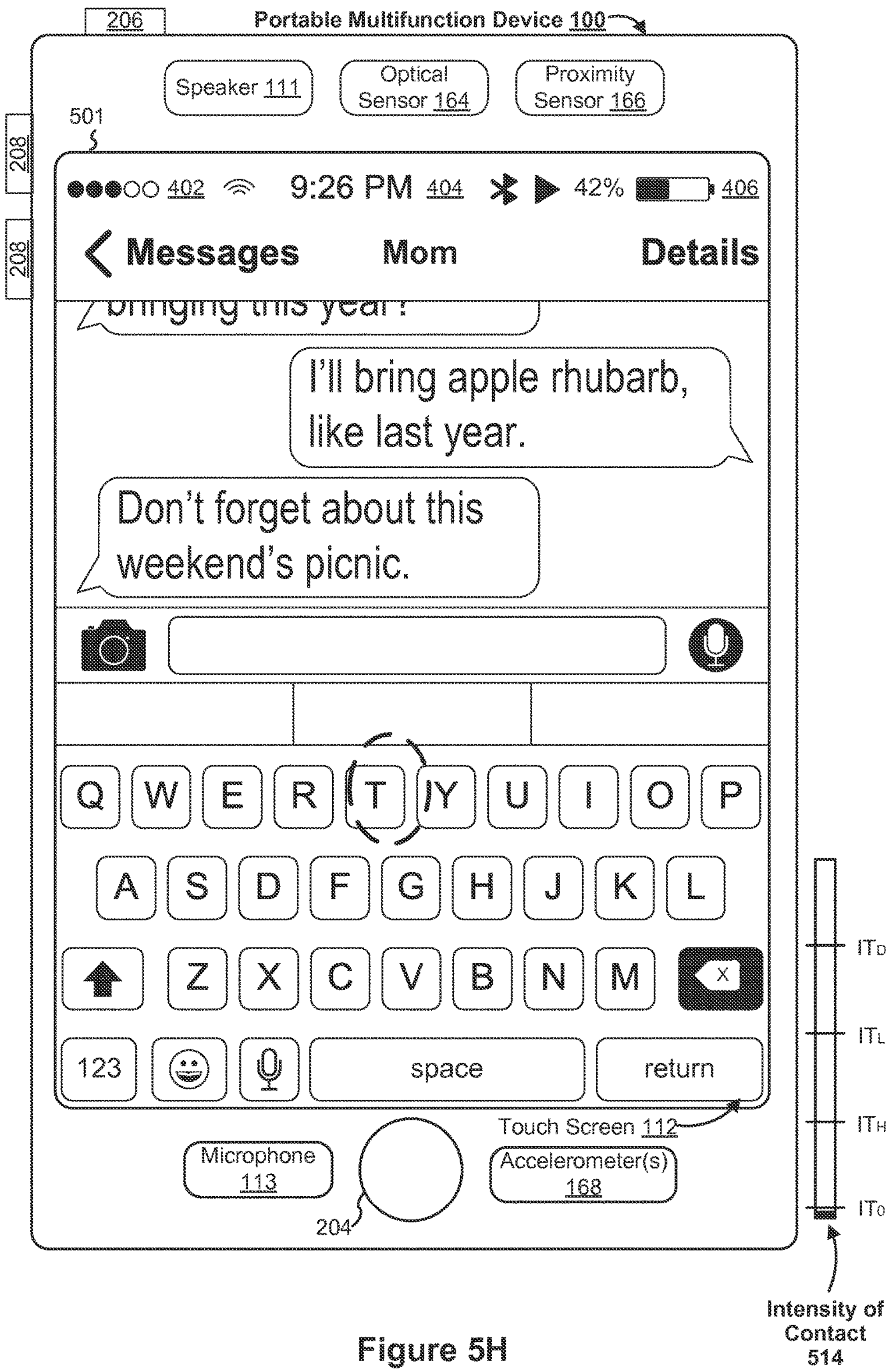

In FIG. 5E, the intensity of contact 502 increases above the threshold (e.g., $IT_L$) needed to invoke messages quick-action menu 504. In response, hint graphic 503 morphs into quick-action menu 504, which displays an icon and text for each selection 506, 508, 510, and 512 that are now available to the user. The device also provides tactile feedback 513, to alert the user that the quick-action menu is now functional. The user lifts-off contact 502 in FIG. 5F, but quick-action menu 504 remains displayed on touch screen 112 because it is a selection menu. The user elects to respond to his mother's message by tapping (via contact 514) on option 508 in quick-action menu 504, as illustrated in FIG. 5G. In response, the device activates the messaging application and displays user interface 501, which includes a text prompt for responding to mom's message, rather than opening the application to a default user interface (e.g., a view of the last message received).

Figure 5I:
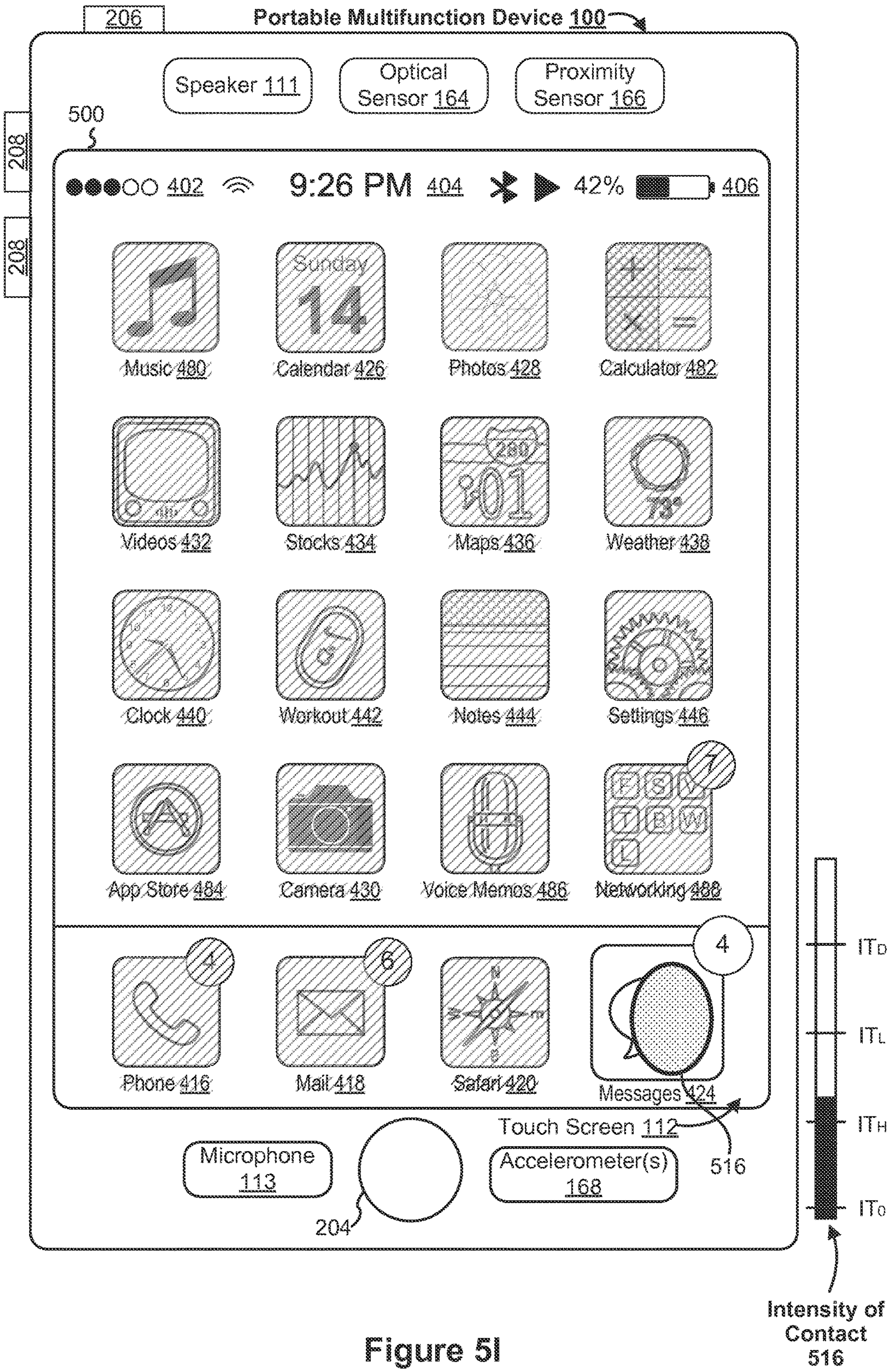

FIG. 5I illustrates an alternative hint state, in which the size of messaging icon 424 increases (e.g., simulating that the icon is coming out of the screen towards the user) in response to contact 516, which has an intensity above a "hint" threshold, but below a "quick-action menu" intensity threshold, in accordance with some embodiments.

Figure 5J:
Figure 5K:
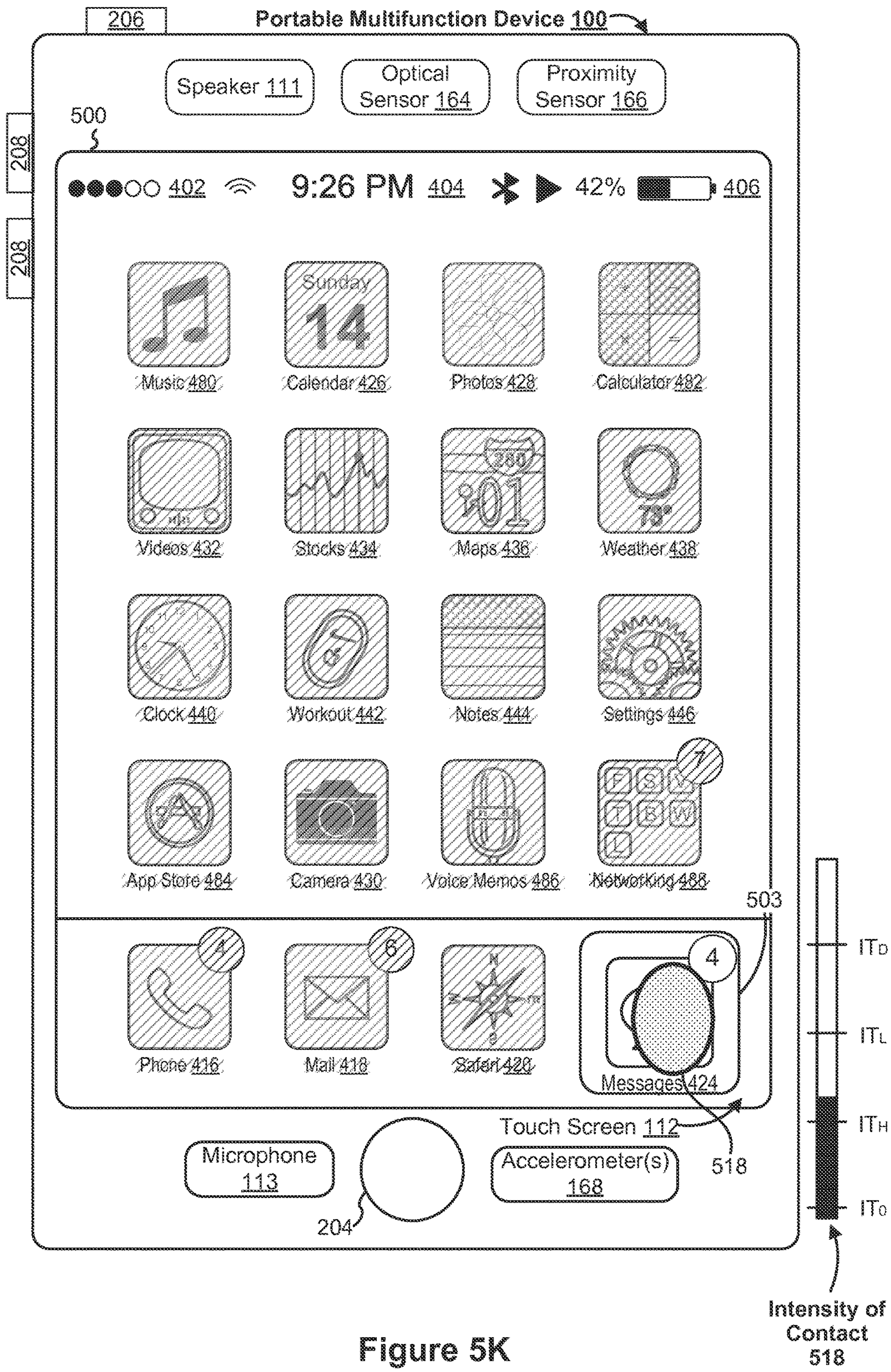
Figure 5L:
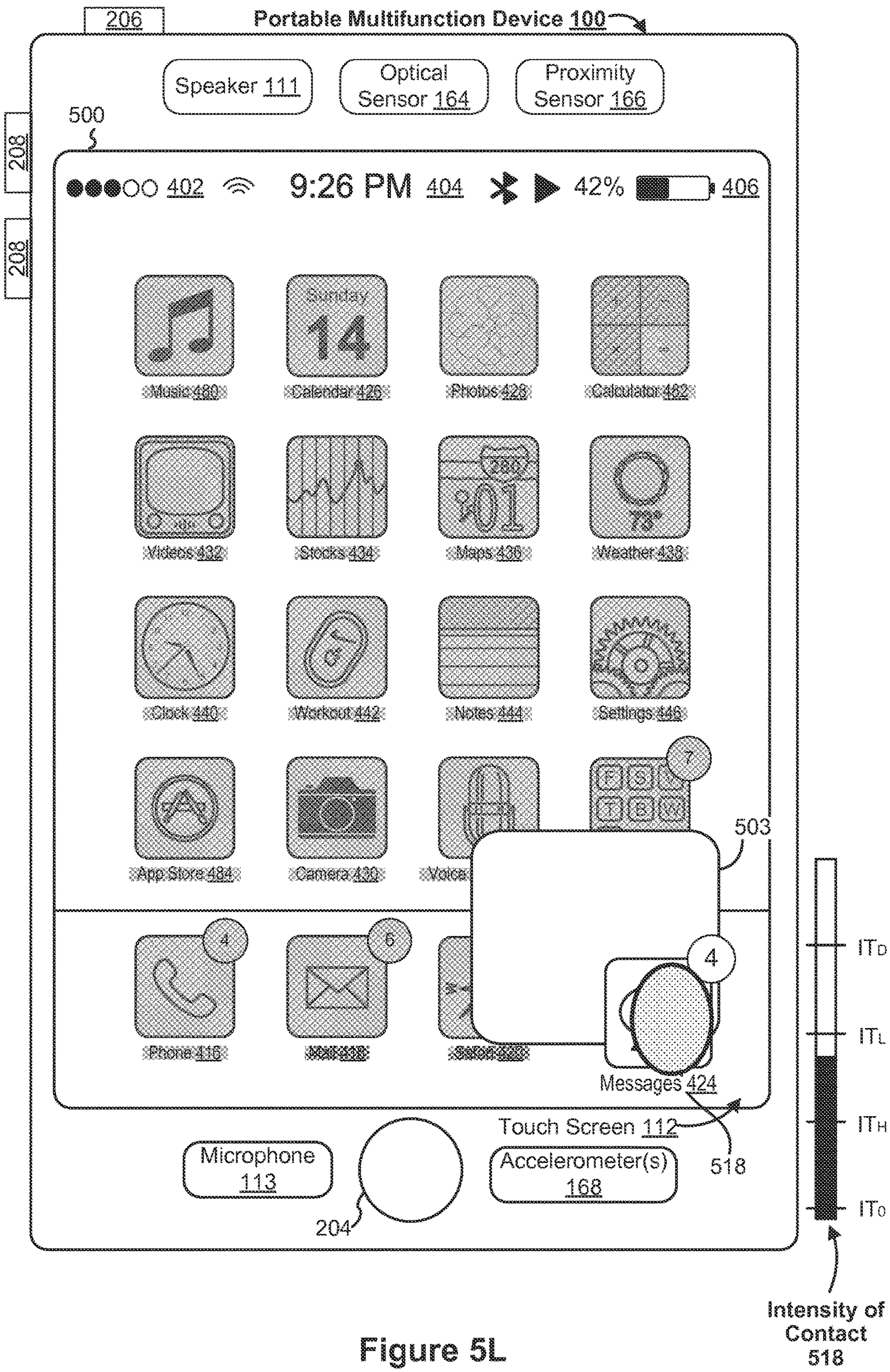
Figure 5M:
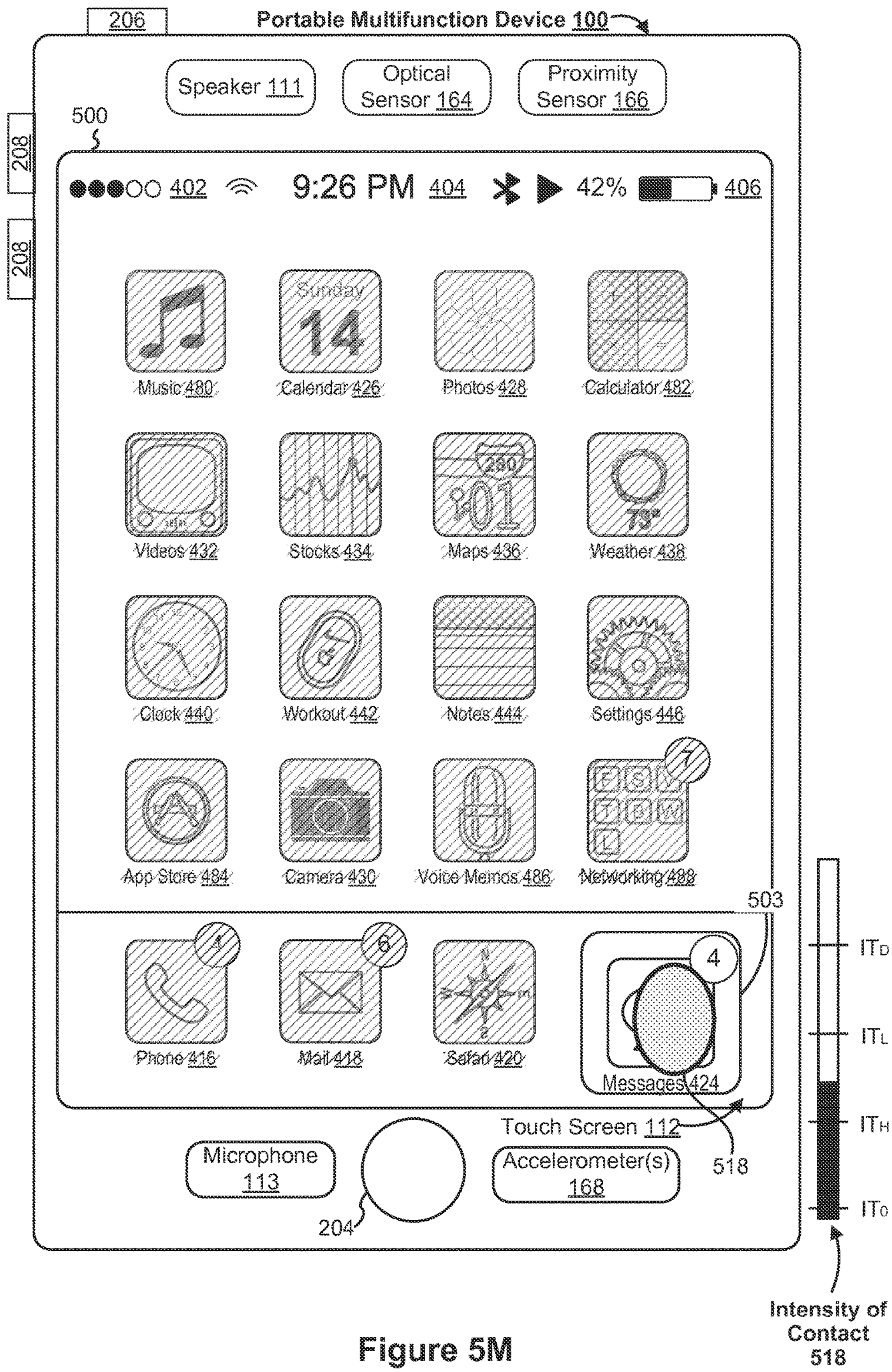
Figure 5N:

FIGS. 5J-5N illustrate an embodiment where the user begins to call-up a quick-action menu, but stops short of reaching the required intensity threshold. In FIG. 5J, the device 100 detects contact 518 on messages icon 424, displayed in home screen user interface 500, with an intensity below the intensity threshold needed to invoke the quick-action menu (e.g., $IT_L$). In FIGS. 5K and 5L, the intensity of contact 518 increases above a "hint" threshold (e.g., $IT_H$), but remains below the intensity threshold needed to invoke the quick-action menu. The device indicates that the user is approaching the intensity needed to call up the quick action menu by dynamically blurring the other launch icons, dynamically pushing the other icons back in virtual z-space (e.g., making them smaller relative to messages icon 424), and providing hint graphic 503 that appears and dynamically grows out from under messages icon 424. However, FIG. 5M illustrates that the user reduces the intensity of contact 518 before reaching the intensity threshold (e.g., $IT_L$) required to invoke the quick-action menu. In response, the device dynamically reverses the icon blurring and shrinking, and begins shrinking the hint graphic 503, that indicated the user was approaching the quick-action intensity threshold. In FIG. 5N, the user lifts-off contact 518. Because the intensity of contact 518 never reached the intensity threshold required to invoke the quick-action menu (e.g., $IT_L$), the device returns the display of user interface 500 to the same state as before contact 518 was detected.

Figure 5O:
Figure 5P:
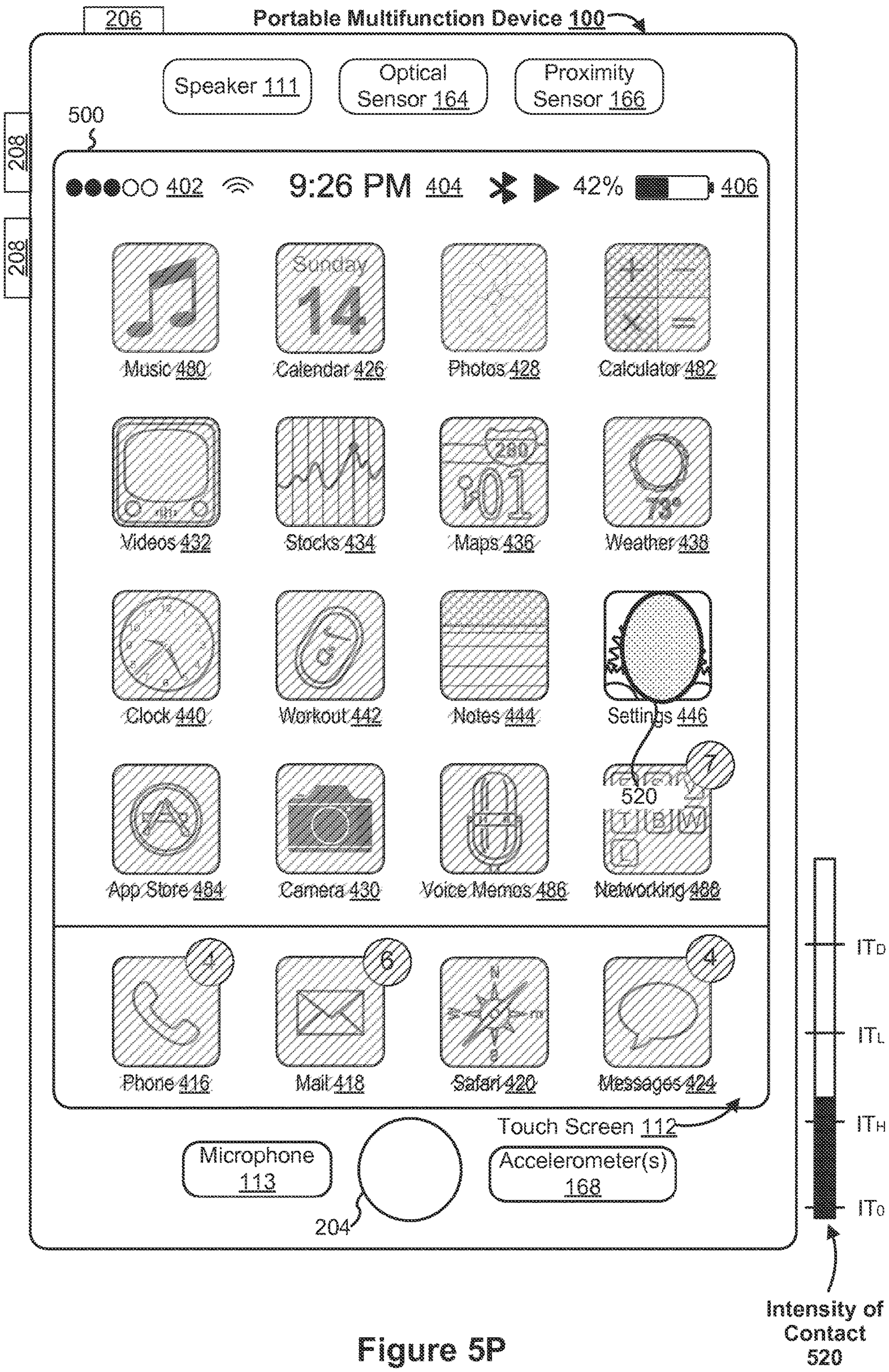
Figure 5Q:
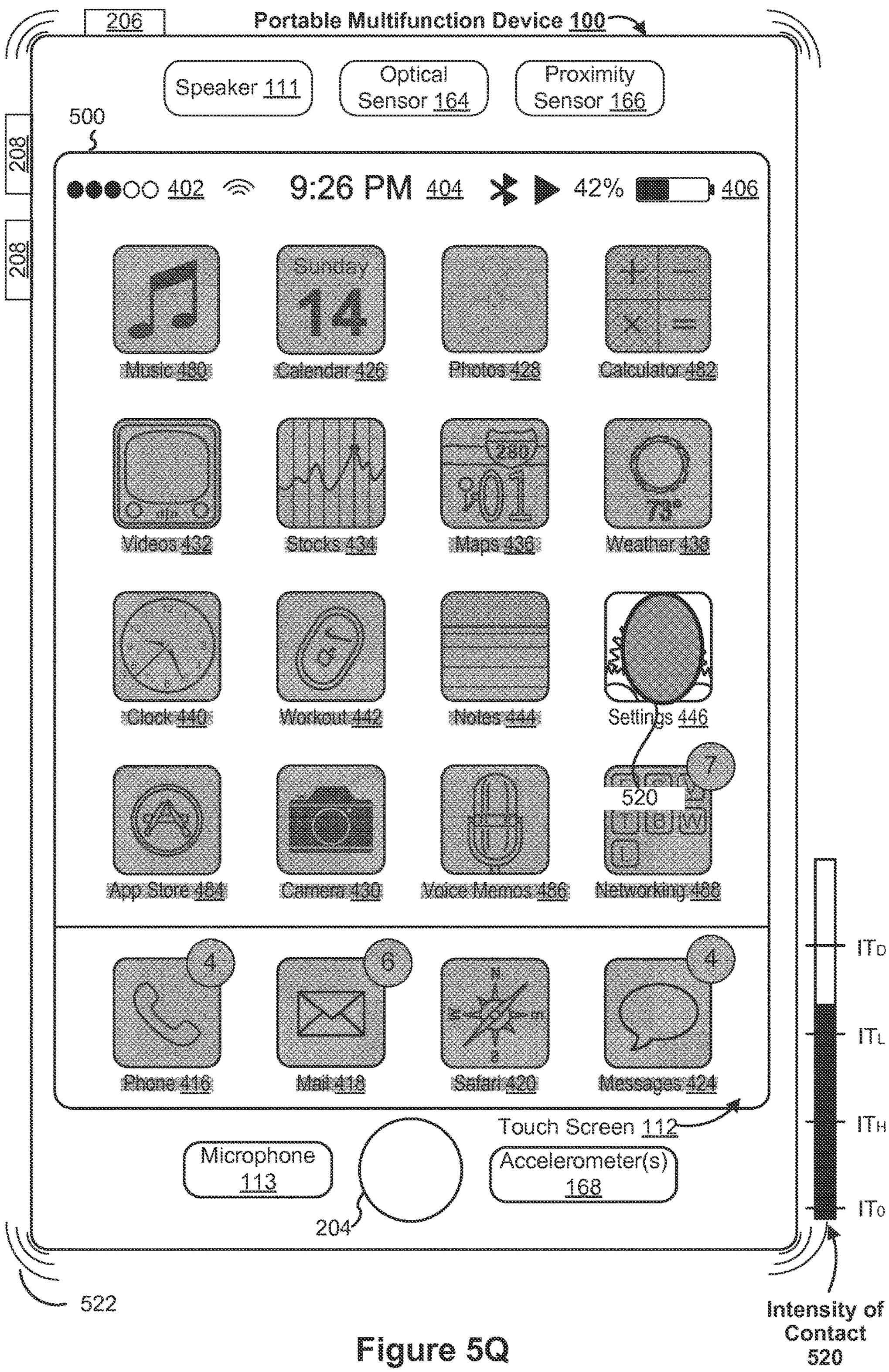
Figure 5R:
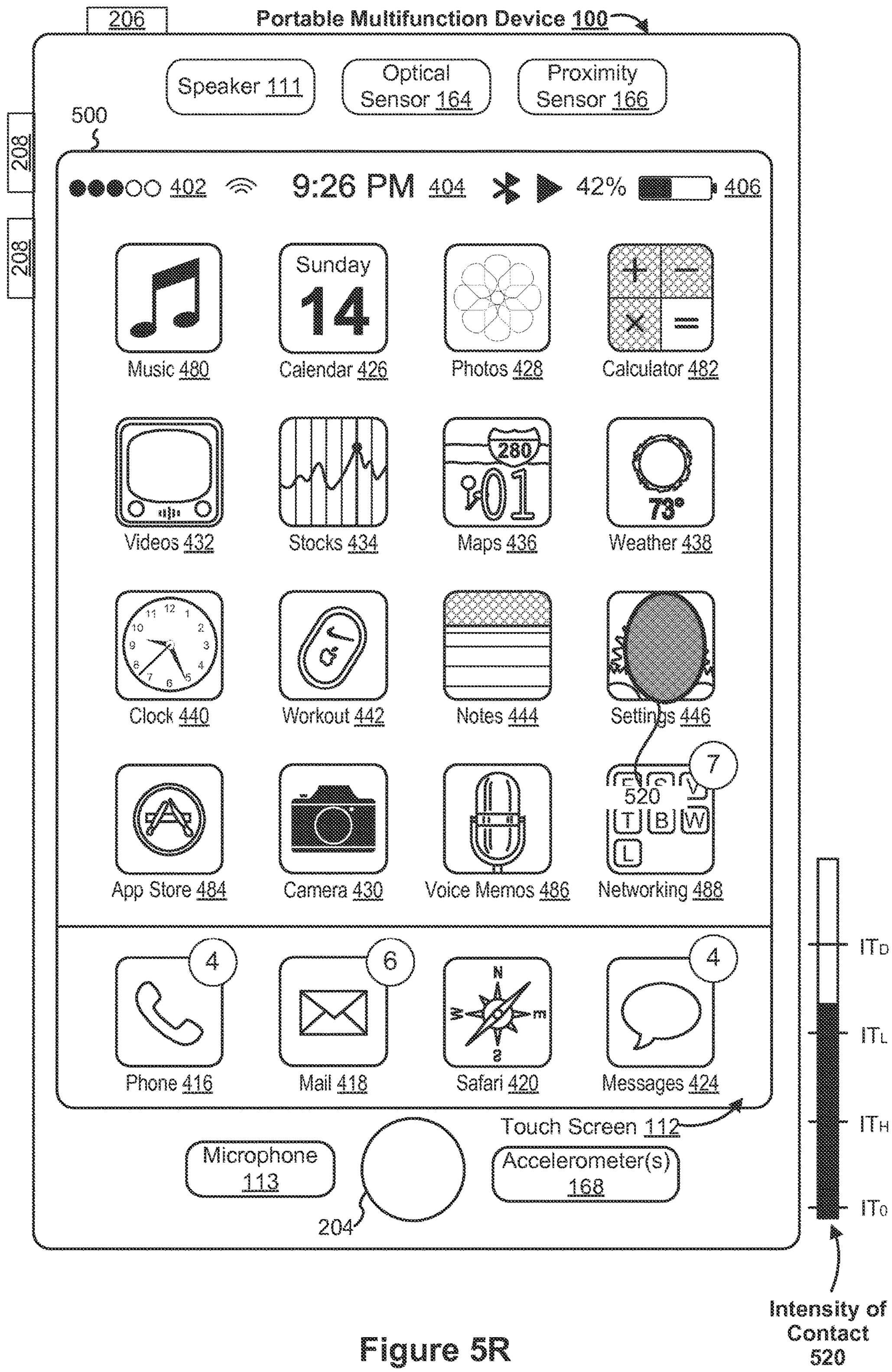

FIGS. 5O-5R illustrate an embodiment where the user performs a gesture meeting the quick-action-display input criteria at a launch icon that does not have an associated quick-action menu. In FIG. 5O, the device 100 detects contact 520 on settings launch icon 446, displayed in home screen user interface 500, with an intensity below the intensity threshold needed to invoke a quick-action menu (e.g., $IT_L$). In FIG. 5P, the intensity of contact 520 increases above a "hint" threshold (e.g., $IT_H$), but remains below the intensity threshold needed to invoke a quick-action menu. The device indicates that the user is approaching the intensity needed to call up a quick action menu by blurring (e.g., dynamically) the other launch icons. However, because settings launch icon 446 is not associated with a quick action menu, the device does not provide a hint graphic (e.g., like hint graphic 503 in FIG. 5C). In FIG. 5Q, the intensity of contact 520 increases above the threshold (e.g., $IT_L$) required to invoke a quick-action menu. However, the device does not display a quick-action menu because settings launch icon 446 is not associated with one. Rather, the device provides negative haptic feedback 522, which is distinguishable from positive haptic feedback 513 illustrated in FIG. 5E, to indicate to the user that no quick-action menu is available for settings launch icon 446. The device then returns display of user interface 500 to the same state as before contact 520 was detected in FIG. 5R, regardless of whether the user lifts-off contact 520.

Figure 5S:
Figure 5T:
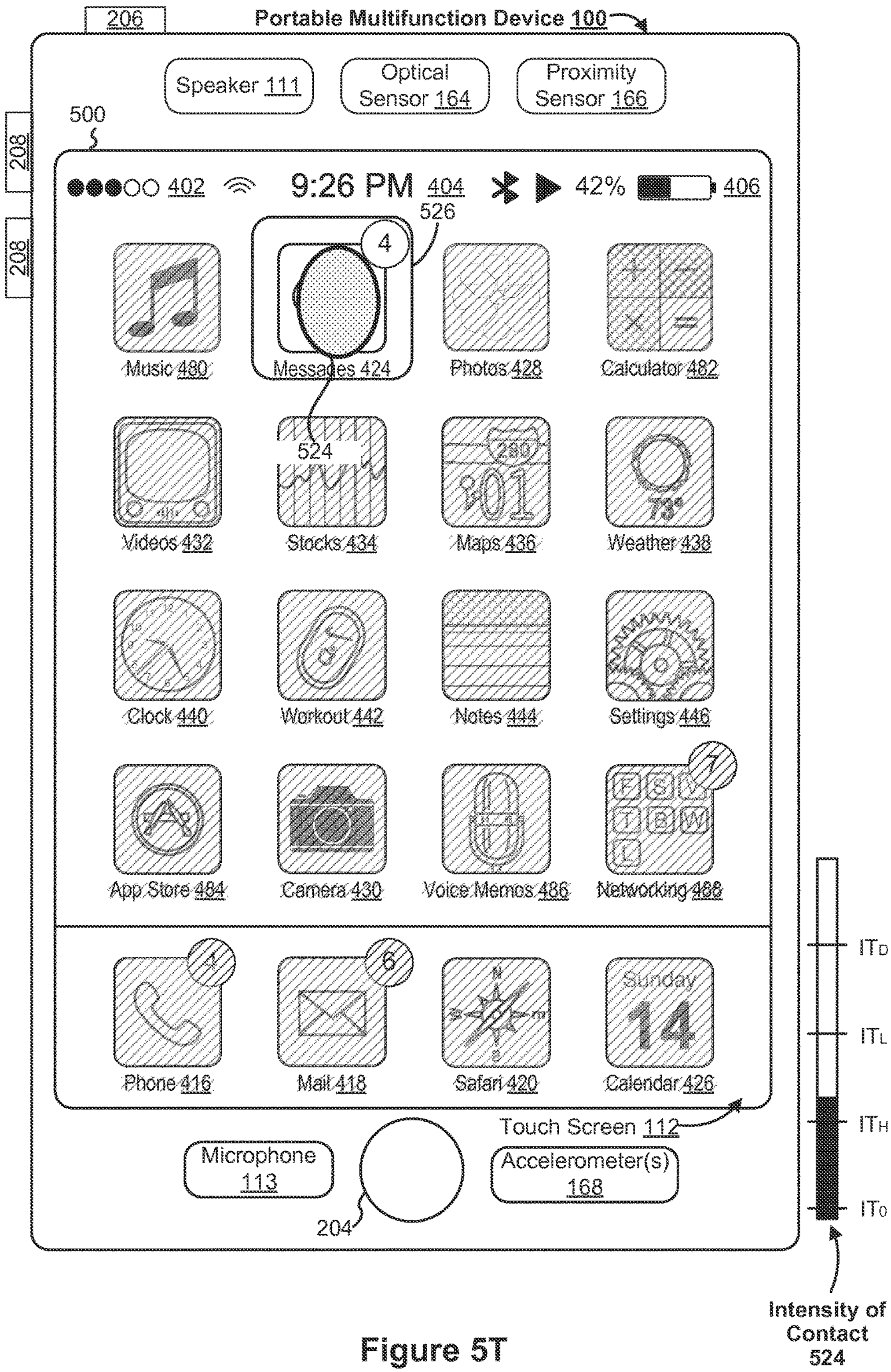
Figure 5U:
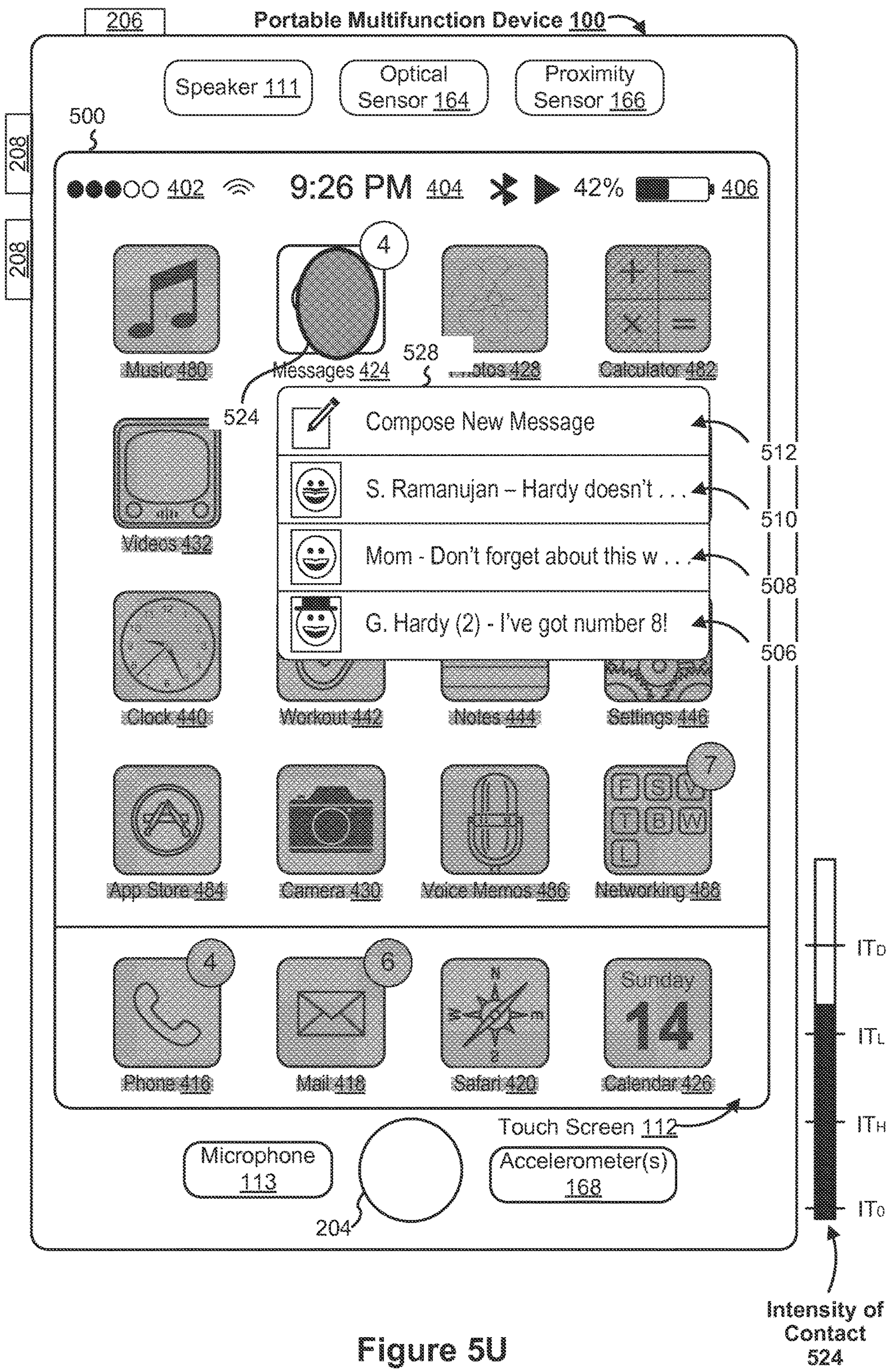

FIGS. 5S-5U illustrate an embodiment where the user invokes a quick-action menu at a launch icon located in the upper-left quadrant of touch screen 112. In FIG. 5J, the device 100 detects contact 524 on messages icon 424, displayed in the upper-left quadrant of home screen user interface 500, with an intensity below the intensity threshold needed to invoke the quick-action menu (e.g., $IT_L$). In FIG. 5T, the intensity of contact 524 increases above a "hint" threshold (e.g., $IT_H$), but remains below the intensity threshold needed to invoke the quick-action menu. The device indicates that the user is approaching the intensity needed to call up the quick action menu by dynamically blurring the other launch icons and providing hint graphic 503 that appears and dynamically grows out from under messages icon 424.

In FIG. 5U, the intensity of contact 524 increases above the threshold (e.g., $IT_L$) needed to invoke the quick-action menu. In response, hint graphic 503 morphs into quick-action menu 528, which displays an icon and text for each selection 506, 508, 510, and 512 that are now available to the user. However, because the launch icon is displayed on the left side of screen 112, quick-action menu 528 is aligned with the left edge of messages launch icon 424, rather than the right edge as illustrated in FIG. 5E (e.g., when messages launch icon 424 was displayed on the right side of touch screen 112). Likewise, the icons associated with options 506, 508, 510, and 512 are justified to the left side of quick-action menu 528, rather than the right side as illustrated in FIG. 5E. Also, because the launch icon is displayed on the top half of touch screen 112, quick-action menu 528 is displayed below messages launch icon 424, rather than above as illustrated in FIG. 5E (e.g., when messages launch icon 424 was displayed on the bottom half of touch screen 112). Similarly, the vertical order of options 506, 508, 510, and 512 is reversed, relative to quick-action menu 504 in FIG. 5E, such that the relative proximity of each option to messages launch icon 424 is the same in messages quick-action menus 504 and 528 (e.g., because the option to compose a new message 512 is prioritized over options 506, 508, and 510 to respond to recently received messages, option 512 is displayed closest to messages launch icon 424 in both quick-action menus.

Figure 5V:
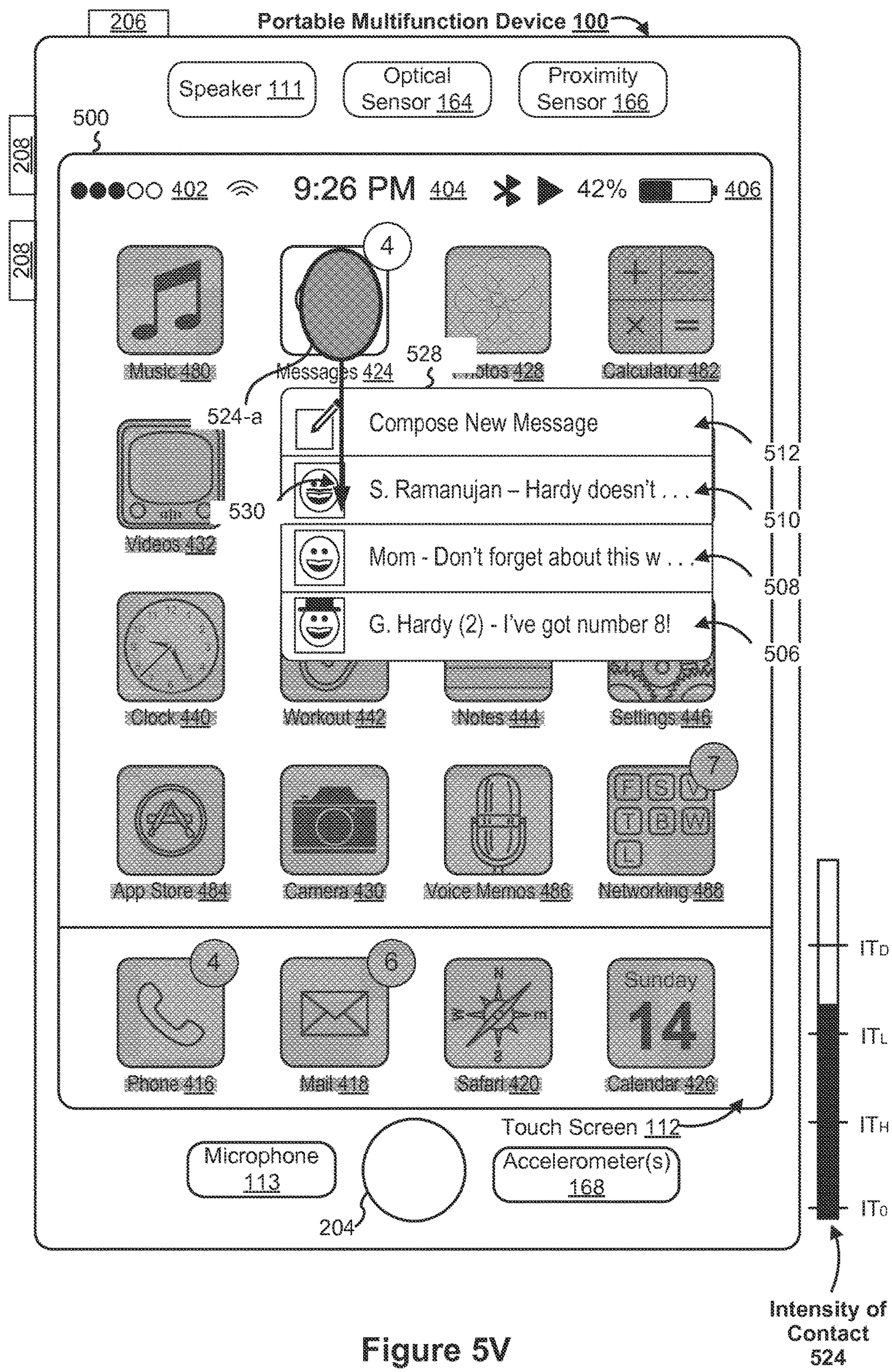

FIGS. 5V-5AF illustrate alternative user inputs for performing different actions after calling-up a quick-action menu, in accordance with some embodiments.

Figure 5W:
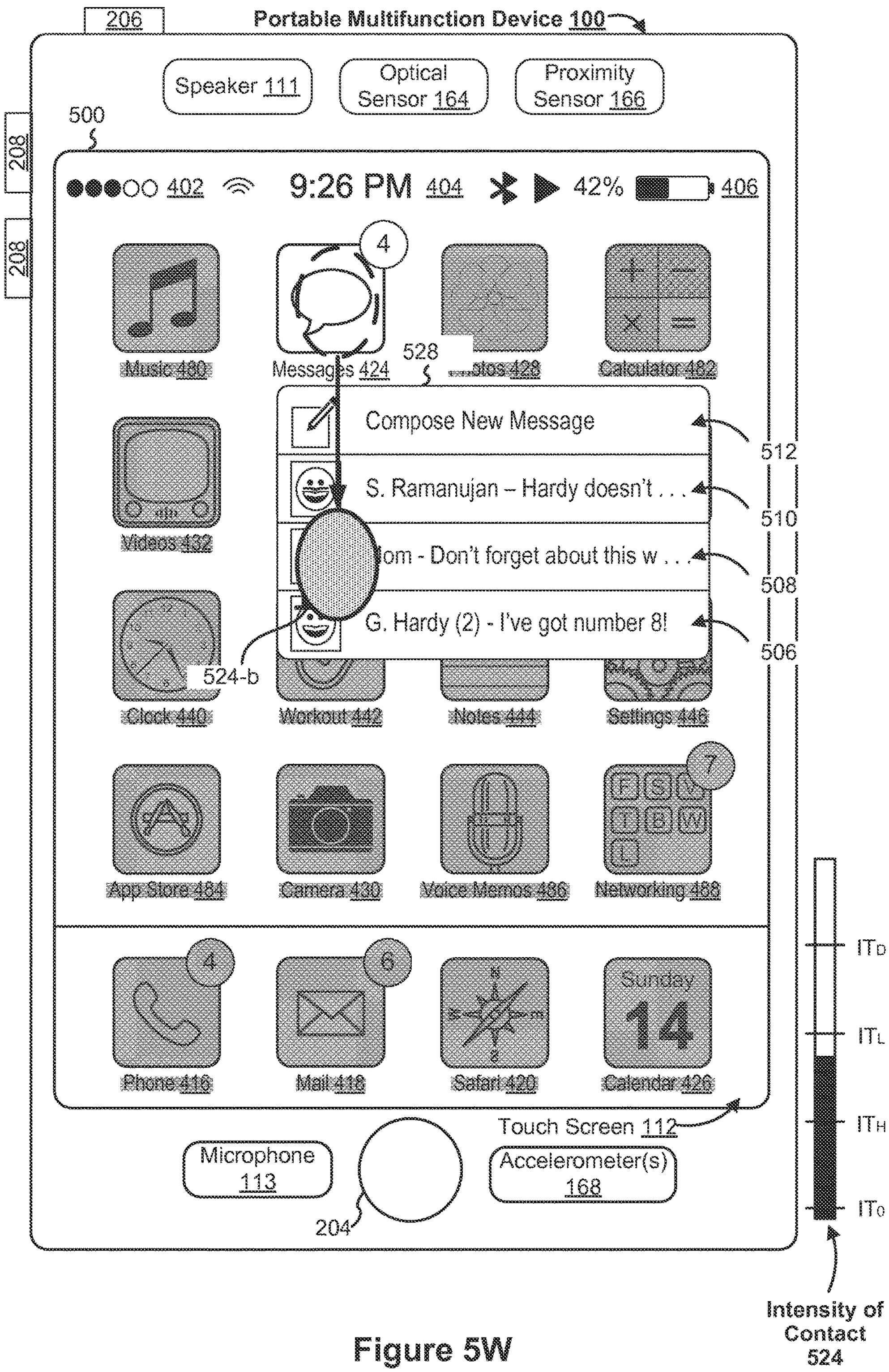
Figure 5X:
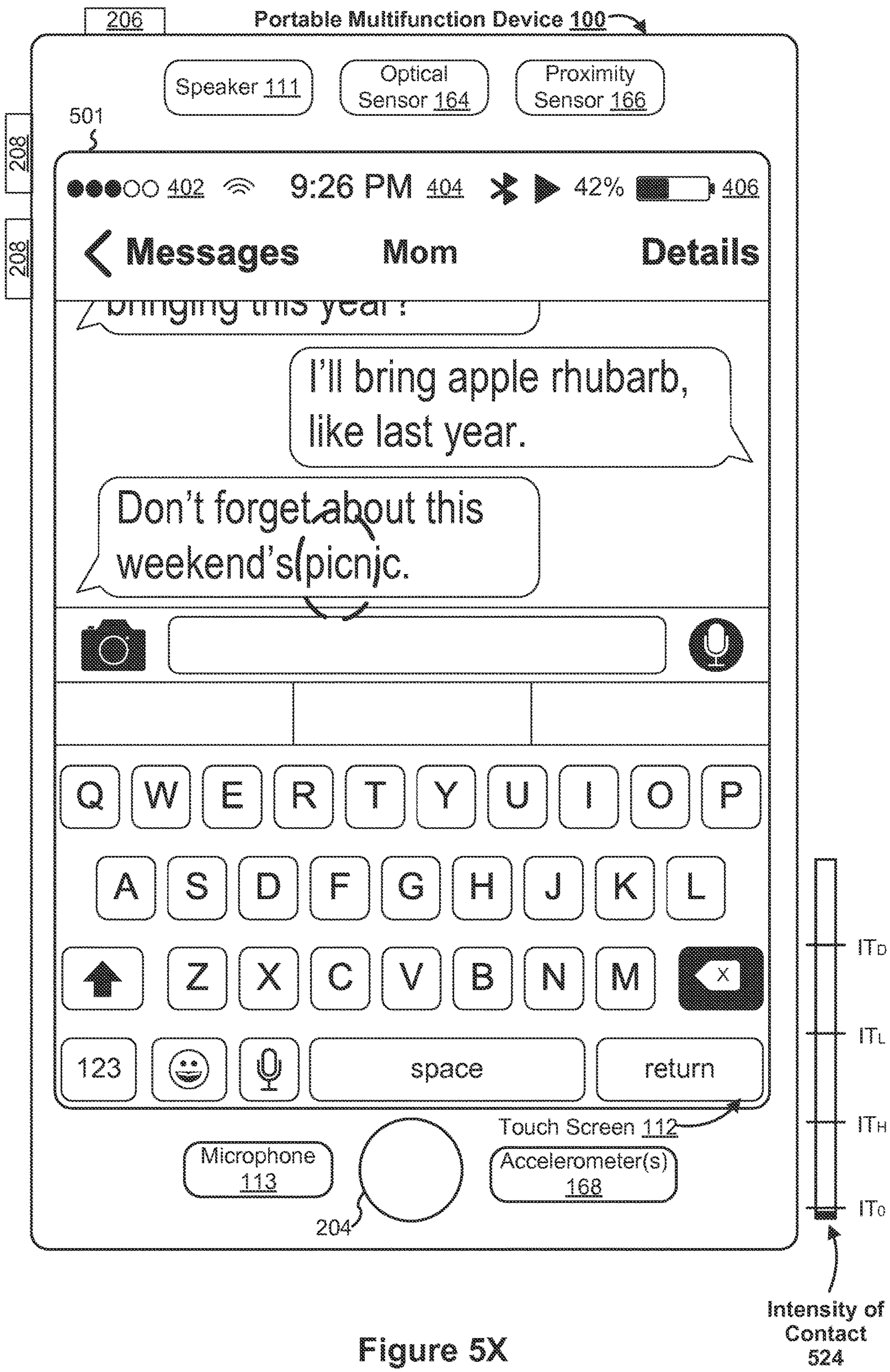

In FIG. 5V, after invoking messages quick-action menu 528 on home screen user interface 500 via contact 524, the user slides contact 524 over option 508 to reply to the message from his mother, as illustrated in FIG. 5W. As illustrated in FIG. 5W, the user does not need to maintain the intensity of contact 524 above the quick-action menu intensity threshold (e.g., $IT_L$) during movement 530. The user then lifts-off contact 524 while over option 508 and, as illustrated in FIG. 5X, the device activates the messaging application and displays user interface 501, which includes a text prompt for responding to mom's message.

Figure 5Y:
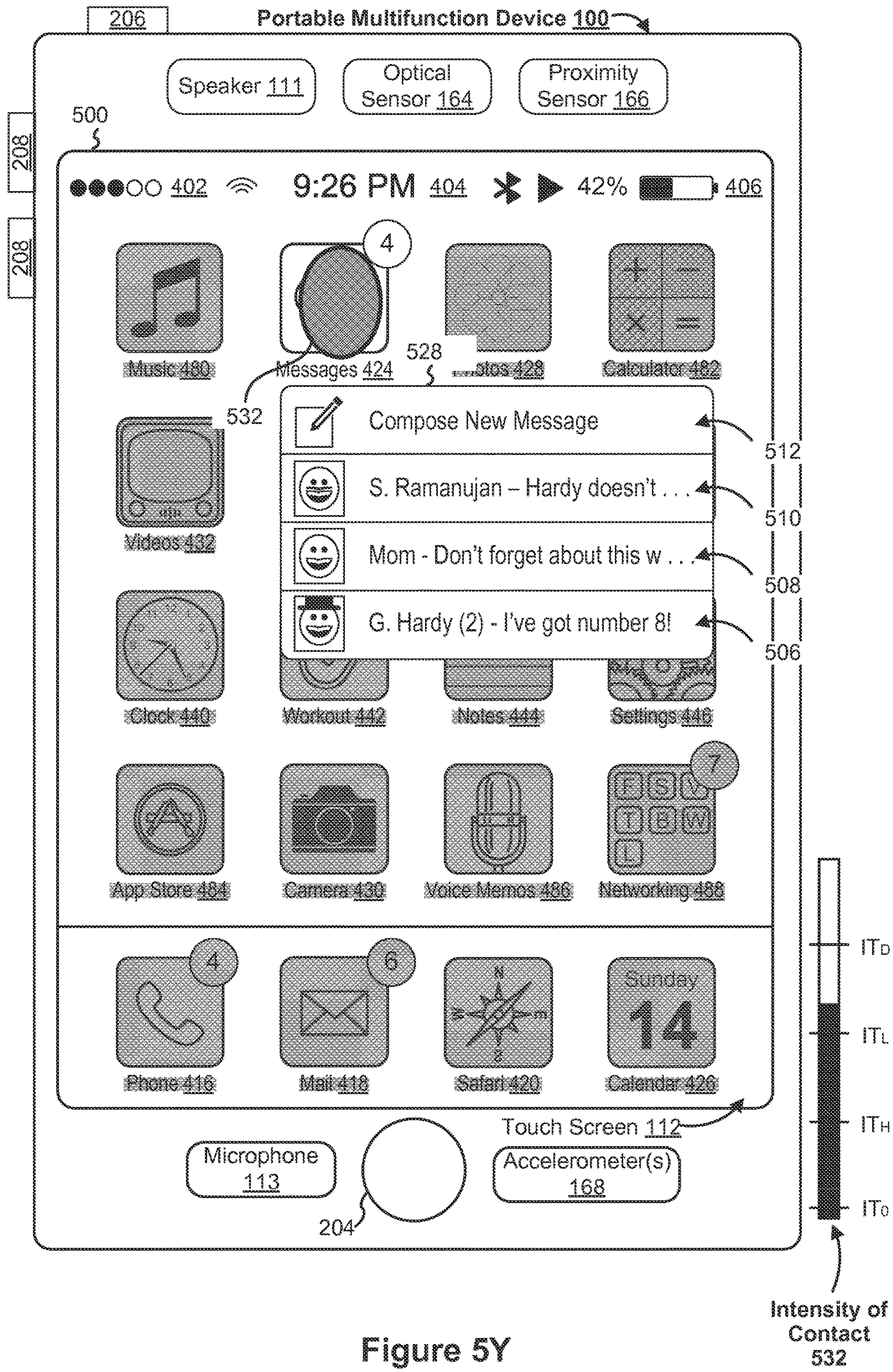
Figure 5Z:
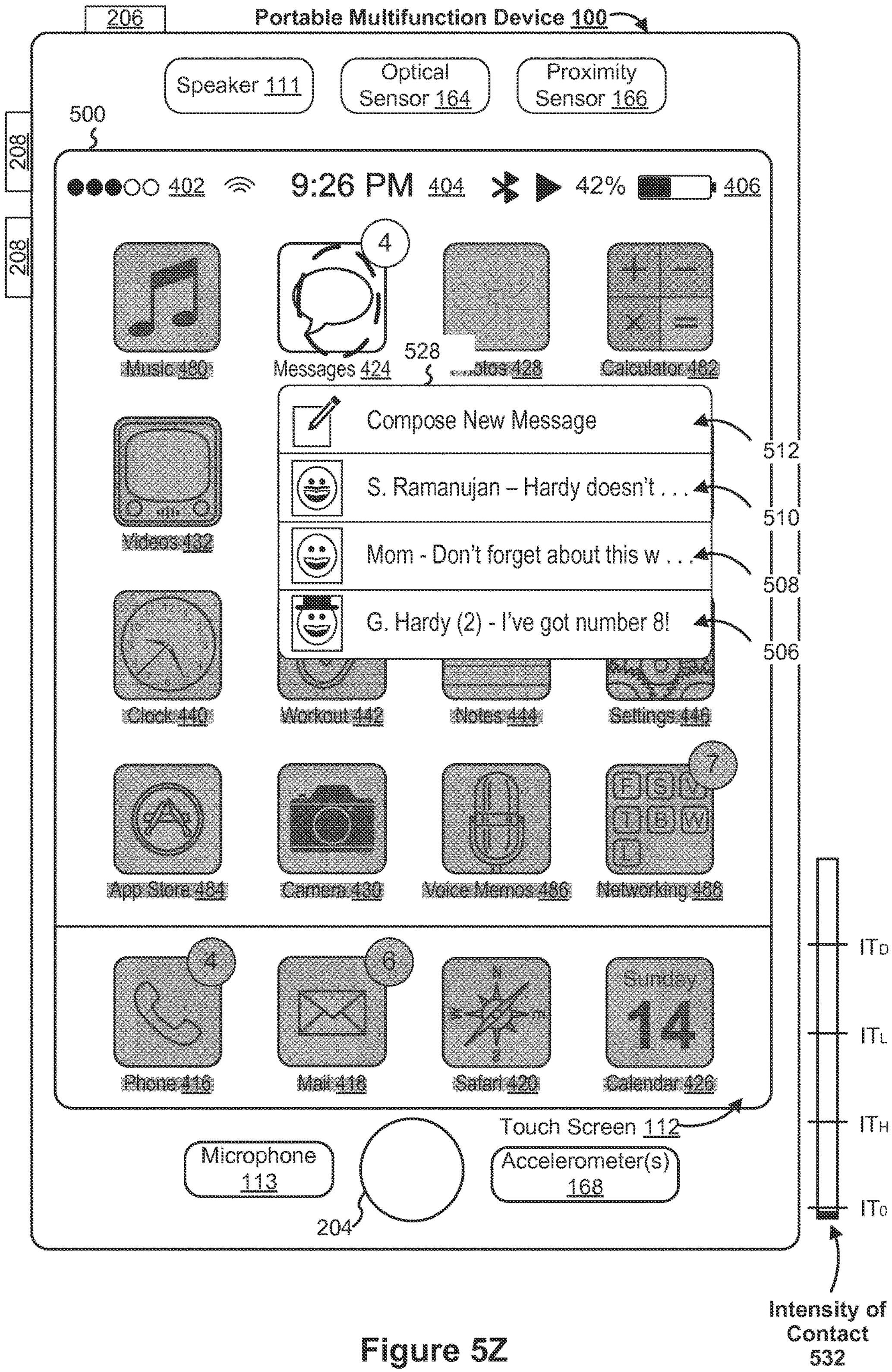
Figure 5A:
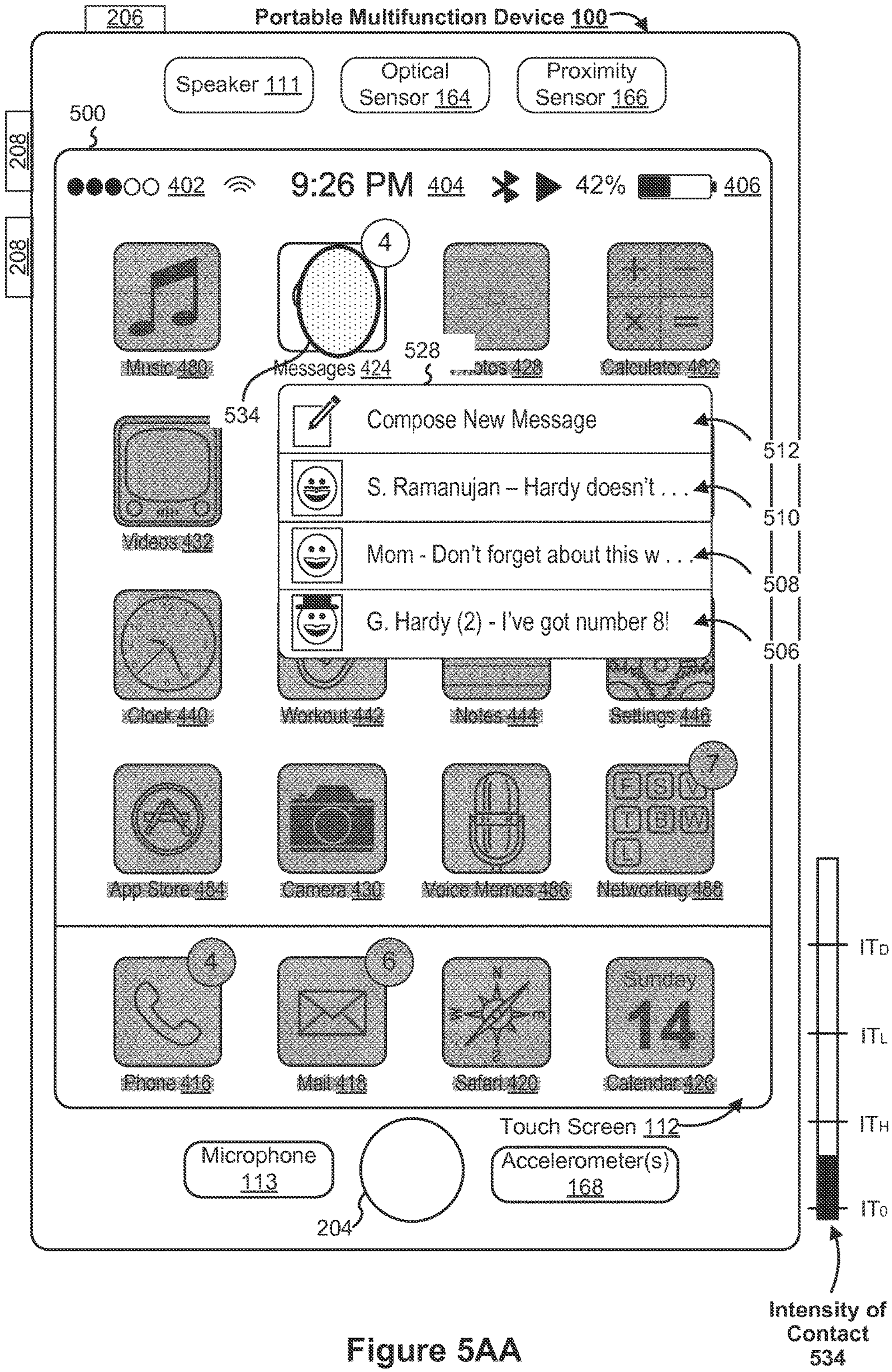
Figure 5A:
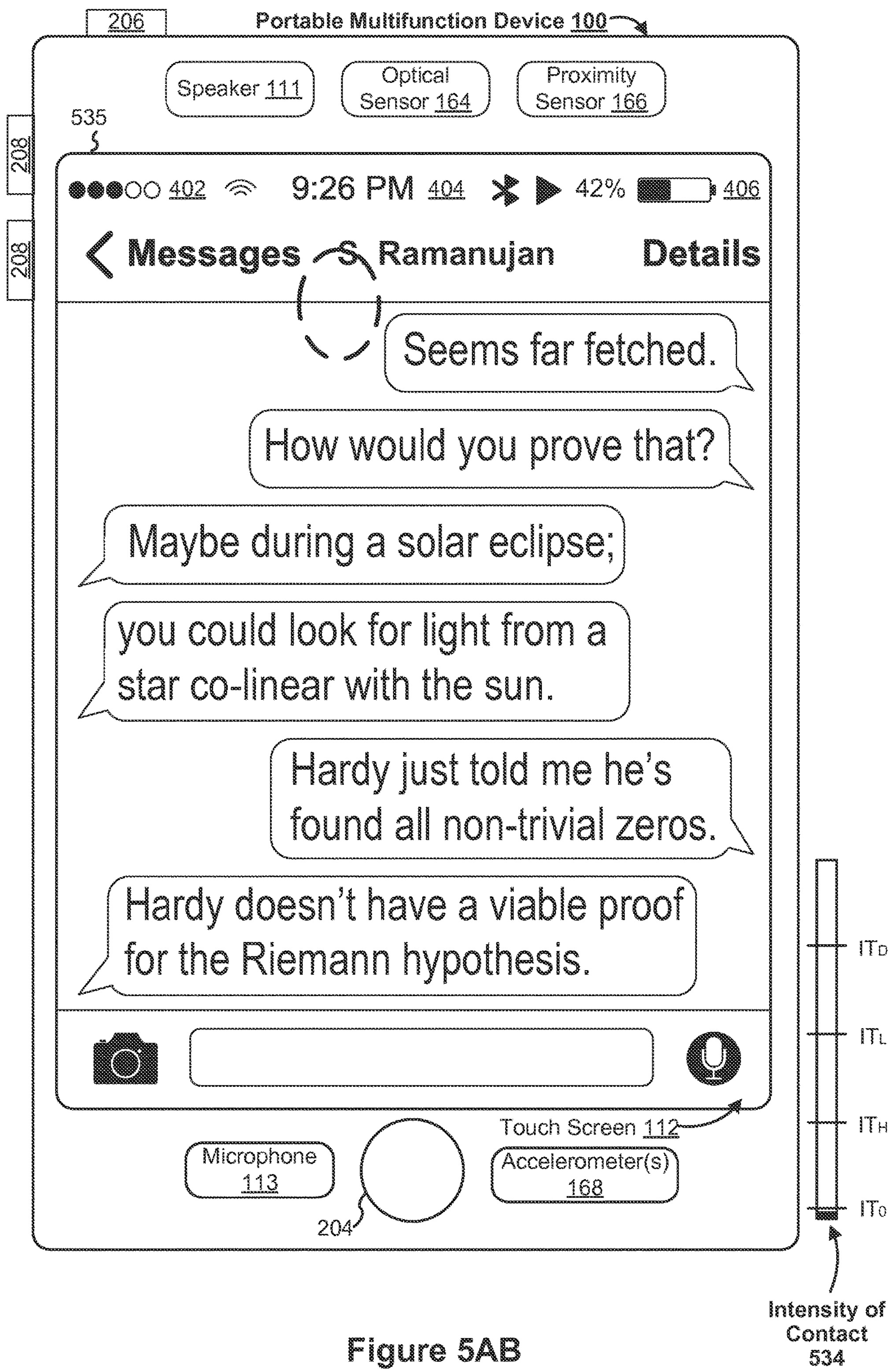
Figure 5A:
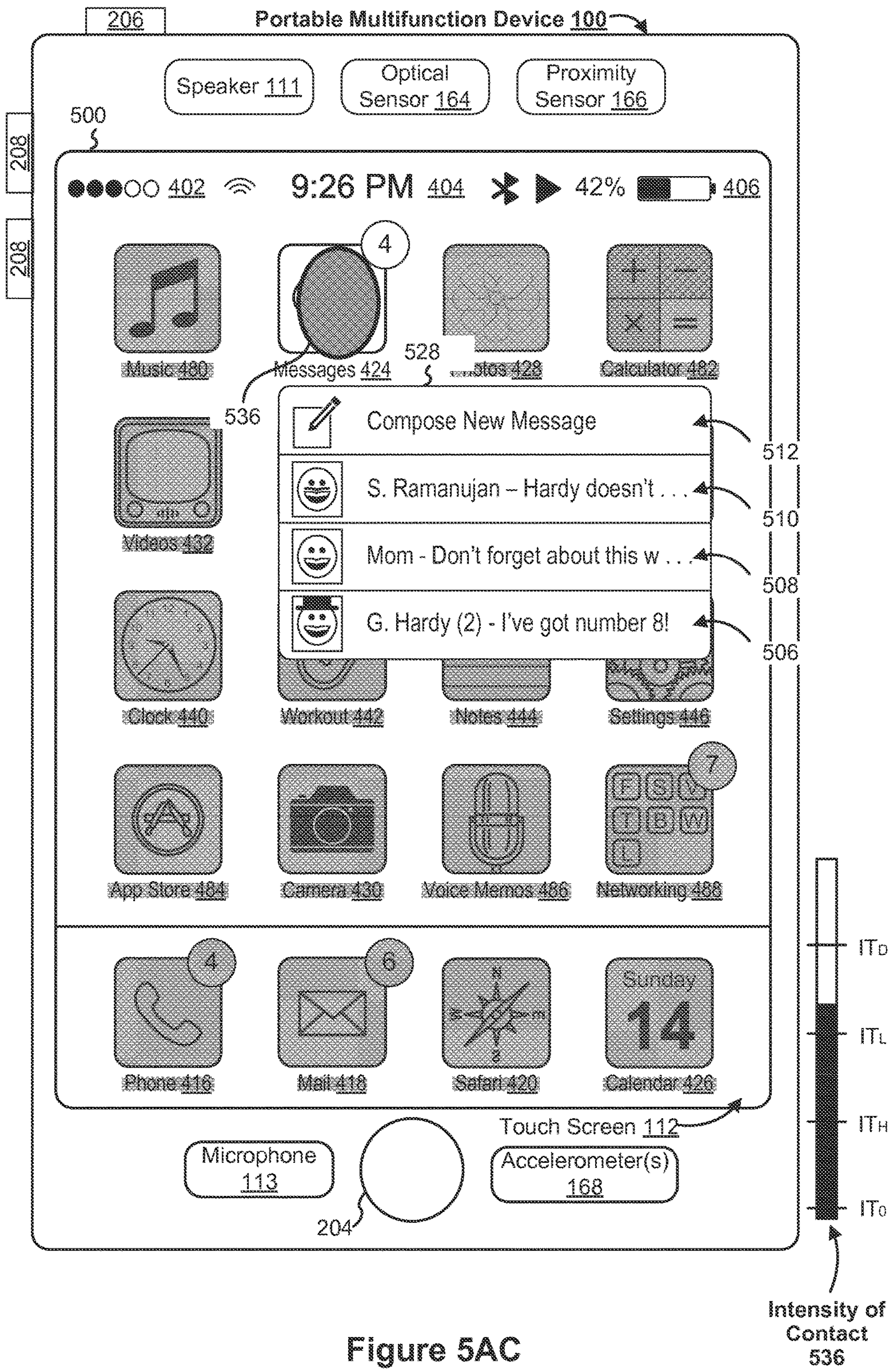
Figure 5A:
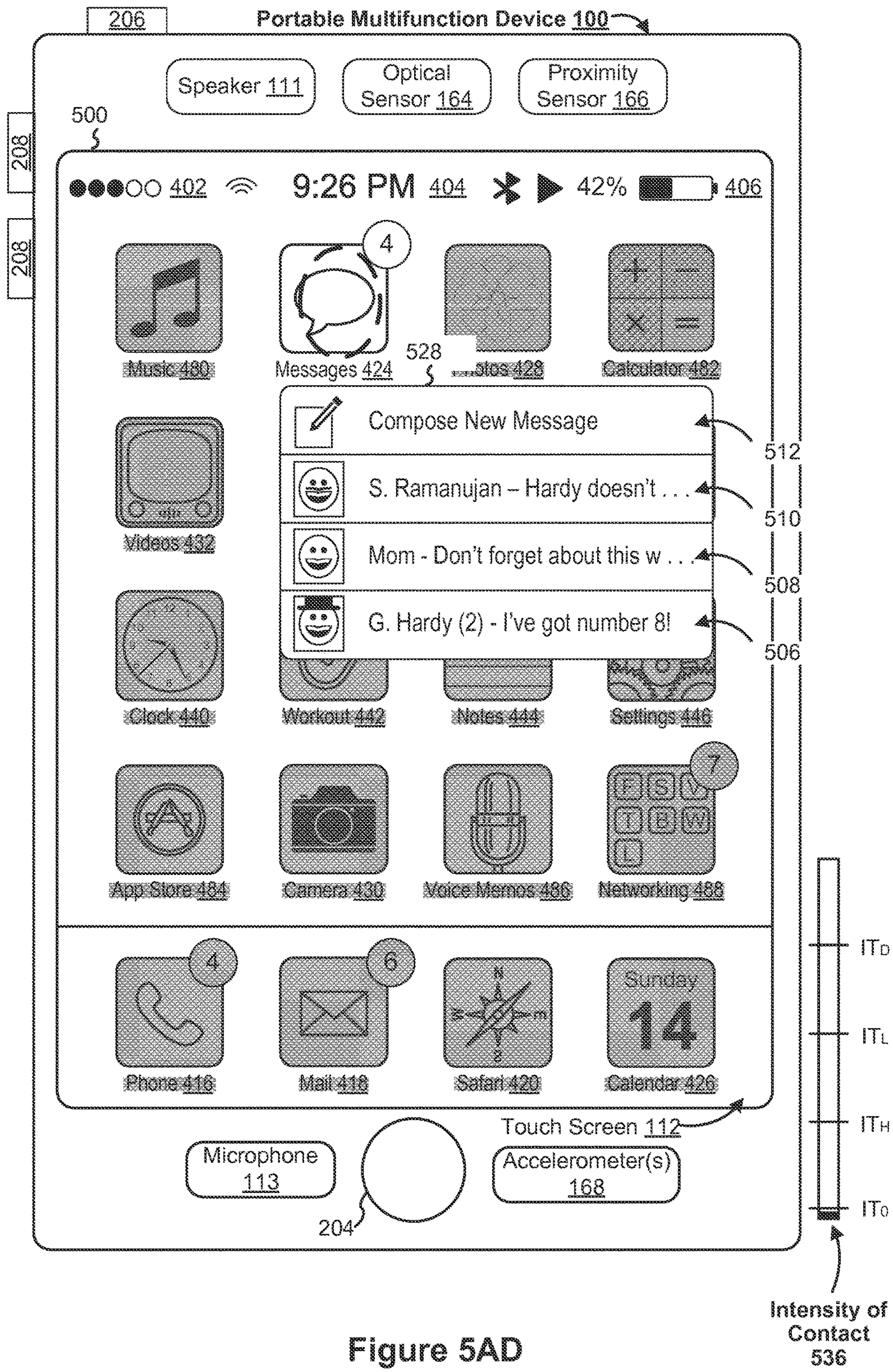
Figure 5A:
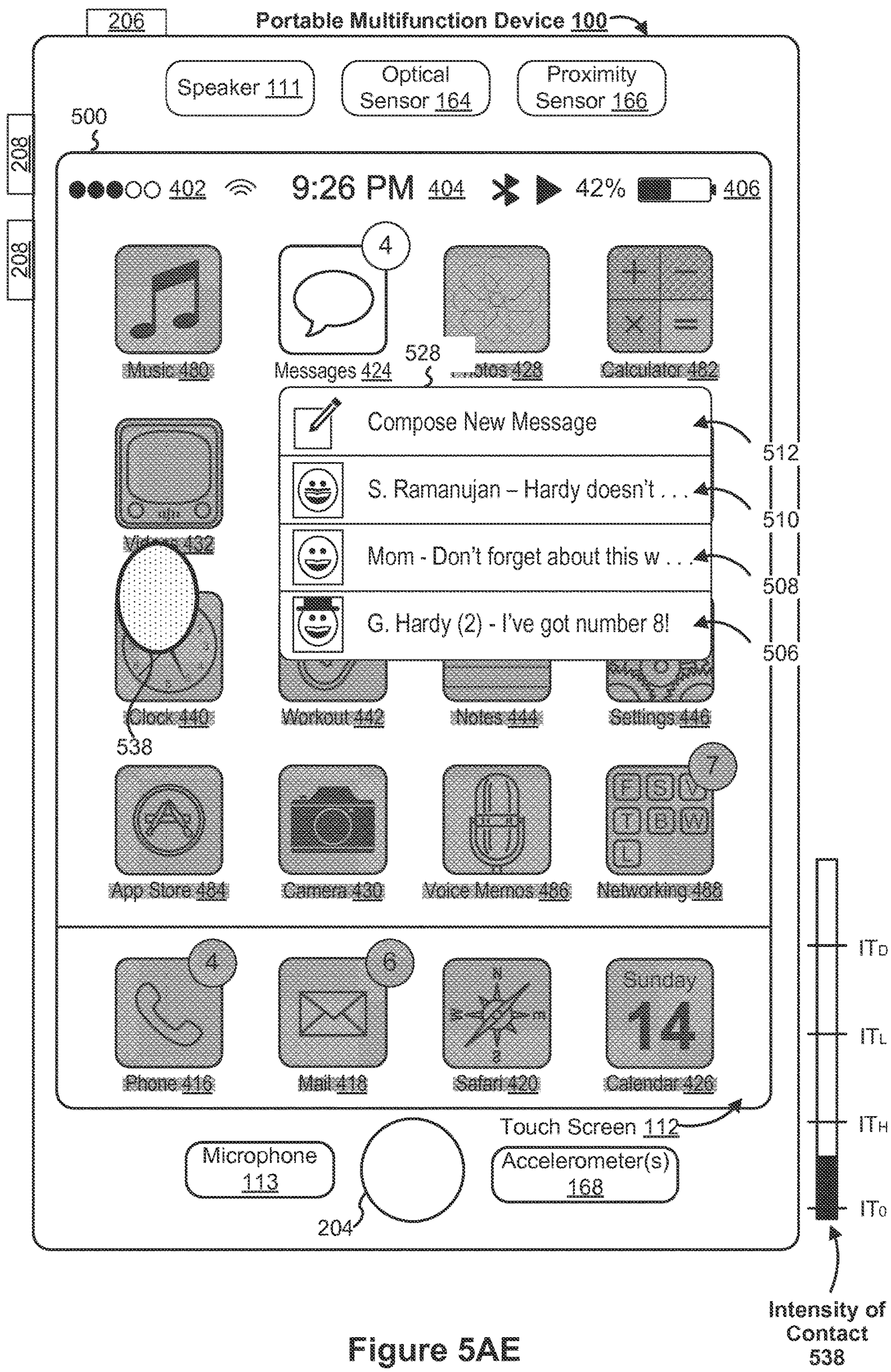
Figure 5A:
Figure 5A:
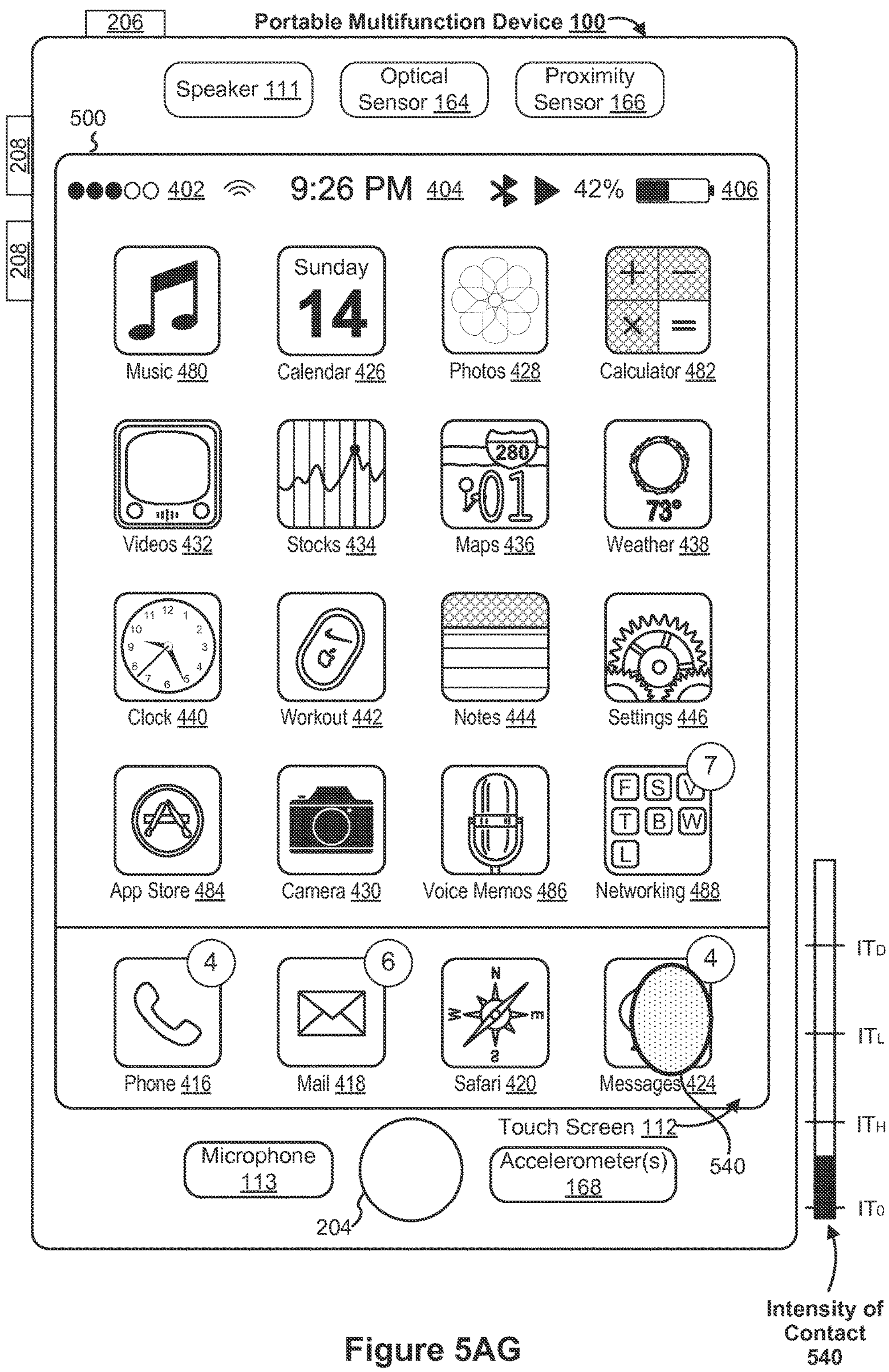
Figure 5A:
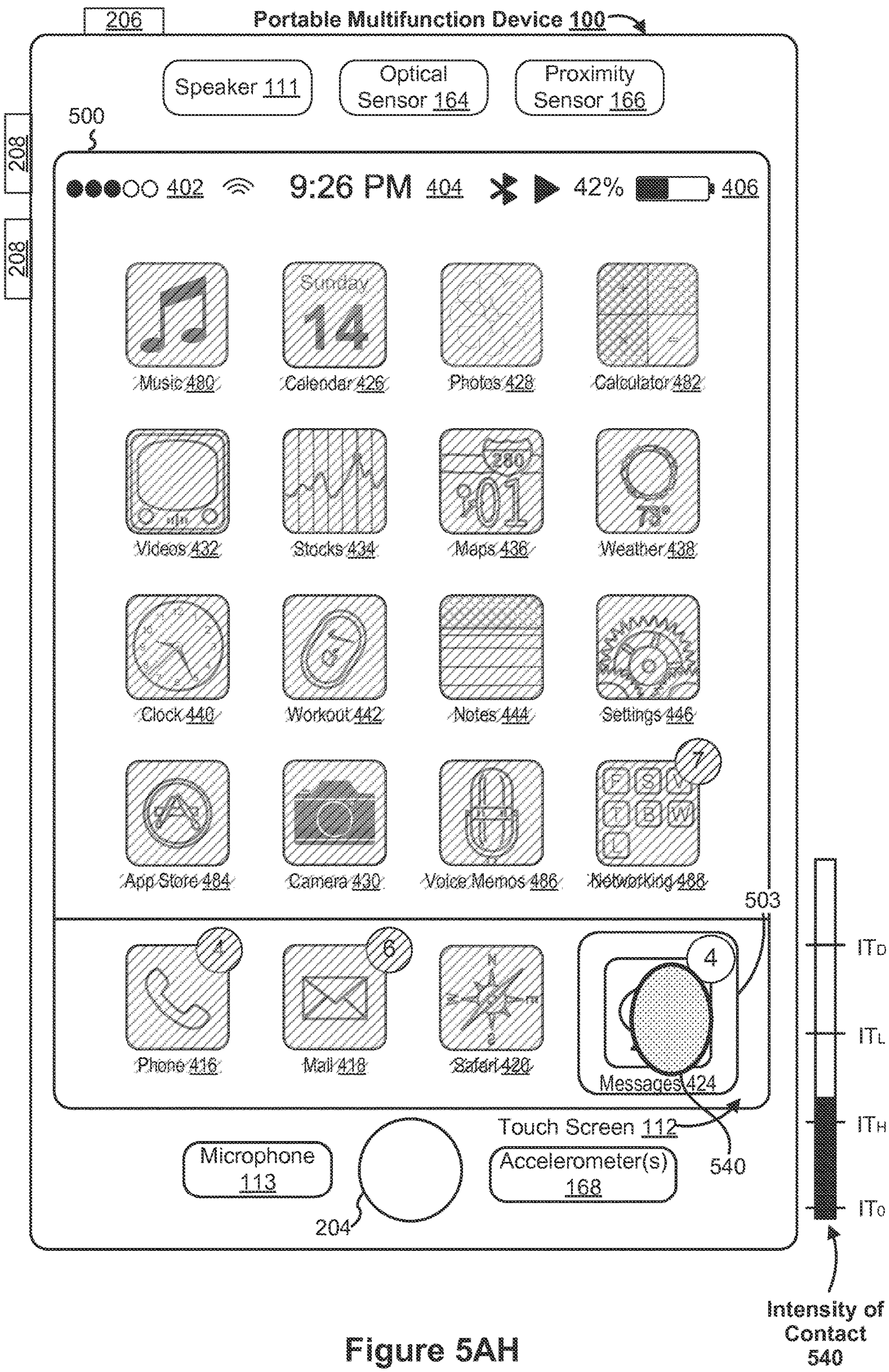
Figure 5A:
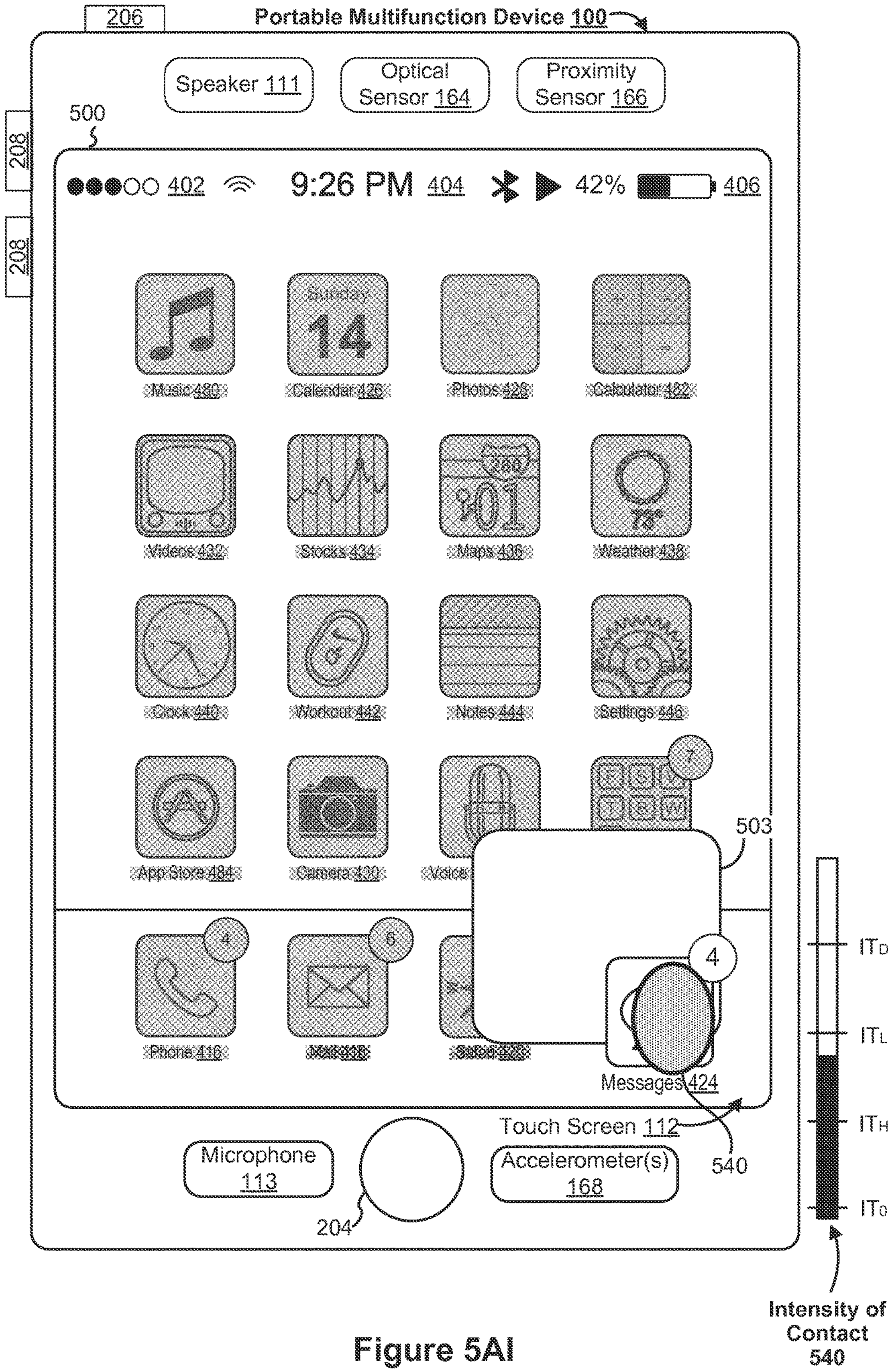
Figure 5A:
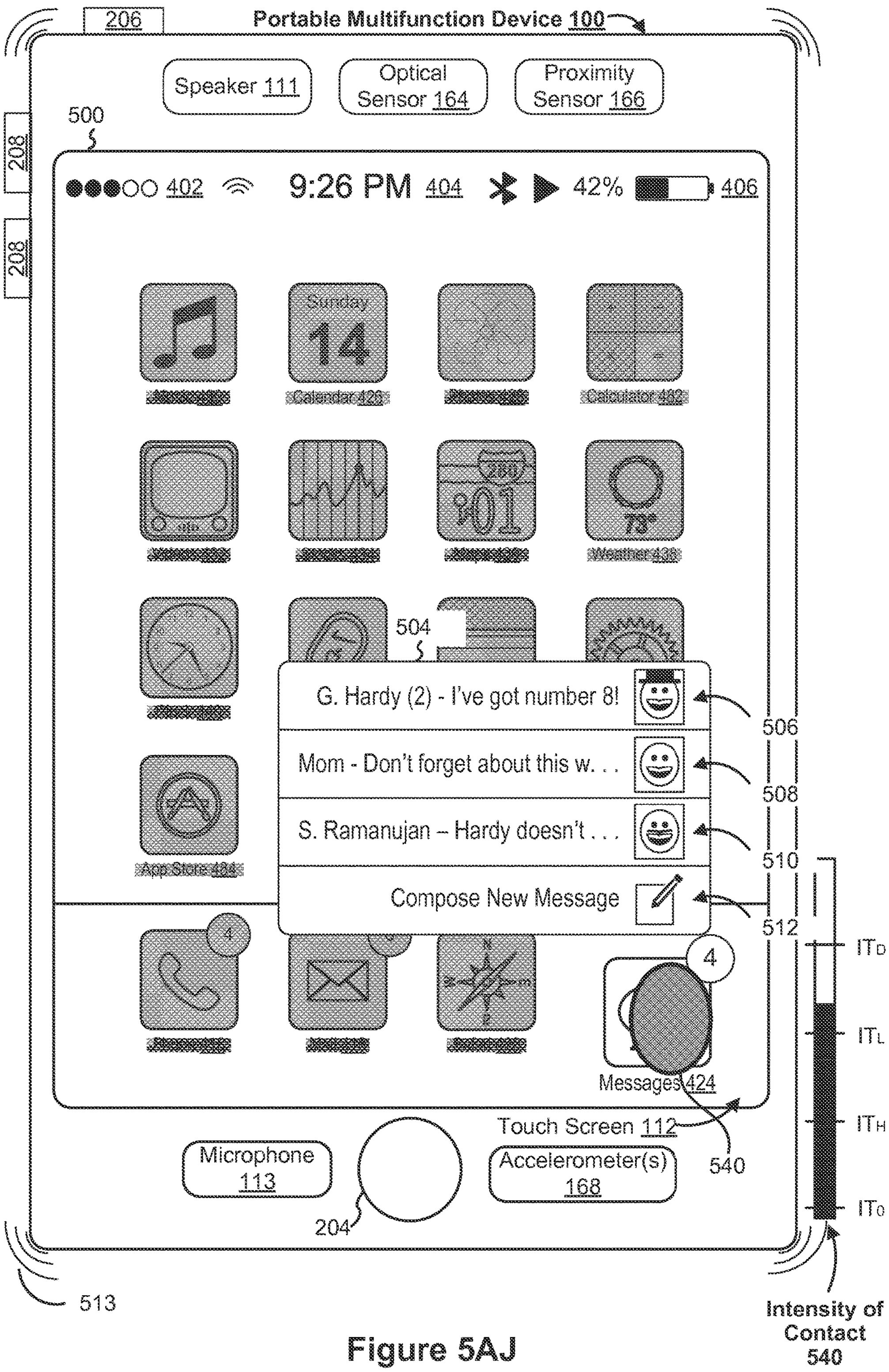
Figure 5A:
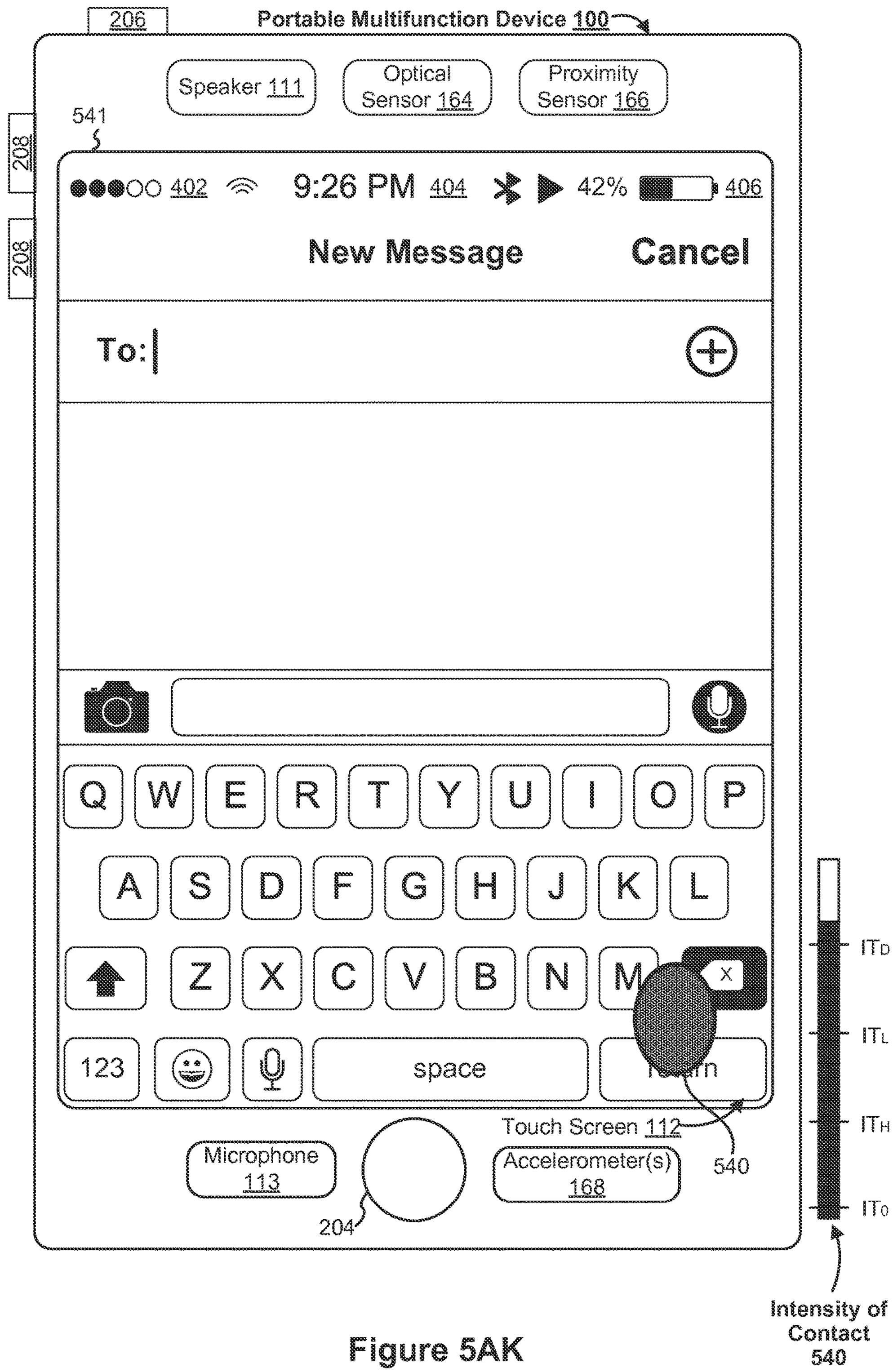
Figure 5A:
Figure 5A:
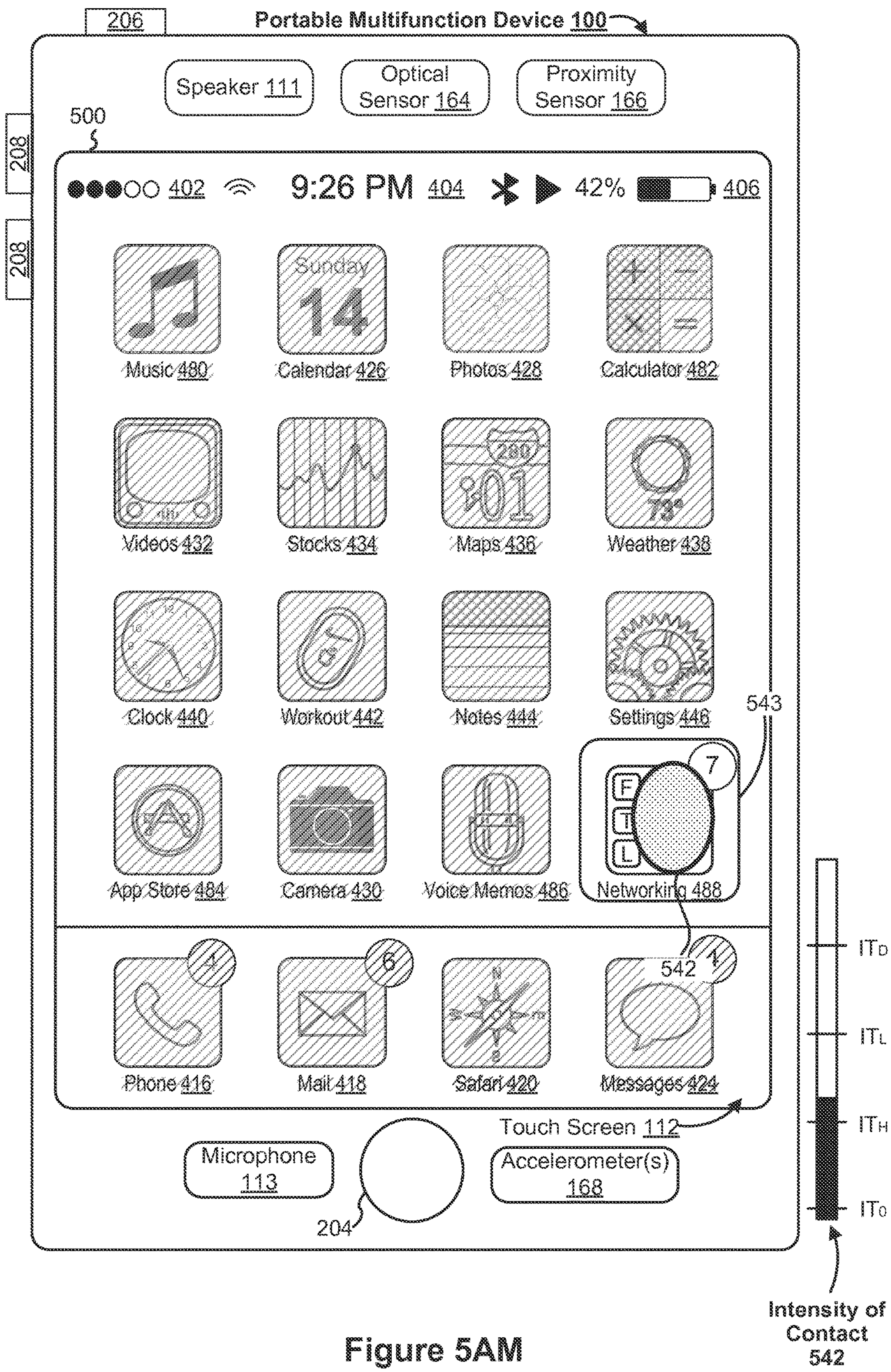
Figure 5A:
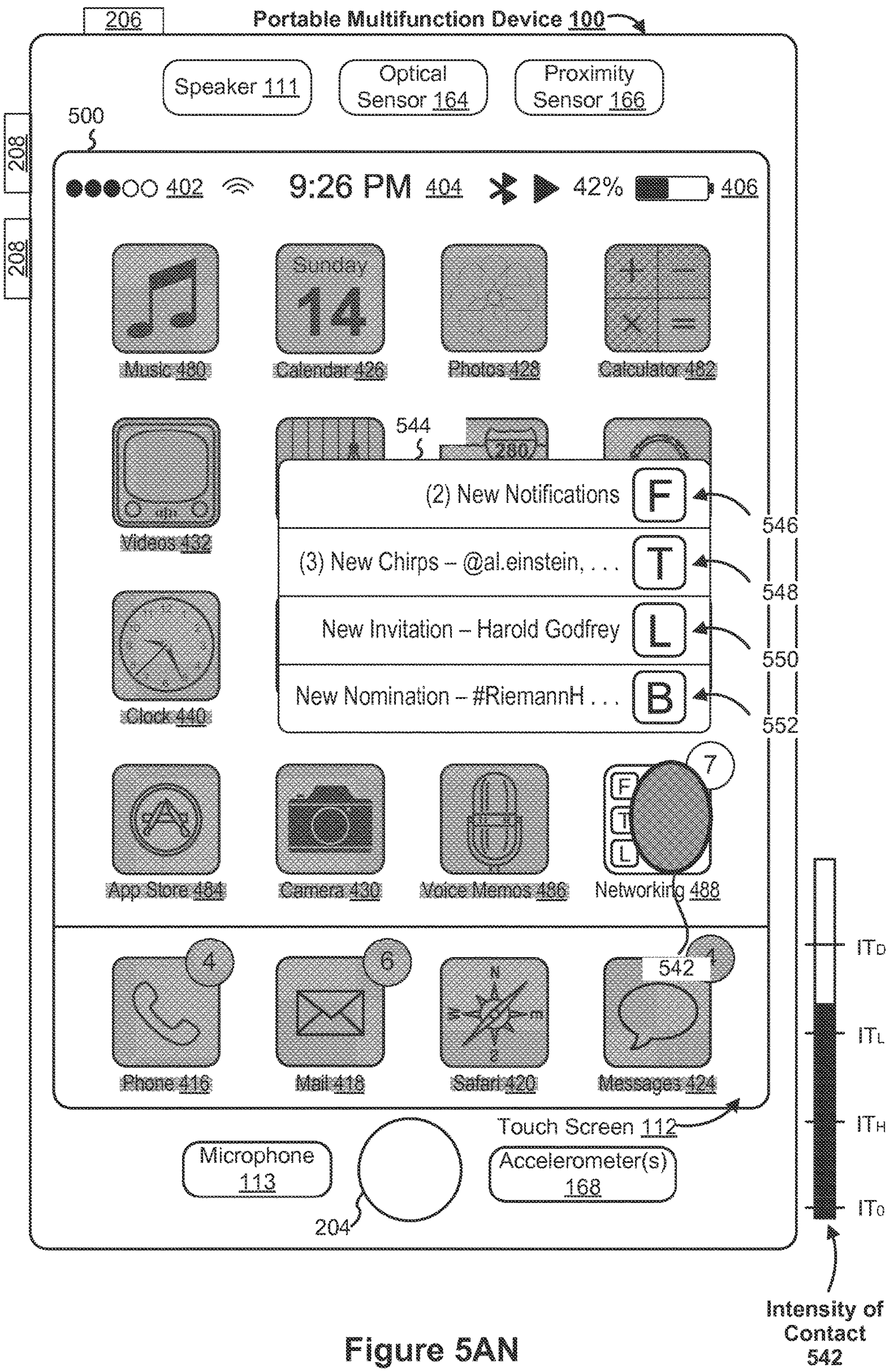
Figure 5A:
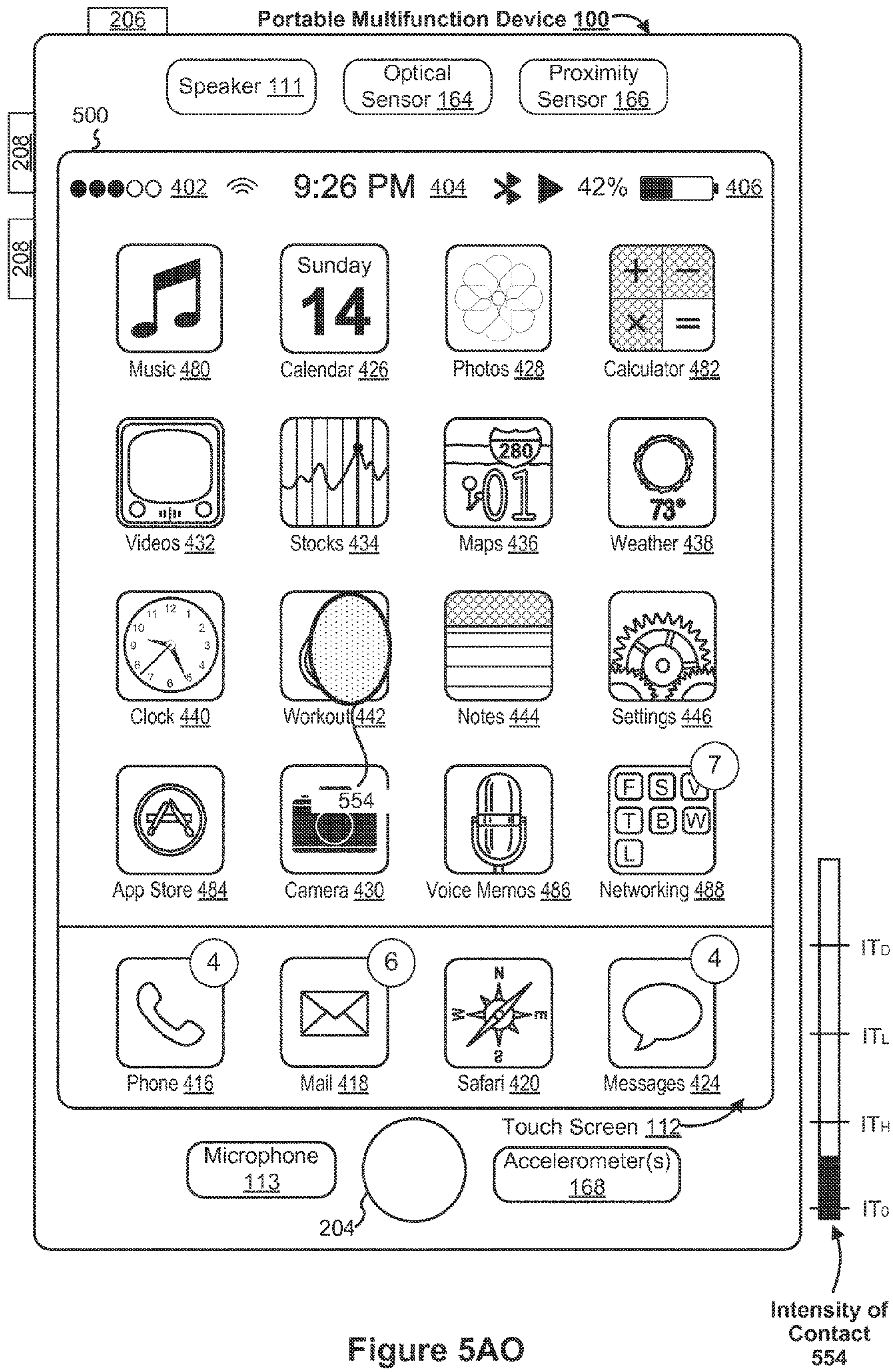
Figure 5A:
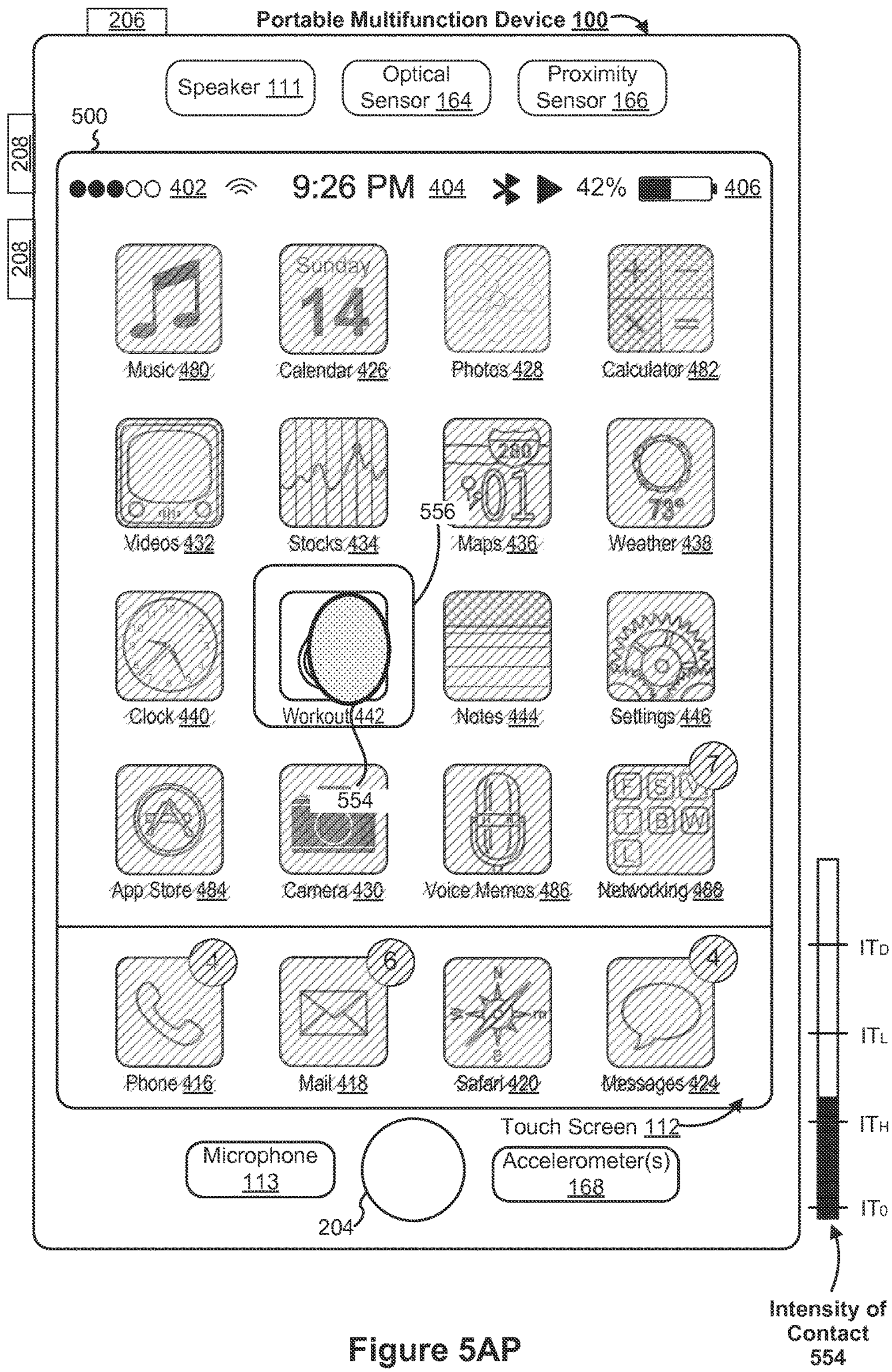
Figure 5A:
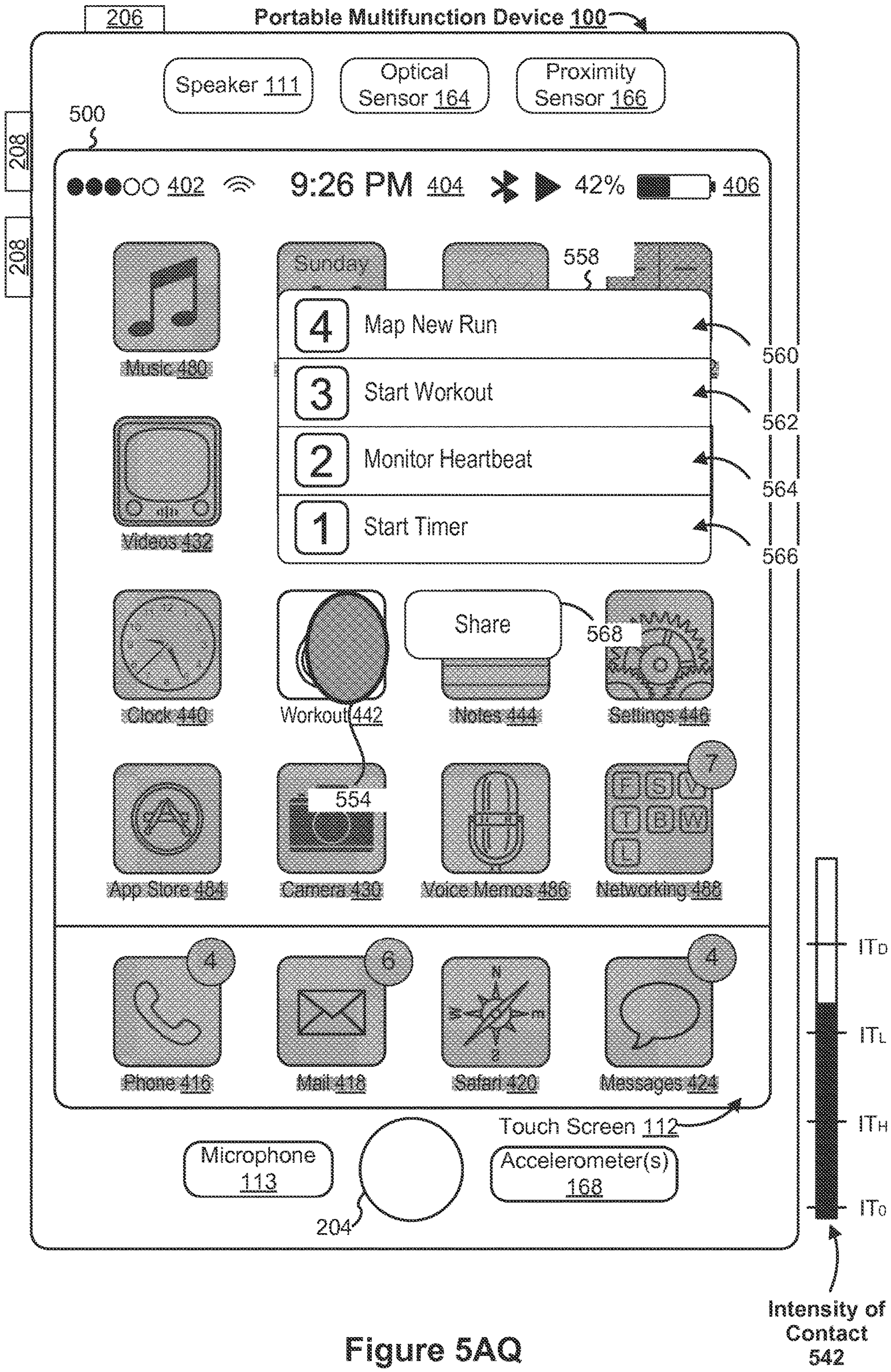
Figure 5A:
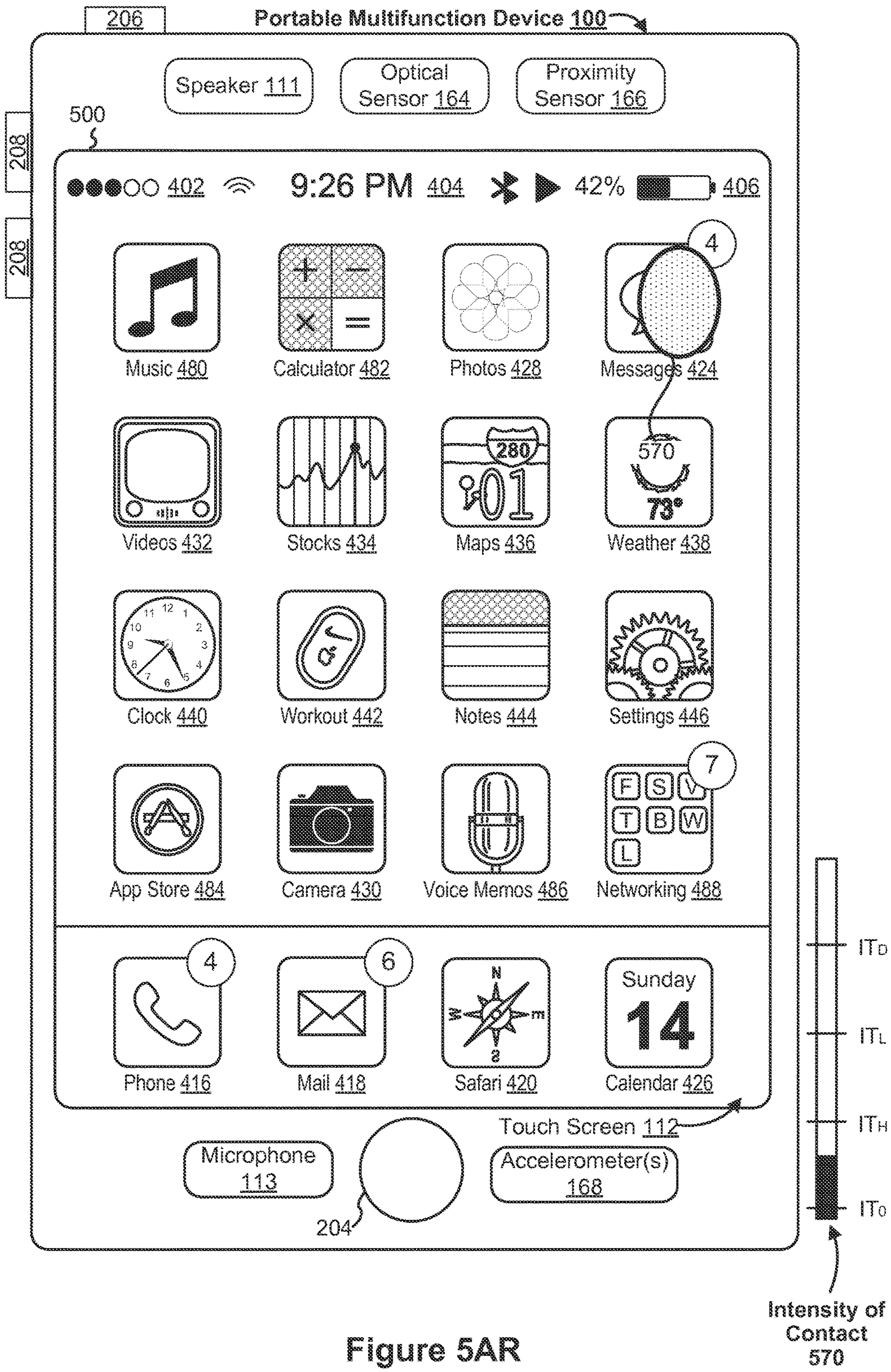
Figure 5A:
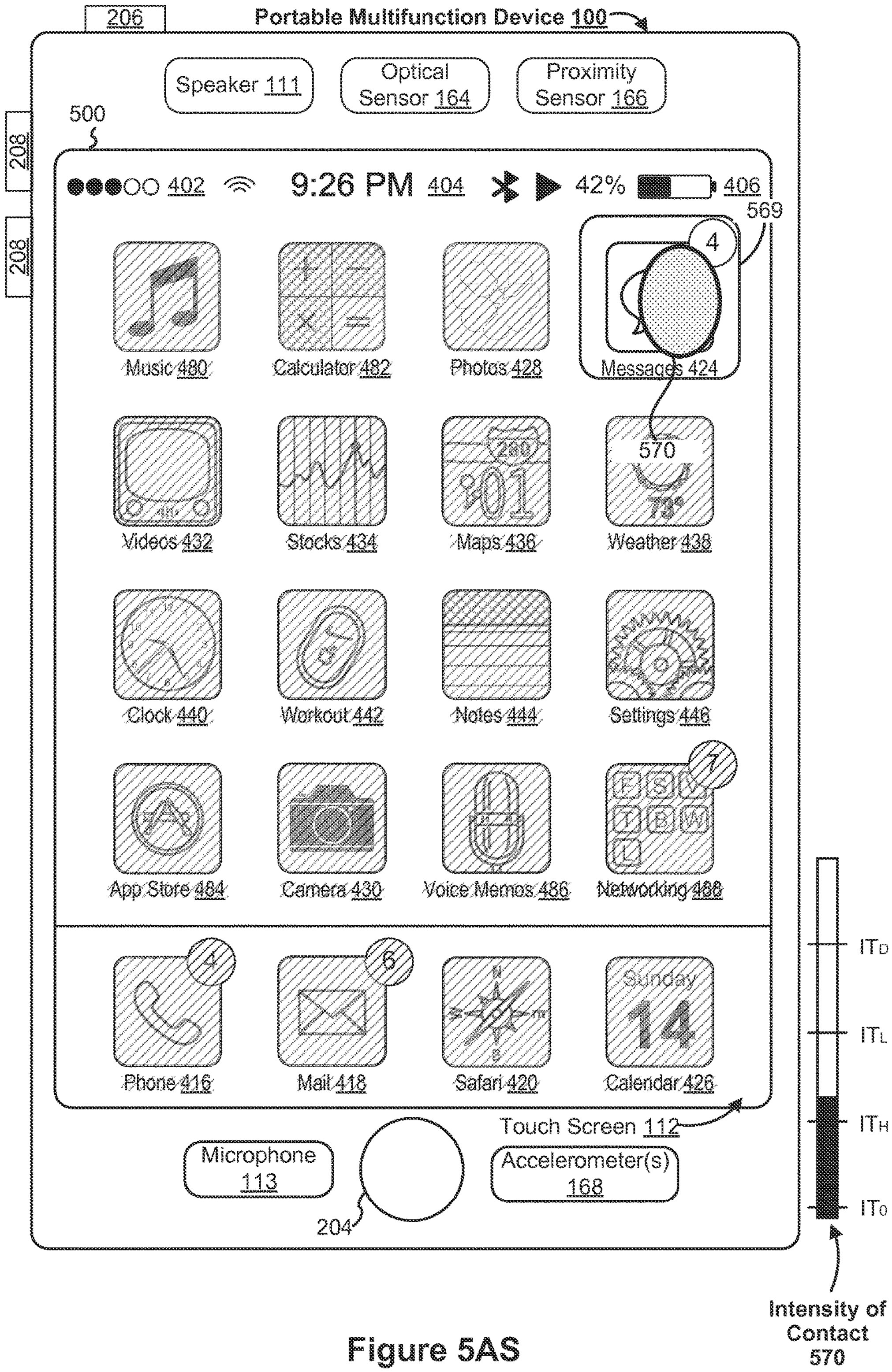
Figure 5A:
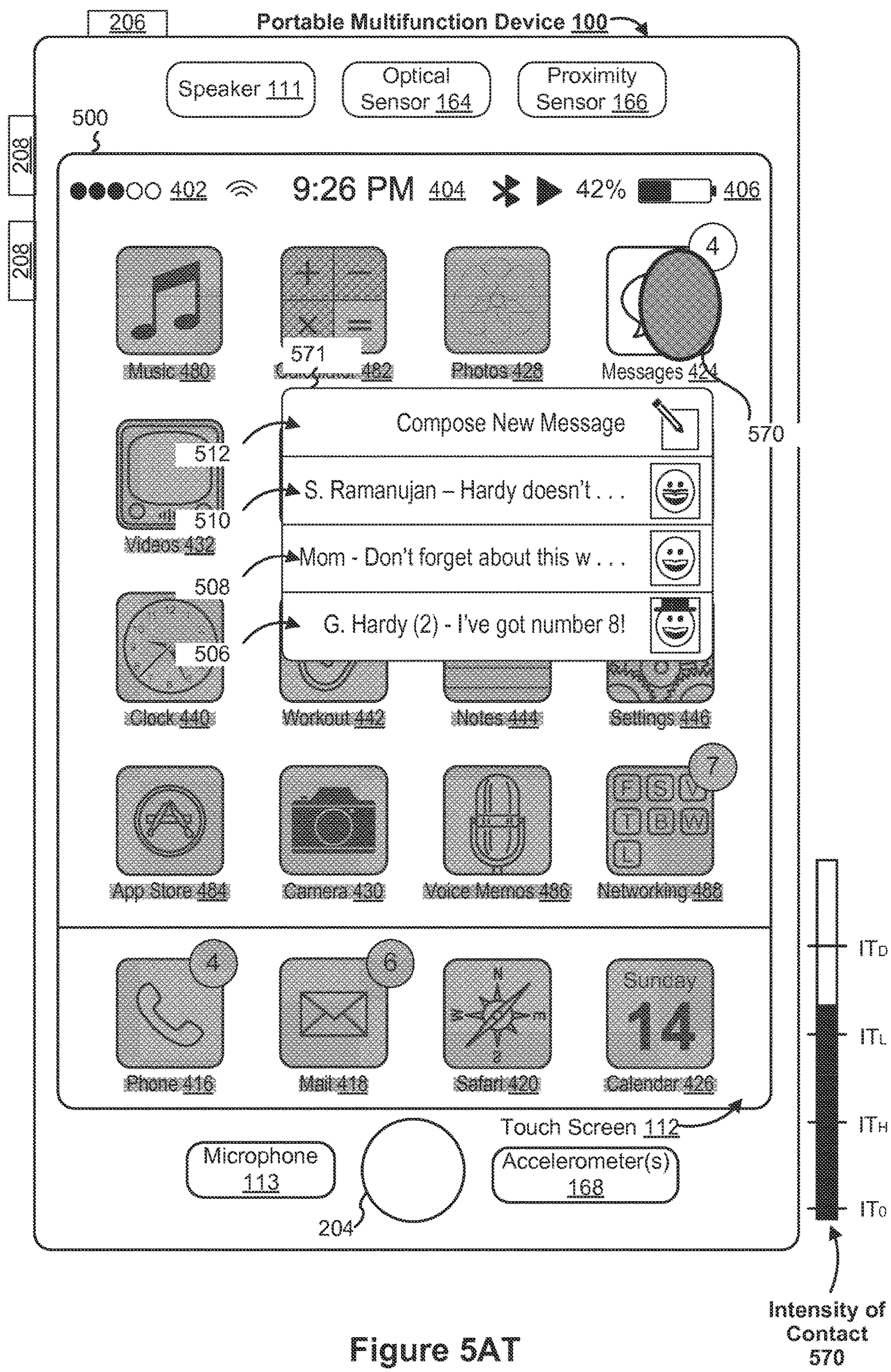
Figure 5A:
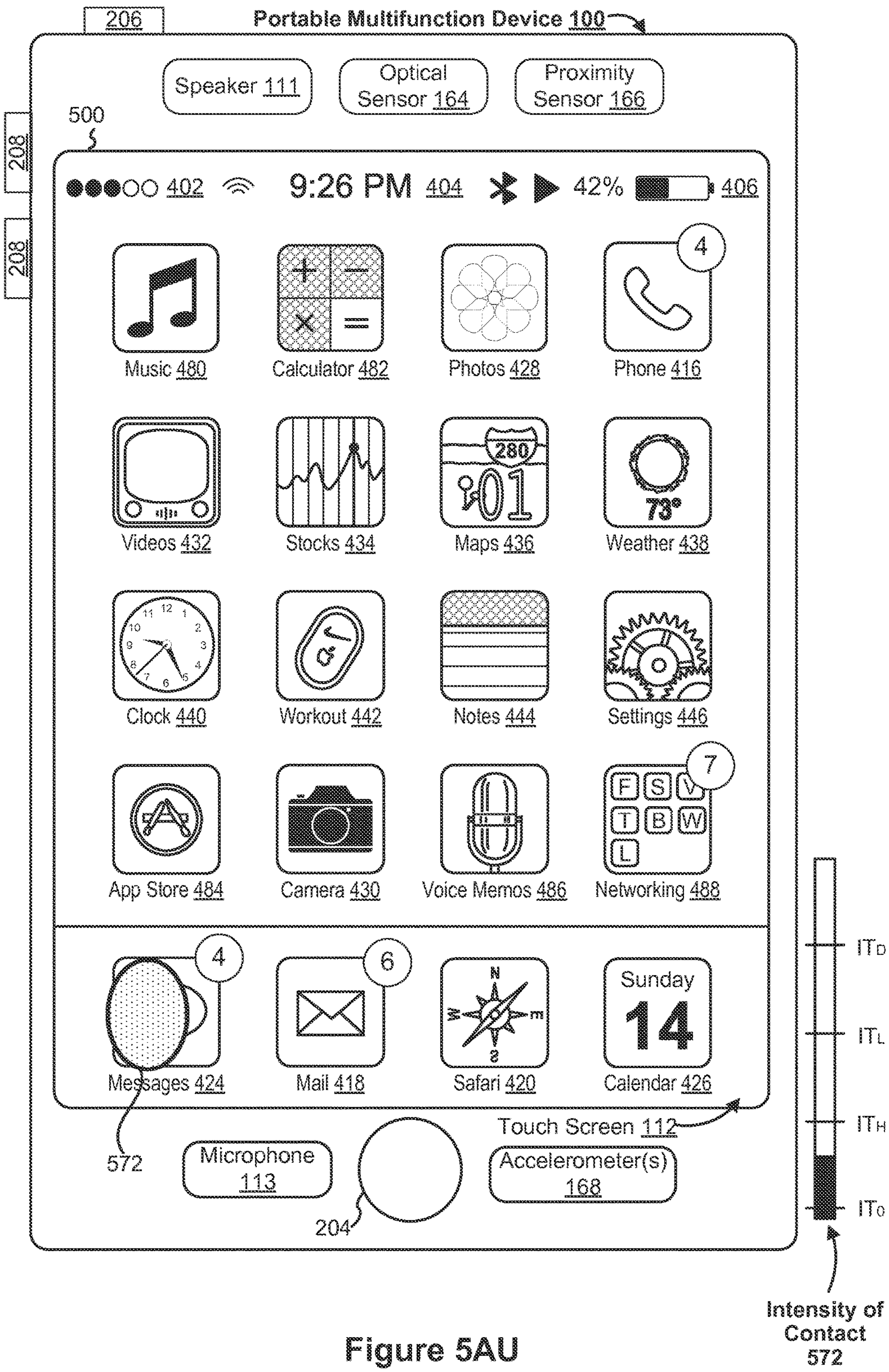
Figure 5A:
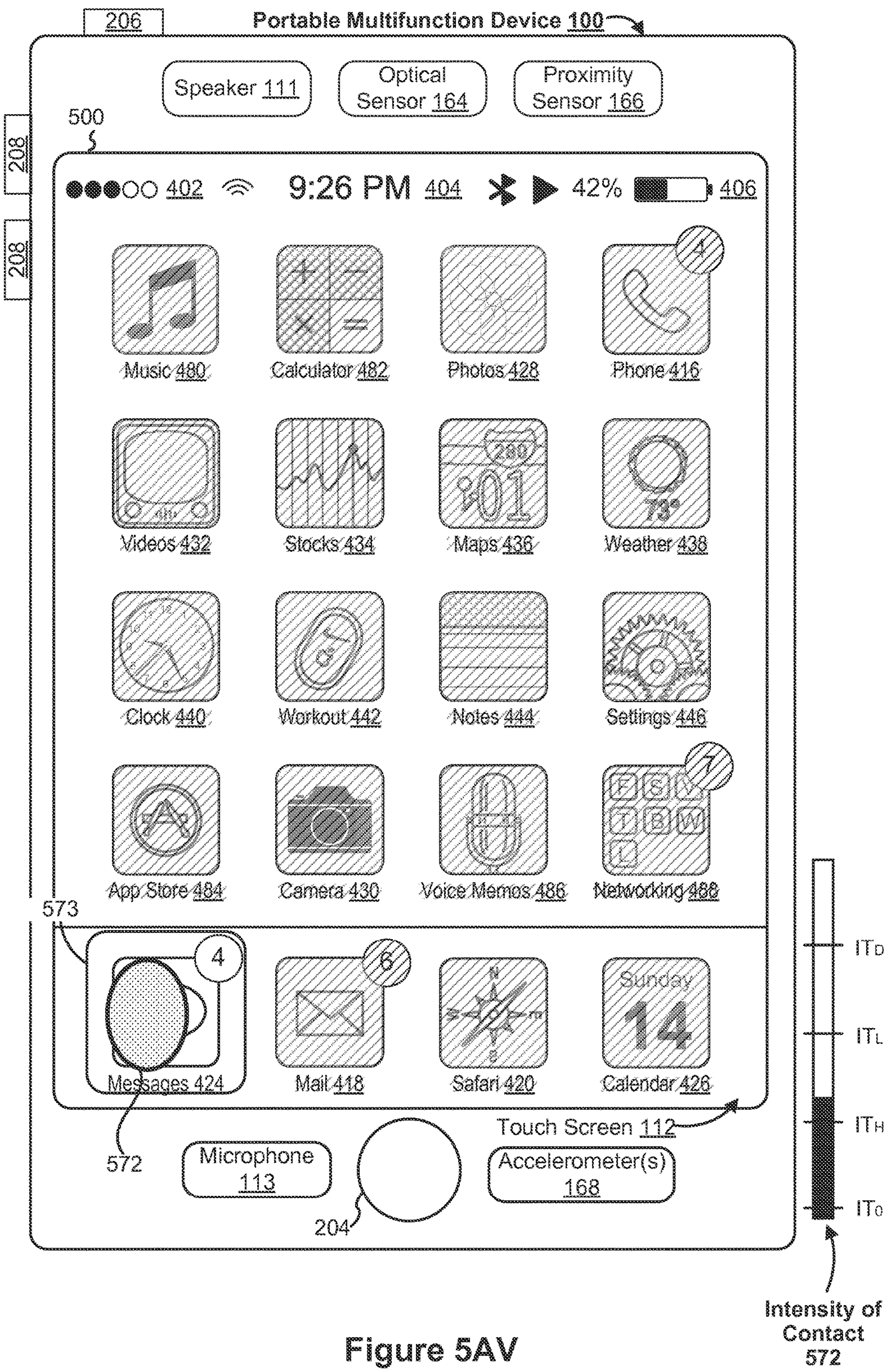
Figure 5A:
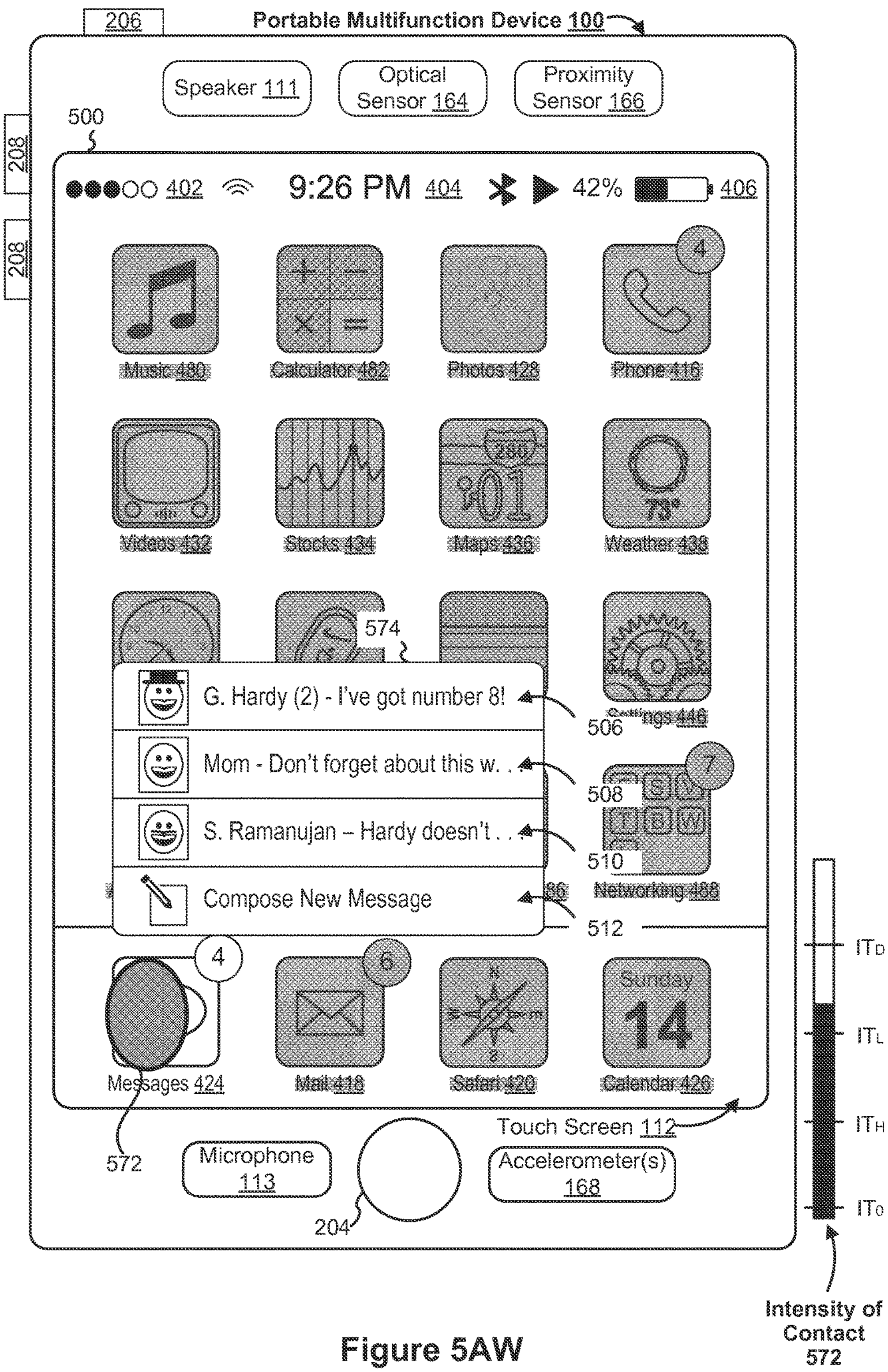

In FIG. 5Y, after invoking messages quick-action menu 528 on home screen user interface 500 via contact 532, the user lifts-off contact 532, as illustrated in FIG. 5Z. The user then taps on messages launch icon 424 via contact 534, as illustrated in FIG. 5AA. In response, the device activates the associated messages application in a default state, by displaying user interface 535 including display of the most recently received message, as illustrated in FIG. 5AB.

In FIG. 5AC, after invoking messages quick-action menu 528 on home screen user interface 500 via contact 536, the user lifts-off contact 536, as illustrated in FIG. 5AD. The user then taps on a location of touch screen 112 other than where messages launch icon 424 and quick-action menu 528 is displayed via contact 538, as illustrated in FIG. 5AE. In response, the device clears quick-action menu 528 and returns display of user interface 500 to the same state as before contact 524 was detected, as illustrated in FIG. 5AF.

FIGS. 5AG-5AK illustrate an embodiment where the user pushes through activation of a quick-action menu to perform a preferred action. In FIG. 5AG, the device 100 detects contact 540 on messages icon 424, displayed in home screen user interface 500, with an intensity below the intensity threshold needed to invoke the quick-action menu (e.g., $IT_L$). In FIGS. 5AH and 5AI, the intensity of contact 540 increases above a "hint" threshold (e.g., $IT_H$), but remains below the intensity threshold needed to invoke the quick-action menu. The device indicates that the user is approaching the intensity needed to call up the quick action menu by dynamically blurring the other launch icons, dynamically pushing the other icons back in virtual z-space (e.g., making them smaller relative to messages icon 424), and providing hint graphic 503 that appears and dynamically grows out from under messages icon 424.

In FIG. 5AJ, the intensity of contact 540 increases above the threshold (e.g., $IT_L$) needed to invoke messages quick-action menu 504. In response, hint graphic 503 morphs into quick-action menu 504, which displays an icon and text for each selection that are now available to the user, including selection 512 for a preferred action of composing a new message. The device also provides tactile feedback 513, to alert the user that the quick-action menu is now functional. After invoking quick-action menu 504, the intensity of contact 540 continues to increase above a third intensity threshold (e.g., $IT_D$). In response, the device activates the associated messages application in a preferred state (e.g., corresponding to option 512), by displaying user interface 541 for composing a new message, as illustrated in FIG. 5AK.

FIGS. 5AL-5AN illustrate an embodiment where the user invokes a quick-action menu at a launch icon for a folder containing launch icons for multiple applications with associated notifications. In FIG. 5AL, the device 100 detects contact 542 on networking launch icon 488, with an intensity below the intensity threshold needed to invoke the quick-action menu (e.g., $IT_L$). Networking launch icon 488 is associated with a folder that opens upon activation to reveal launch icons for a plurality of applications (e.g., launch icons "F," "T," and "L," which are represented on networking launch icon 488). As illustrated in FIG. 5AL, the applications associated with the launch icons contained in the networking folder have a combined seven user notifications.

In FIG. 5AM, the intensity of contact 542 increases above a "hint" threshold (e.g., $IT_H$), but remains below the intensity threshold needed to invoke the quick-action menu. The device indicates that the user is approaching the intensity needed to call up the quick action menu by dynamically blurring the other launch icons and providing hint graphic 543 that appears and dynamically grows out from under networking launch icon 488. In FIG. 5AN, the intensity of contact 542 increases above the threshold (e.g., $IT_L$) needed to invoke the quick-action menu. In response, hint graphic 543 morphs into quick-action menu 544, which displays an icon and text for each selection 546, 548, 550, and 552 that are now available to the user. The icon displayed for each selection is a graphical representation of a launch icon for an application associated with one or more of the seven notifications. The text displayed for each selection is a compellation of the notifications associated with each respective application.

FIGS. 5AO-5AQ illustrate an embodiment where the user invokes a quick-action menu at a launch icon for a third-party application. In FIG. 5AO, the device 100 detects contact 554 on workout launch icon 442, with an intensity below the intensity threshold needed to invoke the quick-action menu (e.g., $IT_L$). In FIG. 5AP, the intensity of contact 554 increases above a "hint" threshold (e.g., $IT_H$), but remains below the intensity threshold needed to invoke the quick-action menu. The device indicates that the user is approaching the intensity needed to call up the quick action menu by dynamically blurring the other launch icons and providing hint graphic 556 that appears and dynamically grows out from under workout launch icon 442. In FIG. 5AQ, the intensity of contact 554 increases above the threshold (e.g., $IT_L$) needed to invoke the quick-action menu. In response, hint graphic 556 morphs into quick-action menu 558, which displays an icon and text for each selection 560, 562, 564, 566, and 568 that are now available to the user. Selection 568 allows the user to share the third party application with a friend (e.g., by sending the friend a link to download the third-party application from an application store).

FIGS. 5AR-5AT illustrate an embodiment where the user invokes a quick-action menu at a launch icon located in the upper-right quadrant of touch screen 112. In FIG. 5AR, the device 100 detects contact 574 on messages icon 424, displayed in the upper-right quadrant of home screen user interface 500, with an intensity below the intensity threshold needed to invoke the quick-action menu (e.g., $IT_L$). In FIG. 5AS, the intensity of contact 570 increases above a "hint" threshold (e.g., $IT_H$), but remains below the intensity threshold needed to invoke the quick-action menu. The device indicates that the user is approaching the intensity needed to call up the quick action menu by dynamically blurring the other launch icons and providing hint graphic 569 that appears and dynamically grows out from under messages icon 424.

In FIG. 5AT, the intensity of contact 570 increases above the threshold (e.g., $IT_L$) needed to invoke the quick-action menu. In response, hint graphic 569 morphs into quick-action menu 571, which displays an icon and text for each selection 506, 508, 510, and 512 that are now available to the user. Because the launch icon is displayed on the right side of screen 112, quick-action menu 571 is aligned with the right edge of messages launch icon 424. Likewise, the icons associated with options 506, 508, 510, and 512 are justified to the right side of quick-action menu 571. Because the launch icon is displayed on the top half of touch screen 112, quick-action menu 571 is displayed below messages launch icon 424. Similarly, the vertical order of options 506, 508, 510, and 512 is reversed, relative to quick-action menu 504 in FIG. 5E.

FIGS. 5AU-5AW illustrate an embodiment where the user invokes a quick-action menu at a launch icon located in the lower-left quadrant of touch screen 112. In FIG. 5AU, the device 100 detects contact 572 on messages icon 424, displayed in the lower-left quadrant of home screen user interface 500, with an intensity below the intensity threshold needed to invoke the quick-action menu (e.g., $IT_L$). In FIG. 5AV, the intensity of contact 572 increases above a "hint" threshold (e.g., $IT_H$), but remains below the intensity threshold needed to invoke the quick-action menu. The device indicates that the user is approaching the intensity needed to call up the quick action menu by dynamically blurring the other launch icons and providing hint graphic 573 that appears and dynamically grows out from under messages icon 424.

In FIG. 5AW, the intensity of contact 572 increases above the threshold (e.g., $IT_L$) needed to invoke the quick-action menu. In response, hint graphic 573 morphs into quick-action menu 574, which displays an icon and text for each selection 506, 508, 510, and 512 that are now available to the user. Because the launch icon is displayed on the left side of screen 112, quick-action menu 574 is aligned with the left edge of messages launch icon 424. Likewise, the icons associated with options 506, 508, 510, and 512 are justified to the left side of quick-action menu 574. Because the launch icon is displayed on the bottom half of touch screen 112, quick-action menu 574 is displayed above messages launch icon 424. Similarly, the vertical order of options 506, 508, 510, and 512 is the same as in quick-action menu 504 in FIG. 5E.

Figure 6A:
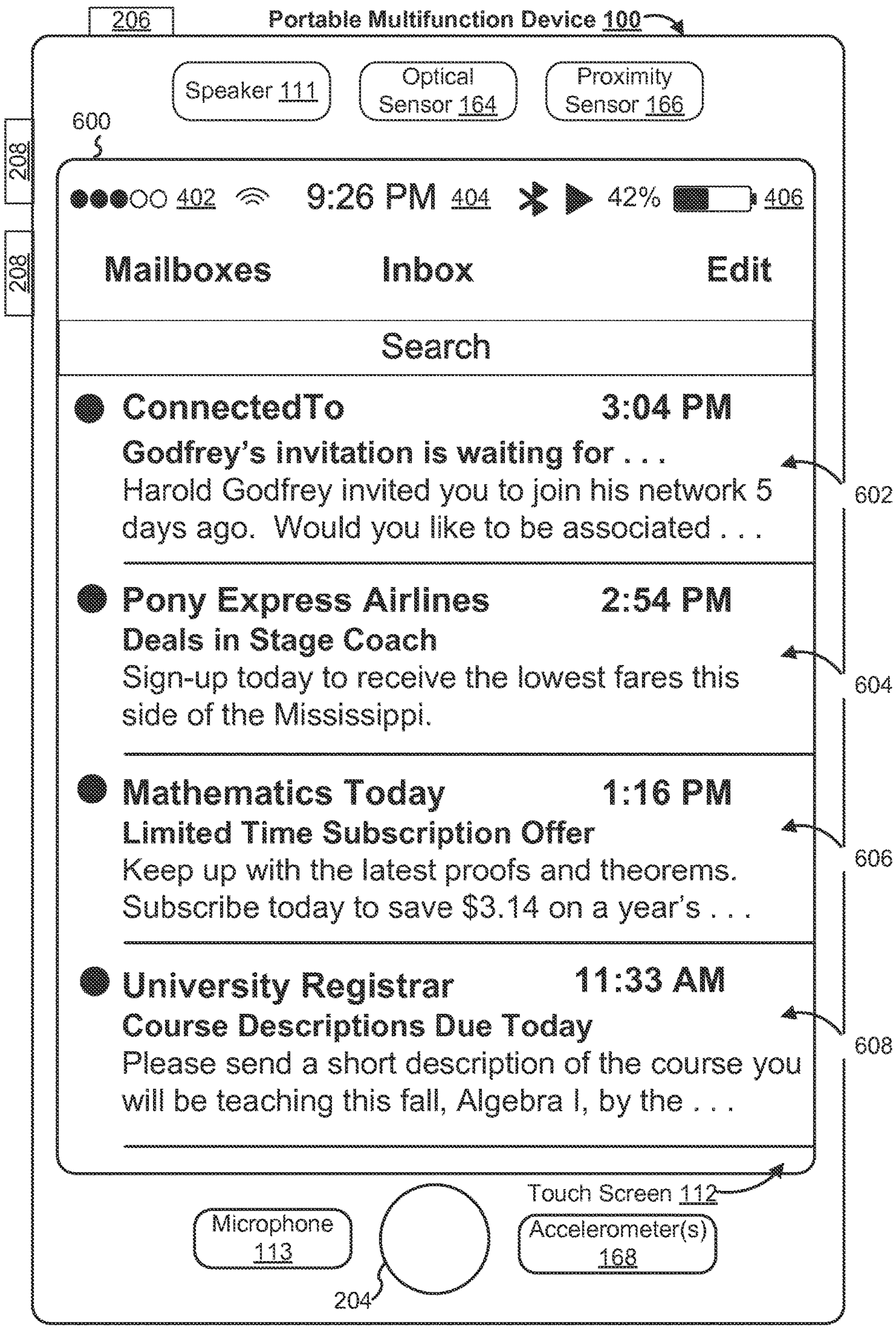
FIGS. 6A-6AS illustrate exemplary user interfaces for navigating between a first user interface and a second user interface in accordance with some embodiments.

FIGS. 6A-6AS illustrate exemplary embodiments of a user interface that allows a user to efficiently navigate between a first user interface and a second user interface, in accordance with some embodiments. In some embodiments, this is achieved by providing the user with the ability to preview content of the second user interface without leaving the first user interface, upon detection of a user input that is distinguishable from conventional user inputs used to navigate between user interfaces (e.g., based on the amount of force the user applies). In some embodiments, the user interface provides the user with the ability to perform actions associated with the second user interface while previewing (e.g., without leaving the first user interface). Although some of the examples which follow will be given with reference to an email messaging application, the methods are implemented within any number of different applications, as described herein.

The user interfaces in these figures are used to illustrate the processes described below. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 6A-6E, 6H-6AL, and 6AN-6AS illustrate an exemplary user interface 600 for managing email messages in an inbox. The user interface displays a plurality of partial views of email messages (e.g., partial views of email messages 602, 604, 606, 608, and 636). Each partial view of an email message is associated with a complete email message containing more content than is displayed in user interface 600 (e.g., as illustrated in FIG. 6F, user interface 614 displays additional content associated with the partial view of email message 602 in user interface 600).

Figure 6B:
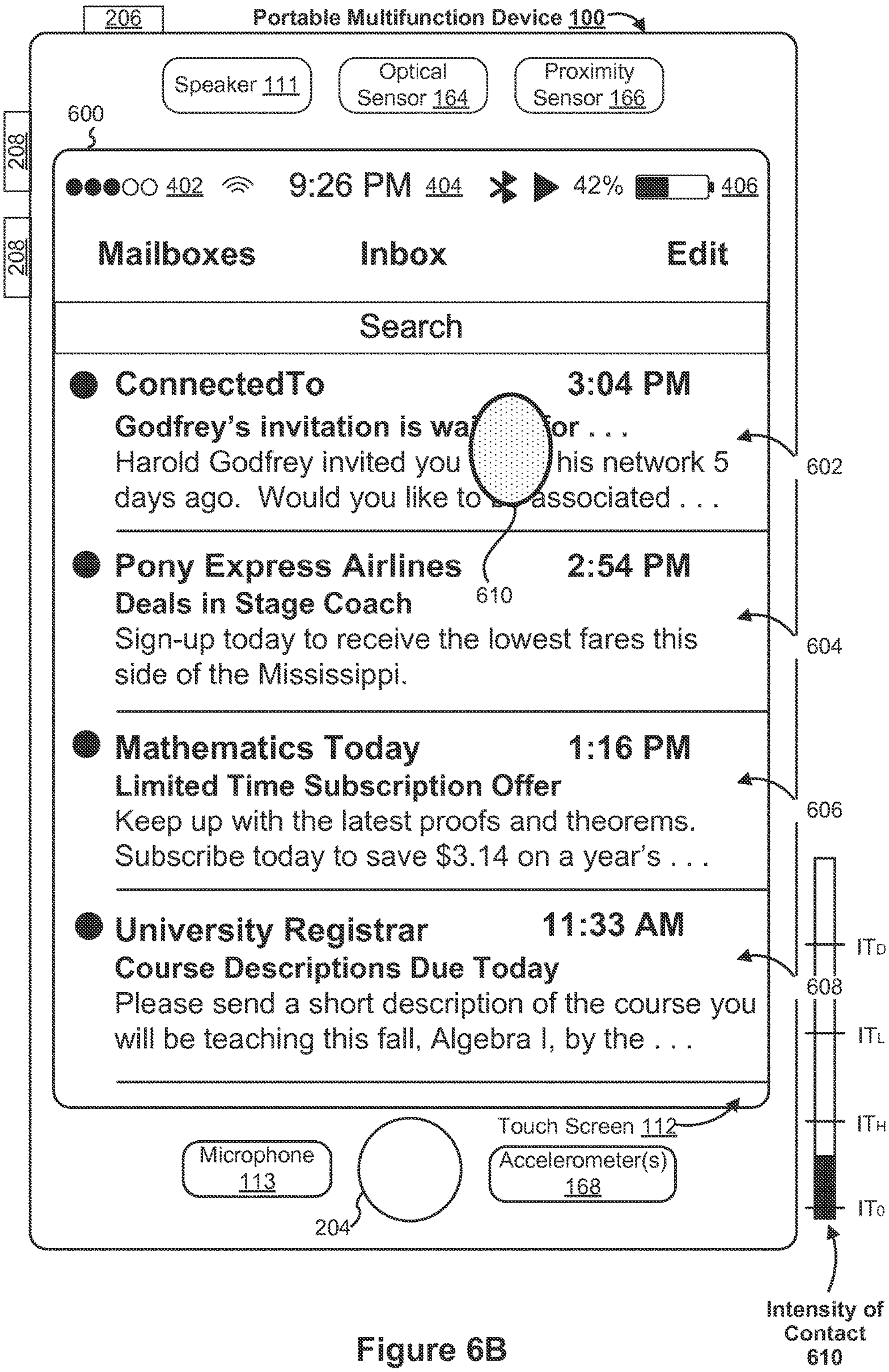
Figure 6C:
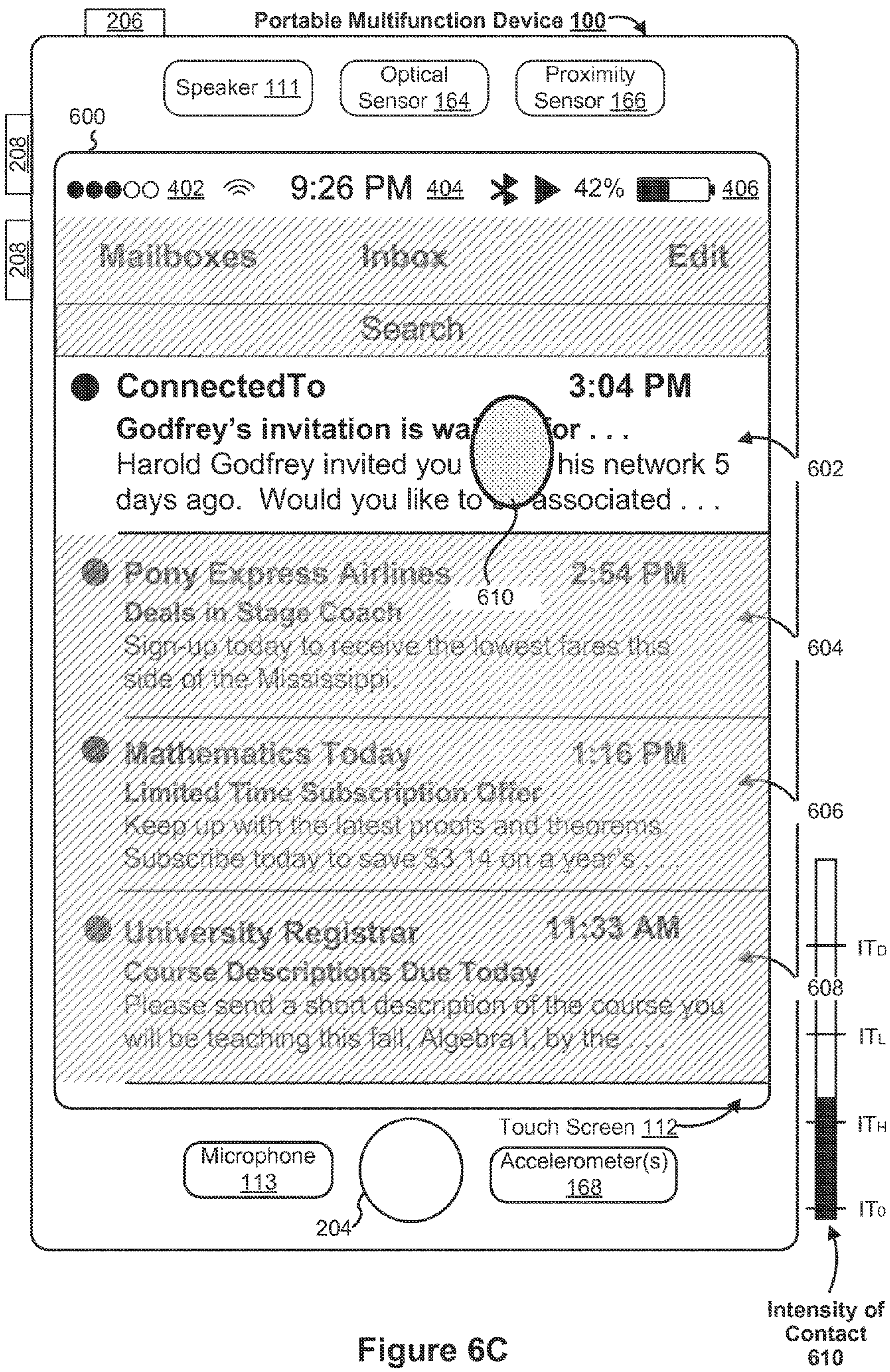
Figure 6D:
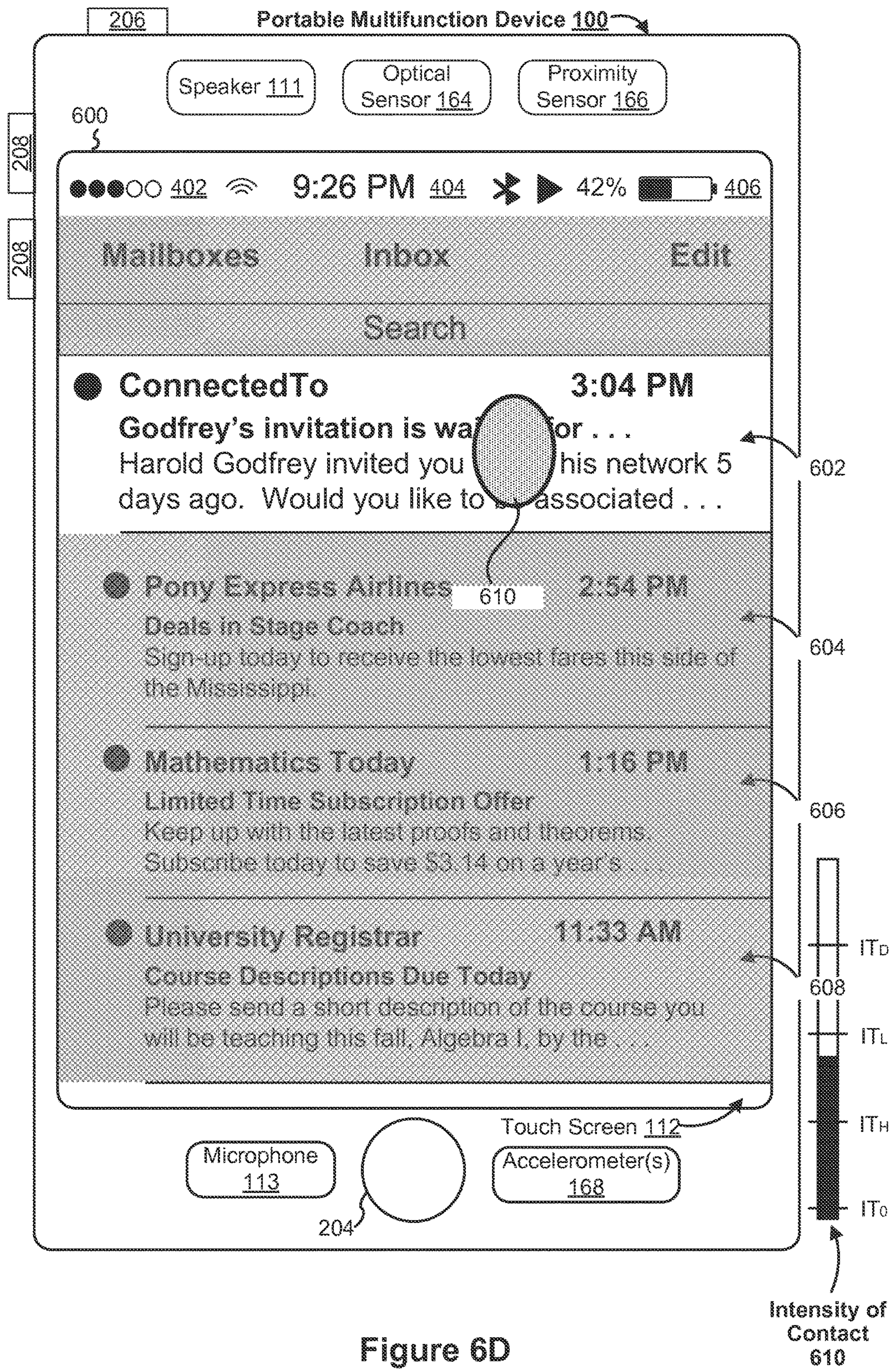
Figure 6E:
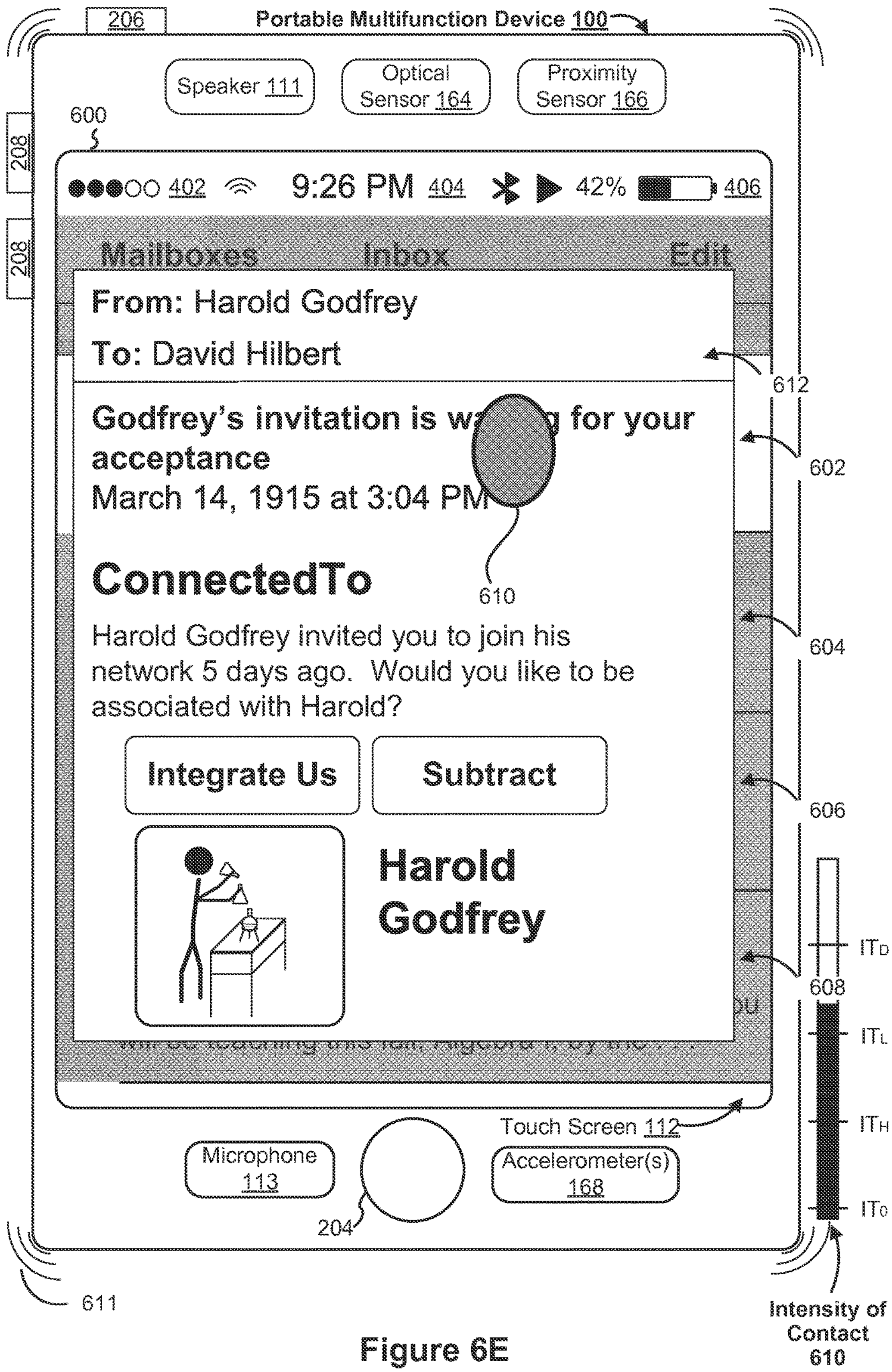
Figure 6F:
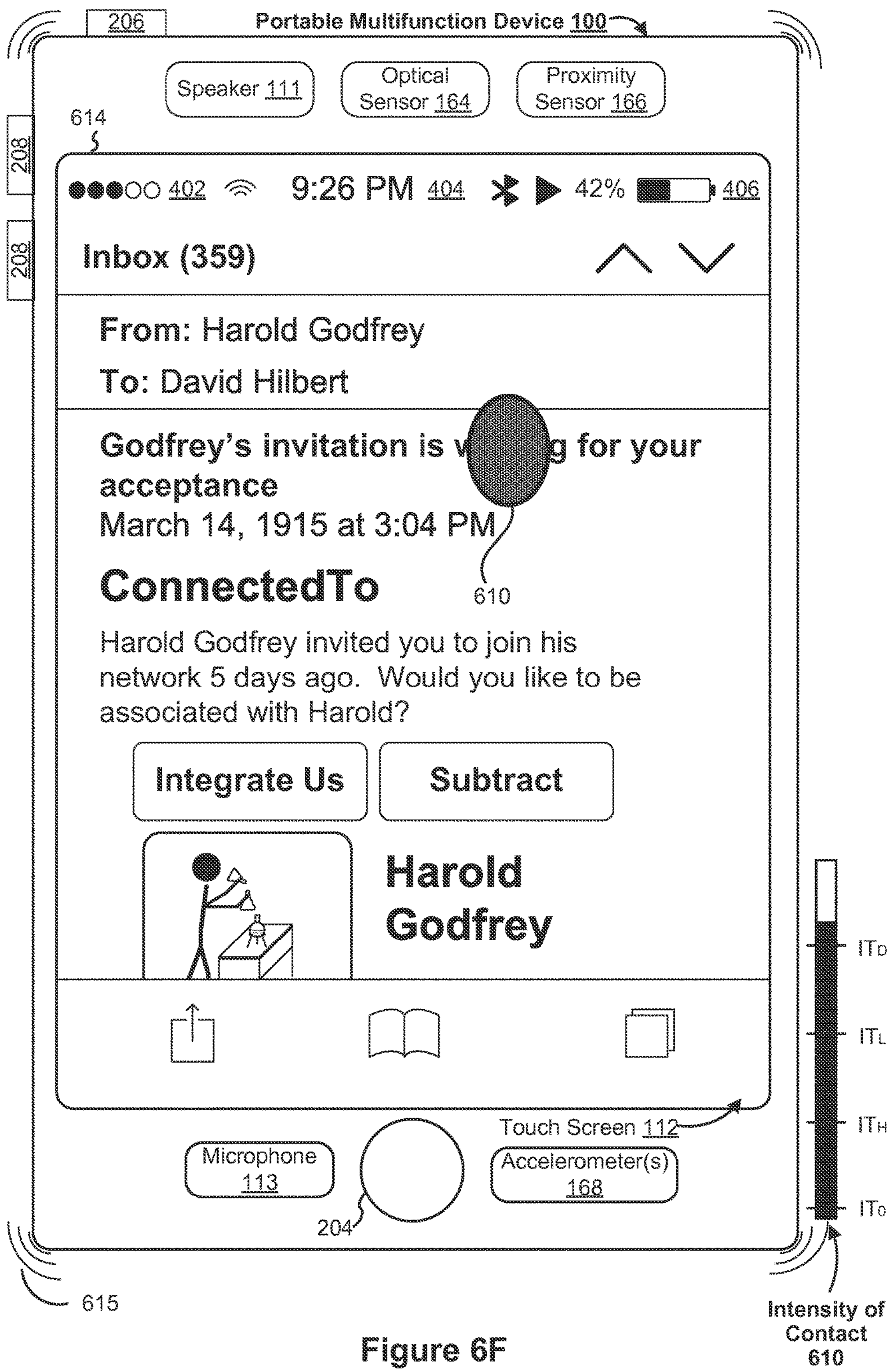

FIGS. 6A-6G illustrate an embodiment where the user previews the content of an email from an email inbox, and then navigates to the email, with a single gesture. FIG. 6A illustrates an email inbox displaying partial views of email messages, including partial view of email message 602. The device 100 detects contact 610 on the partial view of email message 602 in FIG. 6B, with an intensity below the intensity threshold required to invoke the preview of the email (e.g., $IT_L$). In FIG. 6C, the intensity of contact 610 increases above a "hint" threshold (e.g., $IT_H$), but remains below the intensity threshold needed to invoke the preview area of the email (e.g., $IT_L$). The device indicates that the user is approaching the intensity needed to call up the preview area by starting to blur and push the other partial views of emails back in virtual z-space (e.g., away from the screen). As illustrated in FIG. 6D, the blurring and movement backwards in virtual z-space are dynamically responsive to increasing intensity of contact 610 below the preview-area invoking threshold (e.g., $IT_L$).

Figure 6G:
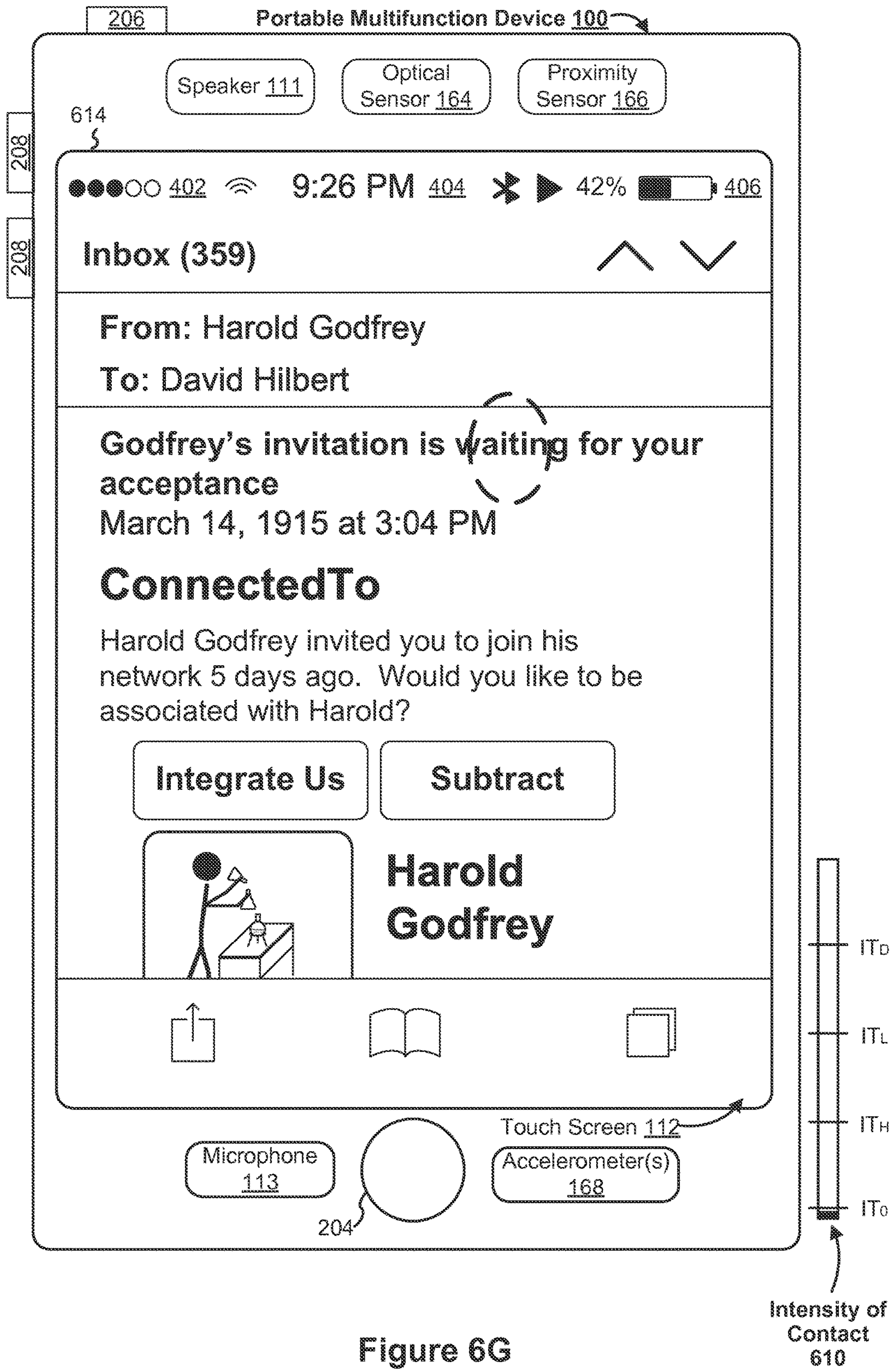

In FIG. 6E, the intensity of contact 610 increases above the threshold needed to invoke the preview area 612 of the email message (e.g., $IT_L$). In response, the device displays preview area 612 over portions of the partial views of the email messages in user interface 600. The preview displays a view of the email that contains more content than provided in the partial view of email message 602. The device also provides tactile feedback 611, to alert the user that the preview area was activated. The user continues to increase the intensity of contact 610 above a third threshold (e.g., $IT_D$) between FIGS. 6E and 6F. In response, the device navigates to user interface 614, displaying the full email associated with the partial view 602 and preview area 612, as illustrated in FIG. 6F. The device also provides tactile feedback 615, which is distinguishable from tactile feedback 611, to alert the user that navigation to the full email has occurred. The device maintains display of user interface 614 after the user terminates the input (e.g., contact 610), as illustrated in FIG. 6G.

Figure 6H:
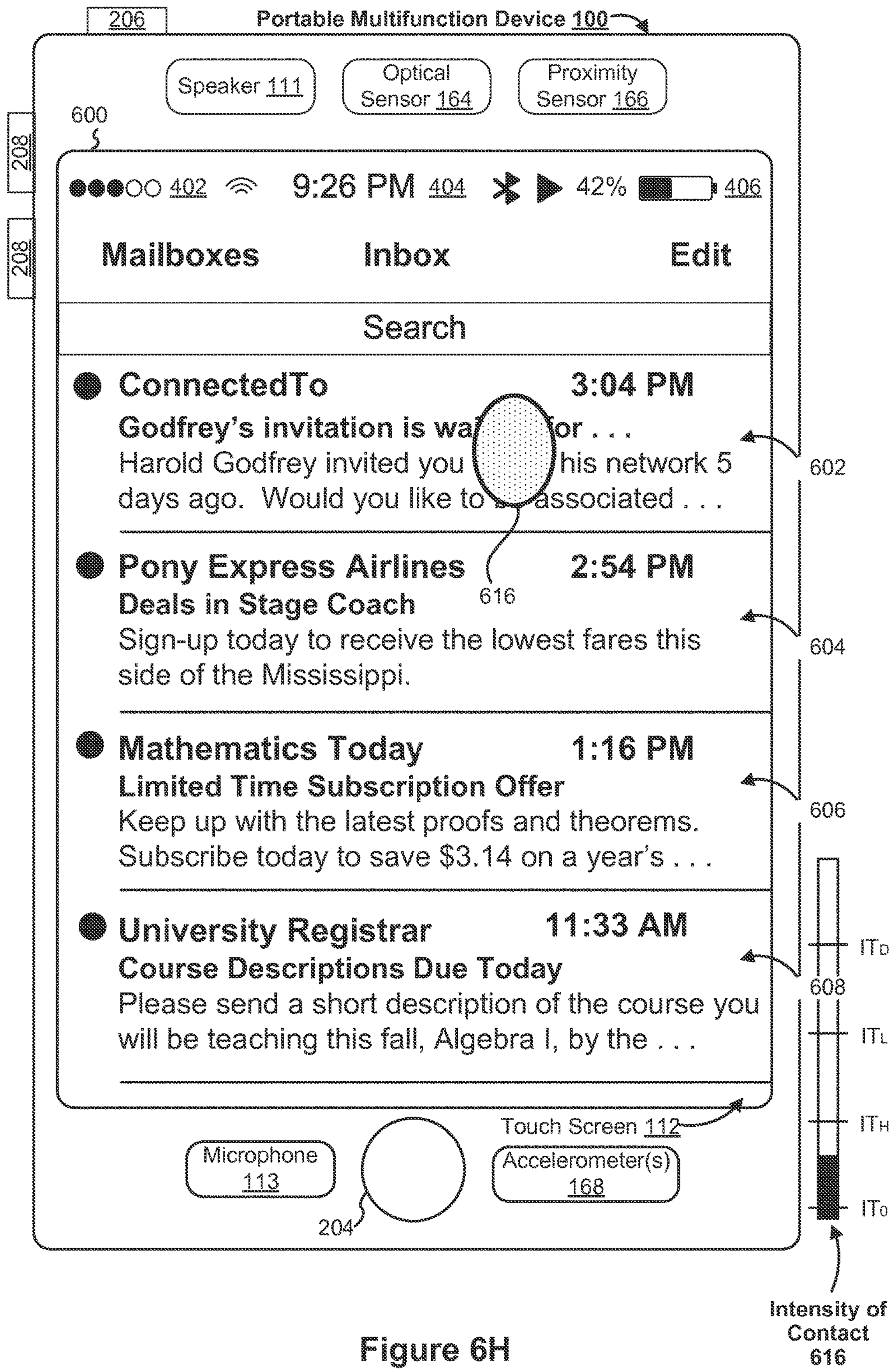
Figure 6I:
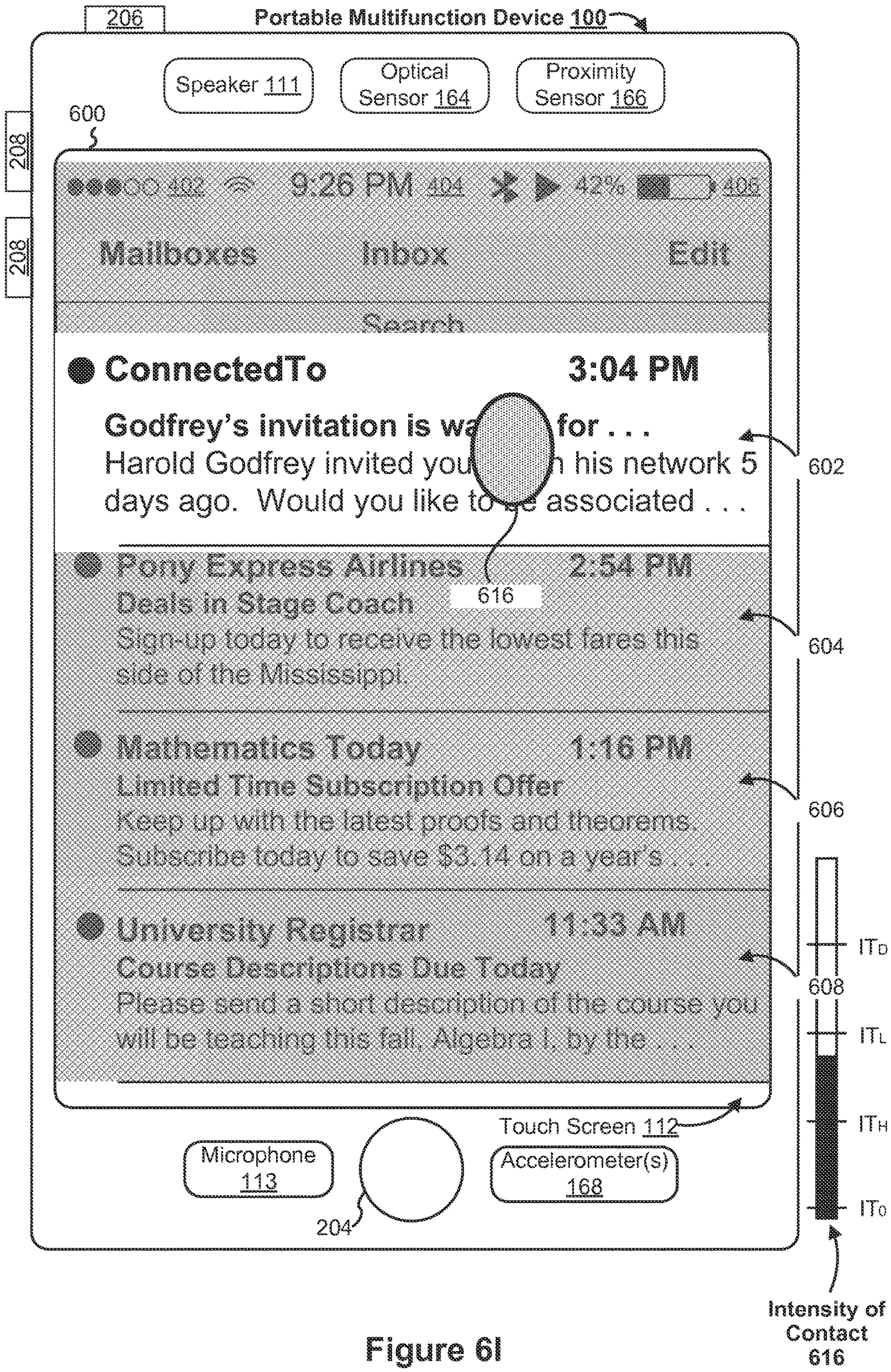
Figure 6J:
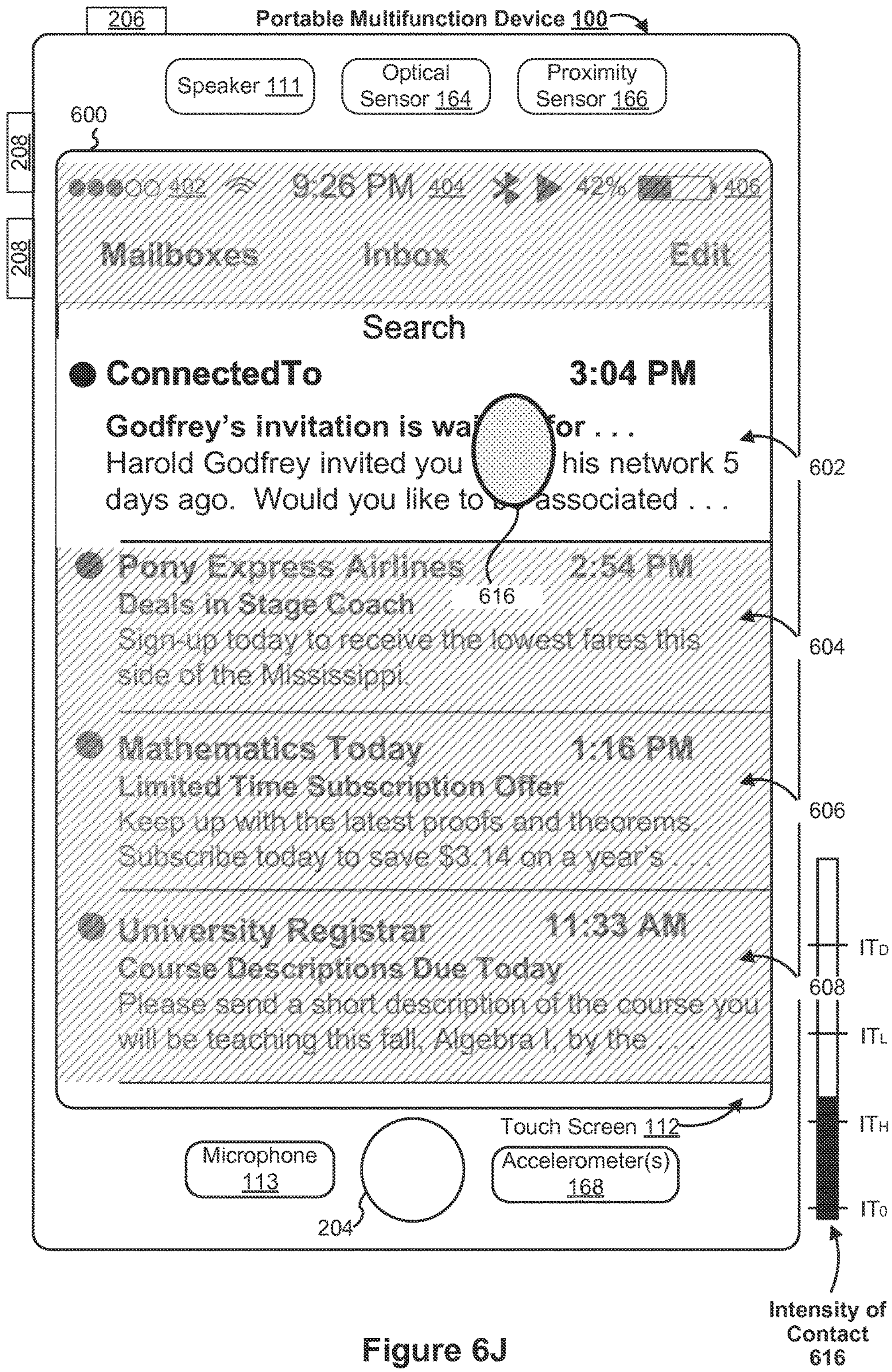
Figure 6K:
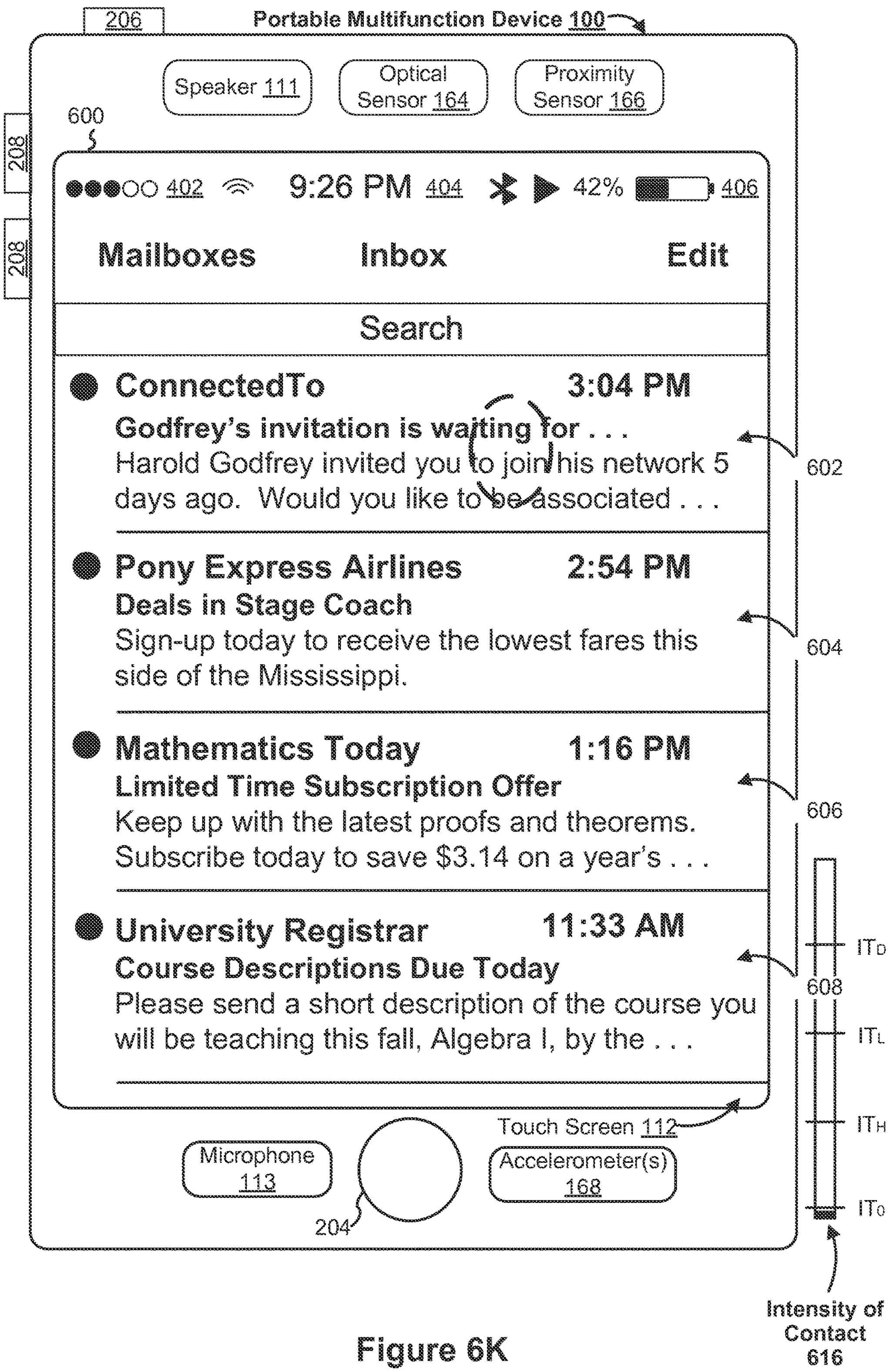

FIGS. 6H-6K illustrate an embodiment where the user begins to call up the preview of the full email associated with partial view 602, but stops short of reaching the required intensity threshold. In FIG. 6H, the device 100 detects contact 616 on partial view of email message 602, displayed in email inbox user interface 600, with an intensity below the intensity threshold required to invoke the preview of the email (e.g., $IT_L$). In FIG. 6I, the intensity of contact 616 increases above a "hint" threshold (e.g., $IT_H$), but remains below the intensity threshold needed to invoke the preview area of the email (e.g., $IT_L$). The device indicates that the user is approaching the intensity needed to call up the preview area by starting to blur and push the other partial views of emails back in virtual z-space (e.g., away from the screen). However, FIG. 6J illustrates that the user reduces the intensity of contact 616 before reaching the intensity threshold (e.g., $IT_L$) required to invoke the preview area. In response, the device dynamically reverses the blurring of the other partial views and moves them forward in virtual z-space. In FIG. 6K, the user lifts-off contact 616. Because the intensity of contact 616 never reached the intensity threshold required to navigate to the full version of the email (e.g., $IT_D$), the device returns the display of user interface 600 to the same state as before contact 616 was detected.

Figure 6L:
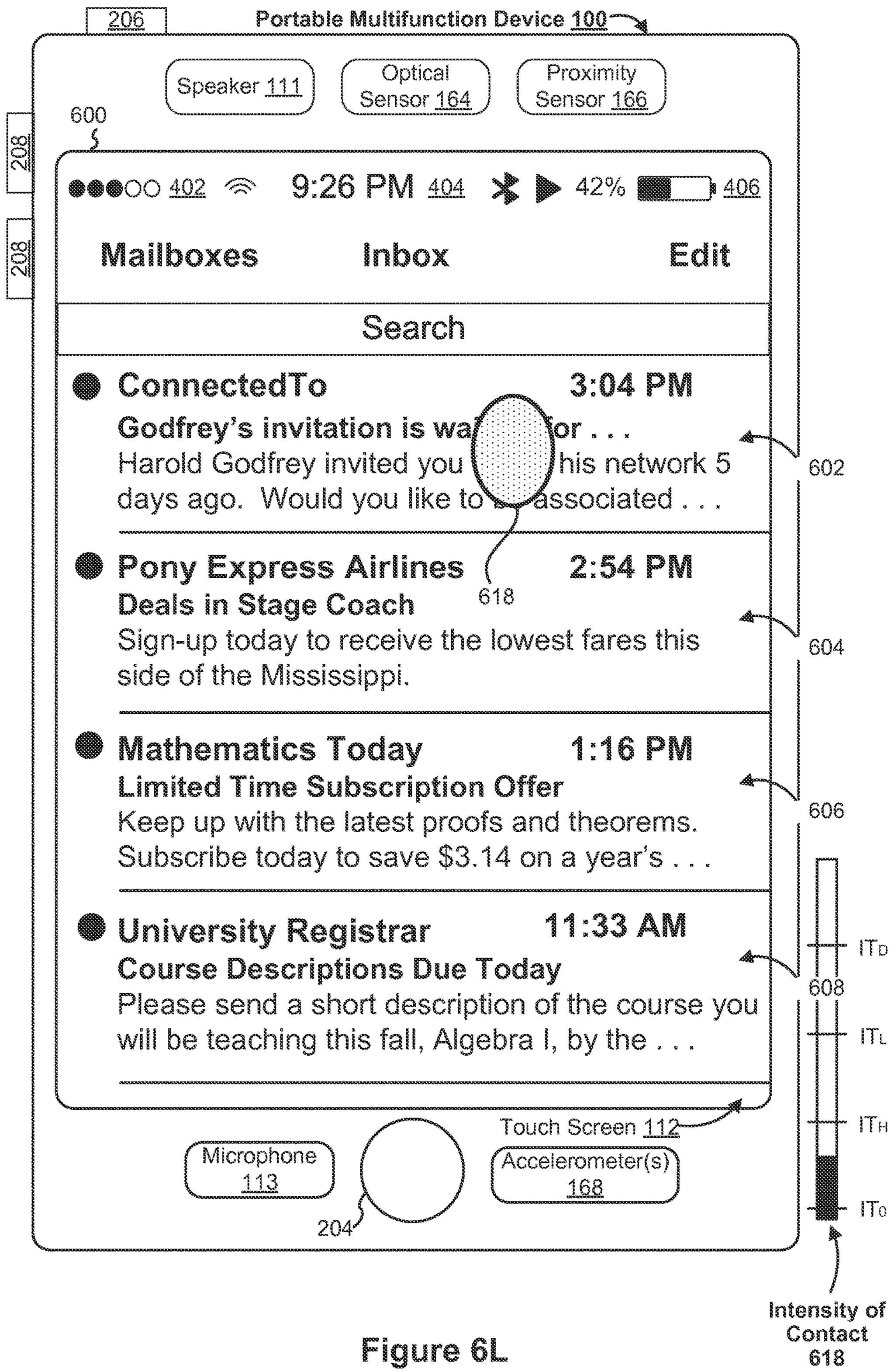
Figure 6M:
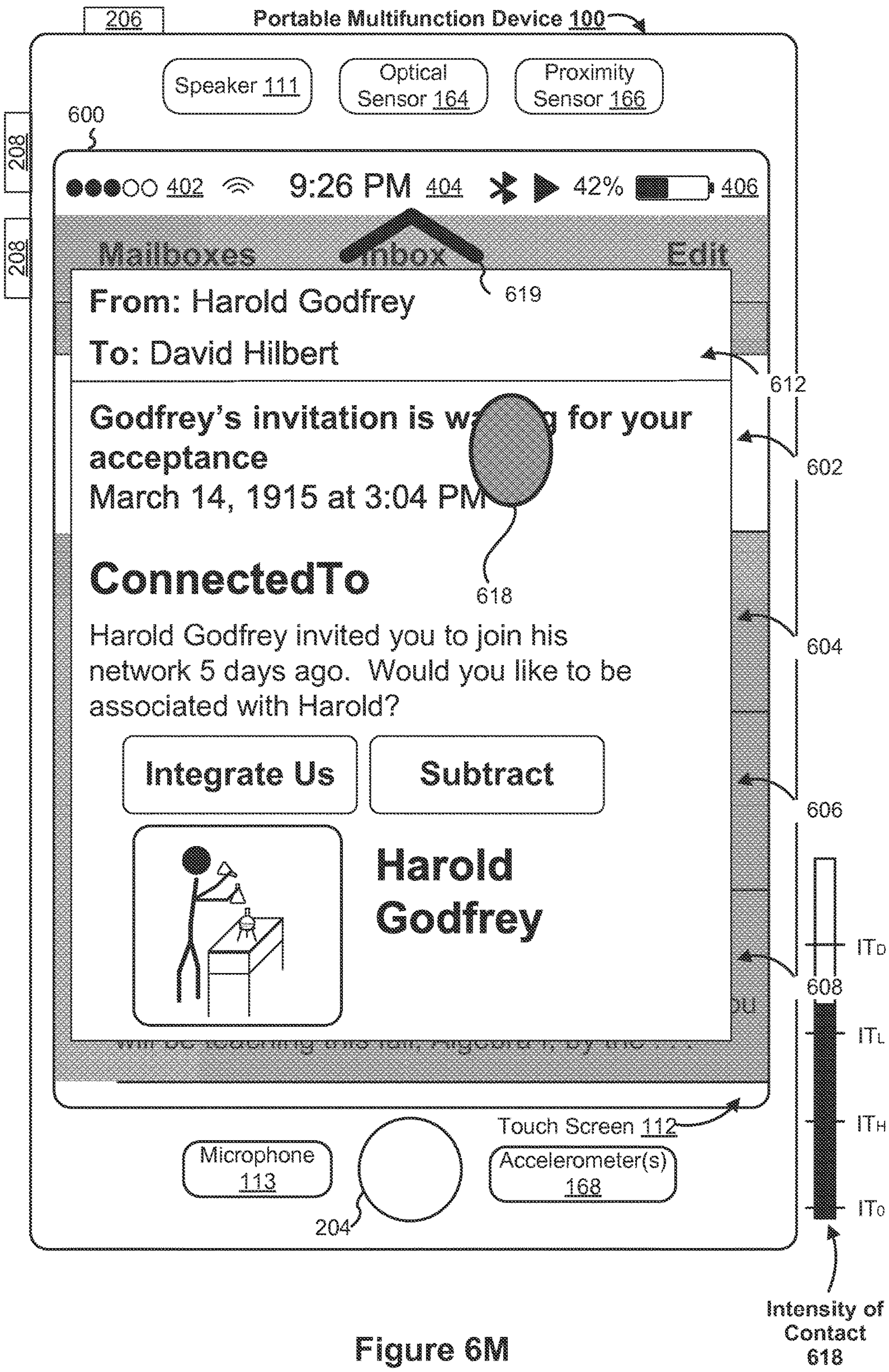
Figure 6N:
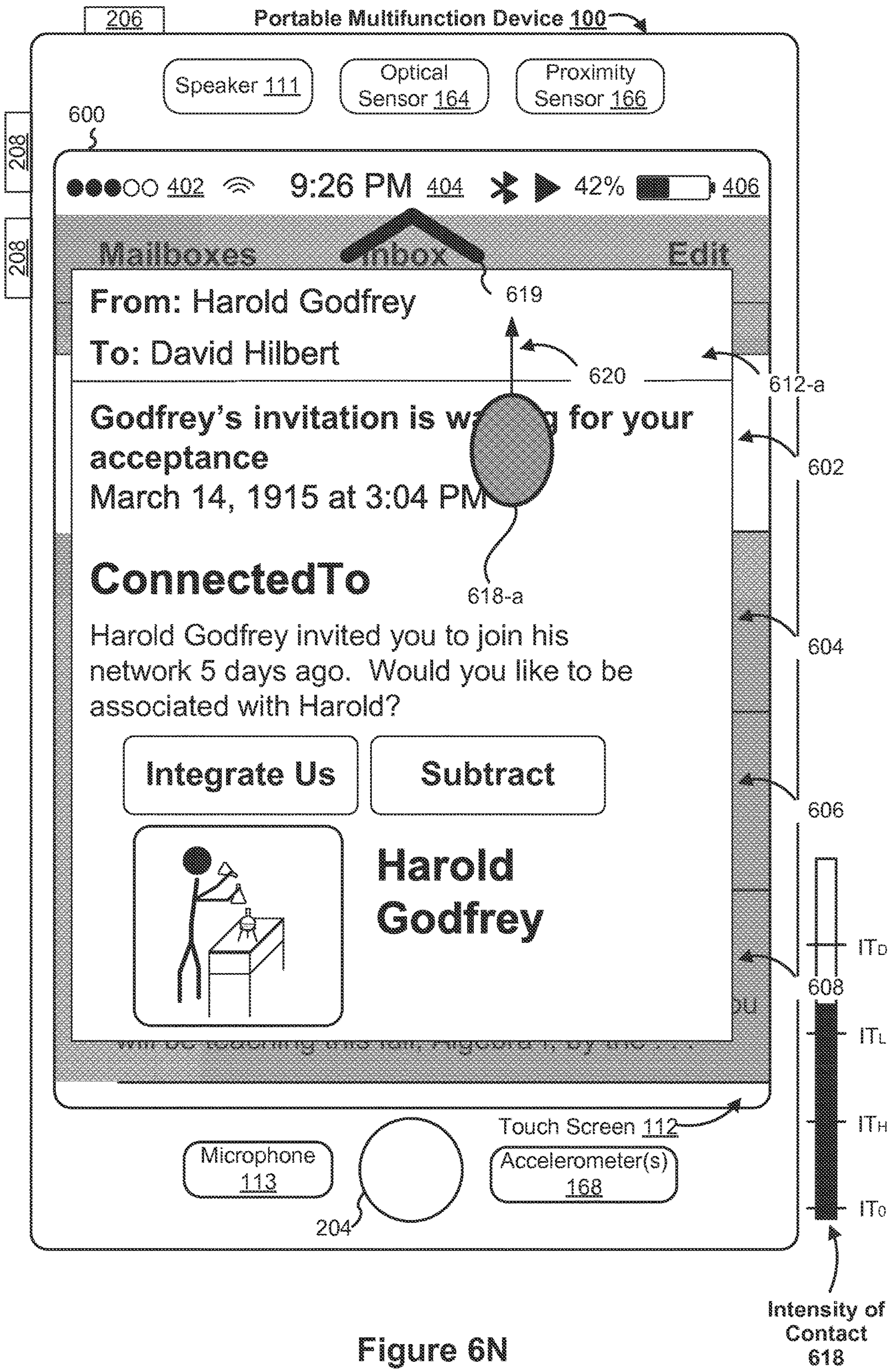

FIGS. 6L-6O illustrate an embodiment where the user activates a menu of selectable actions associated with the full email message while viewing a preview of the message (e.g., without navigating away from the email inbox). In FIG. 6L, the device 100 detects contact 618 on partial view of email message 602, displayed in email inbox user interface 600, with an intensity below the intensity threshold required to invoke the preview of the email (e.g., $IT_L$). In FIG. 6M, the device displays preview area 612 in response to detecting an increase in the intensity of contact 618 above the preview-area invoking threshold (e.g., $IT_L$). The device also displays caret 619, indicating to the user that selectable actions can be revealed by swiping up on touch screen 112. As illustrated in FIG. 6N, the user moves contact 620 up on touch screen 112. In response to detecting the movement of the contact from position 618-*a* to position 618-*b* in FIG. 6O, preview area 612 moves up on the display and selectable action options 624, 626, and 628 are revealed below the preview area. The device also provides tactile feedback 6123, which is distinguishable from tactile feedback 611 and 615, to alert the user that additional actions are now available. As illustrated in FIG. 6P, the device maintains display of preview area 612 after the user liftoff contact 618 because selectable action options 624, 626, and 628 were revealed.

Figure 6O:
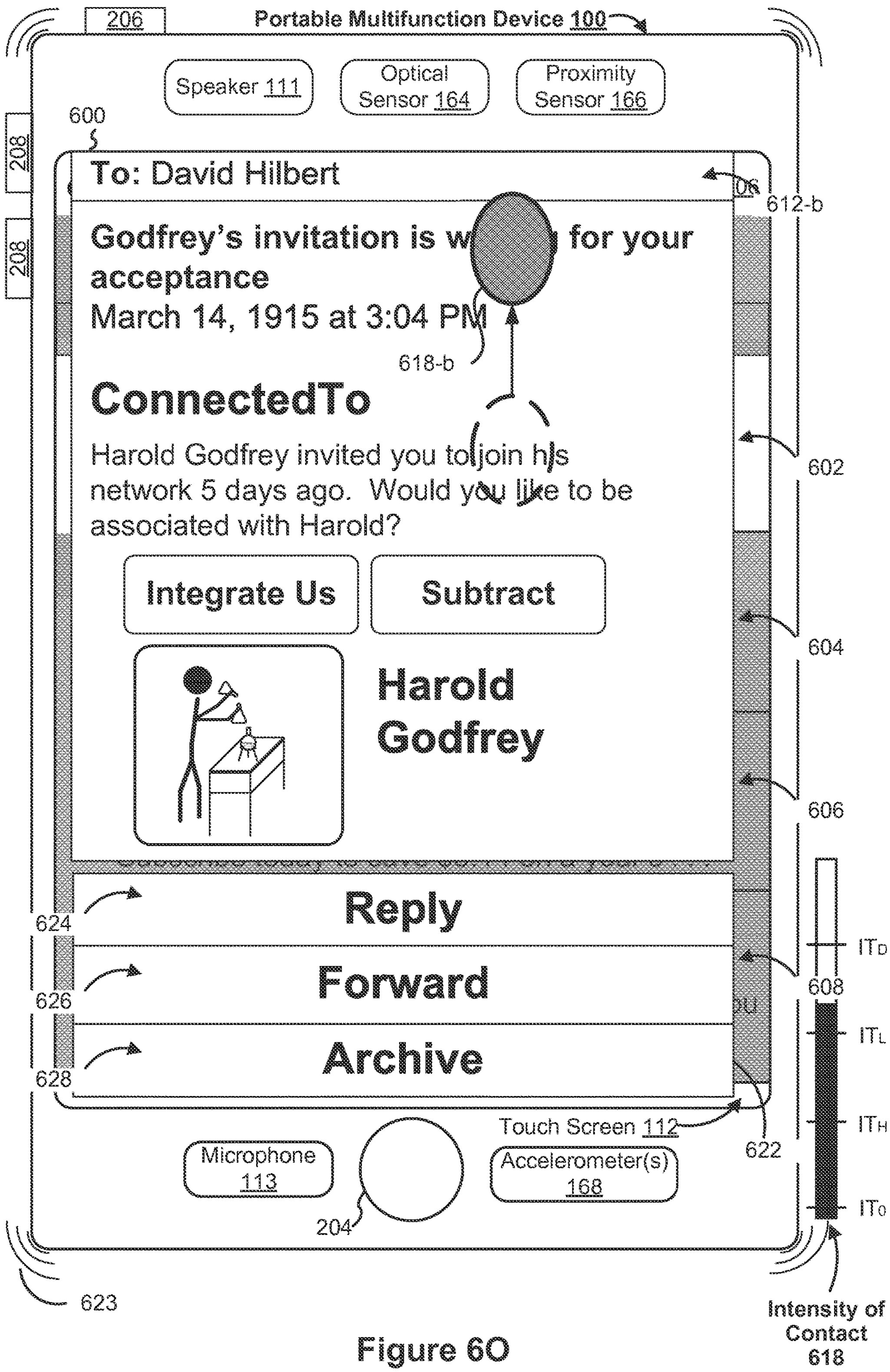
Figure 6P:
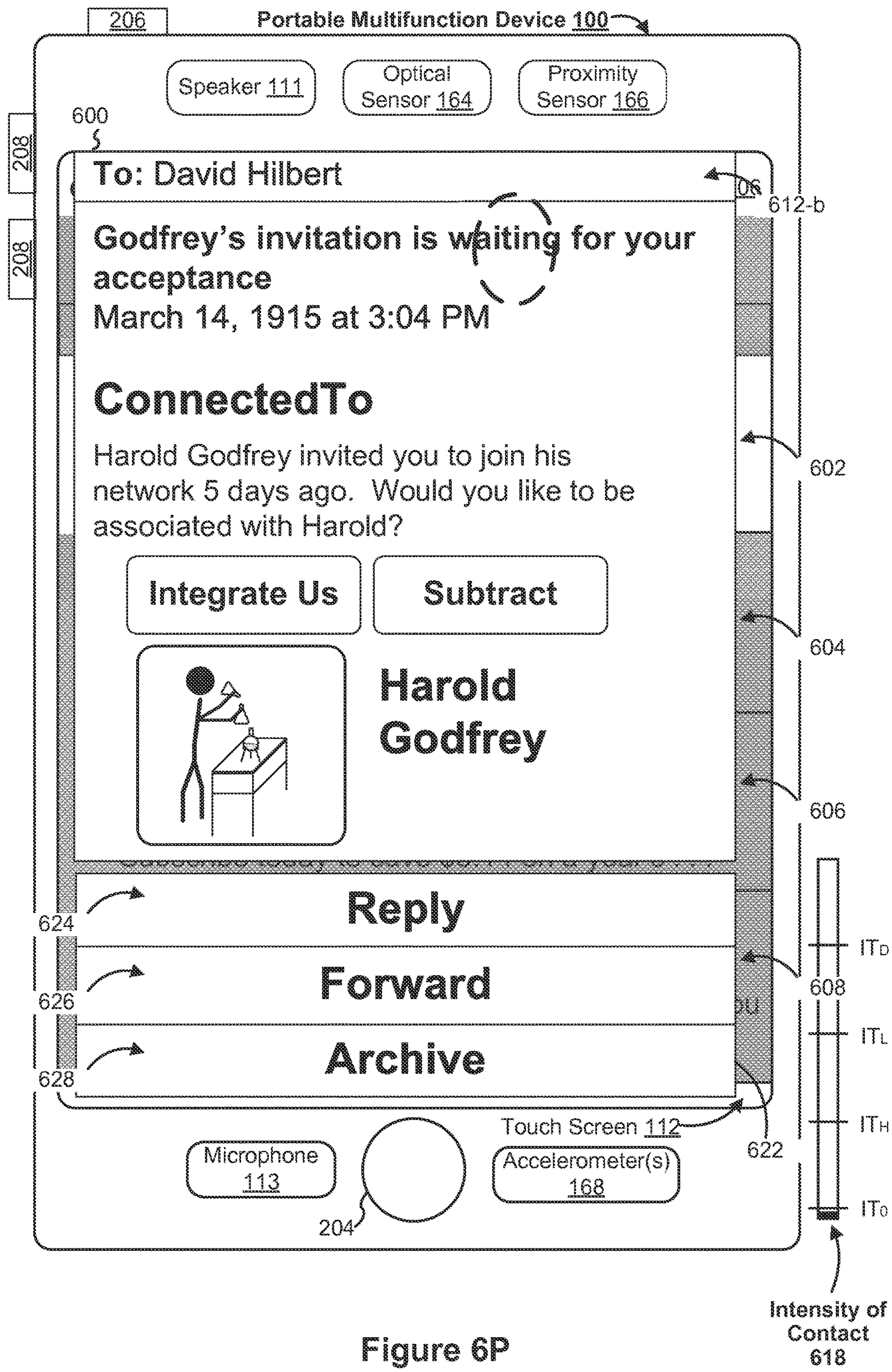
Figure 6Q:
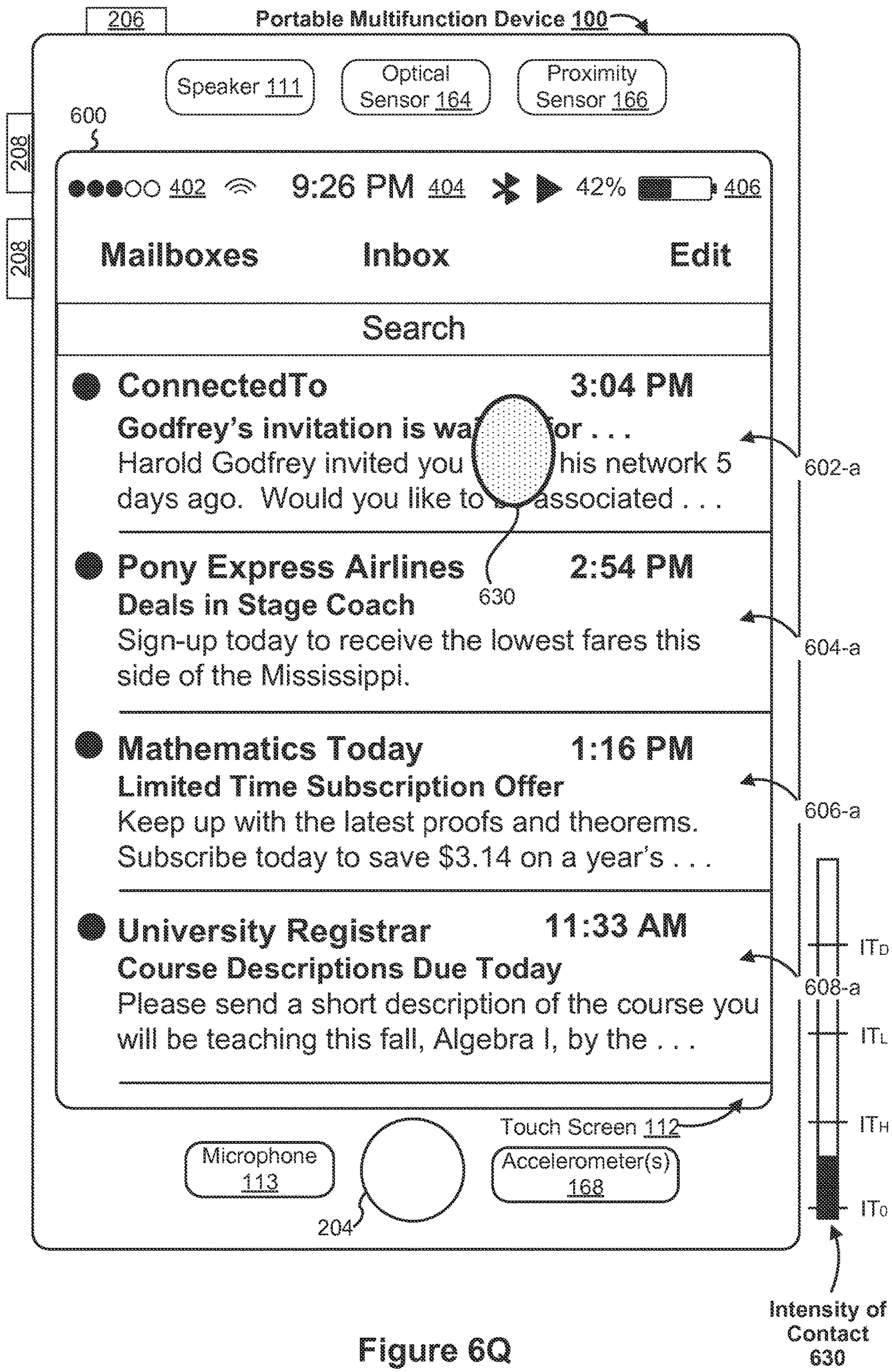
Figure 6R:
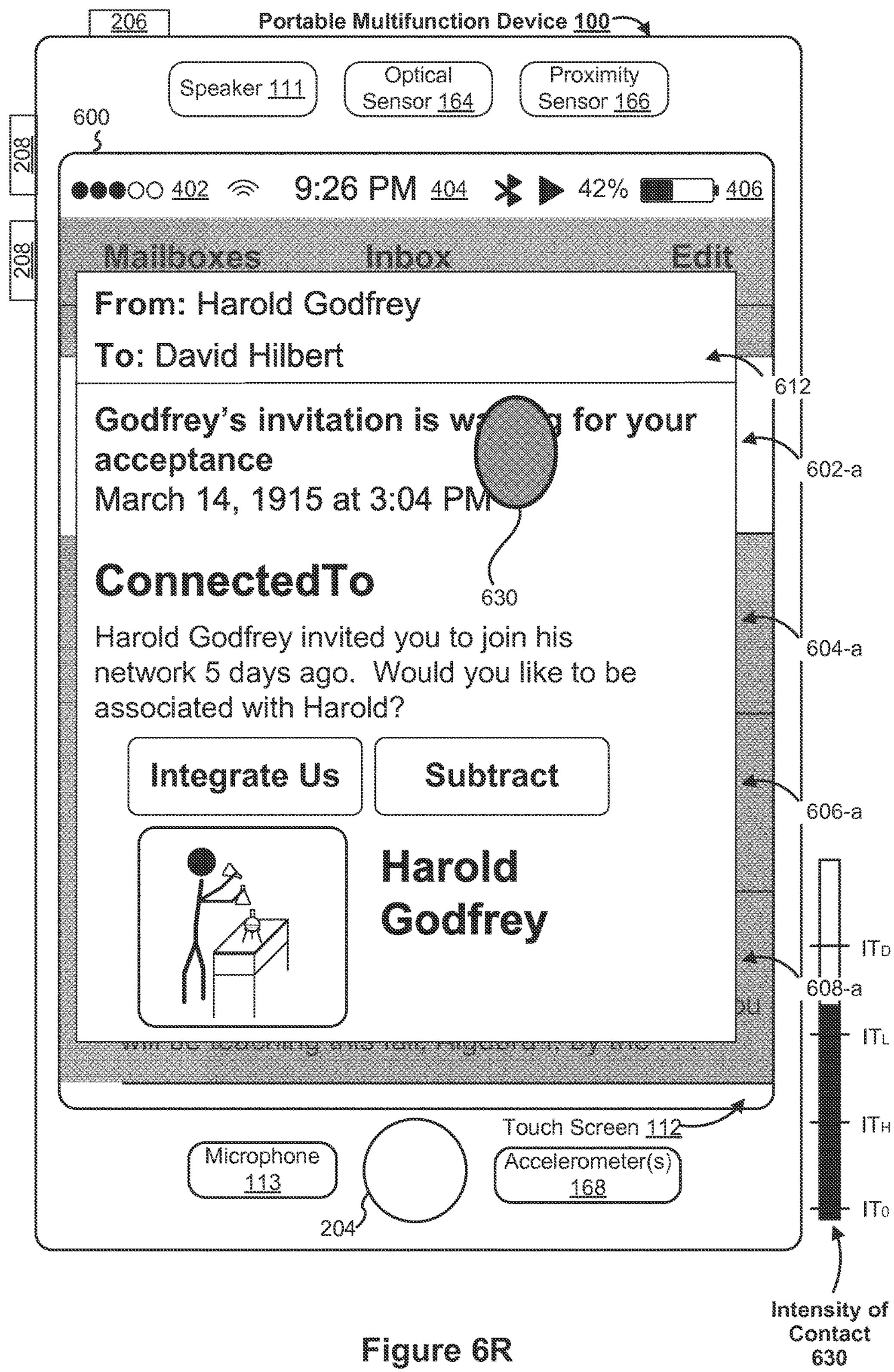
Figure 6S:
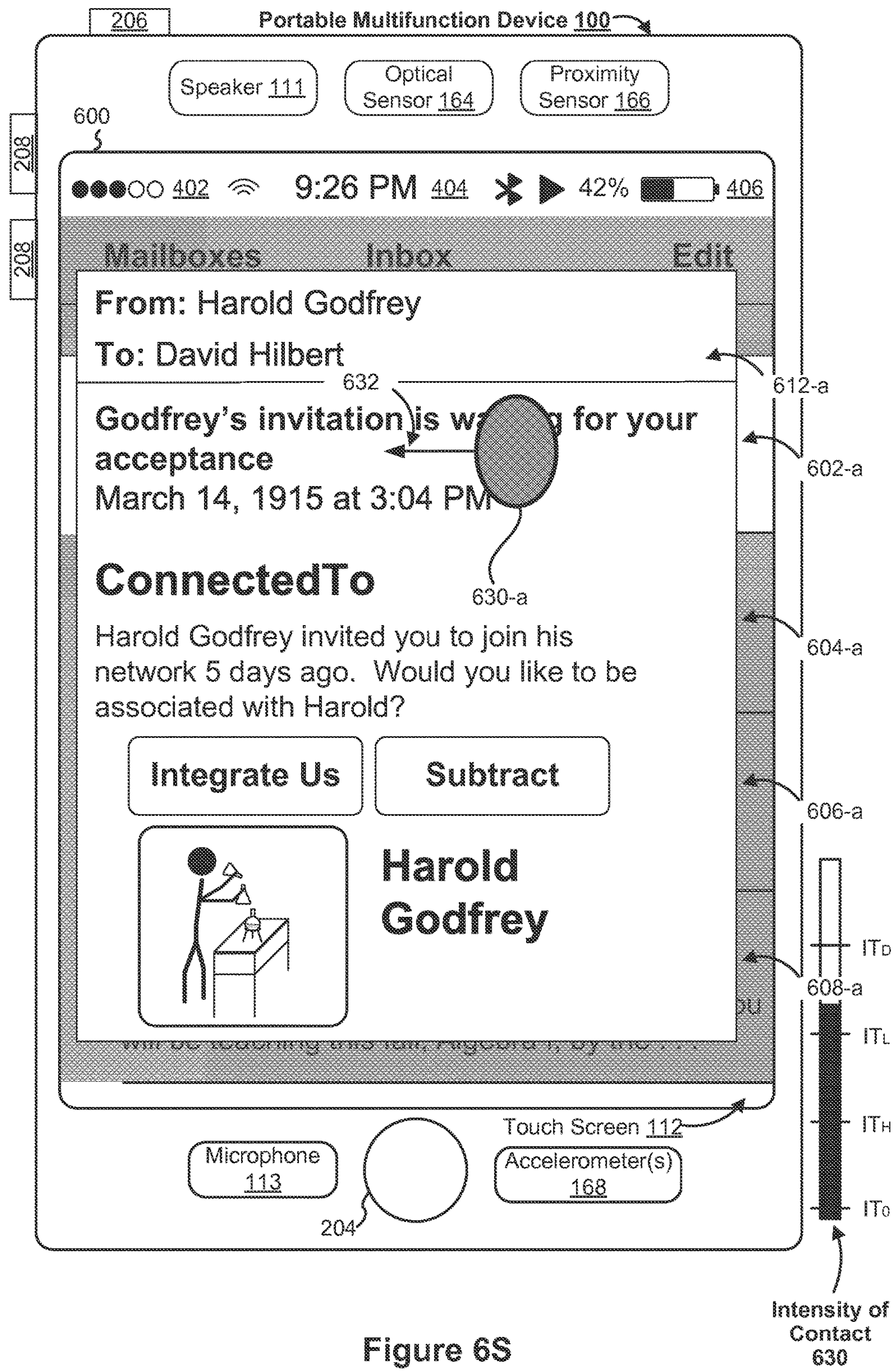
Figure 6T:
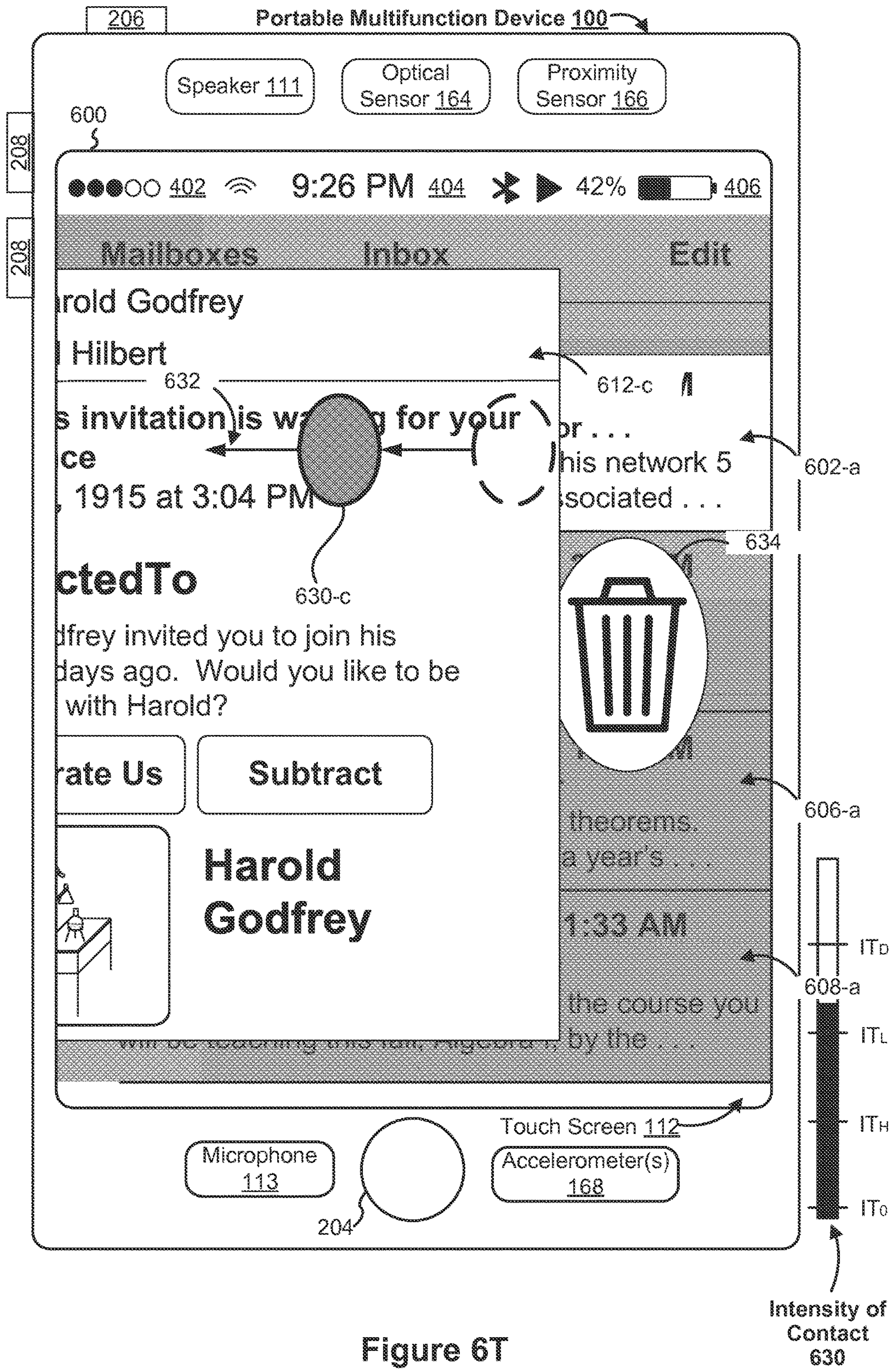
Figure 6U:
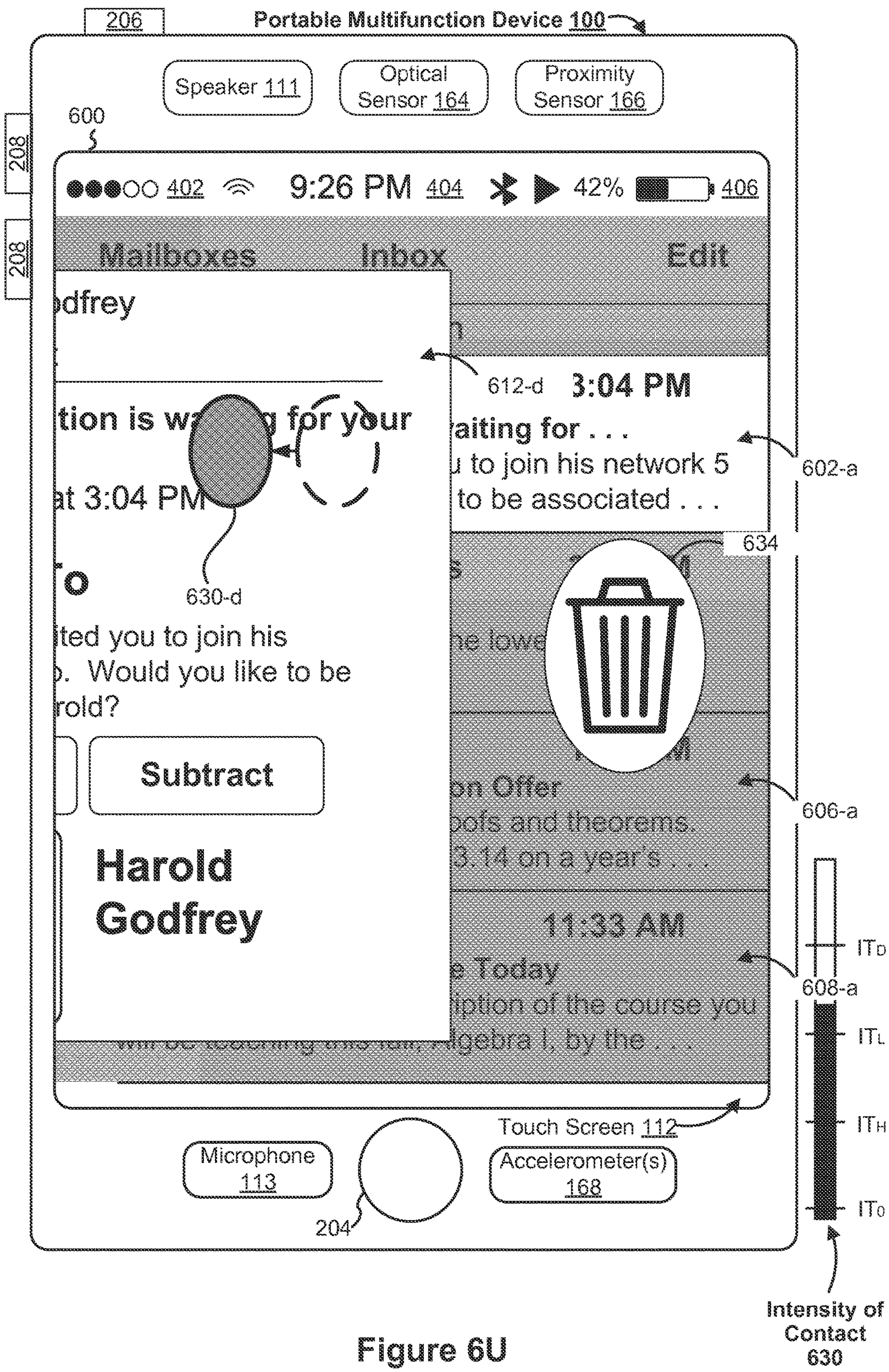
Figure 6V:
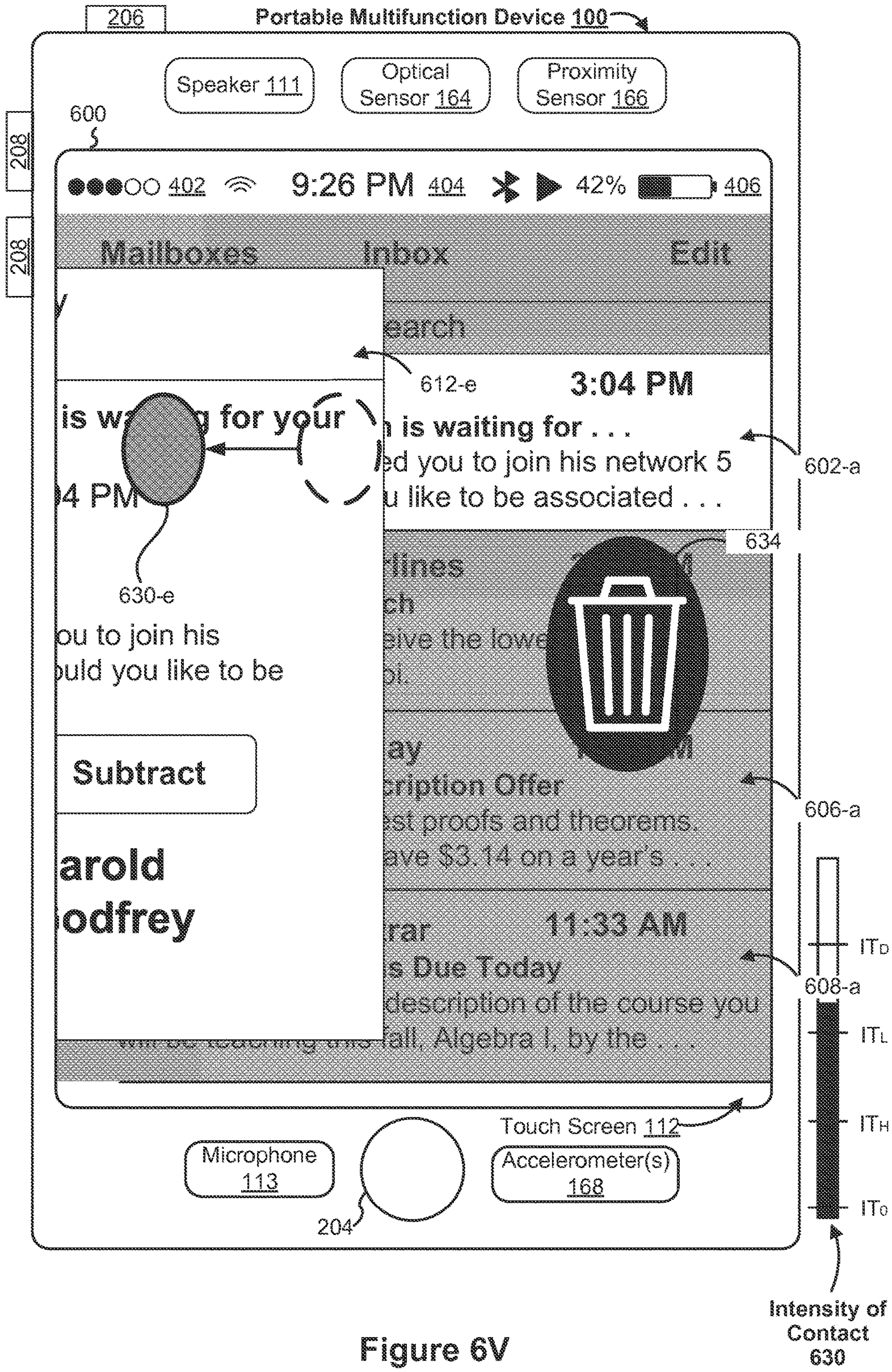
Figure 6W:
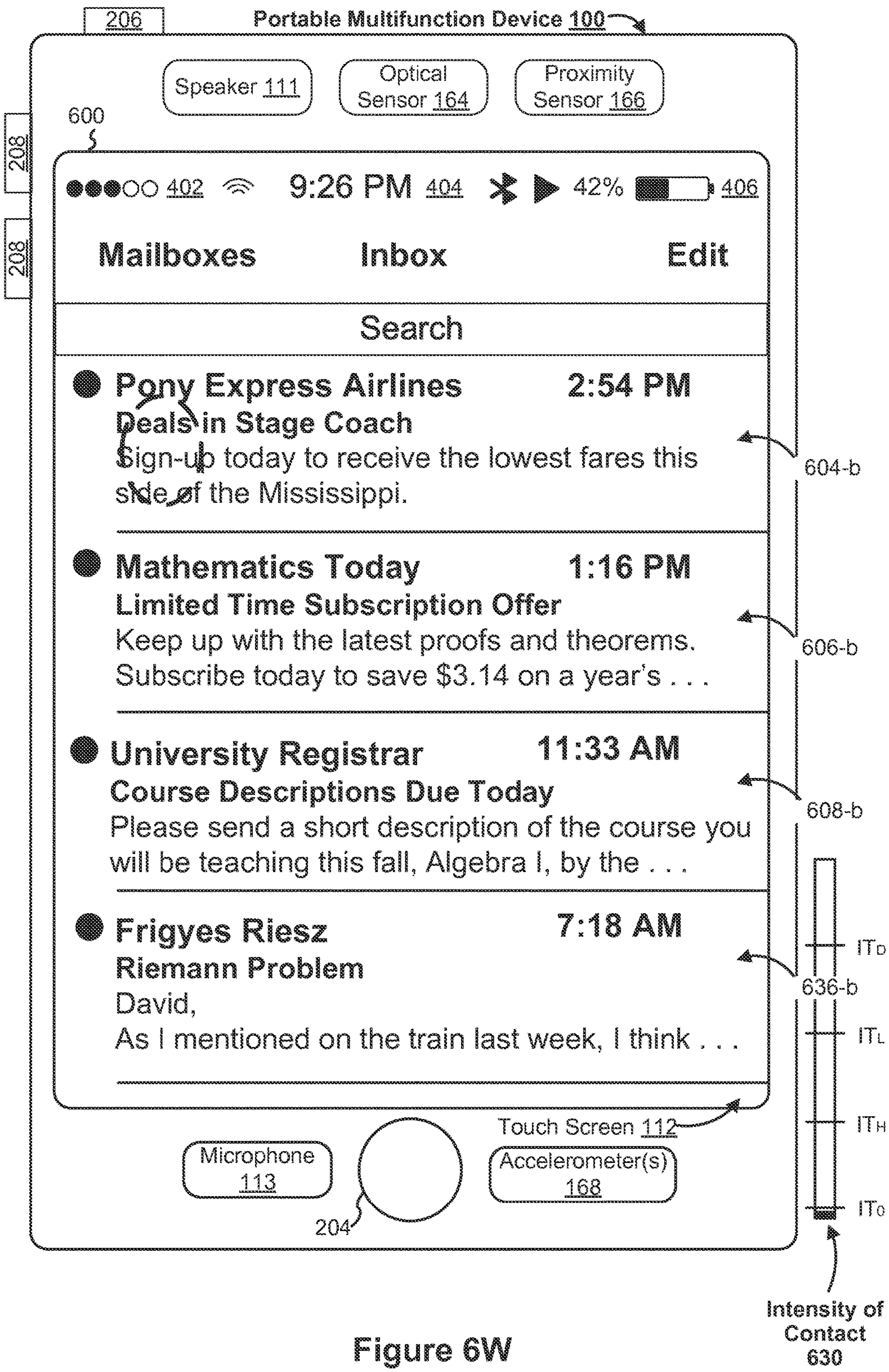

FIGS. 6Q-6W illustrate an embodiment where the user previews the content of an email, and then deletes the email, with a single gesture. In FIG. 6R, the device 100 detects contact 630 on partial view of email message 602, displayed in email inbox user interface 600, with an intensity below the intensity threshold required to invoke the preview of the email (e.g., $IT_L$). In FIG. 6R, the device displays preview area 612 in response to detecting an increase in the intensity of contact 630 above the preview-area invoking threshold (e.g., $IT_L$). In FIG. 6S, the user begins moving contact 630 (via movement 632) to the left on touch screen 112. In response, preview area 612 moves with the contact, gradually revealing action icon 634 from under the preview area in FIGS. 6T-6U. As the user continues to move preview area 612 to the left, the color of action icon 634 changes, indicating to the user that the associated action (e.g., deleting the email from the inbox) is active for performance upon termination of the contact, as illustrated in FIG. 6V. As illustrated in FIG. 6W, the device terminates display of preview area 612 and deletes the associated email when the user lifts contact 630 off of touch screen 112 while the action associated with action icon 634 was active. The device also updates display of the email inbox by removing the partial display of the associated email and moving the partial views of the other emails up in user interface 600, revealing the next partial view of email 636.

Figure 6X:
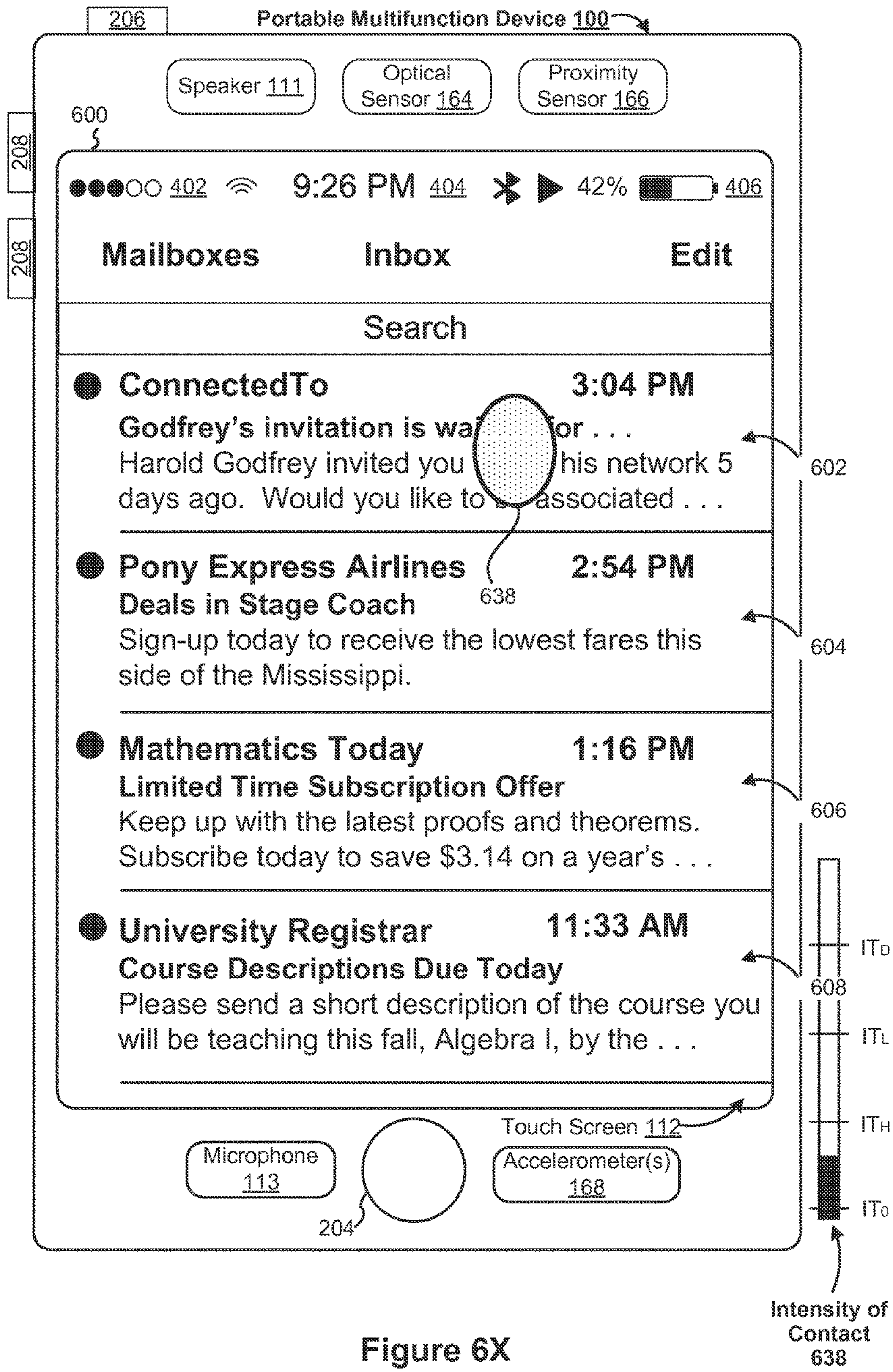
Figure 6Y:
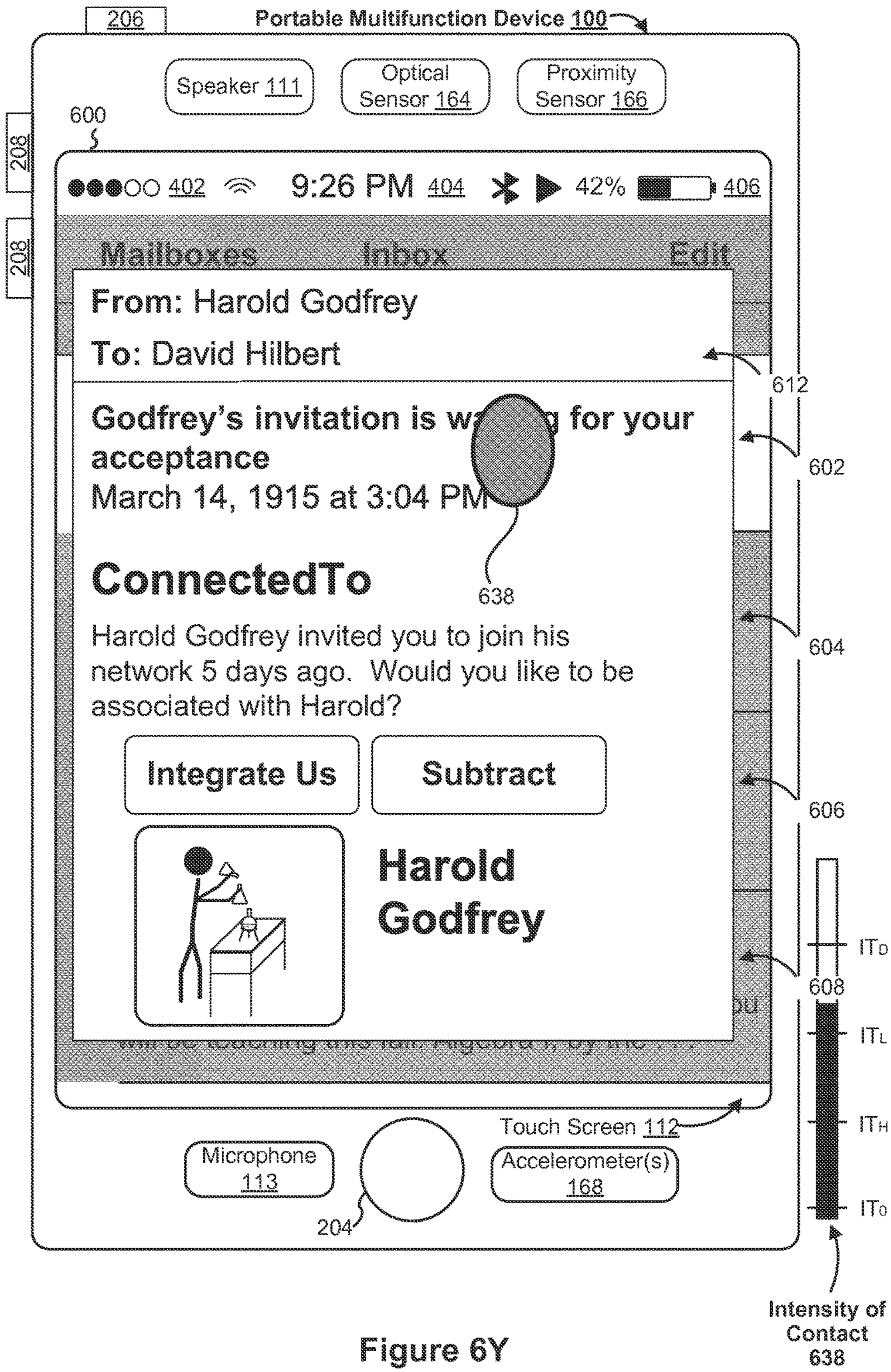
Figure 6Z:
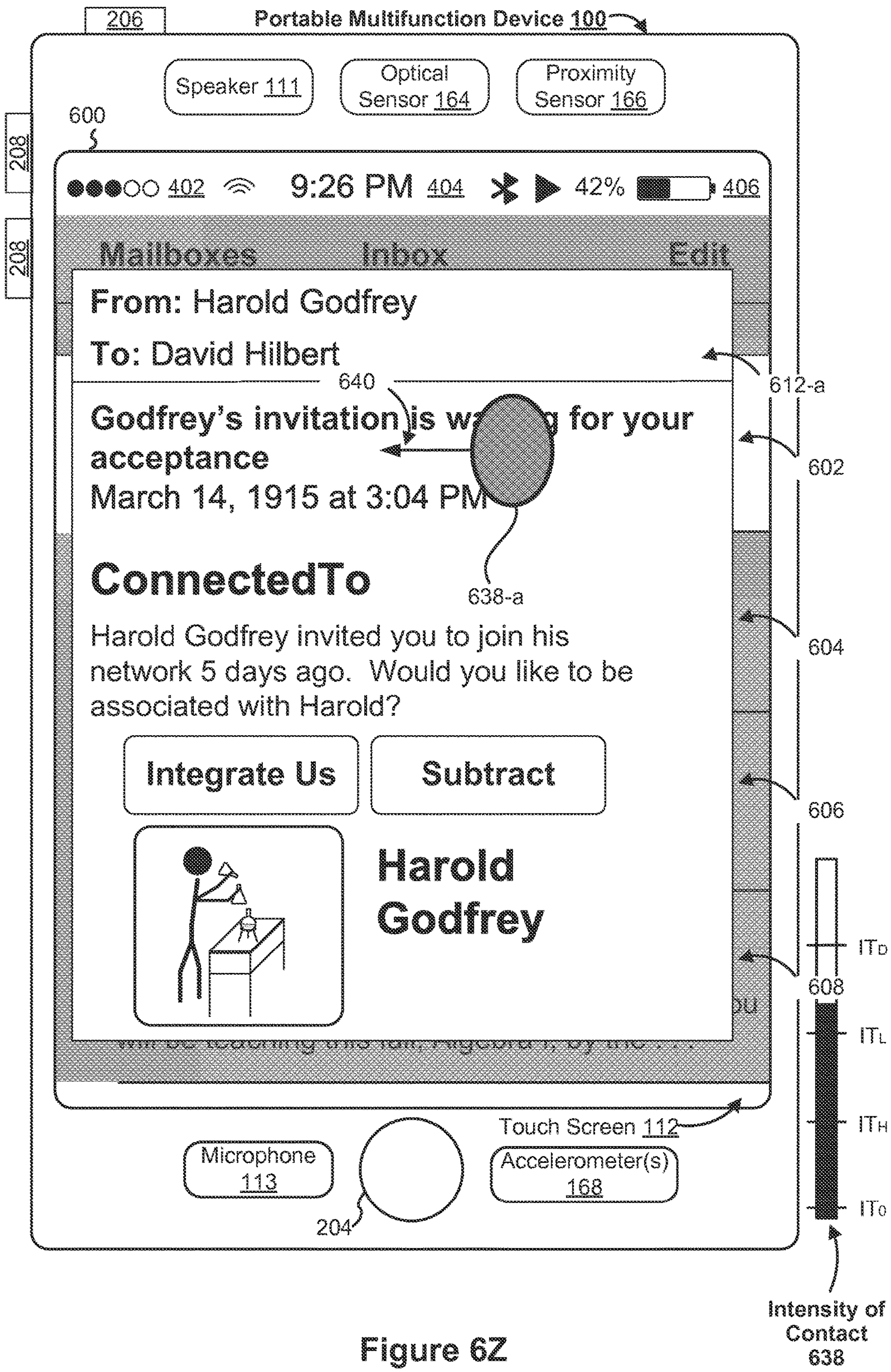
Figure 6A:
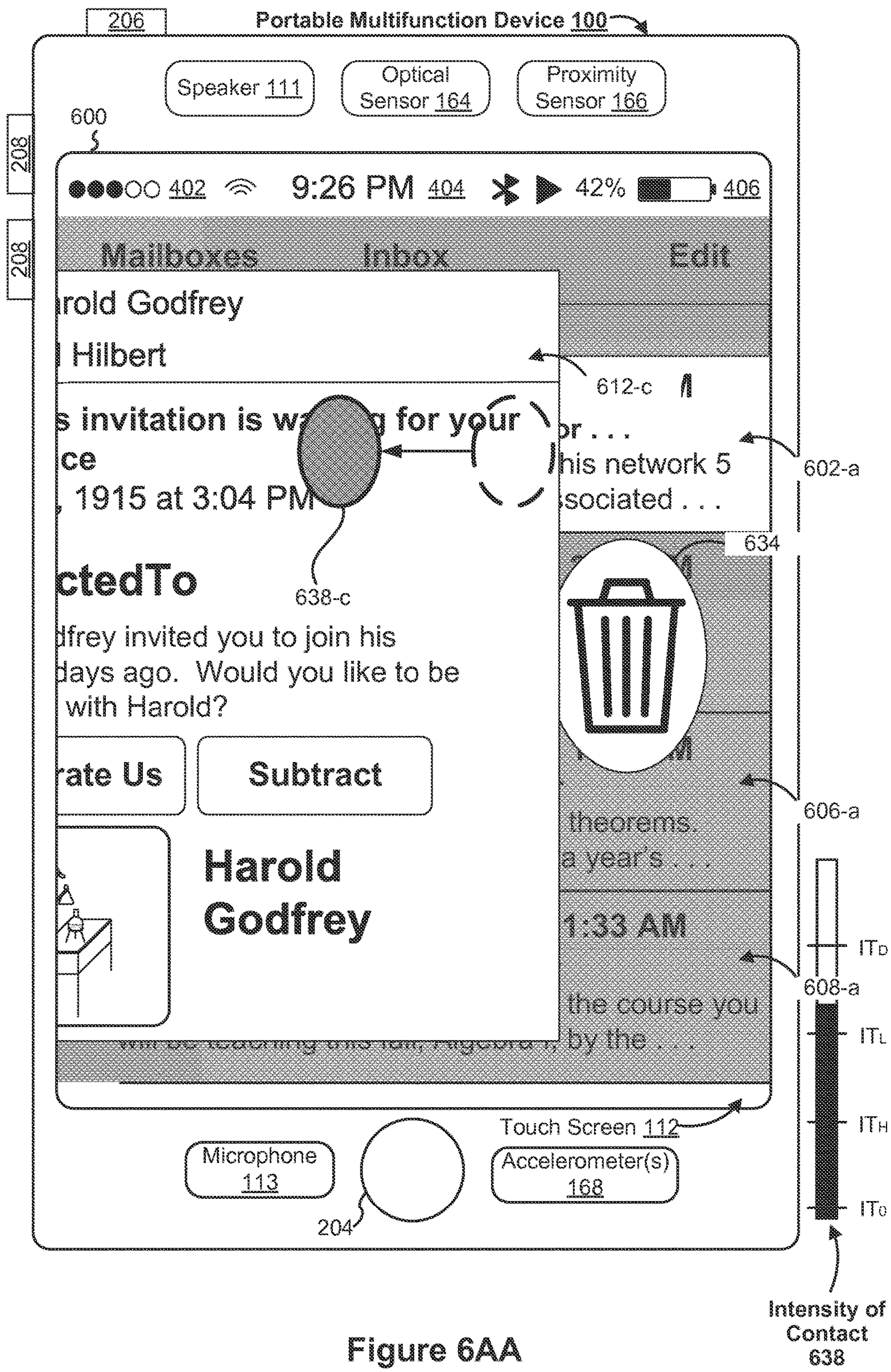
Figure 6A:
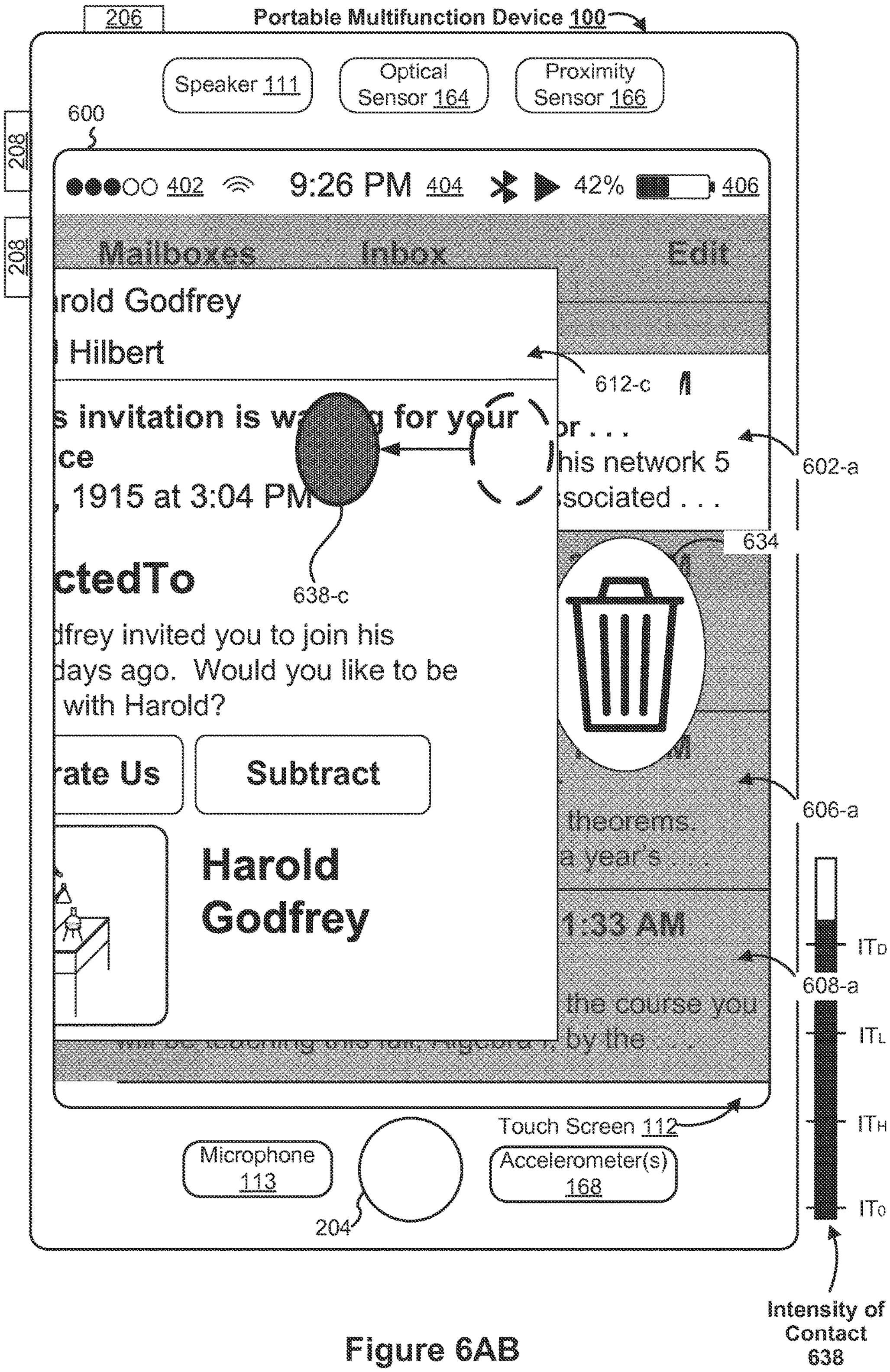
Figure 6A:
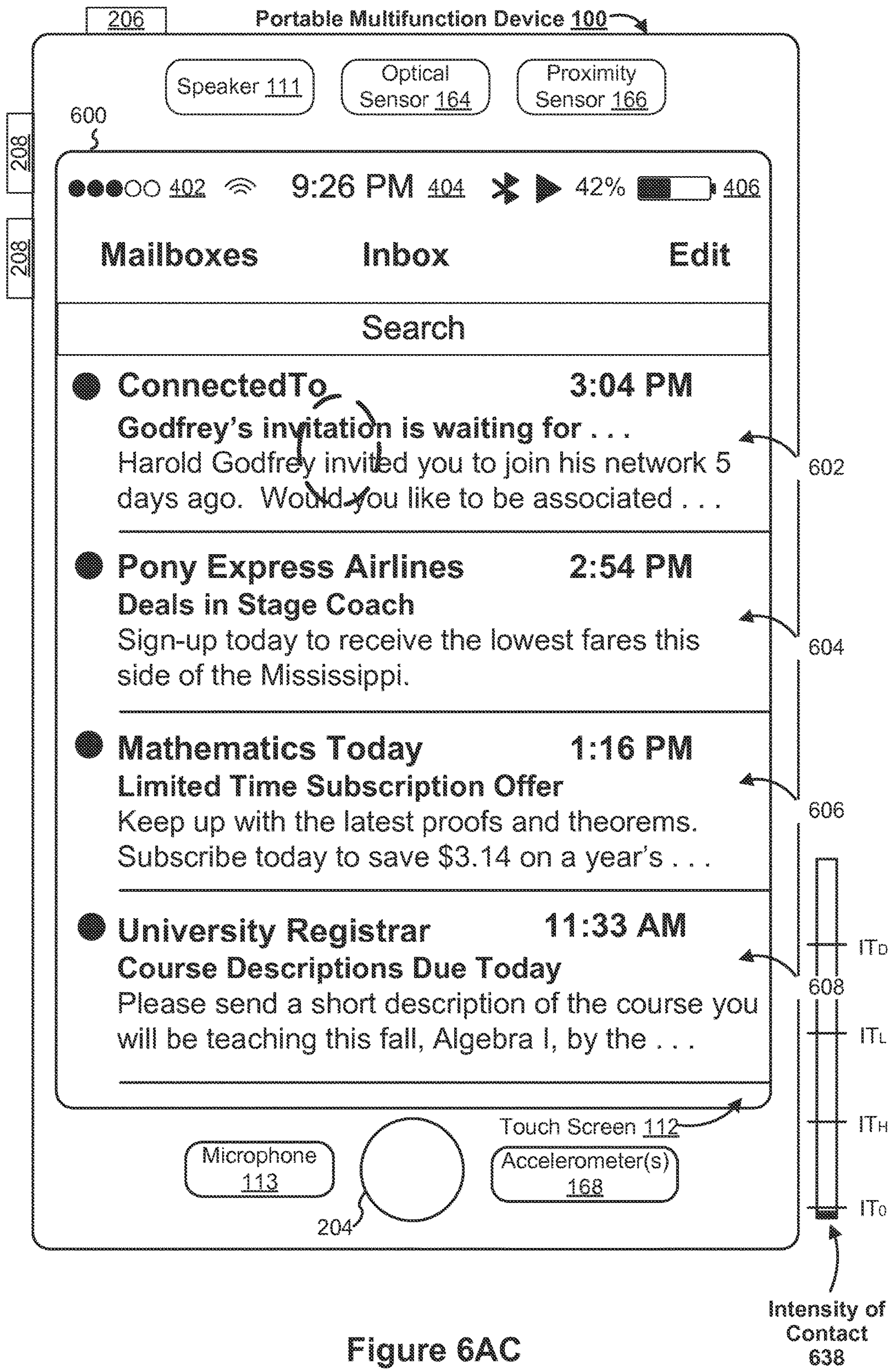
Figure 6A:
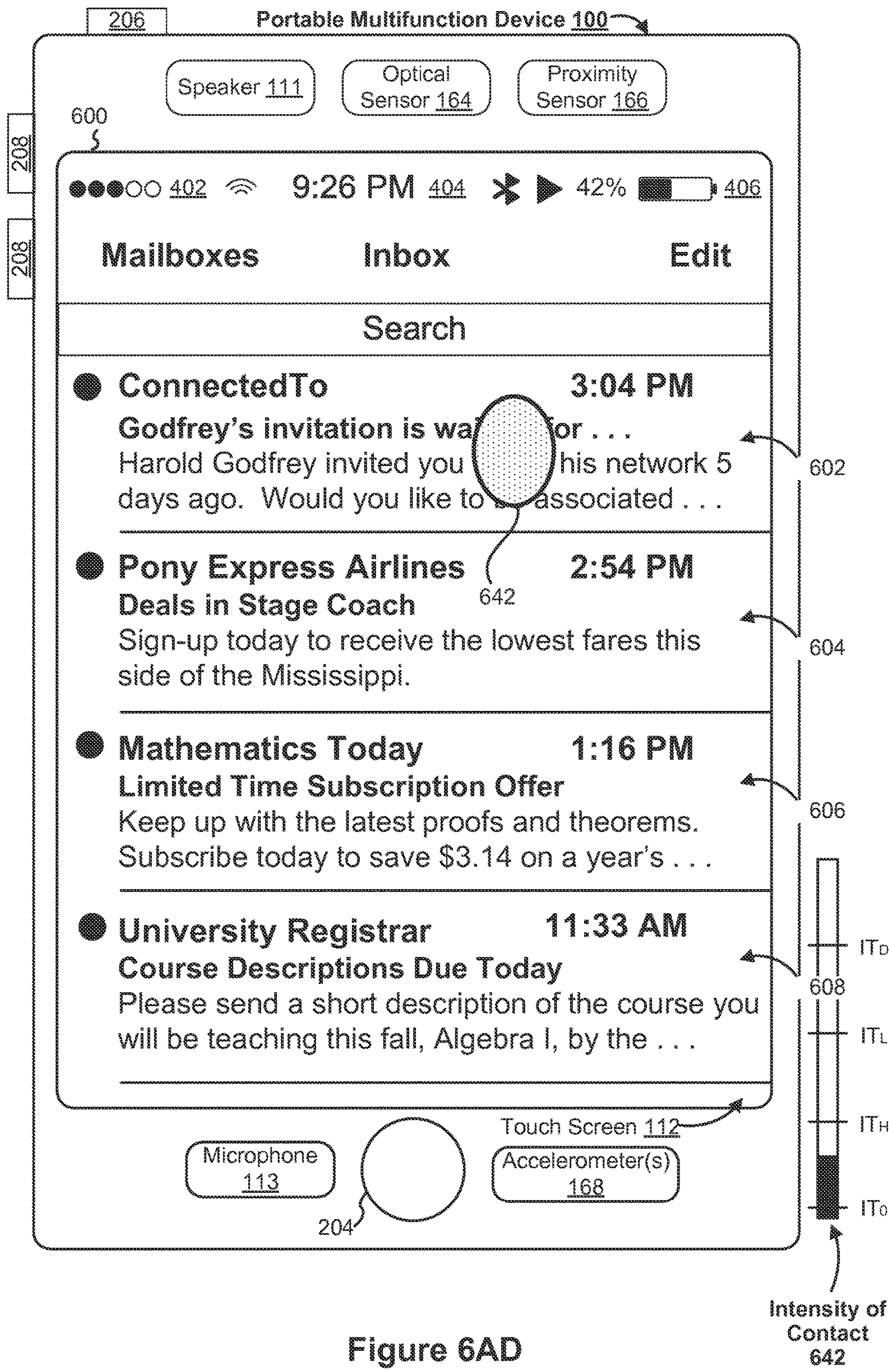
Figure 6A:
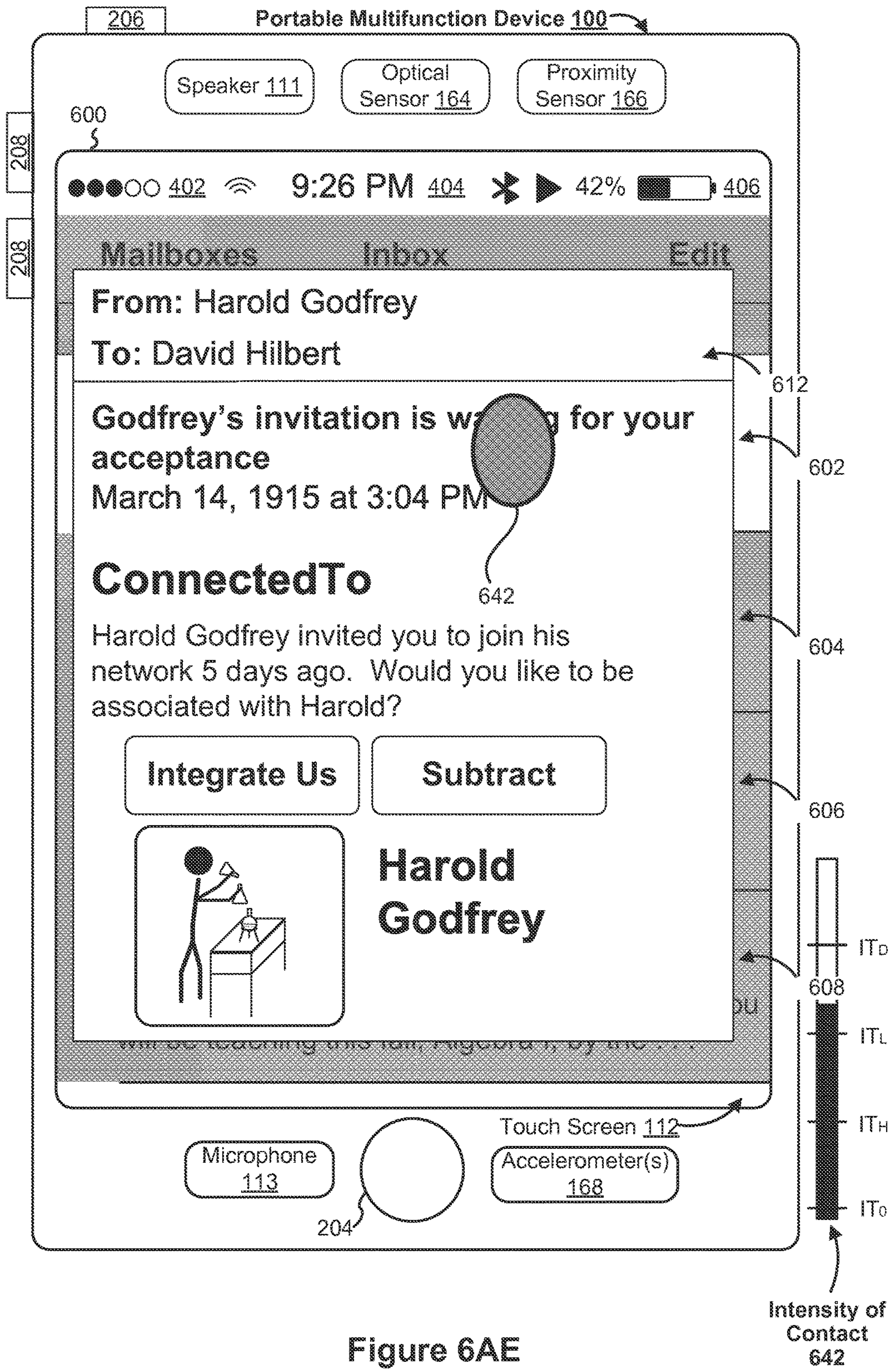
Figure 6A:
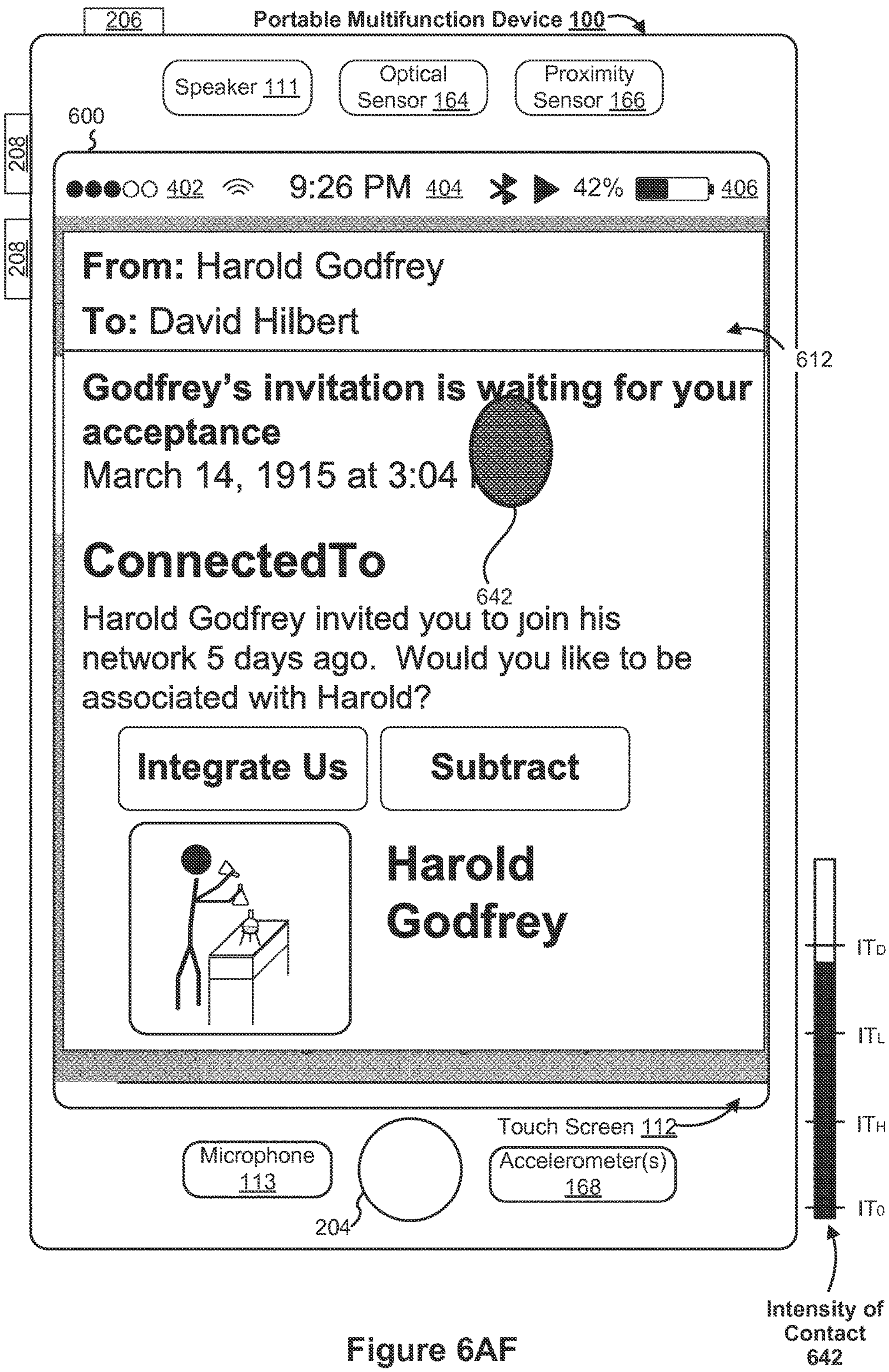
Figure 6A:
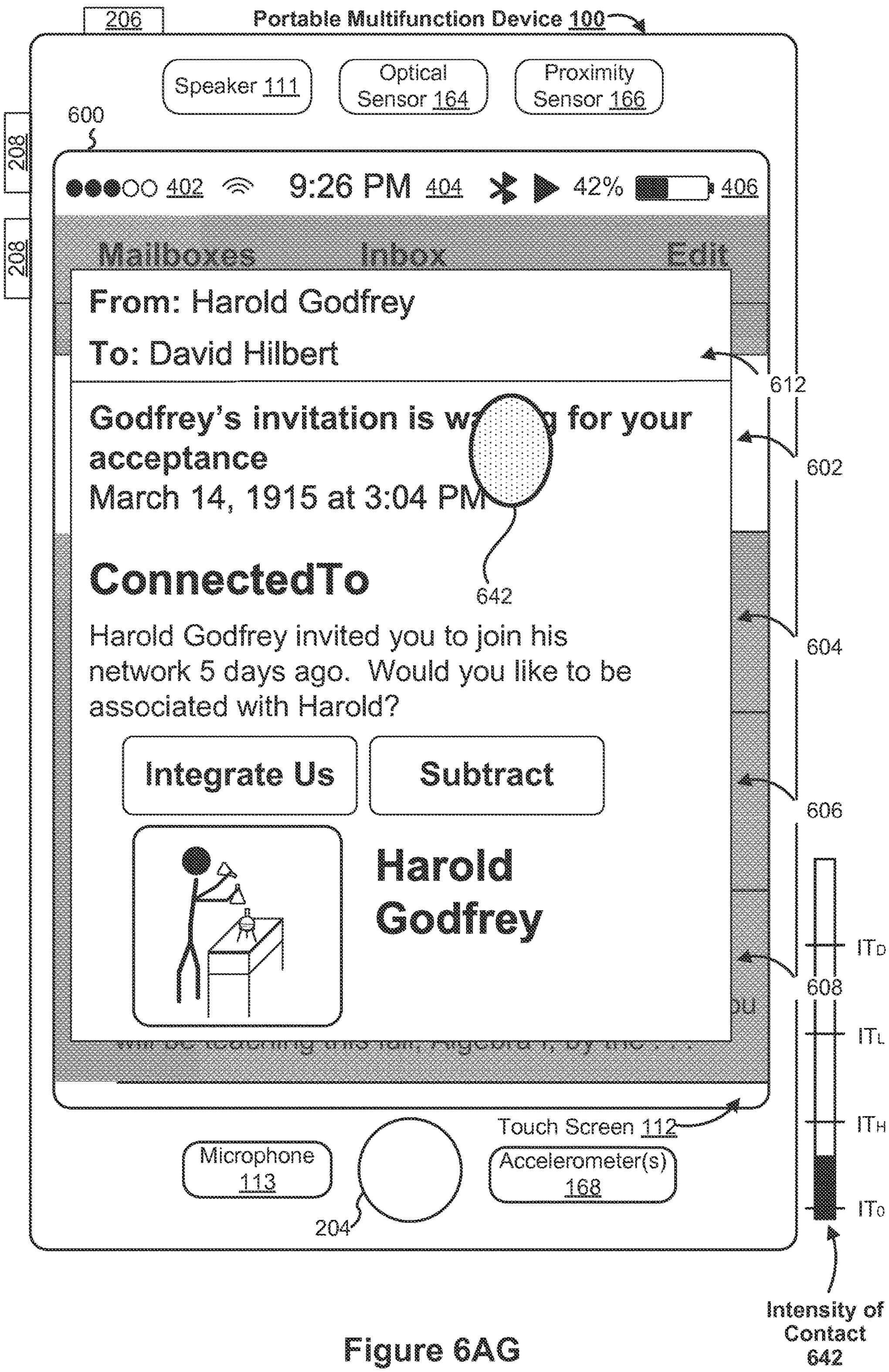
Figure 6A:
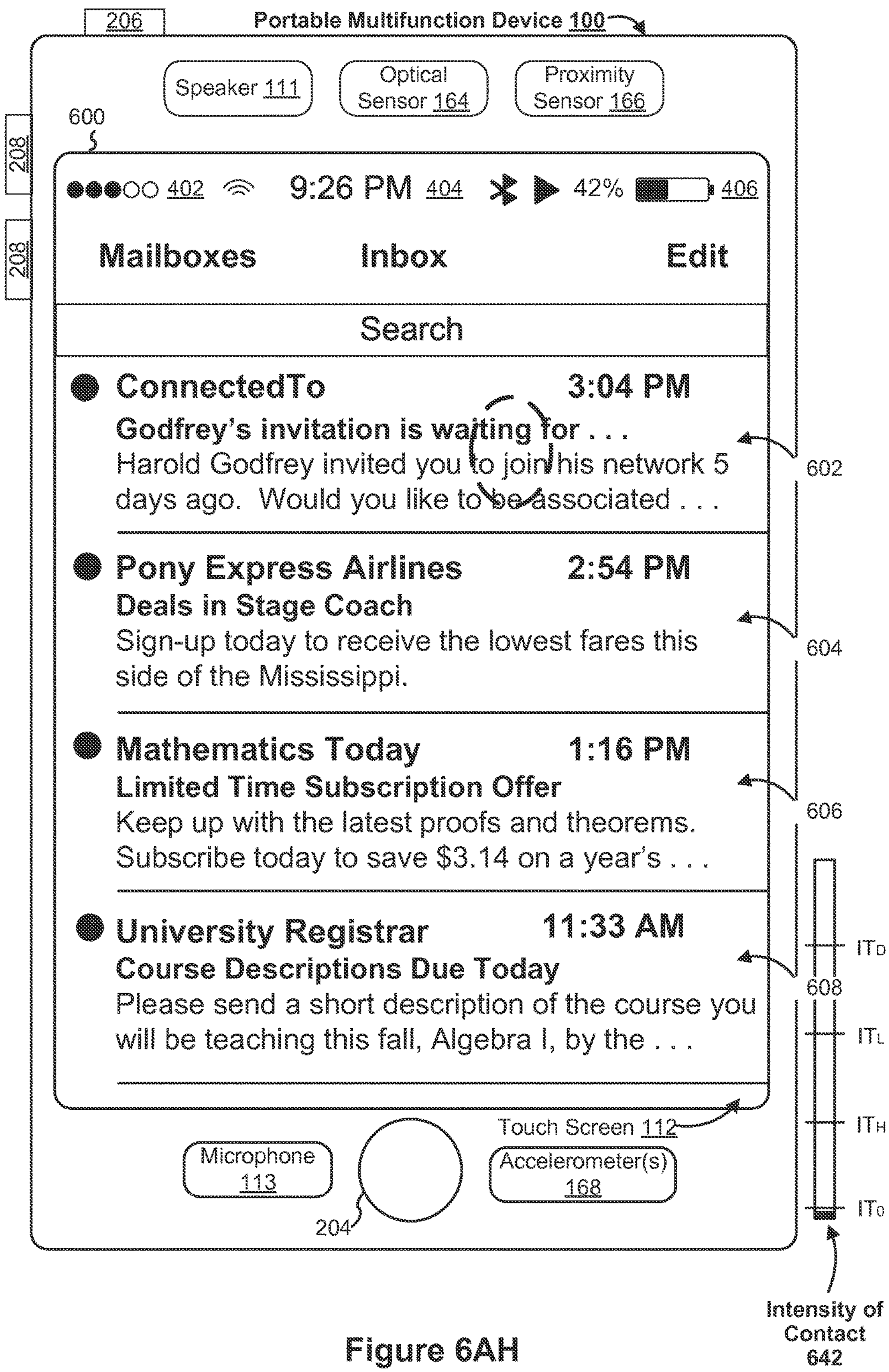
Figure 6A:
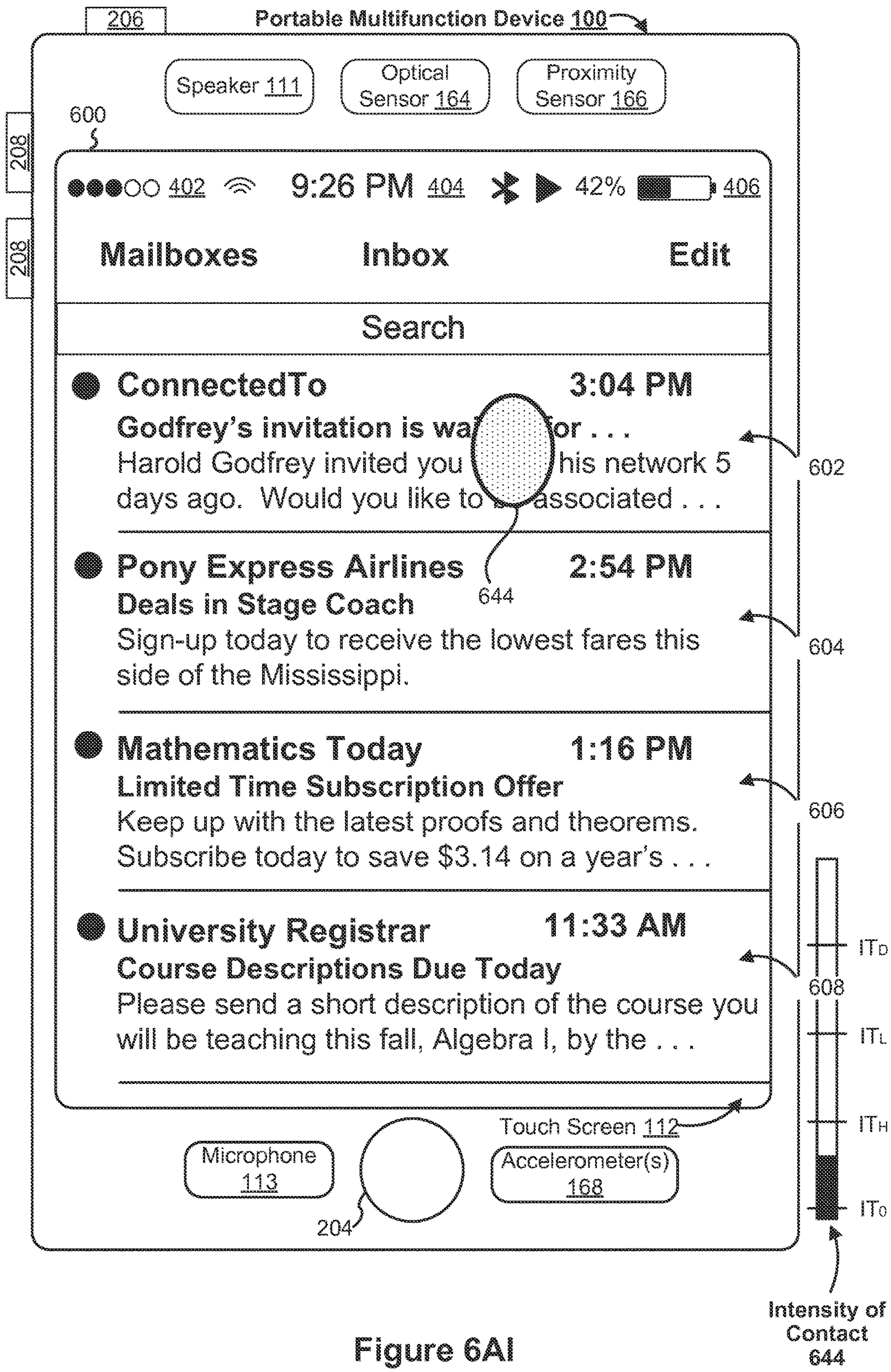
Figure 6A:
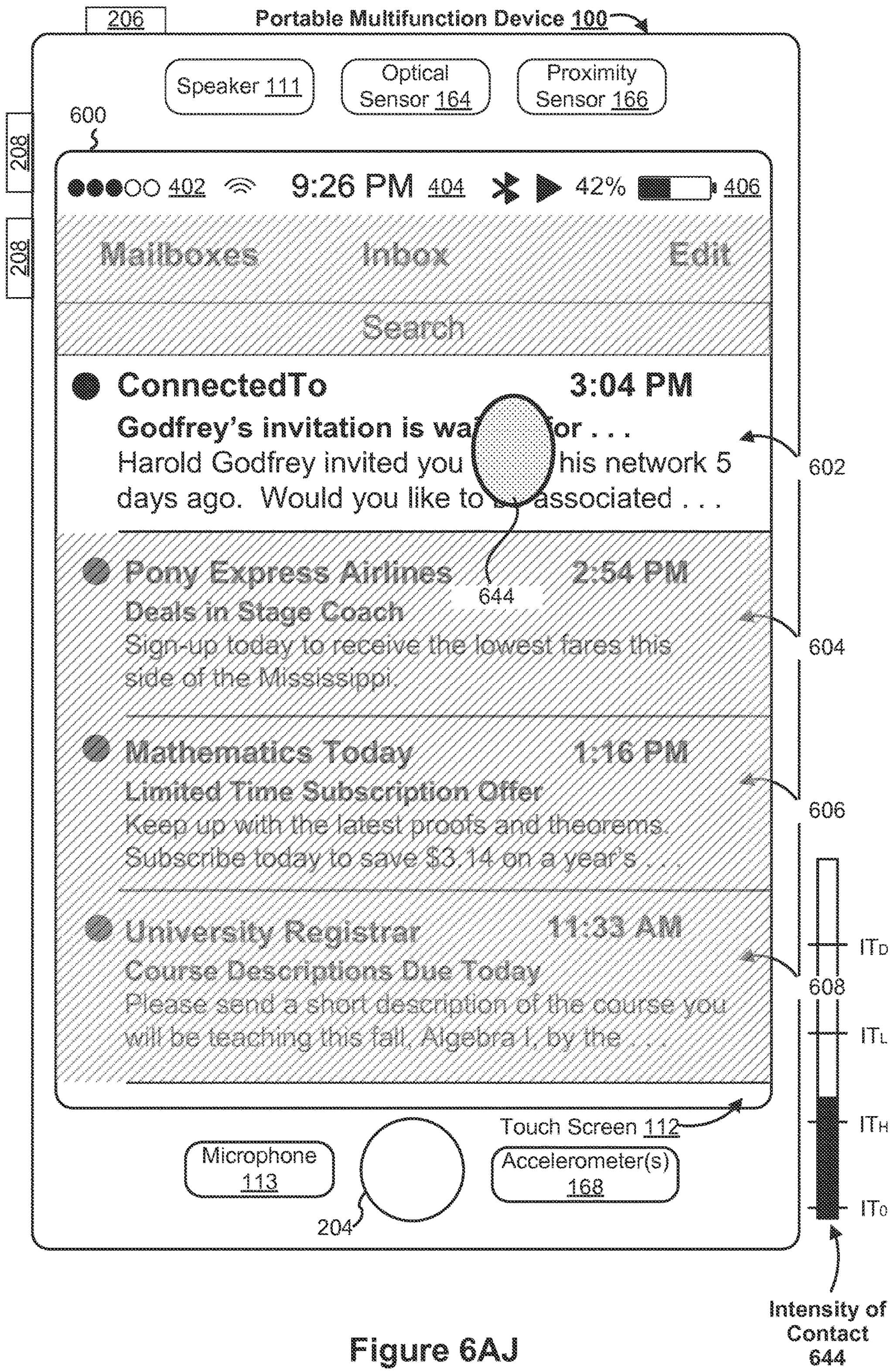
Figure 6A:
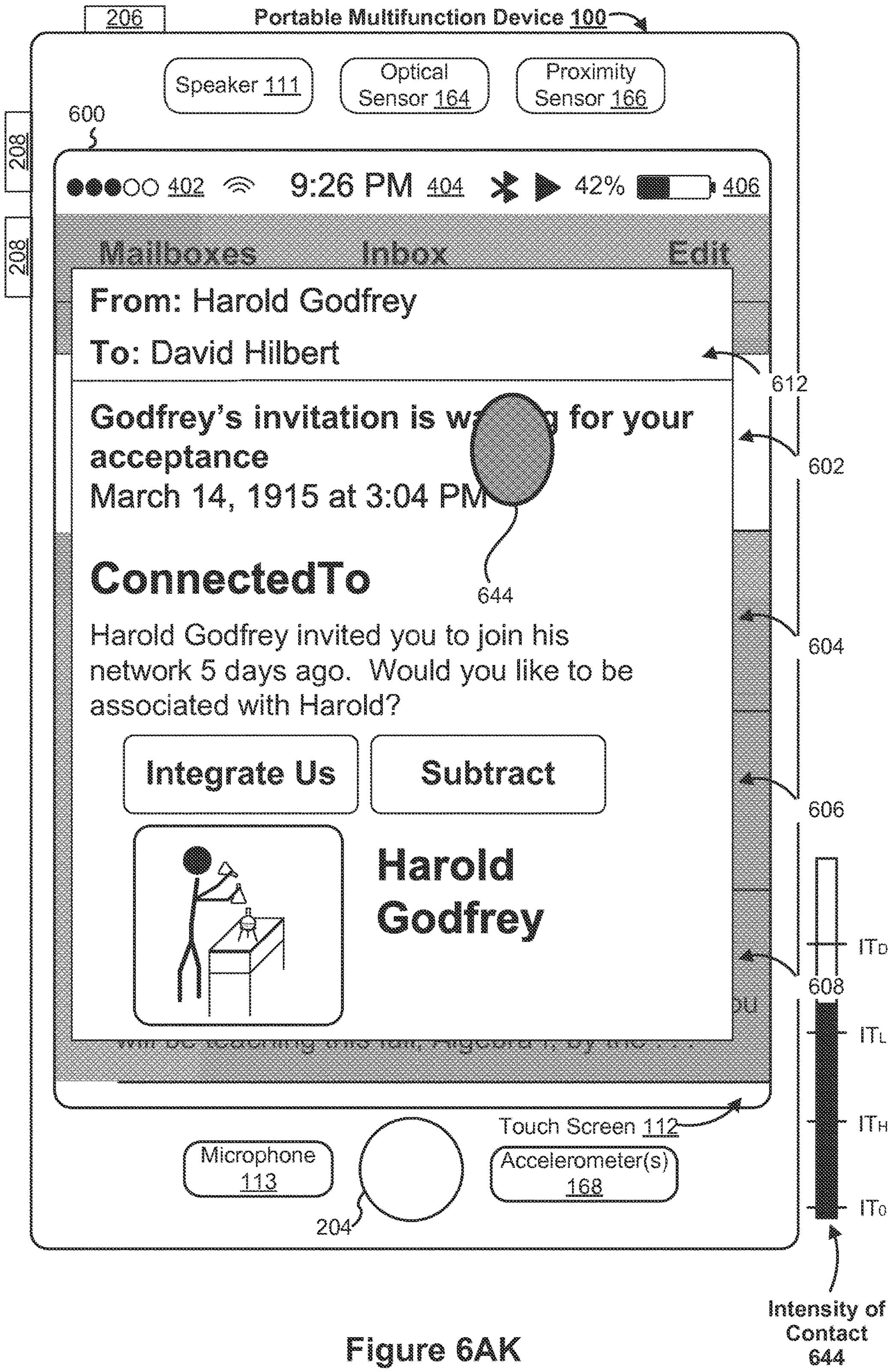
Figure 6A:
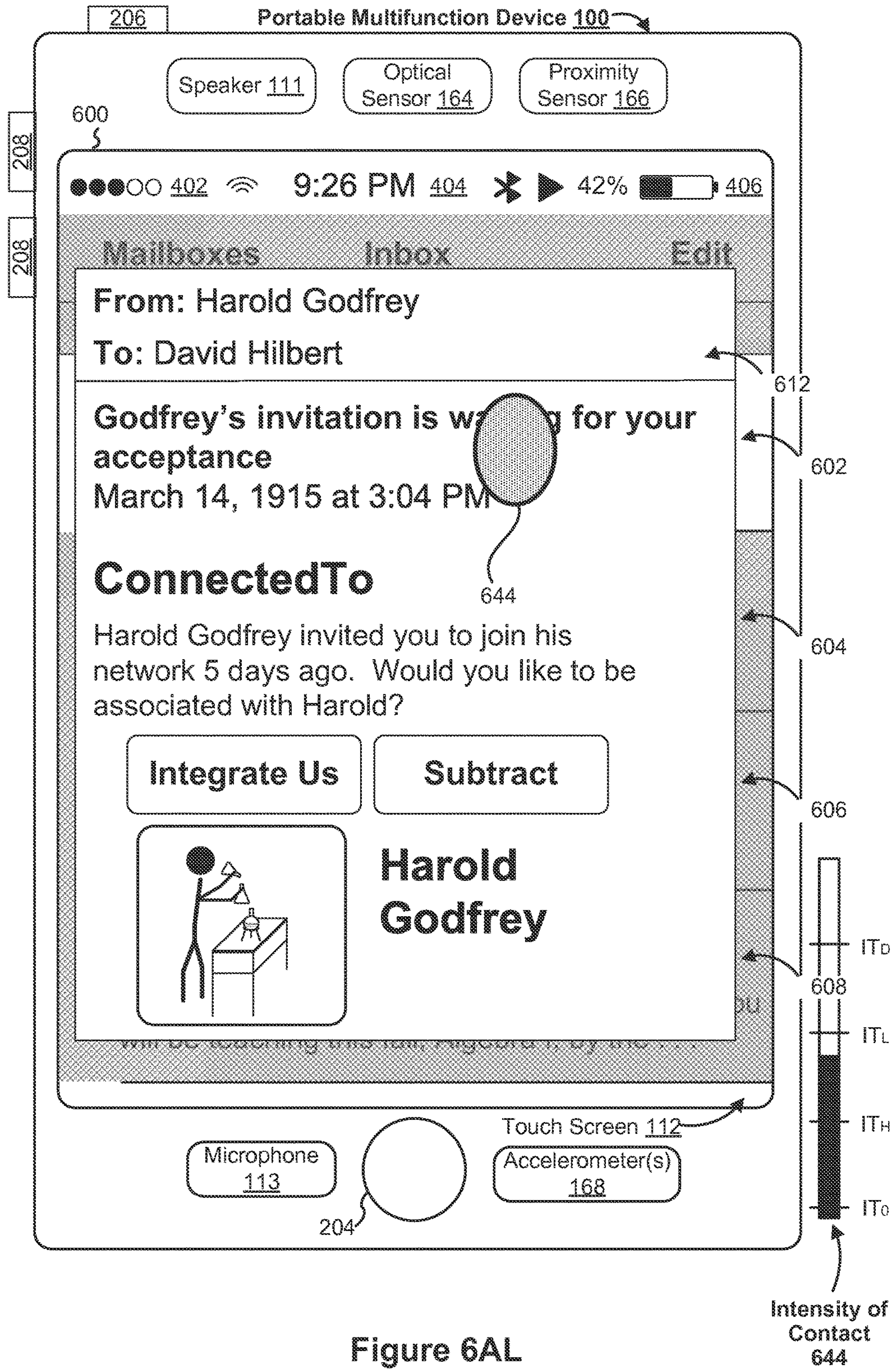
Figure 6A:
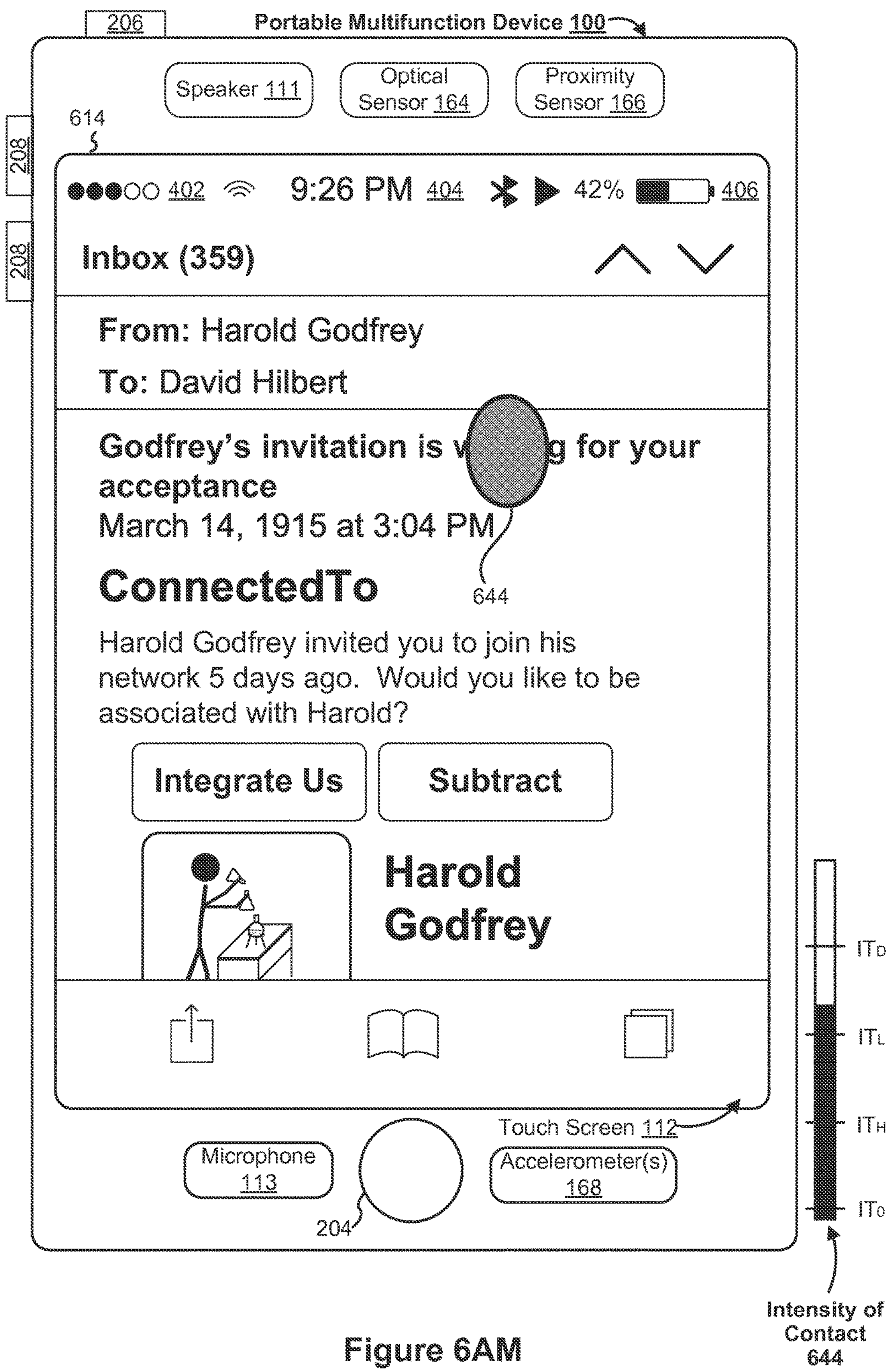
Figure 6A:
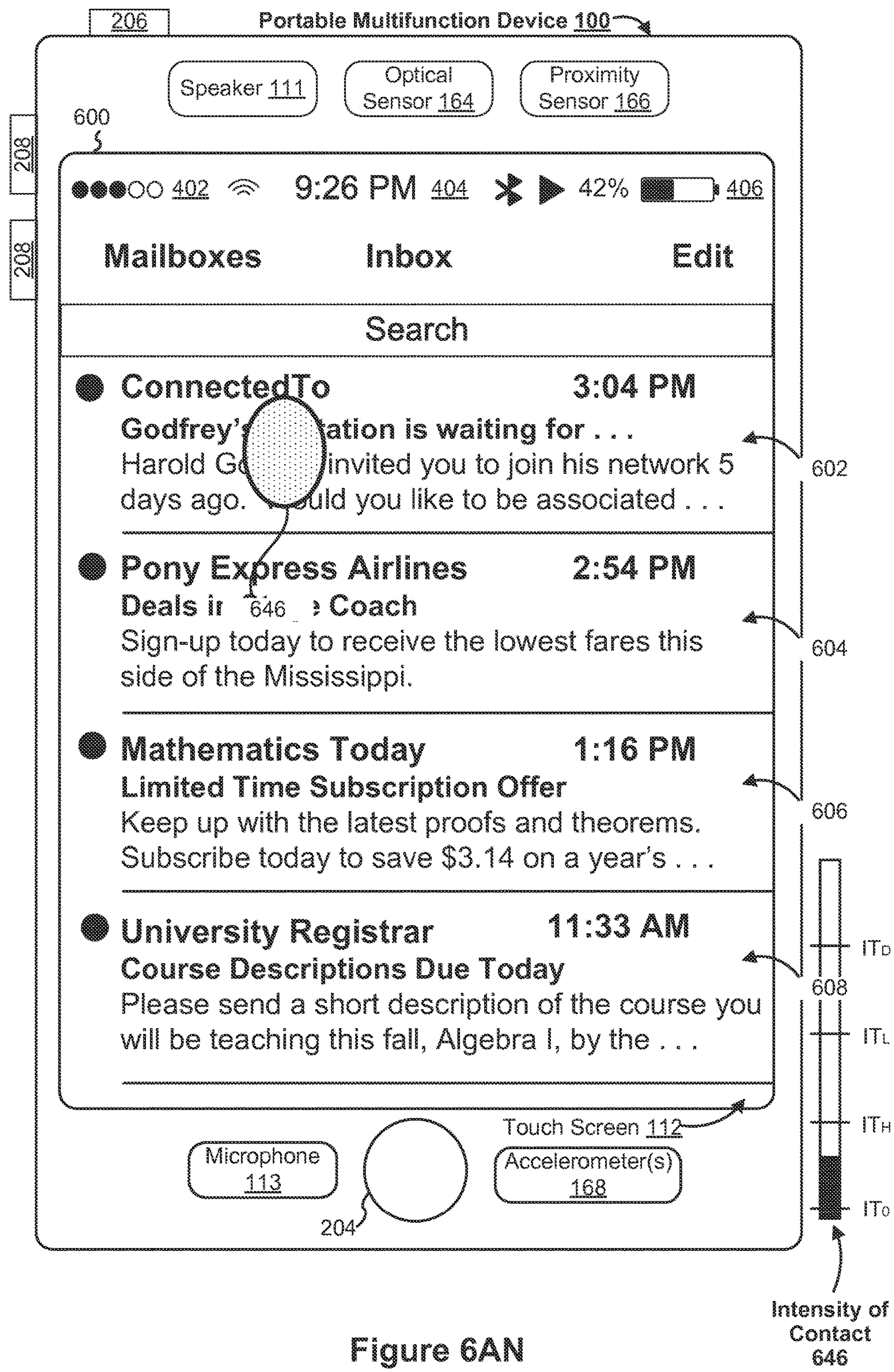
Figure 6A:
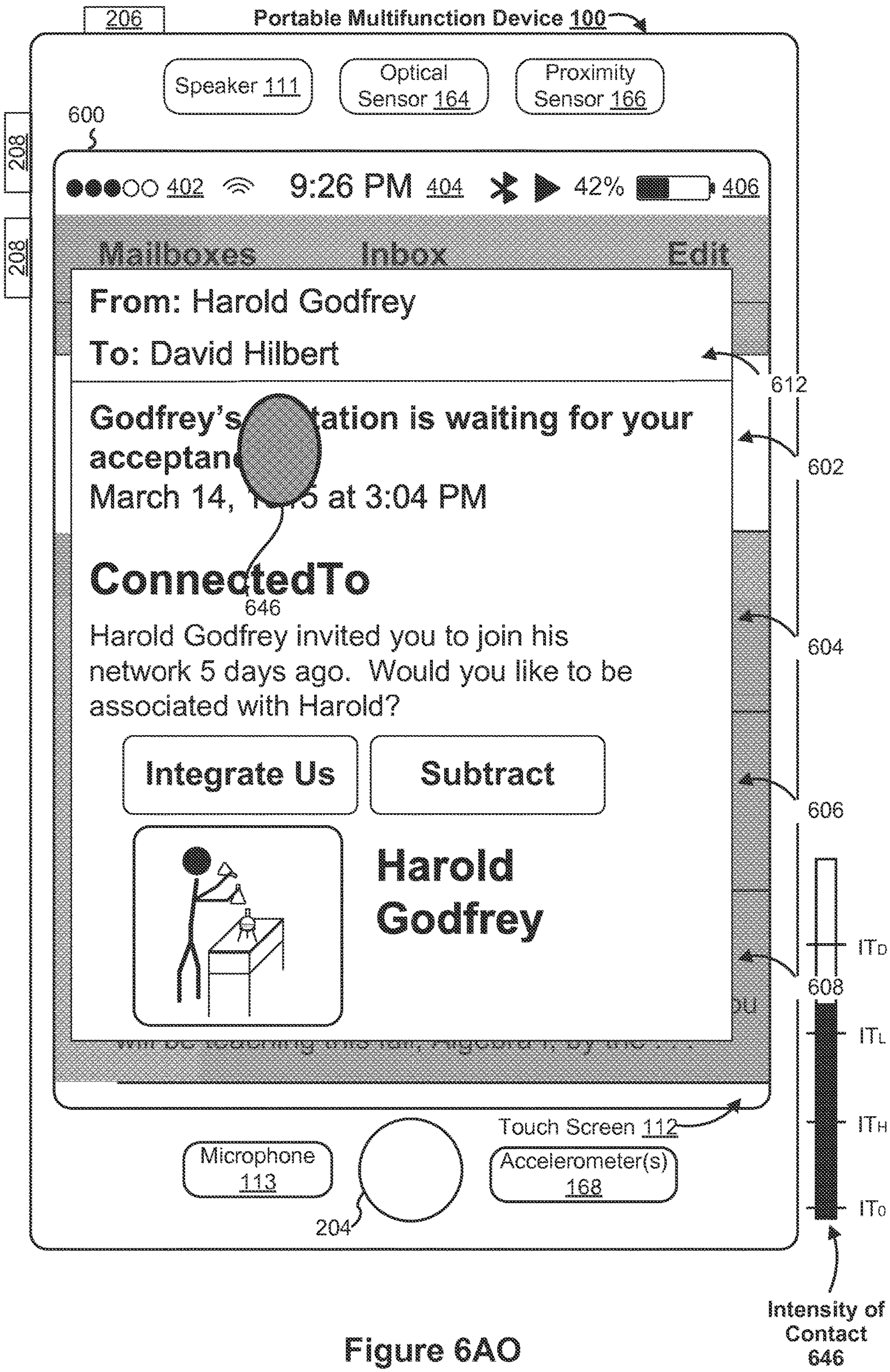
Figure 6A:
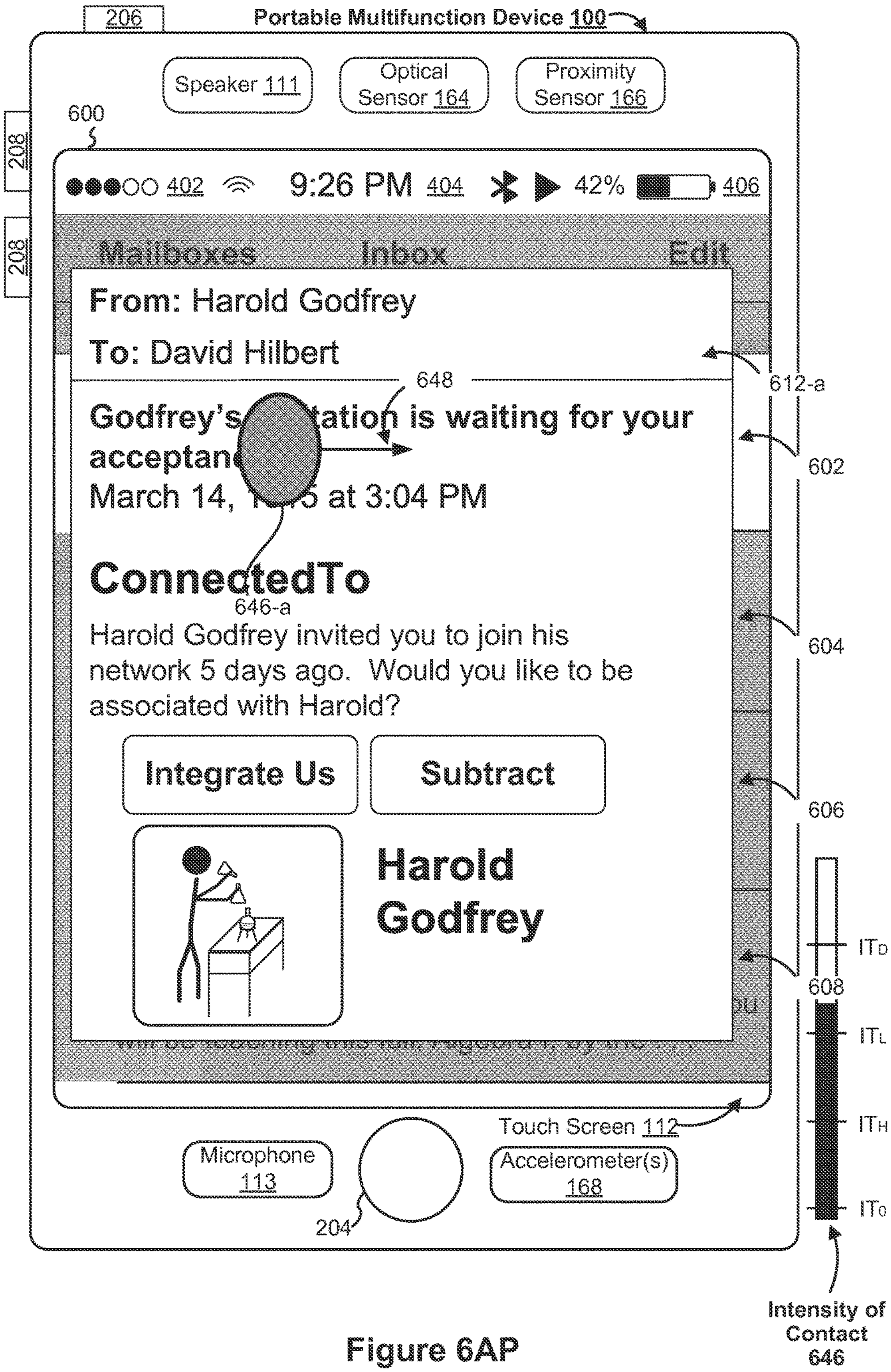
Figure 6A:
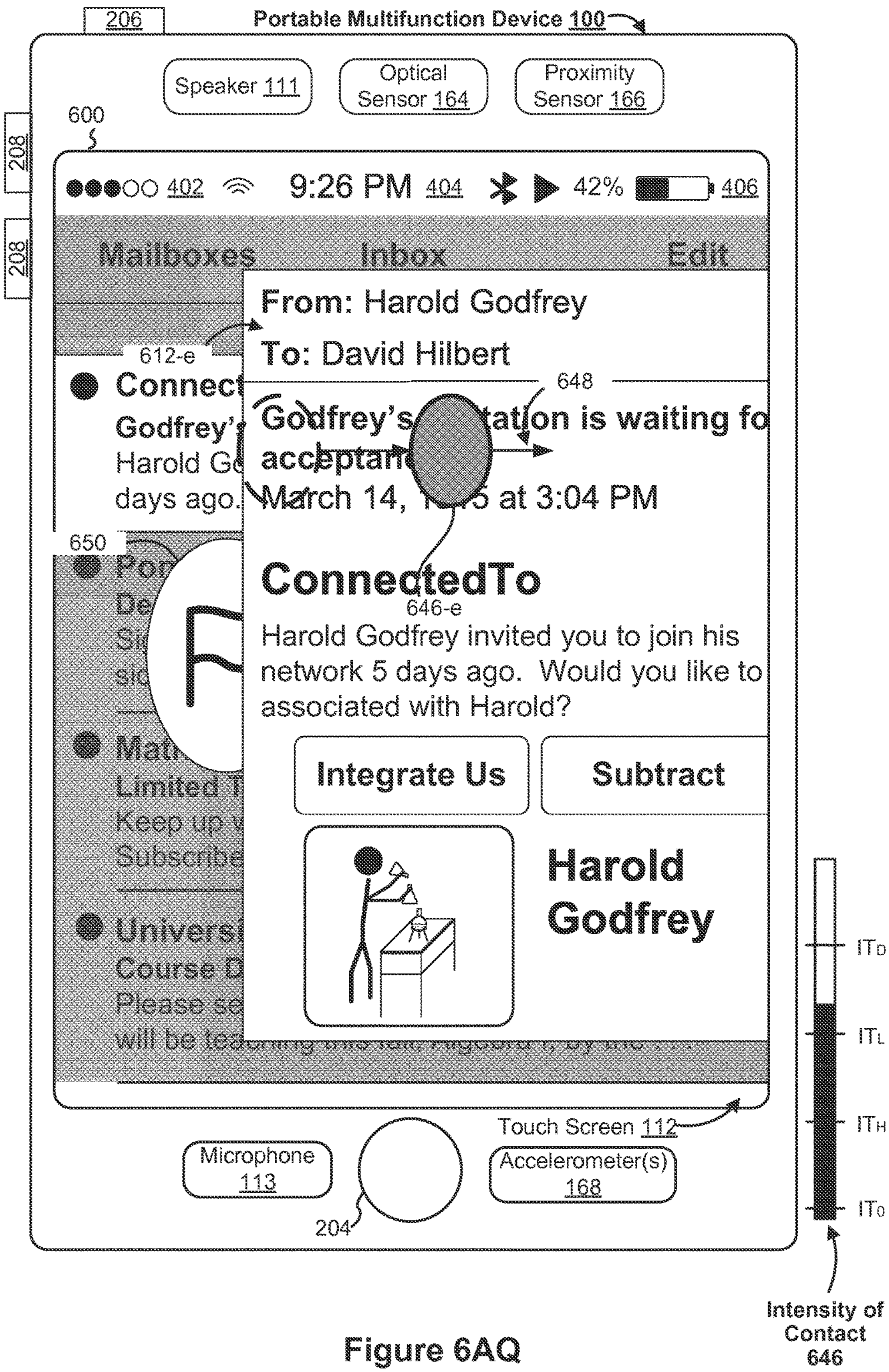
Figure 6A:
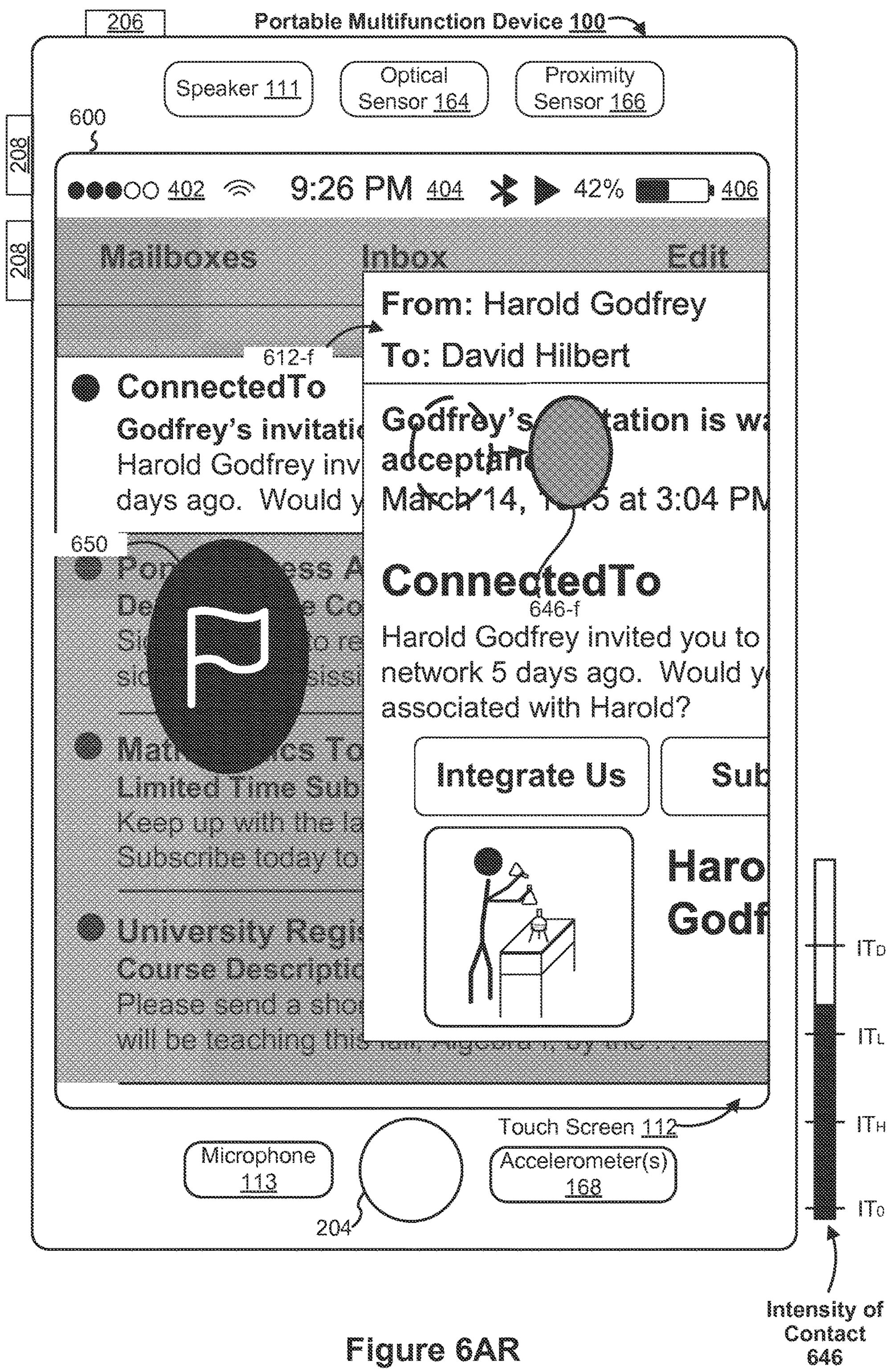
Figure 6A:
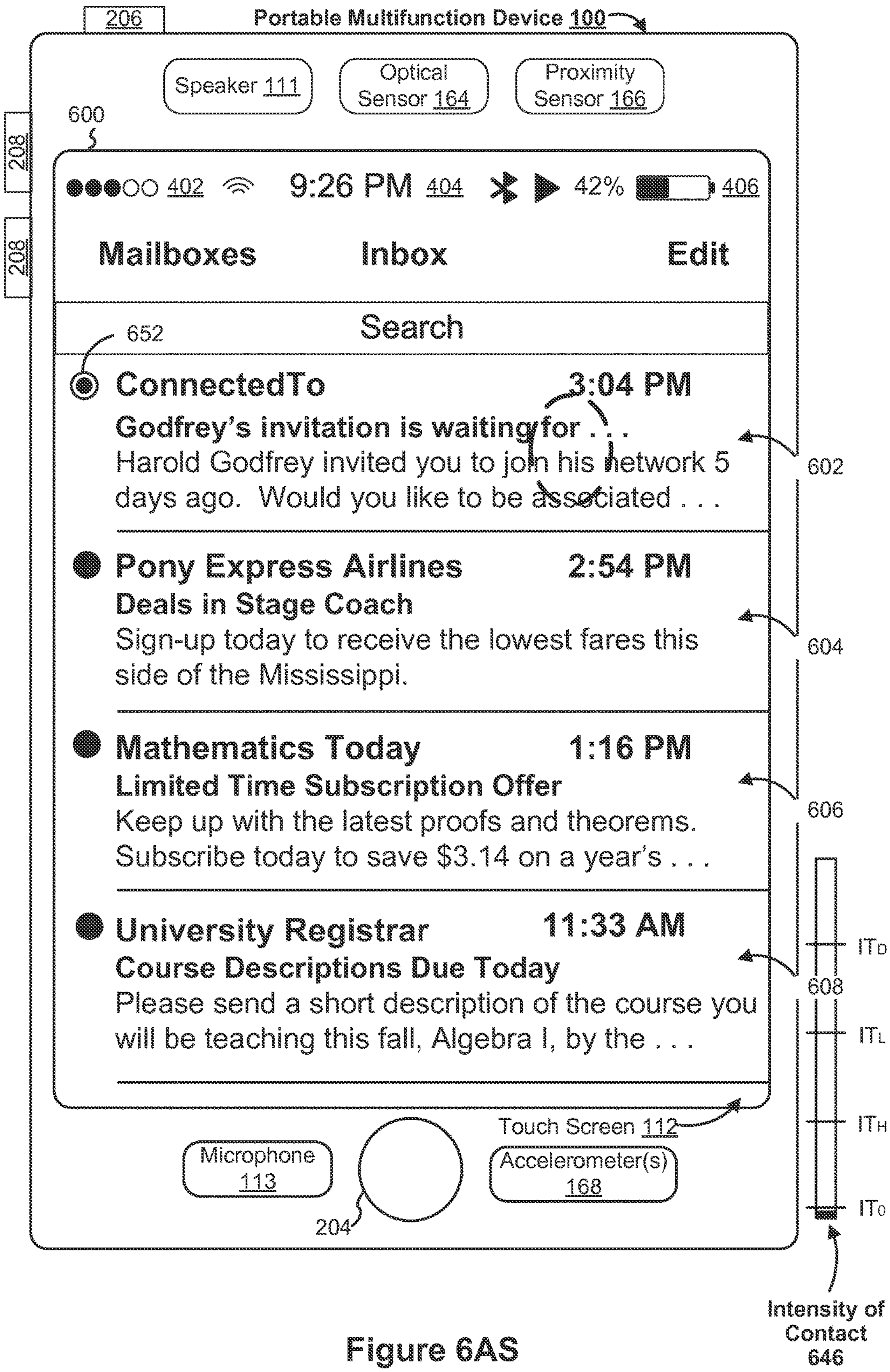

FIGS. 6X-6AC illustrate an embodiment where the user begins to delete an email while in preview mode, but stops short of reaching the positional threshold required to activate the deletion action. In FIG. 6X, the device 100 detects contact 638 on partial view of email message 602, displayed in email inbox user interface 600, with an intensity below the intensity threshold required to invoke the preview of the email (e.g., $IT_L$). In FIG. 6Y, the device displays preview area 612 in response to detecting an increase in the intensity of contact 638 above the preview-area invoking threshold (e.g., $IT_L$). In FIG. 6Z, the user begins moving contact 638 (via movement 640) to the left on touch screen 112. In response, preview area 612 moves with the contact, partially revealing action icon 634 from under the preview area in FIG. 6AA. The user attempts to navigate to the full email by increasing the intensity of contact 638 above the navigation threshold (e.g., $IT_D$) in FIG. 6AB. However, because the user has partially revealed an associated action (e.g., action icon 634), the device locks out the navigation command. The device then restores display of email inbox user interface 600 to the state prior to detection of contact 638 upon liftoff, in FIG. 6AC, because the user did not swipe preview area 612 far enough to the left (e.g., as indicated by action icon 634, which does not switch color in FIG. 6AB).

FIGS. 6AD-6AH illustrate an embodiment where the user previews an email and begins to navigate to the full email, but stops short of reaching the required intensity threshold. In FIG. 6AD, the device 100 detects contact 642 on partial view of email message 602, displayed in email inbox user interface 600, with an intensity below the intensity threshold required to invoke the preview of the email (e.g., $IT_L$). In FIG. 6AE, the device displays preview area 612 in response to detecting an increase in the intensity of contact 642 above the preview-area invoking threshold (e.g., $IT_L$). As the user continues to increase the intensity of contact 642, the device increases the size of preview area 612 in FIG. 6AF, indicating to the user that they are approaching the intensity required to navigate to the full email. However, FIG. 6AG illustrates that the user reduces the intensity of contact 642 before reaching the intensity threshold (e.g., $IT_D$) required to navigate to the full email. In response, the device dynamically reverses the size of preview area 612. In FIG. 6AH, the user lifts-off contact 642. Because the intensity of contact 642 never reached the intensity threshold required to navigate to the full version of the email (e.g., $IT_D$), the device returns the display of user interface 600 to the same state as before contact 642 was detected.

FIGS. 6AI-6AM where the user previews a full email and then navigates to the full email by crossing the preview-area display threshold twice. In FIG. 6AI, the device 100 detects contact 644 on partial view of email message 602, displayed in email inbox user interface 600, with an intensity below the intensity threshold required to invoke the preview of the email (e.g., $IT_L$). In FIG. 6AJ, the intensity of contact 644 increases above a "hint" threshold (e.g., $IT_H$), but remains below the intensity threshold needed to invoke the preview area of the email (e.g., $IT_L$). The device indicates that the user is approaching the intensity needed to call up the preview area by starting to blur and push the other partial views of emails back in virtual z-space. In FIG. 6AE, the device displays preview area 612 in response to detecting an increase in the intensity of contact 644 above the preview-area display threshold (e.g., $IT_L$). In FIG. 6AL, the user reduces the intensity of contact 644 below the preview-area display threshold, as indicated by dynamic reversal of the blurring of the partial views of email messages displayed behind preview area 612. However, because the user has not terminated contact 644, the device maintains display of preview area 612. The user then increases the intensity of contact 644 above the preview-area display threshold (e.g., $IT_L$) again between FIGS. 6AL and 6AM. In response, the device navigates to user interface 614, displaying the full email associated with the partial view 602 and preview area 612, as illustrated in FIG. 6AM.

FIGS. 6AN-6AS illustrate an embodiment where the user slides the preview area in the opposite direction to flag the email, rather than delete the email, with a single gesture. In FIG. 6AN, the device 100 detects contact 646 on partial view of email message 602, displayed in email inbox user interface 600, with an intensity below the intensity threshold required to invoke the preview of the email (e.g., $IT_L$). In FIG. 6AO, the device displays preview area 612 in response to detecting an increase in the intensity of contact 646 above the preview-area invoking threshold (e.g., $IT_L$). In FIG. 6AP, the user begins moving contact 646 (via movement 648) to the right on touch screen 112. In response, preview area 612 moves with the contact, gradually revealing action icon 650 from under the preview area in FIGS. 6AQ-6AR. The color of action icon 650 changes in FIG. 6AR, indicating that the associated action (e.g., flagging the email) is active for performance upon termination of the contact. As compared to the quick deletion action illustrated in FIGS. 6Q-6W, the user does not have to move preview area 612 over as far, in FIG. 6AR, to invoke the flagging action. As illustrated in FIG. 6AS, the device terminates display of preview area 612 and flags partial view of email message 602 via a change in the appearance of indicator icon 652 when the user lifts contact 646 off of touch screen 112 while the action associated with action icon 650 was active.

Figure 7A:
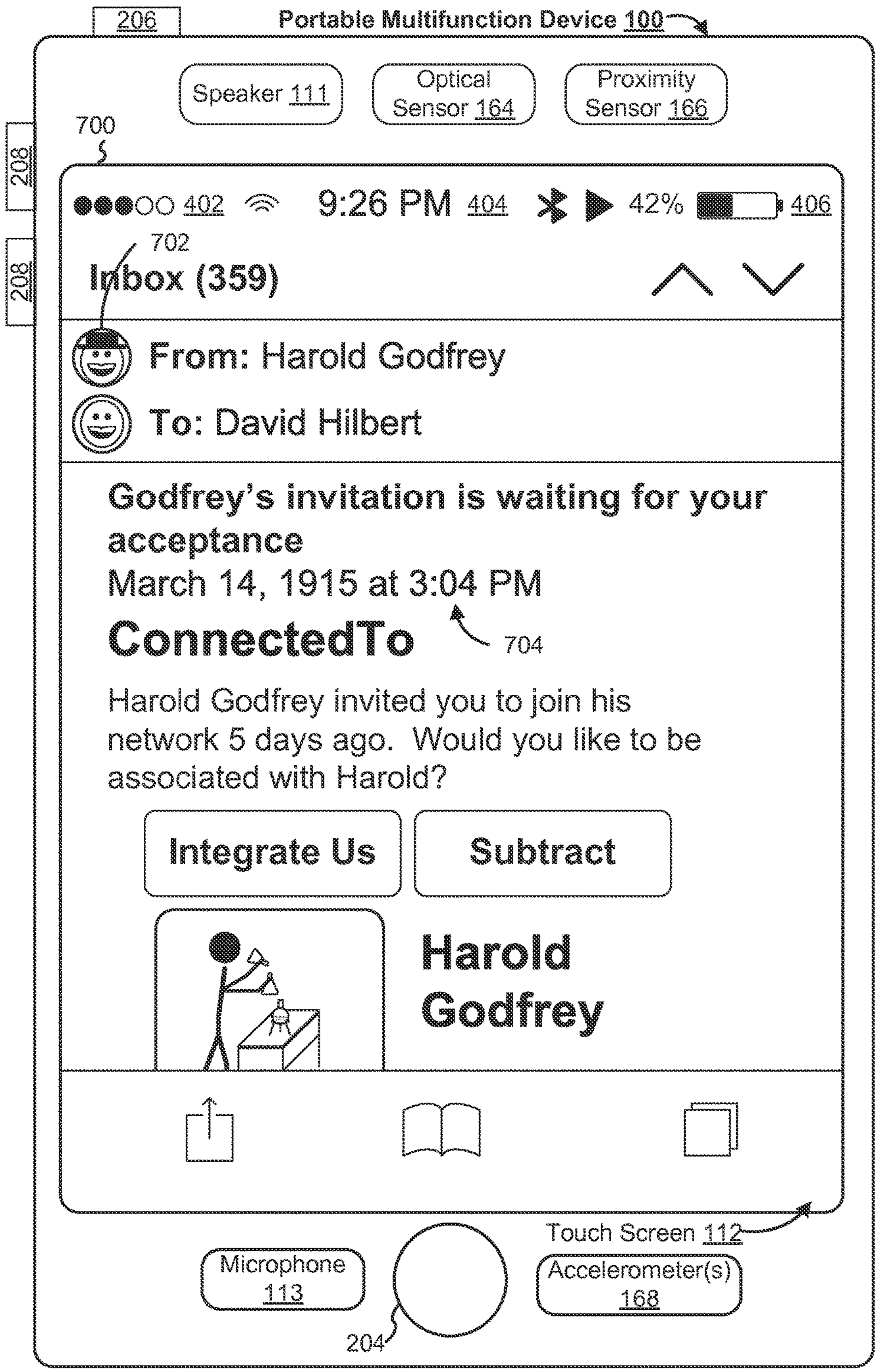
FIGS. 7A-7AQ illustrate exemplary user interfaces for navigating within and between applications in accordance with some embodiments.

FIGS. 7A-7AQ illustrate exemplary embodiments of user interfaces that allow a user to quickly invoke one of several actions associated with a second application while navigating in a first application, without having to first activate the second application. The exemplary user interfaces illustrated in FIGS. 7A-7AQ also allow a user to efficiently navigate between first and second user interfaces, in accordance with some embodiments. In some embodiments, the exemplary user interfaces provide the user with menus containing quick action items (e.g., "quick action menus") associated with other user interfaces (e.g., other applications), upon detection of a user input that is distinguishable from conventional user inputs used to switch between applications (e.g., based on the amount of force the user applies). Likewise, in some embodiments, the exemplary user interfaces provide the user with the ability to preview content of the second user interface without leaving the first user interface, upon detection of a user input that is distinguishable from conventional user inputs used to navigate between user interfaces (e.g., based on the amount of force the user applies). In some embodiments, the exemplary user interfaces provides feedback (e.g., visual, audible, and/or tactile feedback) when a user is close to invoking a quick action menu (e.g., as a user input approaches an intensity threshold). Although some of the examples which follow will be given with reference to an email messaging application, in some embodiments, the methods are implemented within any number of different applications, as described herein.

The user interfaces in these figures are used to illustrate the processes described below. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 7B:
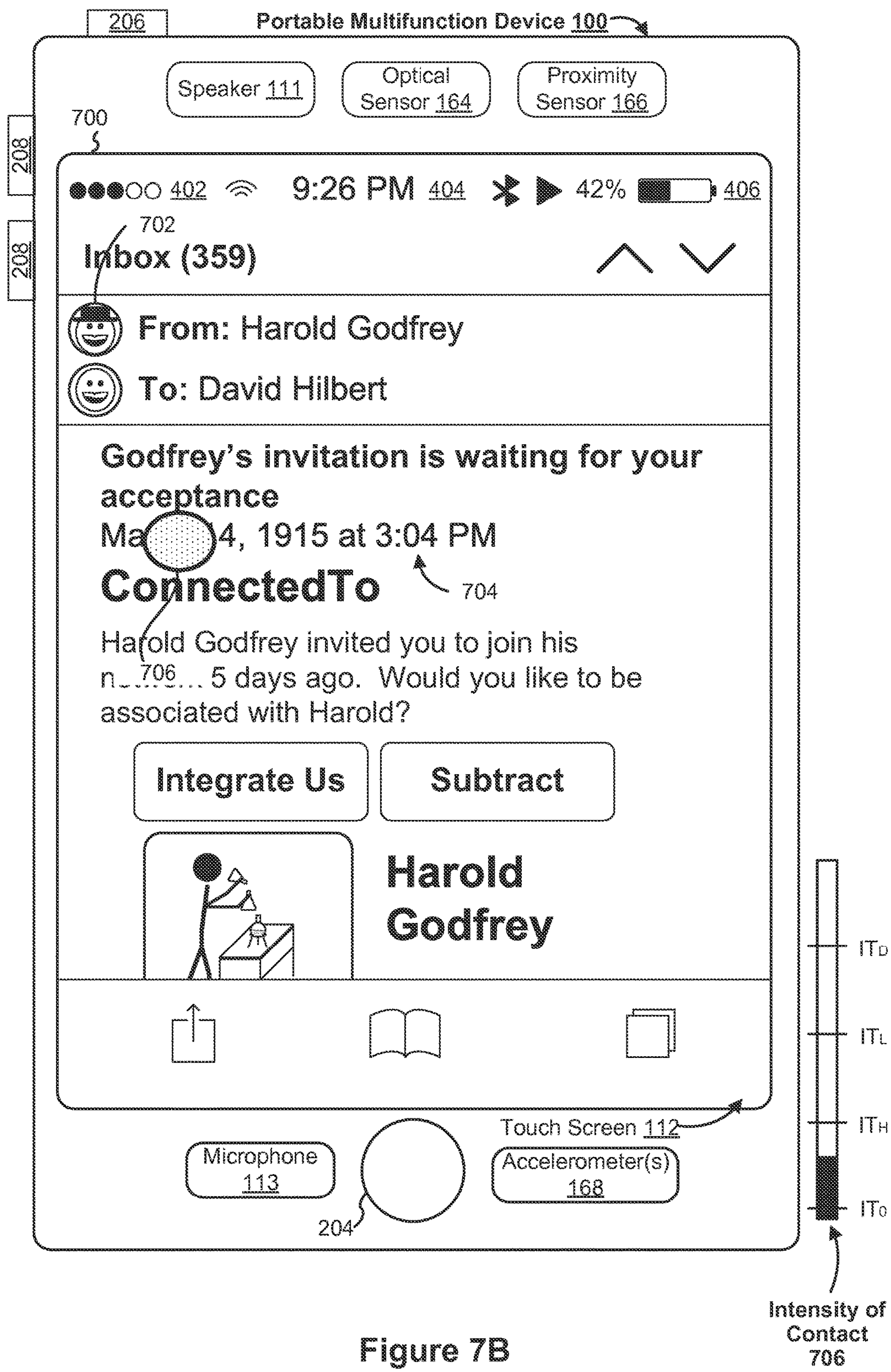
Figure 7C:
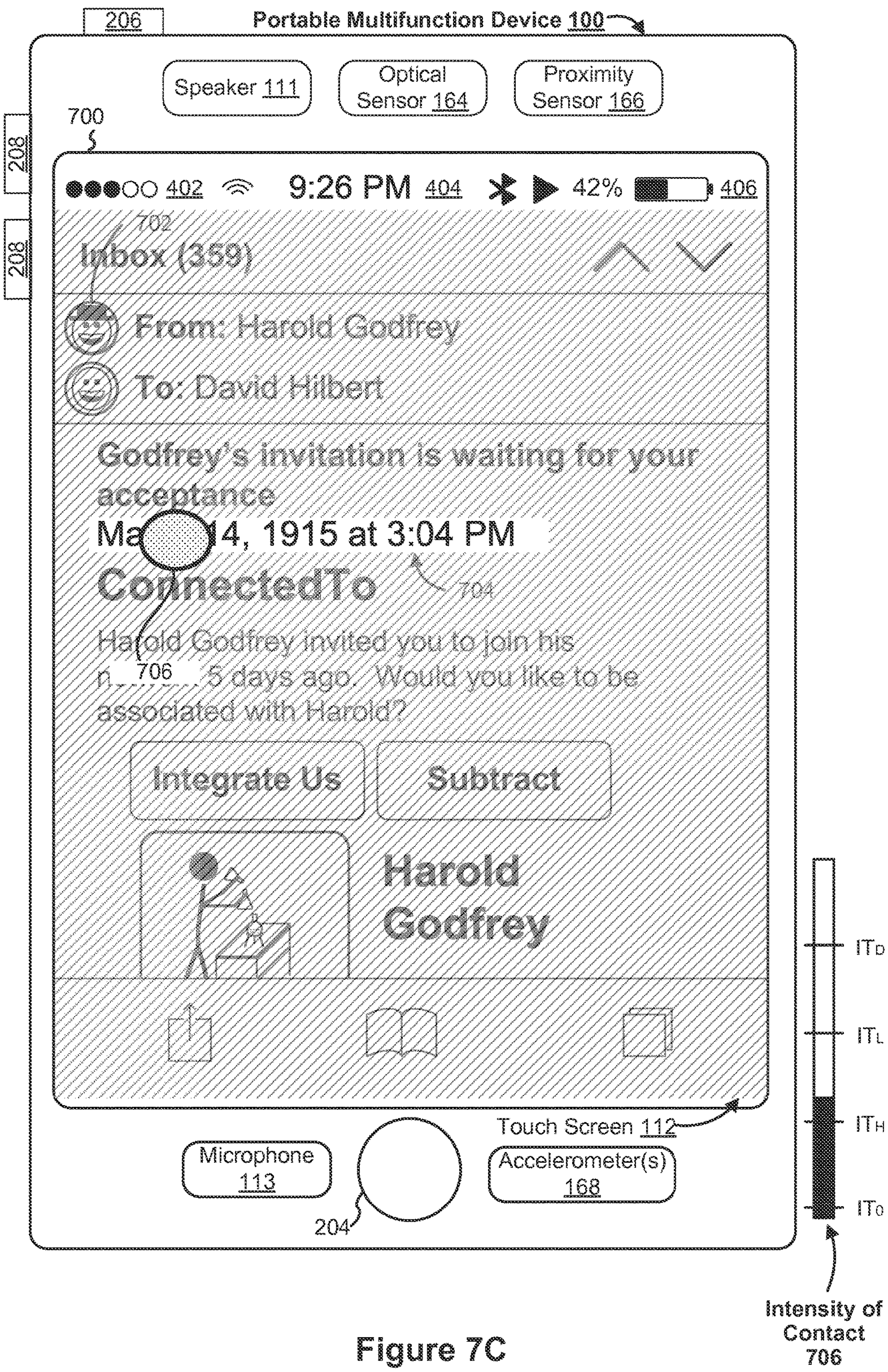
Figure 7D:
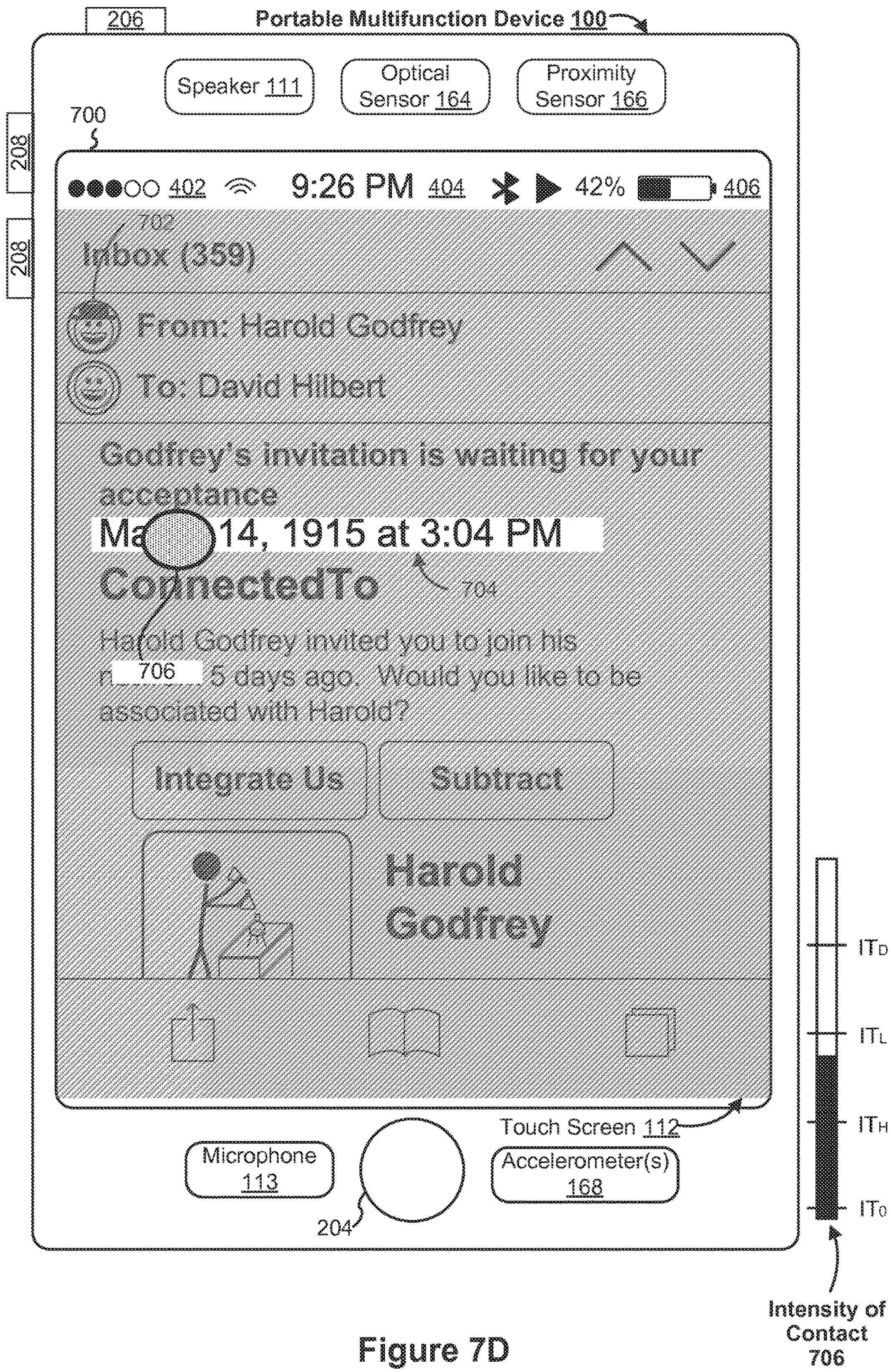
Figure 7E:
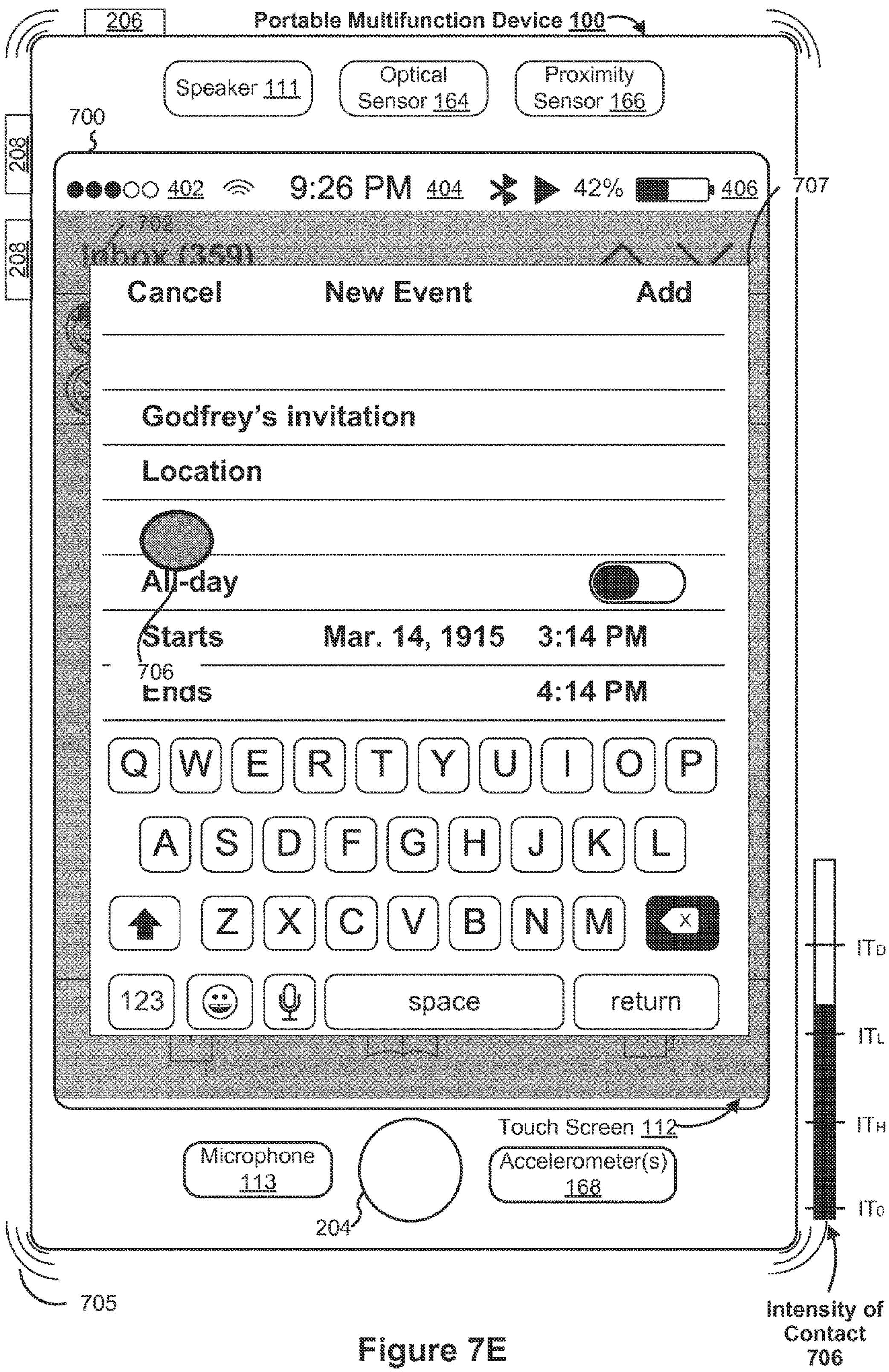
Figure 7F:
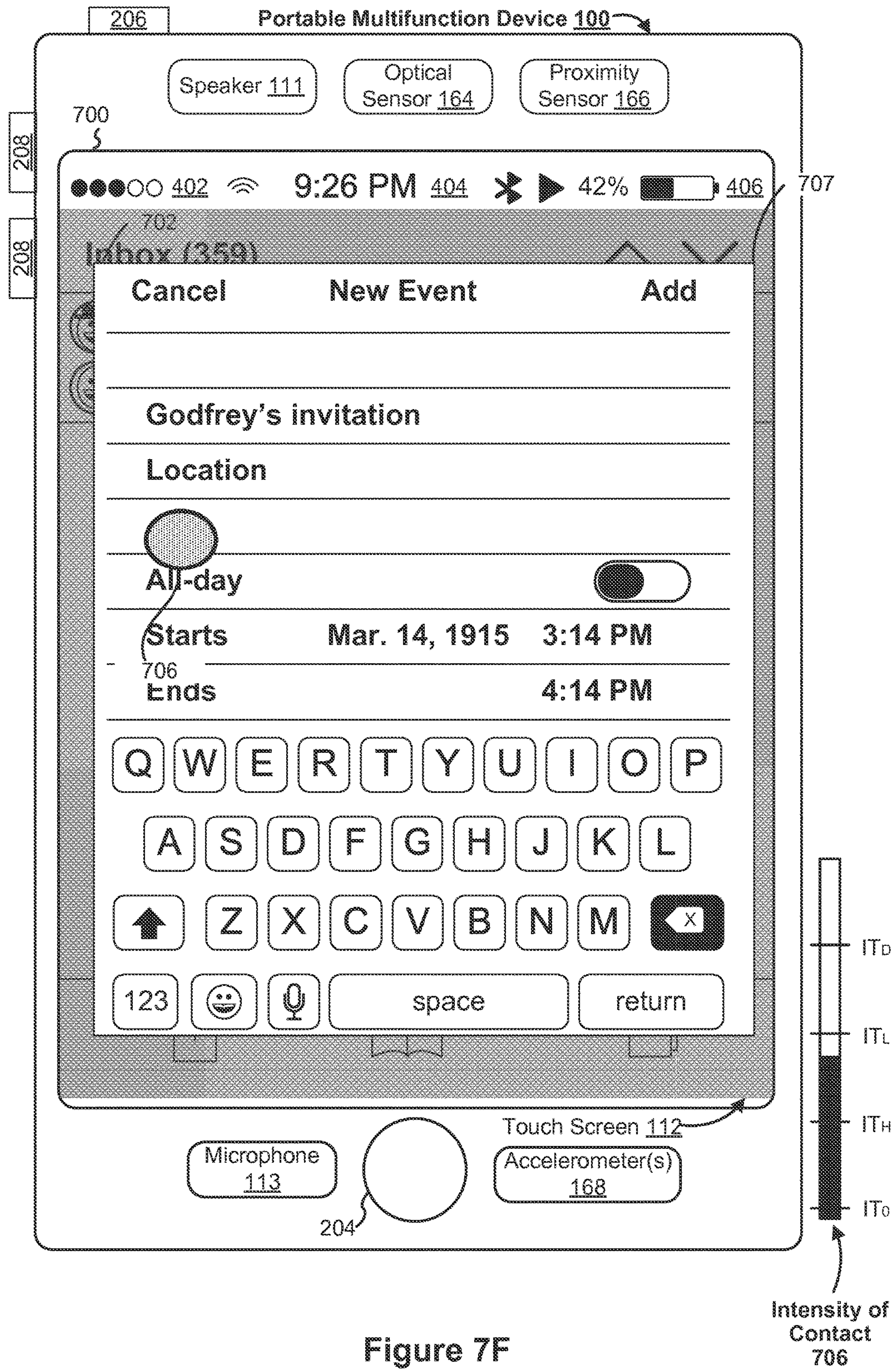
Figure 7G:
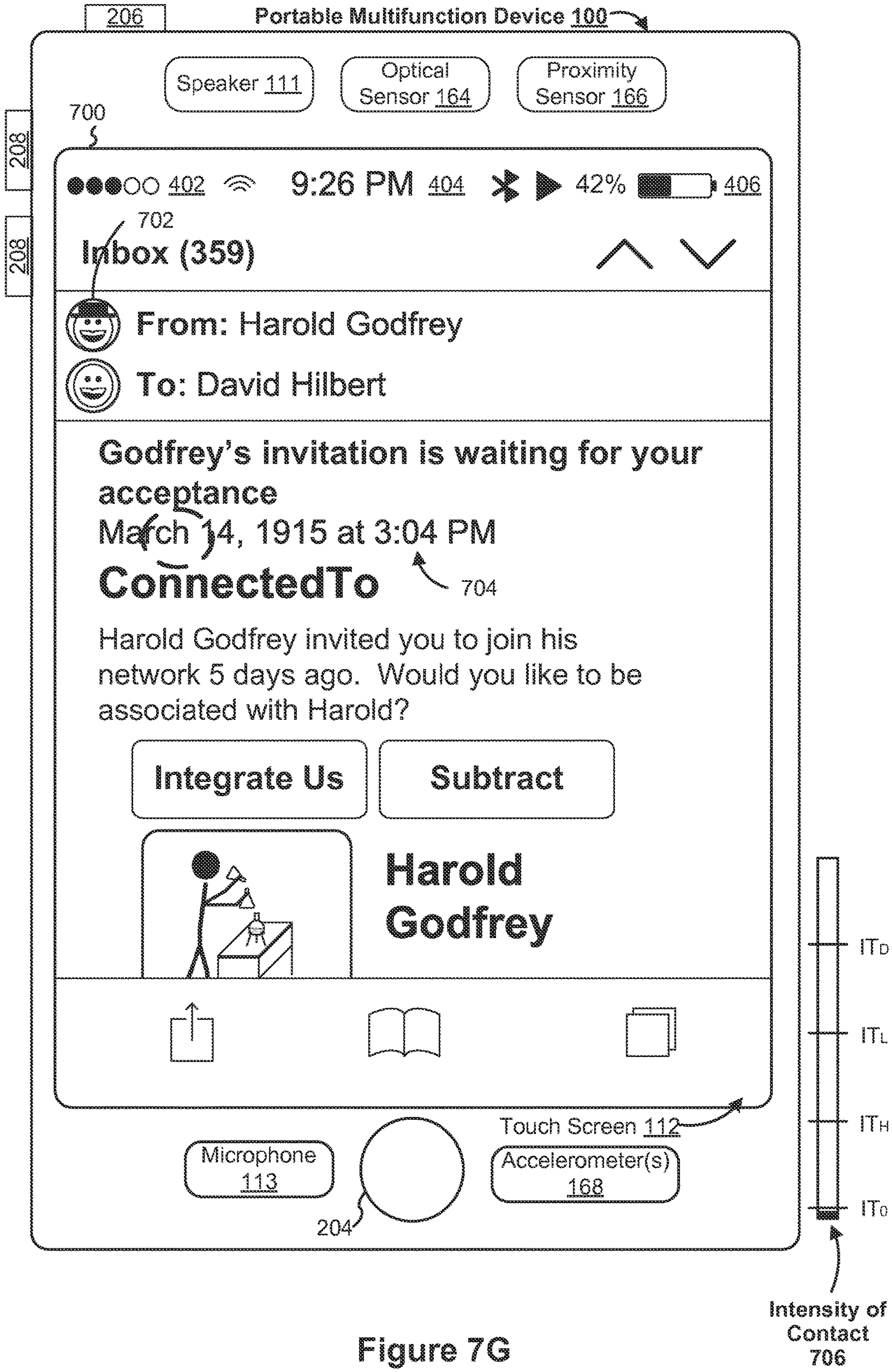
Figure 7H:
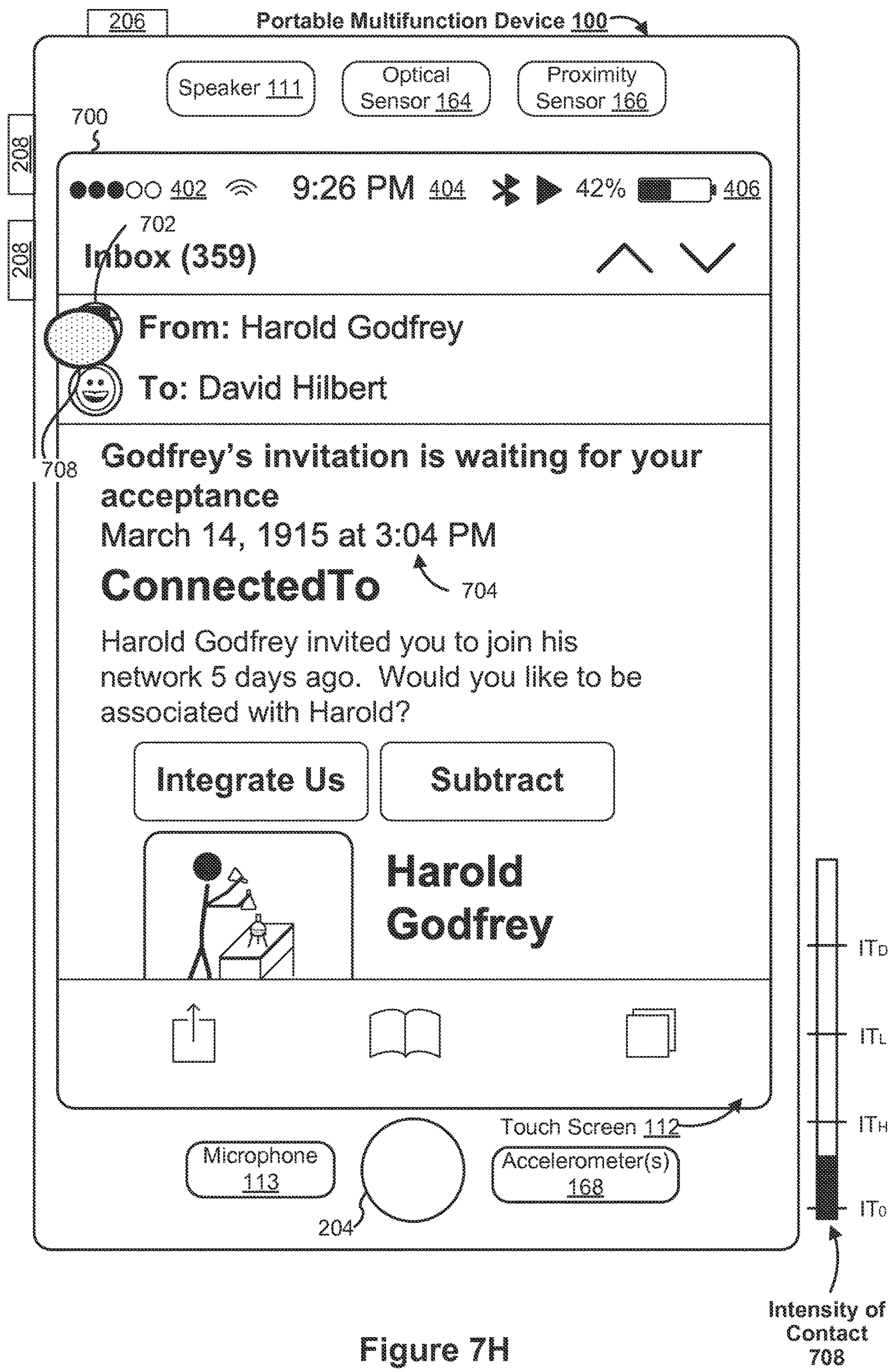
Figure 7I:
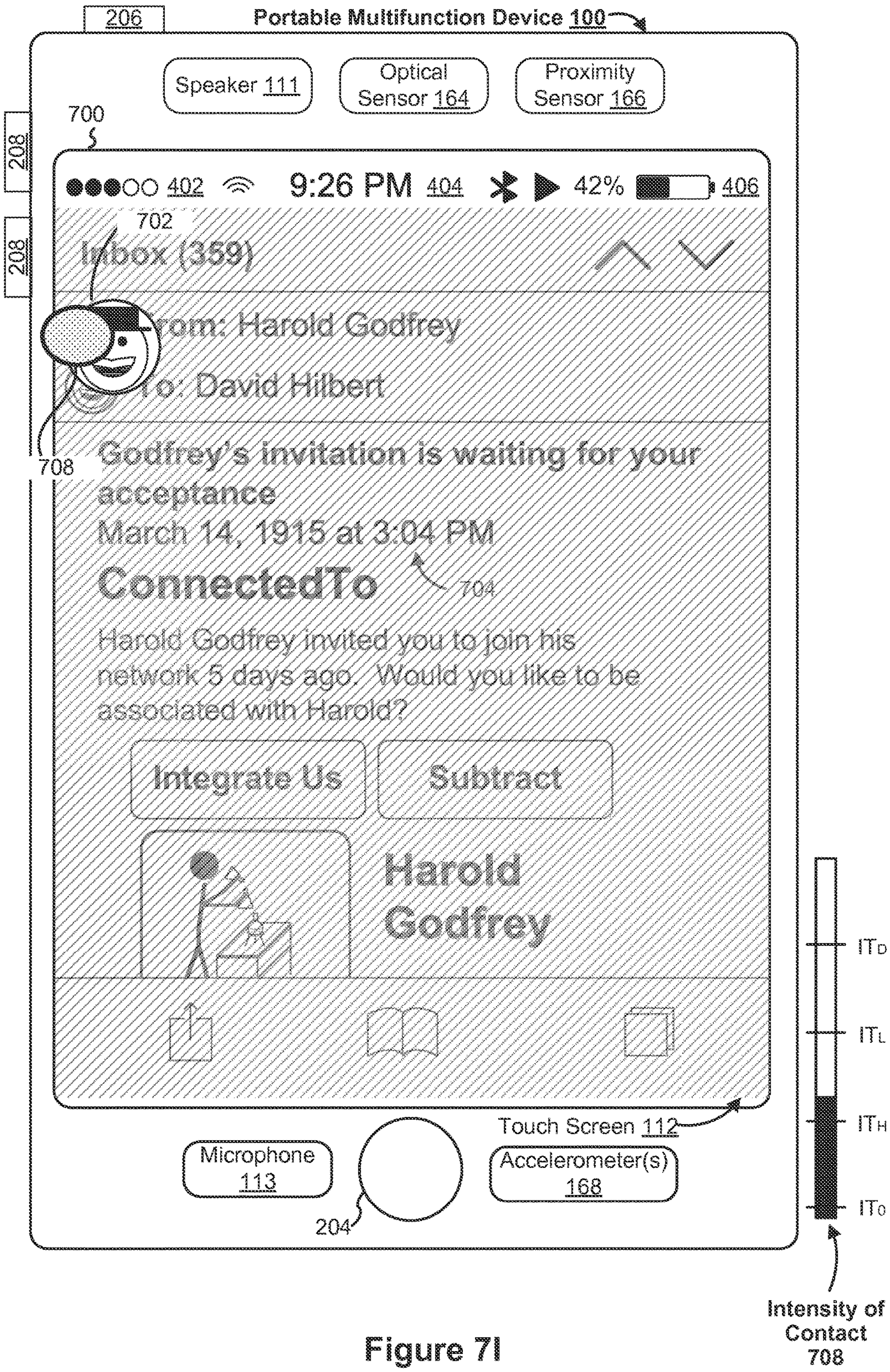
Figure 7J:
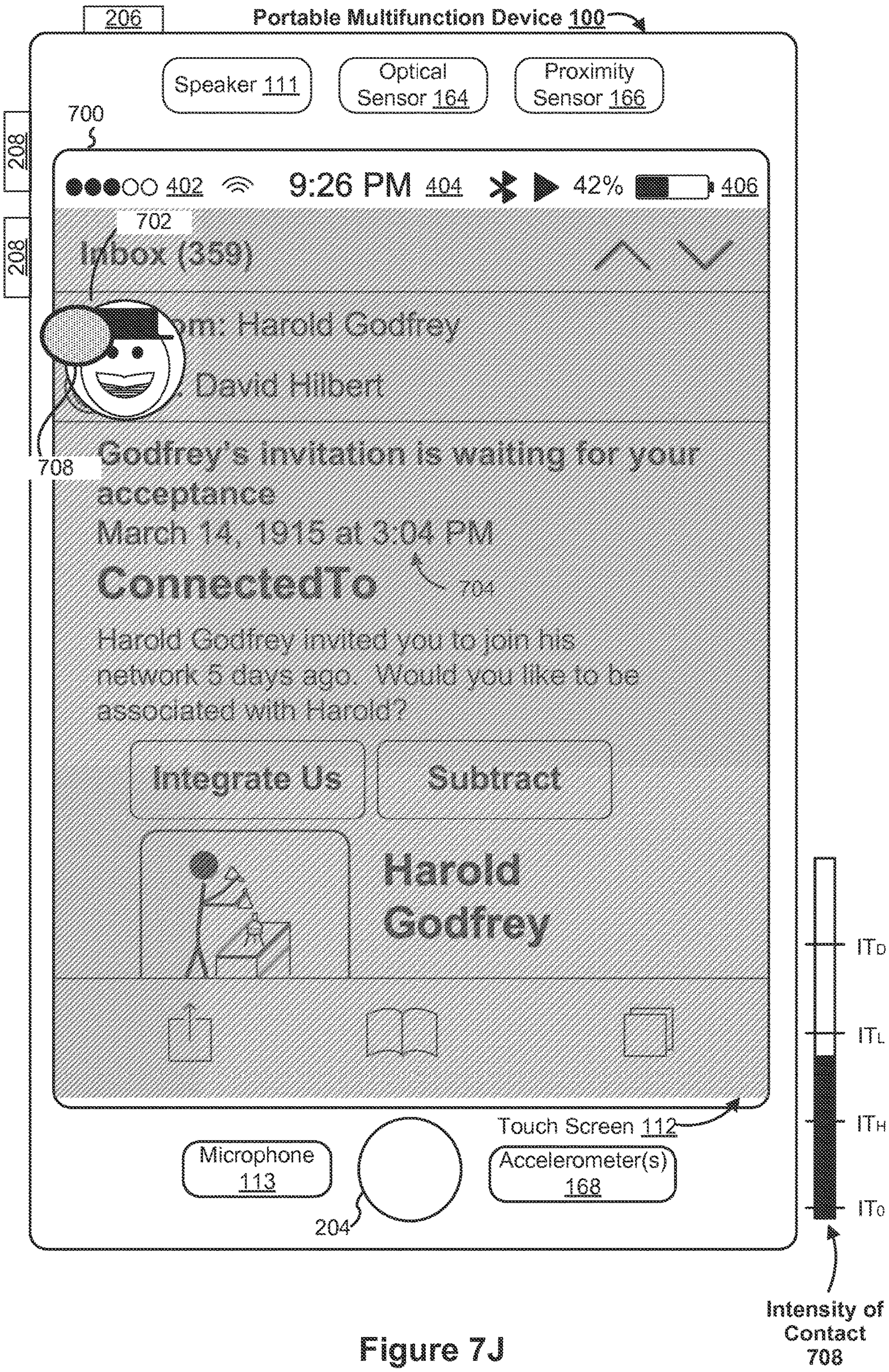
Figure 7K:
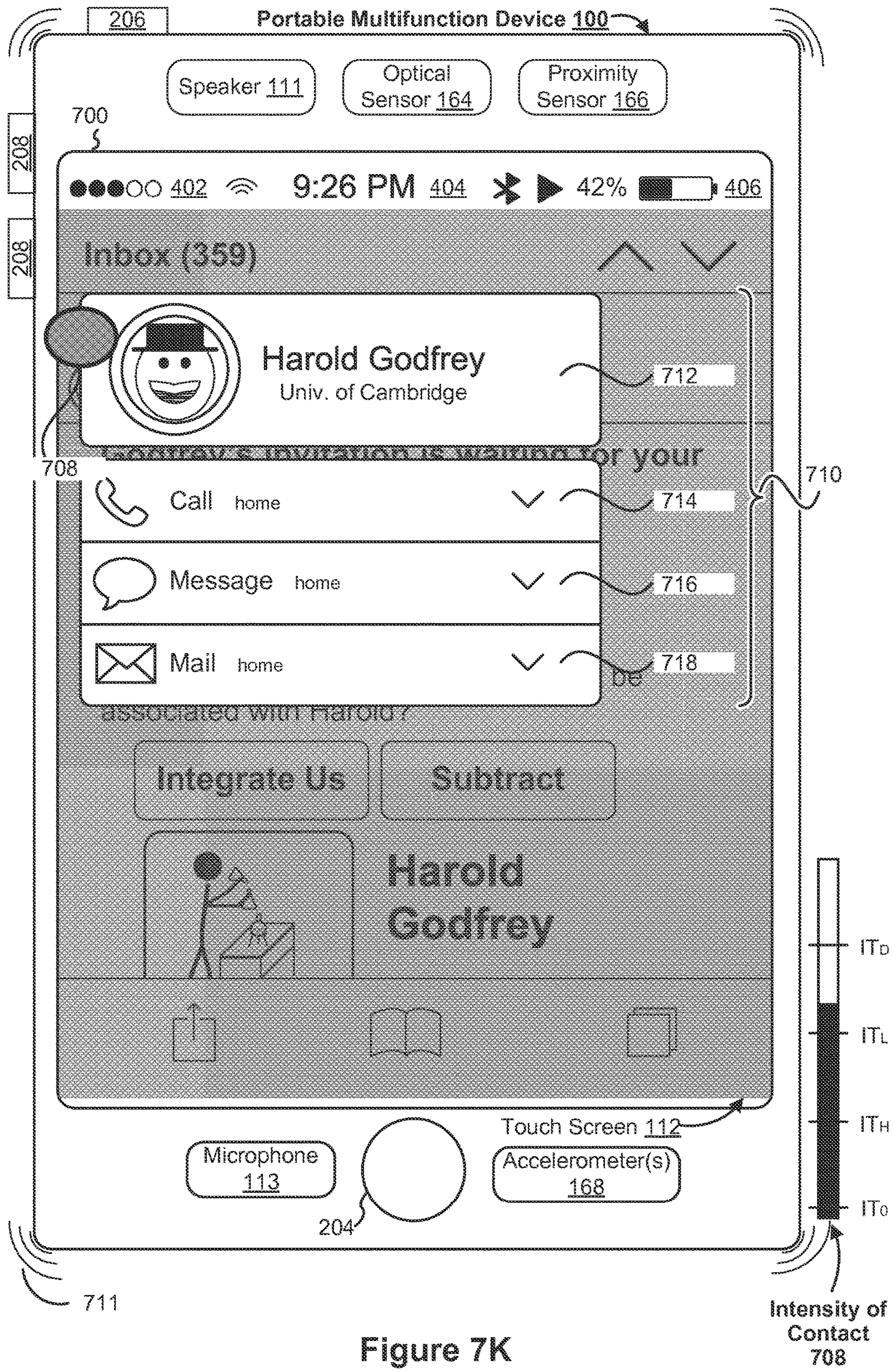
Figure 7L:
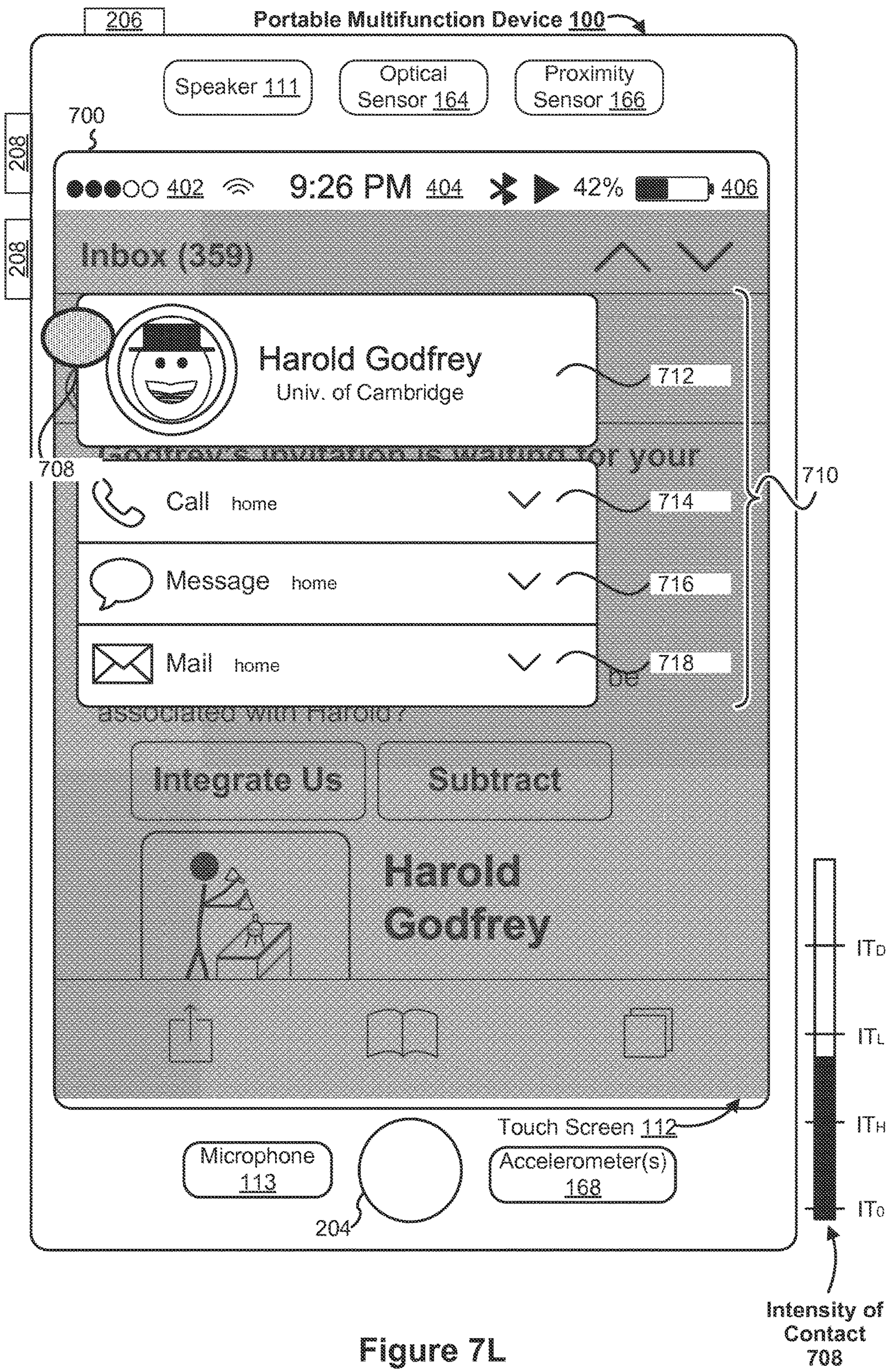
Figure 7M:
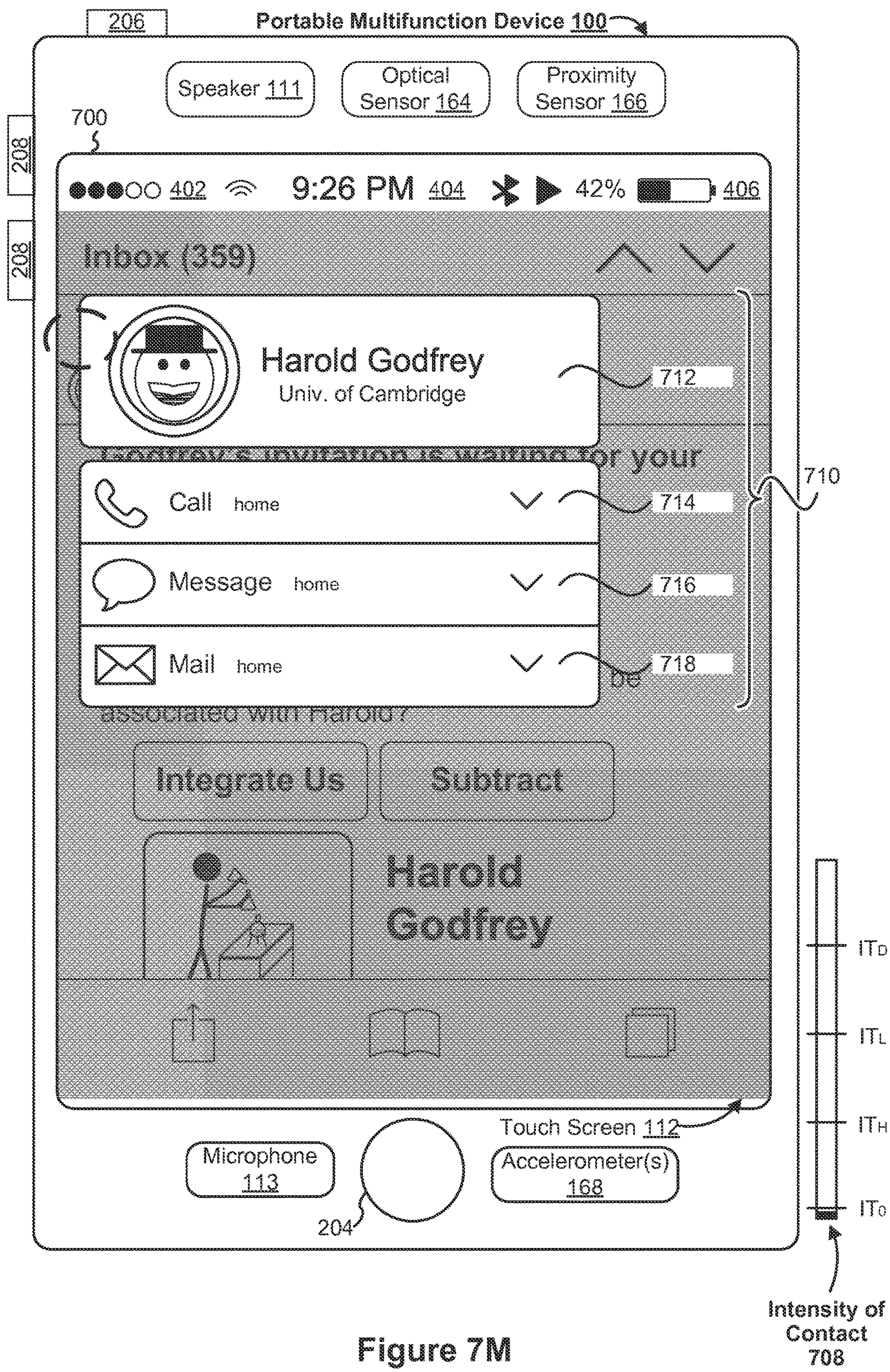
Figure 7N:
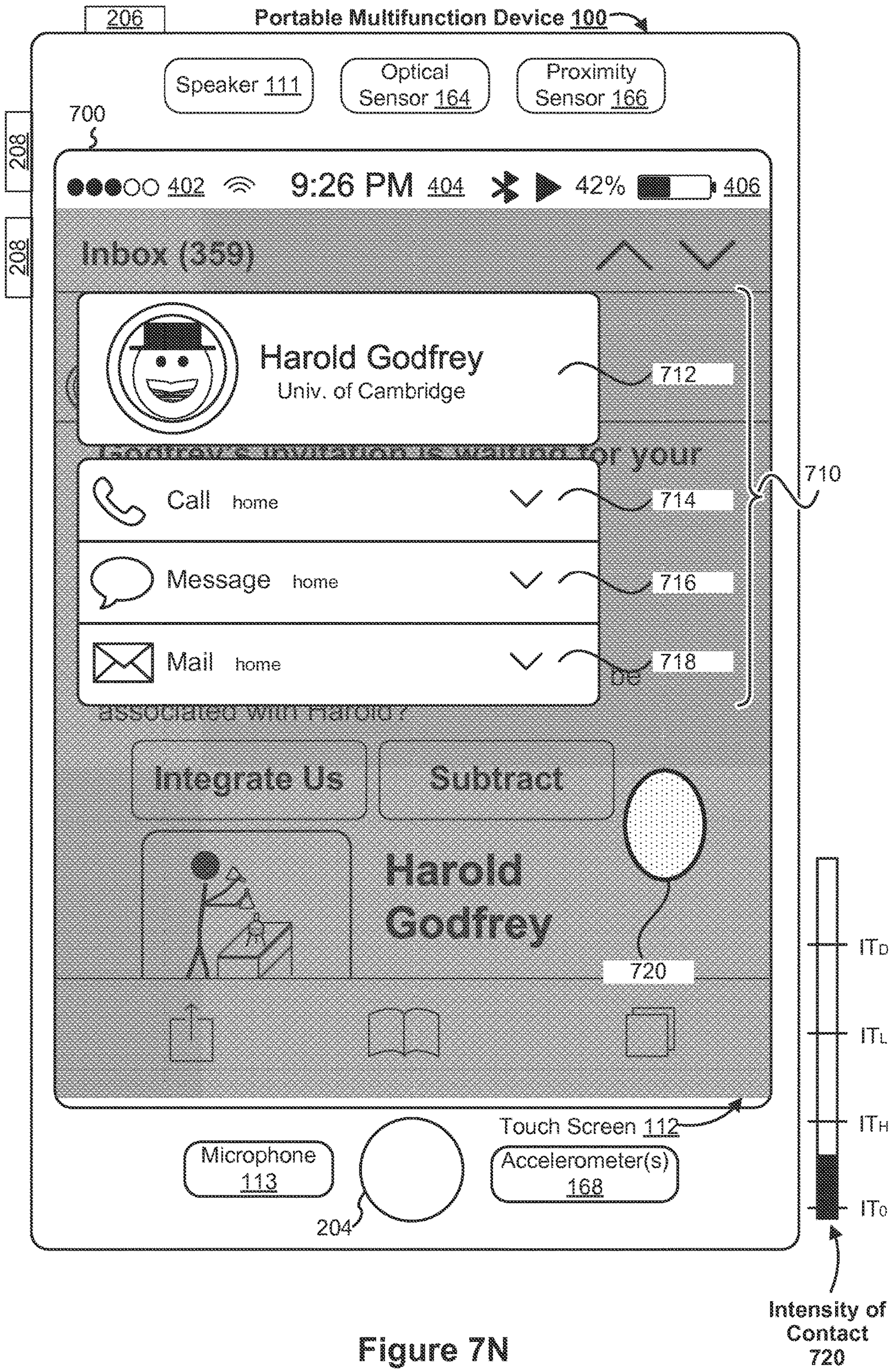
Figure 7O:
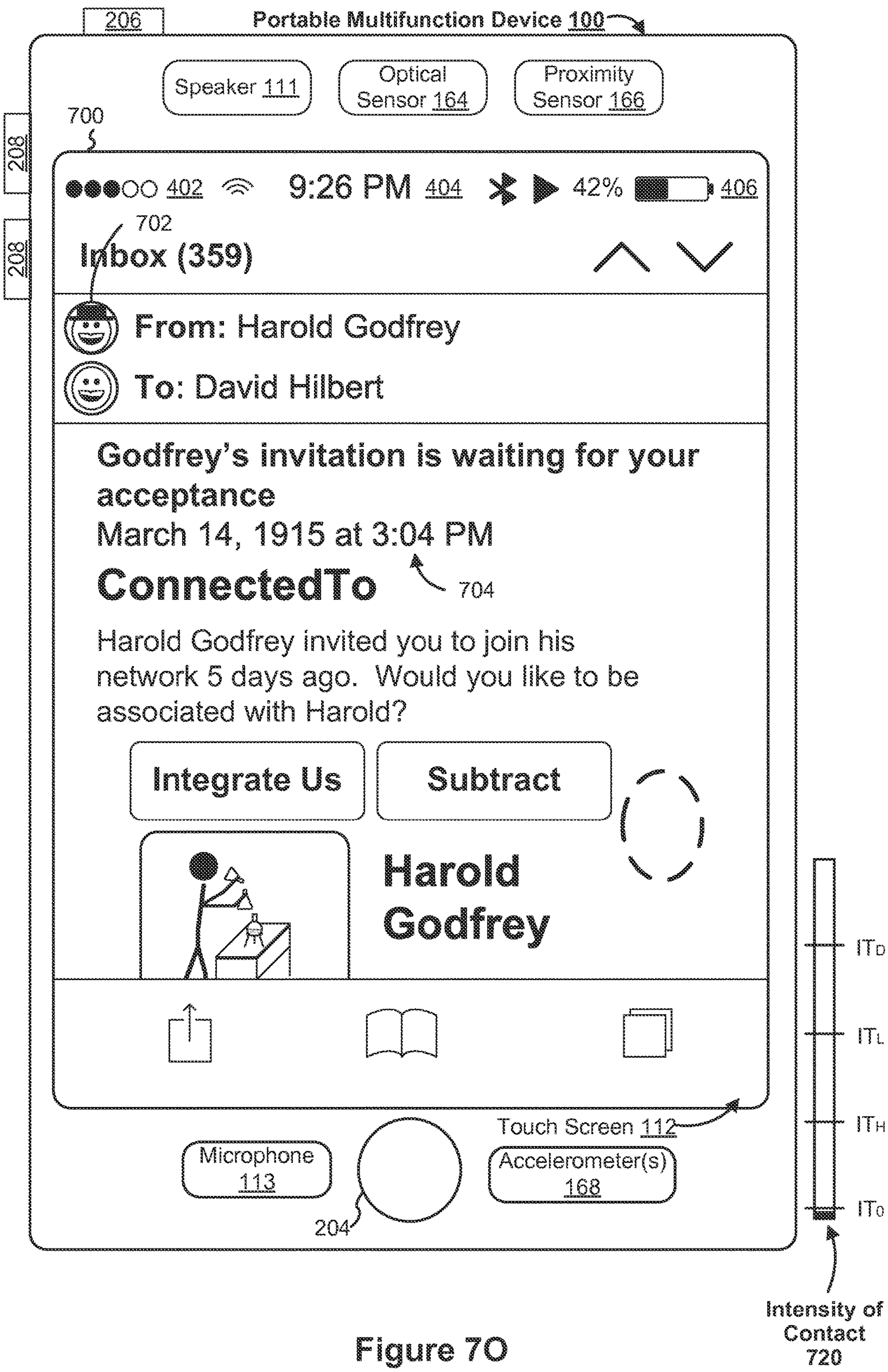
Figure 7P:
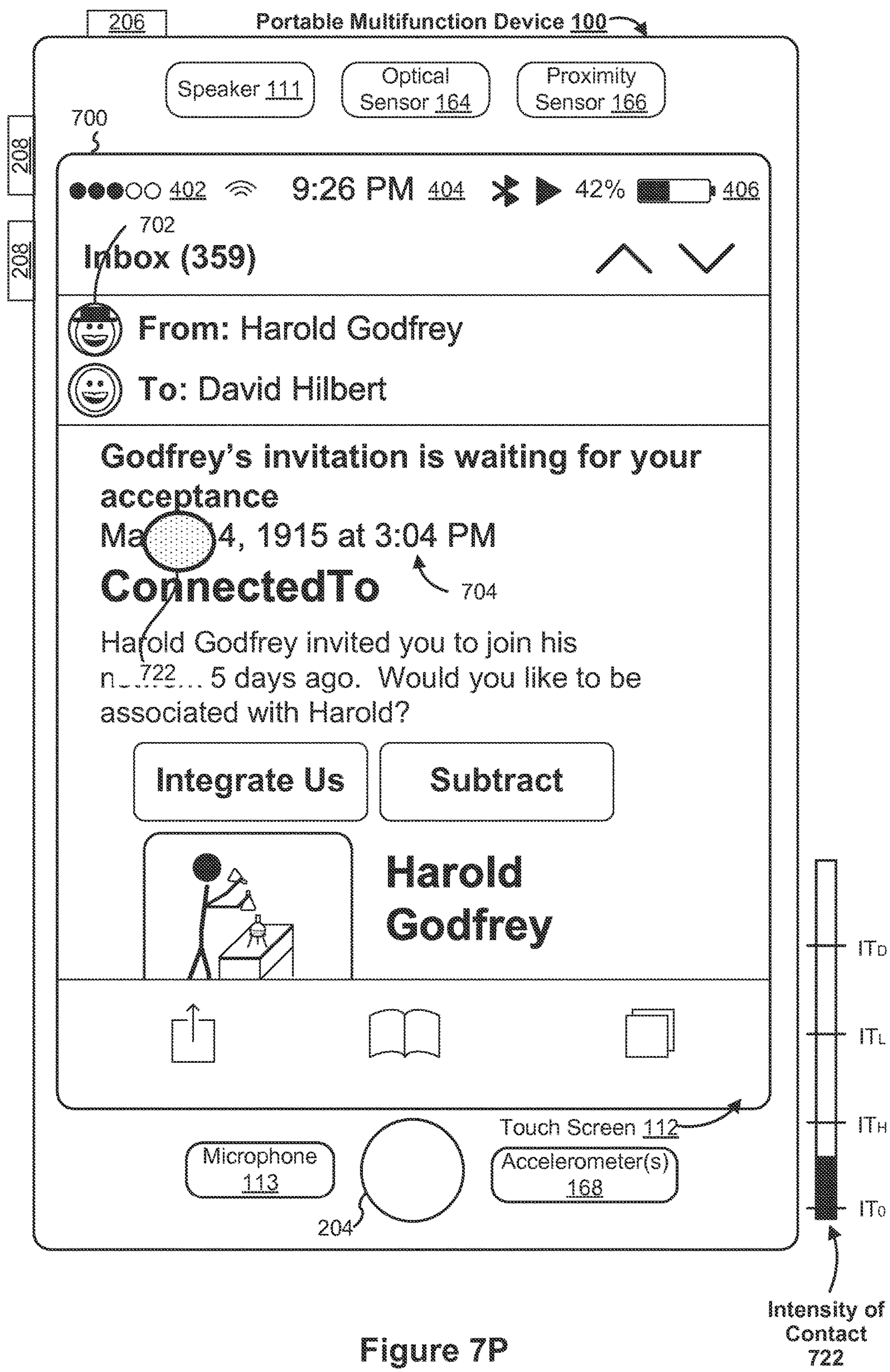
Figure 7Q:
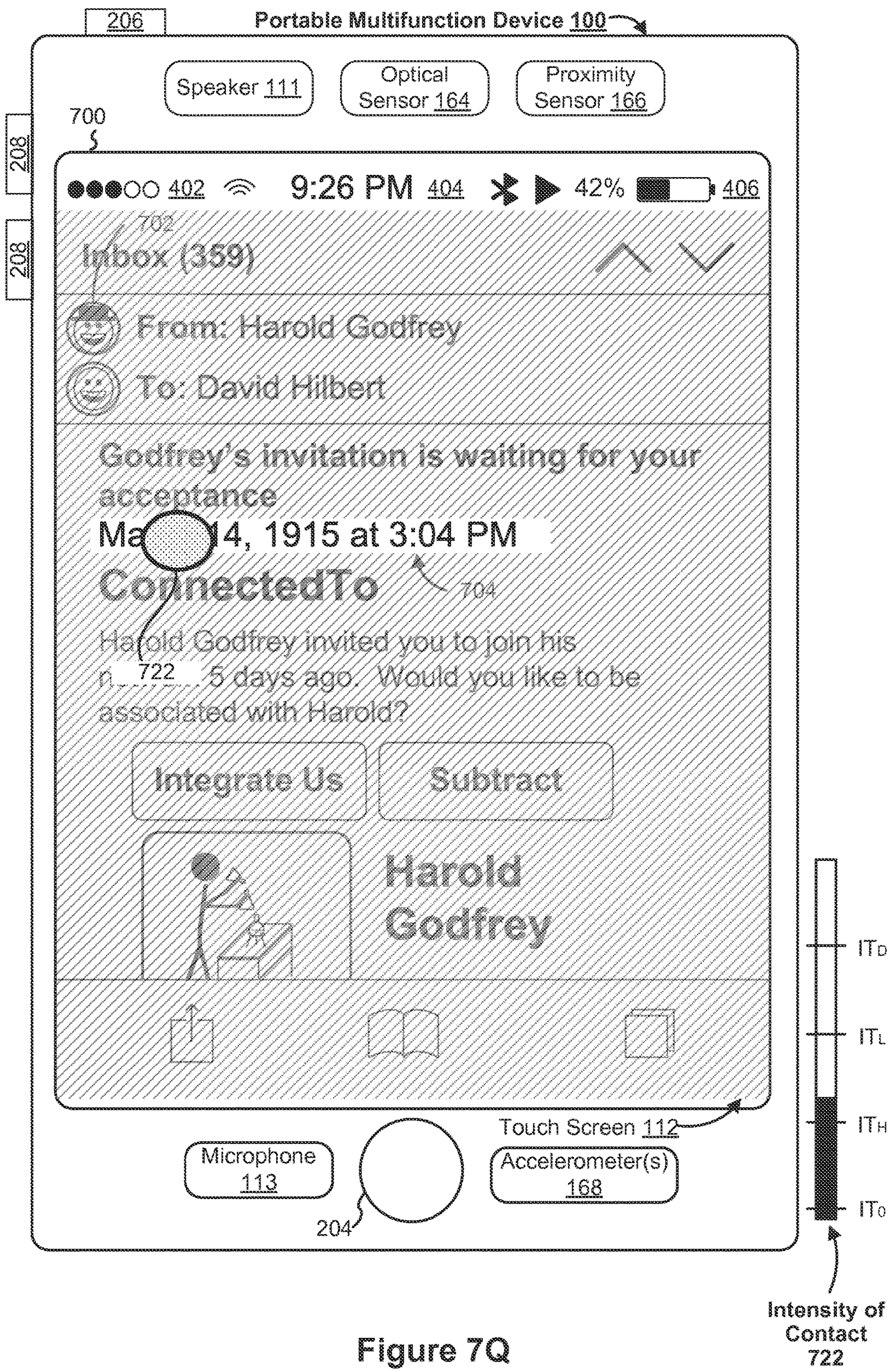
Figure 7R:
Figure 7S:
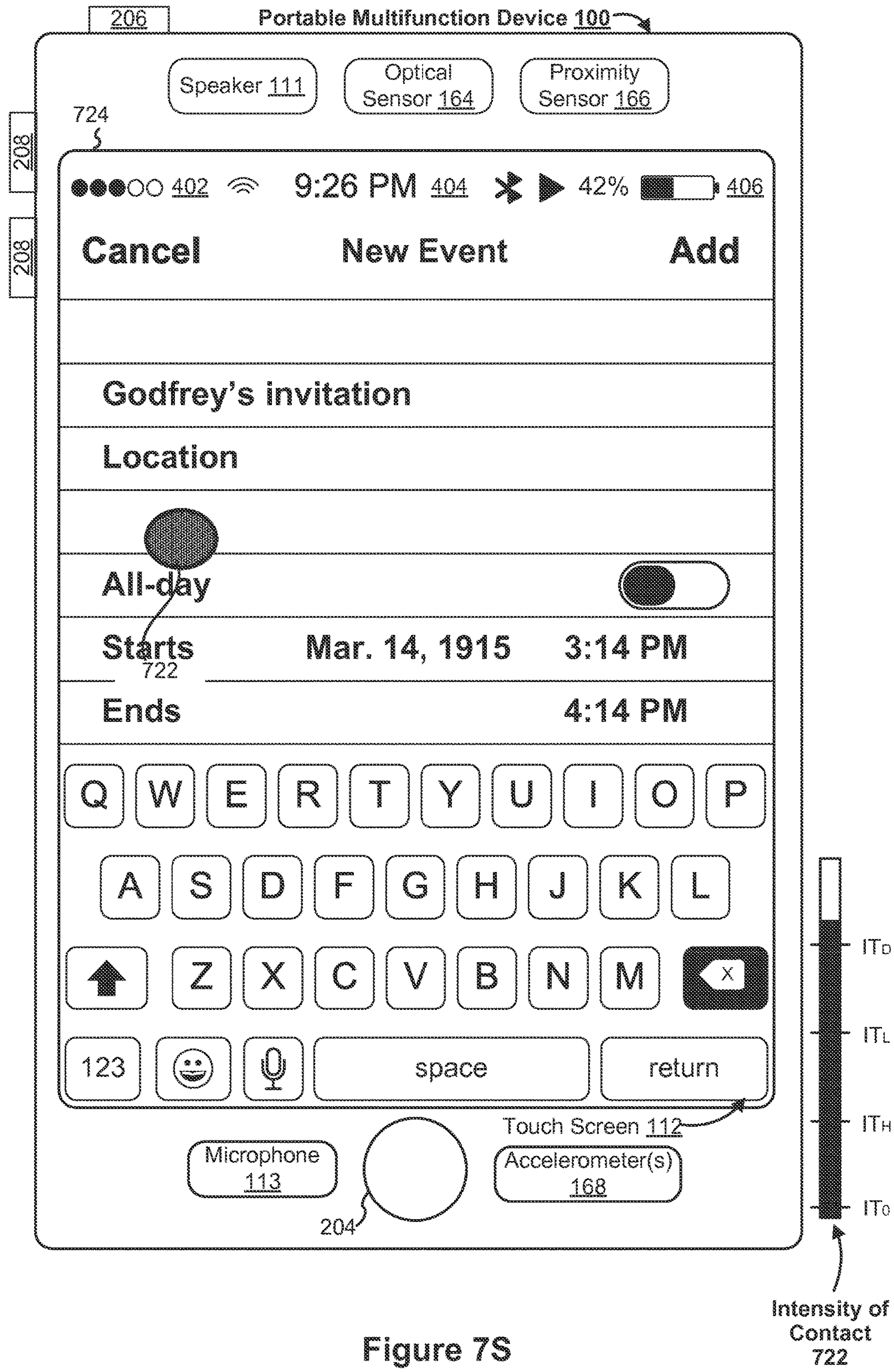
Figure 7T:
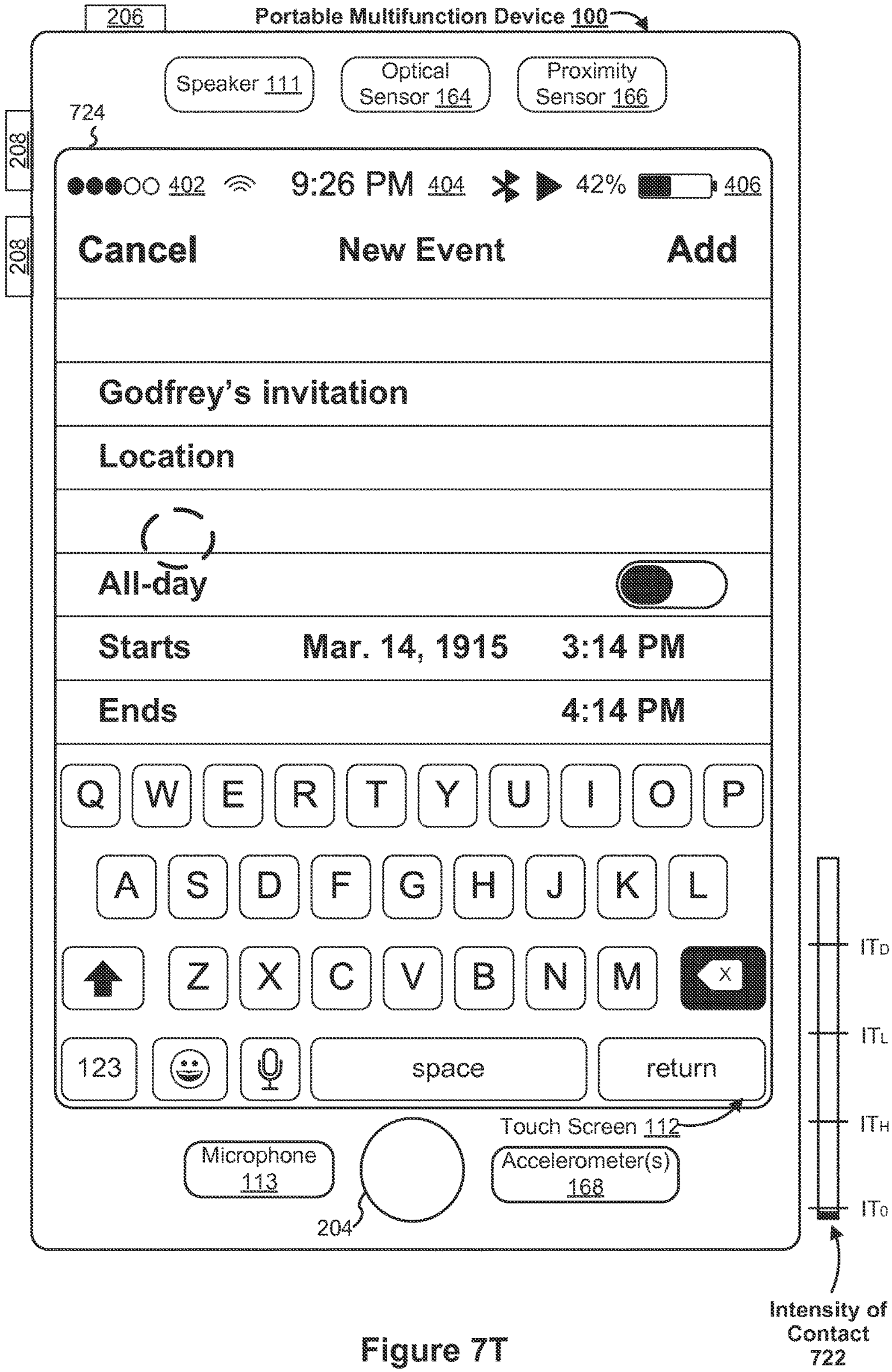
Figure 7U:
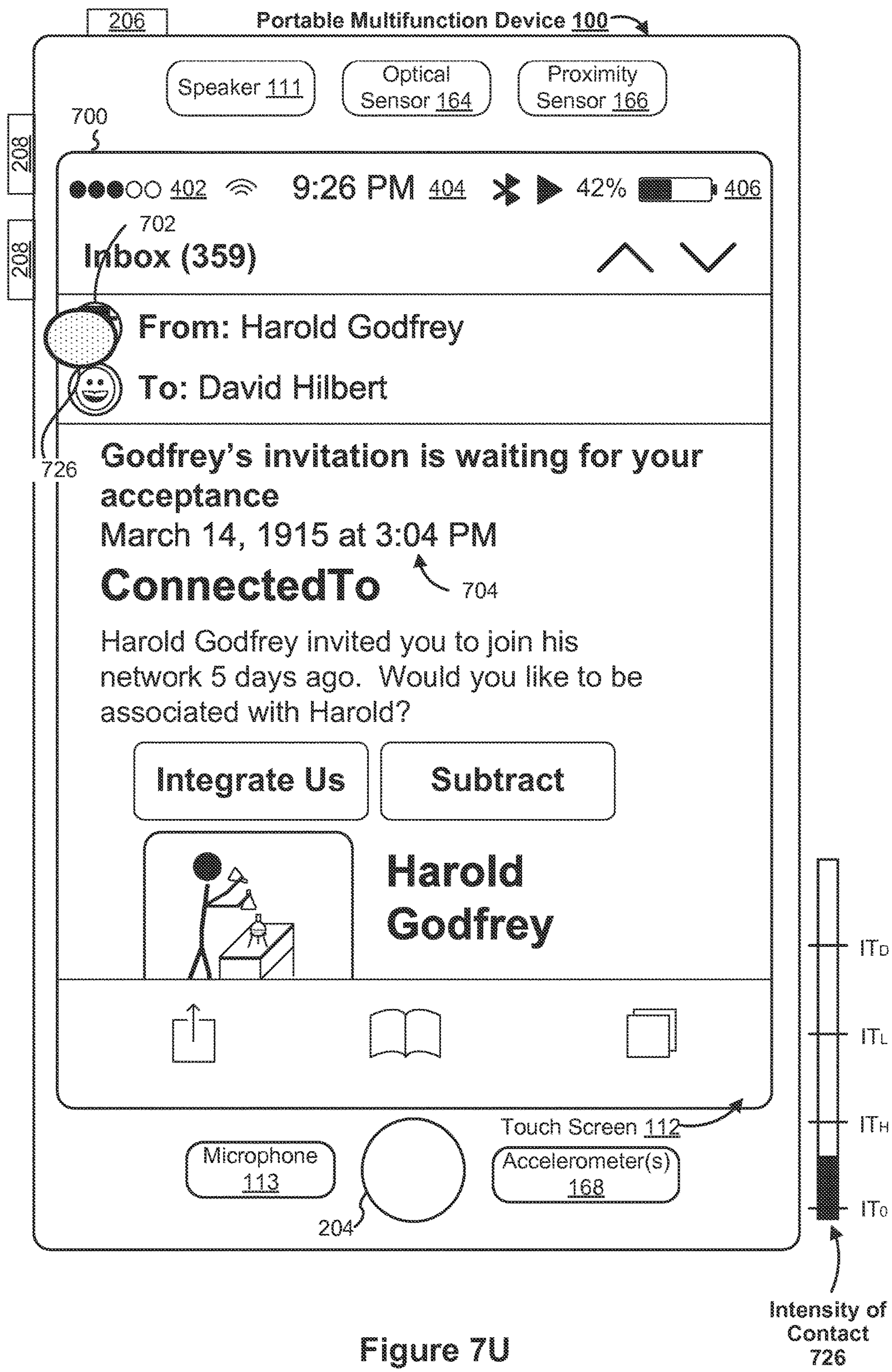

FIGS. 7A-7R and 7U-7AP illustrate exemplary user interface 700 for viewing an email message, which include user interface objects associated with a second application. For example, contact icon 702 is associated with contact information in a contact management application that is activated (e.g., launched) on electronic device 100 upon detection of an application-launch input (e.g., a tap gesture having a maximum intensity below a threshold for invoking a quick-action menu). Contact icon 702 is also associated with a quick action menu that includes options for performing actions associated with the contact management program upon detection of a quick-action-display input (e.g., a force-press gesture having a maximum intensity at or above the threshold for invoking the quick action menu). Similarly, date and time 704 is associated with a calendar application that is activated (e.g., launched) on electronic device 100 upon detection of an application-launch input (e.g., a tap gesture having a maximum intensity below a threshold for invoking a preview of content associated with the calendar application). Date and time 704 is also associated with a potential new event in the calendar application, containing additional content that is made available upon detection of a preview-area display input (e.g., a force-press gesture having a maximum intensity at or above the threshold for invoking the preview area).

FIGS. 7A-7O illustrate an embodiment in which the user invokes a preview of a calendar event associated with a date in an email and then invokes a quick-action menu for actions associated with a contact management application based on a contact recognized within the email. FIG. 7A illustrates an email message viewing user interface 700 displaying contact icon 702 and date and time 704. The device detects contact 706 on date and time 704 in FIG. 7B, with an intensity below the intensity threshold required to invoke the preview area of an associated event in the calendar application (e.g., $IT_L$). In FIG. 7C, the intensity of contact 706 increases above a "hint" threshold (e.g., $IT_H$), but remains below the intensity threshold needed to invoke the preview area of the event (e.g., $IT_L$). The device indicates that the user is approaching the intensity needed to call up the preview area by starting to blur other objects in user interface 700, including contact icon 702, and by increasing the size of date and time 704 (e.g., giving the user the appearance that the date and time are moving forward in a virtual z-space relative to the other user interface objects). As illustrated in FIG. 7D, the blurring and movement forwards in virtual z-space are dynamically responsive to increasing intensity of contact 706 below the preview-area invoking threshold (e.g., $IT_L$).

In FIG. 7E, the intensity of contact 706 increases above the threshold needed to invoke preview area 707 of the event in the calendar application (e.g., $IT_L$). In response, the device displays preview area 707 over a portion of the email message in user interface 700. The preview area displays a view of the calendar user interface for creating a new event based on the date and time information in the email. The device also provides tactile feedback 705, to alert the user that the preview area was activated. The device maintains display of preview area 707 when the user reduces the intensity of contact 706 before reaching an intensity threshold (e.g., $IT_D$) required to navigate to the calendar user interface for creating a new event in FIG. 7F. In FIG. 7G, the user lifts contact 706 off of touch screen 112 without having reached the intensity threshold required to navigate to the calendar user interface (e.g., $IT_D$). Because the preview area did not include one or more selectable action options, the device stops displaying preview area 707 and returns the display of user interface 700 to the same state as before contact 706 was detected.

In FIG. 7H, the device detects contact 708 on contact icon 702, with an intensity below the intensity threshold needed to invoke the quick-action menu (e.g., $IT_L$). In FIG. 7I, the intensity of contact 708 increases above a "hint" threshold (e.g., $IT_H$), but remains below the intensity threshold needed to invoke the quick-action menu. The device indicates that the user is approaching the intensity needed to call up the quick action menu by starting to blur other objects in user interface 700, including date and time 704, and by increasing the size of contact icon 702 (e.g., giving the user the appearance that the contact icon is moving forward in a virtual z-space relative to the other user interface objects). As illustrated in FIG. 7J, the blurring and movement forwards in virtual z-space are dynamically responsive to increasing intensity of contact 708 below the quick-action menu threshold (e.g., $IT_L$).

In FIG. 7K, the intensity of contact 708 increases above the threshold (e.g., $IT_L$) needed to invoke the quick-action menu. In response, contact icon 702 morphs into quick-action menu 710, which displays options for navigating to Harold Godfrey's contact information in the contact management application 712, calling Harold using telephone information associated with the contact management application 714, messaging Harold using contact information associated with the contact management application 716, and sending Harold an email message using email address information associated with the contact management application. The device also provides tactile feedback 711, distinguishable from tactile feedback 705, to alert the user that the quick-action menu is now functional. Because quick action menu 710 includes selectable options for performing actions, the device maintains display of the menu when the user reduces the intensity of contact 708 in FIG. 7L, and then lifts the contact off of touch screen 112 in FIG. 7M. The user then clears quick action menu by tapping (via contact 720) on the touch screen at a location other than where quick action menu 710 is displayed.

FIGS. 7P-7T illustrate an embodiment where the user previews the content of a new event, and then navigates to the associated user interface in the calendar application, with a single gesture. The device 100 detects contact 722 on date and time 704 in the email viewing user interface 700, with an intensity below the intensity threshold required to invoke the preview of the new event (e.g., $IT_L$). In FIG. 7Q, the intensity of contact 722 increases above a "hint" threshold (e.g., $IT_H$), but remains below the intensity threshold needed to invoke the preview area of the email (e.g., $IT_L$). The device indicates that the user is approaching the intensity needed to call up the preview area by starting to blur other objects in user interface 700, including contact icon 702, and by increasing the size of date and time 704. In FIG. 7R, the device displays preview area 707 in response to detecting an increase in the intensity of contact 722 above the preview-area invoking threshold (e.g., $IT_L$). The user continues to increase the intensity of contact 722 above a third threshold (e.g., $IT_D$) between FIGS. 7R and 7S. In response, the device navigates to user interface 724 in the calendar application, displaying a form for creating an event based on the content of the email being viewed in user interface 700, as illustrated in FIG. 7S. Because the device has navigated out of the messaging application, display of new event user interface 724 in the calendar application is maintained upon liftoff of contact 722, as illustrated in FIG. 7T.

Figure 7V:
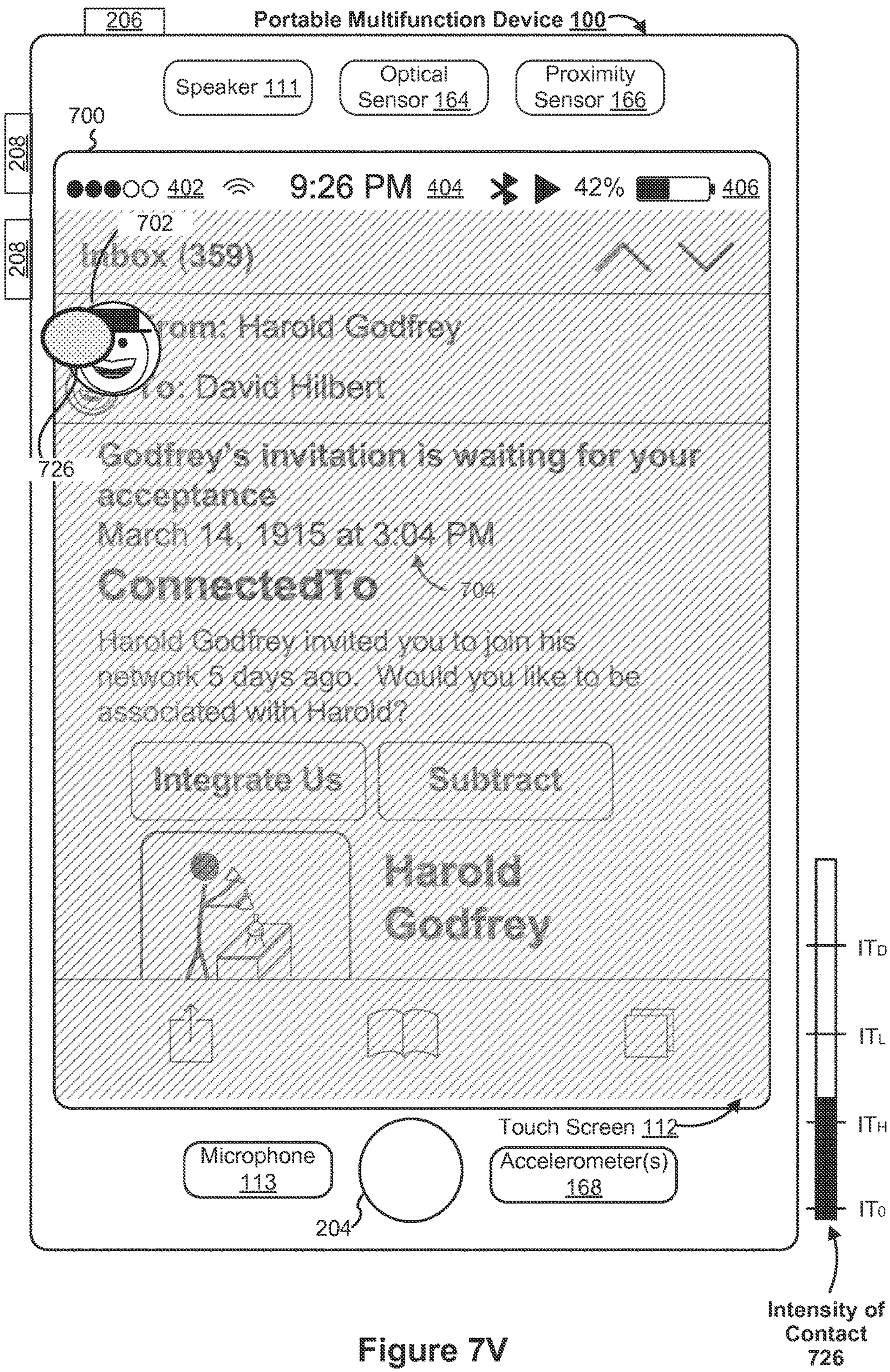
Figure 7W:
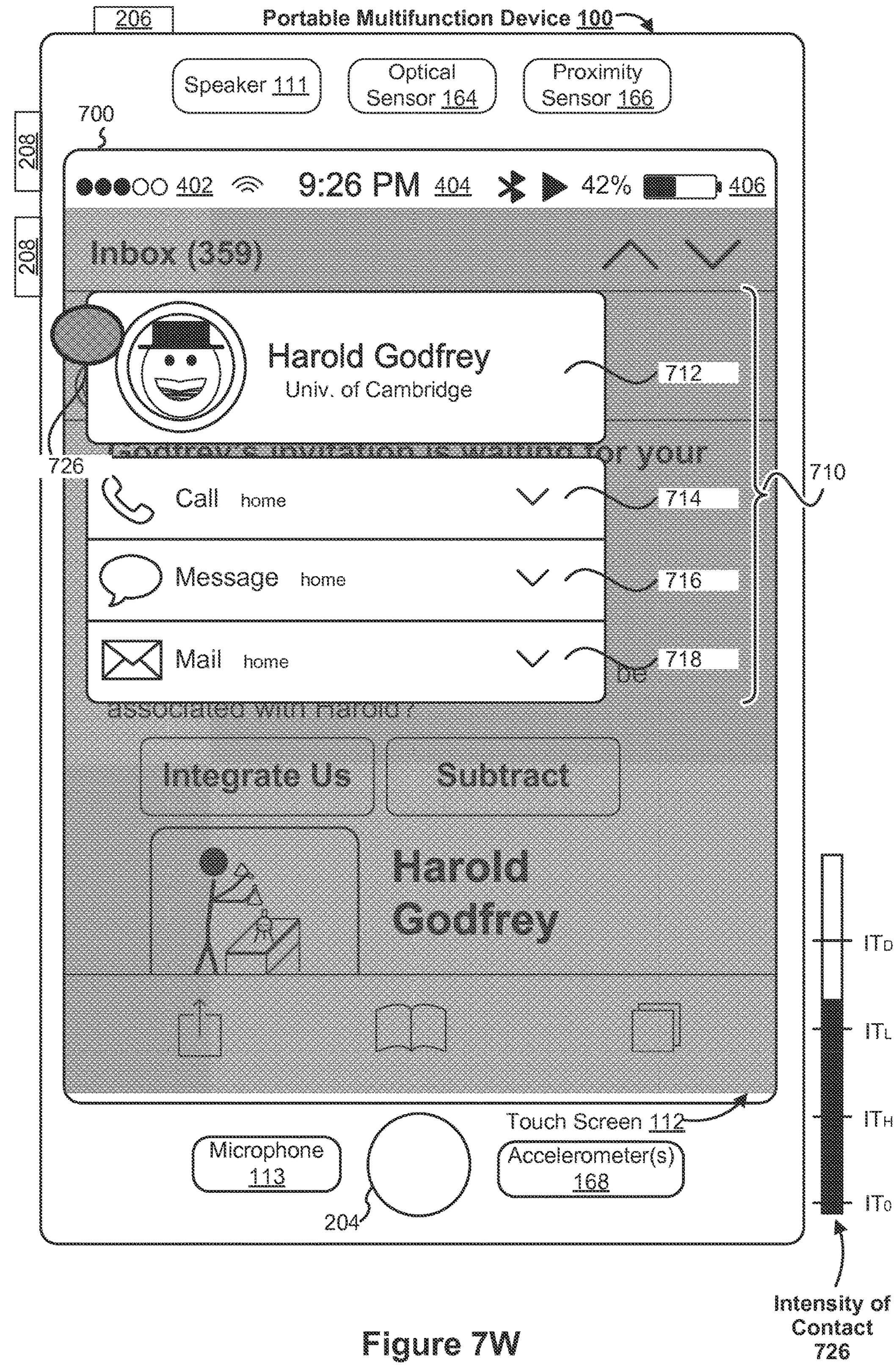
Figure 7X:
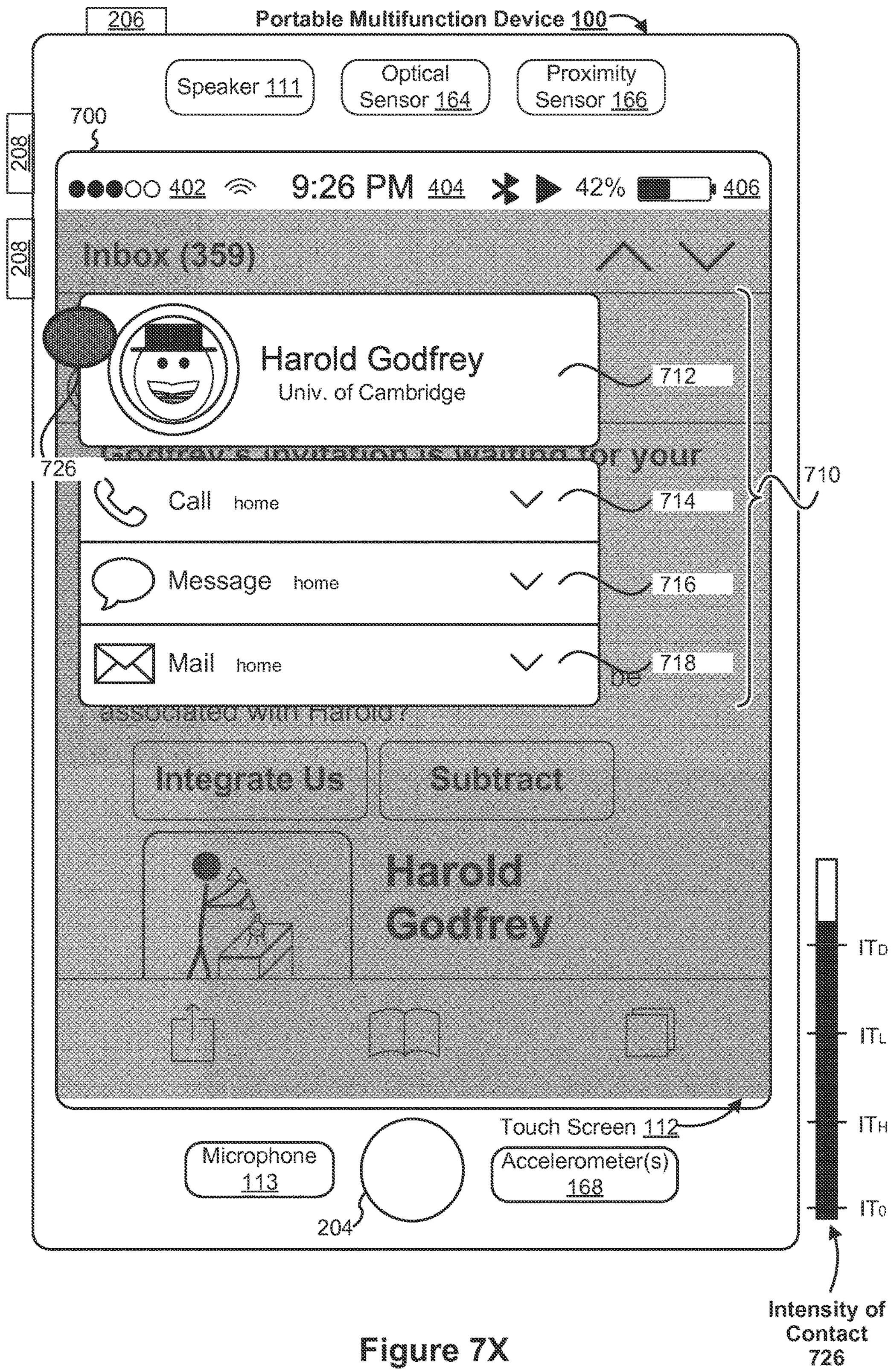

In contrast, FIGS. 7U-7Y illustrate an embodiment where the same input that navigated to the calendar application in FIGS. 7P-7T does not navigate away from the email message application when performed on a contact icon (e.g., a user interface object associated with a quick action menu). In FIG. 7U, the device 100 detects contact 726 on contact icon 702, with an intensity below the intensity threshold needed to invoke the quick-action menu (e.g., $IT_L$). In FIG. 7V, the intensity of contact 708 increases above a "hint" threshold (e.g., $IT_H$), but remains below the intensity threshold needed to invoke the quick-action menu. The device indicates that the user is approaching the intensity needed to call up the quick action menu by starting to blur other objects in user interface 700, including date and time 704, and by increasing the size of contact icon 702. In FIG. 7W, the device displays quick-action menu 710 in response to detecting an increase in the intensity of contact 726 above the quick-action menu threshold (e.g., $IT_L$). The user continues to increase the intensity of contact 726 above a third threshold (e.g., $IT_D$) between FIGS. 7W and 7X. However, unlike date and time 704, image icon 702 is not associated with a navigation operation upon detection of an intensity above the third threshold. Thus, device 100 merely maintains display of quick-action menu 710 after detecting the increased intensity of contact 726 in FIG. 7X and liftoff in FIG. 7Y.

Figure 7Y:
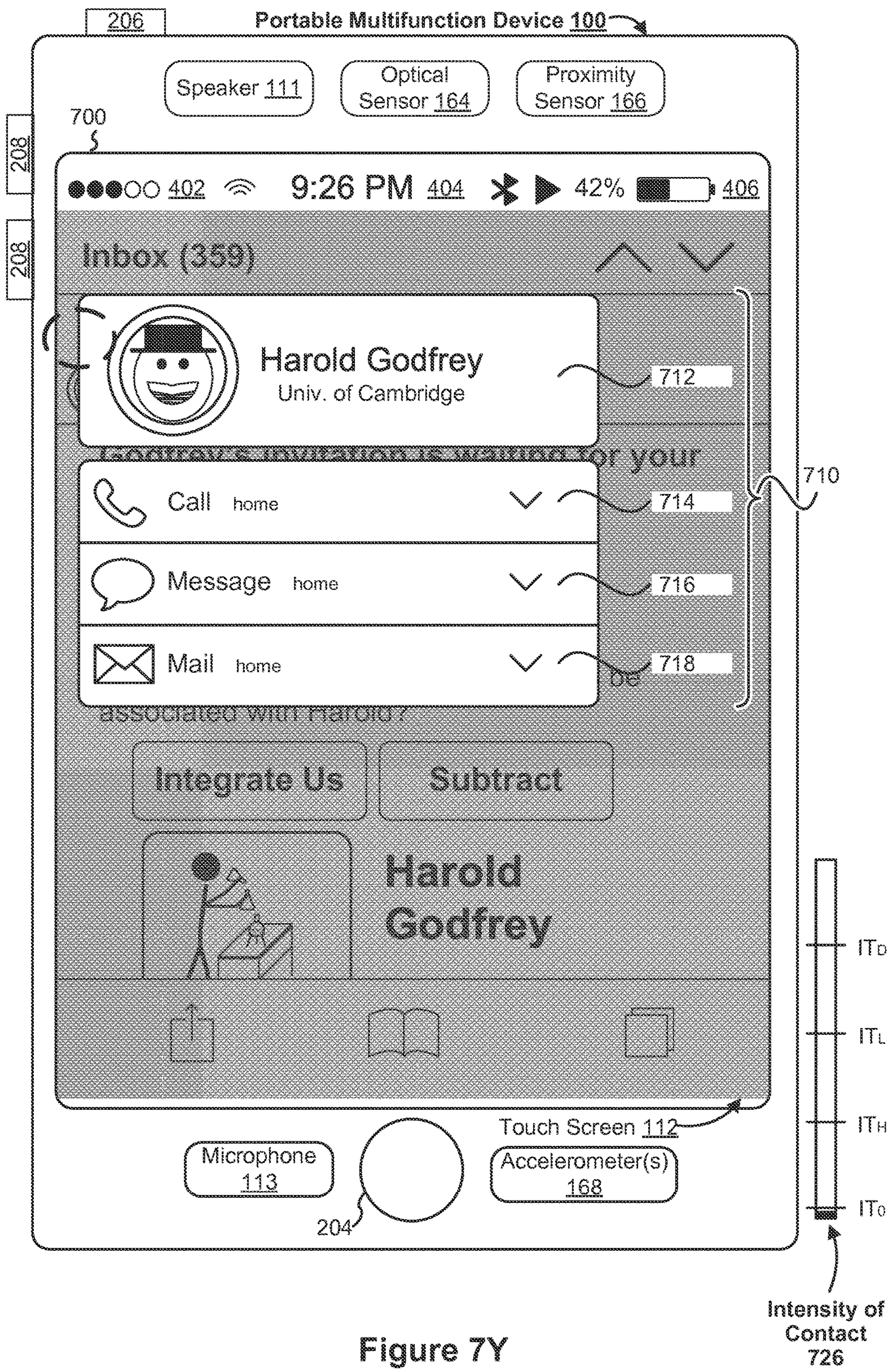
Figure 7Z:
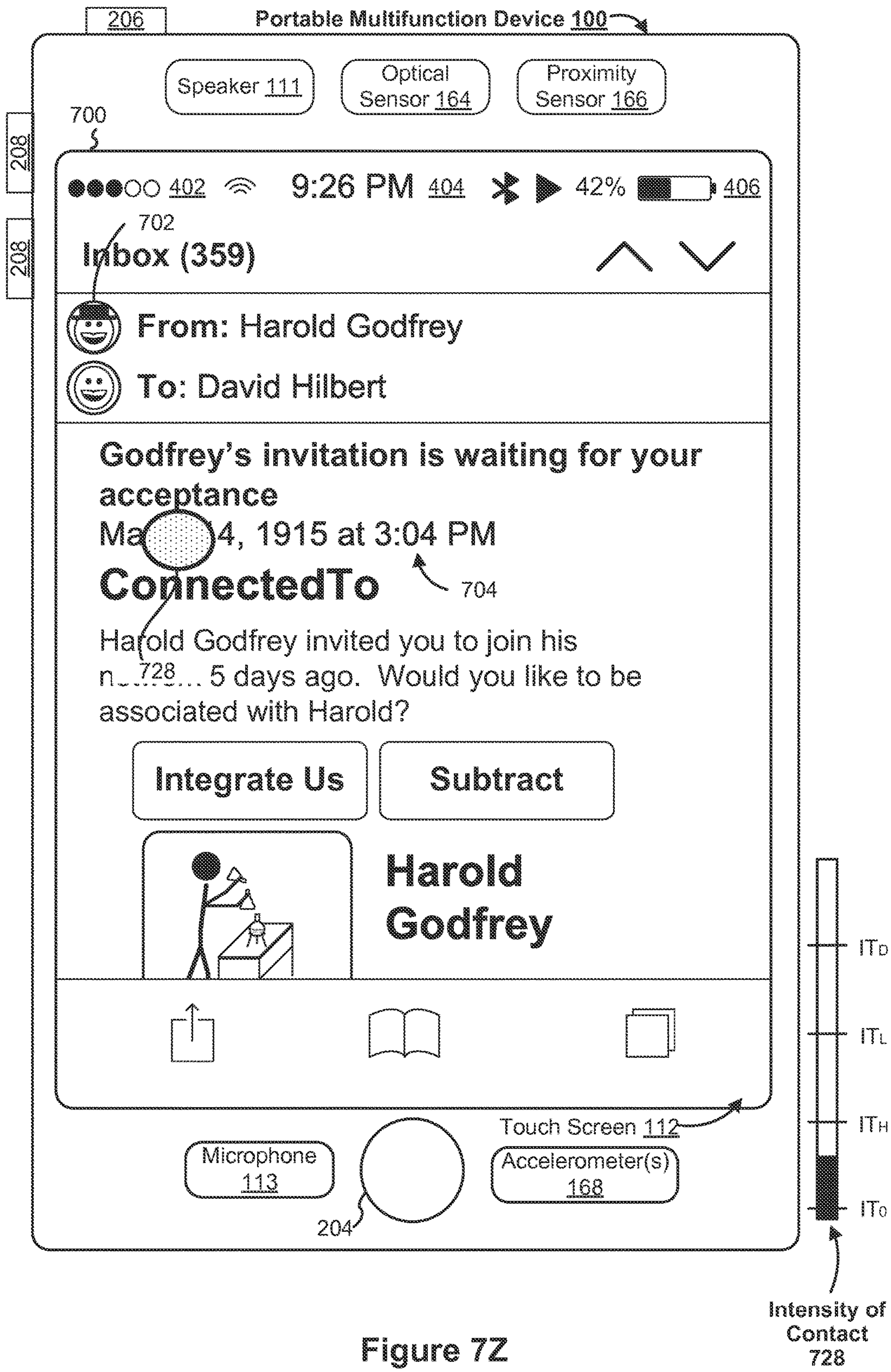
Figure 7A:
Figure 7A:
Figure 7A:
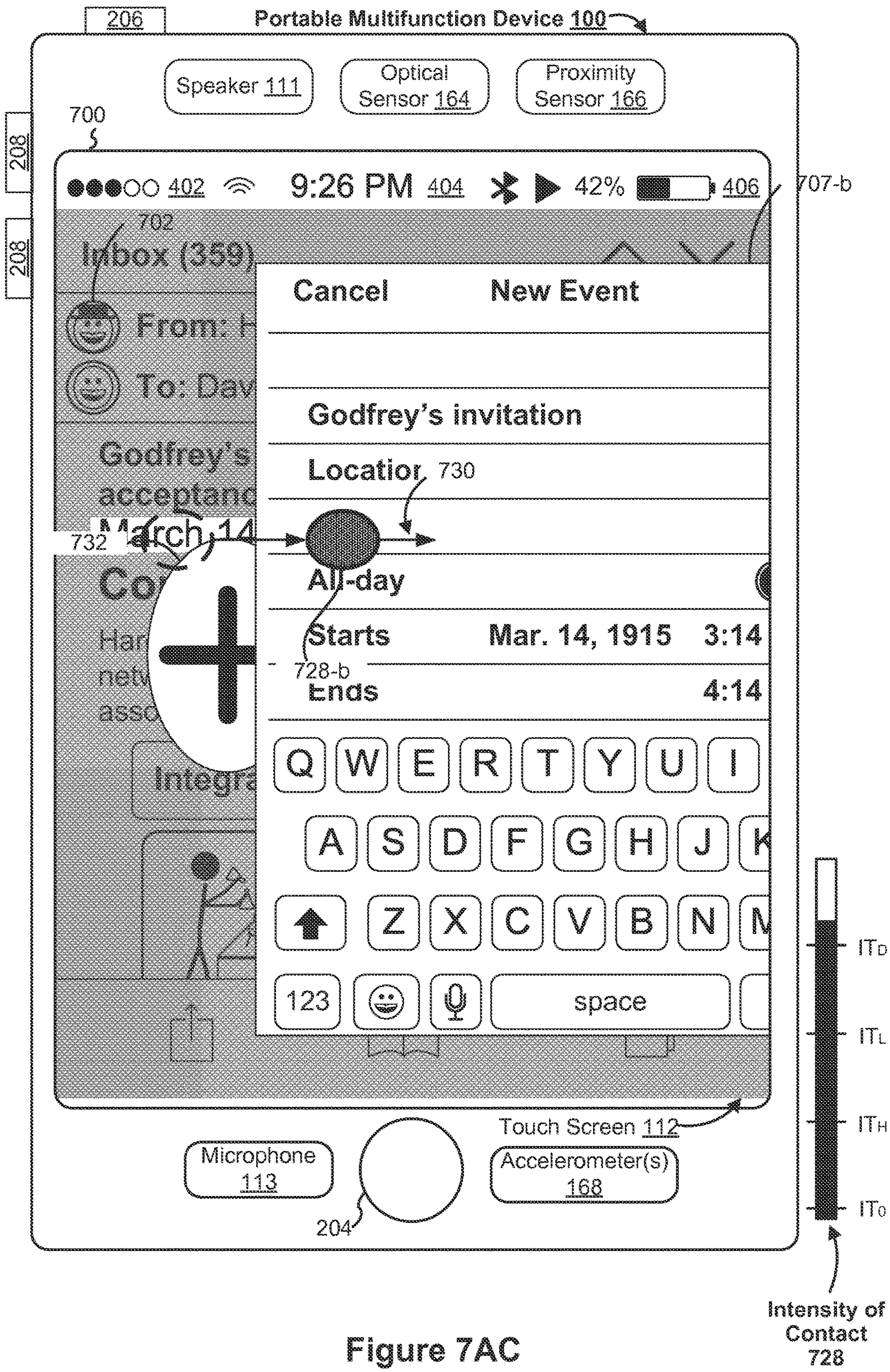
Figure 7A:
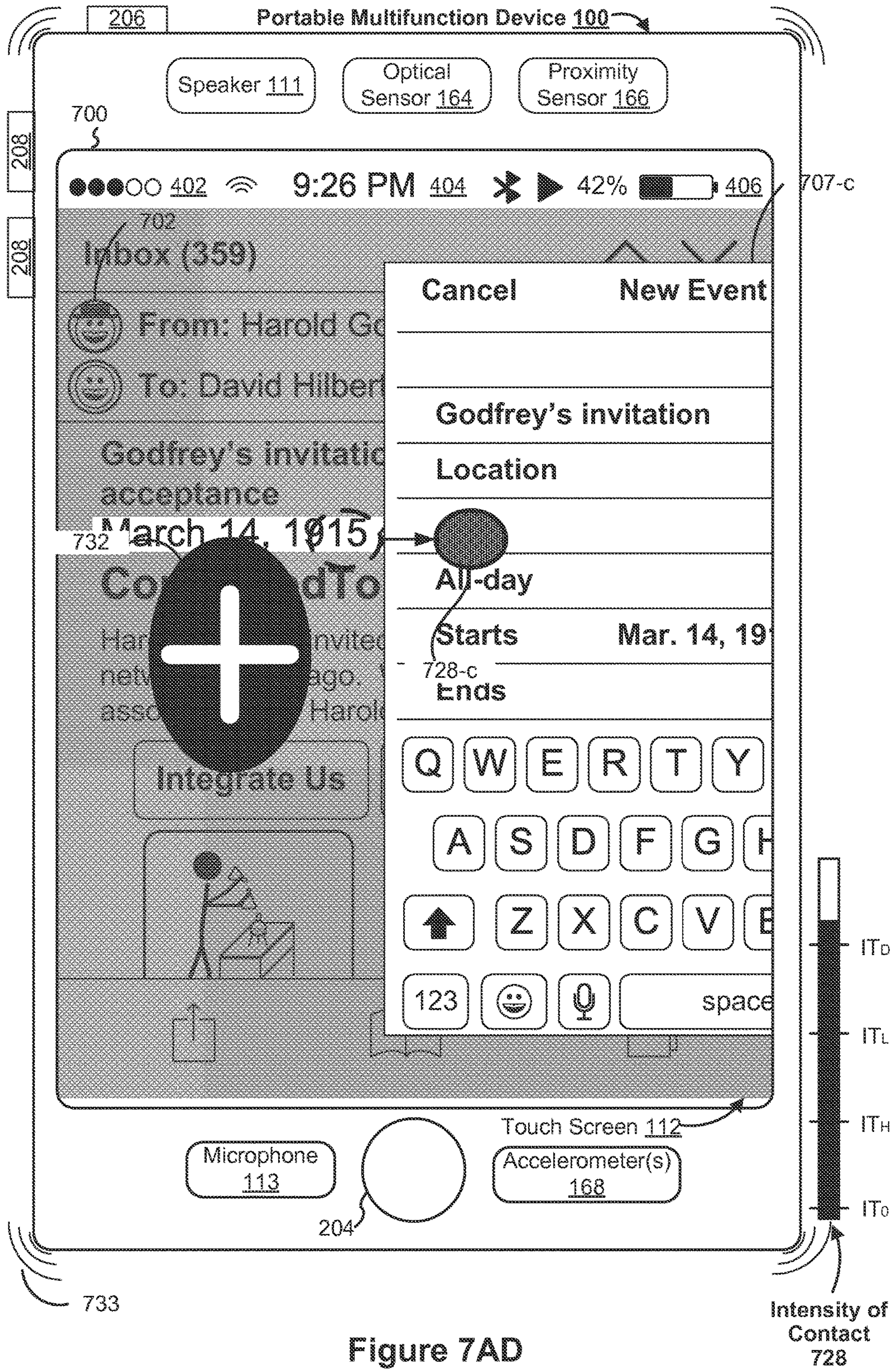
Figure 7A:
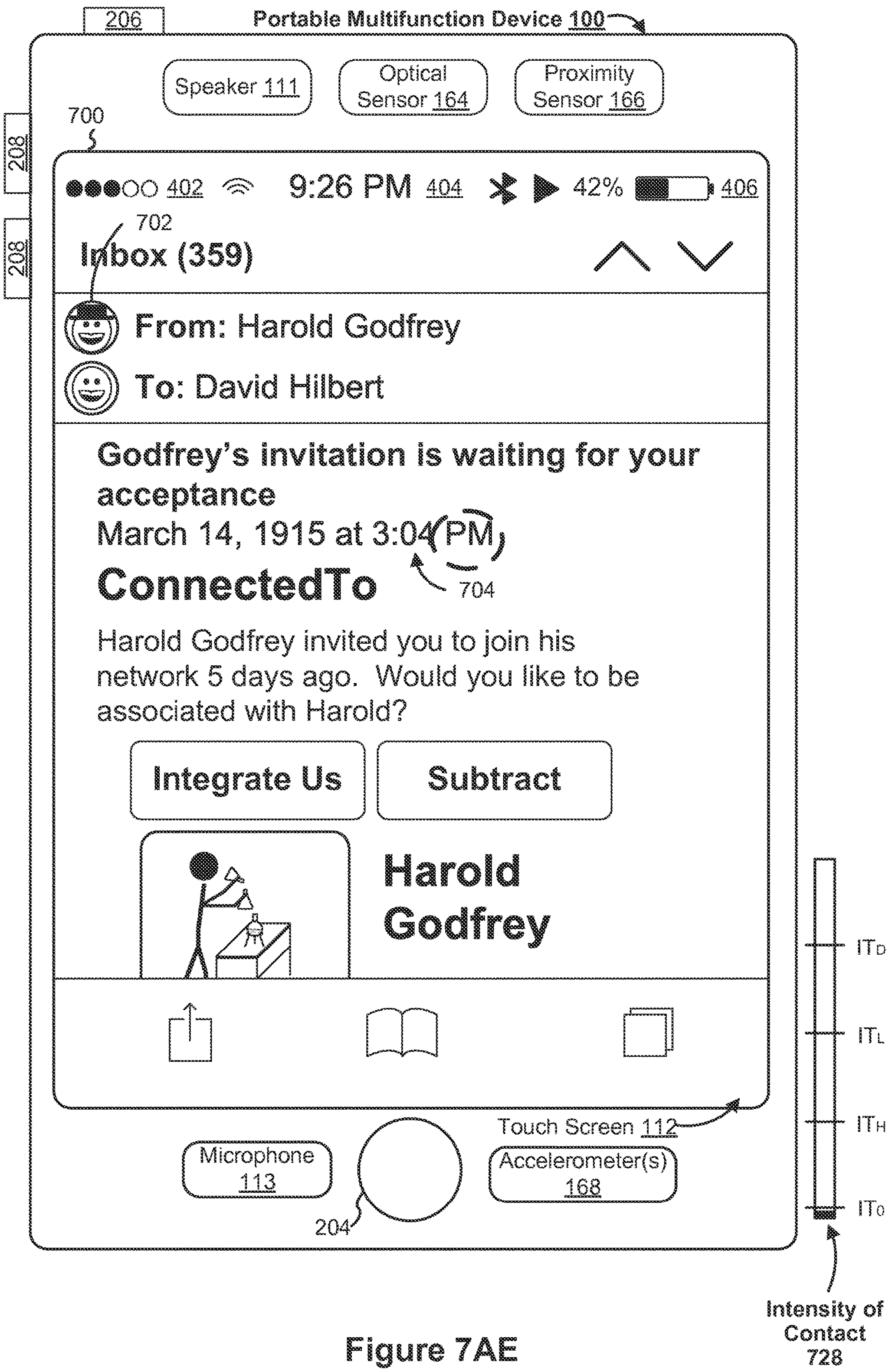
Figure 7A:
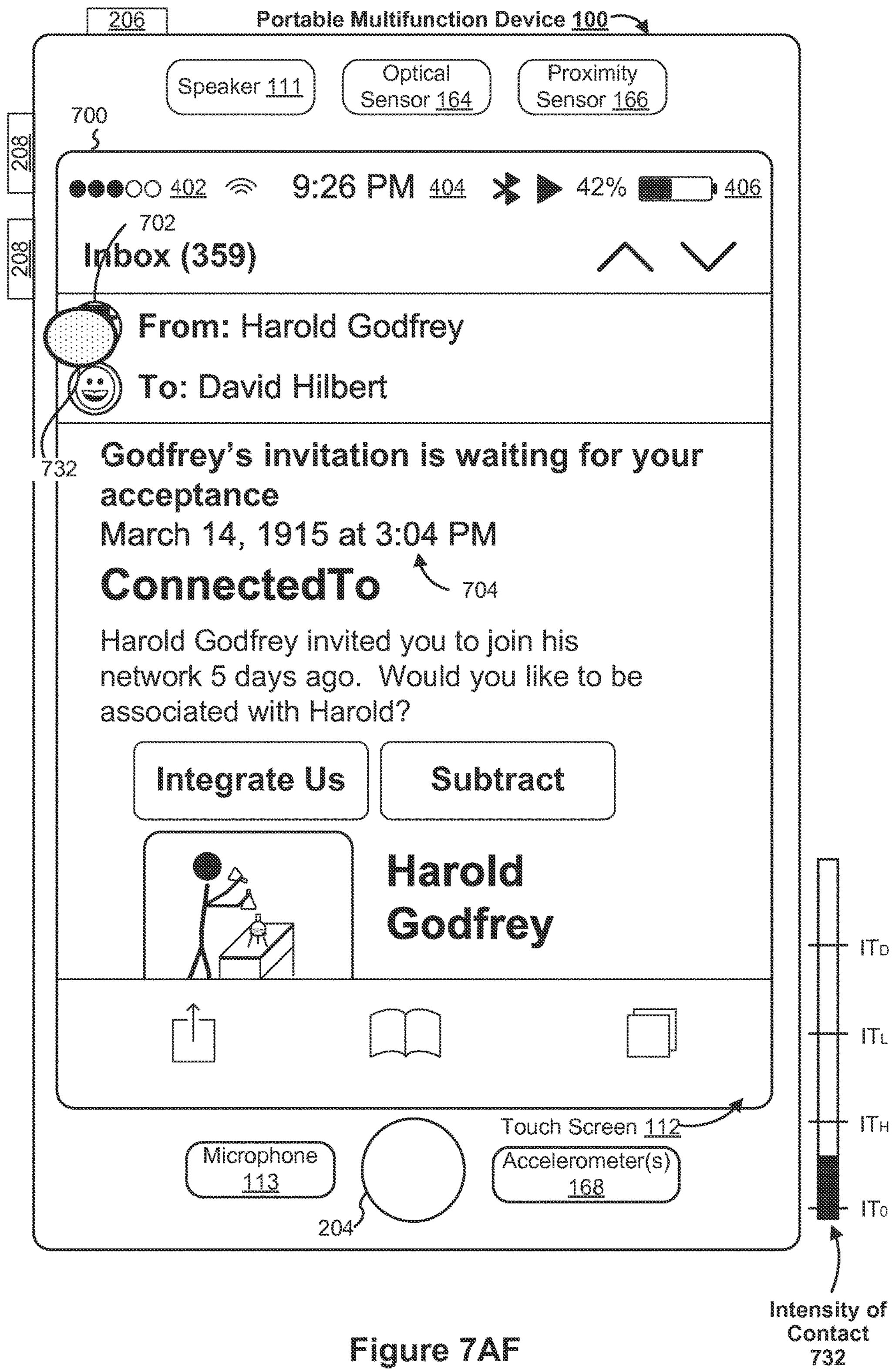
Figure 7A:
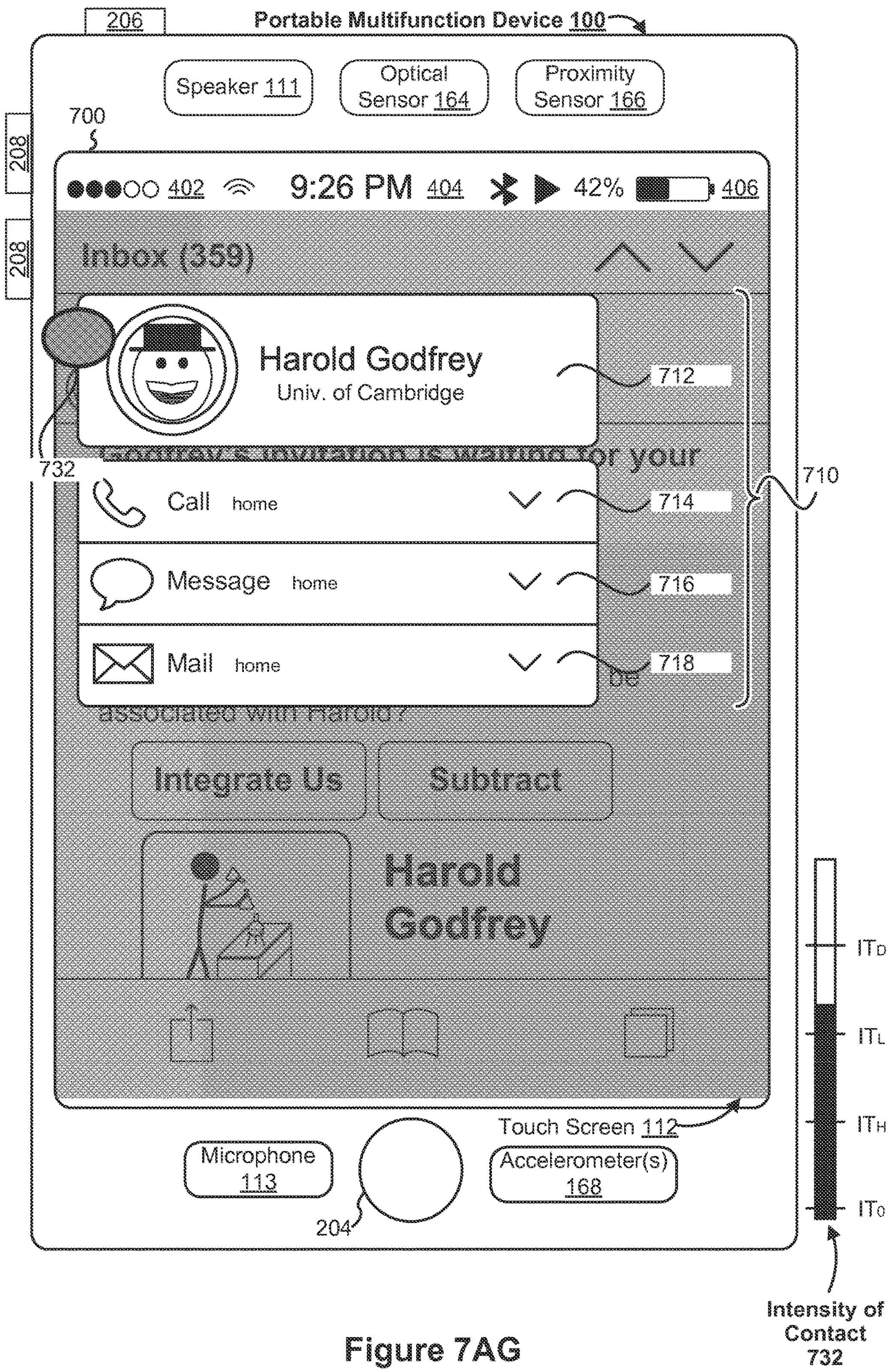
Figure 7A:
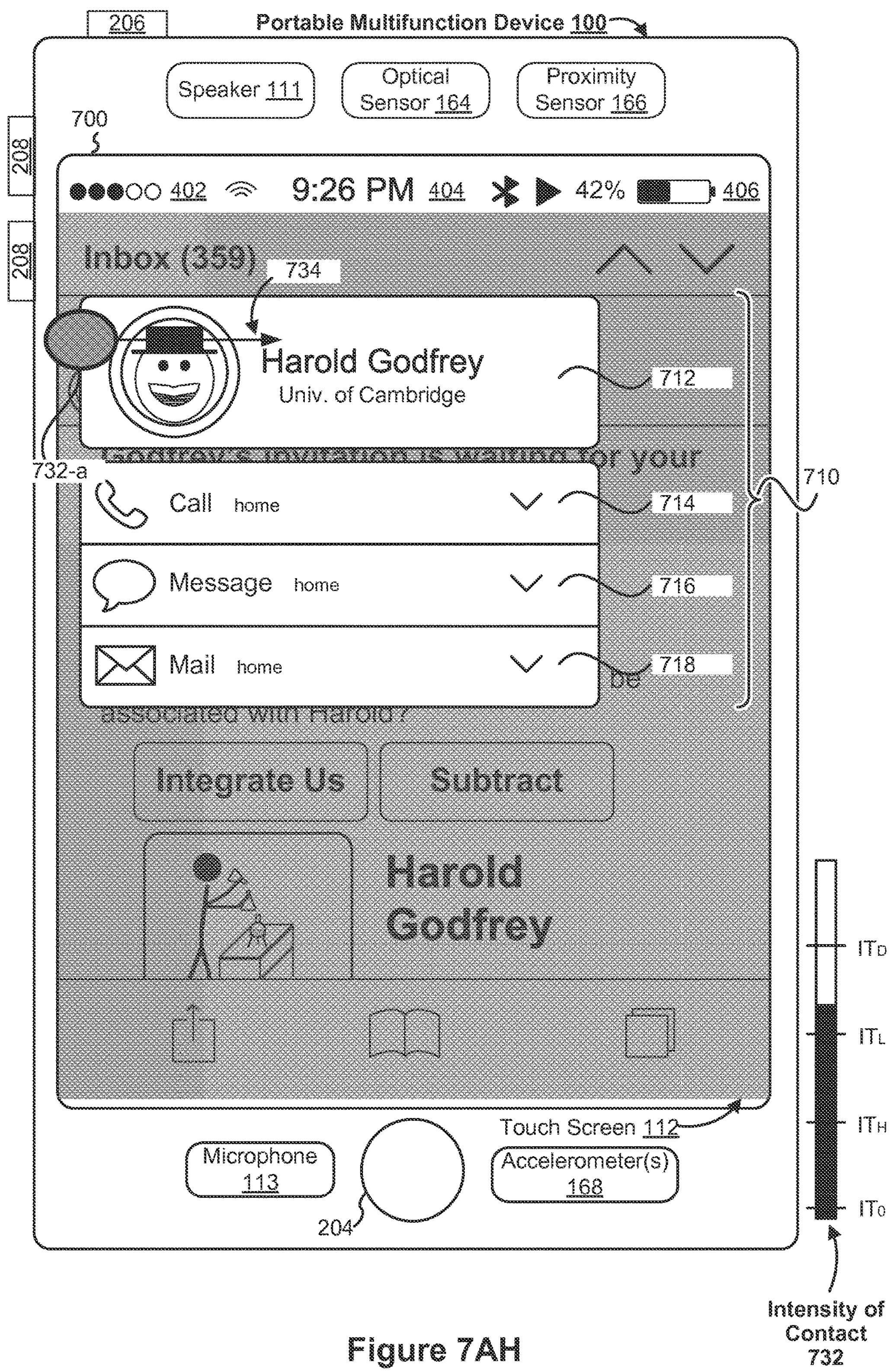
Figure 7A:
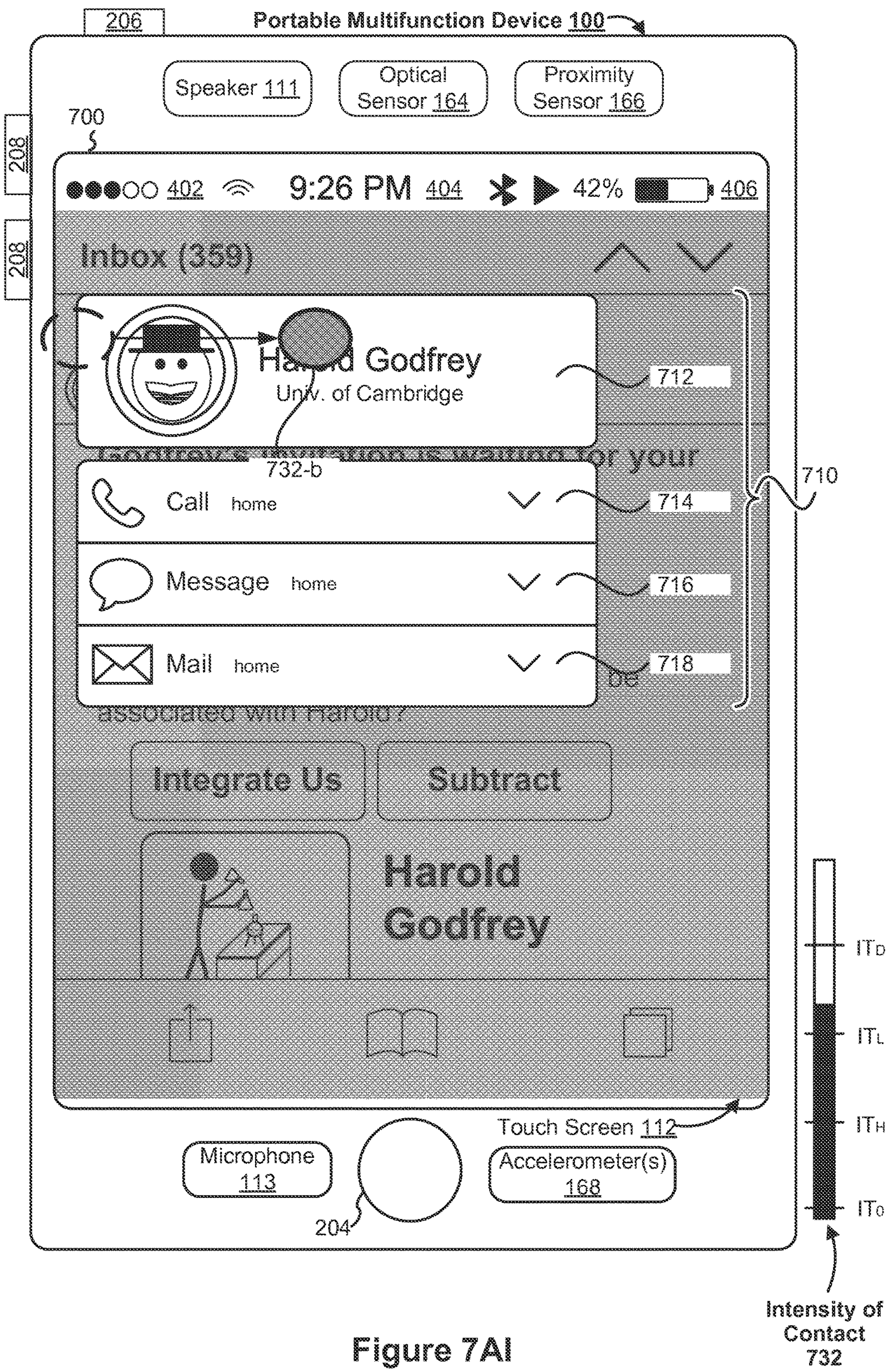
Figure 7A:
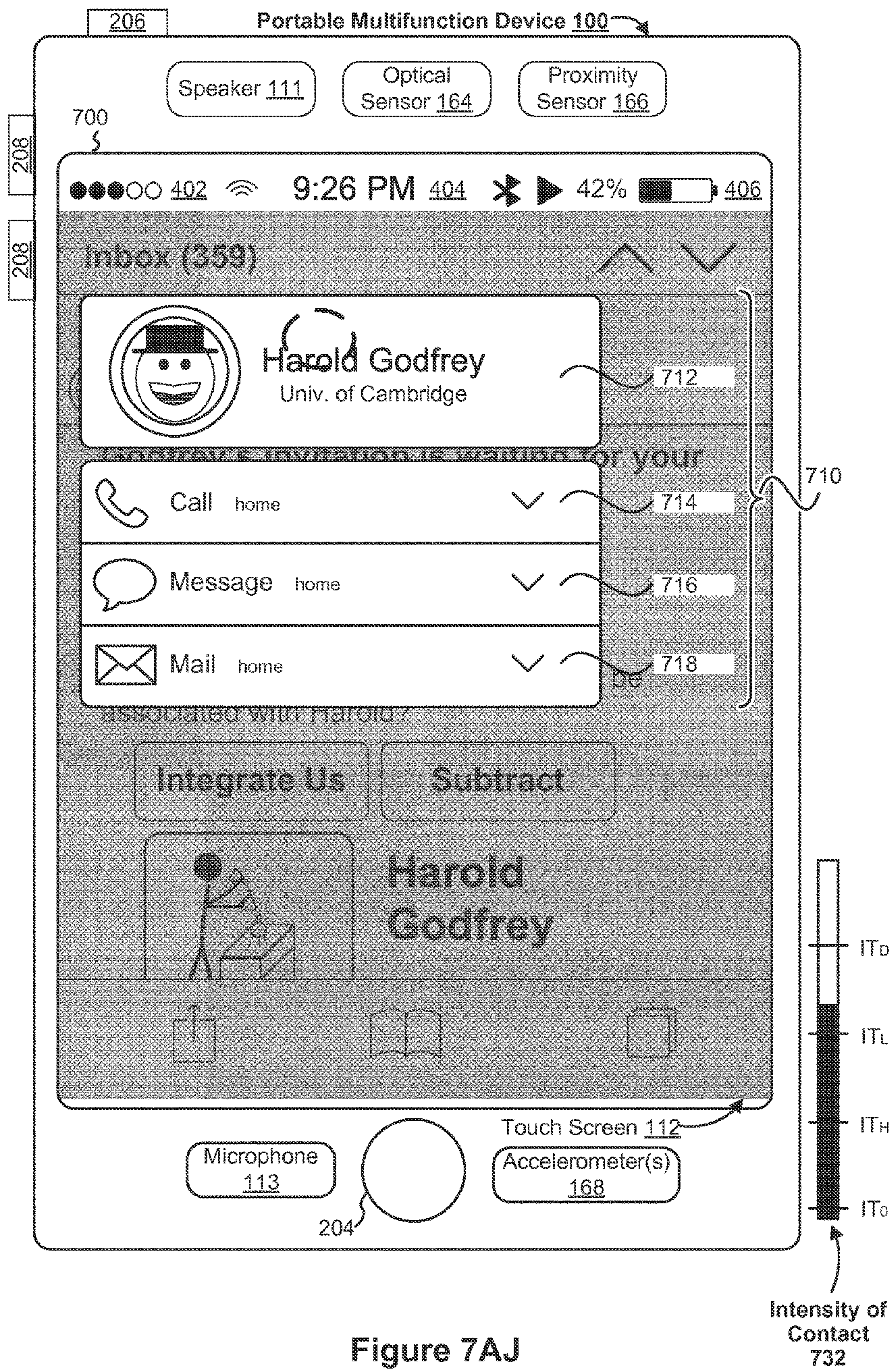
Figure 7A:
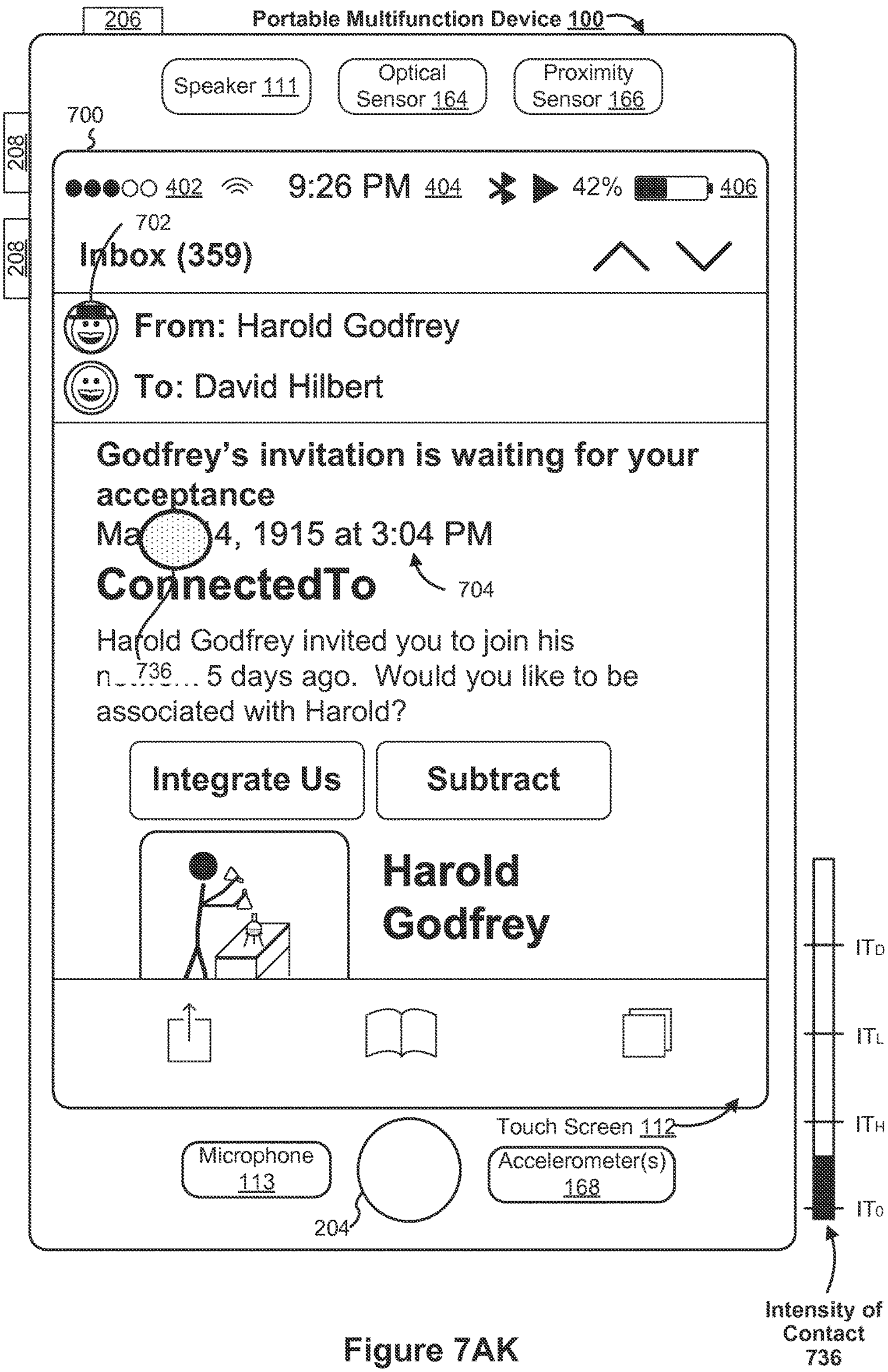
Figure 7A:
Figure 7A:
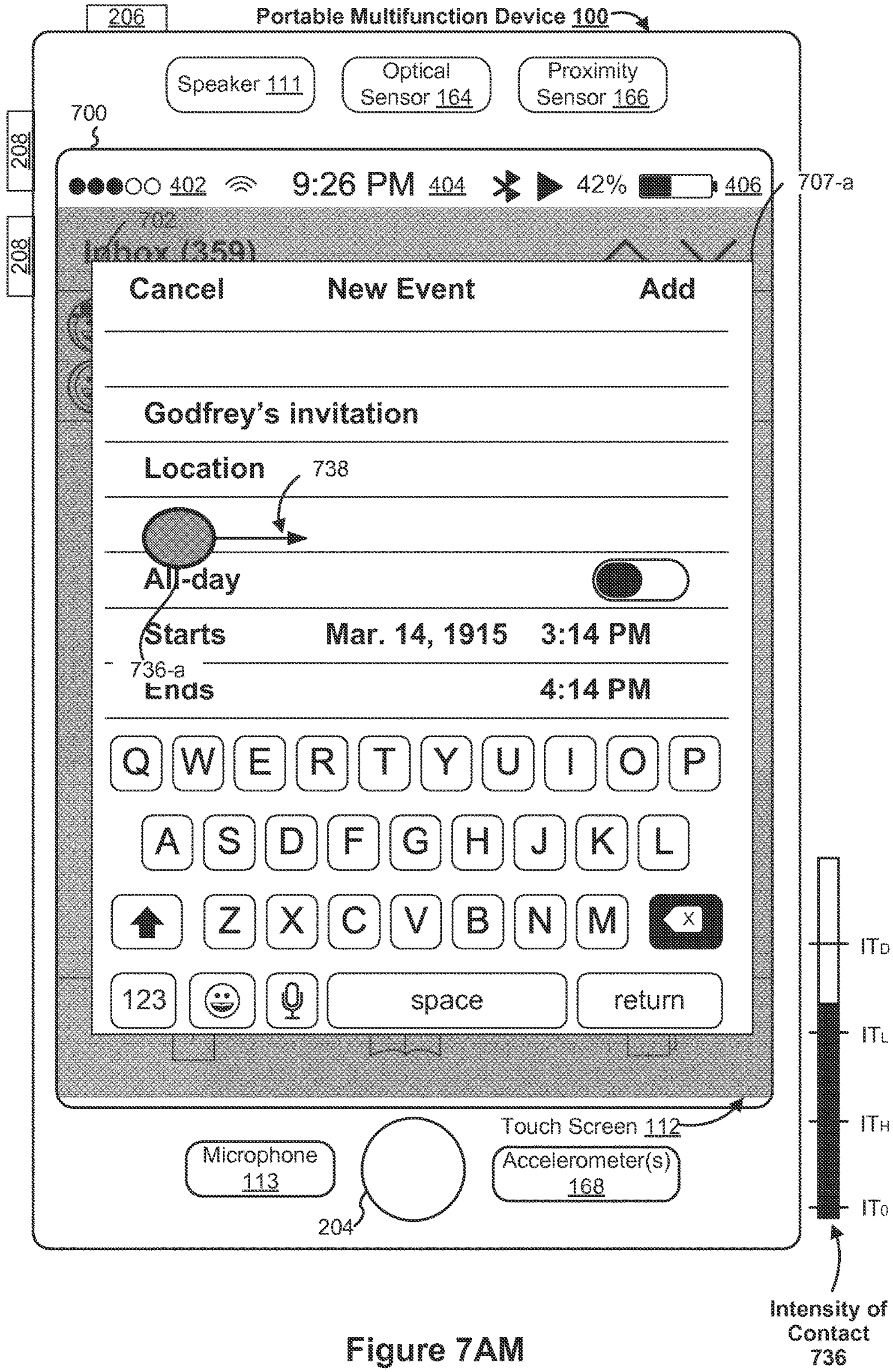
Figure 7A:
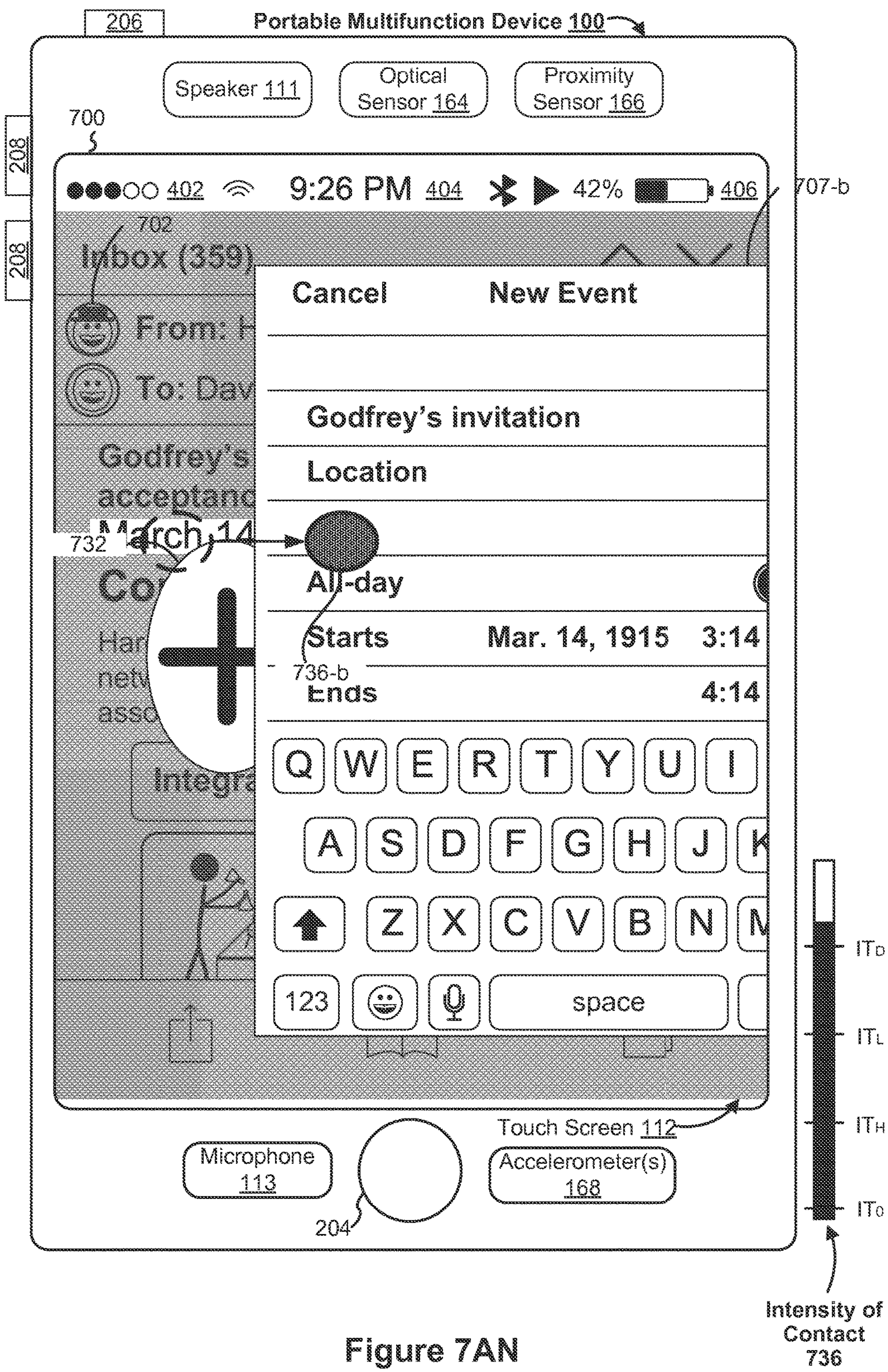
Figure 7A:
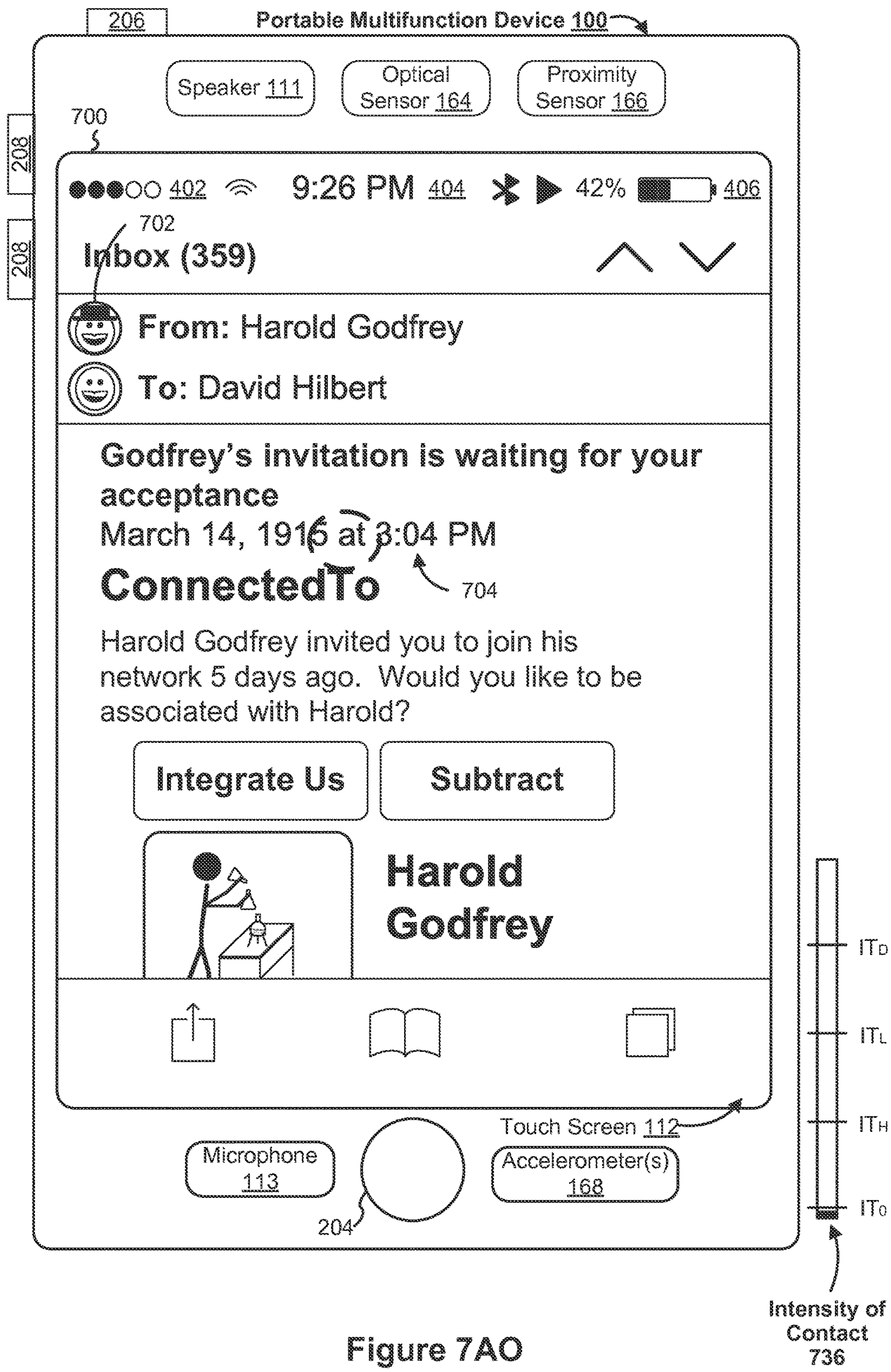
Figure 7A:
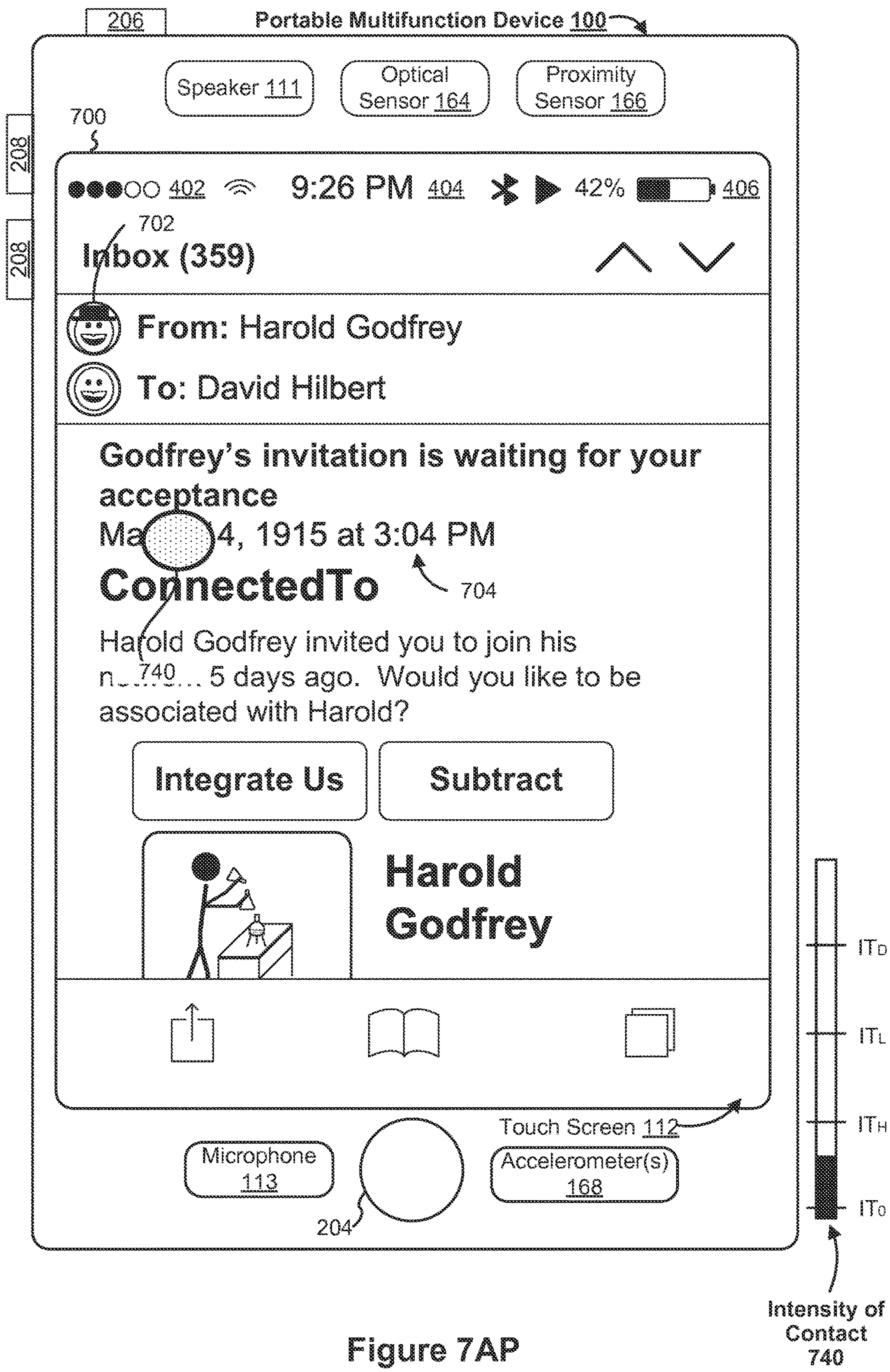
Figure 7A:
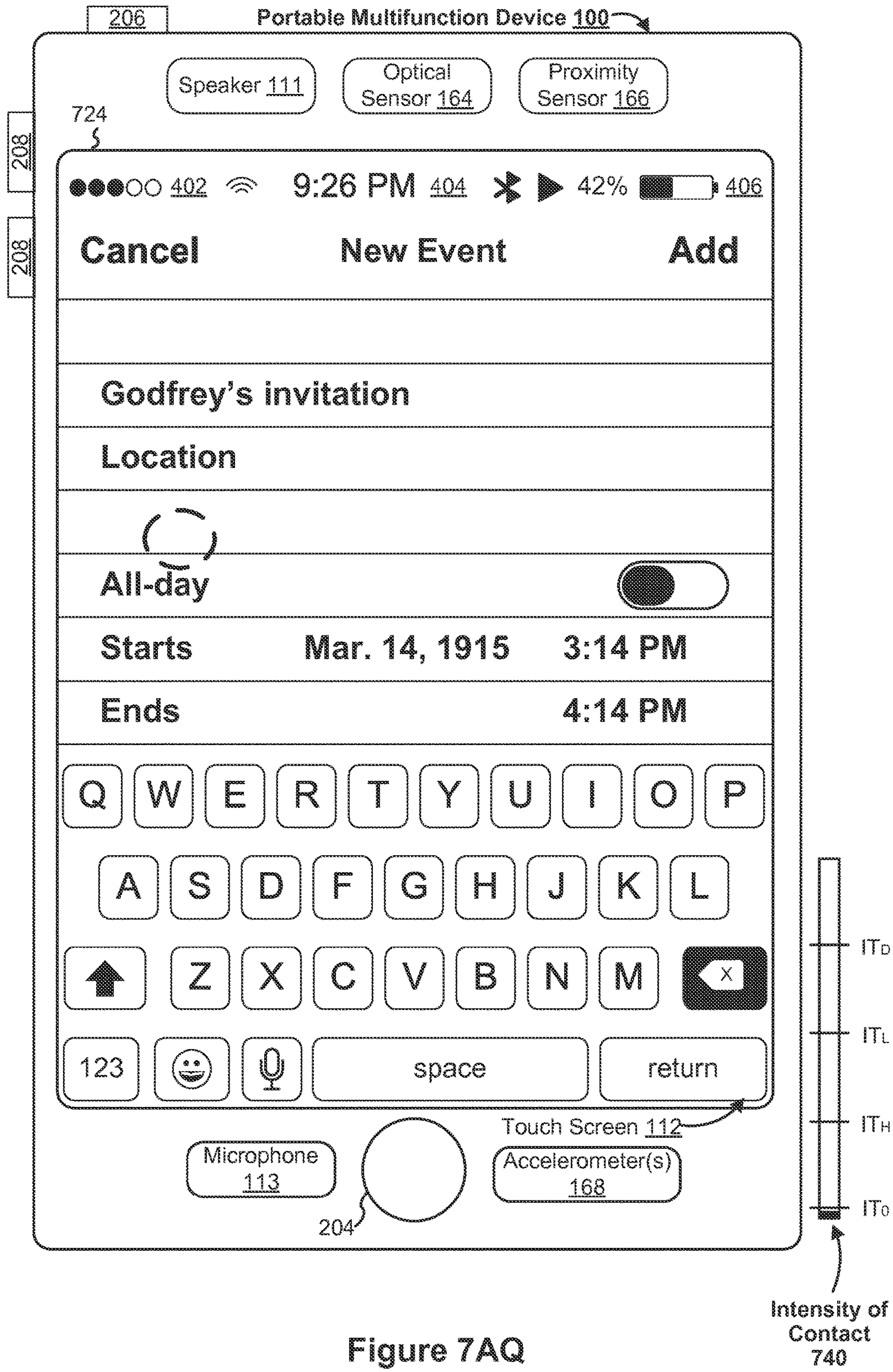

FIGS. 7Z-7AE illustrate an embodiment where the user previews the potential new event in the calendar event, and then creates the calendar event, in a single gesture without navigating away from the email messaging application. In FIG. 7Z, the device 100 detects contact 728 on date and time 704, with an intensity below the intensity threshold required to invoke the preview of the potential new event (e.g., $IT_L$). In FIG. 7AA, the device displays preview area 707 in response to detecting an increase in the intensity of contact 728 above the preview-area invoking threshold (e.g., $IT_L$). The device also displays caret 729, indicating that one or more actions associated with the preview area can be revealed by swiping right on touch screen 112. In FIG. 7AB, the user begins moving contact 728 (via movement 730) to the right on touch screen 112. In response, preview area 707 moves with the contact, gradually revealing action icon 732 from under the preview area in FIGS. 7AC-7AD. As illustrated in FIG. 7AC, navigation to the calendar application by further increasing the intensity of contact 728 (e.g., as illustrated in FIGS. 7R-7S) is disabled by the movement of the contact. As the user continues to move preview area 707 to the right, the color of action icon 732 changes, indicating to the user that the associated action (e.g., creating the calendar event based on the information provided in the email viewed in user interface 700) is active for performance upon termination of the contact, as illustrated in FIG. 7AD. As illustrated in FIG. 7AE, the device terminates display of preview area 707 and creates the new event (not shown) when the user lifts contact 732 off of touch screen 112 while the action associated with action icon 732 is active.

In contrast, FIGS. 7AF-7AJ illustrate an embodiment where the same swipe input that created the calendar event in FIGS. 7Z-7AE is inactive when performed on a contact icon (e.g., a user interface object associated with a quick action menu). In FIG. 7AF, the device 100 detects contact 732 on contact icon 702, with an intensity below the intensity threshold needed to invoke the quick-action menu (e.g., $IT_L$). In FIG. 7AG, the device displays quick-action menu 710 in response to detecting an increase in the intensity of contact 732 above the quick-action menu threshold (e.g., $IT_L$). In FIG. 7AH, the user begins moving contact 732 (via movement 734) to the right on touch screen 112. However, unlike date and time 704, image icon 702 is not associated with an action upon detecting movement of the activating contact to the right. Thus, device 100 merely maintains display of quick-action menu 710 after detecting movement of contact 732 in FIG. 7AI and liftoff in FIG. 7AJ.

FIGS. 7AK-7AO illustrate an embodiment where the user begins to create a new calendar event while navigating in the email messaging application, but stops short of reaching the positional threshold required to activate the creation action. In FIG. 7AK, the device 100 detects contact 736 on contact icon 702, with an intensity below the intensity threshold required to invoke the preview of the email (e.g., $IT_L$). In FIG. 7AL, the device displays preview area 707 in response to detecting an increase in the intensity of contact 736 above the preview-area invoking threshold (e.g., $IT_L$). In FIG. 7AM, the user begins moving contact 736 (via movement 738) to the right on touch screen 112. In response, preview area 707 moves with the contact, partially revealing action icon 732 from under the preview area 707 in FIG. 7AN. The device then restores display of email viewing user interface 700 to the state prior to detection of contact 736 upon liftoff, in FIG. 7AO, because the user did not swipe preview area 707 far enough to the right (e.g., as indicated by action icon 732, which does not switch color in FIG. 7AN).

FIGS. 7AP-7AQ illustrate that a tap gesture (e.g., via contact 740 in FIG. 7AP) on date and time 704 causes the device to navigate to the same calendar user interface 724 (as illustrated in FIG. 7AQ) that is previewed in preview area 707 (e.g., as illustrated in FIG. 7E).

Figure 8A:
FIGS. 8A-8BK illustrate exemplary user interfaces for dynamically changing a background of a user interface in accordance with some embodiments.
Figure 8B:
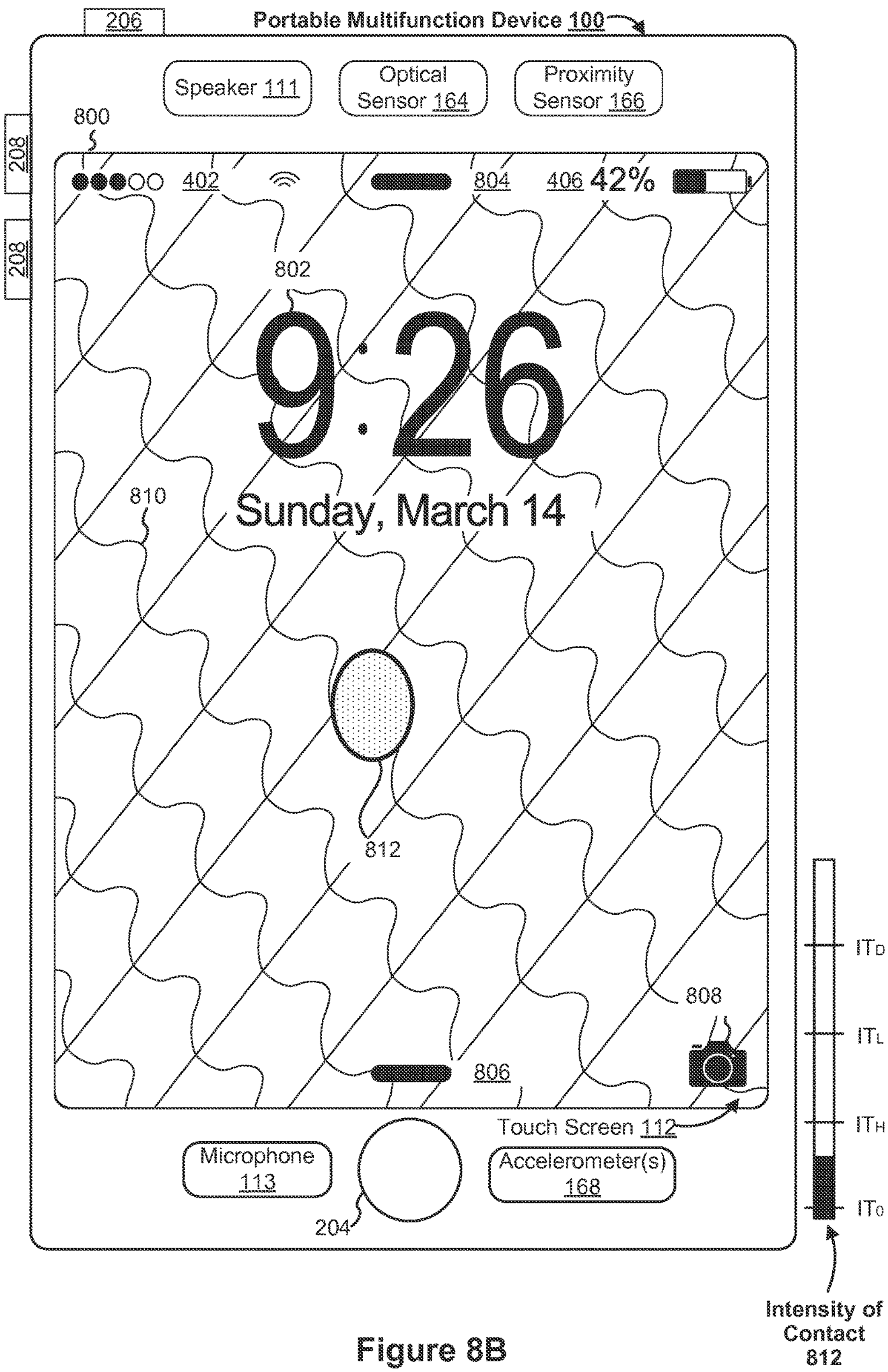

FIGS. 8A-8BE illustrate exemplary embodiments of a user interface that teaches a user how interact with a touch-force user interface, in accordance with some embodiments. In some embodiments, this is achieved by providing a user interface (e.g., a lock screen) that is responsive to contacts having increased intensity, without invoking performance of actions (e.g., other than providing visual, audible, or tactile feedback) on the device. Although some of the examples which follow will be given with reference to a lock screen user interface, in some embodiments, the methods are implemented within any application, as described herein.

The user interfaces in these figures are used to illustrate the processes described below. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 8A-8AQ and 8AU-8BE illustrate an exemplary user interface 800 for a lock screen on device 100. The lock screen user interface displays background elements 810, consisting of a repeated geometric shape, and plurality of foreground user interface objects (e.g., time and date 802, handle icon 804 for navigating to a notification user interface, handle icon 806 for navigating to settings control center user interface, and camera icon 808 for navigating to an image acquisition user interface). In some embodiments, the background elements of lock screen user interface 800 are responsive to contacts having an intensity above a predetermined intensity threshold (e.g., a "hint" threshold $IT_H$, a "peek" threshold $IT_L$, and/or a "pop" threshold $IT_D$). In some embodiments, one or more of the foreground elements are not responsive to contacts having intensities above a predetermined threshold. In some embodiments, one or more of the foreground elements are responsive such contacts in a different manner than are the background elements 810.

Figure 8C:
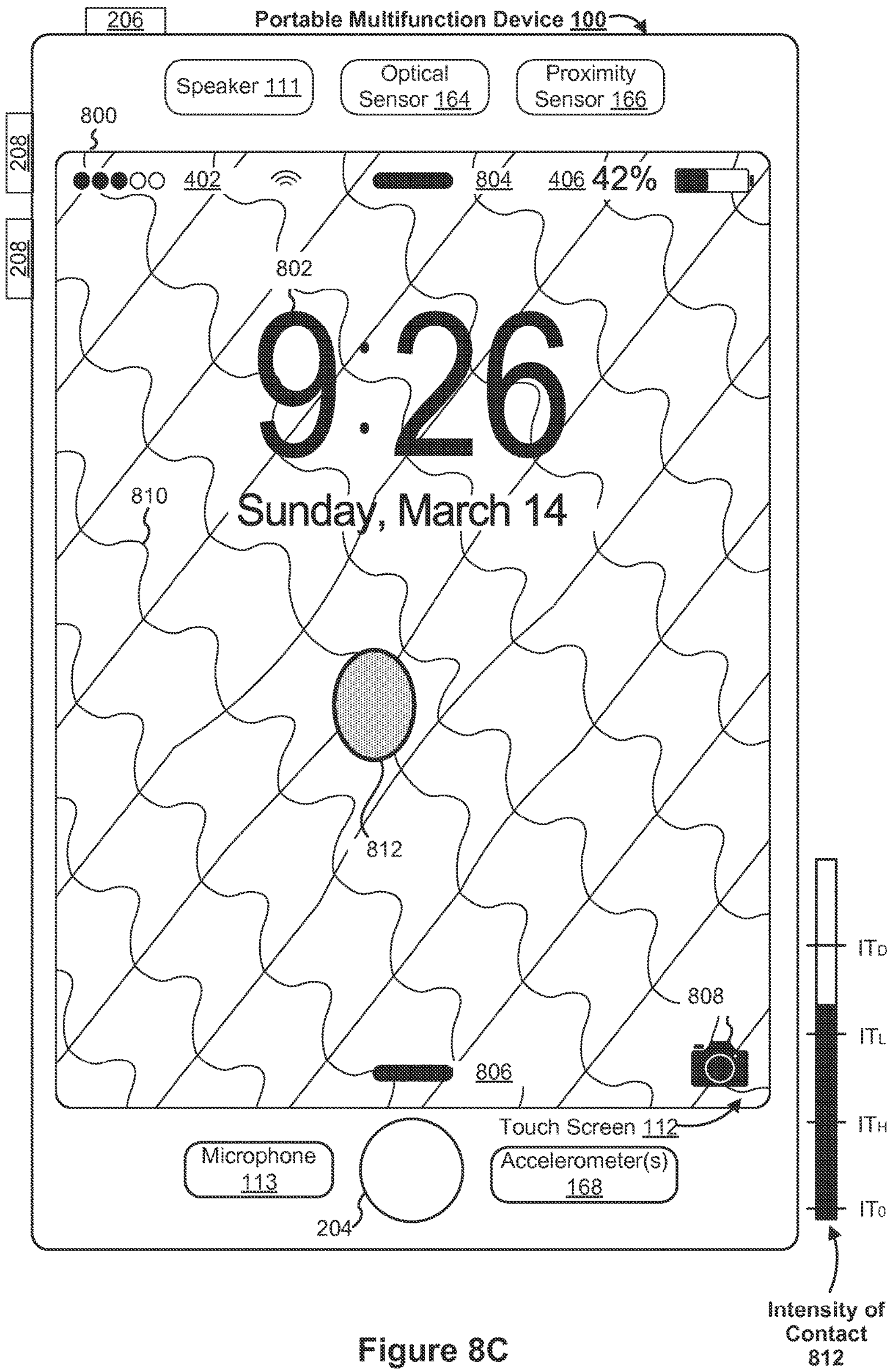
Figure 8D:
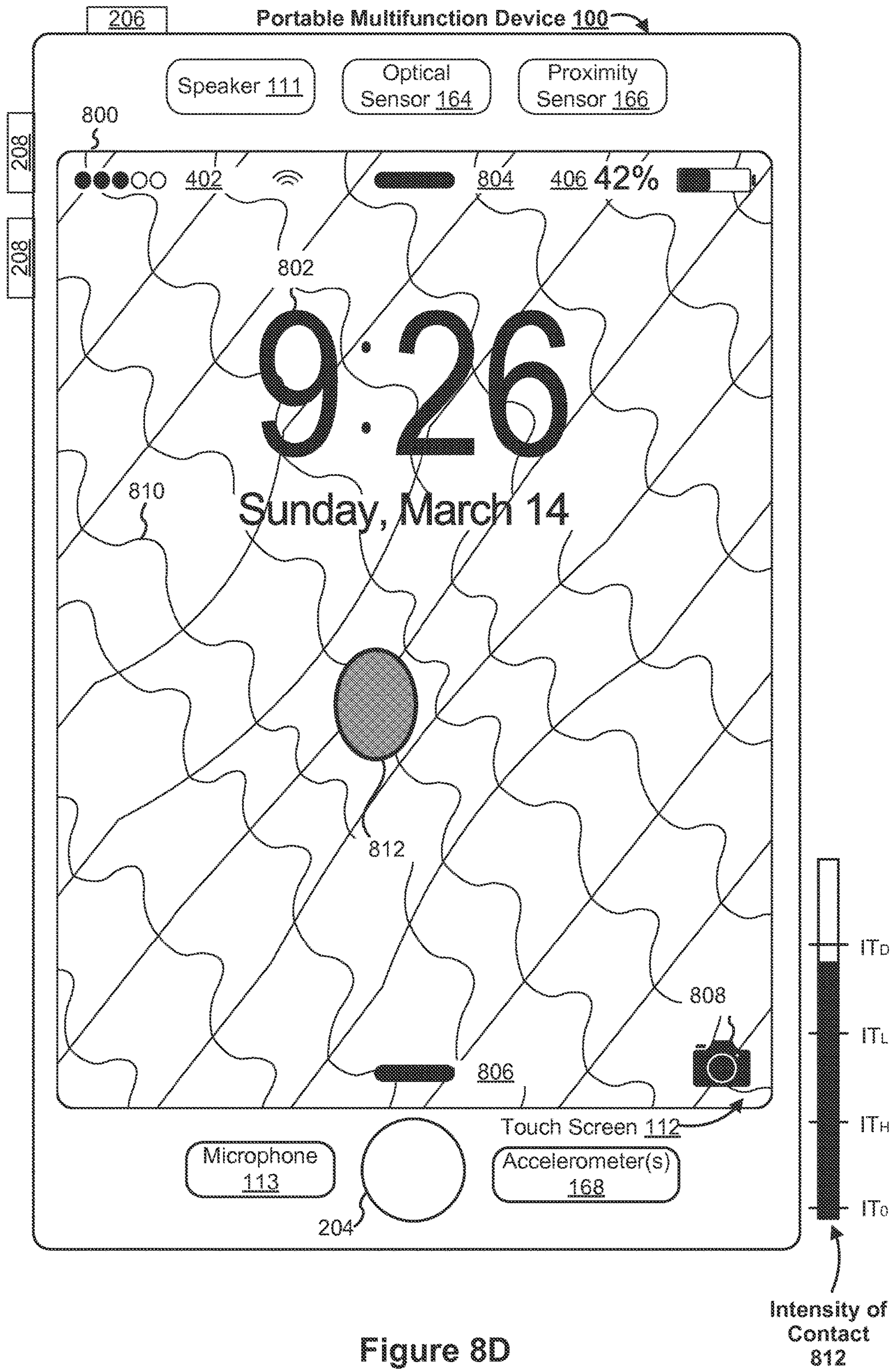
Figure 8E:
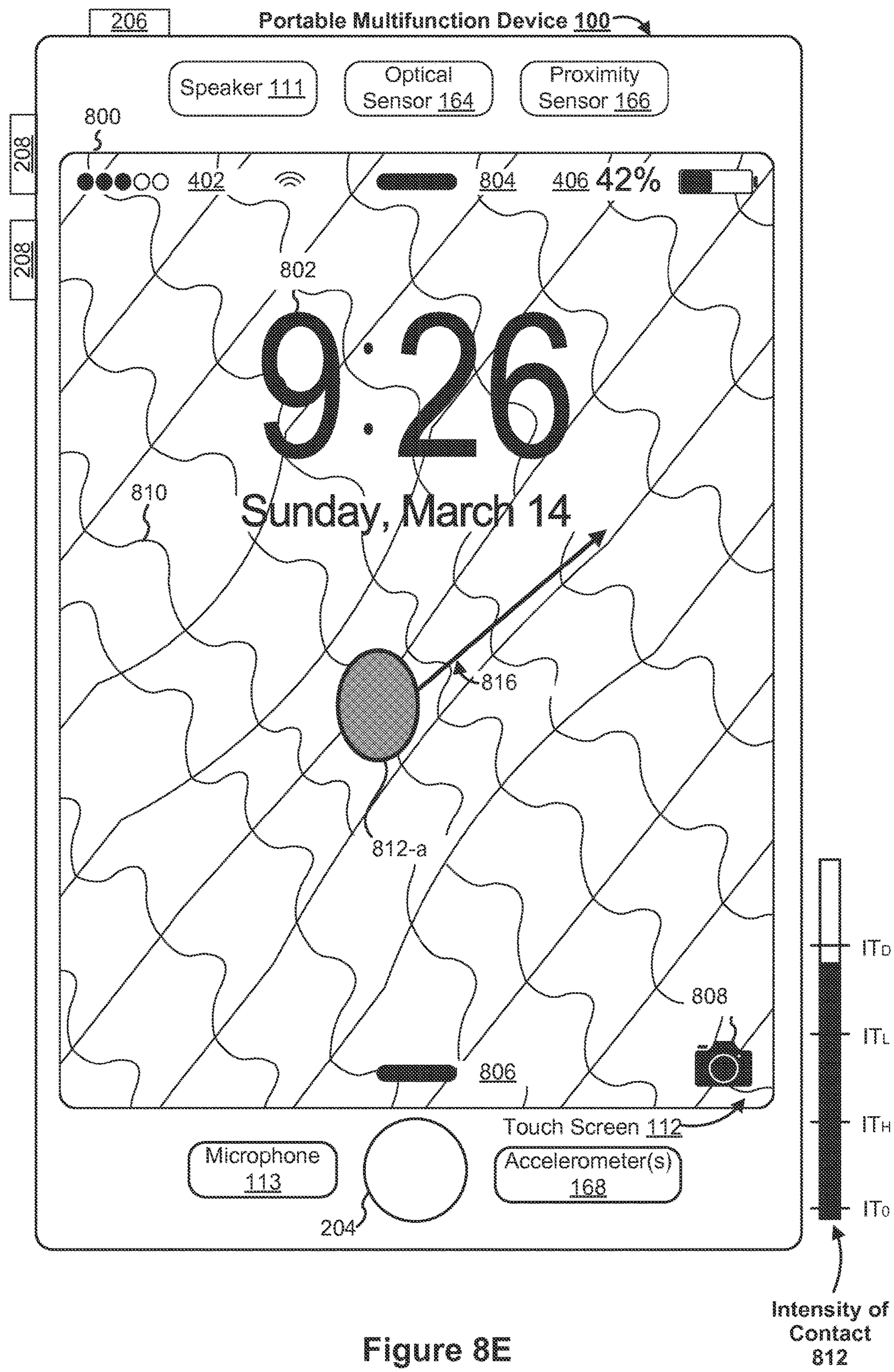
Figure 8F:
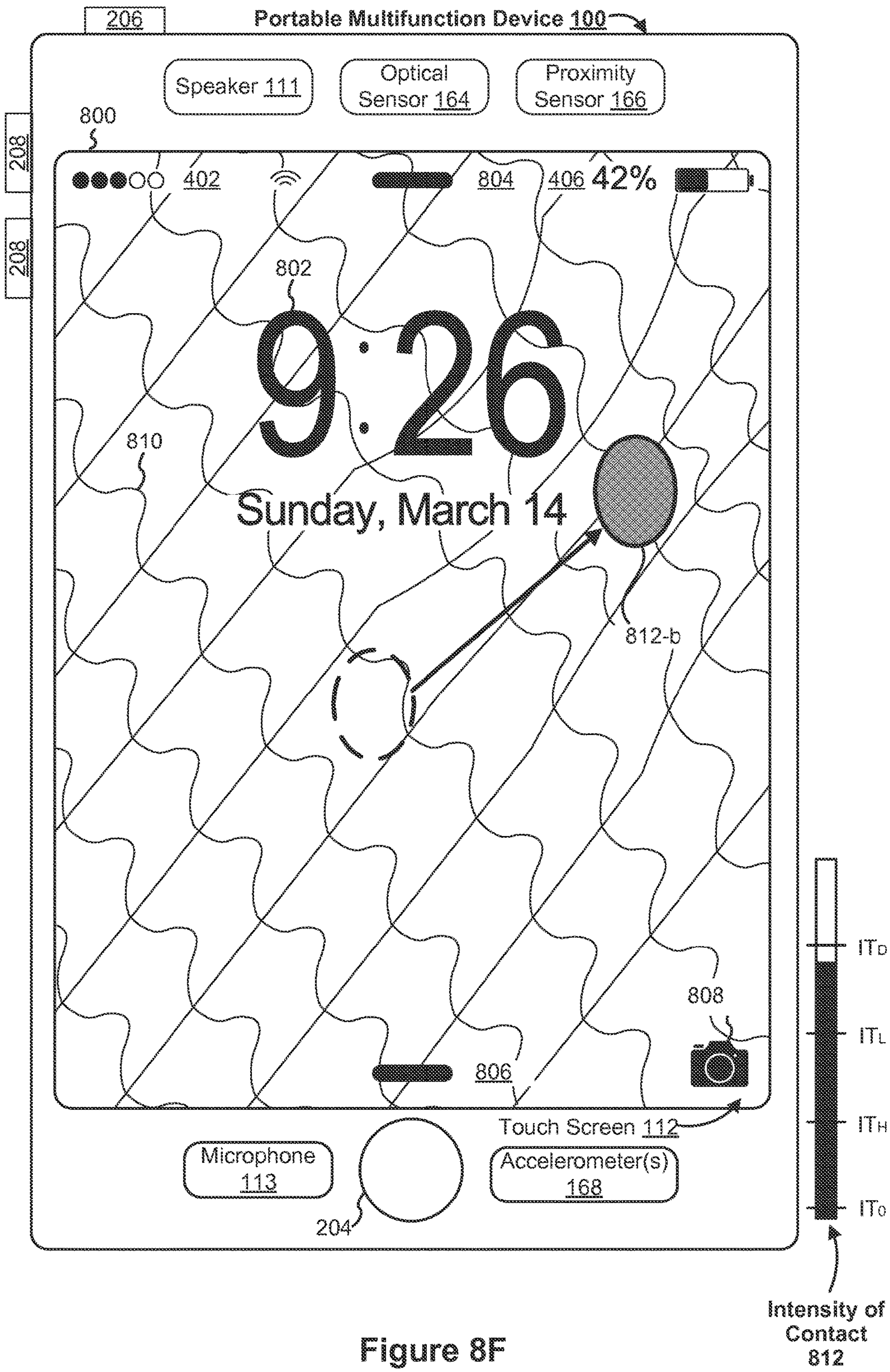
Figure 8G:
Figure 8H:
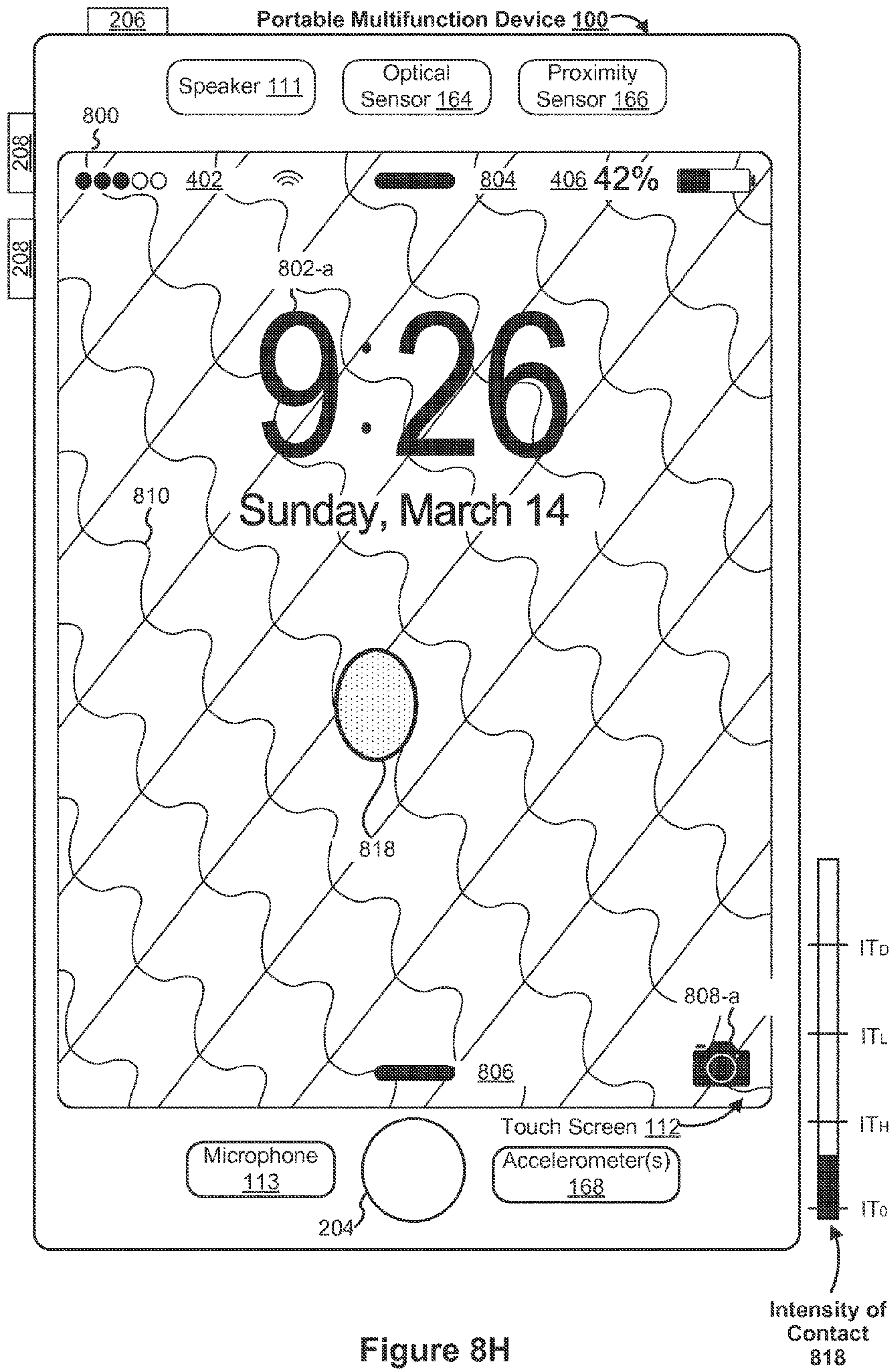
Figure 8I:
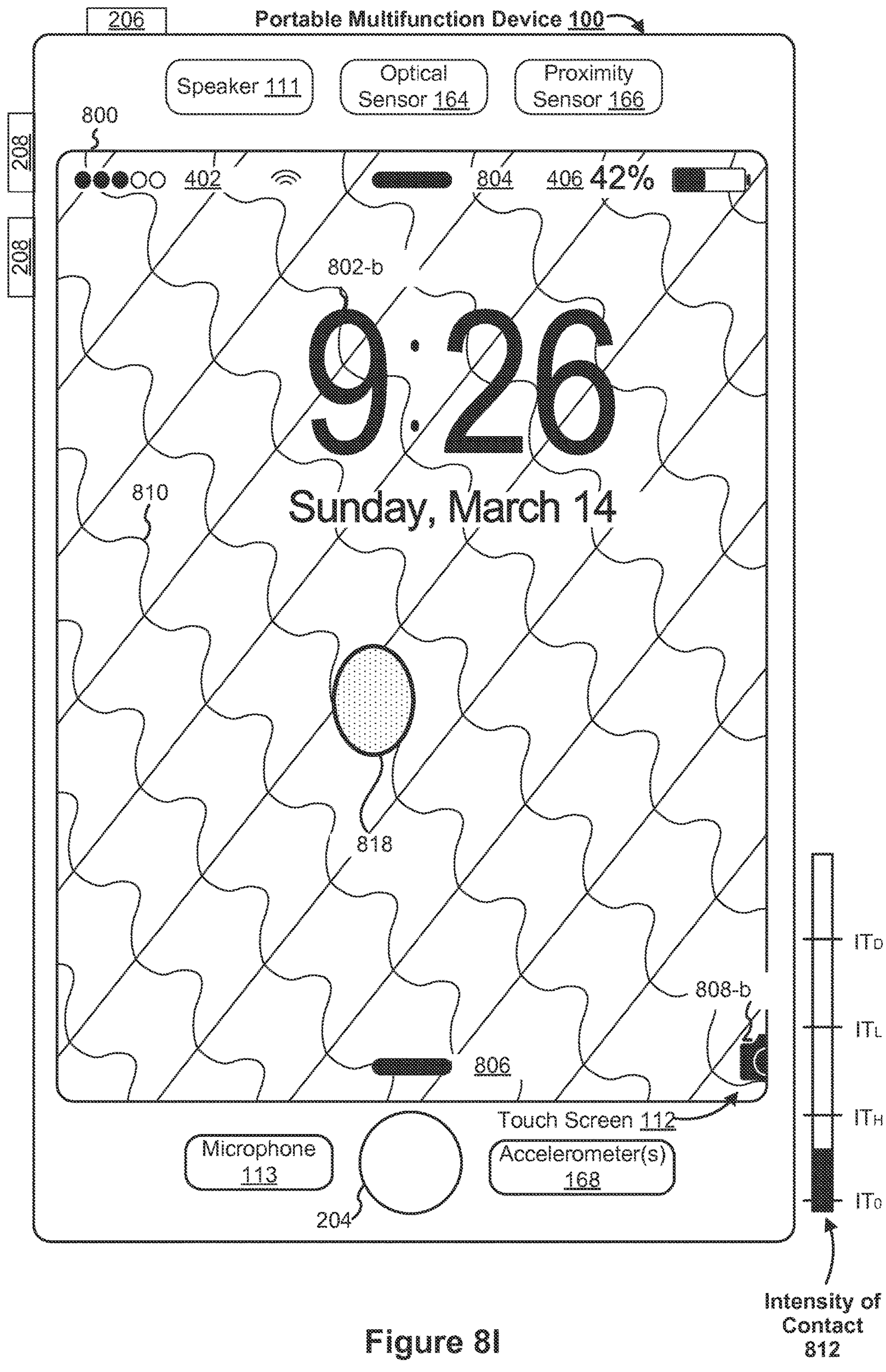

FIGS. 8A-8I illustrate an embodiment where the background of user interface changes in response to a detecting a contact with an intensity above a predetermined threshold. FIG. 8A illustrates lock screen user interface 800 on device 100, which includes background elements 810 and a plurality of foreground elements (e.g., time and date 802, handle icon 804 for navigating to a notification user interface, handle icon 806 for navigating to settings control center user interface, and camera icon 808 for navigating to an image acquisition user interface). In FIG. 8B, the device detects contact 812 over background elements 810, having an intensity below a predetermined intensity threshold (e.g., $IT_L$). Responsive to detecting an increase in the intensity of contact 812 above intensity threshold $IT_L$, background elements 810 appear to be pushed back (e.g., in virtual z-space) from touch screen 112 in FIG. 8C. This gives the appearance that the background of the lock screen user interface 800 is a virtual mesh that the user can interact with above a predetermined intensity threshold. As illustrated in FIG. 8D, the change in the appearance of the background is dynamically responsive to the intensity of the contact above the intensity threshold, as illustrated by pushing virtual mesh 810 further back from touch screen 112 with increasing contact intensity. FIGS. 8E-8F illustrate that the change in the appearance of the background is dependent upon the location of the contact on touch screen 112. As the user moves contact 812, the change in the appearance of virtual mesh 810 follows the contact. In response to lift off of contact 812, the appearance of the background reverts to the same state as before contact 812 was first detected, in FIG. 8G. In contrast, detection of contact 818, having an intensity below the intensity threshold, does not change the appearance of the background in FIGS. 8H-8I. As illustrated in FIG. 8I, contacts below the intensity threshold may still invoke actions of the foreground elements.

Figure 8J:
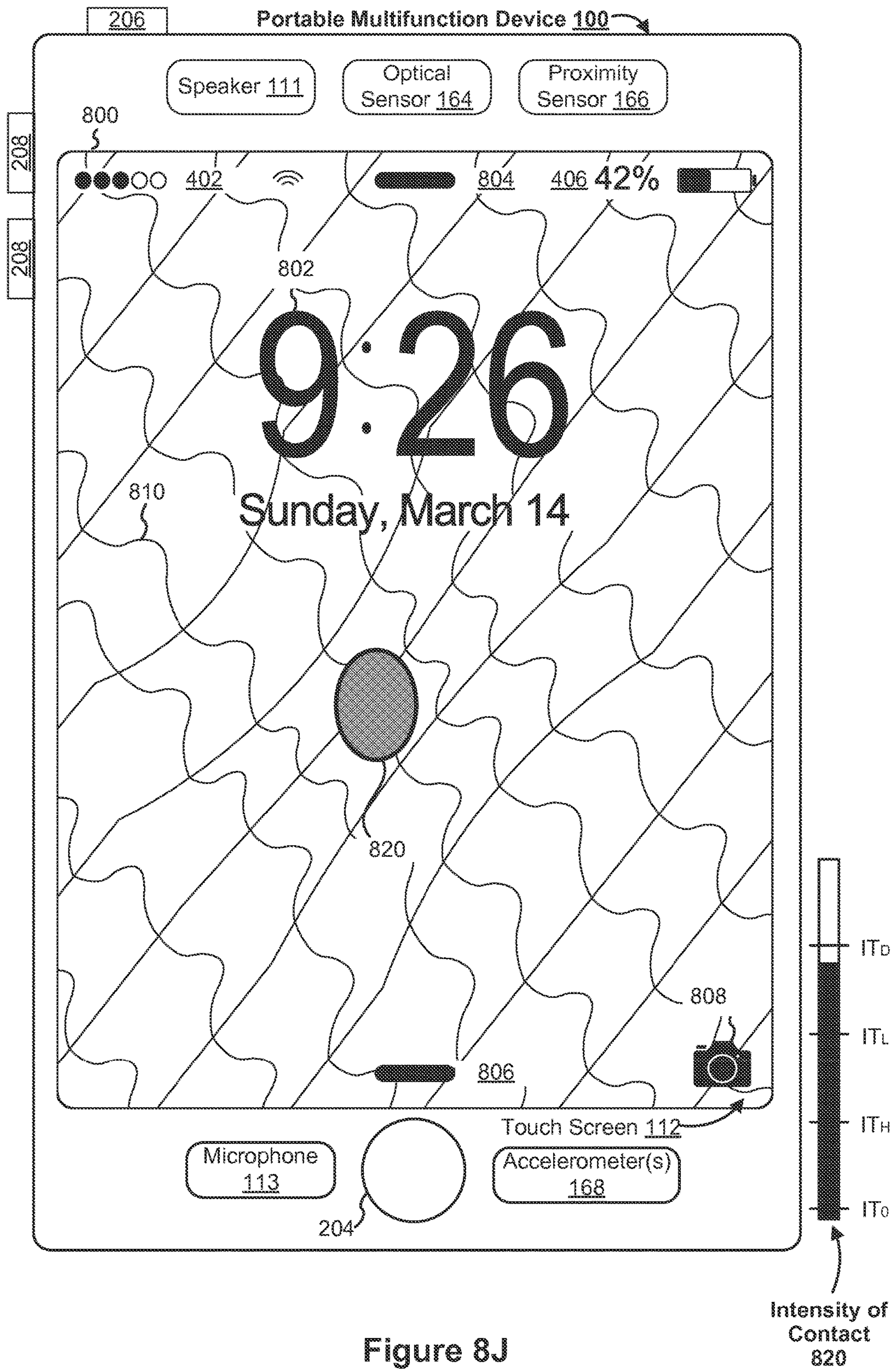
Figure 8K:
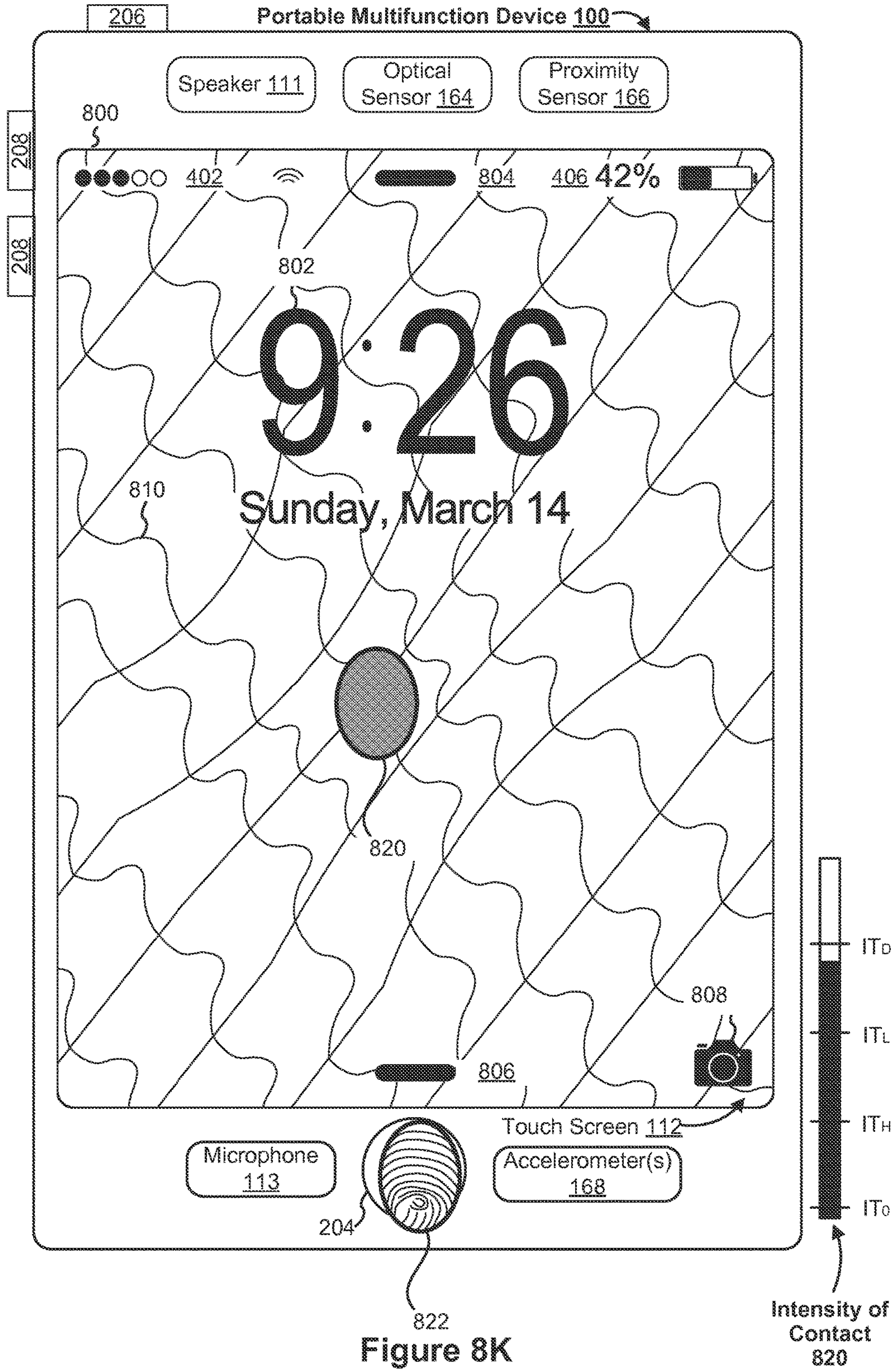
Figure 8L:
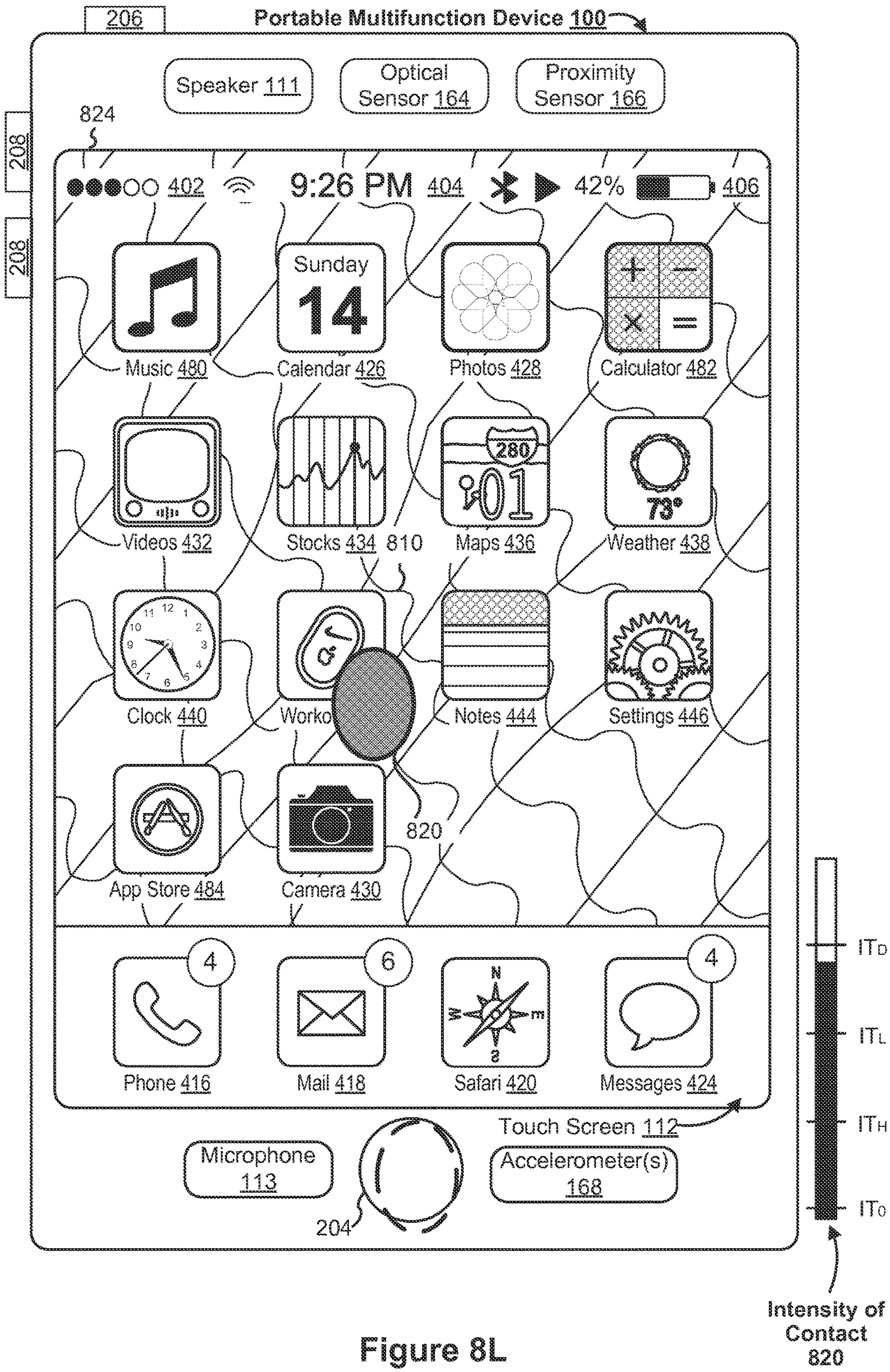
Figure 8M:
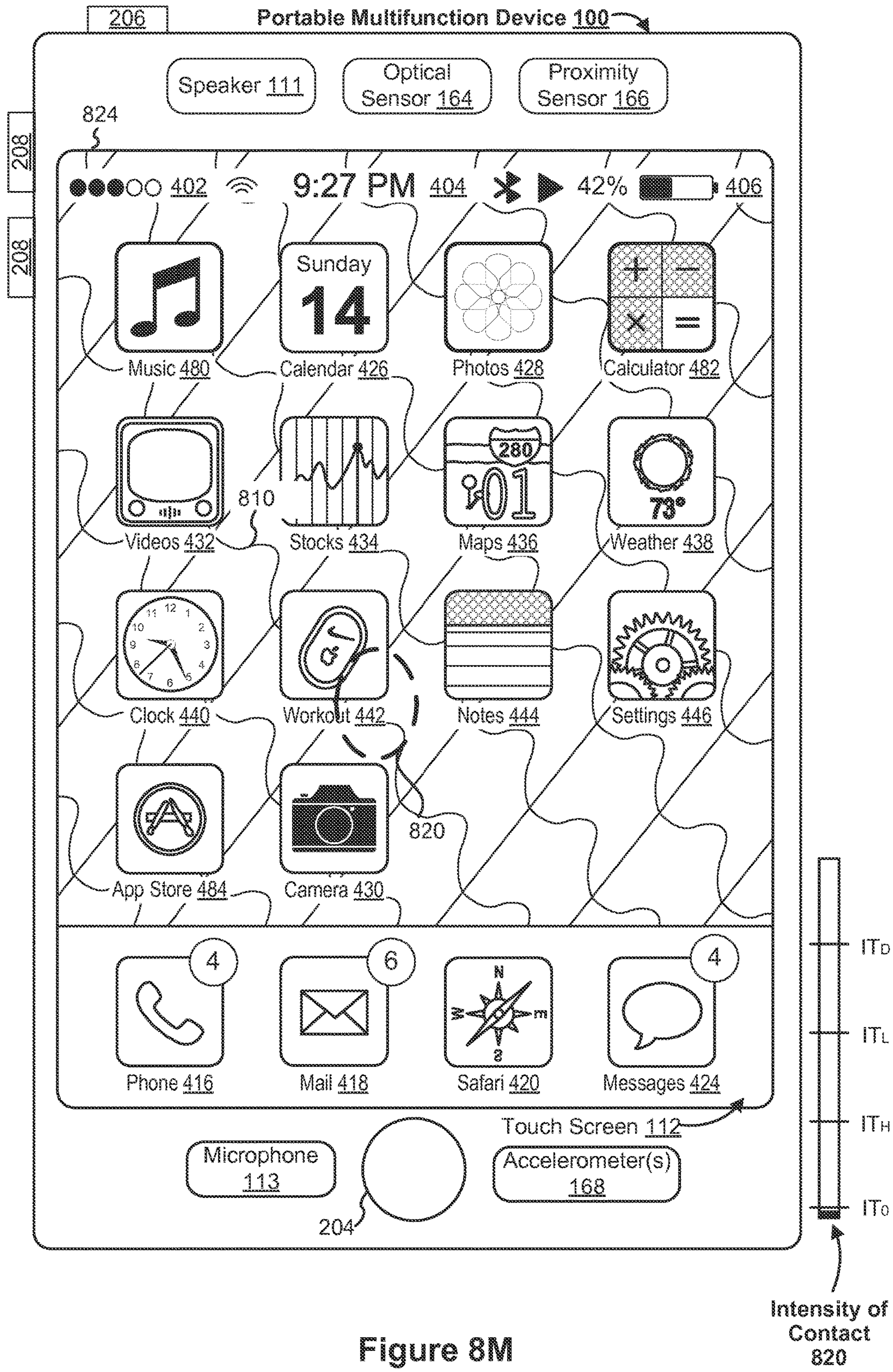
Figure 8N:
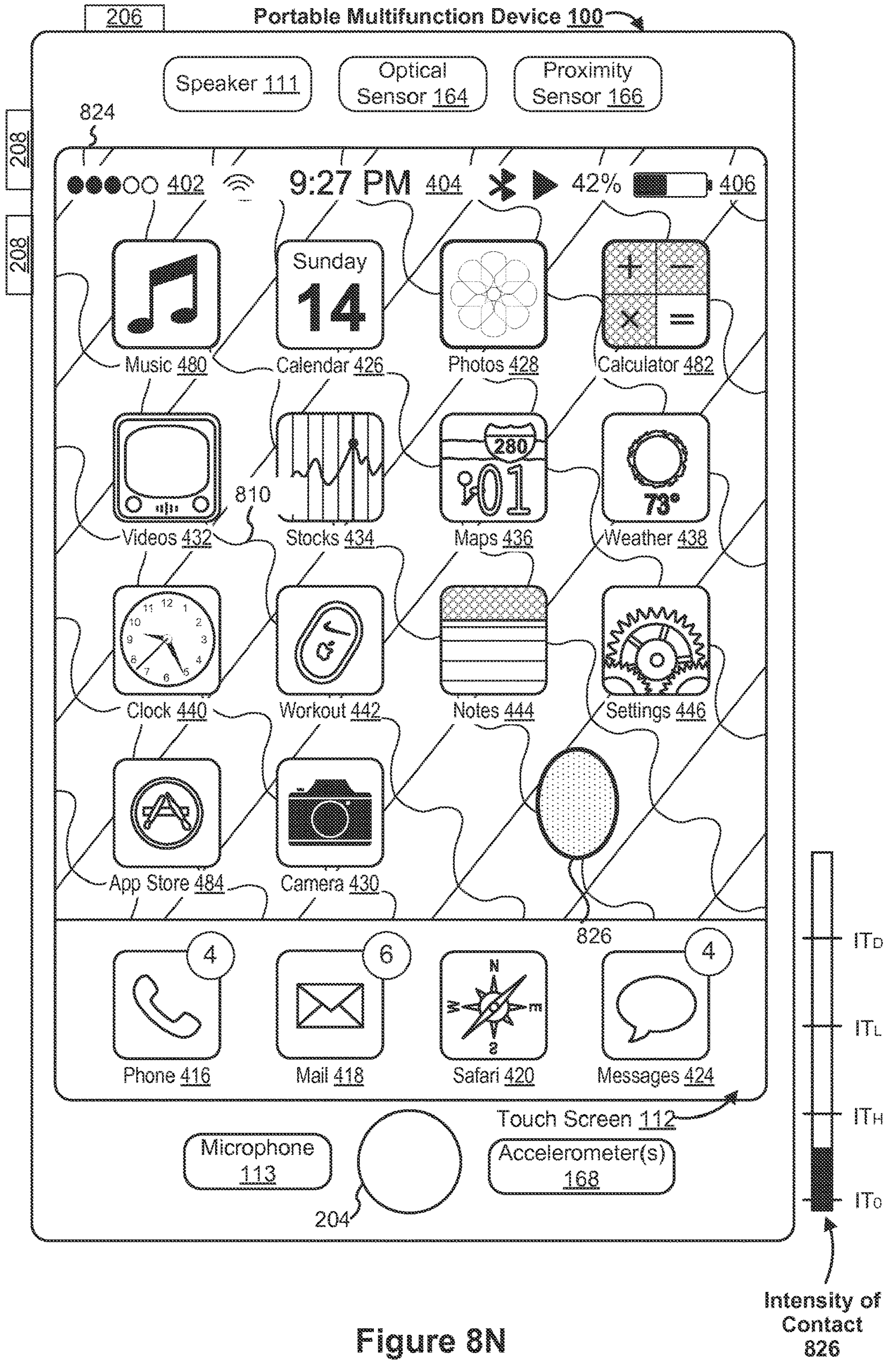
Figure 8O:
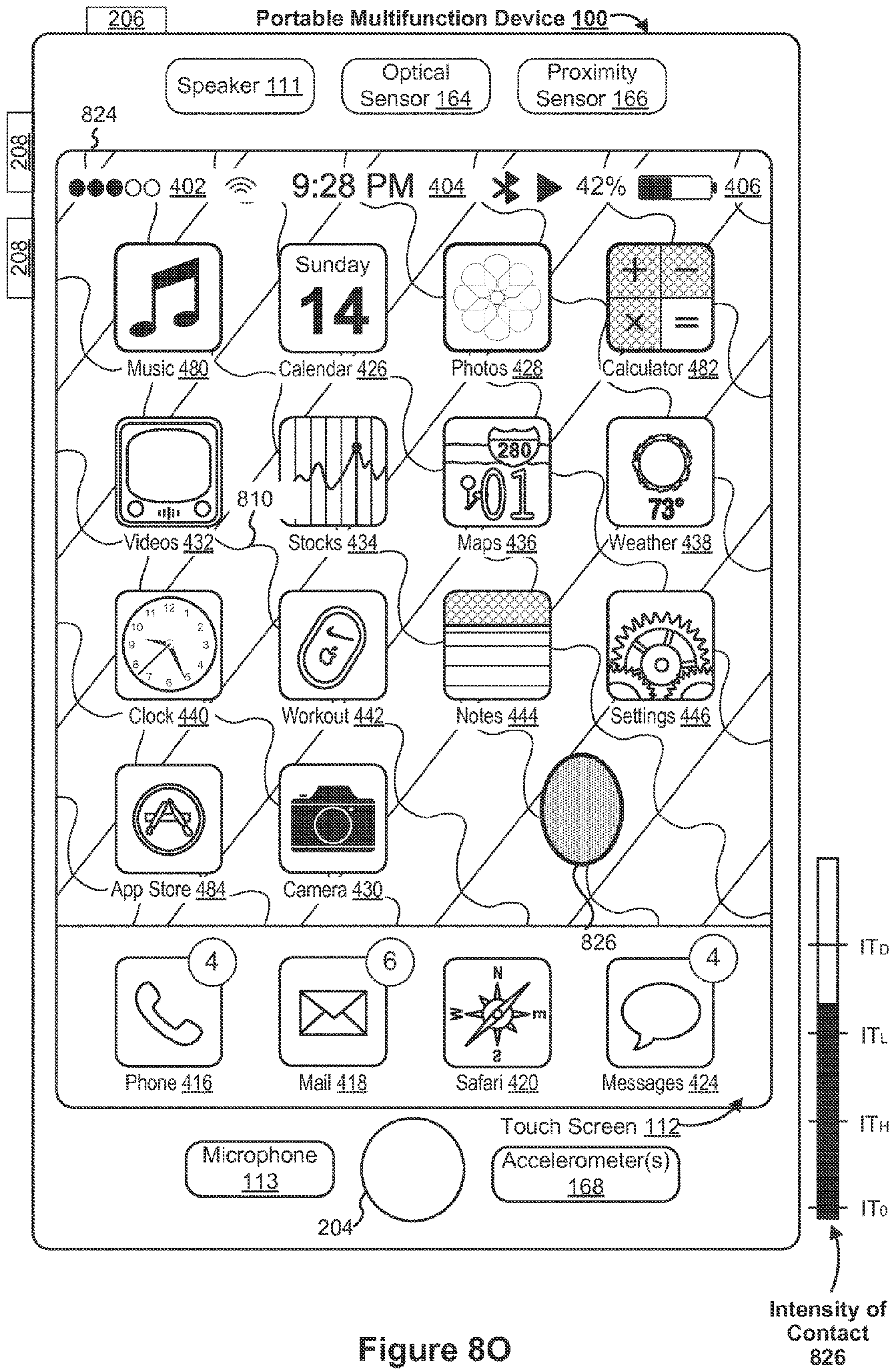
Figure 8P:
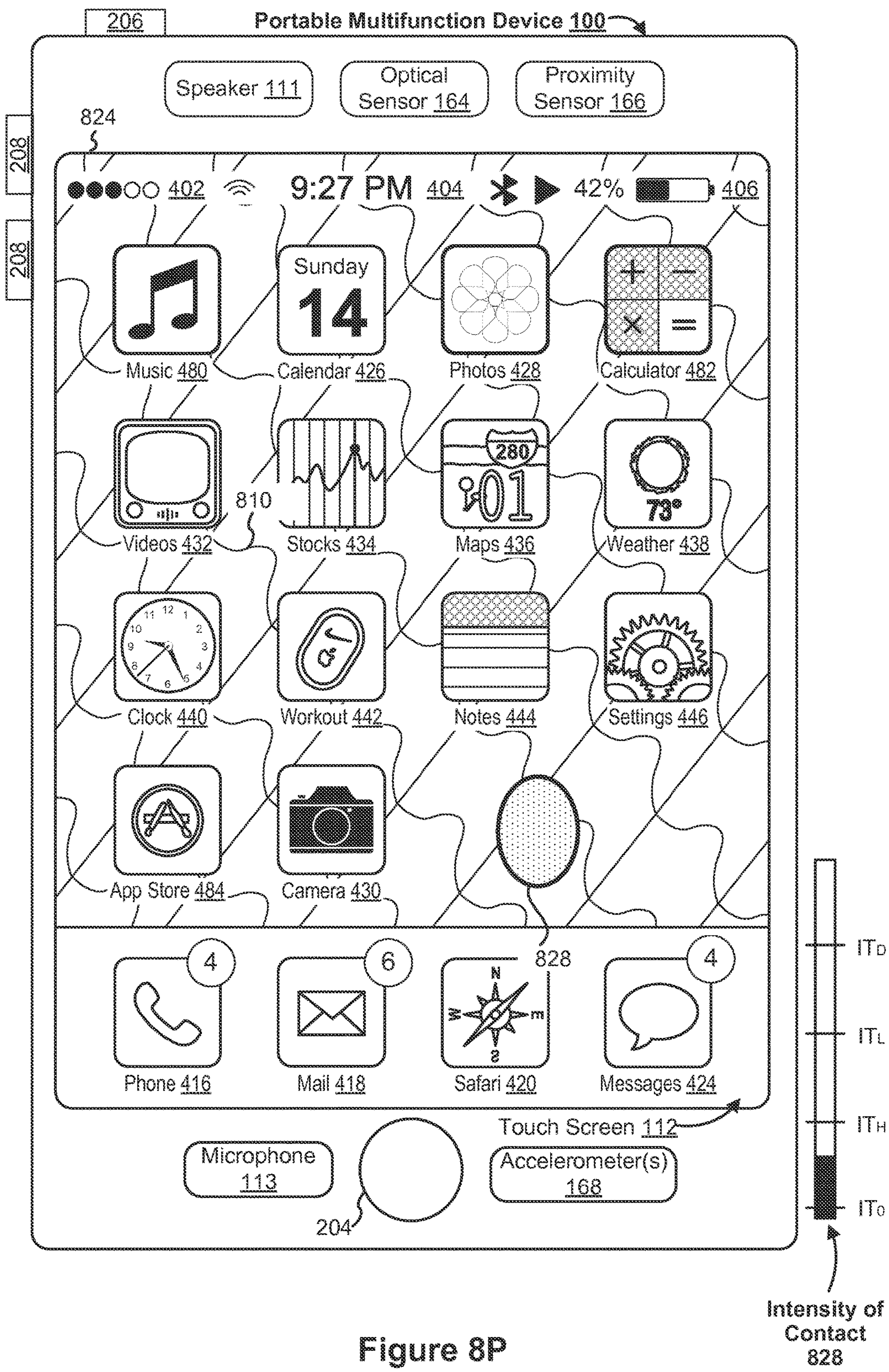
Figure 8Q:
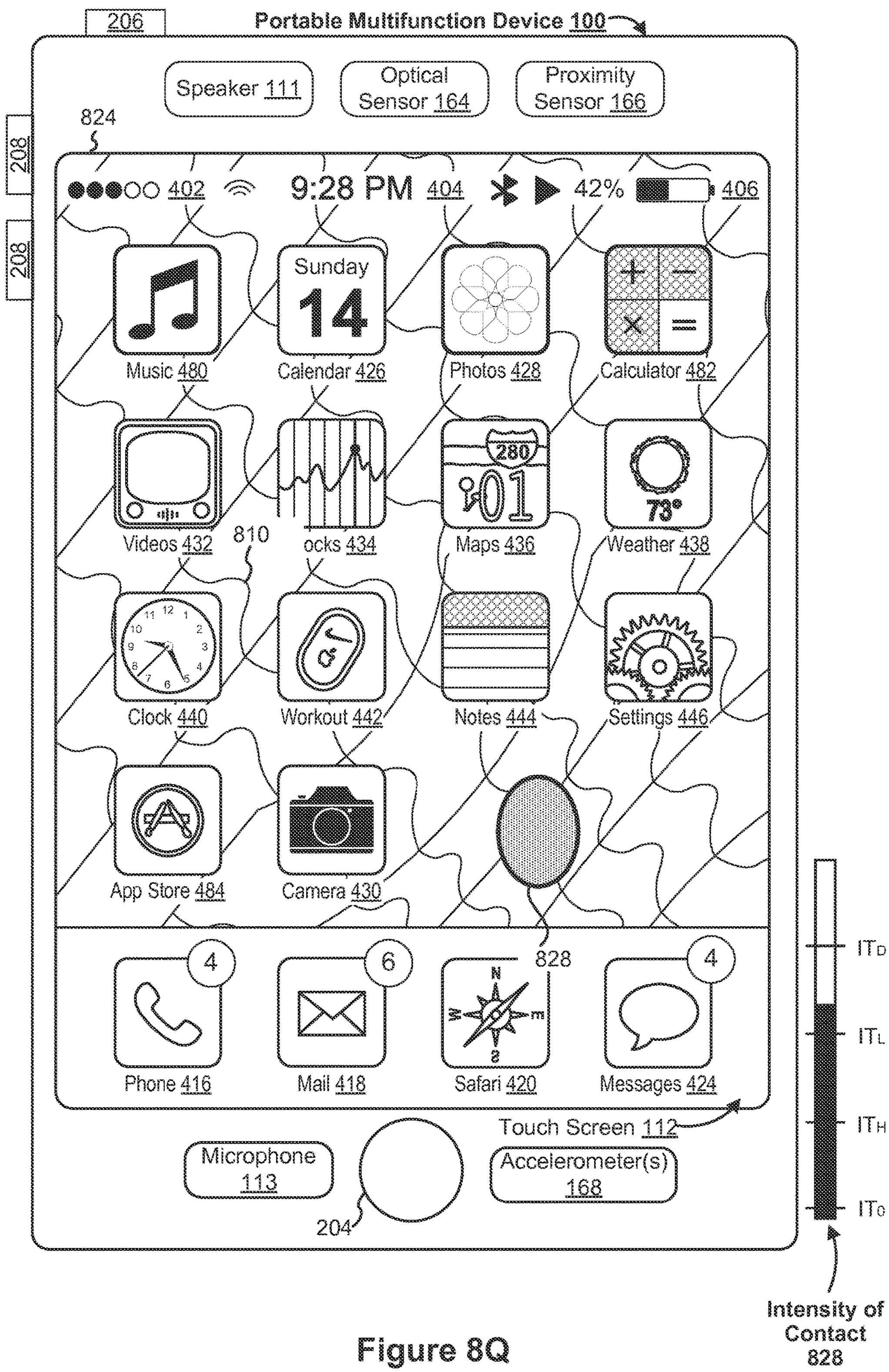
Figure 8R:
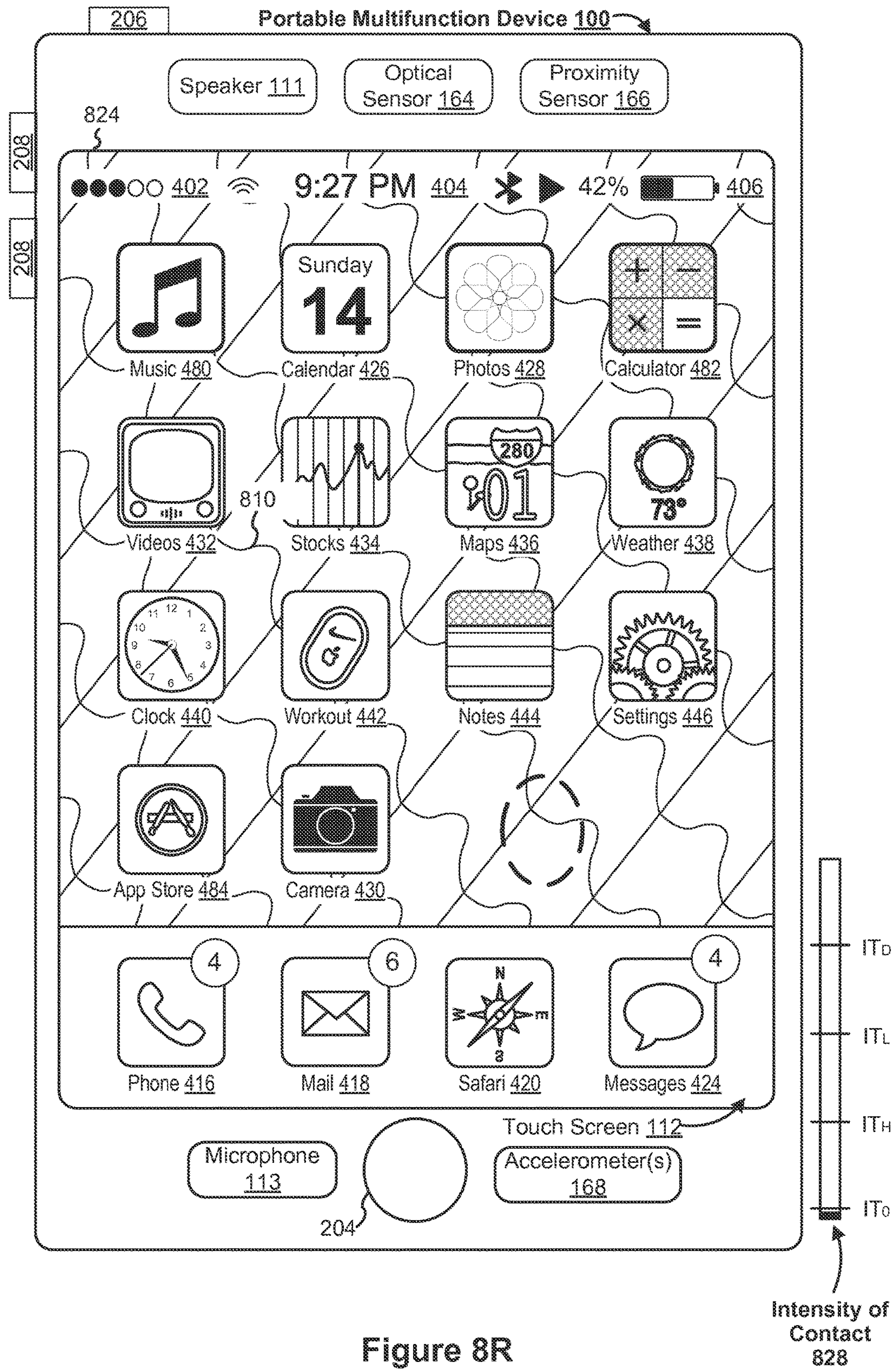

FIGS. 8J-8R illustrate embodiments where the device reverses an applied change in the appearance of the background after unlocking the device (e.g., navigating away from the lock screen user interface). In FIG. 8J, the appearance of the background of the lock screen is changed in response to contact 820 having an intensity above an intensity threshold (e.g., $IT_L$). In response to unlocking the device (e.g., using fingerprint recognition of contact 822 in FIG. 8K), the device navigates to home screen user interface 824, while maintaining the change in the appearance of the background in FIG. 8L. The device then reverses the change in the appearance of the background in response to detecting lift-off of contact 820, or after a predetermined period of time after navigating away from the lock screen user interface, as illustrated in FIG. 8M. As illustrated in FIGS. 8N-8N, in some embodiments, the background of the unlocked user interface (e.g., home screen user interface 824) is not responsive to further contacts (e.g., contact 826) having intensities above the intensity threshold. As illustrated in FIGS. 8P-8R, in some embodiments, the background of the unlocked user interface (e.g., home screen user interface 824) is responsive to further contacts (e.g., contact 828) having intensities above the intensity threshold.

Figure 8S:
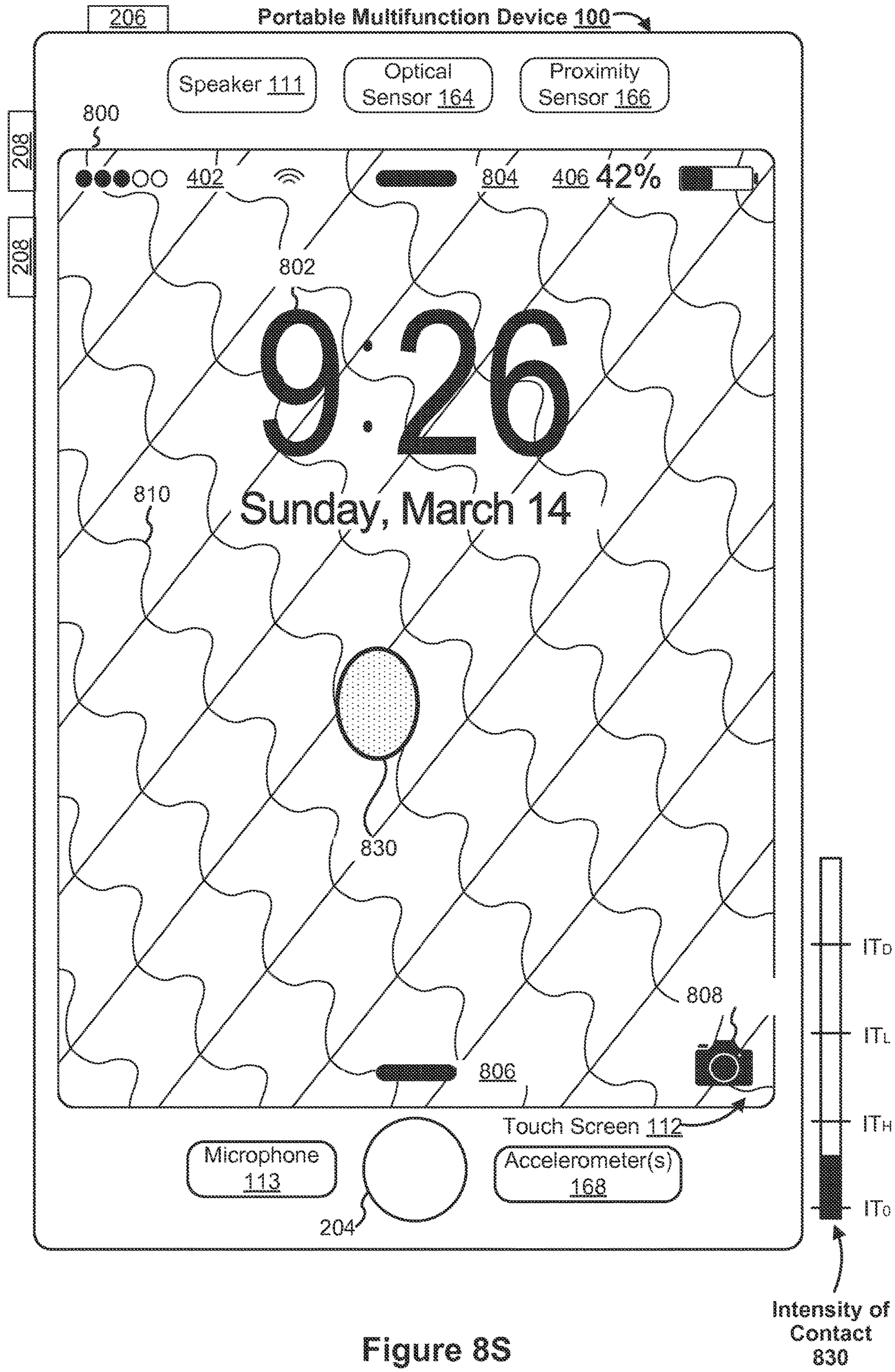
Figure 8T:
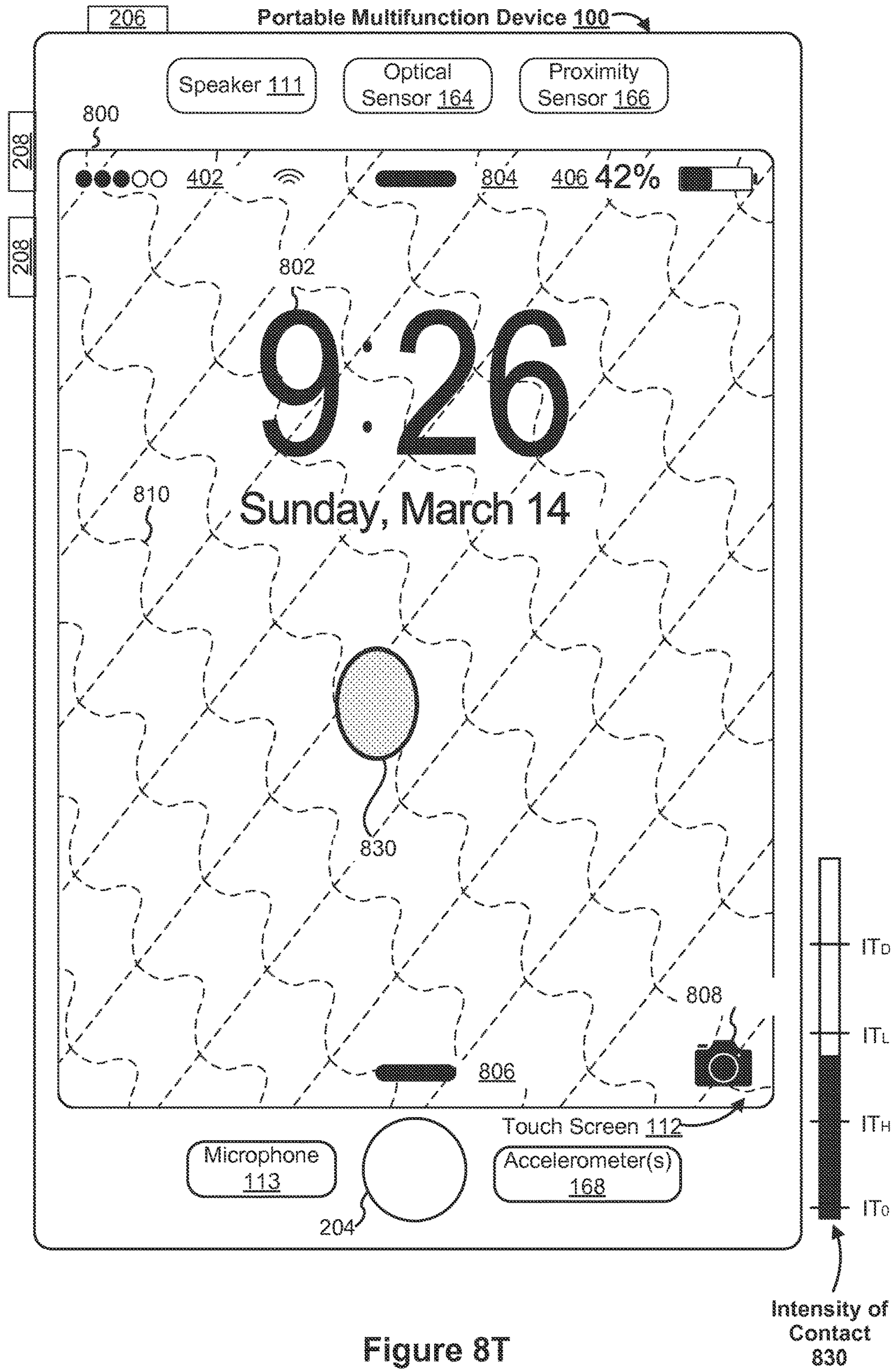
Figure 8U:
Figure 8V:
Figure 8W:
Figure 8X:
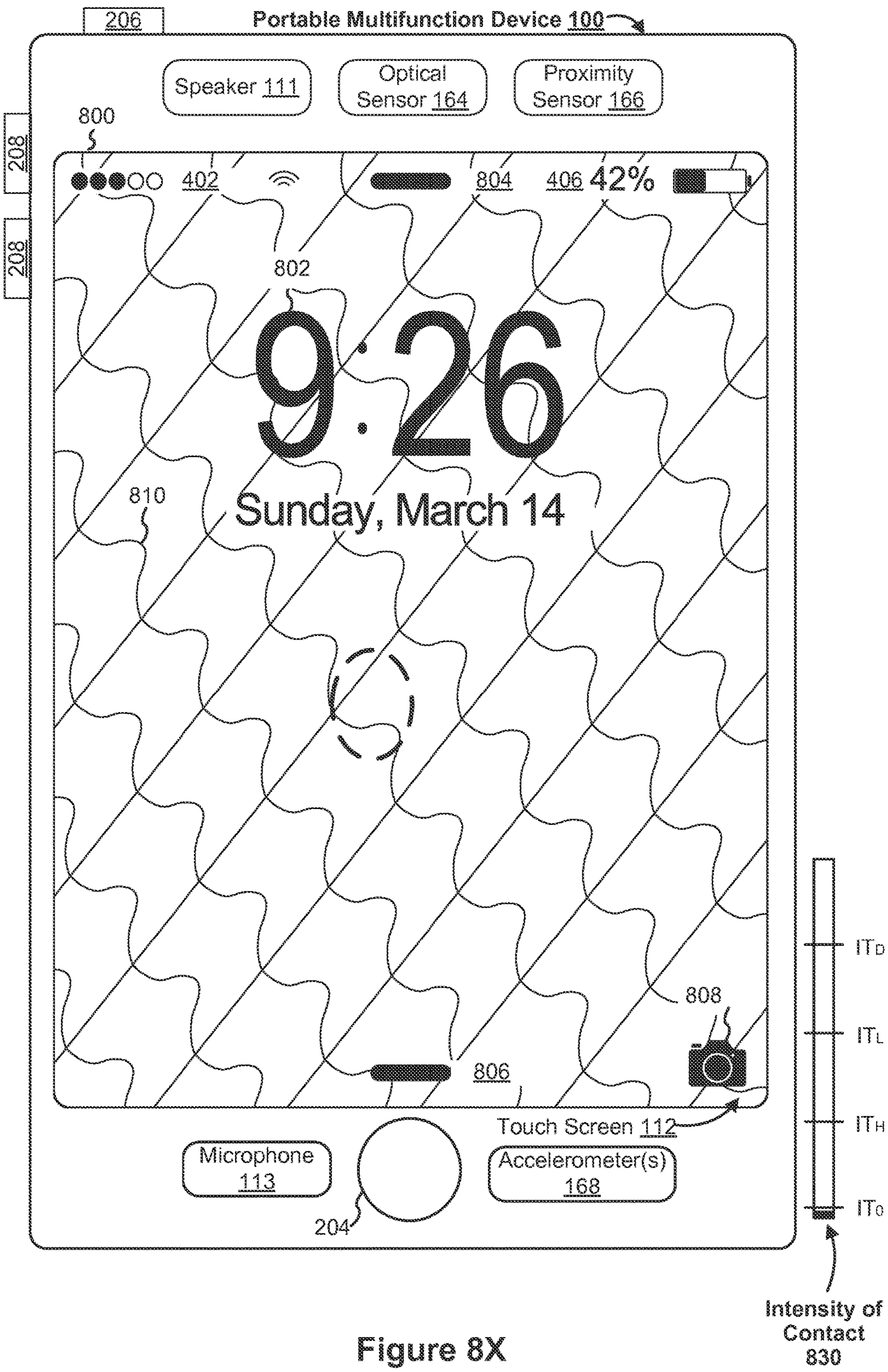

FIGS. 8S-8X illustrate embodiments where the appearance of the background of the lock screen in changes in different fashions in response to detecting contact intensities above different intensity thresholds. In FIG. 8S, the device detects contact 830 over the background, having an intensity below all three intensity thresholds $IT_H$, $IT_L$, and $IT_D$. In response to detecting an increase in the intensity of contact 830 above first intensity threshold $IT_H$, the appearance of the background changes in a first fashion that is independent of the position of the contact on touch screen 112 (e.g., virtual mesh 810 uniformly changes from solid lines to dashed lines) in FIG. 8T. In response to detecting a further increase in the intensity of contact 830 above second intensity threshold $IT_L$, virtual mesh 810 appears to be dynamically pushed back from the location of contact 830 in FIGS. 8U-8V. In response to detecting a further increase in the intensity of contact 830 above third intensity threshold $IT_D$, virtual mesh 810 appears to pop back to the same location as before contact 830 was first detected, and the dashing of the lines becomes smaller in FIG. 8W. Upon detecting liftoff of contact 830, the appearance of the background reverses to the same state as prior to first detecting the contact, as illustrated in FIG. 8X.

Figure 8Y:
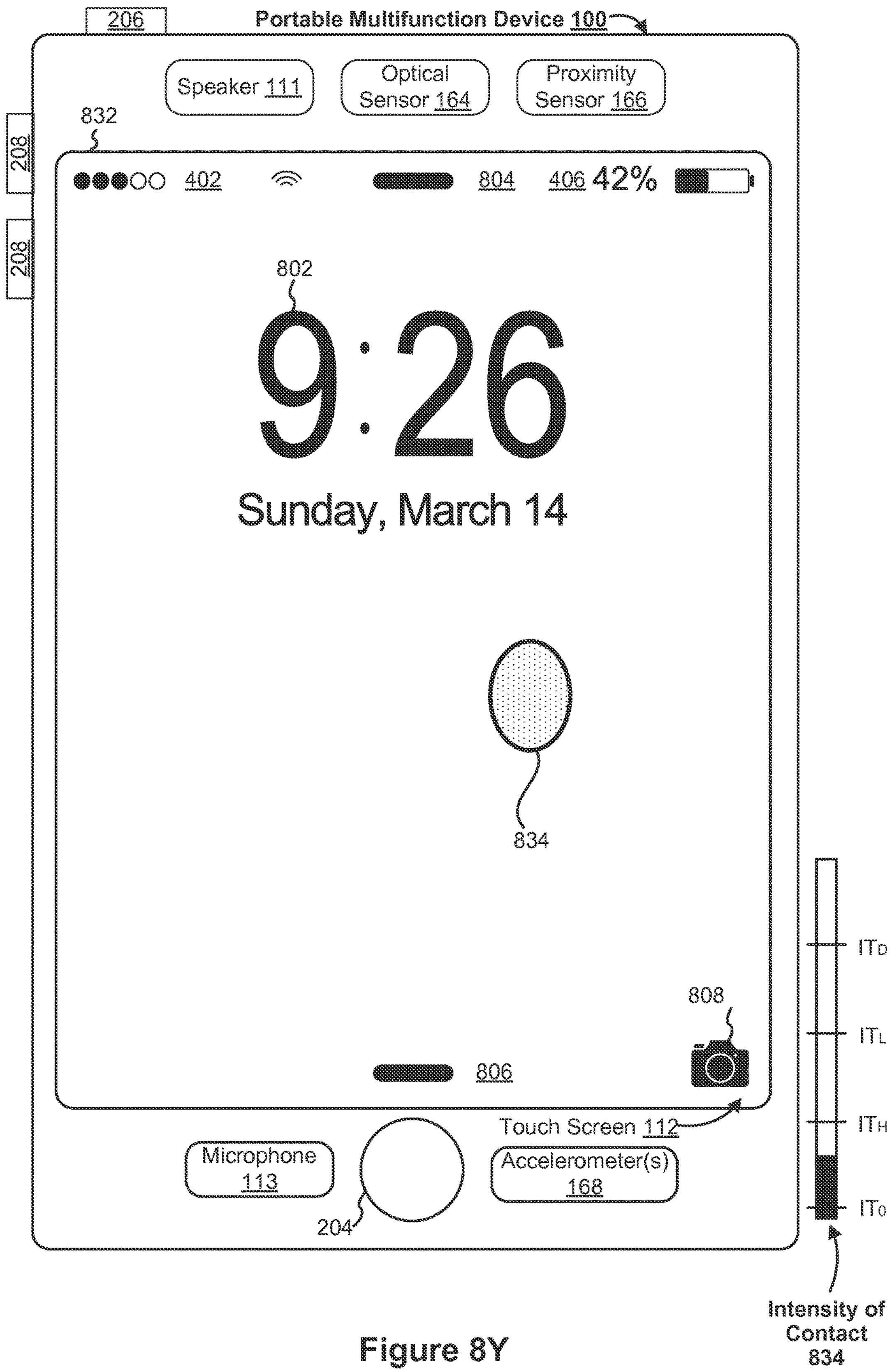
Figure 8Z:
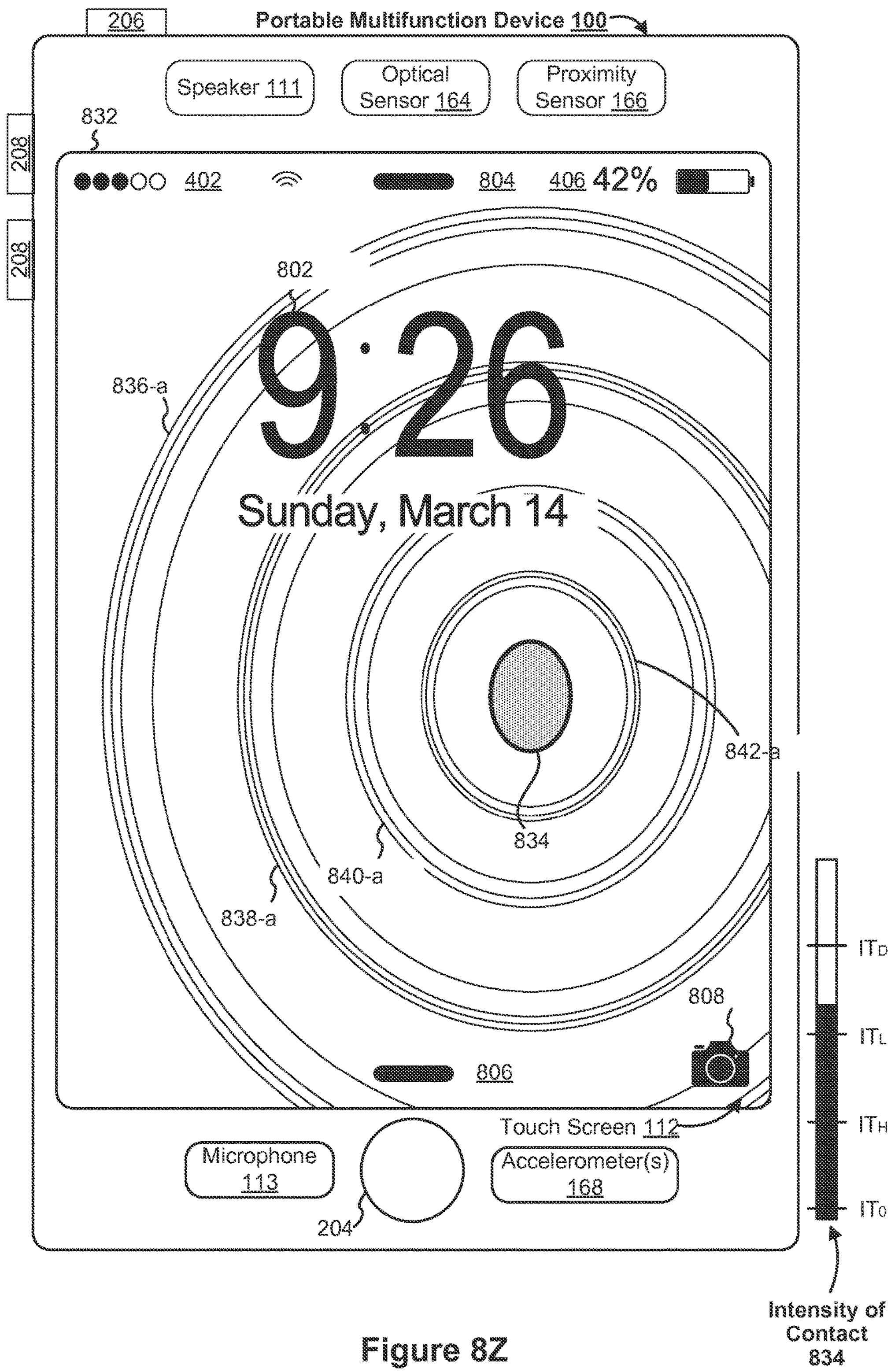
Figure 8A:
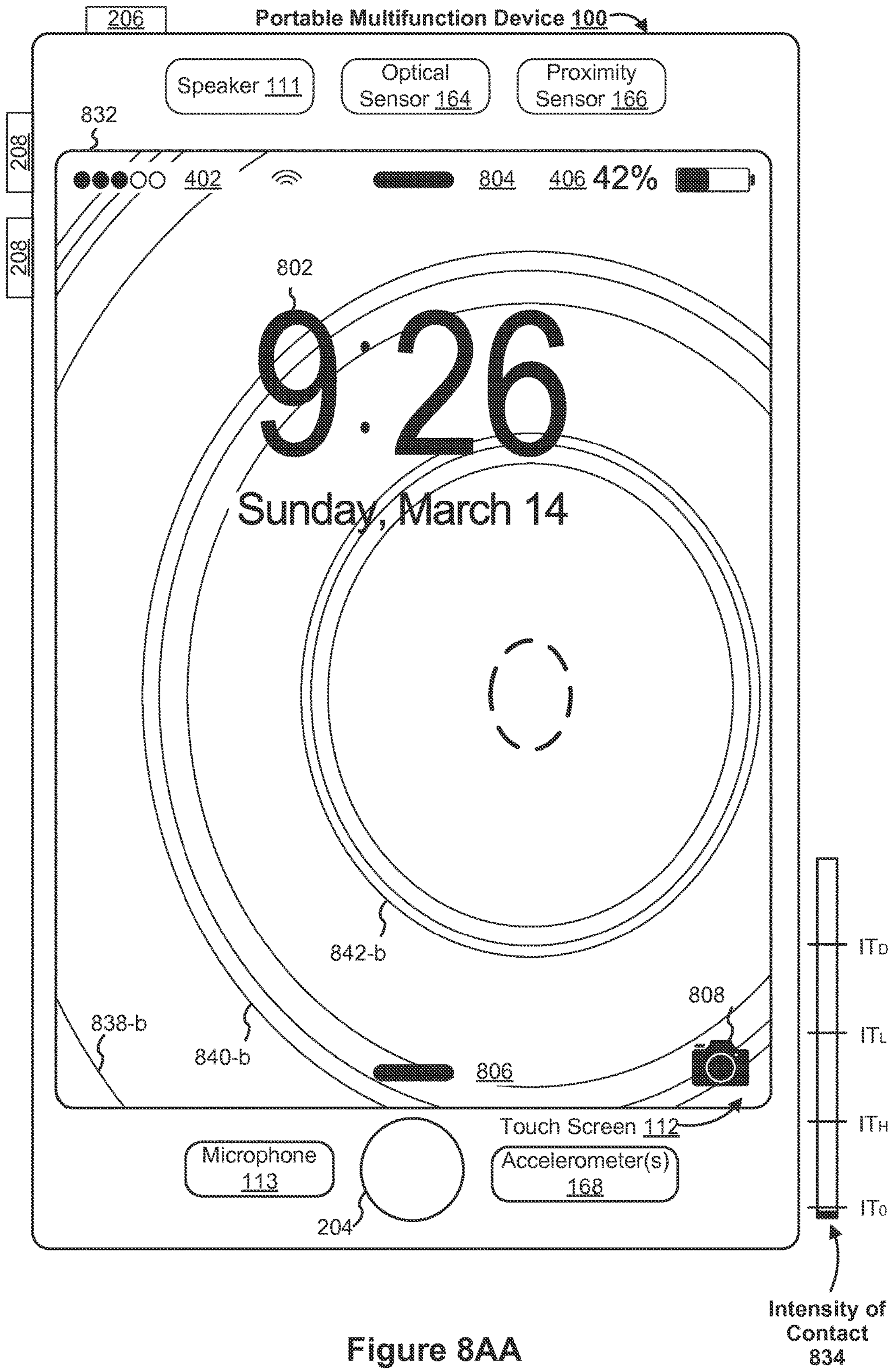
Figure 8A:
Figure 8A:
Figure 8A:
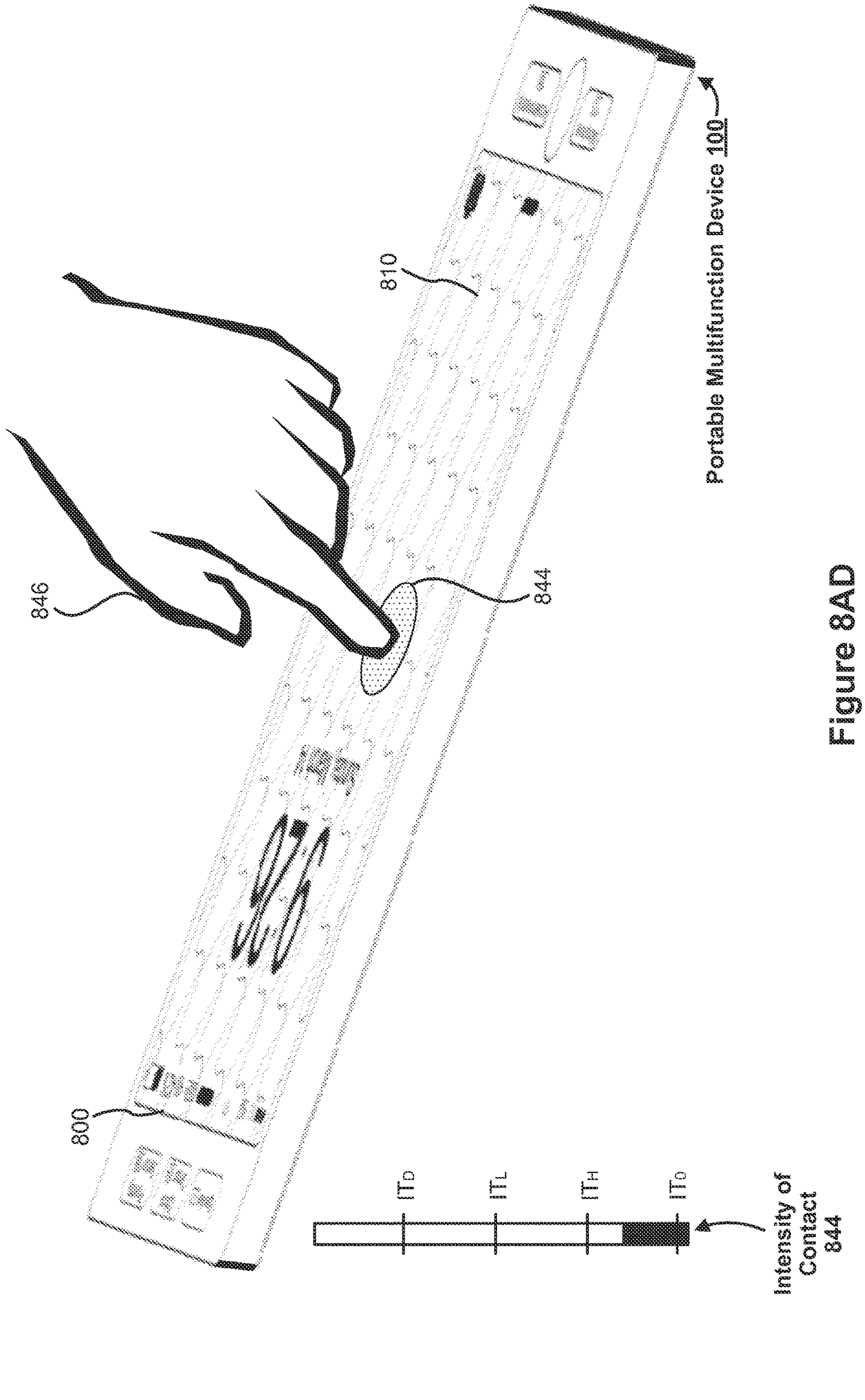
Figure 8A:
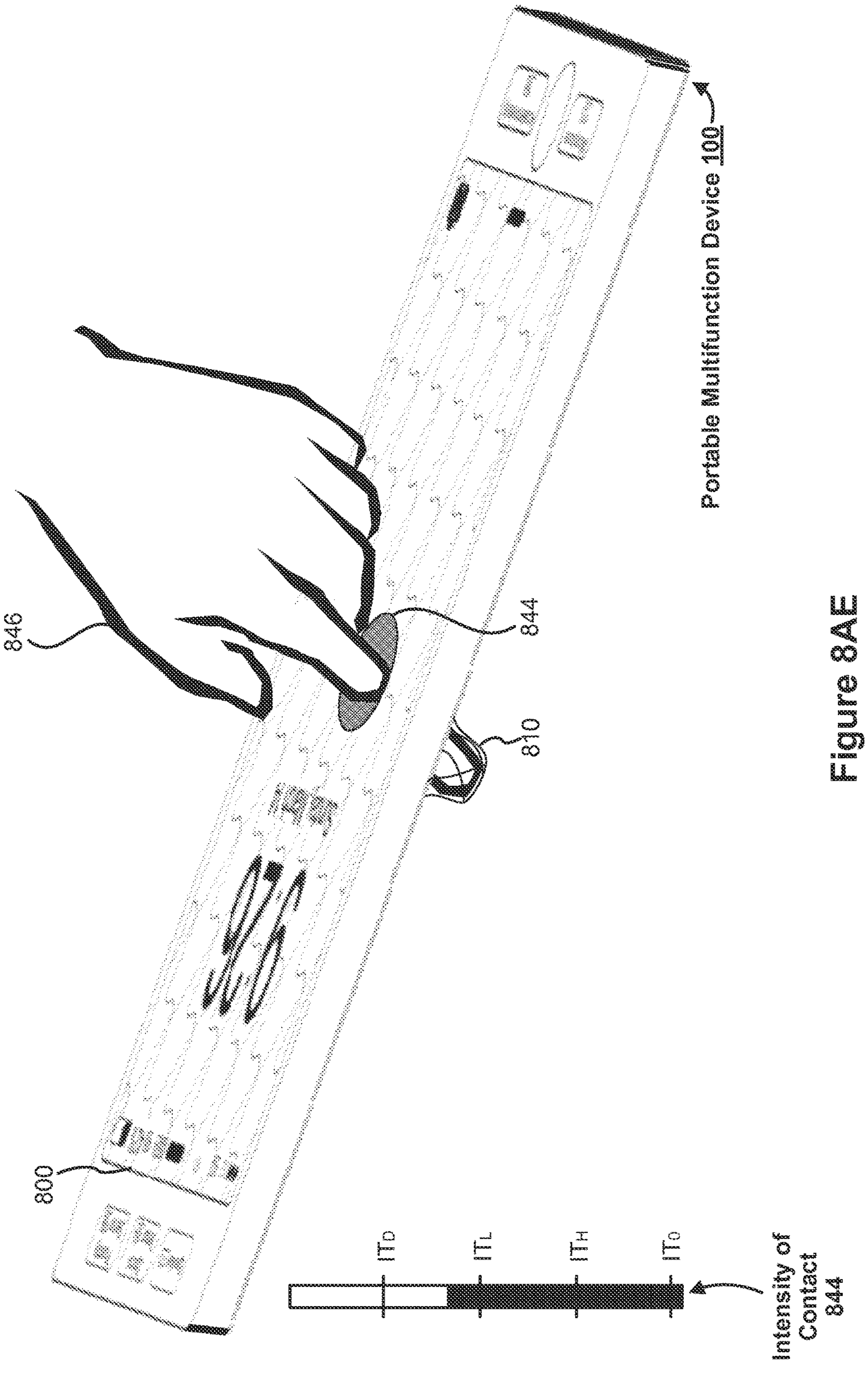
Figure 8A:
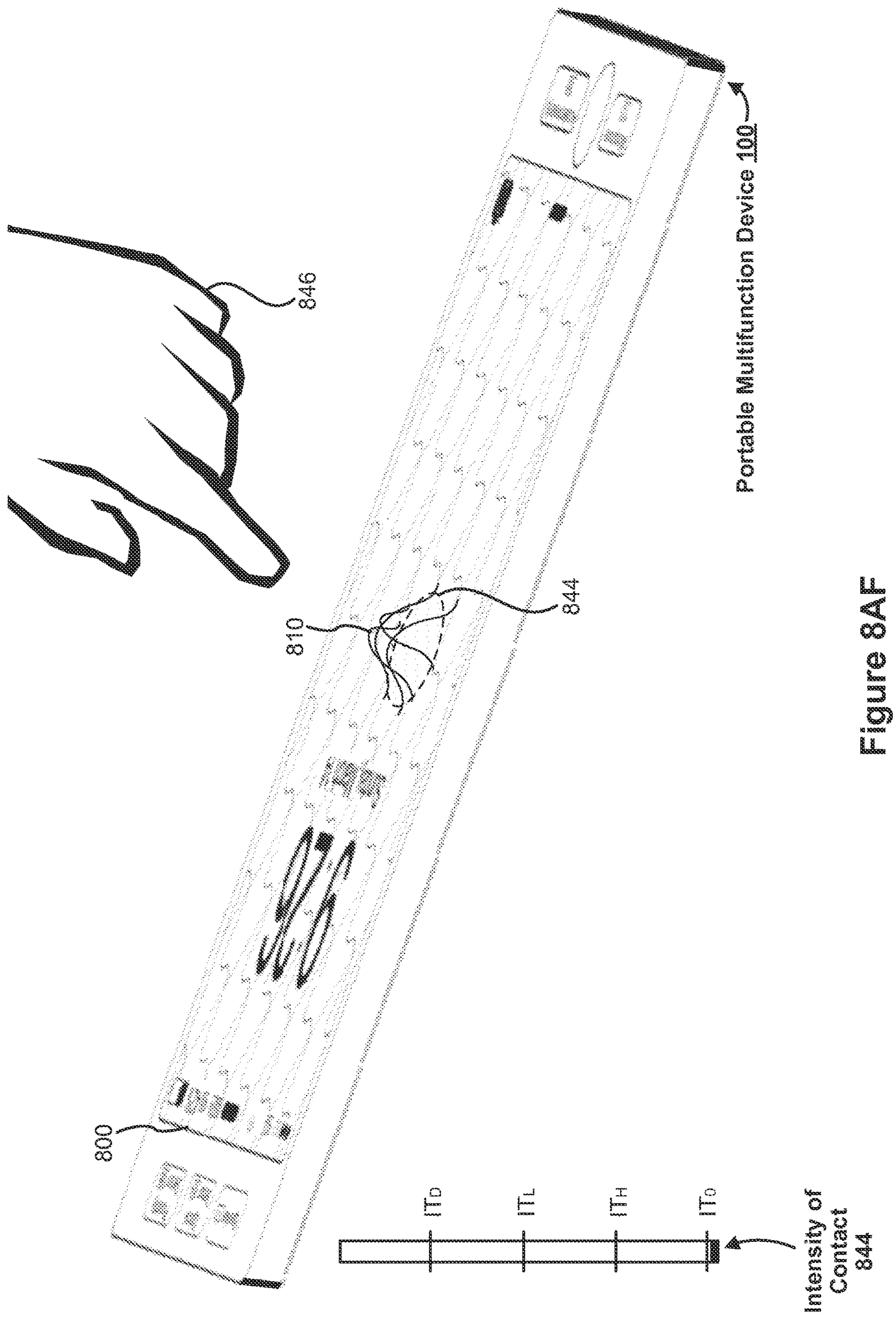
Figure 8A:
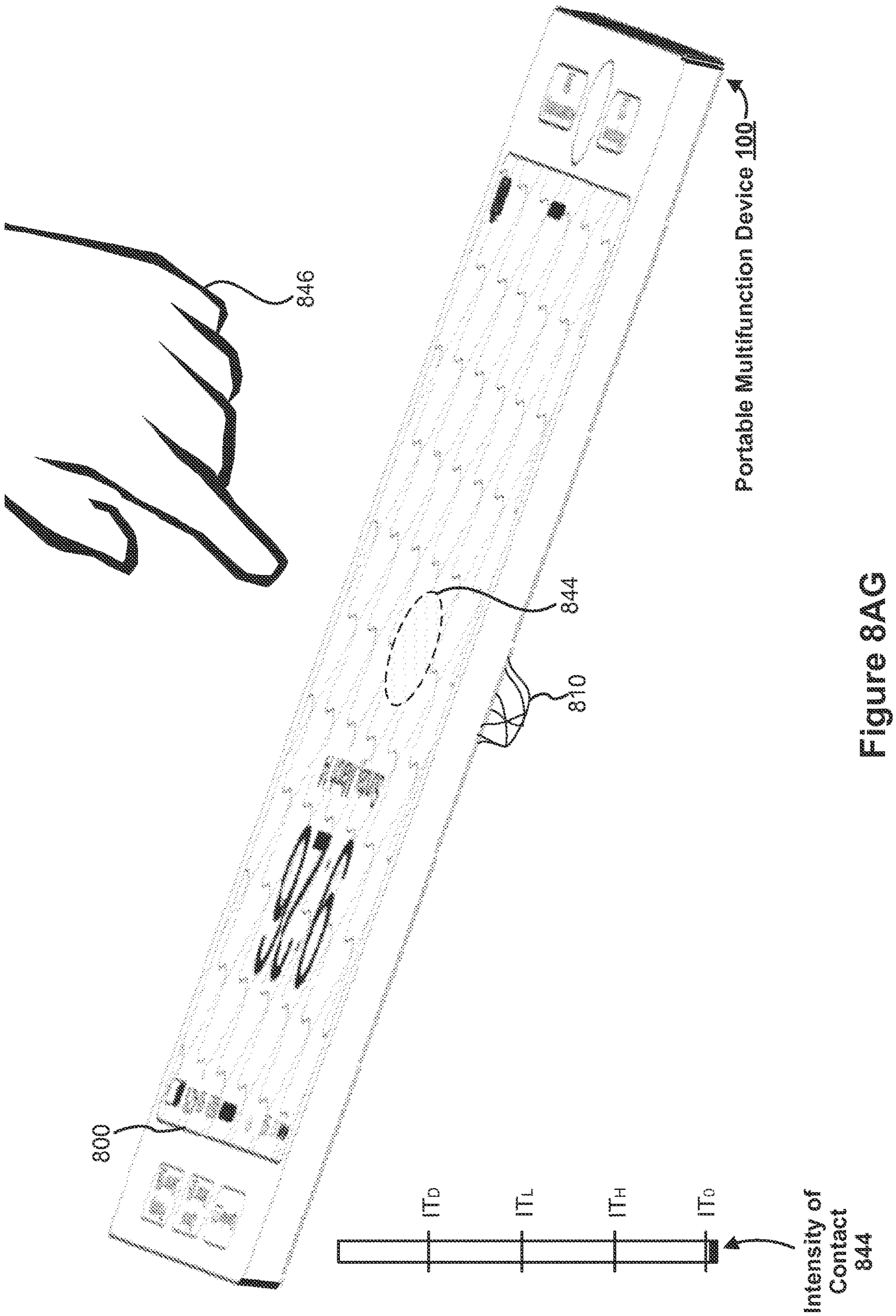
Figure 8A:
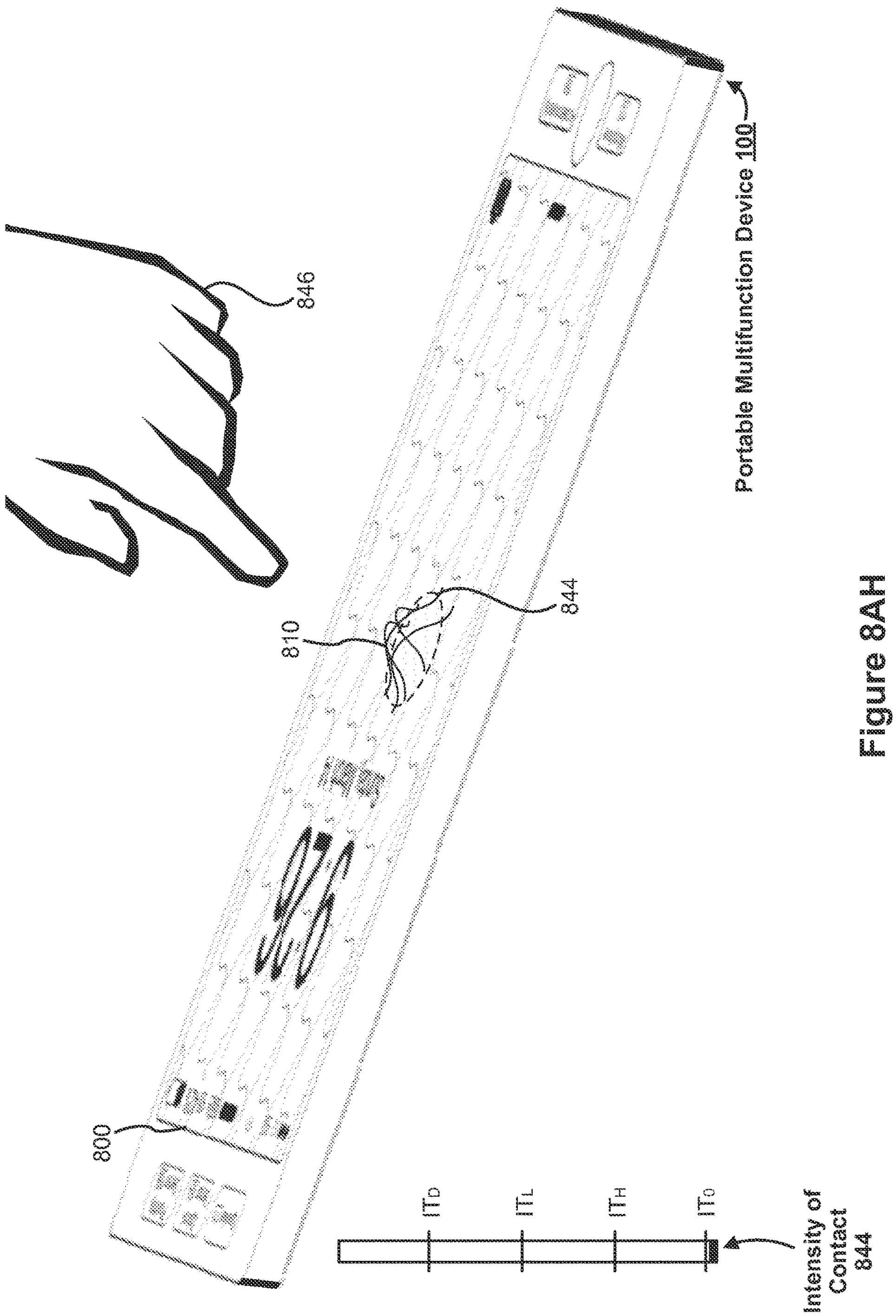
Figure 8A:
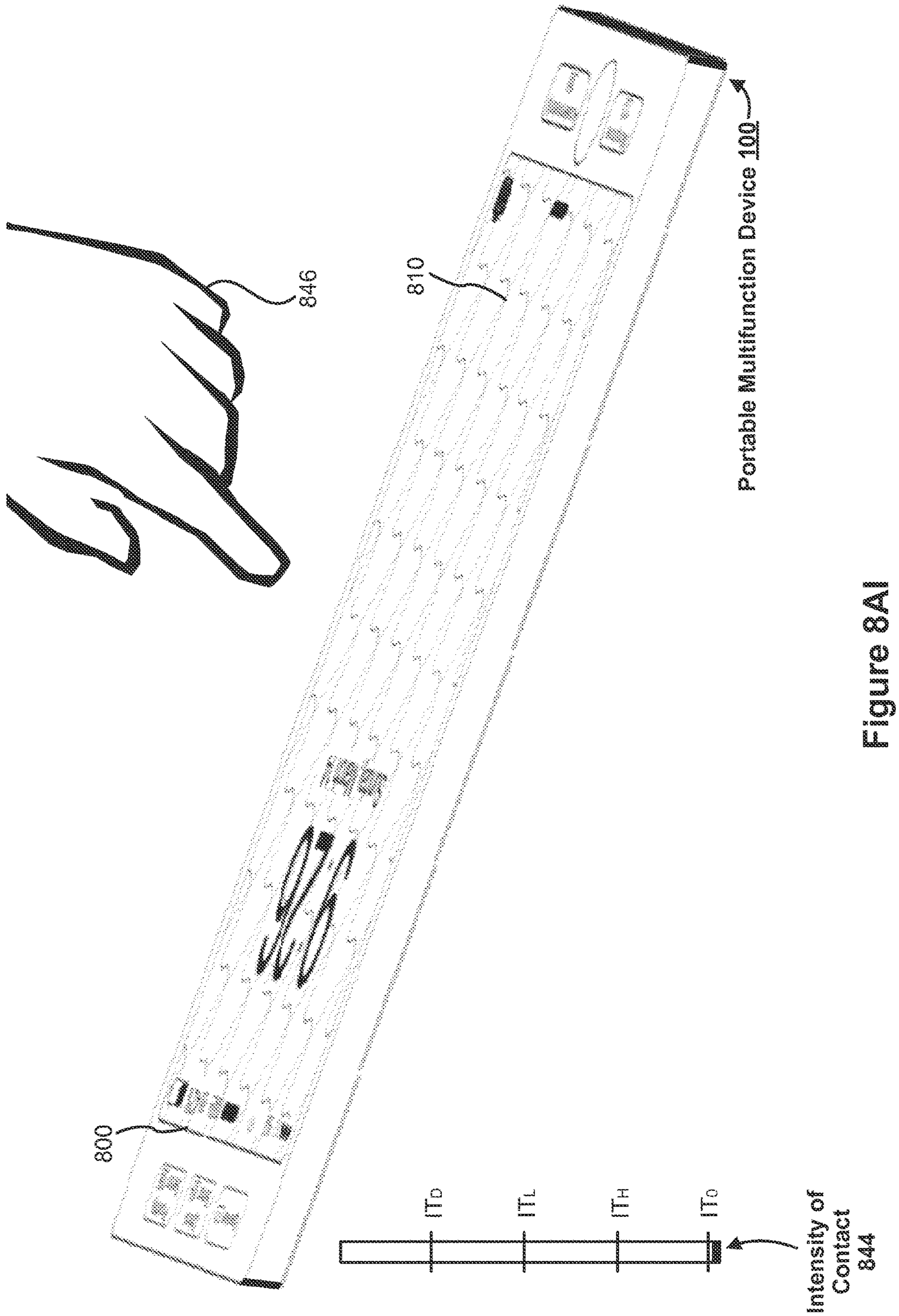
Figure 8A:
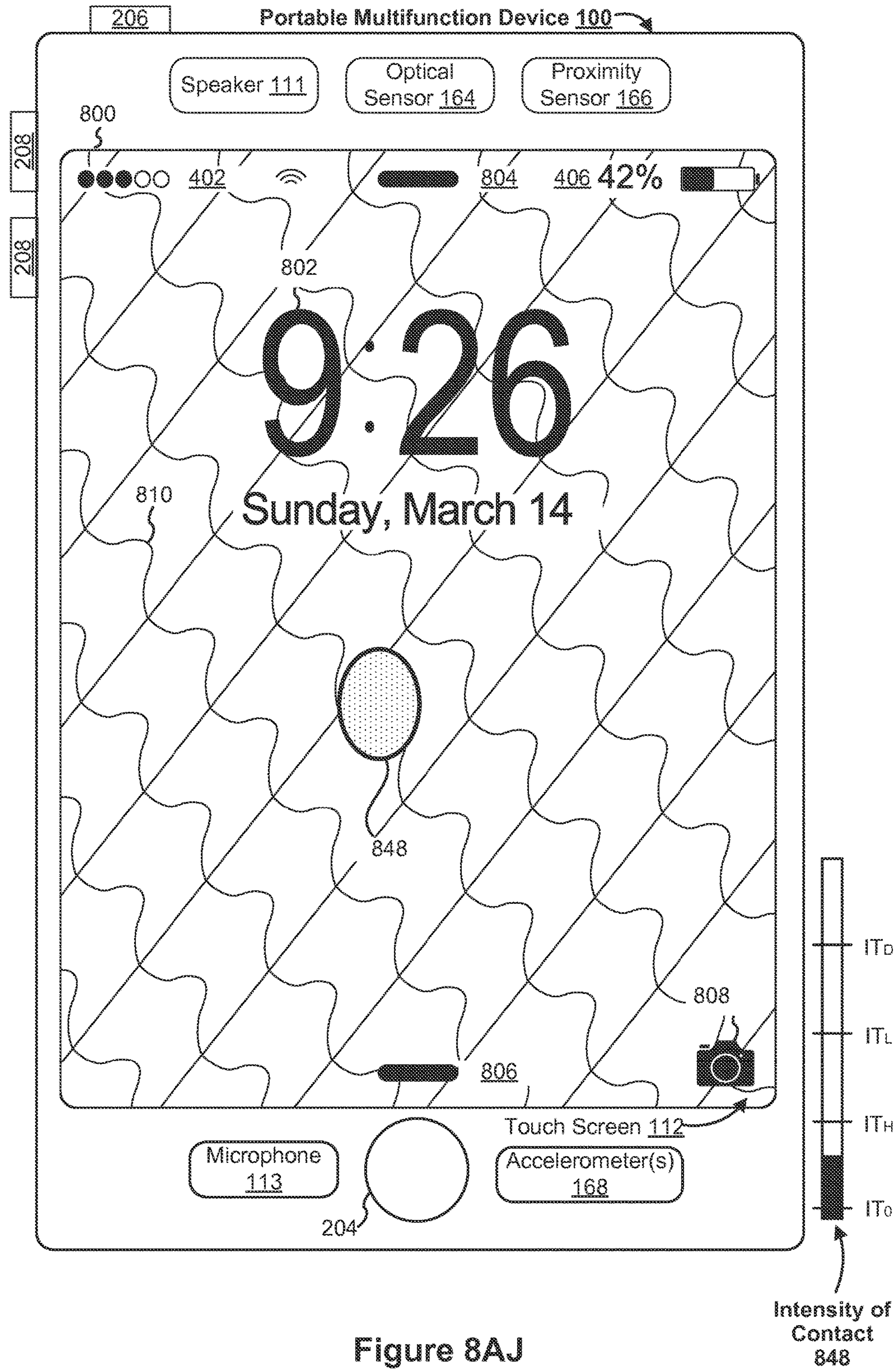
Figure 8A:
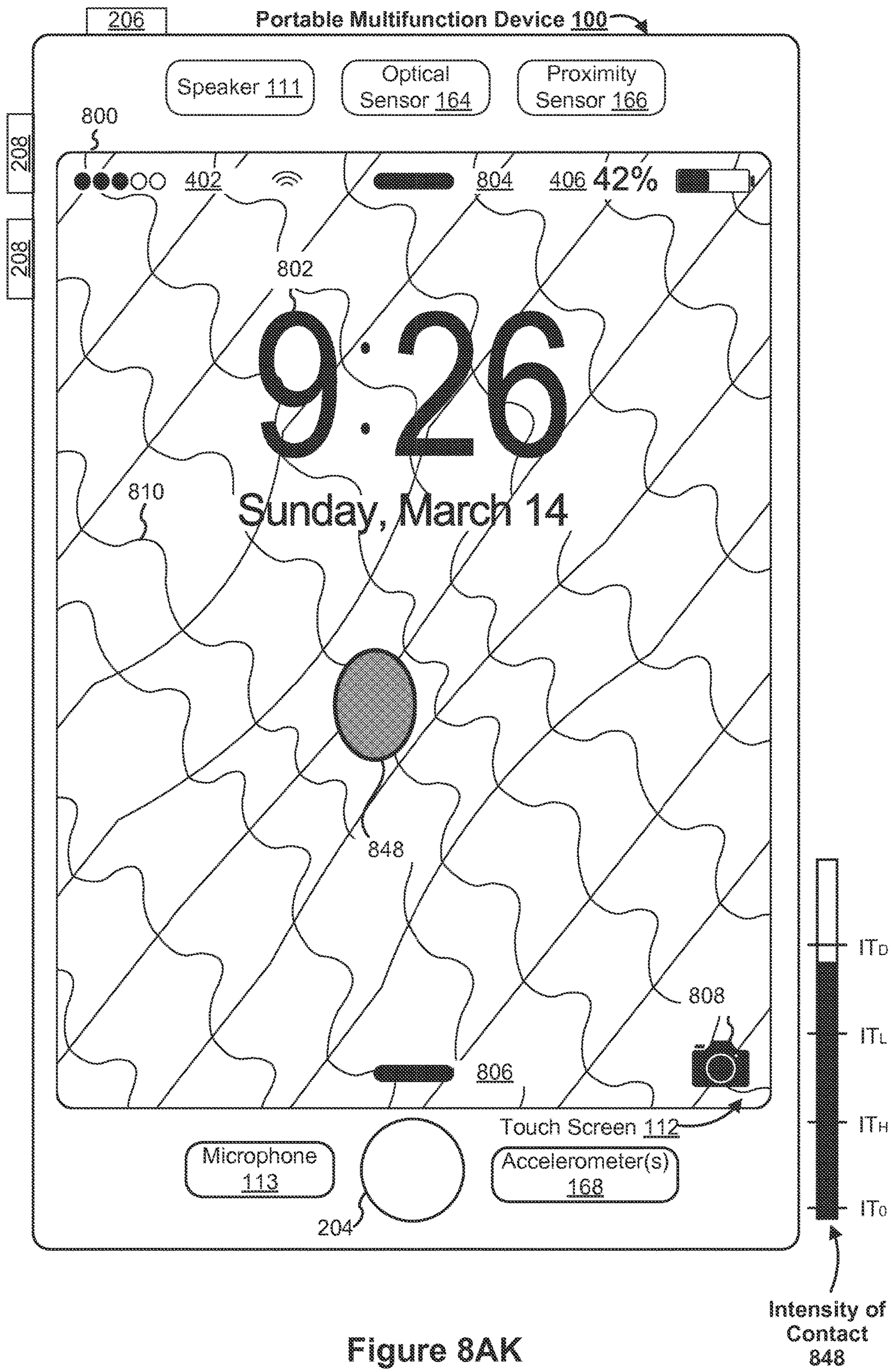
Figure 8A:
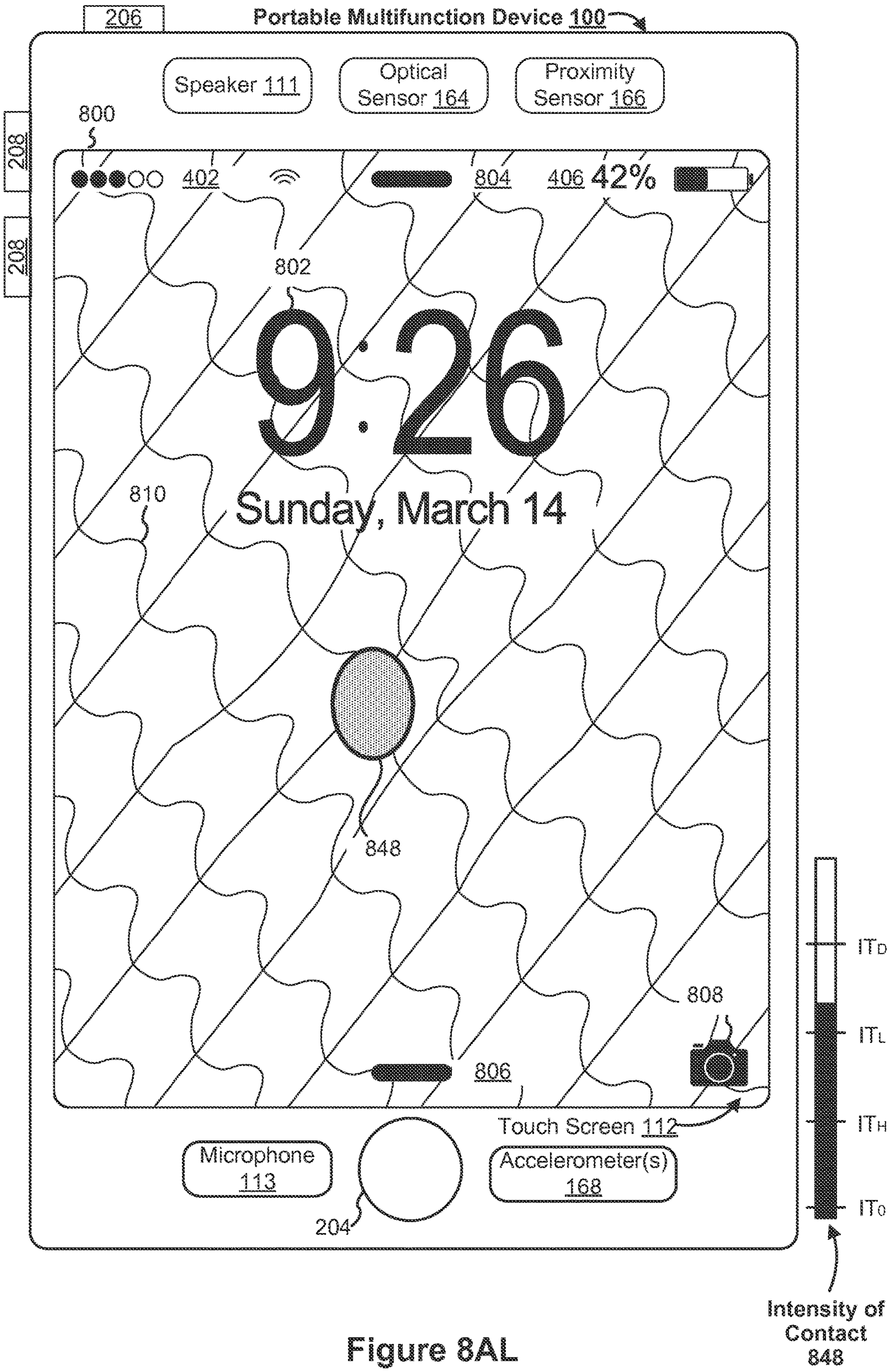
Figure 8A:
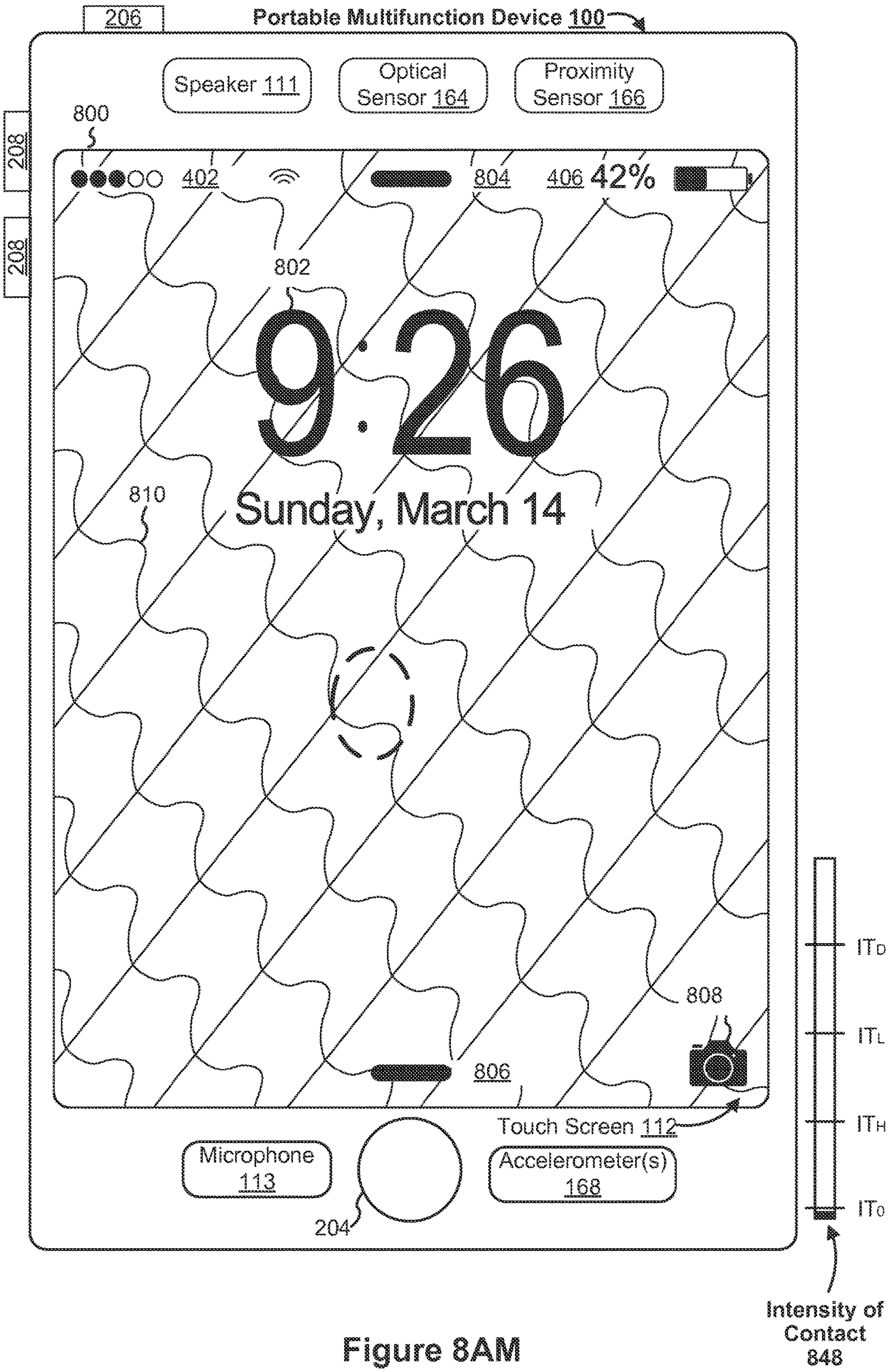
Figure 8A:
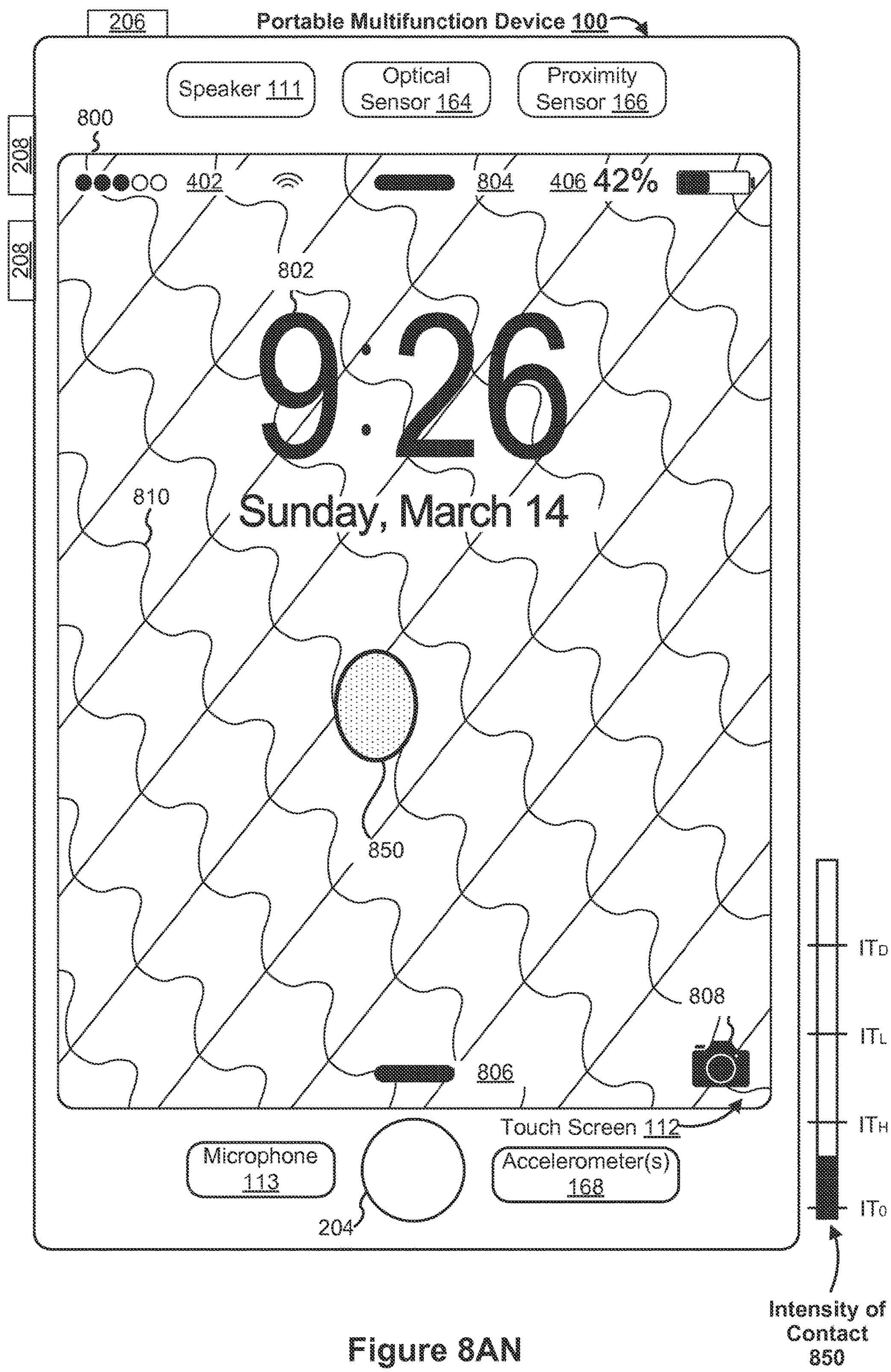
Figure 8A:
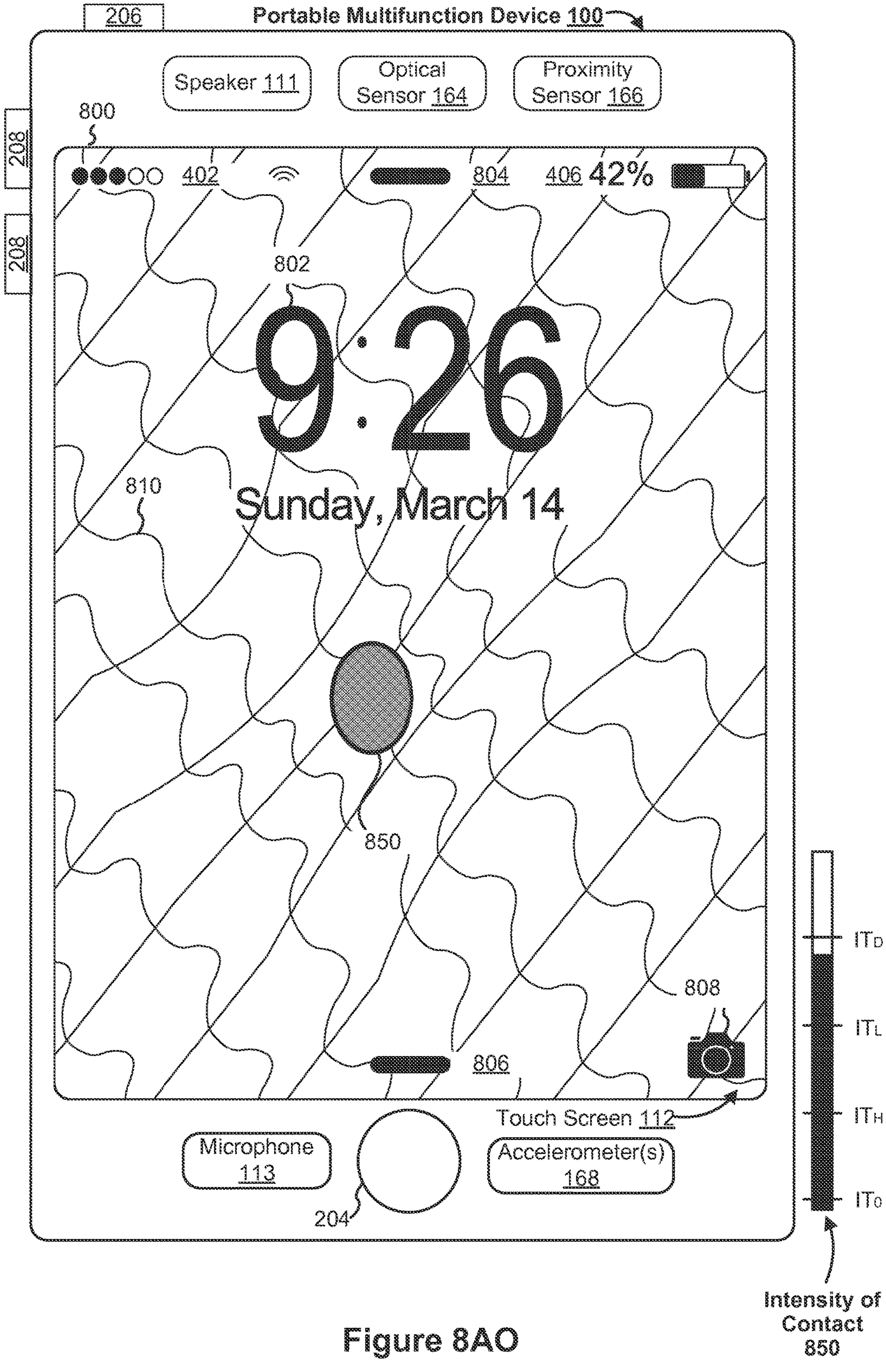
Figure 8A:
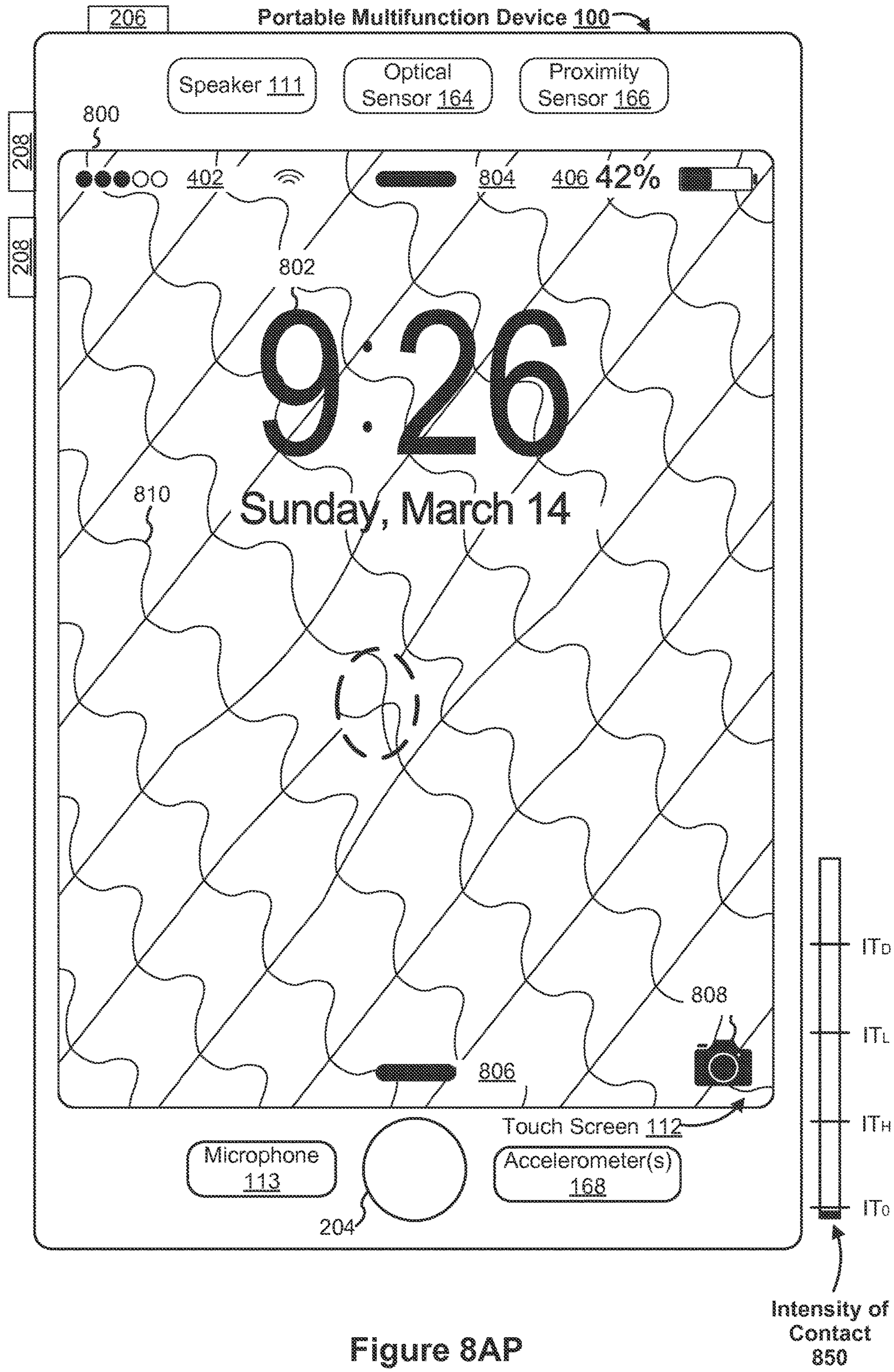
Figure 8A:
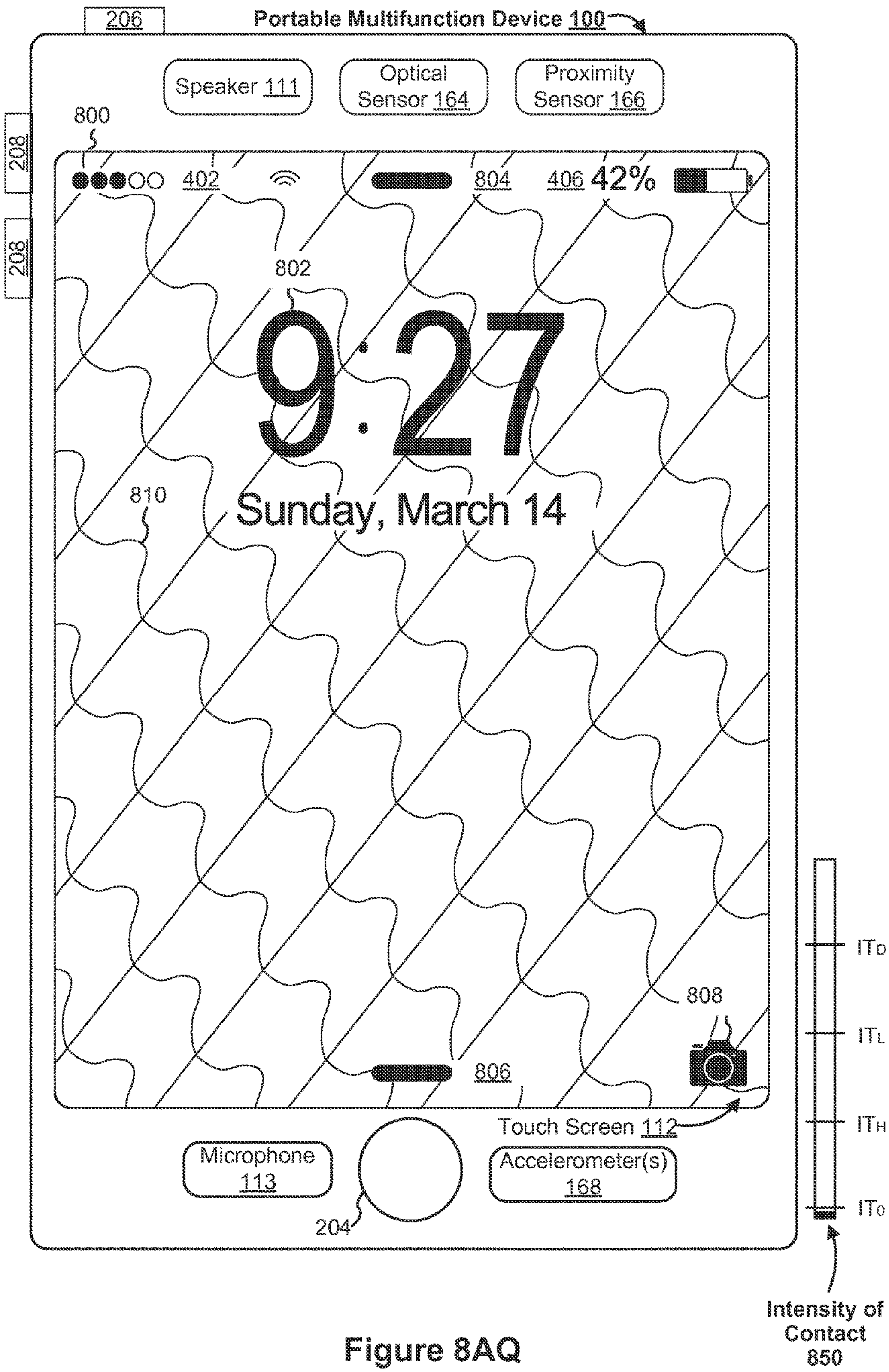
Figure 8A:
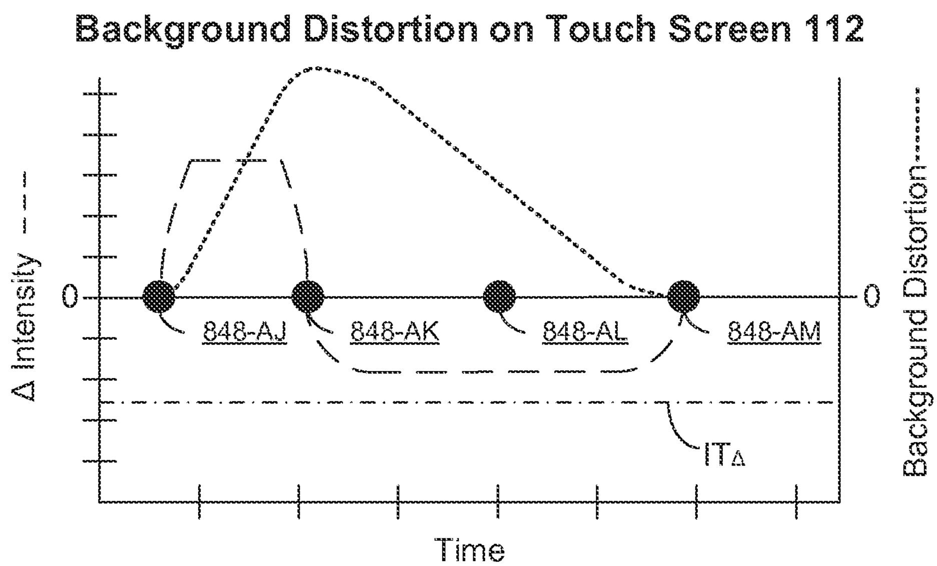
Figure 8A:
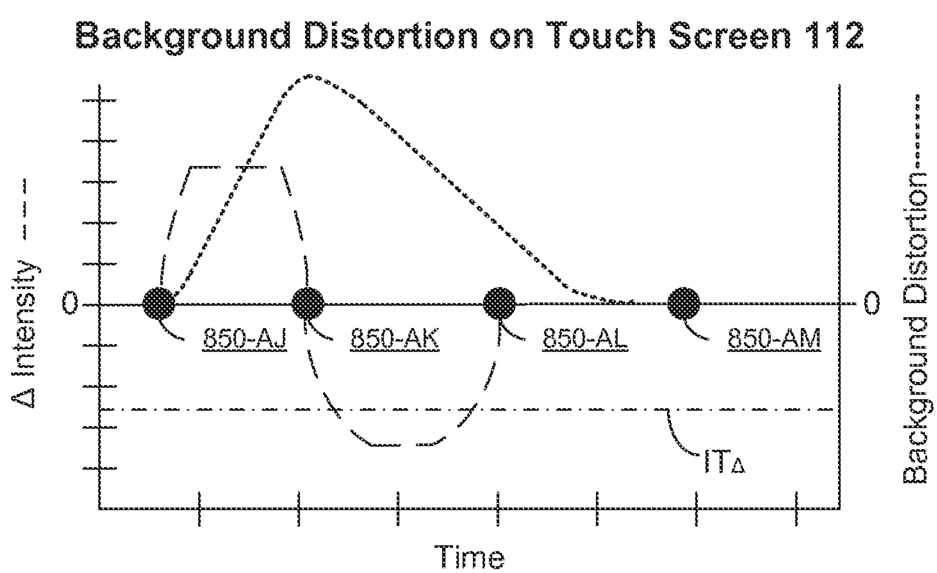
Figure 8A:
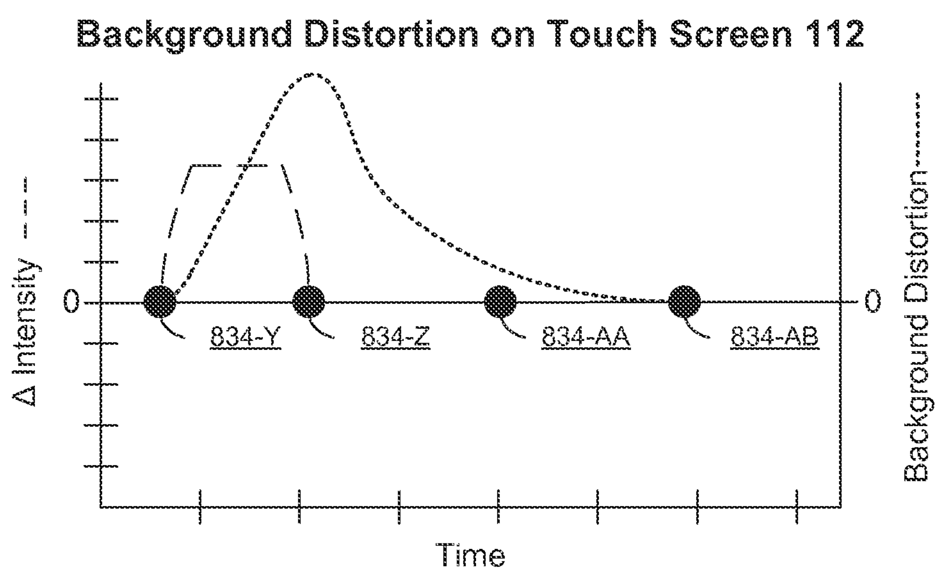
Figure 8A:
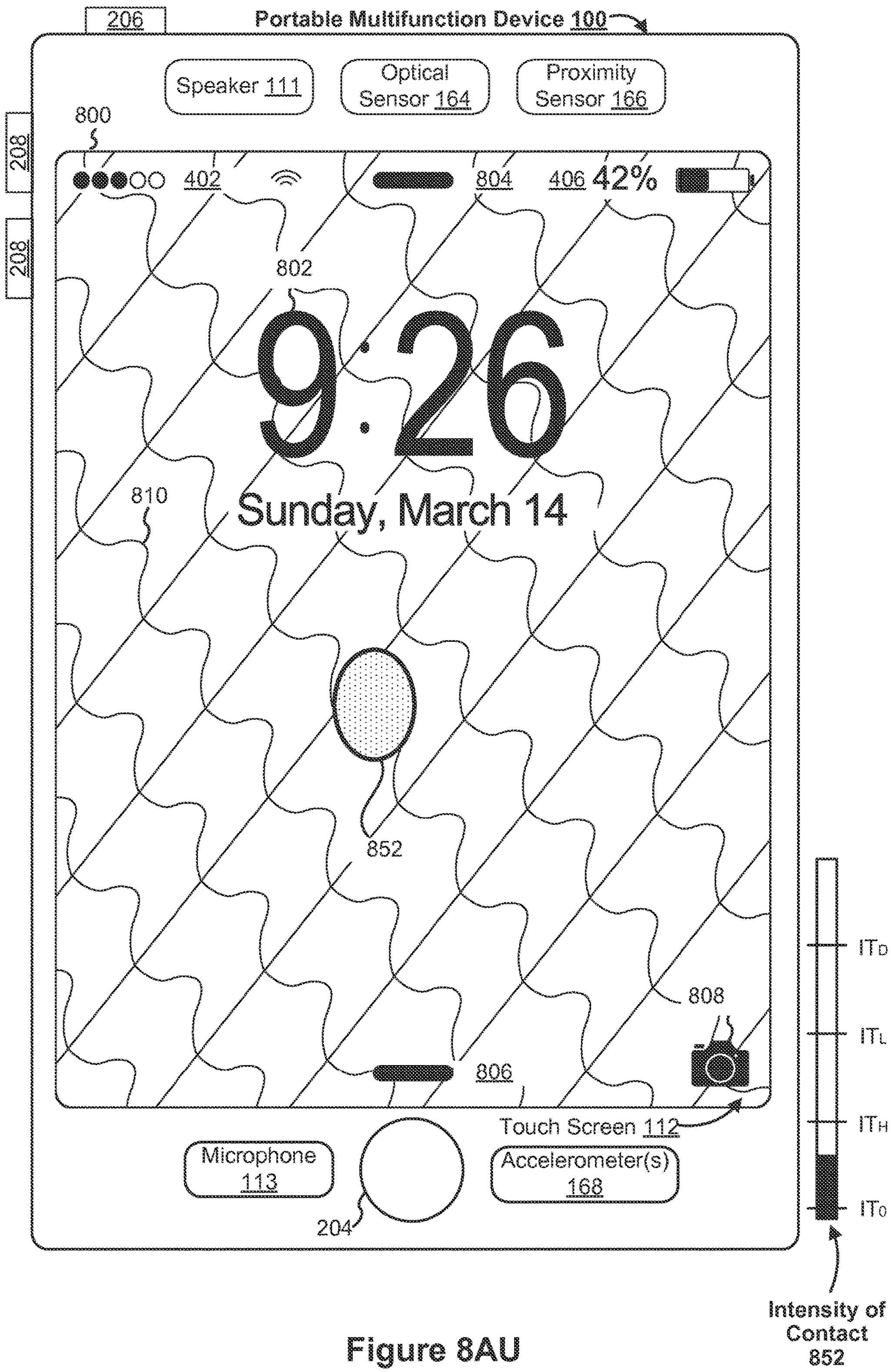
Figure 8A:
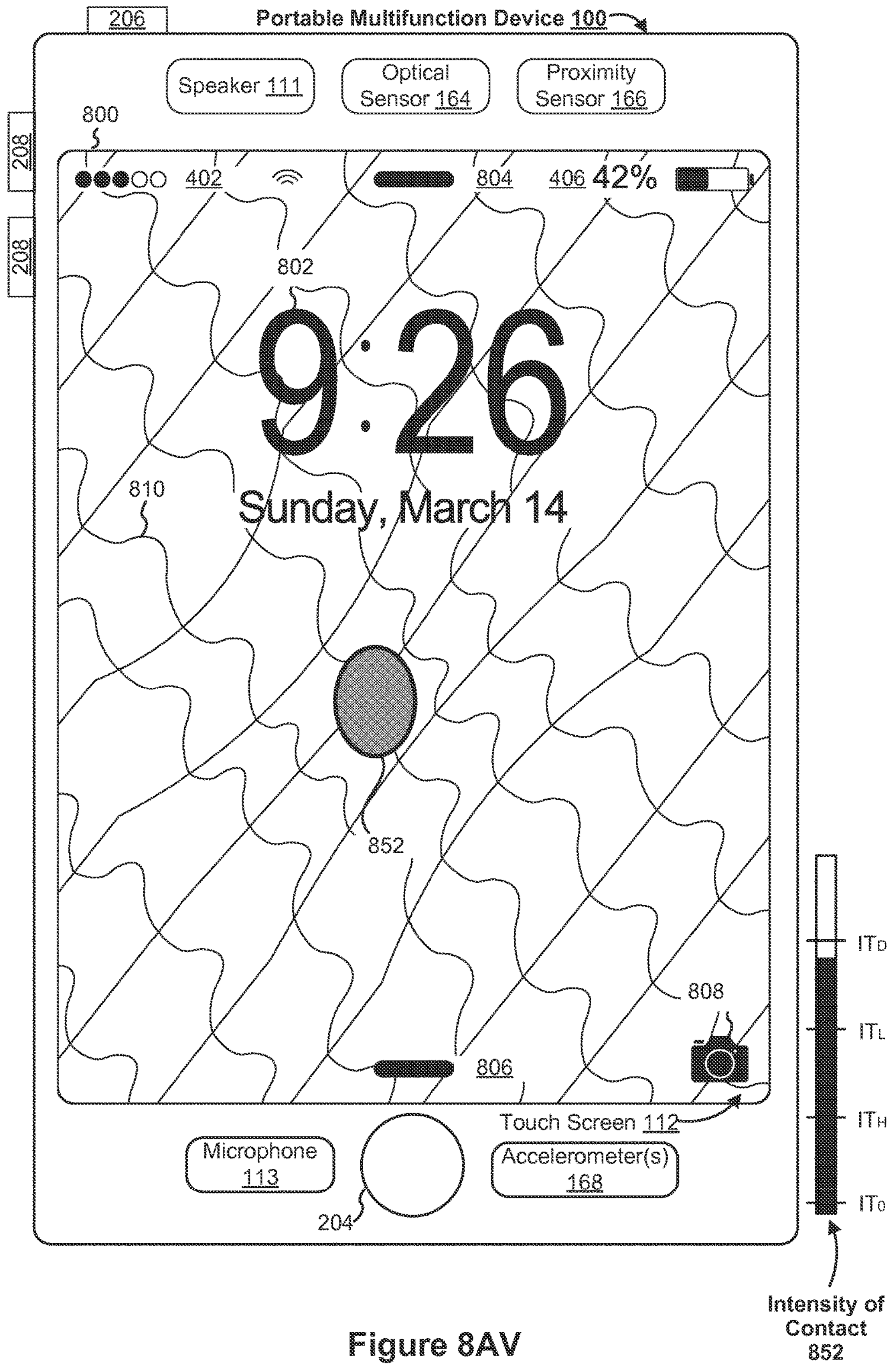
Figure 8A:
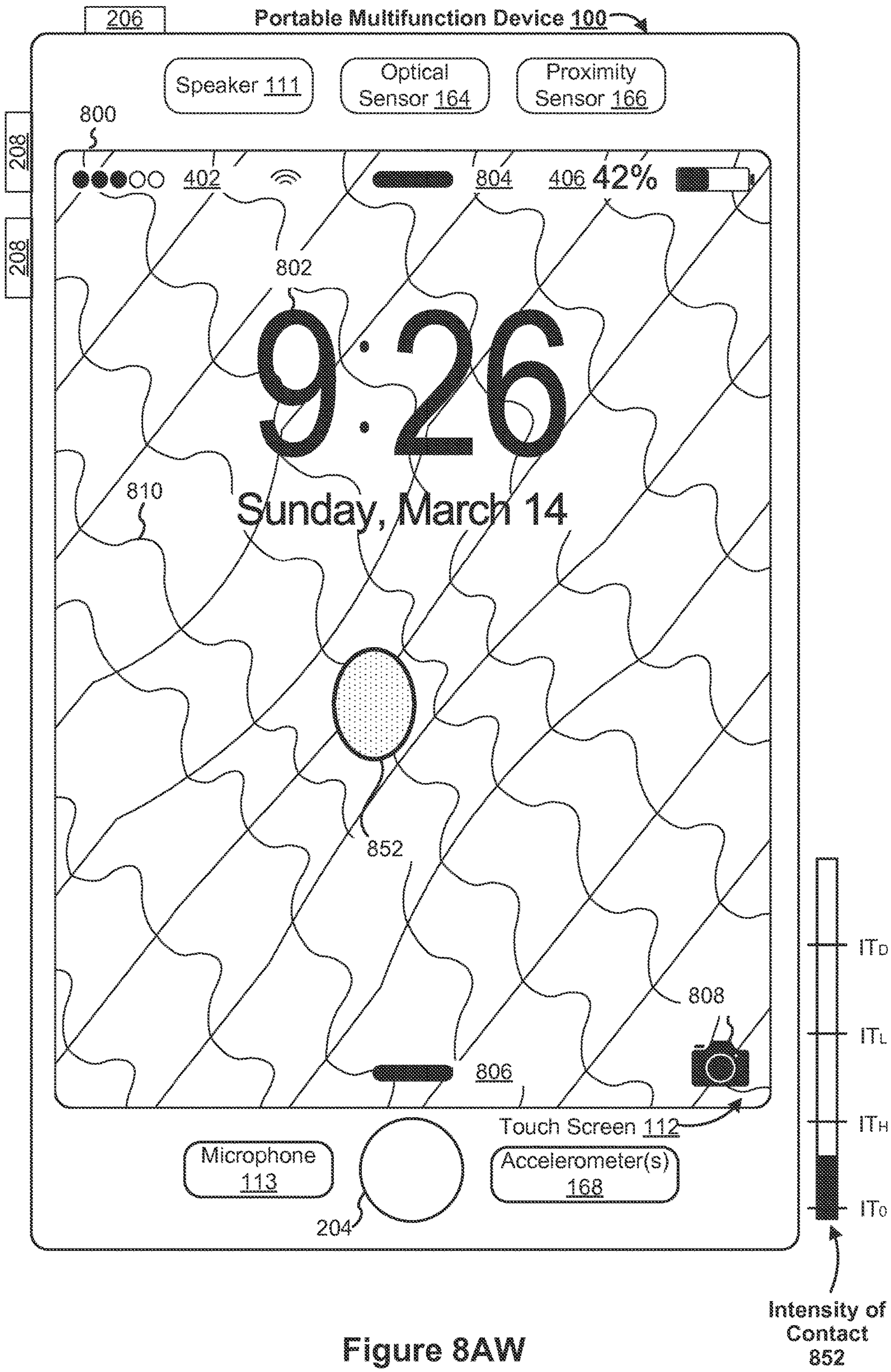
Figure 8A:
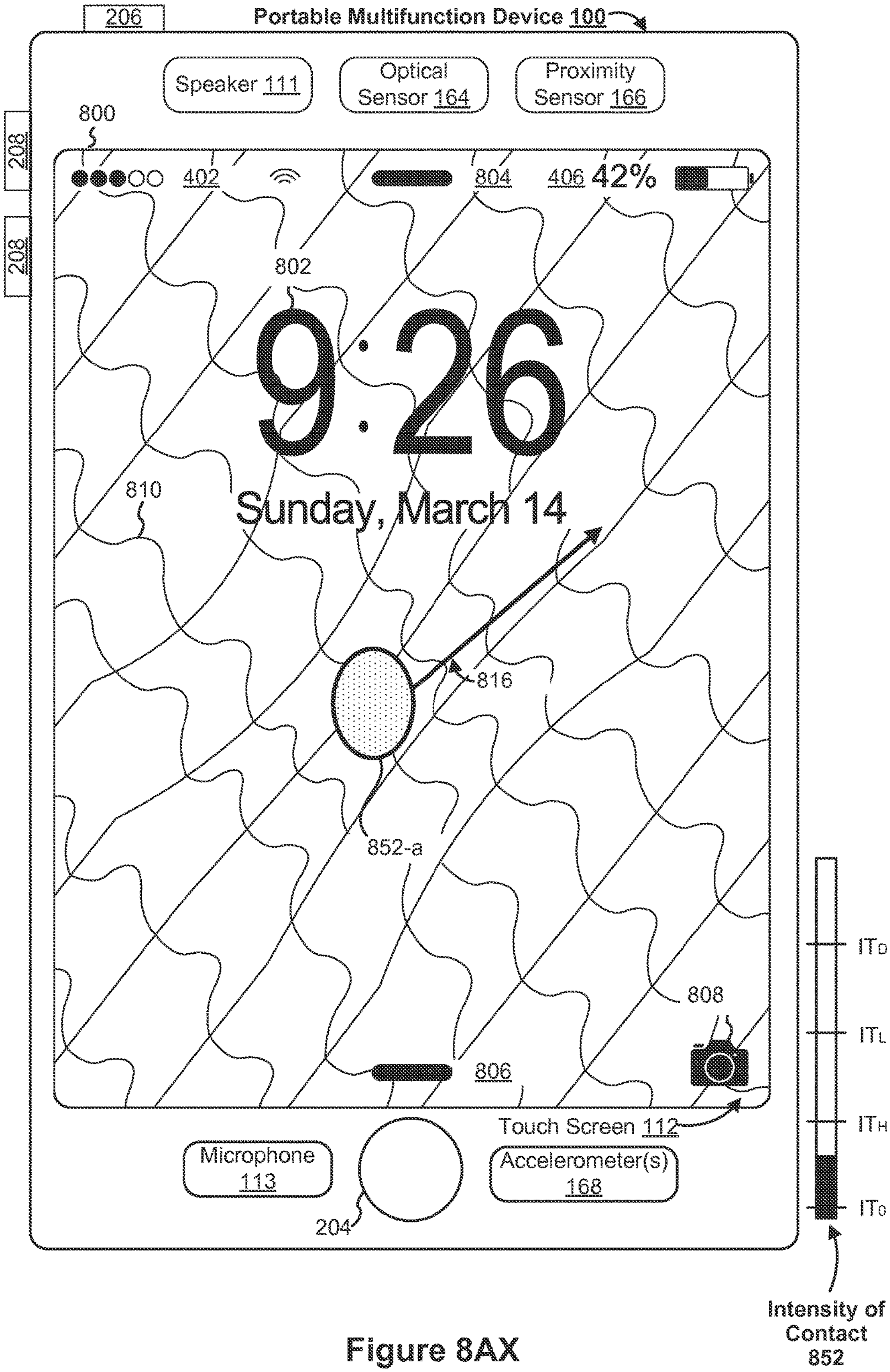
Figure 8A:
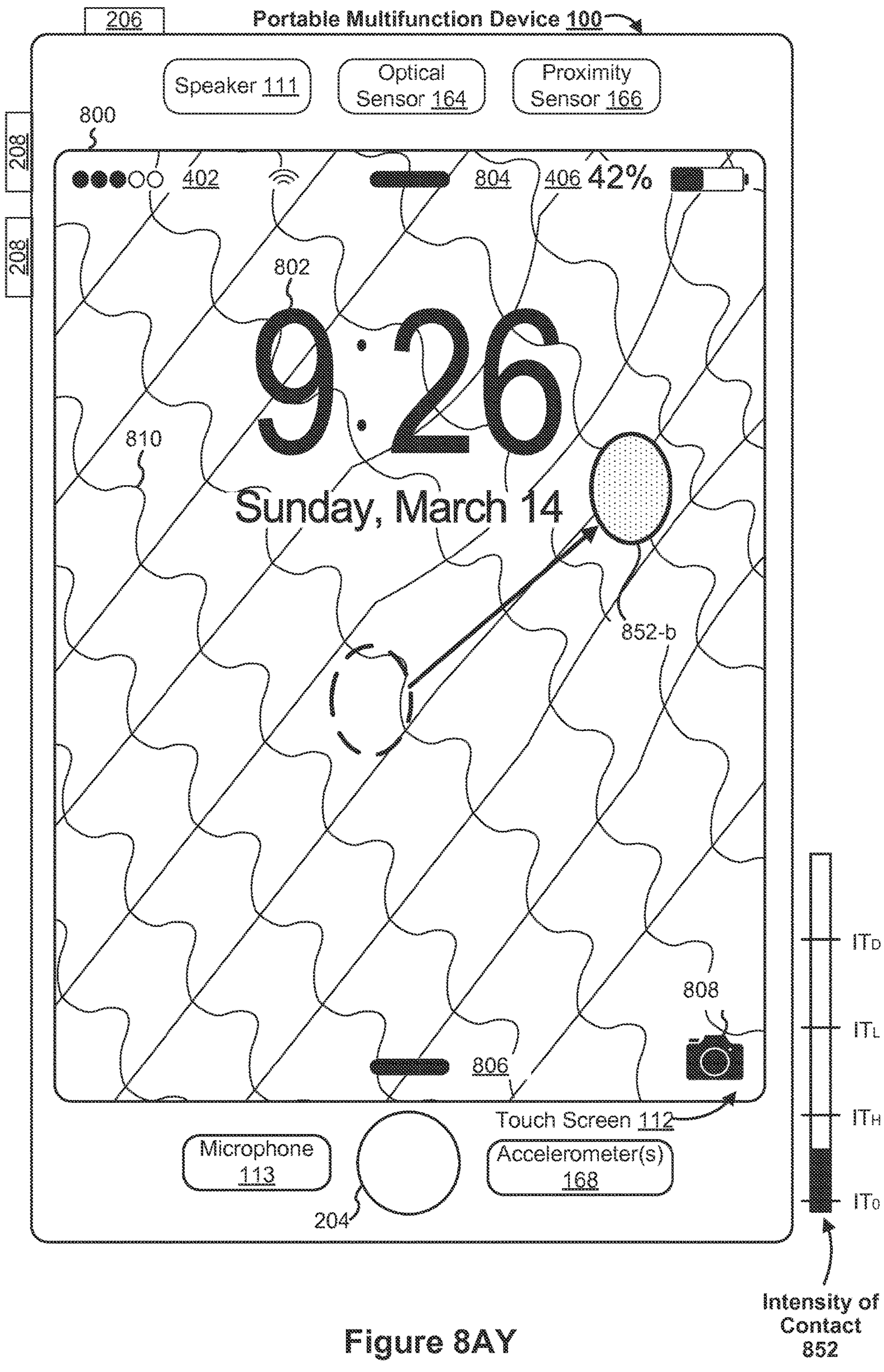
Figure 8A:
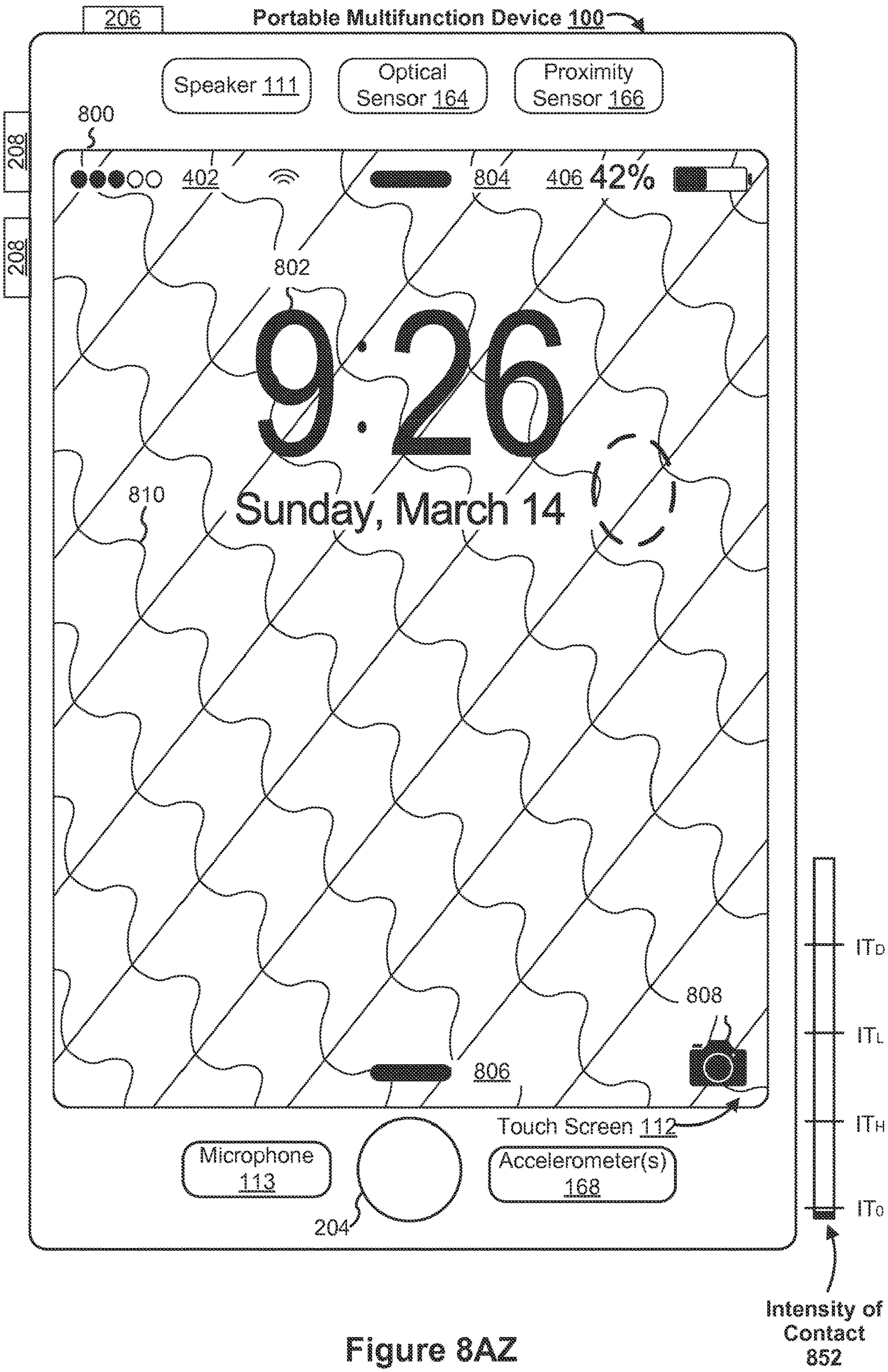
Figure 8B:
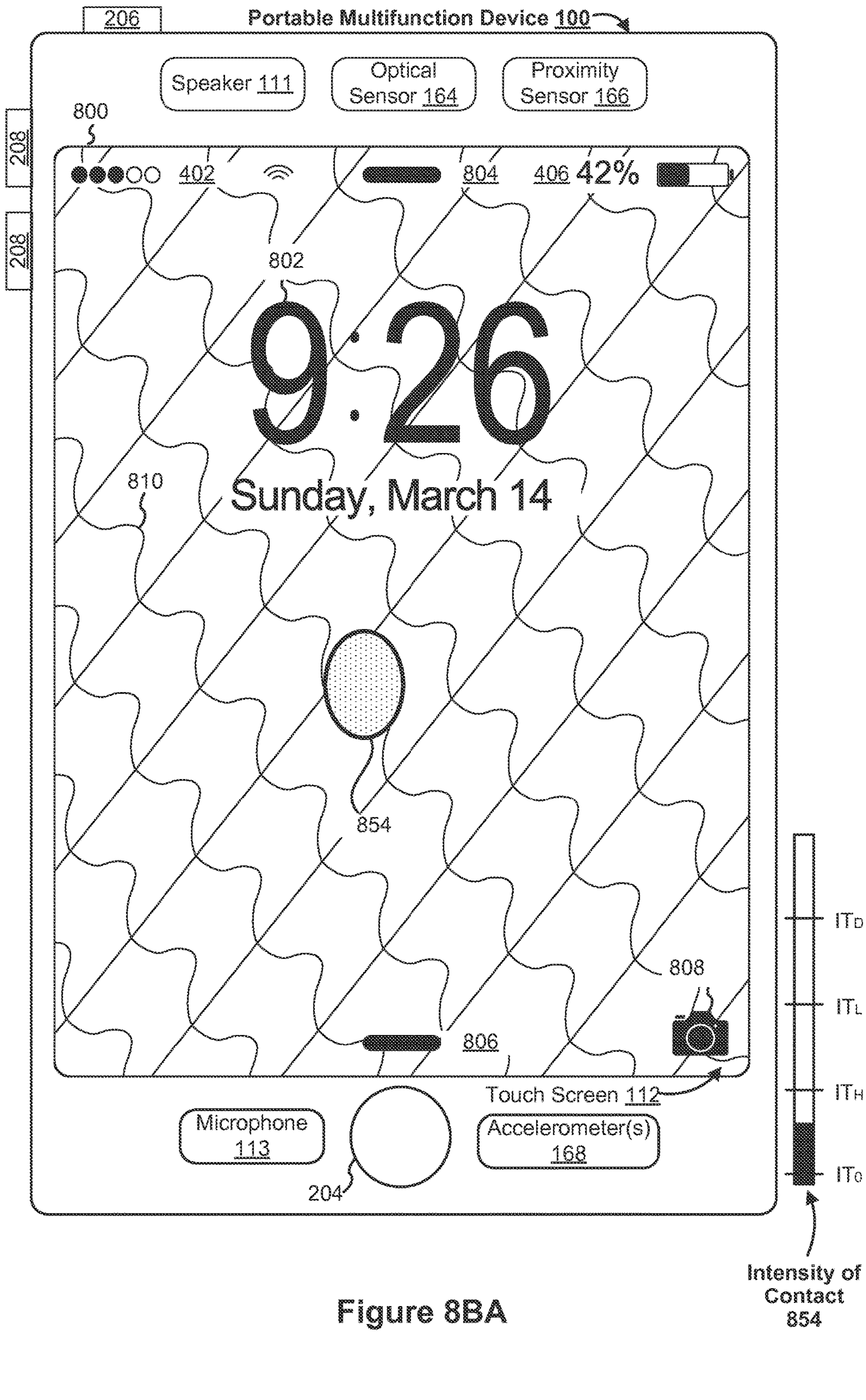
Figure 8B:
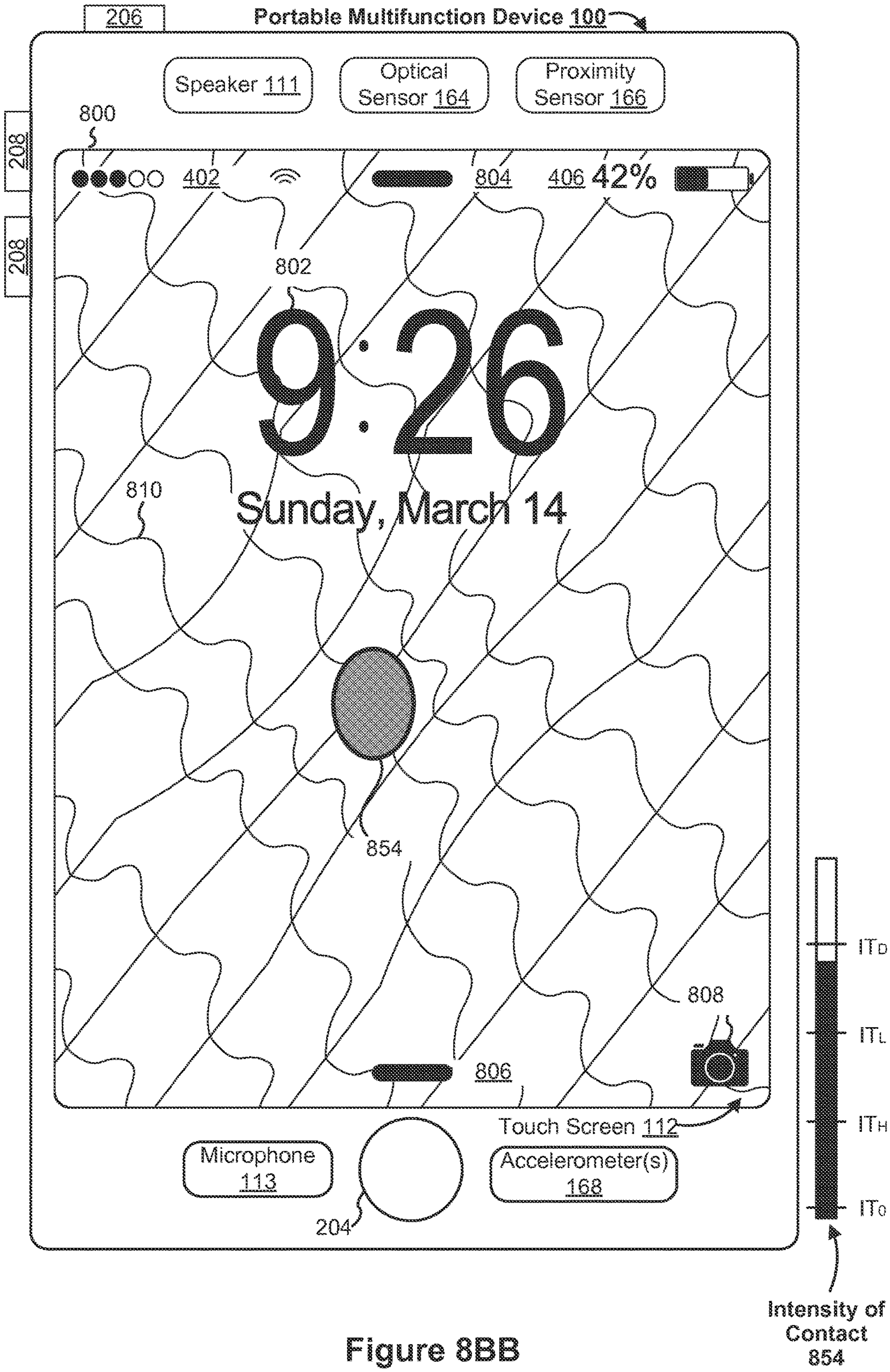
Figure 8B:
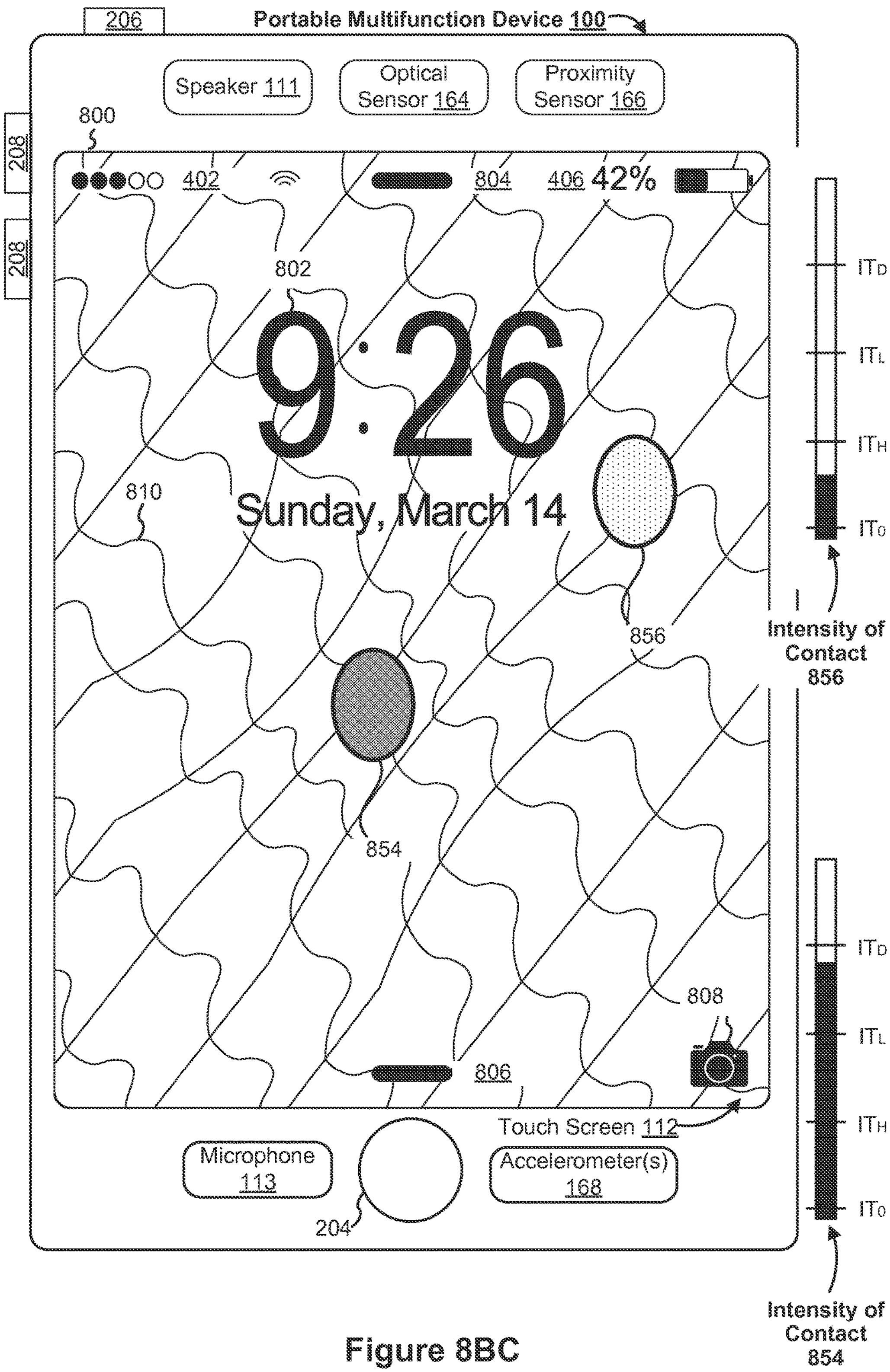
Figure 8B:
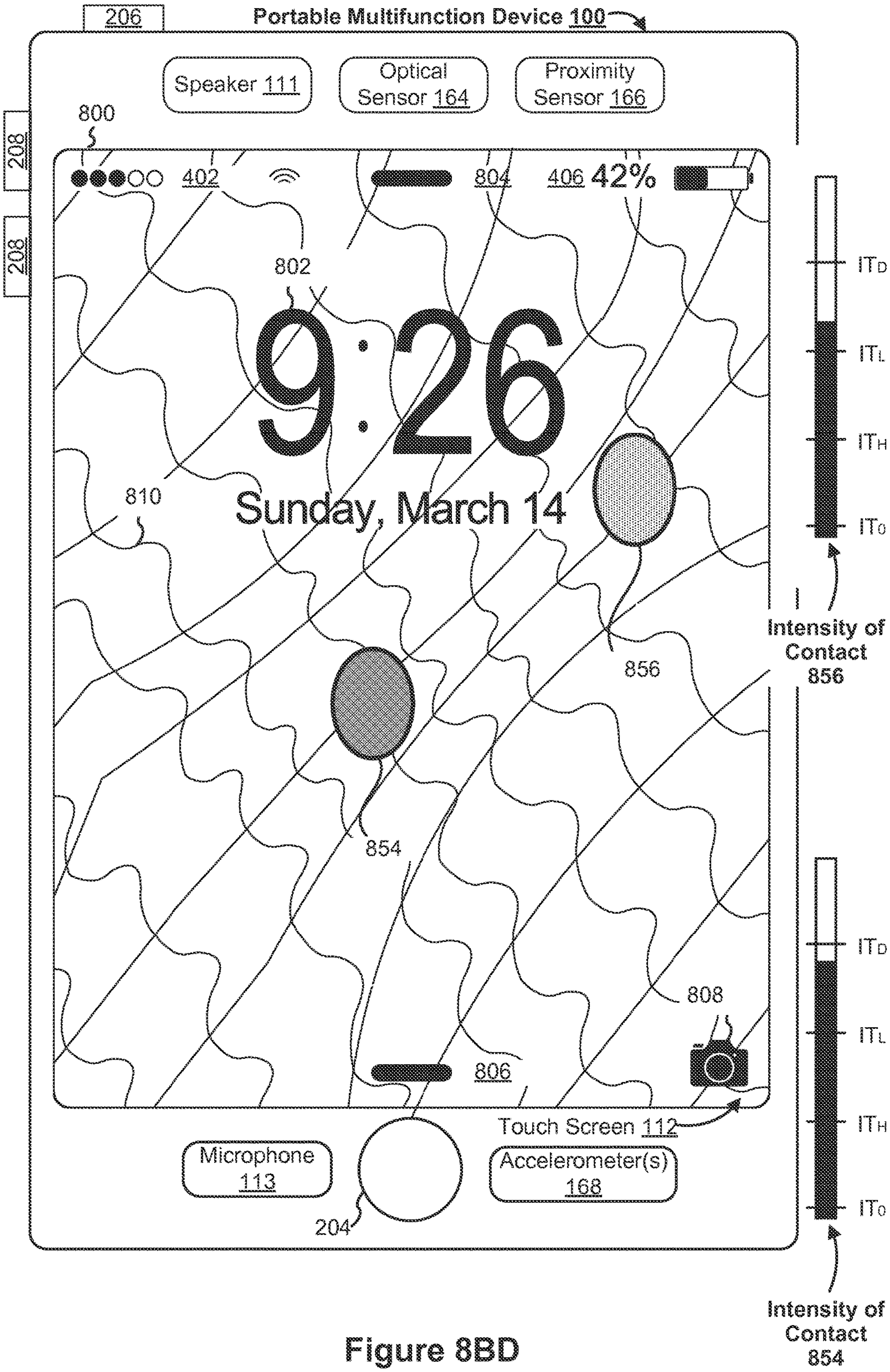
Figure 8B:
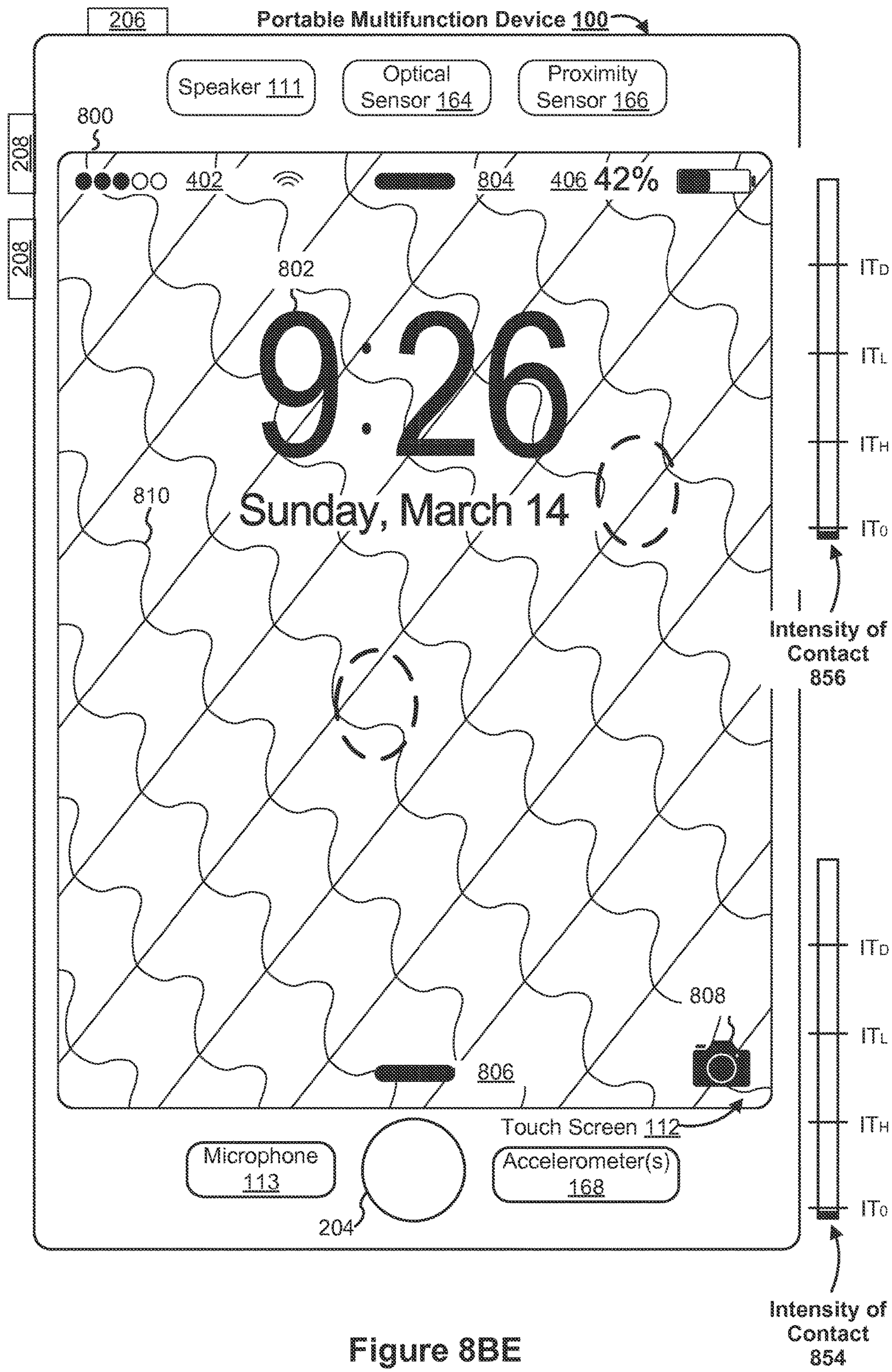
Figure 8B:
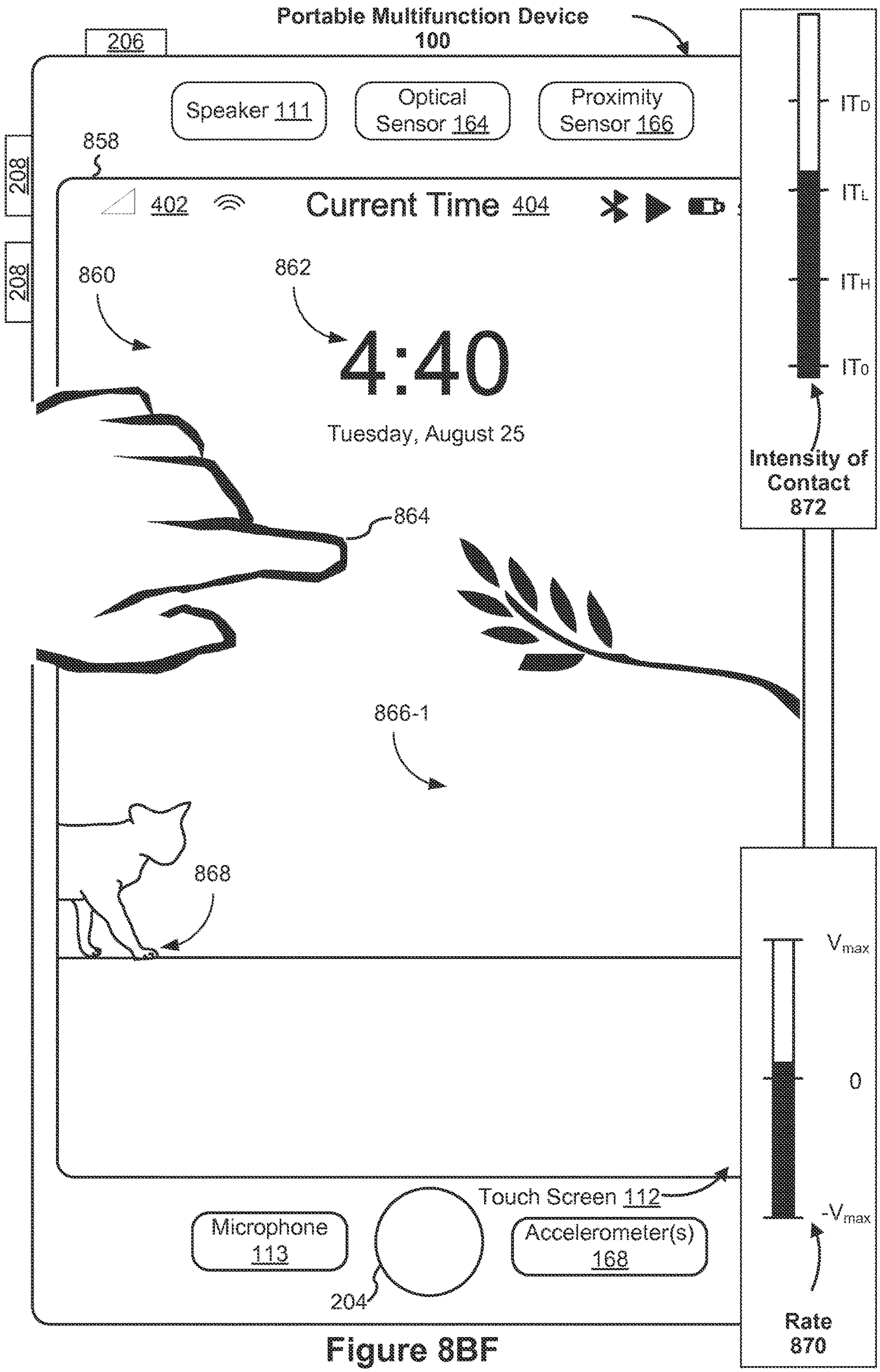
Figure 8B:
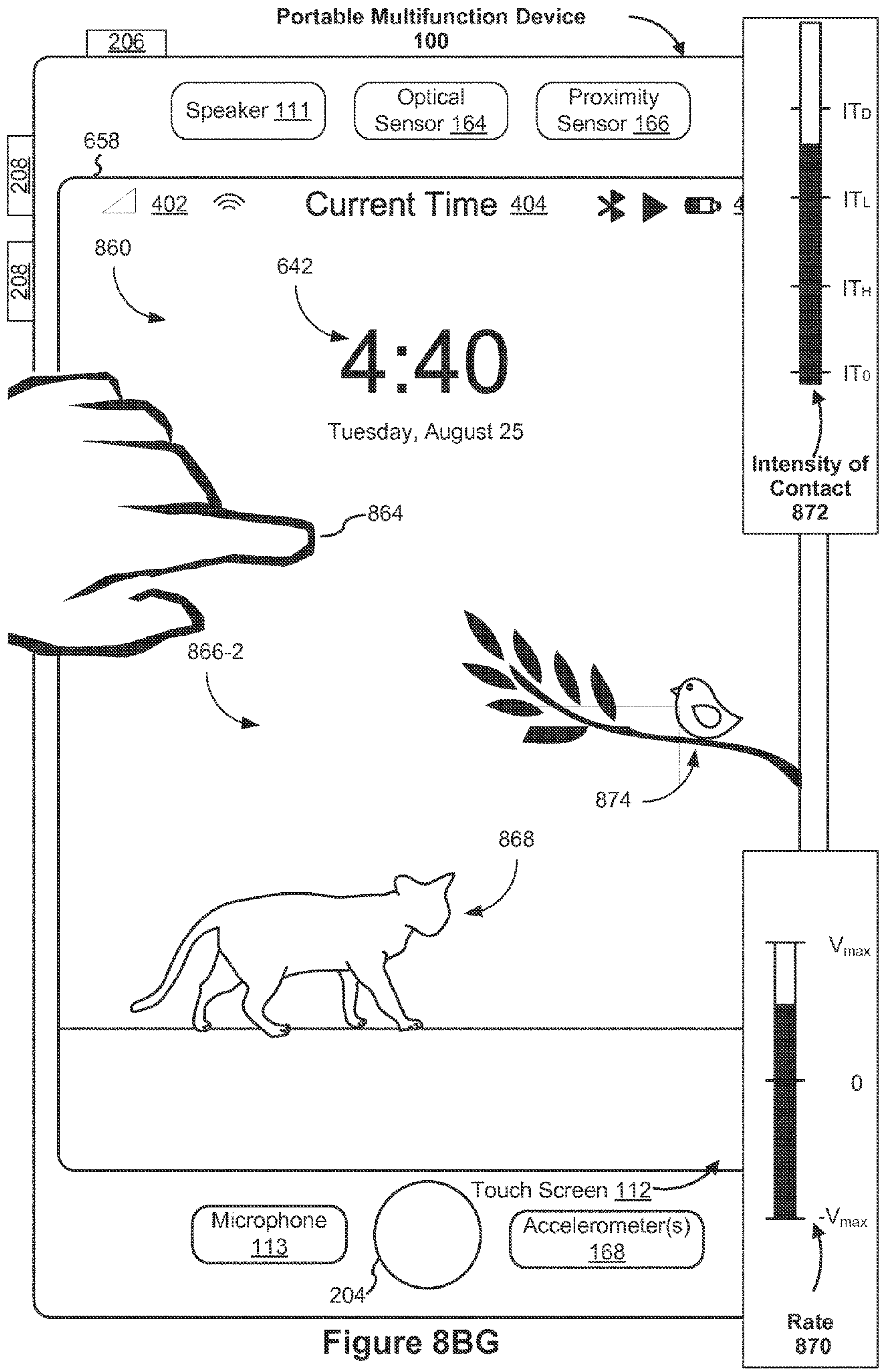
Figure 8B:
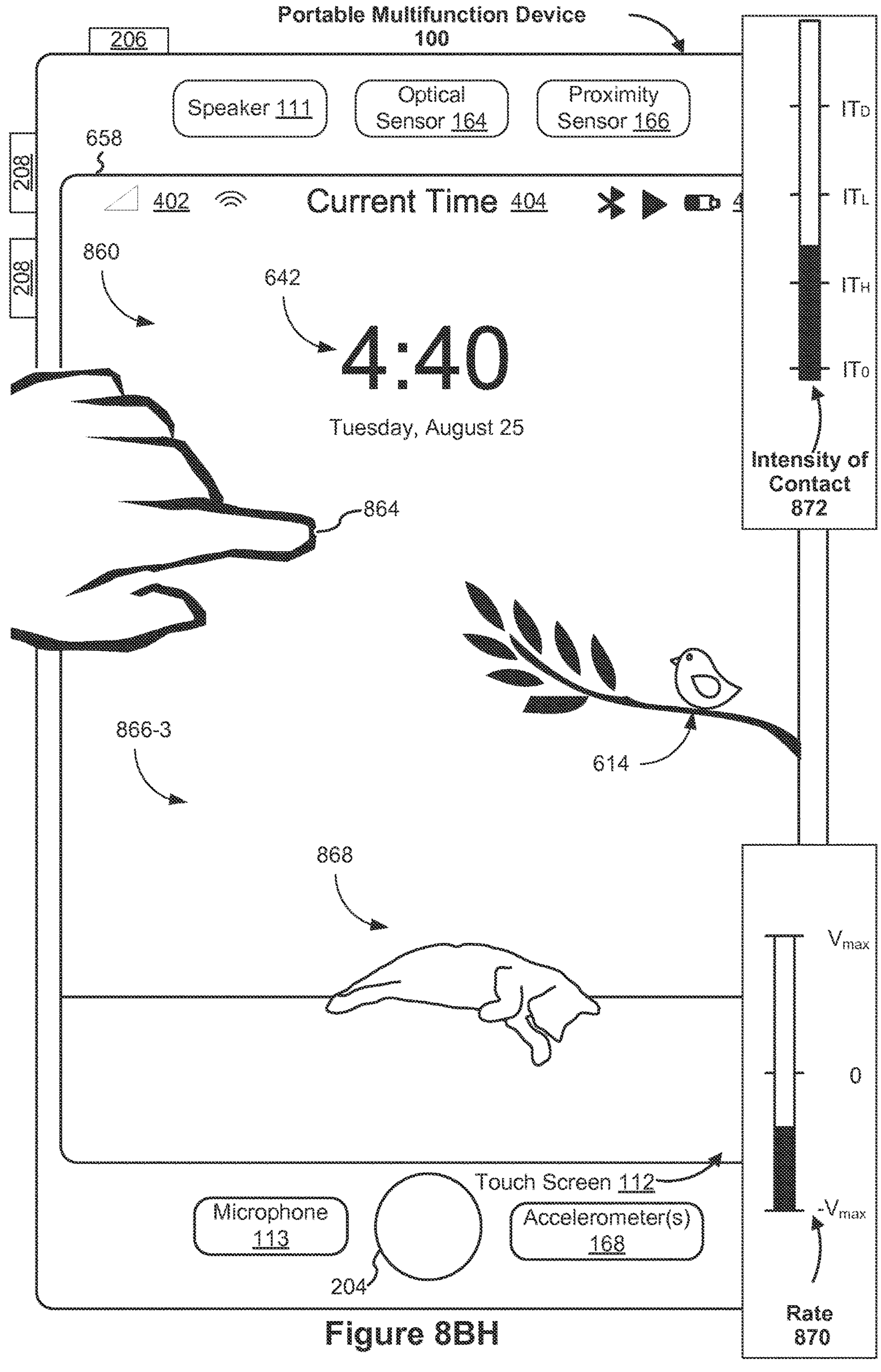
Figure 8B:
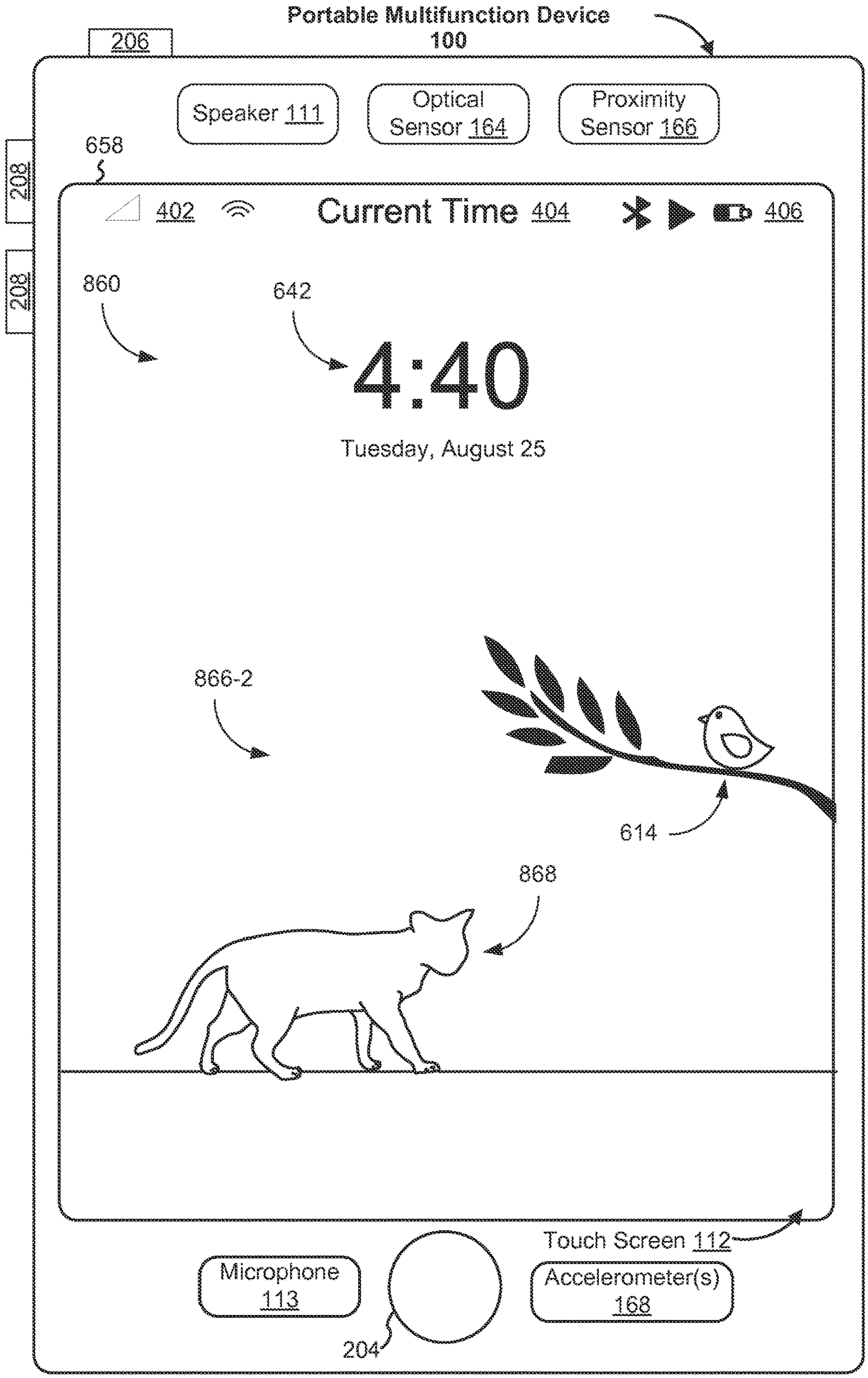
Figure 8B:
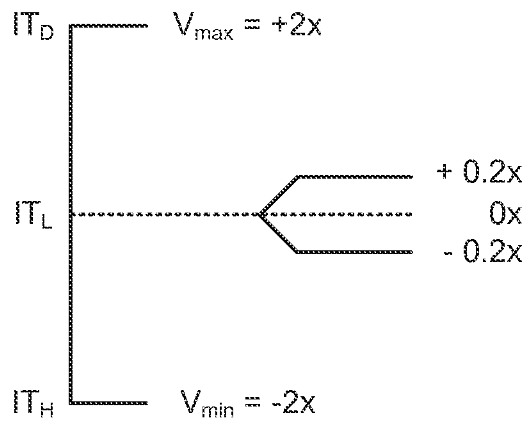
Figure 8B:
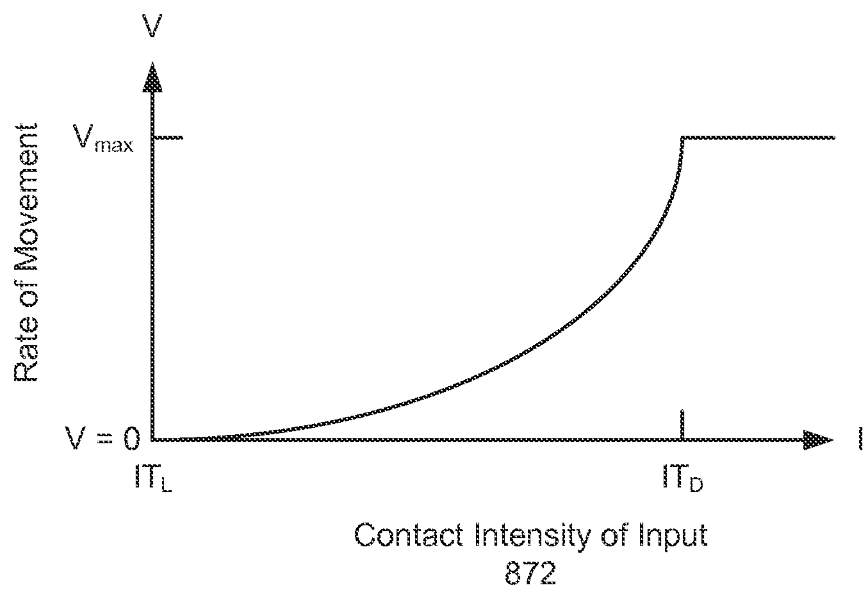

FIGS. 8Y-8AC illustrate an embodiment where the change in the appearance of the background is a ripple effect, like a stone being thrown into a pond. In FIGS. 8Y-8AA, the device detects a jab input, including contact 834 that quickly increases in intensity above a predetermined intensity threshold, and is then lifted off touch screen 112. In response, the device applies a ripple effect to the appearance of the background, including ripples 836, 838, 840, and 842 that emanate away from location on touch screen 112 where contact 834 was detected, as illustrated in FIGS. 8Y-8AC. The effects continues with reducing magnitude after liftoff of contact 834 in FIG. 8AA, as the final ripples slowly disappear from lock screen user interface in FIG. 8AC.

FIGS. 8AD-8AI illustrate an embodiment where the change in the appearance of the background appears to have a trampoline effect after the invoking contact is lifted off of the touch screen. In FIG. 8AD, the device detects contact 844 from hand 846 over the background of lock screen user interface 800, having an intensity below a predetermined intensity threshold. In response to detecting an increase in the intensity of contact 844, the device changes the appearance of the background, simulating that virtual mesh 810 is being pushed back from touch screen 112, in FIG. 8AE. In response to detecting liftoff of contact 844 in FIG. 8AF, the virtual mesh appears to spring forward, above the plane of the device, and then oscillates with decreasing amplitude above and below the plane of the device, in FIGS. 8AF-8AH, before settling back into the same position as prior to first detection of contact 844, in FIG. 8AI.

FIGS. 8AJ-8AS illustrate an embodiment where the rate at which the appearance of the background reverses upon termination of the input is limited by a terminal velocity. In FIG. 8AJ, the device detects contact 848 on the background of lock screen user interface 800, having an intensity below a predetermined intensity threshold. In response to detecting increased intensity of contact 848 above the intensity threshold, the device pushes virtual mesh 810 away from the location of contact 848 in FIG. 8AK. In response to a slow decrease in the intensity of contact 848 in FIGS. 8AL-8AM, the device reverses the change in the appearance of the background proportional to the rate of change of the intensity of contact 848. This is represented graphically in FIG. 88AR.

In FIG. 8AN, the device detects contact 850 on the background of lock screen user interface 800, having an intensity below a predetermined intensity threshold. In response to detecting increased intensity of contact 850 above the intensity threshold, the device pushes virtual mesh 810 away from the location of contact 850 in FIG. 8AO. In response to a rapid decrease in the intensity of contact 850, upon liftoff in FIG. 8AP, the device reverses the change in the appearance of the background at a rate slower than the rate of change in the intensity of contact 850, creating a memory-foam like effect, as illustrated in FIGS. 8AP-8AQ. This is represented graphically in FIG. 88AS.

FIG. 8AT graphically illustrates an embodiment where, similar to the ripple effect illustrated in FIGS. 8Y-8AC, in response to a quick jab-like gesture, the device changes the appearance of the background of a user interface and then reverses the change at a diminishing rate of change.

FIGS. 8AU-8AZ illustrate an embodiment where, after invoking a change in the background appearance of a user interface, the background remains responsive to a user input that decreases in intensity below the intensity threshold required to activate the change. In FIG. 8AU, the device detects contact 852 on the background of lock screen user interface 800, having an intensity below a predetermined intensity threshold. In response to detecting increased intensity of contact 852 above the intensity threshold, the device pushes virtual mesh 810 away from the location of contact 852 in FIG. 8AV. The background remains responsive to contact 852 after a decrease in intensity below the intensity threshold in FIG. 8AW, as illustrated by the change in the appearance of the background in response to movement of contact 852 in FIGS. 8AX-8AY. The change in the appearance of the background is reversed upon liftoff of contact 852 in FIG. 8AZ.

FIGS. 8BA-8BE illustrate an embodiment where the background is responsive to more than one contact meeting the intensity criteria. In FIG. 8BA, the device detects first contact 854 on the background of lock screen user interface 800, having an intensity below a predetermined intensity threshold. In response to detecting increased intensity of contact 854 above the intensity threshold, the device pushes virtual mesh 810 away from the location of contact 854 in FIG. 8BB. In FIG. 8BC, the device detects second contact 856 on the background of lock screen user interface 800, having an intensity below a predetermined intensity threshold. In response to detecting increased intensity of contact 856 above the intensity threshold, the device pushes virtual mesh 810 away from the location of contact 856 in FIG. 8BD, such that the change in the appearance of the background is responsive to both first contact 854 and 856. In response to detecting liftoff of contacts 854 and 856, the devise reverses the change in the background to the same state as prior to first detection of contact 854 in, FIG. 8BE.

In accordance with some embodiments, FIGS. 8BF-8BI illustrate a user interface that initially displays a first image in a sequence of images (e.g., an enhanced photo). The user interface plays the sequence of images forwards or backwards, in accordance with an intensity of a contact of a user input, in the following manner: a range of intensities above a threshold map to forward rates of movement through the sequence of images while a range of intensities below the threshold map to backwards rates of movement through the sequence of images. In some embodiments, the user interface does not loop the sequence of images. So, when the initial image is displayed, a contact with an intensity above the threshold plays the images forward at a rate proportional to the contact intensity and stops when the final image is reached. When the user eases off of the contact such that the contact intensity drops below the threshold, the device plays the images backwards at a rate based on the contact intensity and stops when the initial image is reached.

FIG. 8BF illustrates a user interface 858. In some embodiments, user interface 858 is a lock-screen user interface. For example, a user may lock device 100 so that she can put device 100 in her pocket without inadvertently performing operations on device 100 (e.g., accidentally calling someone). In some embodiments, when the user wakes up device 100 (e.g., by pressing any button), lock screen user interface 858 is displayed. In some embodiments, a swipe gesture on touch screen 112 initiates a process of unlocking device 100.

Portable multifunction device 100 displays, in user interface 860, a representative image 866-1 in a grouped sequence of images 866. In some embodiments, the sequence of images 866 is an enhanced photo that the user has chosen for her lock screen (e.g., chosen in a settings user interface). In the example shown in FIGS. 8BF-8BI, the sequence of images is an enhanced photo that depicts a scene in which a cat 868 walks into the field of view and rolls his back on the ground. Meanwhile, a bird 874 lands on a branch. In some embodiments, the sequence of images includes one or more images acquired after acquiring the representative image (e.g., the representative image 866-1 is an initial image in the sequence of images).

In some embodiments, user interface 860 also includes quick access information 862, such as time and date information.

While displaying representative image 866-1 on touch screen 112, device 100 detects an input 864 (e.g., a press-and-hold gesture) for which a characteristic intensity of a contact on touch screen 112 exceeds an intensity threshold. In this example, the intensity threshold is the light press threshold $IT_L$. As shown in intensity diagram 872 (FIG. 8BF), input 864 includes a contact that exceeds light press threshold $IT_L$.

In response to detecting the increase in the characteristic intensity of the contact, the device advances in chronological order through the one or more images acquired after acquiring representative image 866-1 at a rate that is determined based at least in part on the characteristic intensity of the contact of input 864. So, for example, display of representative image 866-1 (FIG. 8BF) is replaced with display of image 866-2 (FIG. 8BG) at a rate, as indicated in rate diagram 870 (FIG. 8BF), that is based on the contact intensity shown in intensity diagram 872 (FIG. 8BF). Image 866-2 is an image in the sequence of images 866 that was acquired after representative image 866-1. Display of image 866-2 (FIG. 8BG) is replaced with display of image 866-3 (FIG. 8BH) at a faster rate, as indicated in rate diagram 870 (FIG. 8BG), that is based on the contact intensity shown in intensity diagram 872 (FIG. 8BG). Image 866-3 is an image in the sequence of images 866 that was acquired after image 866-2.

In FIG. 8BH, the intensity of input 864's contact drops below $IT_L$, which in this example is the threshold for playing backwards or forwards through the sequence of images 866. As a result, image 866-3 (FIG. 8BH) is replaced with previous image 866-2 (FIG. 8BI) at a backwards rate that is based on input 864's current contact intensity.

In some embodiments, the rate, indicated in rate diagrams 870 (FIGS. 8BF-8BH) is proportional to an absolute value of the difference between $IT_L$ and input 864's current contact intensity, as shown in intensity diagrams 872 (FIGS. 8BF-8BH). The direction of movement is based on whether the current contact intensity is above (e.g., forward movement) or below (e.g., backward movement) the $IT_L$ (or any other appropriate threshold).

In some embodiments, the rate forward or backward is determined in real-time or near-real time, so that the user can speed up or slow down movement through the images (either in the forward or reverse direction) by changing the characteristic intensity of the contact. Thus, in some embodiments, the user can scrub forwards and backwards through sequence of images 866 (e.g., in between the initial and final images in the sequence of images) by increasing and decreasing the contact intensity of user input 864.

In accordance with some embodiments, FIGS. 8BJ-8BK are graphs illustrating how the rate of movement, V, relates to input 864's current contact intensity, I.

As shown in FIG. 8BJ, the threshold for forward/backwards movement, in this example, is the light press threshold $IT_L$. When input 864's current contact intensity is equal to the light press threshold $IT_L$, device 100 does not advance through the sequence of images in either chronological or reverse-chronological order. Thus, device 100 maintains a currently displayed image from sequence of image 866 (e.g., the rate of movement is equal to 0×, where 1× is the speed at which the images in sequence of images 866 were acquired). When input 864's current contact intensity is just above the light press threshold $IT_L$, device 100 advances through the sequence of images in chronological order at a first rate (e.g., 0.2×). When input 864's current contact intensity is the same amount below the light press threshold $IT_L$, device 100 advances through the sequence of images in reverse-chronological order at the first rate (e.g., advances at a −0.2× rate, where the minus sign denotes reverse-chronological order or backwards playback).

In this example, device 100 has a maximum rate $V_{max}$ (e.g., plus or minus 2×) which is reached when input 864's current contact intensity reaches deep press threshold $IT_D$ (or any other upper threshold) and hint threshold $IT_H$ (or any other appropriate lower threshold), respectively. The rate of movement through the sequence of images is constrained by a maximum reverse rate while the contact is detected on the touch-sensitive surface FIG. 8BK shows an exemplary response curve where the rate of movement increases exponentially from 0× to $V_{max}$ between light press threshold $IT_L$ and deep press threshold $IT_D$. Above deep press threshold $IT_D$, the rate of movement is constant.

In accordance with some embodiments, certain circumstances optionally result in device 100 deviating from a rate of movement based solely on input 864's current contact intensity. For example, as device 100 nears a final image while advancing forward through sequence of images 866, device 100 slows the rate of movement as compared to what the rate of movement would be if it were based solely on input 864's current contact intensity (e.g., device 100 "brakes" slightly as it reaches the end of the sequence of images). Similarly, in some embodiments, as device 100 nears an initial image while advancing backwards through sequence of images 866, device 100 slows the rate of movement as compared to what the rate of movement would be if it were based solely on input 864's current contact intensity (e.g., device 100 "brakes" slightly as it reaches the beginning of the sequence of images going backwards).

Figure 9A:
FIGS. 9A-9S illustrate exemplary user interfaces for dynamically changing a background of a user interface in accordance with some embodiments.
Figure 9B:
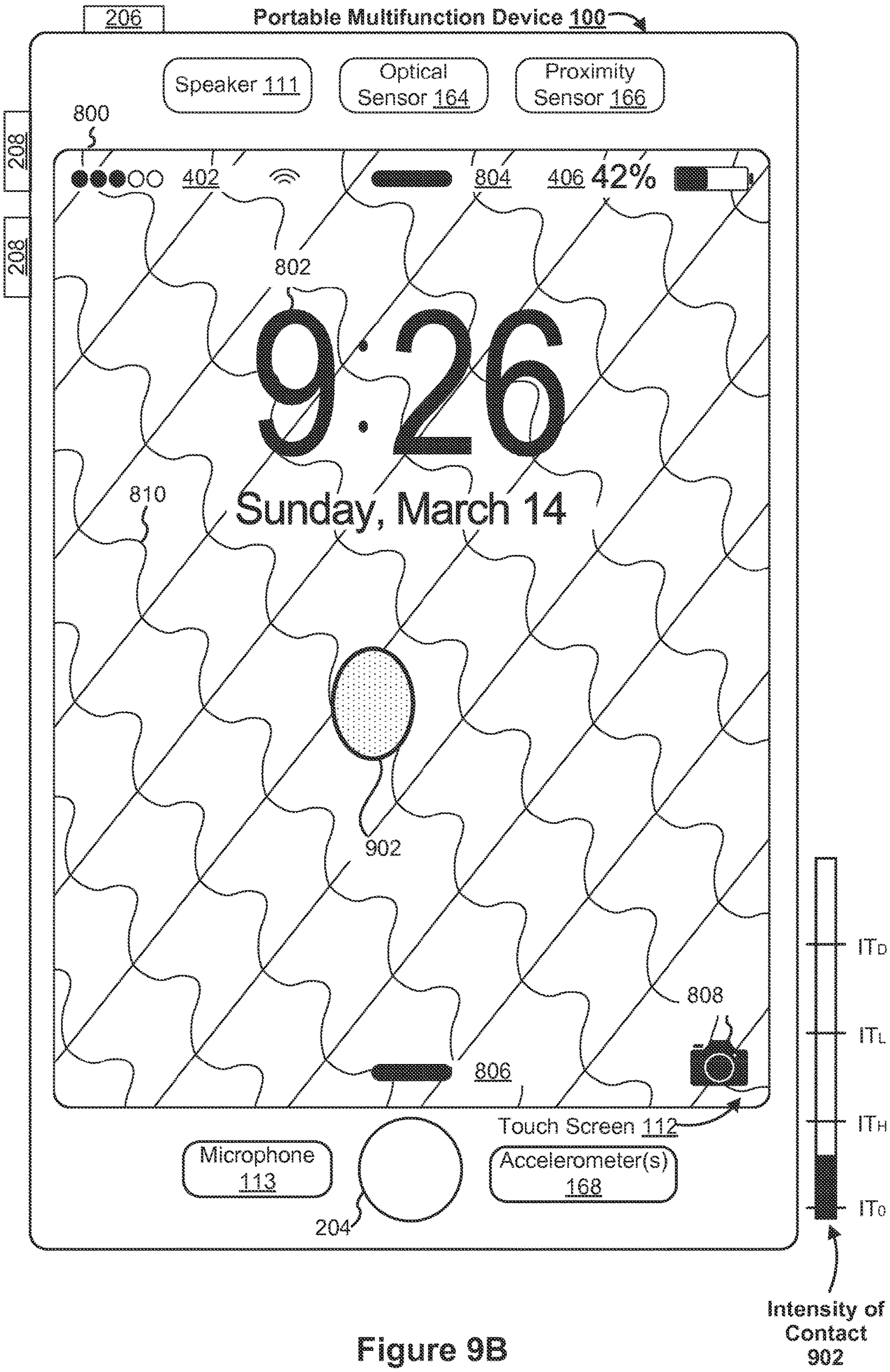
Figure 9C:
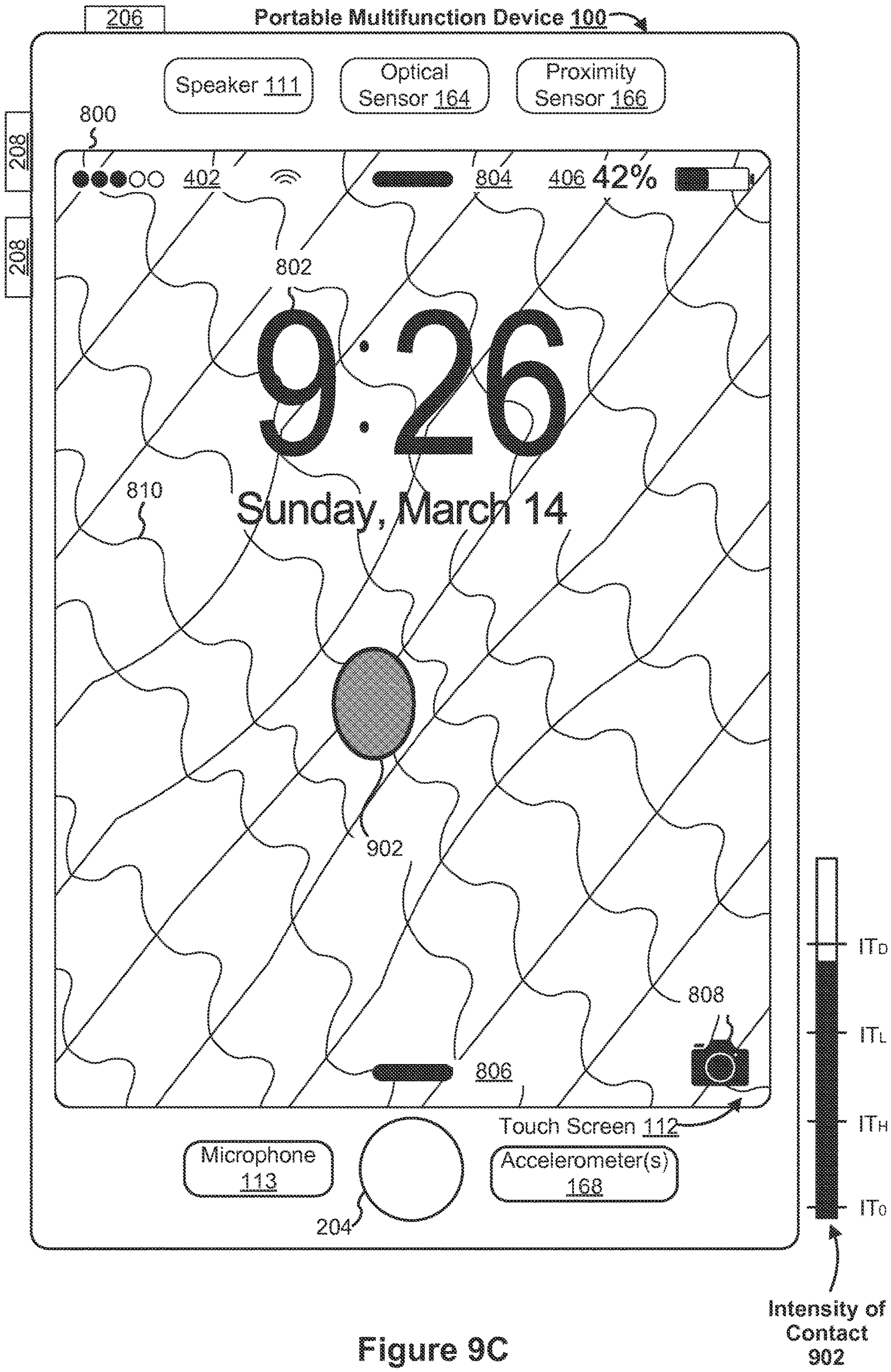
Figure 9D:
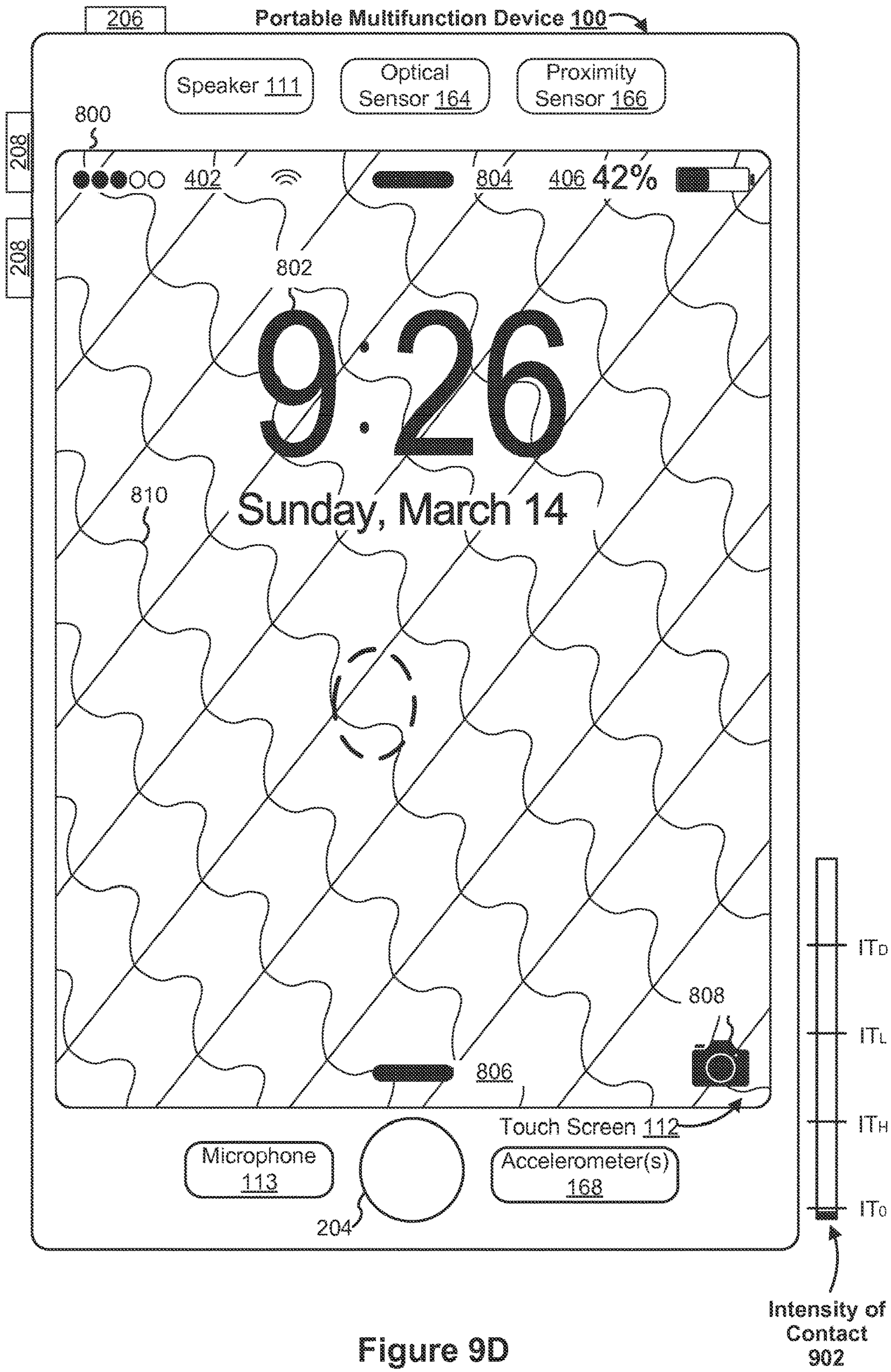
Figure 9E:
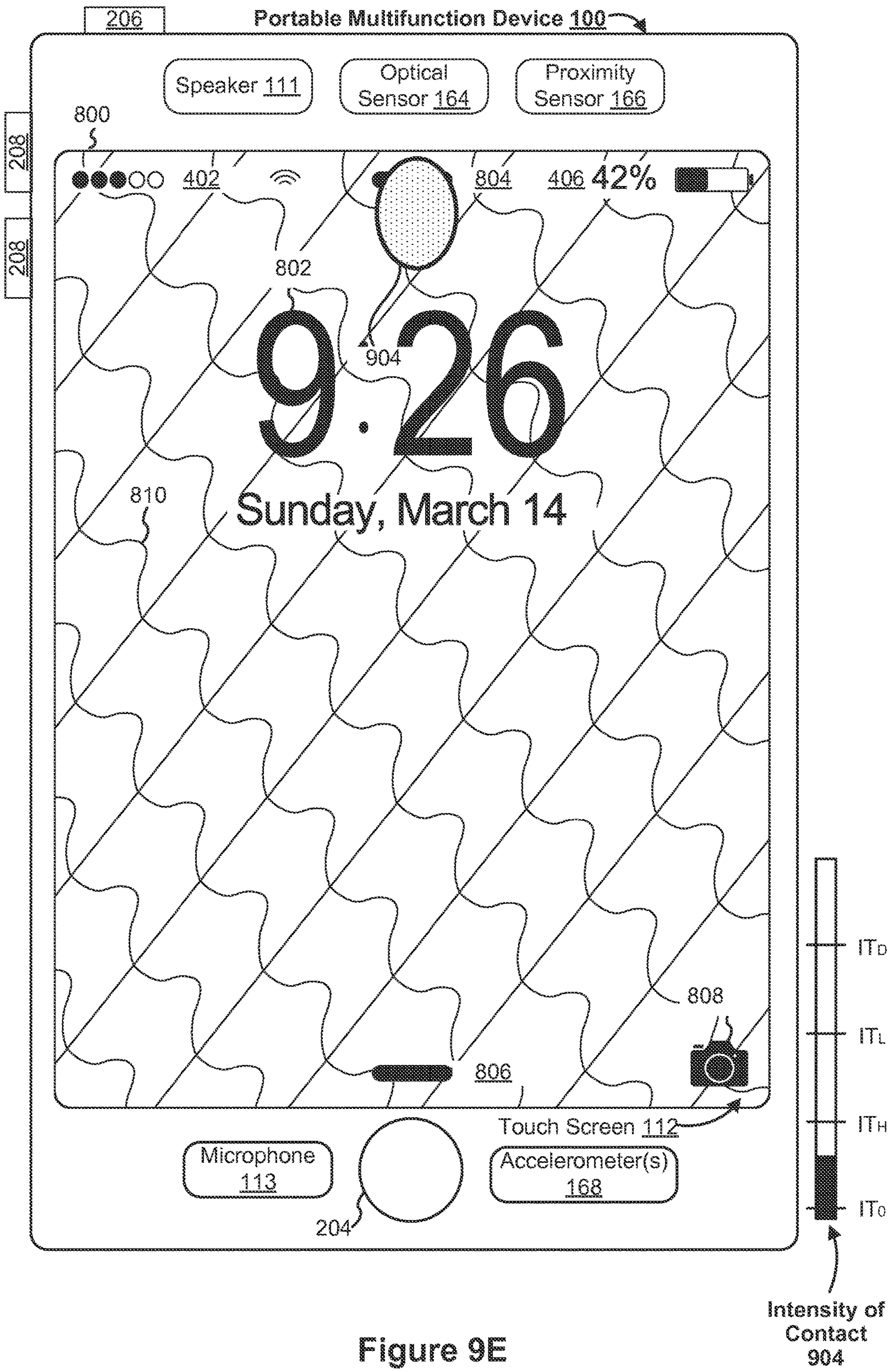
Figure 9F:
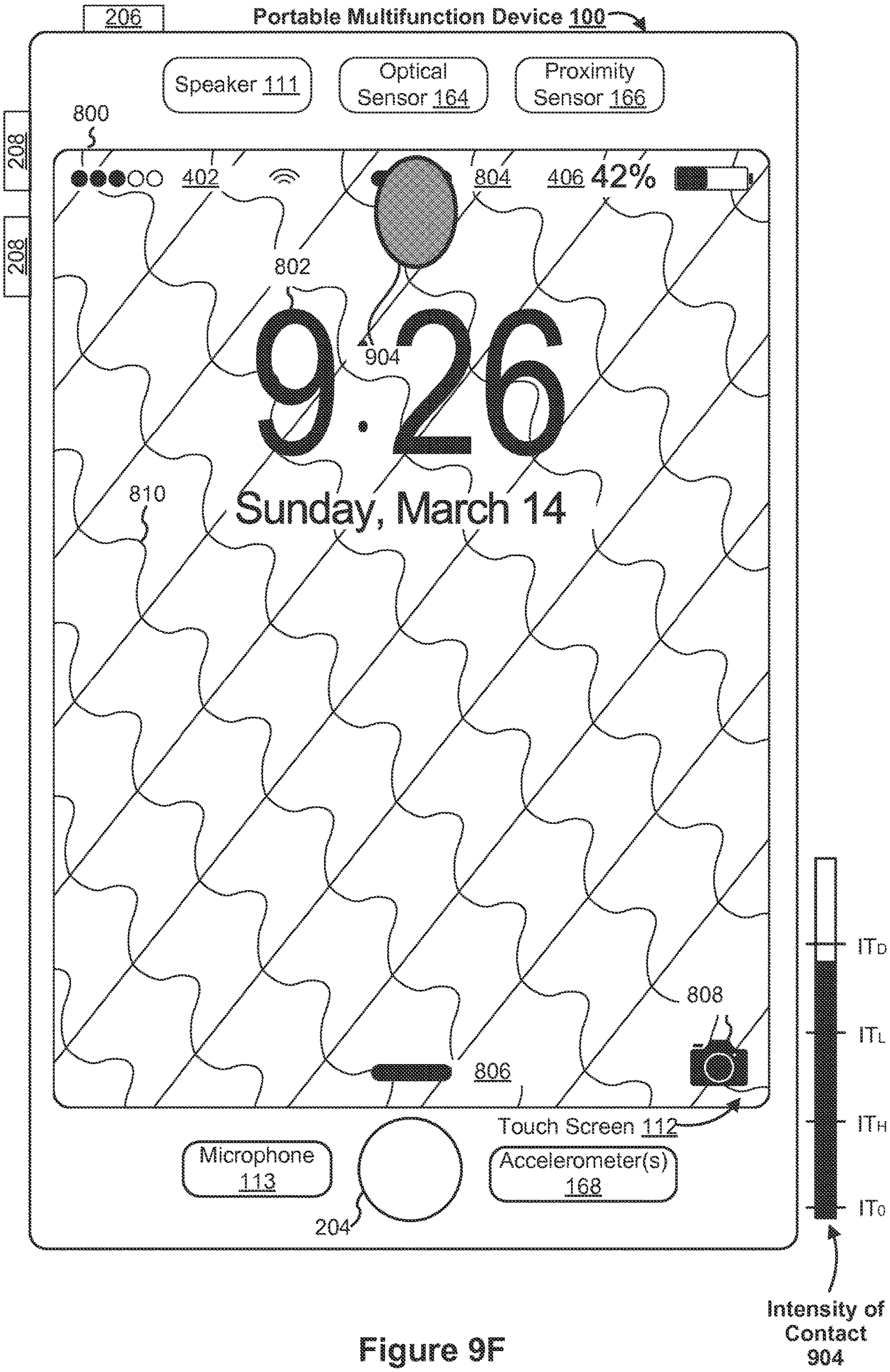
Figure 9G:
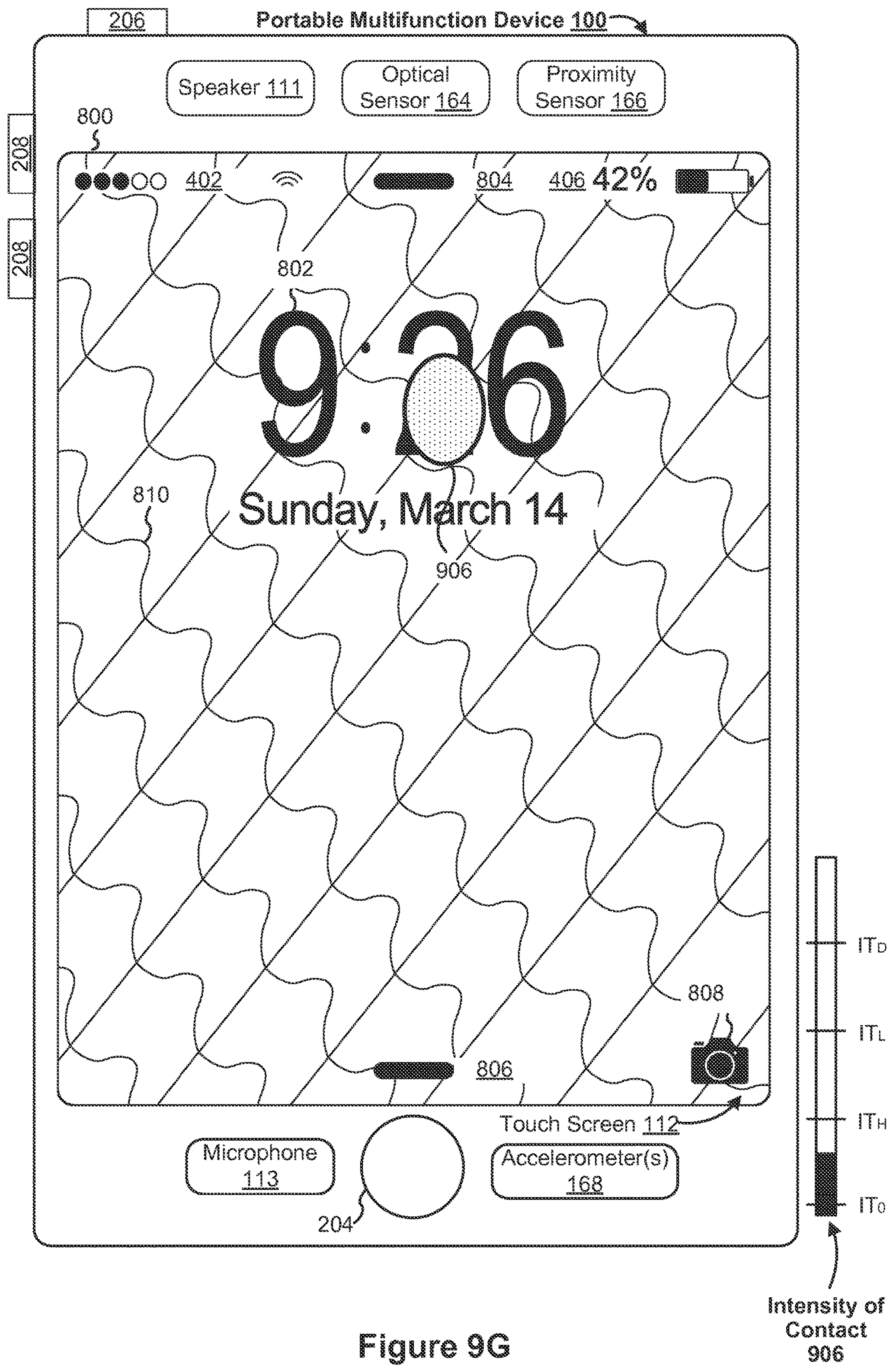
Figure 9H:
Figure 9I:
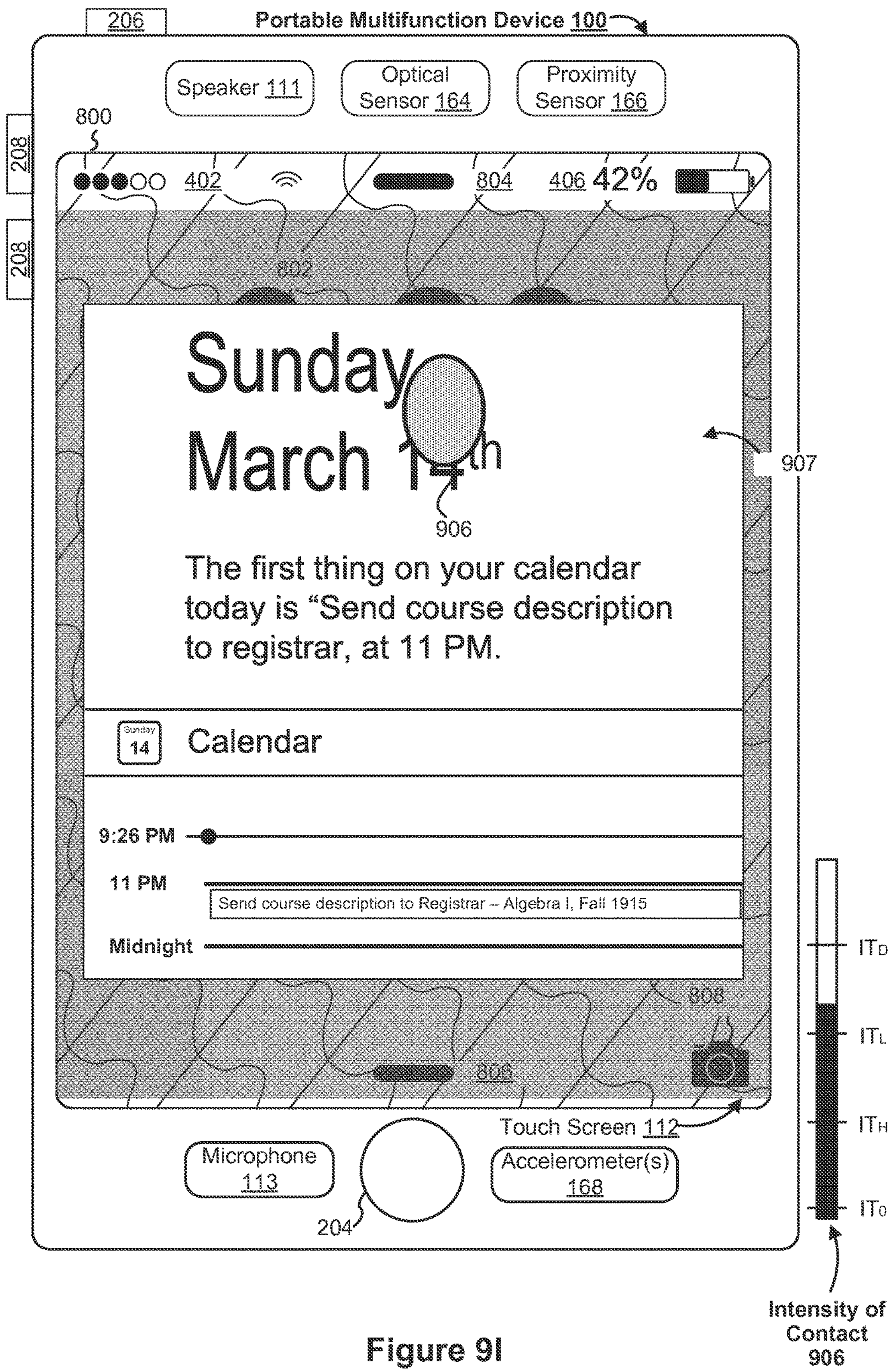
Figure 9J:
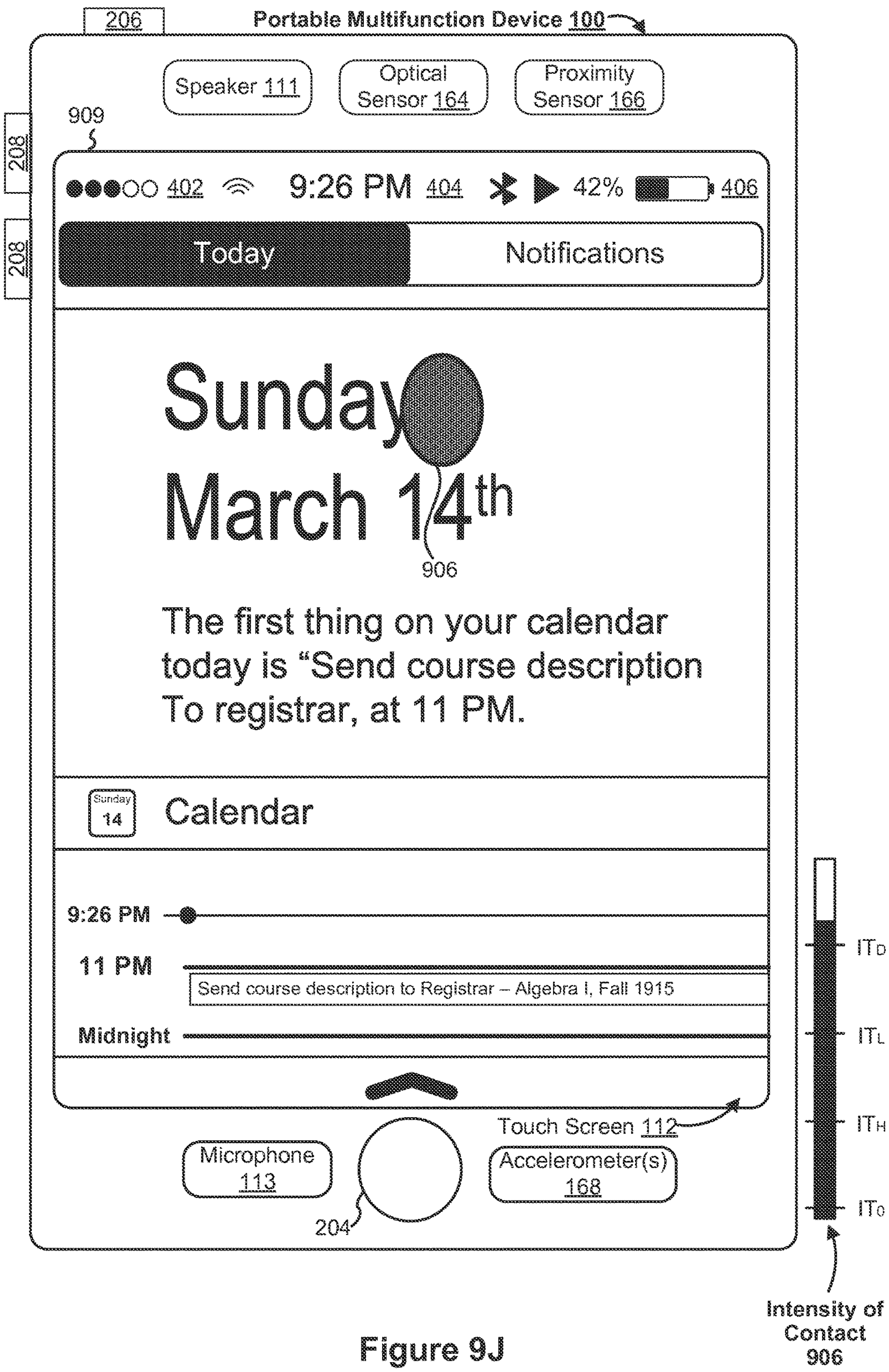
Figure 9K:
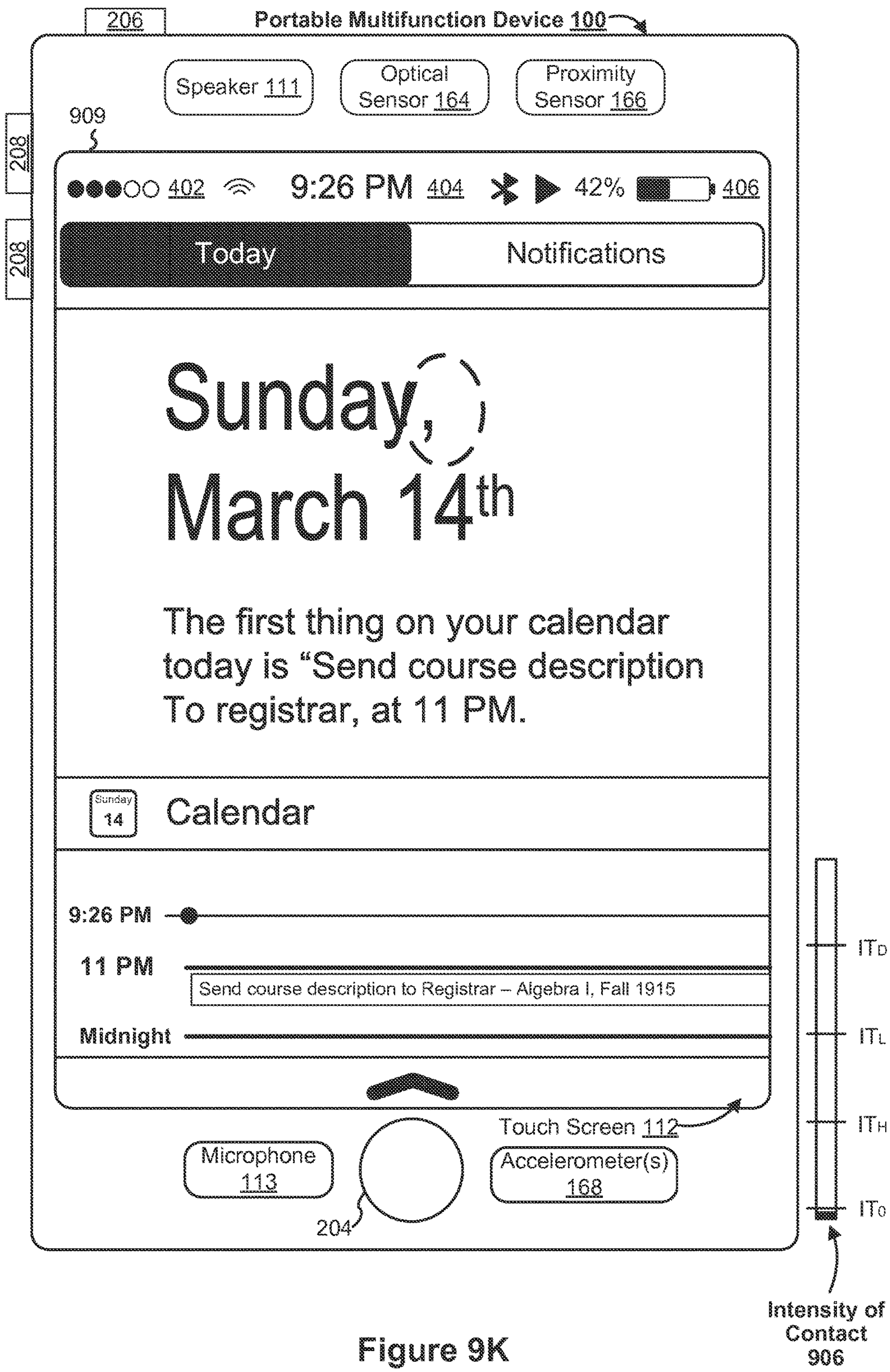
Figure 9L:
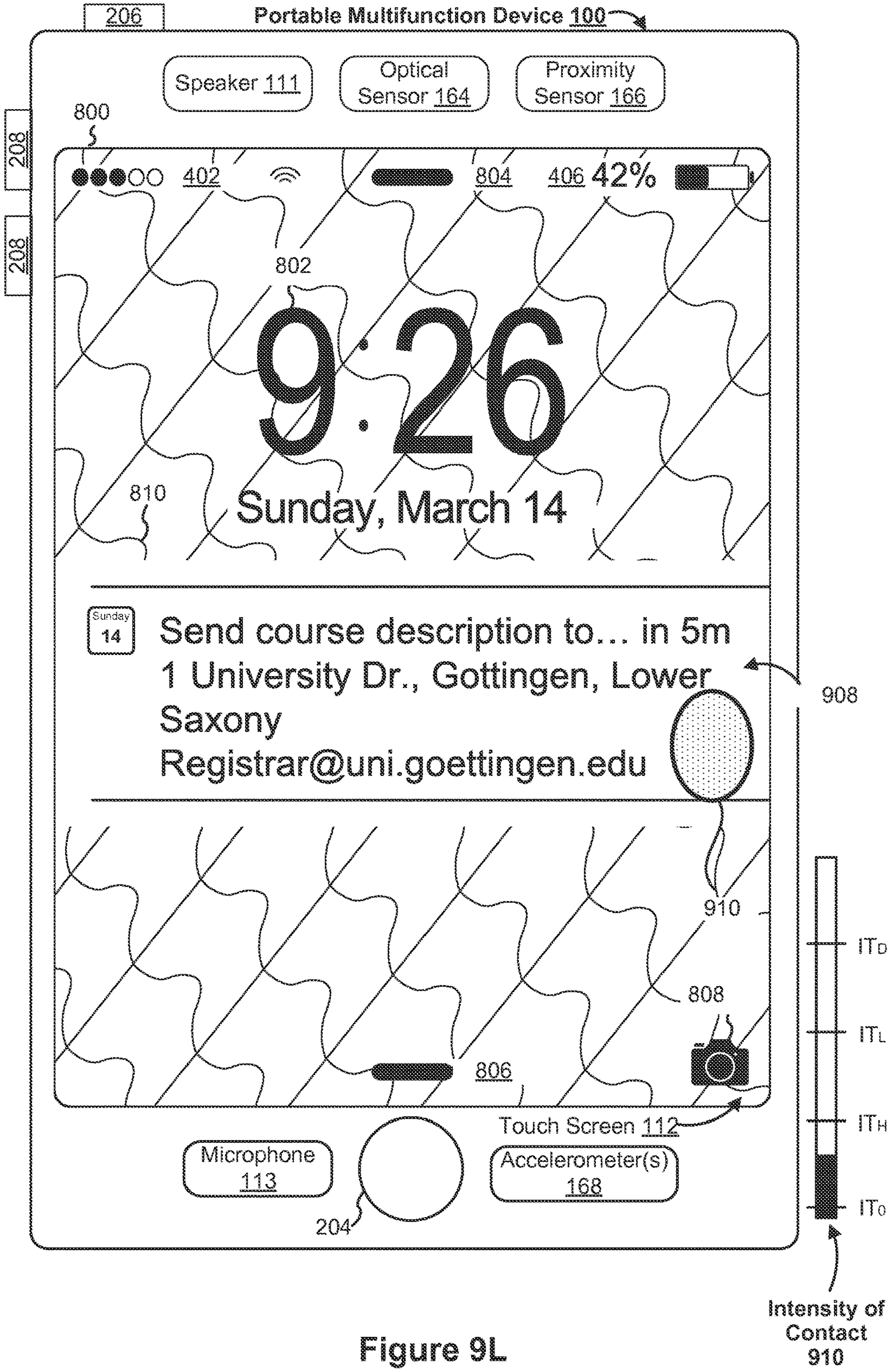
Figure 9M:
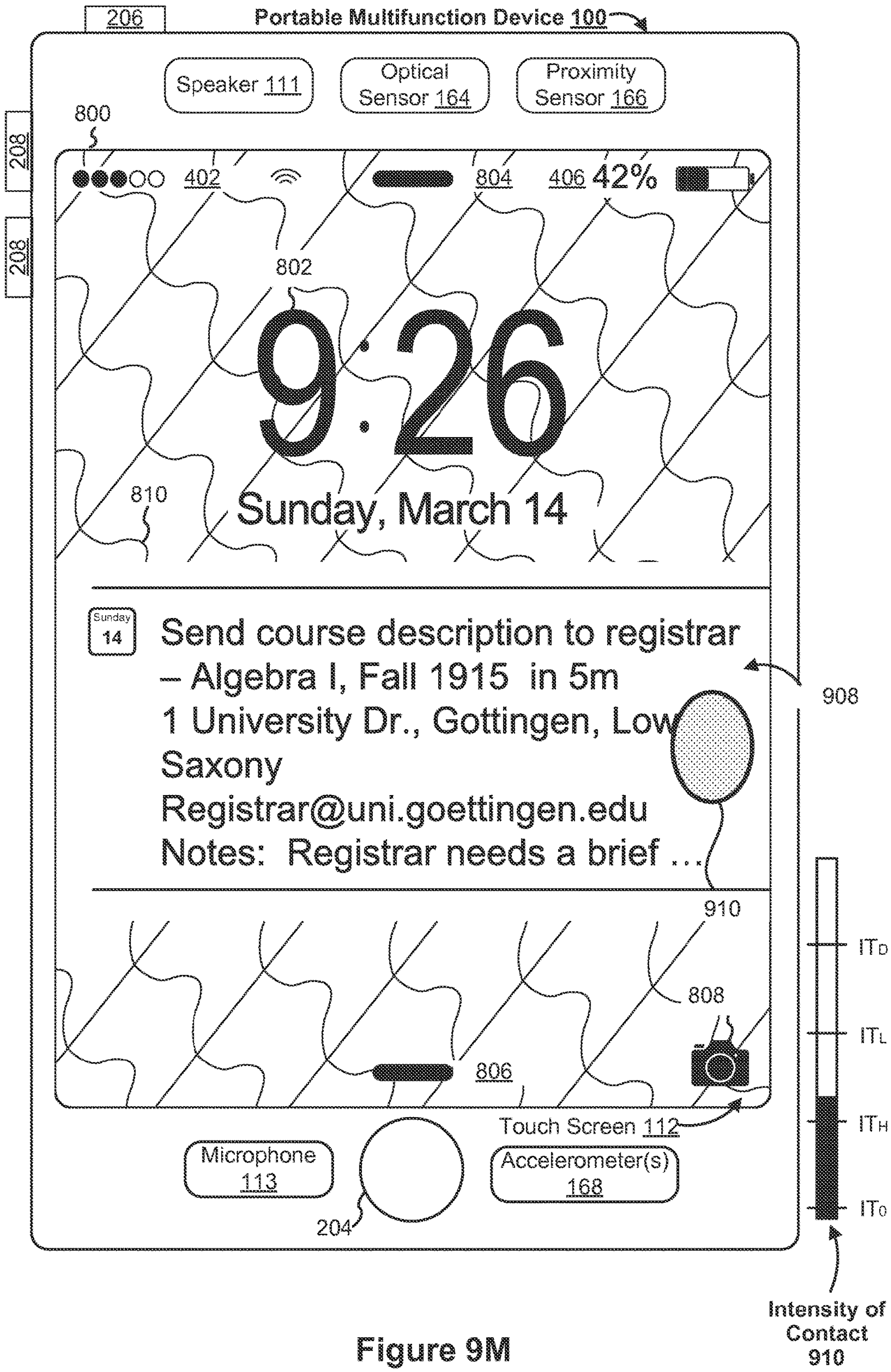
Figure 9N:
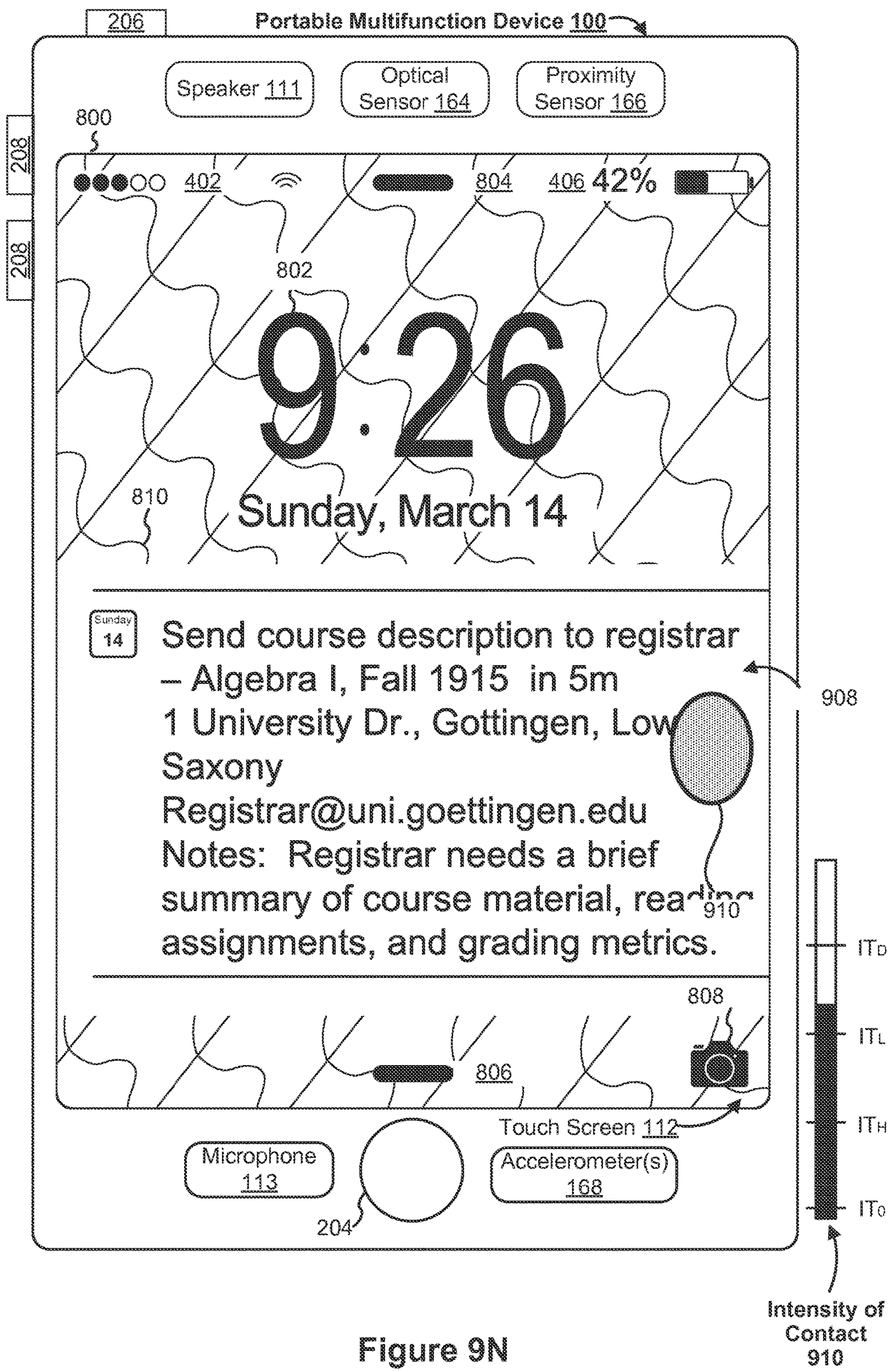
Figure 9O:
Figure 9P:
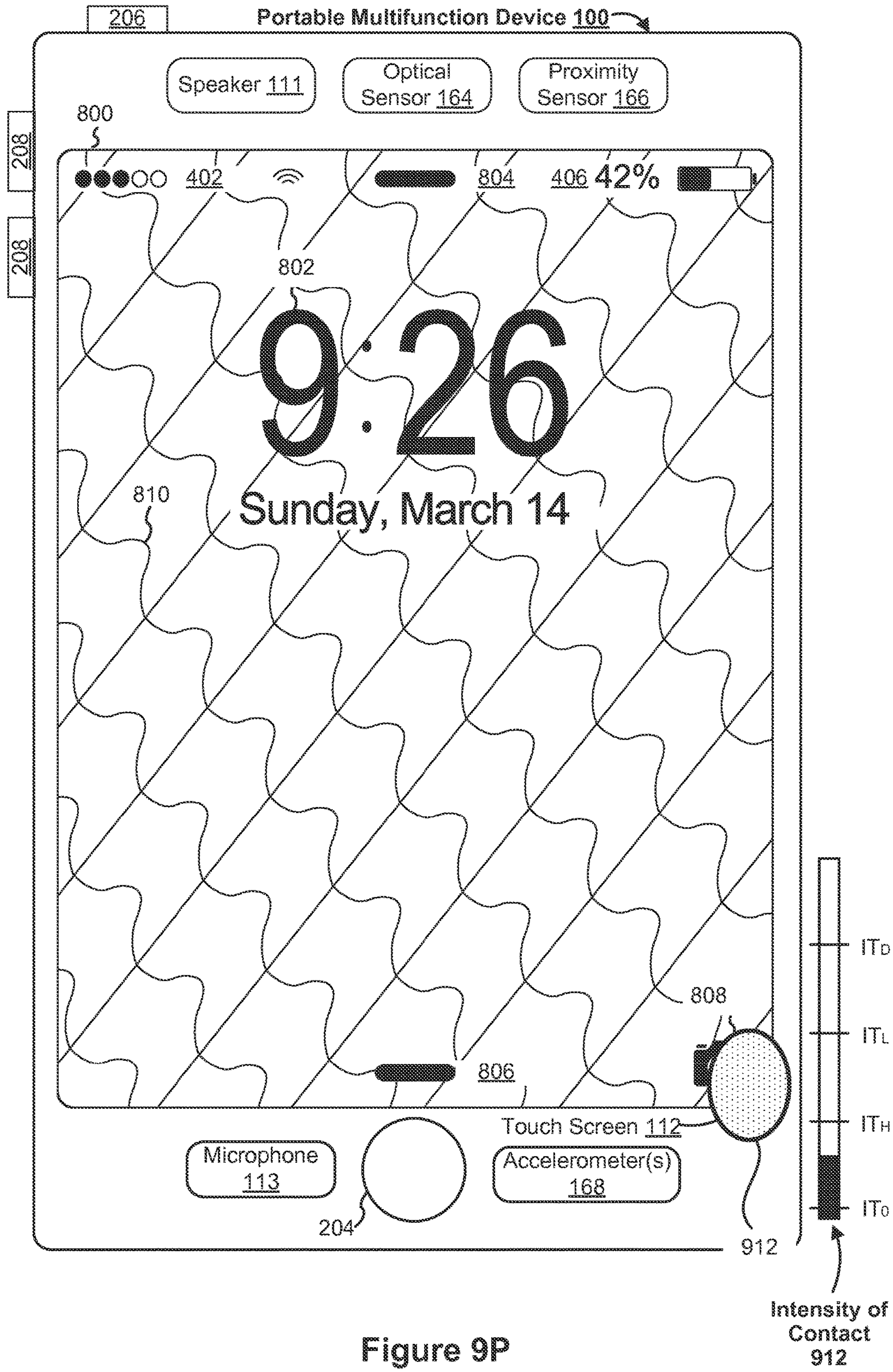
Figure 9Q:
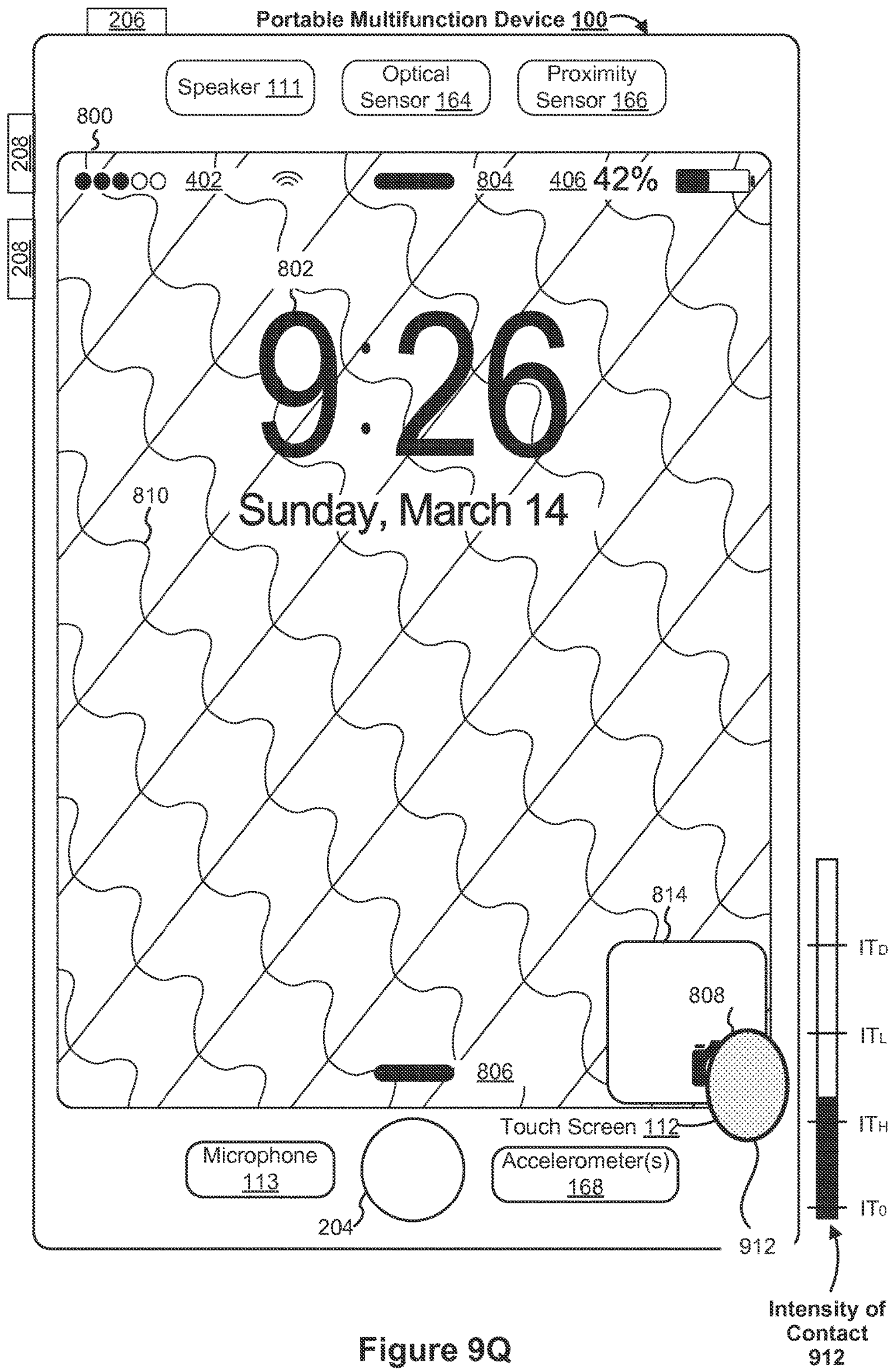
Figure 9R:
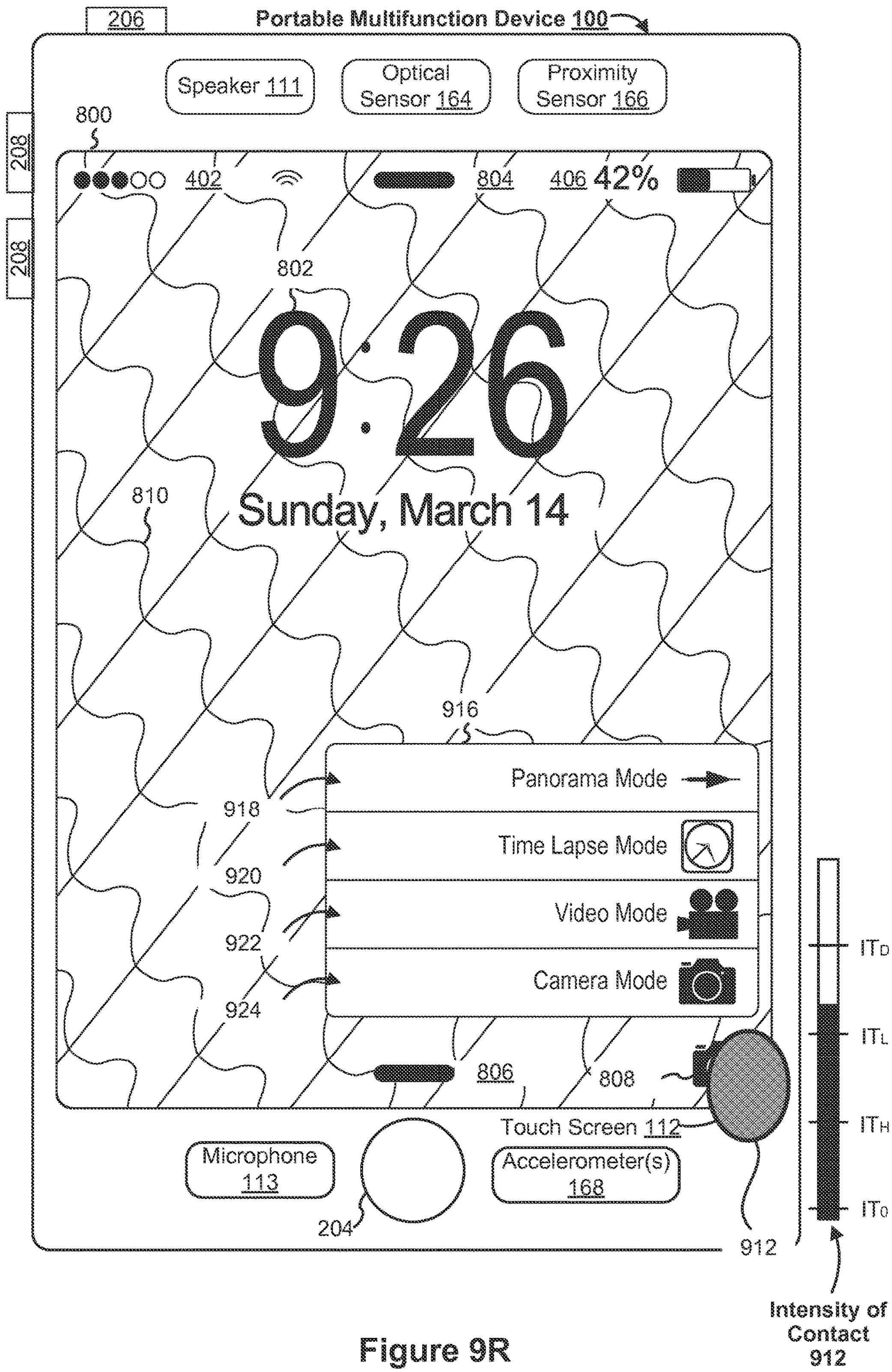
Figure 9S:
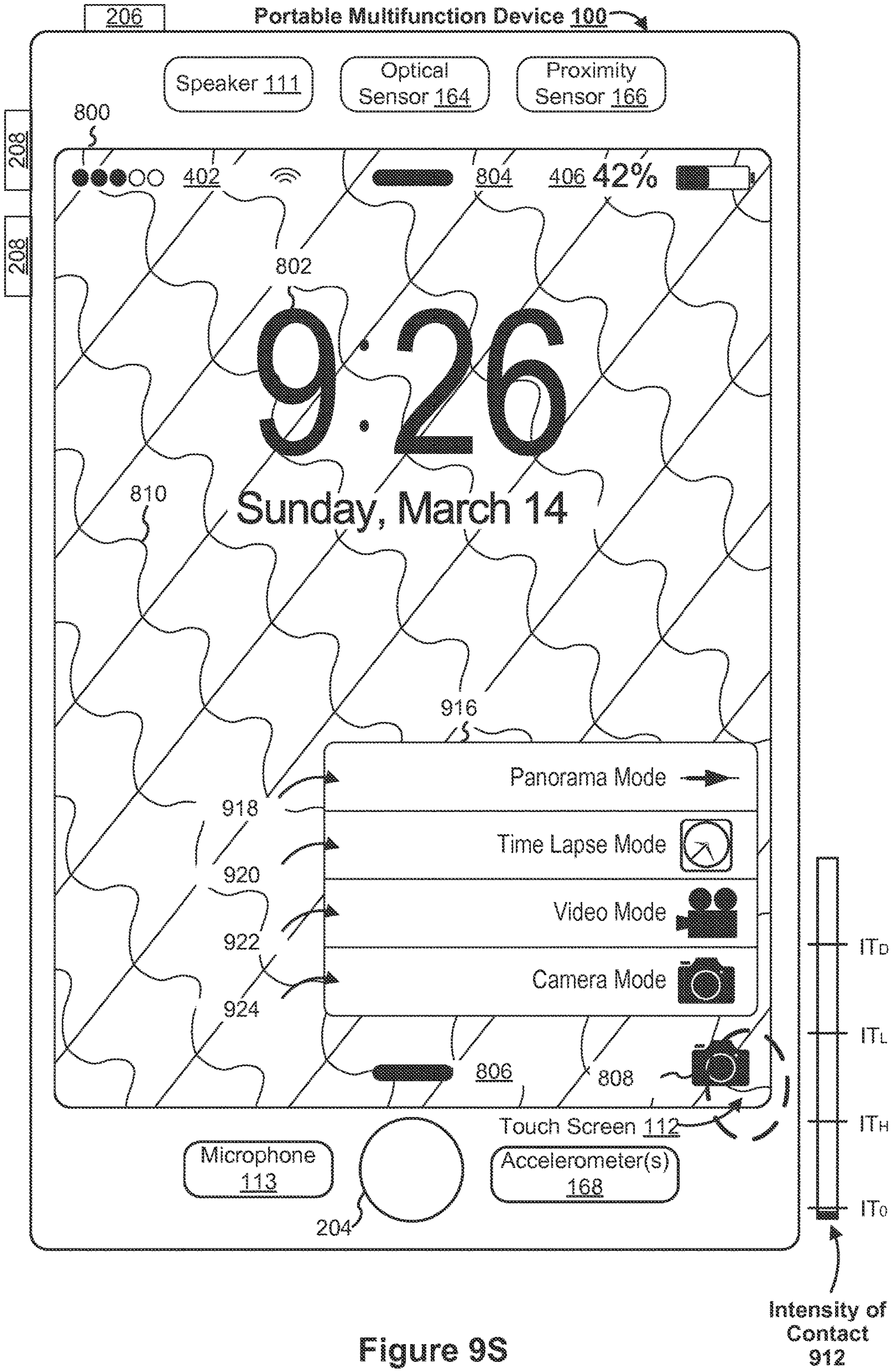

FIGS. 9A-9S illustrate exemplary embodiments of a user interface that allows the user to efficiently interact with functional elements of a user interface for a locked state of the device, which also serves as a means for teaching the user to apply appropriate force when performing force-dependent inputs. The user interfaces in these figures are used to illustrate the processes described below. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 9A-9I and 9L-9S illustrate an exemplary user interface 800 for a lock screen on device 100. The lock screen user interface displays background elements 810, consisting of a repeated geometric shape, and plurality of foreground user interface objects (e.g., time and date 802, handle icon 804 for navigating to a notification user interface, handle icon 806 for navigating to settings control center user interface, and camera icon 808 for navigating to an image acquisition user interface). In some embodiments, the background elements of lock screen user interface 800 are responsive to contacts having an intensity above a predetermined intensity threshold (e.g., a "hint" threshold $IT_H$, a "peek" threshold $IT_L$, and/or a "pop" threshold $IT_D$). In some embodiments, one or more of the foreground elements are also responsive such contacts, but in a different fashion than are the background elements 810.

FIGS. 9A-9E illustrate an embodiment where the background of user interface changes in response to a detecting a contact with an intensity above a predetermined threshold. FIG. 9A illustrates lock screen user interface 800 on device 100, which includes background elements 810 and a plurality of foreground elements (e.g., time and date 802, handle icon 804 for navigating to a notification user interface, handle icon 806 for navigating to settings control center user interface, and camera icon 808 for navigating to an image acquisition user interface). In FIG. 9B, the device detects contact 902 over background elements 810 (e.g., virtual mesh 810), having an intensity below a predetermined intensity threshold (e.g., $IT_L$). Responsive to detecting an increase in the intensity of contact 902 above intensity threshold $IT_L$, virtual mesh 810 appears to be pushed back (e.g., in virtual z-space) from touch screen 112 in FIG. 9C. This gives the appearance that the background of the lock screen user interface 900 is a virtual mesh that the user can interact with above a predetermined intensity threshold. In response to lift off of contact 902, the appearance of the background reverts to the same state as before contact 902 was first detected, in FIG. 9D.

FIGS. 9E-9F illustrate an embodiment where a foreground element is not responsive to a touch input having an intensity above an intensity threshold sufficient for changing the appearance of the background. In FIG. 9B, the device detects contact 904 over foreground handle icon 804, having an intensity below a predetermined intensity threshold (e.g., $IT_L$). Because handle icon 804 is not associated with any high intensity actions, no change in the appearance of user interface 800 occurs when the intensity of contact 904 increases above the intensity threshold in FIG. 9F.

FIGS. 9G-9K illustrate an embodiment where a preview of additional content associated with foreground element is displayed in response to a touch input having an intensity above an intensity threshold that is also sufficient for changing the appearance of the background. In FIG. 9G, the device detects contact 906 over time and date 802, having an intensity below a predetermined intensity threshold (e.g., $IT_L$). In FIG. 9H, the intensity of contact 906 increases above a "hint" threshold (e.g., $IT_H$), but remains below the intensity threshold needed to invoke the preview area of further content associated with date and time 802 (e.g., $IT_L$). The device indicates that the user is approaching the intensity needed to call up the preview area by starting to increase the size of date and time 802. In FIG. 9I, the intensity of contact 906 increases above the threshold (e.g., $IT_L$) required to invoke preview area 907 of the additional content associated with date and time 802 (e.g., relating to calendar events scheduled for the current day). In response, the device displays preview area 907 over a portion of the lockscreen user interface, which becomes blurred to further emphasize the previewed content. The user continues to increase the intensity of contact 906 above a third threshold (e.g., $IT_D$) between FIGS. 9I and 9J. In response, the device navigates to user interface 909, displaying the full content associated with date and time 802, which remains displayed upon liftoff of contact 906, as illustrated in FIG. 9K.

FIGS. 9L-9O illustrate another embodiment where a preview of additional content associated with foreground element is displayed in response to a touch input having an intensity above an intensity threshold that is also sufficient for changing the appearance of the background. In FIG. 9L, the device detects contact 910 over notification 908 displayed in the foreground of lock screen user interface 800, having an intensity below a predetermined intensity threshold (e.g., $IT_L$). In FIG. 9M, the intensity of contact 910 increases above a "hint" threshold (e.g., $IT_H$). In response, the device begins to display additional content associated with notification 908. In FIG. 9N, the intensity of contact 910 increases above a second threshold (e.g., $IT_L$), and in response, device 100 further expands notification 908 to display the rest of the additional content associated with the notification. Upon termination of contact 910, the device returns display of user interface 800 to the same state as before first detecting contact 910, as illustrated in FIG. 9O.

FIGS. 9P-9S illustrate an embodiment where a quick action menu associated with a foreground element is displayed in response to a touch input having an intensity above an intensity threshold that is also sufficient for changing the appearance of the background. The device detects contact 912 on camera icon 808 in FIG. 9P, with an intensity below the intensity threshold needed to invoke the quick-action menu (e.g., $IT_L$). In FIG. 9Q, the intensity of contact 912 increases above a "hint" threshold (e.g., $IT_H$), but remains below the intensity threshold needed to invoke the quick-action menu. The device indicates that the user is approaching the intensity needed to call up the quick action menu by providing hint graphic 914 that appears to grow out from under camera icon 808. In FIG. 9R, the intensity of contact 912 increases above the threshold (e.g., $IT_L$) needed to display quick-action menu 916. In response, hint graphic 914 morphs into quick-action menu 916, which displays an icon and text for each selection 918, 920, 922, and 924 that are now active on the display. Upon lift-off of contact 912, quick action menu 916 remains displayed in user interface 800 because it is a selection menu.

FIGS. 10A-10L illustrate exemplary embodiments of a user interface that allows the user to efficiently interact with functional elements of a user interface for a locked state of the device, which also serves as a means for teaching the user to apply appropriate force when performing force-dependent inputs. In some embodiments, this is achieved by allowing the user to invoke performance of different actions based on the intensity of a contact of a touch-sensitive surface. The user interfaces in these figures are used to illustrate the processes described below. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 10A-10L illustrate an exemplary user interface 800 for a lock screen on device 100. The lock screen user interface displays background elements 810, consisting of a repeated geometric shape, and plurality of foreground user interface objects (e.g., time and date 802, handle icon 804 for navigating to a notification user interface, handle icon 806 for navigating to settings control center user interface, and camera icon 808 for navigating to an image acquisition user interface). In some embodiments, the background elements of lock screen user interface 800 are responsive to contacts having an intensity above a predetermined intensity threshold (e.g., a "hint" threshold $IT_H$, a "peek" threshold $IT_L$, and/or a "pop" threshold $IT_D$). In some embodiments, one or more of the foreground elements are responsive to contacts having intensities below the predetermined intensity threshold.

FIGS. 10A-10L illustrate various embodiments where the user displays a control menu over a portion of the lock screen, and invokes various actions based on differential intensities of contacts on user interface objects displayed in the control menu.

Figure 10A:
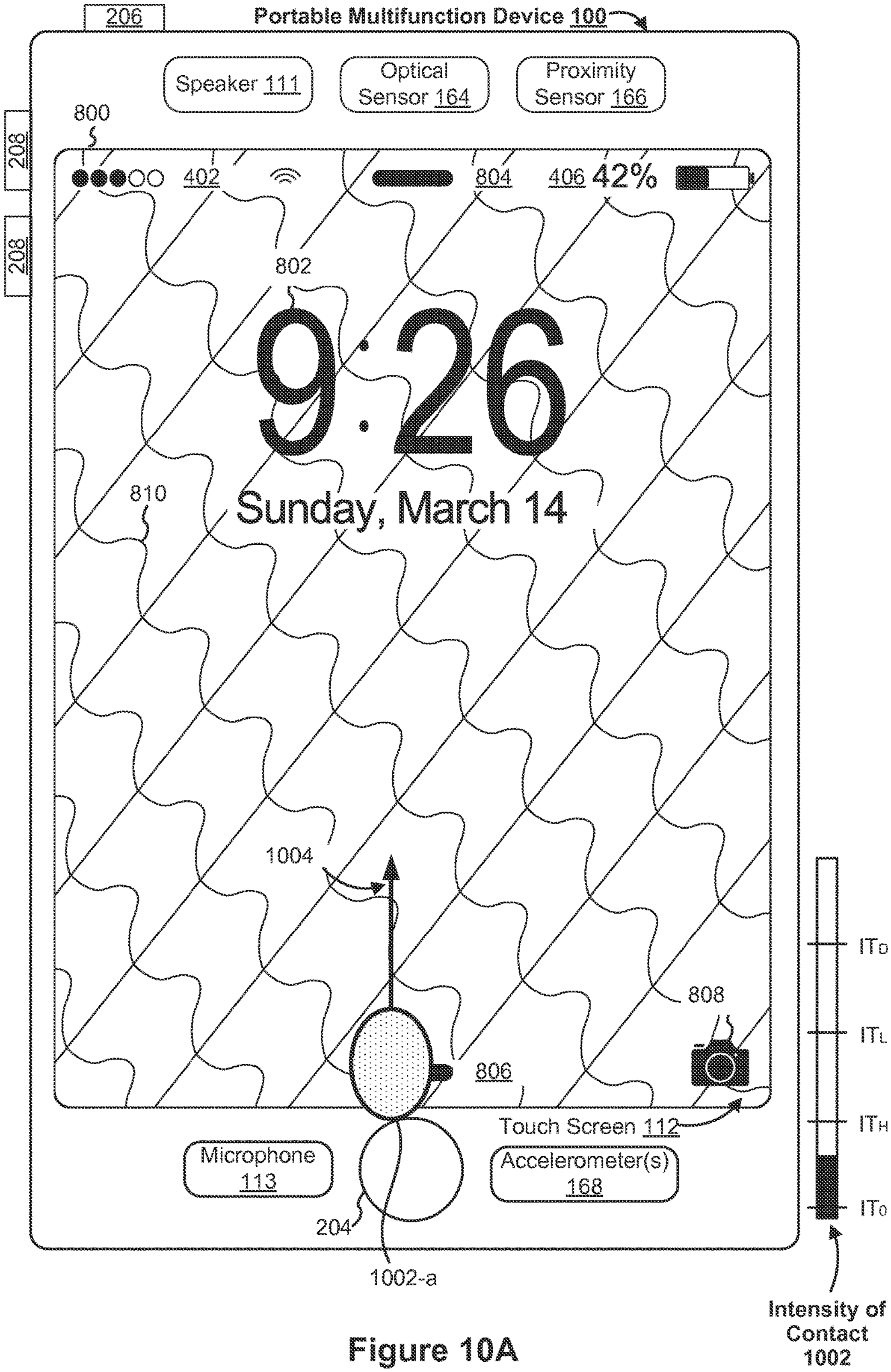
FIGS. 10A-10L illustrate exemplary user interfaces for toggling between different actions based on input contact characteristics in accordance with some embodiments.
Figure 10B:
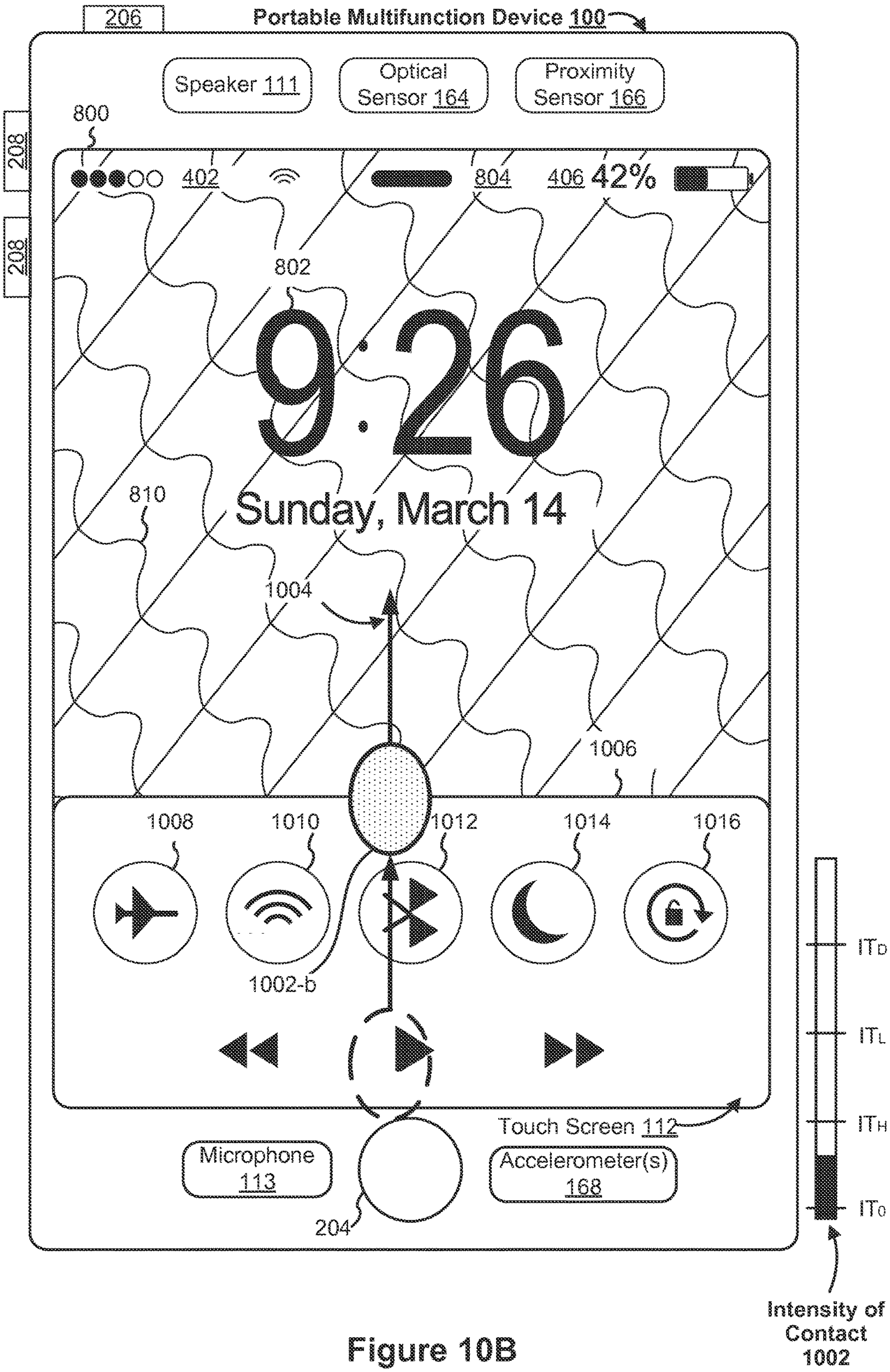
Figure 10C:
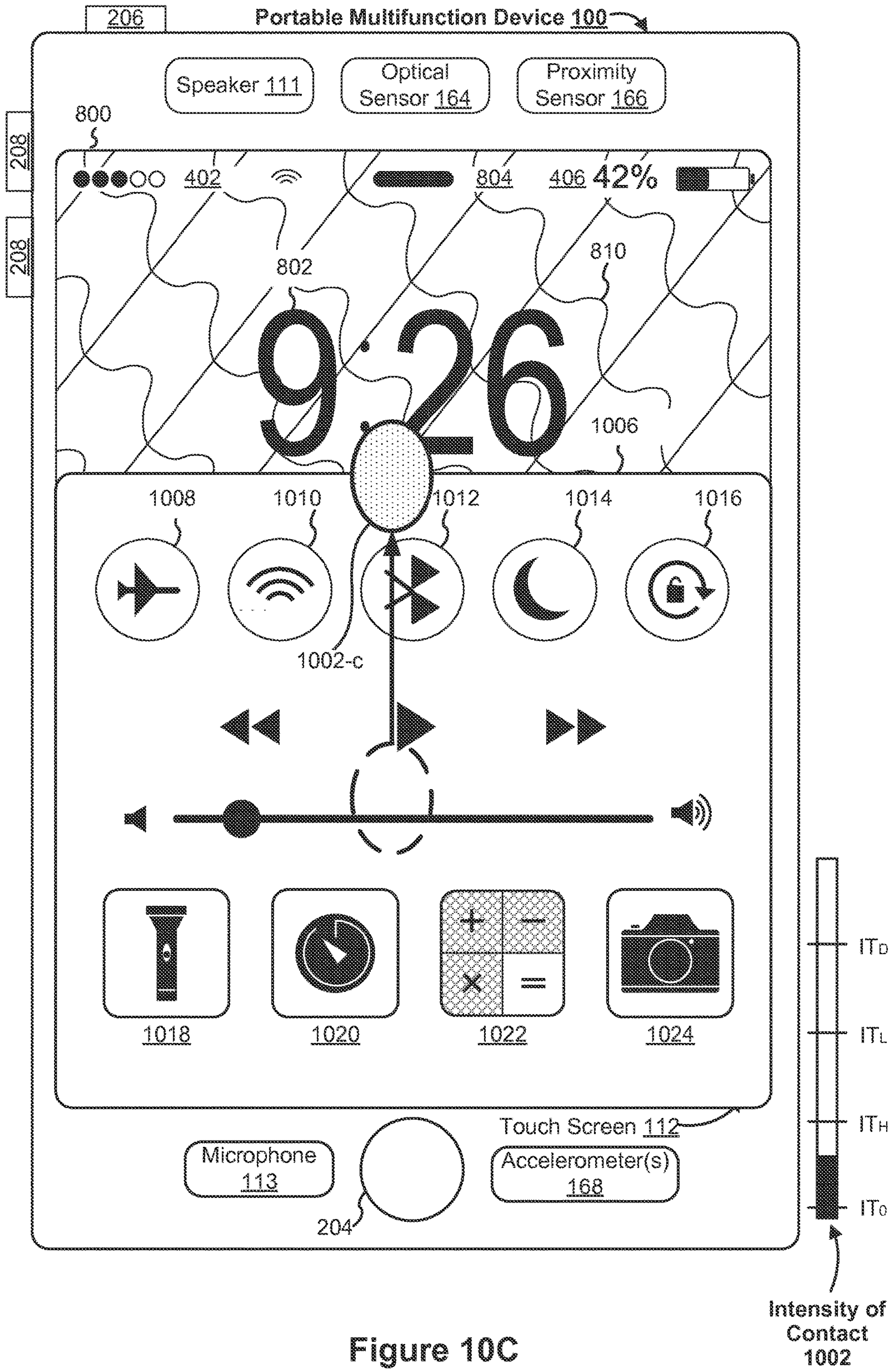

The device detects a swipe gesture including movement of contact 1002, having an intensity below a predetermined intensity threshold (e.g., $IT_L$), from position 1002-*a* over handle icon 806 in FIG. 10A, through position 1002-*b* in FIG. 10B, to position 1002-*c* in FIG. 10C. In response, the device dynamically reveals control menu 1006, which appears to be pulled from the bottom of touch screen 112. Control menu 1006 includes a plurality of user interface objects that are associated with actions relating to a plurality of applications on the device (e.g., airplane icon 1008 is associated with placing and removing the device from an airplane mode of operation, WiFi icon 1010 is associated with connecting the device with local WiFi networks, Bluetooth icon 1012 is associated with connecting the device with local Bluetooth devices, Do not disturb icon 1004 is associated with placing and removing the device from a private mode of operation, lock icon 1016 is associated with locking the orientation of the display of the device, flashlight icon 1018 is associated with turning on the LED array of the device in various modes, timer icon 1020 is associated with performing timing action on the device, calculator icon 1022 is associated with performing mathematical operations, and camera icon 1024 is associated with various image acquisition modalities). Upon liftoff of contact 1002, control menu 1006 remains displayed in user interface 800.

FIGS. 10E-10I illustrate an embodiment where the user places the device in a private mode of operation for either an indefinite period of time or a predetermined period of time, based on the intensity of the contact used to activate the action.

Figure 10D:
Figure 10E:
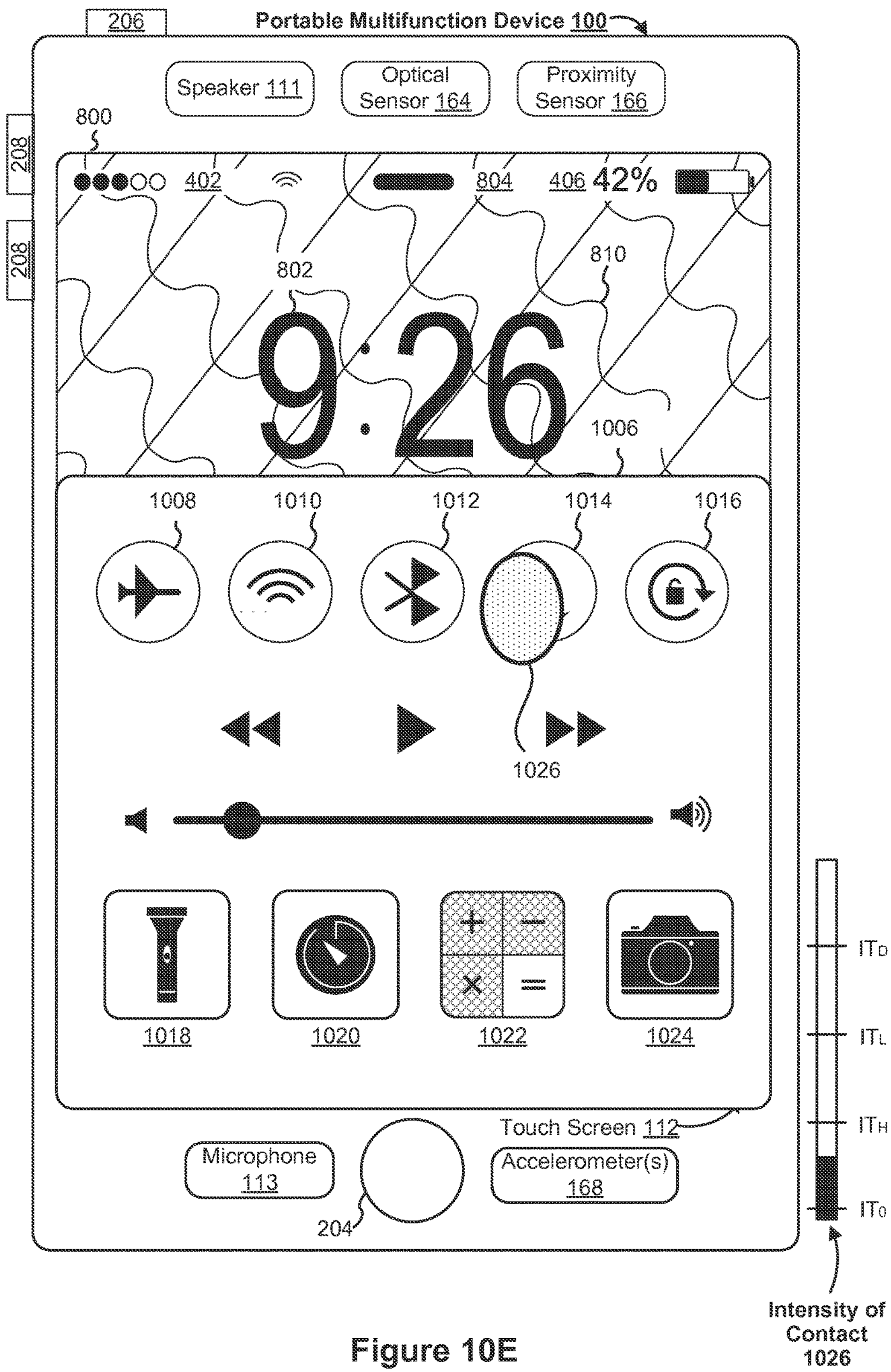
Figure 10F:
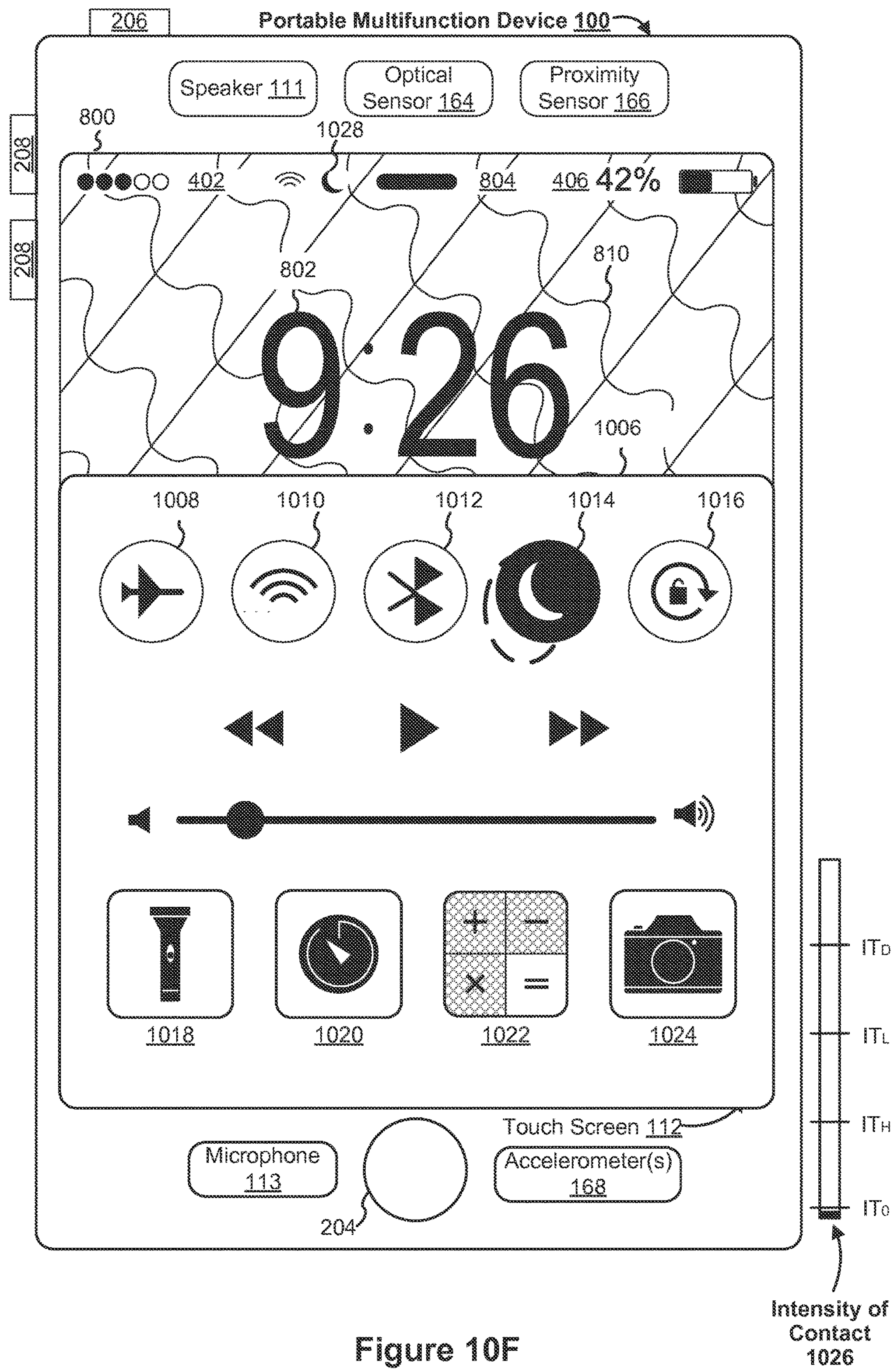

In FIG. 10E, device 100 detects a tap gesture over icon 1014, including contact 1030 having an intensity below a predetermined intensity threshold (e.g., $IT_L$). In response to detecting liftoff of contact 1030 in FIG. 10F, the device enters a private mode for an indeterminate amount of time, because the intensity of contact 1030 did not reach an intensity threshold required to invoke an alternate action.

Figure 10G:
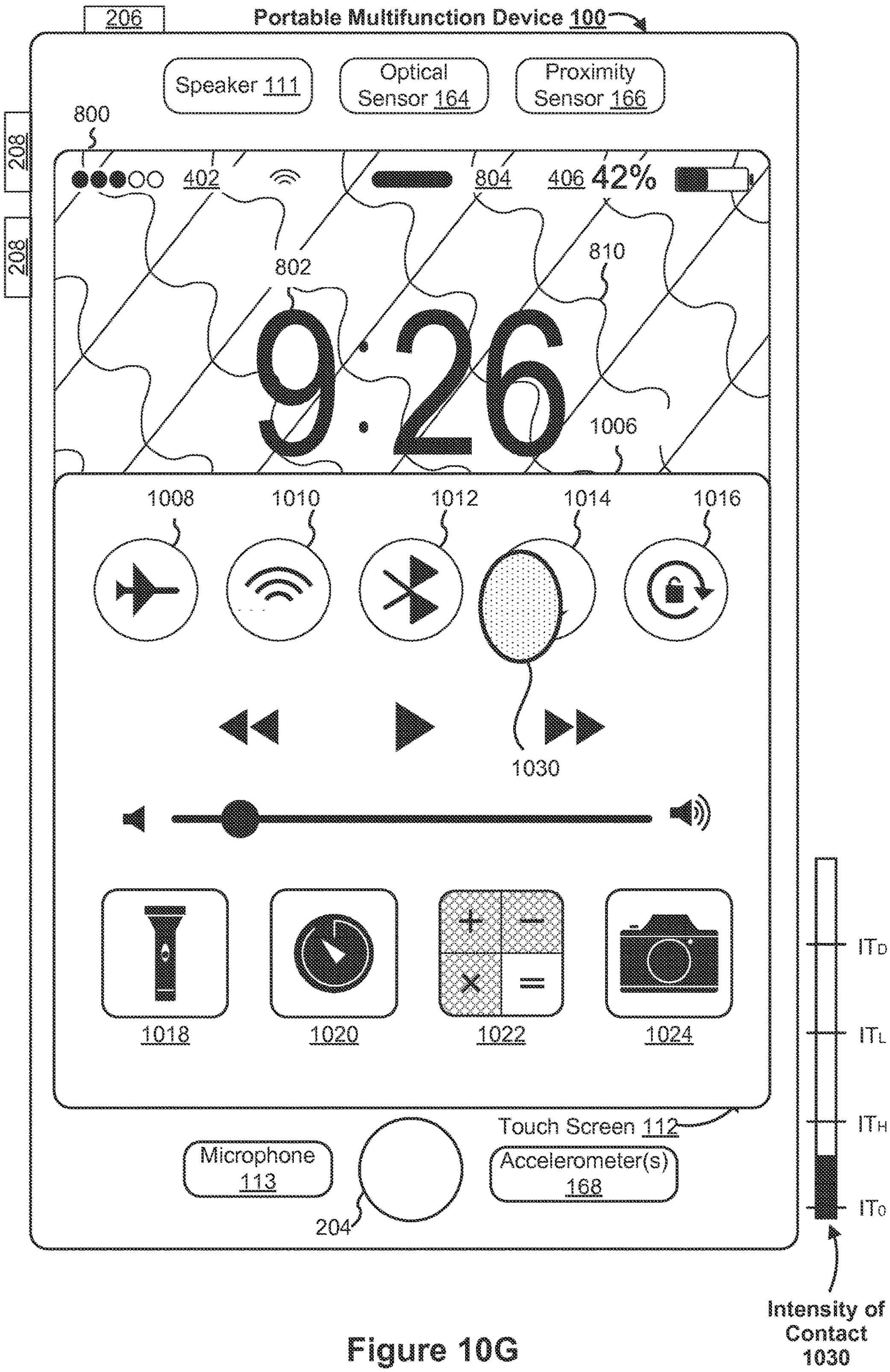
Figure 10H:
Figure 10I:
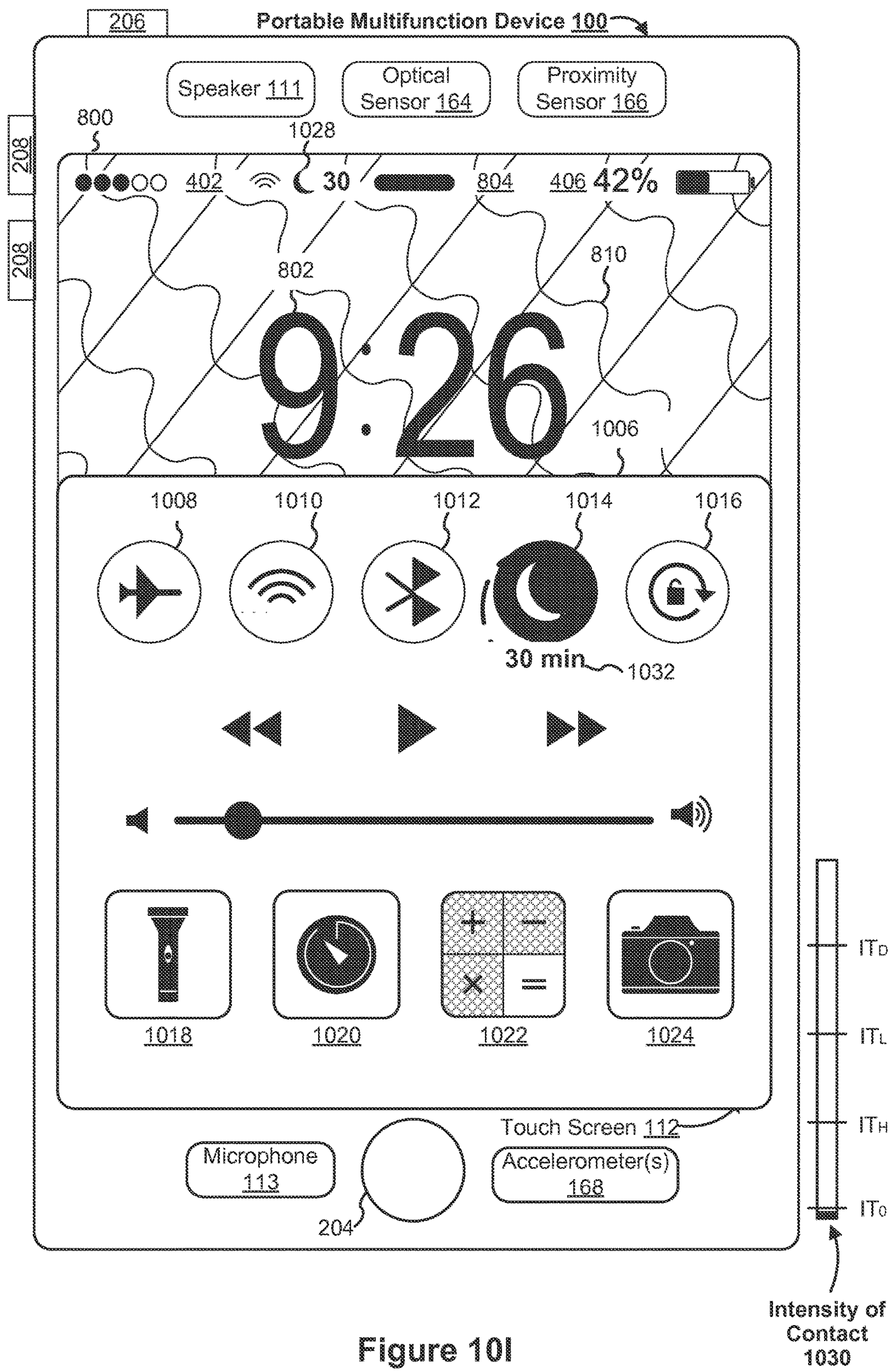

In FIG. 10G, device 100 detects contact 1032 over icon 1014, having an intensity below a predetermined intensity threshold (e.g., $IT_L$). The device then detects an increase in the intensity of contact 1032 above the predetermined intensity threshold (e.g., $IT_L$), as illustrated in FIG. 10H. In response to detecting liftoff of contact 1032 in FIG. 10I, the device enters a private mode for only thirty minutes, because the intensity of contact 1032 rose above the intensity threshold (e.g., $IT_L$) required to invoke the alternate action.

Figure 10J:
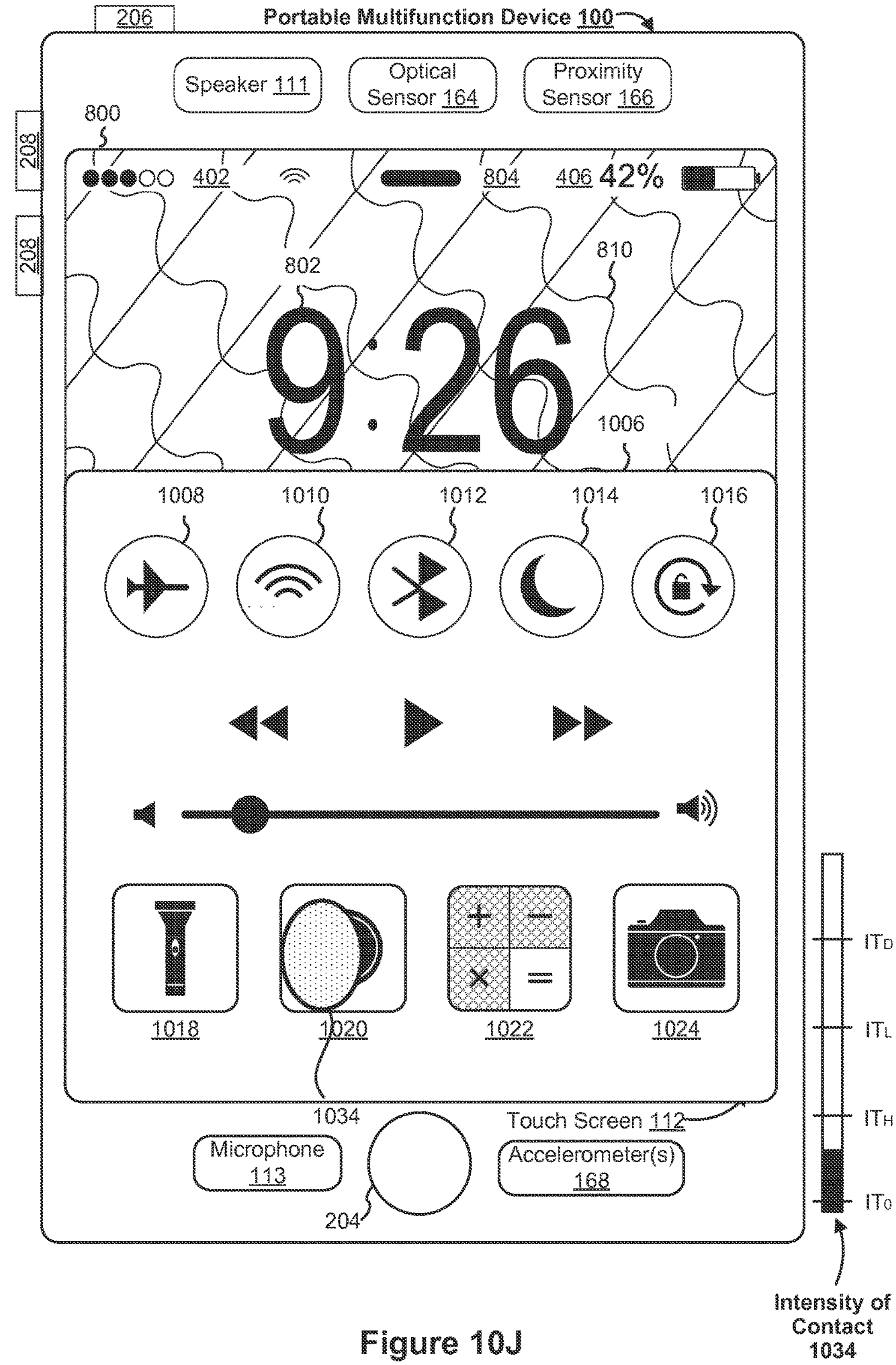
Figure 10K:
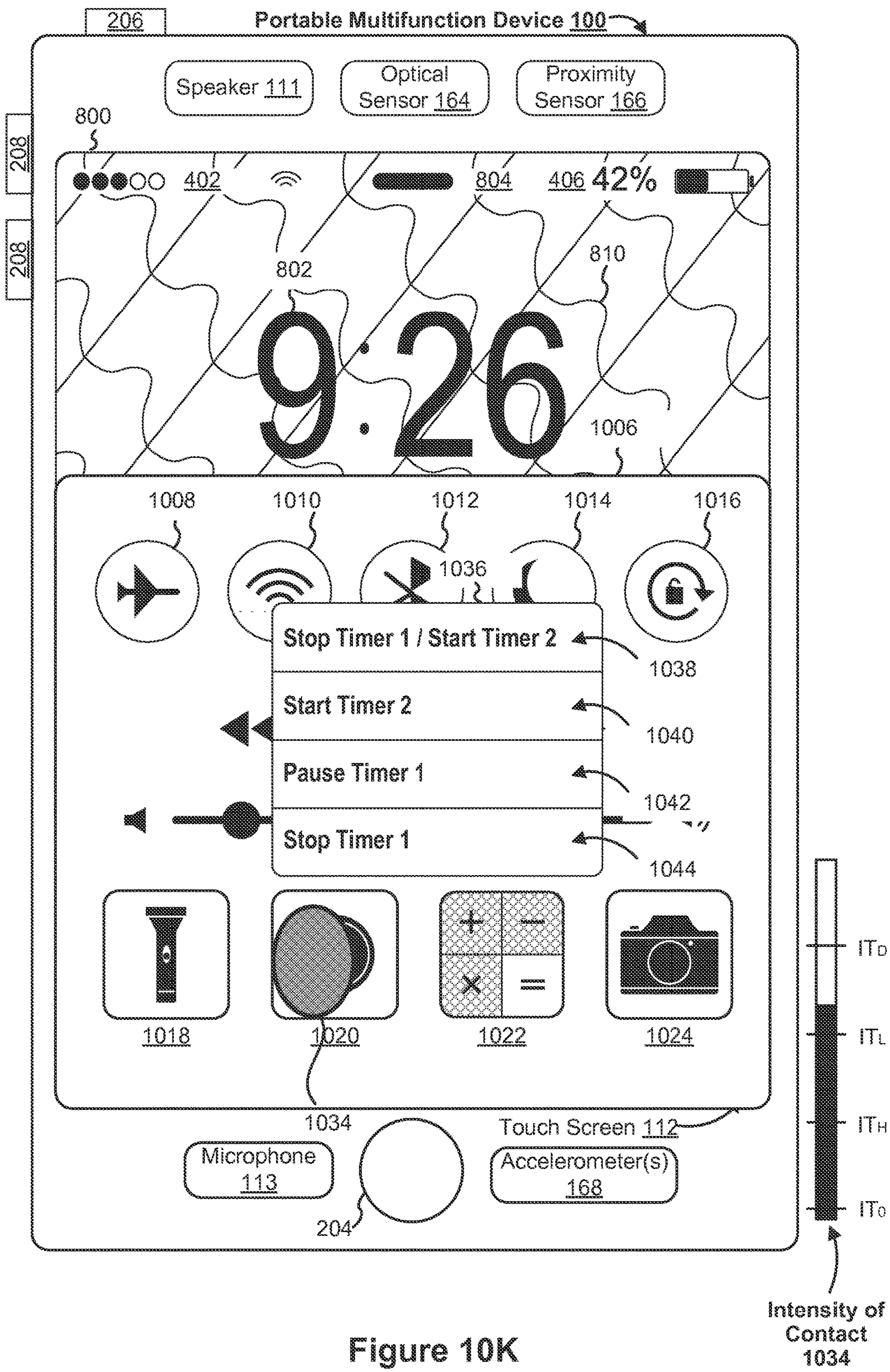
Figure 10L:
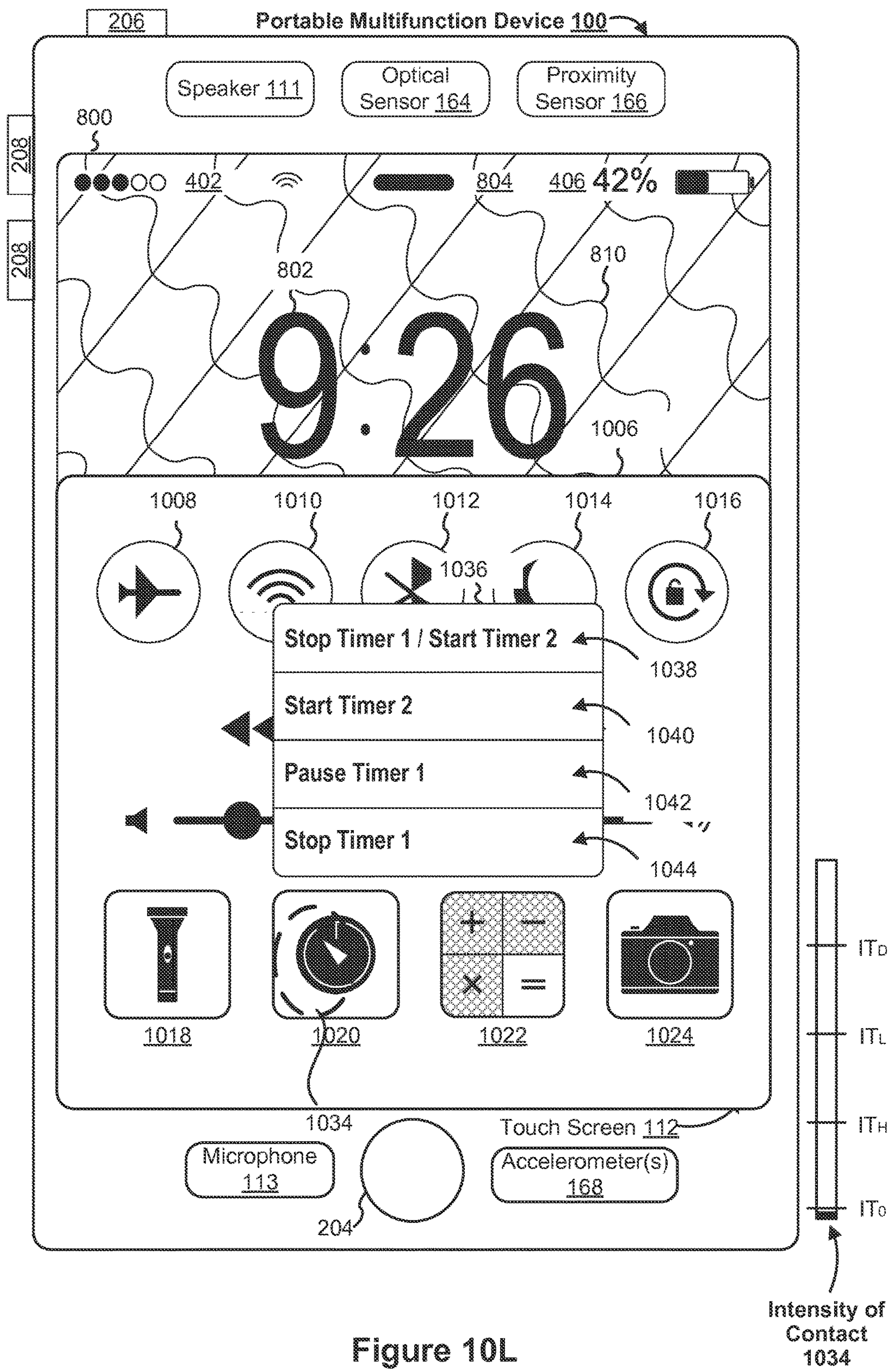

FIGS. 10J-10L illustrate an embodiment where a quick action menu associated with a user interface object in the control menu is displayed in response to a touch input having an intensity above an intensity threshold that is also sufficient for changing the appearance of the background of user interface 800. The device detects contact 1034 on timer icon 1020 in FIG. 10J, with an intensity below the intensity threshold needed to invoke the quick-action menu (e.g., $IT_L$). In FIG. 10K, the intensity of contact 1034 increases above the threshold (e.g., $IT_L$) needed to display quick-action menu 1036. In response, quick-action menu 1036 is displayed over other user interface objects in control menu 1006. As illustrated in FIG. 10K, quick-action menu 1036 options for performing actions 1038 (stop timer 1 and start timer 2), 1040 (start timer 2), 1042 (pause timer 1), and 1044 (stop timer 1) that are now active on the display. Upon lift-off of contact 1034, quick action menu 1036 remains displayed in user interface 800 because it is a selection menu.

Figure 11A:
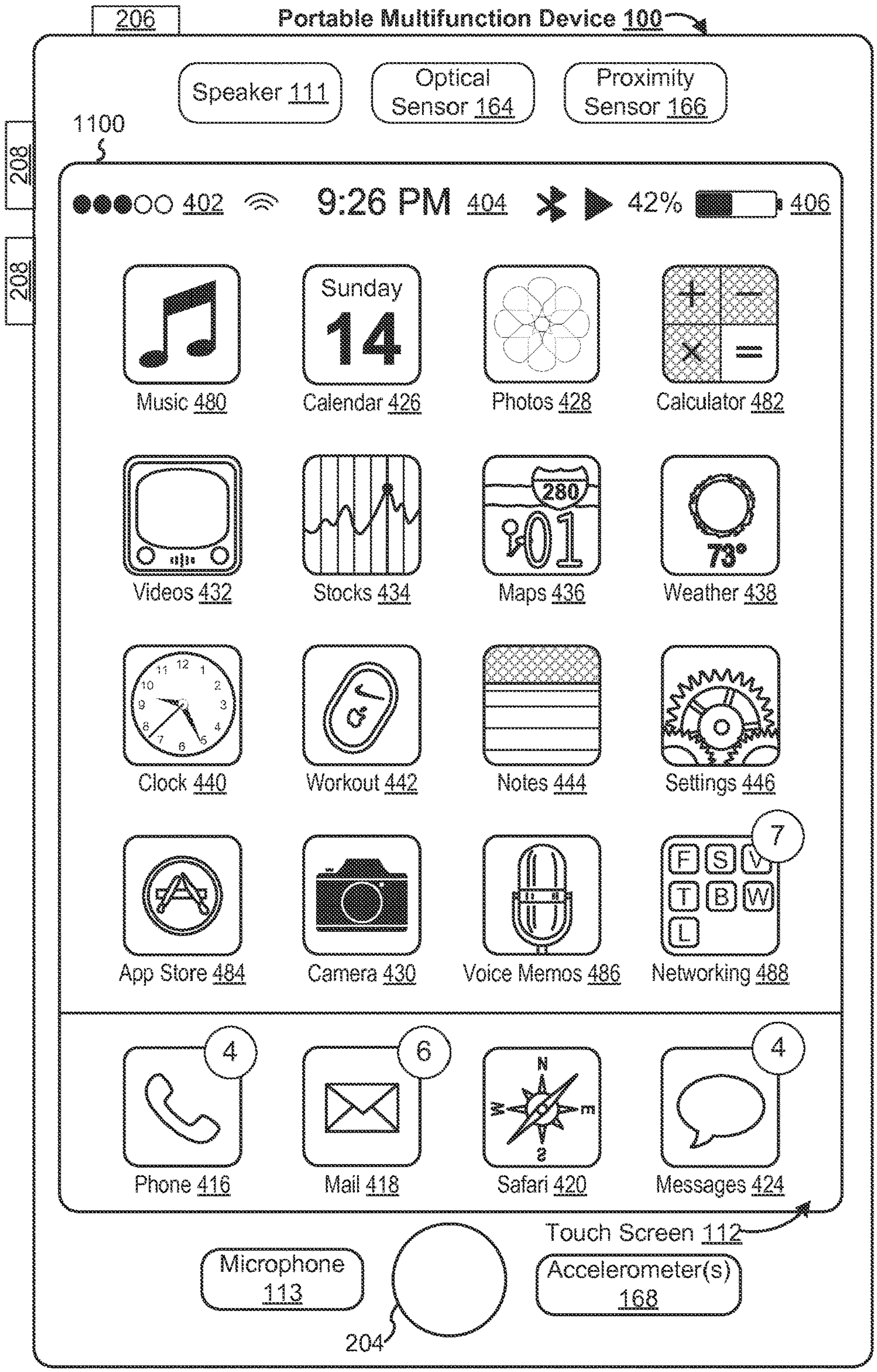
FIGS. 11A-11AT illustrate exemplary user interfaces for launching an application or displaying a quick action menu in accordance with some embodiments.

FIGS. 11A-11AT illustrate exemplary embodiments of a user interface that allows a user to quickly invoke one of several actions associated with a plurality of applications, without having to first activate a respective application, in accordance with some embodiments. In some embodiments, this is achieved by providing the user with menus containing quick action items (e.g., "quick-action menus") for respective applications, upon detection of a user input that is distinguishable from conventional user inputs used to launch applications (e.g., based on the amount of force the user applies). In some embodiments, the device distinguishes between user inputs intended to invoke quick-action menus and user inputs intended to invoke other actions in the user interface based on the intensity of one or more contacts associated with the input.

The user interfaces in these figures are used to illustrate the processes described below. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 11A-11B, 11D-11I, 11K-11M, 11O-11AA, and 11AC-11AT illustrate exemplary user interface 1100 for a home screen displaying a plurality of application launch icons (e.g., icons 480, 426, 428, 482, 432, 434, 436, 438, 440, 442, 444, 446, 484, 430, 486, 488, 416, 418, 420, and 424). Each of the launch icons is associated with an application that is activated (e.g., "launched") on the electronic device 100 upon detection of an application-launch input (e.g., a tap gesture having a maximum intensity below a threshold for invoking the quick action menu). Some of the launch icons are also associated with corresponding quick action menus, which are activated on the electronic device upon detection of a quick-action-display input (e.g., a force-press gesture having a maximum intensity at or above the threshold for invoking the quick action menu).

The Figures described below illustrate various embodiments where the device distinguishes between user inputs intended to call up a quick-action menu (e.g., FIGS. 11D-11J) and user inputs intended to invoke other actions, such as launching an application (e.g., FIGS. 11A-11C), entering a search mode (e.g., FIGS. 11K-11N), and entering a rearrangement mode (e.g., FIGS. 11O-11P). The figures also illustrate how a user navigates between the various modes that may be invoked from home screen user interface 500.

Figure 11B:
Figure 11C:
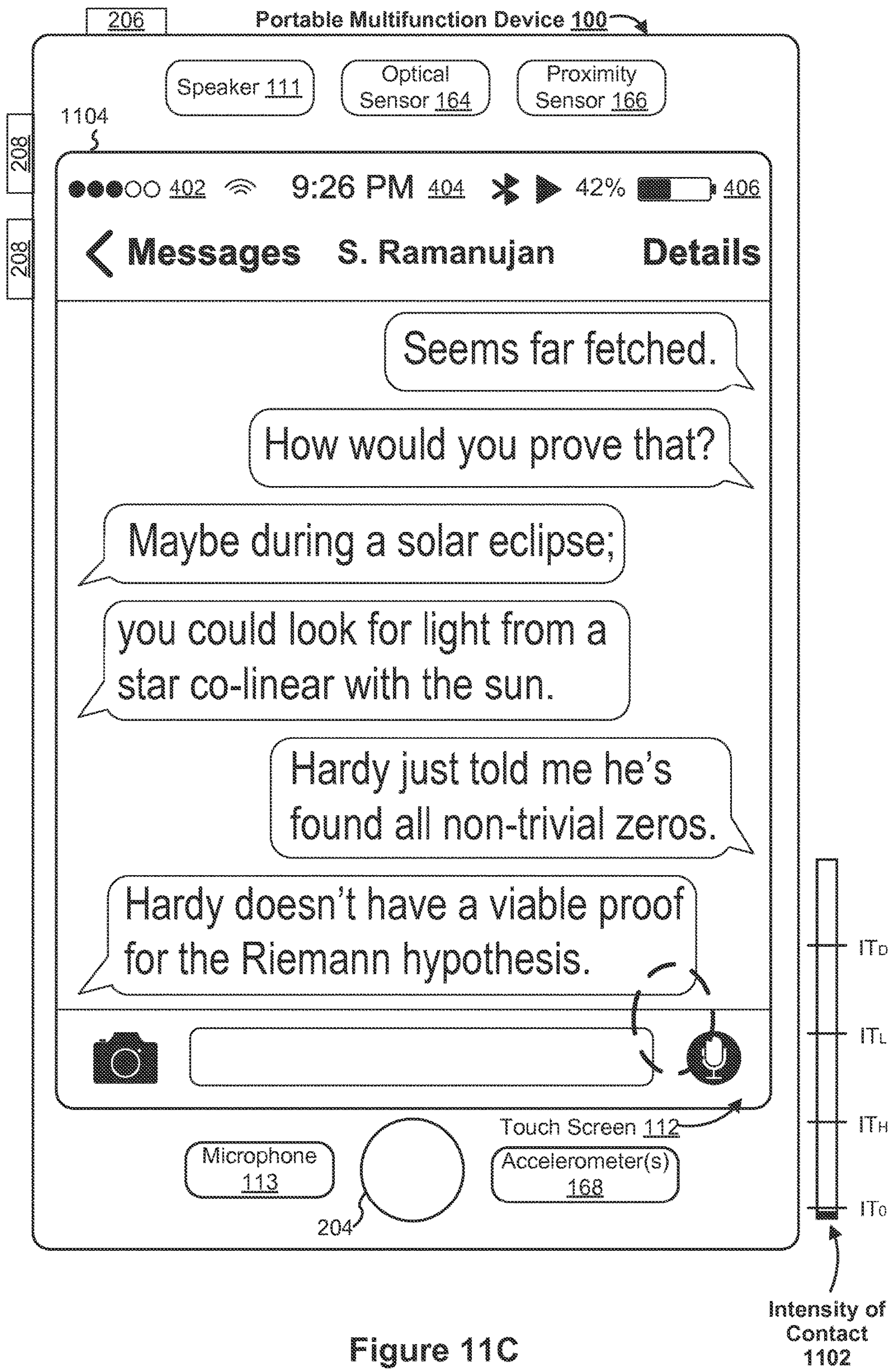
Figure 11D:
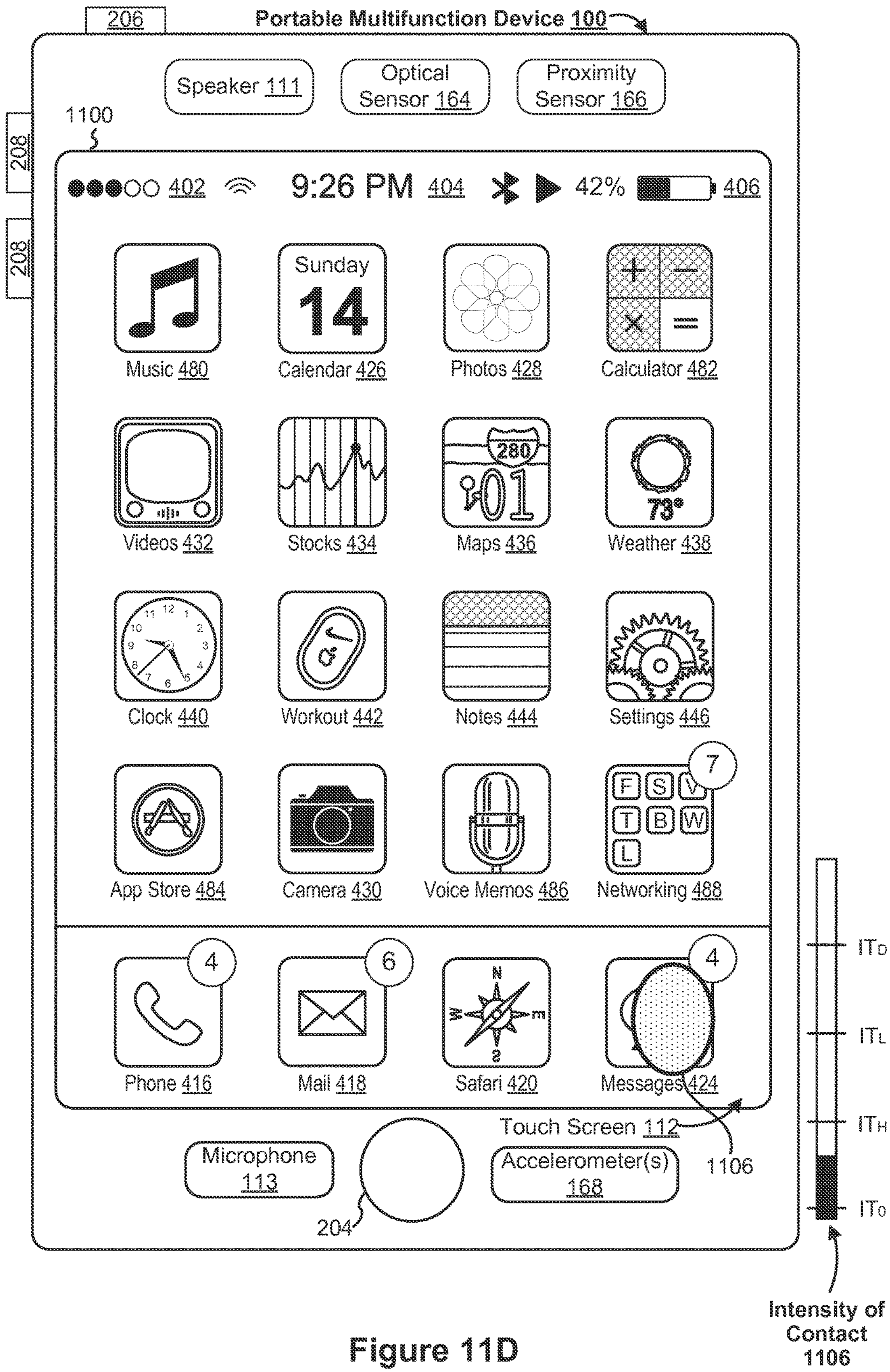

FIGS. 11A-11C illustrate an embodiment where the user launches an application by tapping on an application launch icon. FIG. 11A illustrates a home screen user interface 1100 displaying application launch icons for several applications, including messages icon 424 for activating a messaging application. The device detects contact 1102 on the messages icon 424 in FIG. 11B, with an intensity below the intensity threshold needed to invoke the quick-action menu (e.g., $IT_L$). In response to detecting liftoff of contact 1102, the device launches the messaging application associated with messages launch icon 424, and displays a default user interface 1104 for the application (e.g., a user interface displaying the most recently received message) in FIG. 11C.

Figure 11E:
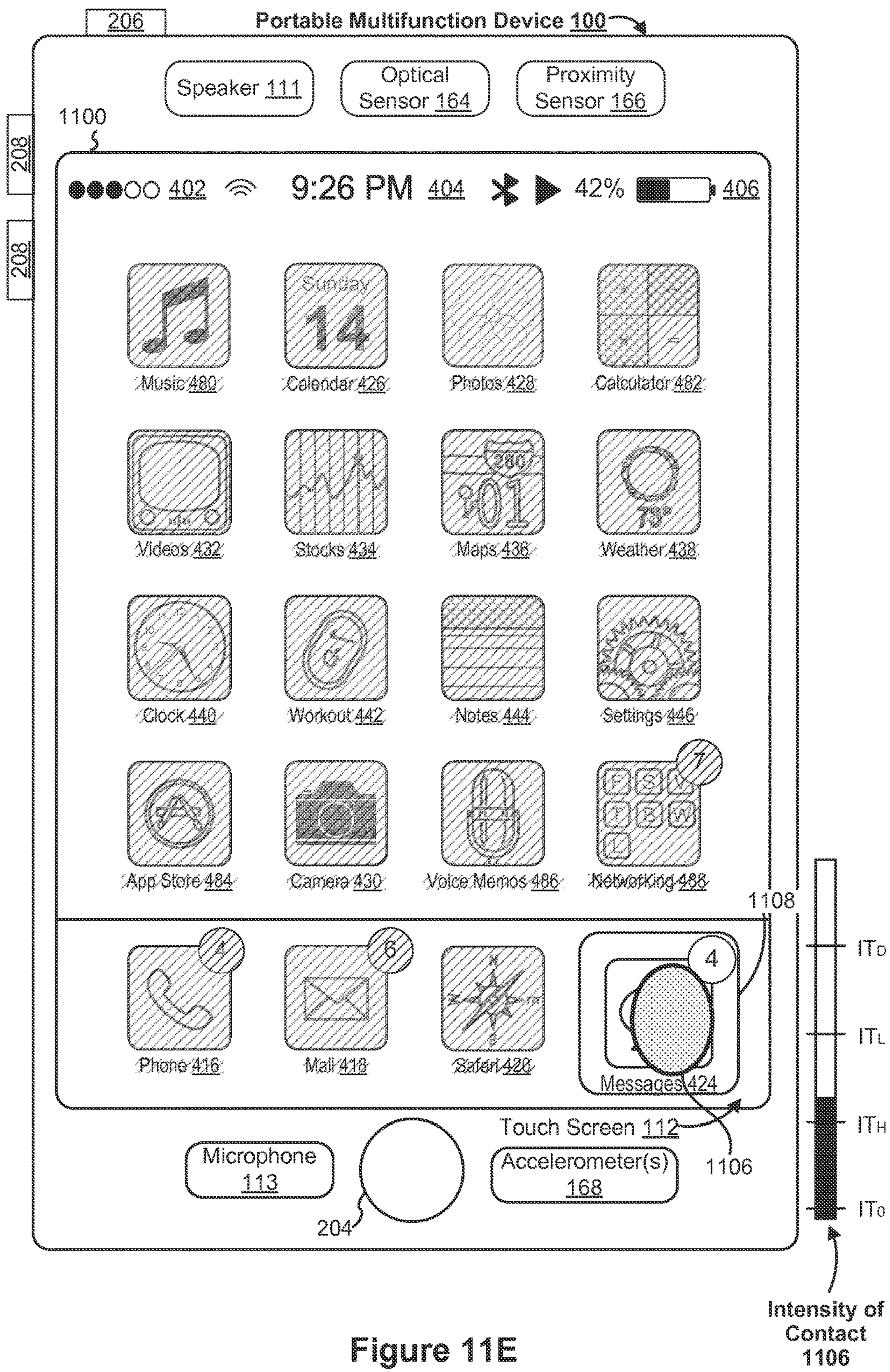
Figure 11F:
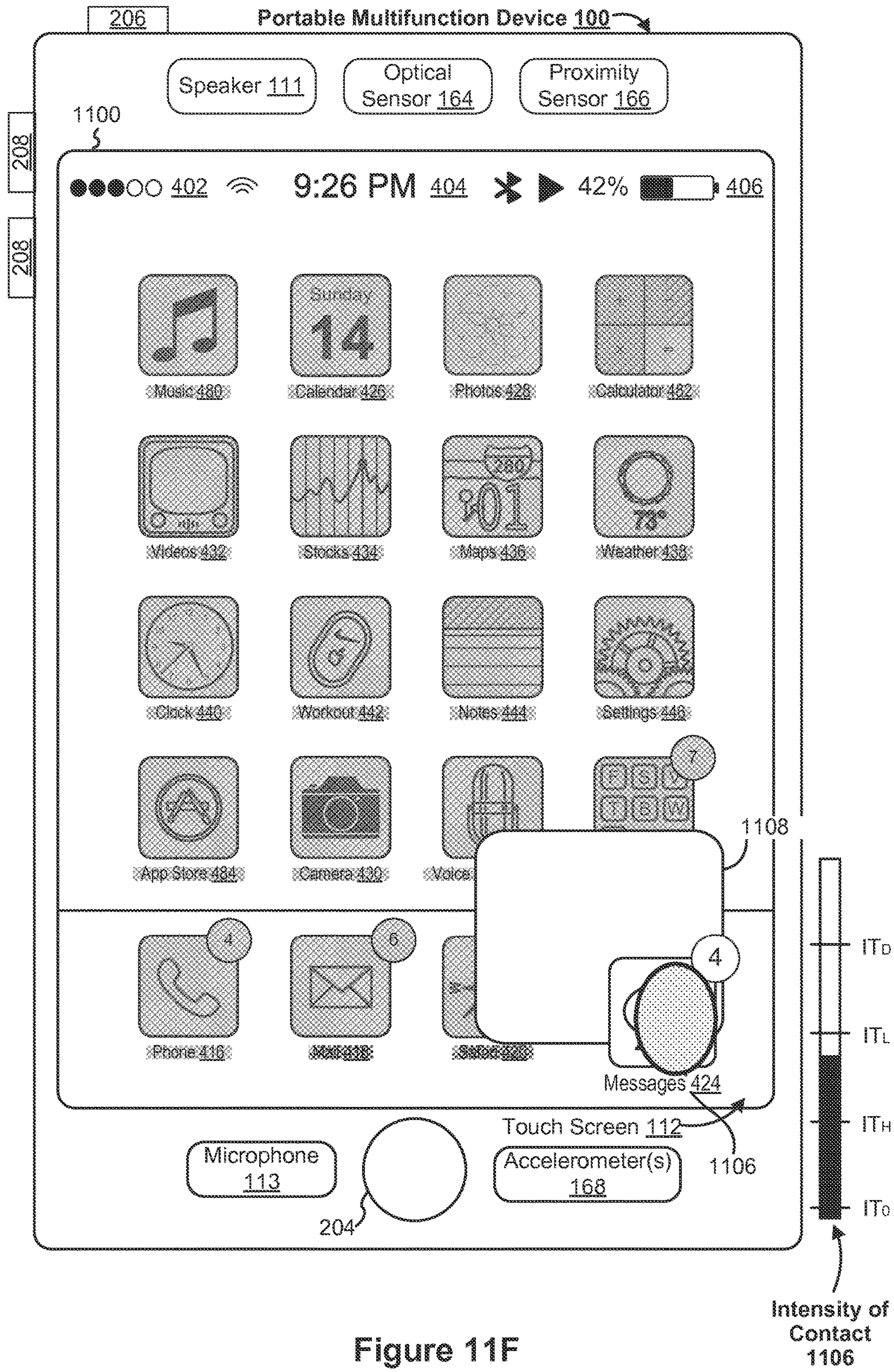

FIGS. 11D-11J illustrate an embodiment where the user calls up a quick-action menu and invokes an action for responding to a recent message in the same messaging application, from the home screen of the electronic device 100. The device detects contact 1106 on messages launch icon 424 in FIG. 11D, with an intensity below the intensity threshold needed to invoke the quick-action menu (e.g., $IT_L$). In FIG. 11E, the intensity of contact 1106 increases above a "hint" threshold (e.g., $IT_H$), but remains below the intensity threshold needed to invoke the quick-action menu. The device indicates that the user is approaching the intensity needed to call up the quick action menu by starting to blur and push the other launch icons back in virtual z-space (e.g., away from the screen) and by providing hint graphic 1108 that appears to grow out from under messages launch icon 424. As illustrated in FIG. 11F, the icon blurring, icon movement back in z-space, and hint graphic are dynamically responsive to increasing contact 1106 intensity below the quick-action menu threshold (e.g., $IT_L$). Hint graphic 1108 continues to grow, and begins migrating out from under messages icon 424.

Figure 11G:
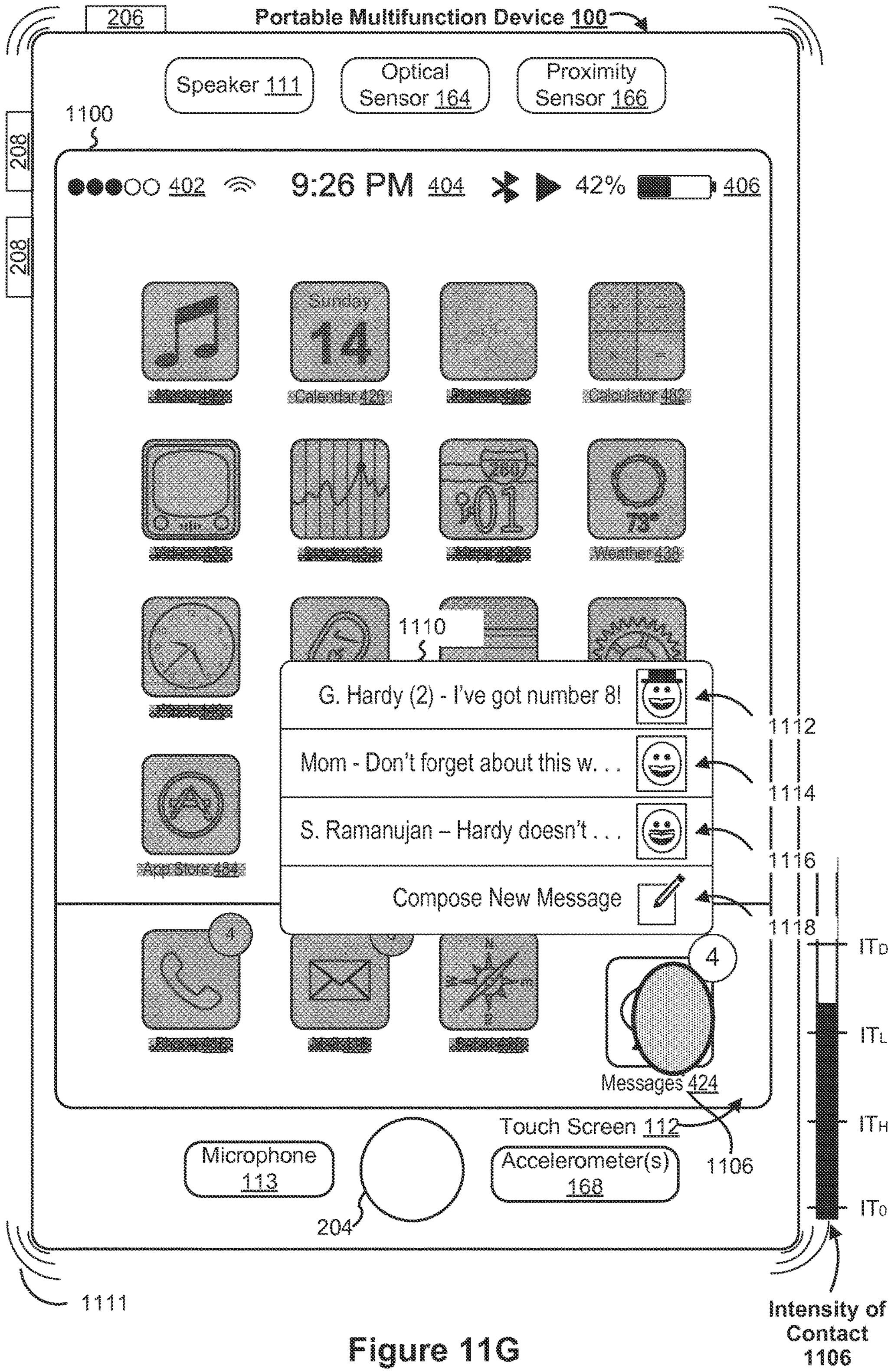
Figure 11H:
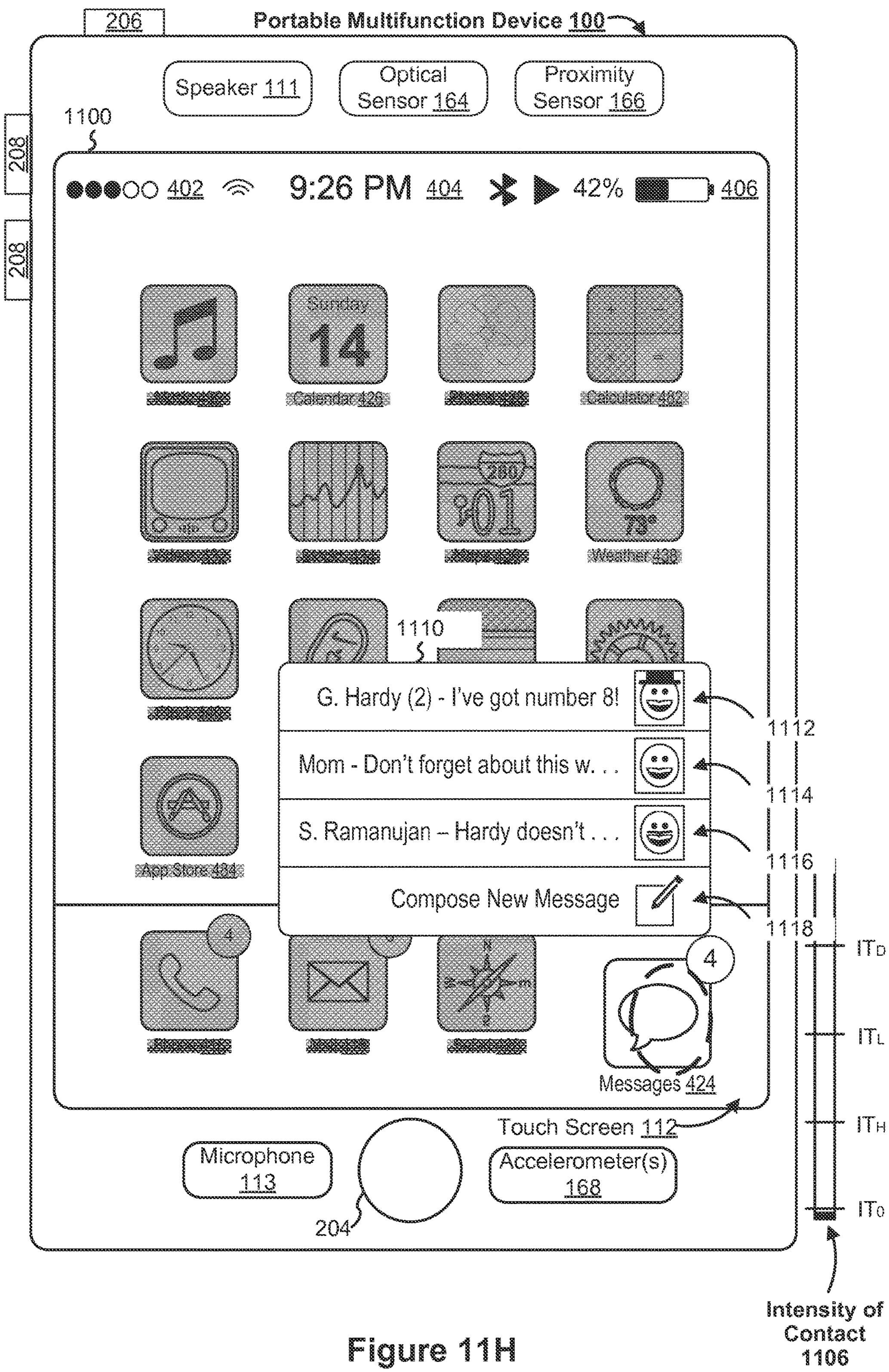
Figure 11I:
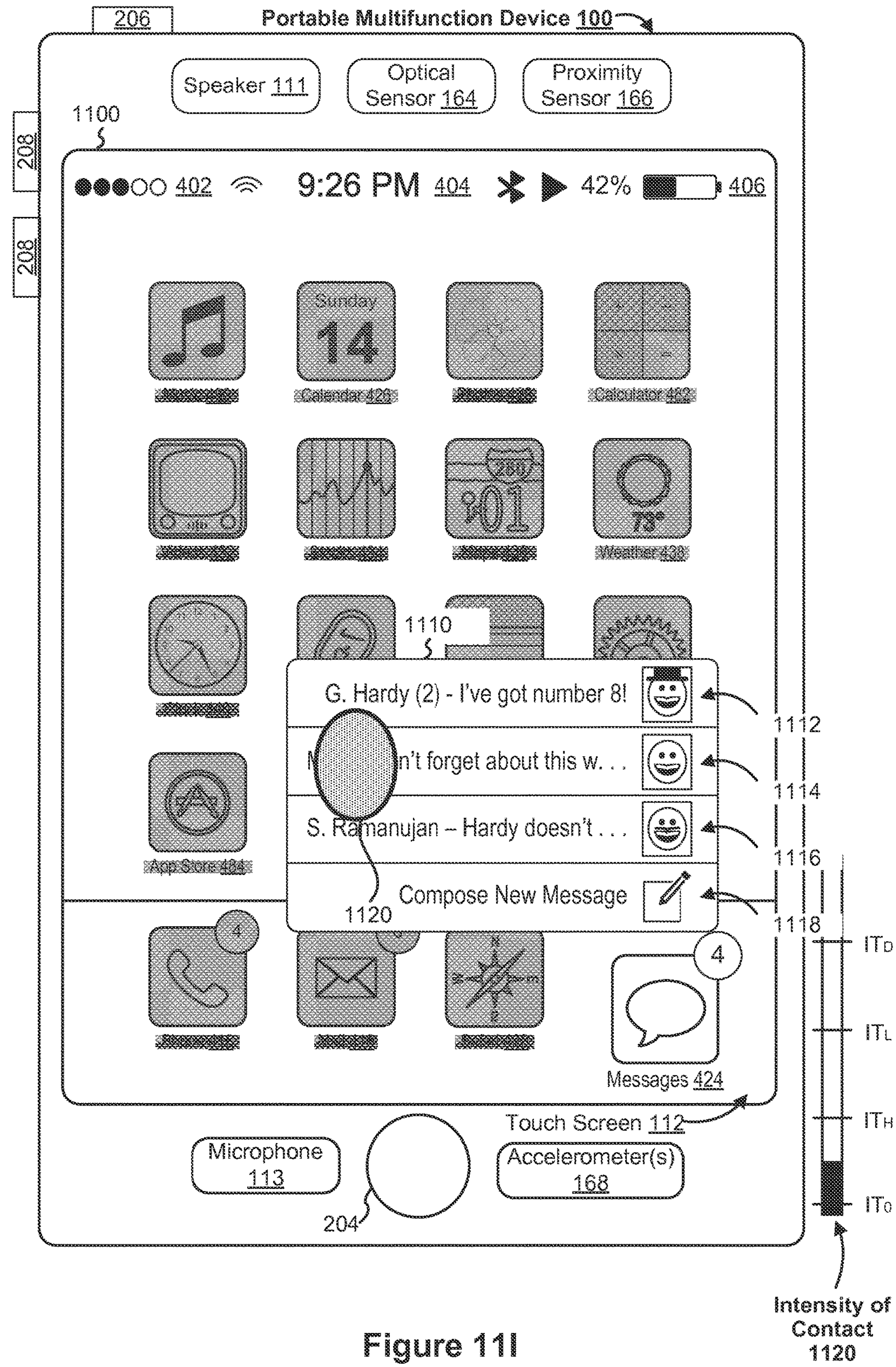
Figure 11J:
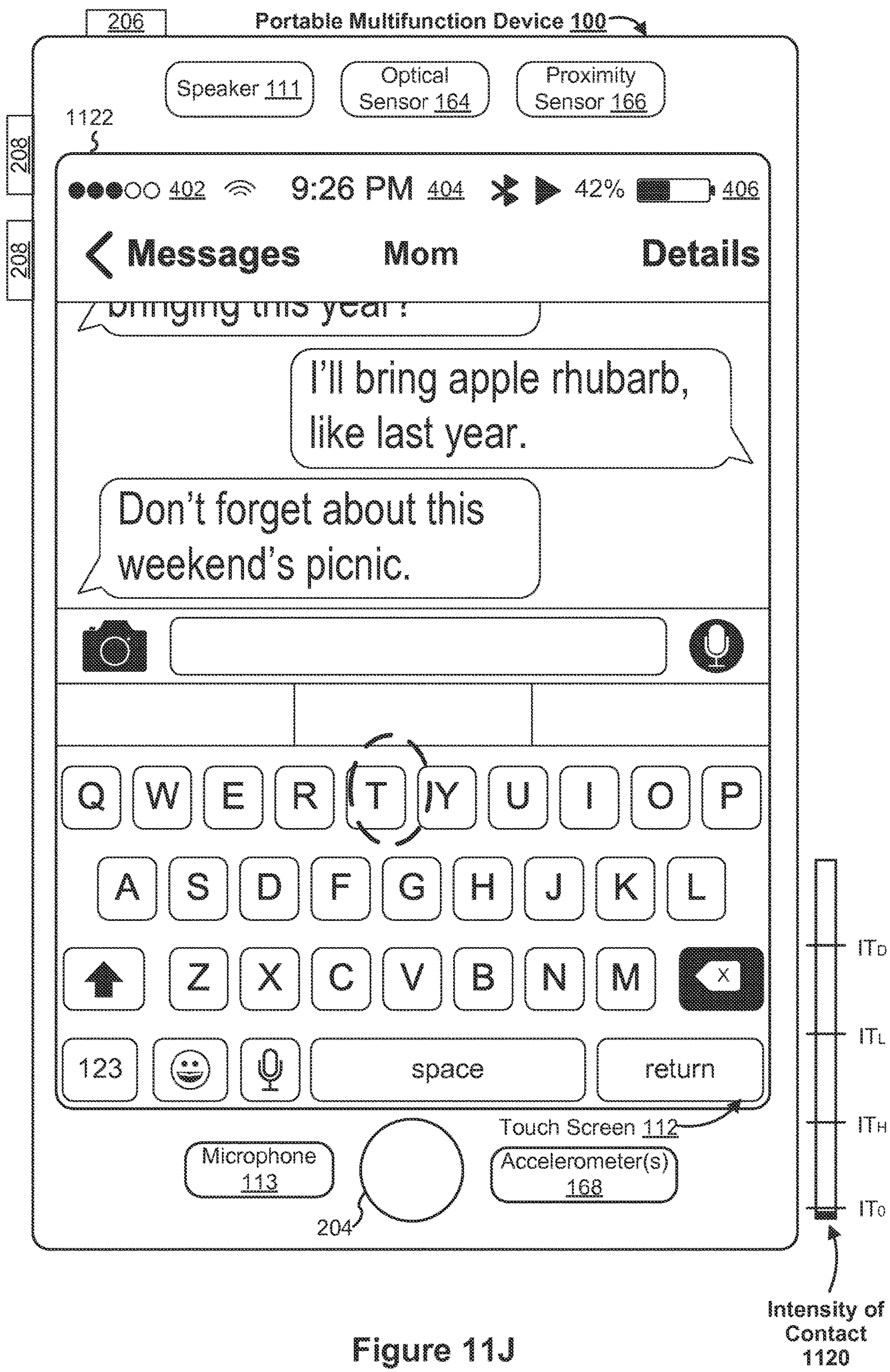
Figure 11K:
Figure 11L:
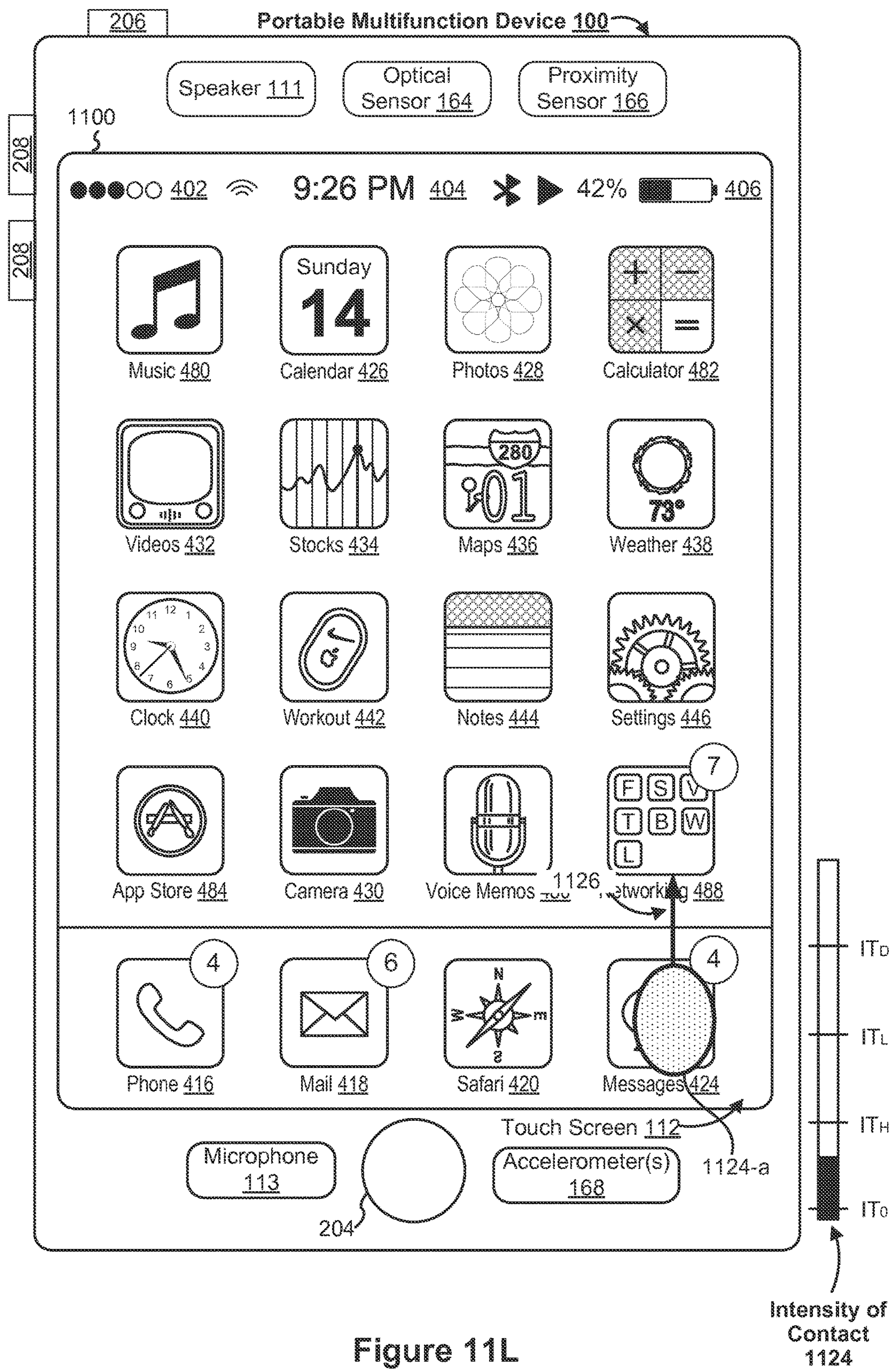

In FIG. 11G, the intensity of contact 1106 increases above the threshold (e.g., $IT_L$) needed to invoke messages quick-action menu 1110. In response, hint graphic 1108 morphs into quick-action menu 1110, which displays an icon and text for each selection 1112, 1114, 1116, and 1118 that are now available to the user. The device also provides tactile feedback 1111, to alert the user that the quick-action menu is now functional. The user lifts-off contact 1106 in FIG. 11H, but quick-action menu 1110 remains displayed on touch screen 112 because it is a selection menu. The user elects to respond to his mother's message by tapping (via contact 1120) on option 1114 in quick-action menu 1110, as illustrated in FIG. 11I. In response, the device activates the messaging application and displays user interface 1122, which includes a text prompt for responding to mom's message, rather than opening the application to a default user interface, as illustrated in FIG. 11C.

Figure 11M:
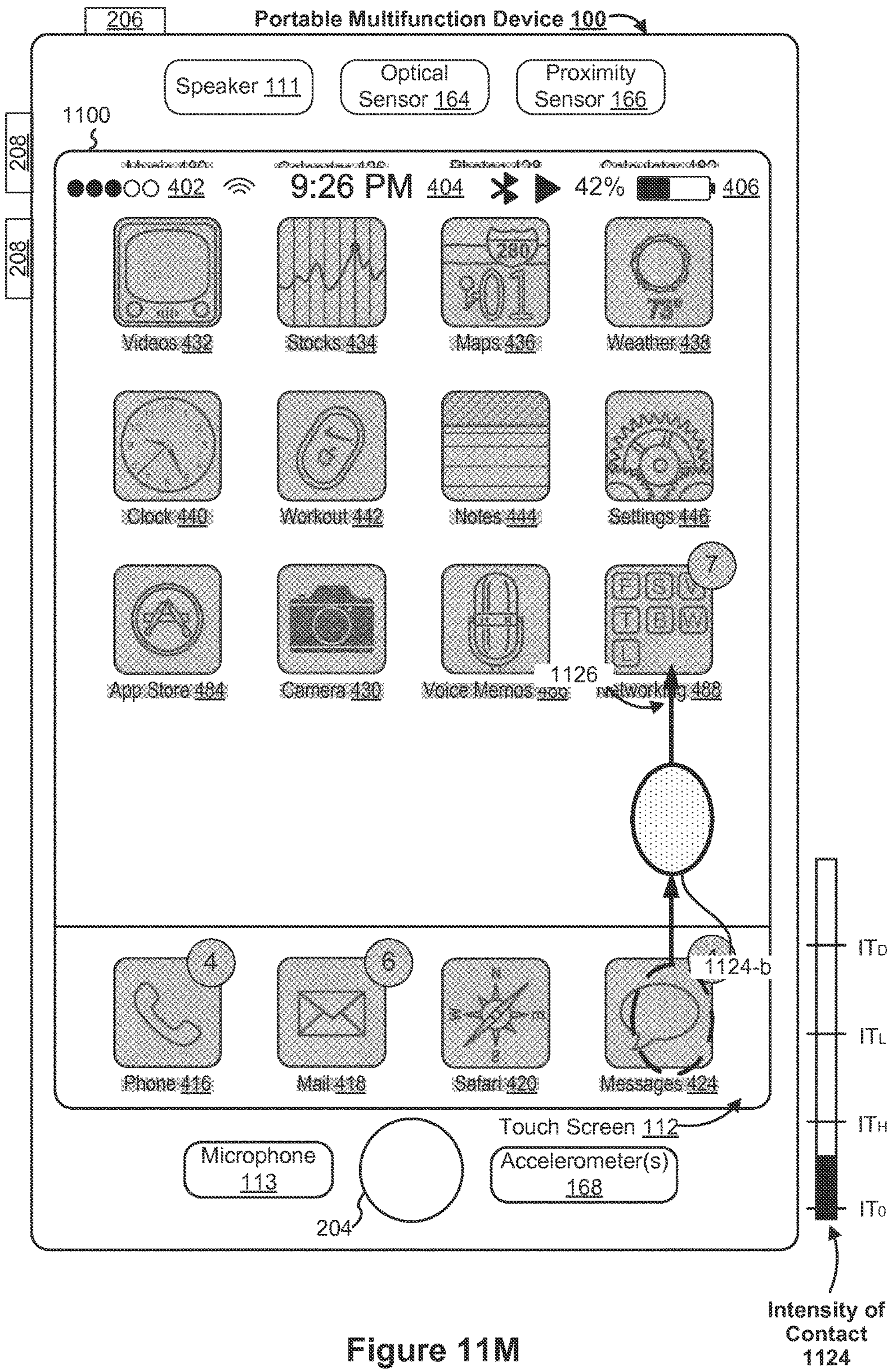
Figure 11N:
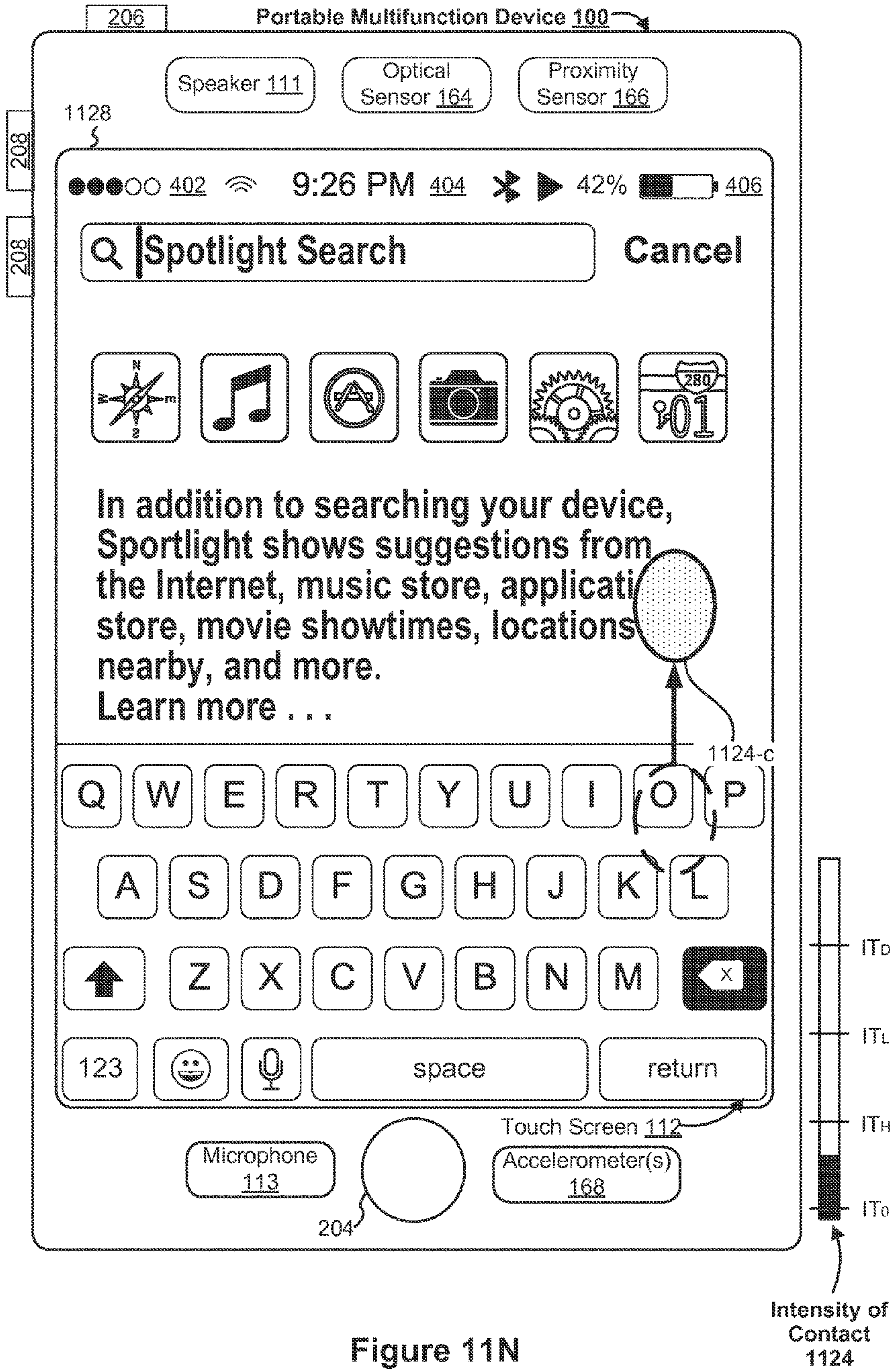

FIGS. 11K-11N illustrate an embodiment where the user navigates to a search modality on device 100 from the same home screen user interface. The device detects contact 1124 on messages launch icon 424 in FIG. 11K, with an intensity below the intensity threshold needed to invoke the quick-action menu (e.g., $IT_L$). The device detects movement 1126 of contact 1124 from position 1124-*a* in FIG. 11L to position 1124-*b* in FIG. 11M, without detecting an increase in the contact's intensity. Because the movement of contact 1124 occurred in a period of time, after the initial detection of the contact at messages launch icon 424, shorter than a time threshold required to activate an icon reconfiguration more, the device indicates that continuation of movement 1126 will invoke a searching modality by starting to blur the application launch icons, and moving some of the launch icons (e.g., dynamically) with the movement of the contact on touch screen 112, as illustrated in FIG. 11M. In response to continued movement of contact 1124 to position 1124-*c*, the device enters the search modality and displays search user interface 1128 in FIG. 11N.

Figure 11O:
Figure 11P:
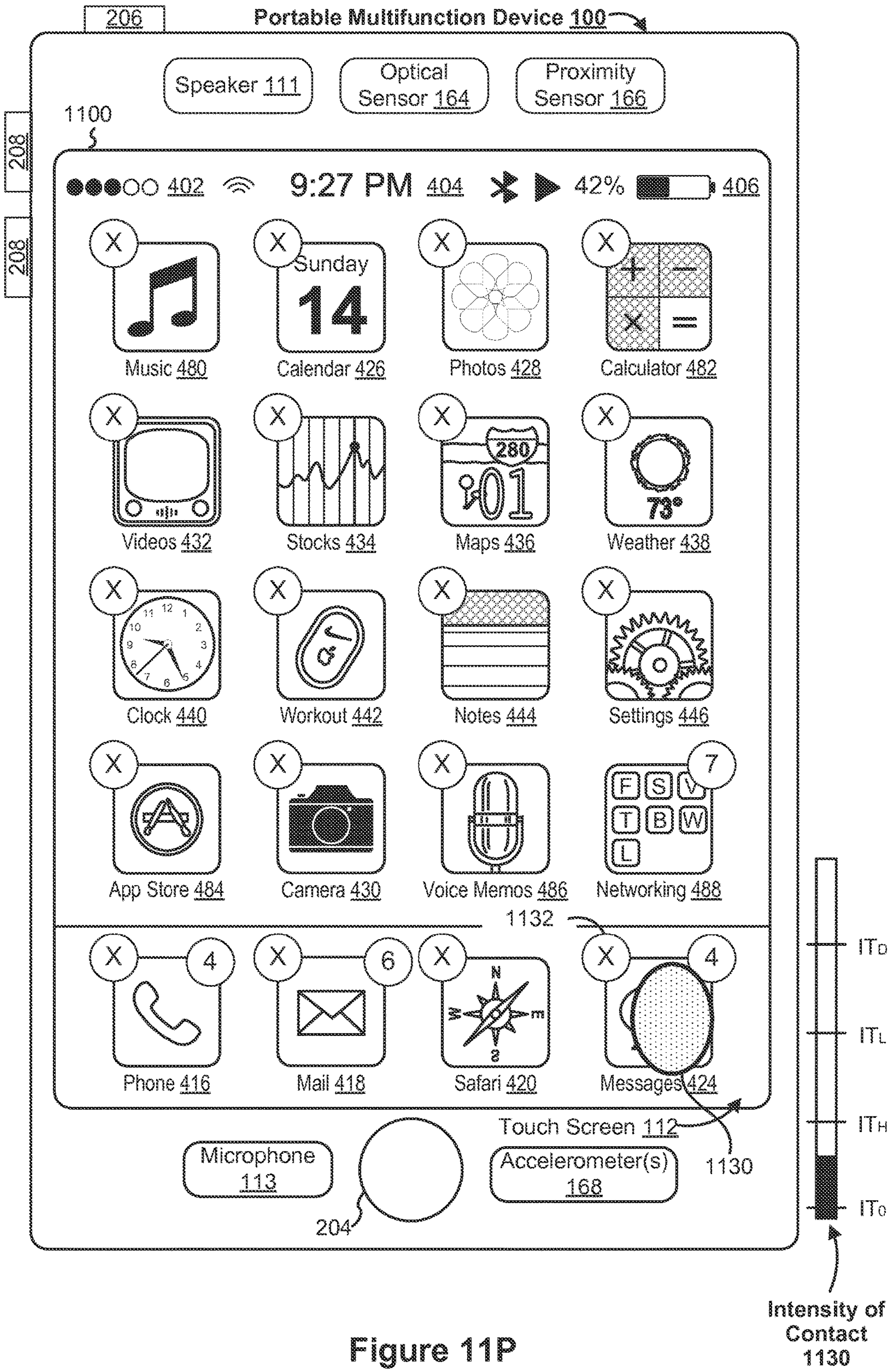
Figure 11Q:
Figure 11R:
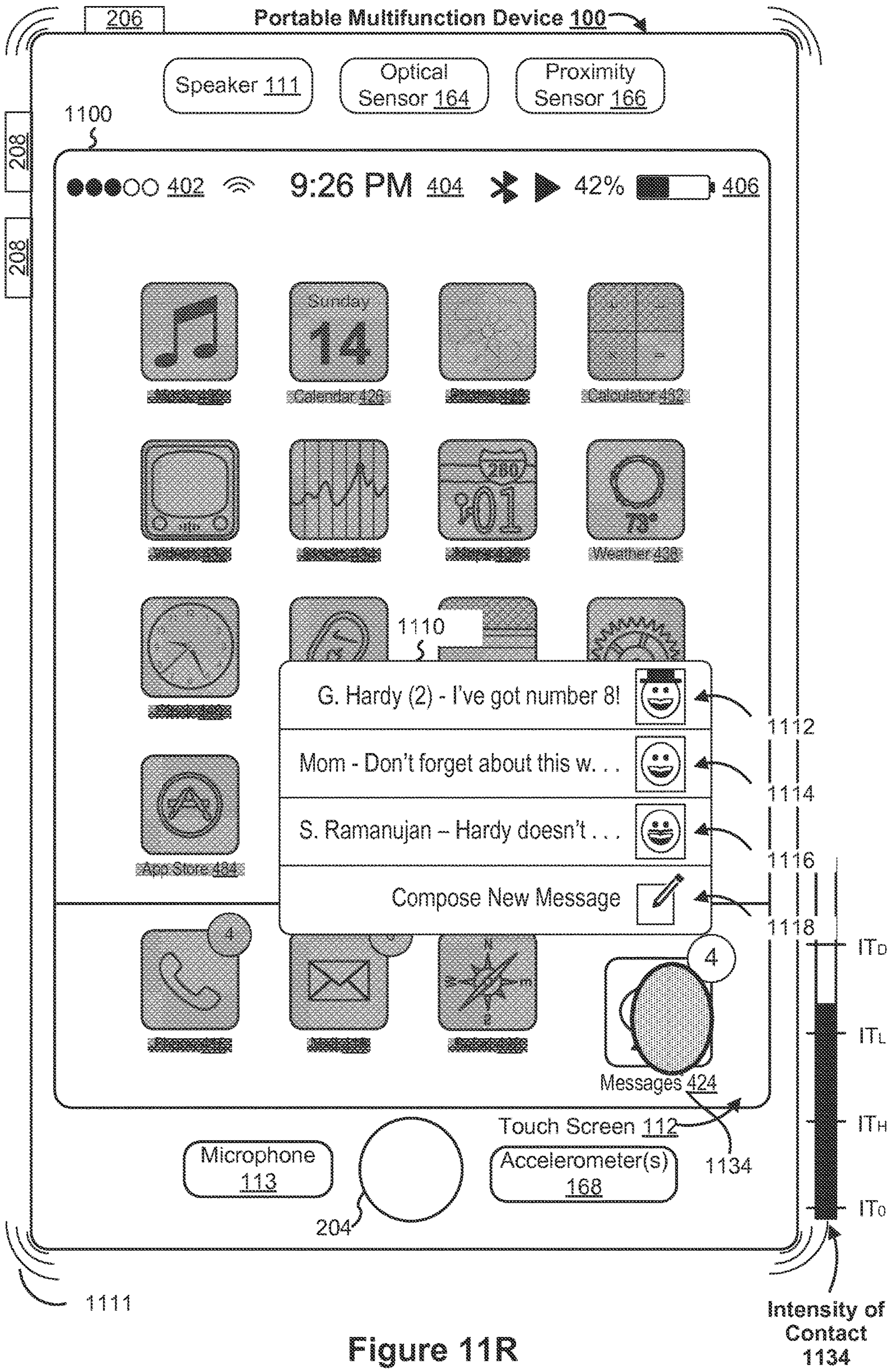
Figure 11S:
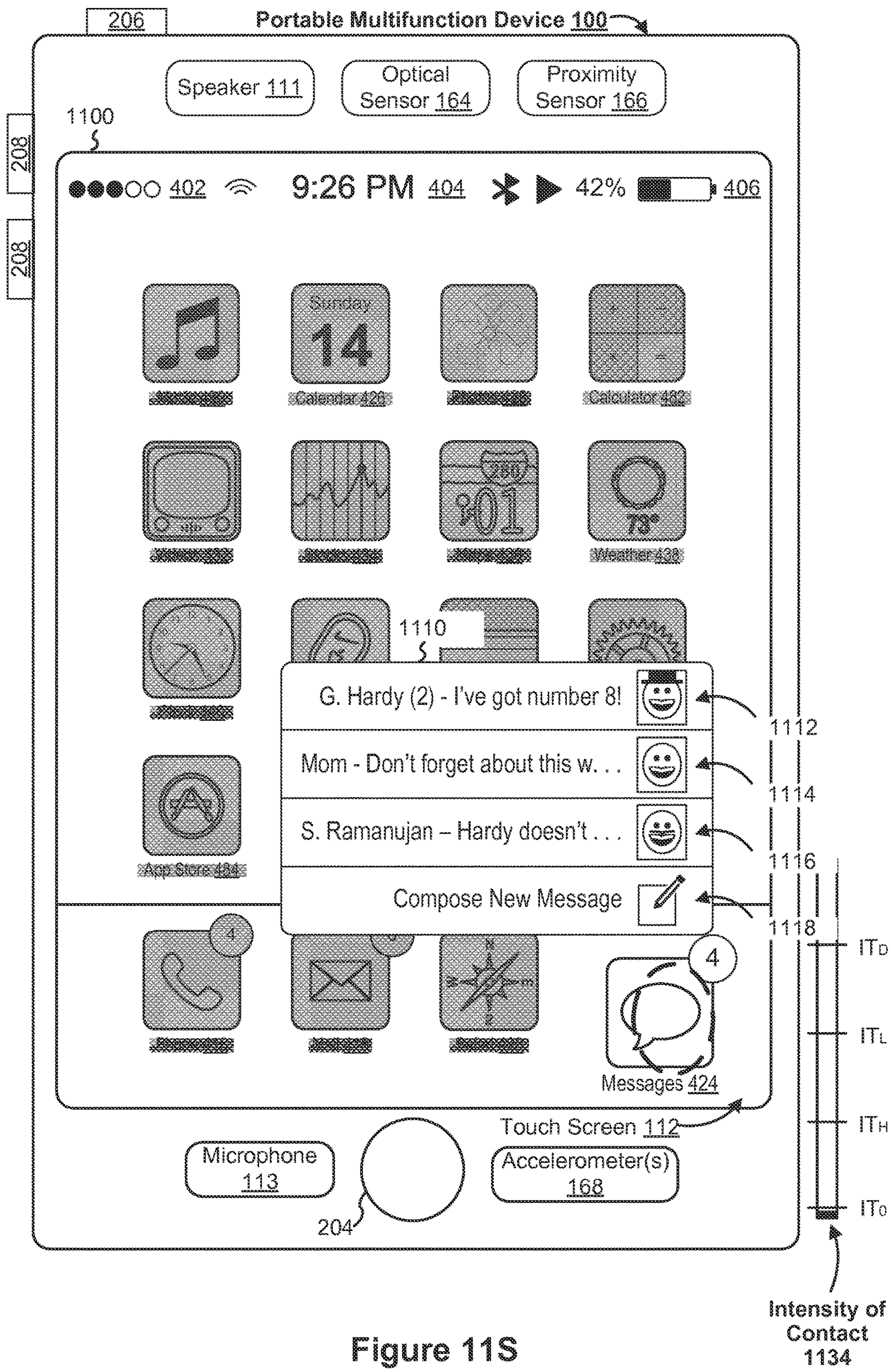

FIGS. 11O-11P illustrate an embodiment where the user invokes an application reconfiguration mode from the same home screen. The device detects contact 1130 on messages launch icon 424 in FIG. 11O, with an intensity below the intensity threshold needed to invoke the quick-action menu (e.g., $IT_L$). In response to detecting that the position of contact 1130 stays substantially stationary over messages launch icon 424 for a period of time satisfying a temporal threshold, the device enters a user interface object reconfiguration mode, as indicated by the display of deletion icons 1132 in FIG. 11P.

FIGS. 11Q-11U and 11AS-11AT illustrate an embodiment where the user invokes a quick-action menu, but terminates the option to perform a quick action by invoking a user interface object reconfiguration mode. The device detects contact 1134 on messages launch icon 424 in FIG. 11Q, with an intensity below the intensity threshold needed to invoke the quick-action menu (e.g., $IT_L$). In response to the intensity of contact 1134 increasing above the quick-action menu display threshold (e.g., $IT_L$), the device displays quick-action menu 1110 in FIG. 11R. The device also provides visual feedback that the other launch icons are inactive by blurring and pushing them backwards in a virtual z-space (e.g., by shrinking tem relative to messages launch icon 424). The device also provides tactile feedback 1111, indicating that a quick-action menu has been invoked. After liftoff of contact 1134, the device maintains display of quick-action menu 1110 in FIG. 11S because it is a selection menu. The device then detects a long-press input that meets a temporal threshold, including contact 1136 over messages launch icon 424 in FIG. 11T. In response, device enters a user interface object reconfiguration mode, as indicated by termination icons 1132 in FIG. 11U. Entry into the reconfiguration mode includes removing the blur from, and restoring the original size of, the other application launch icons displayed in user interface 1100. The device then detects movement of contact 1136 from position 1136-*a* in FIG. 11AS to position 1136-*b* in FIG. 11AT. In response, the device moves display of messages launch icon with contact 1136, from position 424-*a* in FIG. 11AS to position 424-*b* in FIG. 11AT.

FIGS. 11V-11Z illustrate an embodiment where the user invokes a quick-action menu, but terminates the option to perform a quick action by clearing the quick-action menu and restoring the user interface to the prior state. The device detects contact 1138 on messages launch icon 424 in FIG. 11V, with an intensity below the intensity threshold needed to invoke the quick-action menu (e.g., $IT_L$). In response to the intensity of contact 1138 increasing above the quick-action menu display threshold (e.g., $IT_L$), the device displays quick-action menu 1110 in FIG. 11R, providing visual and tactile feedback as described for FIG. 11R. After liftoff of contact 1134, the device maintains display of quick-action menu 1110 in FIG. 11S because it is a selection menu. The device then detects a tap gesture, including contact 1140, at a location other than where messages launch application 424 and quick application menu 1110 are displayed on touch screen 112 in FIG. 11Y. In response to the tap gesture, the device terminates the display of quick-action menu 1110 and restores user interface 1100 to the state it was in prior to detection of contact 1138 (e.g., a default home screen state) in FIG. 11Z.

FIGS. 11AA-11AB illustrate an embodiment where the user launches an icon that does not have an associated quick-action menu. The device detects a tap gesture, including contact 1142 on settings launch icon 446, in FIG. 11AA. Because the intensity of contact 1142 remains below the intensity threshold needed to invoke the quick-action menu (e.g., $IT_L$) until the device detected liftoff, the device launches the associated settings application by displaying a default user interface 1144 for the application in FIG. 11AB.

FIGS. 11AC-11AG illustrate an embodiment where the user performs a gesture meeting the quick-action-display input criteria at the same settings launch icon that does not have an associated quick-action menu. In FIG. 11AC device 100 detects contact 1146 on settings launch icon 446, displayed in home screen user interface 1100, with an intensity below the intensity threshold needed to invoke a quick-action menu (e.g., $IT_L$). In FIGS. 11AD-11AD, the intensity of contact 1146 increases above a "hint" threshold (e.g., $IT_H$), but remains below the intensity threshold needed to invoke a quick-action menu. The device indicates that the user is approaching the intensity needed to call up a quick action menu by blurring (e.g., dynamically) the other launch icons. However, because settings launch icon 446 is not associated with a quick action menu, the device does not provide a hint graphic (e.g., like hint graphic 503 in FIG. 5C). In FIG. 11AF, the intensity of contact 1146 increases above the threshold (e.g., $IT_L$) required to invoke a quick-action menu. However, the device does not display a quick-action menu because settings launch icon 446 is not associated with one. Rather, the device provides negative tactile feedback 1148, which is distinguishable from positive tactile feedback 1111 illustrated in FIG. 11W, to indicate that a quick-action menu is unavailable for settings launch icon 446. The device also returns display of user interface 1100 to the same state as before contact 1146 was detected in FIG. 11AF, regardless of whether liftoff of contact 1146 has occurred, as illustrated in FIG. 11AG.

FIGS. 11AH-11AL illustrate an embodiment where the user invokes a quick-action menu and selects an action from the menu with a single gesture. In FIG. 11AH, the device 100 detects contact 1150 on messages icon 424, with an intensity below the intensity threshold needed to invoke the quick-action menu (e.g., $IT_L$). In response to the intensity of contact 1150 increasing above the quick-action-display intensity threshold (e.g., $IT_L$), the device displays quick-action menu 1151 in FIG. 11AI. The device detects movement 1152 of contact 1150 downward over the display of quick-action menu 1151, from position 1150-*a* in FIG. 11AJ to position 1150-*b* in FIG. 11AK. The device then detects liftoff of contact 550 while it is displayed over option 1114 in quick-action menu 1110. In response, the device launches the associated messaging application and displays user interface 1122, which includes a text prompt for responding to mom's message, rather than opening the application to a default user interface (e.g., as illustrated in FIG. 11C).

FIGS. 11AM-11AR illustrate an embodiment where a user invokes a quick-action menu and selects an action that does not require changing the user interface of the device (e.g., that does not open a user interface within the associated application). In FIG. 11AM, the device 100 detects contact 1154 on music launch icon 480, with an intensity below the intensity threshold needed to invoke the quick-action menu (e.g., $IT_L$). In response to the intensity of contact 1154 increasing above the quick-action-display intensity threshold (e.g., $IT_L$), the device displays quick-action menu 1158 in FIG. 11AN. The device detects a decrease in the intensity of contact 1154 to below the quick-action-display intensity threshold (e.g., $IT_L$), and movement 1156 of contact 1154 from position 1154-*a* in FIG. 11AO to position 1154-*b* in FIG. 11AP, over menu option 1162 in quick-action menu 1158. In response to detecting a second increase in the intensity of contact 1154 above the quick-action-display intensity threshold (e.g., $IT_L$), while the contact is over menu option 1162, the device plays Bach's well-tempered clavier, as indicated by sound waves 1168, and restores user interface 1100 to the same state as before contact 1154 was first detected, as illustrated in FIG. 11AQ. The reversion of user interface 1100 occurs independently of liftoff of contact 1154, as illustrated in FIG. 11AR.

Figure 12A:
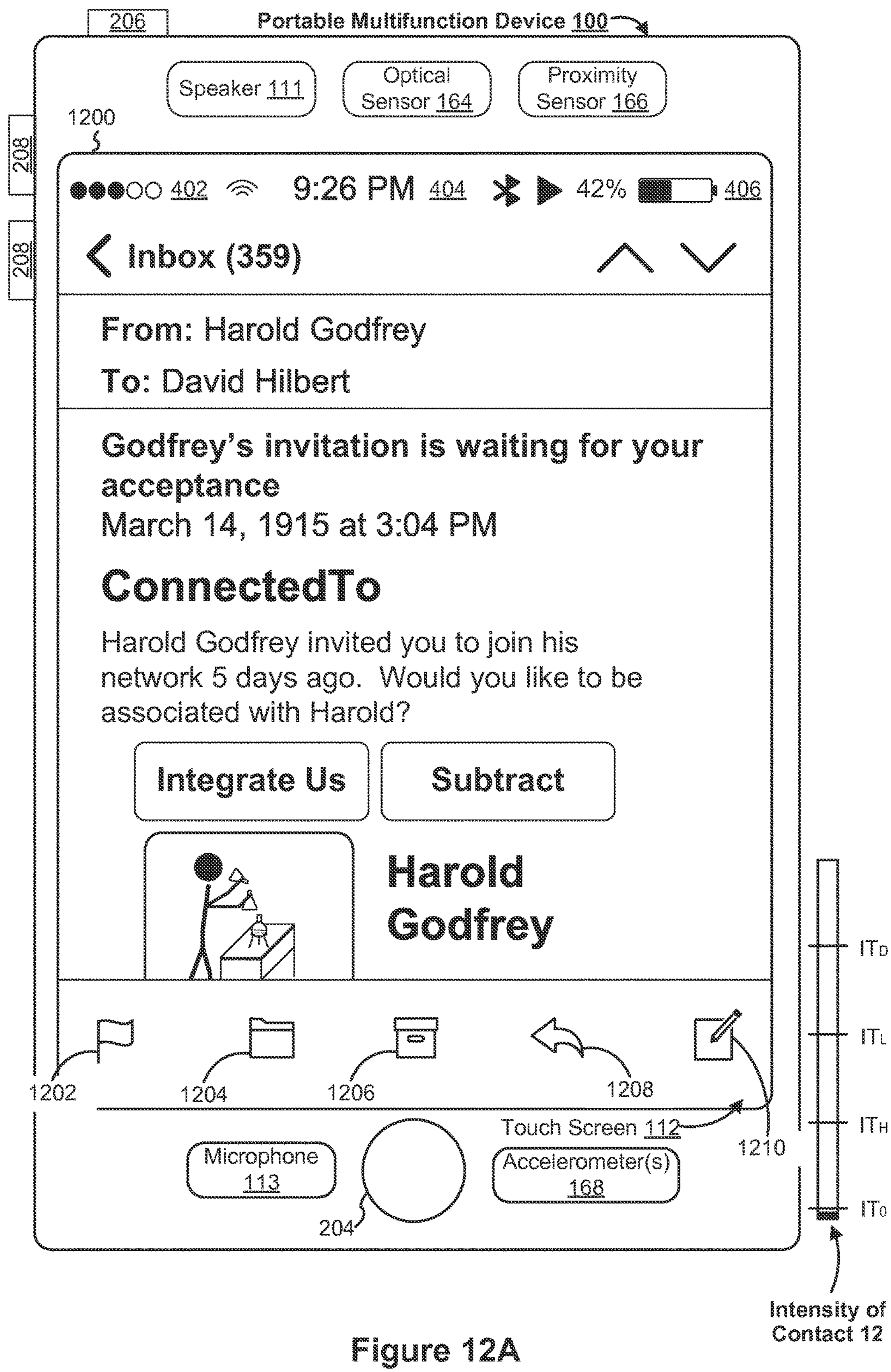
FIGS. 12A-12X illustrate exemplary user interfaces for selecting a default option from a menu or displaying a menu of options in accordance with some embodiments.
Figure 12B:
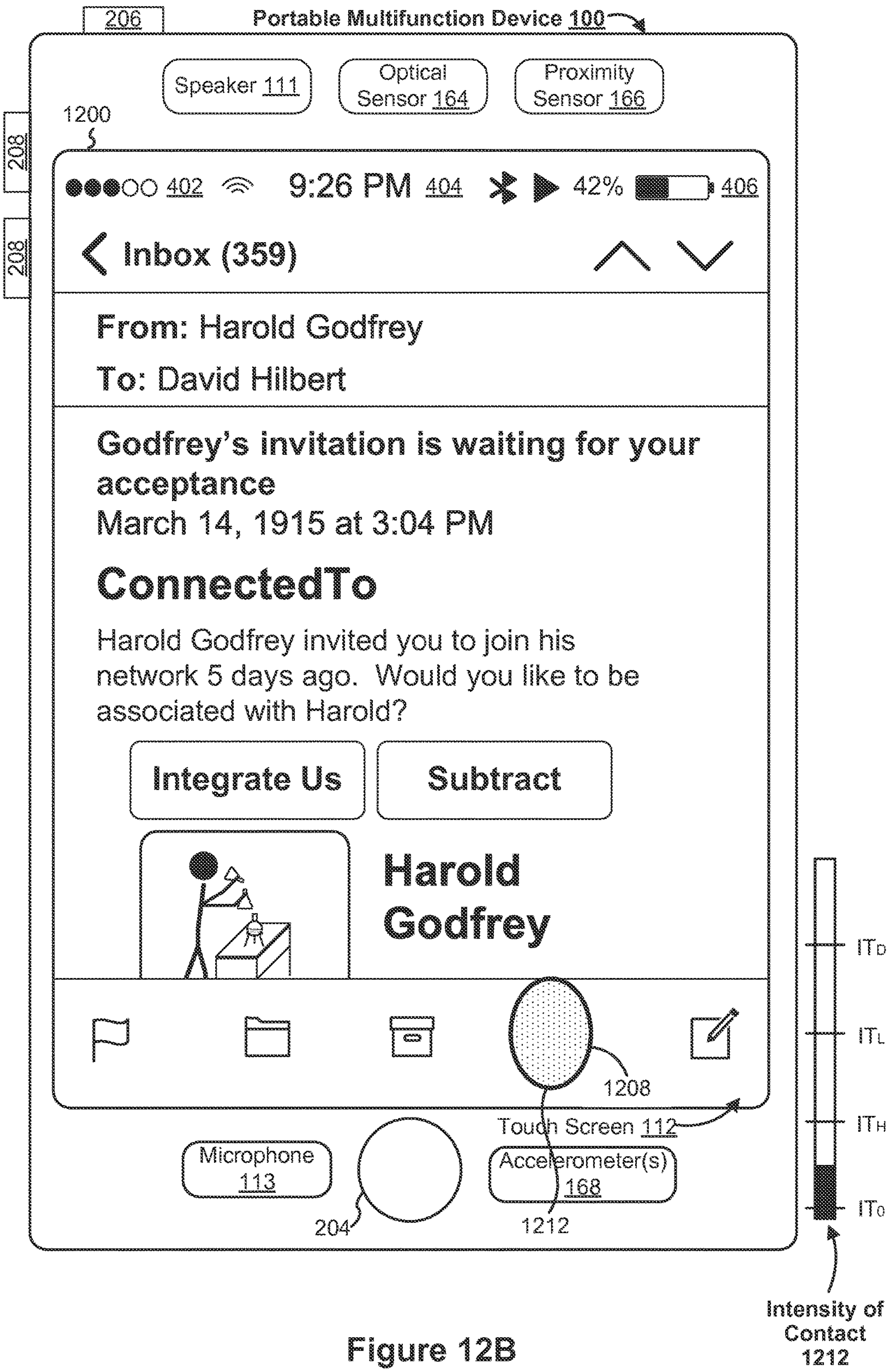
Figure 12C:
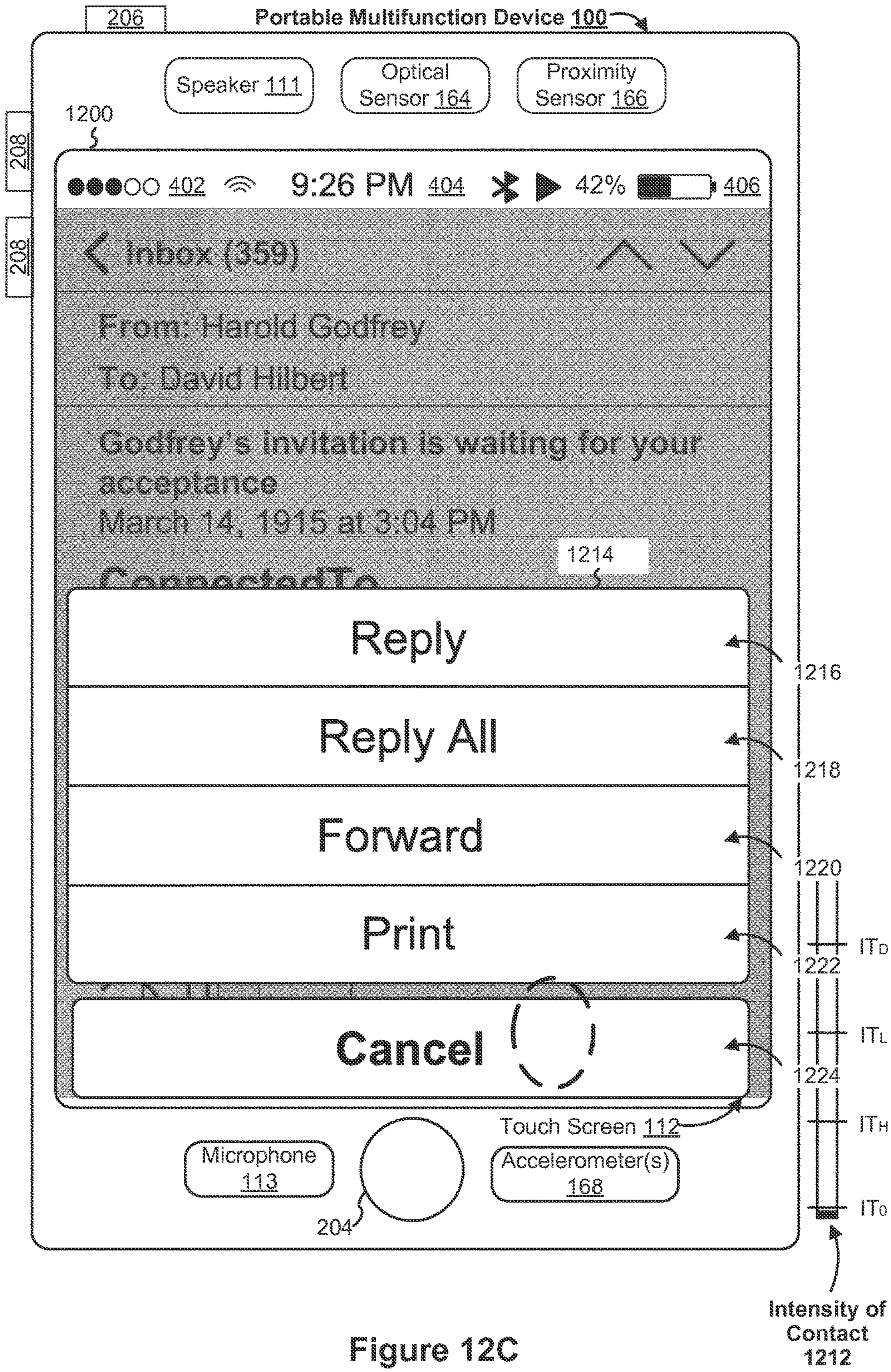
Figure 12D:
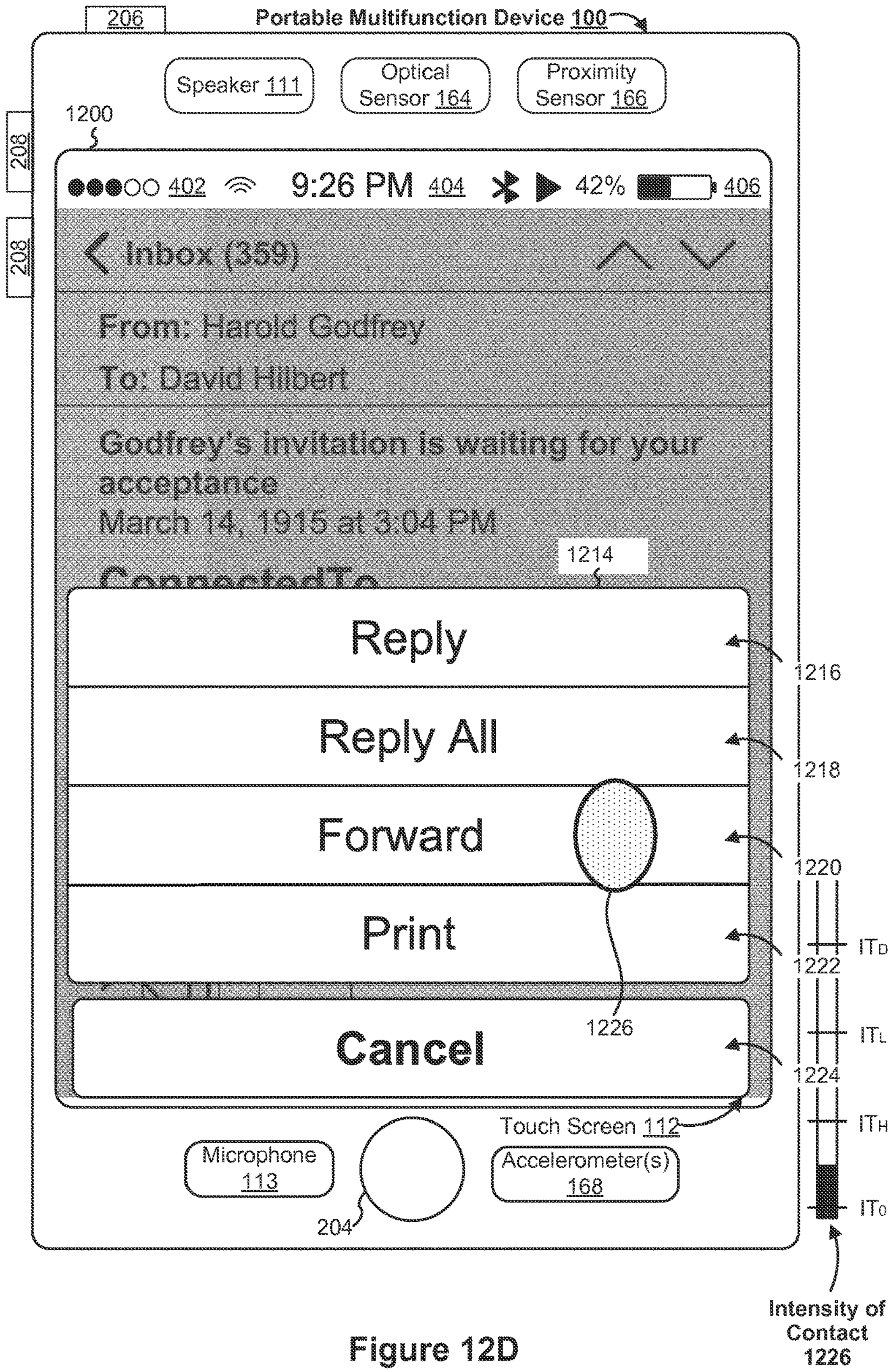
Figure 12E:
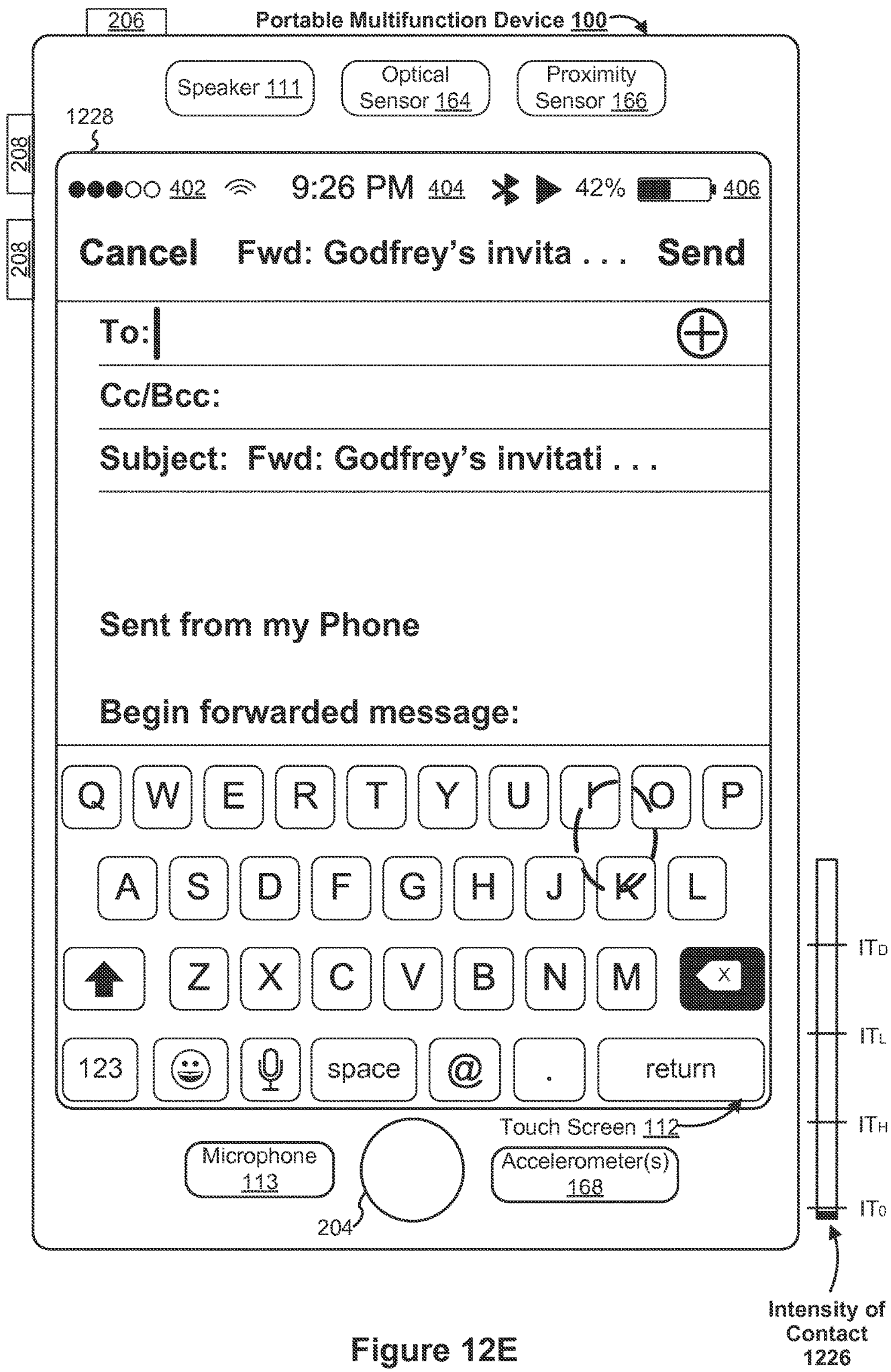
Figure 12F:
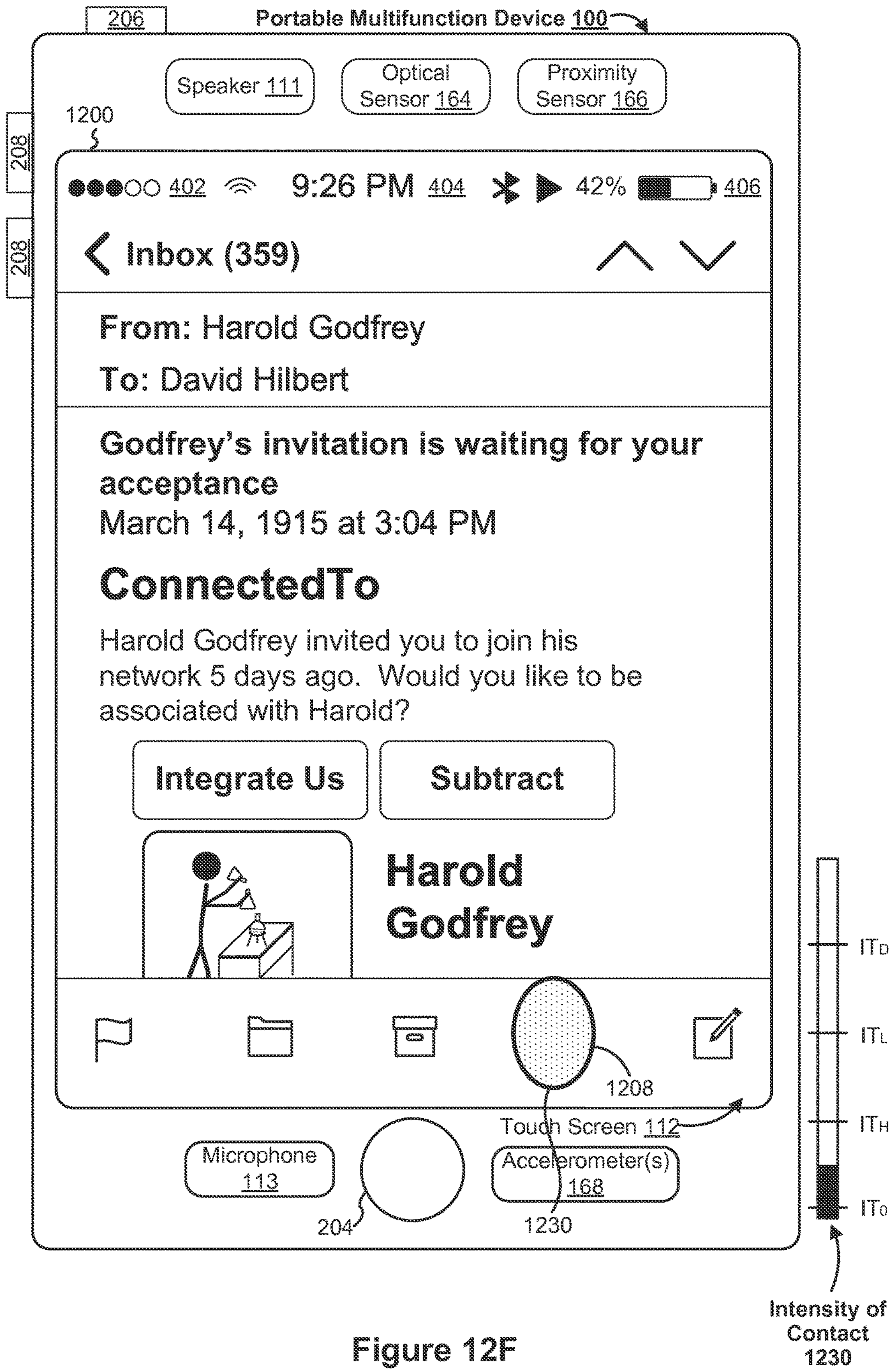
Figure 12G:
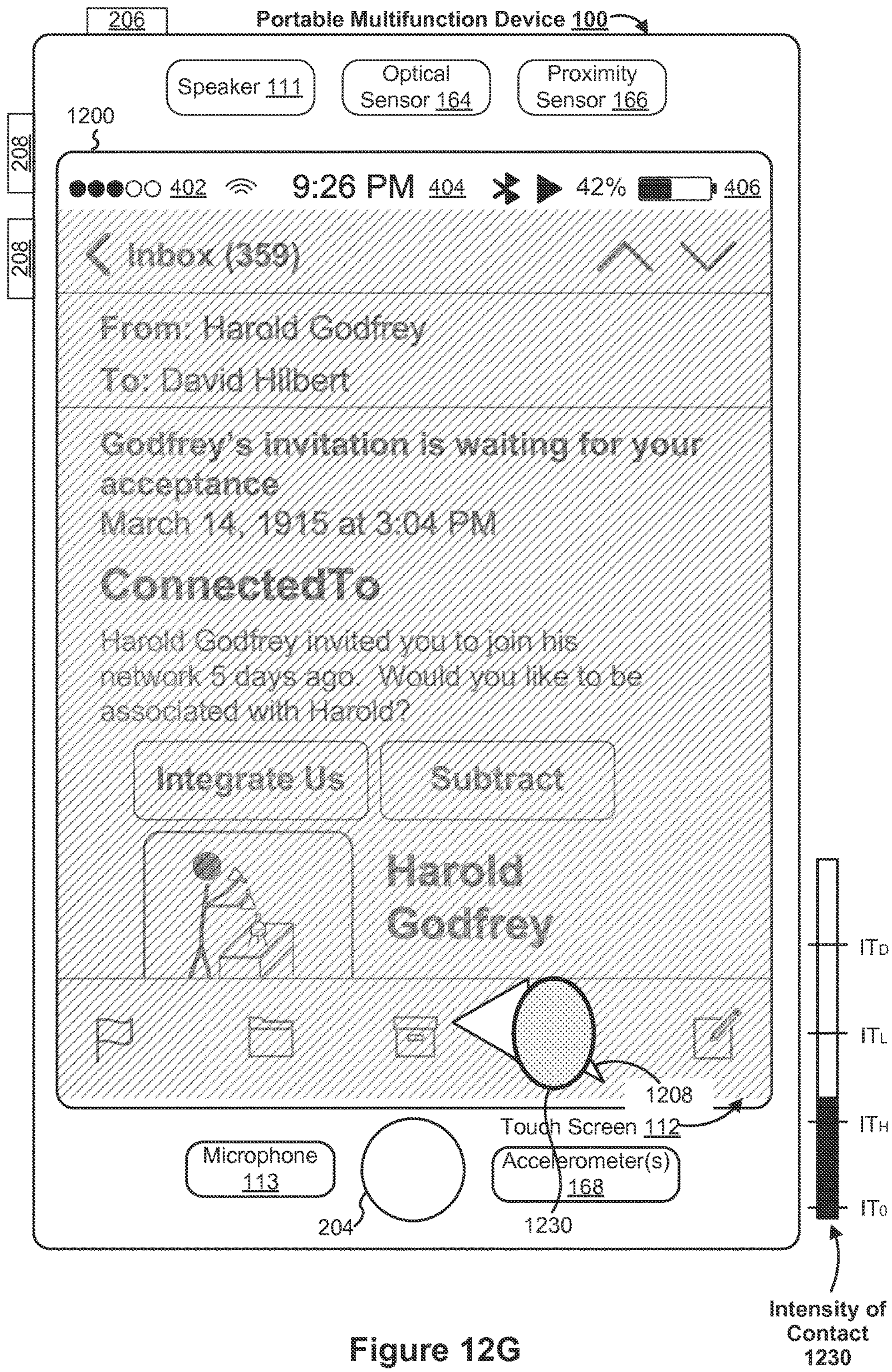
Figure 12H:
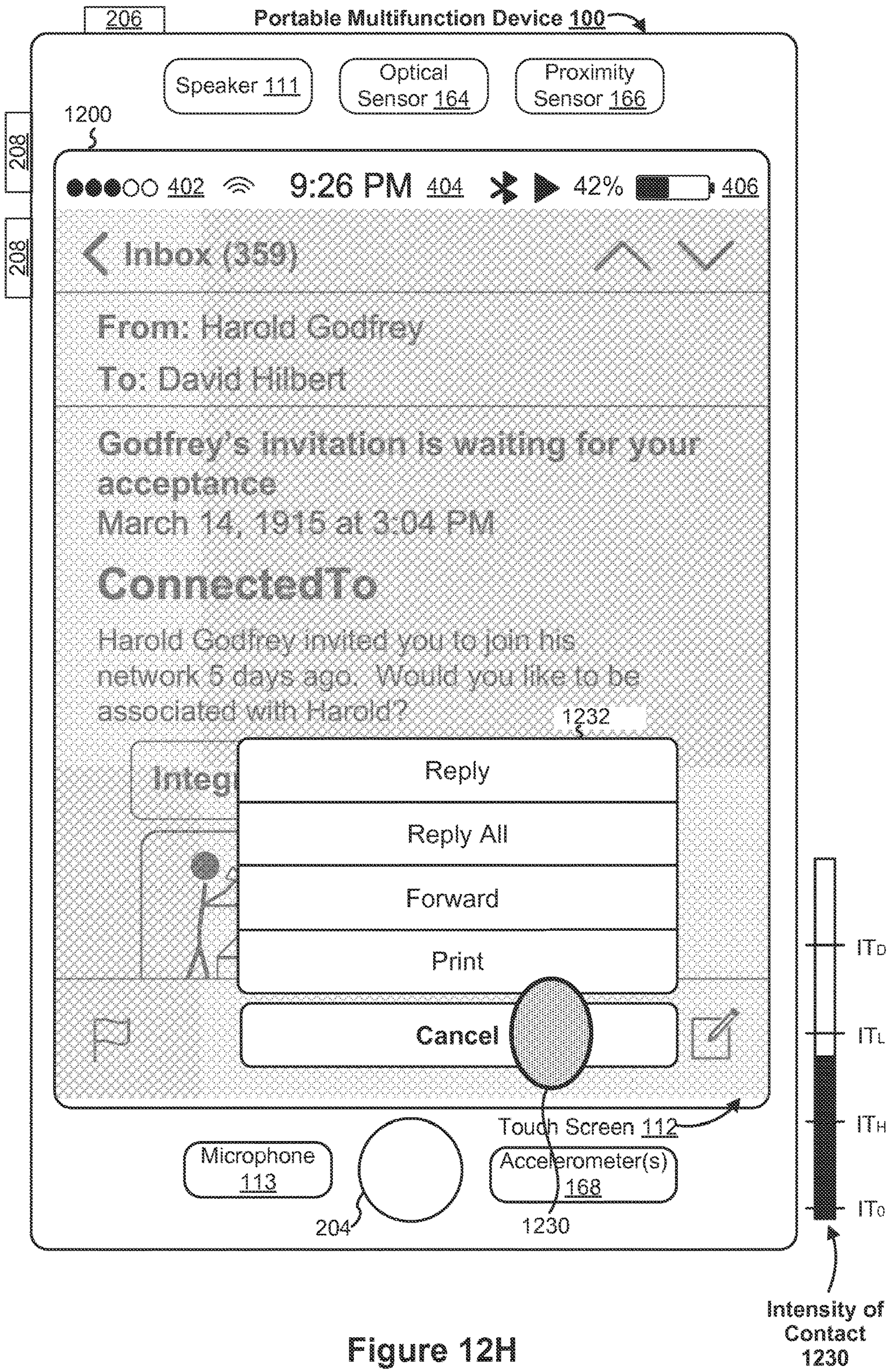
Figure 12I:
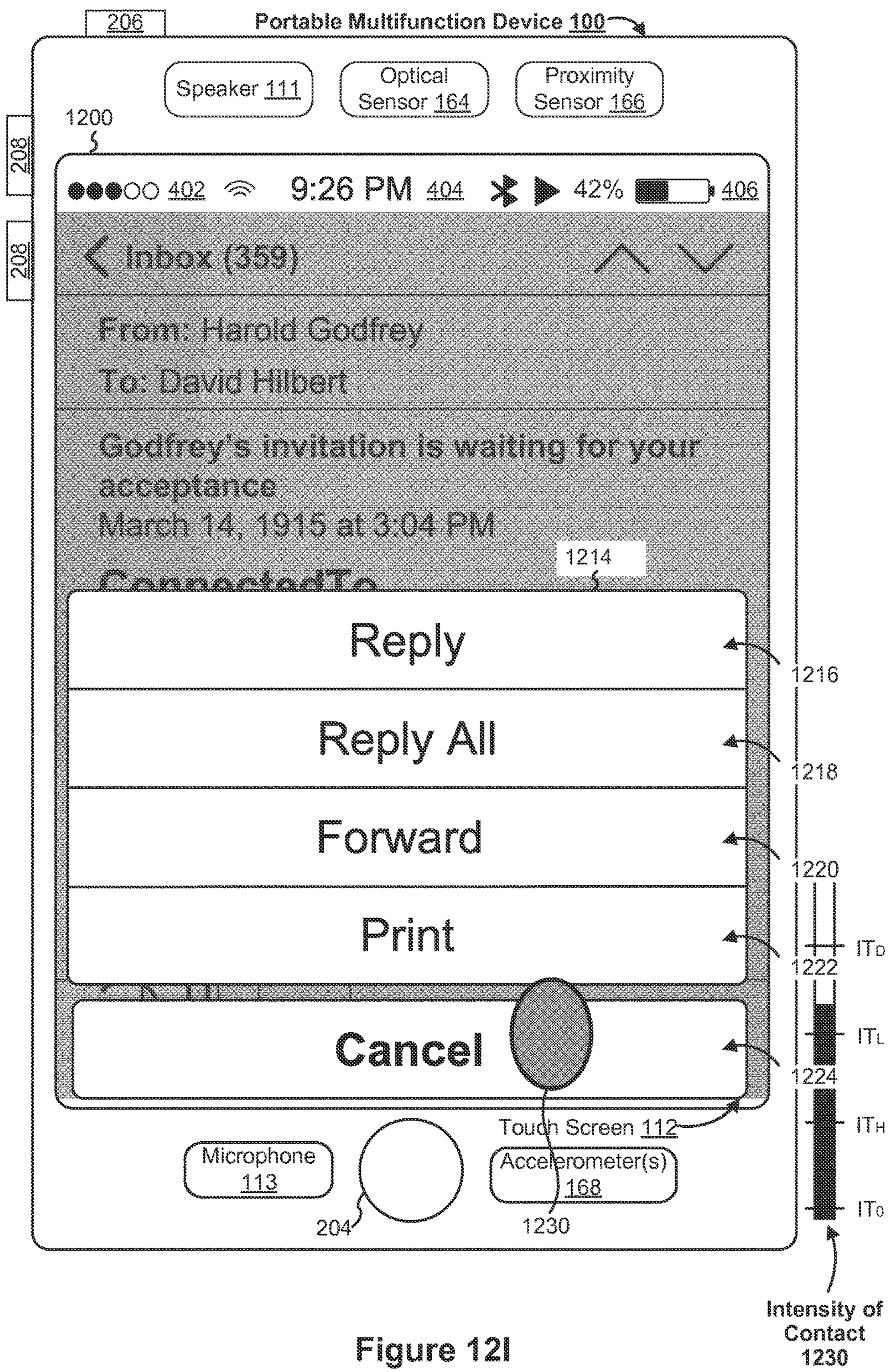
Figure 12J:
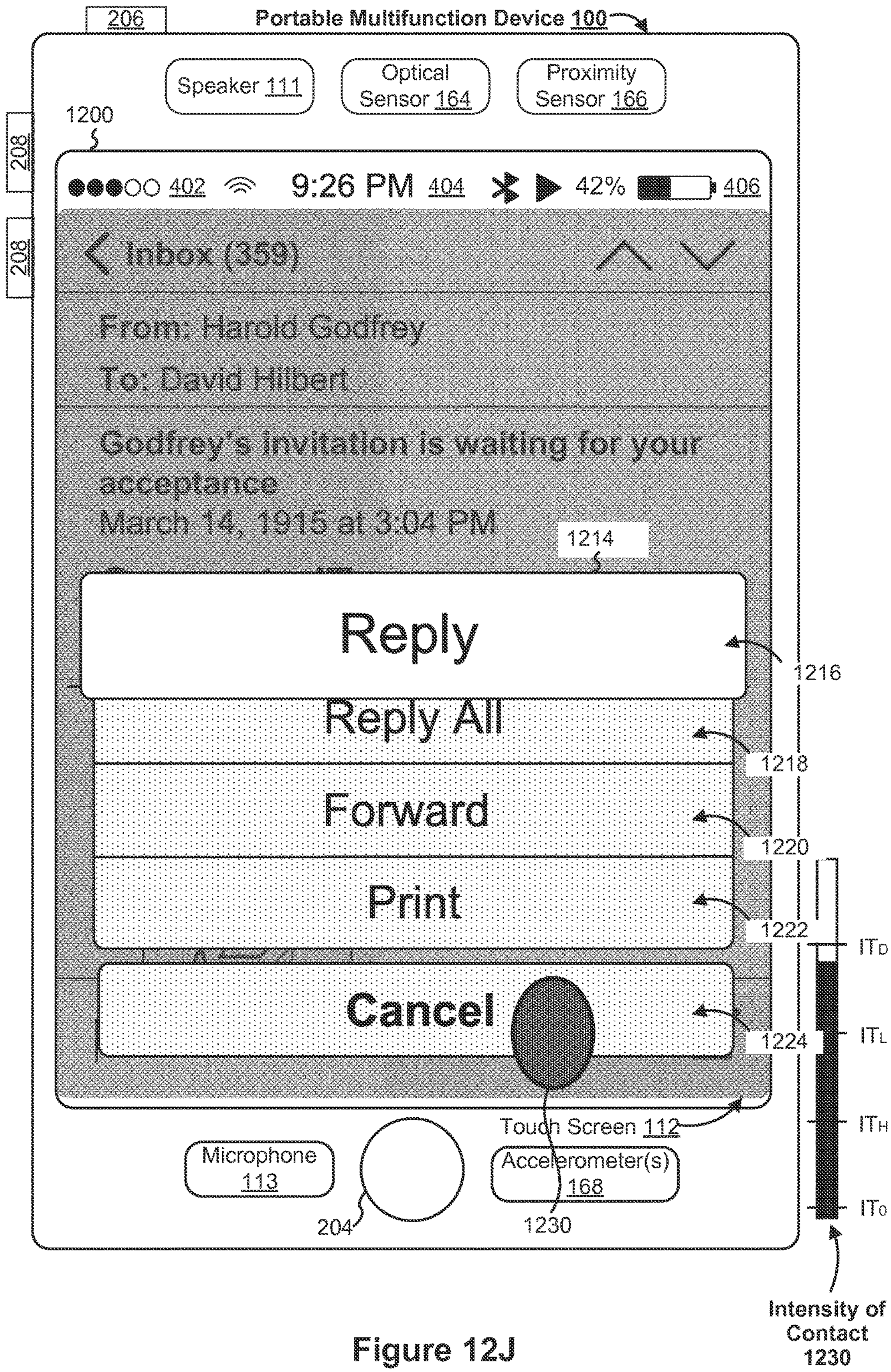
Figure 12K:
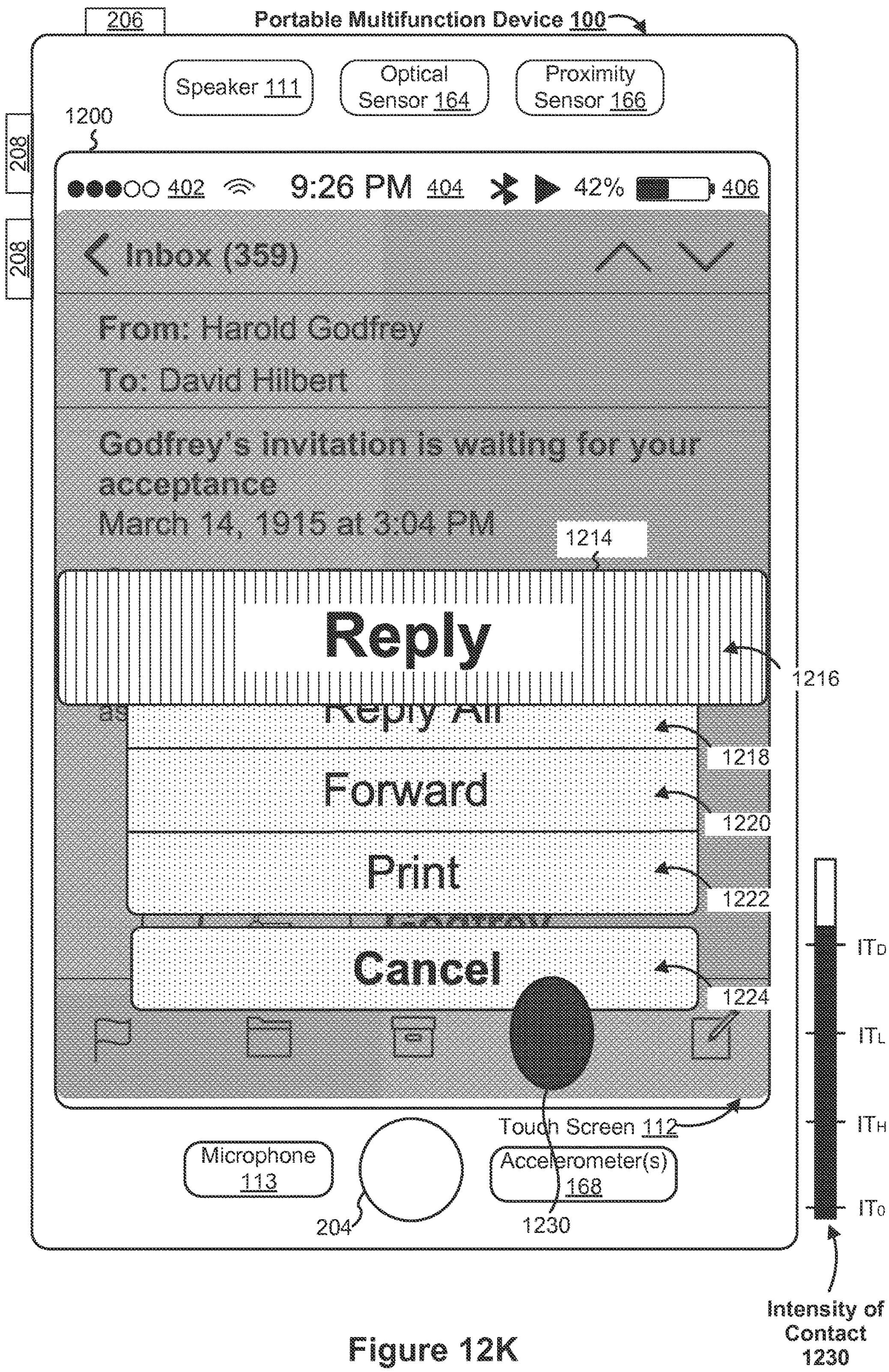
Figure 12L:
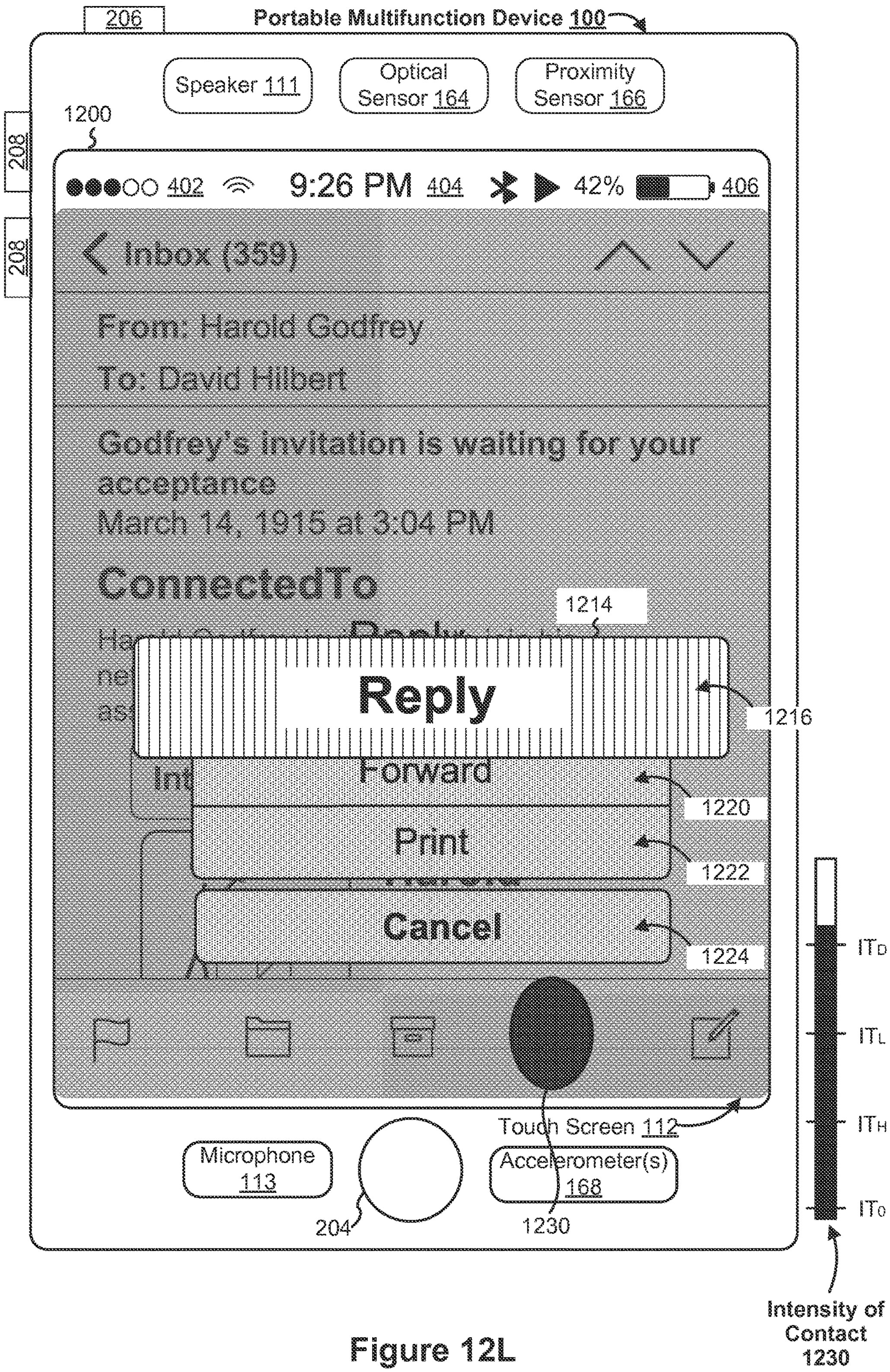
Figure 12M:
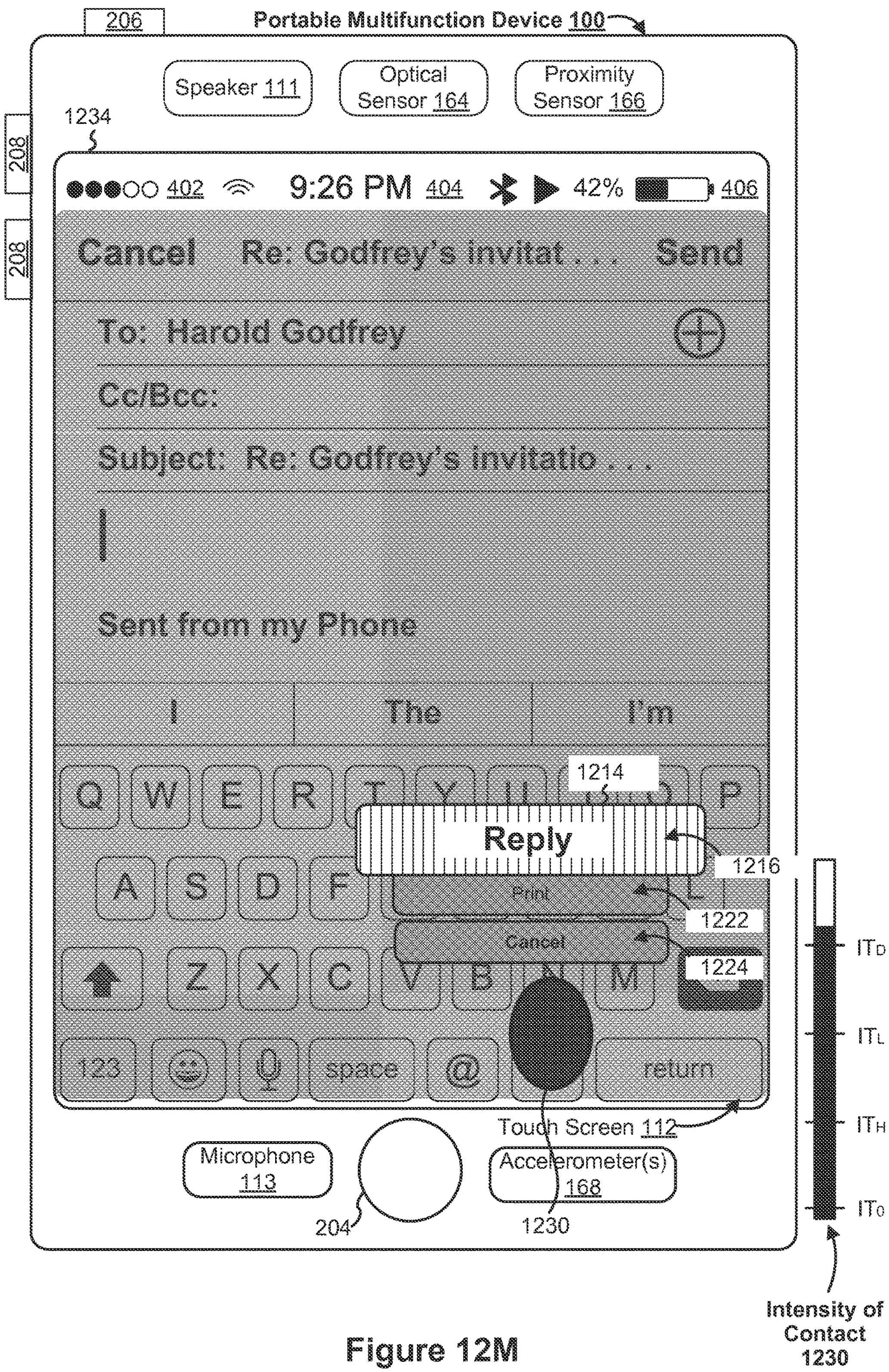
Figure 12N:
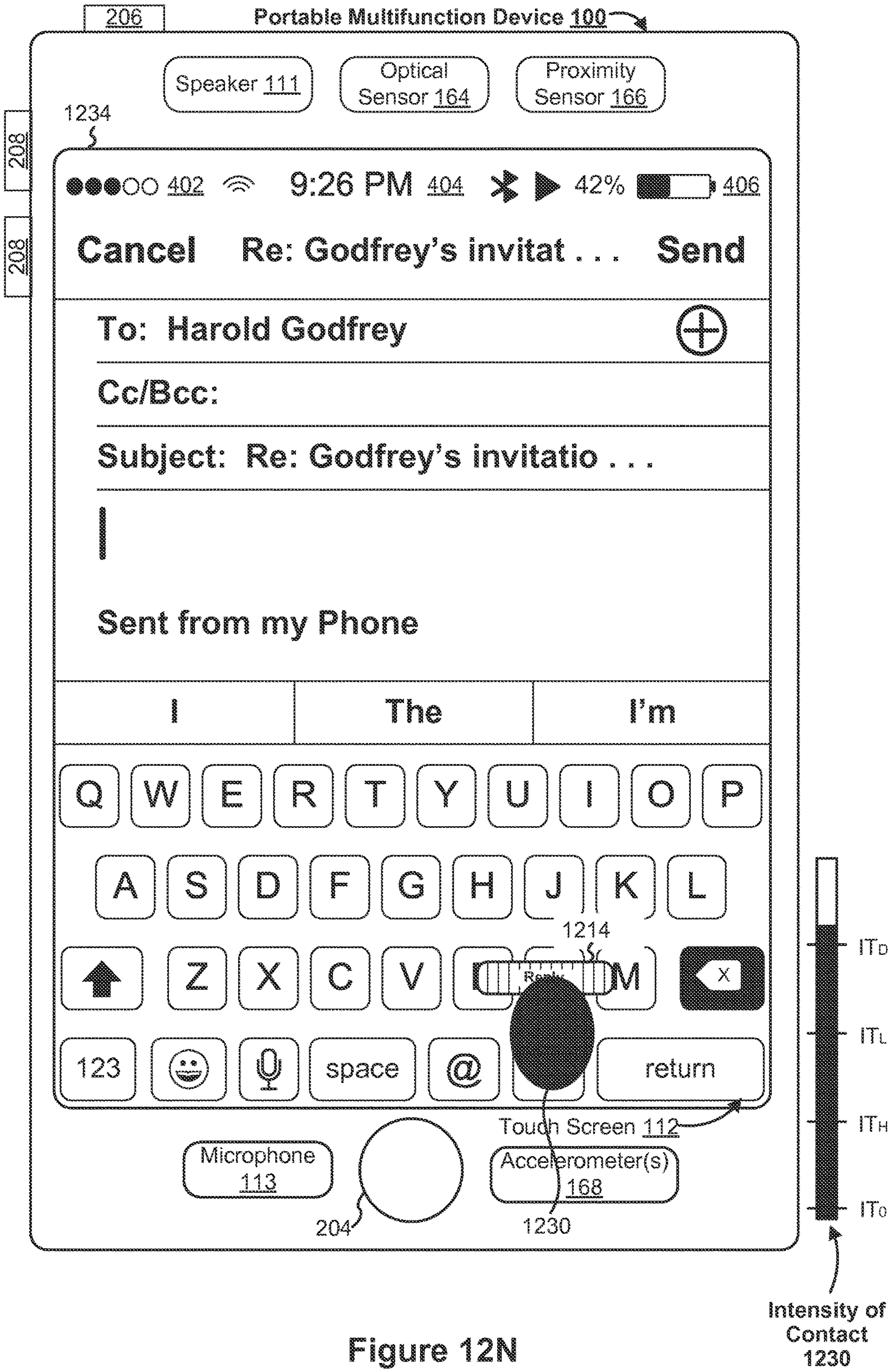
Figure 12O:
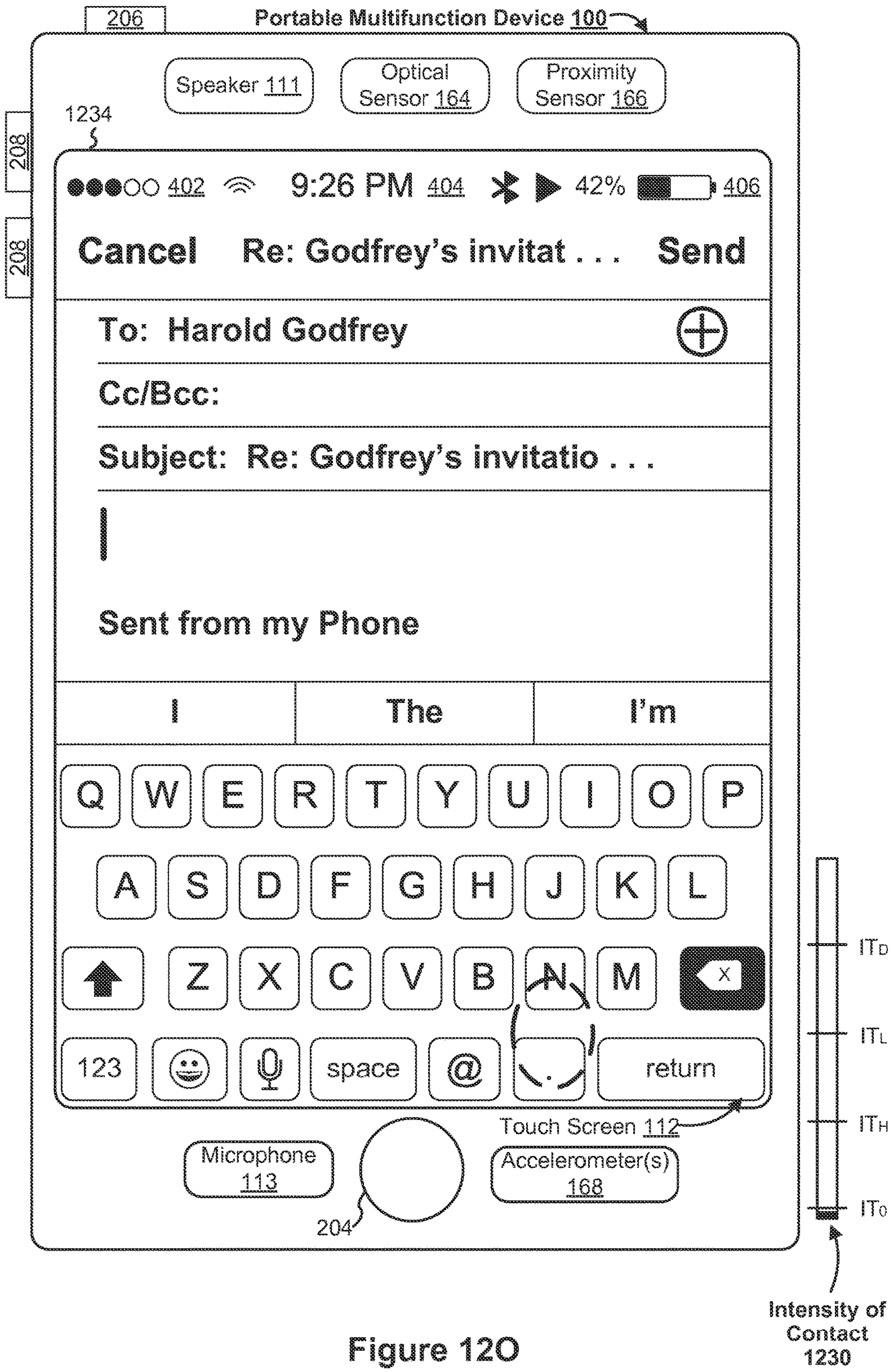
Figure 12P:
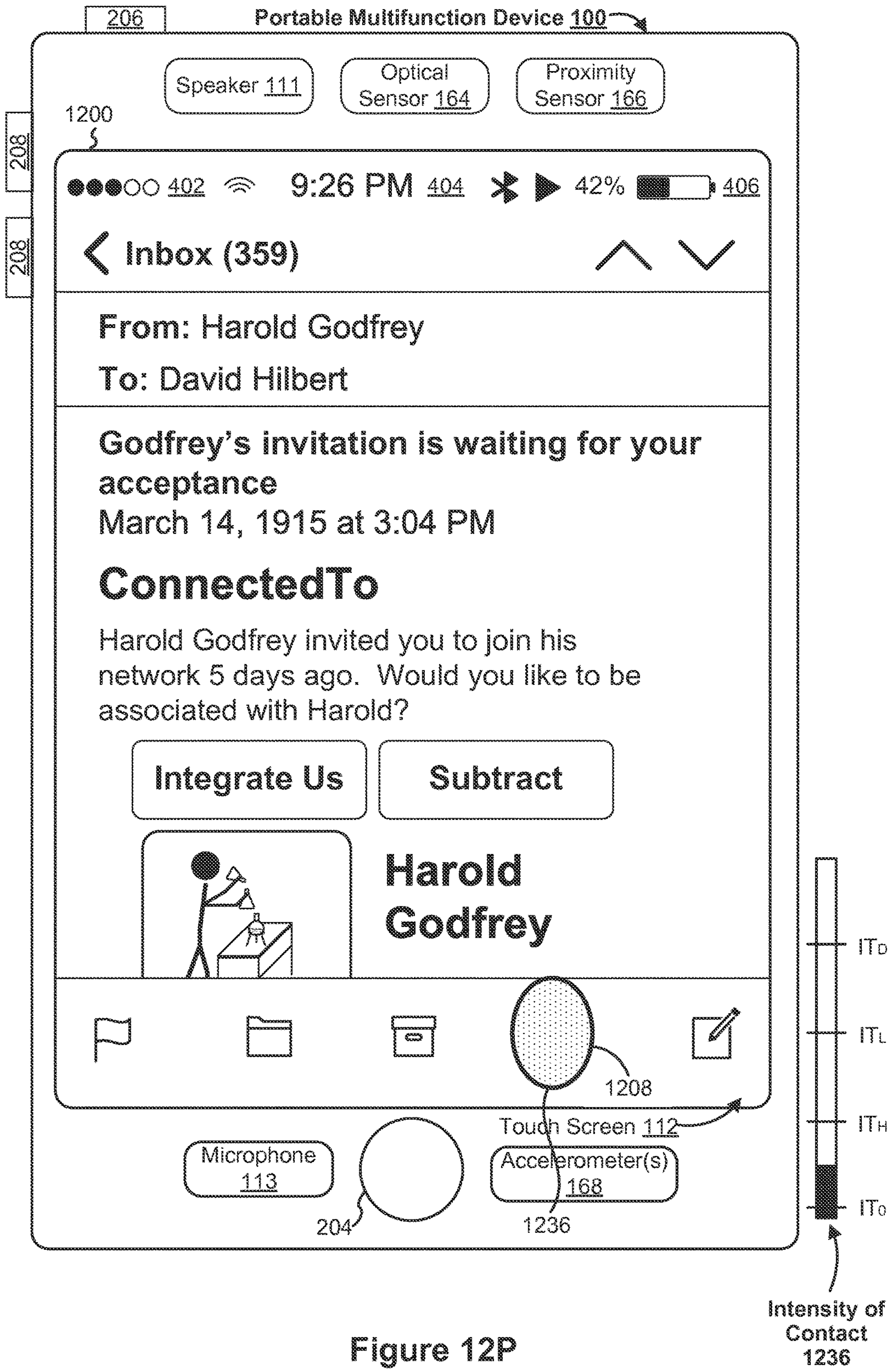
Figure 12Q:
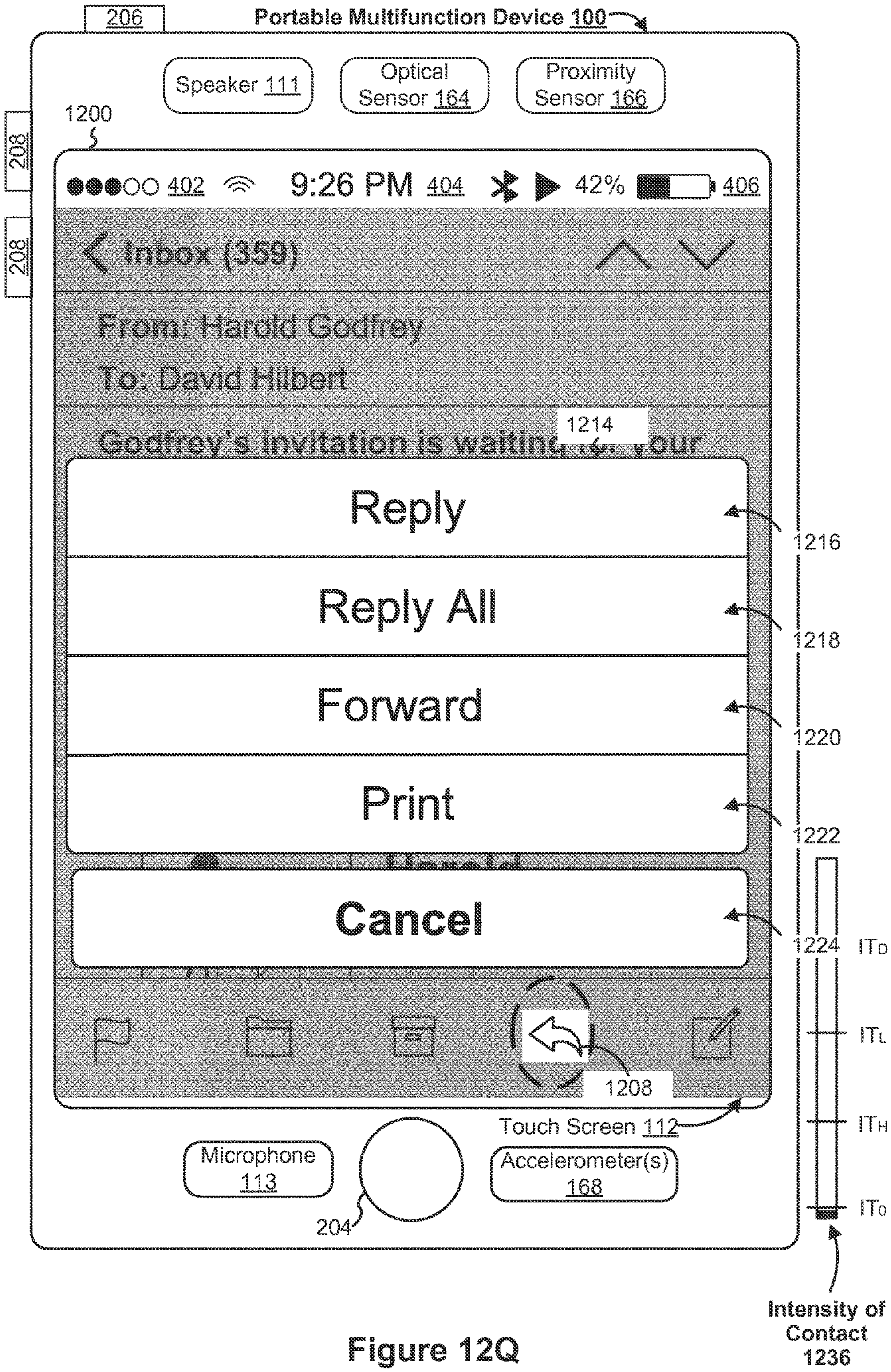
Figure 12R:
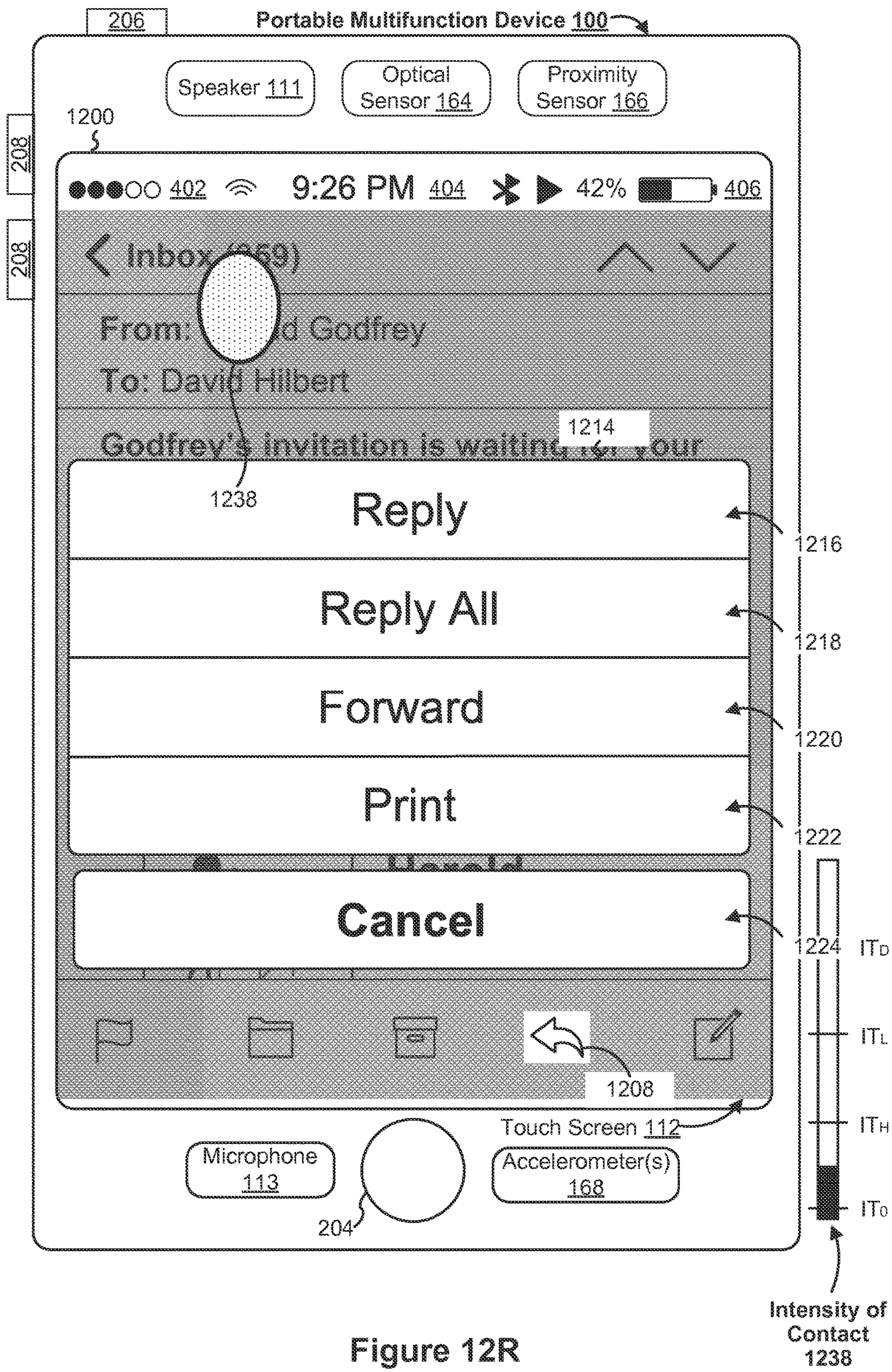
Figure 12S:
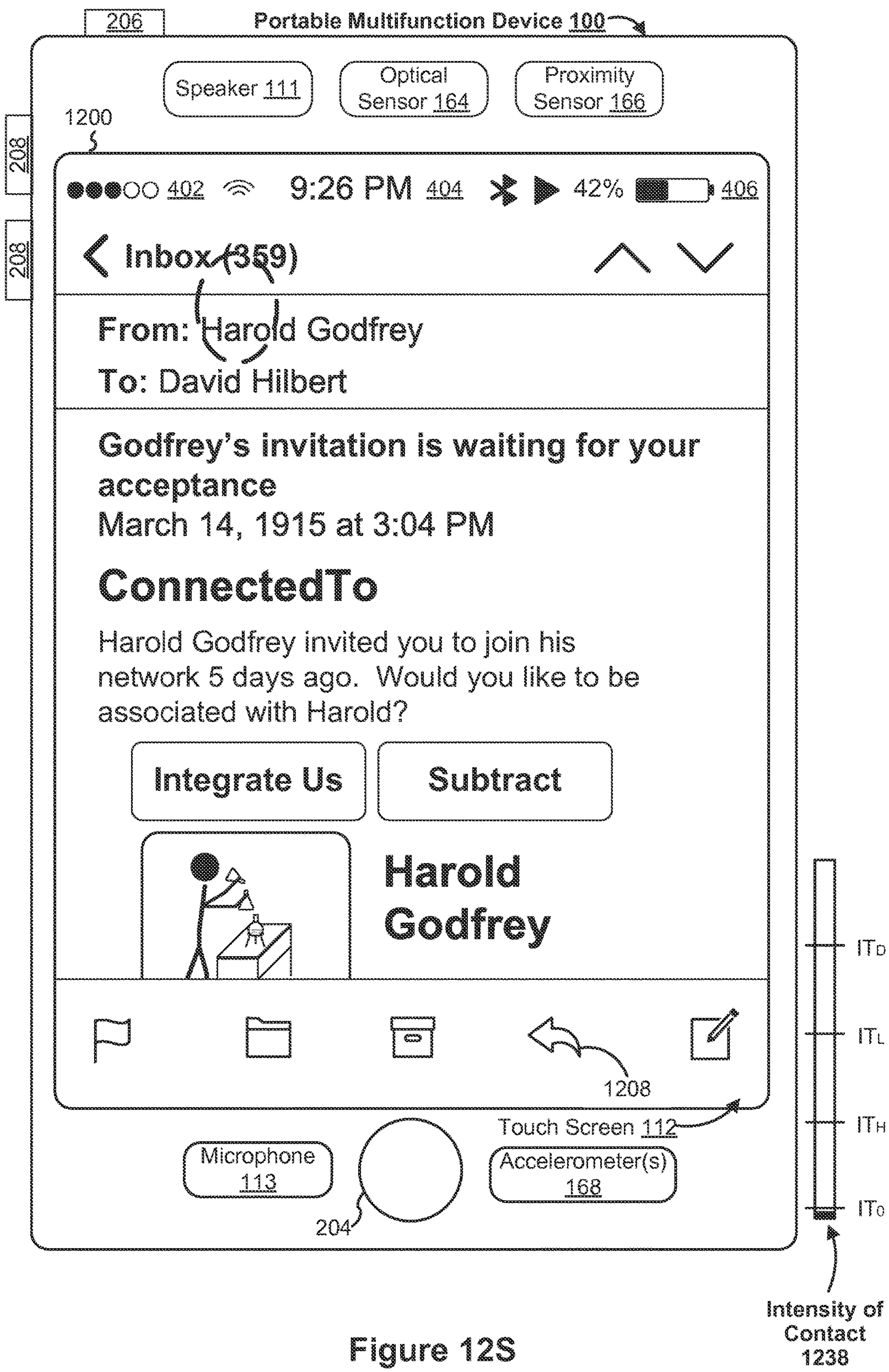
Figure 12T:
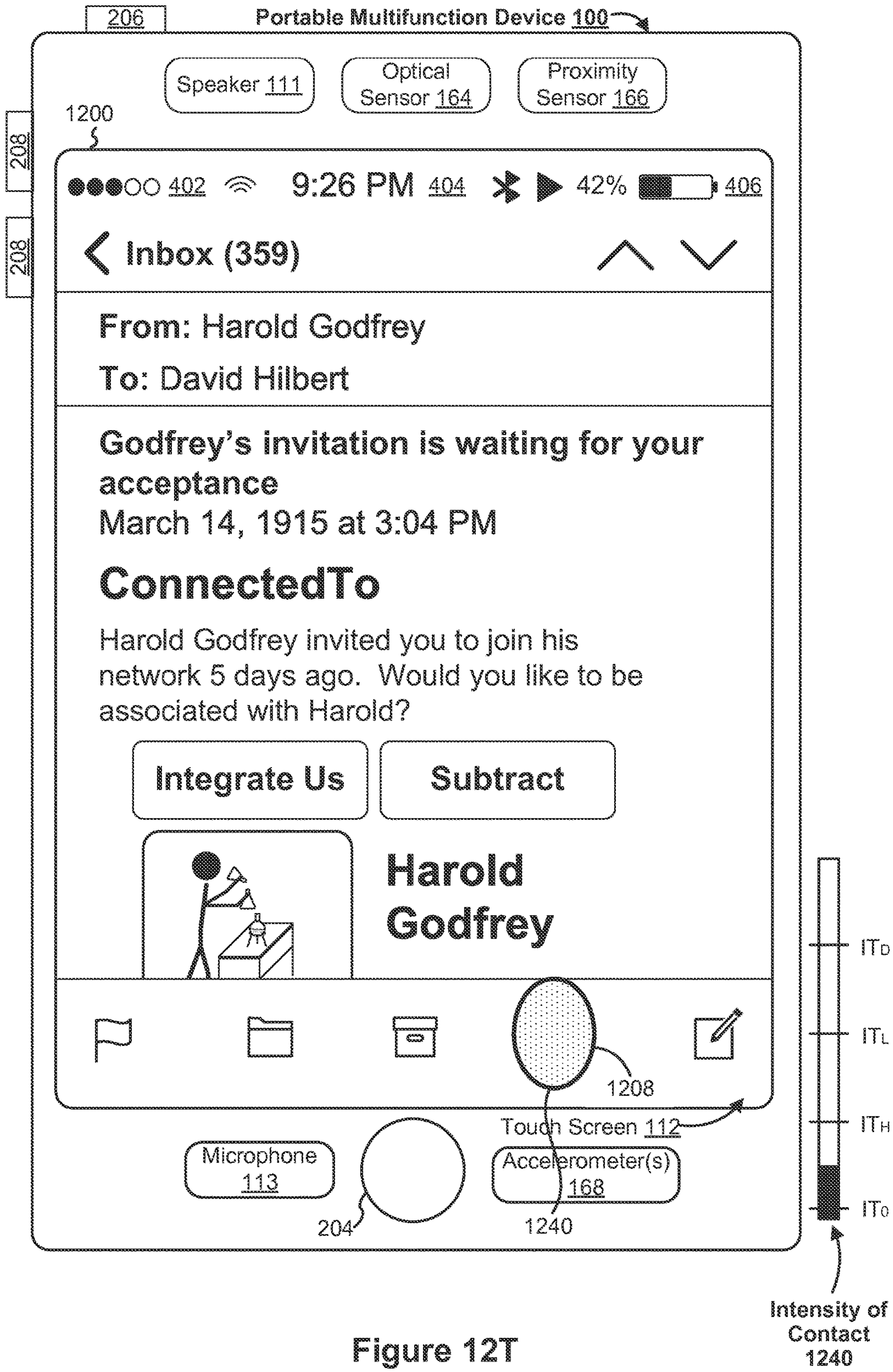
Figure 12U:
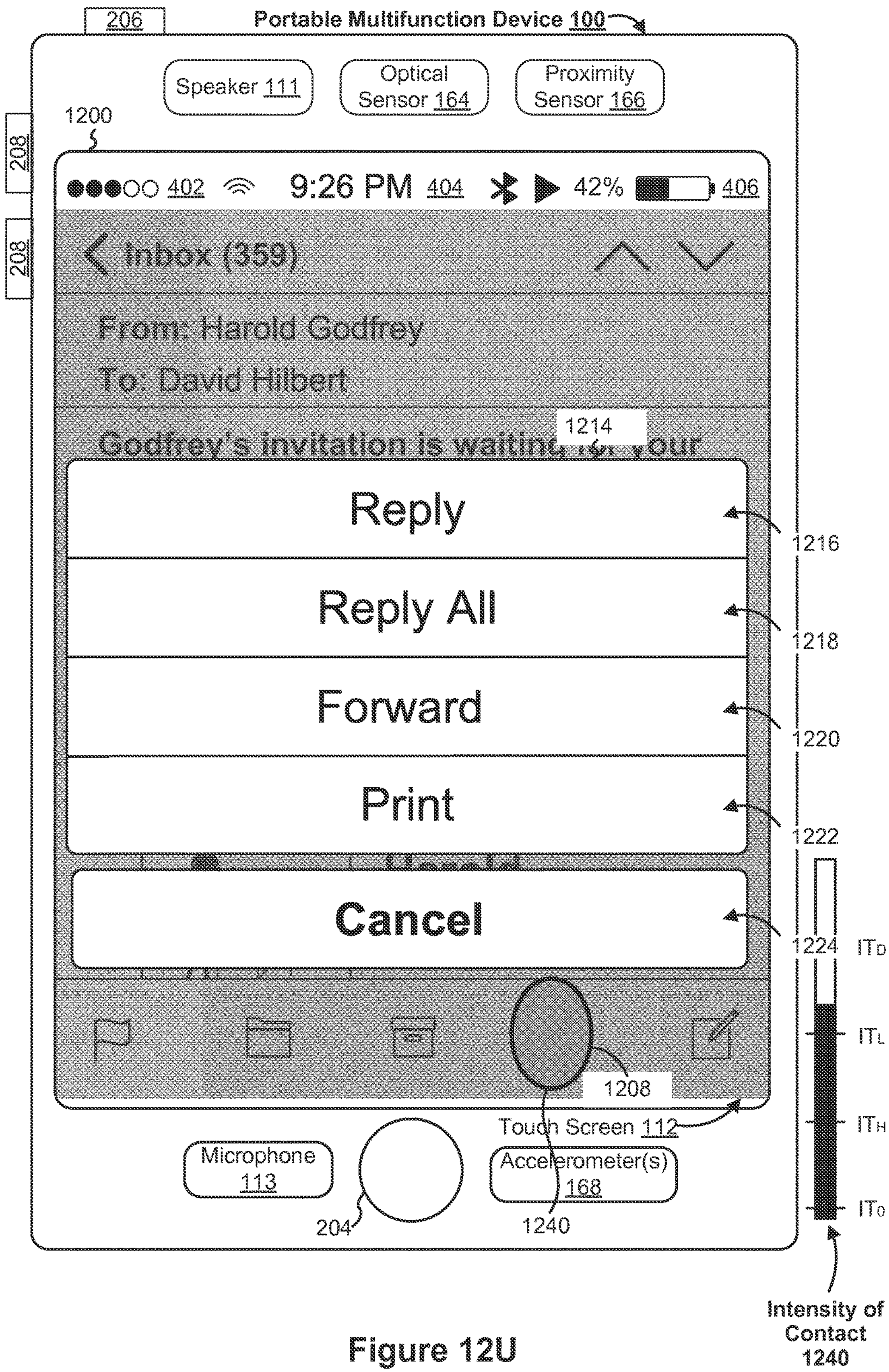
Figure 12V:
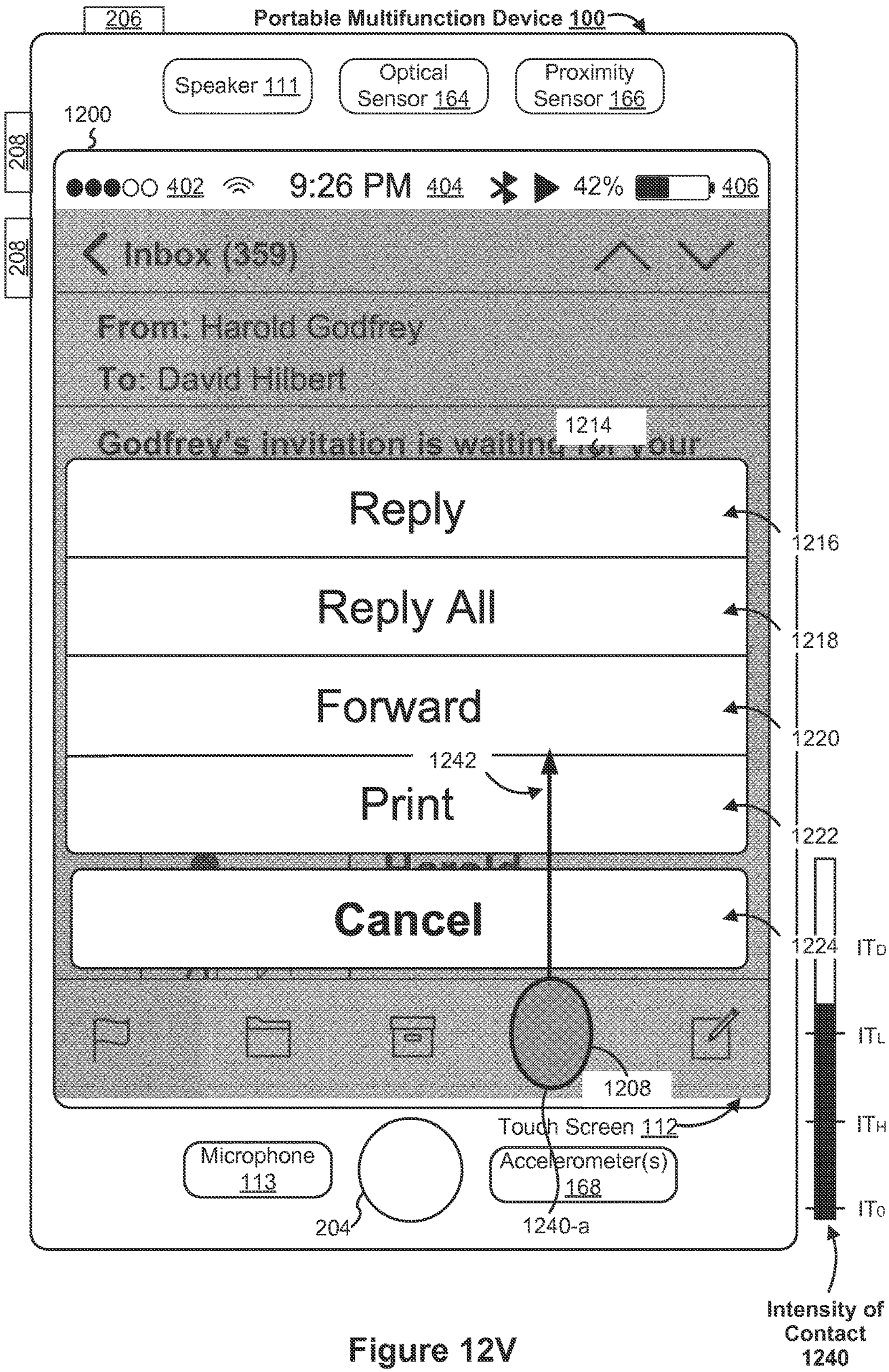
Figure 12W:
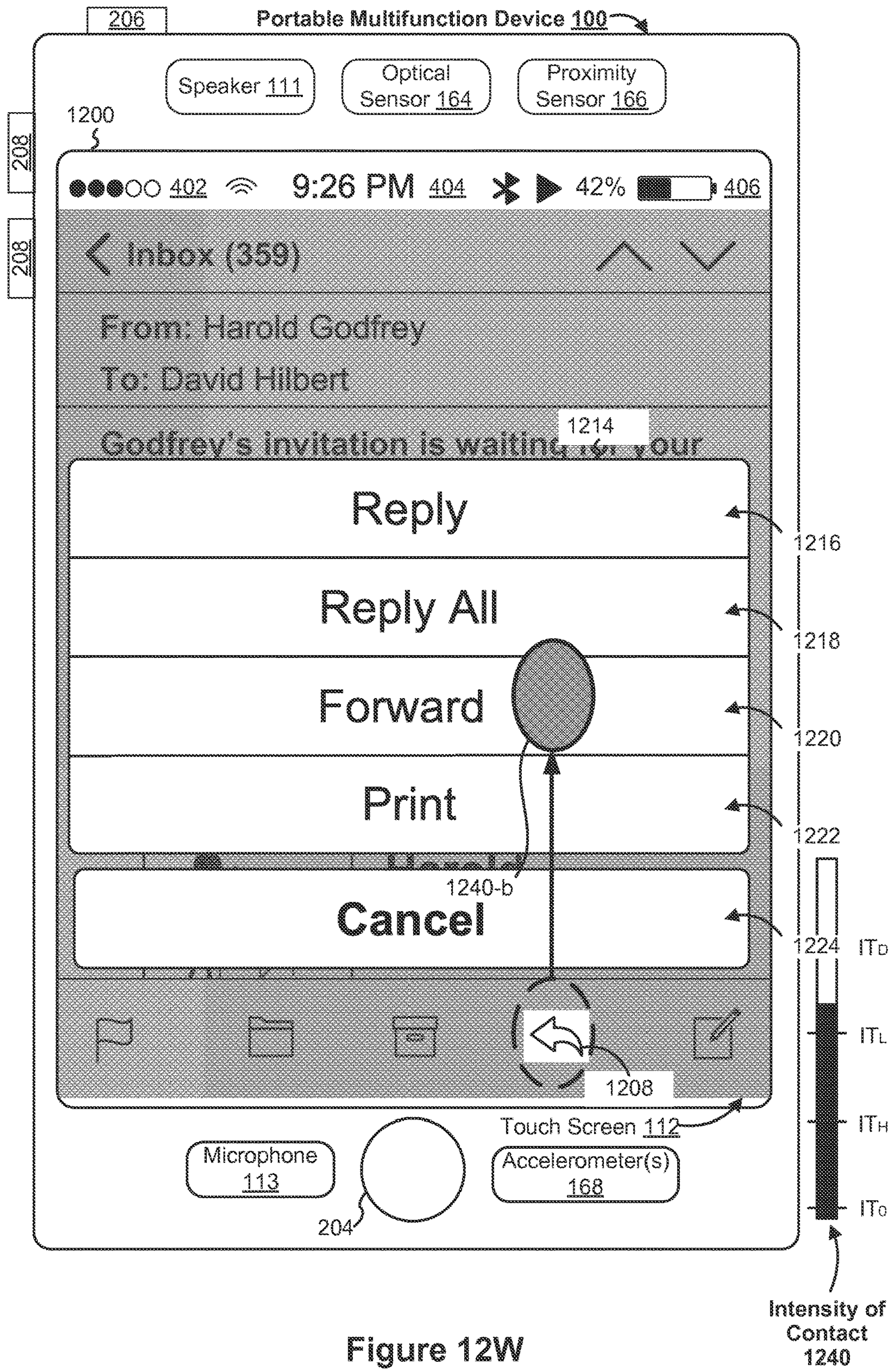
Figure 12X:
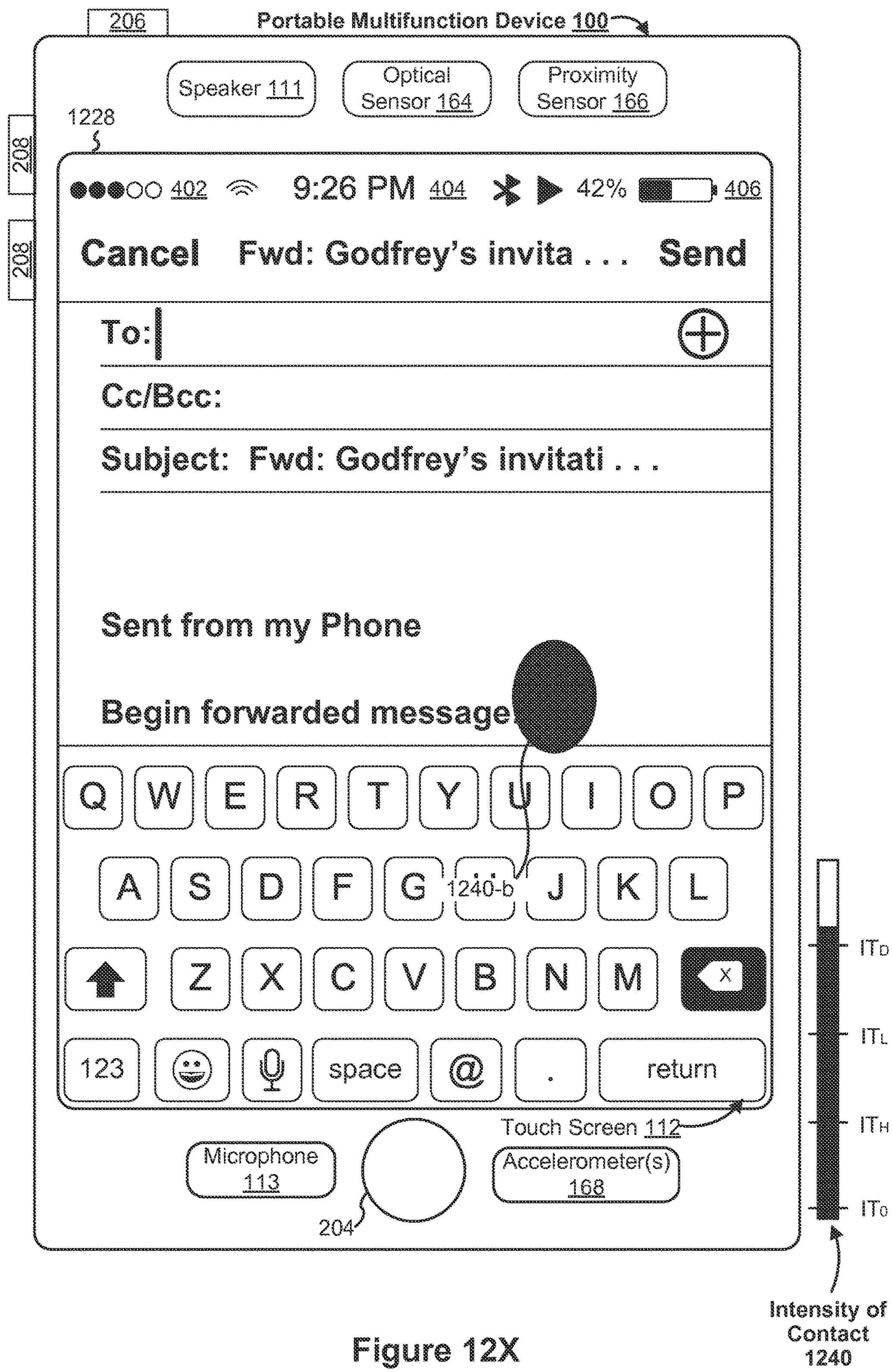

FIGS. 12A-12X illustrate exemplary embodiments of a user interface that allows a user to efficiently interact with (e.g., navigate and perform actions within) an application, in accordance with some embodiments. In some embodiments, this is achieved by allowing the user to perform a first type of input to invoke a direct-selection action associated with a user interface object and a second type of input to access a menu of multiple actions associated with the user interface object. In some embodiments, the device distinguishes between the first type of user input and the second type of user input based on the amount of force applied by the user (e.g., based on the intensity of contacts on a touch-sensitive surface). Although some of the examples which follow will be given with reference to an email messaging application, in some embodiments, the methods are implemented within any number of different applications, as described herein.

The user interfaces in these figures are used to illustrate the processes described below. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 12A-12D, 12F-12L, and 12P-12W illustrate an exemplary user interface 1200 for viewing an email message in an email messaging application on device 100. The user interface displays a plurality of selectable user interface objects, each of which is associated with a plurality of actions for interacting with the email messaging application. For example: user interface object 1202 is associated with various actions for managing the priorities of email messages (e.g., flagging, unflagging, marking as read or unread, and creating notifications), user interface object 1204 is associated with various actions for sorting email messages (e.g., moving an email into one of a plurality of folders), user interface object 1206 is associated with various actions for archiving and deleting email messages, user interface 1208 is associated with various actions for sending email messages (e.g., replying to sender, replying to all, forwarding, and printing), and user interface object 1210 is associated with creating a new message (e.g., to a new contact, to an existing contact, or to a predefined contact).

FIGS. 12A-12E illustrate an embodiment where the user taps on a user interface object to open a menu of actions associated with the object, and then taps on one of the options in the menu to perform an action. FIG. 1200 illustrates exemplary user interface 1228 for viewing and interacting with the content of an email message, including user interface object 1208 associated with actions for sending the email message to another device. The device 100 detects contact 1212 on user interface object 1208 in FIG. 12B, with an intensity below the intensity threshold required to invoke the direct-selection action associated with the user interface object (e.g., $IT_D$). In response to detecting liftoff of contact 1212, without the intensity of the contact reaching the direct-selection action intensity threshold (e.g., $IT_D$), the device displays action menu 1214, with options 1216, 1218, 1220, 1222, and 1224 to reply to the sender of the email message, reply to all recipients of the email message, forward the email message, print the email message, or clear the action menu from user interface 1200, respectively. In response to a light press gesture, including contact 1226 over action option 1220 for forwarding the message in FIG. 12D, the device navigates to a message creation user interface 1228 in FIG. 12E.

FIGS. 12F-12N illustrate an embodiment where the user performs a direct-selection action to reply to the sender of an email by interacting with the same user interface object with greater intensity. The device 100 detects contact 1230 on user interface object 1208 in FIG. 12F, with an intensity below the intensity threshold required to invoke the direct-selection action associated with the user interface object (e.g., $IT_D$). In FIG. 12F, the intensity of contact 1230 increases above a "hint" threshold (e.g., $IT_H$), but remains below the intensity threshold needed to invoke the direct-selection action (e.g., $IT_D$). The device indicates that the user is approaching the intensity needed to perform the direct-selection action by starting to blur other user interface objects (e.g., 1202, 1204, 1206, and 1210) and other content of the email message in FIG. 12G. The device also begins to expand selected user interface object 1208 in response to the increasing intensity of contact 1230. As illustrated in FIG. 12H, the blurring of non-selected content, and increase in size of selected user interface object 1208, are dynamically responsive to increasing intensity of contact 1230 below the direct-selection action intensity threshold (e.g., $IT_D$). FIG. 12H also illustrates that user interface 1208 transforms into hint graphic 1232 resembling action menu 1214 invoked with the tap gesture in FIG. 12C.

In response to the intensity of contact 1230 increasing above a second threshold (e.g., $IT_L$), hint graphic 1232 morphs into action menu 1214, displaying action options 1216, 1218, 1220, 1222, and 1224 in FIG. 12I, which are now active. In response to continuing increase in the intensity of contact 1230 above the second threshold (e.g., $IT_L$), but still below the intensity threshold required to perform the direct-selection action (e.g., $IT_D$), the device indicates that action option 1216 in menu 1214 is the direct-selection action by increasing the size of option 1216, beginning to blur the other action options, and beginning to push the other action options back in a virtual z-space (e.g., simulating that the objects are moving away from touch screen 112).

In response to the intensity of contact 1230 increasing above the direct-selection action intensity threshold (e.g., $IT_D$), the device further highlights action option 1216 in FIG. 12K, indicating that the reply to sender action was selected. The device also continues to blur and push the other action options back in virtual z-space in FIG. 12K. The device then animates the collapse of action menu 1214 towards the original location of selected user interface object 1208 in FIGS. 12L-12N. The non-selected action options appear to fold behind selected action option 1214 as the menu collapses. The device also replaces display of message viewing user interface 1200 with message reply user interface 1234 in FIG. 12M and reverses the blurring applied to the user interface, while animating the collapse of action menu 1214. At the end of the transition animation, user interface 1234, for responding to the sender of the email, is displayed on touch screen 112 in FIG. 12O.

FIGS. 12P-12S illustrate an embodiment where the user calls up, and then clears, an action menu without selecting an action to perform. In response to a tap gesture, including contact 1236 over user interface object 1208 in FIG. 12P, having an intensity below the intensity threshold required to activate the direct-selection action (e.g., $IT_D$), the device displays action menu 1214 and blurs other content in the user interface in FIG. 12Q. In response to a second tap gesture, including contact 1238 at a location on touch screen 112 other than where action menu 1214 is displayed in FIG. 12R, the device removes display of action menu 1234 and restores display of email viewing user interface to the same state as before contact 1236 was detected, in FIG. 12S.

FIGS. 12T-12X illustrate an embodiment where the user activates action menu 1214 and then selects an action other than the direct-selection action, with a single gesture. In FIG. 12T, device 100 detects contact 1240 over user interface object 1208, with an intensity below the intensity threshold required to invoke the direct-selection action associated with the user interface object (e.g., $IT_D$). In response to detecting an increase in the intensity of contact 1240 over intensity threshold $IT_L$, the device displays action menu 1214 and blurs other content displayed in user interface 1200 in FIG. 12U. The device then detects movement of contact 1240 from position 1240-*a* in FIG. 12V to over action option 1220 in FIG. 12W. In response to a further increase in the intensity of contact 1240 above the intensity threshold required to invoke the direct-selection action, while the contact is positioned over action option 1220, the device performs the action associated with action option 1220 (e.g., rather than the direct-selection action) including replacing display of message viewing user interface 1200 with message forwarding user interface 1228 in FIG. 12X.

FIGS. 13A-13C are flow diagrams illustrating a method 1300 of visually obscuring some user interface objects in accordance with some embodiments. The method 1300 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1300 are, optionally, combined and/or the order of some operations is, optionally, changed.

The device displays (1302) a plurality of user interface objects in a first user interface on the display (e.g., a plurality of application launch icons, a plurality of rows in a list, a plurality of email messages, or a plurality of instant messaging conversations). For example, user interface 500 displays application launch icons 480, 426, 428, 482, 432, 434, 436, 438, 440, 442, 444, 446, 484, 430, 486, 488, 416, 418, 420, and 424 in FIGS. 5A-5E. Similarly, user interface 6600 displays email messages 602, 604, 606, and 608 in FIGS. 6A-6E.

The device detects (1304) a contact at a location on the touch-sensitive surface while a focus selector is at a location of a first user interface object, in the plurality of user interface objects, on the display (e.g., contact 502 is detected over messages launch icon 424 in FIG. 5B and contact 610 is detected over email message 602 in FIG. 6B). In some embodiments, the contact is a single contact on the touch-sensitive surface. In some embodiments, the contact is part of a stationary press input. In some embodiments, the contact is part of a press input and the contact moves across the touch-sensitive surface during the press input (e.g., contact 524 moves across touch screen 112 in FIGS. 5V-5W and contact 618 moves across touch screen 112 in FIGS. 6N-6O).

While the focus selector is (1306) at the location of the first user interface object on the display: the device detects an increase in a characteristic intensity of the contact to a first intensity threshold (e.g., a "hint" intensity threshold at which the device starts to display visual hints that pressing on a respective user interface object will provide a preview of another user interface that can be reached by pressing harder on the respective user interface object). In response to detecting the increase in the characteristic intensity of the contact to the first intensity threshold, the device visually obscures (e.g., blur, darken, and/or make less legible) the plurality of user interface objects, other than the first user interface object, in the first user interface while maintaining display of the first user interface object without visually obscuring the first user interface object. For example, device 100 detects an increase in the intensity of contact 502 between FIGS. 5B and 5C. In response, application launch icons other than messages application launch icon 424 are blurred (e.g., Safari launch icon 420 is blurred relative to messages application launch icon 424) in FIG. 5C. Likewise, device 100 detects an increase in the intensity of contact 610 between FIGS. 6B and 6C. In response, email messages other than message 602 are blurred (e.g., message 604 is blurred relative to message 602) in FIG. 6C. In some embodiments, non-selected user interface objects are visually obscured and the selected first user interface object is not visually obscured. In some embodiments, additional objects besides the plurality of user interface objects are displayed (e.g., objects in a status bar) and these additional objects are not visually obscured when the characteristic intensity of the contact increases to or exceeds the first intensity threshold (e.g., status bar objects 402, 404, and 406 are blurred in FIG. 6I, but not in FIG. 6C). In some embodiments, these additional objects are also visually obscured when the characteristic intensity of the contact increases to or exceeds the first intensity threshold.

The device detects that the characteristic intensity of the contact continues to increase above the first intensity threshold. In response to detecting that the characteristic intensity of the contact continues to increase above the first intensity threshold, the device dynamically increases the amount of visual obscuring of the plurality of user interface objects, other than the first user interface object, in the first user interface while maintaining display of the first user interface object without visually obscuring the first user interface object. For example, device 100 detects a further increase in the intensity of contact 502 between FIGS. 5C and 5D. In response, application launch icons other than messages application launch icon 424 are further blurred in FIG. 5D. Likewise, device 100 detects a further increase in the intensity of contact 610 between FIGS. 6C and 6D. In response, email messages other than message 602 are further blurred in FIG. 6D. In some embodiments, the amount of visual obscuring of the plurality of user interface objects, other than the first user interface object, dynamically increases in accordance with the increase in the characteristic intensity of the contact above the first intensity threshold. In some embodiments, the contact is a single continuous contact with the touch-sensitive surface.

In some embodiments, in response to detecting the increase in the characteristic intensity of the contact to the first intensity threshold, the device decreases (1308) a size of the plurality of user interface objects (or obscured representations of the plurality of user interface objects), other than the first user interface object (e.g., without decreasing a size of the first user interface object), in the first user interface (e.g., visually pushing the plurality of user interface objects backward in a virtual z-direction). For example, device 100 detects an increase in the intensity of contact 502 between FIGS. 5B and 5C. In response, application launch icons other than messages application launch icon 424 are pushed back in virtual z-space (e.g., Safari launch icon 420 is displayed smaller than messages application launch icon 424) in FIG. 5C. Likewise, device 100 detects an increase in the intensity of contact 610 between FIGS. 6B and 6C. In response, email messages other than message 602 are pushed back in virtual z-space (e.g., message 604 is displayed smaller than message 602) in FIG. 6C. In some embodiments, the press input on the first user interface object appears to push the other user interface objects backward (in the z-layer direction) on the display, while maintaining the position of the first user interface object on the display.

In some embodiments, the device increases (1310) the size of the first user interface object in the first user interface when the characteristic intensity of the contact meets and/or exceeds the first intensity threshold. In some embodiments, a press input by the contact while the focus selector is on the first user interface object increases the size of the first user interface object (instead of visually pushing the first user interface object backward (in the z-layer direction) on the display) as the characteristic intensity of the contact increases. For example, device 100 detects contact 516 having an intensity above the "hint" threshold in FIG. 5I. In response, the size of messages launch icon 424 is increased relative to the other application launch icons displayed in user interface 500. Likewise, device 100 detects contact 616 having an intensity above the "hint" threshold in FIG. 6I. In response, the size of email message 602 is increased relative to the other email messages in user interface 600.

In some embodiments, in response to detecting that the characteristic intensity of the contact continues to increase above the first intensity threshold, the device dynamically decreases (1312) the size of the plurality of user interface objects, other than the first user interface object, in the first user interface (e.g., visually pushing the plurality of user interface objects further backward in a virtual z-direction). For example, device 100 detects a further increase in the intensity of contact 502 between FIGS. 5C and 5D. In response, application launch icons other than messages application launch icon 424 are pushed further back in virtual z-space in FIG. 5D. Likewise, device 100 detects a further increase in the intensity of contact 610 between FIGS. 6C and 6D. In response, email messages other than message 602 are pushed further back in virtual z-space in FIG. 6D. In some embodiments, the amount of backward pushing of the plurality of user interface objects, other than the first user interface object, dynamically increases in accordance with the increase in the characteristic intensity of the contact above the first intensity threshold. In some embodiments, a press input by the contact while the focus selector is on the first user interface object appears to continuously push the other user interface objects further backward (in the z-layer direction) on the display as the characteristic intensity of the contact increases, while maintaining the position of the first user interface object on the display.

In some embodiments, visually obscuring the plurality of user interface objects includes blurring (1314) the plurality of user interface objects with a blurring effect that has a blur radius; and dynamically increasing the amount of visual obscuring of the plurality of user interface objects includes increasing the blur radius of the blurring effect in accordance with the change in the characteristic intensity of the contact.

In some embodiments, after dynamically increasing the amount of visual obscuring of the plurality of user interface objects, other than the first user interface object, in the first user interface while maintaining display of the first user interface object without visually obscuring the first user interface object and prior to detecting an increase in the characteristic intensity of the contact to a second intensity threshold, the device detects (1316) a decrease in the characteristic intensity of the contact; and, in response to detecting the decrease in the characteristic intensity of the contact, the device dynamically decreases the amount of visual obscuring of the plurality of user interface objects, other than the first user interface object, in the first user interface while maintaining display of the first user interface object without visually obscuring the first user interface object. For example, device 100 detects a decrease in the intensity of contact 518 between FIGS. 5L and 5M. In response, the blurring of application launch icons other than messages application launch icon 424 is reduced in FIG. 5M, relative to the blurring in FIG. 5L. Likewise, device 100 detects a decrease in the intensity of contact 616 between FIGS. 6I and 6J. In response, the blurring of email messages other than message 602 is reduced in FIG. 6J, relative to the blurring in FIG. 6I. In some embodiments, before reaching a second intensity threshold (e.g., a peek threshold), the amount of visual obscuring of the plurality of user interface objects, other than the first user interface object, dynamically decreases in accordance with a decrease in the characteristic intensity of the contact.

In some embodiments, in response to detecting an increase in the characteristic intensity of the contact to a second intensity threshold (e.g., a "peek" intensity threshold at which the device starts to display a preview of another user interface that can be reached by pressing harder on the respective user interface object), greater than the first intensity threshold, the device displays (1318) a preview area overlaid on at least some of the plurality of user interface objects in the first user interface (e.g., a preview area overlaid on representations of the plurality of user interface objects other than the first user interface object that are obscured in accordance with the characteristic intensity of the contact). For example, device 100 detects an increase in the intensity of contact 610 over "peek" threshold (e.g., $IT_L$) between FIGS. 6D and 6E. In response, preview area 612 is displayed over, and partially obscuring, email messages 602, 604, 606, and 608 in FIG. 6E.

In some embodiments, the preview area displays (1320) a preview of a user interface that is displayed in response to detecting a tap gesture on the first user interface object. For example, preview area 612 in FIG. 6E is a preview of the email message user interface that would be displayed in response to tapping on email message 602 (e.g., as illustrated in FIG. 6A).

In some embodiments, while displaying the preview area overlaid on at least some of the plurality of user interface objects in the first user interface, the device detects (1322) a decrease in the characteristic intensity of the contact. In response to detecting the decrease in the characteristic intensity of the contact, the device maintains display of the preview area overlaid on at least some of the plurality of user interface objects in the first user interface until liftoff of the contact is detected. For example, while displaying preview area 612 in FIG. 6AF, the device detects a decrease in the intensity of contact 642 below the initial "peek" intensity threshold (e.g., ITL) between FIGS. 6AF and 6AG. In response, the device maintains display of preview area 612 in FIG. 6AG. The device then detects liftoff of the contact. In response to detecting liftoff of the contact, the device ceases to display the preview area and ceases to visually obscure the plurality of user interface objects. For example, device 100 detects liftoff of contact 642 between FIGS. 6AG and 6AH. In response, the device stops displaying preview area 612 and reverses the blurring of email messages 604, 606, and 608, as illustrated in FIG. 6AH. In some embodiments, after reaching a second intensity threshold (e.g., a peek threshold) and displaying a preview area, the preview area remains overlaid on visually obscured representations of the plurality of user interface objects until liftoff of the contact is detected. In response to detecting liftoff, the preview area ceases to be displayed and the first user interface returns to its original appearance.

In some embodiments, in response to detecting an increase in the characteristic intensity of the contact to a third intensity threshold (e.g., a "pop" intensity threshold at which the device replaces display of the first user interface (with the overlaid preview area) with display of a second user interface), greater than the second intensity threshold, the device replaces (1324) display of the first user interface and the overlaid preview area with display of a second user interface that is distinct from the first user interface (e.g., a second user interface that is also displayed in response to detecting a tap gesture on the first user interface object). For example, while displaying preview area 612 in FIG. 6E, device 100 detects an increase in the intensity of contact 610 above the "pop" intensity threshold (e.g., $IT_D$) between FIGS. 6E and 6F. In response, the device replaces the display of user interface 600 with user interface 614 (e.g., the device navigates to the selected email message in the messaging application) in FIG. 6F.

In some embodiments, in response to detecting an increase in the characteristic intensity of the contact to a second intensity threshold (e.g., an intensity threshold which in some embodiments is the same as the "peek" intensity threshold for displaying previews), greater than the first intensity threshold, the device displays (1326) a menu overlaid on at least some of the plurality of user interface objects in the first user interface. The menu contains activateable menu items associated with the first user interface object. For example, as shown in FIGS. 5A-5AW, when the first user interface object is an application launch icon, the device displays a menu that includes menu items that provide quick access to actions/operations that are performed by the corresponding application, prior to display of the corresponding application on the display or without requiring display of the corresponding application. Exemplary menus are described in FIGS. 5E-5G, 5U-5W, 5Y-5AA, 5AC-5AE, 5AJ, 5AN, 5AQ, 5AT, 5AW, 7K-7N, 7W-7Y, 7AG-7AJ, 9R-9S, 10K-10L, 11G-11I, 11R-11T, 11W-11Y, 11AI-11AK, 11AN-11AP, 12I-12J, and 12U-12W.

It should be understood that the particular order in which the operations in FIGS. 13A-13C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 1300 described above with respect to FIGS. 13A-13C. For brevity, these details are not repeated here.

Figure 14:
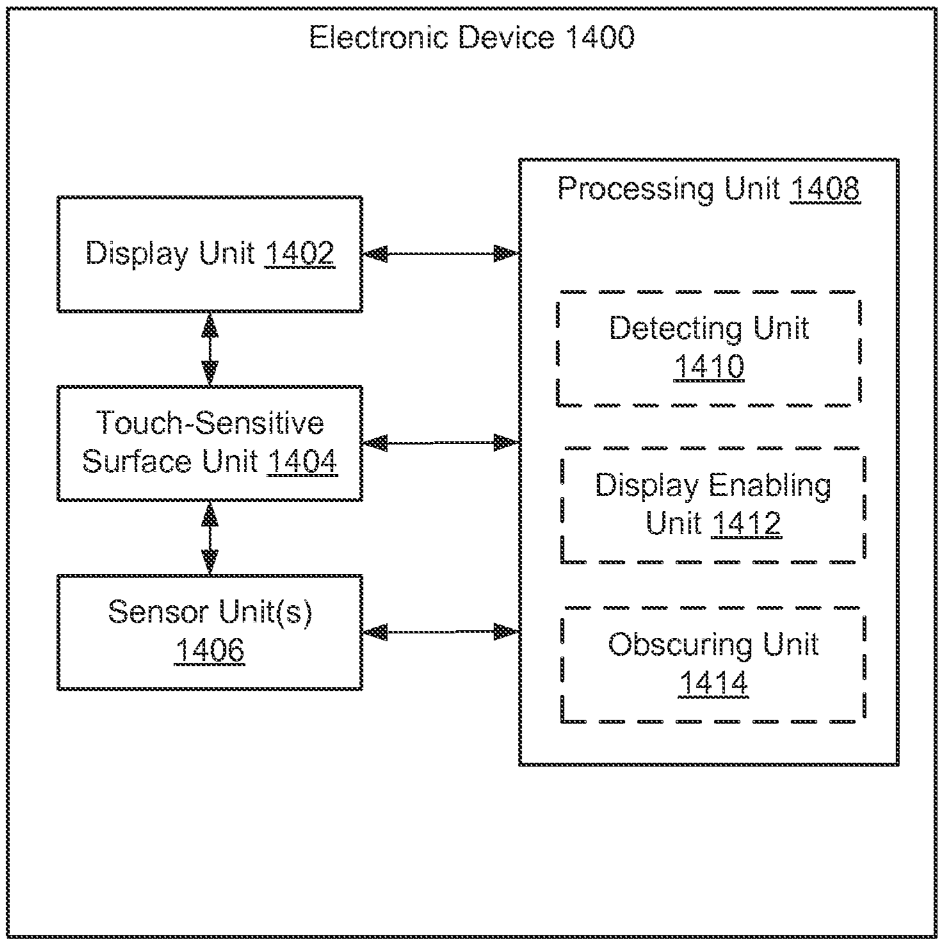
FIG. 14 is a functional block diagram of an electronic device, in accordance with some embodiments.
Figure 15A:
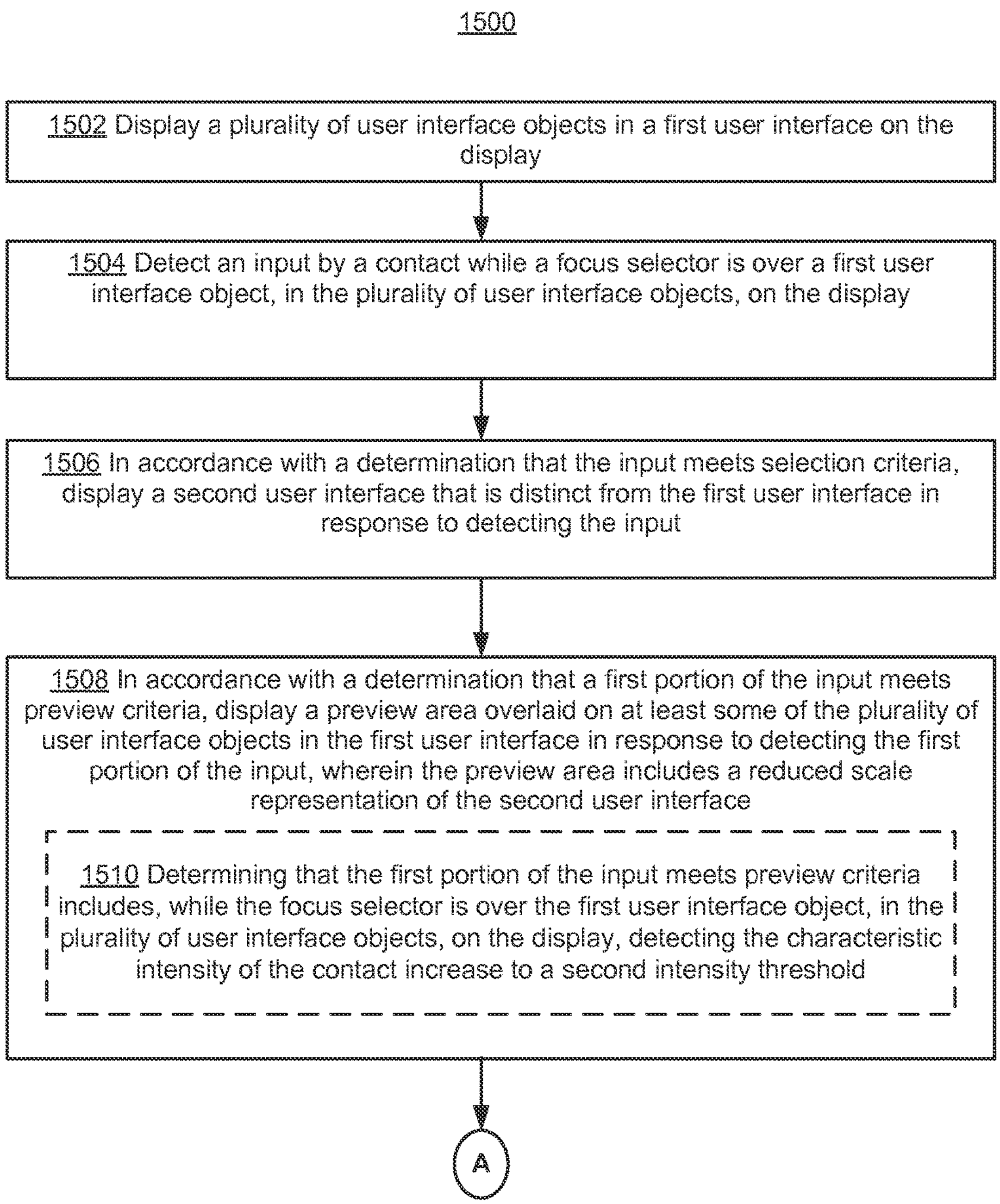

In accordance with some embodiments, FIG. 14 shows a functional block diagram of an electronic device 1400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device includes a display unit 1402 configured to display user interface objects; a touch-sensitive surface unit 1404 configured to receive contacts; one or more sensor units 1406 configured to detect intensity of contacts with the touch-sensitive surface unit 1404; and a processing unit 1408 coupled to the display unit 1402, the touch-sensitive surface unit 1404 and the one or more sensor units 1406. In some embodiments, the processing unit 1408 includes a display enabling unit 1412, a detecting unit 1410, and an obscuring unit 1414. In some embodiments, the processing unit 1408 is configured to: enable display of a plurality of user interface objects in a first user interface on the display unit 1402 (e.g., with display enabling unit 1412); detect a contact at a location on the touch-sensitive surface unit 1404 while a focus selector is at a location of a first user interface object, in the plurality of user interface objects, on the display unit 1402 (e.g., with detecting unit 1410); and, while the focus selector is at the location of the first user interface object on the display unit 1402: detect an increase in a characteristic intensity of the contact to a first intensity threshold (e.g., with detecting unit 1410); in response to detecting the increase in the characteristic intensity of the contact to the first intensity threshold, visually obscure the plurality of user interface objects, other than the first user interface object, in the first user interface while maintaining display of the first user interface object without visually obscuring the first user interface object (e.g., with obscuring unit 1414); detect that the characteristic intensity of the contact continues to increase above the first intensity threshold (e.g., with detecting unit 1410); and, in response to detecting that the characteristic intensity of the contact continues to increase above the first intensity threshold, dynamically increase the amount of visual obscuring of the plurality of user interface objects, other than the first user interface object, in the first user interface while maintaining display of the first user interface object without visually obscuring the first user interface object (e.g., with obscuring unit 1414).

The operations in the information processing methods described above are, optionally implemented by running one or more functional modules in information processing apparatus such as general purpose processors (e.g., as described above with respect to FIGS. 1A and 3) or application specific chips.

FIGS. 15A-15G are flow diagrams illustrating a method 1500 of navigating between a first user interface and a second user interface in accordance with some embodiments. The method 1500 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1500 are, optionally, combined and/or the order of some operations is, optionally, changed.

The device displays (1502) a plurality of user interface objects in a first user interface on the display (e.g., a plurality of application launch icons, a plurality of rows in a list, a plurality of email messages, or a plurality of instant messaging conversations). For example, user interface 600 displays email messages 602, 604, 606, and 608 in FIGS. 6A-6E.

The device detects (1504) an input by a contact while a focus selector is over a first user interface object, in the plurality of user interface objects, on the display (e.g., contacts 610, 616, 618, 630, 638, 642, 644, and 646 over partial view of email message 602 in FIGS. 6B, 6H, 6L, 6Q, 6X, 6AD, 6AI, and 6AN, respectively). In some embodiments, the input is made by a single contact on the touch-sensitive surface. In some embodiments, the input is a stationary input. In some embodiments, the contact in the input moves across the touch-sensitive surface during the input (e.g., contact 618 moves across touch screen 112 in FIGS. 6N-6O).

In accordance with a determination that the input meets selection criteria (e.g., the selection criteria are satisfied when the input is a tap gesture), the device displays (1506) a second user interface that is distinct from the first user interface in response to detecting the input (e.g., where contact 610 is terminated at an intensity below $IT_H$ in FIG. 6B, the device replaces display of user interface 600 with display of user interface 614, as illustrated in FIG. 6G). In some embodiments, the second user interface replaces the first user interface on the display.

In accordance with a determination that a first portion of the input meets preview criteria (e.g., the input is a press input with a characteristic intensity in the first portion of the input that meets preview criteria, such as a characteristic intensity that meets a "peek" intensity threshold), the device displays (1508) a preview area overlaid on at least some of the plurality of user interface objects in the first user interface in response to detecting the first portion of the input, wherein the preview area includes a reduced scale representation of the second user interface. For example, in response to detecting an increase in the intensity of contact 610 above threshold $IT_L$, device 100 displays preview area 612 in FIG. 6E. In some embodiments, a response to an input may start before the entire input ends.

In some embodiments, determining that the first portion of the input meets preview criteria includes, while the focus selector is over the first user interface object, in the plurality of user interface objects, on the display, detecting (1510) the characteristic intensity of the contact increase to a second intensity threshold (e.g., a "peek" intensity threshold at which the device starts to display a preview of another user interface that can be reached by pressing harder on the respective user interface object, such as $IT_L$ illustrated in FIG. 6E).

In accordance with a determination that a second portion of the input by the contact, detected after the first portion of the input, meets user-interface-replacement criteria, the device replaces (1512) display of the first user interface and the overlaid preview area with display of the second user interface. For example, in response to detecting an increase in the intensity of contact 610 above threshold $IT_D$, device 100 navigates to user interface 614 in FIG. 6F.

In some embodiments, the user-interface-replacement criteria include (1514) a requirement that the characteristic intensity of the contact increases to a third intensity threshold, greater than a second intensity threshold, during the second portion of the input (e.g., a "pop" intensity threshold, greater than a "peek" intensity threshold, at which the device replaces display of the first user interface (with the overlaid preview area) with display of a second user interface, such as $IT_D$ illustrated as a greater intensity than $IT_L$ in FIG. 6F).

In some embodiments, the user-interface-replacement criteria include (1516) a requirement that the characteristic intensity of the contact, during the second portion of the input, decreases below a second intensity threshold and then increases again to at least the second intensity threshold. For example, in FIGS. 6AI-6AM, device 100 displays preview area 612 in response to the intensity of contact 644 increasing above threshold $IT_L$ a first time, in FIG. 6AK. After the intensity of contact 644 drops below threshold $IT_L$, in FIG. 6AL, device 100 navigates to user interface 614 in response to the intensity of contact 644 increasing above threshold $IT_L$ a second time, in FIG. 6AM. In some embodiments, repeated presses by the contact that meet or exceed the second intensity threshold satisfy the user-interface-replacement criteria. In some embodiments, repeated presses by the contact within a predetermined time period that meet or exceed the second intensity threshold satisfy the user-interface-replacement criteria.

In some embodiments, the user-interface-replacement criteria include (1518) a requirement that the characteristic intensity of the contact increase at or above a predetermined rate during the second portion of the input. In some embodiments, a quick press (e.g., a jab) by the contact that increases the characteristic intensity of the contact at or above a predetermined rate satisfies the user-interface-replacement criteria. In some embodiments, user-interface-replacement criteria are satisfied by increasing the characteristic intensity of the contact above a third "pop" intensity threshold, by repeated presses by the contact that meet or exceed a second "peek" intensity threshold, or by a quick press (e.g., a jab) by the contact that that increases the characteristic intensity of the contact at or above a predetermined rate.

In some embodiments, the user-interface-replacement criteria include (1520) a requirement that an increase in the characteristic intensity of the contact during the second portion of the input is not accompanied by a movement of the contact. In some embodiments, movement of the focus selector in any direction across the preview disables responses to an increase in contact intensity above the "pop" intensity threshold that may occur during the movement of the contact. For example, after sliding contact 638, and preview area 612, to the left in FIGS. 6Z-6AA, the device does not navigate to the associated email when the intensity of contact 638 increases above user-interface-replacement threshold (e.g., $IT_D$) in FIG. 6AB, because the action has been disabled.

In accordance with a determination that the second portion of the input by the contact meets preview-area-disappearance criteria, the device ceases (1522) to display the preview area and displays the first user interface after the input ends. (e.g., by liftoff of the contact) In some embodiments, in response to detecting liftoff, the preview area ceases to be displayed and the first user interface returns to its original appearance when preview-area-disappearance criteria are met. For example, after displaying preview area 612 in FIGS. 6AE-6AG, the user lift contact 642 off of touch screen 112 without reaching a user-interface-replacement threshold intensity (e.g., $IT_D$). In response, device 100 restores the appearance of user interface 600 in FIG. 6AH to the same state as before contact 642 was first detected.

In some embodiments, the preview-area-disappearance criteria include (1524) a requirement that no action icons are displayed in the preview area during the second portion of the input. In some embodiments, the preview area ceases to be displayed after the input ends if there no buttons or other icons displayed in the preview area that are responsive to user inputs. For example, device 100 restores the appearance of user interface 600 in FIG. 6AH to the same state as before contact 642 was first detected because the user input did not reveal an action icon (e.g., such as icons 624, 626, and 628, as illustrated in FIG. 6P).

In some embodiments, the preview-area-disappearance criteria include (1526) a requirement that the user-interface-replacement criteria are not satisfied and a requirement that the preview-area-maintenance criteria are not satisfied. For example, device 100 restores the appearance of user interface 600 in FIG. 6AH to the same state as before contact 642 was first detected because the contact did not obtain a user-interface-replacement threshold intensity (e.g., $IT_D$) or reveal an action icon (e.g., such as icons 624, 626, and 628, as illustrated in FIG. 6P).

In some embodiments, in accordance with a determination that the second portion of the input by the contact meets preview-area-maintenance criteria, the device maintains (1528) display of the preview area overlaid on at least some of the plurality of user interface objects in the first user interface, after the input ends (e.g., by liftoff of the contact after swiping up to reveal additional options for interacting with the preview area, or the equivalent of liftoff of the contact). In some embodiments, in response to detecting liftoff, the preview area remains displayed over the first user interface when preview-area-maintenance criteria are met. For example, because action icons 624, 626, and 628 were revealed in FIG. 6O, the device maintains display of preview area 612 after the user lifts contact 618 off of touch screen 112, in FIG. 6P.

In some embodiments, the preview-area-maintenance criteria include (1530) a requirement that the second portion of the input include movement of the contact across the touch-sensitive surface that moves the focus selector in a predefined direction on the display. For example, device 100 maintains display of preview area 612 after liftoff of contact 618 in FIG. 6P because the user input included movement 620 of contact 618 upward on touch screen 112 in FIGS. 6N-6O. In contrast, device 100 does not maintain display of preview area 612 after liftoff of contact 638 in FIG. 6AC because the user input included movement 640 of contact 638 leftward on touch screen 112 in FIGS. 6Z-6AB. In some embodiments, a swipe or drag gesture by the contact that moves the focus selector upward during the second portion of the input satisfies the preview-area-maintenance criteria. For example, an upward drag gesture by the contact scrolls content in the preview area (optionally, at least partially off of the display) and reveals buttons or other icons that are responsive to user inputs. In some embodiments, a swipe or drag gesture by the contact that moves the focus selector leftward (or rightward) during the second portion of the input satisfies the preview-area-maintenance criteria. For example, a leftward drag gesture by the contact while the preview area displays a list of emails reveals a list of possible actions and satisfies the preview-area-maintenance criteria.

In some embodiments, the preview-area-maintenance criteria include (1532) a requirement that action icons are displayed in the preview area during the second portion of the input. For example, because action icons 624, 626, and 628 were revealed in FIG. 6O, the device maintains display of preview area 612 after the user lifts contact 618 off of touch screen 112, in FIG. 6P. In some embodiments, the preview area is maintained after the input ends if there are buttons and/or other icons displayed in the preview area that are responsive to user inputs. In some embodiments, preview-area-maintenance criteria are satisfied by the second portion of the input including movement of the contact across the touch-sensitive surface that moves the focus selector in a predefined direction on the display or by displaying action icons in the preview area during the second portion of the input.

In some embodiments, in accordance with a determination that the first portion of the input meets hint criteria prior to meeting the preview criteria (e.g., the input is a press input with a characteristic intensity in the first portion of the input that meets hint criteria, such as a characteristic intensity that meets a "hint" intensity threshold, prior to meeting preview criteria, such as a characteristic intensity that meets a "peek" intensity threshold), the device visually obscures (1534) (e.g., blurs, darkens, and/or makes less legible) the plurality of user interface objects other than the first user interface object in the first user interface. For example, device 100 detects an increase in the intensity of contact 610 between FIGS. 6B and 6C. In response, email messages other than message 602 are blurred (e.g., message 604 is blurred relative to message 602) in FIG. 6C. In some embodiments, non-selected user interface objects are visually obscured and the selected first user interface object is not visually obscured. In some embodiments, additional objects besides the plurality of user interface objects are displayed (e.g., objects in a status bar) and these additional objects are not visually obscured when the characteristic intensity of the contact increases to or exceeds the first intensity threshold (e.g., status bar objects 402, 404, and 406 are blurred in FIG. 6I, but not in FIG. 6C). In some embodiments, these additional objects are also visually obscured when the characteristic intensity of the contact increases to or exceeds the first intensity threshold.

In some embodiments, displaying the preview area overlaid on at least some of the plurality of user interface objects in the first user interface in response to detecting the first portion of the input includes displaying (1536) an animation in which the plurality of user interface objects other than the first user interface object in the first user interface are further obscured. For example, device 100 detects a further increase in the intensity of contact 610 between FIGS. 6C and 6D. In response, email messages other than message 602 are further blurred in FIG. 6D. In some embodiments, the obscuring of the plurality of user interface objects is part of a continuous animation that is dynamically driven in accordance with the characteristic intensity of the contact after the first input meets the hint criteria and before the first input meets the preview criteria and is a canned animation that transitions from displaying the visually obscured user interface objects to displaying the preview area over a predetermined amount of time.

In some embodiments, determining that the first portion of the input meets hint criteria includes, while the focus selector is over the first user interface object, in the plurality of user interface objects, on the display, detecting (1538) the characteristic intensity of the contact increase to a first intensity threshold (e.g., a "hint" intensity threshold at which the device starts to display visual hints that pressing on a respective user interface object will provide a preview of another user interface that can be reached by pressing harder on the respective user interface object). For example, device 100 detects an increase in the intensity of contact 610 between FIGS. 6B and 6C. In response, email messages other than message 602 are pushed back in virtual z-space (e.g., message 604 is displayed smaller than message 602), highlighting message 602 in FIG. 6C.

In some embodiments, while detecting the first portion of the input and displaying the preview area, the device detects (1540) the characteristic intensity of the contact changing over time (e.g., increasing above a second intensity threshold (a "peek" intensity threshold)). In response to detecting the characteristic intensity of the contact changing over time (e.g., increasing above the second intensity threshold), the device dynamically changes the size of the preview area in accordance with changes in the characteristic intensity of the contact. For example, device 100 detects an increase in the intensity of contact 610, above peek intensity threshold $IT_L$, between FIGS. 6AE and 6AF. In response, preview area 612 increases in size (e.g., dynamically) in FIG. 6AF. In some embodiments, the size of the preview area (and, optionally, the magnification of the content within the preview area) dynamically increases in accordance with the increase in the characteristic intensity of the contact (e.g., while above the second intensity threshold).

In some embodiments, the size of the preview area (and, optionally, the magnification of the content within the preview area) dynamically increases in accordance with the increase in the characteristic intensity of the contact above the second intensity threshold until the size of the preview area reaches a predefined maximum size (e.g., 80, 85, 90, 92, or 95% of the size of the first user interface). In some embodiments, the size of the preview area (and, optionally, the magnification of the content within the preview area) dynamically decreases in accordance with the increase in the characteristic intensity of the contact (e.g., while above the second intensity threshold). In some embodiments, the size of the preview area dynamically decreases in accordance with the decrease in the characteristic intensity of the contact until the size of the preview area reaches a predefined minimum size (e.g., 70, 75, 80, 85, 90% of the size of the first user interface). In some embodiments, the preview area is displayed at a predefined size (e.g., 80, 85, 90, 92, or 95% of the size of the first user interface) in response to detecting the characteristic intensity of the contact increase to the second intensity threshold.

In some embodiments, in accordance with a determination that the second portion of the input by the contact includes movement of the contact across the touch-sensitive surface, the device moves (1542) the preview area in accordance with the movement of the contact (e.g., slides the preview in a direction determined based on a direction of movement of the contact on the touch-sensitive surface and optionally revealing one or more actions associated with the preview that include selectable options or swipe options). For example, device 100 detects movement of contacts 618, 630, and 646 up, left, and right on touch screen 112 in FIGS. 6N, 6S, and 6AP, respectively. In response, device 100 moves display of preview area 612 up, left, and right on touch screen 112 in FIGS. 6O, 6T, and 6AQ, respectively.

In some embodiments, in accordance with a determination that the second portion of the input by the contact includes movement of the contact across the touch-sensitive surface, the device moves (1544) the focus selector in accordance with the movement of the contact (e.g., the movement of the focus selector is an upward movement across the displayed preview); and displays one or more action items (e.g., displays a menu of actions that includes multiple action items, such as menu 622 including action items 624, 626, and 628 in FIG. 6O, or displays a single action item, such as action items 634 and 650 in FIGS. 6T and 6Q, respectively) that are associated with the first user interface object. In some embodiments, the one or more action items are included in a menu of actions (e.g., an action platter, such as menu 622 in FIG. 6O), and each action item in the menu of actions is individually selectable and triggers performance of a corresponding action upon selection (e.g., action item 624 triggers a response to the previewed email, action item 626 triggers a forward of the previewed email, and action item 628 triggers archival of the previewed email). In some embodiments, performance of a corresponding action is triggered by detecting lift off of the contact while the focus selector is over the action item (e.g., similar to the slide and liftoff of contact 524 over quick-action menu 528 in FIGS. 5V-5X). In some embodiments, performance of a corresponding action is triggered by detecting a press input (e.g., a deep press input) by the contact while the focus selector is over the action item (e.g., similar to the slide and deep press of contact 1154 over quick action menu 1158 in FIG. 11AP). In some embodiments, performance of a corresponding action is triggered by detecting a tap gesture by another contact while the focus selector is over the action item (e.g., similar to tap 514 on quick action menu 504 in FIG. 5G). In some embodiments, an upward movement of the focus selector causes the preview area to move up on the display to make room for the menu of actions (e.g., as in FIGS. 6N-6O). In some embodiments, a sideways movement (e.g., toward the left or the right side of the display) causes the preview to move left or right, and one or more action items (e.g., as represented by corresponding action icons) are revealed from behind the preview area (e.g., as in FIGS. 6S-6U and 6AP-6AR).

In some embodiments, the device provides (1546) (e.g., generates or outputs with one or more tactile output generators of the device) a tactile output (e.g., a second tactile output such as a click) indicative of display of the one or more action items, wherein the tactile output indicative of display of the one or more action items is different from the first tactile output indicative of displaying the preview area (e.g., tactile feedback 623 in FIG. 6O is distinguishable from tactile feedback 611 in FIG. 6E and tactile feedback 615 in FIG. 6F) and the tactile output indicative of display of the one or more action items is provided in conjunction with displaying the one or more action items (e.g., an action platter or a single action item) associated with the first user interface object.

In some embodiments, while the preview area is displayed on the display and the one or more action items are not displayed, the device displays (1548) an indicator indicating that the one or more action items associated with the first user interface object are hidden (e.g., displays a caret at the top of the preview area, or at the top of the first user interface, e.g., caret 619 in FIG. 6M).

In some embodiments, the indicator is (1550) configured to represent a direction of movement of a focus selector that triggers display of the one or more action items associated with the first user interface object. For example, a caret at the top of the preview area or at the top of the first user interface indicates that a swipe by the contact that move the focus selector upward will trigger the display of a menu of actions associated with the first user interface object (e.g., caret 619 in FIG. 6M indicates that action menu 622 can be revealed by swiping up on touch screen 112, as illustrated in FIG. 6O). In some embodiments, if the menu of actions is triggered by a swipe to one or both sides (e.g., left or right) of a preview area, an indicator is displayed on that side or sides of the preview area.

In some embodiments, the movement of the contact across the touch-sensitive surface causes (1552) a movement of the focus selector on the display in a first direction (e.g., the first direction is approximately horizontal from left to right, or from right to left); and displaying the one or more action items that are associated with the first user interface object include shifting the preview area in the first direction on the display; and revealing the one or more action items (e.g., from behind the supplemental information or from an edge of the display) as the preview area is shifted in the first direction. For example, device 100 detects movement of contacts 630 and 646 to the left and right on touch screen 112 in FIGS. 6S and 6AP, respectively. In response, device 100 moves display of preview area 612 to the left and right on touch screen 112 in FIGS. 6T and 6AQ, revealing action icons 634 and 650, respectively.

In some embodiments, after revealing the one or more action items the device continues (1554) to shift the preview area in the first direction on the display in accordance with the movement of the contact (e.g., while maintaining a position of the one or more action items on the display). For example, movement of contact 630 from position 630-*c* to 630-*d*, and then 630-*e*, in FIGS. 6T-6V.

In some embodiments, displaying the one or more action items associated with the first user interface object includes displaying (1556) a first action item associated with the first user interface object. While displaying the first action item associated with the first user interface object, the device detects that the movement of the contact causes the focus selector to move at least a first threshold amount on the display before detecting lift-off of the contact (e.g., movement of contact 630 from position 630-*a* to 630-*d* in FIGS. 6S-6V). For example, the preview area is dragged along by the focus selector on the user interface by at least the same threshold amount (e.g., an amount that causes the icon of the first action item to be displayed at the center of the space between the edge of the user interface and the edge of the preview area). In response to detecting that the movement of the contact causes the focus selector to move at least the first threshold amount on the display, the device changes a visual appearance (e.g., inverting the color) of the first action item and detects lift-off of the contact after changing the visual appearance of the first action item (e.g., action icon 634 changes color upon contact 630 dragging preview area 612 from location 612-*d* to 612-*e* in FIGS. 6T-6U). In response to detecting the lift-off of the contact, the device ceases to display the first action item, and performs a first action represented by the first action item (e.g., in response to lift off of contact 630, the device deletes message 602 from user interface 600 in FIG. 6W).

In some embodiments, in accordance with a determination that the first portion of the input meets preview criteria, the device provides (1558) (e.g., generates or outputs with one or more tactile output generators of the device) a tactile output (e.g., a first tactile output such as a buzz or tap) indicative of display of the one or more action items in conjunction with displaying the preview area (e.g., tactile feedback 61 in FIG. 6E).

In some embodiments, in accordance with a determination that the second portion of the input by the contact, detected after the first portion of the input, meets user-interface-replacement criteria, the device provides (1560) a tactile output (e.g., second tactile output such as a buzz or tap) indicative of replacement of the first user interface, wherein the tactile output is provided in conjunction with replacing display of the first user interface and the overlaid preview area with display of the second user interface (e.g., tactile feedback 615 in FIG. 6F). In some embodiments, the tactile output indicative of display replacement of the first user interface is different from the first tactile output indicative of displaying the preview area (e.g., tactile feedback 615 in FIG. 6F is distinguishable from tactile feedback 611 in FIG. 6E). In some embodiments, the tactile output indicative of display replacement of the first user interface is the same as the first tactile output indicative of displaying the preview area (e.g., tactile feedback 615 in FIG. 6F is the same as tactile feedback 611 in FIG. 6E).

In some embodiments the first tactile output is different from the second tactile output based on differences in amplitudes of the tactile outputs. In some embodiments, the first type of tactile output is generated by movement of the touch-sensitive surface that includes a first dominant movement component. For example, the generated movement corresponds to an initial impulse of the first tactile output, ignoring any unintended resonance. In some embodiments, the second type of tactile output is generated by movement of the touch-sensitive surface that includes a second dominant movement component. For example, the generated movement corresponds to an initial impulse of the second tactile output, ignoring any unintended resonance. In some embodiments, the first dominant movement component and the second dominant movement component have a same movement profile and different amplitudes. For example, the first dominant movement component and the second dominant movement component have the same movement profile when the first dominant movement component and the second dominant movement component have a same waveform shape, such as square, sine, sawtooth or triangle, and approximately the same period.

In some embodiments the first tactile output is different from the second tactile output based on differences in movement profiles of the tactile outputs. In some embodiments, the first type of tactile output is generated by movement of the touch-sensitive surface that includes a first dominant movement component. For example, the generated movement corresponds to an initial impulse of the first tactile output, ignoring any unintended resonance. In some embodiments, the second type of tactile output is generated by movement of the touch-sensitive surface that includes a second dominant movement component. For example, the generated movement corresponds to an initial impulse of the second tactile output, ignoring any unintended resonance. In some embodiments, the first dominant movement component and the second dominant movement component have different movement profiles and a same amplitude. For example, the first dominant movement component and the second dominant movement component have different movement profiles when the first dominant movement component and the second dominant movement component have a different waveform shape, such as square, sine, sawtooth or triangle, and/or approximately the same period.

In some embodiments, in accordance with a determination that the second portion of the input by the contact includes movement of the contact across the touch-sensitive surface that moves the focus selector in a respective direction and that meets a respective movement threshold (e.g., a distance and/or speed threshold), the device performs (1562) an operation associated with movement in the respective direction (e.g., the action that is revealed when the preview area is moved to the left or right) in response to detecting the end of the input. For example, in response to moving contact 632 past a movement threshold, as indicated by the change in color of action icon 634 in FIG. 6V, the device deletes message 602 from user interface 600 in FIG. 6W. In some embodiments, the action that is performed is the same as the action that is performed when the preview area is not present (because the input did not meet the preview criteria). For example, a left swipe over partial view of message 602 in FIG. 6Q would delete the message from user interface 600 as does the user input in FIGS. 6S-6W.

In some embodiments, in accordance with a determination that the second portion of the input by the contact includes movement of the contact across the touch-sensitive surface that moves the focus selector in the respective direction and that does not meet the respective movement threshold (e.g., a distance and/or speed threshold), the device foregoes performing the operation associated with movement in the respective direction in response to detecting the end of the input. For example, because contact 638 does not move past a movement threshold in FIGS. 6A-6AB, as indicated by no change to the color of action icon 634, email 602 is not deleted from mail inbox user interface 600 upon liftoff of the contact in FIG. 6AC.

In some embodiments, movement of the focus selector in a first direction is (1564) associated with a first action and movement of the focus selector in a second direction is associated with a second action (e.g., movement to the left reveals the "delete" icon in FIG. 6T for deleting the content associated with the respective user interface object (e.g., an email message), while movement to the right reveals a "flag" icon in FIG. 6AQ for marking the content associated with the respective user interface object (e.g., an email message)).

In some embodiments, movement of the focus selector in the first direction is (1566) associated with a first threshold and movement of the focus selector in the second direction is associated with a second threshold that is higher than the first threshold (e.g., because the second action associated with movement in the second direction is destructive such as deleting a message, while the first action associated with movement in the first direction is non-destructive such as flagging a message as read or unread). For example, contact 632 must move farther to the left to delete message 602 from user interface 600 in FIGS. 6Q-6W than contact 646 must move to the right to flag message 602 in user interface 600 in FIGS. 6AN-6AS.

It should be understood that the particular order in which the operations in FIGS. 15A-15G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 1500 described above with respect to FIGS. 15A-15G. For brevity, these details are not repeated here.

In accordance with some embodiments, a method is performed at an electronic device with a touch-sensitive surface and a display. The device includes one or more sensors to detect intensity of contacts with the touch-sensitive surface. The device displays a plurality of user interface objects in a first user interface on the display. The device detects a first portion of a press input by a contact at a location on the touch-sensitive surface that corresponds to a location of a first user interface object, in the plurality of user interface objects, on the display. While detecting the first portion of the press input by the contact at the location on the touch-sensitive surface that corresponds to the location of the first user interface object, in the plurality of user interface objects, on the display, the device selects the first user interface object and detects the intensity of the contact increase to a second intensity threshold. In response to detecting the intensity of the contact increase to the second intensity threshold, the device displays in the first user interface a preview area overlaid on at least some of the plurality of user interface objects. After detecting the first portion of the press input, the device detects a second portion of the press input by the contact. In response to detecting the second portion of the press input by the contact, in accordance with a determination that the second portion of the press input by the contact meets user-interface-replacement criteria, the device replaces display of the first user interface with a second user interface that is distinct from the first user interface. In accordance with a determination that the second portion of the press input by the contact meets preview-area-maintenance criteria, the device maintains display, after the press input ends, of the preview area overlaid on at least some of the plurality of user interface objects in the first user interface. In accordance with a determination that the second portion of the press input by the contact meets preview-area-disappearance criteria, the device ceases to display to the preview area and maintains display, after the press input ends, of the first user interface.

As noted just above, in some embodiments, the device displays a plurality of user interface objects in a first user interface on the display (e.g., a plurality of application launch icons, a plurality of rows in a list, a plurality of email messages, or a plurality of instant messaging conversations).

The device detects a first portion of a press input by a contact at a location on the touch-sensitive surface that corresponds to a location of a first user interface object, in the plurality of user interface objects, on the display. In some embodiments, the press input is made by a single contact on the touch-sensitive surface. In some embodiments, the press input is a stationary input. In some embodiments, the contact in the press input moves across the touch-sensitive surface during the press input.

While detecting the first portion of the press input by the contact at the location on the touch-sensitive surface that corresponds to the location of the first user interface object, in the plurality of user interface objects, on the display, the device selects the first user interface object. In some embodiments, a focus selector is placed over the first user interface object.

The device detects the intensity of the contact increase to a second intensity threshold (e.g., a "peek" intensity threshold at which the device starts to display a preview of another user interface that can be reached by pressing harder on the respective user interface object).

In response to detecting the intensity of the contact increase to the second intensity threshold, the device displays in the first user interface a preview area overlaid on at least some of the plurality of user interface objects, wherein the preview area is associated with the first user interface object.

After detecting the first portion of the press input, the device detects a second portion of the press input by the contact.

In response to detecting the second portion of the press input by the contact, in accordance with a determination that the second portion of the press input by the contact meets user-interface-replacement criteria, the device replaces display of the first user interface with a second user interface that is distinct from the first user interface.

In accordance with a determination that the second portion of the press input by the contact meets preview-area-maintenance criteria, the device maintains display, after the press input ends (e.g., by liftoff of the contact), of the preview area overlaid on at least some of the plurality of user interface objects in the first user interface.

In accordance with a determination that the second portion of the press input by the contact meets preview-area-disappearance criteria, the device ceases to display to the preview area and maintains display, after the press input ends (e.g., by liftoff of the contact), of the first user interface.

In some embodiments, the preview area includes a reduced scale representation of the second user interface. In some embodiments, the second user interface is a user interface that is also displayed in response to detecting a tap gesture on the first user interface object, instead of the press input by the contact.

In some embodiments, while detecting the first portion of the press input by the contact at the location on the touch-sensitive surface that corresponds to the location of the first user interface object on the display, prior to detecting the intensity of the contact increase to the second intensity threshold, the device detects the intensity of the contact increase to a first intensity threshold (e.g., a "hint" intensity threshold at which the device starts to display visual hints that pressing on a respective user interface object will provide a preview of another user interface that can be reached by pressing harder on the respective user interface object). In some embodiments, in response to detecting the intensity of the contact increases to the first intensity threshold, the device visually obscures (e.g., blurs, darkens, and/or makes less legible) the plurality of user interface objects other than the first user interface object in the first user interface. In some embodiments, non-selected user interface objects are visually obscured and the selected first user interface object is not visually obscured. In some embodiments, additional objects besides the plurality of user interface objects are displayed (e.g., objects in a status bar or navigation icons within the user interface) and these additional objects are not visually obscured when the intensity of the contact increases to or exceeds the first intensity threshold. In some embodiments, these additional objects are also visually obscured when the intensity of the contact increases to or exceeds the first intensity threshold.

In some embodiments, while detecting the first portion of the press input by the contact at the location on the touch-sensitive surface that corresponds to the location of the first user interface object on the display, the device detects that the intensity of the contact continues to increase above the second intensity threshold. In some embodiments, in response to detecting that the intensity of the contact continues to increase above the second intensity threshold, the device dynamically increases the size of the preview area. In some embodiments, the size of the preview area dynamically increases in accordance with the increase in the intensity of the contact above the second intensity threshold. In some embodiments, the size of the preview area dynamically increases in accordance with the increase in the intensity of the contact above the second intensity threshold until the size of the preview area reaches a predefined maximum size (e.g., 80, 85, 90, 92, or 95% of the size of the first user interface). In some embodiments, preview area is displayed at a predefined size (e.g., 80, 85, 90, 92, or 95% of the size of the first user interface) in response to detecting the intensity of the contact increase to the second intensity threshold.

Figure 16:
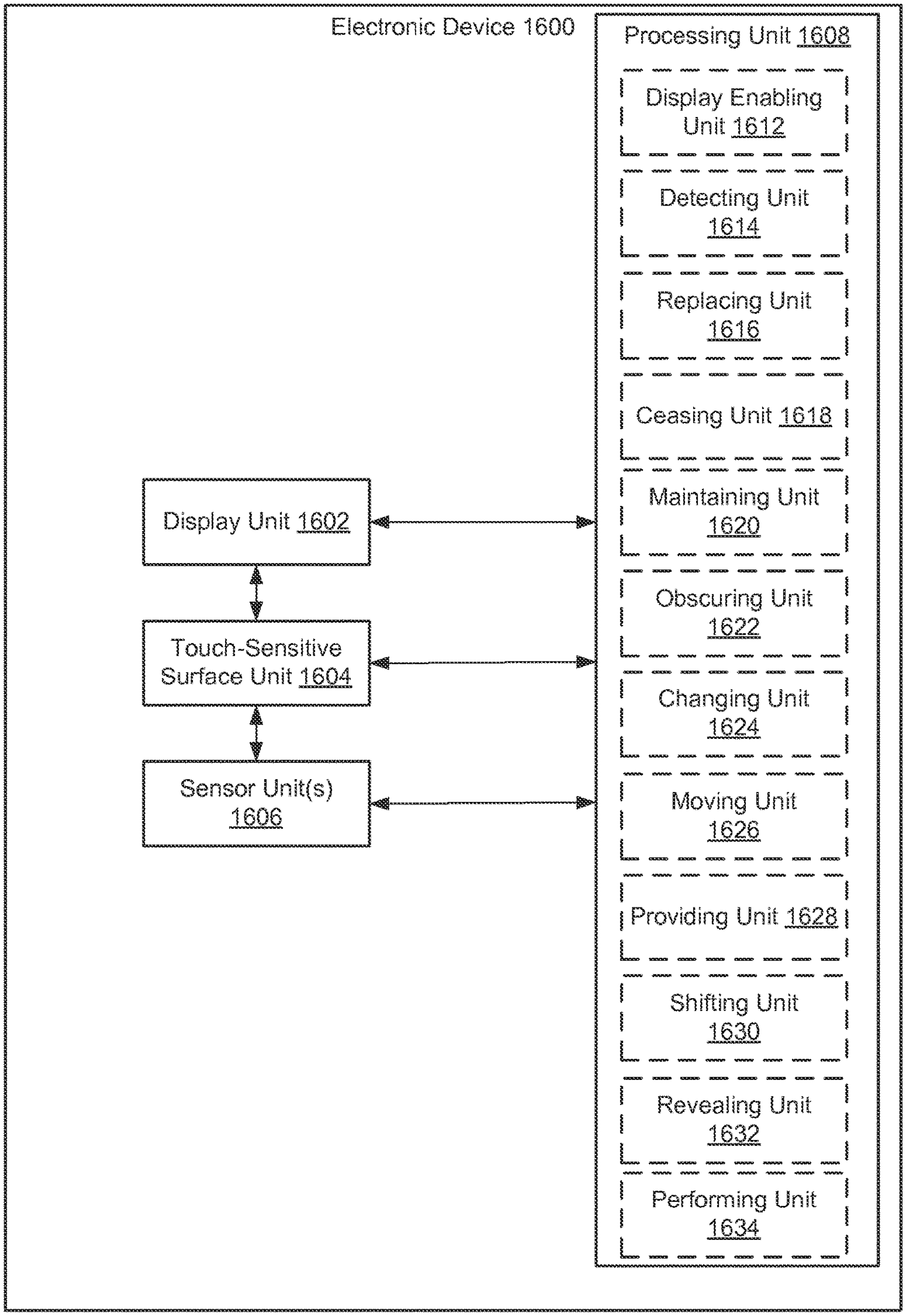
FIG. 16 is a functional block diagram of an electronic device, in accordance with some embodiments.

In accordance with some embodiments, FIG. 16 shows a functional block diagram of an electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 includes a display unit 1602 configured to display user interface objects; a touch-sensitive surface unit 1604 configured to receive contacts; one or more sensor units 1606 configured to detect intensity of contacts with the touch-sensitive surface unit 1604; and a processing unit 1608 coupled to the display unit 1602, the touch-sensitive surface unit 1604 and the one or more sensor units 1606. In some embodiments, the processing unit 1608 includes a display enabling unit 1612, a detecting unit 1614, a replacing unit 1616, a ceasing unit 1618, a maintaining unit 1620, an obscuring unit 1622, a changing unit 1624, a moving unit 1626, a providing unit 1628, a shifting unit 1630, a revealing unit 1632 and a performing unit 1634. The processing unit 1608 is configured to enable display of a plurality of user interface objects in a first user interface on the display unit 1602 (e.g., with display enabling unit 1612).

The processing unit 1608 is configured to detect an input by a contact while a focus selector is over a first user interface object, in the plurality of user interface objects, on the display unit 1602 (e.g., with detecting unit 1614).

In accordance with a determination that the input meets selection criteria, the processing unit 1608 is configured to enable display of a second user interface that is distinct from the first user interface in response to detecting the input (e.g., with display enabling unit 1612).

In accordance with a determination that a first portion of the input meets preview criteria, the processing unit 1608 is configured to enable display of a preview area overlaid on at least some of the plurality of user interface objects in the first user interface in response to detecting the first portion of the input (e.g., with display enabling unit 1612), wherein the preview area includes a reduced scale representation of the second user interface;

In accordance with a determination that a second portion of the input by the contact, detected after the first portion of the input, meets user-interface-replacement criteria, the processing unit 1608 is configured to replace display of the first user interface and the overlaid preview area with display of the second user interface (e.g., with replacing unit 1616).

In accordance with a determination that the second portion of the input by the contact meets preview-area-disappearance criteria, the processing unit 1608 is configured to cease to display the preview area (e.g., with ceasing unit 1618) and enable display of the first user interface after the input ends (e.g., with display enabling unit 1612).

The operations in the information processing methods described above are, optionally implemented by running one or more functional modules in information processing apparatus such as general purpose processors (e.g., as described above with respect to FIGS. 1A and 3) or application specific chips.

FIGS. 17A-17H are flow diagrams illustrating a method 1700 of providing supplemental information (e.g., previews and menus) in accordance with some embodiments. The method 1700 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1700 are, optionally, combined and/or the order of some operations is, optionally, changed.

The device displays (1702), on the display, a first user interface that includes a plurality of selectable user interface objects, including one or more user interface objects of a first type (e.g., user interface objects associated with "non-sticky" supplemental information (e.g., previews), such as date and time 704 in FIGS. 7A-7R and 7U-7AP) and one or more user interface objects of a second type (e.g., user interface objects associated with "sticky" supplemental information (e.g., quick action menus), such as contact icon 702 in FIGS. 7A-7R and 7U-7AP) that is distinct from the first type.

While displaying the first user interface on the display, the device detects (1704) a first portion of a first input that includes detecting an increase in a characteristic intensity of a first contact on the touch-sensitive surface above a first intensity threshold (e.g., a "peek" intensity threshold, which may be the same as a threshold for a "light" press input) while a focus selector is over a respective user interface object of the plurality of selectable user interface objects (e.g., an increase in the intensity of contacts 706, 708, 722, 726, 728, 732, and 736 in FIGS. 7E, 7K, 7R, 7W, 7AA, 7AG, and 7AL, respectively).

In response to detecting the first portion of the first input, the device displays (1706) supplemental information associated with the respective user interface object (e.g., preview area 707 in FIGS. 7E, 7R, 7AA, and 7AL and quick-action menu 710 in FIGS. 7K, 7W, and 7AG. In some embodiments, the supplemental information is overlaid on the first user interface. In some embodiments, when the supplemental information is displayed, the first user interface is blurred or darkened.

While displaying the supplemental information associated with the respective user interface object, the device detects (1708) an end of the first input (e.g., detecting lift-off of the first contact, as illustrated with a broken-lined circle in FIGS. 7G, 7M, 7T, 7Y, 7AE, 7AJ, and 7AO).

In response to detecting the end of the first input: in accordance with a determination that the respective user interface object is the first type of user interface object, the device ceases (1710) to display the supplemental information associated with the respective user interface object (e.g., when the respective user interface object has non-sticky supplemental information (e.g., a preview), the supplemental information is removed when the first input is terminated, as illustrated by removal of preview area 707 in FIGS. 7G, 7AE, and 7AO); and, in accordance with a determination that the respective user interface object is the second type of user interface object, the device maintains display of the supplemental information associated with the respective user interface object after detecting the end of the first input (e.g., when the respective user interface object has sticky supplemental information (e.g., a quick action menu), the supplemental information remains displayed when the first input is terminated, as illustrated by maintenance of quick action menu 710 in FIGS. 7M, 7Y, and 7AJ).

In some embodiments, when the respective user interface object is the first type of user interface object, the supplemental information includes (1712) a preview of a second user interface (e.g., preview area 707 displays a preview of calendar application user interface 724 in FIGS. 7E-7F, 7R, 7AA-7AD, and 7AM-7AN), distinct from the first user interface, that is displayed upon selection of the respective user interface object in the first user interface (e.g., in response to a tap gesture performed at a location that corresponds to the user interface object). In some embodiments, the preview is displayed as described herein with respect to FIGS. 6A-6AS and corresponding methods (e.g., methods 1300 and 1500).

In some embodiments, when the respective user interface object is the second type of user interface object, the supplemental information includes (1714) a first menu of actions that are associated with the respective user interface object (e.g., a quick action menu that includes a small number of most frequently used actions as its menu items, for example, quick action menu 710 in FIGS. 7K-7N, 7W-7Y, and 7AG-7AI). In some embodiments, the first menu is displayed as described herein with respect to FIGS. 5A-5AW and 48A-48EE and corresponding methods (e.g., methods 1300, 2700, and 4900).

In some embodiments, the device detects (1716) a second portion of the first input after the first portion of the first input and before the end of the first input, where detecting the second portion of the first input includes detecting a decrease in the characteristic intensity of the first contact below the first intensity threshold without detecting liftoff of the contact from the touch-sensitive surface. In response to detecting the second portion of the first input, the device maintains (1718) display of the supplemental information associated with the respective user interface object. For example, device 100 maintains display of preview area 707 and quick-action menu 710 after detecting decreases in contacts 706 and 708 in FIGS. 7F and 7L, respectively. In some embodiments, instead of using the first intensity threshold, an intensity threshold that is slightly lower than the first intensity threshold is used during the decrease in intensity of the first contact to avoid jitter. In some embodiments, the device maintains display of the supplemental information associated with the respective user interface object without regard to whether the respective user interface object is a first type of user interface object or a second type of user interface object. For example, in some embodiments, once the supplemental information is displayed in response to an earlier increase in intensity above the first intensity threshold, the user is not required to keep the contact intensity above the first intensity threshold and the supplemental information remains displayed until the end of the first input (e.g., lift-off of the first contact) is detected.

In some embodiments, after detecting the end of the first input and ceasing to display the supplemental information associated with the respective user interface object (e.g., after the supplemental information is removed from the display (1) after the end of the first input and in accordance with the determination that the respective user interface object is the first type of user interface object, or (2) after detecting another dismissal input (e.g., a tap outside of the first menu of actions) and in accordance with the determination that the respective user interface object is the second type of user interface object): while displaying the first user interface on the display, the device detects (1720) a first portion of a second input that includes detecting an increase in a characteristic intensity of a second contact on the touch-sensitive surface above the first intensity threshold while the focus selector is over the respective user interface object. For example, after display of preview area 707 is ceased in user interface 700 in FIG. 7G, as a result of liftoff of contact 706 between FIGS. 7F and 7G, the device detects second contact 722 on date and time 704 in FIG. 7P. In response to the increase in intensity of contact 722, the device redisplays preview area 707 in FIG. 7R. In some embodiments, when the supplemental information is removed from the display, the first user interface is restored.

In response to detecting the first portion of the second input, the device redisplays the supplemental information associated with the respective user interface object. The device detects a second portion of the second input that includes detecting an increase in the characteristic intensity of the second contact on the touch-sensitive surface above a second intensity threshold (e.g., the second intensity threshold is an intensity threshold that is higher than the first intensity threshold). In response to detecting the second portion of the second input: in accordance with a determination that the respective user interface object is the first type of user interface object, the device replaces display of the first user interface and the supplemental information with a second user interface (e.g., the second user interface is also displayed upon selection of the respective user interface object in the first user interface); and, in accordance with a determination that the respective user interface object is the second type of user interface object, the device maintains display the supplemental information associated with the respective user interface object (e.g., without displaying an additional interface as the intensity increases above the first intensity threshold). For example, in response to the increase in intensity of contact 722 above intensity threshold $IT_D$, the device replaces display of email message viewing user interface 700, associated with an email messaging application, with new event user interface 724, associated with a calendar application, in FIG. 7S, because date and time 704 is the first type of user interface object. In contrast, in response to the increase in intensity of contact 726 above intensity threshold $IT_D$, the device merely maintains display of quick-action menu 726 in FIG. 7X, because contact icon 702 is the second type of user interface object. In some embodiments, in accordance with a determination that the respective user interface object is the first type of user interface object, the displayed supplemental information is a preview of a second user interface that is displayed upon selection (e.g., by a tap gesture) of the respective user interface object, and upon detecting the second portion of the input, the second user interface replaces the preview on the display. For example, preview area 707 previews a new event calendar user interface 724 that is displayed upon tapping on date and time 704 in the email message displayed in user interface 700, as illustrated in FIG. 7AP07AQ. In some embodiments, the second user interface is a different user interface that replaces the original first user interface and the preview that is overlaid on top of the first user interface, is described herein with respect to FIGS. 6A-6AS and corresponding methods (e.g., methods 1300 and 1500). In some embodiments, in accordance with a determination that the respective user interface object is the second type of user interface object, the supplemental information includes a first menu of actions, and the first menu of actions remains displayed regardless of subsequent increase in intensity of the second contact.

In some embodiments, after detecting the end of the first input and ceasing to display the supplemental information associated with the respective user interface object (e.g., the supplemental information is removed from the display (1) after the end of the first input and in accordance with the determination that the respective user interface object is the first type of user interface object, or (2) after detecting another dismissal input (e.g., a tap outside of the first menu of actions) and in accordance with the determination that the respective user interface object is the second type of user interface object): while displaying the first user interface on the display, the device detects (1722) a first portion of a second input that includes detecting an increase in a characteristic intensity of a second contact on the touch-sensitive surface above the first intensity threshold while the focus selector is over the respective user interface object. In some embodiments, when the supplemental information is removed from the display, the first user interface is restored.

In response to detecting the first portion of the second input, the device redisplays the supplemental information associated with the respective user interface object. The device detects a second portion of the second input that includes detecting an increase in the characteristic intensity of the second contact on the touch-sensitive surface above a second intensity threshold (e.g., the second intensity threshold is an intensity threshold that is higher than the first intensity threshold). In response to detecting the second portion of the second input: in accordance with a determination that the respective user interface object is the first type of user interface object, the device replaces display of the first user interface and the supplemental information with a second user interface, wherein the second user interface is also displayed upon selection of the respective user interface object in the first user interface; and, in accordance with a determination that the respective user interface object is the second type of user interface object, the device replaces display of the first user interface and the supplemental information with a third user interface, wherein the third user interface is different from a respective user interface that is displayed upon selection of the respective user interface object in the first user interface. For example, in response to the increase in intensity of contact 722 above intensity threshold $IT_D$, the device replaces display of email message viewing user interface 700, associated with an email messaging application, with new event user interface 724, associated with a calendar application, in FIG. 7S, because date and time 704 is the first type of user interface object. In contrast, in response to the increase in intensity of contact 540 above intensity threshold $IT_D$, while the contact is over application launch icon 424 associated with quick-menu 504 in FIG. 5AJ, the device replaces display of home screen user interface 500 with new message input user interface 541 associated with a messaging application, as illustrated in FIG. 5AK, because messages launch icon 424 is the second type of user interface object. In some embodiments, in accordance with a determination that the respective user interface object is the first type of user interface object, the displayed supplemental information is a preview of a second user interface that is displayed upon selection (e.g., by a tap gesture) of the respective user interface object, and upon detecting the second portion of the input, the second user interface replaces the preview on the display. In some embodiments, the second user interface is a different user interface that replaces the original first user interface and the preview that is overlaid on top of the first user interface. In some embodiments, in accordance with a determination that the respective user interface object is the second type of user interface object, the subsequent increase in intensity of the contact above the second intensity threshold causes a default action in the first menu of actions to be performed (and display of the first menu of actions ceases). In such embodiments, the supplemental information is removed in response to an increase in intensity of second contact above the second intensity threshold. So, if the respective user interface object is of the first type, a new user interface replaces the first user interface and the supplemental information on the display, where the new user interface is the same as the user interface that is displayed upon selection of the respective user interface object. If the respective user interface object is of the second type, a new user interface that is displayed upon selection of the default menu option from the first menu of actions replaces the supplemental information and the first user interface on the display, this new user interface is different from the user interface that is displayed upon selection of the respective user interface object. More details are as described herein with respect to FIGS. 12A-12X and corresponding method 2900.

In some embodiments, in accordance with a determination that the increase in the characteristic intensity of the second contact is accompanied by a movement of the second contact, the device disables (1724) replacement of the first user interface and the supplemental information with the second user interface. In some embodiments, movement of the contact in any direction across the displayed/redisplayed supplemental information disables responses to an increase in contact intensity above the second intensity threshold that may occur during the movement of the contact. For example, in response to detecting an increase in the intensity of contact 728 above intensity threshold $IT_D$ in FIG. 7AC, the device does not replace the display of email message viewing user interface 700 with new event calendar user interface 724, because movement 730 has disabled this option, as illustrated in FIGS. 7AB-7AC.

In some embodiments, while displaying the supplemental information on the display and prior to detecting the end of the first input, the device detects (1726) a second portion of the first input that includes movement of the first contact on the touch-sensitive surface. In response to detecting the second portion of the first portion of the input that includes the movement of the first contact: in accordance with a determination that the respective user interface object is the first type of user interface object, the device moves the supplemental information in accordance with the movement of the first contact (e.g., the device slides the peek platter in a direction determined based on a direction of movement of the contact on the touch-sensitive surface and optionally reveals one or more actions associated with the peek platter including selectable options or swipe options); and in accordance with a determination that the respective user interface object is the second type of user interface object, the device maintains a position of the supplemental information and highlights a selectable object in the supplemental information in accordance with the movement of the first contact (e.g., highlights a menu option in the quick action menu when the contact slides over the menu option). For example, in response to detecting movement 730 of contact 728, the device moves preview area 707 to the right in FIGS. 7AB-7AC, because time and date 704 is the first type of user interface object. In contrast, in response to detecting movement 734 of contact 732, the device does not move quick-action menu 710 to the right in FIGS. 7AH-7AI, because contact icon 702 is the second type of user interface object.

In some embodiments, after detecting the end of the first input and ceasing to display the supplemental information associated with the respective user interface object (e.g., the supplemental information is removed from the display (1) after the end of the first input and in accordance with the determination that the respective user interface object is the first type of user interface object, or (2) after detecting another dismissal input (e.g., a tap outside of the first menu of actions) and in accordance with the determination that the respective user interface object is the second type of user interface object): while displaying the first user interface on the display, the device detects (1728) a first portion of a second input that includes detecting an increase in a characteristic intensity of a second contact on the touch-sensitive surface above the first intensity threshold while the focus selector is over the respective user interface object of the plurality of user interface objects. In response to detecting the first portion of the second input, the device redisplays the supplemental information associated with the respective user interface object. The device detects a second portion of the second input that includes detecting a movement of the second contact on the touch-sensitive surface that corresponds to a movement of the focus selector on the display (e.g., the movement of the focus selector is an upward movement across the displayed preview, or a movement over one of the actions in the displayed first menu of actions). In response to detecting the second portion of the second input: in accordance with a determination that the respective user interface object is the first type of user interface object, the device displays one or more action items that are associated with the respective user interface object in the first user interface (e.g., displaying a second menu of actions that includes multiple action items, or displaying a single action item); and, in accordance with a determination that the respective user interface object is the second type of user interface object: the device maintains the redisplay of supplemental information associated with the respective user interface object (e.g., maintains display of the first menu of actions associated with the respective user interface object) and highlights a respective portion of the redisplayed supplemental information. For example, in response to detecting movement 730 of contact 728, the device moves preview area 707 to the right, revealing action icon 732 in FIGS. 7AC-7AD, because time and date 704 is the first type of user interface object. In contrast, in response to detecting movement 734 of contact 732, the device does not move quick-action menu 710 to the right in FIGS. 7AH-7AI, because contact icon 702 is the second type of user interface object. However, one of options 712, 714, 716, and 718 (e.g., the default option) is highlighted for potential performance.

In some embodiments, in accordance with a determination that the respective user interface object is the first type of user interface object, the displayed one or more action items are included in a second menu of actions (e.g., an action platter), and each action item in the second menu of actions is individually selectable and would trigger performance of a corresponding action upon selection. In some embodiments, performance of a corresponding action is triggered by detecting lift off of the contact while the focus selector is over the action item. In some embodiments, performance of a corresponding action is triggered by detecting a press input (e.g., a deep press input) by the contact while the focus selector is over the action item. In some embodiments, performance of a corresponding action is triggered by detecting a tap gesture by another contact while the focus selector is over the action item. In some embodiments, an upward movement of the focus selector causes the preview to move up on the display to make room for the second menu of actions. In some embodiments, the second menu of actions has a different look and/or haptics from the first menu of actions. In some embodiments, a sideways movement (e.g., toward the left or the right side of the display) causes the preview to move left or right, and one or more action items (e.g., as represented by corresponding action icons) are revealed from behind the preview platter.

In some embodiments, in accordance with a determination that the respective user interface object is the second type of user interface object, the displayed supplemental information is the first menu of actions associated with the respective user interface object, and movement of the contact causes a default action in the first menu of actions to become highlighted. Alternatively, the action that is under the focus selector after the movement of the focus selector is highlighted. In some embodiments, subsequent lift-off of the second contact while the focus selector is on a highlighted action item in the first menu of actions causes performance of the highlighted action, and display of the first menu of actions (and, in some cases, the first user interface) ceases upon detecting the lift-off of the second contact.

In some embodiments, in response to detecting the first portion of the first input: in accordance with the determination that the respective user interface object is the first type of user interface object, the device provides (1730) a first tactile output (e.g., a buzz, such as tactile feedback 705 in FIG. 7E) upon displaying the supplemental information associated with the respective user interface object (e.g., a preview associated with the respective user interface object); and, in accordance with the determination that the respective user interface object is the second type of user interface object, the device provides a second tactile output (e.g., a hum, such as tactile feedback 711 in FIG. 7K) different from the first tactile output upon displaying the supplemental information associated with the respective user interface object (e.g., a quick action menu associated with the respective user interface object). In some embodiments the first tactile output is different from the second tactile output based on differences in amplitudes of the tactile outputs. In some embodiments, the first type of tactile output is generated by movement of the touch-sensitive surface that includes a first dominant movement component. For example, the generated movement corresponds to an initial impulse of the first tactile output, ignoring any unintended resonance. In some embodiments, the second type of tactile output is generated by movement of the touch-sensitive surface that includes a second dominant movement component. For example, the generated movement corresponds to an initial impulse of the second tactile output, ignoring any unintended resonance. In some embodiments, the first dominant movement component and the second dominant movement component have the same movement profile and different amplitudes. For example, the first dominant movement component and the second dominant movement component have the same movement profile when the first dominant movement component and the second dominant movement component have a same waveform shape, such as square, sine, sawtooth or triangle, and approximately the same period. In some embodiments the first tactile output is different from the second tactile output based on differences in movement profiles of the tactile outputs. In some embodiments, the first type of tactile output is generated by movement of the touch-sensitive surface that includes a first dominant movement component. For example, the generated movement corresponds to an initial impulse of the first tactile output, ignoring any unintended resonance. In some embodiments, the second type of tactile output is generated by movement of the touch-sensitive surface that includes a second dominant movement component. For example, the generated movement corresponds to an initial impulse of the second tactile output, ignoring any unintended resonance. In some embodiments, the first dominant movement component and the second dominant movement component have different movement profiles and the same amplitude. For example, the first dominant movement component and the second dominant movement component have different movement profiles when the first dominant movement component and the second dominant movement component have a different waveform shape, such as square, sine, sawtooth or triangle, and/or approximately the same period.

In some embodiments, in accordance with the determination that the respective user interface object is the first type of user interface object, the device provides (1732) a third tactile output (e.g., a click, such as tactile feedback 733 in FIG. 7AD) different from the second tactile output upon displaying the one or more action items associated with the respective user interface object (e.g., displaying an action platter that includes multiple action items or displaying a single action item by itself).

In some embodiments, the respective user interface object is the first type of object. While the supplemental information associated with the respective user interface object is displayed on the display and the one or more action items are not displayed: in accordance with the determination that the respective user interface object is the first type of user interface object, the device displays (1734) an indicator indicating that the one or more action items associated with the respective user interface object are hidden (e.g., displays a caret at the top of the user interface area that displays the supplemental information, or at the top of the first user interface, such as caret 729 in FIG. 7AB).

In some embodiments, the indicator is (1736) configured to represent a direction of movement of a contact that triggers display of the one or more action items associated with the respective user interface object. For example, a caret at the top of the user interface area that displays the supplemental information (e.g., the preview), or at the top of the first user interface indicates that a swipe upward by the second contact will trigger the display of the second menu of actions associated with the respective user interface object. In some embodiments, if the second menu of actions is triggered by a swipe to one or both sides (e.g., left or right) of a preview, an indicator is displayed on that side or sides of the preview (e.g., caret 729 displayed on the right side of preview area 707 in FIG. 7AB).

In some embodiments, the respective user interface object is (1738) the first type of object. The movement of the second contact on the touch-sensitive surface corresponds to a movement of the focus selector on the display in a respective direction (e.g., the first direction is approximately horizontal from left to right, or from right to left). Displaying the one or more action items that are associated with the respective user interface object in the first user interface includes: shifting the supplemental information in the first direction on the display; and revealing the one or more action items (e.g., from behind the supplemental information or from an edge of the display) as the supplemental information is shifted in the first direction. For example, in response to movement 730 of contact 728 to the right, preview-area 707 moves to the right revealing action icon 732 in FIGS. 7AB-7AD.

In some embodiments, after revealing the one or more action items: the device continues (1740) to shift the supplemental information in the first direction on the display in accordance with the movement of the second contact (e.g., while maintaining a position of the first action item on the display, as illustrated in FIGS. 7AC-7AD).

In some embodiments, displaying the one or more action items associated with the respective user interface object includes (1742) displaying a first action item associated with the respective user interface object. After displaying the first action item associated with the respective user interface object, the device detects that the movement of the second contact corresponds to movement of the focus selector by at least a first threshold amount on the display before detecting lift-off of the second contact (e.g., the preview is dragged along by the focus selector on the user interface by at least the same threshold amount (e.g., an amount that causes the icon of the first action item to be displayed at the center of the space between the edge of the user interface and the edge of the preview platter)). In response to detecting that the movement of the second contact corresponds to movement of the focus selector by at least the first threshold amount on the display, the device changes a visual appearance of the first action item (e.g., by inverting the color of the first action item, as illustrated by the change in color of action icon 732 from FIGS. 7AC to 7AD). The device detects lift-off of the second contact after changing the visual appearance of the first action item. In response to detecting the lift-off of the second contact: the device ceases to display the first action item and performs a first action represented in the first action item (e.g., upon lift off of contact 728 between FIGS. 7AC-7AD, the device ceases to display preview area 707, as illustrated in FIG. 7AD, and creates a new event in the calendar application (not shown).

In some embodiments, the respective user interface object is (1744) the first type of object. The device detects a second portion of the first input that includes movement in a respective direction. In response to detecting the end of the first input: in accordance with a determination that the movement in the respective direction meets a respective movement threshold (e.g., a distance and/or speed threshold), the device performs an operation associated with movement in the respective direction (e.g., the action that is revealed when the preview platter is moved to the left or right); and in accordance with a determination that the movement in the respective direction does not meet the respective movement threshold (e.g., a distance and/or speed threshold), the device forgoes performance of the operation associated with movement in the respective direction. For example, in response to movement 730 of contact 728 far to the right, action icon 732 changes color and the device performs the associated action (e.g., creating a new calendar event) upon liftoff in FIG. 7AE. In contrast, because contact 736 does not move far enough to the right in FIGS. 7AM-7AM, action icon 732 does not change color and the device does not perform the associated action (e.g., creating a new calendar event) upon liftoff in FIG. 7AO.

In some embodiments, movement of the focus selector in a first direction is (1746) associated with a first action and movement of the focus selector in a second direction is associated with a second action (e.g., movement to the left reveals the "delete" icon for deleting the content associated with the respective user interface object (e.g., an email message), while movement to the right reveals a "flag" icon for marking the content associated with the respective user interface object (e.g., an email message)). For example, as described with respect to FIGS. 6Q-6W and 6AN-6AS.

In some embodiments, movement of the focus selector in the first direction is (1748) associated with a first threshold and movement of the focus selector in the second direction is associated with a second threshold that is higher than the first threshold (e.g., because the second action associated with movement in the second direction is destructive such as deleting a message, while the first action associated with movement in the first direction is non-destructive such as flagging a message as read or unread). For example, as described with respect to FIGS. 6Q-6W and 6AN-6AS.

In some embodiments, after ceasing to display the supplemental information associated with the respective user interface object: while displaying the first user interface on the display (e.g., the supplemental information is removed from the display (1) after the end of the first input and in accordance with the determination that the respective user interface object is the first type of user interface object, or (2) after detecting another dismissal input (e.g., a tap outside of the first menu of actions) and in accordance with the determination that the respective user interface object is the second type of user interface object), the device detects (1750) a third input that includes detecting a third contact with the characteristic intensity below the first intensity threshold on the touch-sensitive surface and lift-off of the third contact while the focus selector is over the respective user interface object of the plurality of user interface objects (e.g., the third input is a tap gesture on the respective user interface object). In response to detecting the third input, the device replaces the first user interface with a second user interface associated with the respective user interface element (e.g., if the respective user interface element is a hyperlink, the second user interface that is displayed in response to the third input includes a webpage or document located at the address associated with the hyperlink. In another example, if the respective user interface element displays a representation (e.g., a name or avatar) of a contact, the second user interface that is displayed in response to the third input includes a contact card of the contact). For example, in response to detecting the tap gesture including contact 740 in FIG. 7AP, the device navigates to user interface 724 for a calendar application associated with date and time 704 in the email message user interface 700, as illustrated in FIG. 7AQ.

In some embodiments, the first type of user interface object includes (1752) a link to a webpage or document.

In some embodiments, the second type of user interface object includes (1754) a representation of a contactable entity (e.g., a friend, a social network entity, a business entity, etc.).

It should be understood that the particular order in which the operations in FIGS. 17A-17H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 1700 described above with respect to FIGS. 17A-17H. For brevity, these details are not repeated here.

Figure 18:
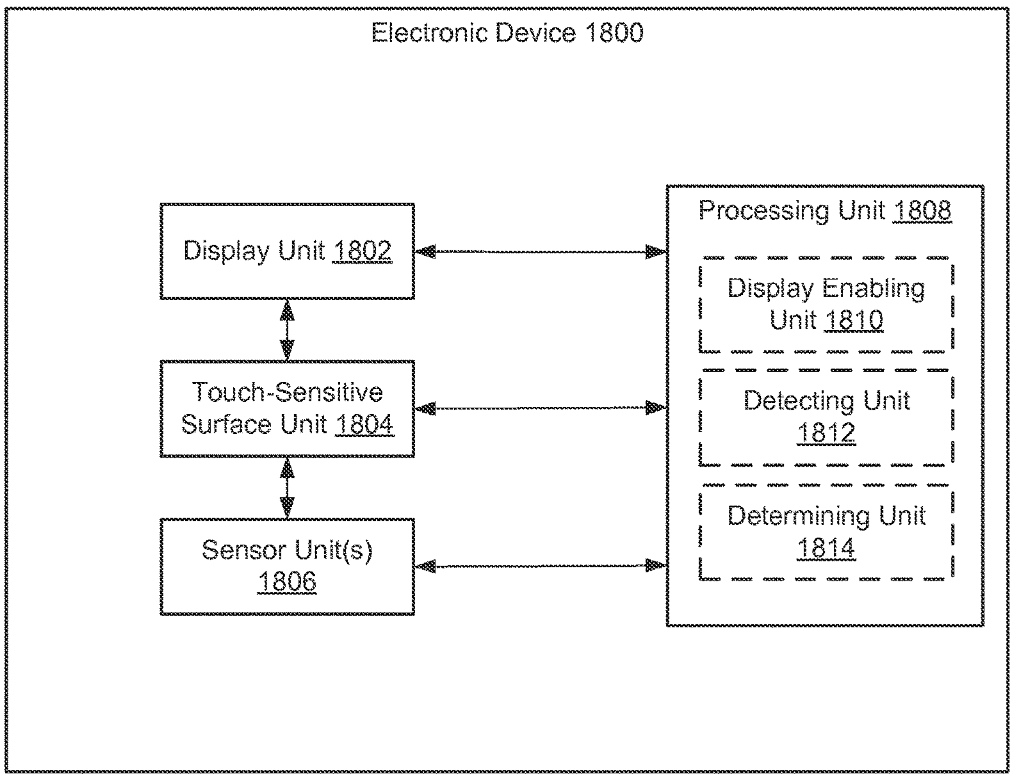
FIG. 18 is a functional block diagram of an electronic device, in accordance with some embodiments.

In accordance with some embodiments, FIG. 18 shows a functional block diagram of an electronic device 1800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, an electronic device includes a display unit 1802 configured to display content items; a touch-sensitive surface unit 1804 configured to receive user inputs; one or more sensor units 1806 configured to detect intensity of contacts with the touch-sensitive surface unit 1804; and a processing unit 1808 coupled to the display unit 1802, the touch-sensitive surface unit 1804 and the one or more sensor units 1806. In some embodiments, the processing unit 1808 includes a display enabling unit 1810, a detecting unit 1812, and a determining unit 1814. In some embodiments, the processing unit 1808 is configured to: enable display (e.g., with display enable unit 1810), on the display unit (e.g., display unit 1802), of a first user interface that includes a plurality of selectable user interface objects, including one or more user interface objects of a first type and one or more user interface objects of a second type that is distinct from the first type; while the first user interface is displayed on the display unit, detect (e.g., with detecting unit 1812) a first portion of a first input that includes detecting an increase in a characteristic intensity of a first contact on the touch-sensitive surface above a first intensity threshold while a focus selector is over a respective user interface object of the plurality of selectable user interface objects; in response to detecting the first portion of the first input, enable display (e.g., with display enabling unit 1810) of supplemental information associated with the respective user interface object; while the supplemental information associated with the respective user interface object is displayed, detect (e.g., with detecting unit 1812) an end of the first input; and, in response to detecting the end of the first input: in accordance with a determination (e.g., with determination unit 1814) that the respective user interface object is the first type of user interface object, cease to enable display of the supplemental information associated with the respective user interface object; and, in accordance with a determination (e.g., with determination unit 1814) that the respective user interface object is the second type of user interface object, maintaining display of the supplemental information associated with the respective user interface object after detecting the end of the first input.

The operations in the information processing methods described above are, optionally implemented by running one or more functional modules in information processing apparatus such as general purpose processors (e.g., as described above with respect to FIGS. 1A and 3) or application specific chips.

FIGS. 19A-19F are flow diagrams illustrating a method 1900 of dynamically changing a background of a user interface in accordance with some embodiments. The method 1900 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1900 are, optionally, combined and/or the order of some operations is, optionally, changed.

The device displays (1902) a first user interface on the display (e.g., user interface 800 in FIG. 8A), wherein the first user interface includes a background with a first appearance (e.g., a digital image, a pattern, or other wallpaper, e.g., virtual mesh 810 in FIG. 8A) and one or more foreground objects (e.g., time/date 802, camera icon 808, notifications, pull-down/up panel handles 804 and 806, or other user interface objects in FIG. 8A).

In some embodiments, the background of the first user interface includes (1904) a geometric or abstract pattern (e.g., as seen in virtual mesh 810).

While displaying (1906) the first user interface on the display, detecting a first input by a first contact on the touch-sensitive surface while a first focus selector is at a location in the first user interface that corresponds to the background of the first user interface (e.g., contact 812 in FIG. 8B).

In some embodiments, when the first input is (1908) detected, the electronic device is in a locked mode in which access to a plurality of different operations that are accessible when the device is in an unlocked state is prevented (e.g., the device is locked when the first input is detected and the first user interface is a lock screen user interface, as illustrated in lock screen user interface 800 in FIG. 8A). In some embodiments, while in the locked mode, access to sensitive information (e.g., previously captured images and videos, financial information, electronic communications, etc.) is protected by a passcode and/or biometric authentication.

In some embodiments, the background is (1910) used for both the locked state of the device and the unlocked state of the device (e.g., virtual mesh 810 is present in the background of lockscreen user interface 800 and home screen user interface 824, as illustrated in FIGS. 8K and 8L, respectively). While in the locked state, the appearance of the background is changed from a first appearance to a second appearance in accordance with the characteristic intensity of the first contact (e.g., virtual mesh 810 is pushed backwards in FIGS. 8C-8D). In some embodiments, while the background has the second appearance, receiving a request to enter an unlocked state (e.g., via contact 822 in FIG. 8K), and, in response to receiving the request to enter the unlocked state, the device enters the unlocked state (e.g., as illustrated in FIG. 8L); and (e.g., the appearance of the background when the device enters the unlocked state is determined based on the appearance of the background while the device was in the locked state, taking into account any changes in appearance of the background due to interaction with the background while the device was in the locked state) after entering the unlocked state, the device displays a transition of the appearance of the background from the second state to the first state. (e.g., in response to detecting liftoff of the first contact or in response to a timer elapsing since the device entered the unlocked state, or in response to detecting a change in intensity of the contact). For example, the change in the appearance of the background reverses between FIGS. 8L and 8M.

In some embodiments, a respective foreground object of the one or more foreground objects responds (1912) to an input by a contact having a characteristic intensity below the first intensity threshold. For example, a light swipe gesture on a foreground object (e.g., "slide to unlock," "Today" view handle, "control center" handle, or camera icon) causes display of a new user interface, as shown in FIGS. 10A-10D.

In response to detecting the first input by the first contact, in accordance with a determination that the first contact has a characteristic intensity above a first intensity threshold (e.g., "hint" threshold $IT_H$, light press threshold $IT_L$, or deep press threshold $IT_D$), the device dynamically changes (1914) the appearance of the background of the first user interface without changing the appearance of the one or more foreground objects in the first user interface (e.g., by pushing back virtual mesh 810 in FIGS. 8C-8D). In some embodiments, the change includes animating a sequence of images in the background in accordance with the characteristic intensity of the first contact (e.g., as illustrated in FIGS. 8BF-8BK. In some embodiments, the change includes changing a Z-depth, focus, radial position relative to the contact, color, contrast, or brightness of one or more objects of the background, wherein the dynamic change in the appearance of the background of the first user interface is based at least in part on the characteristic intensity of the first contact (e.g., directly, linearly, non-linearly proportional to, or at a rate determined based on the characteristic intensity of the contact).

In some embodiments, the dynamic change of the appearance of the background of the first user interface is (1916) based at least in part on a position of the first focus selector on the display (e.g., distortion of a background pattern is more pronounced for portions of the background pattern that are closer to the focus selector). For example, virtual mesh 810 is pushed back more at location near contact 812 than at locations near the edge of touch screen 112 in FIG. 8D.

In some embodiments, the first intensity threshold is associated with an operating system of the electronic device, and respective operations of respective applications on the electronic device are (1918) activated in response to detecting respective inputs that satisfy the first intensity threshold (e.g., a hint/reveal intensity threshold, as described with respect to methods 1300 and 1500 and FIGS. 5A-5AW and 6A-6AS). In some embodiments, the system has force thresholds (or criteria) to perform operations, and the dynamic behavior of the lock screen background changes at the force thresholds (e.g., to teach a user what the force thresholds are), such as the force thresholds described herein with reference to methods 1300, 1500, 1700, and 2500.

In some embodiments, the background of the first user interface includes (1920) a representative image in a sequence of images and dynamically changing the appearance of the background of the first user interface includes displaying in sequence at least some of the sequence of images based at least in part on the characteristic intensity of the first contact. For example, an enhanced photo dynamically animates as the intensity of the input changes, as described in U.S. Provisional Application Ser. No. 62/215,689, filed Sep. 8, 2015, entitled "Devices and Methods for Capturing and Interacting with Enhanced Digital Images," which is incorporated by reference herein in its entirety.

In some embodiments, respective operations of respective applications on the electronic device are (1922) activated in response to detecting respective inputs that satisfy a second intensity threshold (e.g., a peek/preview intensity threshold that is higher than the first intensity threshold); the appearance of the background changes in a first manner (e.g., changing color and spacing of user interface objects) when the characteristic intensity of the contact is between the first intensity threshold and the second intensity threshold; and the appearance of the background changes in a second manner, different from the first manner (e.g., changing an orientation or size of the user interface objects), when the characteristic intensity of the contact is above the second intensity threshold (e.g., to provide the user with feedback as to how much pressure is required to reach a particular intensity threshold and thereby train the user in how to reach the first intensity threshold and the second intensity threshold).

In some embodiments, the change in the appearance of the background of the first user interface includes (1924): a change in the space between background objects; a change in the radial position of a background object with respect to a position of the first contact; a change in the opacity of a background object (e.g., change opacity of a portion of the lock screen generally (e.g., revealing a portion of a home screen through the lock screen) or of individual objects); a change in the color of a background object; a change in a simulated depth (e.g., z-depth) or focus of a background object; a change in the contrast of a background object; and/or a change in the brightness of a background object (e.g., background objects near the contact glow brighter with increasing contact intensity).

In some embodiments, the change in the appearance of the background of the first user interface includes (1926) a rippling effect applied to a background object (e.g., a geometric shape or pattern) that emanates from the focus selector (e.g., like water ripples, for example, as illustrated in FIGS. 8Y-8AC). In some embodiments, the rippling effect interacts with the edges of the display (e.g., like waves reflecting off the side of a pool). In some embodiments the rippling effect ends at the edges of the display (e.g., like waves traveling in a body of water much larger than the display).

In some embodiments, reverting the background of the first user interface back to the first appearance of the background includes (1926) moving display of an object (e.g., a geometric shape or pattern) of the background of the first user interface back to its first appearance in the background of the first user interface with a simulated inertia that is based on a rate of decrease in the characteristic intensity of the first contact detected immediately prior to detecting termination of the input by the first contact (e.g., a trampoline effect in which the background springs back towards, and past, the plane of the screen and then oscillates above and below the plane of the screen with a dampening amplitude, as illustrated in FIGS. 8AD-8AI).

In some embodiments, the dynamic change in the appearance of the background of the first user interface is (1928) based in part on a positive rate of change in the characteristic intensity of the first contact.

In some embodiments, a magnitude of the dynamic change in the appearance of the background of the first user interface decays (1930) following detection of an impulse force by the first contact (e.g., as graphically illustrated in FIG. 8AT). In some embodiments, in response to detecting an increase in the characteristic intensity of the first contact, in accordance with a determination that a rate of change of the characteristic intensity of the first contact during the detected increase in the characteristic intensity of the first contact exceeds a first rate of change threshold, the device dynamically changes the appearance of the background of the first user interface and then animates reversion of the background of the first user interface back to the first appearance of the background over a predetermined period of time. In some embodiments, in response to detecting a rapid increase in the characteristic intensity of the contact above the first intensity threshold, the device dynamically changes the appearance of the background of the first user interface in a transitive fashion that decays over time (e.g., a quick increase in force causes a splash/ripple effect that slowly settles, as illustrated in FIGS. 8Y-8AC).

While dynamically changing the appearance of the background of the first user interface, the device detects (1932) termination of the first input by the first contact; and, in response to detecting termination of the first input by the first contact, the device reverts the background of the first user interface (e.g., as illustrated in FIGS. 8F-8G) back to the first appearance of the background (e.g., restores display of the first user interface to its appearance prior to the first input; animates the reversal of the changes in the background; and/or springs back to the first appearance with a dampening effect). In some embodiments, reversion of the background occurs in response to decreasing the characteristic intensity of the contact below a light press threshold. In some embodiments, while detecting the first input by the first contact, after the determination that the first contact has a characteristic intensity above the first intensity threshold: the device detects a decrease in the characteristic intensity of the first contact; and in response to detecting the decrease in the characteristic intensity of the first contact, in accordance with a determination that the contact has a characteristic intensity below the first intensity threshold, the device reverts the background of the first user interface back to the first appearance of background.

In some embodiments, reverting the background of the first user interface back to the first appearance of the background includes (1934): moving display of an object (e.g., a geometric shape or pattern) of the background of the first user interface back to its first appearance in the background of the first user interface with a simulated inertia that is based on a rate of decrease in the characteristic intensity of the first contact detected immediately prior to detecting termination of the input by the first contact. (e.g., a trampoline effect in which the background springs back towards, and past, the plane of the screen and then oscillates above and below the plane of the screen with a dampening amplitude, as illustrated in FIGS. 8AD-8AI).

In some embodiments, reverting the background of the first user interface back to the first appearance of the background is (1936) based on a rate of change of the decrease in the characteristic intensity of the first contact prior to termination of the first input. In some embodiments, the dynamic reversion of the change in the appearance of the background is retarded relative to a rate of change in characteristic intensity of the contact above a first rate of change threshold. For example, the rate at which the dynamic distortion of the display is reversed reaches a terminal rate that is less than the rate at which the intensity of the contact is released, creating a "memory foam" effect, as illustrated in FIGS. 8AO-8AQ.

In some embodiments, the device detects (1938) a second input by a second contact, the second input meeting criteria to exit the locked mode of the electronic device (e.g., a fingerprint input on a fingerprint sensor in home button 204 that matches a stored fingerprint for the user of the device, or a directional swipe gesture, optionally coupled to input of a password). In response to detecting the second input by the second contact, the device replaces display of the first user interface with display of a second user interface that is distinct from the first user interface on the display (e.g., upon exiting the locked mode of the electronic device, the device displays a second user interface (e.g., an application springboard) associated with an unlocked state of the electronic device that provides access to a plurality of different applications on the electronic device, which were locked when displaying the first user interface), wherein the second user interface includes a background of the second user interface with a first appearance and one or more foreground objects. For example, device 100 replaces display of lock screen user interface 800 with home screen user interface 824 in FIG. 8L, in response to detection of contact 8 in FIG. 8K.

In some embodiments, while displaying the second user interface on the display, the device detects (1940) a third input by a third contact on the touch-sensitive surface while a focus selector is at a location in the second user interface that corresponds to the background of the second user interface, wherein the third contact has a characteristic intensity above the first intensity threshold; and, in response to detecting the third input by the third contact, the device maintains the first appearance of the background of the second user interface (e.g., contact 826 does not change the appearance of the background in FIG. 824).

In some embodiments, while displaying the second user interface on the display, the device detects (1942) a fourth input by a fourth contact on the touch-sensitive surface while a focus selector is at a location in the second user interface that corresponds to the background of the second user interface; and, in response to detecting the fourth input by the fourth contact, in accordance with a determination that the fourth contact has a characteristic intensity above the first intensity threshold, the device dynamically changes the appearance of the background of the second user interface without changing the appearance of the one or more foreground objects in the first user interface, wherein the dynamic change in the appearance of the background of the second user interface is based at least in part on the characteristic intensity of the fourth contact (e.g., directly, linearly, non-linearly proportional to, or at a rate determined based on the characteristic intensity of the contact). For example, contact 826 pushes virtual mesh 810 backwards in FIG. 8Q.

In some embodiments, while dynamically changing the appearance of the background of the second user interface, the device detects (1944) termination of the fourth input by the fourth contact; and, in response to detecting termination of the fourth input by the fourth contact, the device reverts the background of the second user interface back to the first appearance of the background of the second user interface (e.g., liftoff of contact 826 reverses the change in the appearance of virtual mesh 810 in FIG. 8R).

In some embodiments, while detecting the first input by the first contact, after determining that the first contact has a characteristic intensity above the first intensity threshold: the device detects (1946) a decrease in the characteristic intensity of the first contact; and, in response to detecting the decrease in the characteristic intensity of the first contact: in accordance with a determination that a rate of change of the characteristic intensity of the first contact during the detected decrease in the characteristic intensity of the first contact does not exceeds a first rate of change threshold, the device dynamically reverses the change of the appearance of the background of the first user interface based on the rate of change of the characteristic intensity of the first contact. In accordance with a determination that a rate of change of the characteristic intensity of the first contact during the detected decrease in the characteristic intensity of the first contact exceeds a first rate of change threshold, the device animates reversal of the change of the appearance of the background of the first user interface independent of the rate of change of the characteristic intensity of the first contact. In some embodiments, dynamic distortion of the display is retarded in response to a quick release of force. For example, the rate at which the dynamic distortion of the display is reversed reaches a terminal rate that is less than the rate at which the pressure of the contact is released, which results in the background displaying a “memory foam” effect, as illustrated in FIGS. 8AO-8AR.

In some embodiments, while detecting the first input by the first contact, after determining that the first contact has a characteristic intensity above the first intensity threshold: the device detects (1948) a decrease in the characteristic intensity of the first contact below the first intensity threshold; and, in response to detecting the decrease in the characteristic intensity of the first contact below the first intensity threshold, continues to dynamically change the appearance of the background of the first user interface based at least in part on the characteristic intensity of the first contact. In some embodiments, reversion of the background distortion is slower than the initial background distortion because the end point of the reversion is lift-off of the contact (e.g., zero intensity). For example, contact 852 continues to change the appearance of virtual mesh 810 in FIGS. 8AX-8AY, until liftoff is detected in FIG. 8AZ. Thus, in some embodiments, the relationship between increases/decreases in characteristic intensity of the contact and the dynamic distortion of the background changes after the first instance in which the characteristic intensity falls below the first intensity threshold.

In some embodiments, while continuing to detect the first input by the first contact, after determining that the first contact has a characteristic intensity above the first intensity threshold: the device detects (1950) movement of the first contact on the touch-sensitive surface; and, in response to detecting the movement of the first contact, dynamically updates the change in the appearance of the background of the first user interface based on the movement of the first contact on the touch-sensitive surface. For example, movement of contact 812 in FIGS. 8E-8F is accompanied by a corresponding change in the appearance of virtual mesh 810. In some embodiments, the characteristic intensity of the contact must be above the first intensity threshold to affect an update of the background distortion when moving the contact.

In some embodiments, after determining that the first contact has a characteristic intensity above the first intensity threshold, and prior to detecting movement of the first contact on the touch-sensitive surface: the device detects (1952) a decrease in the characteristic intensity of the contact below the first intensity threshold. In some embodiments, the background distortion moves with the contact even when the characteristic intensity of the contact falls below the first intensity threshold. For example, contact 852 continues to change the appearance of virtual mesh 810 in FIGS. 8AX-8AY, until liftoff is detected in FIG. 8AZ.

In some embodiments, in response to detecting the input by the first contact, in accordance with the determination that the first contact has a characteristic intensity above the first intensity threshold, the device changes (1954) an aspect of the appearance of the background of the first user interface without changing the appearance of a respective foreground object of the one or more foreground objects in the first user interface, wherein the change of the aspect of the appearance of the background of the first user interface is independent of the position of the focus selector in the background (e.g., the color of the background changes ubiquitously). For example, in response to detecting an increase in the intensity of contact 830 above a first intensity threshold $IT_H$, the appearance of virtual mesh changes ubiquitously in FIG. 8T. In some embodiments, the aspect of the appearance of the background is a color, contrast, or brightness of an object of the background. In some embodiments, the background color, contrast, or brightness is dynamically responsive to the characteristic intensity of the contact, but not the position of the contact. For example, as the user presses harder, the background continues to change ubiquitously. In some embodiments, the change of the aspect of the appearance of the background indicates to the user that the device has entered a touch-intensity training mode. In some embodiments, certain functionalities of the locked mode are not available in the touch-intensity training mode, e.g., scrolling functions and/or activation of functions associated with foreground objects.

In some embodiments, while detecting the first input by the first contact on the touch-sensitive surface, the device detects (1956) a second input by a second contact on the touch-sensitive surface while a second focus selector is at a location in the first user interface that corresponds to the background of the user interface. In response to detecting the second input by the second contact: in accordance with a determination that the second contact does not have a characteristic intensity above the first intensity threshold, the device dynamically changes the appearance of the background of the first user interface without changing the appearance of a respective foreground object of the one or more foreground objects in the first user interface, wherein the dynamic change in the appearance of the background of the first user interface is based at least in part on the characteristic intensity of the first contact; and, in accordance with a determination that the second contact has a characteristic intensity above the first intensity threshold, the device dynamically changes the appearance of the background of the first user interface without changing the appearance of a respective foreground object of the one or more foreground objects in the first user interface, wherein the dynamic change in the appearance of the background of the first user interface is based at least in part on the characteristic intensity of the first contact, the characteristic intensity of the second contact, and positions of the first and second focus selectors on the display. For example, as illustrated with respect to contacts 854 and 856 in FIGS. 8BA-8BE. In some embodiments, the device detects contacts at multiple locations and responds to different intensities of the different contacts at the different locations. In some embodiments, the intensities at two or more of the locations affect each other (e.g., the simulated z-height of the background between two contacts with a high intensity will be lower than for the simulated z-height of the background between one contact with a high intensity and one contact with a low intensity). While dynamically changing the appearance of the background of the first user interface, the device detects termination of the first input by the first contact and termination of the second input by the second contact; and, in response to detecting termination of the first input by the first contact and termination of the second input by the second contact, the device reverts the background of the first user interface back to the first appearance of the background.

In some embodiments, in response to detecting the first input by the first contact on the touch-sensitive surface, in accordance with a determination that the first input does not have a characteristic intensity above the first intensity threshold, the device maintains (1958) the first appearance of the background of the first user interface. In some embodiments, there is no change in the background while the characteristic intensity of the input is below the first intensity threshold (e.g., the device detects an increase in characteristic intensity without distorting the background). This helps to preserve battery life by not activating the dynamic behavior at low intensity thresholds that correspond to accidental or incidental touches. For example, as illustrated in FIGS. 8H-8I.

It should be understood that the particular order in which the operations in FIGS. 19A-19F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 1900 described above with respect to FIGS. 19A-19F. For brevity, these details are not repeated here.

Figure 20:
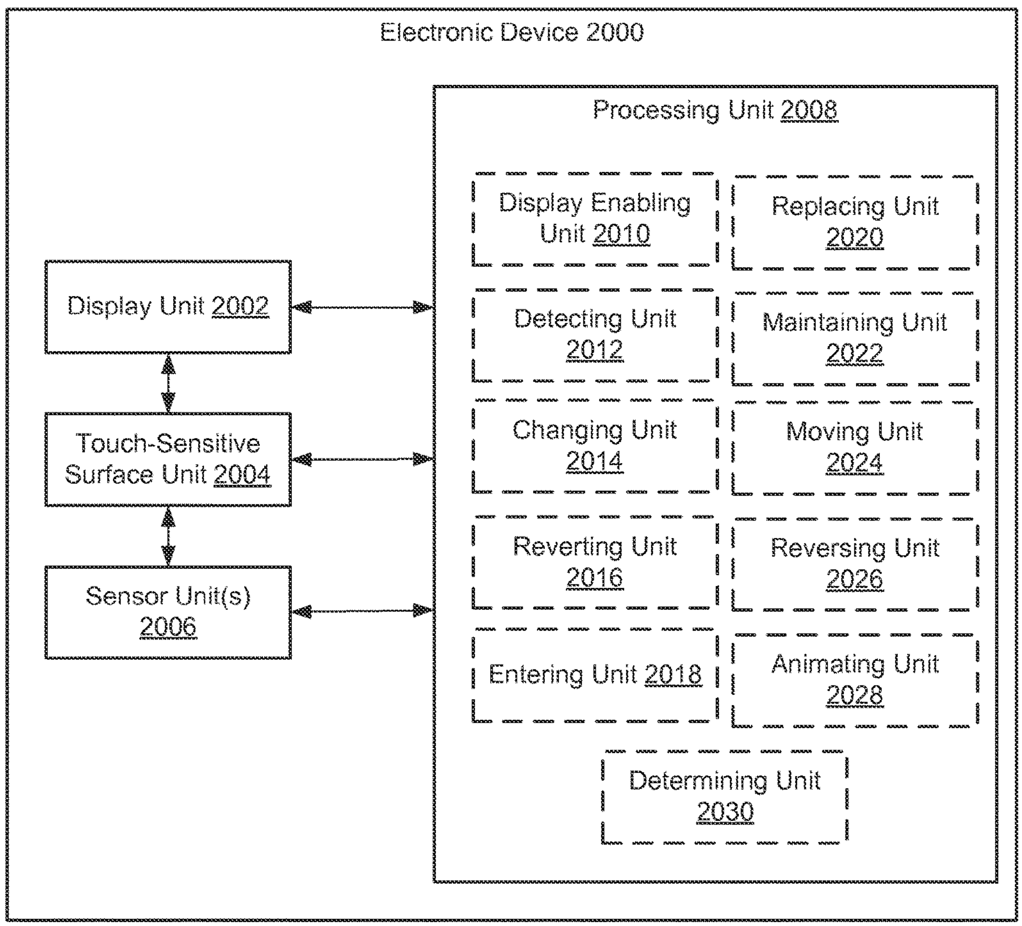
FIG. 20 is a functional block diagram of an electronic device, in accordance with some embodiments.

In accordance with some embodiments, FIG. 20 shows a functional block diagram of an electronic device 2000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, an electronic device a display unit 2002 configured to display user interfaces, backgrounds and foreground objects; a touch-sensitive surface unit 2004 configured to receive inputs; and one or more sensor units 2006 configured to detect intensity of contacts with the touch-sensitive surface unit 2004; and a processing unit 2008 coupled to the display unit 2002, the touch-sensitive surface unit 2004 and the one or more sensor units 2006. The processing unit 2008 including a display enabling unit 2010, a detecting unit 2012, a changing unit 2014, a reverting unit 2016, an entering unit 2018, a replacing unit 2020, a maintaining unit 2022, a moving unit 2024, a reversing unit 2026, an animating unit 2028 and a determining unit 2030. The processing unit 2008 configured to: enable display of a first user interface on the display, wherein the first user interface includes a background with a first appearance and one or more foreground objects (e.g., with display enabling unit 2010). While displaying the first user interface on the display, the processing unit 2008 is configured to detect a first input by a first contact on the touch-sensitive surface unit 2004 while a first focus selector is at a location in the first user interface that corresponds to the background of the first user interface (e.g., with detecting unit 2012). In response to detecting the first input by the first contact, in accordance with a determination that the first contact has a characteristic intensity above a first intensity threshold, the processing unit 2008 is configured to dynamically change the appearance of the background of the first user interface without changing the appearance of the one or more foreground objects in the first user interface (e.g., with changing unit 2014), wherein the dynamic change in the appearance of the background of the first user interface is based at least in part on the characteristic intensity of the first contact. While dynamically changing the appearance of the background of the first user interface, the processing unit 2008 is configured to detect termination of the first input by the first contact (e.g., with detecting unit 2012); and, in response to detecting termination of the first input by the first contact, the processing unit 2008 is configured to revert the background of the first user interface back to the first appearance of the background (e.g., with reverting unit 2016).

FIGS. 21A-21C are flow diagrams illustrating a method of dynamically changing a background of a user interface in accordance with some embodiments. The method 2100 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2100 are, optionally, combined and/or the order of some operations is, optionally, changed.

The device displays (2102) a first user interface on the display (e.g., user interface 800 in FIG. 8A), wherein the first user interface includes a background with a first appearance (e.g., a digital image, a pattern, or other wallpaper, e.g., virtual mesh 810 in FIG. 8A) and one or more foreground objects (e.g., time/date 802, camera icon 808, notifications, pull-down/up panel handles 804 and 806, or other user interface objects in FIG. 8A).

While displaying the first user interface on the display, the device detects (2104) an input by a first contact on the touch-sensitive surface, the first contact having a characteristic intensity above a first intensity threshold (e.g., "hint" threshold $IT_H$, light press threshold $IT_L$, or deep press threshold $IT_D$). For example, contacts 902 and 904 in FIGS. 9C and 9F, respectively.

In some embodiments, when the input is detected, the electronic device is (2106) in a locked mode in which access to a plurality of different operations that are accessible when the device is in an unlocked state is prevented (e.g., the device is locked when the input is detected and the first user interface is a lock screen user interface, as illustrated by user interface 800).

In response to detecting the input by the first contact, in accordance with a determination that, during the input, a focus selector is at a location in the first user interface that corresponds to the background of the user interface, the device dynamically changes (2108) the appearance of the background of the first user interface without changing the appearance of the one or more foreground objects in the first user interface. For example, contact 902 appears to push virtual mesh 810 backwards (e.g., in a virtual z-space) in FIG. 9C. In some embodiments, the change includes animating a sequence of images in the background in accordance with the characteristic intensity of the first contact. In some embodiments, the change includes changing a Z-depth, focus, radial position relative to the contact, color, contrast, or brightness of one or more objects of the background, wherein the dynamic change in the appearance of the background of the first user interface is based at least in part on (e.g., directly, linearly, or non-linearly proportional to) the characteristic intensity of the first contact. In accordance with a determination that a focus selector is at a location in the first user interface that corresponds to a respective foreground object of the one or more foreground objects in the first user interface, the device maintains the first appearance of the background of the first user interface.

In some embodiments, while dynamically changing the appearance of the background of the first user interface, the device detects (2110) termination of the input by the first contact; and, in response to detecting termination of the input by the first contact, the device reverts the background of the first user interface back to the first appearance of the background (e.g., restoring display of the first user interface to its appearance prior to the first input; animating the reversal of the changes in the background; and/or springing back to the first appearance with a dampening effect). For example, as illustrated by liftoff of contact 902 in FIG. 9D. In some embodiments, reversion of the background occurs in response to decreasing the characteristic intensity of the contact below a light press threshold. In some embodiments, while detecting the first input by the first contact, after the determination that the first contact has a characteristic intensity above the first intensity threshold: the device detects a decrease in the characteristic intensity of the first contact; and in response to detecting the decrease in the characteristic intensity of the first contact, in accordance with a determination that the contact has a characteristic intensity below the first intensity threshold, the device reverts the background of the first user interface back to the first appearance of background.

In some embodiments, the input by the first contact includes (2112) a first portion of the input, and detecting the input by the first contact on the touch-sensitive surface includes detecting the first portion of the first input. In response to detecting the first portion of the input, in accordance with a determination that, during first portion of the input, the focus selector is at a location in the first user interface that corresponds to a first foreground object of the one or more foreground objects, and the first portion of the input meets preview criteria (e.g., the input is a press input with a characteristic intensity in the first portion of the input that meets preview criteria, such as a characteristic intensity that meets a "peek" intensity threshold), the device displays a preview area overlaid on at least some of the background of the first user interface (e.g., a preview area 907 overlaid on the background in FIG. 9I, but, optionally, not overlaid on the first foreground object; e.g., press on a date/time object shows a preview of the "today" view). In some embodiments, the preview is displayed as described herein with respect to FIGS. 5A-5AW and 6A-6AS and corresponding methods (e.g., methods 1300 and 1500). In some embodiments, a response to an input may start before the entire input ends.

In some embodiments, after detecting the first portion of the first input, detecting a second portion of the input by the first contact; and, in response to detecting the second portion of the input by the first contact: in accordance with a determination that the second portion of the input by the first contact meets user-interface-replacement criteria, the device replaces (2114) display of the first user interface and the overlaid preview area with display of a second user interface associated with the first foreground object (e.g., as described in greater detail herein with reference to method [link claim sets JO1 and JO2]). For example, as illustrated by replacement of user interface 800 with user interface 909 in FIG. 9J. In accordance with a determination that the second portion of the input by the contact meets preview-area-disappearance criteria, the device ceases to display the preview area and displays the first user interface after the input ends (e.g., by liftoff of the contact). In some embodiments, in response to detecting liftoff, the preview area ceases to be displayed and the first user interface returns to its original appearance when preview-area-disappearance criteria are met.

In some embodiments, in response to detecting the input by the first contact: in accordance with a determination that the focus selector is at a location in the first user interface that corresponds to a second foreground object of the one or more foreground objects, the device displays (2116) additional information associated with the second foreground object (e.g., increasing the size (e.g., dynamically) of the second foreground object from a first size to a second size that is larger than the first size or displaying a preview area that displays an expanded preview of content corresponding to the second foreground object). For example, in response to the increasing intensity of contact 910 over notification 908, additional content associated with the notification is revealed in FIGS. 9L-9N. In some embodiments, increasing the size of the second foreground object includes revealing additional information associated with the foreground object. For example, pressing on a notification on the lock screen shows an expanded view of the notification or shows additional information about a displayed date/time (e.g., a portion of a user's calendar corresponding to the date/time or a today view that includes expected activity of the user corresponding to the date/time). While the additional information associated with respective second foreground object is displayed, the device detects termination of the input by the first contact (e.g., by lift-off or by decreasing the characteristic intensity of the contact below the first intensity threshold); and, in response to detecting termination of the input by the first contact, the device ceases to display the additional information associated with the second foreground object (e.g., decreasing the size of the second foreground object from the second size to the first size in the first user interface or ceasing to display displaying the preview area that displays an expanded preview of content corresponding to the second foreground object). For example, as illustrated with respect to liftoff of contact 910 in FIG. 9O. In some embodiments, the additional information associated with the second foreground object is displayed as described herein with respect to the previews described with reference to FIGS. 5A-5AW and 6A-6AS and corresponding methods (e.g., methods 1300 and 1500).

In some embodiments, the second foreground object is (2118) a notification, and expanding the second foreground object includes displaying additional content associated with the notification (e.g., as illustrated in FIGS. 9L-9O).

In some embodiments, the second foreground object is (2120) a representation of a date and/or time, and expanding the second foreground object includes displaying information about expected activities of a user of the device that correspond to the date and/or time.

In some embodiments, in response to detecting the input by the first contact: in accordance with a determination that the focus selector is at a location in the first user interface that corresponds to a third foreground object of the one or more foreground objects, the device displays (2122) a menu area overlaid on at least some of the background of the first user interface (e.g., display a quick-action menu overlaid on part of the background, but not overlaid on the third foreground object), wherein the menu area displays a plurality of selectable actions that are performed by a first application that corresponds to the third foreground object. For example, pressing on the Camera icon in FIGS. 9P-9S shows options 918, 920, 922, and 924 for opening the camera in a particular camera mode. For example, pressing on the Continuity icon shows options for launching an app associated with a second connected device. In some embodiments, the menu is displayed as described herein with respect to FIGS. 5A-5AW, 6A-6AS, 11A-11AT, and 12A-12X and corresponding methods (e.g., methods 1300, 1500, 2500, 2700, and 2900).

In some embodiments, the third foreground object is (2124) a representation of a suggested application (e.g., that, when activated such as by swiping upward, causes a corresponding application to be launched) and the menu area includes representations of additional suggested applications (e.g., that, when activated cause a corresponding application to be launched).

In some embodiments, the third foreground object is (2126) a representation of a suggested application (e.g., that, when activated such as by swiping upward, causes a corresponding application to be launched) and the menu area includes representations of actions associated with the suggested application (e.g., that, when activated cause the corresponding actions to be performed e.g., such as the quick actions described with reference to method [link back to JO7 and associated table]).

In some embodiments, the third foreground object is (2128) a representation of a media capture application (e.g., that, when activated such as by swiping upward, causes the media capture application to be launched in a default mode of operation such as a still camera mode of operation or a last used mode of operation) and the menu area includes representations of additional modes of operation for the media capture application (e.g., that, when activated cause the media capture application to be launched in a corresponding mode of operation (e.g., a video capture mode of operation or a panorama capture mode of operation).

Figure 22:
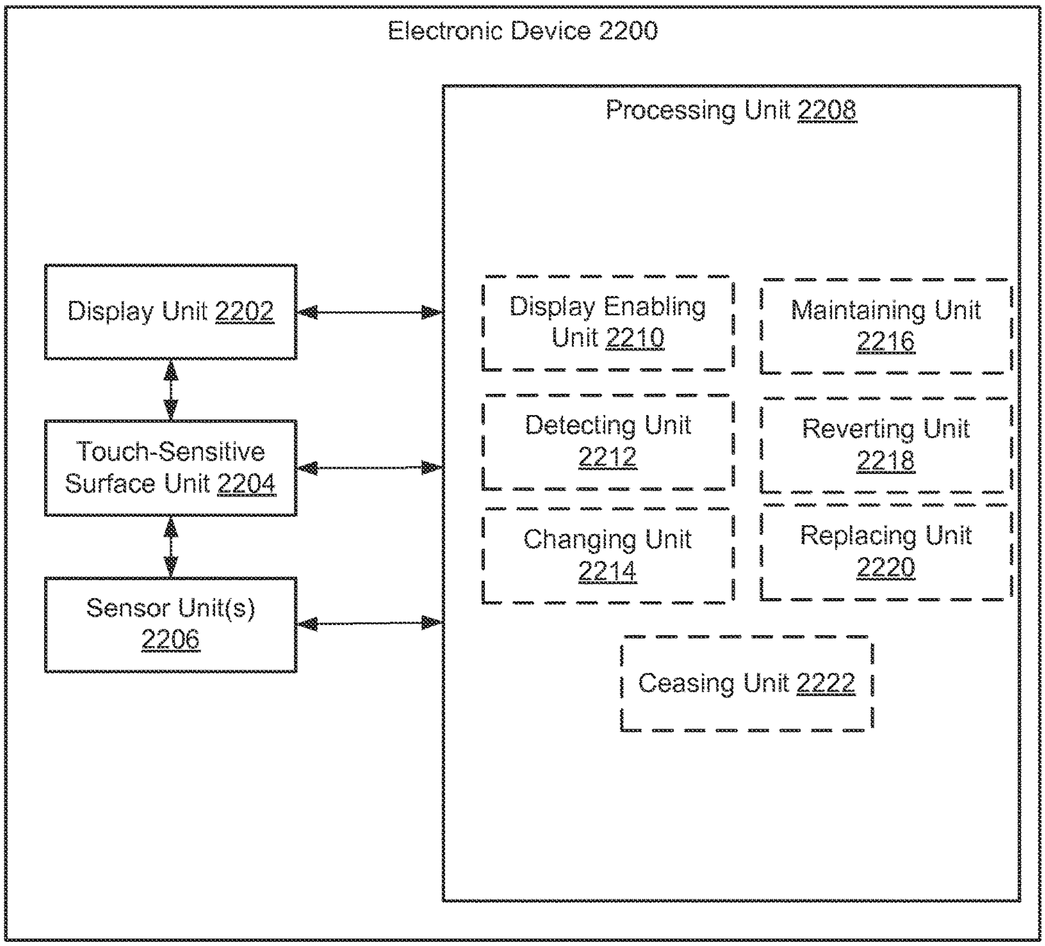
FIG. 22 is a functional block diagram of an electronic device, in accordance with some embodiments.

In accordance with some embodiments, FIG. 22 shows a functional block diagram of an electronic device 2200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 22 are, optionally, combined or separated into sub-blocks to implement the principles of the various described embodiments. Therefore, the description herein optionally supports any possible combination or separation or further definition of the functional blocks described herein.

As shown in FIG. 22, an electronic device includes a display unit 2202 configured to display user interfaces, backgrounds and foreground objects; a touch-sensitive surface unit 2204 configured to receive inputs; one or more sensor units 2206 configured to detect intensity of contacts with the touch-sensitive surface unit 2204; and a processing unit 2208 coupled to the display unit 2202, the touch-sensitive surface unit 2204 and the one or more sensor units 2206. The processing unit 2208 including display enabling unit 2210, detecting unit 2212, changing unit 2214, maintaining unit 2216, reverting unit 2218, replacing unit 2220 and ceasing unit 2222. The processing unit 2208 configured to enable display of a first user interface on the display unit 2202 (e.g., with display enabling unit 2210), wherein the first user interface includes a background with a first appearance and one or more foreground objects. While displaying the first user interface on the display unit 2202, the processing unit 2208 is configured to detect an input by a first contact on the touch-sensitive surface unit 2204 (e.g., with detecting unit 2212), the first contact having a characteristic intensity above a first intensity threshold. In response to detecting the input by the first contact, in accordance with a determination that, during the input, a focus selector is at a location in the first user interface that corresponds to the background of the user interface, the processing unit 2208 is configured to dynamically change the appearance of the background of the first user interface without changing the appearance of the one or more foreground objects in the first user interface (e.g., with changing unit 2214), wherein the dynamic change in the appearance of the background of the first user interface is based at least in part on the characteristic intensity of the first contact; and, in accordance with a determination that a focus selector is at a location in the first user interface that corresponds to a respective foreground object of the one or more foreground objects in the first user interface, the processing unit 2208 is configured to maintain the first appearance of the background of the first user interface (e.g., with maintaining unit 2216).

FIGS. 23A-23C are flow diagrams illustrating a method of toggling between different actions based on input contact characteristics in accordance with some embodiments. The method 2300 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2300 are, optionally, combined and/or the order of some operations is, optionally, changed.

The device displays (2302) a first user interface on the display (e.g., lock screen user interface 800 in FIG. 10A), where the first user interface includes a background (e.g., virtual mesh 810); the first user interface includes a foreground area overlaying a portion of the background (e.g., control menu 1006 in FIG. 10D); and the foreground area includes a plurality of user interface objects (e.g., airplane icon 1008, associated with placing and removing the device from an airplane mode of operation; WiFi icon 1010, associated with connecting the device with local WiFi networks; Bluetooth icon 1012, associated with connecting the device with local Bluetooth devices; Do not disturb icon 1004, associated with placing and removing the device from a private mode of operation; lock icon 1016, associated with locking the orientation of the display of the device; flashlight icon 1018, associated with turning on the LED array of the device in various modes; timer icon 1020, associated with performing timing action on the device; calculator icon 1022, associated with performing mathematical operations; and camera icon 1024, associated with various image acquisition modalities, as illustrated in FIG. 10D). In some embodiments, the foreground area displays settings icons and application icons for the device. In some embodiments, the foreground area displays commonly used settings and applications, like Control Center in iOS by Apple Inc. In some embodiments, the user interface objects in the foreground area are icons for settings and/or applications, such as WiFi, Bluetooth, do not disturb, rotation lock, flashlight, play, pause, skip, volume, brightness, air drop control, timer, camera, calculator, and/or time/date icons.

The device detects (2304) an input by a contact on the touch-sensitive surface while a first focus selector is at a first user interface object in the plurality of user interface objects in the foreground area (e.g., contacts 1026, 1030, and 1034 in FIGS. 10E, 10G, and 10J, respectively.

In some embodiments, when the input is (2306) detected, the electronic device is in a locked mode in which access to a plurality of different operations that are accessible when the device is in an unlocked state is prevented (e.g., the device is locked when the input is detected and the first user interface is a lock screen user interface with an overlaid control center area). In some embodiments, while in the locked mode, access to sensitive information (e.g., previously captured images and videos, financial information, electronic communications, etc.) is protected by a passcode and/or biometric authentication.

In response to detecting the input by the contact, in accordance with a determination that the input by the contact meets one or more first press criteria, which include a criterion that is met when a characteristic intensity of the contact remains below a first intensity threshold during the input (e.g., "hint" threshold $IT_H$, light press threshold $IT_L$, or deep press threshold $IT_D$), the device performs (2308) a first predetermined action that corresponds to the first user interface object in the foreground area. For example, in response to lift off of contact 1026 in FIG. 10F, the device is placed in a private mode of operation for an indeterminate period of time. In accordance with a determination that the input by the contact meets one or more second press criteria, which include a criterion that is met when the characteristic intensity of the contact increases above the first intensity threshold during the input, the device performs a second action, distinct from the first predetermined action, that corresponds to the first user interface object in the foreground area (e.g., a deep press on the WiFi icon switches selected networks or enters a network selection user interface; a deep press on a do not disturb icon sets a time to end do not disturb mode (and optionally turns on the do not disturb mode) or sets a geofence to end do not disturb mode; a deep press on a flashlight icon changes a parameter of the light being shined (and optionally turns on the flashlight); a deep press on a volume or brightness slider enters fine scrubbing mode. For example, in response to detecting liftoff of contact 1030 in FIG. 10I, the device is placed in a private mode of operation for only thirty minutes.

In some embodiments, the first predetermined action changes (e.g., toggles) (2310) a setting that corresponds to the first user interface object in the foreground area. In some embodiments, movement of the focus selector off of the first user interface object, followed by lift off of the contact, does not toggle or otherwise change the setting.

In some embodiments, the first predetermined action opens (2312) an application that corresponds to the first user interface object. In some embodiments, opening the application replaces display of the first user interface with a second user interface that corresponds to the opened application.

In some embodiments, the second predetermined action displays (2314) a menu area overlaying a portion of the foreground area, wherein the menu area displays one or more selectable actions that are performed by an application that corresponds to the first user interface object. For example, a deep press input on AirDrop opens a menu with options for making device files deliverable to nearby devices. In some embodiments, movement of the focus selector off of the first user interface object, followed by lift off of the contact, does not display the menu area.

In some embodiments, the foreground area is (2316) displayed overlaying the portion of the background in response to detecting a gesture (e.g., a swipe gesture including movement 1004 of contact 1002 in FIGS. 10A-10D) that starts at an edge of the touch-sensitive surface.

In some embodiments, the first predetermined action includes (2318) toggling wireless connectivity (e.g., turning on/off WiFi), and the second predetermined action includes displaying a user interface for selecting a wireless network to join.

In some embodiments, the first predetermined action includes (2320) toggling a limited notification mode of operation (e.g., turning on/off a do not disturb mode of operation), and the second predetermined action includes displaying a user interface for setting a timer associated with the limited notification mode of operation (e.g., specifying a time to turn on or turn off the do not disturb mode of operation).

In some embodiments, the first predetermined action includes (2322) toggling a flashlight function (e.g., turning on/off a light on the device to serve as a flashlight), and the second predetermined action includes displaying a user interface for selecting a mode of operation for the flashlight function (e.g., selecting a brightness level, a strobe effect etc.).

In some embodiments, the first predetermined action includes (2324) launching a timer application (e.g., opening an application for starting or stopping a timer), and the second predetermined action includes displaying a user interface for performing timer management operations (e.g., starting, stopping, or pausing a timer) without launching the timer application.

In some embodiments, the first predetermined action includes (2326) launching an alarm application (e.g., opening an application for starting or stopping a timer), and the second predetermined action includes displaying a user interface for performing alarm management operations (e.g., setting, disabling, or snoozing an alarm) without launching the alarm application.

In some embodiments, the first predetermined action includes (2328) launching a corresponding application, and the second predetermined action includes displaying a user interface for performing operations associated with the corresponding application without launching the corresponding application (e.g., such as the quick actions described with reference to method [link back to JO7 and associated table]). For example, in response to detecting an increase in the intensity of contact 1034 above predetermined intensity threshold $IT_L$, the device displays quick action menu 1036 in FIG. 10K.

In some embodiments, in response to detecting the input by the contact: in accordance with a determination that the input by the contact meets one or more third press criteria, which include a criterion that is met when a characteristic intensity of the contact increases above a second intensity threshold (e.g., deep press threshold $IT_D$), greater than the first intensity threshold (e.g., light press threshold $IT_L$) during the input, the device performs (2330) a third predetermined action, distinct from the first predetermined action and the second predetermined action, that corresponds to the first user interface object in the foreground area.

In some embodiments, prior to displaying the foreground area, the device displays (2332) the first user interface on the display, wherein the first user interface is a lock screen user interface that includes a background with a first appearance (e.g., a digital image, a pattern, or other wallpaper) and one or more foreground objects (e.g., time/date, camera icon, notifications, pull-down/up panel handles, or other user interface objects). While displaying the lock screen user interface on the display, the device detects an input by a second contact on the touch-sensitive surface while a focus selector is at a location in the lock screen user interface that corresponds to the background of the lock screen user interface; and, in response to detecting the input by the second contact, in accordance with a determination that the second contact has a characteristic intensity above the first intensity threshold (e.g., "hint" threshold $IT_H$, light press threshold $IT_L$, or deep press threshold $IT_D$), the device dynamically changes the appearance of the background of the lock screen user interface without changing the appearance of the one or more foreground objects in the lock screen user interface. In some embodiments, the change includes animating a sequence of images in the background in accordance with the characteristic intensity of the second contact. In some embodiments, the change includes changing a Z-depth, focus, radial position relative to the contact, color, contrast, or brightness of one or more objects of the background, wherein the dynamic change in the appearance of the background of the lock screen user interface is based at least in part on the characteristic intensity of the second contact (e.g., directly, linearly, non-linearly proportional to, or at a rate determined based on the characteristic intensity of the contact).

Figure 24:
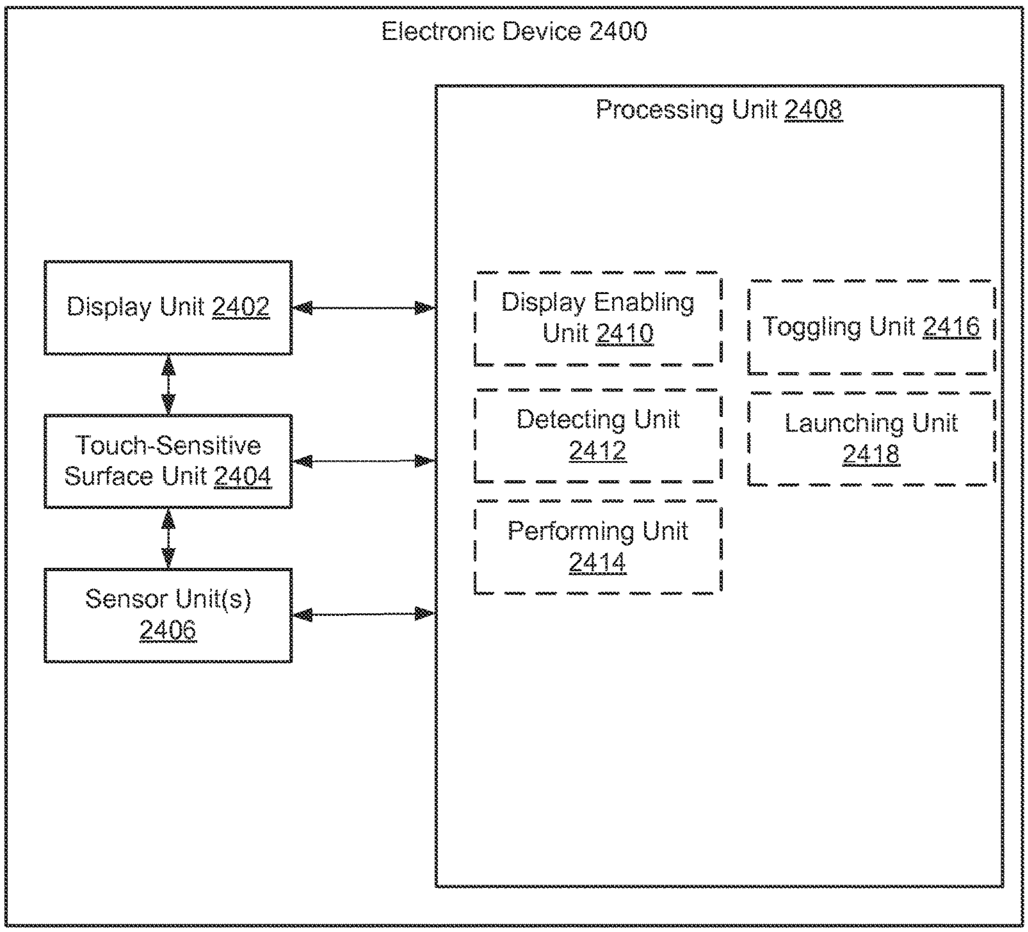
FIG. 24 is a functional block diagram of an electronic device, in accordance with some embodiments.

In accordance with some embodiments, FIG. 24 shows a functional block diagram of an electronic device 2400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 24 are, optionally, combined or separated into sub-blocks to implement the principles of the various described embodiments. Therefore, the description herein optionally supports any possible combination or separation or further definition of the functional blocks described herein.

As shown in FIG. 24, an electronic device includes a display unit 2402 configured to display user interfaces, backgrounds and foreground objects; a touch-sensitive surface unit 2404 configured to receive inputs; one or more sensor units 2406 configured to detect intensity of contacts with the touch-sensitive surface unit 2404; and a processing unit 2408 coupled to the display unit 2402, the touch-sensitive surface unit 2404 and the one or more sensor units 2406. The processing unit 2408 including display enabling unit 2410, detecting unit 2412, performing unit 2414, toggling unit 2416, and launching unit 2418. The processing unit 2408 is configured to: enable display of a first user interface on the display unit 2402 (e.g., with display enabling unit 2410), wherein the first user interface includes a background; the first user interface includes a foreground area overlaying a portion of the background; and the foreground area includes a plurality of user interface objects. The processing unit 2408 is configured to detect an input by a contact on the touch-sensitive surface unit 2404 while a first focus selector is at a first user interface object in the plurality of user interface objects in the foreground area (e.g., with detecting unit 2412). In response to detecting the input by the contact: in accordance with a determination that the input by the contact meets one or more first press criteria, which include a criterion that is met when a characteristic intensity of the contact remains below a first intensity threshold during the input, the processing unit 2408 is configured to perform a first predetermined action that corresponds to the first user interface object in the foreground area (e.g., with performing unit 2414). In accordance with a determination that the input by the contact meets one or more second press criteria, which include a criterion that is met when the characteristic intensity of the contact increases above the first intensity threshold during the input, the processing unit 2408 is configured to perform a second action, distinct from the first predetermined action, that corresponds to the first user interface object in the foreground area (e.g., with performing unit 2414).

The operations in the information processing methods described above are, optionally implemented by running one or more functional modules in information processing apparatus such as general purpose processors (e.g., as described above with respect to FIGS. 1A and 3) or application specific chips.

FIGS. 25A-25H are flow diagrams illustrating a method 2500 of launching an application or displaying a quick action menu in accordance with some embodiments. The method 2500 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2500 are, optionally, combined and/or the order of some operations is, optionally, changed.

The device displays (2502), on the display, an application launching user interface that includes a plurality of application icons for launching corresponding applications. For example, user interface 500 displays application launch icons 480, 426, 428, 482, 432, 434, 436, 438, 440, 442, 444, 446, 484, 430, 486, 488, 416, 418, 420, and 424 in FIGS. 11A-11B, 11D-11I, 11K-11M, 11O-11AA, and 11AC-11AT.

While displaying on the application launching user interface, the device detects (2504) a first touch input that includes detecting a first contact at a location on the touch-sensitive surface that corresponds to a first application icon (e.g., contact 1102 on messages launch icon 424 in FIG. 11B) of the plurality of application icons, wherein the first application icon is an icon for launching a first application that is associated with one or more corresponding quick actions.

In response to detecting the first touch input, in accordance with a determination that the first touch input meets one or more application-launch criteria, the device launches (2506) (e.g., opens) the first application. For example, upon detecting liftoff of contact 1102, device 100 launches a messaging application associated with messaging launch icon 424, including display of default user interface 1104 in FIG. 11C. In some embodiments, the application-launch criteria are met when the detected input is a tap gesture. In some embodiments, a tap gesture is detected if the time between touch down and lift off of a contact is less than a predetermined time, independent of the intensity of the contact between detecting touch down and lift off. In some embodiments, the application-launch criteria that include a criterion that is met when liftoff of the first contact is detected before a characteristic intensity of the first contact increases above a respective intensity threshold. In some embodiments, the application launch criteria include a criterion that is met when the first contact is substantially stationary (e.g., less than a threshold amount of movement of the first contact is detected during a time threshold). In some embodiments, launching the application includes replacing display of the application launch interface with a default view of the application or a last displayed view of the application. In accordance with a determination that the first touch input meets one or more quick-action-display criteria which include a criterion that is met when the characteristic intensity of the first contact increases above a respective intensity threshold, the device concurrently displays one or more quick action objects (e.g., quick action icons that when selected perform a corresponding quick action) associated with the first application along with the first application icon without launching the first application.

In some embodiments, the application-launch criteria are (2508) criteria that are configured to be met when the characteristic intensity of the contact does not increase above the respective intensity threshold (e.g., the application-launch criteria are capable of being satisfied without the characteristic intensity of the contact increasing above the respective intensity threshold that is required to trigger display of the one or more quick action objects such as in the quick action menu). For example, the tap input illustrated in FIGS. 11A-11C meets application-launch criteria because the intensity of contact 1102 never reaches intensity threshold $IT_L$.

In some embodiments, during the first touch input, the device detects (2510) changes in the characteristic intensity of the first contact before the quick-action-display criteria are met and, the device dynamically adjusts an appearance of the other application icons based on the characteristic intensity of the first contact to progressively deemphasize the plurality of application icons other than the first application icon as the characteristic intensity of the first contact increases. For example, hint graphic 1108 dynamically grows from under messaging launch icon 424 in response to increasing intensity of contact 1106 above hint threshold $IT_H$ in FIGS. 11E-11F. Additional details regarding displaying a hint that a quick-action menu can be invoked are provided with respect to method 1300 and corresponding user interfaces shown in FIGS. 5A-5AW.

In some embodiments, concurrently displaying the one or more quick action objects with the first application icon includes (2512) displaying the one or more quick action objects in a menu that includes a plurality of quick action objects (e.g., next to or adjacent to the first application icon and, optionally overlaid on one or more of the other application icons). For example, quick action objects 1112, 1114, 1116, and 1118 are displayed in quick action menu 1110, adjacent to messages launch icon 424 and overlaying camera launch icon 430, voice memo launch icon 486, and networking folder launch icon 488, in FIG. 11D.

In some embodiments, the quick action objects within the menu are (2514) ordered within the menu based on the location of the icon within the application launch user interface. Additional details regarding displaying quick action objects in a quick action menu are provided with respect to method 2700, and corresponding user interfaces shown in FIGS. 5E, 5U, 5AT, and SAW.

In some embodiments, the application icon includes (2516) an indication of a number of notifications (e.g., a notification badge) and the one or more quick action objects include a quick action object associated with one or more of the notifications (e.g., an option for replying to a most recent message, or listening to a most recent voicemail). For example, messages launch icon 424 in FIG. 11H includes a notification badge indicating that there are four notifications pending for the associated messaging application. Quick action objects 1112, 1114, and 1116 are associated with an option to reply to recently received messages triggering the notifications. For example, quick action object 1112 indicates that there are two recently received messages from G. Hardy, and provides text from one of the messages ("I've got number 8!").

In some embodiments, the one or more quick action objects include (2518) a respective quick action object that corresponds to a quick action selected based on recent activity within the first application (e.g., a recently played playlist, a recently viewed/edited document, a recent phone call, a recently received message, a recently received email). For example, quick action objects 1160, 1162, 1164, and 1166 in quick action menu 1158, illustrated in FIG. 11AN, correspond to recently played albums or playlists within the music application associated with music launch icon 480.

In some embodiments, the one or more quick action objects include (2520) a respective quick action object that is dynamically determined based on a current location of the device (e.g., marking a current location, directions from the current location to the user's home or work, nearby users, recently used payment accounts, etc).

In some embodiments, in response to detecting the first touch input, in accordance with the determination that the first touch input meets the quick-action-display criteria, the device deemphasizes (2522) a plurality of the application icons relative to the first application icon in conjunction with displaying the one or more quick action objects. For example, device 100 dynamically blurs unselected application launch icons in FIGS. 11E-11G in response to increasing intensity of contact 1106 leading up to, and above, threshold $IT_L$.

In some embodiments, in response to detecting the first touch input, in accordance with a determination that the first touch input meets one or more interface-navigation criteria that include a criterion that is met when more than a threshold amount of movement of the first contact is detected before the characteristic intensity of the first contact increases above the respective intensity threshold, the device ceases (2524) to display at least a portion of the application launching user interface and displays at least a portion of a different user interface on a portion of the display that was previously occupied by the plurality of application icons in the application launching user interface immediately prior to detecting the first touch input (e.g., replace display of the home screen with a search user interface if the user swipes down or to the right, or replace display of the first page of the home screen with a second page of the home screen that includes different application icons if the user swipes to the left). For example, in response to detecting a swipe gesture including movement 1126 of contact 1124 in FIGS. 11L-11M, device enters a search modality and replaces display of home screen user interface 1100 with searching user interface 1128 in FIG. 11N.

In some embodiments, in response to detecting movement of the first contact before the characteristic intensity of the first contact increases above the respective intensity threshold, the device moves (2526) a plurality of application icons in accordance with the movement of the first contact (e.g., move the application launch icons a distance, direction, and/or speed that corresponds to the distance, direction and/or speed of the first contact on the touch-sensitive surface). For example, in response to detecting a swipe gesture including movement 1126 of contact 1124 in FIGS. 11L-11M, and prior to replacing display of home screen user interface 1100 with searching user interface 1128, the device moves application launch icons (e.g., dynamically) with the movement of contact 1124 in FIGS. 11L-11N.

In some embodiments, in response to detecting the first touch input, in accordance with a determination that the first touch input meets icon-reconfiguration criteria that include a criterion that is met when the first contact is detected on the touch-sensitive surface for more than a reconfiguration time threshold before the characteristic intensity of the first contact increases above the respective intensity threshold, the device enters (2528) an icon reconfiguration mode in which one or more application icons can be reorganized within the application launching interface (e.g., in response to movement of a contact that starts at a location that corresponds to an application icon, the device moves the icon around the user interface relative to other icons). For example, in response to a long-press gesture, including contact 1130 in FIG. 11O, device 100 enters icon-reconfiguration mode, as illustrated in FIG. 11P. In some embodiments, in the icon reconfiguration mode, one or more of the application icons include application icon removal affordances that, when selected, cause the application icon to be removed from the application launch interface and, optionally cause the application to be deleted from the device (e.g., deletion icons 1132 in FIG. 11P).

In some embodiments, while displaying the one or more quick action objects concurrently with the application icon, the device detects (2530) a second touch input (e.g., a tap gesture) that includes detecting a second contact at a location on the touch-sensitive surface that corresponds to the first application icon and meets the application launch criteria. In some embodiments, in response to detecting the second touch input, the device launches the first application (e.g., displays a default view of the first application). For example, in response to detecting a tap gesture, including contact 534 while quick action menu 528 is displayed in FIG. 5A, the device launches the associated messaging application in a default state, including display of user interface 535 in FIG. 5AB.

In some embodiments, while displaying the one or more quick action objects concurrently with the application icon, the device detects (2532) a third touch input that includes detecting a third contact at a location on the touch-sensitive surface that corresponds to the first application icon, wherein the third touch input meets icon-reconfiguration criteria that include a criterion that is met when the third contact is detected on the touch-sensitive surface for more than a reconfiguration time threshold before the characteristic intensity of the third contact increases above the respective intensity threshold. In response to detecting the third touch input, the device enters an icon reconfiguration mode in which application icons can be reorganized within the application launching interface (e.g., in response to movement of the third contact that starts a location that corresponds to an application icon, the device moves the icon around the user interface relative to other icons). In some embodiments, in the icon reconfiguration mode, one or more of the application icons include application icon removal affordances that, when selected cause the application icon to be removed from the application launch interface and, optionally cause the application to be deleted from the device. For example, device 100 enters icon-reconfiguration mode upon detection of a long-press gesture including contact 1136 while displaying quick-action menu 1110 in FIG. 11T. Icon-reconfiguration mode includes display of deletion icons 1132 in FIG. 11U.

Figure 11T:
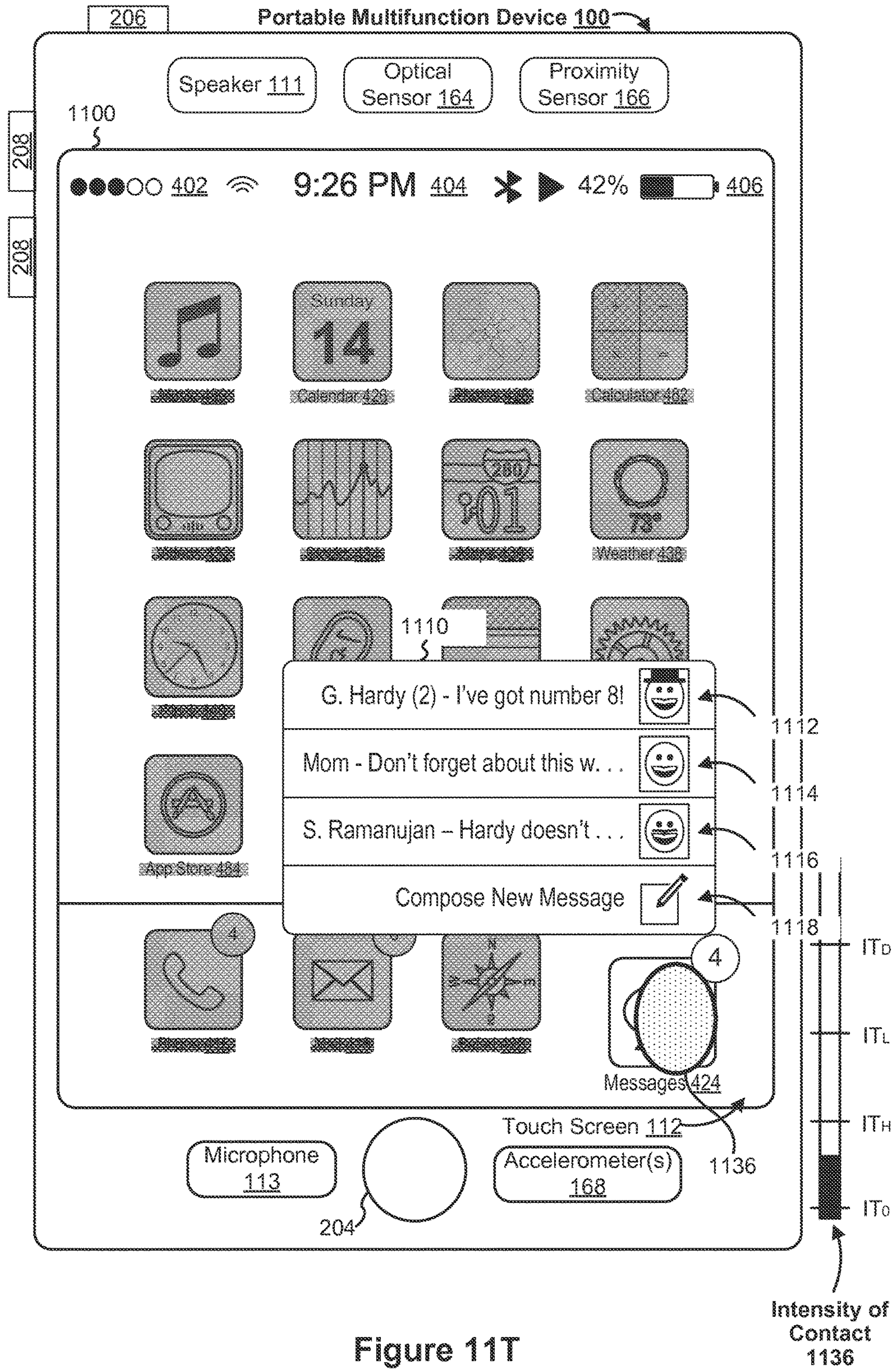
Figure 11U:
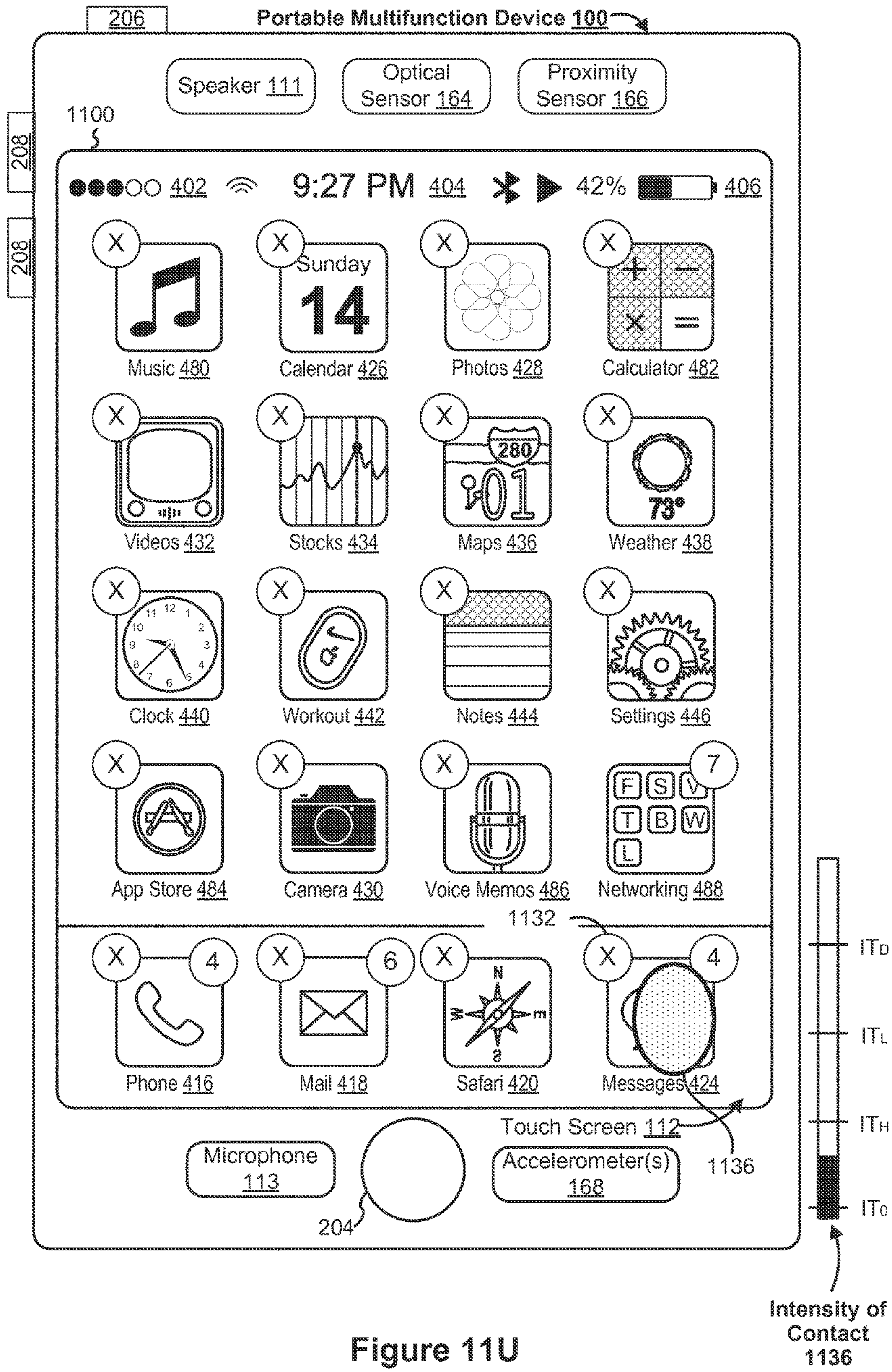
Figure 11V:
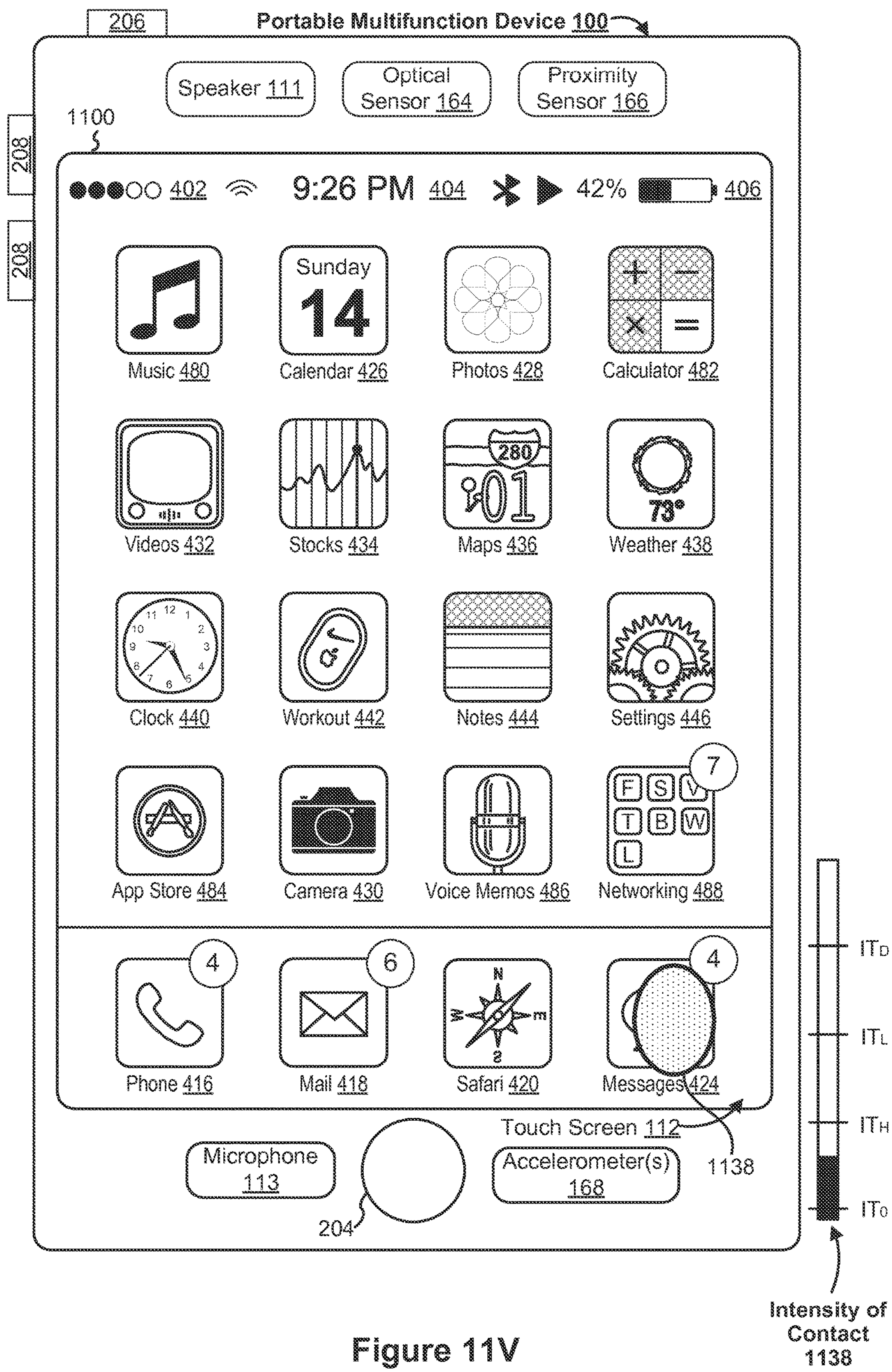
Figure 11W:
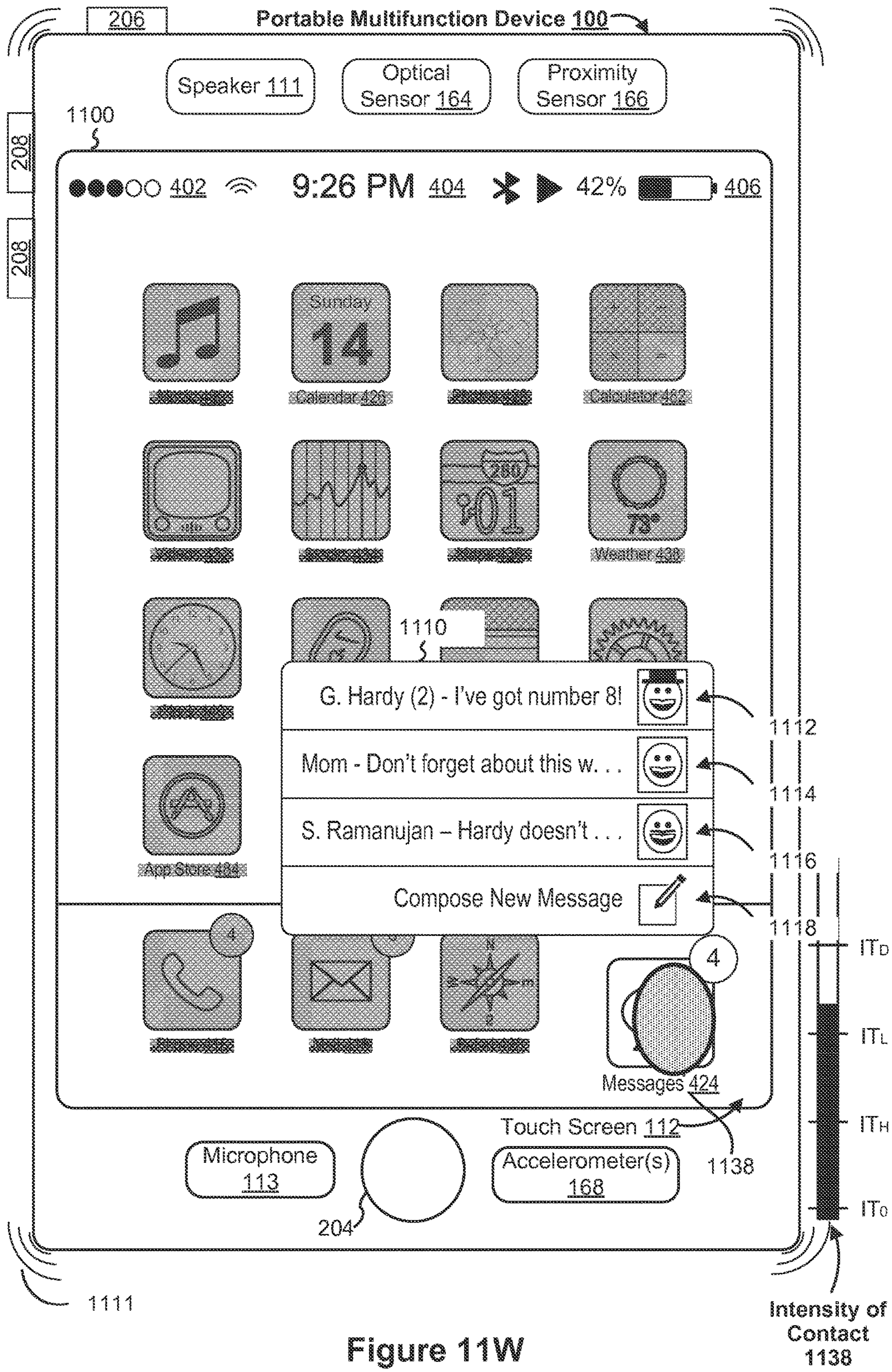
Figure 11X:
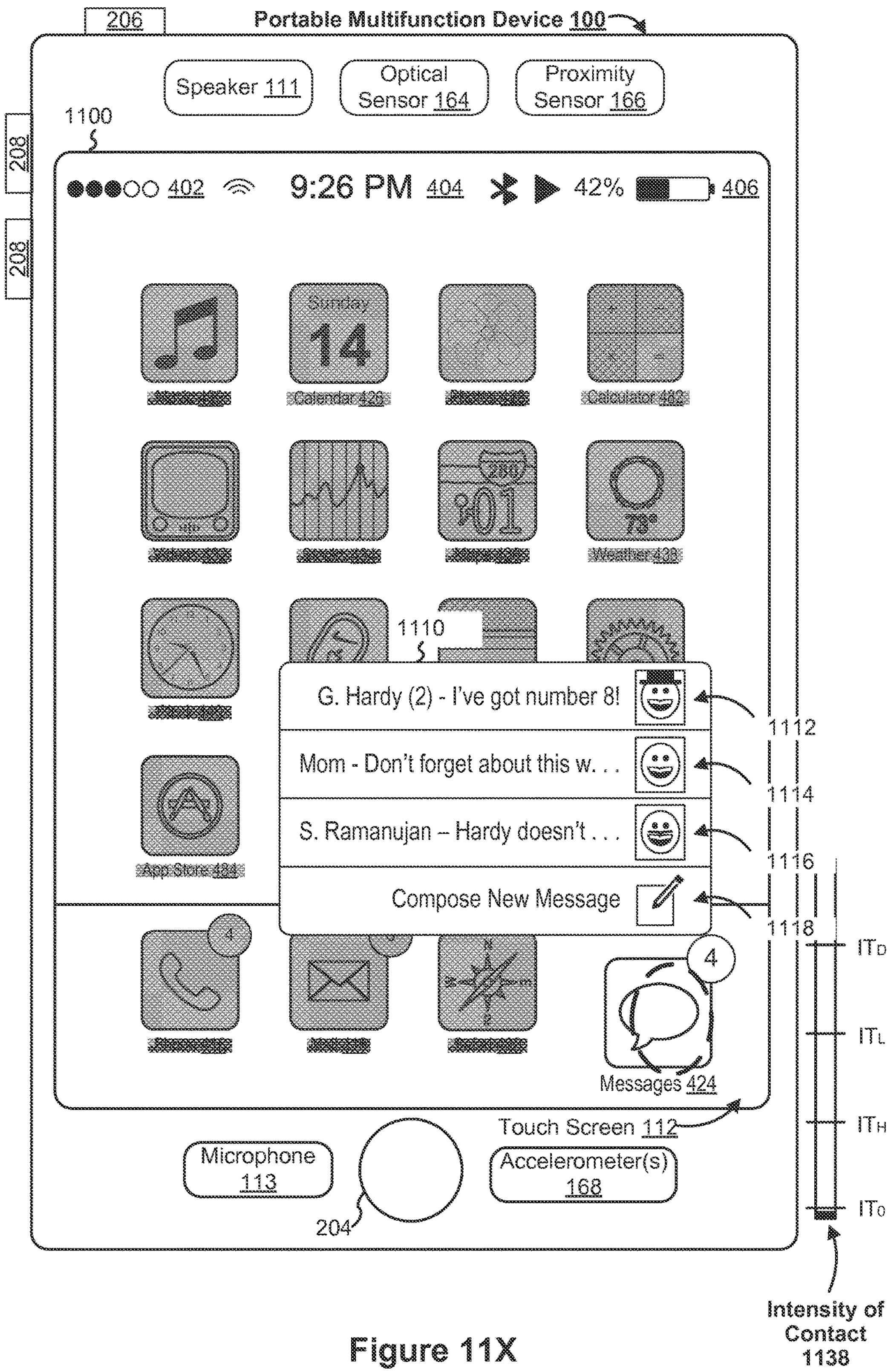
Figure 11Y:
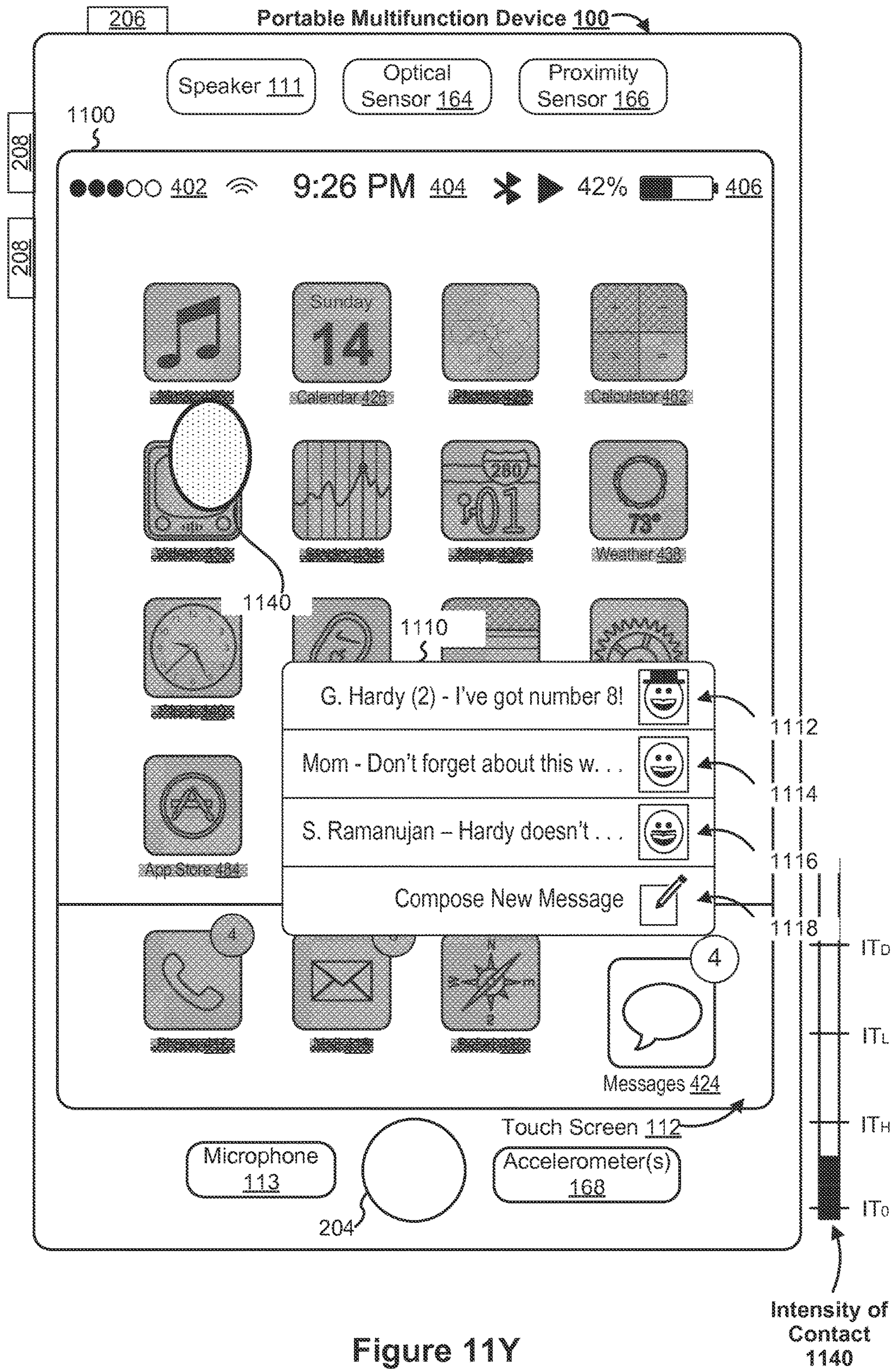

In some embodiments, entering the icon reconfiguration mode in response to detecting the third touch input includes (2534) ceasing to display the one or more quick action objects (and, optionally, reversing a de-emphasis of application icons other than the first application icon). For example, device 100 terminates display of quick-action menu 1110, as illustrated in FIG. 11T, in response to invoking icon-reconfiguration mode in FIG. 11U.

Figure 11Z:
Figure 11A:
Figure 11A:
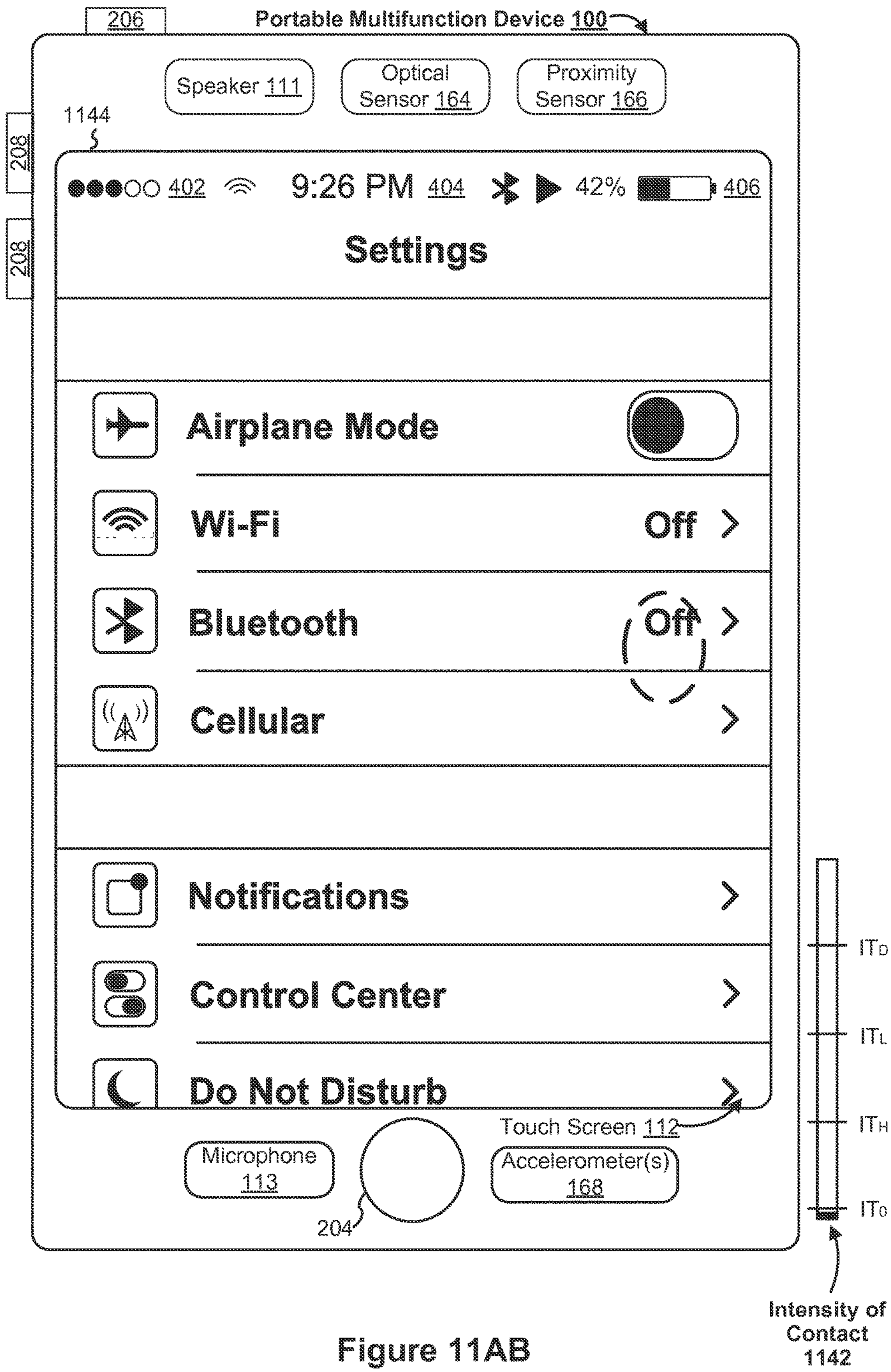
Figure 11A:
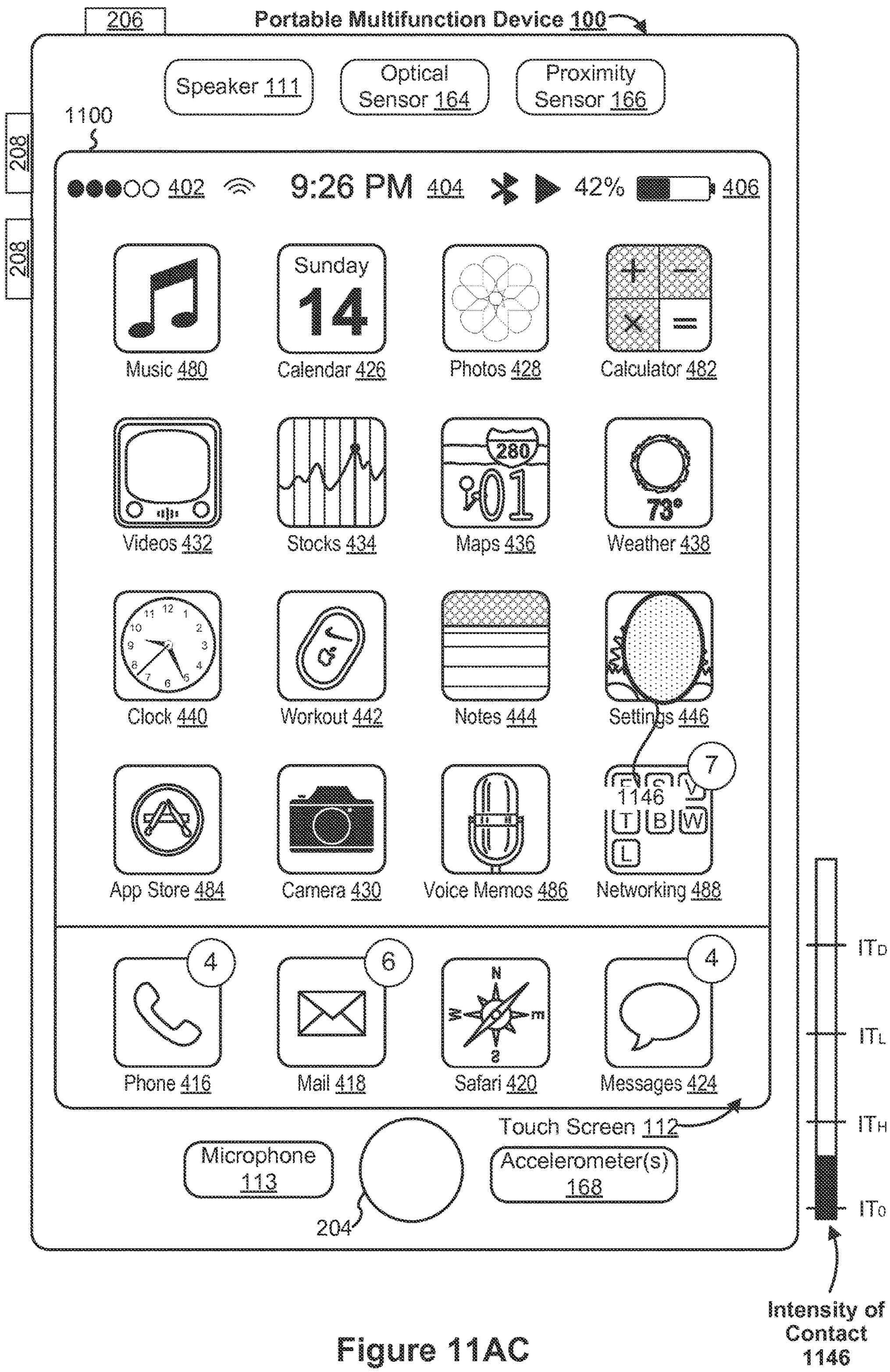
Figure 11A:
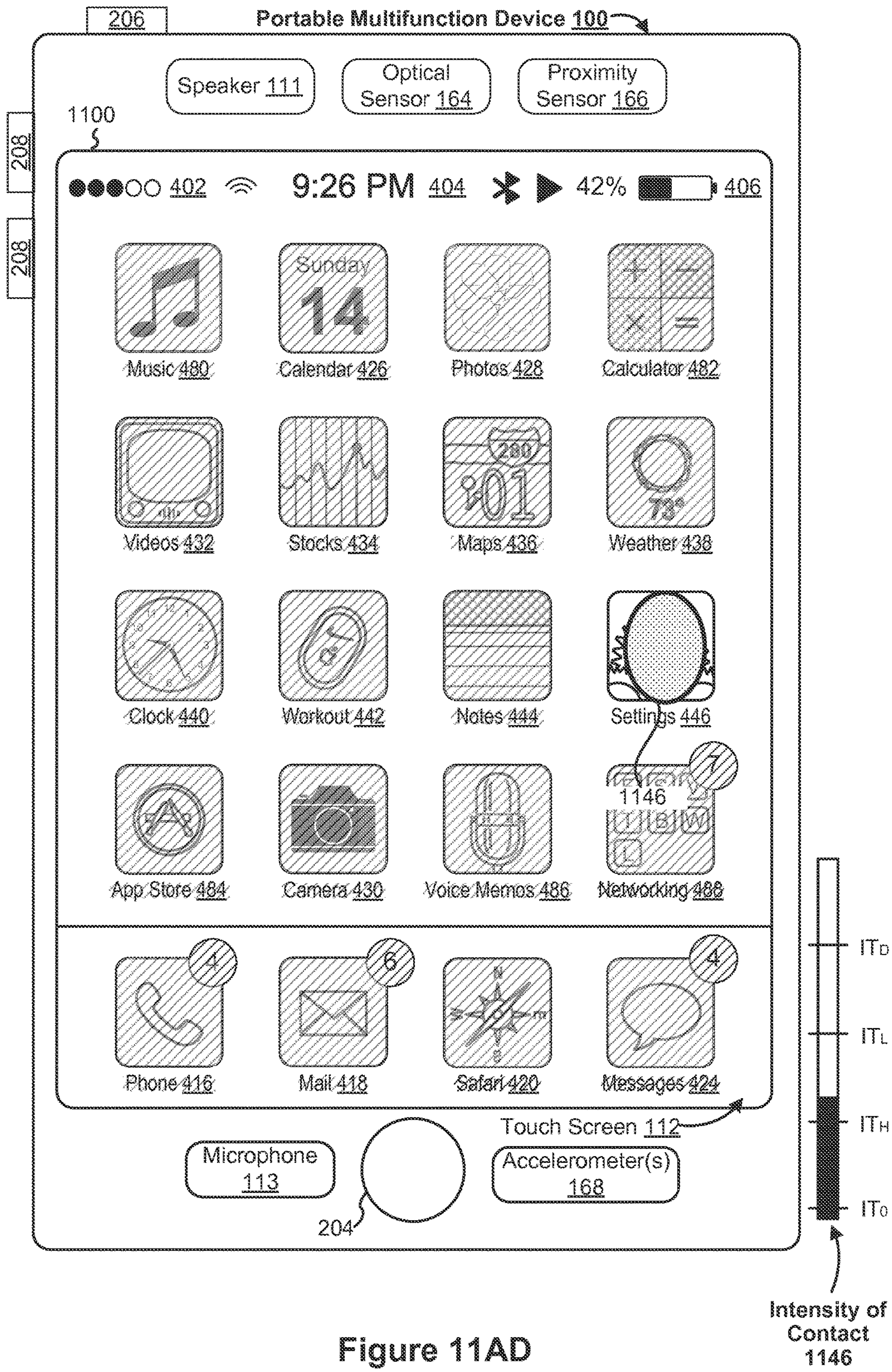
Figure 11A:
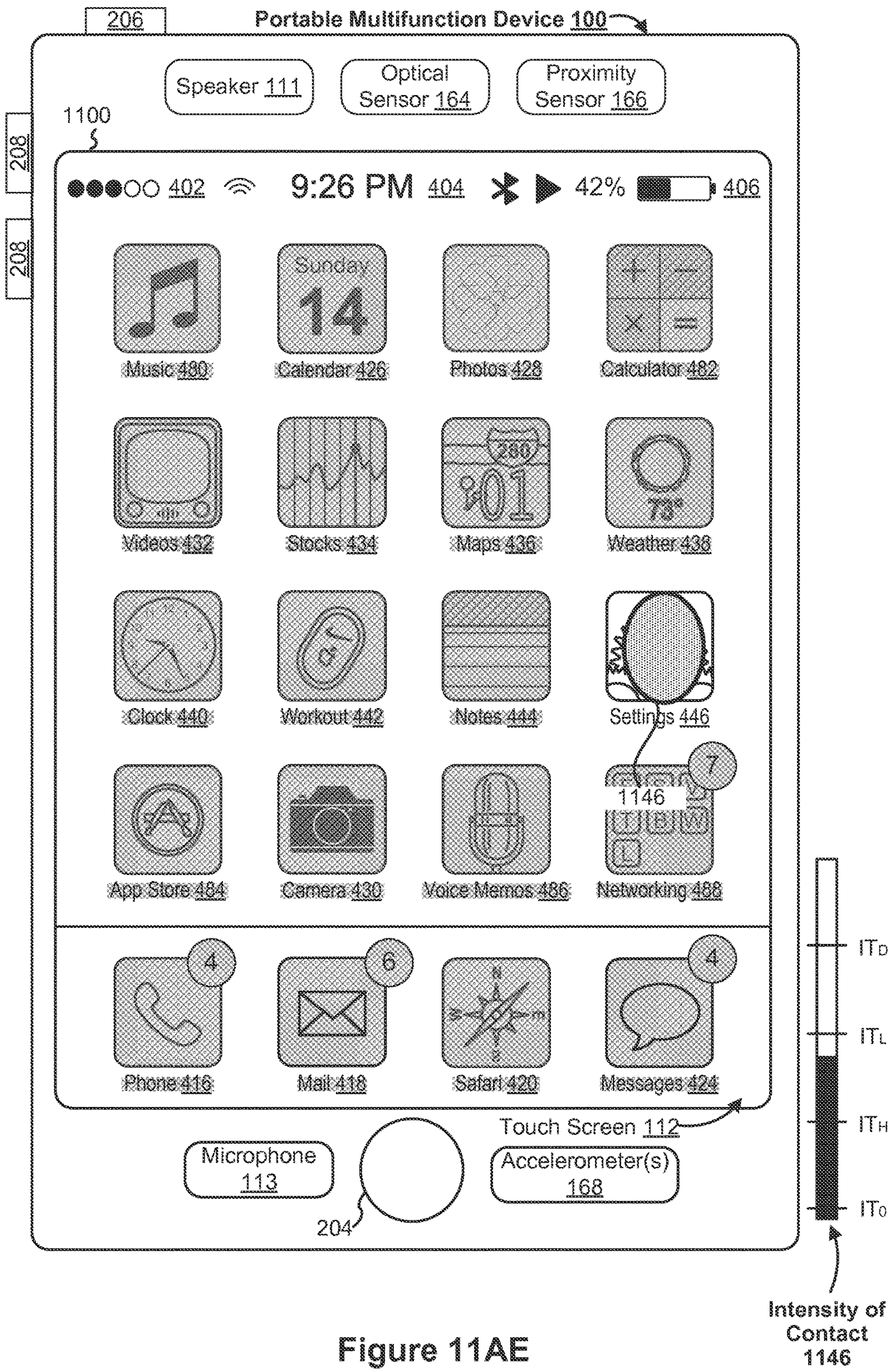
Figure 11A:
Figure 11A:
Figure 11A:
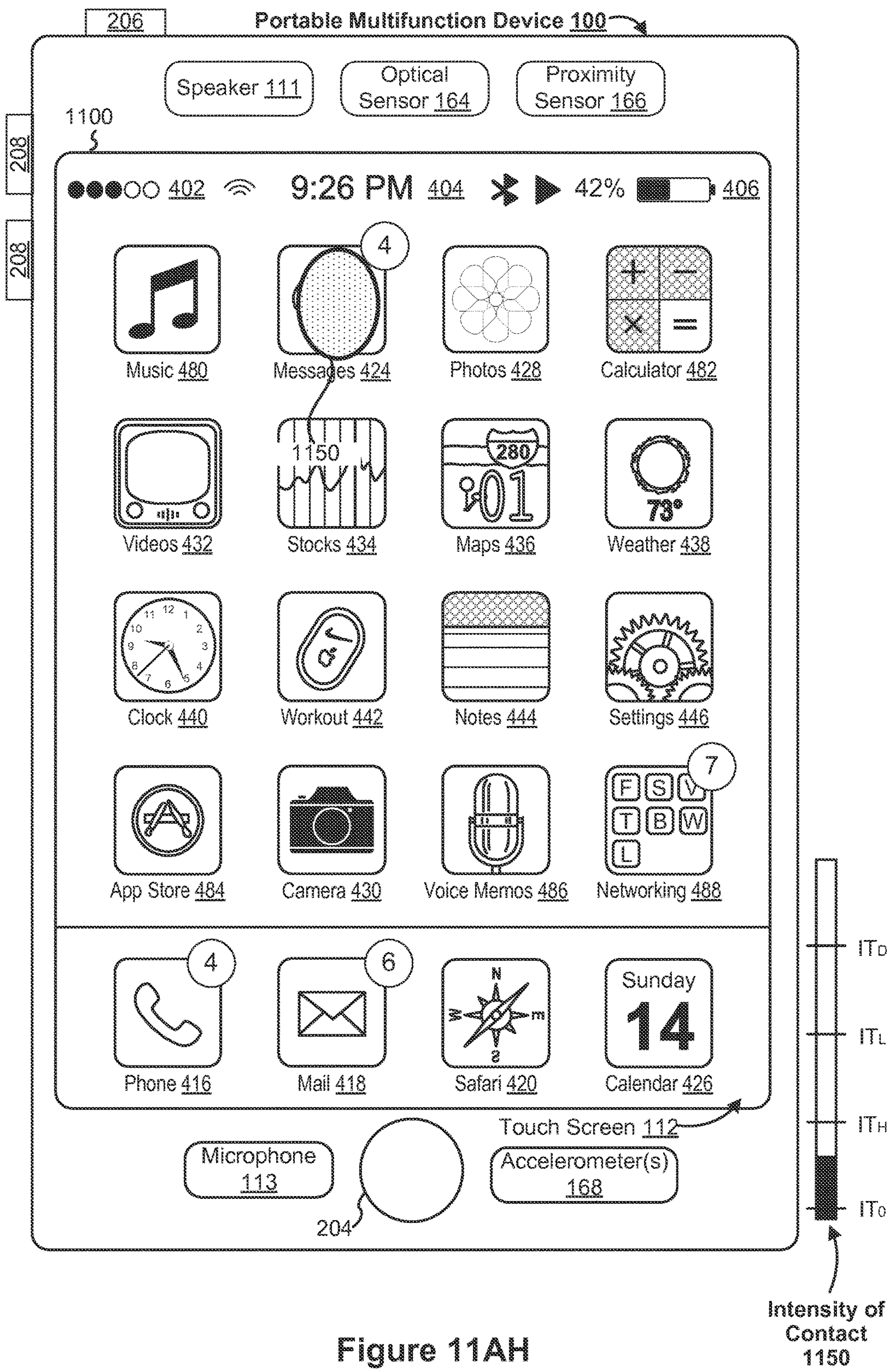
Figure 11A:
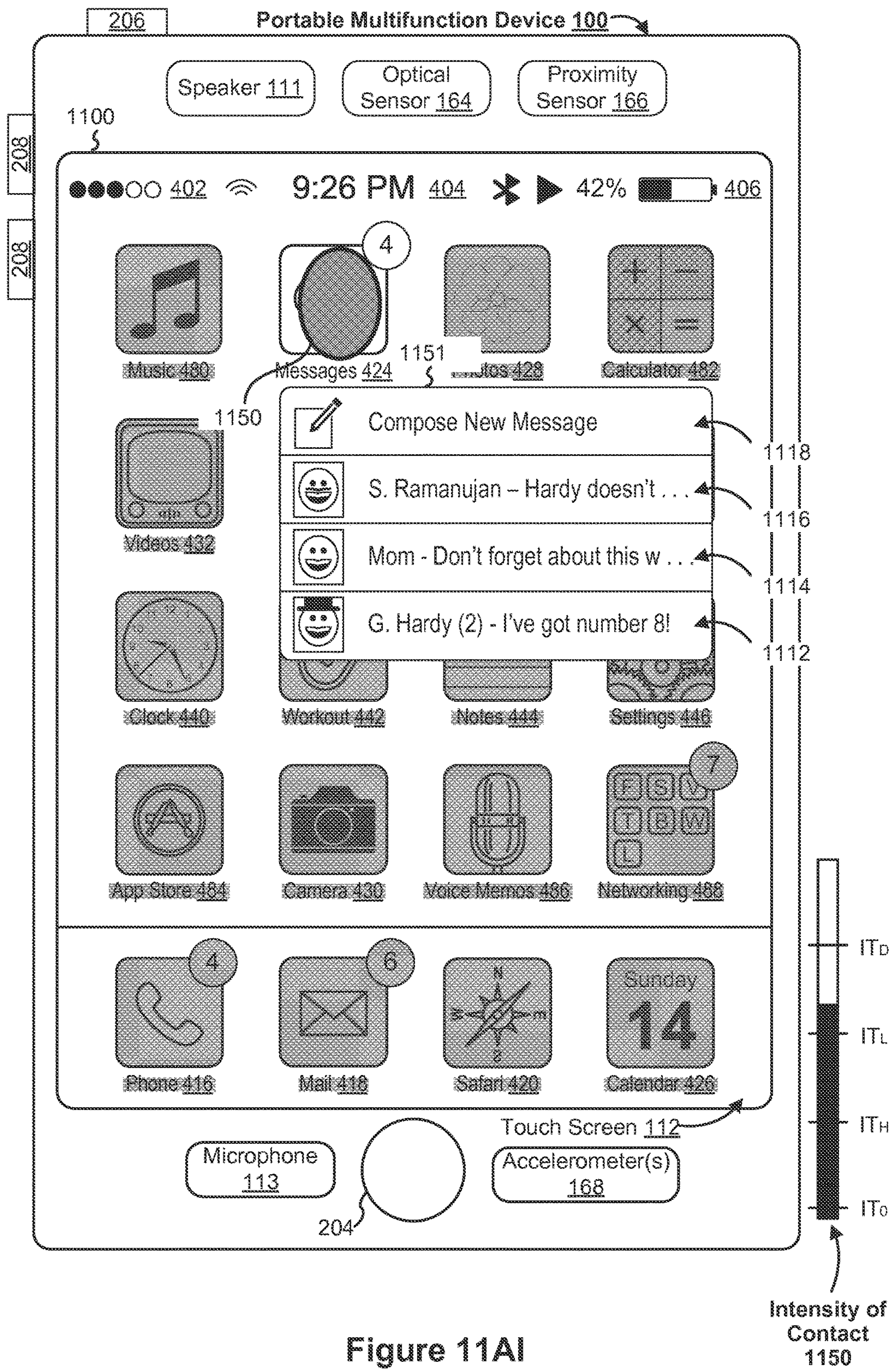
Figure 11A:
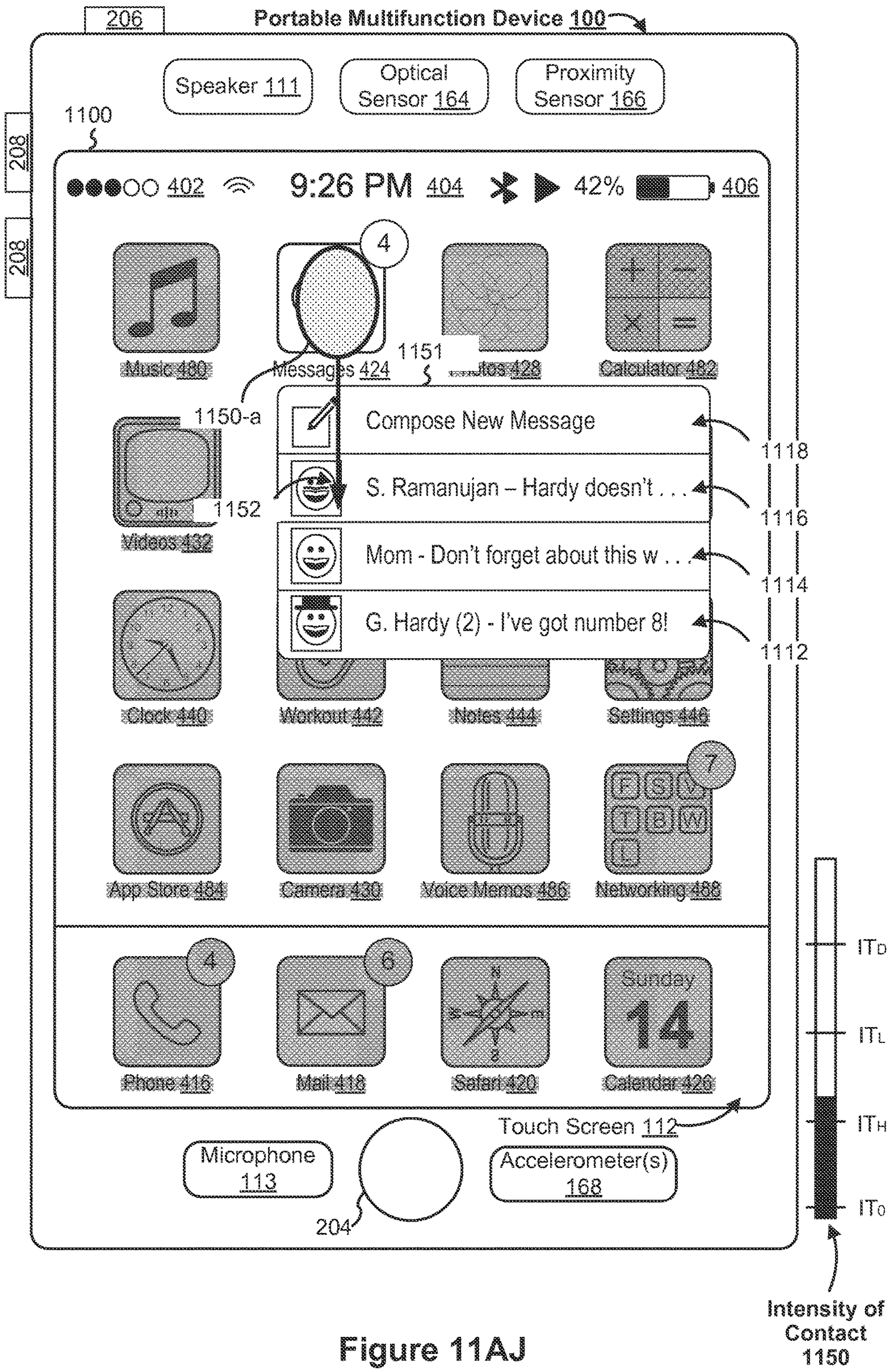
Figure 11A:
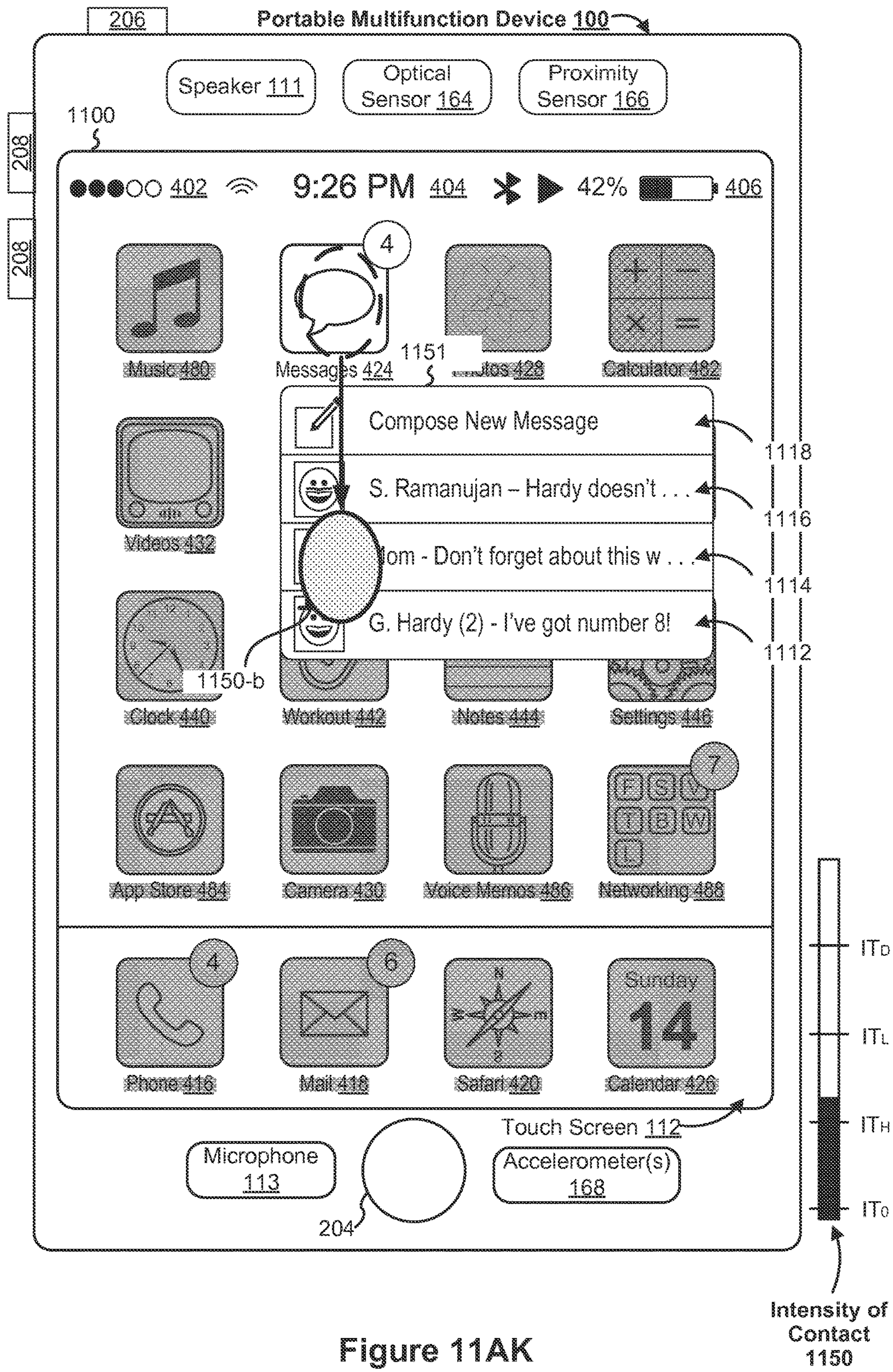
Figure 11A:
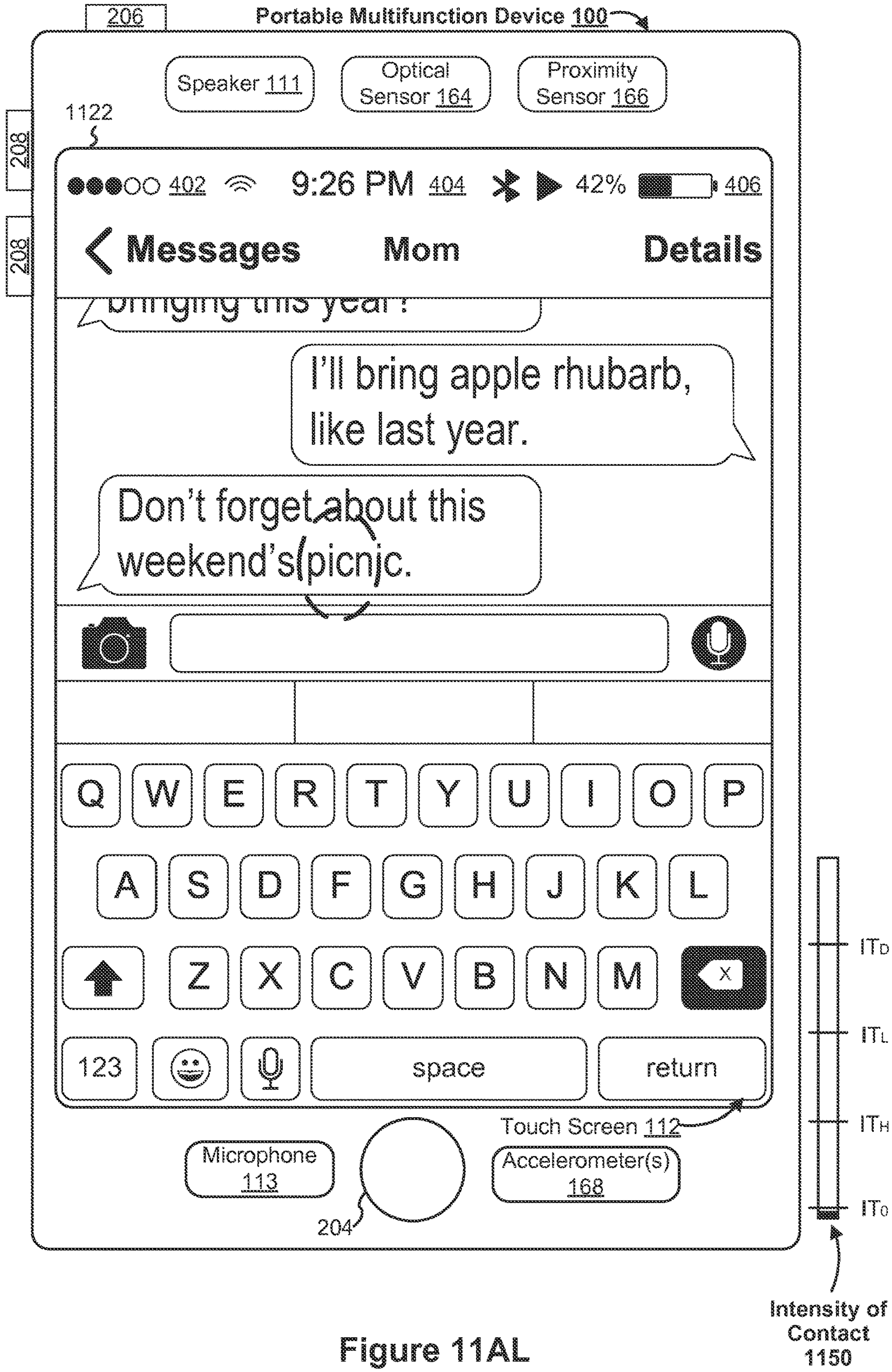
Figure 11A:
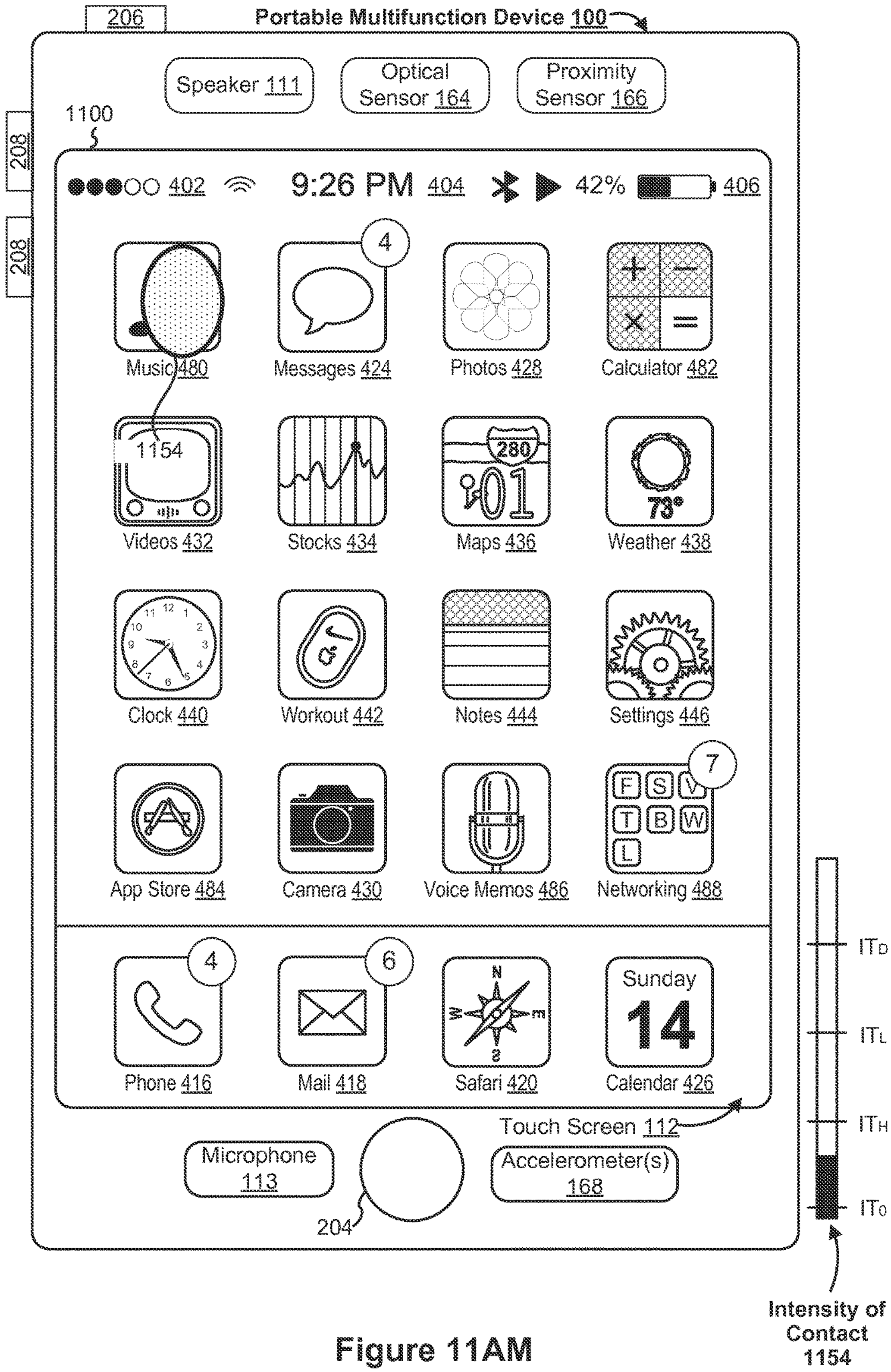
Figure 11A:
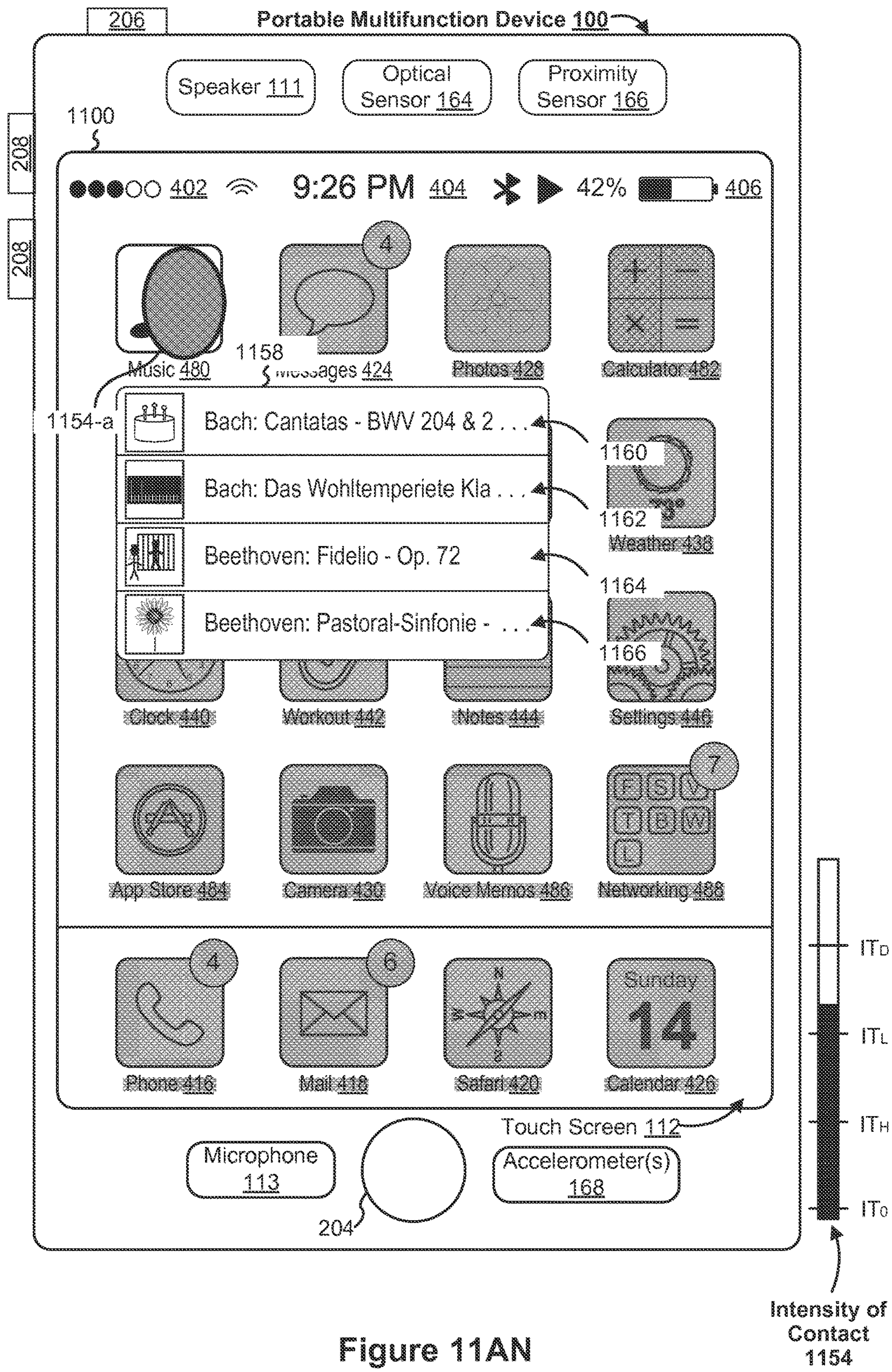
Figure 11A:
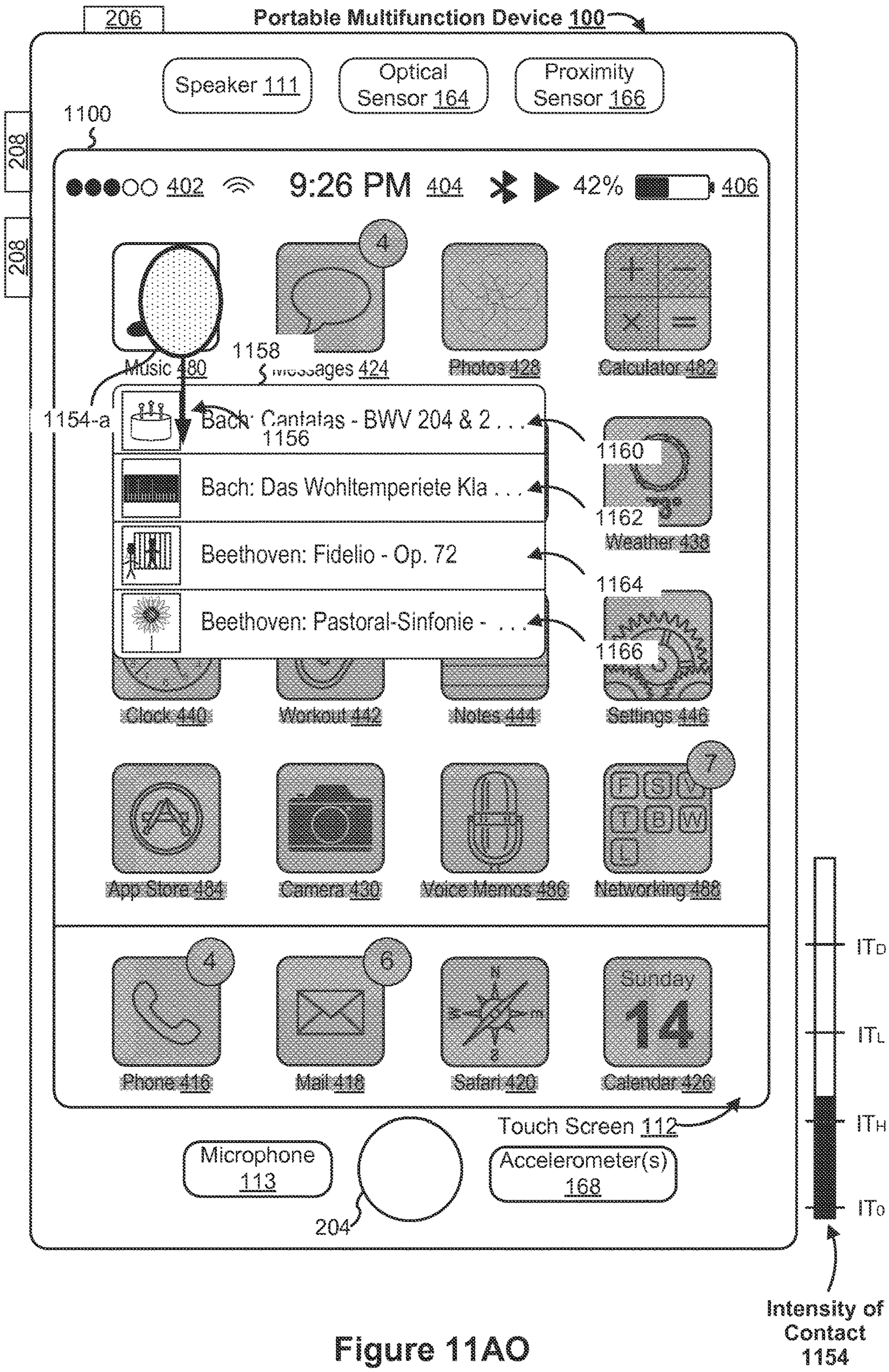
Figure 11A:
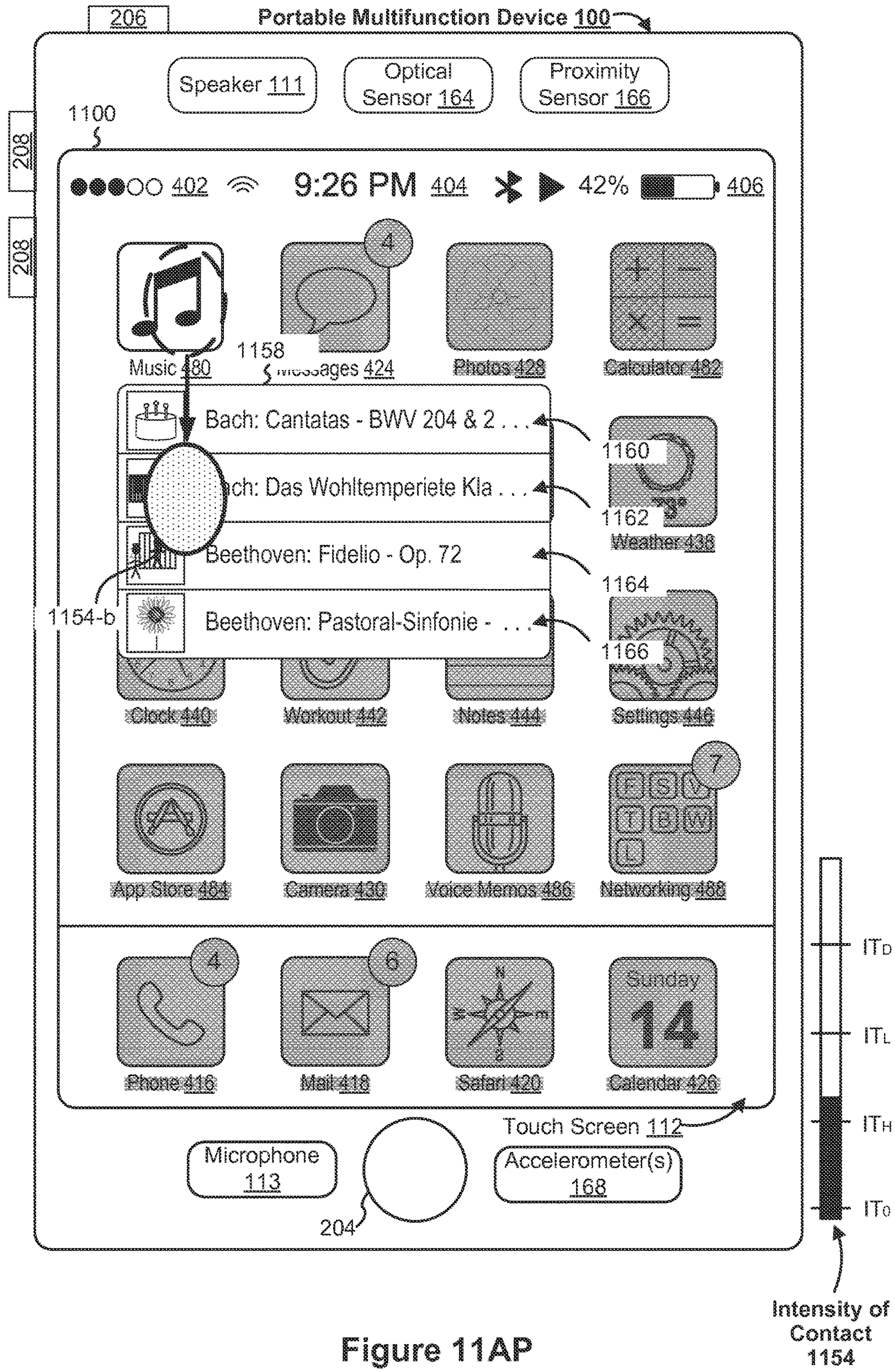
Figure 11A:
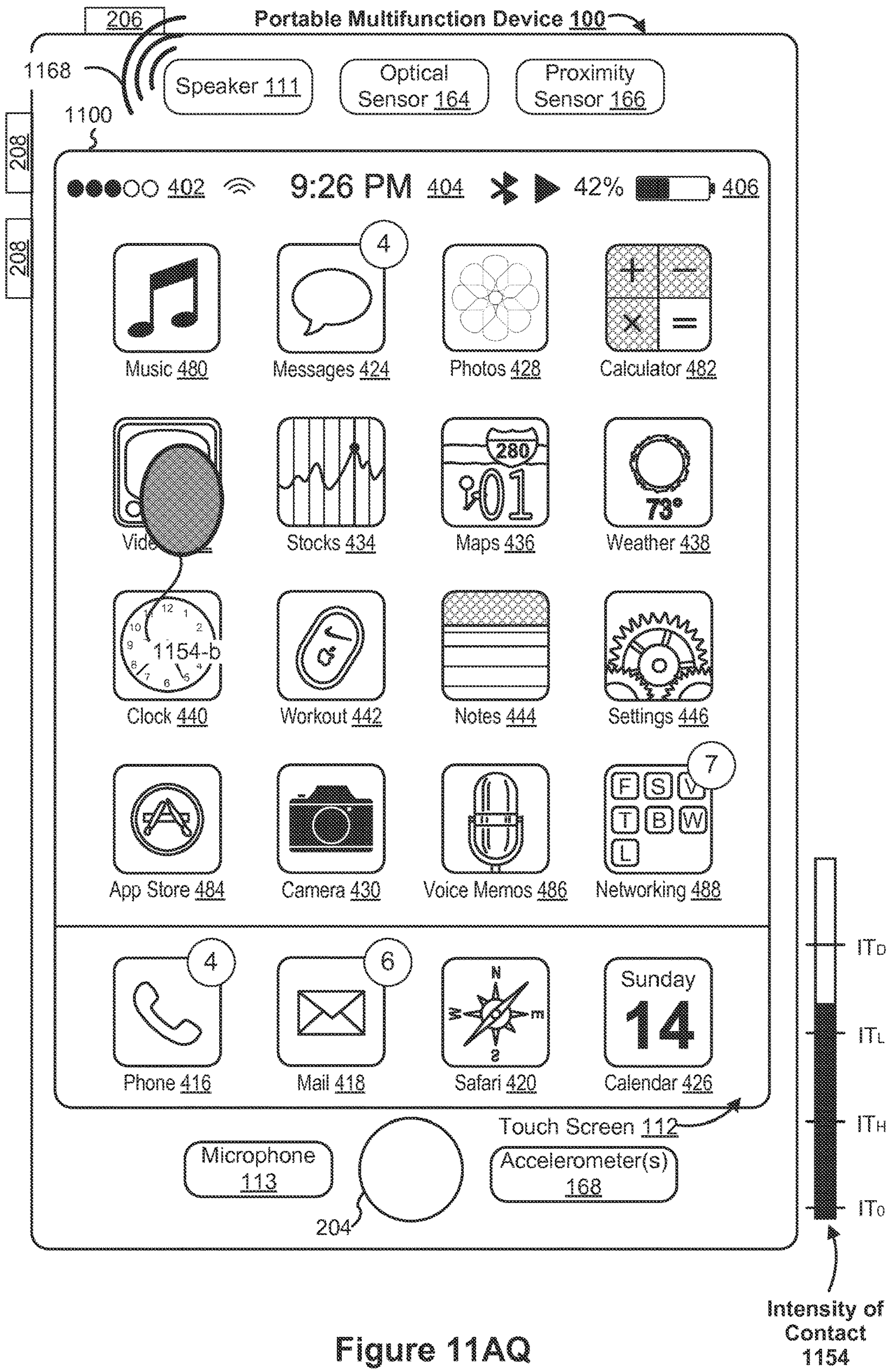
Figure 11A:
Figure 11A:
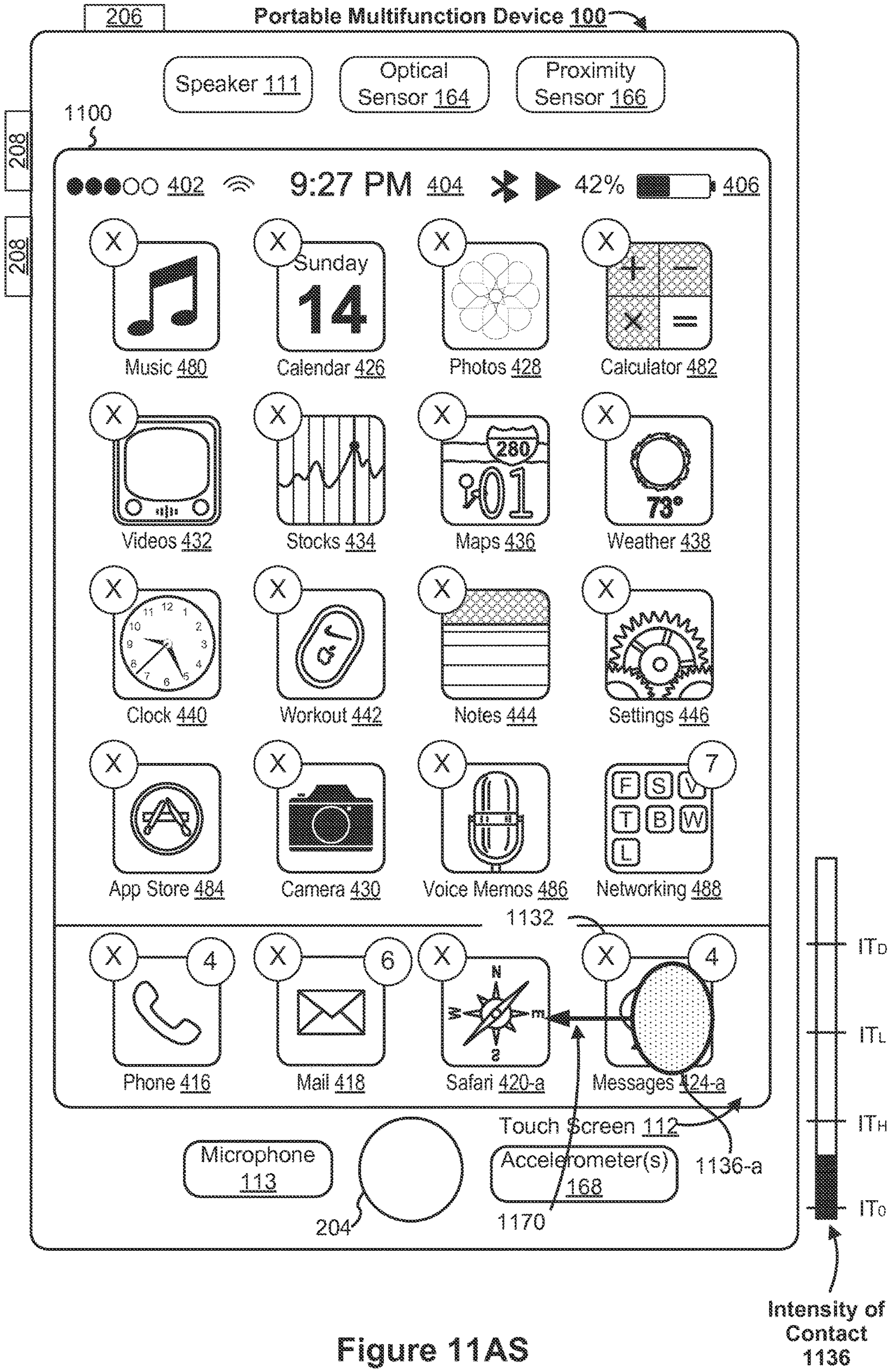
Figure 11A:
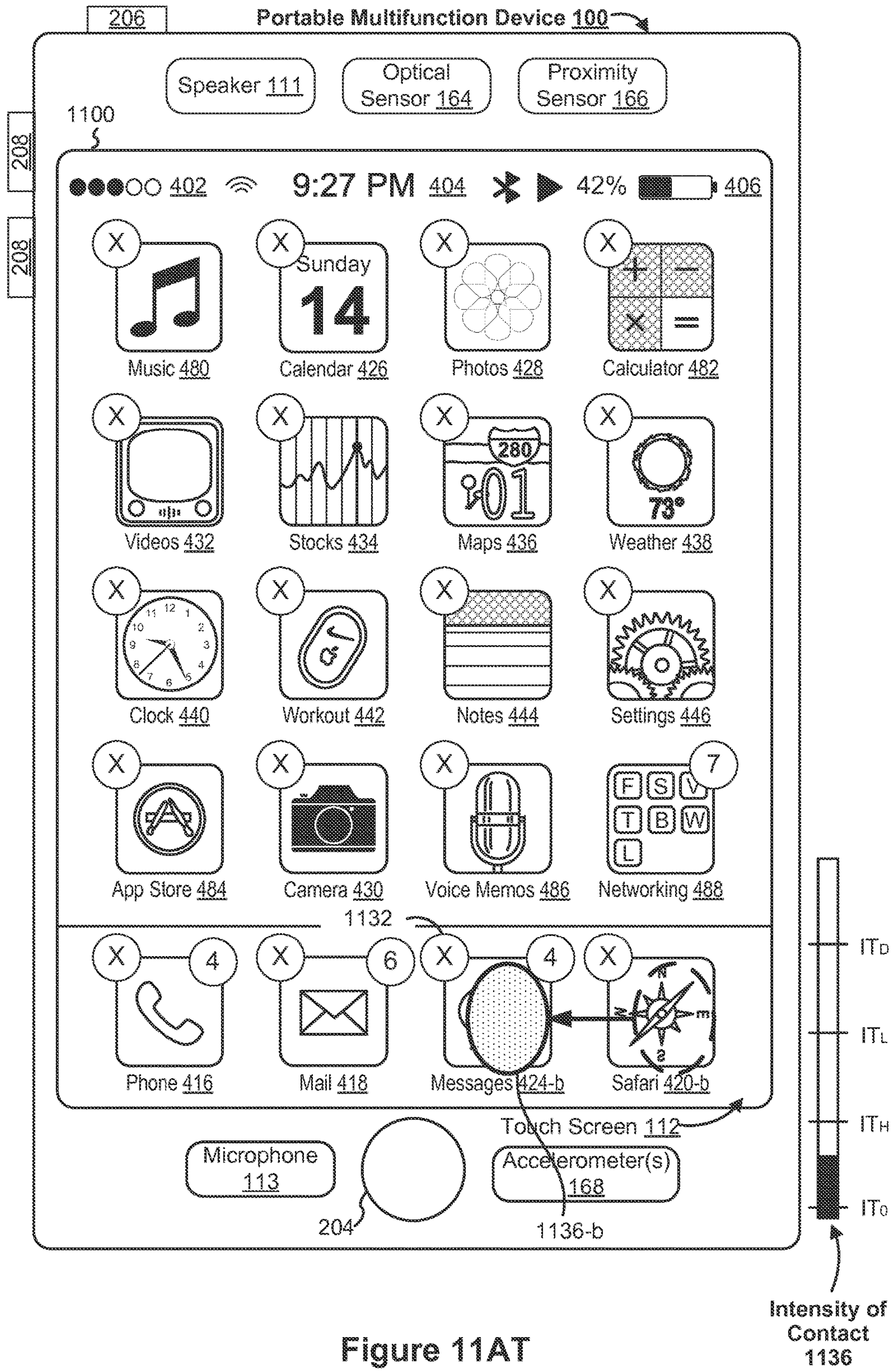

In some embodiments, while displaying the quick action objects concurrently with the first application icon, the device detects (2536) a fourth touch input that includes detecting a fourth contact at a location on the touch-sensitive surface that is away from the quick action objects and the first application icon (e.g., at a location on the touch-sensitive surface that corresponds to one of the other application icons on the display). In response to detecting the fourth touch input, the device ceases to display the one or more quick action objects (and, optionally, reverses a de-emphasis of application icons other than the first application icon). For example, detection of a tap gesture, including contact 1140 while quick action menu 1110 is displayed in FIG. 11Y, terminates the option to select a quick action. In response, the device restores the display of home screen user interface 1100 to a default state, as illustrated in FIG. 11Z.

In some embodiments, in response to determining that the quick-action-display criteria have been met, the device generates (2538) a first tactile output that is indicative of the satisfaction of the quick-action-display criteria (e.g., tactile feedback 1111 in FIG. 11G).

In some embodiments, while displaying the plurality of application icons on the application launching user interface, the device detects (2540) a fifth touch input that includes detecting a fifth contact at a location on the touch-sensitive surface that corresponds to a second application icon of the plurality of application icons, wherein the second application icon is an icon for launching a second application that is not associated with any corresponding quick actions (e.g., contact 1142 on settings launch icon 446 in FIG. 11AA). In response to detecting the fifth touch input, in accordance with a determination that the fifth touch input meets application-launch criteria, the device launches (e.g., opens) the second application (e.g., the device displays settings user interface 1144 in FIG. 11AB). In some embodiments, the application-launch criteria are met when the detected input is a tap gesture. In some embodiments, a tap gesture is detected if the time between touch down and lift off of a contact is less than a predetermined time, independent of the intensity of the contact between detecting touch down and lift off. In some embodiments, the application-launch criteria that include a criterion that is met when liftoff of the first contact is detected before a characteristic intensity of the first contact increases above a respective intensity threshold. In some embodiments, the application launch criteria include a criterion that is met when the contact is substantially stationary (e.g., less than a threshold amount of movement of the contact is detected during a time threshold). In some embodiments, launching the application includes replacing display of the application launch interface with a default view of the application or a last displayed view of the application.

In some embodiments, when the first contact approaches the respective intensity threshold, the device displays (2542), on the display, a respective change in the appearance of a plurality of application icons (e.g., a third application icon and, optionally, one or more application icons other than the first application icon and the second application icon). In some embodiments, displaying the respective change includes displaying an animation that is adjusted dynamically in accordance with the change in intensity of the first contact, such as blurring application icons other than the first application icon. In some embodiments, when the fifth contact approaches the respective intensity threshold, the device displays, on the display, the respective change in the appearance of the plurality of application icons (e.g., the third application icon and, optionally, one or more application icons other than the first application icon and the second application icon). In some embodiments, displaying the respective change includes displaying an animation that is adjusted dynamically in accordance with the change in intensity of the fifth contact, such as blurring application icons other than the second application icon. For example, application launch icons other than messages launch icon 424 are dynamically blurred in response to detecting increasing intensity of contact 1106 above hint threshold $IT_H$ in FIGS. 11E-11F. Additional details regarding displaying a hint that a quick-action menu can be invoked are provided with respect to method 1300 and corresponding user interfaces shown in FIGS. 5A-5AW.

In some embodiments, when the fifth contact approaches the respective intensity threshold, the device displays (2544), on the display, a change in the appearance of the plurality of application icons other than the second application icon (e.g., as described in greater detail above with reference to method 1300, and corresponding user interfaces shown in FIGS. 5A-5AW). In response to detecting that the fifth touch input meets the quick-action-display criteria, the device reverses the change in appearance of the plurality of application icons to redisplay the application launch interface as it appeared just prior to detecting the fifth touch input.

In accordance with a determination that the fifth touch input meets the quick-action-display criteria (for application icons that have corresponding quick actions), the device generates visual and/or tactile output indicating that the fifth touch input met the quick-action-display criteria but that the second application is not associated with any quick actions (e.g., blurring and then unblurring other application icons and/or generating a "negative" tactile output that is different from a "positive" tactile output that is generated when quick actions for an application icon are displayed). For example, in response to detecting increasing intensity of contact 1146 while over settings launch icon 446, the device blurs (e.g., dynamically) other launch icons in FIGS. 11AC-11AE. In response to detecting the intensity of contact 1146 increase above threshold $IT_L$ (e.g., where a quick-action menu would be invoked for a different launch icon), the device provides negative tactile feedback 1148 and restores a default display for home screen user interface 1100 in FIG. 11AF.

In some embodiments, while displaying on the application launching user interface, the device detects (2546) a sixth touch input that includes detecting a sixth contact at a location on the touch-sensitive surface that corresponds to a respective application icon, wherein the sixth contact meets the quick-action-display criteria. In response to detecting the sixth touch input, in accordance with a determination that the respective application icon is associated with one or more quick actions, the device displays quick action objects for the respective application icon and generates a first tactile output (e.g., a "positive" success tactile output) indicating that the sixth touch input met the quick-action-display criteria and that the respective application icon is associated with quick actions. For example, in response to detecting quick-action-display criteria when contact 1138 is over messages launch icon 424 in FIG. 11W, the device provides positive tactile feedback 1111 that is distinguishable from negative tactile feedback 1148 provided in FIG. 11AF. In accordance with a determination that the respective application icon is not associated with any quick actions, the device generates a second tactile output (e.g., a neutral or "negative" failure tactile output) indicating that the sixth touch input met the quick-action-display criteria and that the respective application icon is not associated with any quick actions and the device does not display quick action objects for the respective application icon, wherein the first tactile output is different from the second tactile output (e.g., includes a different amplitude, frequency, number of tactile output components, etc.). For example, the first tactile output is a single "tap" tactile output and the second tactile output is a "tap tap tap" tactile output.

In some embodiments, prior to displaying the menu, the device displays (2548) a layer under the application icon, and in response to detecting that the first input meets the quick-action-display criteria, the device expands the layer (and moving the layer across the display) to serve as a background for the menu.

In some embodiments, as the second contact approaches the respective intensity threshold, the device changes (2550) the size of the layer dynamically as an intensity of the first contact changes. For example, hint graphic 1108 grows out from under messages launch icon 424 in response to increasing intensity of contact 1106 in FIGS. 11E-11F, and then morphs into quick action menu 1110 when quick-action-display criteria are achieved in FIG. 11G. Additional details regarding displaying a hint that a quick-action menu can be invoked are provided with respect to method 1300 and corresponding user interfaces shown in FIGS. 5A-5AW.

In some embodiments, while displaying the one or more quick action objects, the device detects (2552) movement of the first contact to a respective location on the touch-sensitive surface that corresponds to a respective quick action object of the one or more quick action objects and detects liftoff of the first contact from the touch-sensitive surface while the first contact is at the respective location on the touch-sensitive surface. In response to detecting liftoff of the first contact, the device performs the respective quick action. For example, contact 1150 moves from over messages launch icon 424 in FIG. 11AJ to over quick action object 1114 in FIG. 11AK. In response to subsequent liftoff, while still over quick action object 1114, the device launches the messaging application in a mode for responding to mom's message, including display of user interface 1122 in FIG. 11AL, rather than in a default mode.

In some embodiments, while displaying the one or more quick action objects, the device detects (2554) movement of the first contact to a respective location on the touch-sensitive surface that corresponds to a respective quick action object of the one or more quick action objects and detects an increase in the characteristic intensity of the contact that meets action-selection criteria (e.g., the contact is substantially stationary and the characteristic intensity of the contact increases over a threshold intensity) while the first contact is at the respective location on the touch-sensitive surface. In response to detecting that the first contact meets the action-selection criteria, the device performs the respective quick action. For example, contact 1154 decreases in intensity below intensity threshold $IT_L$ and moves from over music launch icon 480 in FIG. 11AO to over quick action object 1162 in FIG. 11AK. In response to a subsequent increase in the intensity of contact 1154 above intensity threshold $IT_L$, while still over quick action object 1114, the device plays the music associated with quick action object 1162 in FIG. 11AQ.

In some embodiments, after displaying the one or more quick action objects, the device detects (2556) liftoff of the contact from the touch-sensitive surface and detects a subsequent touch input on the touch sensitive surface at a location that corresponds to a respective quick action object of the one or more quick action objects (e.g., a tap gesture). In response to detecting the subsequent touch input on the touch sensitive surface at a location that corresponds to the respective quick action object, the device performs the respective quick action. For example, in response to a tap gesture including contact 1120 on quick action object 1114 in FIG. 11I, the device opens the messaging application in a mode for responding to mom's message, including display of user interface 1122 in FIG. 11J, rather than in a default mode.

In some embodiments, launching the first application in response to detecting the first touch input includes (2558) displaying a default view of the application. In some embodiments, the one or more quick action objects include a respective quick action object that is associated with a non-default view of the application (e.g., user interface 1122 for the messaging application in FIG. 11J). In some embodiments, the device detects selection of the respective quick action object. In response to detecting selection of the respective quick action object, the device displays the non-default view of the application (e.g., displays a user-selected email mailbox instead of displaying an inbox).

In some embodiments, the one or more quick action objects include (2560) a quick action object that is associated with a function of the first application. In some embodiments, the device detects selection of the respective quick action object. In response to detecting selection of the respective quick action object, the device performs the function (e.g., takes a picture, starts to record audio or video, stops recording audio or video, starts/stops/pauses playback of media). In some embodiments, the function is performed without displaying a user interface of the first application (e.g., the device starts recording audio without displaying a user interface for the audio application and instead shows a status indicator in the application launch user interface indicating that audio is being recorded). For example, selection of quick action option 1162 in FIG. 11AP causes the device to play music in the music application without opening a user interface for the music application in FIG. 11AQ. In some embodiments, the function is performed in conjunction with displaying a user interface of the application (e.g., the device takes a photo and displays a photo library for the camera that includes the photo).

In some embodiments, the one or more quick action objects include (2562) a quick action object that is associated with a function of an application other than the first application. In some embodiments, the device detects selection of the respective quick action object. In response to detecting selection of the respective quick action object, the device performs the function (e.g., launches a music recognition program from the music store app icon where the music recognition program is a system functionality that is not specific to the music store app).

In some embodiments, the first application is (2564) a content creation application and the one or more quick action objects include a respective quick action object that is associated with creating new content (e.g., a document, an email, a message, a video, etc.). For example, selection of quick action option 1118 in FIG. 11I would be associated with creating a new message in the messaging application. In some embodiments, the device detects selection of the respective quick action object. In response to detecting selection of the respective quick action object, the device creates a new blank content object and displays the new blank content object on the display in an editing mode of operation (e.g., create a new document, compose a new email, compose a new message, create a calendar event, add a new reminder).

In some embodiments, the first application is (2566) a content creation application and the one or more quick action objects include a respective quick action object that is associated with opening previously created content (e.g., a document, an email, a message, a video, etc.). In some embodiments, the device detects selection of the respective quick action object. In response to detecting selection of the respective quick action object, the device opens the application and displays the previously created content within the application (e.g., opens a most recent document, email, message, or video).

It should be understood that the particular order in which the operations in FIGS. 25A-25H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 2500 described above with respect to FIGS. 25A-25H. For brevity, these details are not repeated here.

Figure 26:
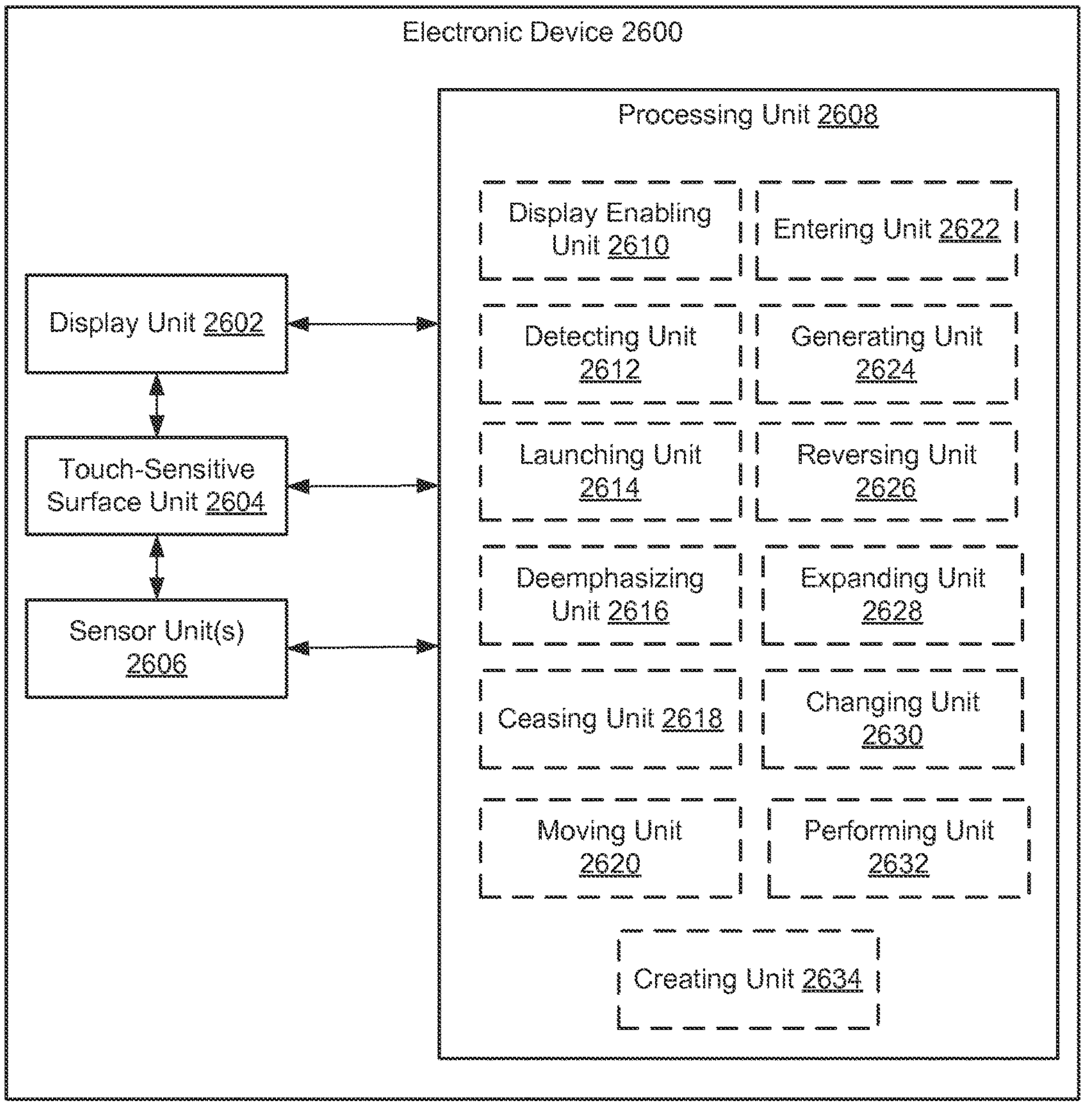
FIG. 26 is a functional block diagram of an electronic device, in accordance with some embodiments.

In accordance with some embodiments, FIG. 26 shows a functional block diagram of an electronic device 2600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 26 are, optionally, combined or separated into sub-blocks to implement the principles of the various described embodiments. Therefore, the description herein optionally supports any possible combination or separation or further definition of the functional blocks described herein.

As shown in FIG. 26, an electronic device includes a display unit 2602 configured to display content items; a touch-sensitive surface unit 2604 configured to receive user inputs; one or more sensor units 2606 configured to detect intensity of contacts with the touch-sensitive surface unit 2604; and a processing unit 2608 coupled to the display unit 2602, the touch-sensitive surface unit 2604 and the one or more sensor units 2606. In some embodiments, the processing unit 2608 includes a display enabling unit 2610, a detecting unit 2612, a launching unit 2614, a deemphasizing unit 2616, a ceasing unit 2618, a moving unit 2620, an entering unit 2622, a generating unit 2624, a reversing unit 2626, an expanding unit 2628, a changing unit 2630, a performing unit 2632, and a creating unit 2634. In some embodiments, the processing unit 2608 is configured to enable display of, on the display unit 2602, an application launching user interface that includes a plurality of application icons for launching corresponding applications (e.g., with display enabling unit 2610). While displaying on the application launching user interface, the processing unit 2608 is configured to detect a first touch input that includes detecting a first contact at a location on the touch-sensitive surface unit 2604 that corresponds to a first application icon of the plurality of application icons (e.g., with detecting unit 2612), wherein the first application icon is an icon for launching a first application that is associated with one or more corresponding quick actions. In response to detecting the first touch input, in accordance with a determination that the first touch input meets one or more application-launch criteria, the processing unit 2608 is configured to launch the first application (e.g., with launching unit 2614). In accordance with a determination that the first touch input meets one or more quick-action-display criteria which include a criterion that is met when the characteristic intensity of the first contact increases above a respective intensity threshold, the processing unit 2608 is configured concurrently enable display of one or more quick action objects associated with the first application along with the first application icon without launching the first application (e.g., with display enabling unit).

The operations in the information processing methods described above are, optionally implemented by running one or more functional modules in information processing apparatus such as general purpose processors (e.g., as described above with respect to FIGS. 1A and 3) or application specific chips.

FIGS. 27A-27E are flow diagrams illustrating a method 2700 of displaying a menu with a list of items arranged based on a location of a user interface object in accordance with some embodiments. The method 2700 is performed at an electronic device (e.g., device 300, FIG. 3, or portable multifunction device 100, FIG. 1A) with a display, and one or more input devices. In some embodiments, the display is a touch-screen display and a touch-sensitive surface is on or integrated with the display. In some embodiments, the display is separate from a touch-sensitive surface. Some operations in method 2700 are, optionally, combined and/or the order of some operations is, optionally, changed.

The device displays (2702), on the display, a first user interface (e.g., a home screen) that includes a plurality of user interface objects (e.g., application launch icons), wherein a respective user interface object is associated with a corresponding set of menu options (e.g., each application launch icon has a corresponding set of menu options that are displayed in a menu over a portion of the first user interface when the application icon is selected). For example, user interface 5500 displays application launch icons 480, 426, 428, 482, 432, 434, 436, 438, 440, 442, 444, 446, 484, 430, 486, 488, 416, 418, 420, and 424 in FIGS. 5A-5G, 5I-5W, 5Y-5AA, 5AC-5AG, and 5AL-5AW. Similarly, user interface 1100 displays application launch icons 480, 426, 428, 482, 432, 434, 436, 438, 440, 442, 444, 446, 484, 430, 486, 488, 416, 418, 420, and 424 in FIGS. 11A-11B, 11D-11I, 11K-11M, 11O-11AA, and 11AC-11AT.

The device detects (2704), via the one or more input devices, a first input that corresponds to a request to display menu options for a first user interface object of the plurality of user interface objects (e.g., a long press or, for a device with one or more sensors for detecting intensity of contacts on a touch-sensitive surface, a press characterized by an increase in intensity of a contact above a first threshold while a focus selector is over the first user interface object). For example, device 100 detects an increase in the intensity of contact 502 above intensity threshold ITL while positioned over messages launch icon 424 in FIGS. 5B-5E. In response, the device displays quick-action menu 504 in FIG. 5E. Additional details regarding displaying the menu options for the first user interface object (e.g., displaying a quick action menu for an application icon, e.g., on the home screen) are provided with respect to methods 1300 and 1700 and corresponding user interfaces shown in FIGS. 5A-5AW and 7A-7AQ.

In some embodiments, the first user interface object is (2706) an application icon that corresponds to a first application program (e.g., an application icon for an application program (e.g., "Mail", "iTunes", etc.) that is displayed on a home screen). For example, messages launch icon 424 displayed on home screen user interface 500 in FIGS. 5A-5E and 5Y.

In some embodiments, while displaying the menu items in the menu that corresponds to the first user interface object (e.g., overlaid on top of the first user interface), the device detects (2708) a second input that corresponds to a request to select the first user interface object (e.g., detects a tap gesture on the first user interface object (e.g., the application icon for an application program (e.g., "Mail", "iTunes", etc.))). In some embodiments, detecting the tap gesture on the first user interface object includes detecting touch-down of a contact followed by lift-off of the contact on the touch-sensitive surface within a first threshold amount of time, and while a focus selector is at the location of the first user interface object on the first user interface. In some embodiments, during the first threshold amount of time, intensity of the contact is taken in to consideration when responding to the second input. In response to detecting the second input that corresponds to the request to select the first user interface object, the device launches the first application program; and ceases to display the first user interface and the menu that corresponds to the first user interface object (e.g., the first user interface and the menu are replaced with a user interface of the first application program). For example, while displaying quick action menu 528 in FIG. 5Y, device 100 detects liftoff of contact 532 in FIG. 5Z. The device then detects a tap gesture including contact 534 on messages launch icon 424 in FIG. 5AA, and in response to termination of the tap gesture, launches a default view of the messages application, including user interface 535 in FIG. 5AB (e.g., instead of launching the application in a view defined by one of options 512, 510, 508, or 506 in quick-action menu 528).

In some embodiments, while displaying the first user interface without displaying the menu that corresponds to the first user interface object, a respective input that corresponds to a request to select the first user interface (e.g., a tap gesture on the first user interface object (e.g., the application icon for an application program (e.g., "Mail", "iTunes", etc.)) launches (2710) the first application program. For example, device 100 detects a tap gesture including contact 1102 on messages icon 424 in home screen user interface 1100, while no quick-action menu is displayed in FIG. 11B. In response to liftoff of the contact, the device launches the messaging application in the default view of the application, including user interface 1104 in FIG. 11C.

In some embodiments, while displaying the menu items in the menu that corresponds to the first user interface object (e.g., overlaid on top of the first user interface), the device detects (2712) a first portion of a third input that corresponds to a request to enter a user interface reconfiguration mode (e.g., detects a long press gesture on the first user interface object (e.g., the application icon for an application program (e.g., "Mail", "iTunes", etc.))). In some embodiments, detecting the long press gesture on the first user interface object includes detecting touch-down of a contact on the touch-sensitive surface followed by maintenance of a characteristic intensity of the contact below a respective intensity threshold for at least a second threshold amount of time (that is greater than the first threshold amount of time), and while a focus selector is at the location of any of the plurality of user interface objects on the first user interface (e.g., at the location of the first user interface object on the first user interface). In response to detecting the first portion of the third input that corresponds to the request to enter the user interface reconfiguration mode, the device enters the user interface reconfiguration mode; and ceases to display the menu that corresponds to the first user interface object. For example, while displaying quick-action menu 1110 in FIG. 11S, the device detects a long-press gesture, including contact 1136 in FIG. 11T. In response to the long press (e.g., as indicated by the passage of time in time 404), the device enters an interface reconfiguration mode, as indicated by deletion icons 1132 in FIG. 11U.

In some embodiments, while in the user interface reconfiguration mode: the device detects (2714) a second portion of the third input that corresponds to a request to move the first user interface object from a first location in the first user interface to a second location in the first user interface (e.g., detects a drag gesture on the first user interface object (e.g., the application icon for an application program (e.g., "Mail", "iTunes", etc.))). In some embodiments, detecting the drag gesture on the first user interface object includes detecting movement of the contact (e.g., the same contact in the long press that triggered the user interface reconfiguration mode) that drags the first user interface object to a different location in the first user interface. In response to detecting the second portion of the third input that corresponds to the request to move the first user interface object from the first location in the first user interface to the second location in the first user interface, the device reconfigures the first user interface (e.g., moves the first user interface object from the first location to the second location in the first user interface, and optionally moves one or more other user interface objects in the first user interface to accommodate the first user interface object). For example, upon detecting movement of 1170 of contact 1136 from position 1136-*a* in FIG. 11AS to position 1136-*b* in FIG. 11AT, messages launch icon 424 is moved from position 424-*a* to position 424-*b*.

In some embodiments, while displaying the first user interface without displaying the menu that corresponds to the first user interface object, a respective input that corresponds to a request to enter the user interface reconfiguration mode (e.g., detecting a long press gesture on the first user interface object (e.g., the application icon for an application program (e.g., "Mail", "iTunes", etc.))) causes (2716) the electronic device to enter the reconfiguration mode. For example, while displaying not displaying a quick action menu, the device detects a long-press gesture, including contact 1130 in FIG. 11O. In response to the long press (e.g., as indicated by the passage of time in time 404), the device enters an interface reconfiguration mode, as indicated by deletion icons 1132 in FIG. 11P.

In response to detecting the first input, the device displays (2718) menu items in a menu that corresponds to the first user interface object (e.g., a quick action menu with a small subset of the most frequently used or relevant menu options for the application that corresponds to the first user interface object is displayed over the first user interface). For example, device 100 detects an increase in the intensity of contact 502 above intensity threshold ITL while positioned over messages launch icon 424 in FIGS. 5B-5E. In response, the device displays quick-action menu 504 in FIG. 5E. In some embodiments, displaying the menu includes: in accordance with a determination that the first user interface object is at a first location in the first user interface (e.g., in the upper left corner of the home screen), displaying the menu items in the menu (e.g., the quick action menu) that corresponds to the first user interface object in a first order (e.g., with decreasing priorities from top to bottom of the displayed quick action menu). For example, as illustrated for quick-action menu 528 in FIG. 5U, top priority action option 512, for composing a new message, is displayed at the top of the quick action menu, closest to messages launch icon 424. In accordance with a determination that the first user interface object is at a second location in the first user interface that is different from the first location (e.g., in the lower right corner of the home screen), the device displays the menu items in the menu that corresponds to the first user interface object in a second order (e.g., with decreasing priorities from bottom to top of the displayed quick action menu) that is different from the first order. For example, as illustrated for quick action menu 504 in FIG. 5E, top priority action option 512, for composing a new message, is displayed at the bottom of the quick action menu, closest to messages launch icon 424.

In some embodiments, the second order is (2720) opposite to the first order. For example, the order of action items in quick-action menu 528 in FIG. 5U is opposite of the order of action items in quick-action menu 504 in FIG. 5E.

In some embodiments, the menu items in the menu that corresponds to the first user interface object have associated priorities relative to one another, and the highest priority menu item in the menu is (2722) displayed closest to the first user interface object. For example, as illustrated for quick action menu 504 in FIG. 5E, top priority action option 512, for composing a new message, is displayed at the bottom of the quick action menu, closest to messages launch icon 424.

In some embodiments, the first user interface object is (2724) an application launch icon, and the menu for the first user interface object includes a menu item that when activated initiates a process for sending to a second electronic device acquisition information for an application that corresponds to the application launch icon. For example, activating menu item 568 ("Share") in quick-action menu 558, illustrated in FIG. 5AQ, initiates a process for sending to a second device of a second user, a link to the workout application associated with workout launch icon 442 (e.g., in an application store), so that the second user can easily download the application.

In some embodiments, in accordance with the determination that the first user interface object is at the first location in the first user interface (e.g., the upper left corner of the home screen), the device extends (2726) the menu that corresponds to the first user interface object away from the first user interface object in a first direction (e.g., vertically downward from the top to the bottom of the home screen). For example, quick-action menus 528 and 571 are displayed on the top half of user interface 500 in FIGS. 5U and 5AT, respectively. As such, menu action items 512, 510, 508, and 506 extend down from messages launch icon 424. In accordance with the determination that the first user interface object is at the second location (e.g., the lower right corner of the home screen), the device extends the menu that corresponds to the first user interface object away from the first user interface object in a second direction (e.g., vertically upward from the bottom to the top of the home screen) that is different from the first direction. For example, quick-action menus 504 and 574 are displayed on the bottom half of user interface 500 in FIGS. 5E and 5AU, respectively. As such, menu action items 512, 510, 508, and 506 extend up from messages launch icon 424.

In some embodiments, a plurality of menu items in the menu that corresponds to the first user interface object each includes (2728) a respective graphic and respective text, and a displayed arrangement of the respective graphics and the respective text of said plurality of menu items in the menu is determined based on the location of the first user interface object in the first user interface. For example, quick-action menus 504 and 528 are located on the right side of user interface 500 in FIGS. 5E and 5U, respectively. As such, respective graphics are justified to the right side of the quick action menus, and corresponding text is right justified to the left of each graphic. In contrast, quick-action menus 571 and 574 are located on the left side of user interface 500 in FIGS. 5AT and 5AW, respectively. As such, respective graphics are justified to the left side of the quick action menus, and corresponding text is left-justified to the right of each graphic.

In some embodiments, in accordance with the determination that the first user interface object is at the first location (e.g., upper left corner of the home screen), the respective text of each menu item is (2730) arranged to the right of the respective graphic of the menu item in the menu that corresponds to the first user interface object (and the menu items are in the first order (e.g., with decreasing priority from top to bottom of the menu)). For example, quick-action menu 571 is displayed in the upper-left quadrant of user interface 500 in FIG. 5AT. Accordingly, respective graphics are justified to the left side of the quick action menus, corresponding text is left-justified to the right of each graphic, and menu items 512, 510, 508, and 506 are displayed in decreasing order of priority from top to bottom of the quick-action menu.

In some embodiments, in accordance with the determination that the first user interface object is at the second location (e.g., lower right corner of the home screen), the respective text of each menu item is arranged (2732) to the left of the respective graphic of the menu item in the menu that corresponds to the first user interface object (and the menu items are in the second order (e.g., with decreasing priorities from bottom to top of the menu)). For example, quick-action menu 504 is displayed in the lower-right quadrant of user interface 500 in FIG. 5E. Accordingly, respective graphics are justified to the right side of the quick action menus, corresponding text is right justified to the left of each graphic, and menu items 512, 510, 508, and 506 are displayed in decreasing order of priority from bottom to top of the quick-action menu.

In some embodiments, in accordance with the determination that the first user interface object is at a third location (e.g., upper right corner of the home screen), the respective text of each menu item is arranged (2734) to the left of the respective graphic of the menu item in the menu that corresponds to the first user interface object and the menu items in the menu are in the first order (e.g., with decreasing priorities from top to bottom of the menu). For example, quick-action menu 528 is displayed in the upper-right quadrant of user interface 500 in FIG. 5U. Accordingly, respective graphics are justified to the right side of the quick action menus, corresponding text is right justified to the left of each graphic, and menu items 512, 510, 508, and 506 are displayed in decreasing order of priority from top to bottom of the quick-action menu.

In some embodiments, in accordance with the determination that the first user interface object is at a fourth location (e.g., lower left corner of the home screen), the respective text of each menu item is arranged (2736) to the right of the respective graphic of the menu item in the menu that corresponds to the first user interface object and the menu items in the menu are in the second order (e.g., with decreasing priorities from bottom to top of the menu). For example, quick-action menu 574 is displayed in the lower-left quadrant of user interface 500 in FIG. 5AW. Accordingly, respective graphics are justified to the left side of the quick action menus, corresponding text is left justified to the right of each graphic, and menu items 512, 510, 508, and 506 are displayed in decreasing order of priority from bottom to top of the quick-action menu.

In some embodiments, the first user interface object includes a respective icon graphic, and the respective icon graphic of the first user interface object is aligned (2738) with the respective graphics of the menu items in the menu that corresponds to the first user interface object. For example, quick action menus 571 and 574 are aligned with the left edge of corresponding messages launch icon 424 in FIGS. 5AT and 5AW, respectively, because the launch icons are located on the left side of user interface 500.

In some embodiments, the plurality of user interface objects are arranged (2740) in a grid in the first user interface, the first user interface object is located at a first position in the grid, and the menu is extended in a respective direction vertically (e.g., above or below the first user interface object) and a respective direction horizontally (e.g., to the left or to the right of the first user interface object) relative to the first user interface object such that the menu covers a portion of the first user interface without covering the first user interface object at the first position. For example, as described for quick-action menus 504, 528, 571, and 574 above, and illustrated in FIGS. 5E, 5U, 5AT, and SAW, respectively.

In some embodiments, while displaying the menu that corresponds to the first user interface object, the device visually emphasizes (2742) the first user interface object relative to other user interface objects in the plurality of user interface objects in the first user interface. In some embodiments, in response to the first input that corresponds to the request to display menu options that correspond to the first user interface object, the device highlights (e.g., enlarges, lifts up, brightens, etc.) the first user interface object and/or deemphasizes (e.g., blurs, dims, darkens, masks, etc.) the other user interface objects in the plurality of user interface objects in the first user interface. For example, launch icons other than messages launch icon 424 are blurred and displayed smaller than messages launch icon 424 in FIG. 5E.

In some embodiments, the device receives (2744), by an operating system of the electronic device, menu generation data from an application associated with the first user interface object, wherein the menu generation data includes the menu items to be included in the menu for the first user interface object and priority information associated with the menu items to be included in the menu for the first user interface object; and generates, by the operating system, the menu for the first user interface object for display on the first user interface, based on the menu generation data received from the application associated with the first user interface object. For example, the third-party application associated with workout launch icon 442 provides the device's 100 operating system with information to display menu items "Start Timer" 566, "Monitor Heartbeat" 564, "Start Workout" 562, and "Map New Run" 560 with corresponding priorities 1, 2, 3, and 4, respectively. As illustrated in FIG. 5AQ, the device displays these items in quick-menu 558, according to the assigned priorities.

In some embodiments, the device moves (2746) the first user interface object on the first user interface from the first location (or the second location) to a new location in the first user interface, different from the first location (or the second location), and after moving the first user interface object to the new location in the first user interface, the device detects, via the one or more input devices, a second input that corresponds to a second request to display the menu options for the first user interface object (e.g., a long press or, for a device with one or more sensors for detecting intensity of contacts on a touch-sensitive surface, a press characterized by an increase in intensity of a contact above a first threshold while a focus selector is over the first user interface object). In response to detecting the second input, the device displays the menu items in the menu that corresponds to the first user interface object in a new order that is different from the first order (or the second order) in accordance with the new location of the first user interface object. For example, after moving messages launch icon 424 from the lower right quadrant of user interface 500, as illustrated in FIG. 5E to the upper right quadrant, as illustrated in FIG. 5AT, the device displays the orientation of corresponding quick-action menu 571, and justification of menu items 512, 510, 508, and 506, oppositely.

In some embodiments, the device applies (2748) a visual effect to obscure (e.g., blur, darken, mask, etc.) one or more user interface objects of the plurality user interface objects other than the first user interface object while displaying the menu items in the menu that corresponds to the first user interface object. For example, launch icons other than messages launch icon 424 are blurred and displayed smaller than messages launch icon 424 in FIG. 5E.

It should be understood that the particular order in which the operations in FIGS. 27A-27E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 2700 described above with respect to FIGS. 27A-27E. For brevity, these details are not repeated here.

Figure 28:
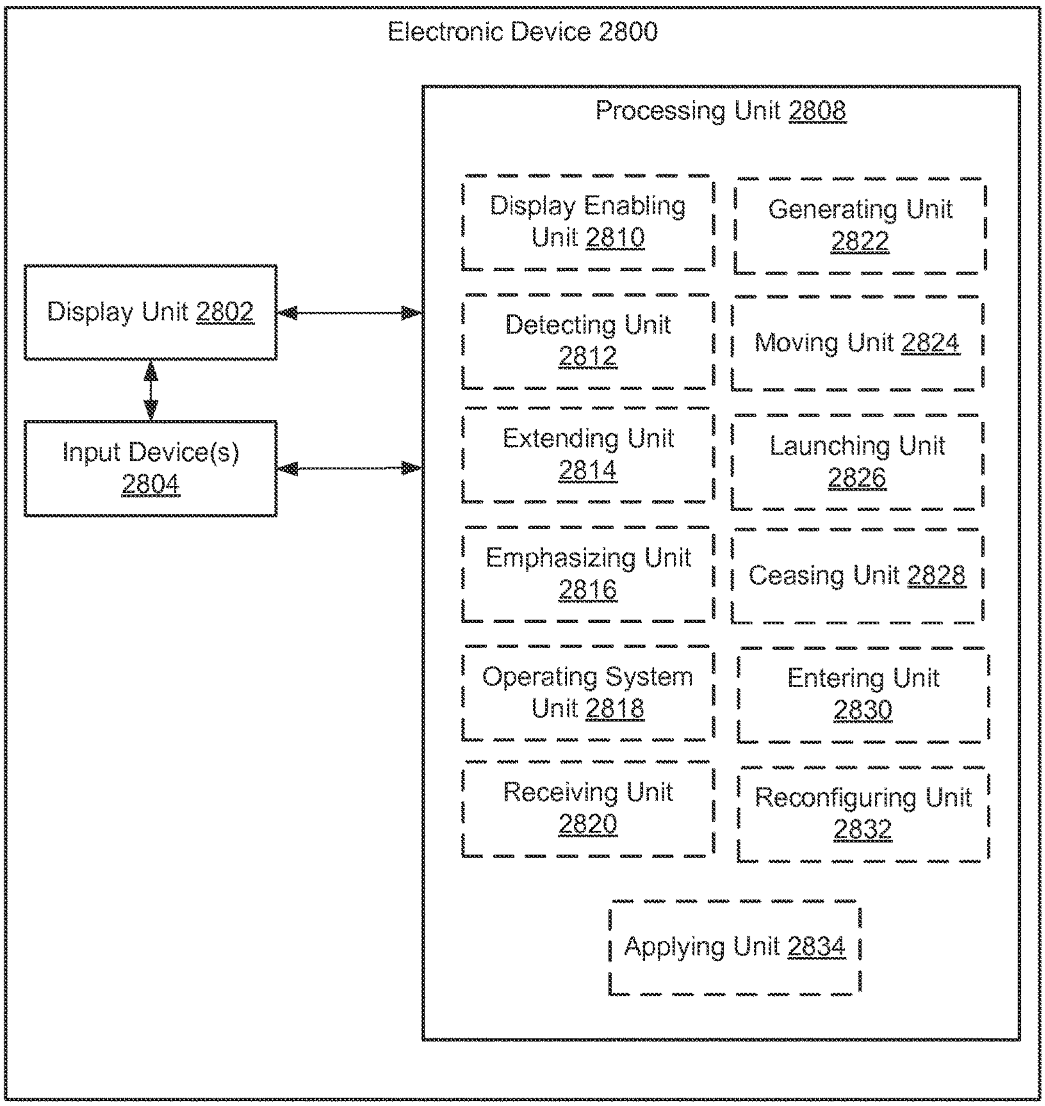
FIG. 28 is a functional block diagram of an electronic device, in accordance with some embodiments.

In accordance with some embodiments, FIG. 28 shows a functional block diagram of an electronic device 2800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 28 are, optionally, combined or separated into sub-blocks to implement the principles of the various described embodiments. Therefore, the description herein optionally supports any possible combination or separation or further definition of the functional blocks described herein.

As shown in FIG. 28, an electronic device includes a display unit 2802 configured to display content items; one or more input devices 2804 configured to receive user inputs; and a processing unit 2808 coupled to the display unit 2802, and the one or more input devices 2804. In some embodiments, the processing unit 2808 includes a display enabling unit 2810, a detecting unit 2812, an extending unit 2814, an emphasizing unit 2816, an operating system unit 2818, a receiving unit 2820, a generating unit 2822, a moving unit 2824, a launching unit 2826, a ceasing unit 2828, an entering unit 2830, a reconfiguration unit 2832 and an applying unit 2834. In some embodiments, the processing unit 2808 is configured to enable display of, on the display unit 2802, a first user interface that includes a plurality of user interface objects (e.g., with display enabling unit 2810, wherein a respective user interface object is associated with a corresponding set of menu options. In some embodiments, the processing unit 2808 is configured to detect, via the one or more input devices, a first input that corresponds to a request to display menu options for a first user interface object of the plurality of user interface objects (e.g., with detecting unit 2812). In response to detecting the first input, the processing unit 2808 is configured to enable display of menu items in a menu that corresponds to the first user interface object (e.g., with display enabling unit 2810), wherein displaying the menu includes: in accordance with a determination that the first user interface object is at a first location in the first user interface, displaying the menu items in the menu that corresponds to the first user interface object in a first order; and in accordance with a determination that the first user interface object is at a second location in the first user interface that is different from the first location, displaying the menu items in the menu that corresponds to the first user interface object in a second order that is different from the first order.

The operations in the information processing methods described above are, optionally implemented by running one or more functional modules in information processing apparatus such as general purpose processors (e.g., as described above with respect to FIGS. 1A and 3) or application specific chips.

FIGS. 29A-29C are flow diagrams illustrating a method 2900 of selecting a default option from a menu or displaying a menu of options in accordance with some embodiments.

The method 2900 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2900 are, optionally, combined and/or the order of some operations is, optionally, changed.

The device displays (2902), on the display, a user interface that includes a selectable user interface object that is associated with a plurality of actions for interacting with the user interface, wherein the plurality of actions include a direct-selection action and one or more other actions (e.g., user interface objects 1202, 1204, 1206, 1208, and 1210 in user interface 1200 in FIG. 12A). In one example, the user interface is an email interface that displays an email message and an affordance for composing a reply to the displayed email message. In some embodiments, the affordance for composing a reply to the displayed email message is associated with multiple actions (e.g., "reply to sender", "reply to all", "forward", "print", and "cancel" are associated with user interface object 1208). In some embodiments, one of the multiple actions (e.g., "reply to sender" in FIGS. 12A-12X) is used as a direct-selection action for the affordance. In another example, the user interface is chat or instant messaging interface that displays a conversation with a contactable entity (e.g., a friend) and an affordance for invoking a camera function. In some embodiments, the affordance for invoking the camera function is associated with multiple actions, such as, "go to the photo library", "take a photo or video", "selecting a recent photo", and "cancel". In some embodiments, one of the multiple actions (e.g., "take a photo or video") is used as a direct-selection action for the affordance. In some embodiments, the affordance for invoking the camera function is associated with multiple actions, such as respective actions to activate "photo mode", "video mode", "panorama mode", and "cancel". In some embodiments, one of the multiple actions (e.g., activating "camera mode") is used as a direct-selection action for the affordance.

While displaying the user interface that includes the selectable user interface object, the device detects (2904) an input that includes detecting a contact on the touch-sensitive surface while a focus selector is over the selectable user interface object (e.g., contact 1212 over user interface object 1208 in FIG. 12B).

In response to detecting the input that includes detecting the contact in accordance with a determination that the input meets selection criteria, the device displays (2906), on the display, a menu that includes graphical representations of the plurality of actions that include the direct-selection action and the one or more other actions. In some embodiments, the selection criteria includes a criterion that is met when lift-off of the contact is detected before a characteristic intensity of the contact increases above a respective intensity threshold (e.g., a deep press intensity threshold) used for direct-selection criteria. For example, because contact 1212 in FIG. 12B is part of a tap gesture that does not achieve an intensity required to trigger a direct-selection action, the device displays action menu 1214 in FIG. 12C in response to liftoff of the contact. In some embodiments, the selection criteria include an additional criterion that is met when the characteristic intensity of the contact increases above a first intensity threshold (e.g., a light press intensity threshold) below the respective intensity threshold used for direct-selection criteria. For example, in some embodiments, when a tap input with a characteristic intensity below the deep press intensity threshold $IT_D$ is detected on a camera icon shown in an instant messaging interface, a menu including multiple actions (e.g., "go to the photo library", "take a photo or video", "selecting a recent photo", and "cancel") is displayed over a portion of the messaging interface (e.g., in an action platter), and the menu persists on the user interface after the lift-off of the contact. In some embodiments, the menu is dismissed when an action is selected from the menu by another input (e.g., a second tap input on the action) or when a dismissal input (e.g., a tap input detected outside of the menu) is detected. In another example, when a light press input with a characteristic intensity above the light press input $IT_L$ and below the deep press intensity threshold $IT_D$ is detected on a camera icon shown on home screen, a quick action menu including multiple actions (e.g., "photo mode", "video mode", and "panorama mode") is displayed over a portion of the home screen, and the menu goes away upon lift-off of the contact. In accordance with a determination that the input meets direct-selection criteria, wherein the direct-selection criteria include a criterion that is met when a characteristic intensity of the contact increases above a respective intensity threshold (e.g., the deep press intensity threshold), the device performs the direct-selection action. In some embodiments, the direct-selection criteria further includes a criterion that no movement of the contact is detected after the characteristic intensity of the contact increases above the respective intensity threshold. For example, in some embodiments, if movement is detected after the characteristic intensity of the contact increases above the respective intensity threshold, performance of the direct-selection is canceled. In some embodiments, after the direct-selection criteria have been met, performance of the direct-selection action occurs when lift-off of the contact is detected. In some embodiments, after the direct-selection criteria have been met, performance of the direct-selection action occurs immediately and before lift-off of the contact is detected.

In some embodiments, each of the direction-selection action and the one or more other actions are (2908) individually selectable in the menu displayed on the user interface. For example, direction-selection action 1216 (reply to sender), action 1218 (reply to all), action 1220 (forward), action 1222 (print), and action 1224 (cancel) are all individually selectable in action menu 1214 illustrated in FIG. 12D.

In some embodiments, the menu is (2910) displayed after lift-off of the contact is detected (e.g., liftoff of contact 1212 in FIG. 12C).

In some embodiments, the menu is (2912) displayed when the characteristic intensity of the contact reaches a first intensity value (e.g., the light press intensity threshold) that is lower than the respective intensity threshold (e.g., the deep press intensity threshold) used in the direct-selection criteria (e.g., action menu 1214 is displayed in response to an increase in the intensity of contact 1230 above $IT_L$ in FIG. 12I).

In some embodiments, displaying the menu that includes (2914) graphical representations of the plurality of actions that include the direct-selection action and the one or more other actions includes applying a visual effect (e.g., enlarging, highlighting, etc. the direct-selection action relative to the one or more other actions) to visually distinguish the direct-selection action from the one or more other actions in the menu (e.g., direct-selection action 1216 (reply to sender) is highlighted in FIG. 12J).

In some embodiments, displaying the menu that includes graphical representations of the plurality of actions that include the direct-selection action and the one or more other actions includes (2916) presenting the menu gradually (e.g., the menu grows larger (e.g., expands out from the selectable user interface object), becomes more clear, and/or becomes more complete) in accordance with the increase in intensity of the contact. In some embodiments, the size, clarity, completeness (e.g., as reflected in the number of actions shown) of menu is directly manipulated via the intensity of the contact before characteristic intensity of the contact increases above the first intensity value (e.g., the light press intensity threshold). For example, in response to an increase in the intensity of contact 1230 above a "hint" threshold (e.g., $IT_H$) action menu 1214 grows dynamically from user interface object 1208 in FIGS. 12G-12I.

In some embodiments, the menu is (2918) displayed overlaid over a portion of the user interface and adjacent to the selectable user interface object (e.g., action menu 1214 is displayed over a portion of the email viewed in user interface 1200 and above user interface object 1208 in FIG. 12Q). In some embodiments, the portion of the user interface that is not obscured by the menu (not including the selectable user interface object) is visually obscured (e.g., blurred or masked) while the menu is overlaid on the user interface (e.g., the visible content of the email in displayed in user interface 120 is blurred behind action menu 1214 In FIGS. 12J and 12Q). In some embodiments, the portion of the user interface that is not obscured by the menu partially reveals at least some of the other user interface elements in the user interface (e.g., by showing their colors at their corresponding locations).

In some embodiments, performing the direct-selection action includes (2920) updating the user interface (e.g., display of email viewing user interface 1200 is replaced with display of message replying user interface 1234 in FIG. 12M).

In some embodiments, the selectable user interface object corresponds (2922) to a message interface (e.g., an email interface presenting an email message), and the menu includes a reply action as the direct-selection action, and a reply all action and a forward action as the other actions (e.g., as illustrated in FIG. 12J.

In some embodiments, the selectable user interface object corresponds (2924) to a camera icon (e.g., a camera icon in the home screen or within an application user interface (e.g., an instant messaging user interface)), and the menu includes a still camera mode as the direct-selection action, and a video camera mode and a panorama mode as the other actions. In some embodiments, the user interface object is an icon on the lock screen of the device (e.g., camera icon 808 on lock screen user interface 800 in FIG. 8A). In some embodiments, the user interface object is a button or other selectable user interface object in a user interface of an application of the device.

In some embodiments, in accordance with the determination that the input meets direct-selection criteria, the device applies (2926) a second visual effect (e.g., enlarges, highlights, lifts up, pushes back, etc.) to the direct-selection action to visually distinguish the direct-selection action from the one or more other actions in the menu (e.g., reply action option 1216 is highlighted and initially increases in size after being selected as the direct-selection action in FIG. 12K). For example, if the direct-selection action was not already visually distinguished from the other actions in the menu, when the direct-selection criteria are satisfied, a visual effect is applied to the direct-selection action to visually distinguish the direct-selection action from the other actions in the menu. Alternatively, if the direct-selection action was already visually distinguished from the other actions in the menu by some visual effect when first presented, when the direct-selection criteria are satisfied, another visual effect is applied to the direct-selection action to visually distinguish the direct-selection action from its previous non-activated state and from the other actions in the menu. In some embodiments, a magnitude of the visual effect changes dynamically as the characteristic intensity of the contact changes (e.g., as the intensity of the contact increases, the direct-selection action gets progressively darker and/or increases in size relative to the other actions).

In some embodiments, in accordance with the determination that the input meets direct-selection criteria, the device gradually fades (2928) out the other actions to visually emphasize the direct-selection action in the menu. For example, in some embodiments, when the contact intensity reaches above the deep press intensity threshold, the other actions are optionally blurred out in the menu, while the direct-select action remains visible and clear. In some embodiments, the gradual fading progresses dynamically as the characteristic intensity of the contact changes (e.g., as the intensity of the contact increases, the other actions progressively fade relative to the direct-selection action). For example, unselected action options 1218, 1220, 1222, and 1224 are blurred upon selection of direct-selection action 1216 in FIG. 12K.

In some embodiments, in accordance with the determination that the input meets direct-selection criteria, the device gradually shrinks (2930) the menu to conceal the other actions in the menu while the direction-selection action remains displayed in the menu. For example, in some embodiments, when the contact intensity reaches above the deep press intensity threshold, the representations of the other actions collapse toward the representation of the direction-selection action in the menu and become concealed behind the representation of the direct-selection action. In some embodiments, the gradual shrinking progresses dynamically as the characteristic intensity of the contact changes (e.g., as the intensity of the contact increases, the other actions progressively get smaller relative to the direct-selection action). For example, the size of unselected action options 1218, 1220, 1222, and 1224 are decreased upon selection of direct-selection action 1216 in FIG. 12K.

In some embodiments, in accordance with the determination that the input meets direct-selection criteria, the device moves (2932) the direct-selection action closer to the focus selector. For example, in some embodiments, when the contact intensity reaches above the deep press intensity threshold, the representations of the direct-selection action moves towards the focus selector, while the other actions fade away, or collapse toward the representation of the direction-selection action to eventually become concealed behind the representation of the direct-selection action when the direct-selection action arrives beneath the focus selector. In some embodiments, the movement of the direct-selection action closer to the focus selector progresses dynamically as the characteristic intensity of the contact changes (e.g., as the intensity of the contact increases, the direct-selection action progressively moves toward the detected contact). For example, the device animates the transition to a selected user interface, after selection of the direct-selection action 1216, in FIG. 12N by gradually shrinking the size of action option 1216 and moving it towards user interface object 1208. The other action options appear to fall back behind action option 1216 during this transition.

In some embodiments, while displaying the menu in accordance with the determination that the input meets selection criteria, the device detects (2934) a termination of the input. Thus, in some embodiments, the menu persists even after the input is terminated (e.g., even after detecting liftoff of the contact). In addition, the device detects a second input including detecting a second contact on the touch-sensitive surface while the focus selector is outside of the displayed menu (e.g., the second input is optionally a tap input detected outside of the displayed menu, or a swipe input across the displayed menu that ends outside of the displayed menu). In response to detecting the second input, the device ceases to display the menu. For example, a tap gesture including contact 1238 outside of the action menu 1214 in FIG. 12R clears the action in FIG. 12S.

In some embodiments, while displaying the menu in accordance with the determination that the input meets selection criteria (e.g., when a characteristic intensity of the contact increases above a first intensity value (e.g., the light press threshold) below the respective intensity threshold used for the direct-selection criteria (e.g., the deep press intensity threshold)), the device detects (2936) a movement of the contact that corresponds to a movement of the focus selector over to a first action of the one or more other actions (e.g., movement 1242 of contact 1240 from position 1240-*a* in FIG. 12V to position 1240-*b* in FIG. 12W). In response to detecting the movement of the contact, the device performs the first action. In some embodiments, the first action is performed when lift-off of the contact is detected while the focus selector is on the first action. In some embodiments, the first action is performed in response to detecting the characteristic intensity of the contact reaches above the respective intensity threshold (e.g., the deep press intensity threshold) that is used for the direct-selection action while the focus selector is on the first action (e.g., in response to an increase in the intensity of contact 1240 above the direct-selection action threshold, e.g., $IT_D$, while the contact is over action option 1220 in action menu 1214 illustrated in FIG. 12W the device initiates an action to forward the email in FIG. 12X, rather than reply to the sender (e.g., the direct-selection action)).

It should be understood that the particular order in which the operations in FIGS. 29A-29C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 2900 described above with respect to FIGS. 29A-29C. For brevity, these details are not repeated here.

Figure 30:
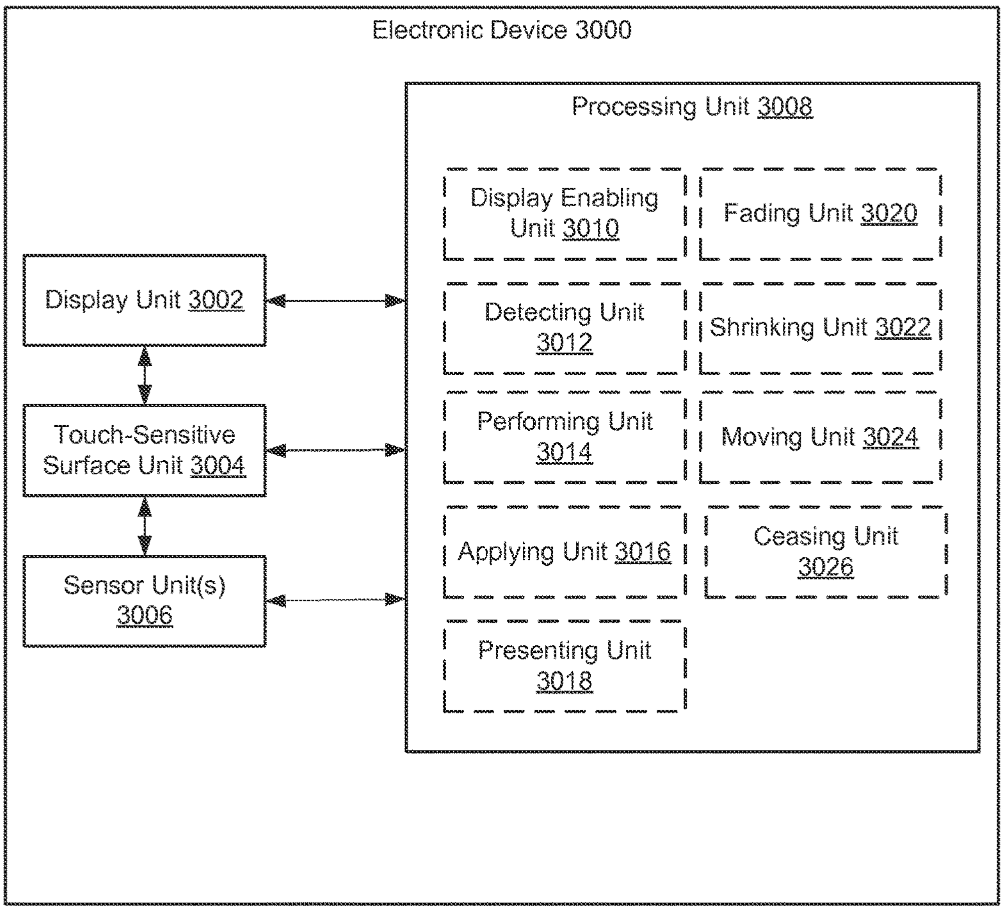
FIG. 30 is a functional block diagram of an electronic device, in accordance with some embodiments.

In accordance with some embodiments, FIG. 30 shows a functional block diagram of an electronic device 3000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 30 are, optionally, combined or separated into sub-blocks to implement the principles of the various described embodiments. Therefore, the description herein optionally supports any possible combination or separation or further definition of the functional blocks described herein.

As shown in FIG. 30, an electronic device includes a display unit 3002 configured to display content items; a touch-sensitive surface unit 3004 configured to receive user inputs; one or more sensor units 3006 configured to detect intensity of contacts with the touch-sensitive surface unit 3004; and a processing unit 3008 coupled to the display unit 3002, the touch-sensitive surface unit 3004 and the one or more sensor units 3006. In some embodiments, the processing unit 3008 includes a display enabling unit 3010, a detecting unit 3012, a performing unit 3014, an applying unit 3016, a presenting unit 3018, a fading unit 3020, a shrinking unit 3022, a moving unit 3024, and a ceasing unit 3026. In some embodiments, the processing unit 3008 is configured to enable display of, on the display unit 3002, a user interface that includes a selectable user interface object that is associated with a plurality of actions for interacting with the user interface (e.g., with display enabling unit 3010), wherein the plurality of actions include a direct-selection action and one or more other actions. While displaying the user interface that includes the selectable user interface object, the processing unit 3008 is configured to detect an input that includes detecting a contact on the touch-sensitive surface unit 3004 while a focus selector is over the selectable user interface objects (e.g., with detecting unit 3012). In response to detecting the input that includes detecting the contact, in accordance with a determination that the input meets selection criteria, the processing unit 3008 is configured to enable display of, on the display unit 3002, a menu that includes graphical representations of the plurality of actions that include the direct-selection action and the one or more other actions (e.g., with a display enabling unit 3010). In accordance with a determination that the input meets direct-selection criteria, wherein the direct-selection criteria include a criterion that is met when a characteristic intensity of the contact increases above a respective intensity threshold, the processing unit 3008 is configured to perform the direct-selection action (e.g., with performing unit 3014).

The operations in the information processing methods described above are, optionally implemented by running one or more functional modules in information processing apparatus such as general purpose processors (e.g., as described above with respect to FIGS. 1A and 3) or application specific chips.

As noted above, there is a need for electronic devices with improved methods and interfaces for teaching new user interface capabilities and features to the user, such as new contact-intensity based capabilities and features. In the embodiments described below, intensity sensitive user interface objects are revealed in response to a detected input at a location away from the intensity sensitive user interface objects. In this way, an electronic device provides information to a user about which user interface objects in a user interface will be responsive to contact intensity when input is provided at the user interface object. This approach allows for a user interface to identify intensity sensitive user interface elements without the need for consuming space in the interface with a dedicated user interface element selectable by the user to reveal intensity sensitive user interface elements.

Figure 31A:
FIGS. 31A-31Q illustrate exemplary user interfaces for visually distinguishing intensity sensitive objects in a user interface in accordance with some embodiments.
Figure 31B:
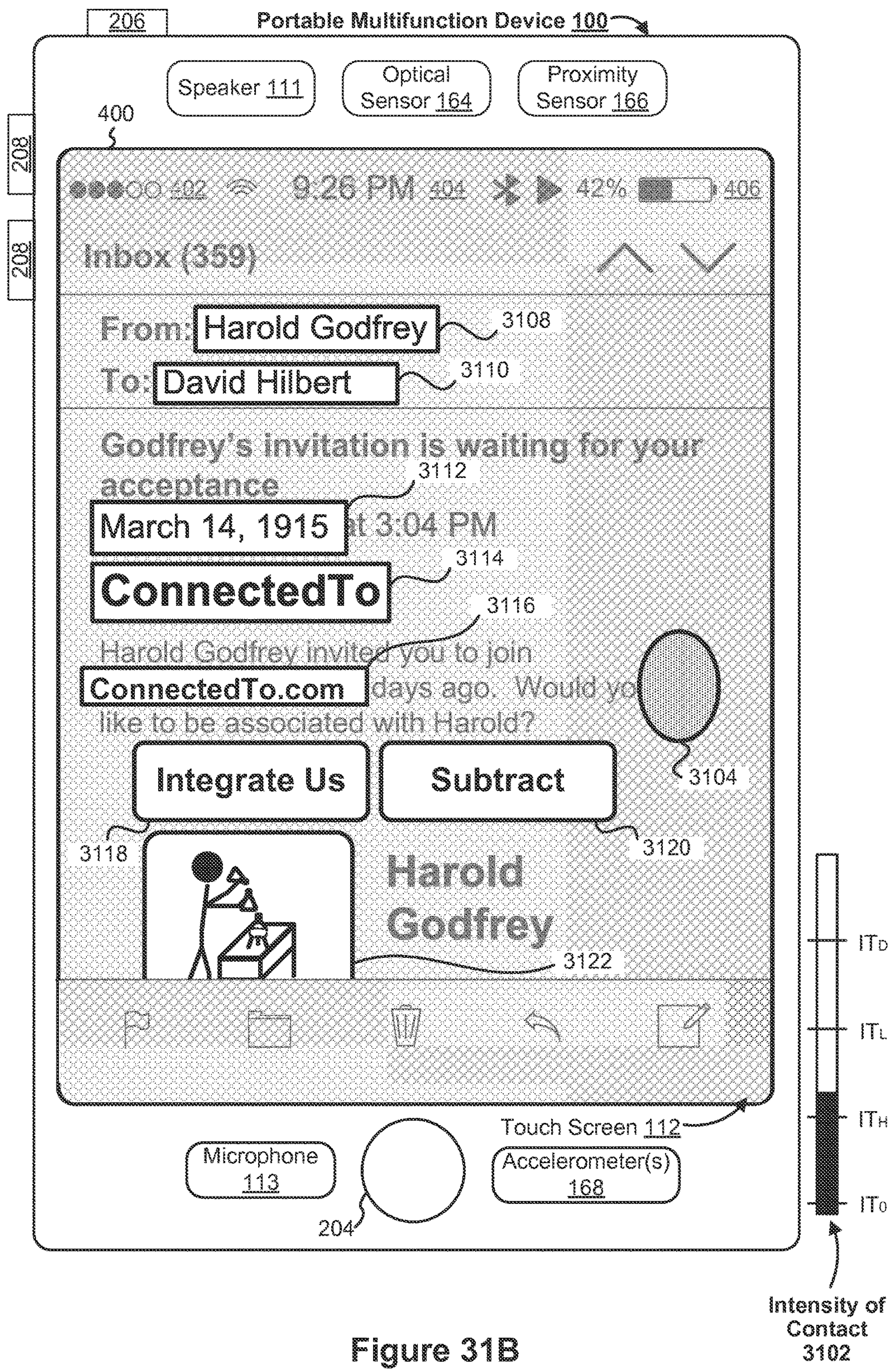
Figure 31C:
Figure 31D:
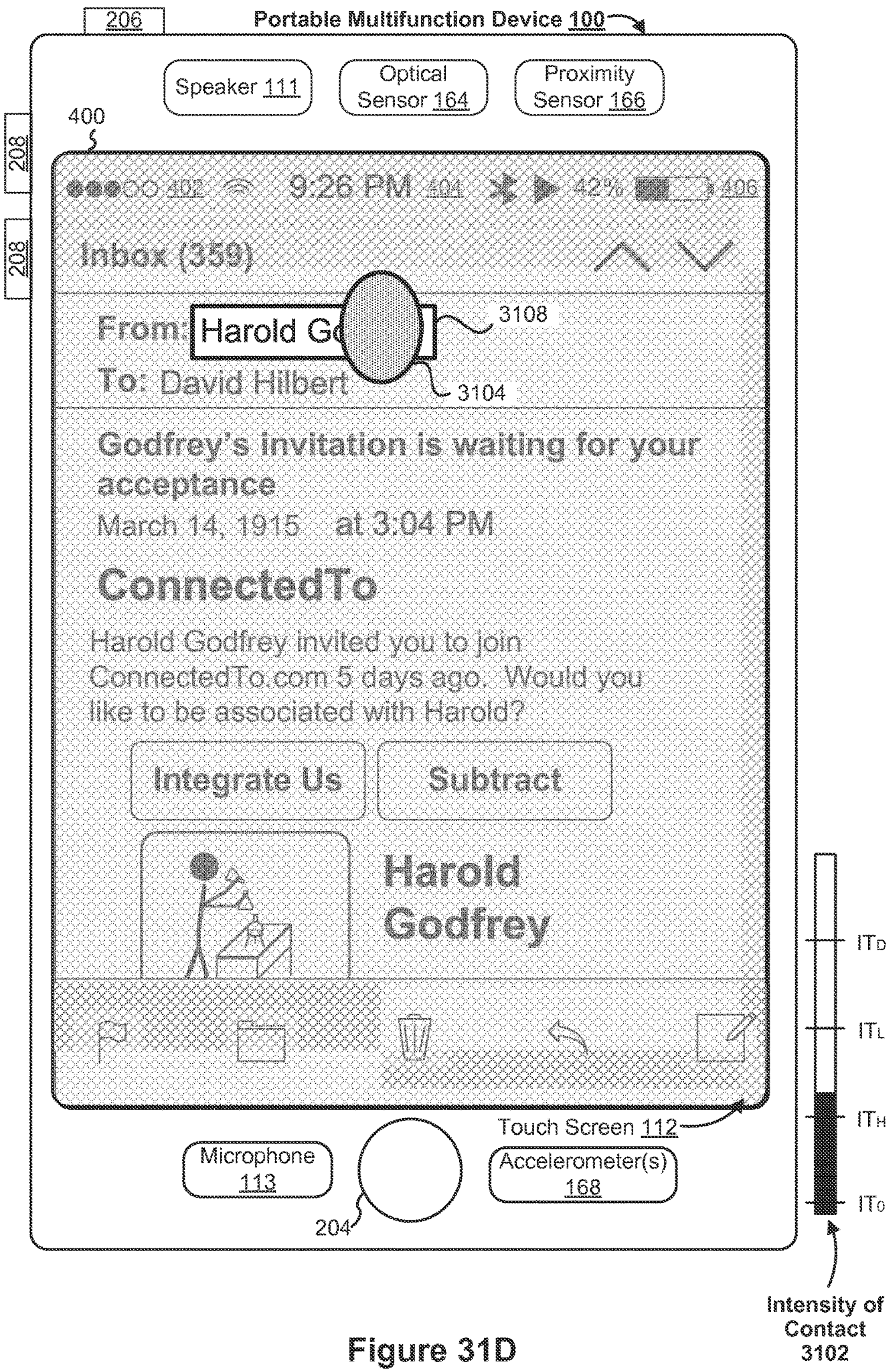
Figure 31E:
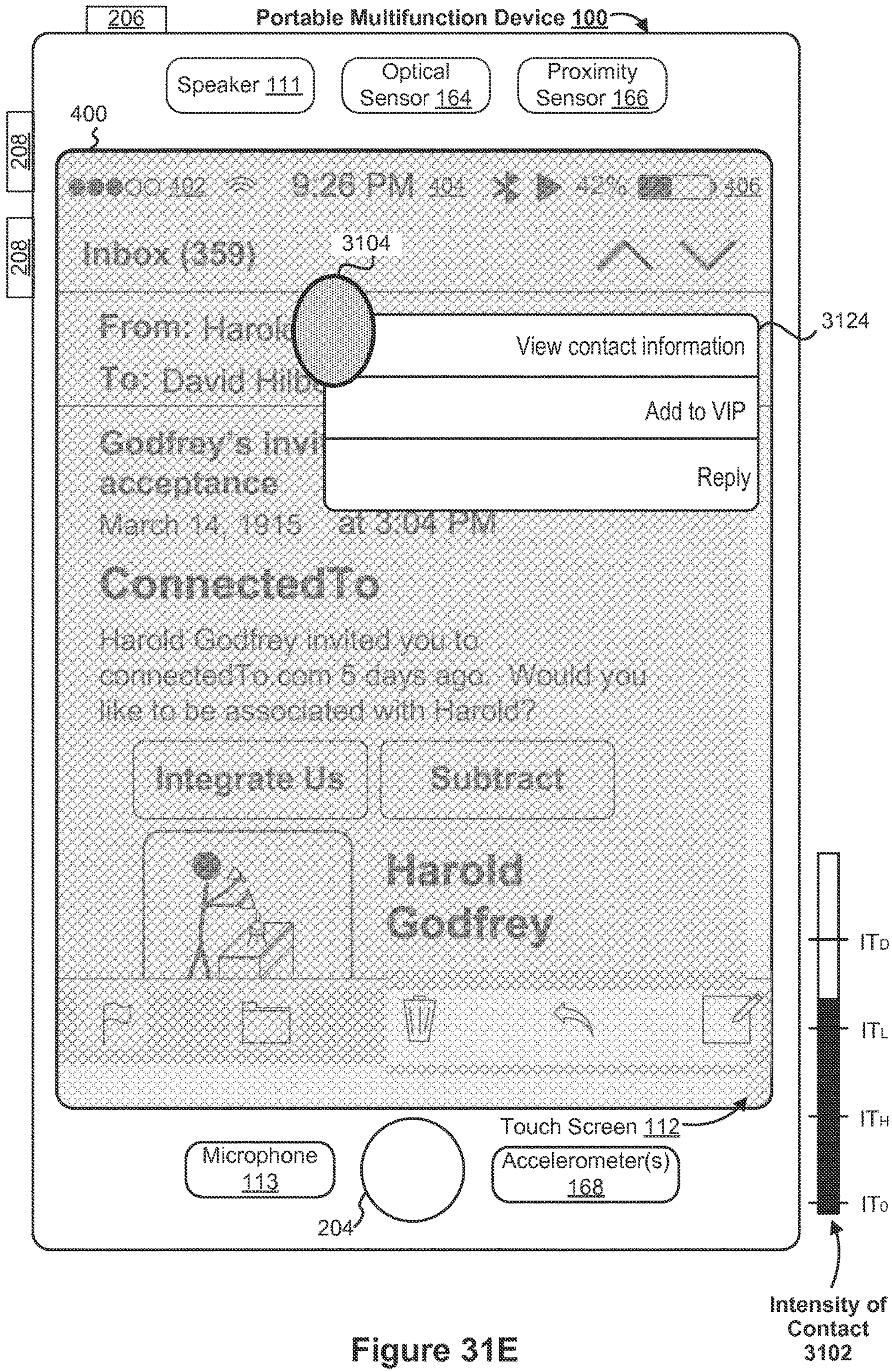
Figure 31F:
Figure 31G:
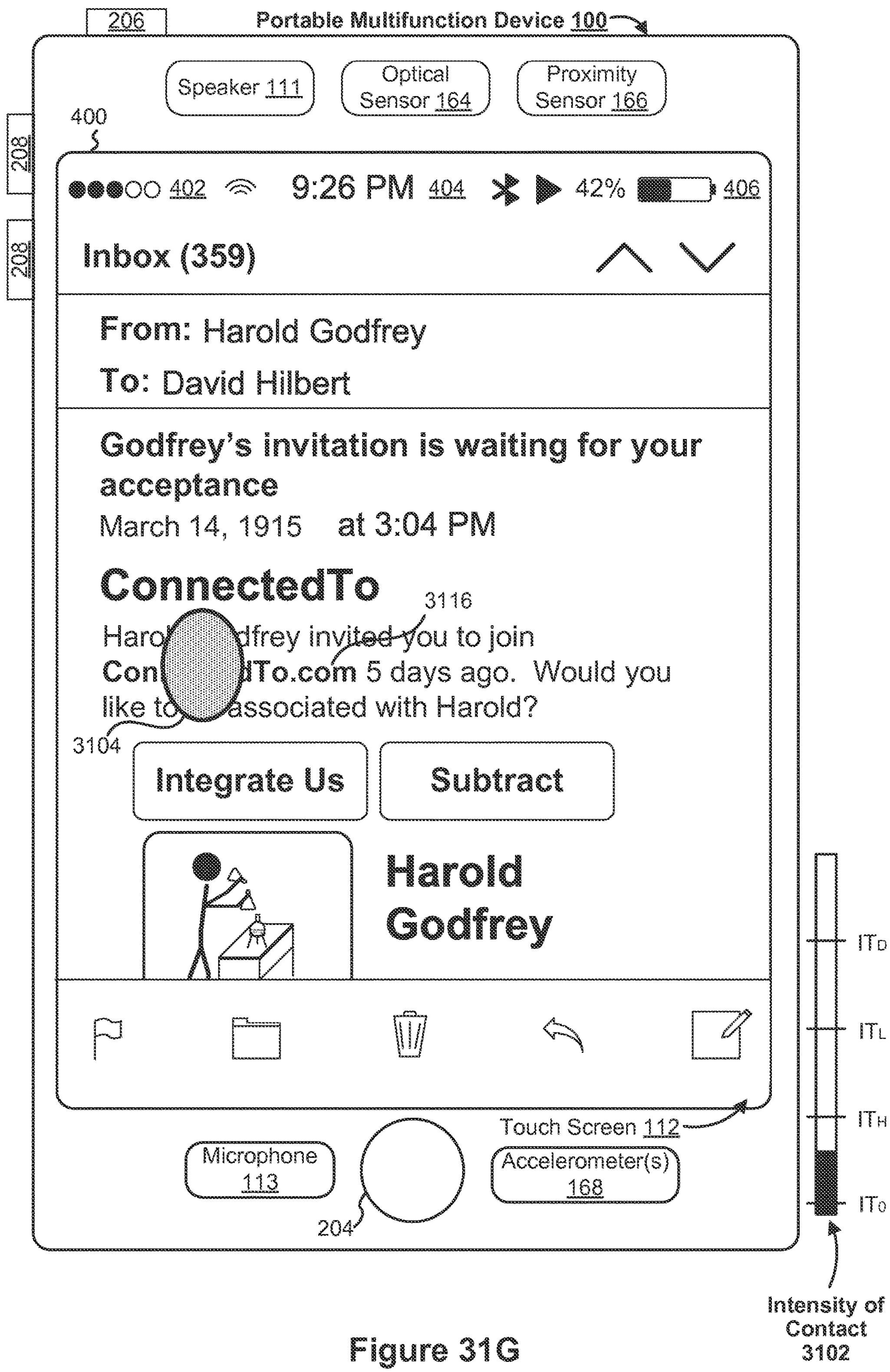
Figure 31H:
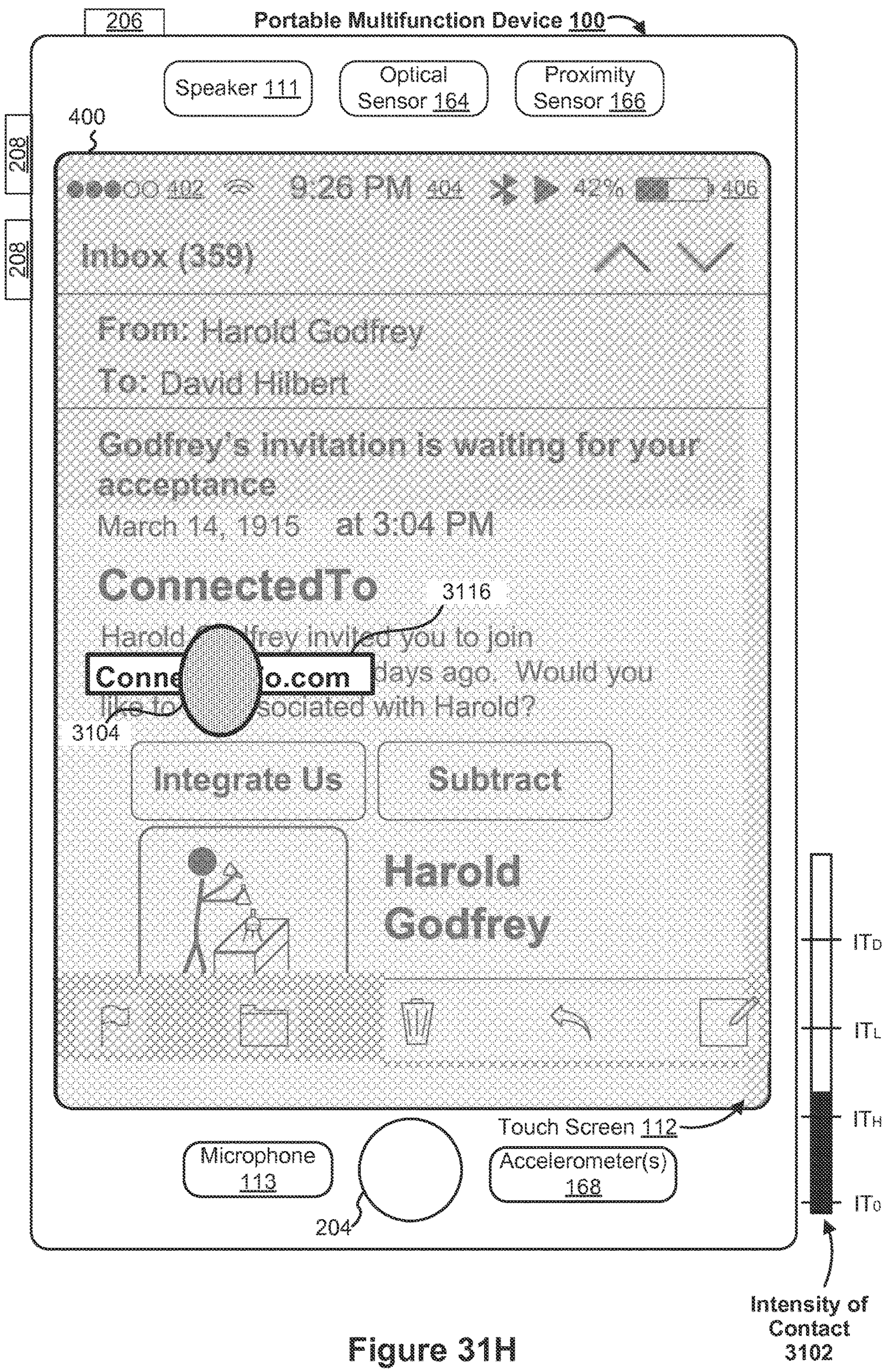
Figure 31I:
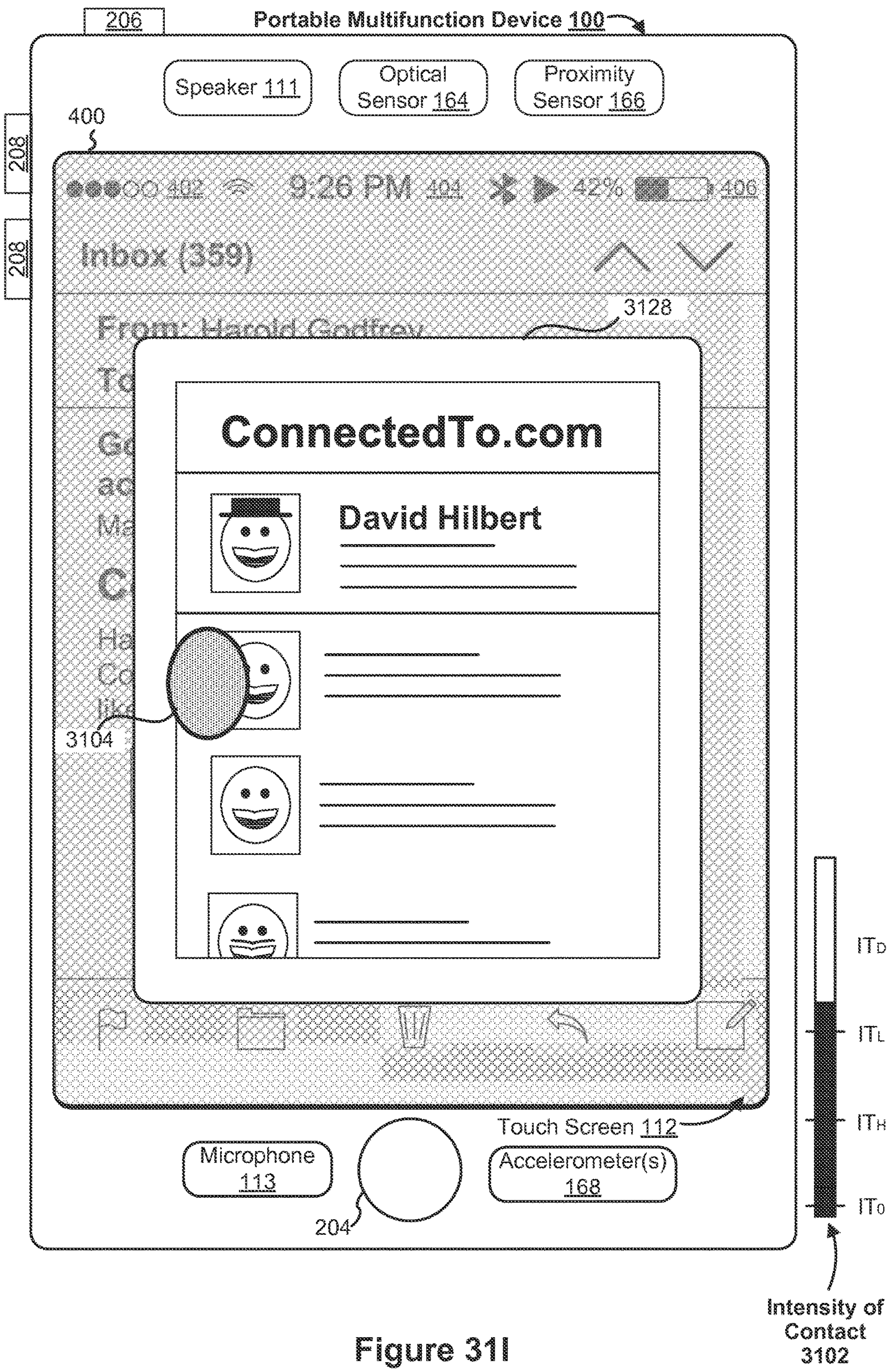
Figure 31J:
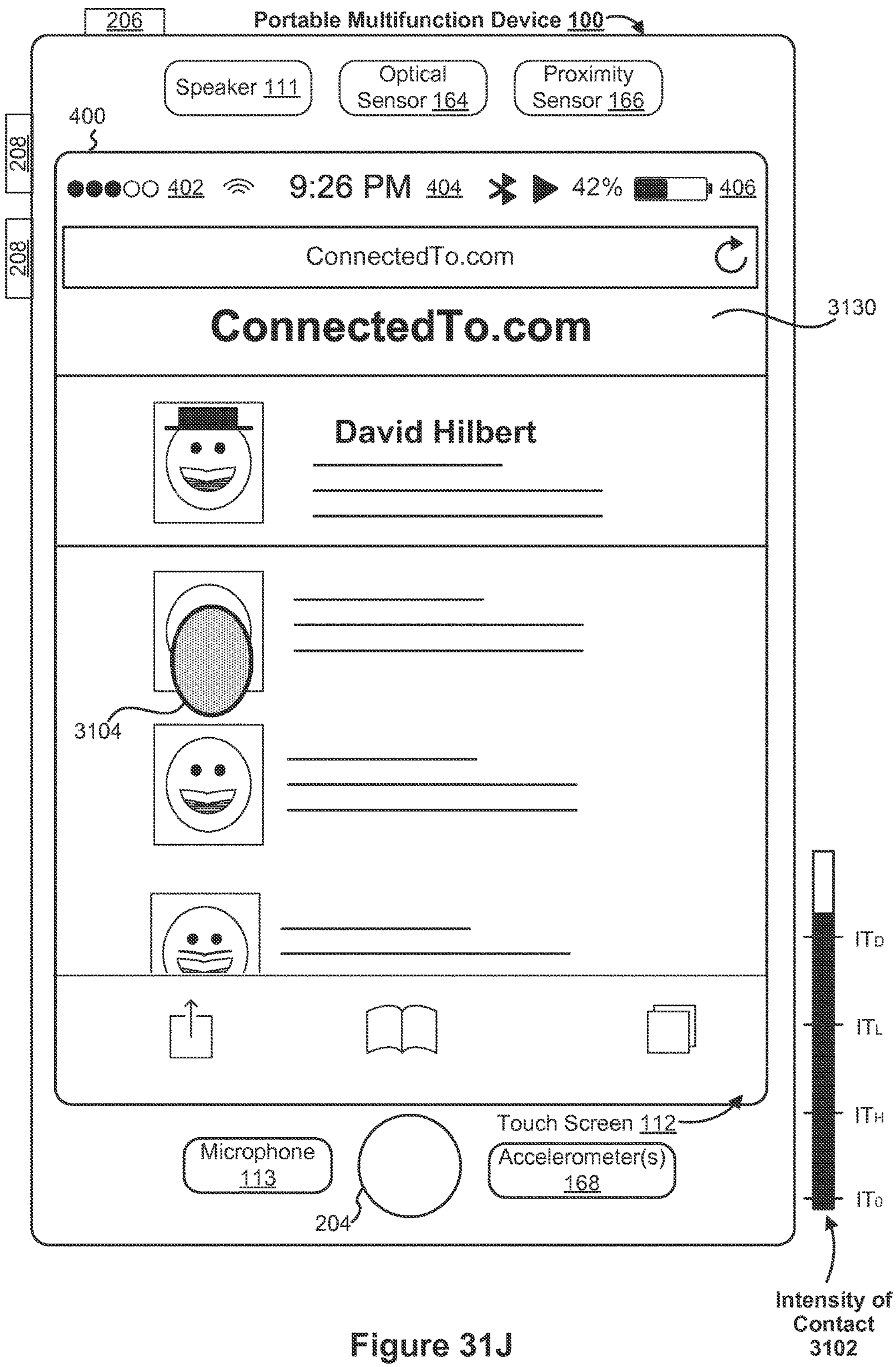
Figure 31K:
Figure 31L:
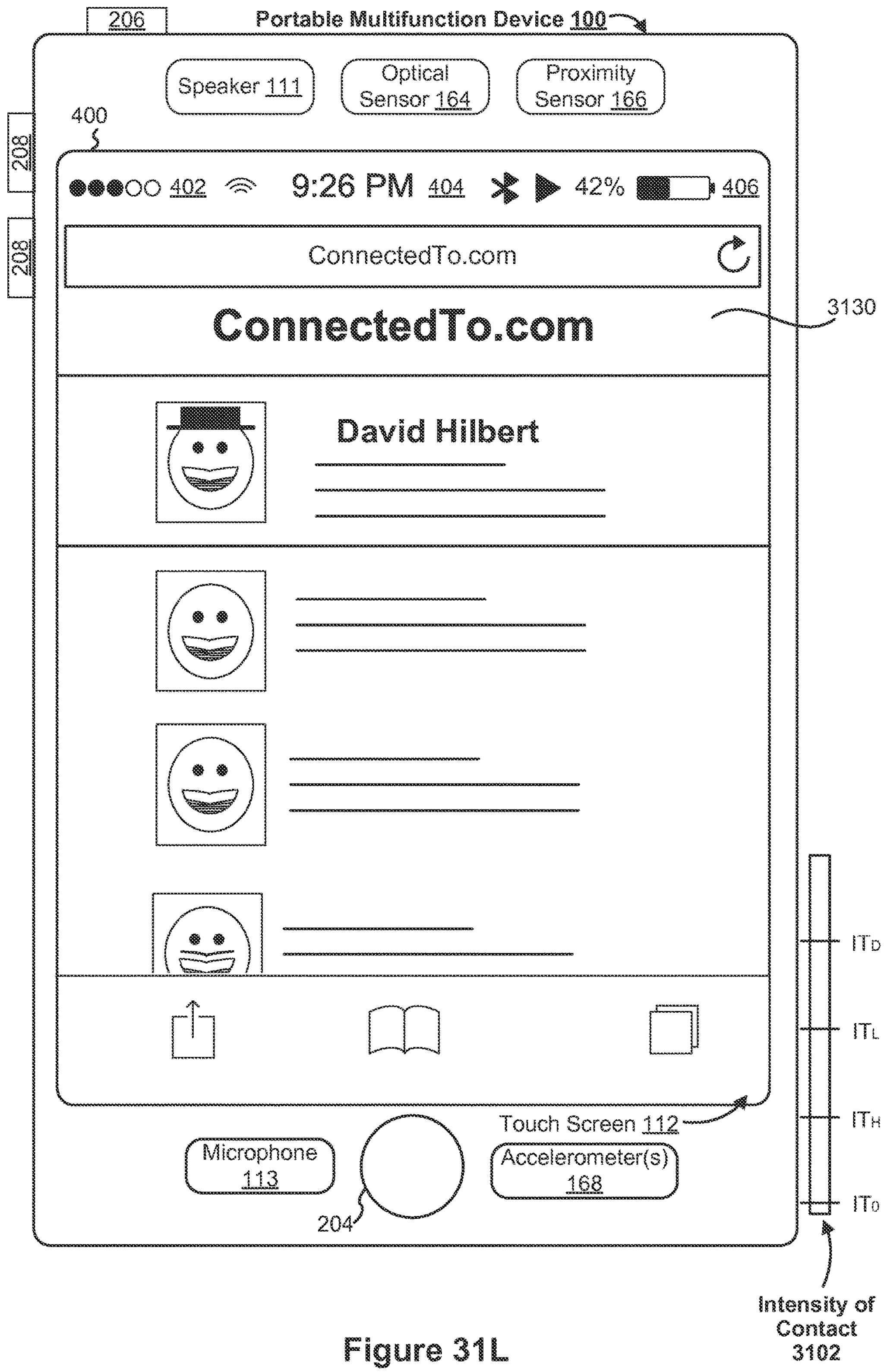
Figure 31M:
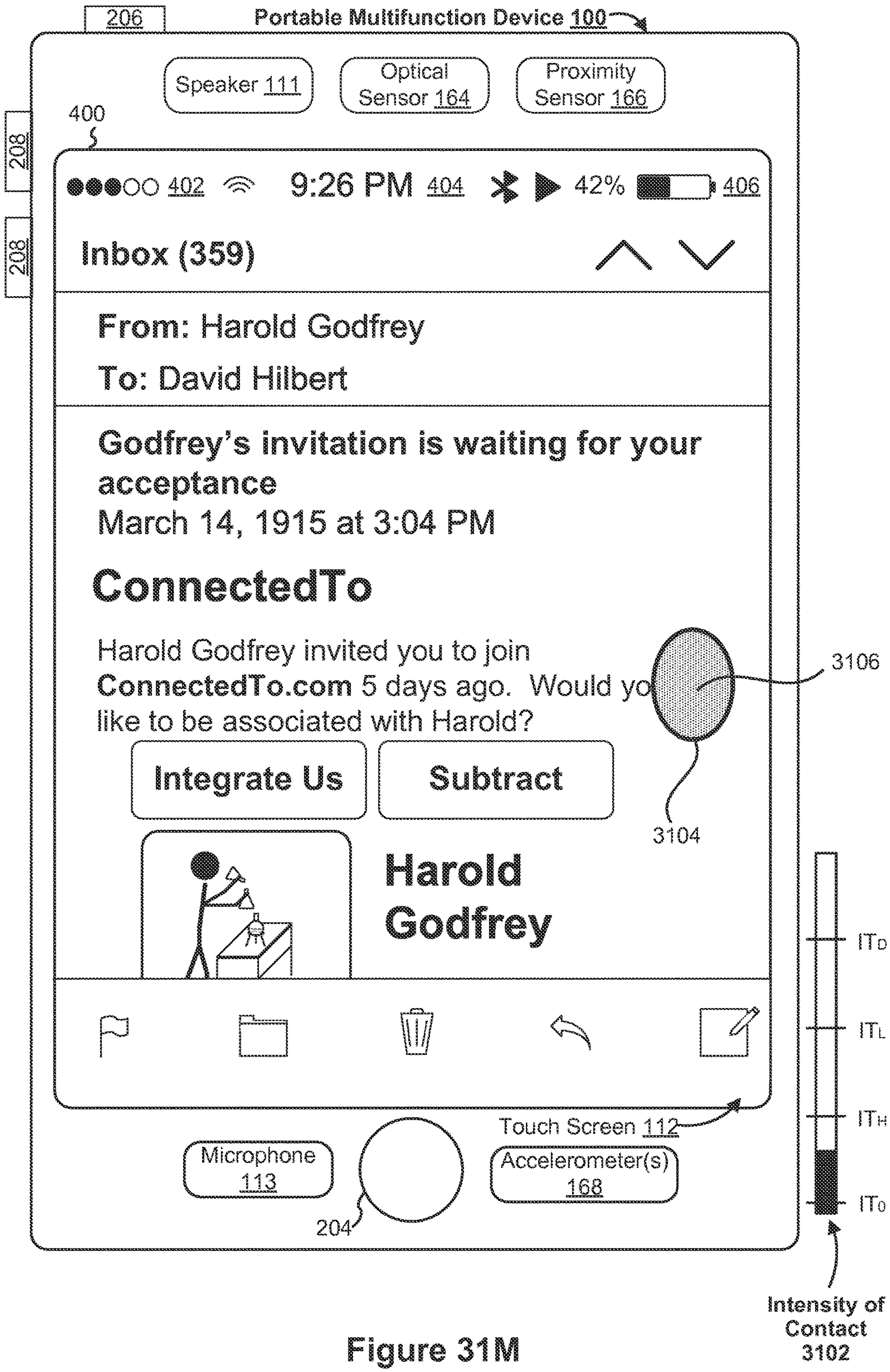
Figure 31N:
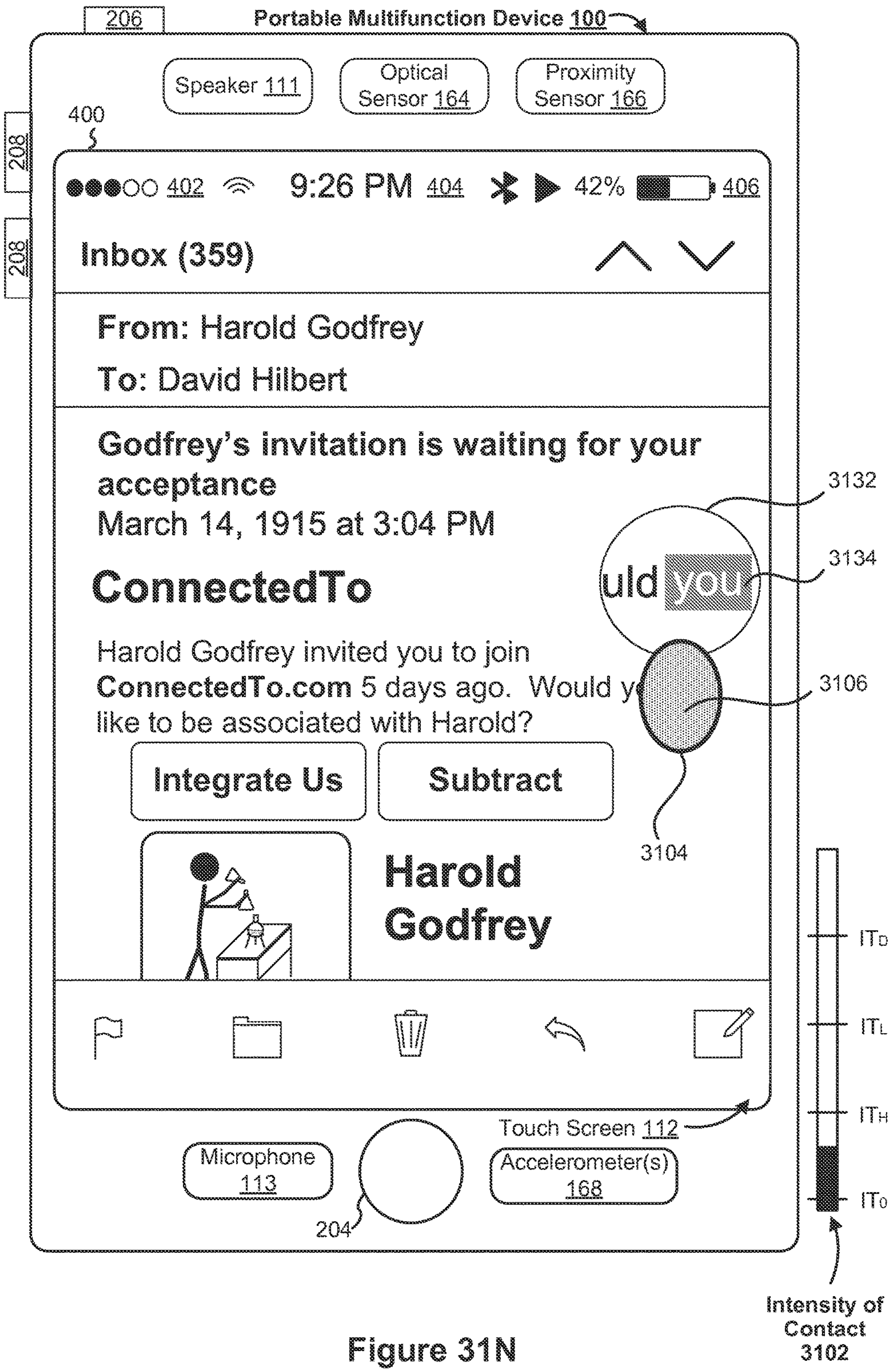
Figure 31O:
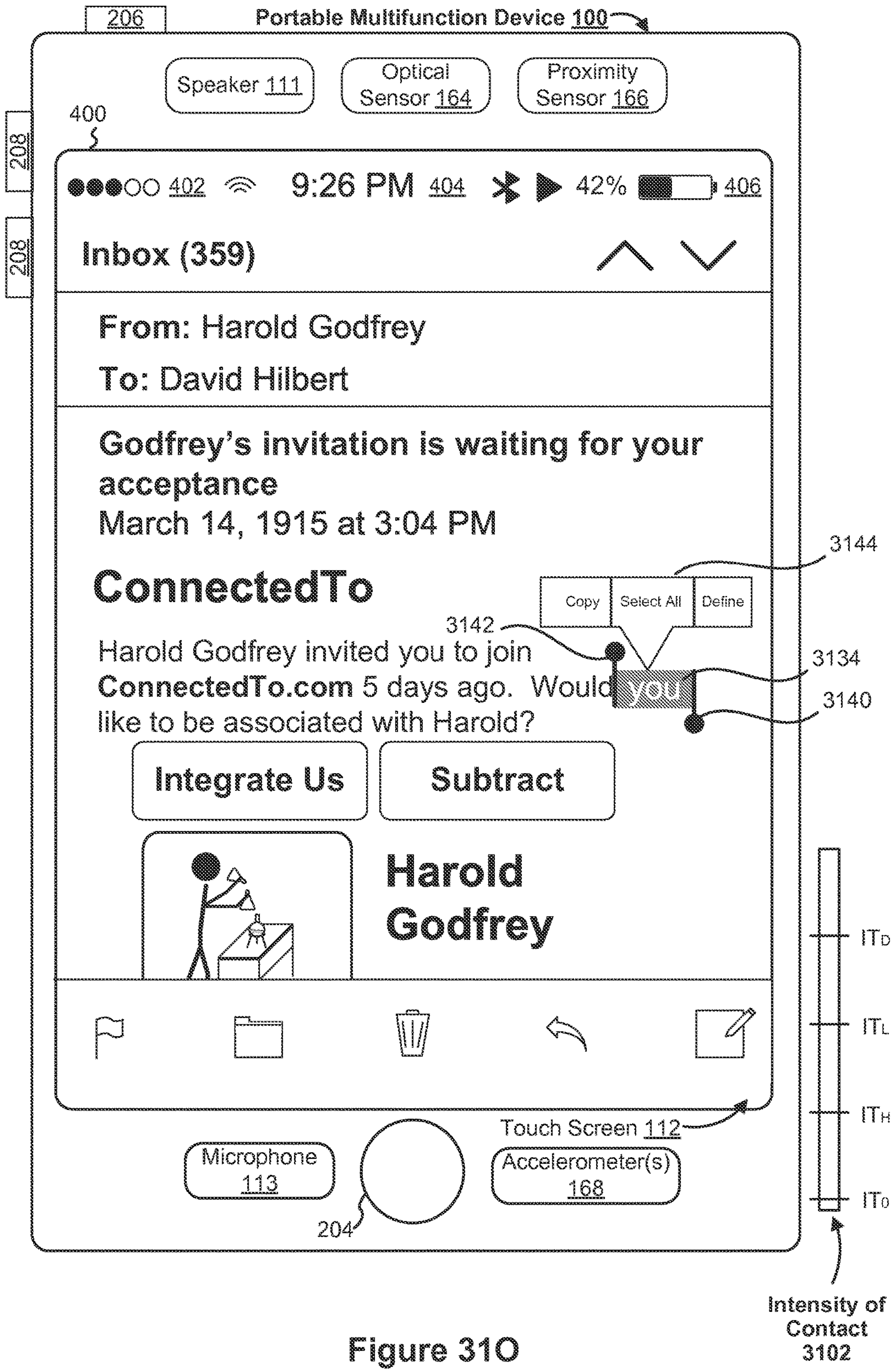
Figure 31P:
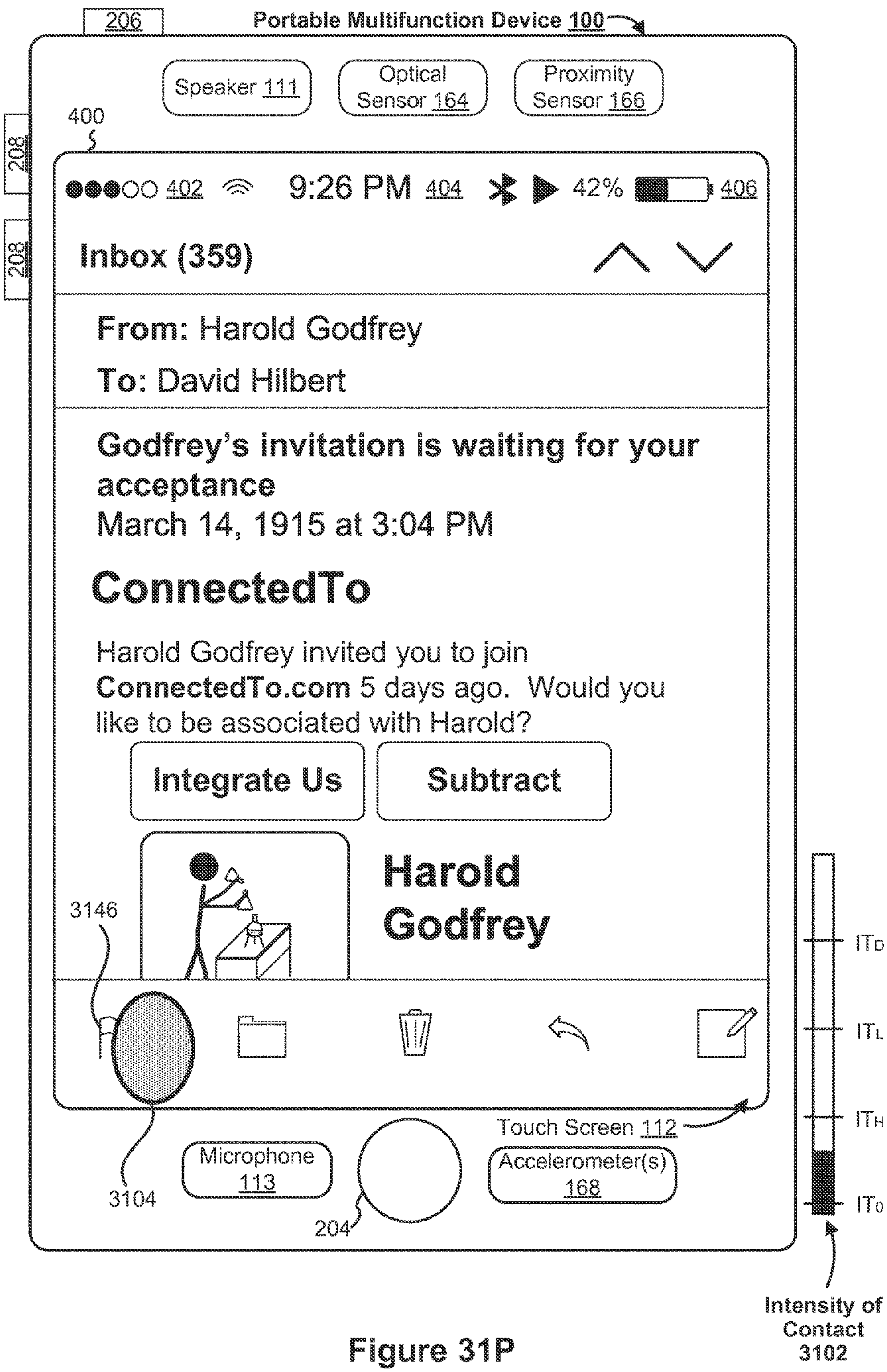
Figure 31Q:
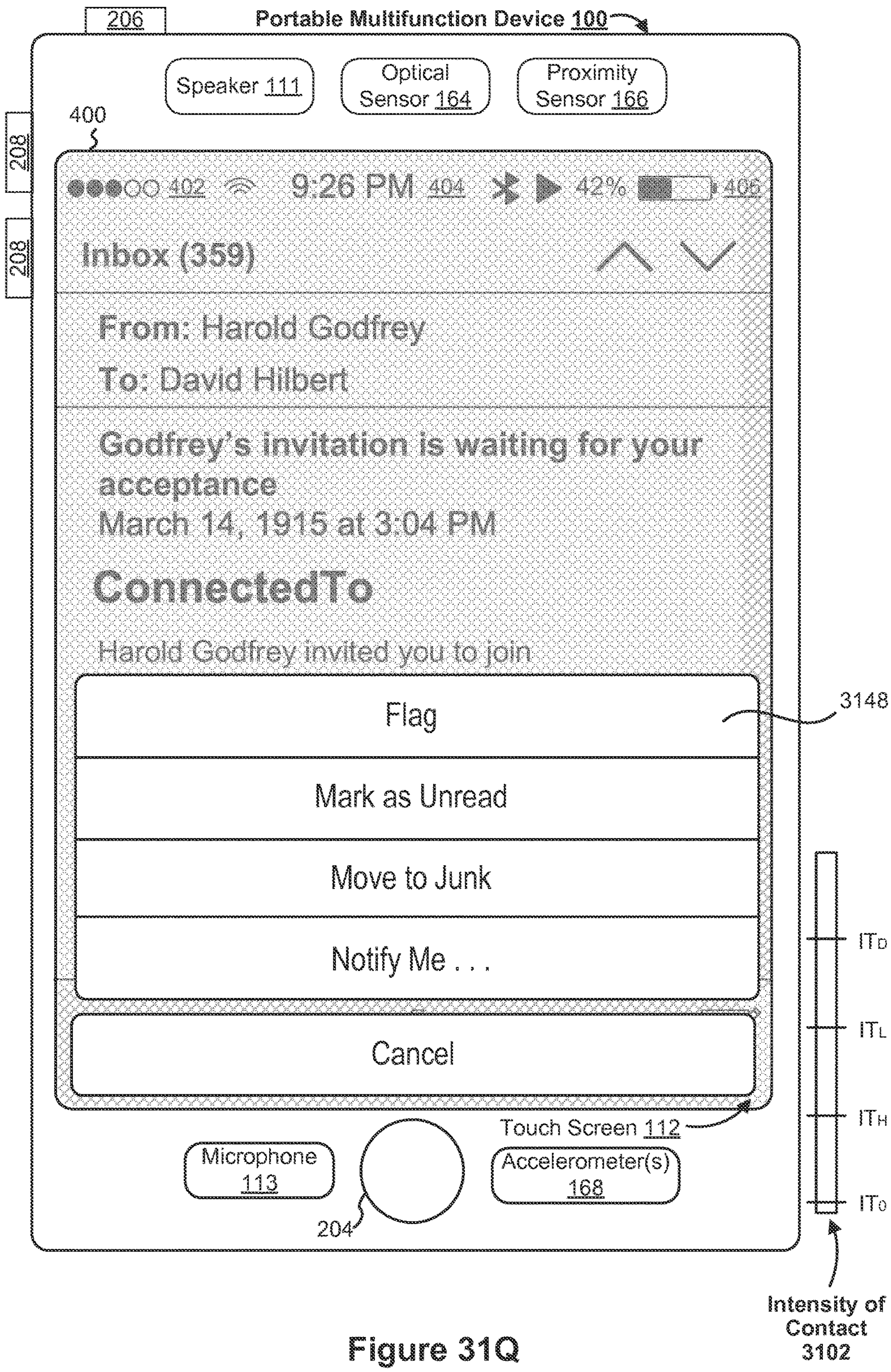

Below, FIGS. 31A-31Q illustrate exemplary user interfaces for visually distinguishing intensity sensitive user interface objects in a user interface. FIGS. 32A-32E and FIGS. 34A-34C are flow diagrams illustrating methods of visually distinguishing objects in a user interface. The user interfaces in FIGS. 31A-31Q are used to illustrate the processes in FIGS. 32A-32E and FIGS. 34A-34C.

FIGS. 31A-31Q illustrate exemplary user interfaces for visually distinguishing objects in a user interface in accordance with some embodiments. The user interfaces in these figures are used to illustrate the processes described below, including the processes in FIGS. 32A-32E and FIGS. 34A-34C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 31A-31Q, 32A-32E, and 34A-34C will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts described in FIGS. 31A-31Q on the touch-sensitive surface 451 while displaying the user interfaces shown in FIGS. 31A-31Q on the display 450, along with a focus selector.

FIGS. 31A-31B illustrate visually distinguishing pressure-sensitive objects in an exemplary user interface in accordance with some embodiments.

FIG. 31A illustrates a focus selector 3104 at location 3106 of user interface 400 that includes a plurality of user interface objects (e.g., text, buttons, headers, background, image, links, etc.). The characteristic intensity of the contact detected by touch screen 112 when focus selector 3104 is at location 3106, as illustrated in FIG. 31A, is below an intensity threshold (e.g., hint intensity threshold ("$IT_H$"), as illustrated by intensity meter 3102). In some embodiments, the intensity threshold is a light press intensity threshold ("$IT_L$"), also referred to as a "preview" or "peek" intensity threshold. In some embodiments, the intensity threshold is a deep press intensity threshold ("$IT_D$"), also referred to as a "pop" intensity threshold.

In FIG. 31B, the characteristic intensity of the contact indicated by focus selector 3104 has risen above the intensity threshold (e.g., above $IT_H$, as illustrated at intensity meter 3102, above $IT_L$, $IT_D$, or above another threshold level). As a result of the detected increase in characteristic intensity of the contact above the intensity threshold (e.g., $IT_H$), objects 3108-3122 are visually distinguished (i.e., highlighted and outlined) within user interface 400. Visually distinguishing of objects 3108-3122 occurs when focus selector 3104 is at a location away from objects 3108-3122 at the time that the increase in the characteristic intensity of the contact indicated by focus selector 3104 occurs. In other words, focus selector 3104 is at a location that is not associated with a user interface object that has an object-specific pressure-sensitive response or operation. Visually distinguishing objects 3108-3122 indicates that objects 3108-3122 are associated with object-specific operations that are triggered by changes in contact intensity. For example, 3108 is a contact information object indicating a contact name "Harold Godfrey" of a contact (e.g., a contact in a stored collection of contact information). Operations triggered by changes in contact intensity detected while focus selector 3104 is located at contact information object 3108 are described further with reference to FIGS. 31C-31F. In another example, 3116 indicates a hyperlink object. Operations triggered by changes in contact intensity detected while focus selector 3104 is located at hyperlink object 3116 are described further with reference to FIGS. 31G-31J. Additional objects shown in FIG. 31B include contact information object 3110; date object 3112 (e.g., with an associated operation that includes displaying information about inserting an event for that date into a calendar application); hyperlink objects 3114, 3118, and 3120; and image object 3120 (e.g., with an associated operation that includes displaying a preview with an enlarged version of the image). Other examples of pressure-sensitive objects and associated object-specific operations can be found in the specification with respect to discussions of "hint", "preview", "peek and pop", and quick action menus, for example.

As illustrated in FIG. 31B, a visual effect (i.e., darkening and blurring) is applied to a background region of user interface 400 (e.g., a background region that includes all locations of user interface 400 other than the locations of intensity sensitive objects (e.g., objects 3108-3122) in user interface 400.

FIGS. 31C-31F illustrate operations triggered by changes in contact intensity when focus selector 3104 is at a location of contact information object 3108 (for a contactable entity "Harold Godfrey").

FIG. 31C illustrates a focus selector 3104 at a location of contact information object 3108. The characteristic intensity of the contact detected by touch screen 112 when focus selector 3104 is at contact information object 3108, as illustrated in FIG. 31C, is below an intensity threshold (e.g., $IT_H$, as illustrated by intensity meter 3102).

As illustrated in FIG. 31D, the characteristic intensity of the contact indicated by focus selector 3104 at contact information object 3108 has risen above the intensity threshold (e.g., $IT_H$). As a result of the detected increase in characteristic intensity of the contact above the intensity threshold, object 3108 is visually distinguished (i.e., highlighted and outlined) within user interface 400, while other parts of user interface 400 is darkened and blurred.

As illustrated in FIG. 31E, the characteristic intensity of the contact indicated by focus selector 3104 at contact information object 3108 has risen above an intensity threshold (e.g., light press intensity threshold ("$IT_L$"), as illustrated by intensity meter 3102). As a result of the detected increase in characteristic intensity of the contact above the intensity threshold (e.g., $IT_L$), additional information (i.e., quick-action menu 3124) associated with contact information object 3108 is displayed. In some embodiments, the quick action menu 3124 will remain displayed upon lift-off of the contact to accept selection input for selecting one of the options included in the menu.

As illustrated in FIG. 31F, the characteristic intensity of the contact indicated by focus selector 3104 at contact information object 3108 has risen above an intensity threshold (e.g., deep press intensity threshold ("$IT_D$"), as illustrated by intensity meter 3102). As a result of the detected increase in characteristic intensity of the contact above the intensity threshold (e.g., $IT_D$), a new user interface (i.e., contact information interface 3126) associated with contact information object 3108 is displayed. In some embodiments, contact information interface 3126 continues to be displayed after a characteristic intensity of the contact decreases below the intensity threshold (e.g., below $IT_D$, below $IT_L$, below $IT_H$, below $IT_0$, on liftoff of the contact from touch screen 112, etc.).

FIGS. 31G-31J illustrate operations triggered by changes in contact intensity when focus selector 3104 is at a location of hyperlink object 3116.

FIG. 31G illustrates focus selector 3104 at a location of hyperlink object 3116 of user interface 400. The characteristic intensity of the contact detected by touch screen 112 when focus selector 3104 is at hyperlink object 3116, as illustrated in FIG. 31G, is below an intensity threshold (e.g., $IT_H$, as illustrated by intensity meter 3102).

As illustrated in FIG. 31H, the characteristic intensity of the contact indicated by focus selector 3104 at hyperlink object 3116 has risen above the intensity threshold (e.g., $IT_H$). As a result of the detected increase in characteristic intensity of the contact above the intensity threshold (e.g., $IT_H$), hyperlink object 3116 is visually distinguished (i.e., highlighted and outlined) within user interface 400, while other parts of user interface 400 is darkened and blurred.

As illustrated in FIG. 31I, the characteristic intensity of the contact indicated by focus selector 3104 at hyperlink object 3108 has risen above an intensity threshold (e.g., $IT_L$, as illustrated by intensity meter 3102). As a result of the detected increase in characteristic intensity of the contact above the intensity threshold (e.g., $IT_L$), additional information (e.g., preview area 3128 including a preview of a website target of the hyperlink associated with hyperlink object 3116) is displayed. In some embodiments, the additional information (e.g., preview area 3128) will cease to be displayed, and user interface 400 will be restored upon lift-off of the contact.

As illustrated in FIG. 31J, the characteristic intensity of the contact indicated by focus selector 3104 at hyperlink object 3116 has risen above an intensity threshold (e.g., $IT_D$, as illustrated by intensity meter 3102). As a result of the detected increase in characteristic intensity of the contact above the intensity threshold (e.g., $IT_D$), a new user interface (i.e., the website target associated with the link of object 3116) is displayed in website application 3130. In some embodiments, website application 3130 continues to be displayed after a characteristic intensity of the contact decreases below the intensity threshold (e.g., below $IT_D$, below $IT_L$, below $IT_H$, below $IT_0$, on liftoff of the contact from touch screen 112, etc.).

FIGS. 31K-31L illustrate operations that occur in response to an input (e.g., a tap input) received when focus selector 3104 is at a location of object 3116 and the characteristic intensity of the contact does not exceed an intensity threshold (e.g., $IT_H$, as illustrated by intensity meter 3102) prior to lift-off of the contact from touch screen 112.

FIG. 31K illustrates focus selector 3104 at a location of object 3116 of user interface 400. The characteristic intensity of the contact detected by touch screen 112 when focus selector 3104 is at object 3116, as illustrated in FIG. 31K, is below an intensity threshold (e.g., $IT_H$).

In FIG. 31L, the contact has lifted off of touch screen 112. As a result of the detected input (e.g., the tap input), the website target associated with the hyperlink of hyperlink object 3116 is displayed in website application 3130.

FIGS. 31M-31O illustrate operations that occur in response to an input (e.g., a tap input) received when focus selector 3104 is at location 3106 and the characteristic intensity of the contact does not exceed an intensity threshold (e.g., $IT_H$, as illustrated by intensity meter 3102) prior to lift-off of the contact from touch screen 112.

FIG. 31M illustrates focus selector 3104 at a location 3106 of user interface 400. The characteristic intensity of the contact detected by touch screen 112 when focus selector 3104 is at location 3106, as illustrated in FIG. 31M, is below an intensity threshold (e.g., $IT_H$).

In FIG. 31N, the contact has remained in contact with touch screen 112 for a predetermined period of time and the intensity of the contact has remained below an intensity threshold (e.g., $IT_H$) during the predetermined period of time. As a result of the detected input (e.g., the tap input, such as a "long tap" input), magnifying loupe 3132 appears. Text 3134 from under focus selector 3104 is shown magnified in magnifying loupe 3132. A word of text 3134 from under focus selector 3104 is shown selected (e.g., highlighted to indicate selected status) within magnifying loupe 3132.

In FIG. 31O, the contact has lifted off of touch screen 112. As a result of the detected input discussed with regard to FIGS. 31M-31N, the word of text 3134 is shown selected (e.g., highlighted to indicate selected status). In some embodiments, text selection lollipops 3140 and 3142 are displayed to allow alteration of the text selection. In some embodiments, an action menu 3144 for operations related to the selected text is shown.

FIGS. 31P-31Q illustrate operations that occur in response to an input (e.g., a tap input) received when focus selector 3104 is at a location of object 3146 and the characteristic intensity of the contact does not exceed an intensity threshold (e.g., $IT_H$, as illustrated by intensity meter 3102) prior to lift-off of the contact from touch screen 112.

FIG. 31P illustrates focus selector 3104 at a location of object 3146 of user interface 400. The characteristic intensity of the contact detected by touch screen 112 when focus selector 3104 is at object 3146 is below an intensity threshold (e.g., $IT_H$).

In FIG. 31Q, the contact has lifted off of touch screen 112. As a result of the detected input (e.g., the tap input), menu 3148 associated with object 3146 is displayed.

FIGS. 32A-32E are flow diagrams illustrating a method 3200 of visually distinguishing press-sensitive user interface objects in accordance with some embodiments. The method 3200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 3200 are, optionally, combined and/or the order of some operations is, optionally, changed.

As described below, the method 3200 provides an intuitive way to indicate intensity sensitive user interface objects in a user interface. The method reduces the number, extent, and/or nature of the inputs from a user and produces a more efficient human-machine interface. For battery-operated electronic devices, enabling a user to learn about intensity sensitive user interface objects in the user interface faster and more efficiently conserves power and increases the time between battery charges.

The device displays (3202), on the display, a user interface (e.g., user interface 400 in FIG. 31A) that includes a plurality of user interface objects that are associated with respective object-specific operations that are triggered by changes in contact intensity (e.g., the respective object-specific operations for different user interface objects in the user interface are distinct from one another)(e.g., user interface objects 3108-3122 in FIG. 31B), wherein the plurality of user interface elements include a first object (e.g., object 3116 in FIG. 31B) displayed at a first location in the user interface and a second object (e.g., object 3108 in FIG. 31B) displayed at a second location in the user interface.

While displaying the user interface that includes the plurality of user interface elements, the device detects (3204) a first input that includes detecting a first contact (e.g., contact 3104 in FIG. 31B) on the touch-sensitive surface and detecting an increase in a characteristic intensity of the first contact above a first intensity threshold (e.g., a hint intensity threshold, a preview intensity threshold, etc.). In response to detecting the first input: in accordance with a determination that a focus selector is at the first location in the user interface at which the first object is displayed, the device performs (3206) a first operation associated with the first object that includes displaying, on the display, additional information associated with the first object (e.g., information that was not displayed in the user interface immediately prior to detecting the first input). (The additional information is specific to the first object (e.g., if the first object is an application icon for an email program on the home screen, the additional information optionally includes a menu of actions that are associated with the email program (e.g., compose, go to inbox, go to contact list, etc.); and if the first object is a hyperlink in a document, the additional information optionally includes a preview of a webpage associated with the hyperlink).). In accordance with a determination that a focus selector is at the second location in the user interface at which the second object is displayed, the device performs a second operation associated with the second object that includes displaying, on the display, additional information associated with the second object (e.g., information that was not displayed in the user interface immediately prior to detecting the input. The additional information is specific to the second object (e.g., if the second object is an application icon for an telephony program on the home screen, the additional information optionally includes a menu of actions that are associated with the telephony program (e.g., call, callback, FaceTime, go to contact list, etc.). If the second object is an avatar of a user, the additional information optionally includes a menu of actions that that are associated with performing various communication functions in connection with the user. If the second object represents a conversation in a chat program, the additional information optionally includes a conversation interface showing a sequence of messages exchanged during the conversation. Wherein the second operation associated with the second object is distinct from the first operation associated with the first object. In accordance with a determination that a focus selector is at the location in the user interface that is away from any objects that are associated with object-specific operations that are triggered by changes in contact intensity, the device performs a third operation that includes updating the user interface on the display to concurrently visually distinguish (e.g., highlight, animate, enlarge, lift up in z-direction from the user interface plane) the first and second objects in the user interface (e.g., without displaying the additional information associated with the first object or the additional information associated with the second object). In some embodiments, updating the user interface on the display includes concurrently visually distinguishing a first group of objects (e.g., all objects in the user interface that are associated with respective object-specific operations that are triggered by changes in contact intensity) from a second group of objects (e.g., other objects (and optionally, background regions) that do not have associated object-specific operations that are triggered by changes in contact intensity) in the user interface. In some embodiments, updating the user interface on the display to concurrently visually distinguishing the first and second objects in the user interface includes maintaining the appearance of the first and second objects (as well as all other objects in the first group of objects in the user interface), while applying a visual effect (e.g., blurring, darkening, masking, etc.) to visually obscure objects in the second group of objects in the user interface. This is illustrated in FIGS. 31I, 31E, and 31B, where, when contact intensity increases above a respective threshold (e.g., $IT_L$), preview area 3128 is displayed when contact 3104 is over object 3116, menu 3124 is displayed when contact 3104 is over object 3108, and objects 3108 and 3116 are visually distinguished when contact 3104 is at location 3106 away from any of the pressures sensitive objects (e.g., objects 3108 and 3116). Although not shown in FIGS. 31D and 31H, in some embodiments, when contact intensity reaches above $IT_H$, some indications (e.g., reduced versions) of menu 3124 and preview 3128 are optionally shown (e.g., growing larger) with increased contact intensity.

In some embodiments, the first operation associated with the first object includes (3208) emphasizing the first object relative to the second object. In some embodiments, the first operation associated with the first object also includes emphasizing the first object relative to one or more regions of the user interface that are separate from the first object and the second object, and are not associated with object-specific responses to changes in contact intensity. In some embodiments, emphasizing the first object relative to the second object includes enhancing the appearance of the first object by, e.g., highlighting, magnifying, lifting up from the user interface plane, and/or animating, the first object to make the first object more distinct on the display than the second object, while maintaining the appearance of the second object (and optionally, the appearance of some or all other objects in remainder of the user interface). In some embodiments, emphasizing the first object relative to the second object includes obscuring the second object (and optionally, some or all other objects in the remainder of the user interface) by, e.g., blurring, shrinking, and/or masking, to make the second object (and the some or all other objects in the remainder of the user interface) less clear or distinct on the display, while maintaining the appearance of the first object in the user interface. In some embodiments, emphasizing the first object relative to the second object includes enhancing the appearance of the first object, while obscuring the second object (and optionally, some or all other objects in the remainder of the user interface). In some embodiments, emphasizing the first object relative to the second object includes providing a visual hint that the first object is an object that would respond to changes in contact intensity by producing an object-specific response (e.g., providing a preview or displaying a quick action menu that is specific to the first object).

In some embodiments, an amount of visual effect applied to emphasize the first object relative to the second object is dynamically varied in accordance with a current change in the characteristic intensity of the contact above the first intensity threshold. In some embodiments, an amount of visual effect applied to emphasize the second object relative to the first object, an amount of visual effect applied to emphasize the first and second objects relative to other objects that do not have associated object-specific operations that are triggered by changes in contact intensity are dynamically varied in accordance with a current change in the characteristic intensity of the contact.

In some embodiments, the second operation associated with the second object includes (3212) emphasizing the second object relative to the first object. In some embodiments, the second operation associated with the second object also includes emphasizing the second object relative to one or more regions of the user interface that are separate from the first object and the second object, and that are not associated with object-specific responses to changes in contact intensity. In some embodiments, emphasizing the second object relative to the first object includes enhancing the appearance of the second object by, e.g., highlighting, magnifying, lifting up from the user interface plane, and/or animating, the second object to make the second object more distinct on the display than the first object, while maintaining the appearance of the first object (and optionally, the appearance of some or all other objects in remainder of the user interface). In some embodiments, emphasizing the second object relative to the first object includes obscuring the first object (and optionally, some or all other objects in the remainder of the user interface) by, e.g., blurring, shrinking, and/or masking, to make the first object (and the some or all other objects in the remainder of the user interface) less clear or distinct on the display, while maintaining the appearance of the second object in the user interface. In some embodiments, emphasizing the second object relative to the first object includes enhancing the appearance of the second object, while obscuring the first object (and optionally, some or all other objects in the remainder of the user interface). In some embodiments, emphasizing the second object relative to the first object includes providing a visual hint that the second object is an object that would respond to changes in contact intensity by producing an object-specific response (e.g., providing a preview or displaying a quick action menu that is specific to the second object).

In some embodiments, the third operation includes (3214) emphasizing the first object and the second object. In some embodiments, the third operation includes emphasizing the first object and the second object relative to one or more regions of the user interface that are separate from the first object and the second object and that are not associated with object-specific responses to changes in contact intensity.

In some embodiments, the emphasizing in the third operation includes (3216) emphasizing the first object in the same way that the first operation emphasizes the first object and emphasizing the second object in the same way that the second operation emphasizes the second object (e.g., by blurring all other objects (and optionally, background regions) that are not subject to the emphasizing in the user interface).

In some embodiments, the first object is (3218) associated with a first type of intensity-triggered operation (e.g., providing a preview associated with the first object in response to contact intensity meeting a preview-presentation criterion (e.g., also referred to a "peek" criterion), and providing content represented in the preview in response to contact intensity meeting a user interface transition criterion (e.g., also referred to as a "pop" criterion)) (e.g., when the first object is a first web link, the first type of intensity-triggered operation associated with the first object includes presenting a preview of a first webpage represented in the first web link, when the contact intensity reaches a preview-presentation intensity threshold (e.g., the "peek" intensity threshold), and/or presenting the first webpage when the contact intensity reaches a user interface transition intensity threshold (e.g., the "pop" intensity threshold)). This is illustrated in FIGS. 31G-31J.

In some embodiments, the second object is (3220) associated with a second type of intensity-triggered operation (e.g., providing a quick action menu associated with the second object in response to contact intensity meeting a menu-presentation criterion (e.g., as illustrated in FIGS. 31C-31E), and optionally, performing a default direction-selection action in the quick action menu in response to contact intensity meeting a direct-selection criterion) that is distinct from the first type of intensity-triggered operation (e.g., as illustrated in FIG. 31F). In an example where the second object is an application icon for an email program, the second type of intensity-triggered operation associated with the second object includes presenting a quick action menu for the email program when the contact intensity reaches menu-presentation intensity threshold, and performing a default direct-selection action in the quick action menu when the contact intensity reaches direct-selection intensity threshold.

In some embodiments, the first object is (3222) associated with a first type of intensity-triggered operation for revealing first content associated with the first object (e.g., when the first object is a first web link, the first type of intensity-triggered operation associated with the first object includes presenting a preview of a first webpage represented in the first web link, when the contact intensity reaches a first intensity threshold (e.g., the "peek" intensity threshold), and presenting the first webpage when the contact intensity reaches a second intensity threshold (e.g., the "pop" intensity threshold)). This is illustrated in FIGS. 31G-31J.

In some embodiments, the second object is (3224) associated with the first type of intensity-triggered operation for revealing second content associated with the second object (e.g., when the second object is a second web link, the first type of intensity-triggered operation associated with the second object includes presenting a preview of a second webpage represented in the second web link, when the contact intensity reaches the first intensity threshold (e.g., the "peek" intensity threshold), and presenting the second webpage when the contact intensity reaches the second intensity threshold (e.g., the "pop" intensity threshold)).

In some embodiments, the first object is (3226) associated with a first type of action API associated with changes in contact intensity. In some embodiments, the device determines whether the first object is associated with a Peek-and-Pop API. In some embodiments, the device determines whether the first object is associated with a Quick Action Menu API. In some embodiments, if the electronic device determines that if an object at the location of the focus selector is not associated with any action API that responds to changes in contact intensity, the device determines that an appropriate response is to visually distinguish/emphasize the objects that are associated with the Peek-and-Pop API or the Quick Action API in the user interface.

In some embodiments, performing the first operation associated with the first object includes (3228) presenting first information that corresponds to the first object (e.g., a "peek" operation for the first object) when the character intensity of the contact increases above the first intensity threshold (e.g., a light press threshold); and presenting second information, that is distinct from the first information, that corresponds to the first object (e.g., a "pop" operation for the first object) when the character intensity of the contact increases above a second intensity threshold (e.g., a deep press threshold) that is greater than the first intensity threshold. In some embodiments, the first intensity threshold is greater than a contact detection threshold. In some embodiments, the first intensity threshold is the "peek" intensity threshold.

In some embodiments, the first information that corresponds to the first object is (3230) a preview associated with the first object (e.g., preview 3128 in FIG. 31I), and the second information that corresponds to the first object is a second user interface associated with the first object (e.g., webpage 3130 in FIG. 31J). In some embodiments, the preview is a preview of the second user interface.

In some embodiments, performing the second operation associated with the second object includes (3232) presenting first information that corresponds to the second object (e.g., presenting a quick action menu for the second object) when the character intensity of the contact increases above the first intensity threshold (e.g., a light press threshold); and performing an action represented in the first information that corresponds to the second object (e.g., performing a direct-selection action in the quick action menu for the second object) when the character intensity of the contact increases above a second intensity threshold (e.g., a deep press threshold) that is greater than the first intensity threshold. In some embodiments, the first intensity threshold is greater than a contact detection threshold. In some embodiments, the first intensity threshold is the "peek" intensity threshold.

In some embodiments, the first information that corresponds to the second object is (3234) a menu of actions associated with the second object, and the action represented in the first information that corresponds to the second object is a direct-selection action represented in the menu of actions associated with the second object. For example, the second object is a representation of a contactable entity (e.g., a name or avatar of a user), and a quick action menu with actions (such as "call" "message", "FaceTime", "email", etc.) is presented in response to the contact intensity increases above the first intensity threshold (e.g., a menu-presentation intensity threshold), and a default direct-selection action (e.g., "call") is selected and performed (e.g., a default phone number of the contact is dialed) when the contact intensity increases above the second intensity threshold (e.g., a direct-selection intensity threshold).

In some embodiments, while displaying the user interface on the display, the device detects (3236) a second input (e.g., a tap gesture) that includes detecting a second contact on the touch-sensitive surface followed by lift-off of the second contact without detecting an increase in a characteristic intensity of the second contact above the first intensity threshold; and, in response to detecting the second input, in accordance with a determination that a focus selector is at the first location in the user interface at which the first object is displayed, the device performs a second operation associated with the first object that is distinct from the first operation associated with the first object (e.g., the first operation associated with the first object includes displaying additional information (e.g., a preview or a quick action menu) associated with the first object, and the second operation associated with first object includes displaying a second user interface associated with the first object) (e.g., as illustrated in 31K-31L). For example, if the first object is an application icon for an email program on the home screen, performing the first operation associated with the application icon includes displaying a menu of actions that are associated with the email program (e.g., compose, go to inbox, go to contact list, etc.), and performing the second operation associated with the application icon includes activating the email program. If the first object is a hyperlink in a document, performing the first operation associated with the hyperlink includes displaying a preview of a webpage associated with the hyperlink (e.g., as illustrated in 31G-31I), and performing the second operation associated with the hyperlink includes displaying the webpage associated with the hyperlink in a browser interface (e.g., as illustrated in 31K-31L). If the first object is an avatar of a user, the first operation associated with the avatar includes displaying a menu of actions that that are associated with performing various communication functions in connection with the user, and the second operation associated with the avatar includes displaying a contact card for the user represented by the avatar. Further, in response to detecting the second input, in accordance with a determination that a focus selector is at the location in the user interface that is away from any objects that are associated with object-specific operations that are triggered by changes in contact intensity, the device performs a fourth operation that corresponds to a user interface element (e.g., the user interface element at which the focus selector is located at the time of lift-off of the second contact) in the remainder of the user interface (e.g., if the user interface element is a selectable button that is not associated with a Peek-and-Pop API or Quick Action API, performing the third operation includes visually distinguishing (e.g., highlighting) all objects in the user interface that are associated with respective object-specific operations that are triggered by changes in contact intensity the user interface, and performing the fourth operation includes performing an operation associated with selecting/activating the selectable button. If the user interface element is non-editable text, performing the third operation includes visually distinguishing (e.g., highlighting) all objects in the user interface that are associated with respective object-specific operations that are triggered by changes in contact intensity the user interface, and performing the fourth operation includes selecting a portion of the text and optionally displaying a menu on the user interface (e.g., a menu showing actions such as "copy, select all, define")) This is illustrated in FIGS. 31M-31O, and FIGS. 31P-31Q, for example.

It should be understood that the particular order in which the operations in FIGS. 32A-32E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 3200 described above with respect to FIGS. 32A-32E. For brevity, these details are not repeated here.

Figure 33:
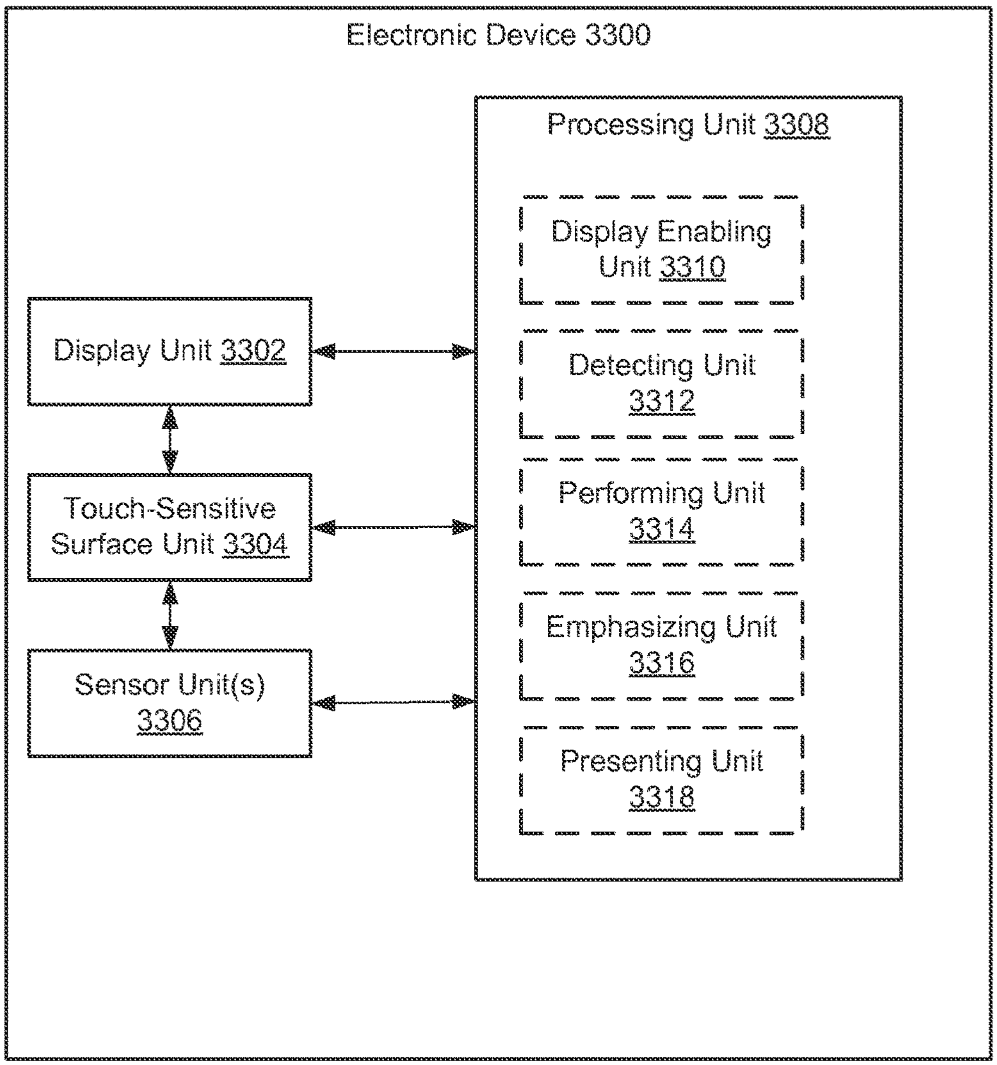
FIG. 33 is a functional block diagram of an electronic device in accordance with some embodiments.

In accordance with some embodiments, FIG. 33 shows a functional block diagram of an electronic device 3300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 33 are, optionally, combined or separated into sub-blocks to implement the principles of the various described embodiments. Therefore, the description herein optionally supports any possible combination or separation or further definition of the functional blocks described herein.

As shown in FIG. 33, an electronic device includes a display unit 3302 configured to display user interfaces and user interface elements; a touch-sensitive surface unit 3304 configured to receive user inputs; one or more sensor units 3306 configured to detect intensity of contacts with the touch-sensitive surface unit 3304; and a processing unit 3308 coupled to the display unit 3302, the touch-sensitive surface unit 3304 and the one or more sensor units 3306. In some embodiments, the processing unit 3308 includes a display enabling unit 3310, a detecting unit 3312, a performing unit 3314, an emphasizing unit 3316, and a presenting unit 3318. In some embodiments, the processing unit 3308 is configured to enable display of, on the display unit 3302, a user interface that includes a plurality of user interface objects that are associated with respective object-specific operations that are triggered by changes in contact intensity (e.g., with displaying unit 3310), wherein the plurality of user interface elements include a first object displayed at a first location in the user interface and a second object displayed at a second location in the user interface. While displaying the user interface that includes the plurality of user interface elements, the processing unit 3308 is configured to detect a first input (e.g., with detecting unit 3312) that includes detecting a first contact on the touch-sensitive surface unit 3304 and detecting an increase in a characteristic intensity of the first contact above a first intensity threshold. In response to detecting the first input, in accordance with a determination that a focus selector is at the first location in the user interface at which the first object is displayed, the processing unit 3308 is configured to perform a first operation associated with the first object (e.g., with performing unit 3314) that includes displaying, on the display unit 3302, additional information associated with the first object; in accordance with a determination that a focus selector is at the second location in the user interface at which the second object is displayed, the processing unit 3308 is configured to perform a second operation associated with the second object (e.g., with performing unit 3314) that includes displaying, on the display unit 3302, additional information associated with the second object, wherein the second operation associated with the second object is distinct from the first operation associated with the first object; and in accordance with a determination that a focus selector is at the location in the user interface that is away from any objects that are associated with object-specific operations that are triggered by changes in contact intensity, the processing unit 3308 is configured to perform a third operation (e.g., with performing unit 3314) that includes updating the user interface on the display unit 3302 to concurrently visually distinguish the first and second objects in the user interface.

Figure 34A:
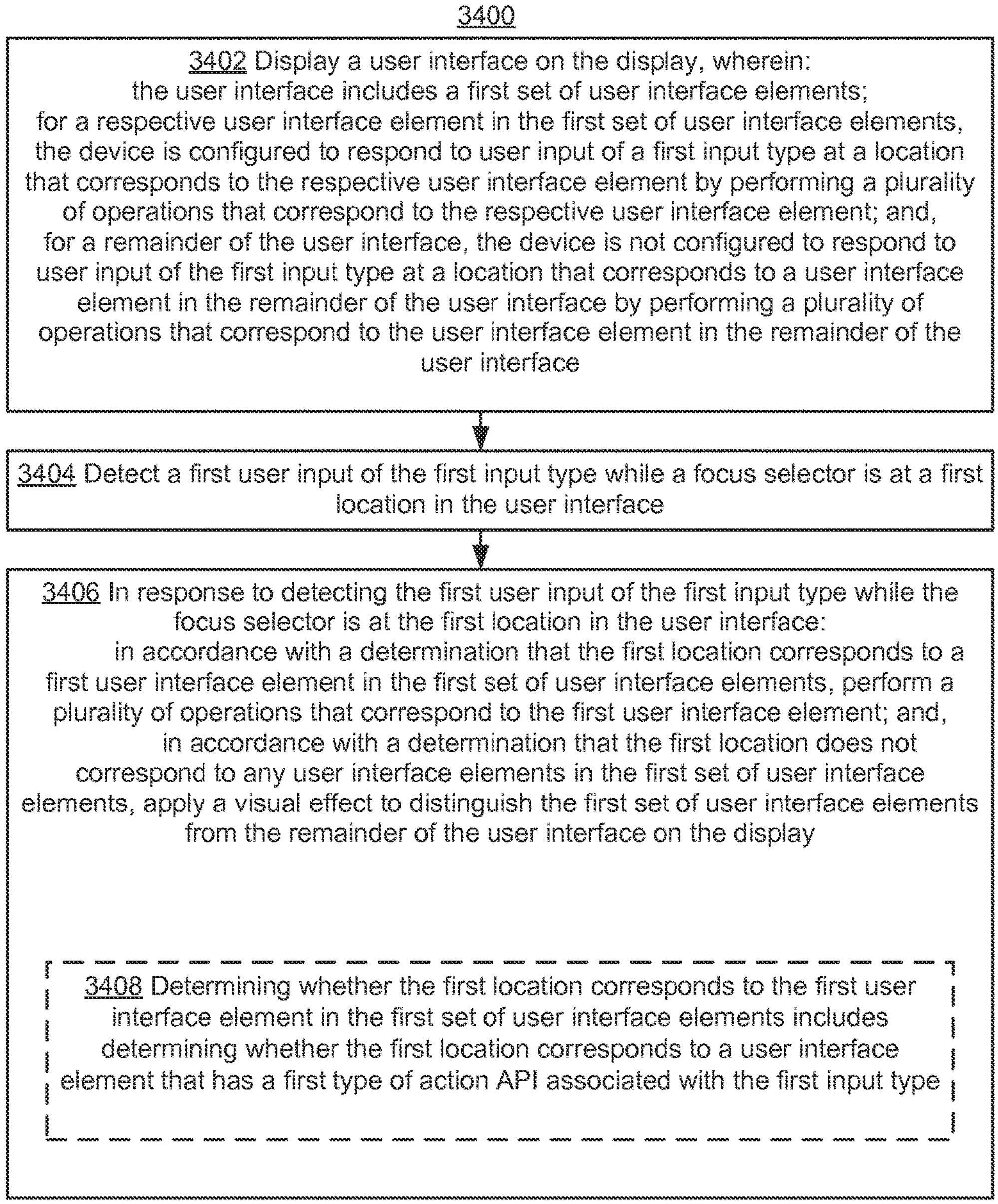

FIGS. 34A-34C are flow diagrams illustrating a method 3400 of visually distinguishing objects in accordance with some embodiments. The method 3400 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 3400 are, optionally, combined and/or the order of some operations is, optionally, changed.

As described below, the method 3400 provides an intuitive way to identify objects that are associated with object-specific intensity sensitive operations. The method reduces the cognitive burden on a user when learning about new capabilities of the user interface, thereby creating a more efficient human-machine interface. For battery-operated electronic devices, enabling a user to learn about new capabilities of the user interface faster and more efficiently conserves power and increases the time between battery charges.

The device displays (3402) a user interface on the display, wherein the user interface includes a first set of user interface elements (e.g., icons, links, buttons, images, and/or other activatable user interface objects). For a respective user interface element in the first set of user interface elements, the device is configured to respond to user input of a first input type (e.g., a press input with contact intensity above a respective intensity threshold (e.g., a hint intensity threshold, a preview intensity threshold, etc.)) at a location that corresponds to the respective user interface element (e.g., a location that corresponds to a hit region of the respective user interface element) by performing a plurality of operations that correspond to the respective user interface element. For example, user interface objects 3108-3122 in FIG. 31B are all associated with respective object-specific intensity sensitive operations. For a remainder of the user interface (areas of the user interface other than areas that correspond to the first set of user interface elements, such as areas of the user interface that do not correspond to any of the hit regions of the first set of user interface elements), the device is not configured to respond to user input of the first input type at a location that corresponds to a user interface element in the remainder of the user interface by performing a plurality of operations that correspond to the user interface element in the remainder of the user interface. The device detects (3404) a first user input of the first input type while a focus selector is at a first location in the user interface. In response to detecting the first user input of the first input type while the focus selector is at the first location in the user interface, in accordance with a determination that the first location corresponds to a first user interface element in the first set of user interface elements (e.g., the first location is within a hit region for the first user interface element in the first set of user interface elements), the device performs (3406) a plurality of operations that correspond to the first user interface element (e.g., as illustrated in FIGS. 31C-31F, 31G-31J). In accordance with a determination that the first location does not correspond to any user interface elements in the first set of user interface elements (e.g., the first location is not within a hit region for any user interface element in the first set of user interface elements), the device applies a visual effect to distinguish the first set of user interface elements from the remainder of the user interface on the display, e.g., as illustrated in FIGS. 31A-31B.

One of the benefits of this method is that it reveals the first set of user interface elements without requiring any additional user interface elements, which would take up valuable area in the user interface and increase the complexity of the user interface. For example, the user interface does not have a separate "show objects that are configured to respond to deep presses" icon that when activated results in the device visually distinguishing the first set of user interface elements from the remainder of the user interface.

In some embodiments, determining (3408) whether the first location corresponds to the first user interface element in the first set of user interface elements includes determining whether the first location corresponds to a user interface element that has a first type of action API associated with the first input type. In some embodiments, the device determines whether the first location corresponds to a user interface element associated with a Peek-and-Pop API. In some embodiments, the device determines whether the first location corresponds to a user interface element associated with a contact intensity-based input API that needs to be revealed/taught to the user.

In some embodiments, the first input type is (3410) a press input by a contact on the touch-sensitive surface; the device is configured to respond to the press input by the contact at the location that corresponds to the respective user interface element by performing a first operation that corresponds to the respective user interface element (e.g., a "peek" operation for the respective user interface element, as described herein) when the intensity of the contact exceeds a first intensity threshold (e.g., a light press threshold). In some embodiments, the first intensity threshold is greater than a contact detection threshold. The device is configured to respond to the press input by the contact at the location that corresponds to the respective user interface element by performing a second operation, distinct from the first operation, that corresponds to the respective user interface element (e.g., a "pop" operation for the respective user interface element, as described herein) when the intensity of the contact exceeds a second intensity threshold that is greater than the first intensity threshold (e.g., a deep press threshold).

In some embodiments, the first operation displays (3412) a preview associated with the respective user interface element; and the second operation displays a second user interface associated with the respective user interface element. In some embodiments, the preview is a preview of the second user interface. This is illustrated in FIGS. 31G-31J, for example.

In some embodiments, the first operation displays (3414) a menu of actions associated with the respective user interface element; and the second operation performs an action represented in the menu of actions associated with the respective user interface (e.g., and optionally displays a second user interface associated with the respective user interface element, such as a user interface associated with performance of the action). This is illustrated in FIGS. 31C-31F, for example.

In some embodiments, applying the visual effect to distinguish the first set of user interface elements from the remainder of the user interface on the display includes (3416) enhancing appearances of the first set of user interface elements (e.g., highlighting, magnifying, lifting up from the user interface plane, and/or animating the first set of user interface elements to make the first set of user interface elements more distinct on the display) while maintaining appearances of user interface elements in the remainder of the user interface on the display.

In some embodiments, applying the visual effect to distinguish the first set of user interface elements from the remainder of the user interface on the display includes (3418) obscuring user interface elements in the remainder of the user interface on the display (e.g., blurring, shrinking, and/or masking to make user interface elements in the remainder of the user interface less clear or distinct on the display), while maintaining appearances of the first set of user interface elements on the display.

In some embodiments, applying the visual effect to distinguish the first subset of user interface elements from other user interface elements on the display includes (3420) enhancing appearances of the first set of user interface elements, and obscuring user interface elements in the remainder of the user interface on the display.

In some embodiments, while displaying the user interface on the display, the device detects (3422) a second user input of a second input type (e.g., a tap gesture), distinct from the first input type (e.g., a press input with contact intensity above a respective intensity threshold (e.g., a hint intensity threshold, a preview intensity threshold, etc.)), while a focus selector is at the first location in the user interface. In response to detecting the second user input of the second input type while the focus selector is at the first location in the user interface, in accordance with a determination that the first location corresponds to the first user interface element in the first set of user interface elements (e.g., the first location is within a hit region for the first user interface element in the first set of user interface elements), the device performs an operation that corresponds to the first user interface element (e.g., displaying a second user interface associated with the first user interface element). This is illustrated in FIG. 31K-31L, for example. In some embodiments, the second user interface is also displayed in response to a deep press (which is part of the first input type) on the first user interface element. In accordance with a determination that the first location corresponds to a user interface element in the remainder of the user interface (e.g., the first location is not within a hit region for any user interface element in the first set of user interface elements and instead is in a hit region for a user interface element in the remainder of the user interface), the device performs an operation that corresponds to the user interface element in the remainder of the user interface (e.g., displaying a third user interface associated with the user interface element in the remainder of the user interface, alters the user interface by displaying additional user interface elements and/or selecting a portion of the user interface). This is illustrated in FIG. 31M-31O, and FIGS. 31P-31Q, for example.

It should be understood that the particular order in which the operations in FIGS. 34A-34C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 3400 described above with respect to FIGS. 34A-34C. For brevity, these details are not repeated here.

Figure 35:
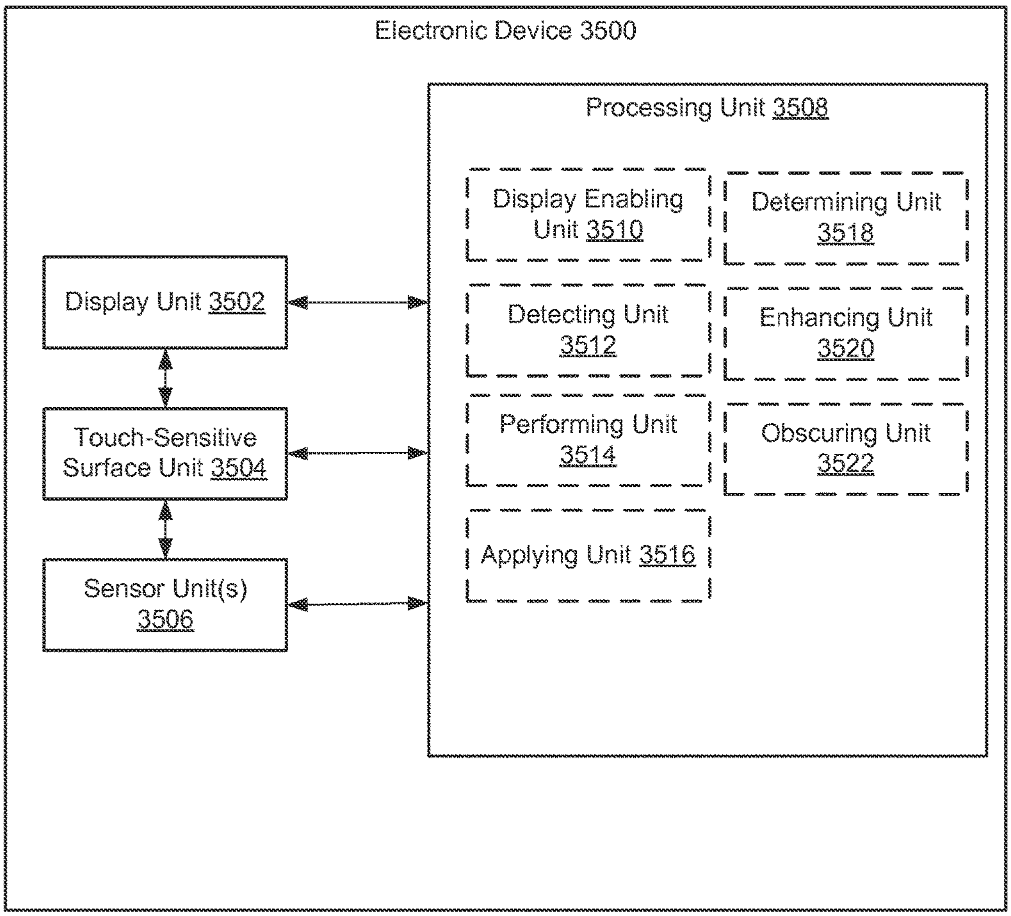
FIG. 35 is a functional block diagram of an electronic device in accordance with some embodiments.

In accordance with some embodiments, FIG. 35 shows a functional block diagram of an electronic device 3500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 35 are, optionally, combined or separated into sub-blocks to implement the principles of the various described embodiments. Therefore, the description herein optionally supports any possible combination or separation or further definition of the functional blocks described herein.

As shown in FIG. 35, an electronic device includes a display unit 3502 configured to display user interfaces and user interface elements; a touch-sensitive surface unit 3504 configured to receive user inputs; one or more sensor units 3506 configured to detect intensity of contacts with the touch-sensitive surface unit 3504; and a processing unit 3508 coupled to the display unit 3502, the touch-sensitive surface unit 3504 and the one or more sensor units 3506. In some embodiments, the processing unit 3508 includes a display enabling unit 3510, a detecting unit 3512, a performing unit 3514, an applying unit 3516, a determining unit 3518, an enhancing unit 3520, and an obscuring unit 3522. In some embodiments, the processing unit 3508 is configured to enable display of a user interface on the display unit 3502, wherein the user interface includes a first set of user interface elements (e.g., with display enabling unit 3510); for a respective user interface element in the first set of user interface elements, the device is configured to respond to user input of a first input type at a location that corresponds to the respective user interface element by performing a plurality of operations that correspond to the respective user interface element; and, for a remainder of the user interface, the device is not configured to respond to user input of the first input type at a location that corresponds to a user interface element in the remainder of the user interface by performing a plurality of operations that correspond to the user interface element in the remainder of the user interface. The processing unit 3508 is configured to detect a first user input of the first input type while a focus selector is at a first location in the user interface (e.g., with detecting unit 3512). In response to detecting the first user input of the first input type while the focus selector is at the first location in the user interface, in accordance with a determination that the first location corresponds to a first user interface element in the first set of user interface elements, the processing unit 3508 is configured to perform a plurality of operations that correspond to the first user interface element (e.g., with performing unit 3514); and, in accordance with a determination that the first location does not correspond to any user interface elements in the first set of user interface elements, the processing unit 3508 is configured to apply a visual effect to distinguish the first set of user interface elements from the remainder of the user interface on the display unit 3502 (e.g., with applying unit 3516).

The operations in the information processing methods described above are, optionally implemented by running one or more functional modules in information processing apparatus such as general purpose processors (e.g., as described above with respect to FIGS. 1A and 3) or application specific chips.

As noted above, there is a need for electronic devices with improved methods and interfaces for previewing media content. With existing methods, gestures used for playing media content of media are different from gestures used to move the media objects within a user interface. In the embodiments described below, a moving input may result in previews of content associated with different media objects or movement of the media objects on the display, depending on whether the input exceeds a threshold intensity level. Providing a user with the ability to provide input with or without an intensity component allows additional functionality to be associated with the input.

Figure 36A:
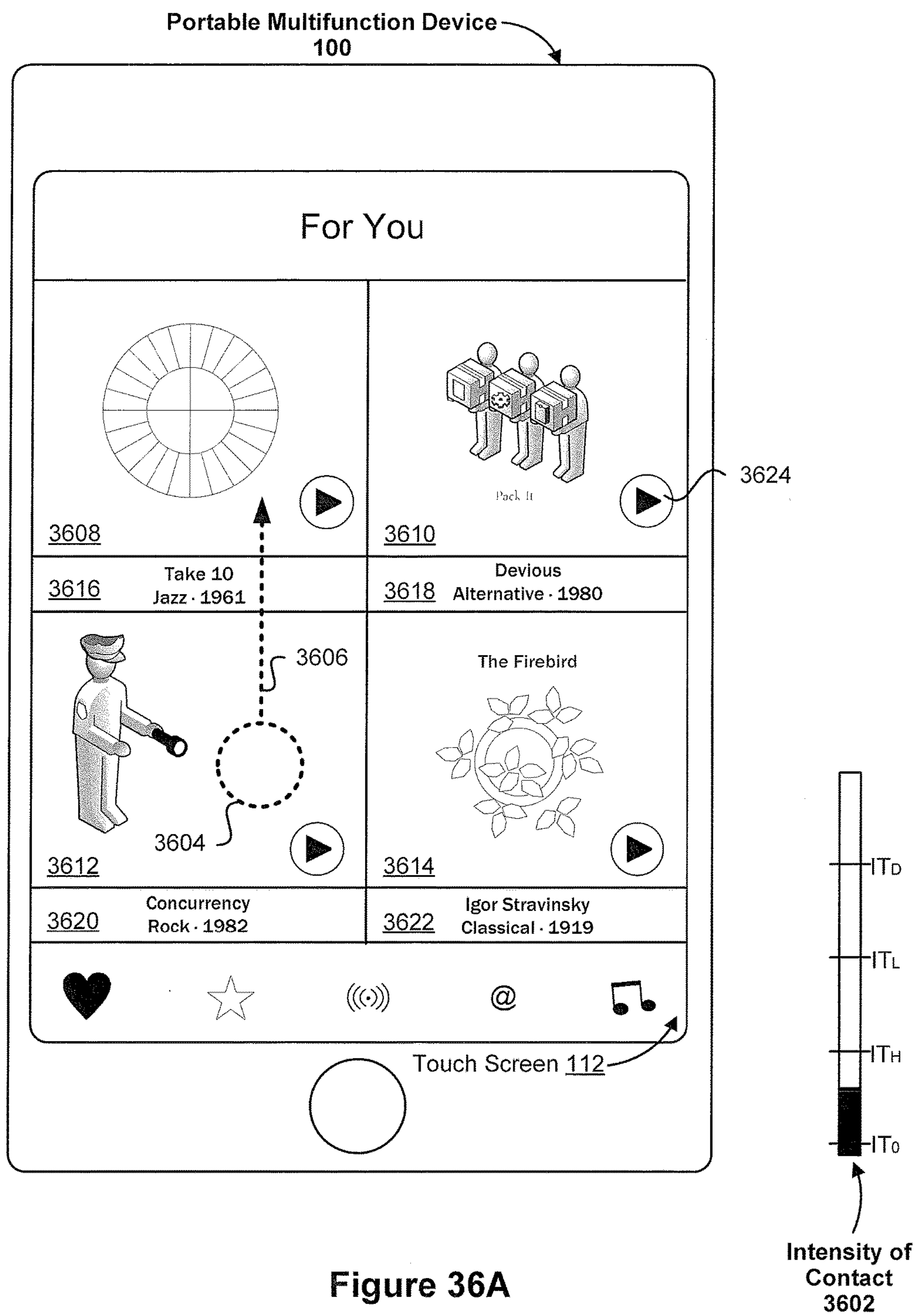
FIGS. 36A-36V illustrate exemplary user interfaces for previewing media content (e.g., audio content and/or video content) in accordance with some embodiments.
Figure 36B:
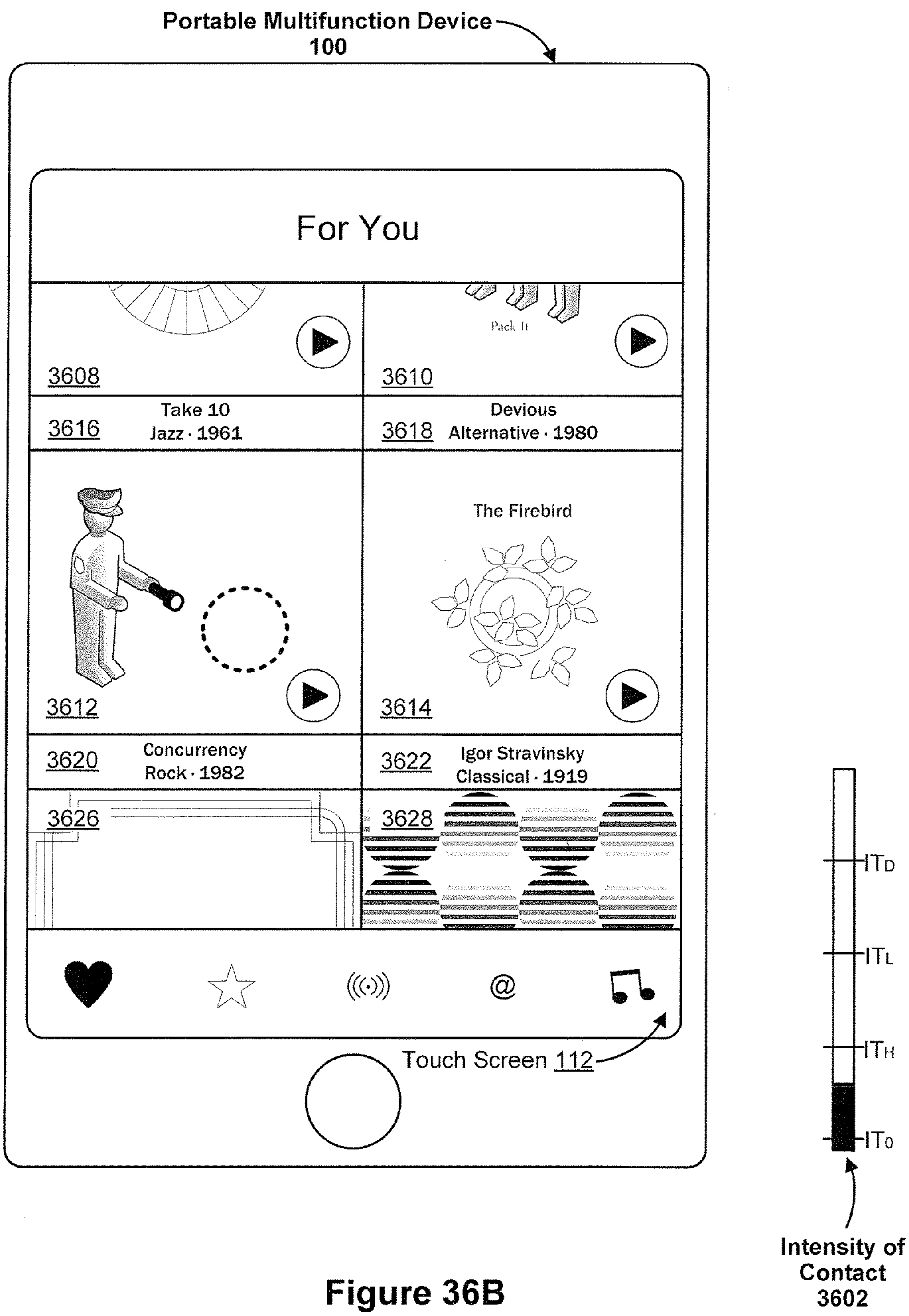
Figure 36C:
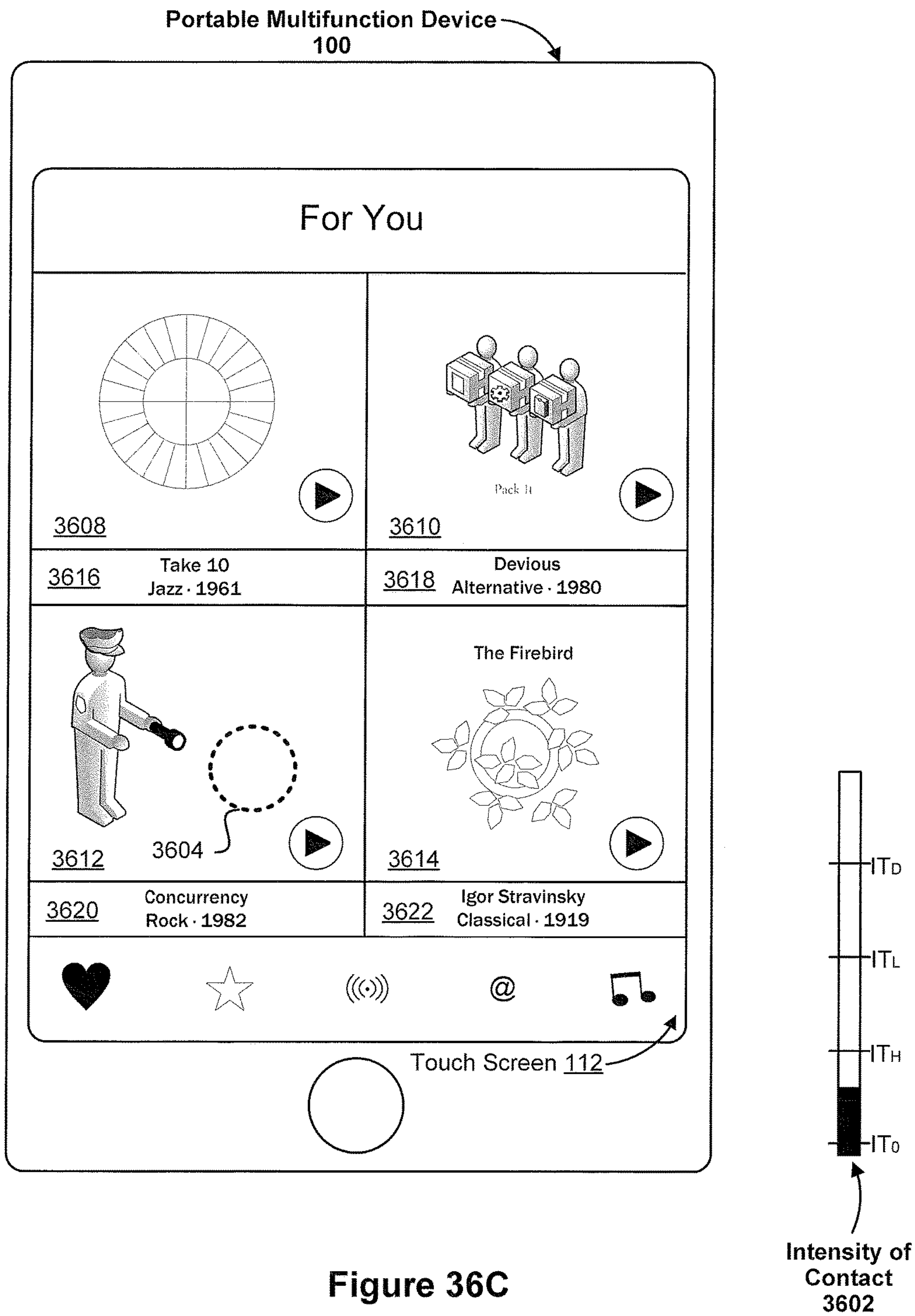
Figure 36D:
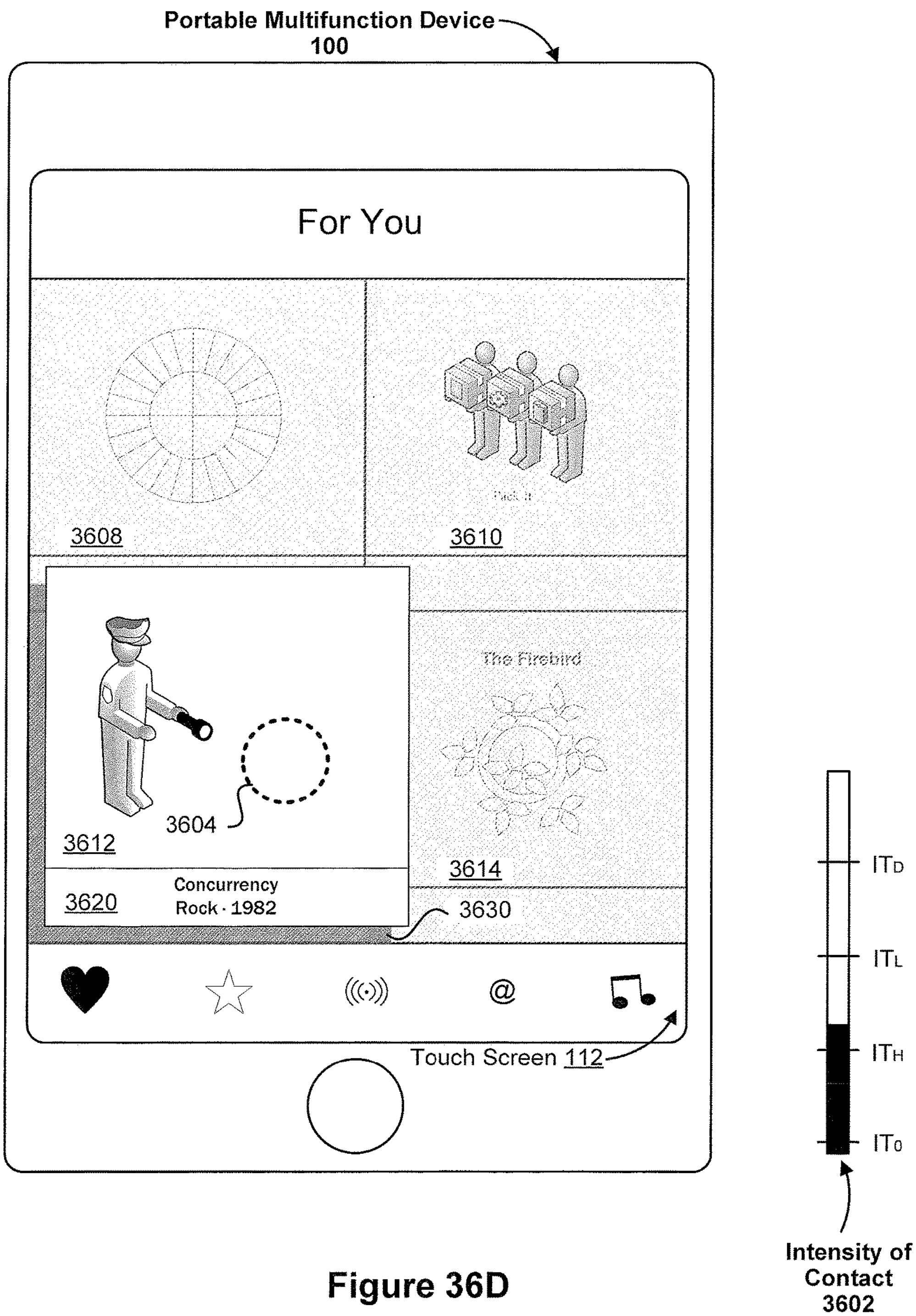
Figure 36E:
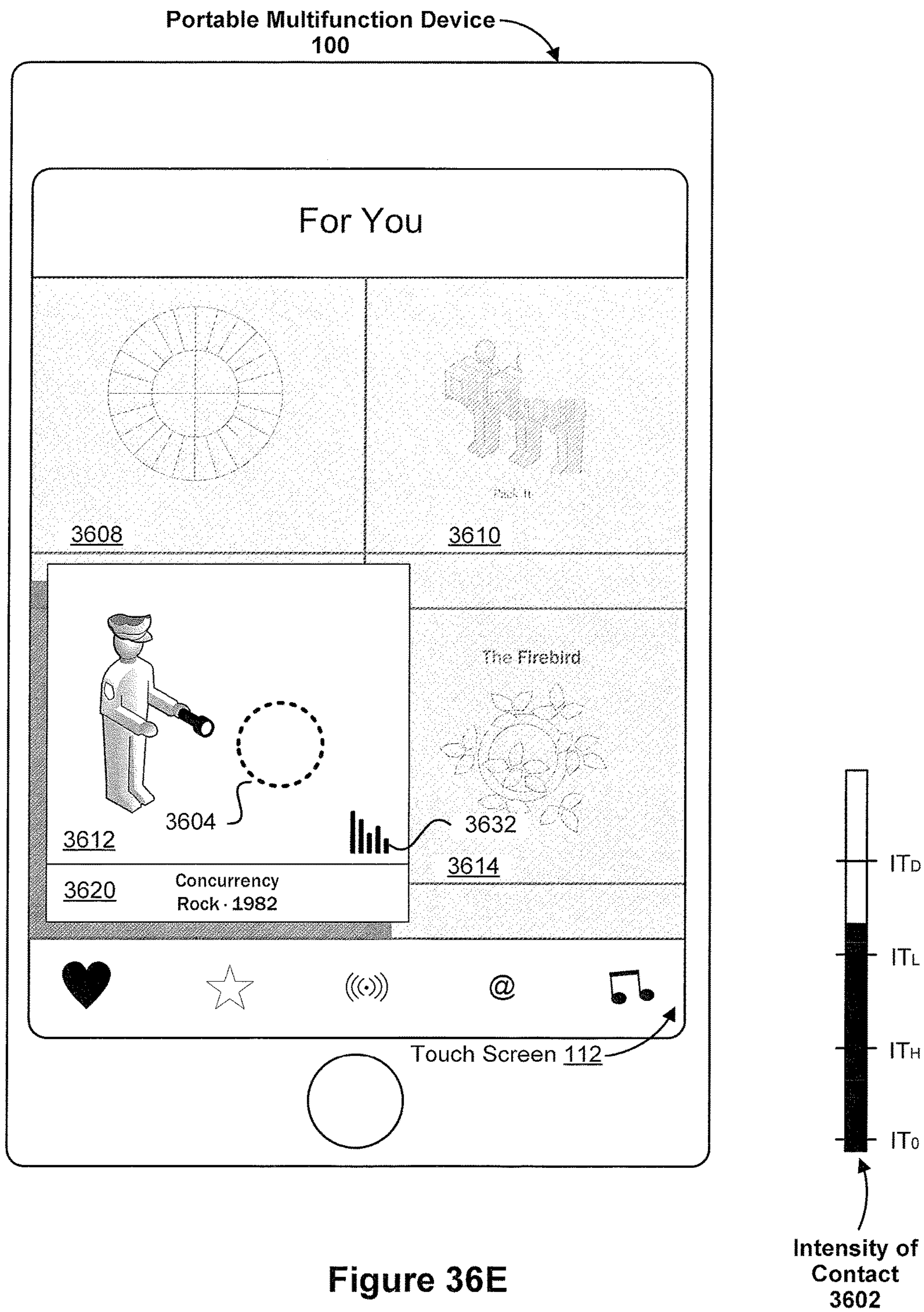
Figure 36F:
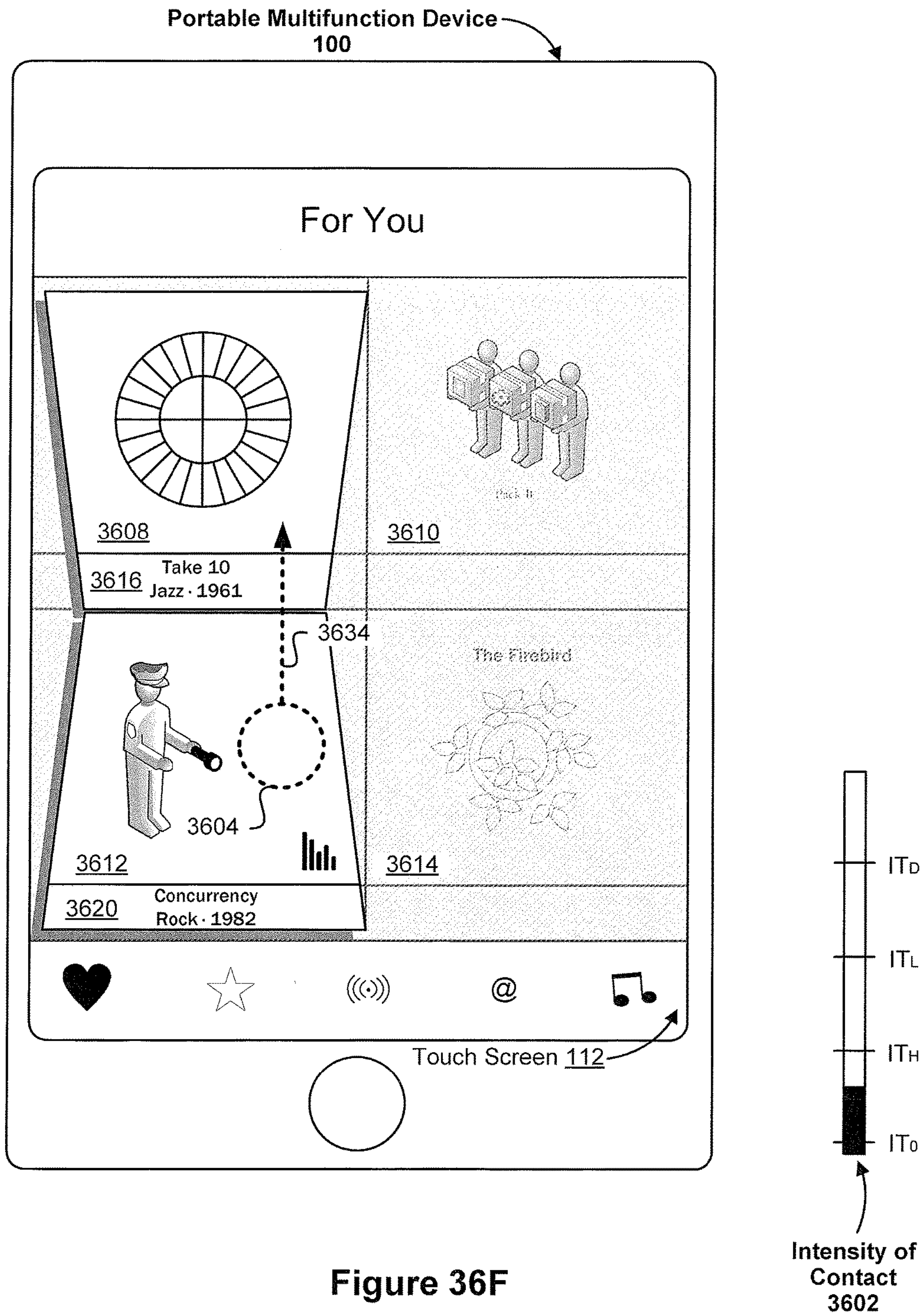
Figure 36G:
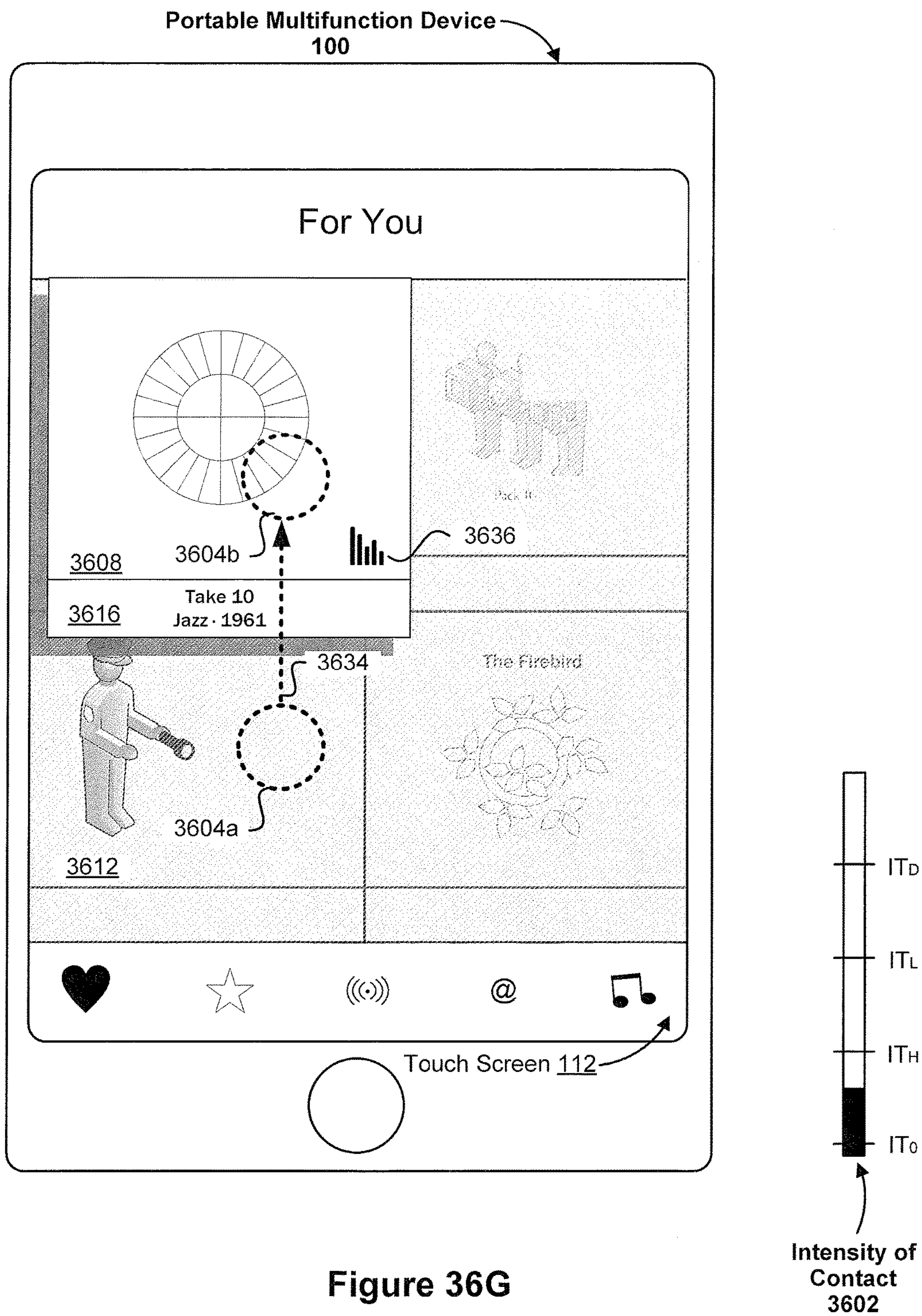
Figure 36H:
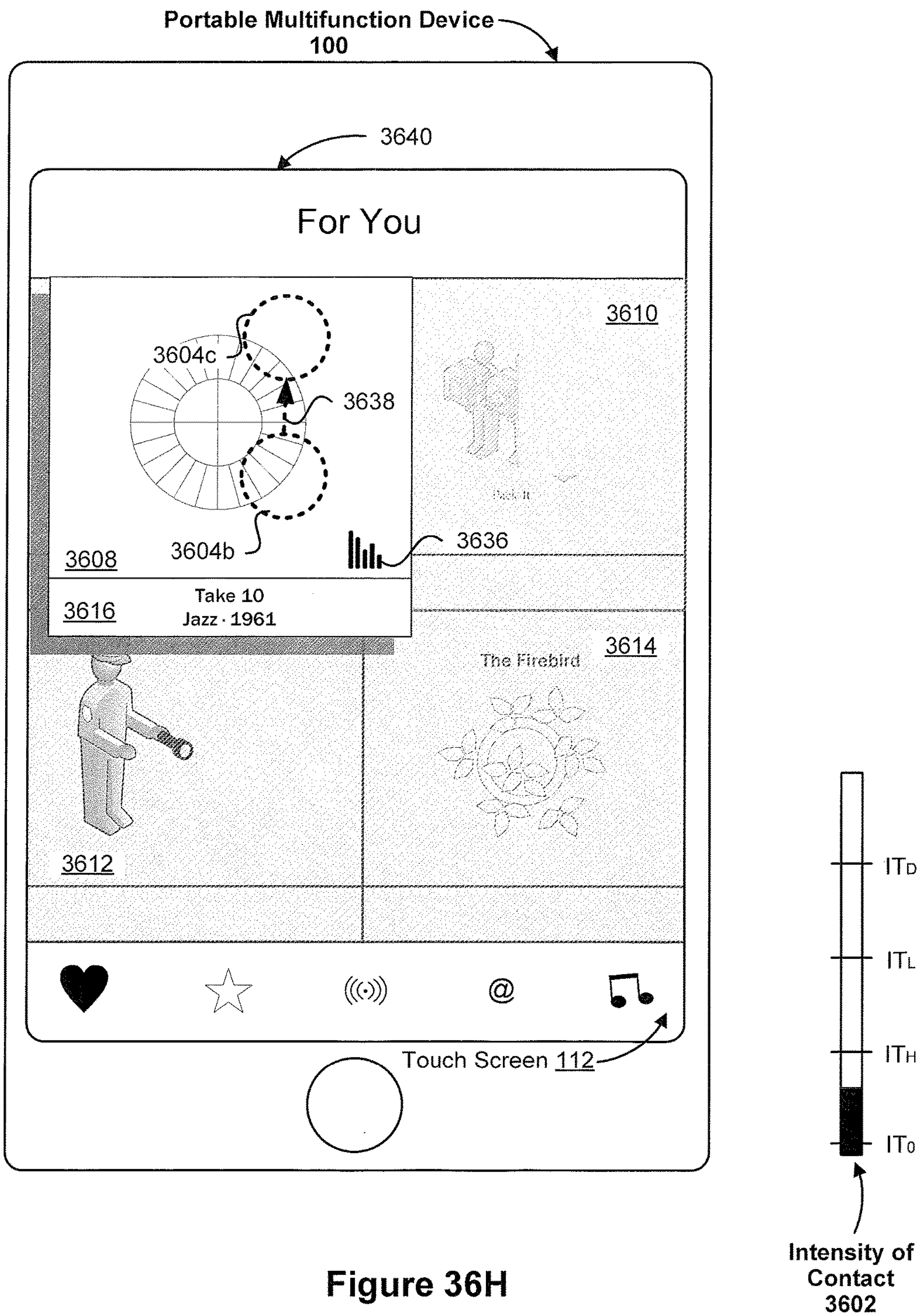
Figure 36I:
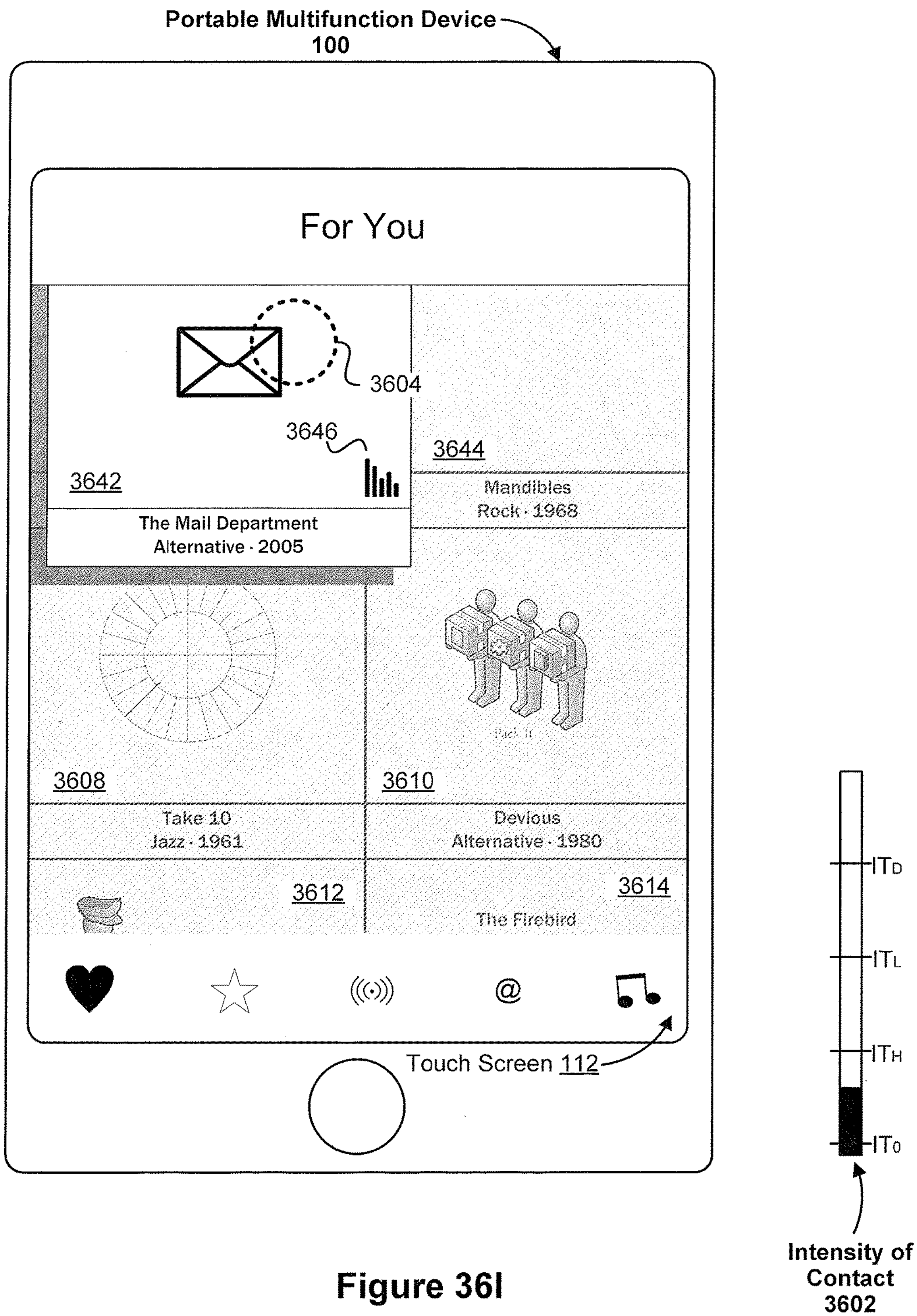
Figure 36J:
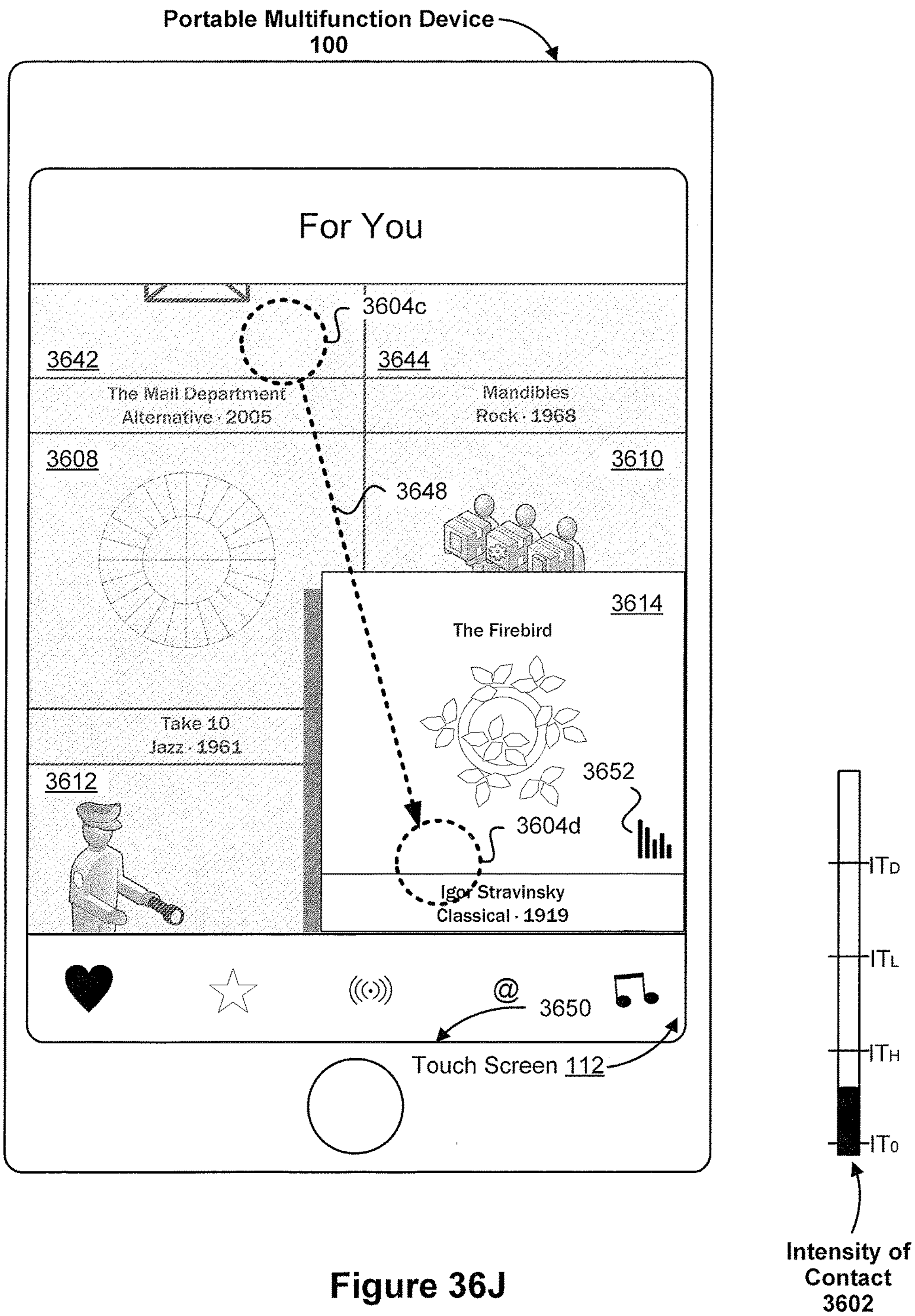
Figure 36K:
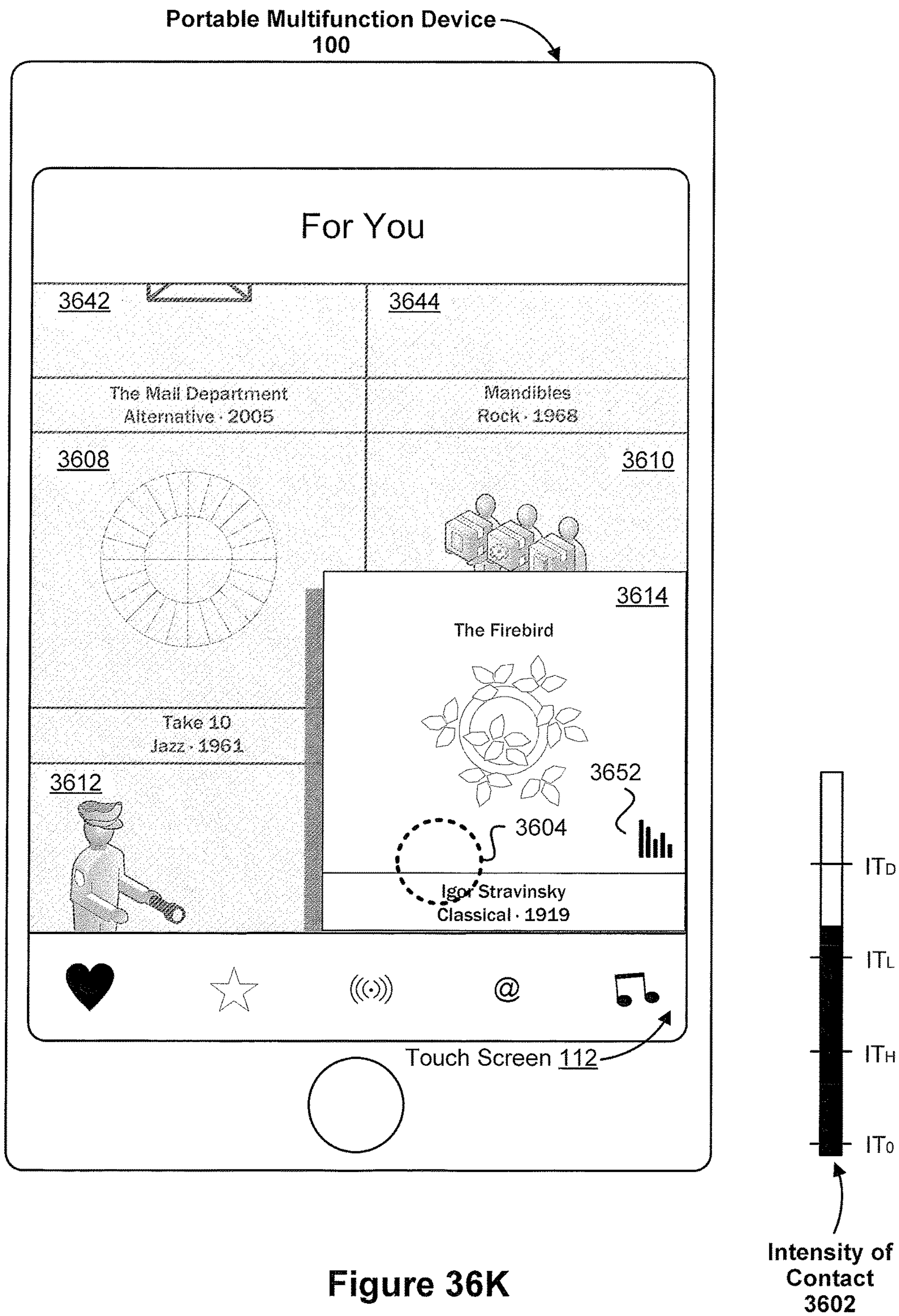
Figure 36L:
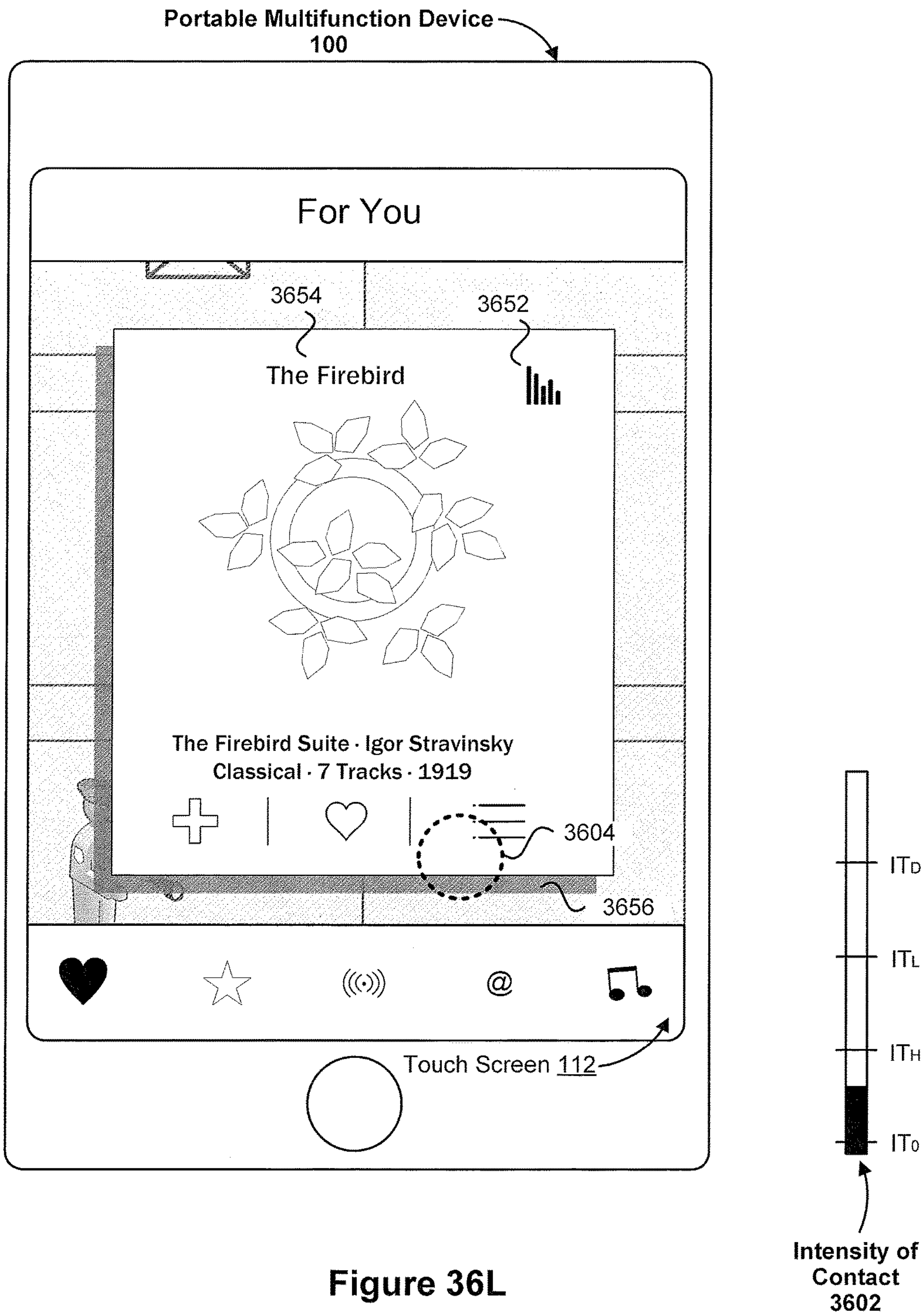
Figure 36M:
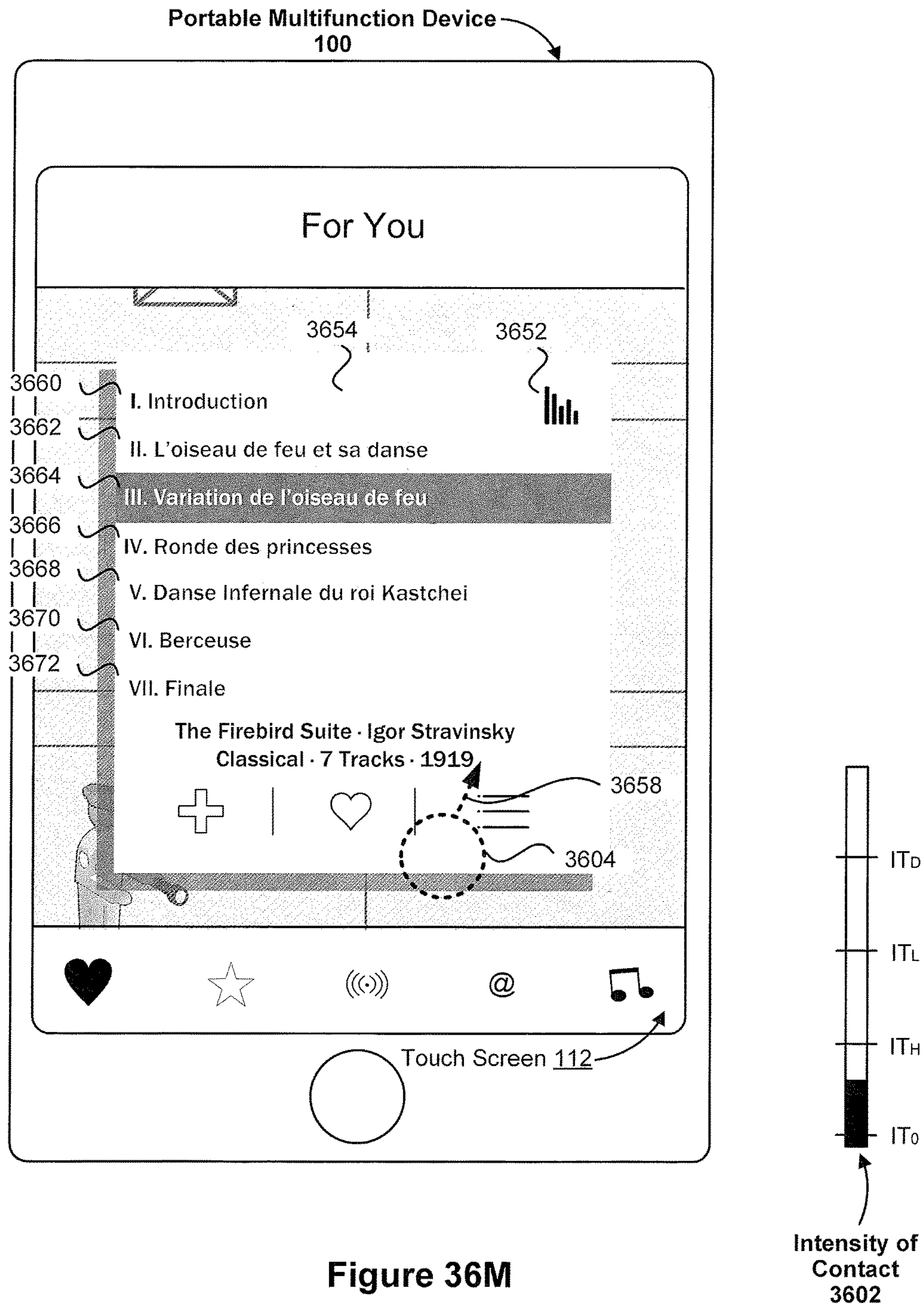
Figure 36N:
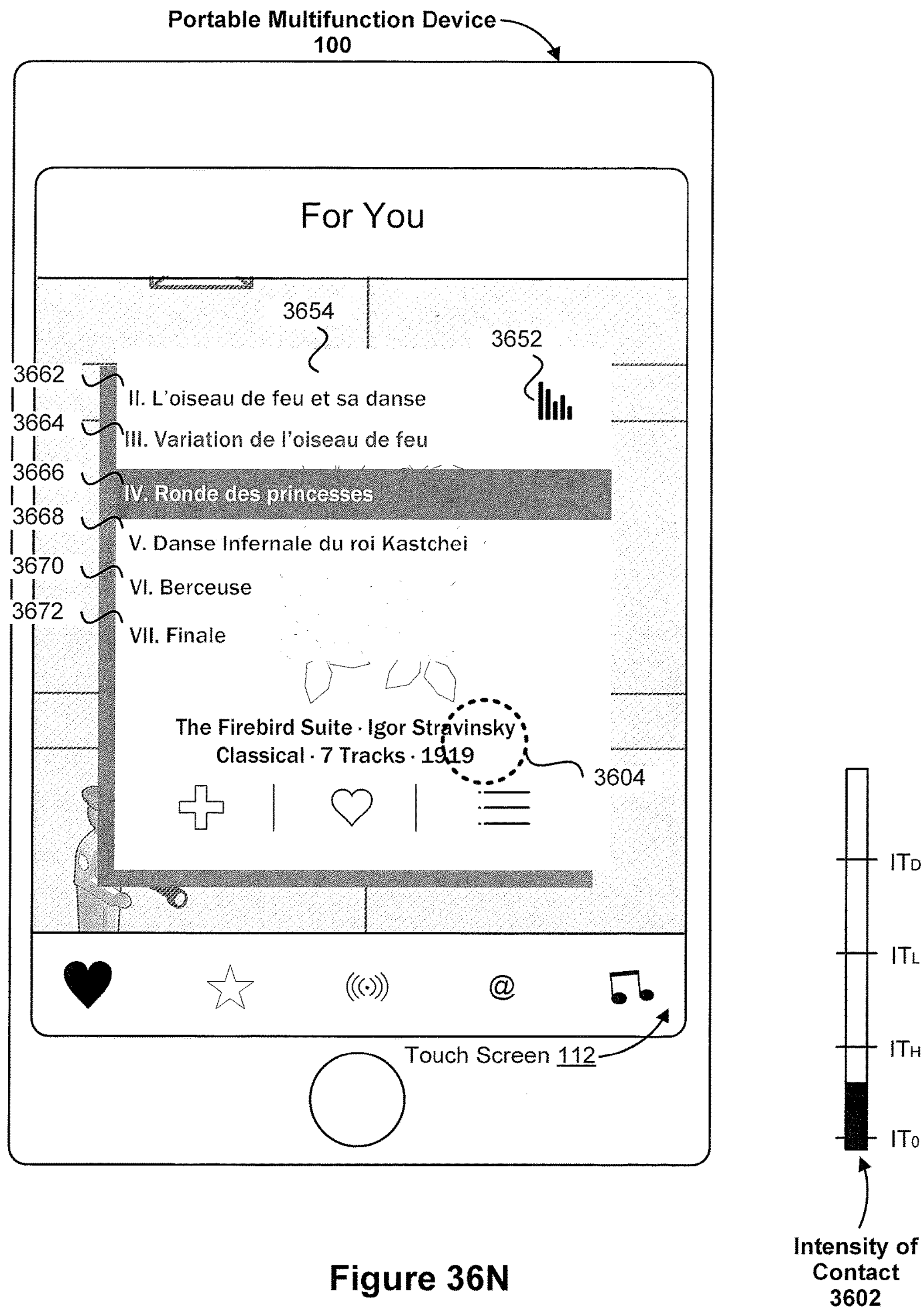
Figure 36O:
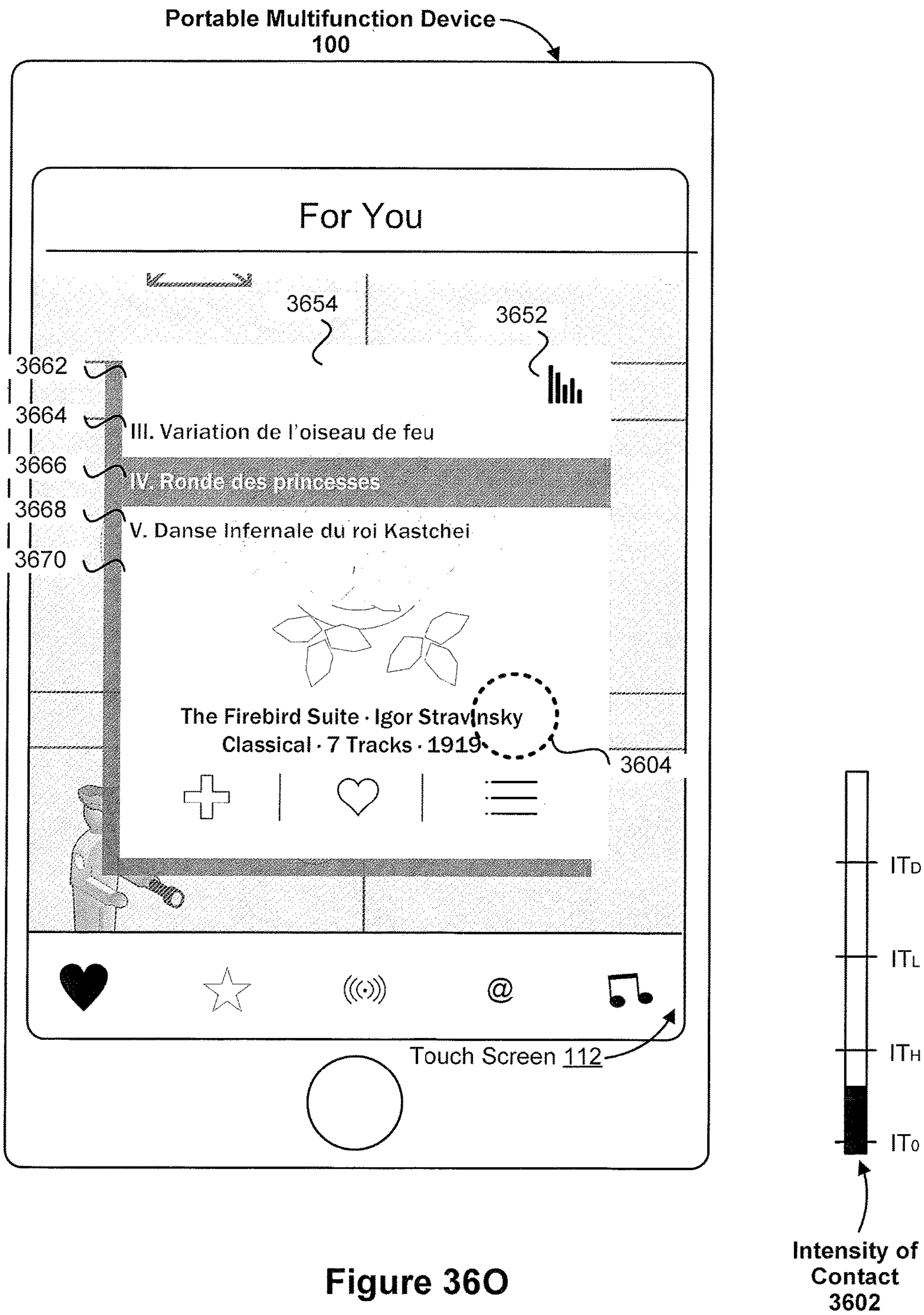
Figure 36P:
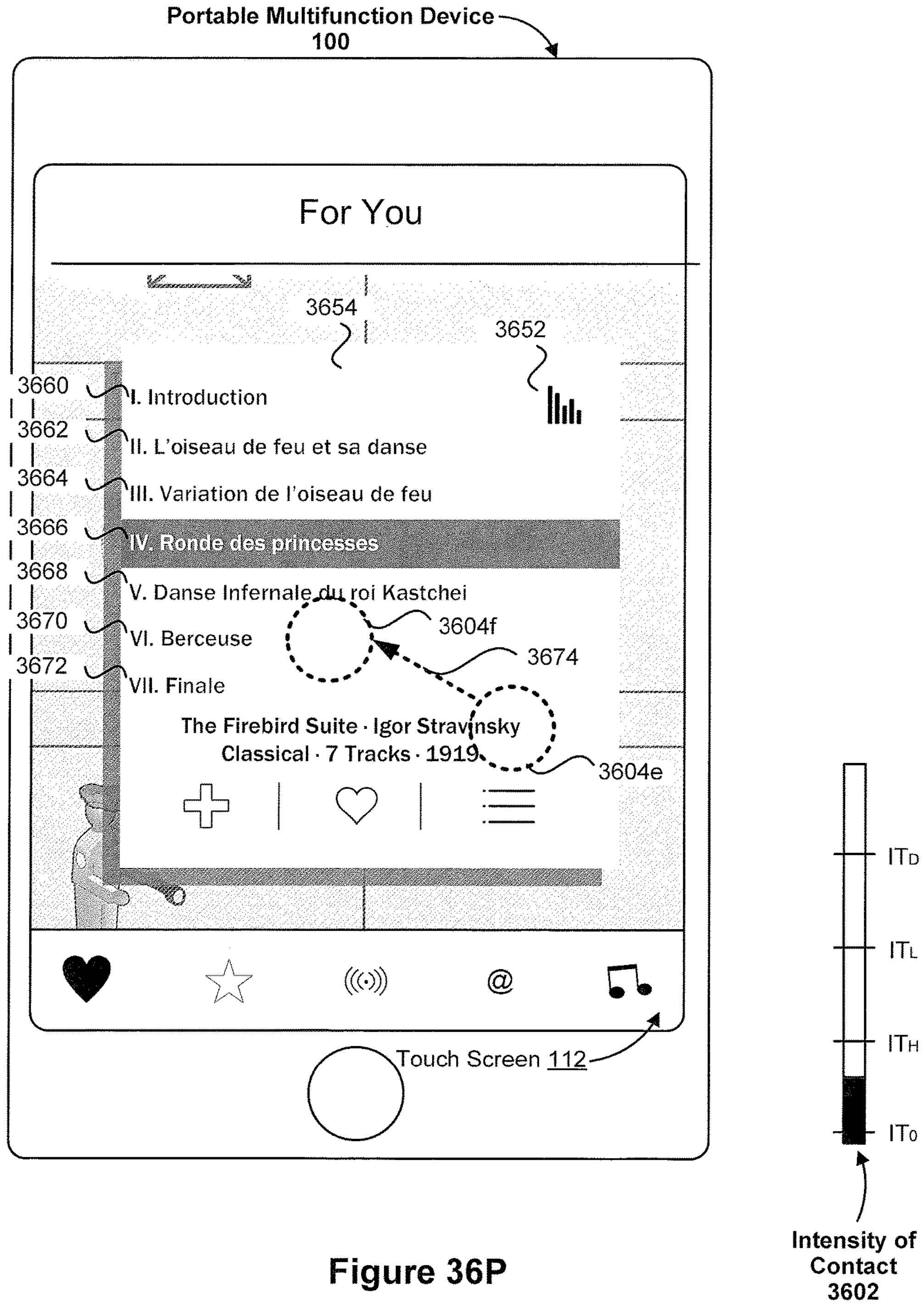
Figure 36Q:
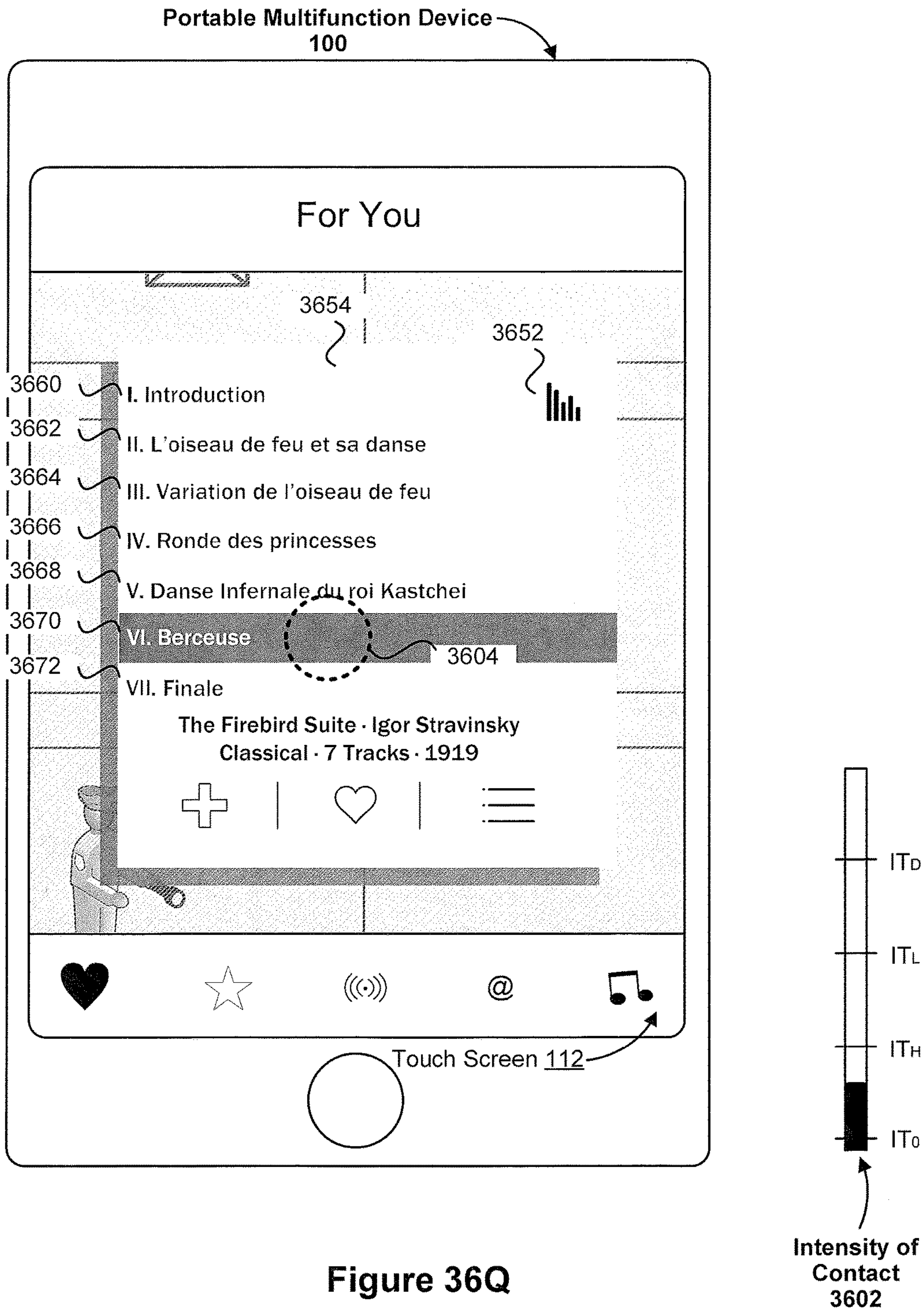
Figure 36R:
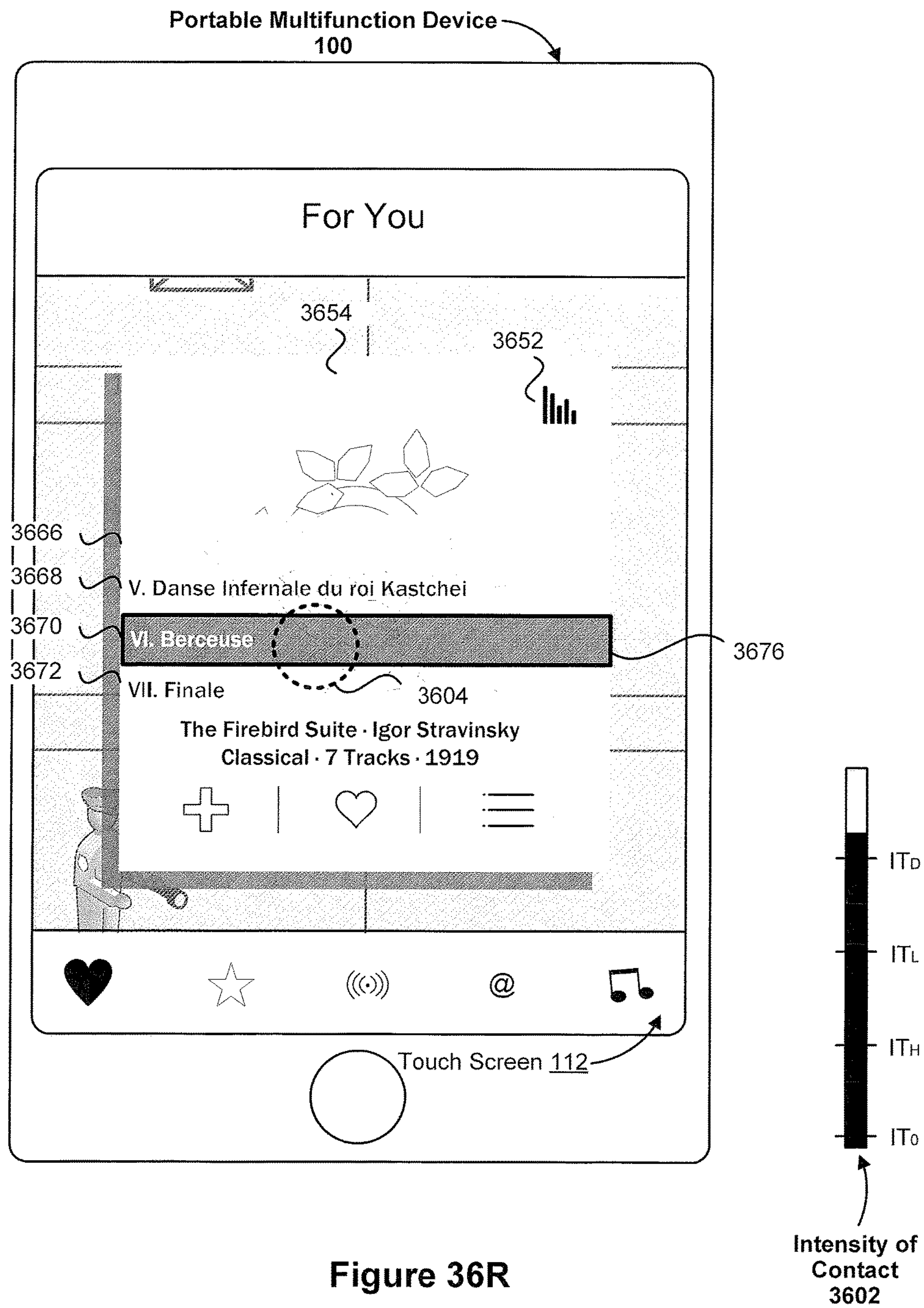
Figure 36S:
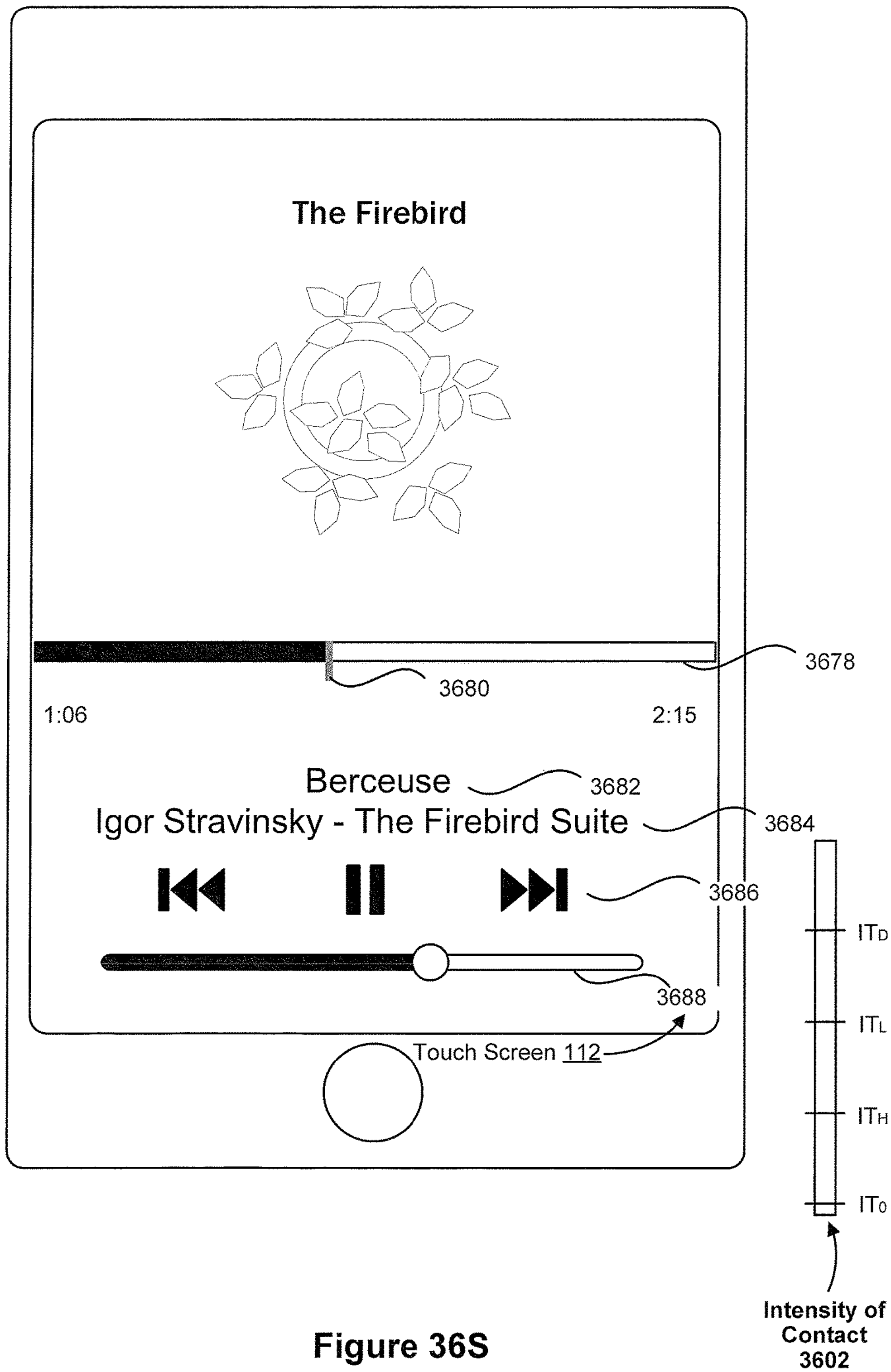
Figure 36T:
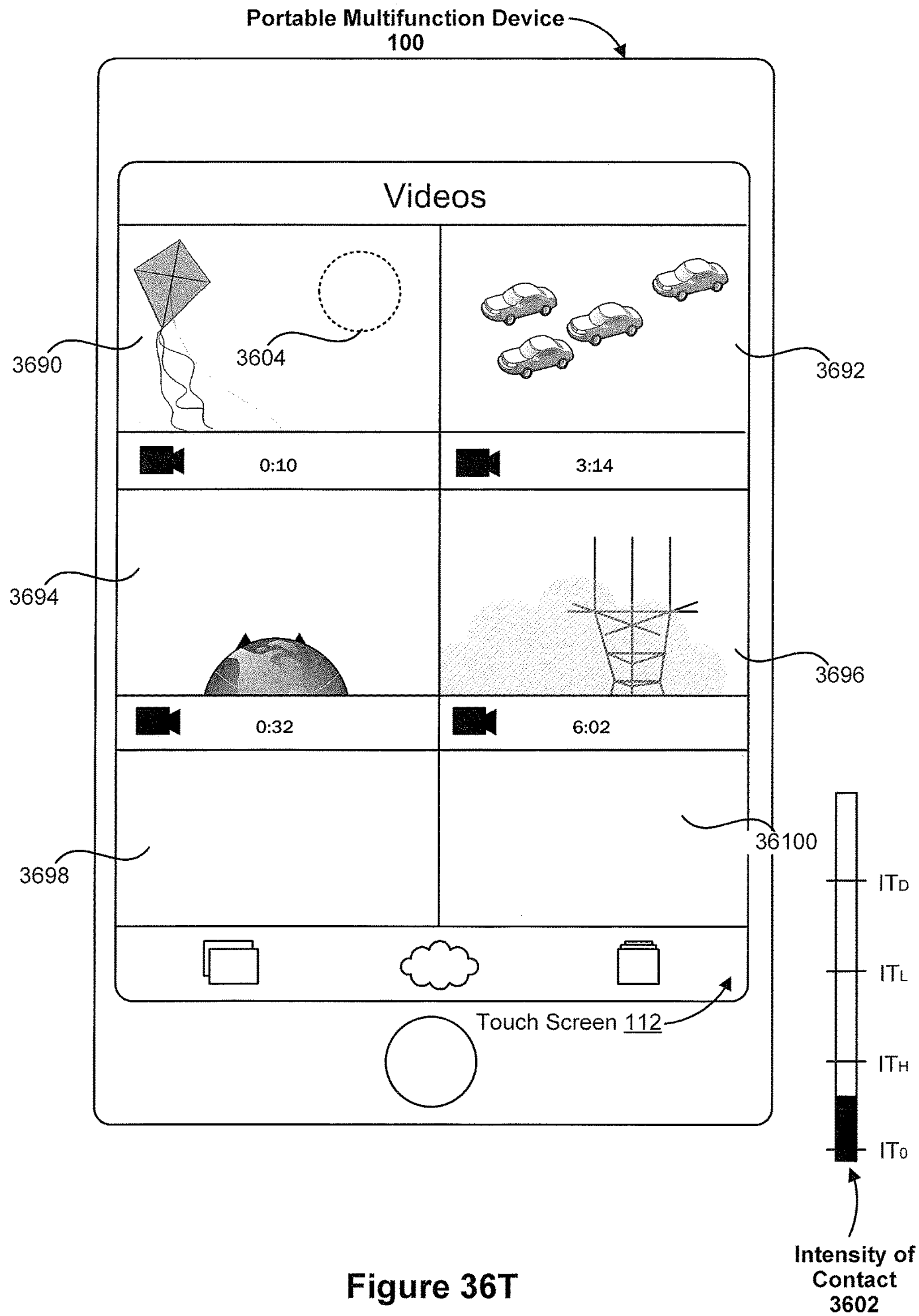
Figure 36U:
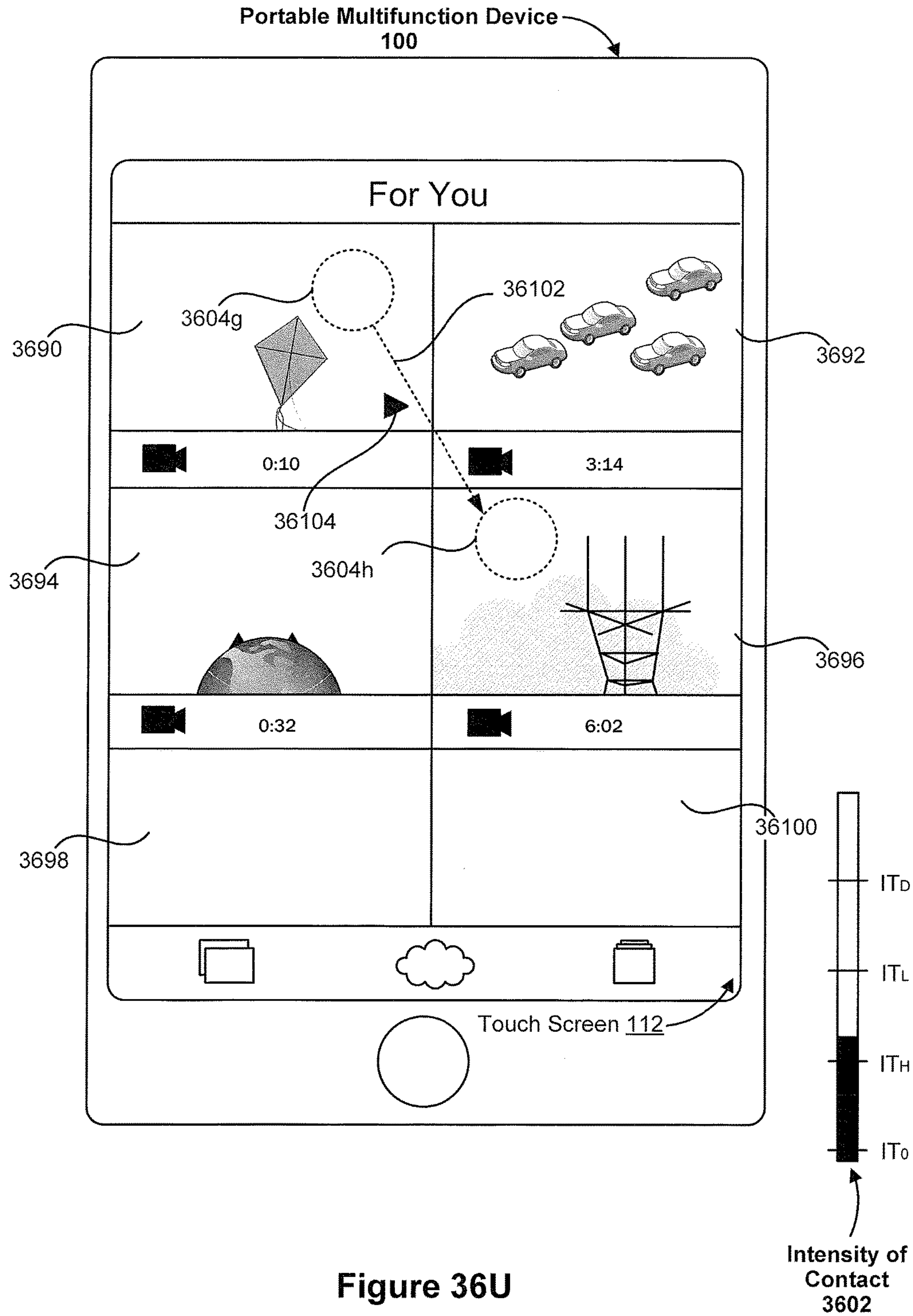
Figure 36V:
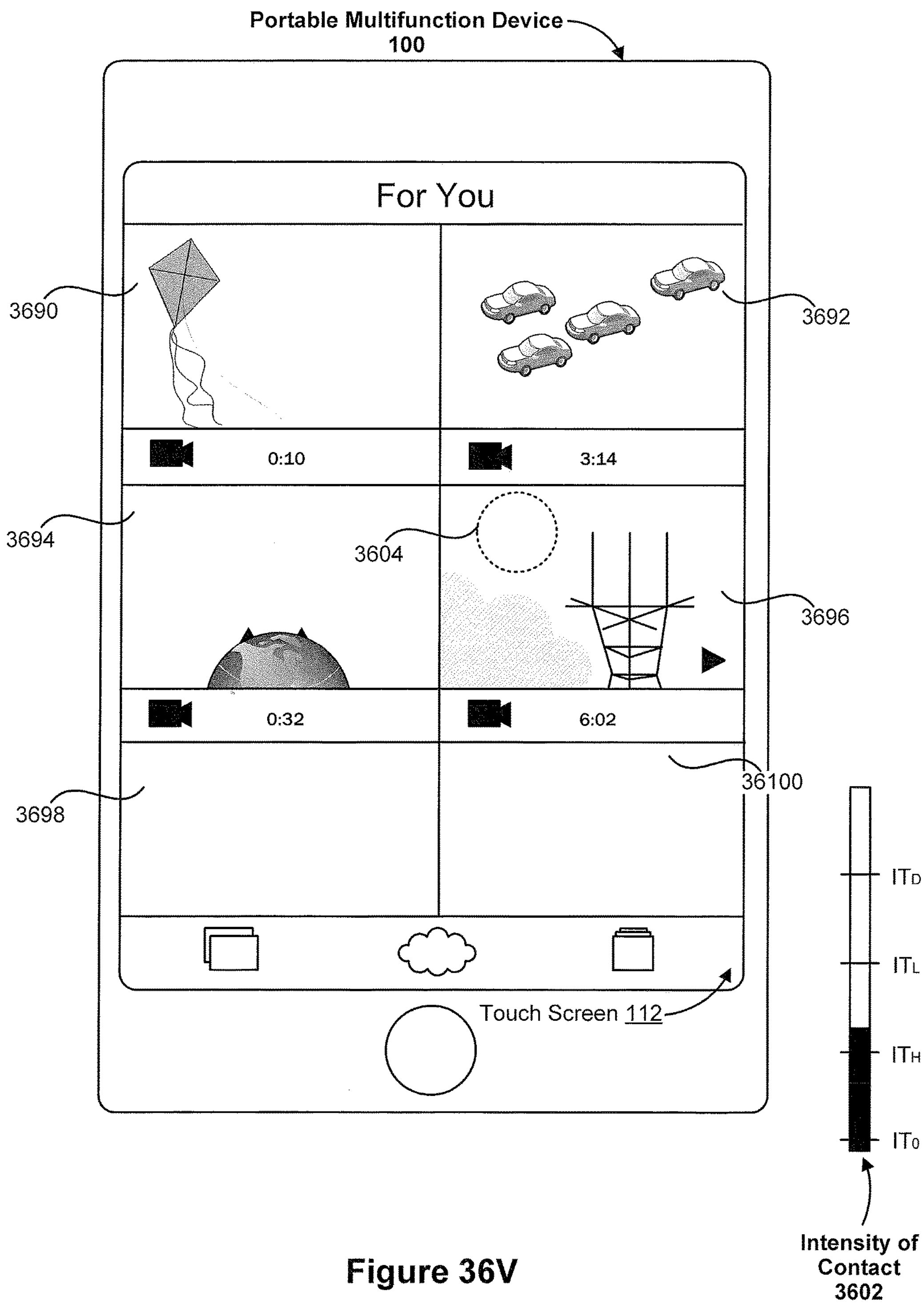
Figure 37A:
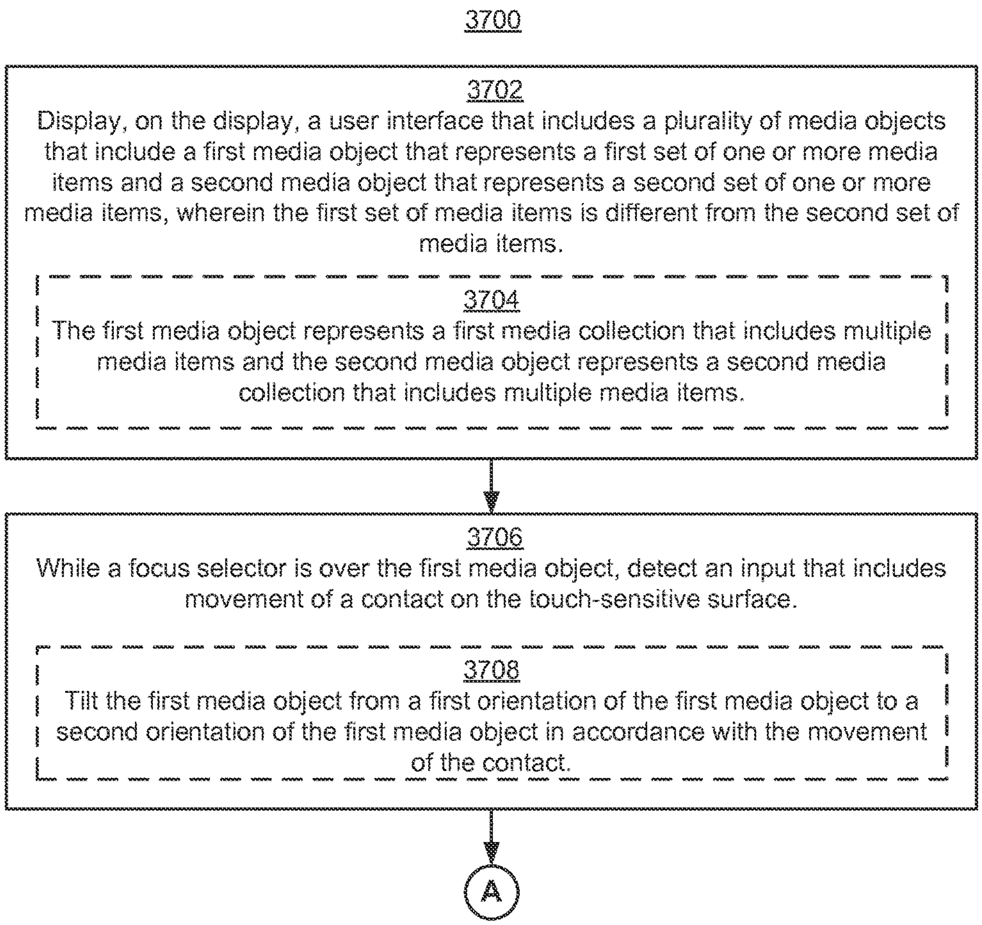

Below, FIGS. 36A-36V illustrate exemplary user interfaces for previewing media content. FIGS. 37A-37H are flow diagrams illustrating a method of previewing media content. The user interfaces in FIGS. 36A-36V are used to illustrate the processes in FIGS. 37A-37H.

FIGS. 36A-36V illustrate exemplary user interfaces for previewing media content in accordance with some embodiments. The user interfaces in these figures are used to illustrate the processes described below, including the processes in FIGS. 37A-37H. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to 36A-36V and 37A-37H will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts described in 36A-36V on the touch-sensitive surface 451 while displaying the user interfaces shown in 36A-36V on the display 450, along with a focus selector.

FIG. 36A illustrates a user interface that displays media objects 3608, 3610, 3612, and 3614, in accordance with some embodiments. Media objects 3608-3614 are graphical representations for sets of media items (i.e., album art for music albums including sets of audio tracks). For example, media object 3614 displays album art for an album titled "The Firebird." Media object 3614 includes additional information 3622 for "The Firebird" including artist information ("Igor Stravinsky"), music category ("Classical"), year of recording (1919), etc. Media objects 3608, 3610, and 3612 also include additional information as indicated at 3616, 3618, and 3620, respectively. Media object 3614 represents a set of media items (i.e., media items 3660-3672, which represent a set of audio tracks as indicated at FIG. 36M). Similarly, media objects 3608, 3610, and 3612 each represent sets of audio tracks. In some embodiments, an input received at a control (e.g., control 3624 displayed on media object 3610) is usable to initiate playback of a media item from a media object (e.g., media object 3610).

A contact on touch screen 112 moves from a location indicated by focus selector 3604 along a path indicated by arrow 3606. A characteristic intensity of the contact is below a media-preview threshold intensity level (e.g., below a "hint" intensity threshold $IT_H$ as indicated at intensity meter 3602).

FIG. 36B illustrates a user interface that displays media objects 3608, 3610, 3612, 3614, 3626, and 3628, in accordance with some embodiments. In accordance with a determination that the characteristic intensity of the contact indicated by focus selector 3604 did not exceed the media-preview intensity threshold, media objects 3608, 3610, 3612, and 3614 moved (scrolled up) in accordance with the path indicated by arrow 3606 (i.e., the media objects are translated within the user interface in a direction indicated by the arrow and/or for a distance indicated by the arrow). In FIG. 36B, media objects 3608, 3610, 3612, and 3614 have moved within the user interface such that media objects 3608 and 3610 are partially visible, and additional media objects 3626 and 3628 are partially revealed.

FIG. 36C illustrates a user interface that displays media objects 3608, 3610, 3612, and 3614, in accordance with some embodiments. A contact on touch screen 112 is detected at a location indicated by focus selector 3604 with an intensity above $IT_0$ and below a "hint" intensity threshold $IT_H$, as indicated at intensity meter 3602.

FIG. 36D illustrates a user interface in which media object 3612 is visually distinguished from media objects 3608, 3610, and 3614, in accordance with some embodiments. A contact on touch screen 112 is detected at a location indicated by focus selector 3604. A characteristic intensity of the contact is above a threshold intensity level (e.g., above a "hint" intensity threshold $IT_H$ as indicated at intensity meter 3602, above a "light press" intensity threshold $IT_L$, etc.). In accordance with a determination that the characteristic intensity of the contact is above the threshold intensity level, media object 3612 is visually distinguished from media objects 3608, 3610, and 3614. Ways in which media object 3612 is visually distinguished from media objects 3608, 3610, and 3614 include darkening of media objects 3608, 3610, and 3614; removal of additional information 3616, 3618, and 3622 from media objects 3608, 3610, and 3614 while additional information 3620 for media object 3612 continues to be displayed; and lifting of media object 3612 in a virtual z direction relative to the plane of the user interface (e.g., as indicated by shadow 3630 of media object 3608 and as indicated by the shifted position of media object 3612 relative to media objects 3608, 3610, and 3614). In some embodiments, media object 3612 is visually distinguished from media objects 3608, 3610, and 3614 by display of an equalizer graphic or animation as shown at 3632 of FIG. 36E.

FIG. 36E illustrates a user interface in which a preview of a media item of media object 3612 is output, in accordance with some embodiments. A preview of a media item of media object 3612 is output when media preview criteria are met. The media preview criteria include a criterion that is met when input includes an increase in a characteristic intensity of the contact above a media-preview intensity threshold. In 36E, the characteristic intensity of the contact at the location indicated by focus selector 3604 is above a media-preview threshold intensity level (e.g., above a "light press" intensity threshold $IT_L$ as indicated at intensity meter 3602). In accordance with a determination that media preview criteria are met, including a determination that the characteristic intensity of the contact is above the media-preview threshold intensity level, a preview of a media item of media object 3612 is output. The media item is, for example, an audio track from a set of audio tracks of the album ("Concurrency") represented by media object 3612. In some embodiments, equalizer graphic 3632 is shown on media object 3612 to indicate that a preview of a media item of media object 3612 is being output. In some embodiments, equalizer graphic 3632 is animated (e.g., animated to indicate that a preview is being output.)

FIG. 36F illustrates a user interface in which the contact moves from media object 3612 to media object 3608 when media preview criteria have been met, in accordance with some embodiments. In some embodiments, the input includes movement of the contact across touch screen 112 from a position indicated by focus selector 3604 along a path indicated by arrow 3634. The focus selector moves along the path indicated by arrow 3634 from a position over media object 3612 to a position over media object 3608. In FIG. 36F, a preview of 3612 is output in accordance with a determination that media preview criteria have been met (e.g., as described with reference to FIG. 36E). In some embodiments, media object 3612 and media object 3610 tilt as shown in FIG. 36F in accordance with the movement of the contact along the path indicated by arrow 3634.

FIG. 36G illustrates a user interface in which the contact has moved from a position on media object 3612 to a position on media object 3608 when media preview criteria have been met, in accordance with some embodiments. The contact moved along a path indicated by arrow 3634, as shown in FIG. 36G, from a position over media object 3612, as indicated by focus selector 3604*a* (i.e., focus selector 3604 at a first point in time) to a position over media object 3608, as indicated by focus selector 3604*b* (i.e., focus selector 3604 at a second point in time later than the first point in time) as shown in FIG. 36G. As can be seen from FIGS. 36C-36G, when the contact has moved and media preview criteria have been met, positions of media objects 3608-3614 are maintained. In response to the movement of the contact, the preview of the media item of media object 3612 ceases to be output and a preview of a media item of media object 3608 is output. Equalizer graphic 3636 is shown on media object 3608 to indicate that a preview of a media item of media object 3608 is being output. The media item is, for example, a song from a set of songs of the album ("Take 10") represented by media object 3608.

FIG. 36H illustrates a user interface in which media objects are scrolled in response to movement of the contact such that focus selector 3604 is located within a predefined region of the user interface, in accordance with some embodiments. In FIG. 36H, the contact moves along a path indicated by arrow 3638, from a position indicated by focus selector 3604*b* (i.e., focus selector 3604 at a point in time, such as the second point in time as described with regard to FIG. 36G) to a position within a predefined region of the user interface, as indicated by focus selector 3604*c* (i.e., focus selector 3604 at a third point in time that is later than the point in time of focus selector 3604*b*). In accordance with a determination that focus selector 3604*b* is within a predefined region (e.g., within a predefined distance of upper edge 3640 of the user interface), media objects 3608, 3610, 3612, and 3614 are scrolled in accordance with the path indicated by arrow 3638 (i.e., the media objects are translated within the user interface in a direction indicated by the arrow and/or for a distance indicated by the arrow).

FIG. 36I illustrates a user interface in which media objects have been scrolled in response to the contact moving such that focus selector 3604 is located within a predefined region of the user interface, in accordance with some embodiments. In FIG. 36I, the contact indicated by focus selector 3604 has moved to a position within a predefined region of the user interface (e.g., within a predefined distance of the top edge of the user interface). In accordance with a determination that focus selector 3604 is within the predefined region of the user interface (and in the absence of further movement of the contact), media objects 3608, 3610, 3612, and 3614 have been automatically scrolled such that media objects 3612 and 3614 are partially visible and media objects 3642 and 3644 are partially revealed. In some embodiments, the automatic scrolling is faster when the contact is positioned closer to the edge of the user interface, and is slower when the contact is positioned farther away from the edge of the user interface. In some embodiments, in accordance with a determination that focus selector 3604 is over media object 3642 (e.g., in accordance with a determination that focus selector 3604 is over the midpoint of media object 3642) as a result of the automatic scrolling, a preview of a media item of media object 3642 is output (and the preview of a media item from 3608 ceases to be output). Equalizer graphic 3646 is displayed on media object 3642 to indicate that a preview of a media item of media object 3642 is being output. While a media item from media object 3642 is being output, the representation of media object 3642 is visually distinguished (e.g., lifted), while other media objects in the user interface (e.g., representations of media objects 3608, 3610, 3612, and 3614) are obscured.

FIG. 36J illustrates a user interface in which media objects are scrolled in response to the contact moving such that focus selector 3604 is located within a predefined region of the user interface, in accordance with some embodiments. In FIG. 36J, the contact moves along a path indicated by arrow 3648, from a position indicated by focus selector 3604*c* (i.e., focus selector 3604 at a point in time, such as the third point in time as described with regard to FIG. 36H) to a position within a predefined region of the user interface, as indicated by focus selector 3604*d* (i.e., focus selector 3604 at a fourth point in time that is later than the point in time of focus selector 3604*c*). In accordance with a determination that focus selector 3604*c* is within a predefined region (e.g., within a predefined distance of the lower edge 3650 of the user interface), media objects 3642, 3644, 3608, 3610, 3612, and 3614 are scrolled in accordance with the path indicated by arrow 3642. In accordance with a determination that focus selector 3604*b* is over media object 3614, a preview of a media item of media object 3614 is output. Equalizer graphic 3652 is displayed on media object 3614 to indicate that a preview of a media item of media object 3614 is being output.

FIGS. 36K-36L illustrate a sequence of user interfaces indicating display of an enhanced preview of a media object when enhanced media preview criteria are met, in accordance with some embodiments.

In FIG. 36K, the characteristic intensity of the contact indicated by focus selector 3604 on media object 3614 increases beyond an enhanced-preview intensity threshold (e.g., $IT_L$) when a preview of a media item of media object 3614 is output, as indicated by equalizer graphic 3652.

In some embodiments, enhanced media preview criteria include a criterion that is met when received input includes an increase in the characteristic intensity of a contact above an enhanced-preview intensity threshold (e.g., $IT_L$). When enhanced media preview criteria are met while a preview of a media object is being output, an enhanced preview of the media object is displayed.

FIG. 36L illustrates a user interface in which an enhanced preview of media object 3614 is displayed, in accordance with some embodiments. In response to the increase in the characteristic intensity of the contact indicated by focus selector 3604 above an enhanced-preview intensity threshold (e.g., as illustrated in FIG. 36K), while the preview of the media item of media object 3614 is being output, an enhanced preview (e.g., preview platter 3654) of media object 3614 is displayed. Preview platter 3654 includes the album art of the album represented by media object 3614. Preview platter 3654 is lifted in a virtual z direction relative to the plane of the user interface (e.g., as indicated by shadow 3656 of preview platter 3654) and the user interface behind the preview platter is visually obscured (e.g., media objects 3642, 3644, 3608, 3610, and 3612 are darkened). The preview of the media item of media object 3614 continues to be output when the enhanced preview is displayed (e.g., as indicated by equalizer graphic 3652).

FIGS. 36M-36N illustrate a sequence of user interfaces indicating preview output for different media items in response to movement of a contact, in accordance with some embodiments.

The user interface of FIG. 36M includes indications of multiple media items 3660-3672 representing a set of audio tracks of media object 3614. In FIG. 36M, a preview is output (as indicated at equalizer graphic 3652) for media item 3664. The media item 3664 for which a preview is being output is visually distinguished from media items 3660-3662 and 3666-3670 (e.g., the region indicating media item 3664 is highlighted, while media items 3660-3662 and 3666-3670 are not highlighted). The contact moves from a position indicated by focus selector 3604 along a path indicated by arrow 3658.

In response to detecting the movement of the contact (e.g., in response to detecting movement of the contact by a predefined distance), portable multifunction device 100 ceases to output the preview of media item 3664 and outputs a preview of a different media item (e.g., media item 3666, as indicated in FIG. 36N). For example, when the contact moves along the path indicated by arrow 3658, media items 3660-3672 are scrolled in a direction of the arrow (e.g., toward the upper edge of touch screen 112 when the path of arrow 3658 includes upward movement) such that media item 3660 is no longer visible and such that media item 3666 moves into a position where media item 3664 was previously located. In some embodiments, media item 3666 is highlighted to indicate that a preview of media item 3666 is being output (e.g., as a result of the movement of media item 3666 into the position where media item 3664 was previously located). Equalizer graphic 3652 is shown on the enhanced preview of media object 3614 to indicate that a preview of a media item from media object 3614 is being output.

In some embodiments, the set of audio tracks of media object 3614 is automatically displayed after the album art is displayed in preview platter 3654 (e.g., after a predefined period of time). In some embodiments, the set of audio tracks of media object 3614 is displayed in response to the detection of the movement of the contact. In some embodiments, the set of audio tracks of media object 3614 is arranged in a loop, and continued upward movement of the contact detected when a preview of the first audio track in the set is being output would cause preview of the last audio track in the set to start. Similarly, continued downward movement of the contact detected when a preview of the last audio track in the set is being output would cause preview of the first audio track in the set to start.

FIGS. 36O-36P illustrate a sequence of user interfaces indicating that a preview is being output for a media item in response to movement of a contact to a region indicating the media item, in accordance with some embodiments.

The user interface of FIG. 36O displays media items 3662-3670 of media object 3614. In FIG. 36O, the highlighting in the region indicating media item 3666 and the equalizer graphic 3652 indicate a preview is being output for media item 3666. In some embodiments, media items other than the media item for which a preview is being output (e.g., media items 3660-363664 and 3668-3672) are faded gradually over time (e.g., revealing information, such as an album art image, associated with media object 3614) while the media item for which the preview is being output (e.g., media item 3666) remains highlighted. In some embodiments, media items that are closer to the media item for which a preview is being output (e.g., media items 3664 and 3668 adjacent to media item 3666 for which a preview is being output) fade more slowly that media items that are further from the media item for which the preview is being output (e.g., media items 3662 and 36708).

In FIG. 36P, the contact moves from a position indicated by focus selector 3604 along a path indicated by arrow 3674, from a position indicated by focus selector 3604*e* (i.e., focus selector 3604 at a point in time, such as a fifth point in time that is later than the fourth point in time as described with regard to FIG. 36H) to a position indicated by focus selector 3604*f* (i.e., focus selector 3604 at a sixth point in time that is later than the point in time of focus selector 3604*e*) and optionally hovers over the position indicated by focus selector 3604*f*. In response to detecting the movement of the contact over media item 3670 (and optionally, hovering over media item 3670 for at least a threshold amount of time), portable multifunction device 100 ceases to output the preview of media item 3666 and outputs a preview of media item 3670, e.g., as indicated in FIG. 36Q. In FIG. 36Q, a preview of media item 3670 is being output, as indicated by equalizer graphic 3652 and highlighting of the region indicating media item 3670.

FIG. 36R illustrates a user interface that displays an indication that a representation of a media item 3670 is selected, in accordance with some embodiments. In FIG. 36R, an input meets media selection criteria, e.g., the characteristic intensity of the contact at a position indicated by focus selector 3604 has increased beyond an intensity threshold (e.g., $IT_D$). In response to the increase in the characteristic intensity of the contact indicated by focus selector 3604 above the intensity threshold, an indication that a representation of a media item 3670 is selected is displayed. For example, further highlighting (e.g., selection box 3676) is displayed at the representation of media item 3670 to indicate that media item 3670 is selected.

FIG. 36S illustrates a user interface that displays a playback mode for media item 3670, in accordance with some embodiments. In FIG. 36S, in response to the increase in the characteristic intensity of the contact indicated by focus selector 3604 above an intensity threshold (e.g., as discussed with regard to FIG. 36R), an indication that a representation of a media item 3670 is selected (e.g., a playback mode for media item 3670) is displayed. For example, a playback mode for media item 3670 as illustrated in FIG. 36S includes, e.g., progress indicator bar 3678, progress scrubber control 3680, media item information 3682, media object information 3684, playback controls 3686, volume control 3688, etc. In other words, the user interface including the preview platter 3654 has "popped" into a new user interface associated with the previewed media object (e.g., media object 3614 in FIG. 36K).

FIGS. 36T-36V illustrate a sequence of user interfaces indicating preview output for media items associated with various media objects in response to movement of a contact, in accordance with some embodiments.

The user interface of FIG. 36T illustrates a user interface that displays media objects 3690-36100. A contact is received at touch screen 112 at a location indicated by focus selector 3604. A characteristic intensity of the contact is below a media-preview threshold intensity level (e.g., below a "hint" intensity threshold $IT_H$ as indicated at intensity meter 3602).

In FIG. 36U, the characteristic intensity of the contact indicated by focus selector 3604 is above a media-preview threshold intensity level (e.g., above $IT_H$ as indicated at intensity meter 3602). In accordance with a determination that the characteristic intensity of the contact is above the media-preview threshold intensity level, a preview of a media item (e.g., a video) of media object 3690 is output. For example, the video of media object 3690 has advanced (as shown in the transition from media object 3690 as shown in FIG. 36T to media object 3690 as shown in 36U) during a preview of the media item. Playback graphic 36104 is shown on media object 3690 to indicate that a preview of a media item of media object 3690 is being output.

In FIG. 36U, the contact on touch screen 112 moves from a location indicated by focus selector 3604 along a path indicated by arrow 36102 from a position indicated by focus selector 3604*g* (i.e., focus selector 3604 at a point in time) to a position indicated by focus selector 3604*h* (i.e., focus selector 3604 point in time that is later than the point in time of focus selector 3604*g*).

FIG. 36V illustrates a user interface in which the contact has moved from a position on media object 3690 to a position on media object 3696 when media preview criteria have been met (e.g., the characteristic intensity of the contact indicated by focus selector 3604 is above the media-preview threshold intensity level). The contact moved along a path indicated by arrow 36102, as shown in FIG. 36U, from a position over media object 3690, as indicated by focus selector 3604*g*, to a position over media object 3696, as indicated by focus selector 3604*h*. In response to the movement of the contact, the preview of the media item of media object 3690 ceases to be output and a preview of a media item of media object 3696 is output. For example, the video of media object 3696 has advanced (from media object 3696 as shown in FIG. 36U to media object 3696 as shown in 36V) during a preview of media item 3696. Playback graphic 36104 is shown on media object 3696 to indicate that a preview of a media item of media object 3696 is being output.

FIGS. 37A-37H are flow diagrams illustrating a method 3700 of previewing media content in accordance with some embodiments. The method 3700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 3700 are, optionally, combined and/or the order of some operations is, optionally, changed.

As described below, the method 3700 provides an intuitive way to preview media content. The method reduces the cognitive burden on a user when previewing media content, thereby creating a more efficient human-machine interface. For battery-operated electronic devices, enabling a user to preview media content faster and more efficiently conserves power and increases the time between battery charges.

The device displays (3702), on the display (e.g., touch screen 112), a user interface (e.g., a user interface as shown in any of FIGS. 36A-36R and 36T-36V) that includes a plurality of media objects that include a first media object (e.g., such as a first one of media objects 3608, 3620, 3612, 3614, 3626, 3628, 3642, 3644) that represents a first set of one or more media items (e.g., one or more of media items 3660-3672 of media object 3614) and a second media object (e.g., a second one of media objects 3608, 3620, 3612, 3614, 3626, 3628, 3642, 3644) that represents a second set of one or more media items, wherein the first set of media items is different from the second set of media items. In some embodiments, a media object (e.g., media object 3614) is a graphical representation of an album, and a first and/or second set of one or more media items includes one or more audio tracks (e.g., audio tracks represented by media items 3660-3672 of media object 3614) of the album. In some embodiments, a media object includes a playlist including one or more media items, a list of tracks for an artist, a track, a series of videos or video clips, a video, etc.

In some embodiments, the first media object (e.g., media object 3614) represents (3704) a first media collection (e.g., an music album, a playlist, etc.) that includes multiple media items (e.g., media items 3660-3672 of media object 3614) and the second media object (e.g., media object 3608) represents a second media collection that includes multiple media items. For example, a media object represents an album or playlist that includes multiple audio tracks, a media object represents multiple audio tracks for an artist or band, a media object represents a video series (such as a TV series) that includes multiple videos, a media object represents an image album that includes multiple animated images (e.g., animated .gif files), etc.

While a focus selector 3604 is over the first media object (e.g., media object 3612 in FIG. 36A), the device detects (3706) an input that includes movement (e.g., as indicated by arrow 3606 of FIG. 36A or as indicated by arrow 3634 of FIGS. 36F-36G) of a contact on the touch-sensitive surface 112.

In some embodiments, the device tilts (3708) the first media object (e.g., media object 3612) from a first orientation of the first media object (e.g., a default or initial orientation (e.g., parallel to the plane of the user interface)) to a second orientation (e.g., a tilted orientation relative to the plane of the user interface)) of the first media object in accordance with the movement of the contact. For example, as shown in FIG. 36F, the currently previewed media object representation 3612 is tilted about a virtual x- or y-axis into the plane of the display as the contact moves toward an edge of the currently previewed media object (e.g., along a path indicated by arrow 3634 toward an upper edge of 3612). In some embodiments, as the contact approaches a media object adjacent to the currently previewed media object, (e.g., media object 3608 adjacent to media object 3612), that media object and the currently previewed media object are tilted in opposite directions (e.g., both 3612 and 3608 tilt toward the location of focus selector 3604 as the focus selector moves along the path indicated by arrow 3634.

In response to detecting the input that includes the movement of the contact on the touch-sensitive surface, in accordance with a determination that the input meets media preview criteria, wherein the media preview criteria includes a criterion that is met when the input includes an increase in a characteristic intensity of the contact above a media-preview intensity threshold (e.g., a hint intensity threshold ($IT_H$), a preview intensity threshold ($IT_L$), or another static or dynamically determined media-preview intensity threshold) while the focus selector 3604 is over the first media object (e.g., media object 3612), the device outputs (3710) a preview of a media item. For example, in FIG. 36E, a media preview criteria includes a criterion that is met when the input includes an increase in characteristic intensity of the contact above threshold $IT_L$, as indicated by intensity meter 3602, while focus selector is over media object 3612. In accordance with a determination that the input meets media preview criteria, the device outputs a preview of a media item of media object 3612, as indicated by the equalizer graphic 3632 (e.g., the device plays a first audio track of an album represented by media object 3612). In some embodiments, the preview is output via one or more speakers 111 (for an audible media item such as a media item of media object 3612). In some embodiments, the preview is output via touch screen 112 (e.g., for a visual media item such as the video preview illustrated at FIGS. 36T-36V).

In response to detecting the movement of the contact, the device ceases to output the preview of the media item from the first set of media items and outputs (3710) a preview of a media item from the second set of media items. For example, the movement moves the focus selector 3604 from over first media object 3612, along a path indicated by arrow 3634, to over second media object 3608, as indicated in FIG. 36F. In response to detecting the movement of the contact along the path indicated by arrow 3634, the device stops the preview playback of the audio track from the first album represented by media object 3612 and the device plays, via speakers 111, a second audio track from a second album (e.g., an album represented by media object 3608, in FIG. 36G) as a preview of the second album.

In accordance with a determination that the input does not meet the media preview criteria, the device moves (3710) the first media object and the second media object on the display in accordance with the movement of the contact on the touch-sensitive surface. For example, when an input includes a movement of a focus selector 3604 along a path indicated by arrow 3606 and media preview criteria are not met (e.g., the characteristic intensity of the contact does not reach an intensity threshold, such as $IT_L$), as indicated at FIG. 36A, the movement of the contact causes scrolling of the user interface such that the first media object (e.g., media object 3612) and the second media object (e.g., media object 3608) are moved/translated from respective first positions on the display as illustrated at FIG. 36A to respective second positions on the display as illustrated at FIG. 36B. In some embodiments, the first media object and the second media object move (e.g., scroll) in same direction as the movement of focus selector 3604 (e.g., media objects 3612 and 3608 move in the direction of arrow 3606). In some embodiments, the scrolling of the user interface occurs at a speed in accordance with the movement of the contact (e.g., the speed of movement of focus selector 3604 along the path indicated by arrow 3606).

In some embodiments, in response to detecting the input that includes the movement of the contact on the touch-sensitive surface, in accordance with the determination that the input meets the media preview criteria, the device maintains (3712) positions of the first media object and the second media object on the display during the movement of the contact on the touch-sensitive surface. (e.g., the first media object and the second media object are static or substantially static (e.g., do not scroll) during the movement of the contact/focus selector. For example, when movement of the contact (e.g., from a location indicated by focus selector 3604 along a path indicated by arrow 3606) occurs while or after an increase in the characteristic intensity of the contact above the media-preview intensity threshold is detected, and the preview of a media object is started in response to media preview criteria being met, the first media object and the second media object do not scroll with the movement of the contact. For example, as shown in FIGS. 36E-36H, after the media-preview criteria are met (e.g., characteristic intensity of contact exceeded intensity level $IT_L$, as indicated by intensity meter 3602 of FIG. 36E) and the preview of the first album is started (e.g., preview of media object 3612 being output, as indicated by equalizer graphic 3632), the user interface (including the representations of the first album (e.g., media object 3612) and the second album (e.g., media object 3608) are not scrolled on the display while the contact/focus selector moves on the display (e.g., along the path indicated by arrow 3634).

In some embodiments, the media preview criteria includes a criterion that is met (3714) when the increase in the characteristic intensity of the contact above the media-preview intensity threshold occurs before the focus selector 3604 has moved by more than a threshold distance. In some embodiments, the threshold distance is a distance selected based on average or maximum contact position variations found in a substantially static contact during a press input (e.g. a lateral range of less than 2 mm or 5 pixels). In some embodiments, the threshold distance is used to differentiate inadvertent movements of the contact while applying pressure to the touch-sensitive surface 112 from intentional movement/translation of the contact on the touch-sensitive surface 112. In some embodiments, the criterion associated with the threshold distance is used in addition to the criterion associated with the media preview intensity threshold when determining whether the input has met the media preview criteria.

In some embodiments, in accordance with a determination that the input meets the media preview criteria, the device selects (3716) the media item from the first set of media items for outputting the preview of the media item from the first set of media items based on at least one selection criterion. For example, the selection criterion includes, e.g., most popular, trending, highest rated for the user, listed first (e.g., in an album or a playlist), etc. In some embodiments, the preview of the media item starts at the beginning of the media item. In some embodiments, the preview of the media item starts at a position other than the beginning of the media item (e.g., a preselected "interesting" portion of the media item).

In some embodiments, while outputting the preview of the media item from the first set of media items, the device visually distinguishes (3718) the first media object (e.g., media object 3612, as shown in FIG. 36D) from one or more media objects of the plurality of media objects other than the first media object (e.g., media objects 3608, 3610, and 3614 as shown in FIG. 36D). In some embodiments, visually distinguishing the first media object from the one or more other media objects includes altering the appearance of the one or more other media objects (e.g., by fading, darkening, blurring or otherwise altering the appearance of one or more of the other media objects, removing text descriptions/labels of one or more of the other media objects, etc.), and/or altering the appearance of first media object (e.g., by lifting the first media object (from the user interface that includes the plurality of media objects) in a virtual z direction, highlighting or otherwise enhancing the first media object, etc.). For example, in FIG. 36D, media object 3612 is lifted in a virtual z direction relative to the plane of the user interface; media objects 3608, 3610, and 3614 are darkened; and additional information 3616, 3618, and 3622 is removed from media objects 3608, 3610, and 3614, respectively.

In some embodiments, in response to detecting the movement of the contact, the device ceases (3720) to visually distinguish the first media object from the one or more media objects of the plurality of media objects other than the first media object, while ceasing to output the preview of the media item from the first set of media items; and visually distinguishes the second media object from one or more media objects of the plurality of media objects other than the second media object, while outputting the preview of the media item from the second set of media items. For example, FIG. 36E shows media object 3612 visually distinguished from media objects 3608, 3610, and 3614 (e.g., media object 3612 is lifted in a virtual z direction relative to the plane of the user interface; media objects 3608, 3610, and 3614 are darkened; and additional information 3616, 3618, and 3622 is removed from media objects 3608, 3610, and 3614, respectively) while the preview of the media item from media object 3612 is output (e.g., as indicated by equalizer graphic 3632. In FIG. 36G, in response to detecting the movement of the contact (e.g., along the path indicated by arrow 3634 from the location 3604*a* on the first media object 3612 to the location 3604*b* on the second media object 3608), device 100 ceases to visually distinguish media object 3612 from media objects 3608, 3610, and 3614; and media object 3608 is visually distinguished from media objects 3610, 3612, and 3614 (e.g., media object 3608 is lifted in a virtual z direction relative to the plane of the user interface; media objects 3610, 3612, and 3614 are darkened; and additional information 3618, 3620, and 3622 is removed from media objects 3610, 3612, and 3614, respectively) while the preview of the media item from media object 3608 is output (e.g., as indicated by equalizer graphic 3636).

In some embodiments, after the outputting of the preview of the media item from the second set of media items is started, the device ceases (3722) to output the preview of the media item from the second set of media items after a predetermined duration (e.g., until reaching the end of the media item (such as the end of a preview segment, the end of an audio track, the end of a video, etc.), until a predetermined preview playback duration has been reached, etc.). In some embodiments, the preview of the media object is completed before lift-off of the contact is detected. In some embodiments, the preview of the media object is interrupted when lift-off of the contact is detected. In some embodiments, the preview of the media object continues with a different media item selected from the set of media items, if no lift-off of the contact has been detected.

In some embodiments, while outputting the preview of the media item from one of the first set of media items or the second set of media items, the device detects (3724) a decrease in the characteristic intensity of the contact below a preview-termination intensity threshold (e.g., the contact detection intensity threshold ($IT_0$), the hint intensity threshold ($IT_H$), or the preview intensity threshold ($IT_L$), the media-preview intensity threshold, or another static or dynamically determined preview-termination intensity threshold). In response to detecting the decrease in the characteristic intensity of the contact below the preview-termination intensity threshold, the device ceases to output the preview of the media item from said one of the first set of media items or the second set of media items. In some embodiments, the preview ends immediately on the detected decrease in the characteristic intensity of the contact below the preview-termination threshold (e.g., the device ceases to display image/video, ends audio playback from speakers, etc.). In some embodiments, the preview is gradually faded out.

In some embodiments, the preview-termination intensity threshold (3726) is an intensity threshold that is lower than the media-preview intensity threshold. In such embodiments, preview of a media item can continue without the need to maintain the intensity of the contact above the media-preview intensity threshold all the time. For example, in FIG. 36G, a preview of a media item from media object 3608 is output (e.g., as indicated by equalizer graphic 3636) when the characteristic intensity of the contact at the location on 3608 (as indicated by focus selector 3604*b*) is below a media preview intensity threshold (e.g., $IT_L$ of intensity meter 3602) and above a media-termination intensity threshold (e.g., $IT_0$ of intensity meter 3602). In some embodiments, the electronic device continues to output the preview of the currently previewed media item until the contact intensity decreases below the preview-termination intensity threshold that is lower than the media-preview intensity threshold. In some embodiments, the electronic device continues to output the preview of the currently previewed media item until the contact intensity drops below the contact detection intensity threshold (e.g., until lift-off of the contact).

In some embodiments, while outputting the preview of the media item from one of the first set of media items or the second set of media items (e.g., while the focus selector 3604 is over media object 3612 as shown in FIG. 36E, and the preview of the media item is playing, as indicated by equalizer graphic 3632) in accordance with a determination that the input meets menu presentation criteria, wherein the menu presentation criteria includes a criterion that is met when the input includes a movement of the contact that corresponds to a movement of the focus selector (e.g., a movement of the focus selector by at least a threshold distance across the display), the device displays (3728) a menu of options (e.g., a menu of actions associated with the media item that is currently being previewed, or the media object that includes the media item that is currently being previewed). In some embodiments, a preview platter (e.g., preview platter 3654 illustrated in FIGS. 36L-36R), is shifted (e.g., upward) in the user interface to make room for the displayed menu of options. In some embodiments, when lift-off of the contact is detected while the preview platter and the menu of options are displayed over the user interface, the preview platter and the menu of options remain on the user interface.

In some embodiments, the movement of the contact on the touch-sensitive surface 112 causes movement of the focus selector 3604 to a predefined region (e.g., within a threshold distance from an edge (e.g., upper edge 3640 or lower edge 3650) of the user interface displaying the plurality of media objects) of the user interface that includes the plurality of media objects, and, while the focus selector is within the predefined region of the user interface, the device moves (3730) the first media object and the second media object on the display (e.g., automatically scrolling the plurality of media objects in the user interface as the focus selector (e.g., the contact) is within the predefined region of the user interface). For example, when focus selector 3604*c* is within a predefined region of upper edge 3640 of the user interface, as shown in FIG. 36H, media object 3612 and media object 3608 are scrolled downward, revealing media objects 3642 and 3644, as shown in FIG. 36I. In some embodiments, the scrolling of the plurality of media objects (including the first and second media objects) proceeds when the contact is substantially stationary within the predefined region. In some embodiments, when the focus selector 3604 is in a first predefined region (e.g., within a threshold distance of the upper edge 36400 of the user interface), the media objects are scrolled in a first direction (e.g., scrolled down); when the focus selector 3604 is in a second predefined region (e.g., within a threshold distance of the lower edge 3650 of the user interface), the media objects are scrolled in a second direction (e.g., scrolled up). In some embodiments, the reverse relationship between the location of the focus selector 3604 and the scroll direction is implemented (e.g., focus selector being 3604 near the upper edge 3640 corresponds to scrolling up, and focus selector 3604 being near the lower edge 3650 corresponds to scrolling down).

In some embodiments, moving the first media object and the second media object on the display while the focus selector 3604 is within the predefined region of the user interface includes (3732) moving the first media object (e.g., media object 3612) and the second media object (e.g., media object 3608) while the focus selector 3604 is substantially stationary within the predefined region of the user interface (e.g., when the contact is substantially stationary on touch-sensitive surface 112).

In some embodiments, moving the first media object (e.g., media object 3612) and the second media object (e.g., media object 3608) on the display while the focus selector 3604 is within the predefined region of the user interface includes moving (3734) the first media object (3612) and the second media object (3608) at a rate in accordance with a current location of the focus selector within the predefined region of the user interface. For example, the scrolling speed is based on (e.g., directly proportional to or otherwise related to) a distance from the edge (e.g., upper edge 3640 or lower edge 3650) of the user interface rather than being dependent on the movement of the contact on the touch-sensitive surface. In some embodiments, the rate at which the media objects are scrolled on the display is determined based on a distance of the contact from the edge of the touch-sensitive surface (e.g., moving faster when the contact is near the edge of the touch-sensitive surface and moving slower when the contact is further away from the edge of the touch-sensitive surface) or a distance of a focus selector from an edge of a content region on the display that includes the media objects. In some embodiments, the rate at which the media objects are scrolled is dependent upon an intensity of the contact (e.g., scrolling faster when the intensity of the contact is higher and scrolling more slowly when the intensity of the contact is lower).

In some embodiments, moving the first media object and the second media object on the display while the focus selector 3604 is within the predefined region of the user interface includes moving (3736) the first media object (e.g., media object 3612) and the second media object (e.g., media object 3608) while outputting the preview of the media item from one of the first set of media items and the second set of media items. For example, after the preview of a media item from one of the first and second set of media items has been started in accordance with a determination that the input meets media preview criteria (e.g., a preview of a media item from media object 3608 being output as indicated by equalizer graphic 3636 in FIG. 36H), if the contact then moves sufficiently close to the edge of the user interface (e.g., to a position indicated by focus selector 3604*c*), the scrolling of the plurality of media objects in the user interface can start while the preview of said one of the first and second set of media items continues. In some embodiments, when a third media object (e.g., the midpoint of the representation of the third media object) is scrolled (via the automatic scrolling described herein) to a position under the focus selector (e.g., media object 3642 moves under focus selector 3604, as shown in FIG. 36I), the preview of the media item from the currently previewed media object can stop (e.g., a preview of a media item from media object 3608 is stopped), and a preview of a media item from the third media object is optionally started (e.g., a preview of a media item from media object 3642 is started, as indicated by equalizer graphic 3646 of FIG. 36I). In some embodiments, the preview of the media item is optionally started when an increase in the characteristic intensity of the contact above a respective intensity threshold (e.g., a hint intensity threshold or the media-preview intensity threshold) is detected while the focus selector 3604 is located over the third media object (e.g., media object 3642) during the automatic scrolling.

In some embodiments, the movement of the contact on the touch-sensitive surface 112 causes movement of the focus selector 3604 from within the predefined region to a location outside of the predefined region of the user interface, and, in response to detecting that the movement of the contact has caused the movement of the focus selector from within the predefined region to a location outside of the predefined region of the user interface, the device ceases (3738) to move the first media object and the second media object on the display (e.g., the automatic scrolling of the plurality of media objects stops when the focus selector is moved out of the predefined region of the user interface. Subsequent movement of the focus selector 3604 caused by subsequent movement of the contact on the touch-sensitive surface 112 does not cause further scrolling of the media objects (e.g., media object 3608, 3610, 3612, 3614) on the user interface. Instead, when the focus selector 3604 is moved (through the subsequent movement of the contact) to a third media object on the user interface (e.g., media object 3642), a preview of a media item from the third media object is output, and the preview of the media item from the currently previewed media object (e.g., the first or second media object) is stopped.

In some embodiments, while outputting the preview of the media item from one of the first set of media items or the second set of media items (e.g., while the focus selector 3604 is over media object 3614 as shown in FIG. 36K, and the preview of the media item is playing, as indicated by equalizer graphic 3652) in accordance with a determination that the input meets enhanced media preview criteria, wherein the enhanced media preview criteria includes a criterion that is met when the input includes an increase in the characteristic intensity of the contact above an enhanced-preview intensity threshold (e.g., a light press intensity threshold ($IT_L$), as shown at 3602 of FIG. 36K, the media-preview intensity threshold, or another static or dynamically determined enhanced-preview intensity threshold), the device displays (3740) an enhanced preview of one of the first or second media object that corresponds to said one of the first or second set of media items (e.g., an enhanced preview 3654 of media object 3614 as shown in FIG. 36L). The enhanced preview optionally includes an image, an animation, or a video clip representing the media object (e.g., an album cover of the album, as shown at enhanced preview 3654 of FIG. 36L) and/or a listing of media items in the media object (e.g., tracks in the album, for example, media items 3660-3672 as shown at enhanced preview 3654 of FIG. 36M). In some embodiments, the enhanced preview 3654 shows a representation of the media item for which a preview is being output and/or a set of media items in the currently previewed media object using a preview platter, e.g., as shown in FIGS. 36M-36R. In some embodiments, the enhanced preview 3654 is shown as a preview platter that is lifted up in a virtual z direction relative to the plane of the user interface (e.g., as indicated by shadow 3656), and is overlaid on top of the user interface. In some embodiments, while the preview platter is displayed, the user interface behind the preview platter is visually obscured (e.g., blurred or, as indicated at FIGS. 36M-36R, darkened). In some embodiments, while the enhanced preview 3654 is displayed as a preview platter over the user interface, the preview of the media item from the set of media items associated with the media object (e.g., preview playback of the media item from media object 3614) continues (e.g., as indicated by equalizer graphic 3652 at FIG. 36L).

In some embodiments, while displaying the enhanced preview of said one of the first or second media object corresponding to said one of the first or second set of media items, the device detects (3742) further movement of the contact on the touch-sensitive surface; and in response to detecting the further movement of the contact on the touch-sensitive surface 112 (e.g., movement of the contact that causes movement of the focus selector 3604 by more than a predefined distance or to a different media item in the set of media items, such as movement along the path indicated by arrow 3658 of FIG. 36M), the device ceases to output the preview of the media item from said one of the first set of media items or the second media items, and the device outputs a preview of a different media item from said one of the first set of media items or the second set of media items. In some embodiments, user scrubs through media items of the first set of media items (e.g., media items 3660-3672 of media object 3614) by providing continuous moving input (e.g., along a path indicated by arrow 3658 of FIG. 36M). In some embodiments, the current preview (e.g., a preview of media item 3664 of media object 3614, as shown in FIG. 36M) ceases and the next preview begins (e.g., a preview of media item 3666 of media object 3614, as shown in FIG. 36N) when a predetermined distance is traversed by the moving focus selector 3604. In some embodiments, the current preview ceases and the next preview begins when a predetermined portion or duration of the media item preview has been played. In some embodiments, the current preview (e.g., a preview of media item 3666 of media object 3614, as shown in FIG. 36P) ceases and the next preview (e.g., a preview of media item 3670 of media object 3614, as shown in FIG. 36Q) begins when the focus selector 3604 has been moved over to a different media item (e.g., moved over media item 3670, as shown at 3604*f* of FIG. 36P) shown in the enhanced preview 3654 (e.g., moves to and remains on the different media item for more than a threshold amount of time). In some embodiments, the direction of movement by the focus selector 3604 (e.g., along a path indicated by arrow 3674) determines whether a previous media item or the next media item in the set of media items (which is pre-sorted) would be played. In some embodiments, the different media item is selected in accordance with predefined criteria (e.g., according to ranking based on one or more selection criteria). In some embodiments, the different media item is selected randomly from the set of media items 3660-3672.

In some embodiments, outputting an enhanced preview (e.g., preview platter 3654) of one of the first or second media object corresponding to said one of the first or second set of media items includes displaying (3744) representations of said one of the first or second set of media items. For example, media items 3660-3672 are displayed enhanced preview 3654 in FIG. 36M. In some embodiments, displaying the enhanced preview 3654 may include displaying a list of track titles from an album, a grid of images (e.g., images associated with tracks in an album, images of a set of animated images in an album, images associated with videos in a series of videos, etc.), and the like. In some embodiments, the listing of media items is displayed in an enhanced preview (e.g., listing of media items 3660-3672 are displayed in enhanced preview 3654, as shown in FIG. 36M) after displaying a preview image representing the media object (e.g., album art of media object 3614 is displayed in enhanced preview 3654, as shown in FIG. 36L). In various embodiments, the listing of media items is displayed in the enhanced preview 3654 in response to movement (e.g., movement as indicated by arrow 3658 of FIG. 36M), the listing of media items is displayed in response to increased intensity of the contact, the listing of media items is displayed after a predetermined duration, etc. In some embodiments, the listing of media items are overlaid on top of a preview image representing the media object (e.g., media items 3660-3672 are overlaid on top of the album art image representing media object 3614 in FIG. 36M).

In some embodiments, while outputting the preview of a first respective media item from said one of the first set of media items or the second set of media items, the first respective media item is visually distinguished (3746) from one or more media items from said one of the first or second set of media items other than the first respective media item (e.g., the first respective media item is highlighted relative to other media items in the set of media items, and/or the first respective media item remains clear and visible while other media items fade away gradually over time on the preview platter). For example, in FIG. 36M, media item 3664 is highlighted relative to media items 3660-3662 and 3655-3672. In FIG. 36O, a gradual fade is shown in the highlighting of media items from media item 3666, to media item 3668, and then to media item 3670.

In some embodiments, while outputting the preview of the first respective media item from said one of the first set of media items or the second set of media items, the device alters (3748) an appearance of respective representations of one or more media items from said one of the first or second set of media items other than the first respective media item. For example, while the preview of the first respective media item (e.g., media item 3666) from the set of media items for a media object (e.g., media object 3614) is being played and the enhanced preview 3654 for the media object is being displayed over the user interface, the representations of the media items in the listing of the media items are gradually faded out (e.g., as demonstrated by the representations of media items 3662, 3664, 3668, and 3670) leaving only the representation for the media item that is being previewed (e.g., media item 3666) visible/unchanged in the enhanced preview 3654 (e.g., as shown in FIG. 36O). In some embodiments, altering the appearance of the representation of the un-previewed media item includes, e.g., fading, darkening, blurring, removing text descriptions/label from the un-previewed media item, etc. In some embodiments, the alteration of the appearance changes over time, e.g., the fading of the representations increases over time. In some embodiments, the appearance of the media items that are listed farther away from the currently previewed media item are altered to a greater extent than media items that are listed closer to the currently previewed media item at a given time. For example, in FIG. 36O, the representations of media items 3662 and 3670 are faded to a greater extent than the representations of media items 3664 and 3668, which are closer to currently previewed media item 3666, while the display of the representation of media item 3666 is maintained. In some embodiments, the display of the preview image is maintained and is visible when the representations of the un-previewed media items are faded away.

In some embodiments, the device detects (3750) movement of the contact that causes movement of the focus selector 3604 to a second respective media item (e.g., while the appearance of the second respective media item is unaltered (e.g., not yet faded) or while the second respective media item has already been altered (e.g., faded but not completely gone from the preview platter) from said one of the first set of media items or the second set of media items, the second respective media item being distinct from the first respective media item; and in response to detecting the movement of the contact that causes the movement of the focus selector to the second respective media item (or, in some embodiments, in response to the focus selector moving to and remaining at the second respective media item for more than a threshold amount of time), the device alters the appearance of the second respective media item. For example, the representation of the second respective media item is highlighted, and the representation of the first respective media item is no longer highlighted, when the focus selector moves over to the second respective media and, optionally, remains at the second respective media item for more than a threshold amount of time. If the second respective media item has already started to fade when the focus selector moves over it, the second respective media item is no longer faded, and the representation of the first respective media item is optionally faded. In some embodiments, as the focus selector traverses to the representation of the second respective media item, altering the appearance of the second respective media item optionally includes showing additional information associated with the second respective media item such as descriptions/labels, lifting the representation of the second respective media item in a virtual z direction, etc. In some embodiments, the alteration of the appearance is reversed in response to determining that focus selector has moved away from the second respective media item.

In some embodiments, in response to detecting the movement of the contact that causes the movement of the focus selector to the second respective media item (or, in some embodiments, in response to the focus selector moving to and remaining at the second respective media item for more than a threshold amount of time), the device ceases (3752) to output the preview of the first respective media item from said one of the first set of media items or the second set of media items and the device outputs a preview of the second respective media item from said one of the first set of media items or the second set of media items. For example, when focus selector 3604 has moved to media item 3670, as indicated at 36Q, a preview of media item 3670 is output.

In some embodiments, while outputting a preview for a currently previewed media item, in accordance with a determination that the input meets media selection criteria (e.g., a characteristic intensity of a contact exceeds a "deep press" intensity threshold ($IT_D$), or another static or dynamically determined media-selection intensity threshold), the device displays (3754) an indication that the representation of the currently previewed media item is selected. In some embodiments, the indication that the representation of the currently previewed media item is selected includes an altered appearance of the representation of the currently previewed media item, such as outline, further highlighting, bold text, etc. For example, as shown in FIG. 36R, an outline is shown around media item 3670 in accordance with a determination that a characteristic intensity of a contact at a location indicated by focus selector 3604 exceeds $IT_D$, as indicated at intensity meter 3602. In some embodiments, the indication that the representation of the currently previewed media item is selected includes "popping" into a playback mode for the currently previewed media item (such as showing a playback user interface for the currently previewed media item and/or media object, e.g., as shown in FIG. 36S). In some embodiments, playback of the media item when the media item is selected (e.g., when a playback user interface is shown) begins from beginning of the selected media item (e.g., when user interface 36S is shown, playback of selected media item 3670 begins from the start of the audio track represented by media item 3670. In some embodiments, playback continues from a current position in the selected media item, begins from the end of a preview segment for the selected media item, etc.

In some embodiments, while displaying the enhanced preview of said one of the first or second media object that corresponds to said one of the first or second set of media items: in accordance with a determination that a characteristic intensity of the contact has decreased below a respective intensity threshold (e.g., decreased below the enhanced-preview intensity threshold (e.g., ($IT_L$), such as below the enhanced-preview intensity threshold but above the media-preview intensity threshold (e.g., $IT_H$)), the device maintains (3756) display of the enhanced preview 3654 of said one of the first or second media object that corresponds to said one of the first or second set of media items. In some embodiments, maintaining display of the enhanced preview of the currently previewed media item/media object enables a user to more easily scroll through the media item representations (and, optionally, scroll through the list of media items upon moving the focus selector to an edge of the set of media item representations, similar to the way that the media objects scroll (e.g., as discussed with regard to FIGS. 36H-36I) while previews are playing).

In some embodiments, while displaying the enhanced preview (e.g., preview platter 3654) of said one of the first or second media object that corresponds to said one of the first or second set of media items, in accordance with a determination that lift-off of the contact has been detected, the device maintains (3758) display of the enhanced preview 3654 of said one of the first or second media object that corresponds to said one of the first or second set of media items. In some embodiments, maintaining display of the enhanced preview of the currently previewed media item/media object on liftoff of the contact enables a user to provide further input related to one or more media items, e.g., the user is enabled to select a media item representation (such as by tapping on the media item representation).

In some embodiments, while displaying the enhanced preview (e.g., preview platter 3654) of said one of the first or second media object that corresponds to said one of the first or second set of media items, in accordance with a determination that lift-off of the contact has been detected, the device ceases (3760) to display the enhanced preview (e.g., preview platter 3654) of said one of the first or second media object that corresponds to said one of the first or second set of media items.

It should be understood that the particular order in which the operations in FIGS. 37A-37H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 3700 described above with respect to FIGS. 37A-37H. For brevity, these details are not repeated here.

Figure 38:
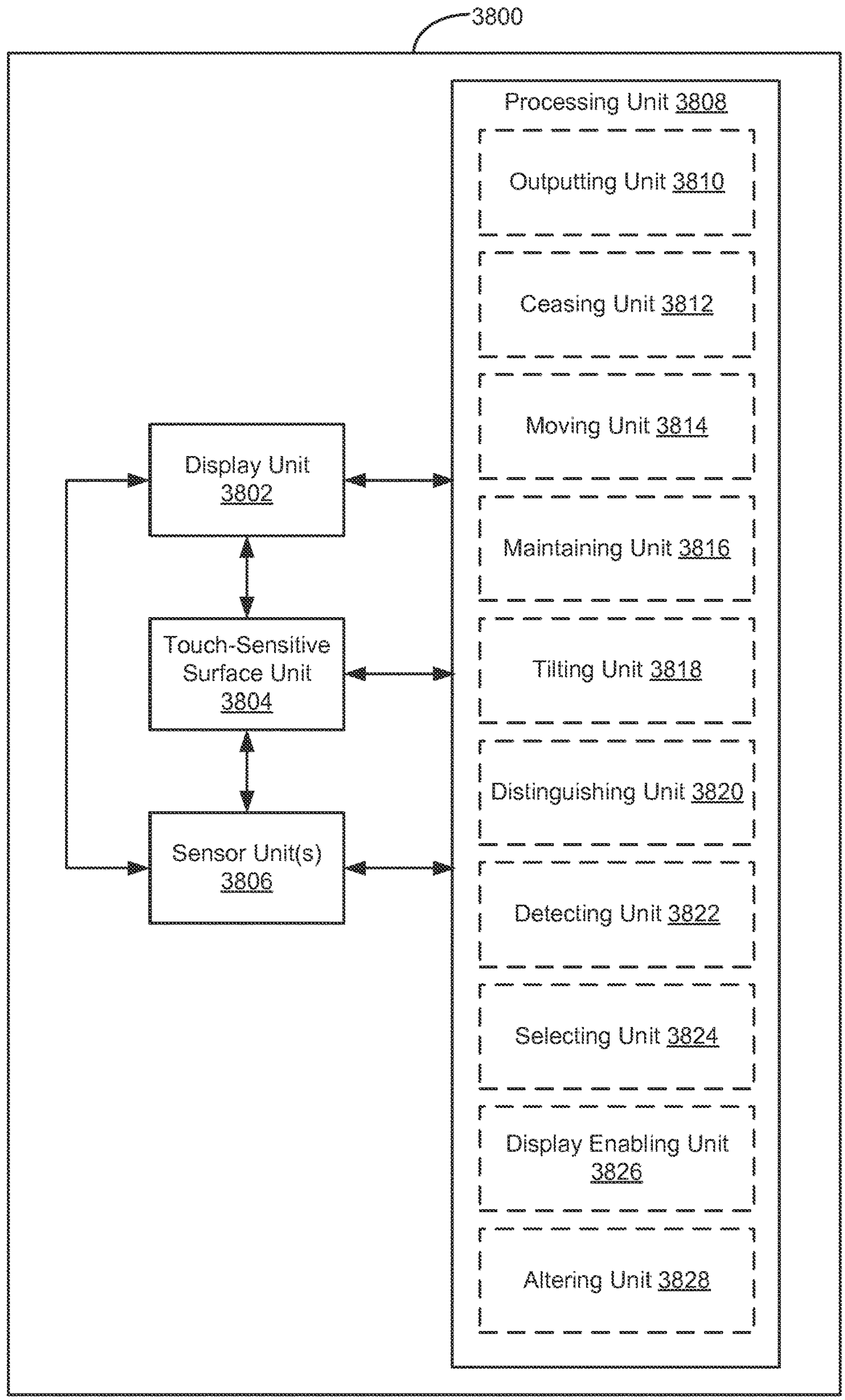
FIG. 38 is a functional block diagram of an electronic device in accordance with some embodiments.

In accordance with some embodiments, FIG. 38 shows a functional block diagram of an electronic device 3800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 38 are, optionally, combined or separated into sub-blocks to implement the principles of the various described embodiments. Therefore, the description herein optionally supports any possible combination or separation or further definition of the functional blocks described herein.

As shown in FIG. 38, an electronic device 3800 includes a display unit 3802 configured to display a user interface, a touch-sensitive surface unit 3804 configured to receive contacts, one or more sensor units 3806 for detecting intensity of contacts on the touch-sensitive surface unit 3804; and a processing unit 3808 coupled with the display unit 3802, the touch-sensitive surface unit 3804 and the one or more sensor units 3806. In some embodiments, the processing unit 3808 includes an outputting unit 3810, a ceasing unit 3812, a moving unit 3814, a maintaining unit 3816, a tilting unit 3818, a distinguishing unit 3820, a detecting unit 3822, a selecting unit 3824, a display enabling unit 3826, and an altering unit 3828.

The processing unit 3808 is configured to enable display, on display unit 3802, of a user interface a plurality of media objects that include a first media object that represents a first set of one or more media items and a second media object that represents a second set of one or more media items, wherein the first set of media items is different from the second set of media items. The processing unit 3808 is configured to, while a focus selector is over the first media object, detect an input that includes movement of a contact on the touch-sensitive surface 3804. The processing unit 3808 is configured to: in response to detecting the input that includes the movement of the contact on the touch-sensitive surface: in accordance with a determination that the input meets media preview criteria, wherein the media preview criteria includes a criterion that is met when the input includes an increase in a characteristic intensity of the contact above a media-preview intensity threshold while the focus selector is over the first media object, output (e.g., with the outputting unit 3810) a preview of a media item from the first set of media items and, in response to detecting the movement of the contact, cease (e.g., with the ceasing unit 3812) to output the preview of the media item from the first set of media items and output (e.g., with the outputting unit 3810) a preview of a media item from the second set of media items; and, in accordance with a determination that the input does not meet the media preview criteria, move (e.g., with the moving unit 3810) the first media object and the second media object on the display in accordance with the movement of the contact on the touch-sensitive surface.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 37A-37H are, optionally, implemented by components depicted in FIGS. 1A-1B or FIG. 38. For example, detection operation 3706 is optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Many electronic devices have graphical user interfaces that display paginated content, such as pages of a book displayed in a reader application. With existing methods, tapping or swiping input is used to sequentially access the pages before and after a currently displayed page. In some embodiments described below, when an input meets one respective content navigation criteria (e.g., when a press input received at the edge of a page exceeds a threshold intensity level), an indication of a quantity of later pages or an indication of a quantity of prior pages is displayed. In some embodiments, when the input meets another respective content navigation criteria (e.g., when the press input ends with a focus selector on a particular page in the prior or later pages, or when the press input exceeds a second threshold intensity level), the device jumps ahead or backward to a page that is in the later or prior pages or to a page in a later or prior section. Providing a user with the ability to provide input with or without an intensity component allows additional functionality to be associated with the input, and thereby improve efficiency and ease of content navigation.

Figure 41:
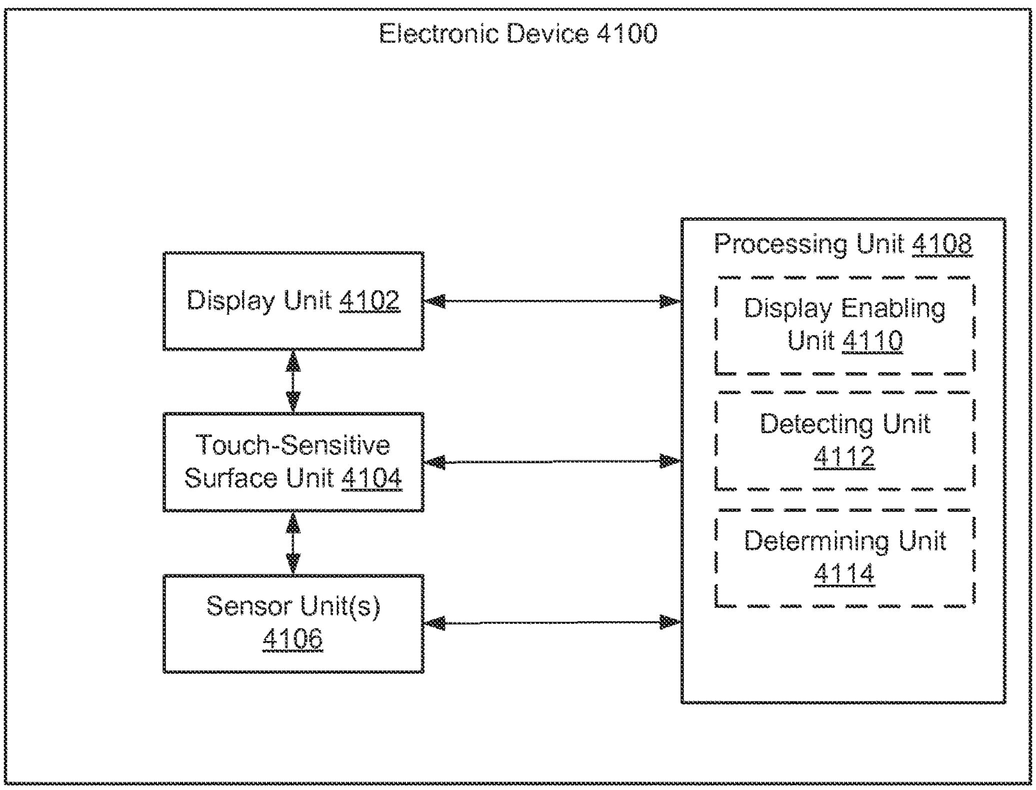
FIG. 41 is a functional block diagram of an electronic device in accordance with some embodiments.

Below, FIGS. 39A-39K illustrate exemplary user interfaces for navigating paginated content in accordance with some embodiments. FIG. 39L illustrates an exemplary flow diagram indicating operations that occur in response to received input (or portion(s) thereof) that meet various content navigation criteria, in accordance with some embodiments. FIGS. 40A-40E are flow diagrams illustrating a method of navigating paginated content in accordance with some embodiments. The user interfaces in FIGS. 39A-39K are used to illustrate the processes in FIG. 39L and FIGS. 40A-40E. FIG. 41 is a functional block diagram of an exemplary electronic device that performs the method described in FIGS. 39A-39K, 5SSL, and FIGS. 40A-40E, in accordance with some embodiments.

FIGS. 39A-39K illustrate exemplary user interfaces for navigating paginated content in accordance with some embodiments. The user interfaces in these figures are used to illustrate the processes described below, including the processes in FIG. 39L, and FIGS. 40A-40E. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 39A-39L and 40A-40E will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts described in FIGS. 39A-39K on the touch-sensitive surface 451 while displaying the user interfaces shown in FIGS. 39A-39K on the display 450, along with a focus selector.

Figure 39A:
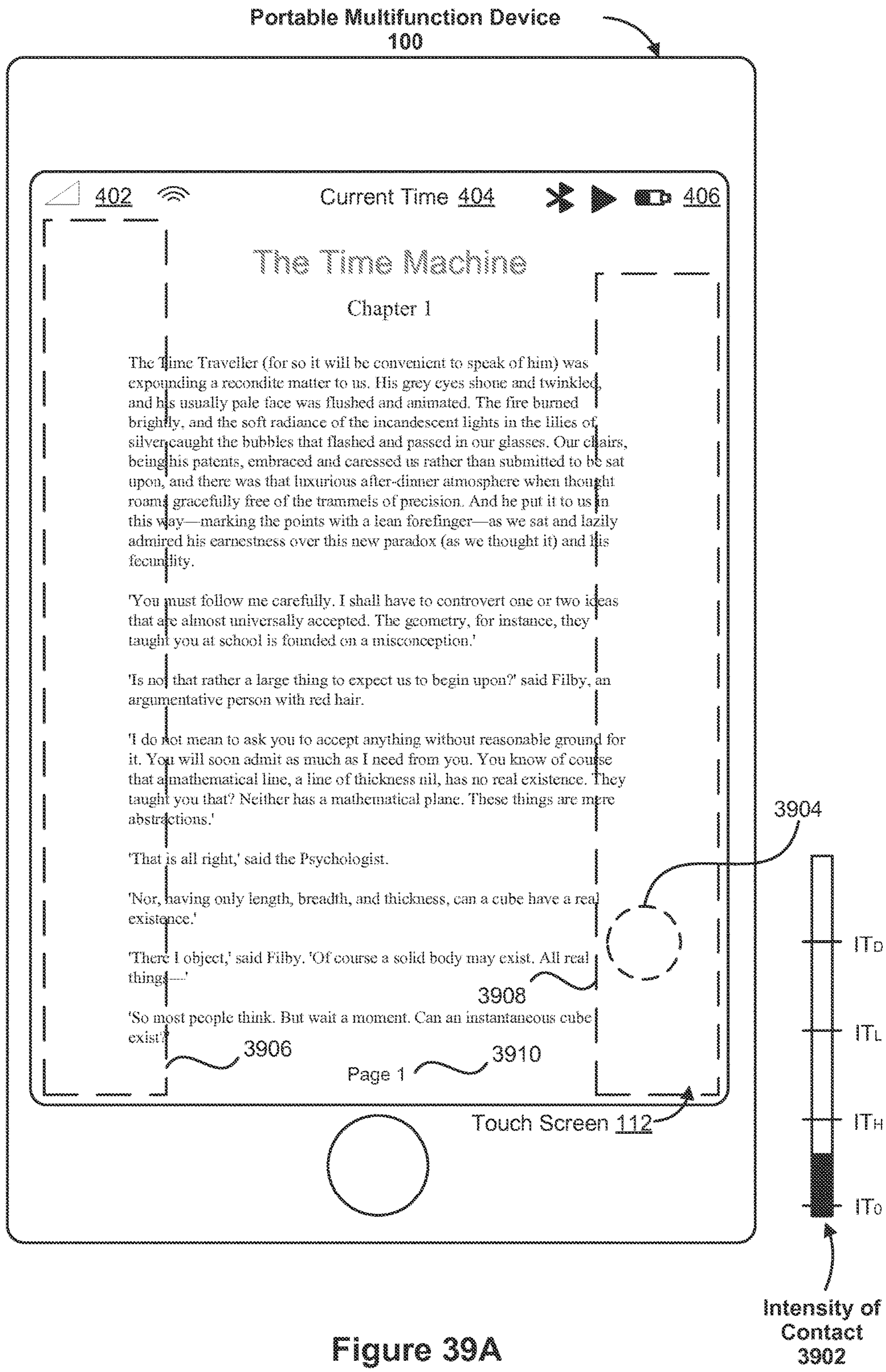
FIGS. 39A-39K illustrate exemplary user interfaces for navigating paginated content in accordance with some embodiments.

FIG. 39A illustrates a user interface that displays a portion of paginated content, in accordance with some embodiments. In the illustrative example of FIG. 39A, the portion is a page 3910 (page 1) of a section (Chapter 1) of paginated content (a book titled *The Time Machine*) that includes a plurality of sections (Chapters 1, 2, 3, and so on). The page includes a left-side predefined region 3906 and a right-side predefined region 3908. In some embodiments, left-side predefined region 3906 has a different size (i.e., height) from right-side predefined region 3908, e.g., to reserve space for an additional region (such as an additional region to receive input for bookmarking a page). A contact on touch screen 112 is received within right-side region 3908 at a location indicated by focus selector 3904. For a touch screen 112, the focus selector 3904 is the contact detected on the touch screen 112. In FIG. 39A, the characteristic intensity of the contact is below a threshold intensity level (e.g., below a "light press" intensity threshold $IT_L$ as indicated at intensity meter 3902).

Figure 39B:
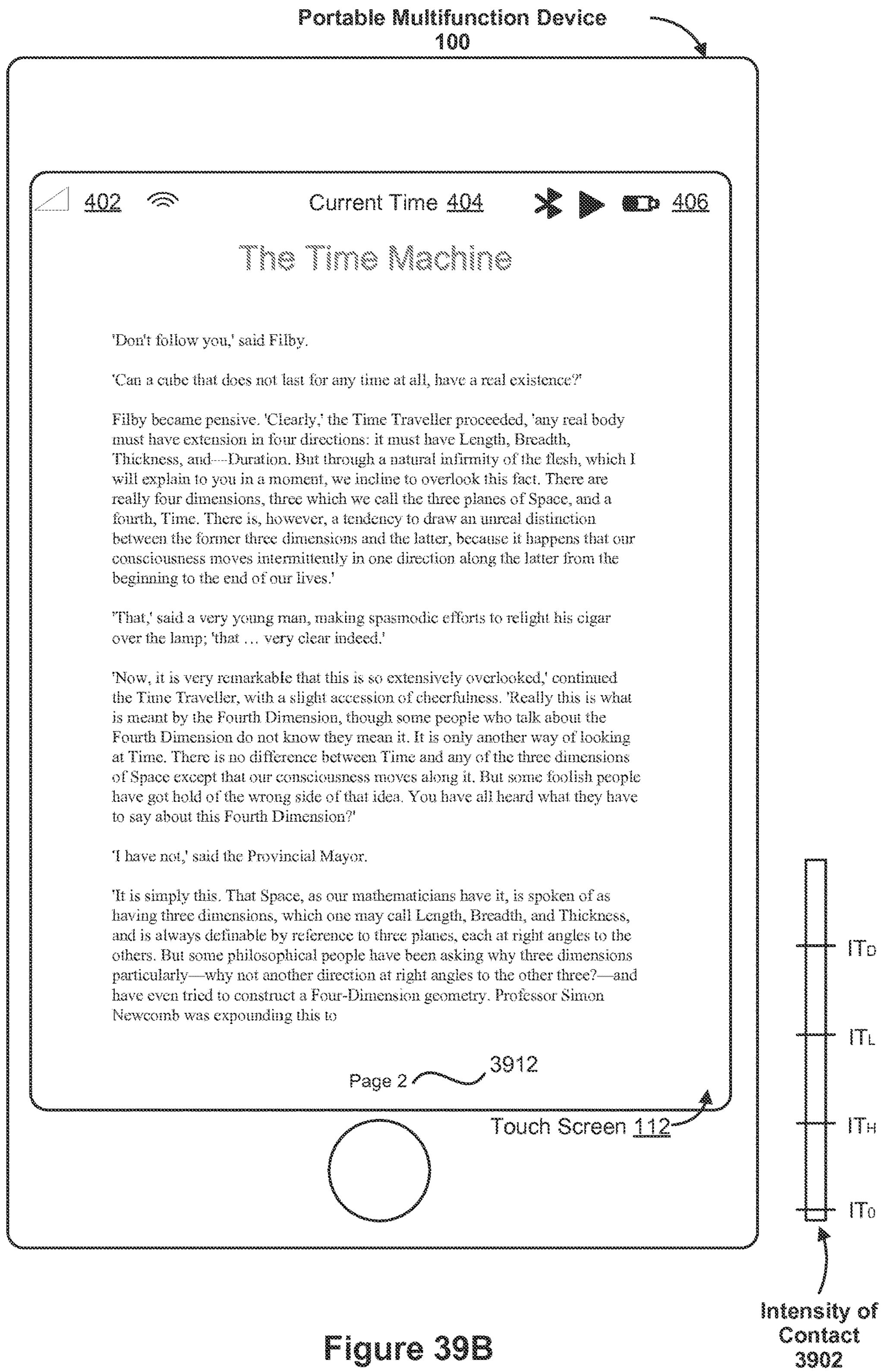

FIG. 39B illustrates a user interface that displays a portion of paginated content that replaces the portion of paginated content (e.g., page 1) shown in FIG. 39A, in accordance with some embodiments. The portion of paginated content shown in FIG. 40B is a page 3912 (page 2) that is sequentially adjacent to (e.g., immediately follows) the page 3910 (page 1) shown in FIG. 39A. In accordance with a determination that the characteristic intensity of the contact at the location indicated by focus selector 3904 in FIG. 39A did not exceed a threshold intensity (e.g., $IT_L$), on lift-off of the contact, the sequentially adjacent content of FIG. 39B is shown. In other words, FIGS. 39A-39B illustrates that, with a tap input or a swipe input detected on the right edge of a page, that page is flipped, and the next page is displayed.

Figure 39C:
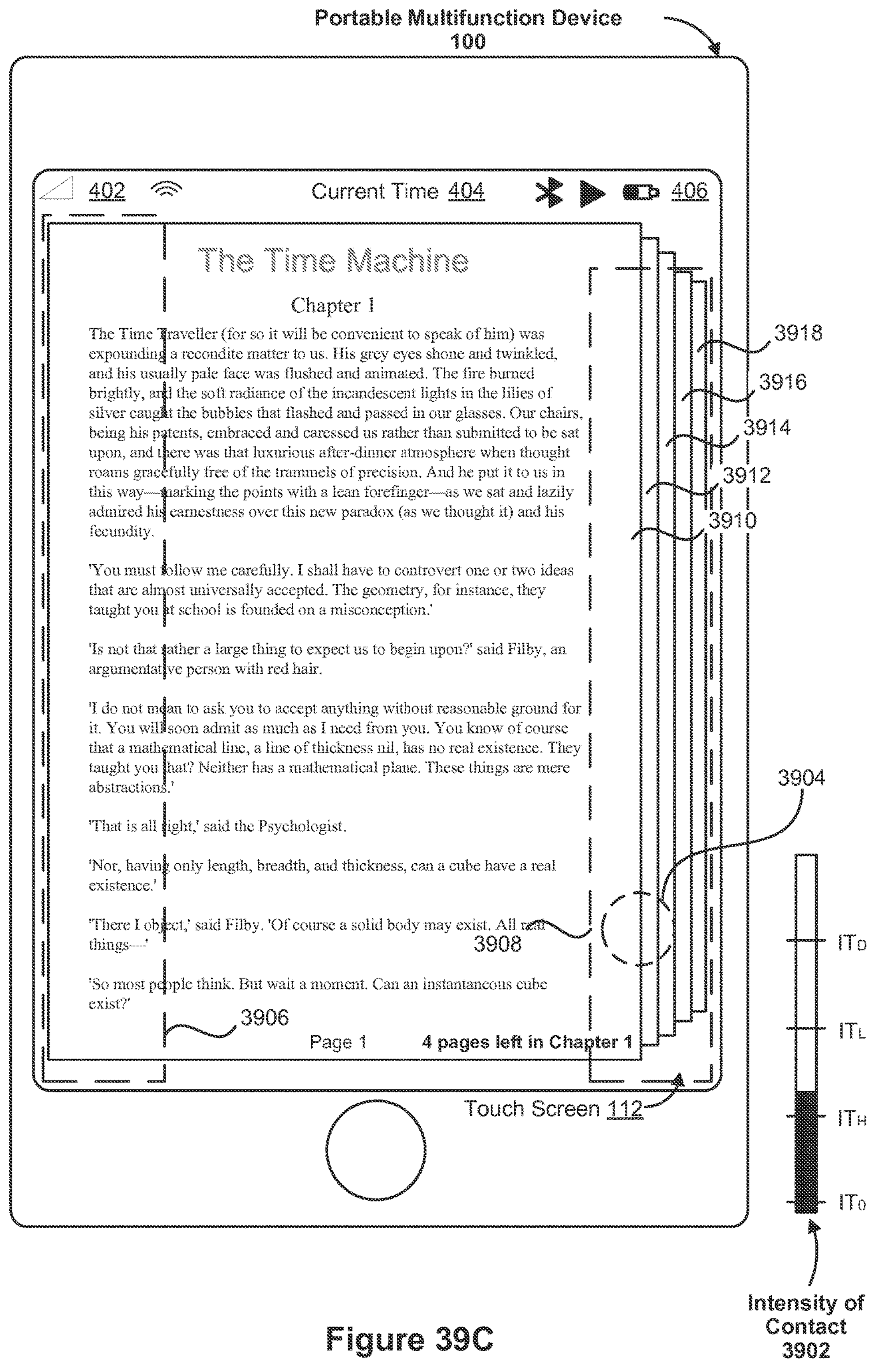

FIG. 39C illustrates a user interface that displays a sequence of pages that follow page 3910, in accordance with some embodiments. In accordance with a determination that the characteristic intensity of the contact at the location within region 3908 indicated by focus selector 3904 exceeded a threshold intensity (e.g., "hint" intensity threshold $IT_H$ as indicated by intensity meter 3902), a quantity of pages from the sequence pages following page 3910 is shown. In FIG. 39C, edges of pages 3912-3918 (e.g., the remaining pages in Chapter 1) are revealed. Display of page 3910 (page 1) is maintained (e.g., page 1 remains visible at a smaller scale) when edges of pages 3912-3918 are shown.

Figure 39D:
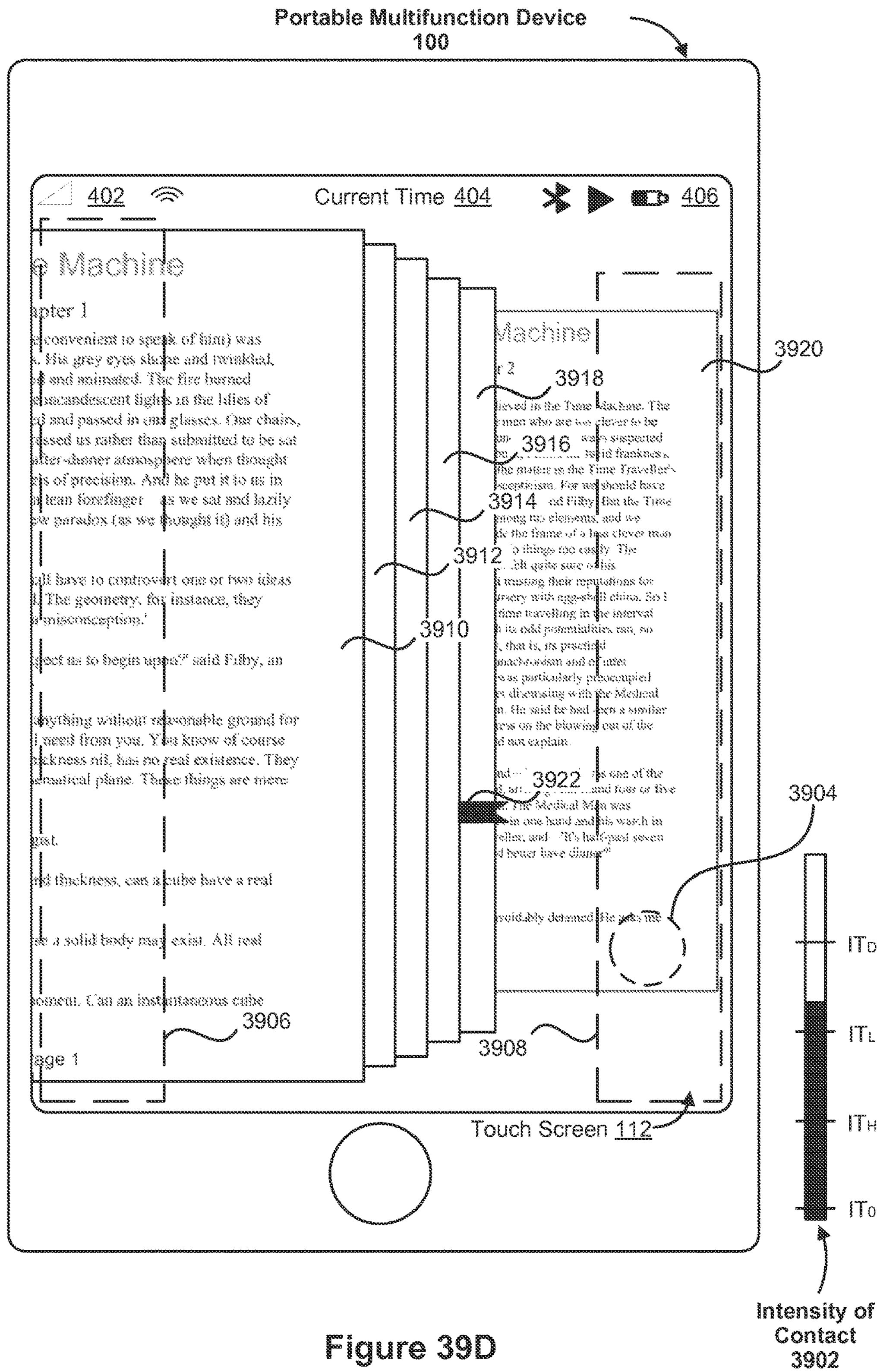

FIG. 39D illustrates a user interface that displays the sequence of pages that follow page 3910 in the current section, in accordance with some embodiments. In accordance with a determination that the characteristic intensity of the contact at the location within region 3908 indicated by focus selector 3904 exceeded a respective threshold intensity (e.g., a light press intensity threshold $IT_L$), as indicated by intensity meter 3902, edges of pages 3912-3920 are shown. In some embodiments, the size of the edges of the pages increases (e.g., from the size shown in FIG. 39C to the size shown in FIG. 39D) as the intensity of the contact increases. In some embodiments, as shown in FIG. 39D, page 3910 (page 1) remains visible and is shifted in the user interface view of the pages to make room for the later pages (e.g., pages 3912-3920).

In some embodiments, an existing bookmark 3922 is displayed (e.g., at the location of the bookmarked page 3918) when edges of pages 3912-3920 are revealed (e.g., in accordance with a determination that the characteristic intensity of the contact at the location within region 3908 indicated by focus selector 3904 exceeded the respective threshold intensity (e.g., $IT_L$), as shown in FIG. 39D. In some embodiments, bookmark 3922 is revealed in accordance with a determination that the contact at the location within region 3908 indicated by focus selector 3904 exceeded another threshold intensity (e.g., exceeded the "deep press" intensity threshold $IT_D$, or the "hint" intensity threshold $IT_H$), when the edges of pages 3912-3920 are shown.

FIG. 39D further illustrate that, as the contact intensity increases above the respective intensity threshold (e.g., $IT_L$), content of a respective page (e.g., 3920) in the later pages (e.g., 3912-3920) is partially shown, while content of other pages in the later pages are concealed. In some embodiments, the device automatically reveals content of the sequence of later pages (e.g., 3912-3920) one by one. In some embodiments, the user controls which page is revealed by moving the focus selector 3904 to scan across the edges of the pages manually, or by maintaining a stationary contact (and stationary focus selector) while increasing the contact intensity (e.g., easing the pressure and then pressing hard again) to cause a different page (e.g., the next or the previous page) in the sequence of pages to shift to the position of the focus selector 3904.

FIG. 39D further illustrate that, as the contact intensity increases above the respective intensity threshold (e.g., $IT_L$), content of a respective page (e.g., 3920) in the later pages (e.g., 3912-3920) is partially shown, while content of other pages in the later pages are concealed. In some embodiments, the respective page (e.g., 3920) is the first page of the next section (e.g., chapter 2). In some embodiments, if lift-off of the contact is detected when the preview of the content of the respective page is displayed, the review remains displayed upon lift-off of the contact.

Figure 39E:
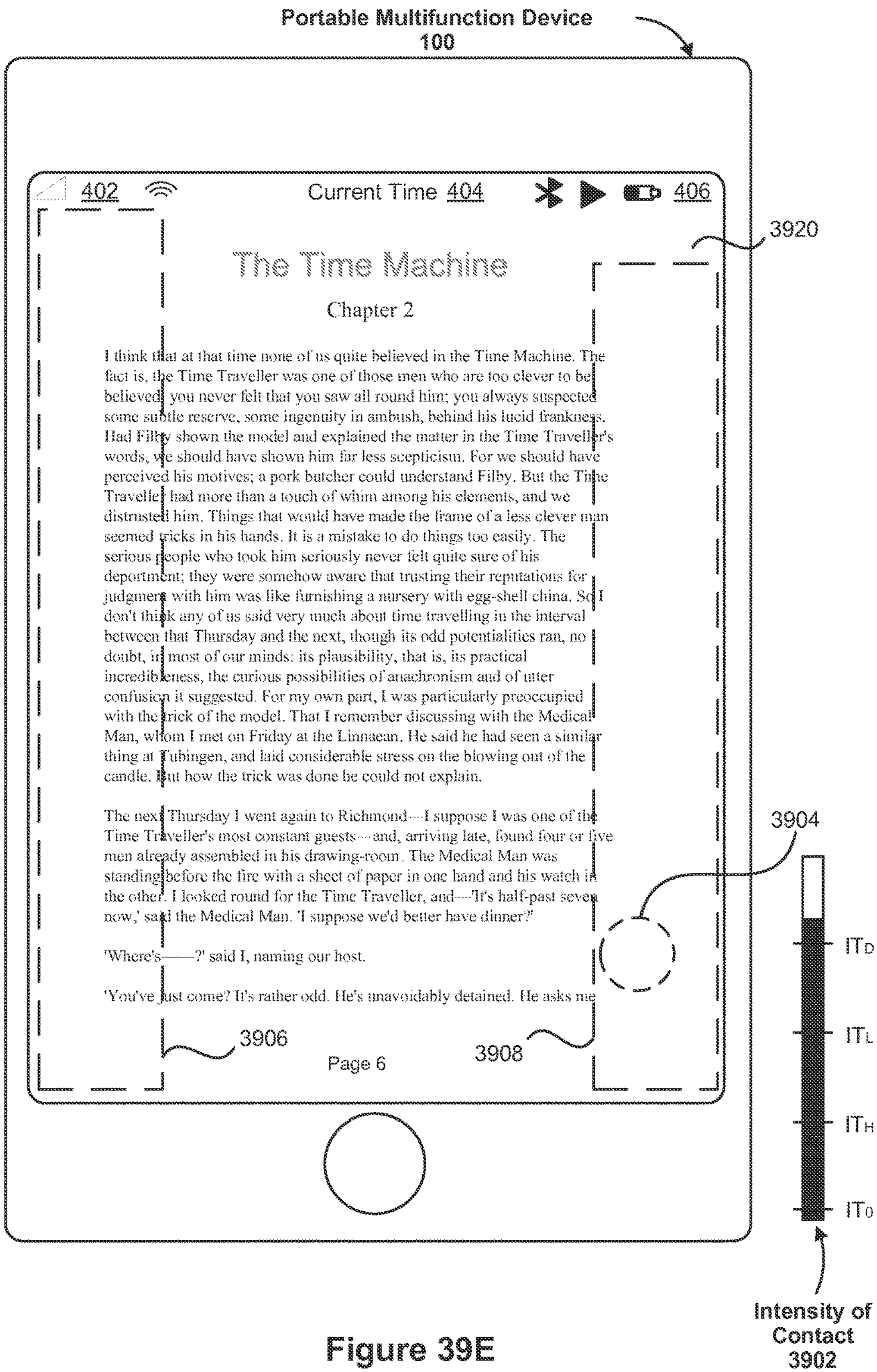

FIG. 39E illustrates a user interface that displays a beginning page 3920 of a section (Chapter 2) that is sequentially adjacent to (e.g., immediately following) the section (Chapter 1) shown in FIGS. 39A-39D, in accordance with some embodiments. In accordance with a determination that the contact at the location within region 3908 indicated by focus selector 3904 exceeded a second respective threshold intensity (e.g., the "deep" press intensity threshold $IT_D$), as indicated by intensity meter 3902 of FIG. 39E, beginning page 3920 of Chapter 2 is shown (and the page 3910, and the later pages 3912-3920 (or respective portions thereof) in the same section are removed from the user interface). In some embodiments, beginning page 3920 continues to be shown when the characteristic intensity of the contact decreases below $IT_D$. In other words, FIGS. 39C-39E illustrate that, when a press input is detected on the right edge of a currently displayed page (e.g., Page 1) in a current section (e.g., Chapter 1), in response to detecting a first increase in contact intensity of the press input above a first respective threshold, an indication of the quantity of the remaining pages in the current section is displayed (and, optionally some content of the remaining pages are shown), and in response to detecting a second increase in contact intensity of the press input above a second respective threshold, the device directly jumps over the remaining pages in the current section, and displays a page (e.g., Page 1) of the next section (e.g., Chapter 2).

Figure 39F:
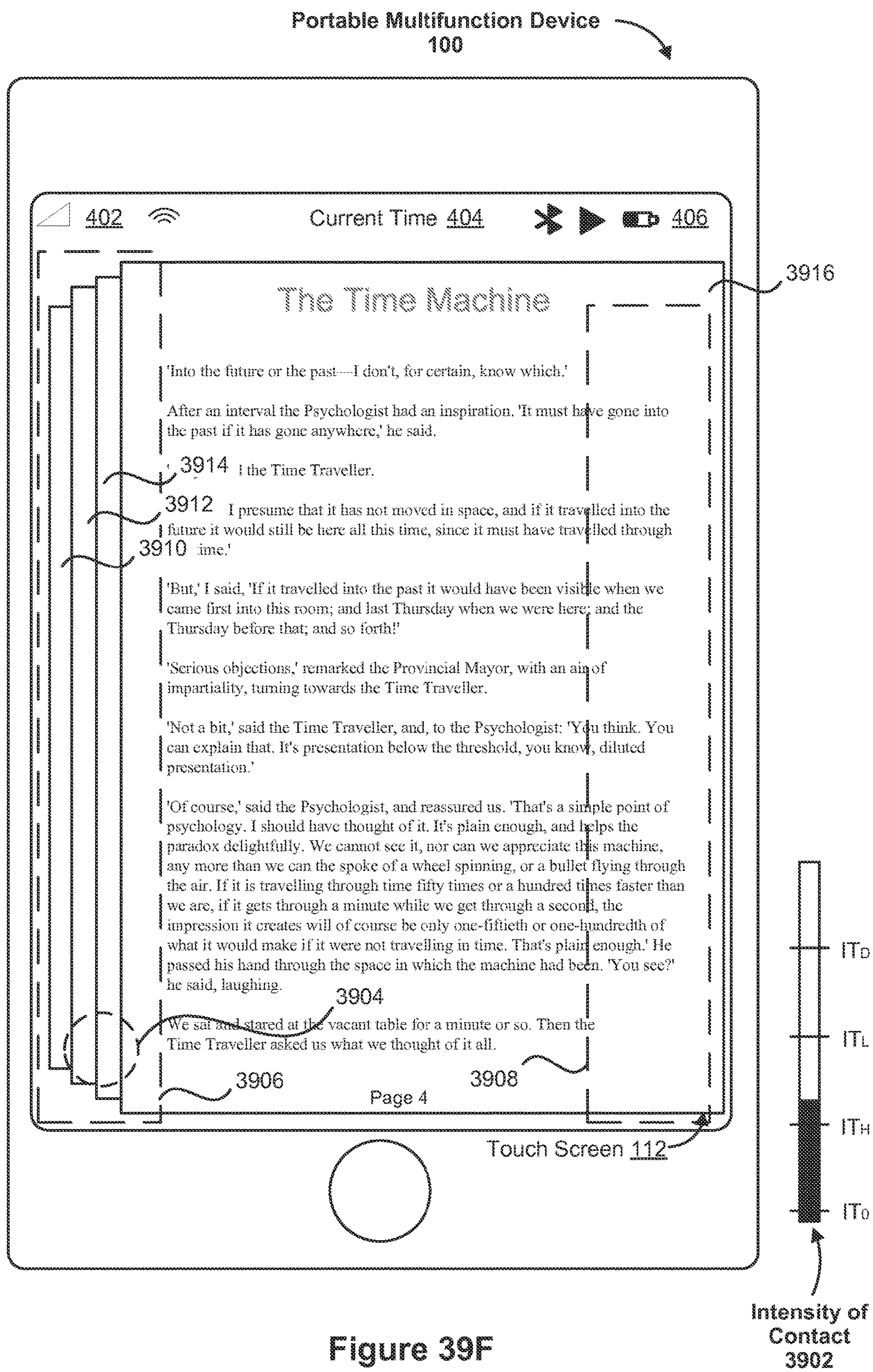

FIG. 39F illustrates a user interface that displays an indication of a quantity of pages within a sequence of prior pages in the first section, in accordance with some embodiments. When a contact at a location indicated by focus selector 3904 within left-side region 3906 of page 3916 exceeds a respective threshold intensity (e.g., $IT_L$), an indication of a quantity of pages within the sequence of pages prior to page 3916 (e.g., pages 3910-3914) in the current section (e.g., Chapter 1) is shown.

Figure 39G:
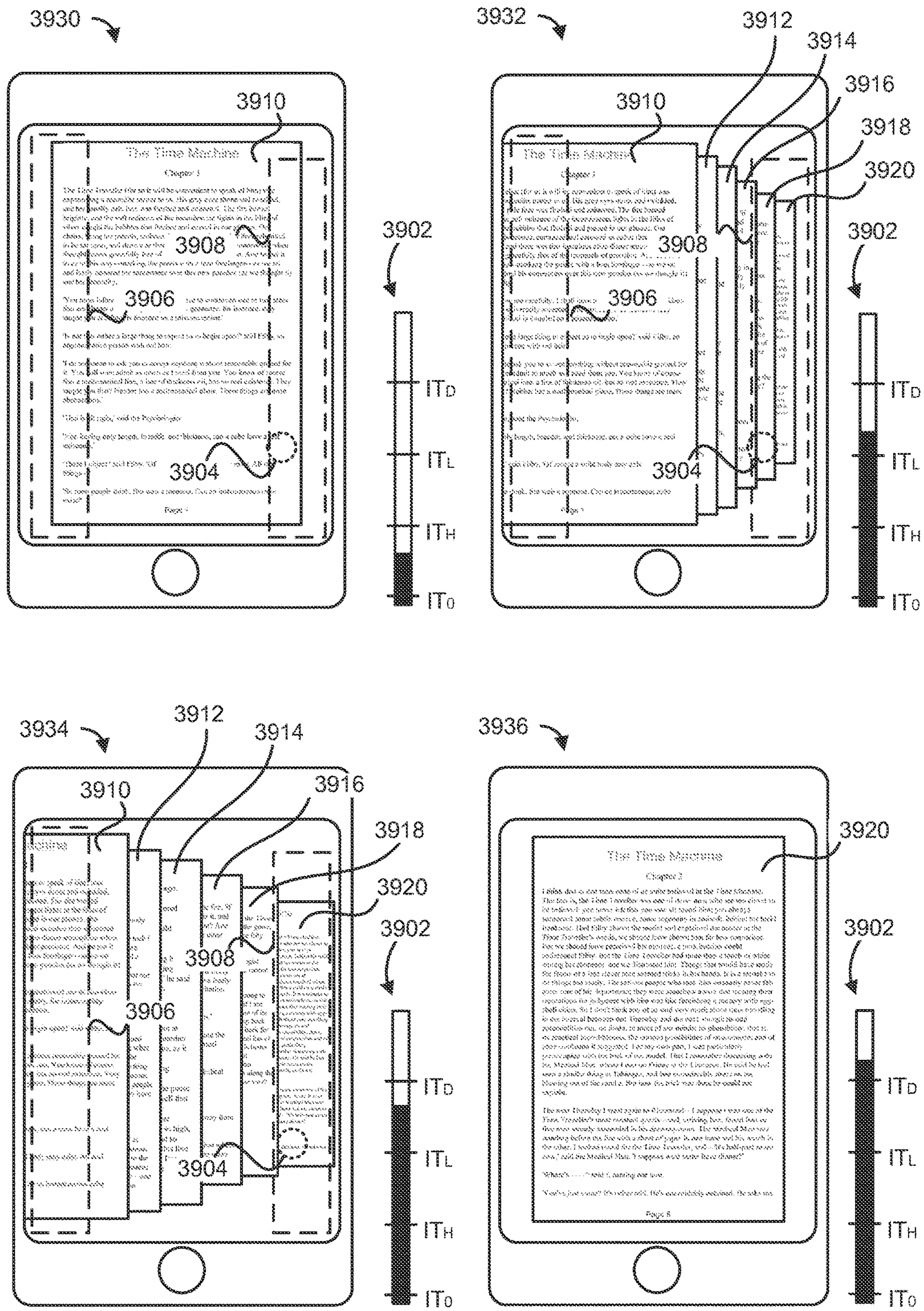

FIG. 39G illustrates a sequence of user interfaces that display a page of a section, as shown at user interface 3930, revealed page edges of a sequence of later pages, as shown at user interface 3932, revealed page edges of increased sizes, as shown at user interface 3934, and a beginning page of a later section, as shown at user interface 3936, in response to changes in a characteristic intensity of the contact/focus selector 3904, in accordance with some embodiments.

In user interface 3930, a portion (e.g., page 3910) of a section (e.g., Chapter 1) of paginated content is shown. A contact with touch screen 112 of portable multifunction device 100 is detected at a location within region 3908 indicated by focus selector 3904. As indicated by intensity meter 3902 shown adjacent to user interface 3930, the characteristic intensity of the contact is below threshold intensity $IT_L$.

In accordance with a determination that the characteristic intensity of the contact at the location indicated by focus selector 3904 exceeded a threshold intensity $IT_L$ (as shown at intensity meter 3902 adjacent to user interface 3932), edge portions of pages 3912-3920 are revealed, as shown in user interface 3932.

In some embodiments, more (or less) of the edge portions of pages 3912-3920 are dynamically revealed as the characteristic intensity of the contact at the location indicated by focus selector 3904 increases (decreases). In accordance with a determination that the characteristic intensity of the contact at the location within region 3908 indicated by focus selector 3904 continued to increase beyond intensity threshold $IT_L$ (without reaching intensity threshold $IT_D$), as shown at intensity meter 3902 adjacent to user interface 3934, the size of the revealed edges of page edges 3912-3920 increases (e.g., to a predetermined size), as shown in user interface 3934.

In accordance with a determination that the characteristic intensity of the contact at the location within region 3908 indicated by focus selector 3904 exceeded a threshold intensity $IT_D$, as shown at intensity meter 3902 adjacent to user interface 3936, the display of pages 3910-3920 are replaced with beginning page 3920 of Chapter 2, as shown at user interface 3936. In some embodiments, beginning page 3920 continues to be shown when the characteristic intensity of the contact decreases below $IT_D$ (e.g., below $IT_0$ upon lift-off of the contact).

In some embodiments, beginning page 3920 as shown in user interface 3936 is displayed in accordance with a determination that the characteristic intensity of the contact at the location within region 3908 indicated by focus selector 3904 (as shown in user interface 3934) fell below a respective threshold intensity (e.g., $IT_L$) followed, within a predetermined time, by an increase in the characteristic intensity to a level above the respective threshold intensity (e.g., $IT_L$).

Figure 39H:
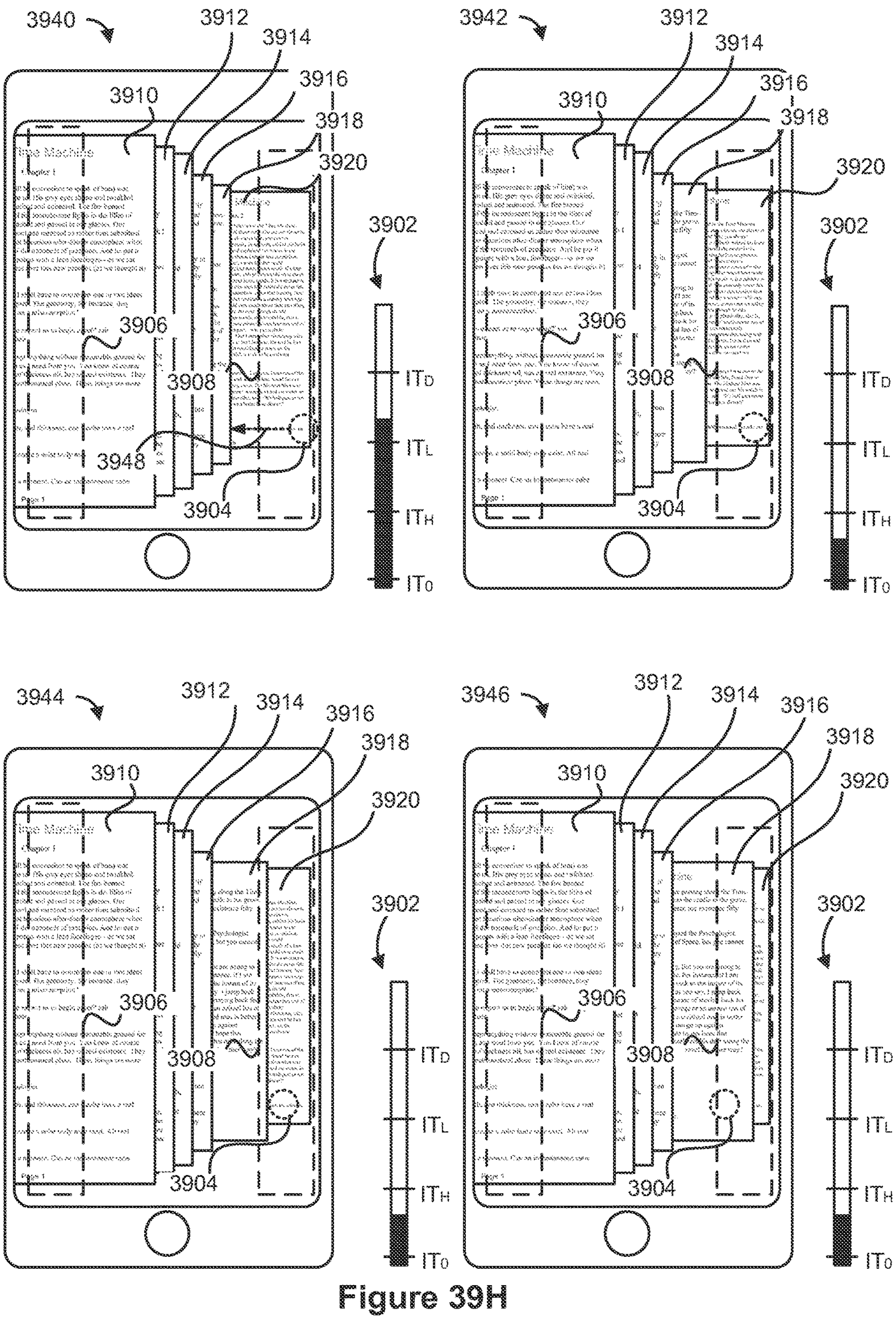

FIG. 39H includes a sequence of user interfaces 3940-3946 that illustrate dynamically enhancing (e.g., enlarging) an edge of a respective page (e.g., displaying more content on the respective page), while the contact is maintained on the touch screen 112.

User interface 3940 illustrates revealed page edges of a sequence of pages 3912-3920 that follow page 3910. For example, edges of pages 3912-3920 are revealed in accordance with a determination that the characteristic intensity of the contact at the location within region 3908 indicated by focus selector 3904 exceeded a respective threshold intensity $IT_L$, as shown at intensity meter 3902 adjacent to user interface 3940.

When portable multifunction device 100 detects a movement of focus selector 3904 (in accordance with movement of the contact) (e.g., in a direction indicated by arrow 3948), as shown in user interfaces 3940-3946, edges of different pages from pages 3912-3920 are selectively enhanced (e.g., enlarged) to show more content on the enhanced pages. In various embodiments, the intensity of the contact is maintained (e.g., above $IT_L$) or reduced (e.g., below $IT_L$, as indicated at intensity meter 3902 adjacent to user interfaces 3942-3946) as the movement of focus selector 3904 occurs.

User interfaces 3942 illustrates that, as focus selector 3904 towards the edge of page 3918 (e.g., by a respective threshold distance), page 3918 is shifted toward focus selector 3904, while other pages on the user interface remained stationary. As a result, more of page 3918 becomes visible on the user interface (e.g., more content of page 3918 is shown on the user interface) (e.g., as shown in user interfaces 3944 and 3946). As movement of focus selector (in accordance with movement of the contact) continues (e.g., in the direction indicated by arrow 3948), enhancement of the page immediately preceding page 3918 (e.g., page 3916) is triggered (not shown in FIG. 39H), and page 3916 is shifted toward focus selector 3904. As page 3916 is shifted toward focus selector 3904, other pages on the user interface remain stationary, such that more of page 3916 becomes visible on the user interface (e.g., more content of page 3916) is shown on the user interface).

In some embodiments, analogous behaviors can be implemented when the focus selector is initially detected on the left edge of a currently displayed page. After a sequence of prior pages preceding the currently displayed page are presented in response to an increase in intensity of the contact, movement of the focus selector (in accordance with movement of the contact) toward the right, causes edges of the prior pages to be enhanced (e.g., to be moved leftward toward the contact) one page at a time, such that the user can get a better glimpse of the content of the prior page one page at a time while the edge of the page is enhanced.

Figure 39I:
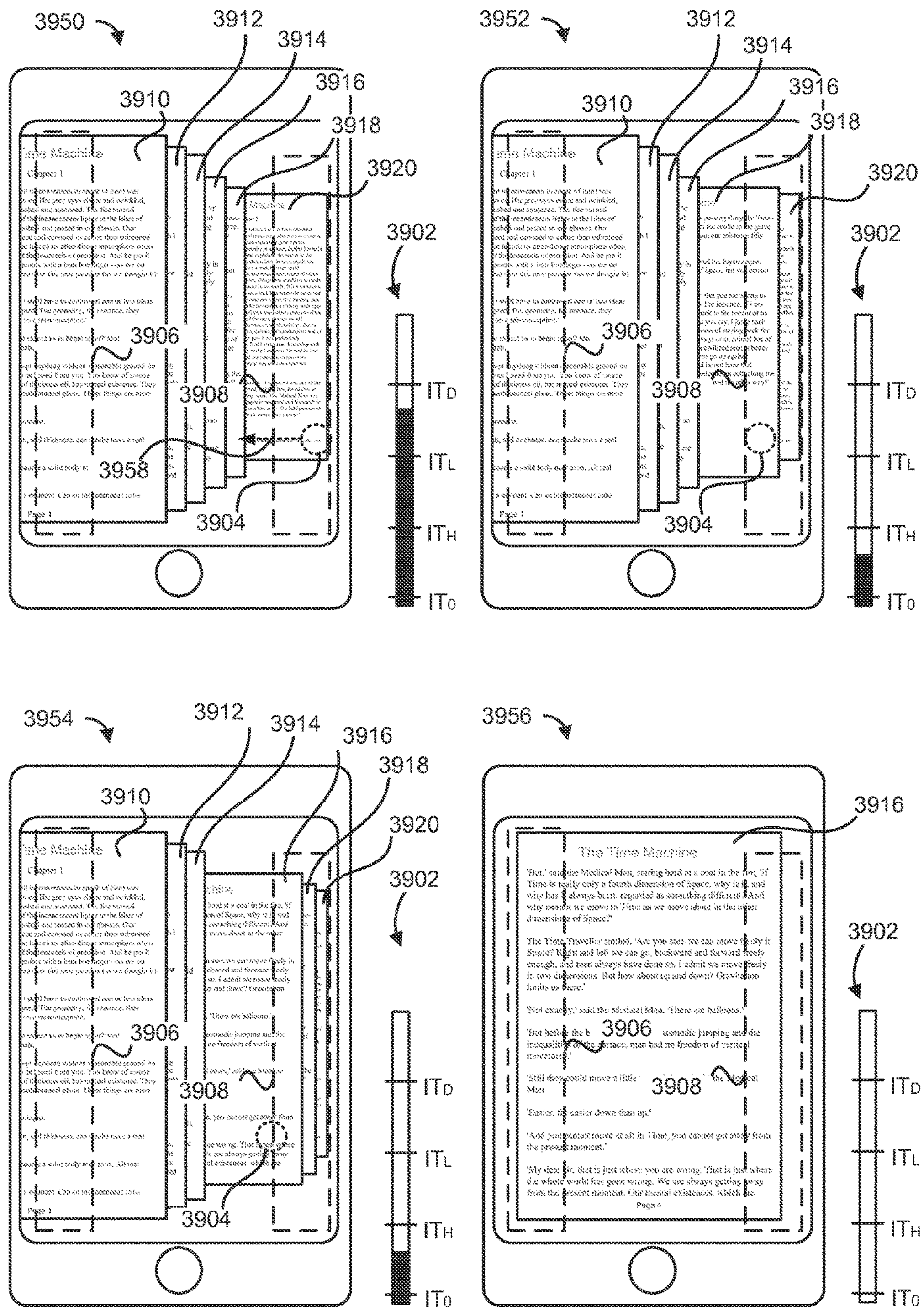

FIG. 39I includes a sequence of user interfaces 3950-3956 that illustrate dynamically enhancing (e.g., enlarging) an edge of a respective page (e.g., displaying more content on the respective page), while the contact is maintained on the touch screen 112, and selectively jump to the respective page upon lift-off of the contact.

User interface 3950 illustrates revealed page edges of a sequence of later pages 3912-3920 that follow a page 3910. For example, edges of pages 3912-3920 are revealed in accordance with a determination that the characteristic intensity of the contact at the location within region 3908 indicated by focus selector 3904 exceeded a threshold intensity $IT_L$, as shown at intensity meter 3902 adjacent to user interface 3950.

Portable multifunction device 100 detects a movement of focus selector 3904 (e.g., in a direction indicated by arrow 3958), as shown in user interfaces 3950. User interface 3952 and 3954 illustrate that page 3918 is being dynamically enhanced (e.g., exposed portion of the page is increased) as focus selector 3904 moves toward the edge of page 3918. User interface 3954 illustrates that page 3916 moves toward focus selector 3904 and eventually reaches a location under focus selector 3904. While focus selector 3904 is over the edge of page 3916, as shown in user interface 3954, lift-off of the contact from touch screen 112 occurs, as indicated by intensity meter 3902 adjacent to user interface 3956. In response to lift-off of the contact from touch screen 112 while focus selector 3904 is over the edge of page 3916, the user interface ceases to display page 3910 and edge portions of pages 3912-3920, and the user interface displays page 3916, as shown in user interface 3956.

Figure 39J:
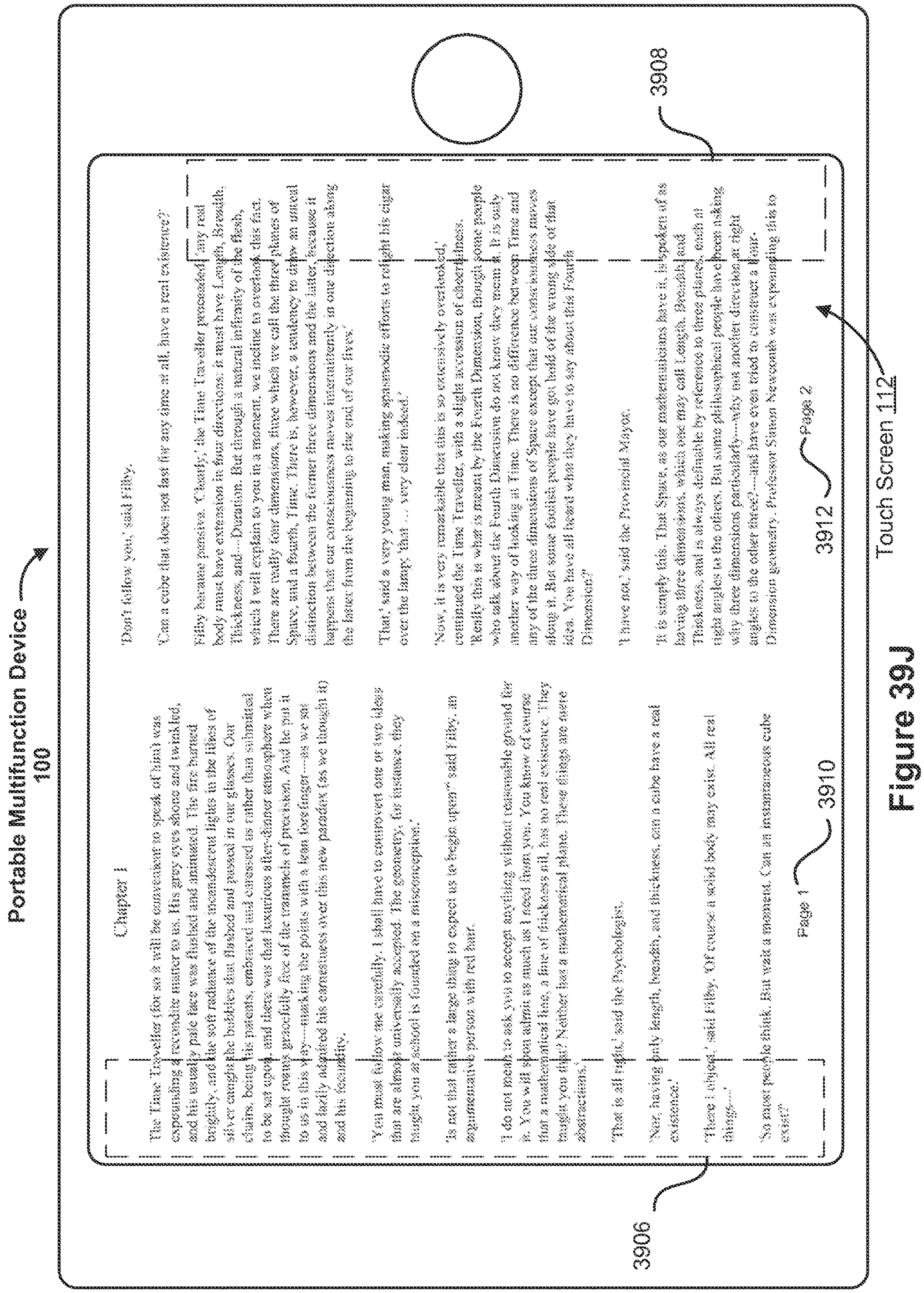

FIG. 39J illustrates a user interface that displays two adjacent pages (e.g., pages 3910 and 3912) of paginated content in a book-reading mode, in accordance with some embodiments. The user interface includes a left-side predefined region 3906 (shown over page 3910) and a right-side predefined region 3908 (shown over page 3912).

Figure 39K:
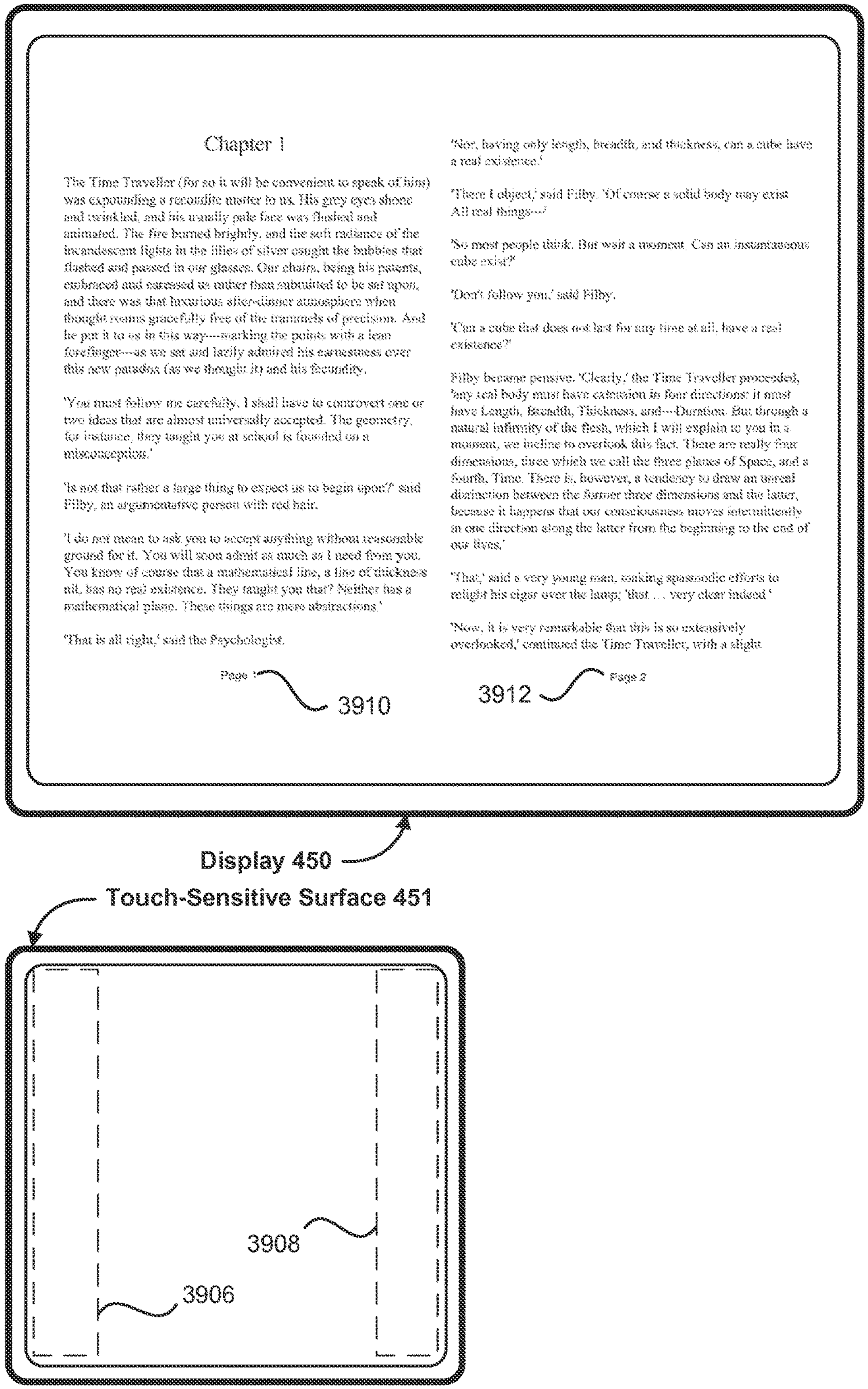
Figure 39L:
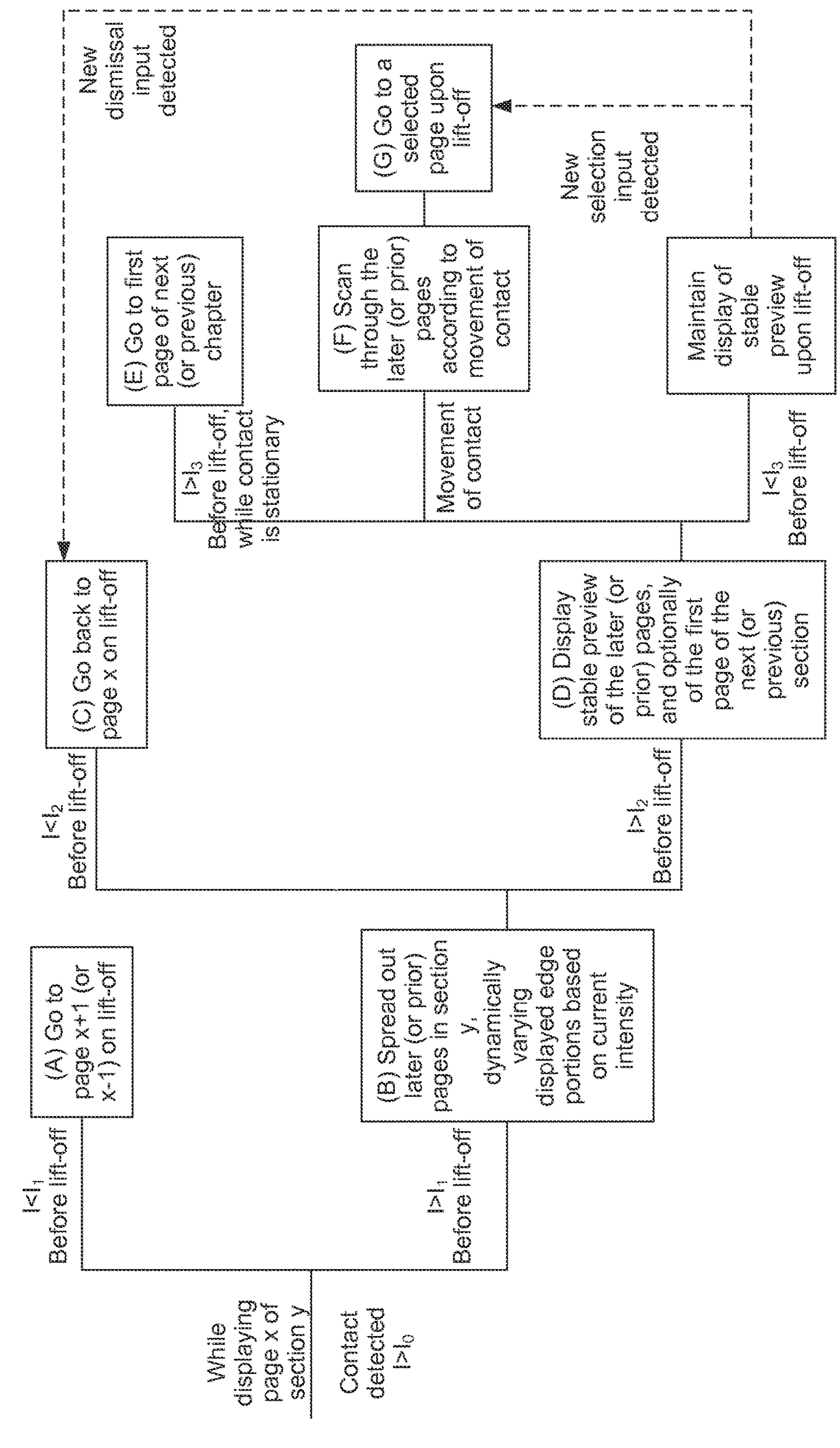
FIG. 39L illustrates an exemplary flow diagram indicating operations that occur in response to received input (or portion(s) thereof) that meet various content navigation criteria, in accordance with some embodiments.

FIG. 39K illustrates a user interface displayed on a display 450 that is separate from a touch-sensitive surface 451. Pages (e.g., pages 3910 and 3912) from paginated content (e.g., an electronic book) are displayed on display 450. In some embodiments, a single page (e.g., page 3910) is displayed on display 450. Touch sensitive surface 451 includes a left-side predefined region 3906 (e.g., corresponding to a left edge of page 3910) and a right-side predefined region 3908 (e.g., corresponding to a right edge of page 3912). In some embodiments, input received in region 3906 and region 3908 of touch sensitive surface 451 results in operations corresponding to the operations resulting from input received in region 3906 and 3908, respectively, of touch sensitive screen 112, as described above with regard to FIGS. 39A-39I.

FIG. 39L illustrates a flow diagram indicating operations that occur in response to received an input that meets various content navigation criteria, in accordance with some embodiments. In FIG. 39L, I indicates a characteristic intensity of a contact that corresponds to a focus selection on the display. In some embodiments, $I_0$, $I_1$, $I_2$, and $I_3$ of FIG. 39L correspond to $IT_0$, $IT_H$, $IT_L$, and $IT_D$ as indicated at intensity meter 39002 in FIGS. 39A-39K, respectively.

In some embodiments, while the device is displaying page x of section y of paginated content, the input is received (e.g., the contact is detected, and the characteristic intensity of the contact $I>I_0$).

(A) If lift-off of the contact is detected before the characteristic intensity of the contact ever increased above a first intensity threshold $I_1$ (e.g., $I<I_1$, before lift-off), the device ceases to display the currently displayed page (e.g., page x), and displays the next page (e.g., page x+1) (or the previous page (e.g., x−1), e.g., depending on whether the location of the contact is on the right edge of the currently displayed page, or the left edge of the currently displayed page) in the user interface. This is illustrated in FIGS. 39A-39B, for example.

(B) Alternatively, if lift-off of the contact is not yet detected, and the characteristic intensity of the contact increases above the first intensity threshold $I_1$ (e.g., $I>I_1$, before lift-off), a sequence of later pages (or a sequence of prior pages, e.g., depending on whether the location of the contact is on the right edge of the currently displayed page, or the left edge of the currently displayed page) in the current section (e.g., section y) are presented in the user interface. In some embodiments, the edges of the sequence of later pages (or the sequence of prior pages) are spread out dynamically (e.g., spread out by a larger or smaller amount) in accordance with the current characteristic intensity of the contact above $I_1$. This is illustrated in FIGS. 39C and 39F, for example.

(C) If lift-off of the contact is detected after reaching $I_1$, but before it reaches above a second intensity threshold $I_2$ (e.g., $I<I_2$, before lift-off), the device ceases to display the edges of the sequence of later pages (or the sequence of prior pages), and restores the display of page x in the user interface, upon lift-off of the contact.

(D) Alternatively, if lift-off of the contact is not yet detected, and the characteristic intensity of the contact increases above the second intensity threshold $I_2$ (e.g., $I>I_2$, before lift-off), a stable preview of the sequence of later pages (or the sequence of prior pages) is displayed (and, optionally, content of a respective one of the sequence of later pages or prior pages is enlarged for the user to preview). In addition, the stable preview optionally shows a preview of the content of first page of the next (or previous) section (e.g., page 3920 in FIG. 39D is the first page of Chapter 2).

(E) If lift-off of the contact is not yet detected, and the characteristic intensity of the contact increases above a third intensity threshold $I_3$ (e.g., $I>I_3$, before lift-off) while the contact is substantially stationary, the stable preview of the sequence of later pages (or the sequence of prior pages) is removed, and the device displays the first page of the next section (e.g., section y+1) (or the first page of the previous section (e.g., section y−1)) in the user interface. In other words, the devices "pops" into the next section (or the previous section), skipping the pages in between. This is illustrated in FIG. 39E, for example. This is also illustrated in the flow shown in FIG. 39G, for example.

(F) If lift-off of the contact is not yet detected, and movement of the contact is detected, the device scans through the sequence of the later pages (or the sequence of prior pages) to present more content of each of the pages in accordance the movement of the contact. This is illustrated in FIG. 39H, for example.

(G) If lift-off is detected while the contact (focus selector) is over a respective page in the sequence of later pages (or the sequence of prior pages) during the scanning of the pages in (F), the device ceases to display the stable preview of the sequence of later pages (or the sequence of prior pages), and displays the page that is currently under the contact (focus selector) in the user interface. In other words, the device "pops" into the selected page in the current section, upon lift-off of the contact. This is illustrated in FIG. 39I, for example.

(H) If lift-off is detected before the characteristic intensity of the contact ever increased above the third intensity threshold $I_3$ (e.g., $I<I_3$, before lift-off), the device maintains the stable preview of the sequence of later pages (or the sequence of prior pages) in the user interface, upon lift-off of the contact. When a subsequent input is detected, if the subsequent input is a selection input (e.g., a tap input) on one of the pages depicted in the preview, the device ceases to display the preview and displays the selected page in the user interface; if the subsequent input is a dismissal input (e.g., a swipe input or a tap input outside of the preview), the preview is removed, and the device restores the originally displayed page x in the user interface.

It should be noted that, the process flow in FIG. 39L is merely illustrative, and no all of the criteria and/or responses need to be implemented in any particular embodiment.

FIGS. 40A-40E are flow diagrams illustrating a method 4000 of navigating paginated content in accordance with some embodiments. The method 4000 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 4000 are, optionally, combined and/or the order of some operations is, optionally, changed.

As described below, the method 4000 provides an intuitive way to improve efficiency and ease of navigating paginated content. The method reduces the cognitive burden on a user when navigating paginated content, thereby creating a more efficient human-machine interface. For battery-operated electronic devices, enabling a user to locate and navigated to desired portions in paginated content faster and more efficiently conserves power and increases the time between battery charges.

The device displays (4002), on the display, a first portion of paginated content (e.g., a currently displayed page or pages, such as one page in a single page mode (e.g., page 3910 in FIG. 39A) or two adjacent pages in a book-reading mode) in a user interface. In some embodiments, the paginated content is an electronic book. In some embodiments, the electronic book is paginated in accordance with a printed original. In some embodiments, the electronic book is formatted and divided into pages according to specified display font size, screen size, and resolution. The paginated content includes a plurality of sections (e.g., chapters in a book or sections in a paginated webpage), a respective section in the plurality of sections includes a respective plurality of pages, the first portion of the paginated content is part of a first section of the plurality of sections, and the first portion of the paginated content lies between a sequence of prior pages in the first section (e.g., a set of one or more pages that precede the currently displayed page(s) in the current chapter) and a sequence of later pages in the first section (e.g., a set of one or more pages that succeed the currently displayed page(s) in the current chapter).

While a focus selector is within a first predefined region (e.g., region 3908 in FIG. 39A) of the displayed first portion of the paginated content on the display (e.g., right edge or left edge of the page, or top edge or bottom edge of the page, depending on the page layout orientation), the device detect (4004) a first portion of an input, where detecting the first portion of the input includes detecting a contact (e.g., contact corresponding to focus selector 3904 in FIG. 39A) on the touch-sensitive surface.

In response to detecting the first portion of the input: in accordance with a determination that the first portion of the input meets first content-navigation criteria, where the first content-navigation criteria include a criterion that is met when the device detects a lift-off of the contact from the touch-sensitive surface before a characteristic intensity of the contact reaches a first threshold intensity (e.g., a tap or swipe gesture that does not reach a light press threshold intensity before lift-off of the contact in the tap or swipe gesture occurs), the device replaces (4006) the displayed first portion of the paginated content with a second portion of the paginated content (e.g., page 3912 in FIG. 39B) on the display, wherein the second portion of the paginated content includes a page that is sequentially adjacent to (e.g., immediately follows or immediately precedes) the first portion of the paginated content (e.g., page 3910 in FIG. 39A). For example, when the user taps or swipes on the right edge of the displayed page, that page turns and the (entire) next page is displayed. For example, when the user taps or swipes on the left edge of the displayed page, that page turns and the (entire) previous page is displayed. In some embodiments, the focus selector remains within the first predefined region during a tap or a swipe gesture. In response to detecting the first portion of the input: in accordance with a determination that the first portion of the input meets second content-navigation criteria, where the second content-navigation criteria include a criterion that is met when the device detects an increase in the characteristic intensity of the contact above the first intensity threshold while the focus selector is within the first predefined region of the displayed first portion of the paginated content (e.g., as shown in FIG. 39C, I>$IT_H$, or in FIG. 39D, I>$IT_L$), the device displays an indication (e.g., a stack of page edges) of a quantity of pages (e.g., a total number of pages) within the sequence of later pages in the first section or displays an indication of a quantity of pages (e.g., a total number of pages) within the sequence of prior pages in the first section (and maintains display of at least some of the first portion of the paginated content). In some embodiments, an indication of the quantity of pages is displayed without displaying the entire content of the pages. In some embodiments, an indication of the quantity of pages is an exact number of pages. In some embodiments, an indication of the quantity of pages is an approximate number of pages. In some embodiments, when the number of later pages in the current chapter is relatively small, the user can easily tell how many pages still remain in the current chapter by looking at revealed edges of the later pages (e.g., as shown in FIG. 39C, or 39D). Similarly, in some embodiments, when the number of prior pages in the current chapter is relatively small, the user can easily tell how many prior pages are in the current chapter by looking at revealed edges of the prior pages (e.g., as shown in FIG. 39F). In some embodiments, an animation is shown to shift the displayed first portion of paginated content (e.g., to the left), to make room for displaying the edges of the later pages in the current chapter. The animation imitates the user spreading out the later (unread) pages by the edge of the book using his/her fingers.

In some embodiments, the device determines (4008) whether to display the indication of the quantity of pages within the sequence of later pages in the first section or to display the indication of the quantity of pages within the sequence of prior pages in the first section based on a location of the focus selector during the first portion of the input. For example, when a user presses above a light press threshold on the left edge of the displayed page, edges of the set of prior pages in the current chapter are revealed from behind the currently displayed page (e.g., as shown in FIG. 39F). In some embodiments, a number is displayed to indicate the total count of the prior pages in the current chapter. For example, when the user presses above a light press threshold on the right edge of the displayed page, edges of the set of later pages in the current chapter are revealed from behind the currently displayed page (e.g., as shown in FIG. 39C). In some embodiments, a number is displayed to indicate the total count of the later pages remaining in the current chapter.

In some embodiments, displaying the indication of the quantity of pages within the sequence of later pages in the first section of the paginated content includes (4010) concurrently displaying, in the user interface, a respective edge portion for a plurality of respective pages in the sequence of later pages (e.g., as shown in FIG. 39C). In some embodiments, a respective edge portion for each respective page in the sequence of later pages is displayed. Similarly, in some embodiments, displaying the indication of the quantity of pages within the sequence of prior pages in the first section of the paginated content includes displaying, in the user interface, a respective edge portion for each respective page in the sequence of prior pages. In some embodiments, a respective edge portion for each respective page in the sequence of prior pages is displayed (e.g., as shown in FIG. 39F). In some embodiments, if one or more of the pages within the sequence of later pages in the first section are associated with bookmarks, representations of the bookmarks are displayed with the revealed edge portion of the one or more pages (e.g., bookmark 3922, as shown FIG. 39D).

In some embodiments, in accordance with the determination that the first portion of the input meets the second content-navigation criteria, the device dynamically varies (4012) sizes of the respective edge portions of the sequence of later pages that are displayed in the user interface in accordance with a current intensity of the contact. For example, when the characteristic intensity of the contact varies between $IT_H$ and $IT_L$, the sizes of the edge portions of the sequence of later pages shown in FIG. 39C vary with the current value of the characteristic intensity. Similarly, in some embodiments, in accordance with the determination that the first portion of the input meets the second content-navigation criteria, the device dynamically varies sizes of the respective edge portions of the sequence of prior pages that are displayed in the user interface in accordance with a current intensity of the contact.

In some embodiments, in accordance with the determination that the first portion of the input meets the second content-navigation criteria, the device sequentially displays (4014) respective edge portions of the sequence of later pages in accordance with a current intensity of the contact. For example, as the intensity of the contact increases, the edge portions of additional pages between the current page and the end of the chapter are displayed. In some embodiments, displaying the indication of the quantity of pages between the current page and the end of the document includes sequentially displaying the appearance of a number of page edges that corresponds to the number of pages between the current page and the end of the current chapter.

In some embodiments, in accordance with the determination that the first portion of the input meets the second content-navigation criteria, the device dynamically shifts (4016) the displayed first portion of the paginated content in the user interface to make room for the displayed respective edge portions of the sequence of later pages. Similarly, in some embodiments, in accordance with the determination that the first portion of the input meets the second content-navigation criteria, the device dynamically shifts the displayed first portion of the paginated content in the user interface to make room for the displayed respective edge portions of the sequence of prior pages. For example, as shown in FIGS. 39C and 39D, page 3910 is shifted to the left to make room for pages 3912-3918.

In some embodiments, while displaying the indication of the quantity of pages within the sequence of later pages in the first section or the indication of the quantity of pages within the sequence of prior pages in the first section and at least some of the first portion of the paginated content, the device detects (4018) a second portion of the input. In accordance with a determination that the second portion of the input meets third content-navigation criteria, the device replaces display of the indication of the quantity of pages within the sequence of later pages in the first section or the indication of the quantity of pages within the sequence of prior pages in the first section and the at least some of the first portion of the paginated content with display of a third portion of the paginated content, where the third portion of the paginated content includes a beginning page of a second section that is sequentially adjacent to (e.g., immediately follows or immediately precedes) the first section (e.g., as shown in FIG. 39D, page 3920 is the first page of the next chapter that is revealed in the user interface). In one example, in response to a deep press on the left edge of the displayed page, the first page of the previous chapter is displayed. In another example, in response to a deep press on the right edge of the displayed page, the first page of the next chapter is displayed (e.g., as shown in FIGS. 39E and 39G).

In some embodiments, the third content-navigation criteria include (4020) a criterion that is met when the device detects an increase in the characteristic intensity of the contact above a second intensity threshold (e.g., a deep press threshold) that is higher than the first intensity threshold (e.g., the light press threshold). In some embodiments, the third content-navigation criteria require detecting the increase in the characteristic intensity of the contact above the second intensity threshold while the focus selector is within the first predefined region of the displayed first portion of the paginated content on the display. In some embodiments, a swipe gesture with a characteristic intensity below an intensity threshold (e.g., below a deep press threshold) navigates through the content one page at a time, whereas a swipe gesture with a characteristic intensity above an intensity threshold (e.g., above a deep press threshold) navigates through the content by more than one page at a time (e.g., by one chapter or section at a time).

In some embodiments, the third content-navigation criteria include (4022) a criterion that is met when the device detects a decrease in the characteristic intensity of the contact below the first intensity threshold (e.g., the light press threshold) followed, within a predetermined time, by an increase in the characteristic intensity of the contact to a third intensity threshold that is above the first intensity threshold. For example, in some embodiments, after a light press displays the indication of the quantity of pages within the sequence of later pages in the first section or the indication of the quantity of pages within the sequence of prior pages in the first section (e.g., edges of prior pages or edges of later pages, respectively) and at least some of the first portion of the paginated content, a reduction in intensity followed, within a predetermined time, by an increase in intensity to a third intensity threshold results in display of the first page of the next chapter (e.g., if the focus selector is on the right edge of the displayed page) or results in display of the first page of the previous chapter (e.g., if the focus selector is on the left edge of the displayed page). In some embodiments, the third intensity threshold is below the second intensity threshold. In some embodiments, the third intensity threshold is the same as the second intensity threshold. In some embodiments, the third content-navigation criteria require detecting an increase in the characteristic intensity of the contact at or above the third intensity threshold while the focus selector is within the first predefined region of the displayed first portion of the paginated content on the display. In some embodiments, the criterion based on the second intensity threshold and the criterion based on the third intensity threshold are alternative criterions, and an input meeting either one of the two criteria is sufficient to meet the third content-navigation criteria.

In some embodiments, while displaying the indication of the quantity of pages within the sequence of later pages in the first section or the indication of the quantity of pages within the sequence of prior pages in the first section and at least some of the first portion of the paginated content, the device detects (4024) a second portion of the input. In accordance with a determination that the second portion of the input meets fourth content-navigation criteria, where the fourth content-navigation criteria include a criterion that is met when the device detects a decrease in the characteristic intensity of the contact below the first intensity threshold followed by a lift off of the contact: the device ceases to display the indication of the quantity of pages within the sequence of later pages in the first section or ceasing to display the indication of the quantity of pages within the sequence of prior pages in the first section, and restores the display of the first portion of the paginated content in the user interface on the display to its appearance just prior to detecting the first portion of the input. In some embodiments, the fourth content-navigation criteria require detecting the decrease in the characteristic intensity of the contact below the first intensity threshold followed by a lift off of the contact while the focus selector is within the first predefined region of the displayed first portion of the paginated content on the display.

In some embodiments, while displaying respective edge portions of later pages that indicate the quantity of pages within the sequence of later pages in the first section or respective edge portions of prior pages that indicate the quantity of pages within the sequence of prior pages in the first section and at least some of the first portion of the paginated content, the device detects (4026) a second portion of the input. In accordance with a determination that the second portion of the input meets fifth content-navigation criteria, where the fifth content-navigation criteria include a criterion that is met when the device detects a movement of the focus selector on the display, the device dynamically enhances (e.g., magnifying, enlarging, highlighting, lifting up, or otherwise visually distinguishing) a respective edge portion. This is illustrated in FIG. 39H, for example. In some embodiments, dynamically enhancing a given edge portion requires detecting an increase in intensity of the contact in the second portion of the input (e.g., detecting a light press input). In some embodiments, the amount of the content of the page that corresponds to the given edge portion that is displayed is determined based on the intensity of the contact (e.g., as the intensity of the contact progressively increases, the amount of content of the page that corresponds to the given edge portion is progressively increased, and similarly decreased as the intensity of the contact decreases).

In some embodiments, dynamically enhancing the respective edge portion occurs (4028) while the focus selector is over the respective edge portion. For example, as the focus selector moves over displayed edge portions of each of the later pages, the displayed edge portion of that later page is enlarged to show more of its content or its content is shown more prominently as compared to the other later pages in the current chapter. In some embodiments, dynamically enhancing a given edge portion requires detecting an increase in intensity of the contact in the second portion of the input (e.g., detecting a light press input) while the focus selector is over the given edge portion.

In some embodiments, when the focus selector moves by a predetermined amount, the dynamically enhanced respective edge portion is (4030) moved to under the focus selector. In some embodiments, an animation is shown to move the respective edge portion to under the focus selector (e.g., the finger contact). This is illustrated in FIG. 39H, for example.

In some embodiments, after detecting the second portion of the input, the device detects (4032) a third portion of the input while the focus selector is on an edge portion of a second page in the first section. In accordance with a determination that the third portion of the input meets sixth content-navigation criteria: the device ceases (4032) to display the respective edge portions and the first portion of the paginated content and displays a third portion of the paginated content on the display, where the third portion of the paginated content includes the second page in the first section. This is illustrated in FIG. 39I, for example.

In some embodiments, the sixth content-navigation criteria include (4034) a criterion that is met when the device detects an increase in the characteristic intensity of the contact above the second intensity threshold (e.g., the deep press threshold) (during the third portion of the input, while the focus selector is on the edge portion of the second page in the first section).

In some embodiments, the sixth content-navigation criteria include (4036) a criterion that is met when the device detects a decrease in the characteristic intensity threshold below the first intensity threshold followed, within a predetermined time, by an increase in the characteristic intensity to a third intensity threshold that is above the first intensity threshold (during the third portion of the input, while the focus selector is on the edge portion of the second page in the first section). In some embodiments, the criterion based on the second intensity threshold and the criterion based on the first intensity threshold are alternative criterions, and an input meeting either one of the two criteria is sufficient to meet the sixth content-navigation criteria.

In some embodiments, the sixth content-navigation criteria include (4038) a criterion that is met when the device detects a lift off of the contact in the input from the touch-sensitive surface (during the third portion of the input, while the focus selector is on the edge portion of the second page in the first section). This is illustrated in FIG. 39I, for example.

It should be understood that the particular order in which the operations in FIGS. 40A-40E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 4000 described above with respect to FIGS. 40A-40E. For brevity, these details are not repeated here.

In accordance with some embodiments, FIG. 41 shows a functional block diagram of an electronic device 4100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 41 are, optionally, combined or separated into sub-blocks to implement the principles of the various described embodiments. Therefore, the description herein optionally supports any possible combination or separation or further definition of the functional blocks described herein.

As shown in FIG. 41, an electronic device includes a display unit 4102 configured to display content items; a touch-sensitive surface unit 4104 configured to receive user inputs; one or more sensor units 4106 configured to detect intensity of contacts with the touch-sensitive surface unit 4104; and a processing unit 4108 coupled to the display unit 4102, the touch-sensitive surface unit 4104 and the one or more sensor units 4106. In some embodiments, the processing unit 4108 includes a display enabling unit 4110, a detecting unit 4112, and a determining unit 4114.

In some embodiments, the processing unit 4108 is configured to: enable display (e.g., with the display enabling unit 4110), on the display unit, of a first portion of paginated content in a user interface, where: the paginated content includes a plurality of sections; a respective section in the plurality of sections includes a respective plurality of pages; the first portion of the paginated content is part of a first section of the plurality of sections; and the first portion of the paginated content lies between a sequence of prior pages in the first section and a sequence of later pages in the first section; while a focus selector is within a first predefined region of the displayed first portion of the paginated content on the display, detect (e.g., with detecting unit 4112) a first portion of an input, where detecting the first portion of the input includes detecting a contact on the touch-sensitive surface; in response to detecting the first portion of the input: in accordance with a determination (e.g., with determining unit 4114) that the first portion of the input meets first content-navigation criteria, wherein the first content-navigation criteria include a criterion that is met when the device detects a lift-off of the contact from the touch-sensitive surface before a characteristic intensity of the contact reaches a first threshold intensity, replace the displayed first portion of the paginated content with a second portion of the paginated content on the display, wherein the second portion of the paginated content includes a page that is sequentially adjacent to the first portion of the paginated content; and, in accordance with a determination (e.g., with determining unit 4114) that the first portion of the input meets second content-navigation criteria, wherein the second content-navigation criteria include a criterion that is met when the device detects an increase in the characteristic intensity of the contact above the first intensity threshold while the focus selector is within the first predefined region of the displayed first portion of the paginated content, enable display (e.g., with display enabling unit 4110) of an indication of a quantity of pages within the sequence of later pages in the first section or enable display (e.g., with display enabling unit 4110) of an indication of a quantity of pages within the sequence of prior pages in the first section.

The operations in the information processing methods described above are, optionally implemented by running one or more functional modules in information processing apparatus such as general purpose processors (e.g., as described above with respect to FIGS. 1A and 3) or application specific chips.

Many electronic devices have graphical user interfaces that display a map at various zoom levels. For example, a map view including multiple points of interest can be displayed and the zoom level of the map can be increased to show contextual information for a particular point of interest. As noted above, there is a need for electronic devices with improved methods and interfaces for displaying contextual information associated with a point of interest in a map. In the embodiments described below, a map is zoomed to show contextual information for a point of interest in response to input including an intensity component. The map view is maintained at the zoomed level or redisplayed at a previous zoom level depending on whether the input intensity reaches a threshold intensity level. The approach described in the embodiments below allows a user to display a map at a desired zoom level using input with an intensity component. Giving a user the ability to provide input with or without an intensity component allows additional functionality to be associated with the input.

Figure 42A:
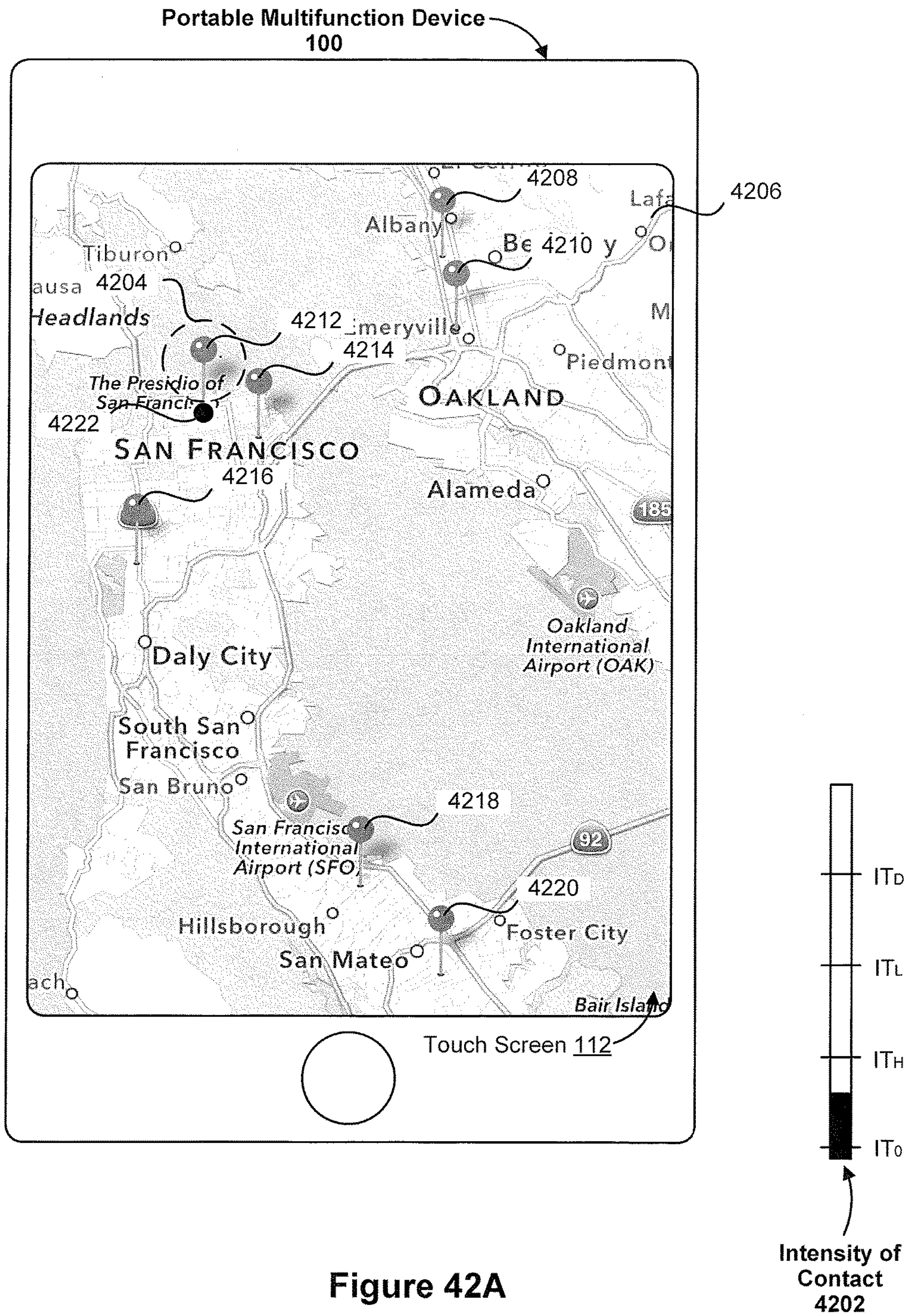
FIGS. 42A-42N illustrate exemplary user interfaces for displaying contextual information associated with a point of interest in a map in accordance with some embodiments.
Figure 42B:
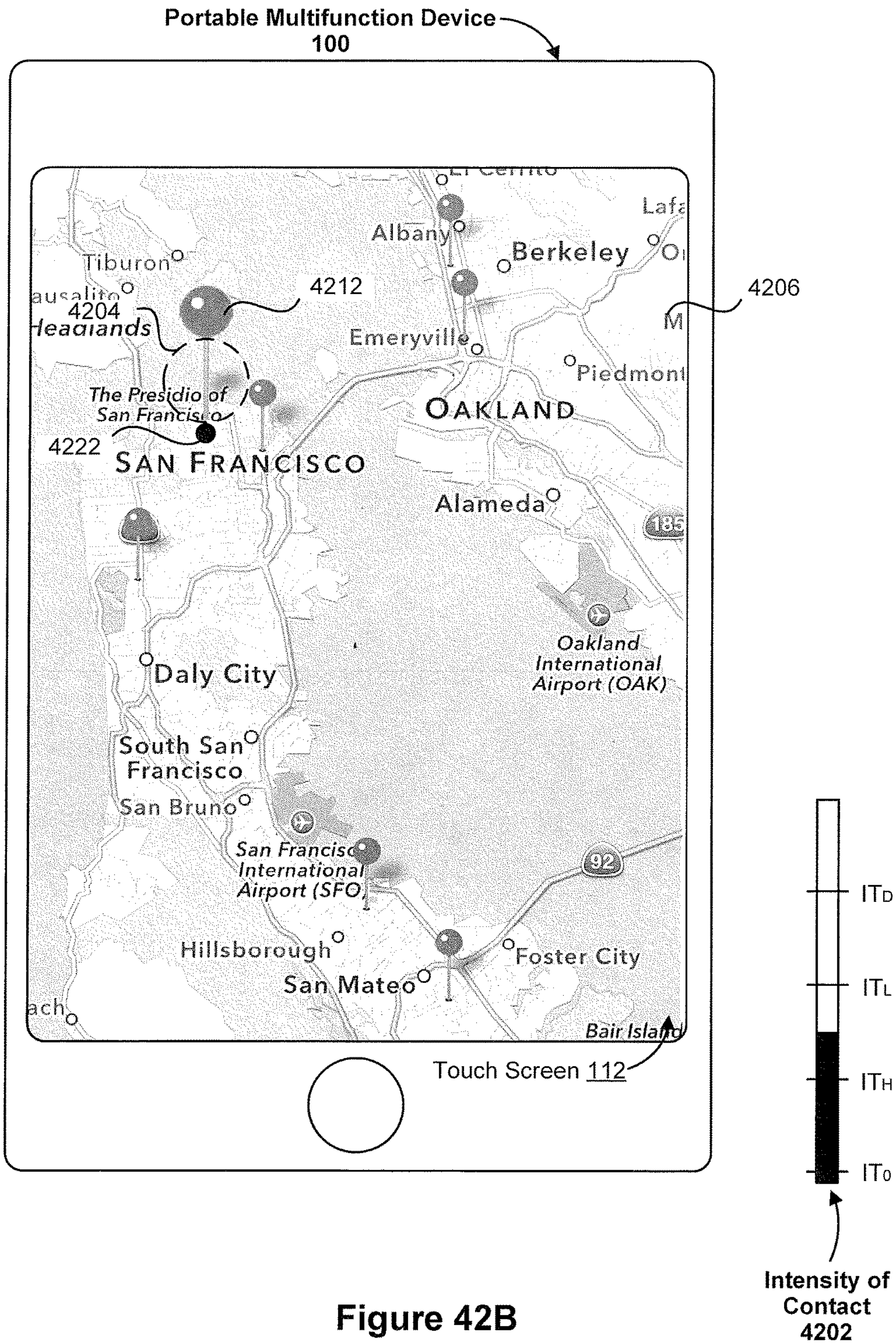
Figure 42C:
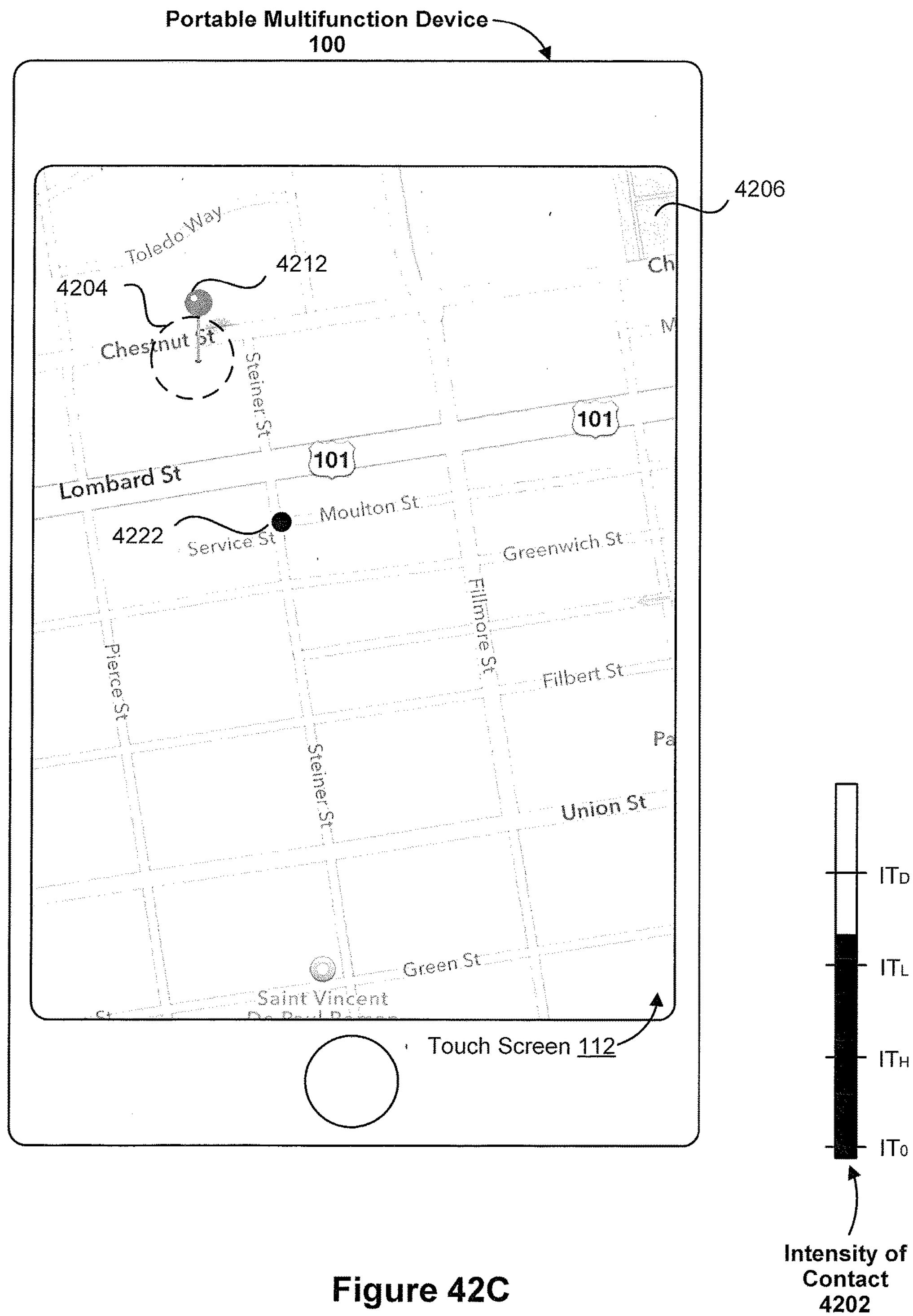
Figure 42D:
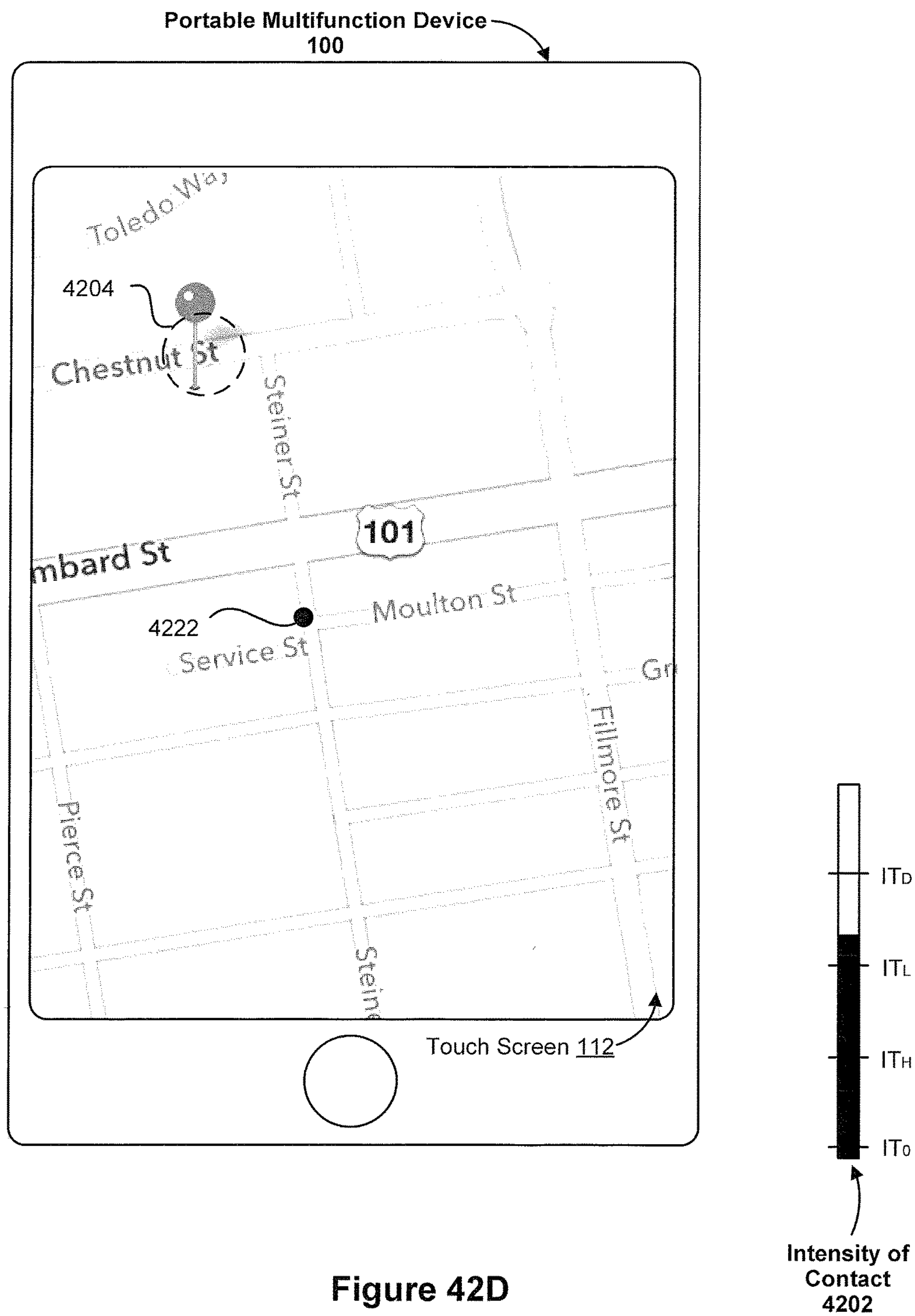
Figure 42E:
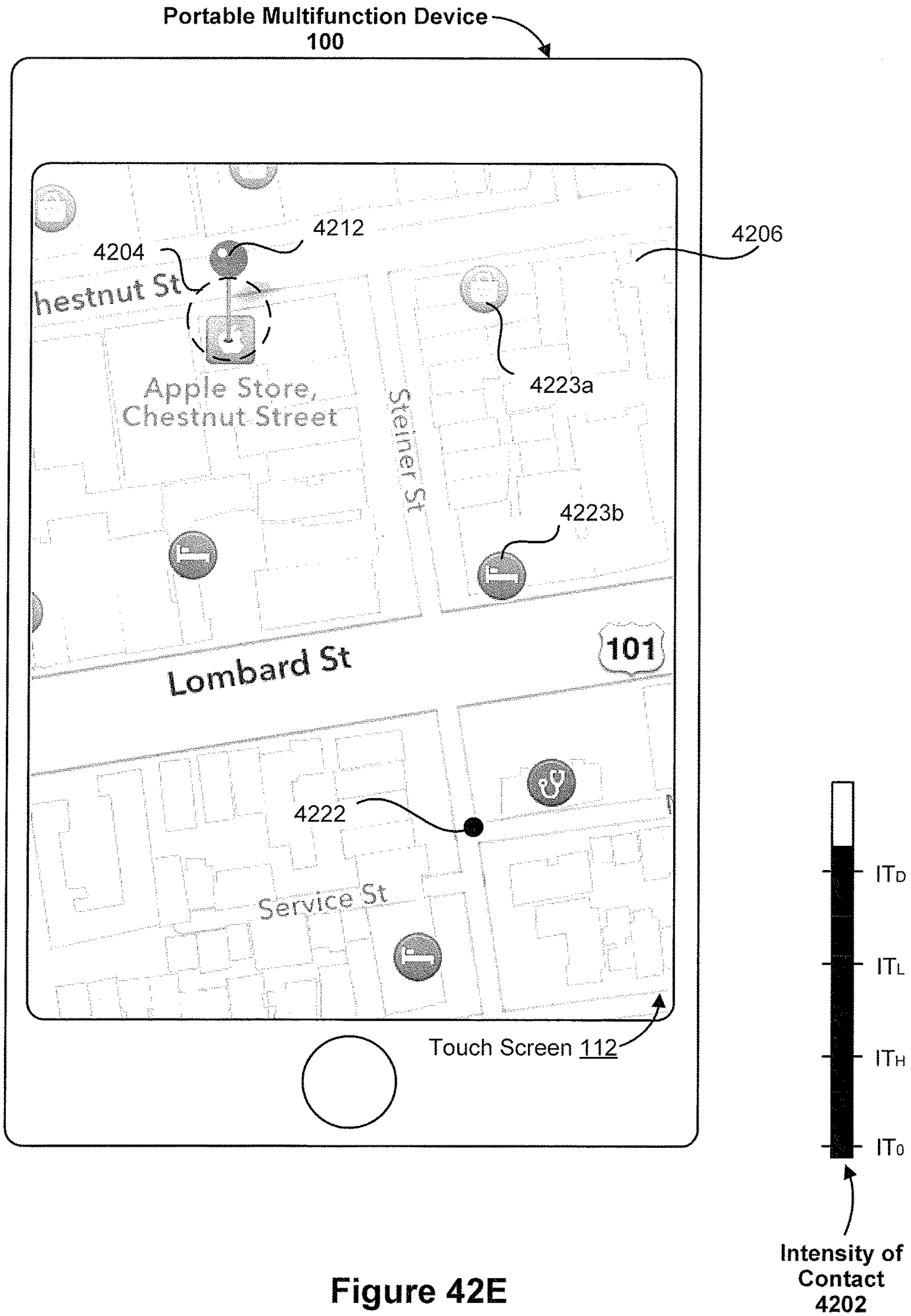
Figure 42F:
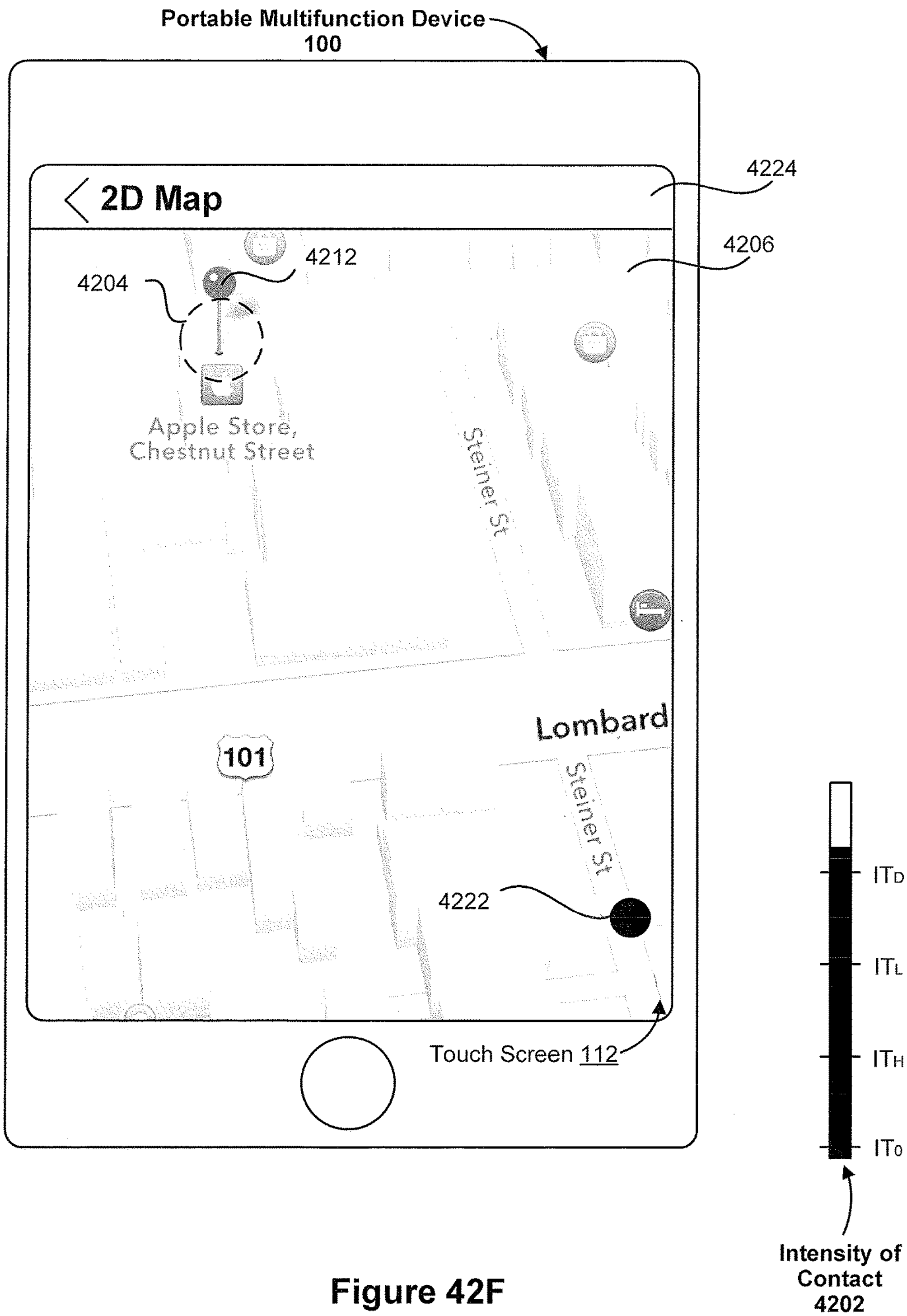
Figure 42G:
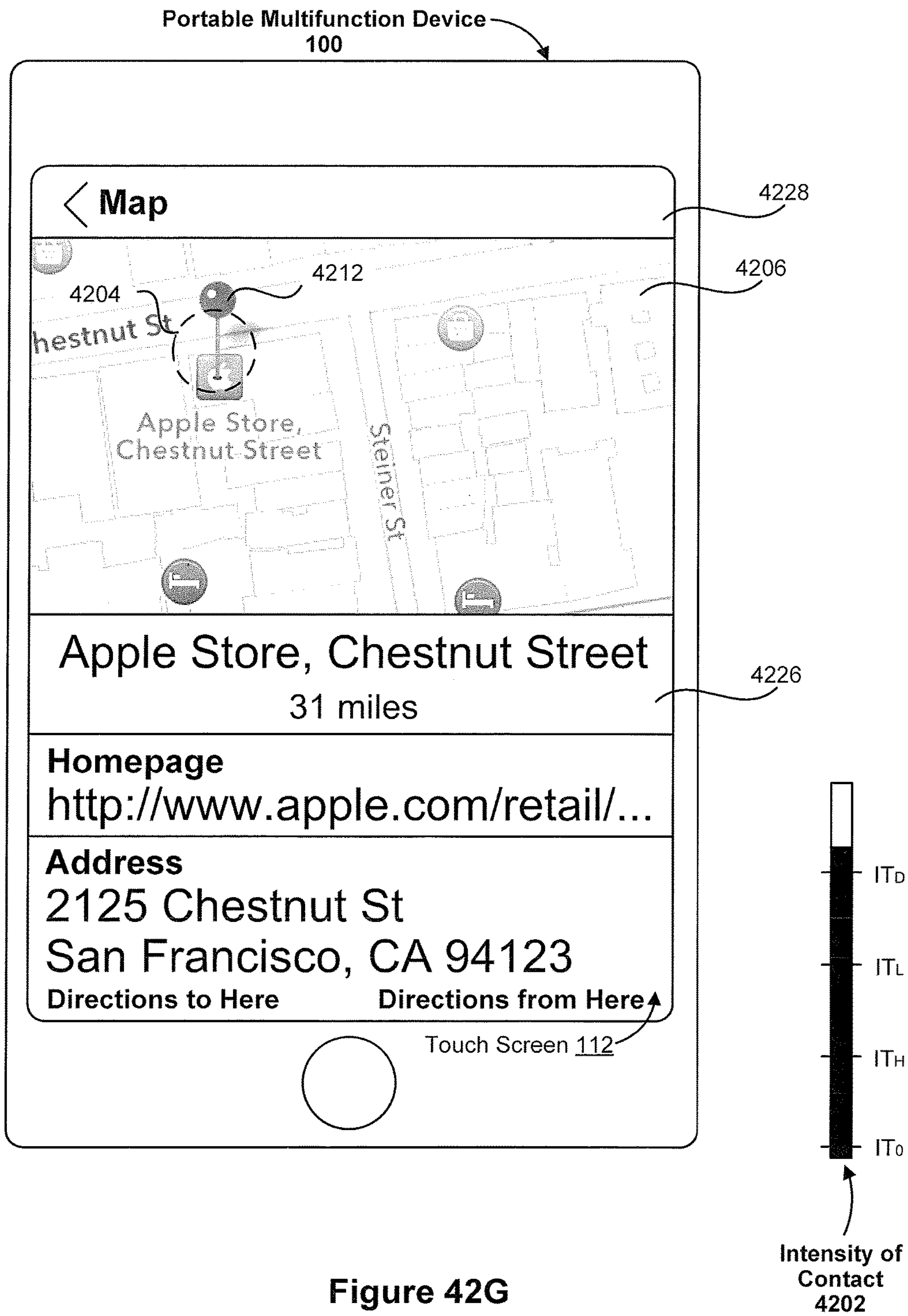
Figure 42H:
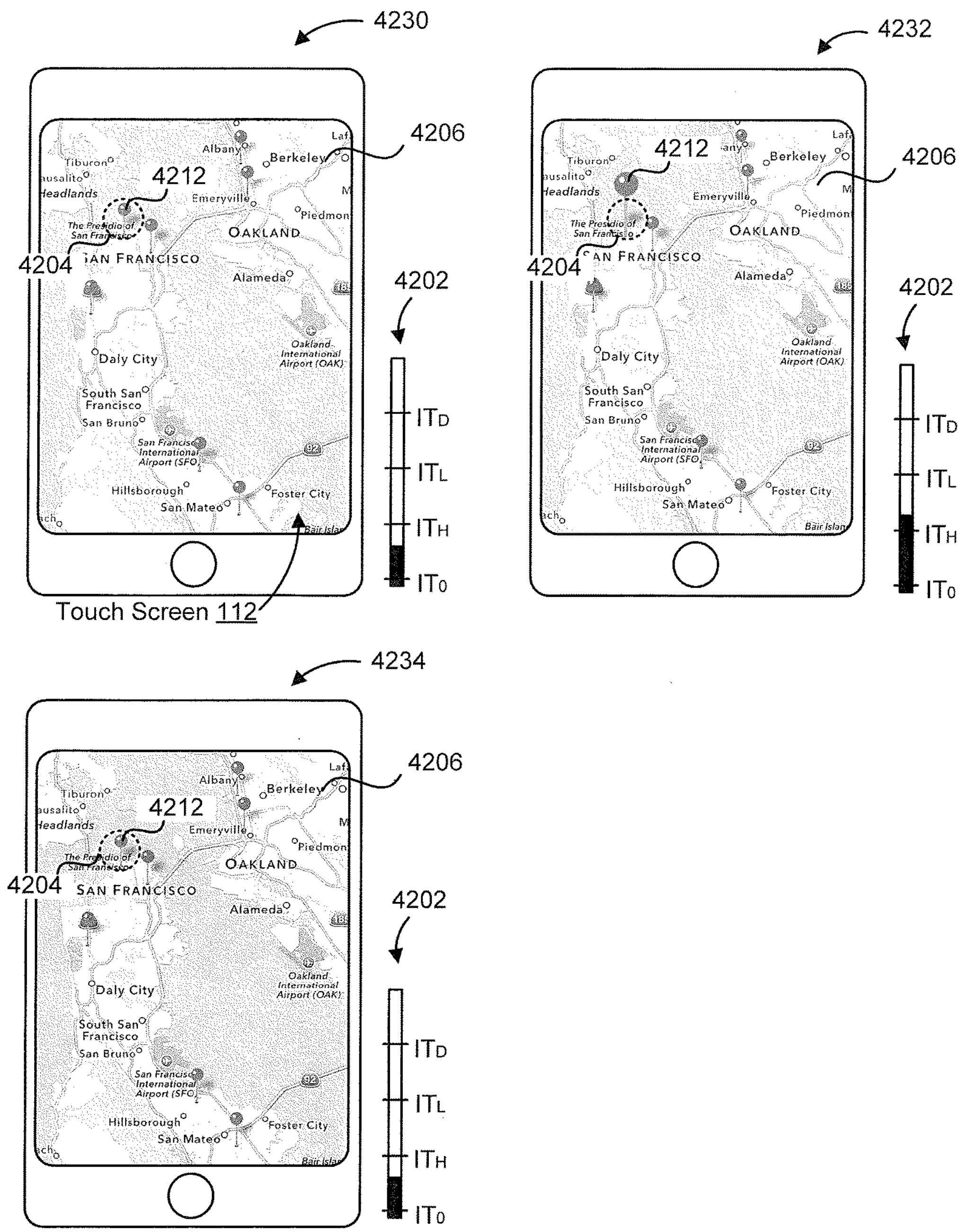
Figure 42I:
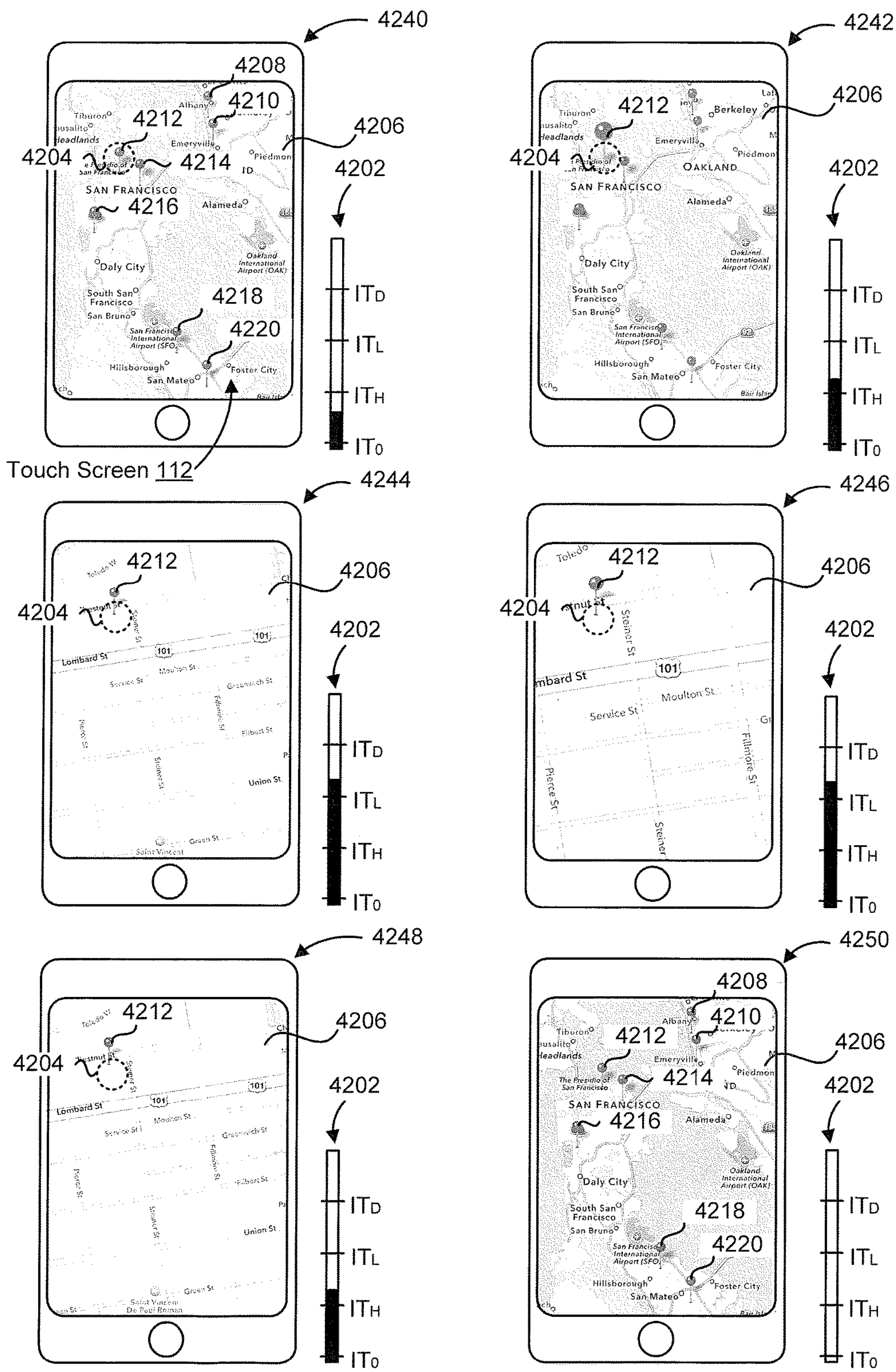
Figure 42J:
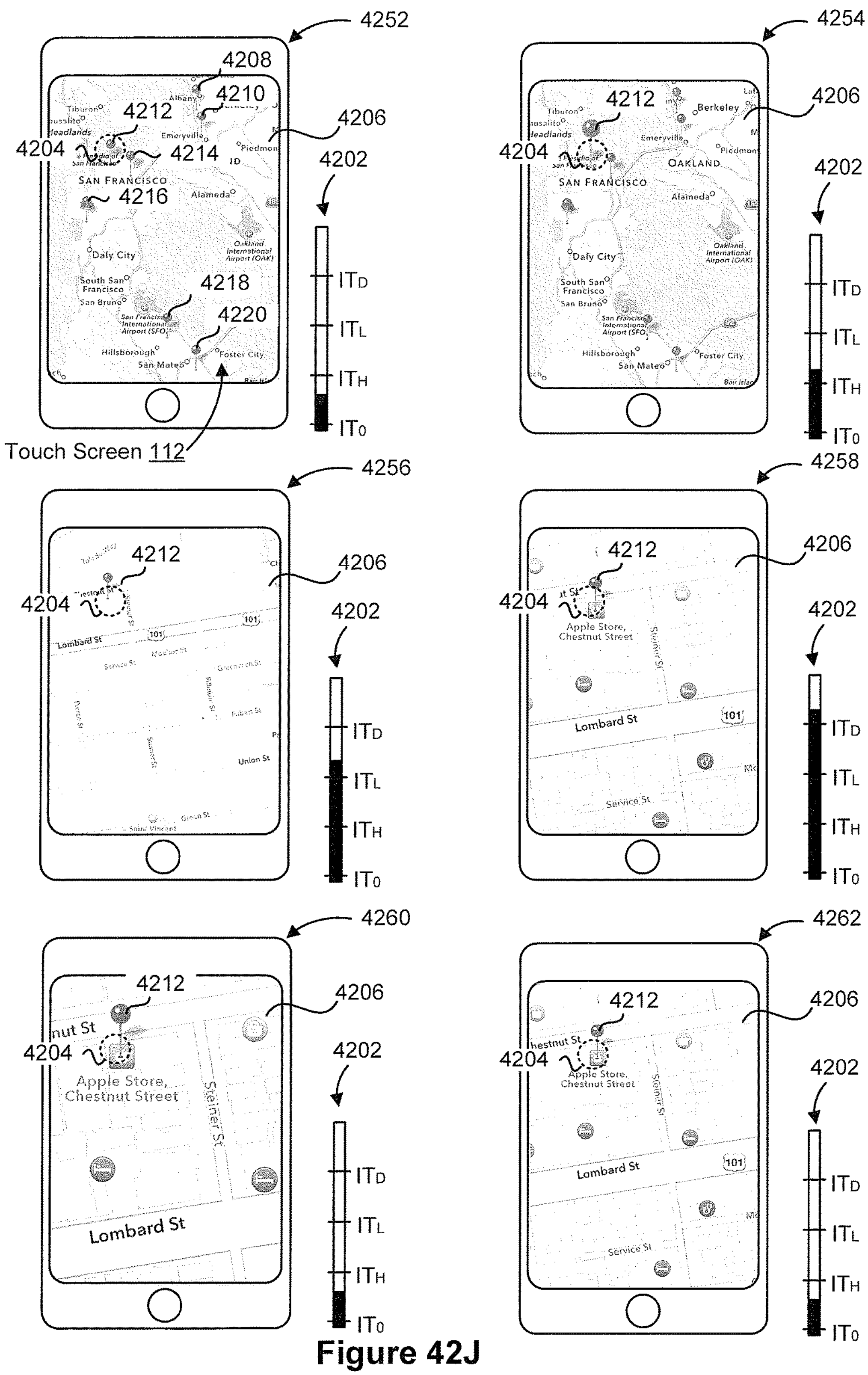
Figure 42K:
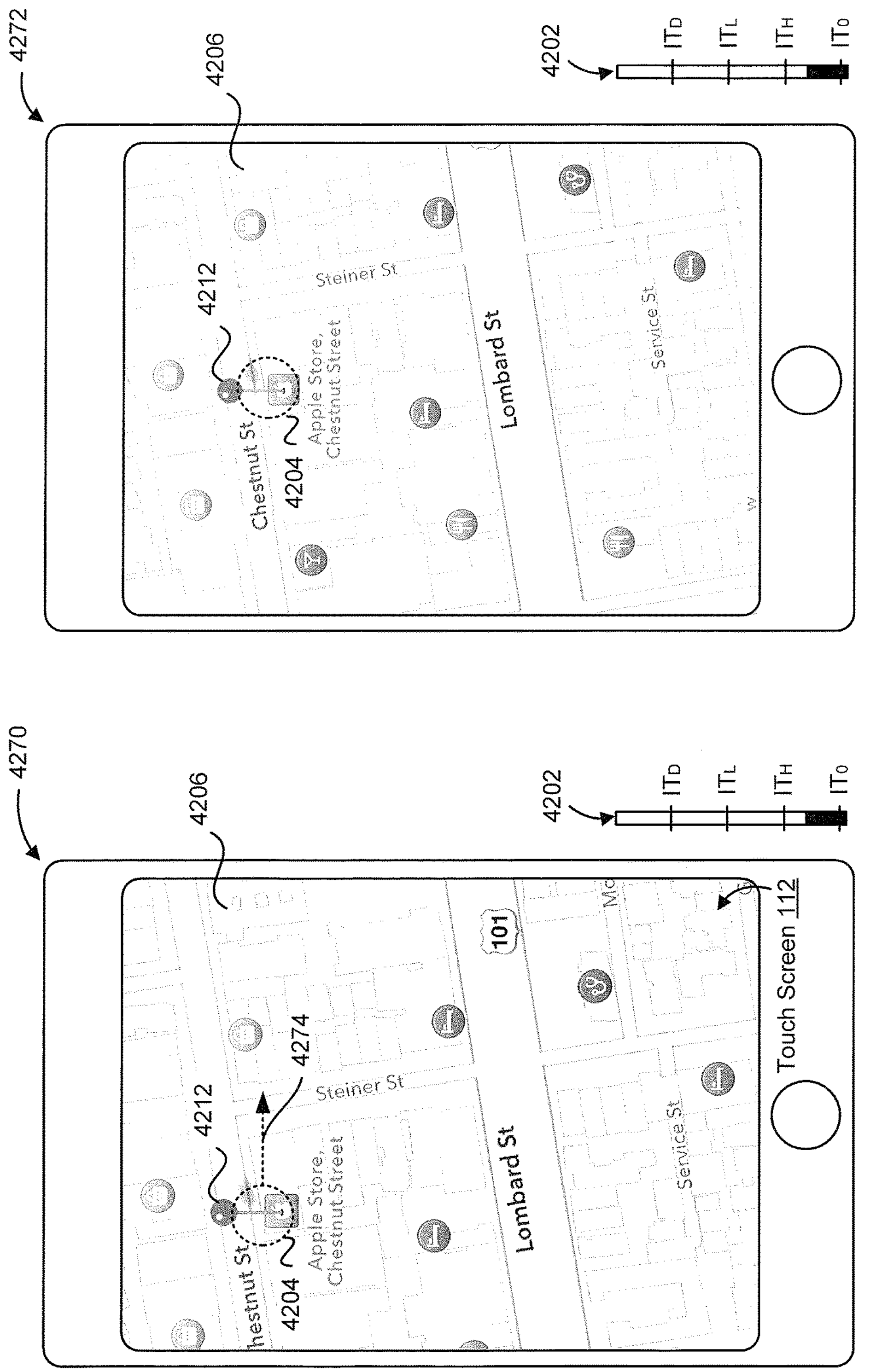
Figure 42L:
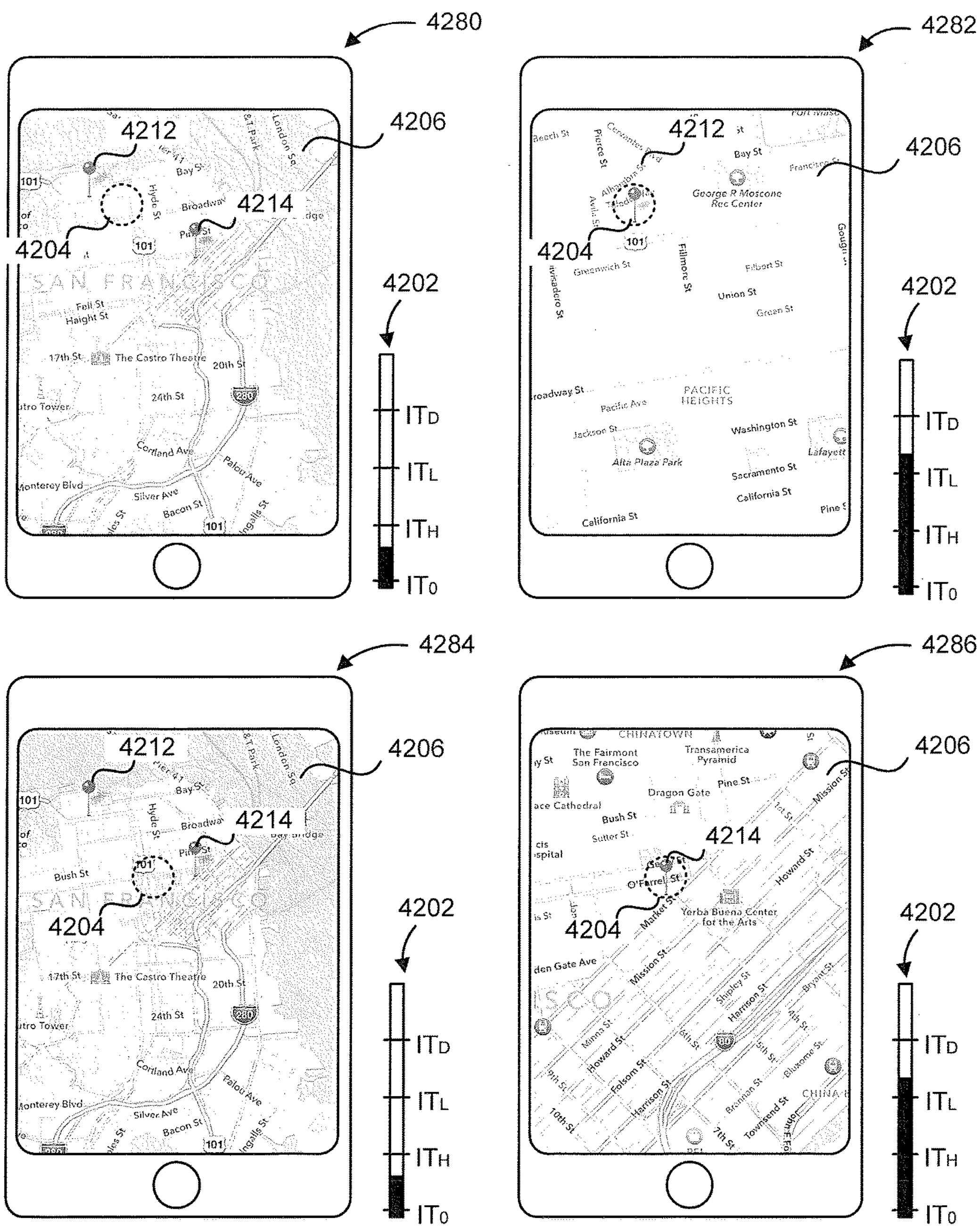
Figure 42M:
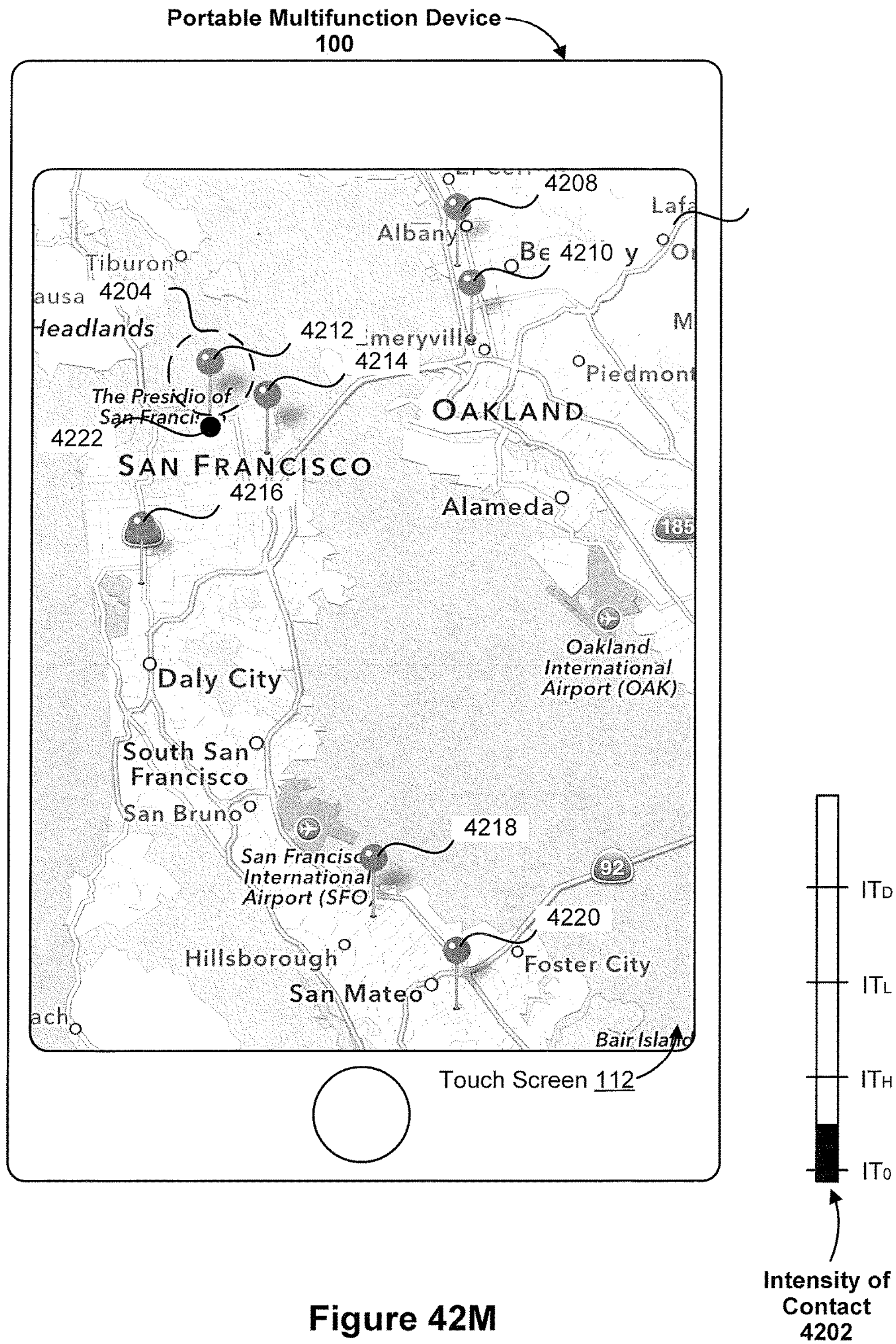
Figure 42N:
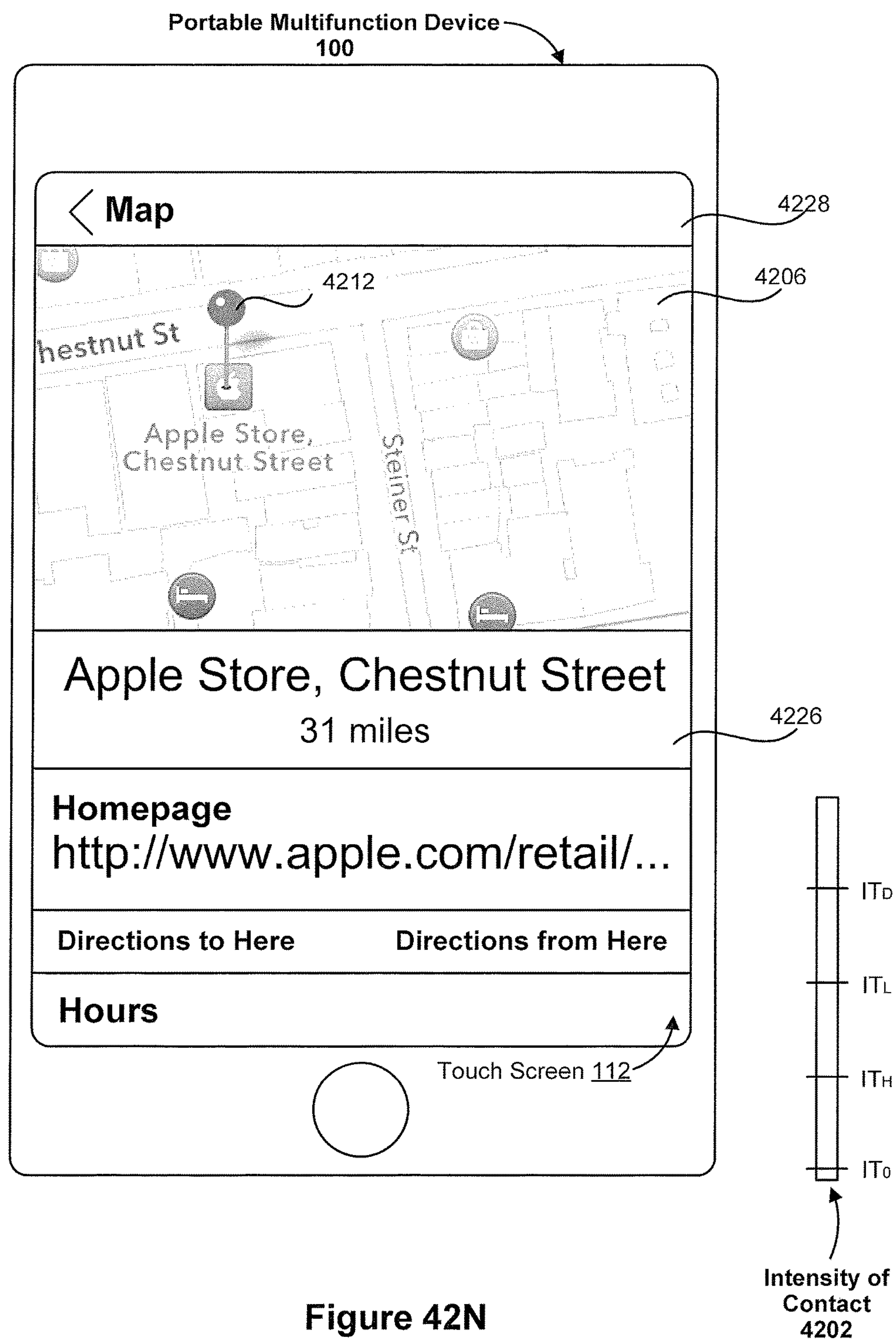

Below, FIGS. 42A-42N illustrate exemplary user interfaces for displaying contextual information associated with a point of interest in a map. FIGS. 43A-43D are flow diagrams illustrating a method of displaying contextual information associated with a point of interest in a map. The user interfaces in FIGS. 42A-42N are used to illustrate the processes in FIGS. 43A-43D.

FIGS. 42A-42N illustrate exemplary user interfaces for zooming a map to display contextual information near a point of interest in accordance with some embodiments. The user interfaces in these figures are used to illustrate the processes described below, including the processes in FIGS. 43A-43D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 42A-42N and 43A-43D will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts described in FIGS. 42A-42N on the touch-sensitive surface 451 while displaying the user interfaces shown in FIGS. 42A-42N on the display 450, along with a focus selector.

FIG. 42A illustrates a user interface displaying a view of a map 4206 that includes a plurality of points of interest 4208-4220, in accordance with some embodiments. In some embodiments, the points of interest are indicated by markers (i.e., map pins), as shown in 42A. In some embodiments, the points of interest are search results of a query. In the illustrative example of 42A, points of interest 4208-4220 are search results of a query for "Apple Store" in an area near San Francisco, Calif.

A contact is detected at touch screen 112 at a location indicated by focus selector 4204. Focus selector 4204 is at the location of point of interest 4212, corresponding to an Apple Store in San Francisco. A characteristic intensity of the contact is indicated by intensity meter 4202. In the illustrative example of 42A, the intensity of the contact is between a threshold intensity level $IT_0$ and a threshold intensity level $IT_H$ (e.g., a "hint" intensity threshold). The intensity of the contact is below a threshold intensity level $IT_L$ (e.g., a "light press" intensity threshold) and below a threshold intensity level $IT_D$ (e.g., a "deep press" intensity threshold).

FIG. 42B illustrates a user interface displaying a view of a map 4206 in which point of interest 4212 has a modified appearance, in accordance with some embodiments. In the illustrative example of FIG. 42B, the appearance of a map pin marker for point of interest 4212 is modified to show an enlarged pin head of the map pin marker. The appearance of point of interest 4212 is modified in accordance with a determination that a contact at the location of point of interest 4212, as indicated by focus selector 4204, has an intensity level exceeding an intensity threshold (e.g., exceeding $IT_H$, as illustrated at intensity meter 4202).

FIG. 42C illustrates a user interface displaying a view of a map 4206 that is zoomed to display contextual information near point of interest 4212, in accordance with some embodiments. For example, in FIG. 42C, contextual information such as street names near point of interest 4212 (e.g., "Chestnut St," "Steiner St," "Lombard Street") and nearby highways (e.g., highway 101) are shown. The map is zoomed to display contextual information in response to a detected increase in the characteristic intensity of the contact at the location indicated by focus selector 4204. The contact has an intensity level exceeding an intensity threshold, such as a preview intensity threshold (e.g., exceeding $IT_L$, as illustrated at intensity meter 4202).

FIG. 42D illustrates a user interface displaying a view of a map 4206 that is zoomed to an overshoot zoom level (e.g., a zoom level that is past the zoom level of the view of map 4206 as shown in FIG. 42C), in accordance with some embodiments. In some embodiments, an "overshoot and bounce back" effect is used when zooming the map, for example, such that the animation zooms from the view of the map 4206 as shown in FIG. 42B to the view of the map 4206 as shown in FIG. 42C and then to the view of the map 4206 as shown in FIG. 42D, and finally bounce back to the view of the map 4206 as shown in FIG. 42C. The user does not have to maintain the contact intensity above $IT_L$ at this point, and the view of the map 4206 as shown in FIG. 42C will remain on the user interface as long as contact is maintained on the touch-sensitive surface.

FIG. 42E illustrates a user interface displaying a view of a map 4206 that is zoomed to a zoom level that is past the zoom level of the view of map 4206 as shown in FIG. 42C. In some embodiments, after zooming the view of the map 4206 from an initial zoom level (e.g., a view of the map 4206 that includes a plurality of points of interest, as shown at 42A) to an increased zoom level (e.g., as shown in FIG. 42C), in response to detecting an increase in the characteristic intensity of the contact above a "maintain context intensity threshold" (e.g., a deep press threshold $IT_D$ as indicated at intensity meter 4202) while focus selector 4204 is located at a point of interest 4212, map 4206 is zoomed to a further increased zoom level as shown in FIG. 42E. In FIG. 42E, context information such as street names near point of interest 4212 (e.g., "Chestnut St," "Steiner St," "Lombard Street," "Service St"), nearby highways (e.g., highway 101), nearby entities (e.g., hotels, stores, etc., as indicated by icons 4223*a*, 4223*b*, etc.) is shown.

FIG. 42F illustrates a user interface displaying a three-dimensional (3D) view of a map 4206, in accordance with some embodiments. In some embodiments, a user interface (e.g., a two-dimensional (2D) view of the map 4206 as shown in FIG. 42C) is replaced with a different user interface (e.g., the 3D view of map 4206 as shown in FIG. 42F). For example, in response to detecting an increase in the characteristic intensity of the contact above a "maintain context intensity threshold" (e.g., a deep press threshold ITD as indicated at intensity meter 4202 of FIG. 42F) when focus selector 4204 is located at a point of interest 4212, the 3D view of map 4206 as shown in FIG. 42F replaces the 2D view of map 4206 as shown in FIG. 42C. In some embodiments, the view of map 4206 shown in FIG. 42F continues to be displayed when the characteristic intensity of the contact is reduced (e.g., below $IT_D$, below $IT_L$, below $IT_H$, below $IT_0$, on liftoff of the contact from touch screen 112, etc.). In some embodiments, the second user interface includes an affordance (e.g., control 4224) for returning to a previously shown interface (e.g., from the 3D view of the map as shown in FIG. 42F to a 2D view of map 4206 as shown in FIG. 42E, FIG. 42C, FIG. 42A, etc.).

FIG. 42G illustrates a user interface that includes a location information interface 4226, in accordance with some embodiments. In some embodiments, a user interface (e.g., a view of the map 4206 displayed in FIG. 42C) is replaced with a second user interface (e.g., the location information interface 4226 displayed in FIG. 42G). In some embodiments, location information interface 4226 includes a view of map 4206 zoomed past the zoom level of the view of map 4206 as shown in FIG. 42C. In some embodiments, location information interface 4226 includes a view of map 4206 zoomed to the same zoom level as the view of map 4206 shown in FIG. 42C. In some embodiments, location information interface 4226 is displayed in response to detecting an increase in the characteristic intensity of the contact above a "maintain context intensity threshold" (e.g., a deep press threshold $IT_D$ as indicated at intensity meter 4202 of FIG. 42G) when focus selector 4204 is located at a point of interest 4212. In some embodiments, the location information interface 4226 shown in FIG. 42G continues to be displayed when the characteristic intensity of the contact is reduced (e.g., below $IT_D$, below $IT_L$, below $IT_H$, below $IT_0$, on liftoff of the contact from touch screen 112, etc.). In some embodiments, location information interface 4226 includes control 4228 for returning from location information interface 4226 to a user interface as shown in FIG. 42E, FIG. 42C, FIG. 42A, etc.

FIG. 42H illustrates a sequence of user interfaces 4230-4234 indicating a hint animation, in accordance with some embodiments. At 4230, while the intensity of the contact indicated by focus selector 4204 does not exceed $IT_H$ (as indicated in intensity meter 4202 shown adjacent to 4230), portable multifunction device 100 displays a map pin representing point of interest 4212. At 4232, the intensity of the contact indicated by focus selector 4204 has increased to exceed $IT_H$ (as indicated in intensity meter 4202 shown adjacent to 4232) and the appearance of the map pin representing point of interest 4212 is adjusted (i.e., the size of the head of the map pin is increased). At 4234, the intensity of the contact indicated by focus selector 4204 has decreased to below $IT_H$ (as indicated in intensity meter 4202 shown adjacent to 4234) and the appearance of the map pin representing point of interest 4212 is returned to its previous appearance. In other words, the hint animation is reversible, and the visual effect of the hint is dynamically correlated with the current intensity of the contact.

FIG. 42I illustrates a sequence of user interfaces 4240-4250 indicating a transition between displaying a view of map 4206 including multiple points of interest and displaying contextual information for a point of interest 4212, in accordance with some embodiments. At 4240, while the intensity of a contact with touch screen 112 at a location indicated by focus selector 4204 does not exceed $IT_H$ (as indicated in intensity meter 4202 shown adjacent to 4240), portable multifunction device 100 displays a view of map 4206 on which map pins representing a plurality of points of interest 4208-4220 are shown. At 4242, the intensity of the contact indicated by focus selector 4204 has increased to exceed $IT_H$ (as indicated in intensity meter 4202 shown adjacent to 4242) while focus selector 4204 is located at point of interest 4212, and the appearance of the map pin representing point of interest 4212 is adjusted (i.e., the size of the head of the map pin is increased). At 4244, the intensity of the contact indicated by focus selector 4204 has increased to exceed $IT_L$ (as indicated in intensity meter 4202 shown adjacent to 4244), and portable multifunction device 100 displays a view of map 4206 including contextual information for point of interest 4212 (i.e., at a zoom level that is past the zoom level indicated in 4240). At 4246, after intensity of the contact indicated by focus selector 4204 has reached a level exceeding $IT_L$ (as indicated in intensity meter 4202 shown adjacent to 4246), portable multifunction device 100 animates the view of map 4206 to briefly show the view of map 4206 at an overshoot zoom level that exceeds the zoom level indicated in 4244, after which the view of map 4206 is again displayed at user interface 4248 at the same zoom level of the view of map 4206 in user interface 4244. At 4248, the view of map 4206 is maintained at the same zoom level of the view of map 4206 in user interface 4244 even when the contact intensity falls below $IT_L$ (as indicated in intensity meter 4202 shown adjacent to 4246). At 4250, the intensity of the contact indicated by focus selector 4204 has decreased below $IT_L$ (as indicated in intensity meter 4202 shown adjacent to 4250), and portable multifunction device 100 displays a view of map 4206 including the plurality of points of interest at the same zoom level of the view of map 4206 in user interface 4240. In other words, the zoomed map view (a preview) displayed in response to contact intensity reaching $IT_L$ is stable against changes (e.g., decreases) in contact intensity, until lift-off of the contact is detected.

FIG. 42J illustrates a sequence of user interfaces 4252-4262 indicating a transition from displaying a view of map 4206 including multiple points of interest, to displaying a view of map 4206 at an increased zoom level including contextual information for a point of interest 4212, to displaying a view of map 4206 at a further increased zoom level, in accordance with some embodiments. At 4252, while the intensity of a contact with touch screen 112 at a location indicated by focus selector 4204 does not exceed $IT_H$ (as indicated in intensity meter 4202 shown adjacent to 4252), portable multifunction device 100 displays a view of map 4206 on which map pins representing a plurality of points of interest 4208-4220 are shown. At 4254, the intensity of the contact has increased to exceed $IT_H$ (as indicated in intensity meter 4202 shown adjacent to 4254) while focus selector 4204 is located at point of interest 4212, and the appearance of the map pin representing point of interest 4212 is adjusted (i.e., the size of the head of the map pin is increased). At 4256, the intensity of the contact has increased to exceed $IT_L$ (as indicated in intensity meter 4202 shown adjacent to 4256) while focus selector 4204 is located at point of interest 4212, and portable multifunction device 100 displays a view of map 4206 including contextual information for point of interest 4212 (i.e., at a zoom level that is past the zoom level indicated in 4252). At 4258, the intensity of the contact has increased to exceed $IT_H$ (as indicated in intensity meter 4202 shown adjacent to 4258) while focus selector 4204 is located at point of interest 4212, and portable multifunction device 100 displays a view of map 4206 at a zoom level that is past the zoom level indicated in 4256. At 4260, portable multifunction device 100 animates the view of map 4206 to briefly show the view of map 4206 at an overshoot zoom level that exceeds the zoom level indicated in 4258, after which the view of map 4206 is displayed in 4262 at a zoom level that is the same as the zoom level indicated in 4258. Because a maintain-context intensity threshold has been met (i.e., $IT_D$ was reached as shown at intensity meter 4202 adjacent to 4258), the zoom level indicated in 4262 is maintained when the intensity of the contact decreases below $IT_D$.

FIG. 42K illustrates a sequence of user interfaces 4270-4272 indicating a transition corresponding to a movement of the contact across touch screen 112, in accordance with some embodiments. In some embodiments, the sequence of user interface 4270-4272 are displayed after the view of map 4206 has been zoomed (e.g., zoomed as shown in 42C, 42E, 42F, 42G, etc.). At user interface 4270, a user interface displays a view of map 4206 zoomed to show contextual information for point of interest 4212. A contact is moved across touch screen 112 such that focus selector 4204 moves from a first location at point of interest 4212 to a second location along a path indicated by arrow 4274. In user interface 4272, the view of map 4206 is shifted in accordance with the movement of the contact along the path indicated by arrow 4274.

FIG. 42L illustrates a sequence of user interfaces 4280-4282 indicating a transition between displaying a view of map 4206 including multiple points of interest and displaying contextual information for a point of interest 4212 and a sequence of user interfaces 4284-4286 indicating a transition between displaying a view of map 4206 including multiple points of interest and displaying contextual information for a point of interest 4214.

In user interface 4280, map pins representing points of interest 4212 and 4214 are displayed and a contact is received at a location indicated by focus selector 4204. Because focus selector 4204 is closer to point of interest 4212 than point of interest 4214, in user interface 4282, the view of the map 4206 is zoomed to display contextual information near point of interest 4212. In some embodiments, the view of the map 4206 is positioned in user interface 4283 such that point of interest 4212 is located at the position of focus selector 4204. In some embodiments, the zoom from the view of the map 4206 shown in user interface 4280 to the view of the map 4206 shown in user interface 4282 occurs in accordance with a determination that a characteristic intensity of the contact exceeds a threshold intensity level, such as a preview intensity threshold (e.g., $IT_L$, as shown at intensity meter 4202 adjacent to user interface 4282) or another intensity threshold as described herein.

In user interface 4284, map pins representing points of interest 4212 and 4214 are displayed and a contact is received at a location indicated by focus selector 4204. Because focus selector 4204 is closer to point of interest 4214 than point of interest 4212, in user interface 4286, the view of the map 4206 is zoomed to display contextual information near point of interest 4214. In some embodiments, the view of the map 4206 is positioned in user interface 4286 such that point of interest 4214 is located at the position of focus selector 4204. In some embodiments, the zoom from the view of the map 4206 shown in user interface 4284 to the view of the map 4206 shown in user interface 4286 occurs in accordance with a determination that a characteristic intensity of the contact exceeds a threshold intensity level, such as a preview intensity threshold (e.g., $IT_L$, as shown at intensity meter 4202 adjacent to user interface 4286) or another intensity threshold as described herein.

FIGS. 42M-42N illustrate a sequence of user interfaces indicating a transition from displaying a view of map 4206 including multiple points of interest, as shown in FIG. 42M, to displaying a different user interface including a view of map 4206 at an increased zoom level and an affordance for returning to the user interface of 42M, in accordance with some embodiments.

At 42M, a user interface displays a view of map 4206 that includes a plurality of points of interest 4208-4220. A contact is detected at touch screen 112 at a location indicated by focus selector 4204, which is positioned at point of interest 4212. The contact is a tap input. As a result of the received tap input, different user interface from the interface of 42M is displayed, as indicated in FIG. 42N.

In some embodiments, the user interface of FIG. 42N includes a view of map 4206 at a zoom level past the zoom level of the view of map 4206 shown in FIG. 42M. In some embodiments, the user interface of FIG. 42N includes affordance 4228 for returning to the user interface of 42M.

FIGS. 43A-43D are flow diagrams illustrating a method 4300 of zooming a map in accordance with some embodiments. The method 4300 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 4300 are, optionally, combined and/or the order of some operations is, optionally, changed.

As described below, the method 4300 provides an intuitive way to zoom a map. The method reduces the cognitive burden on a user when zooming a map around a point of interest, thereby creating a more efficient human-machine interface. For battery-operated electronic devices, enabling a user to zoom a map faster and more efficiently conserves power and increases the time between battery charges.

The device displays (4302), in a first user interface on the display (e.g. touch screen 112), a view of a map that includes a plurality of points of interest (e.g., the points of interest are represented in the map by corresponding markers or icons (e.g., pins, avatars of users, logos of business entities, etc.) at their respective locations in the map). For example, FIG. 42A shows a first user interface including a plurality of points of interest 4208-4220 represented by map pins. Points of interest include, for example, restaurants, shops, and other types of businesses; hospitals, recreation areas, educational facilities, travel facilities, monuments, and other types of facilities; lakes, rivers, mountains, and other geographical landmarks; residences; location of the user and/or locations of other users; location of the device and/or locations of other devices; and so on. In some embodiments, the map with the plurality of points of interest is displayed in response to a query and includes search results for the query. In some embodiments, the map with the plurality of points of interest is displayed as part of a user interface (e.g., a friend finder application interface, a chat application that supports location sharing functions, a device finder application interface, etc.) that periodically or in real-time monitors the locations of predetermined entities (e.g., location-sharing friends of the user, location-sharing peripheral devices or associated devices of the electronic device), etc.

While displaying the view of the map that includes the plurality of points of interest (e.g., as shown in FIG. 42A), and while a focus selector 4204 is at a location of a respective point of interest (e.g., while the focus selector is within a predetermined threshold distance of the marker or icon representing the respective point of interest, and/or while the focus selector is the closest to the respective point of interest than to any other points of interest visible in the view of the map), the device detects (4304) an increase in a characteristic intensity of the contact on the touch-sensitive surface above a preview intensity threshold (e.g., an intensity threshold above a light press intensity threshold $IT_L$, as shown at intensity meter 4202, or above another static or dynamically determined preview intensity threshold). For example, in FIG. 42A, focus selector 4204 is shown at a map pin representing point of interest 4212. The characteristic intensity of the contact at the location indicated by focus selector 4204 is below a threshold intensity level $IT_L$, as indicated at intensity meter 4202 of FIG. 42A. In FIG. 42C, an increase in the characteristic intensity of the contact at the location indicated by 4204 to above a threshold intensity level $IT_L$ is detected, as indicated at intensity meter 4202 of FIG. 42C.

In some embodiments, the respective point of interest (e.g., 4212 in FIG. 42A) is a fixed point of interest (4306) on the map (e.g., the respective point of interest has a static location (e.g., a business, a facility, a residence, a geographical landmark, etc.).

In some embodiments, the respective point of interest is a dynamic (e.g., mobile) point of interest (4308). In some embodiments, the respective point of interest is a location-sharing user (e.g., a person who has made location of his/her portable device available to the electronic device, e.g., via a location-sharing application), a location-sharing device (e.g., a lost device with a homing function enabled to contact the electronic device with its own location, a peripheral device (e.g., a drone) or other devices that communicate with and report their locations to the electronic device, etc.).

In some embodiments, while displaying the view of the map that includes the plurality of points of interest (e.g., as shown in FIG. 42A), and while the focus selector 4204 is at the location of the respective point of interest (e.g., at a map pin representing point of interest 4212), the device detects (4310) an increase in the characteristic intensity of the contact above a hint intensity threshold (e.g., above $IT_H$ as shown at intensity meter 4202 of FIG. 42B) that is below the preview intensity threshold (e.g., $IT_L$). In response to detecting the increase in the characteristic intensity of the contact above the hint intensity threshold, the device modifies (4310) an appearance of the respective point of interest. Modifying an appearance of the respective point of interest includes, e.g., enlarging a representation of the respective point of interest by slightly zooming the map; enlarging the representation of the point of interest without zooming the map (e.g., enlarging a head of the map pin representing point of interest 4212, as shown at FIG. 42B and as shown at user interface 4232 of FIG. 42H); expanding the point of interest to display additional information about the point of interest such as contact information or status information, information pertaining to a business; etc. In some embodiments, modifying the appearance of the respective point of interest includes displaying an animation in which a rate of change in the appearance of the respective point of interest is directly manipulated by or is proportional to the change (e.g., increase and/or decrease) in the characteristic intensity of the contact. In some embodiments, modifying the appearance of the respective point of interest includes displaying a canned animation (i.e., an animation that is not responsive to intensity change) for the change in appearance of the respective point of interest. In some embodiments, the hint intensity threshold (e.g., $IT_H$) is higher than the intensity required for scrolling the map or selecting of an item on the map (e.g., the contact detection threshold intensity $IT_0$).

In some embodiments, modifying the appearance of the respective point of interest includes displaying (4312) an animated transition from a first appearance of the respective point of interest to a second appearance of the respective point of interest. (e.g., an animated transition between the respective point of interest 4212 as shown in FIG. 42A and respective point of interest 4212 as shown in FIG. 42B)

In some embodiments, displaying the animated transition from the first appearance of the respective point of interest to the second appearance of the respective point of interest includes dynamically displaying (4314) (and, optionally, generating) a series of intermediate appearances of the respective point of interest in accordance with a current intensity of the contact while the intensity of the contact varies between the hint intensity threshold (e.g., $IT_H$) and the preview intensity threshold (e.g., $IT_L$). For example, the size of the pin representing the respective point of interest is directly manipulated (e.g., increased and decreased) by changing the contact intensity between the hint intensity threshold and the preview intensity threshold.

In response to detecting the increase in the characteristic intensity of the contact above the preview intensity threshold (e.g., above $IT_L$ as indicated at intensity meter 4204 of FIG. 42C), the device zooms (4316) the map to display contextual information near the respective point of interest (e.g., as illustrated at FIG. 42C). In some embodiments, the contextual information that is displayed near the respective point of interest includes information that was not visible in the view of the map prior to the zooming of the map. For example, the contextual information includes names and/or representations of entities (e.g., nearby streets, nearby businesses, nearby facilities, nearby geographical features, nearby people, nearby devices, and/or other nearby entities that were not visible or called out in the view of the map prior to the zooming of the map). As shown in FIG. 42C, contextual information near point of interest 4212, such as nearby street names (e.g., “Chestnut St”, “Lombard St.”, and “Steiner St.”) and nearby highways (e.g., highway 101) are displayed in the zoomed view of the map. In some embodiments, the zooming is centered around the respective point of interest. In some embodiments, the zooming is not necessarily centered around the respective point of interest, but around another point that ensures inclusion of the respective point of interest and relevant contextual information after the zooming of the map.

In some embodiments, zooming the map to display the contextual information near the respective point of interest includes displaying (4318) an animated transition from a first zoom level of the map to a second zoom level of the map (e.g., an animated transition from a first zoom level as shown in FIG. 42A to a second zoom level as shown in FIG. 42C or FIG. 42E.) In some embodiments, a smooth animated transition from the first zoom level of the map to the second zoom level of the map occurs, without regard to the current characteristic intensity of the contact detected during the animated transition. In some embodiments, the rate of change of the animated transition from the first zoom level of the map to the second zoom level of the map is directly manipulated by or is proportional to the change (e.g., increase and/or decrease) in the characteristic intensity of the contact.

In some embodiments, the animated transition from the first zoom level of the map to the second zoom level of the map includes (4320) a first portion showing an increase from the first zoom level of the map to a third zoom level of the map, followed by a second portion showing a decrease from the third zoom level of the map to the second zoom level of the map. For example, the animated transition from may zoom in from an initial zoom level (e.g., as shown in FIG. 42A) to a zoom level (e.g., as shown in FIG. 42D) that is a small amount past a target zoom level and then zoom back out to the target zoom level (e.g., as shown in FIG. 42C). In some embodiments, the animation imitates an "overshoot and bounce back" effect of the zooming in process at the end of the animation. In some embodiments, the "overshoot and bounce back" effect is used when zooming of the map occurs in response to the characteristic intensity of the contact increasing above the preview intensity threshold (e.g., $IT_L$, for example, as illustrated in user interfaces of Figure 4244-4248 of FIG. 42I) and/or the characteristic intensity of the contact increasing above the maintain context intensity threshold (e.g., $IT_D$, for example, as illustrated in user interfaces of Figure 4258-4262 of FIG. 42J).

In some embodiments, the plurality of points of interest includes (4322) a first point of interest and a second point of interest (e.g., both the first point of interest and the second point of interest are within a predetermined threshold map/screen distance from the focus selector). For example, first point of interest 4212 and second point of interest 4214 are shown in user interfaces 4280 and 4284 of FIG. 42L. Zooming the map to display contextual information near the respective point of interest includes (4322), in accordance with a determination that the focus selector is located closer to the first point of interest than the second point of interest (e.g., focus selector 4204 is located closer to point of interest 4212 than point of interest 4214, as shown in user interface 4280), zooming the map to display first contextual information near the first point of interest (e.g., as shown in user interface 4282); and in accordance with a determination that the focus selector is located closer to the second point of interest than the first point of interest (e.g., focus selector 4204 is located closer to point of interest 4214 than point of interest 4212, as shown in user interface 4284), zooming the map to display second context near the second point of interest (e.g., as shown in user interface 4286 in FIG. 42L).

In some embodiments, zooming the map to display contextual information near the respective point of interest includes (4324) zooming the map to a predefined zoom level (e.g., such that map view displays a predefined geographic range (e.g., 10-mile radius, 5-block radius, neighborhood, city, county, etc.). In some embodiments, the map view is adjusted such that the respective point of interest is in the center of zoomed map view. In some embodiments, the respective point of interest does not move as the zooming occurs. For example, point of interest 4212 does not change position within map view 4206 as zooming (from map view 4206 as shown in FIG. 42A to map view 4206 as shown in FIG. 42C) occurs.

In some embodiments, zooming the map to display contextual information near the respective point of interest includes (4326) zooming the map to a dynamically selected zoom level (e.g., a zoom level that is determined based on the current context). In some embodiments, the zoom level is dynamically selected to show meaningful information relevant to the current scenario (e.g., if the map and points of interest are displayed as a result of a restaurant search, this search context may warrant a zoom down to the street level near a restaurant of interest; if the map and points of interest are displayed as a result of a search for community parks, this search context and the user's current location 4222 may warrant a zoom down to a level that includes a meaningful number of community parks (e.g., five) near the user's current location, etc.) In some embodiments, dynamically selected zoom level determination includes determining an information density value at the respective point of interest or in an area of the map where the respective point of interest is located. For example, different information density values may be determined for each of a plurality of map views at different zoom levels for each point of interest, and an appropriate information density is used to select the appropriate zoom level for the respective point of interest.

After zooming the map, the device detects (4328) a respective input that includes detecting a decrease in the characteristic intensity of the contact on the touch-sensitive surface below a predefined intensity threshold (e.g., detecting a decrease in intensity of the contact below the predefined intensity threshold or detecting liftoff of the contact from the touch-sensitive surface). For example, in FIG. 42I, the characteristic intensity of the contact on the touch-sensitive surface at a location indicated by focus selector 4204 decreases below a predefined intensity threshold (e.g., $IT_L$) as indicated at user interface 4250. In FIG. 42J, the characteristic intensity of the contact on the touch-sensitive surface at a location indicated by focus selector 4204 decreases below a predefined intensity threshold (e.g., $IT_L$) as indicated at user interfaces 4260-4262.

In response to detecting the respective input that includes detecting the decrease in the characteristic intensity of the contact: in accordance with a determination that the characteristic intensity of the contact increased above a maintain-context intensity threshold (e.g., a deep press intensity threshold (e.g., $IT_D$), or another static or dynamically determined maintain-context intensity threshold) before detecting the respective input, the device continues (4330) to display the contextual information near the respective point of interest (e.g., the same zoomed view of the map is maintained on the display when the characteristic intensity of the contact increases above the maintain-context intensity threshold before easing off). For example, in FIG. 42J, in response to detecting the decrease in the characteristic intensity of the contact below predefined intensity threshold $IT_L$ as indicated at intensity meter 4202 adjacent to user interfaces 4260-4262, in accordance with a determination that the characteristic intensity of the contact increased above a maintain-context intensity threshold $IT_D$, as indicated at intensity meter 4202 adjacent to user interface 4258, the device continues to display the contextual information near point of interest 4212, as indicated at user interface 4262. In some embodiments, another view of the map at a different zoom level (e.g., higher zoom level, such as the view of the map indicated at FIG. 42E) is displayed and maintained on the display when the contact increases above the maintain-context intensity threshold before easing off. In such embodiments, the contextual information near the respective point of interest is visible in the views of the map at both zoom levels. As shown in FIGS. 42C and 42E, contextual information, such as nearby street names (e.g., "Chestnut St", "Steiner St.", and "Lombard St."), nearby highways (e.g., highway 101) are visible at both the zoom level of FIG. 42C and the higher zoom level of FIG. 42E.

In accordance with a determination that the characteristic intensity of the contact did not increase above the maintain-context intensity threshold before detecting the respective input, the device ceases (4330) to display the contextual information near the point of interest and the device redisplays the view of the map that includes the plurality of points of interest. In some embodiments, if the device detects that the intensity of the contact decreases below the predefined intensity threshold or detects liftoff of the contact from the touch-sensitive surface without first detecting an increase above the maintain-context intensity threshold, the zoomed view of the map is replaced by the original view of the map that includes the plurality of points of interest, without the contextual information near the respective point of interest. For example, in FIG. 42I, in response to detecting the decrease in the characteristic intensity of the contact below predefined intensity threshold $IT_L$ as indicated at intensity meter 4202 adjacent to user interface 4250, in accordance with a determination that the characteristic intensity of the contact did not increase above a maintain-context intensity threshold $IT_D$, the device redisplays the view of the map that includes the plurality of points of interest upon lift-off of the contact, as indicated at user interface 4250.

In some embodiments, after zooming the map (e.g., while displaying the zoomed view of the map with the contextual information), the device detects (4332) a movement of the contact on the touch-sensitive surface (e.g., after detecting the increase in intensity of the contact, the device detects a decrease in contact intensity below the preview intensity threshold or the maintain-context intensity threshold, followed by a movement of the contact while at the lower contact intensity). For example, after zooming the map to a map view 4206 as shown in FIG. 42E, the device detects a movement of the contact from a location indicated by focus selector 4204 along a path indicated by arrow 4274, as shown in FIG. 42K. The movement illustrated in FIG. 42K occurs after a decrease in the characteristic intensity of the contact below $IT_L$ has occurred, as indicated by intensity meter 4202 adjacent to user interface 4270 of FIG. 42K. In response to detecting the movement of the contact (e.g., while at an intensity below the preview intensity threshold or the maintain-context intensity threshold), the device shifts (4332) the zoomed view of the map (and, optionally, the contextual information) in accordance with the movement of the contact. For example, as shown in FIG. 42K, a movement of the contact that is a translation of the contact in a first direction (e.g., a movement of focus selector 4204 along a path indicated by arrow 4274) causes a corresponding translation of the zoomed map in direction of arrow 4274, as indicated by the transition from map view 4206 shown in user interface 4270 to the map view 4206 shown in user interface 4272. In some embodiments, the zoom level of the map is maintained even though the contact intensity is not necessarily maintained at a level above the preview intensity threshold or the maintain-context intensity threshold.

In some embodiments, zooming the map to display contextual information near the respective point of interest includes zooming the map to a first zoom level (e.g., a preview zoom level), and after zooming the map to the first zoom level (and, optionally, before detecting the respective input that includes detecting a decrease in intensity of the contact on the touch-sensitive surface), the device detects (4334) an increase in the characteristic intensity of the contact above the maintain-context intensity threshold. For example, as shown in FIG. 42J, map view 4206 is zoomed from an initial view, as shown in user interface 4252, to a first zoom level, as indicated at user interface 4256. After zooming the map to the first zoom level, the characteristic intensity of the contact at the location indicated by focus selector 4204 increases above a maintain-context intensity threshold (e.g., $IT_D$ as indicated at intensity meter 4202 adjacent to user interface 4258). In response to detecting the increase in the characteristic intensity of the contact above the maintain-context intensity threshold, the device zooms (4334) the map to a second zoom level above the first zoom level. For example, as shown in FIG. 42J, in response to detecting the increase in the characteristic intensity of the contact above the maintain-context intensity threshold (e.g., $IT_D$ as indicated at intensity meter 4202 adjacent to user interface 4258), map view 4206 is zoomed from the first zoom level shown in user interface 4256 to a second zoom level shown in user interface 4258. In some embodiments, a banner is displayed over the representation of the respective point of interest to show additional information about the respective point of interest. In some embodiments, the user can select the banner to see a location card (e.g., as shown in FIG. 42G) of the respective point of interest in a new user interface.

In some embodiments, in response to detecting the respective input that includes detecting the decrease in the characteristic intensity of the contact, the device maintains (4336) display of the map at a respective zoom level that is equal to or greater than the first zoom level. For example, after reaching above the maintain-context intensity threshold, on reduced intensity with or without liftoff, the zoom level of the map is locked in at (1) the preview zoom level (e.g., as shown at FIG. 42C, user interfaces 4244 and 4248 of FIG. 42I, user interface 4256 of FIG. 42J, etc.), (2) a highest zoom level that was reached in response to the increase in intensity of the contact above the maintain-context threshold (e.g., as shown at FIG. 42E, etc.) or (3) an intermediate zoom level that is between the preview zoom level and the highest zoom level reached in response to the increase in intensity of the contact above the maintain-context threshold (e.g., in the case where an overshoot of the zooming is implemented (e.g., an overshoot zoom level as illustrated at FIG. 42D, user interface 4260 of FIG. 42J, etc.) the final zoom level is slightly lower than the overshoot zoom level (e.g., a final zoom level is a zoom level as illustrated at FIG. 42C, FIG. 42E, 4262 of FIG. 42J, etc.).

In some embodiments, while maintaining the display of the map at the respective zoom level that is equal to or greater than the first zoom level, the device detects (4338) a predefined gesture directed to the zoomed map (e.g., the user can provide a predetermined gesture (e.g., a pinch gesture) to zoom back out). In response to detecting the predefined gesture directed to the zoomed map, the device ceases (4338) to display the map at the respective zoom level that is equal to or greater than the first zoom level and the device zooms the map to a fourth zoom level below the respective zoom level. In some embodiments, the fourth zoom level is the view of the map that includes the plurality of points of interest. In some embodiments, the amount of zoom from the respective zoom level to the fourth level is based on a magnitude the predetermined gesture (e.g., based a distance traversed by the pinch gesture).

In some embodiments, in response to detecting the increase in the characteristic intensity of the contact above the maintain-context intensity threshold (e.g. $IT_D$), zooming the map to the second zoom level above the first zoom level includes (4340) replacing the first user interface with a second user interface that includes the zoomed map at the second zoom level, and an affordance for returning to the first user interface (e.g., a "Back" button). For example, a second user interface is a user interface as illustrated at FIG. 42F (including zoomed map view 4206 and affordance 4224 for returning to the first user interface), a user interface as illustrated at FIG. 42G (including zoomed map view 4206 and affordance 4228 for returning to the first user interface), etc.

In some embodiments, the first user interface is an interface that includes a map showing avatars of multiple location-sharing friends of the user. When the user places a contact (e.g., a finger contact) on a respective location-sharing friend's avatar in the map and increases the characteristic intensity of the contact above the preview intensity threshold (e.g. $IT_L$), a preview showing a zoomed map around the respective location-sharing friend's location is displayed in a preview platter overlaid on top of the first user interface, or the map in the first user interface is zoomed around the respective location-sharing friend's location while other portions of the first user interface remain unchanged. When the contact intensity increases above the maintain-context intensity threshold (e.g., $IT_D$), a new, second user interface is displayed to replace the first user interface. In the second user interface, the map is displayed in a zoomed state (e.g., at the same zoom level as in the preview or at a higher zoom level). The second user interface also includes additional information about the respective location-sharing friend and affordances for various functions (e.g., contact the friend, etc.) that are not available in the first user interface.

In some embodiments, while displaying the second user interface (e.g., as illustrated at FIG. 42F or FIG. 42G), the device detects (4342) an input to invoke the affordance (e.g. 4224 of FIG. 42F or 4228 of FIG. 42G) for returning to the first user interface. In response to detecting the input to invoke the affordance for returning to the first user interface, the device ceases (4342) to display the second user interface and redisplays the first user interface with the view of the map that includes the plurality of points of interest (e.g., as illustrated at FIG. 42A). While the view of the map that includes the plurality of points of interest is redisplayed in the first user interface, the device detects (4342) a tap input on the touch sensitive surface while a focus selector is at the location of the respective point of interest (e.g., focus selector 4204 is at point of interest 4212, as shown in FIG. 42A). In response to detecting a tap input while the focus selector is at the location of the respective point of interest, the device replaces (4342) the first user interface (e.g., the user interface of FIG. 42A) with the second user interface (e.g., the user interface of FIG. 42F or FIG. 42G) that includes the zoomed map at the second zoom level (4206 of FIG. 42F or FIG. 42G) and the affordance for returning to the first user interface (e.g. 4224 of FIG. 42F or 4228 of FIG. 42G). In some embodiments, a selection of the respective point of interest (e.g., by a tap input) causes a contact card associated with the respective point of interest to be displayed in a new user interface, and a deep press input with a characteristic intensity increasing above the maintain-context intensity threshold directed to the respective point of interest also causes the contact card to displayed in a new user interface.

It should be understood that the particular order in which the operations in FIGS. 43A-43D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 4300 described above with respect to FIGS. 43A-43D. For brevity, these details are not repeated here.

Figure 44:
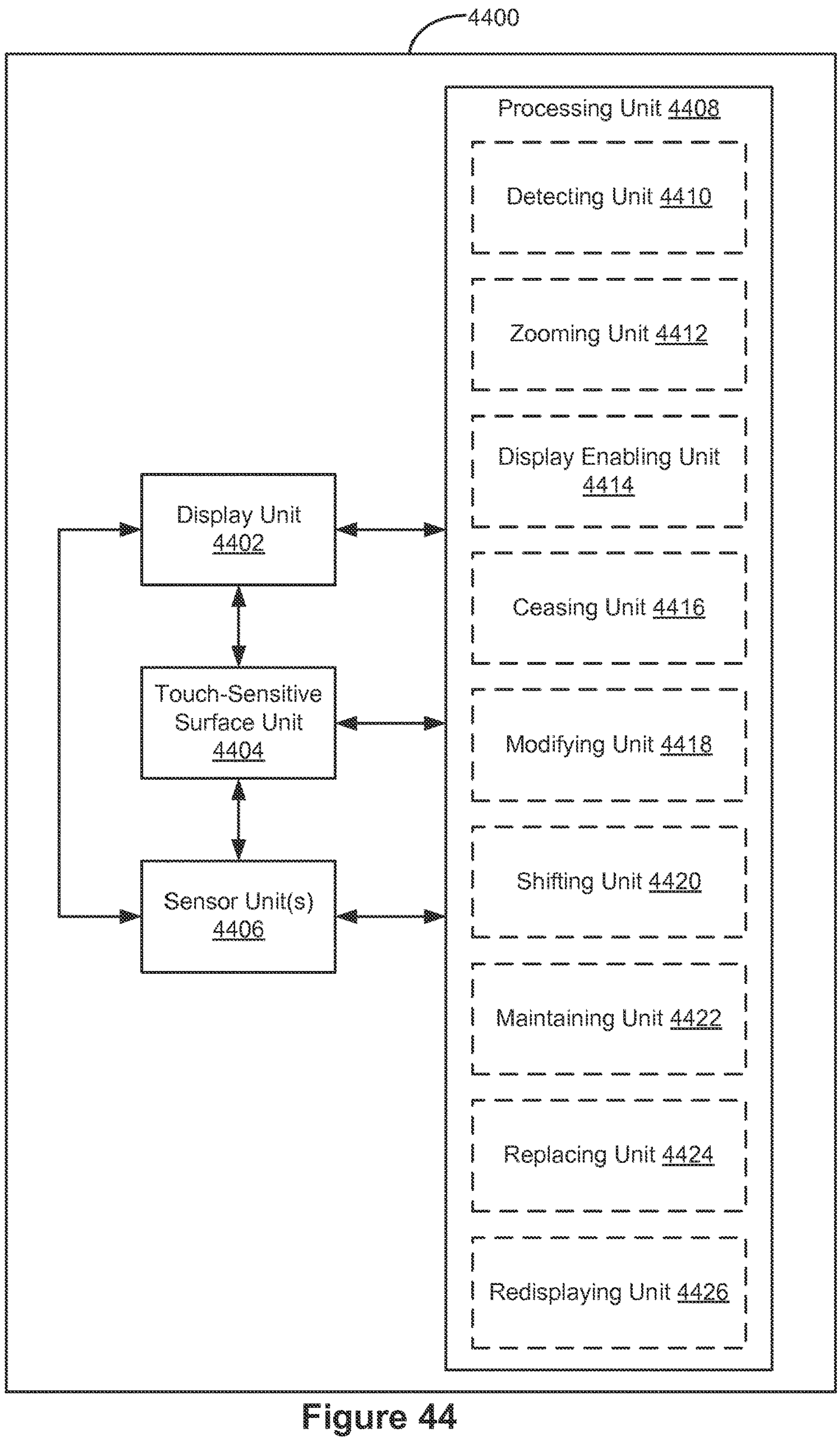
FIG. 44 is a functional block diagram of an electronic device in accordance with some embodiments.

In accordance with some embodiments, FIG. 44 shows a functional block diagram of an electronic device 4400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 44 are, optionally, combined or separated into sub-blocks to implement the principles of the various described embodiments. Therefore, the description herein optionally supports any possible combination or separation or further definition of the functional blocks described herein.

As shown in FIG. 44, an electronic device 4400 includes a display unit 4402; a touch-sensitive surface unit 4404; one or more sensor units 4406 configured to detect intensity of contacts on the touch-sensitive surface; and a processing unit 4408 coupled with the display unit 4402, the touch-sensitive surface unit 4404 and the one or more sensor units 4406. In some embodiments, the processing unit 4408 includes a detecting unit 4410, a zooming unit 4412, a display enabling unit 4414, a ceasing unit 4416, a modifying unit 4418, a shifting unit 4420, a maintaining unit 4422, a replacing unit 4424, and a redisplaying unit 4426.

The processing unit 4408 is configured to: enable display, in a first user interface on the display unit 4402, of a view of a map that includes a plurality of points of interest; while enabling display (e.g., with display enabling unit 4414) of the view of the map that includes the plurality of points of interest; and while a focus selector is at a location of a respective point of interest, detect (e.g., with detecting unit 4410) an increase in a characteristic intensity of the contact on the touch-sensitive surface unit 4404 above a preview intensity threshold; in response to detecting (e.g., with the detecting unit 4410) the increase in the characteristic intensity of the contact above the preview intensity threshold, zoom (e.g., with the zooming unit 4412) the map to enable display (e.g., with the display enabling unit 4414) of contextual information near the respective point of interest; after zooming (e.g., with the zooming unit 4412) the map, detect (e.g., with detecting unit 4410) a respective input that includes detecting a decrease in the characteristic intensity of the contact on the touch-sensitive surface below a predefined intensity threshold; and in response to detecting the respective input that includes detecting the decrease in the characteristic intensity of the contact: in accordance with a determination that the characteristic intensity of the contact increased above a maintain-context intensity threshold before detecting the respective input, continue to enable display (e.g., with the display enabling unit 4414) of the contextual information near the respective point of interest; and in accordance with a determination that the characteristic intensity of the contact did not increase above the maintain-context intensity threshold before detecting the respective input, cease to enable display (e.g., with the ceasing unit 4416) of the contextual information near the point of interest and redisplay the view of the map that includes the plurality of points of interest.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 42A-42N are, optionally, implemented by components depicted in FIGS. 1A-1B or FIG. 44. For example, detection operations 4304 and 4328 and zooming operation 4316 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Many electronic devices have graphical user interfaces that display a map at various zoom levels. For example, a map view including multiple points of interest can be displayed and the zoom level of the map can be increased to show contextual information for a particular point of interest. In the embodiments described below, a user interface displays a region with a view of a map including multiple points of interest and another region including representations of the points of interest (e.g., a list including information about the points of interest). When input received at a representation of a point of interest reaches a threshold intensity level, the view of the map is zoomed to show contextual information for the point of interest. Giving a user the ability to provide input with or without an intensity component allows additional functionality to be associated with the input.

Below, FIGS. 45A-45L illustrate exemplary user interfaces for zooming a map to display contextual information near a point of interest. FIGS. 46A-46D are flow diagrams illustrating a method of visually distinguishing objects in a user interface. The user interfaces in FIGS. 45A-45L are used to illustrate the processes in FIGS. 46A-46D.

FIGS. 45A-45L illustrate exemplary user interfaces for zooming a map to display contextual information near a point of interest in accordance with some embodiments. The user interfaces in these figures are used to illustrate the processes described below, including the processes in FIGS. 46A-46D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 45A-45L and 46A-46D will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts described in FIGS. 45A-45L on the touch-sensitive surface 451 while displaying the user interfaces shown in FIGS. 45A-45L on the display 450, along with a focus selector.

Figure 45A:
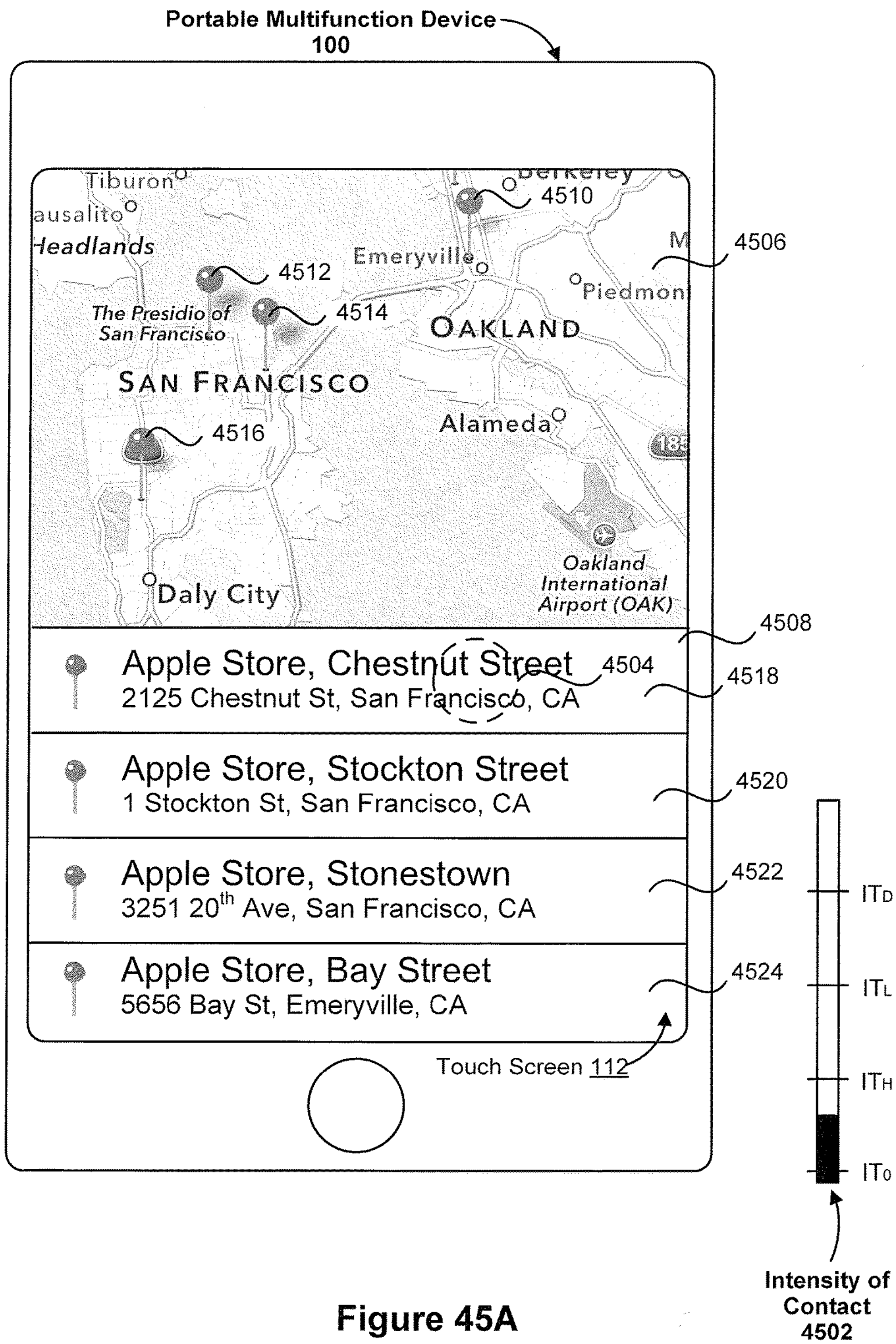
FIGS. 45A-45L illustrate exemplary user interfaces for zooming a map to display contextual information near a point of interest in accordance with some embodiments.

FIG. 45A illustrates a user interface that concurrently displays a view of a map (e.g., map view 4506) and a context region (e.g., context region 4508), in accordance with some embodiments. Map view 4506 includes points of interest 4510-4516. Context region 4508 includes representations 4518, 4520, 4522, and 4524 that correspond to points of interest 4512, 4514, 4516 and 4510, respectively. The points of interest are indicated by markers (i.e., map pins), as shown in map view 4506 and context region 4508. In some embodiments, the points of interest are search results of a query. In the illustrative example of FIG. 45A, points of interest 4510-4516 are search results of a query for "Apple Store" in an area near San Francisco, Calif.

A contact is detected on touch screen 112 at a location indicated by focus selector 4504 within context region 4508. Focus selector 4504 is at the location of representation 4518, corresponding to point of interest 4512. A characteristic intensity of the contact at the location indicated by focus selector 4504 is indicated by intensity meter 4502. In the illustrative example of FIG. 45A, the intensity of the contact is between a threshold intensity level $IT_0$ and a threshold intensity level $IT_H$ (e.g., a "hint" intensity threshold).

Figure 45B:
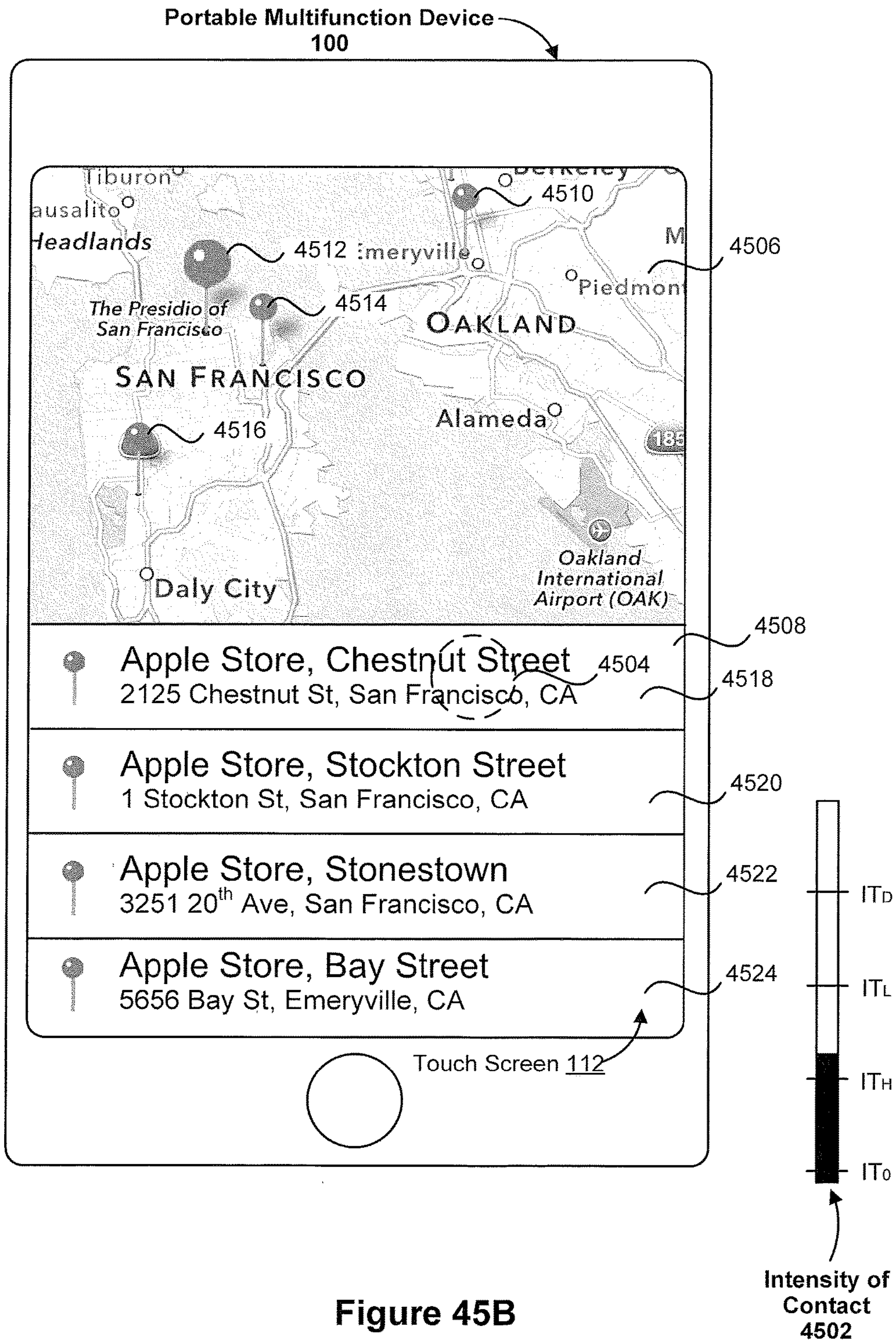

FIG. 45B illustrates a user interface displaying map view 4506 in which point of interest 4512 has a modified appearance, in accordance with some embodiments. In the illustrative example of FIG. 45B, the appearance of a map pin marker for point of interest 4512 is modified to show an enlarged pin head of the map pin marker. The appearance of point of interest 4512 is modified in accordance with a determination that a contact at the location of representation 4518 (corresponding to point of interest 4512), as indicated by focus selector 4504, has an intensity level exceeding an intensity threshold (e.g., exceeding "hint" intensity threshold $IT_H$, as illustrated at intensity meter 4502).

Figure 45C:
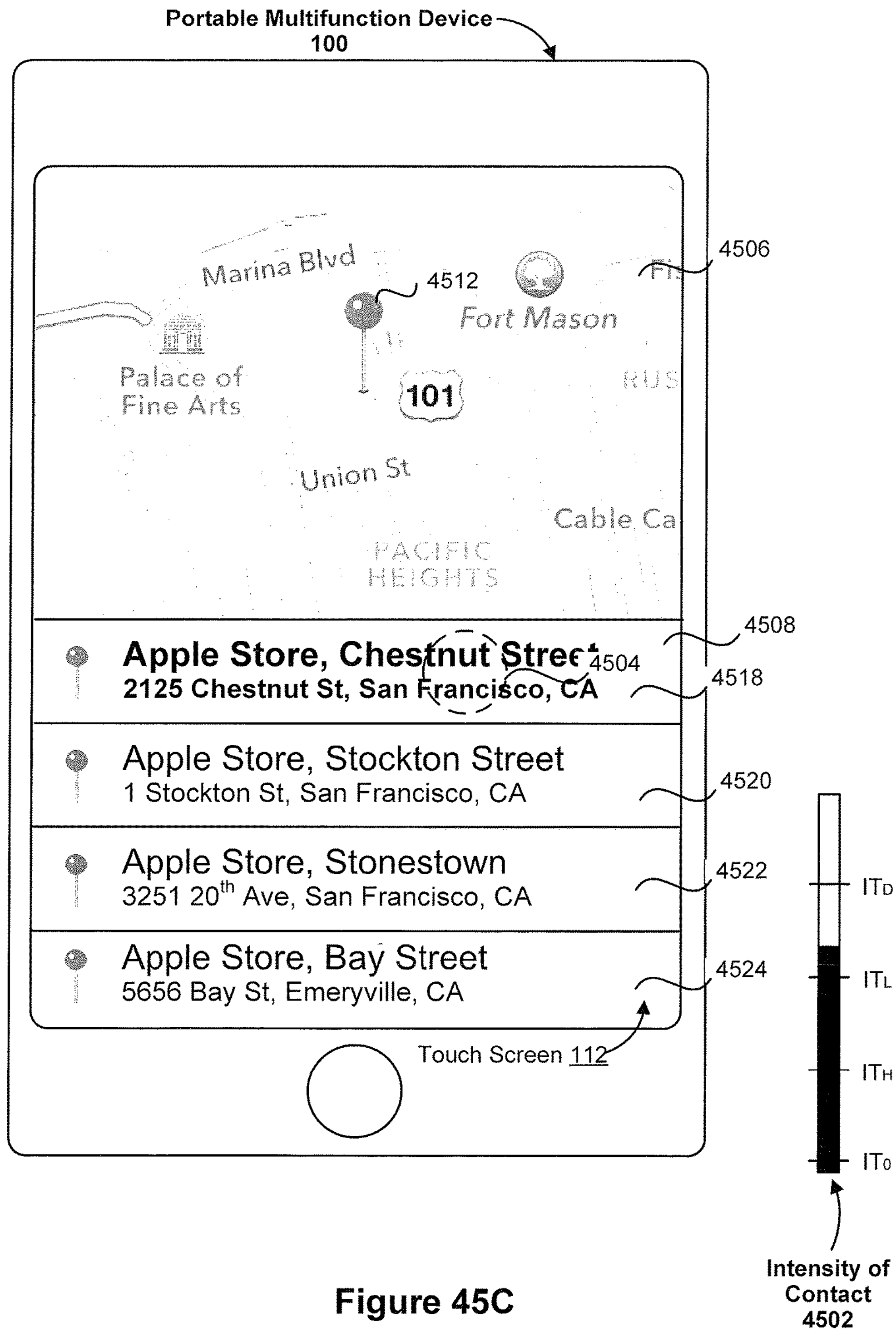

FIG. 45C illustrates a user interface displaying a view of a map (e.g., map view 4506) that is zoomed to display contextual information for point of interest 4512, in accordance with some embodiments. For example, in FIG. 45C, contextual information such as names of streets near point of interest 4512 (e.g., "Marina Blvd," and "Union St"), names of highways near point of interest 4512 (e.g., "101"), names of neighborhoods near point of interest 4512 (e.g., "Pacific Heights") and other points of interest near point of interest 4512 (e.g., "Palace of Fine Arts," "Fort Mason") are shown. The map view is zoomed to display contextual information in response to a detected increase in the characteristic intensity of a contact on touch screen 112 when a focus selector 4504 is located at representation 4518 corresponding to point of interest 4512. The contact has an intensity level exceeding an intensity threshold, such as a preview intensity threshold (e.g., exceeding a "light press" intensity threshold $IT_L$, as illustrated at intensity meter 4502).

Figure 45D:
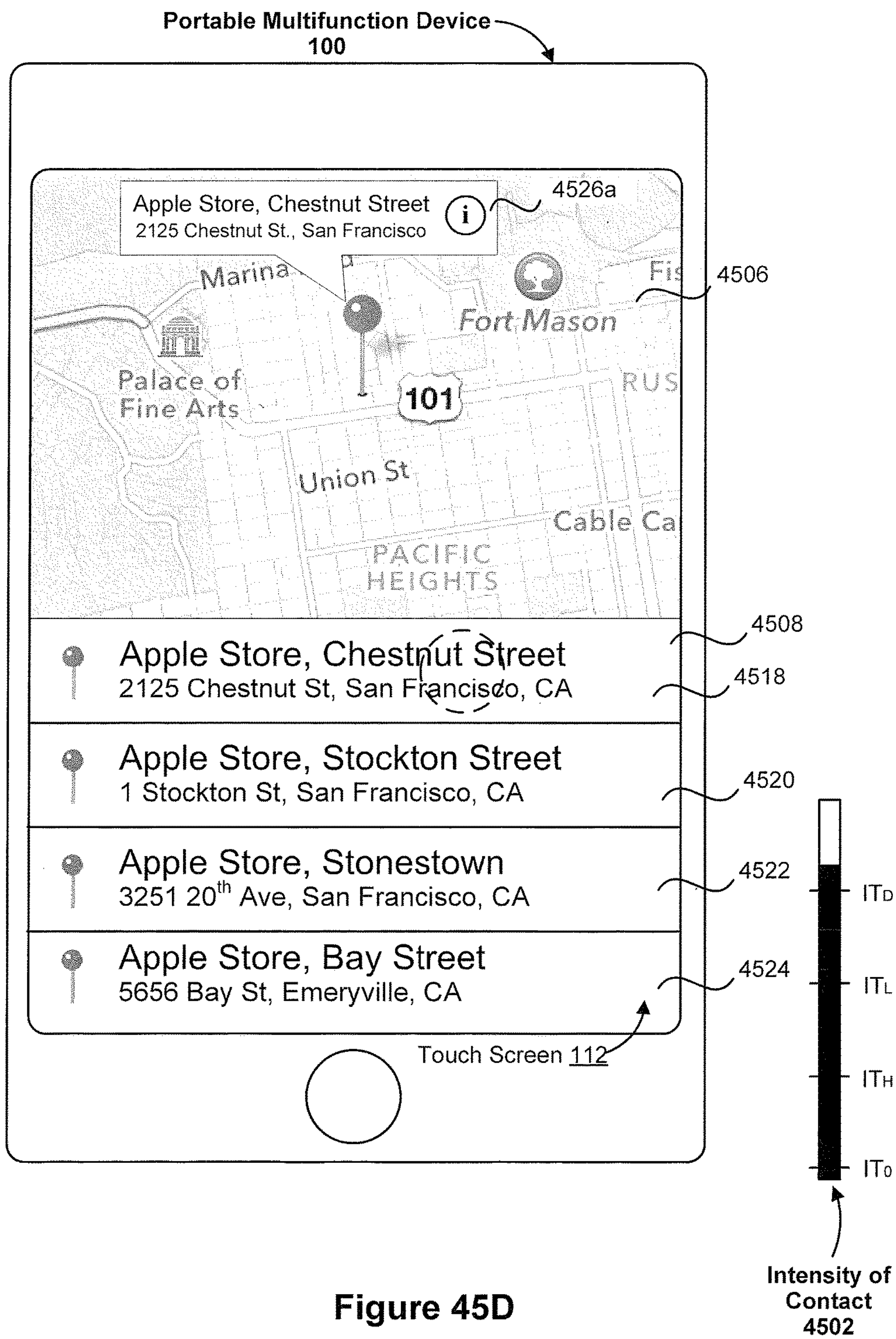
Figure 45E:
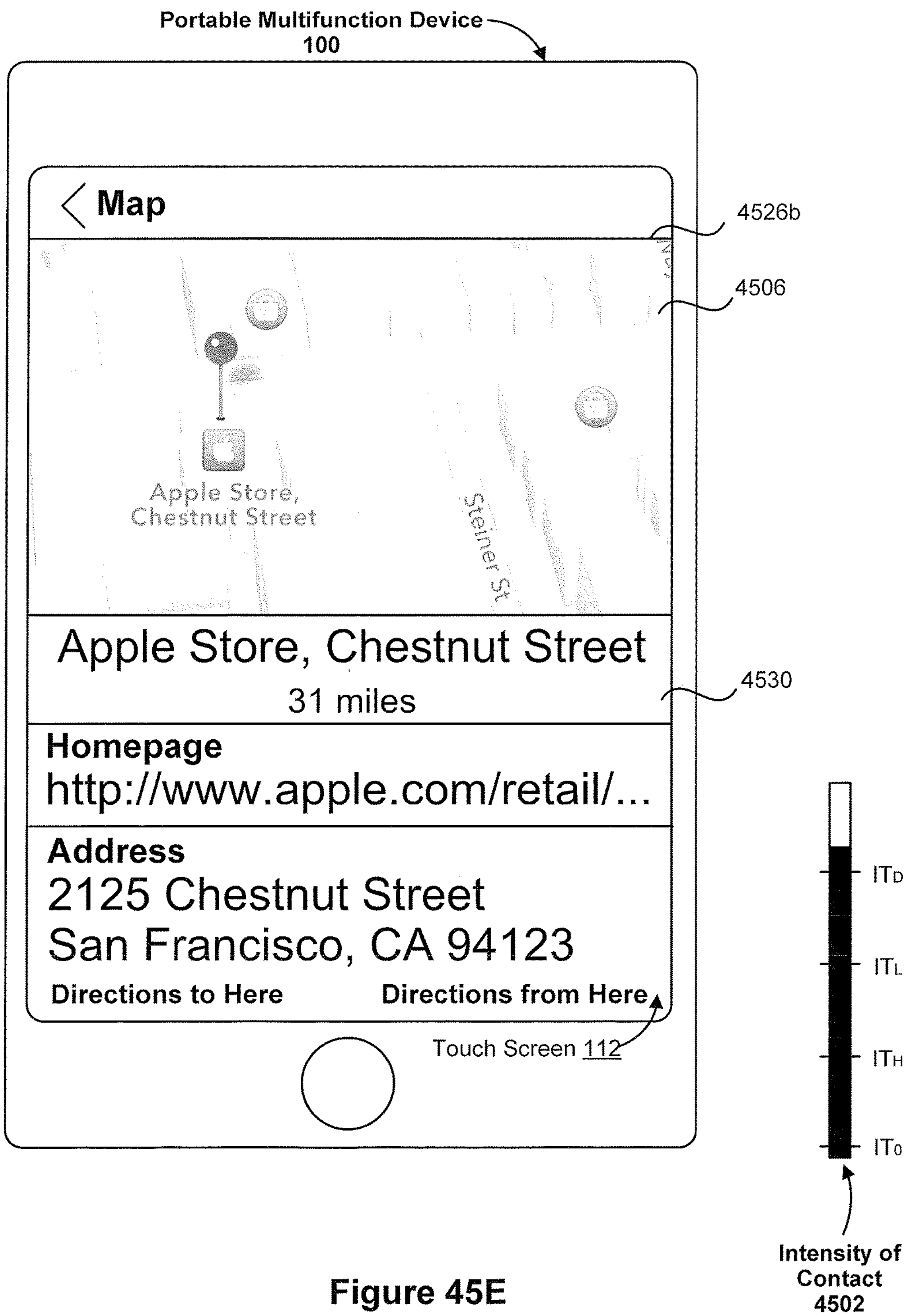
Figure 45F:
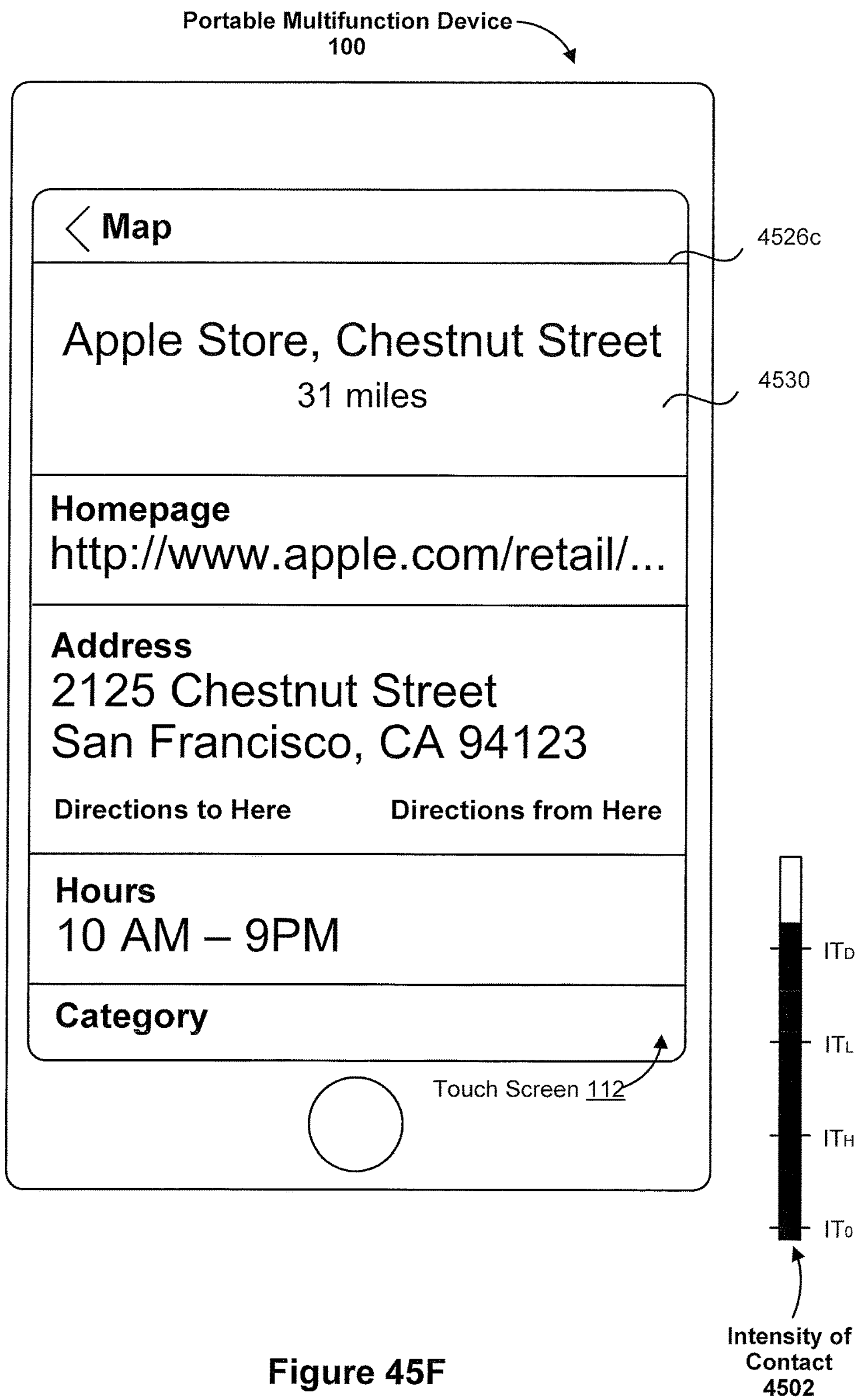

FIGS. 45D-45F illustrate a user interface displaying a location card 4526, in accordance with various embodiments. In some embodiments, in response to detecting an increase in the characteristic intensity of the contact above a respective intensity threshold (e.g., a "location card display intensity threshold" that corresponds to a "deep press" threshold $IT_D$ as indicated at intensity meter 4502) when focus selector 4504 is located at representation 4518 (corresponding to point of interest 4512), location card 4526 (e.g., location card 4526*a* in FIG. 45D, location card 4526*b* in FIG. 45E, location card 4526*c* in FIG. 45F, etc.) for point of interest 4512 is displayed. In some embodiments, the location card 4526 continues to be displayed when the characteristic intensity of the contact is reduced (e.g., below $IT_D$, below $IT_L$, below $IT_H$, below $IT_0$, on lift-off of the contact from touch screen 112, etc.).

As shown in FIG. 45D, in some embodiments, location card 4526*a* is a banner shown within map view 4506. In FIG. 45D, context region 4508 and map view 4506 showing location card 4526*a* are concurrently displayed in the same user interface.

As shown in FIG. 45E, in some embodiments, location card 4526*b* includes map view 4506 and location information region 4530. In the user interface shown in FIG. 45E, context region 4508 is no longer concurrently displayed with location card 4526*b* or map view 4506. In some embodiments, map view 4506 in location card 4526*b*, as illustrated in FIG. 45E, is zoomed past the zoom level of map view 4506 shown in FIG. 45C. In some embodiments, map view 4506 in location card 4526*b*, as illustrated in FIG. 45E, includes a 3D representation of map view 4506 shown in FIG. 45C (e.g., at a higher zoom level and shown with a 3D perspective). Location information region 4530 in location card 4526*b* includes additional information, such as name, web address, address information, etc. about point of interest 4618.

As shown in FIG. 45F, in some embodiments, location card 4526*c* includes a location information region 4530. The illustrative user interface of FIG. 45F does not include map view 4506 and does not include context region 4508.

Figure 45G:
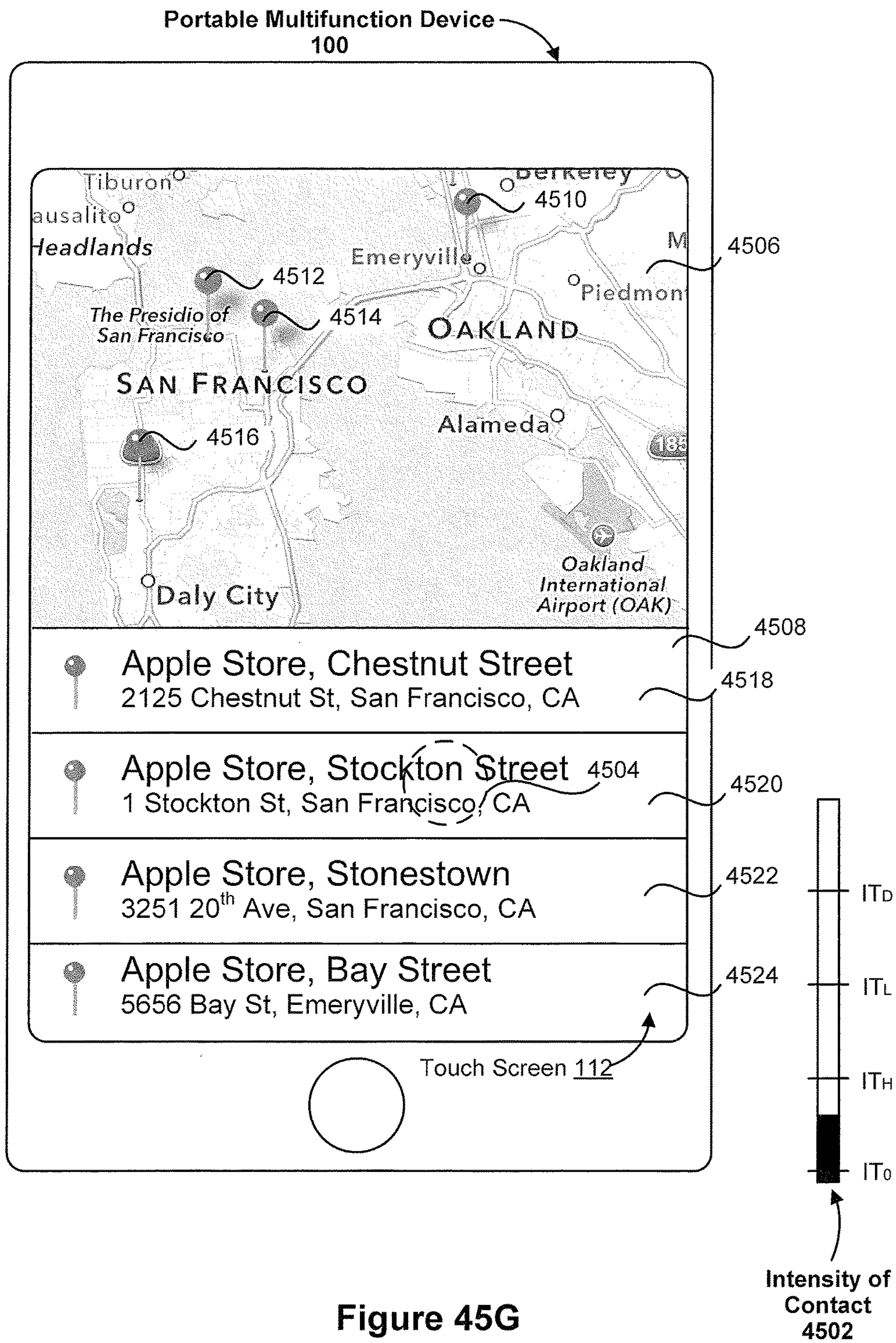

FIG. 45G illustrates a user interface that concurrently displays a view of a map (e.g., map view 4506) and a context region (e.g., context region 4508), in accordance with some embodiments. A contact is detected on touch screen 112 at a location indicated by focus selector 4504. Focus selector 4504 is at the location of representation 4520, corresponding to point of interest 4514. A characteristic intensity of the contact at the location indicated by focus selector 4504 is between a threshold intensity level $IT_0$ and a threshold intensity level $IT_H$, as indicated by intensity meter 4502.

Figure 45H:
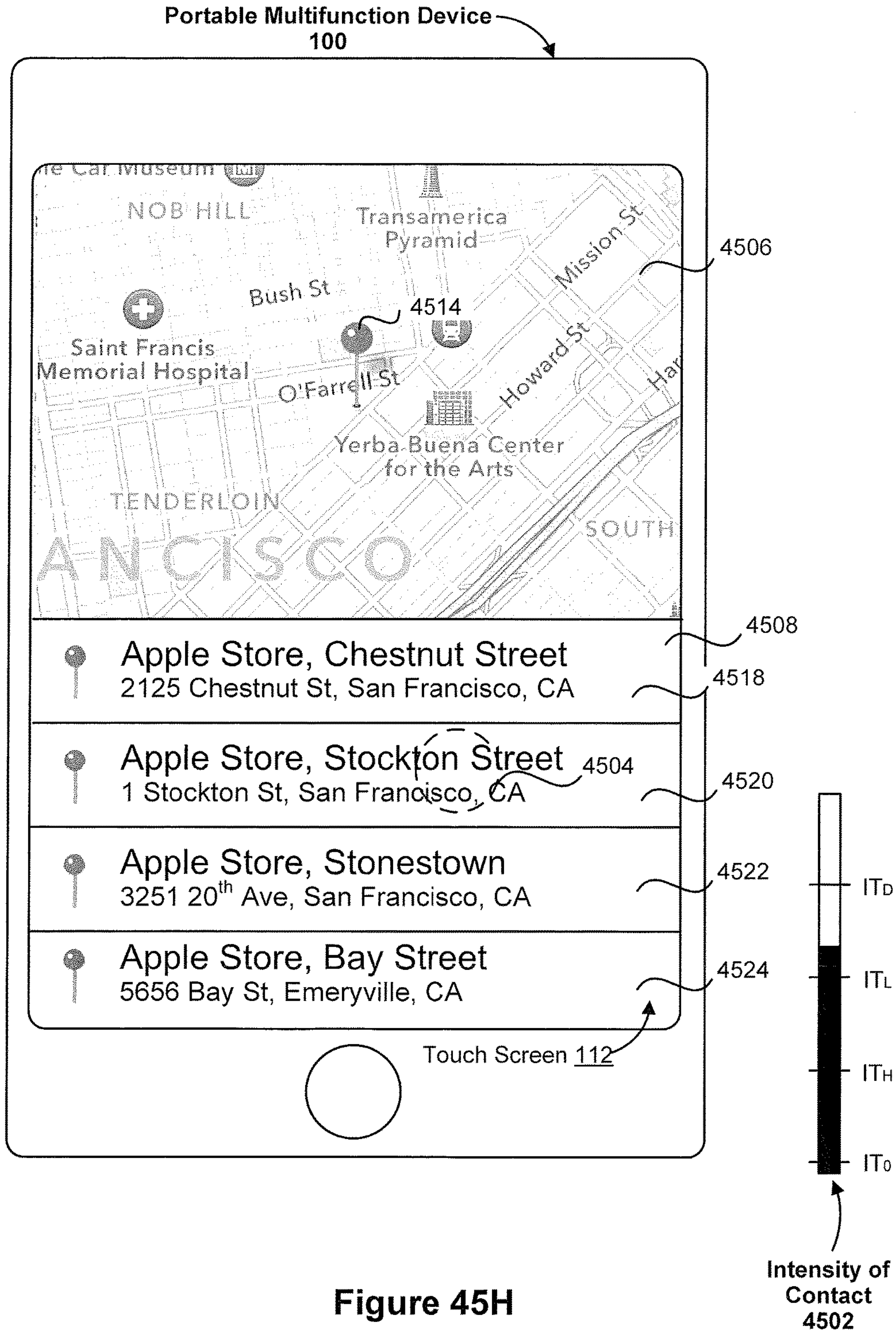

FIG. 45H illustrates a user interface displaying a view of a map (e.g., map view 4506) that is zoomed to display contextual information for point of interest 4514, in accordance with some embodiments. For example, in FIG. 45H, contextual information such as names of streets near point of interest 4514 (e.g., "O'Farrell St," "Mission St," and "Howard St"), names of neighborhoods near point of interest 4514 (e.g., "Nob Hill" and "Tenderloin"), and other points of interest near point of interest 4514 (e.g., "Yerba Buena Center for the Arts," "Transamerica Pyramid") are shown. The map view is zoomed to display contextual information in response to a detected increase in the characteristic intensity of a contact on touch screen 112 when a focus selector 4504 is located at representation 4520 corresponding to point of interest 4514. The contact has an intensity level exceeding an intensity threshold, such as a preview intensity threshold (e.g., exceeding a "light press" intensity threshold $IT_L$, as illustrated at intensity meter 4502). As shown in FIG. 45H, the map view is zoomed and centered around point of interest 4514.

Figure 45I:
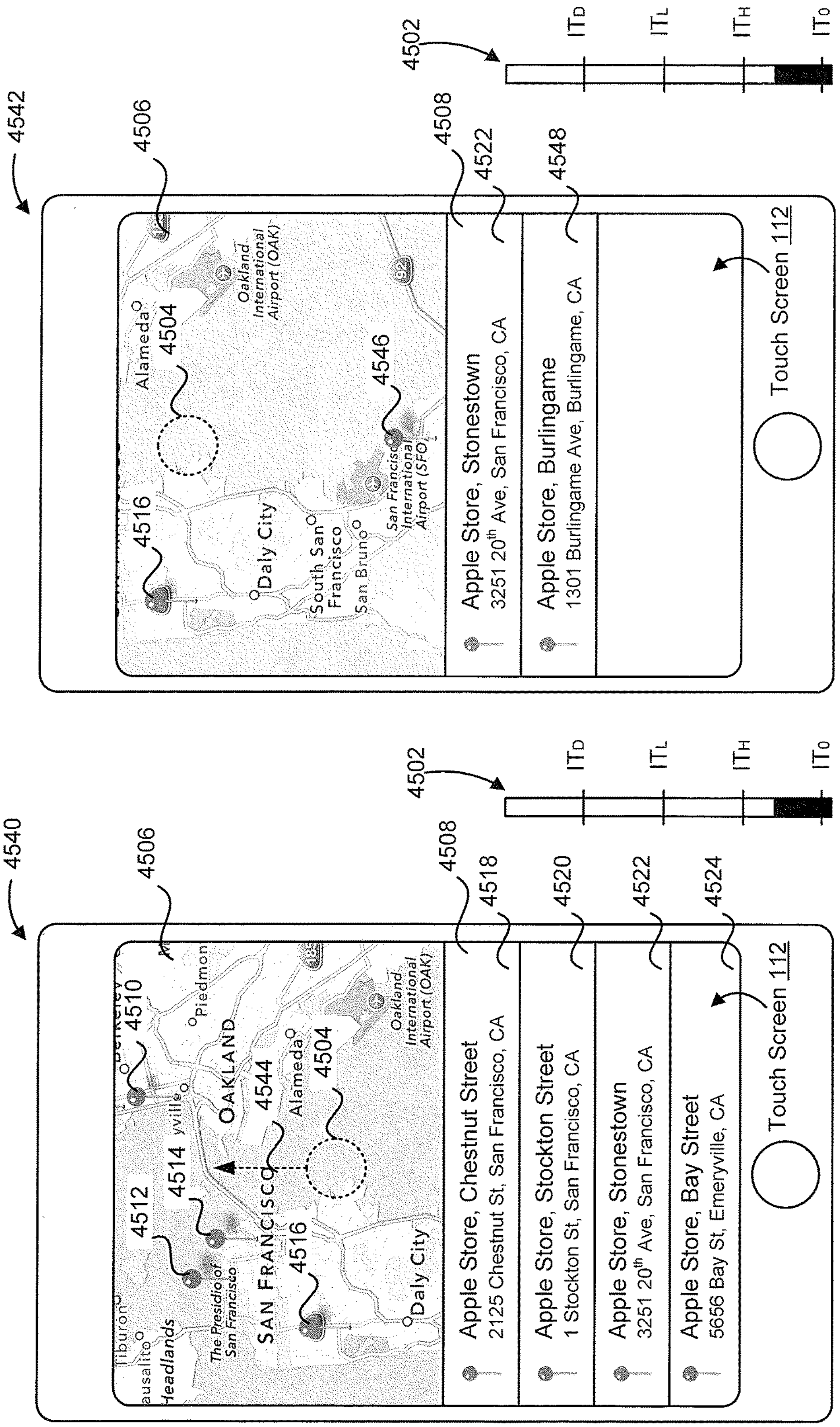

FIG. 45I illustrates a sequence of user interfaces 4540-4542 indicating a transition corresponding to a movement of the contact, in accordance with some embodiments. User interface 4540 concurrently displays a view of a map (e.g., map view 4506) and a context region (e.g., context 4508). Context region 4508 of user interface 4540 includes representations 4518, 4520, 4522, and 4524 that correspond to points of interest 4512, 4514, 4516 and 4510, respectively. A contact is moved across touch screen 112 of portable multifunction device 100 such that focus selector 4504 moves from a first location in map view 4506 to a second location in map view 4506 along a path indicated by arrow 4544. In user interface 4542, map view 4506 is shifted in accordance with the movement of the contact along the path indicated by arrow 4544, such that points of interest 4510, 4512, and 4514 are no longer shown and such that point of interest 4546 is shown. Context region 4508 of user interface 4542 is updated accordingly to include representation 4548 (indicating "Apple Store, Burlingame") corresponding to point of interest 4546. In some embodiments, the intensity of the contact while the focus selector moves from a first location to a second location along the path indicated by arrow 4544 is below a threshold intensity level (e.g., below $IT_H$ as shown in intensity meter 4502 adjacent to user interface 4540 and as shown in intensity meter 4502 adjacent to user interface 4542), and the zoom level of map view 4506 is maintained during the transition shown in FIG. 45I.

Figure 45J:
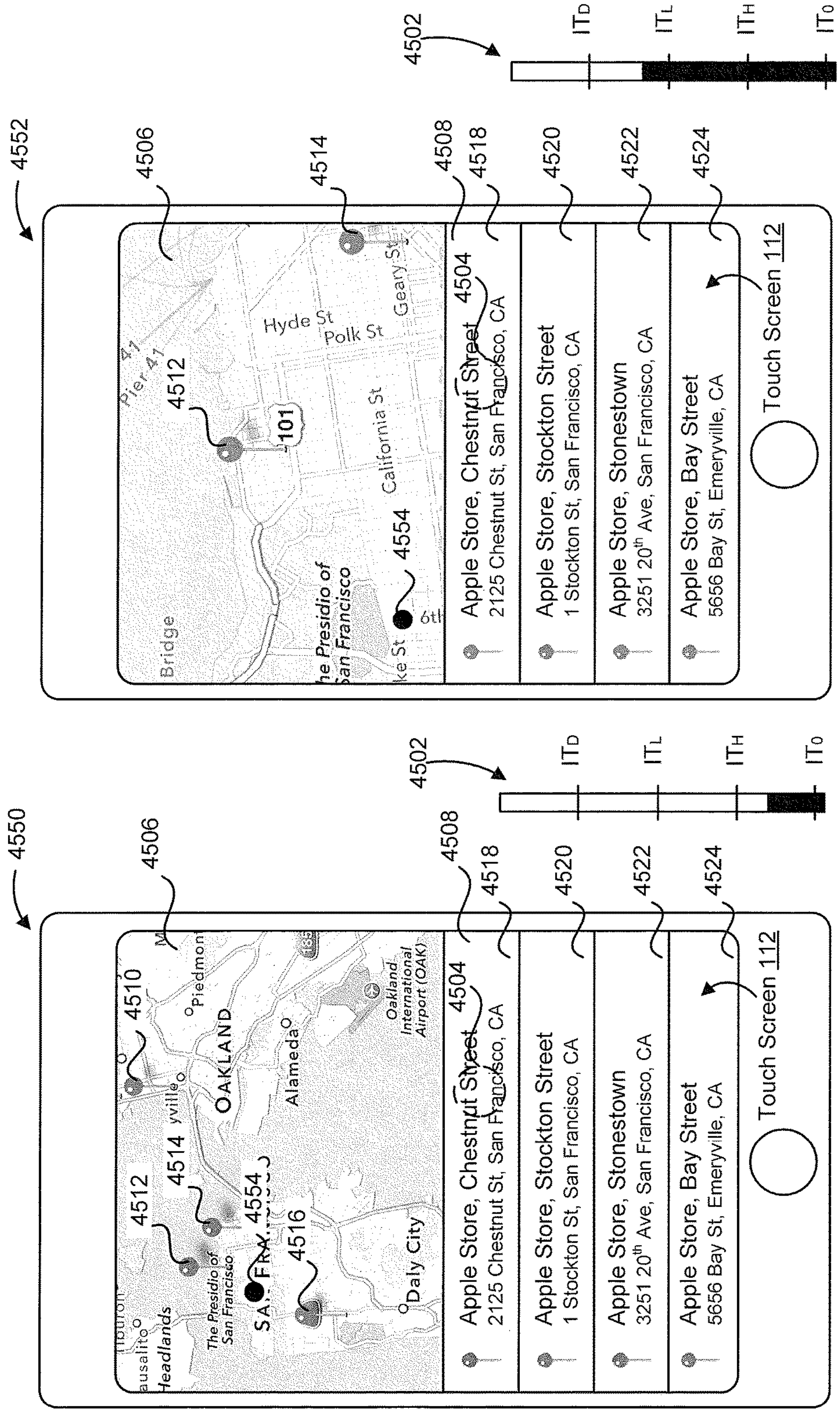

FIG. 45J illustrates a sequence of user interfaces 4550-4552 indicating a transition from displaying a view of map (e.g., map view 4506) including multiple points of interest to displaying contextual information for point of interest 4512, including displaying a location of portable multifunction device 100.

User interface 4550 concurrently displays, on touch screen 112 of portable multifunction device 100, a view of a map (e.g., map view 4506) and a context region (e.g., context region 4508). Map view 4506 includes multiple points of interest 4510-4516 and location indicator 4554 indicating the location of portable multifunction device 100. A contact is detected on touch screen 112 at a location indicated by focus selector 4504. Focus selector 4504 is at the location of representation 4518, corresponding to point of interest 4512. A characteristic intensity of the contact at the location indicated by focus selector 4504 is between a threshold intensity level $IT_0$ and a threshold intensity level $IT_H$, as indicated by intensity meter 4502 adjacent to 4550.

In user interface 4552, map view 4506 is zoomed to display contextual information for point of interest 4512 in response to a detected increase in the characteristic intensity of a contact on touch screen 112 when a focus selector 4504 is located at representation 4518 (corresponding to point of interest 4512). The contact has an intensity level exceeding an intensity threshold, such as a preview intensity threshold (e.g., intensity threshold $IT_L$, as illustrated at intensity meter 4502 adjacent to 4552). Map view 4506 includes point of interest 4512 and location indicator 4554 indicating the location of portable multifunction device 100. In some embodiments, a zoom level of map view 4506 in user interface 4552 is determined such that point of interest 4512 and location indicator 4554 are concurrently visible in map view 4506.

Figure 45K:
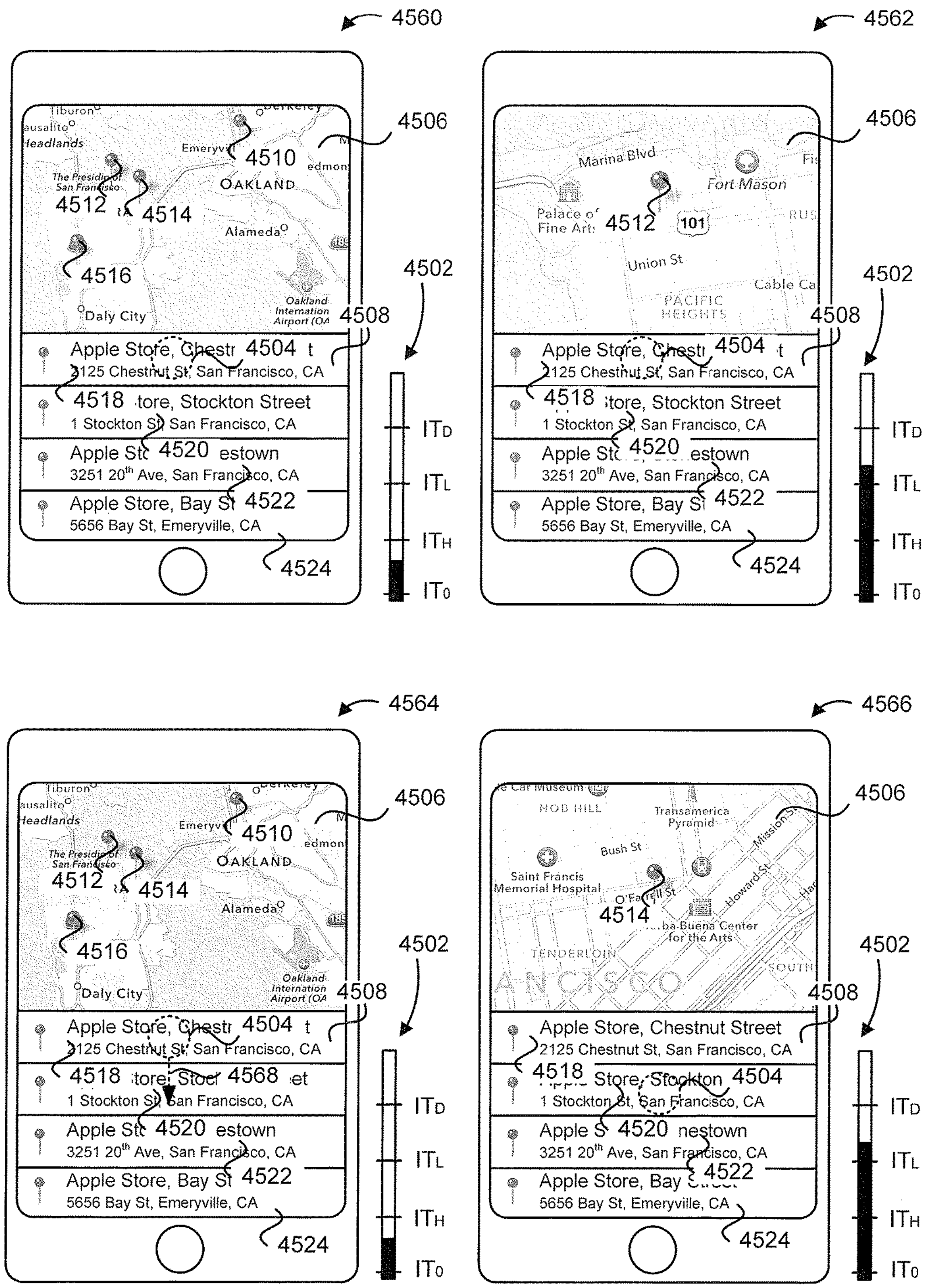

FIG. 45K illustrates a sequence of user interfaces 4560-4566 indicating a transition from displaying a view of a map (e.g., map view 4506 in user interface 4560) including multiple points of interest, to displaying a view of the map (e.g., map view 4506 in user interface 4562) that is zoomed to display contextual information for point of interest 4512, to redisplaying a view of the map (e.g., map view 4506 in user interface 4564) including multiple points of interest, to displaying a view of the map (e.g., map view 4506 in user interface 4566) that is zoomed to display contextual information for point of interest 4514, in accordance with some embodiments.

User interface 4560 concurrently displays, on touch screen 112 of portable multifunction device 100, a view of a map 4506 and a context region 4508. The view of the map 4506 includes multiple points of interest 4510-4516. A contact is detected at touch screen 112 at a location indicated by focus selector 4504. Focus selector 4504 is at the location of representation 4518, corresponding to point of interest 4512. A characteristic intensity of the contact at the location indicated by focus selector 4504 is between a threshold intensity level $IT_0$ and a threshold intensity level $IT_H$, as indicated by intensity meter 4502 adjacent to 4560.

In user interface 4562, the view of the map (e.g., map view 4506) is zoomed to display contextual information for point of interest 4512 in response to a detected increase in the characteristic intensity of a contact on touch screen 112 when a focus selector 4504 is located at representation 4518 corresponding to point of interest 4512. The contact has an intensity level exceeding an intensity threshold, such as a preview intensity threshold (e.g., above intensity threshold $IT_L$, as illustrated at intensity meter 4502 adjacent to 4562).

In response to detecting a decrease in the intensity of the contact below the intensity threshold (e.g., below intensity threshold $IT_L$, as illustrated at intensity meter 4502 adjacent to 4564), portable multifunction device 100 redisplays user interface 4564 with the view of the map (e.g., map view 4506, as shown in user interface 4560) that includes multiple points of interest 4510-4516. While the view of the map (e.g., map view 4506) that includes multiple points of interest 4510-4516 is redisplayed as indicated in user interface 4564, the contact moves across touch screen 112 of portable multifunction device 100 such that focus selector 4504 moves from a location over representation 4518 to a location over representation 4520 along a path indicated by arrow 4568.

After movement of the contact along the path indicated by arrow 4568, portable multifunction device 100 detects an increase in the intensity of the contact above the intensity threshold (e.g., above intensity threshold $IT_L$, as illustrated at intensity meter 4502 adjacent to 4566). In response to detecting the increase in the intensity of the contact while focus selector 4504 is at a location over representation 4520 (which corresponds to point of interest 4514), the view of the map (e.g., map view 4506) is zoomed to display contextual information for point of interest 4514, as shown in user interface 4566.

Figure 45L:
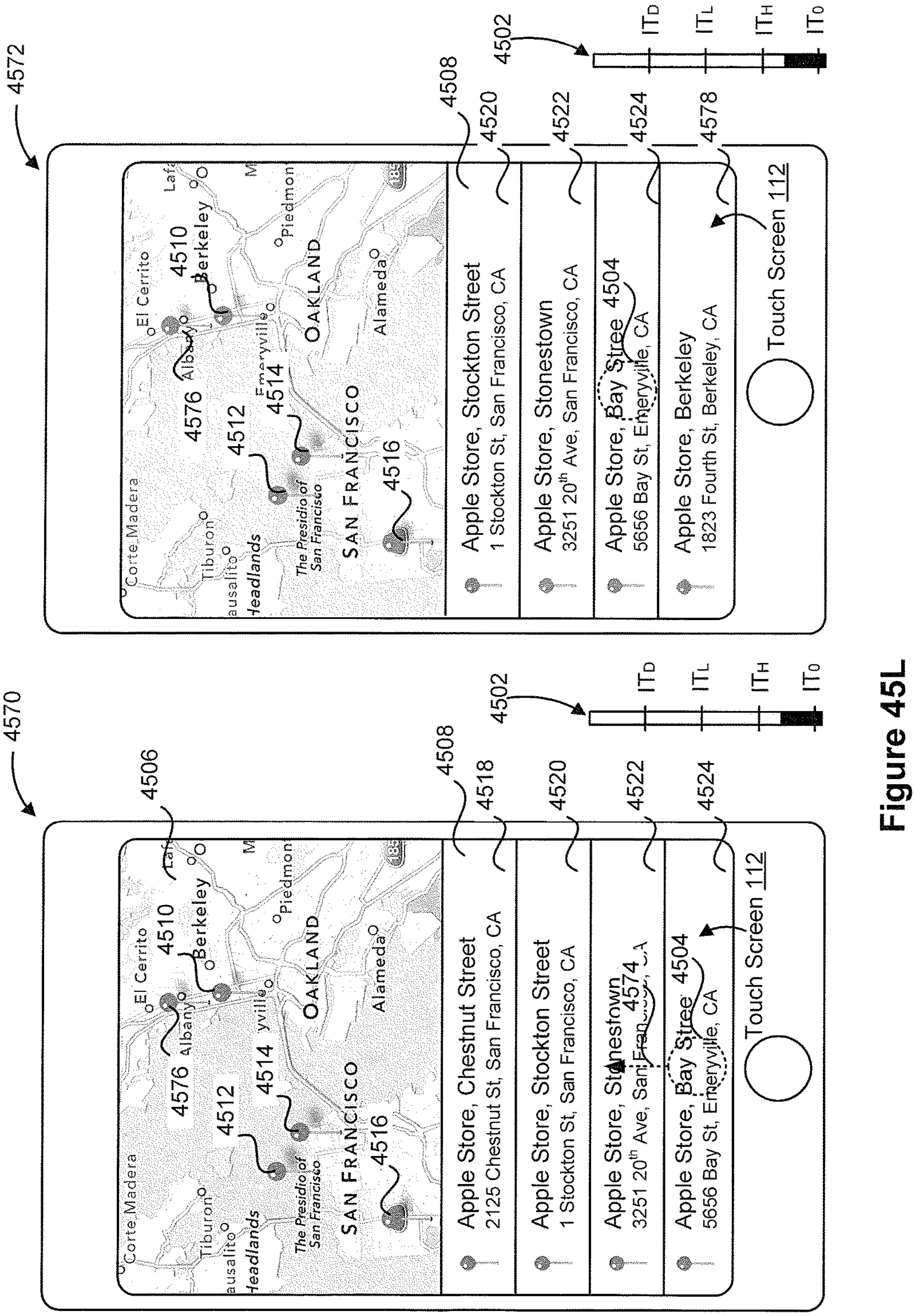

FIG. 45L illustrates a sequence of user interfaces 4570-4572 indicating a transition corresponding to a movement of a contact in context region 4508, in accordance with some embodiments. User interface 4570 concurrently displays a view of a map (e.g., map view 4506) and a context region (e.g., context region 4508). Map view 4506 includes points of interest 4510, 4512, 4514, 4516, and 4576. Context region 4508 of user interface 4570 includes representations 4518, 4520, 4522, and 4524 that correspond to points of interest 4512, 4514, 4516 and 4510, respectively. A contact is moved across touch screen 112 of portable multifunction device 100 such that focus selector 4504 moves from a first location in context region 4508 to a second location in context region 4508 along a path indicated by arrow 4574. The context region 4508 is scrolled in accordance with the movement of the contact along the path indicated by arrow 4574, such that, as illustrated in user interface 4572, representation 4518 is no longer shown in context region 4508 and such that representation 4578 (indicating "Apple Store, Berkeley") corresponding to point of interest 4576 is shown in context region 4508. In some embodiments, the intensity of the contact while the focus selector moves from a first location to a second location along the path indicated by arrow 4574 is below a threshold intensity level (e.g., below $IT_H$ as shown in intensity meter 4502 adjacent to user interface 4570 and as shown in intensity meter 4502 adjacent to user interface 4572.)

FIGS. 46A-46D are flow diagrams illustrating a method 4600 of zooming a map in accordance with some embodiments. The method 4600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 4600 are, optionally, combined and/or the order of some operations is, optionally, changed.

As described below, the method 4600 provides an intuitive way to zoom a map. The method reduces the cognitive burden on a user when zooming a map, thereby creating a more efficient human-machine interface. For battery-operated electronic devices, enabling a user to zoom a map faster and more efficiently conserves power and increases the time between battery charges.

The device concurrently displays (4602) in a user interface on the display: a map view (e.g., map view 4506 in FIG. 45A) that includes a plurality of points of interest (e.g., points of interest 4510-4516 in FIG. 45A) and a context region (e.g., context region 4508 in FIG. 45A) that is distinct from the map view and includes a representation of a first point of interest (e.g., point of interest 4518 in FIG. 45A) from the plurality of points of interest and a representation of a second point of interest (e.g., point of interest 4520 in FIG. 45A) from the plurality of points of interest. Points of interest include, for example, restaurants, shops, and other types of businesses; hospitals, recreation areas, educational facilities, travel facilities, monuments, and other types of facilities; lakes, rivers, mountains, and other geographical landmarks; residences; location of the user and/or locations of other users; location of the device and/or locations of other devices; and so on. In some embodiments, the map with the plurality of points of interest is displayed in response to a query and includes search results for the query. In some embodiments, a point of interest is a user (e.g., a person who has made location of their portable device available, e.g., via an application (such as an application for indicating locations of other users, an application for indicating a location of a device (e.g., a lost device), etc.). In some embodiments, a point of interest is a portable or otherwise mobile device, an object to which a location-sharing device is attached, etc. In some embodiments, a context region (e.g., context region 4508 in FIG. 45A) is a region of the user interface that displays a list or other presentation including entries for multiple points of interest, such as an entry for each point of interest shown in the map view (e.g., entries 4518, 4520, 4522, and 4524 of region 4508, corresponding to points of interest 4512, 4514, 4516, and 4510, respectively, of map view 4506 in FIG. 45A), entries for a number (e.g., fixed number) of entries closest to current user location, etc.

In some embodiments, the representations of the first and second points of interest in the context region (e.g., representations 4518 and 4520 in context region 4508 of points of interest 4512 and 4514, respectively, shown in map view 4506) include (4604) additional information (e.g., text description of the address, rating, number of reviews, name, hours of operation, one or more images associated with the point of interest, a category description of the point of interest, a cost indicator, a distance from current user location, etc.) about the first and second points of interest that is not displayed in the map view, as shown in FIG. 45A, for example.

While concurrently displaying the map view and the context region on the display, the device detects (4606) an increase in a characteristic intensity of a contact on the touch-sensitive surface (e.g., touch screen 112) above a respective intensity threshold (e.g., a light press threshold ($IT_L$), or a preview intensity threshold). For example, in FIG. 45C, a characteristic intensity of a contact on touch screen 112 at a location indicated by focus selector 4504 is above an intensity level $IT_L$, as indicated by intensity meter 4502.

In response to detecting the increase in the characteristic intensity of the contact above the respective intensity threshold (e.g., the light press threshold ($IT_L$), or a preview intensity threshold), in accordance with a determination that a focus selector (e.g., focus selector 4504 in FIG. 45A) was at a location of the representation of the first point of interest in the context region (e.g., focus selector 4504 is at a location of point of interest 4518 in context region 4508, as shown in FIG. 45A) when the increase in the characteristic intensity of the contact above the respective intensity threshold (e.g., $IT_L$) was detected (e.g., an increase in the characteristic intensity above $IT_L$ as indicated by intensity meter 4502 in FIG. 45C), the device zooms (4608) the map view (e.g., map view 4506) to display respective contextual information for the first point of interest around the first point of interest (e.g., point of interest 4512) in the map view (e.g., zooming map view 4506 from the map view 4506 as shown in 45A to the map view 4506 shown in FIG. 45C). In map view 4506 of FIG. 45C, contextual information such as street names (e.g., "Marina Blvd," "Union St"), highway names (e.g., 101), neighborhood names (e.g., "Pacific Heights"), and names of other features (e.g., "Palace of Fine Arts," "Fort Mason"), etc., around first point of interest 4512 is shown. In accordance with a determination that the focus selector (e.g., focus selector 4504 in FIG. 45G) was at a location of the representation of the second point of interest in the context region (e.g., focus selector 4504 is at a location of point of interest 4520 in context region 4508, as shown in FIG. 45H) when the increase in the characteristic intensity of the contact above the respective intensity threshold (e.g., $IT_L$) was detected (e.g., an increase in the characteristic intensity above $IT_L$ as indicated by intensity meter 4502 in FIG. 45H), the device zooms (4608) the map view (e.g., map view 4506) to display respective contextual information for the second point of interest around the second point of interest (e.g., point of interest 4514) in the map view (e.g., zooming map view 4506 from map view 4506 as shown in 45G to map view 4506 shown in FIG. 45H). In some embodiments, zooming the map view is accompanied by centering the map around a corresponding point of interest. In some embodiments, after zooming the map view, at least one of the visible points of interest in the original map view is no longer visible in the zoomed map view. For example, points of interest 4510 and 4516 from the original map view shown in FIG. 45A are not visible in the zoomed map views of FIG. 45C and FIG. 45H.

In some embodiments, when zooming the map view, the context region is not zoomed (4610). For example, when the map view 4506 is zoomed from the view shown in FIG. 45A to the view shown in FIG. 45C, context region 4508 is not zoomed. Similarly, when the map region 4506 is zoomed from the view shown in FIG. 45E to the view shown in FIG. 45F, context region 4508 is not zoomed.

In some embodiments, zooming the map view to display the respective contextual information for the first point of interest around the first point of interest (e.g., point of interest 4512) in the map view (e.g., map view 4506 in 45J) includes (4612) zooming the map to a first zoom level so as to concurrently display a location of the electronic device and the first point of interest. For example, as shown in FIG. 45J, zooming the map view from map view 4506 as shown in user interface 4550 to map view 4506 as shown in user interface 4552 includes concurrently displaying location 4554 of the electronic device and the first point of interest 4512. Zooming the map view to display the respective contextual information for the second point of interest around the second point of interest in the map view includes (4612) zooming the map to a second zoom level so as to concurrently display the location of the electronic device and the second point of interest. In some embodiments, when the first and second points of interest are at different distances away from the location of the electronic device, the first zoom level and the second zoom level may be different. In some embodiments, this rule for dynamically selecting an appropriate zoom level to concurrently displaying both the selected point of interest and the location of the device is used when certain conditions are met (e.g., when the electronic device and the selected point of interest are sufficiently close to each other, such as within 1 mile or some other predefined distance in map space, in screen space, etc.).

In some embodiments, zooming the map view to display the respective contextual information for the first point of interest around the first point of interest in the map view includes ceasing (4614) to display the second point of interest in the zoomed map view (e.g., FIG. 45C shows the first point of interest 4512 in the zoomed map view 4506 and does not display the second point of interest 4514 in the zoomed map view 4506). In some embodiments, map view 4506 is zoomed such that the second point of interest (e.g., point of interest 4514) does not appear in map view 4506. In some embodiments, the second point of interest (e.g., point of interest 4514) is removed from map view 4506.

In some embodiments, zooming the map view to display the respective contextual information for the second point of interest around the second point of interest in the map view includes ceasing (4616) to display the first point of interest in the zoomed map view (e.g., FIG. 45H shows the second point of interest 4514 in the zoomed map view 4506 and does not display the first point of interest 4512 in the zoomed map view 4506.) In some embodiments, map view 4506 is zoomed such that the first point of interest (e.g., point of interest 4512) does not appear in map view 4506. In some embodiments, the first point of interest (e.g., point of interest 4512) is removed from map view 4506.

In some embodiments, the device detects (4618) a movement of the contact on the touch-sensitive surface (e.g., touch screen 112) that corresponds to a movement of the focus selector (e.g., focus selector 4504) in the map view (e.g., map view 4506) (e.g., a movement along a path indicated by arrow 4544 in FIG. 45I). In response to detecting the movement of the contact that corresponds to the movement of the focus selector in the map view, the device shifts (4618) the map view in accordance with the movement of the focus selector (e.g., as shown in FIG. 45I, map view 4506 is shifted from the view shown in user interface 4540 to the view shown in user interface 4542. The shifted map view includes a third point of interest (e.g., the "Apple store in Burlingame, Calif." as indicated at representation 4522 corresponding to point of interest 4546 shown in map view 4506 of user interface 4542) that was not among the plurality of points of interest represented in the context region and the map view before the shifting of the map view. In some embodiments, the third point of interest is displayed in the shifted map view and the updated context region based on predetermined matching criteria (e.g., meeting search criteria such as "Apple Store," "restaurants," "coffee shops," etc., and having locations corresponding to a geographic area shown in the shifted map view.

In some embodiments, while displaying the zoomed map view with the respective contextual information for one of the first or second point of interest, the device detects (4620) a decrease in intensity of the contact on the touch-sensitive surface below a second respective intensity threshold (e.g., a decrease in intensity of the contact below $IT_L$, a decrease in intensity of the contact below $IT_H$, a lift-off of the contact from the touch screen 112, etc.) while the focus selector is at the location of the representation of said one of the first or second point of interest. In response to detecting the decrease in the characteristic intensity of the contact below the second respective intensity threshold, the device reverses (4620) the zooming of the map view. For example, in FIG. 45K, zoomed map view 4506 shown in user interface 4562 includes contextual information for point of interest 4512. The intensity of the contact at the location indicated by focus selector 4504 decreases below $IT_L$, as illustrated by the transition from intensity meter 4502 adjacent to user interface 4562 (intensity level above $IT_L$) to intensity meter 4502 adjacent to user interface 4564 (intensity level reduced below $IT_L$). In response to the decrease in the intensity, the device reverses the zooming of the map from the map view 4506 shown in user interface 4562 to the map view 4506 shown in user interface 4564.

In some embodiments, after reversing the zooming of the map view, the device detects (4622) a movement of the contact on the touch-sensitive surface that corresponds to a movement of the focus selector from the location of the representation of said one of the first or second point of interest to a location of a representation of a different point of interest shown in the context region (e.g., a third point of interest shown in the context region, or the other one of the first and second point of interest) in the map view. For example, in FIG. 45K, focus selector 4504 moves along a path indicated by arrow 4568, as indicated in user interface 4564, from the location of representation 4518 of point of interest 4512 to the location of representation 4520 of point of interest 4514. The device detects (4622) an increase in the characteristic intensity of the contact on the touch-sensitive surface above the respective intensity threshold while the focus selector is at the location of the representation of the different point of interest (e.g., the third point of interest shown in the context region, or the other one of the first and second point of interest) in the context region. For example, in FIG. 45K, when focus selector 4504 is at the location of representation 4520 of point of interest 4514, the characteristic intensity of the contact on touch screen 112 increases, as indicated at intensity meter 4502 shown adjacent to user interface 4566. In response to detecting the increase in the characteristic intensity of the contact above the respective intensity threshold while the focus selector is at the location of the representation of the different point of interest (e.g., the third point of interest shown in the context region, or the other one of the first and second point of interest) in the context region, the device zooms (4622) the map view to display respective contextual information for said different point of interest around said different point of interest in the map view. For example, in FIG. 45K, when focus selector 4504 is at the location of representation 4520 of point of interest 4514 and the characteristic intensity of the contact on touch screen 112 has increased above $IT_L$, as indicated at intensity meter 4502 shown adjacent to user interface 4566, map view 4506 is zoomed to display contextual information for 4514.

In some embodiments, while the focus selector is at the location of the representation of one of the first or second point of interest: in response to detecting the increase in the characteristic intensity of the contact above the respective intensity threshold, the device changes (4624) an appearance of said one of the first or second point of interest in the context region (e.g., highlighting the text in the representation of said point of interest in the context region, as shown at representation 4518 in context region 4508 of FIG. 45C, or expanding the representation of said point of interest in the context region, or displaying additional information (e.g., additional text, image, etc.) describing said point of interest in the context region). In some embodiments, the appearance of said point of interest is also changed in the map view in accordance with the intensity of the contact.

In some embodiments, prior to detecting the increase in characteristic intensity of the contact above the respective intensity threshold (e.g. $IT_L$), the device detects (4626) movement of the contact on the touch-sensitive surface (e.g. touch screen 112) that corresponds to movement of the focus selector in the context region; and in response to detecting the movement of the contact on the touch-sensitive surface (e.g. touch screen 112) that corresponds to the movement of the focus selector in the context region, the device scrolls (4626) the context region in accordance with the corresponding movement of the focus selector in the context region (e.g., context region 4508 is scrolled to show additional entries in the list of entries in the context region 4508 in FIG. 45L). In FIG. 45L, the intensity of the contact on touch screen 112 is below $IT_L$ (as shown by intensity meter 4502 adjacent to user interface 4570 and intensity meter 4502 adjacent to user interface 4572) and focus selector 4504 is moved along a path indicated by arrow 4574 in context region 4508. Context region 4508 scrolls in accordance with the movement of focus selector 4504 along the path indicated by arrow 4574, as shown in user interface 4572. An additional representation 4578 (e.g., "Apple Store, Berkeley" corresponding to point of interest 4510) is shown in the scrolled context region 4508 of user interface 4572. In some embodiments, a movement of the contact that is a translation of the contact in a direction causes a translation of the context region in the same direction.

In some embodiments, after zooming the map view to display the respective contextual information for one of the first or second point of interest in the map view, and while the focus selector is at the location of the representation of said one of the first or second point of interest, the device detects (4628) an increase in the characteristic intensity of the contact above a location card display intensity threshold (e.g., a deep press intensity threshold $IT_D$, or a static or dynamically determined "pop" intensity threshold). In response to detecting the increase in the characteristic intensity of the contact above the location card display intensity threshold, the device displays (4628) a location card (e.g., location card 4526) for said one of the first or second point of interest. For example, in FIG. 45D, a contact at a location of representation 4518 is indicated by focus selector 4504. The characteristic intensity of the contact has increased above $IT_D$, as indicated by intensity meter 4502. In response to the increase in the characteristic intensity of the contact above $IT_D$, location card 4526*a* is shown for point of interest 4512. Alternative location cards 4526 are shown at 4526*b* of FIG. 45E and 4526*c* of FIG. 45F. In some embodiments, location card 4526 for a point of interest is shown when a tap input is detected on the point of interest. In some embodiments, in response to detecting the increase in the characteristic intensity of the contact above the location card display intensity threshold, the electronic device ceases to display the user interface including the map view 4506 and context region 4508 (e.g., a user interface as shown in FIG. 45A, a user interface as shown in FIG. 45C, etc.), and the electronic device displays a new user interface including location card 4526 for said one of the first or second point of interest.

In some embodiments, while the focus selector 4504 is at the location of the representation of one of the first or second point of interest: prior to detecting the increase in the characteristic intensity of the contact on the touch-sensitive surface above the respective intensity threshold (e.g., a light press threshold ($IT_L$)), the device detects (4630) an increase in the characteristic intensity of the contact above a hint intensity threshold (e.g., $IT_H$) below the respective intensity threshold. In response to detecting the increase in the characteristic intensity of the contact above the hint intensity threshold, the device changes (4630) an appearance of said one of the first or second point of interest in the context region in accordance with the intensity of the contact (e.g., highlighting the text in the representation of said point of interest in the context region, expanding the representation of said point of interest in the context region, or displaying additional information (e.g., additional text, image, etc.) describing said point of interest in the context region). In some embodiments, the appearance of said point of interest (e.g., e.g., point of interest 4512) is also changed (e.g., highlighted by changing color or size) in the map view in accordance with the intensity of the contact. For example, as shown in FIG. 45B, the characteristic intensity of a contact at representation 4518 (as indicated by focus selector 4504) of point of interest 4512 has increased beyond intensity threshold $IT_H$ (as indicated by intensity meter 4502), and the appearance of point of interest 4512 is changed (the head of the map pin indicating point of interest 4512 is enlarged).

It should be understood that the particular order in which the operations in FIGS. 46A-46D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 4600 described above with respect to FIGS. 46A-46D. For brevity, these details are not repeated here.

Figure 47:
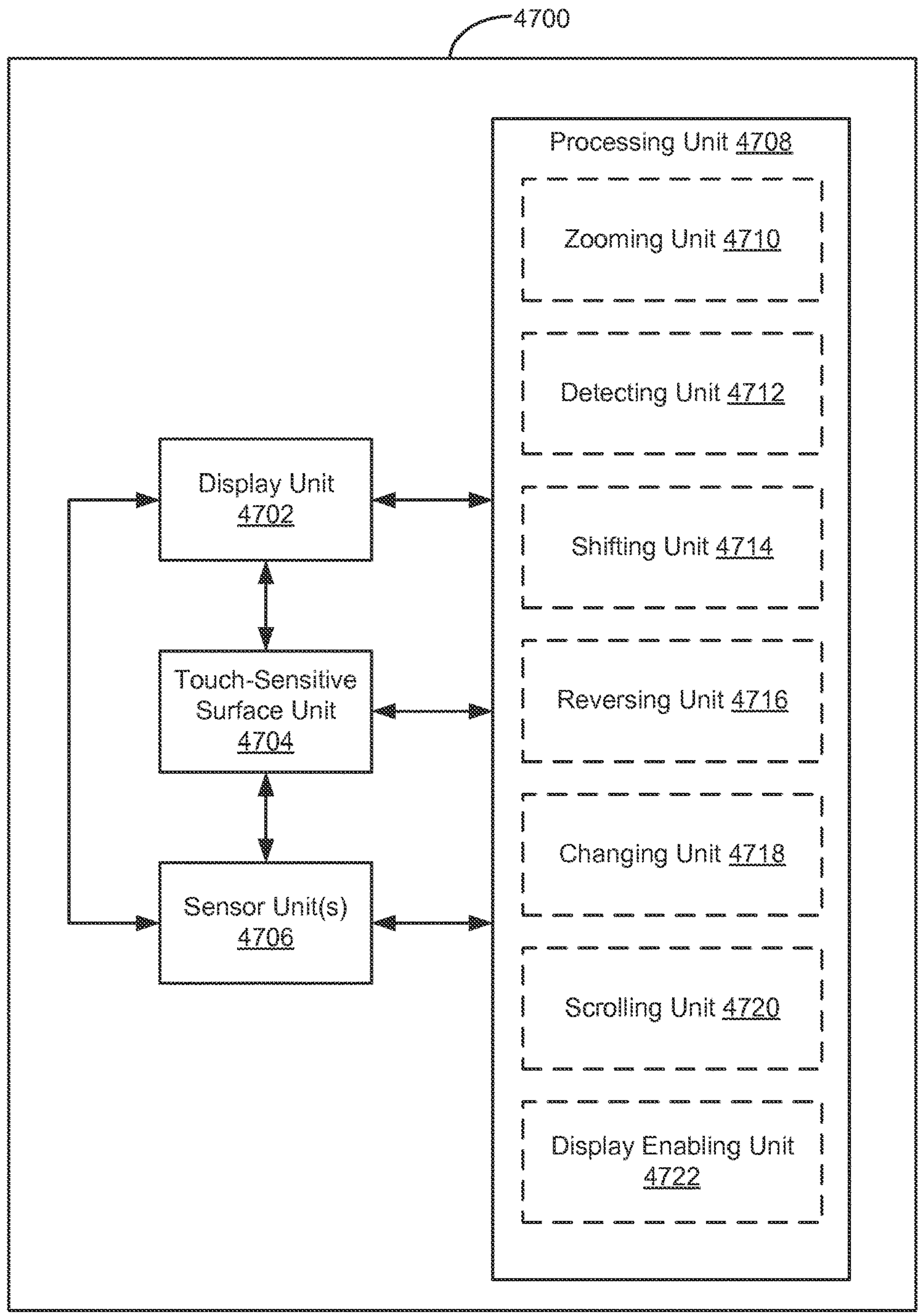
FIG. 47 is a functional block diagram of an electronic device in accordance with some embodiments.

In accordance with some embodiments, FIG. 47 shows a functional block diagram of an electronic device 4700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 47 are, optionally, combined or separated into sub-blocks to implement the principles of the various described embodiments. Therefore, the description herein optionally supports any possible combination or separation or further definition of the functional blocks described herein.

As shown in FIG. 47, an electronic device 4700 includes a display unit 4702, a touch-sensitive surface unit 4704, one or more sensor units 4706 for detecting intensity of contacts on the touch-sensitive surface unit 4704; and a processing unit 4708 coupled with the display unit 4702, the touch-sensitive surface unit 4704 and the one or more sensor units 4706. In some embodiments, the processing unit 4708 includes a zooming unit 4710, a detecting unit 4712, a shifting unit 4714, a reversing unit 4716, a changing unit 4718, a scrolling unit 4720, and a display enabling unit 4722.

The processing unit configured to: enable concurrent display (e.g., with display enabling unit 4722), in a user interface on the display unit 4702, of: a map view that includes a plurality of points of interest, and a context region that is distinct from the map view and includes a representation of a first point of interest from the plurality of points of interest and a representation of a second point of interest from the plurality of points of interest; while enabling concurrent display of the map view and the context region on the display unit, detect (e.g., with detecting unit 4712) an increase in a characteristic intensity of a contact on the touch-sensitive surface unit above a respective intensity threshold; and in response to detecting the increase in the characteristic intensity of the contact above the respective intensity threshold:—in accordance with a determination that a focus selector was at a location of the representation of the first point of interest in the context region when the increase in the characteristic intensity of the contact above the respective intensity threshold was detected, zoom (e.g., with the zooming unit 4710) the map view to display respective contextual information for the first point of interest around the first point of interest in the map view; and—in accordance with a determination that the focus selector was at a location of the representation of the second point of interest in the context region when the increase in the characteristic intensity of the contact above the respective intensity threshold was detected, zoom (e.g., with the zooming unit 4710) the map view to display respective contextual information for the second point of interest around the second point of interest in the map view.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 45A-45L are, optionally, implemented by components depicted in FIGS. 1A-1B or FIG. 47. For example, detection operation 4604 and zooming operation 4608 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As noted above, there is a need for electronic devices with improved methods and interfaces for displaying and using a menu that includes contact information. Many electronic devices have applications that list objects that are associated with contact information (e.g., a list of search results in a map application, a list of friends in a messaging application, etc.). However, existing methods for accessing the associated contact information and initiating actions based on the contact information are slow and inefficient. For example, if a user was messaging with a friend in a messaging application, and then wants to call that friend, the user may need to open a phone application, search for that friend in his/her contacts, and then select that friend from the contacts in order to place the call. The embodiments below address this problem by providing a menu (e.g., an action platter or quick action menu) for initiating one or more actions for a respective object that includes the contact information for the respective object. The menu provides a fast way to initiate actions (e.g., for a person, calling, messaging, or emailing the person, or for a business, getting directions to the business, calling the business, opening a web page for the business, etc.) without having to open a separate application or enter search terms and perform a search.

Below, FIGS. 48A-48EE illustrate exemplary user interfaces for displaying a menu that includes contact information. FIGS. 49A-49F are flow diagrams illustrating a method of displaying a menu that includes contact information. The user interfaces in FIGS. 48A-48EE are used to illustrate the processes in FIGS. 49A-49F.

FIGS. 48A-48EE illustrate exemplary user interfaces for displaying a menu that includes contact information in accordance with some embodiments. The user interfaces in these figures are used to illustrate the processes described below, including the processes in FIGS. 49A-49F. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 48A-48EE and 49A-49F will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts described in FIGS. 48A-48EE on the touch-sensitive surface 451 while displaying the user interfaces shown in FIGS. 48A-48EE on the display 450, along with a focus selector.

FIGS. 48A-48EE illustrate exemplary user interfaces for displaying a menu that includes contact information in accordance with some embodiments. While FIG. 4A shows touch screen 112 with additional details of device 100 (e.g., speaker 111, optical sensor 164, proximity sensor 166, etc.), for sake of clarity, FIGS. 48A-48EE simply show touch screen 112 of device 100, without showing other details of device 100.

Figure 48A:
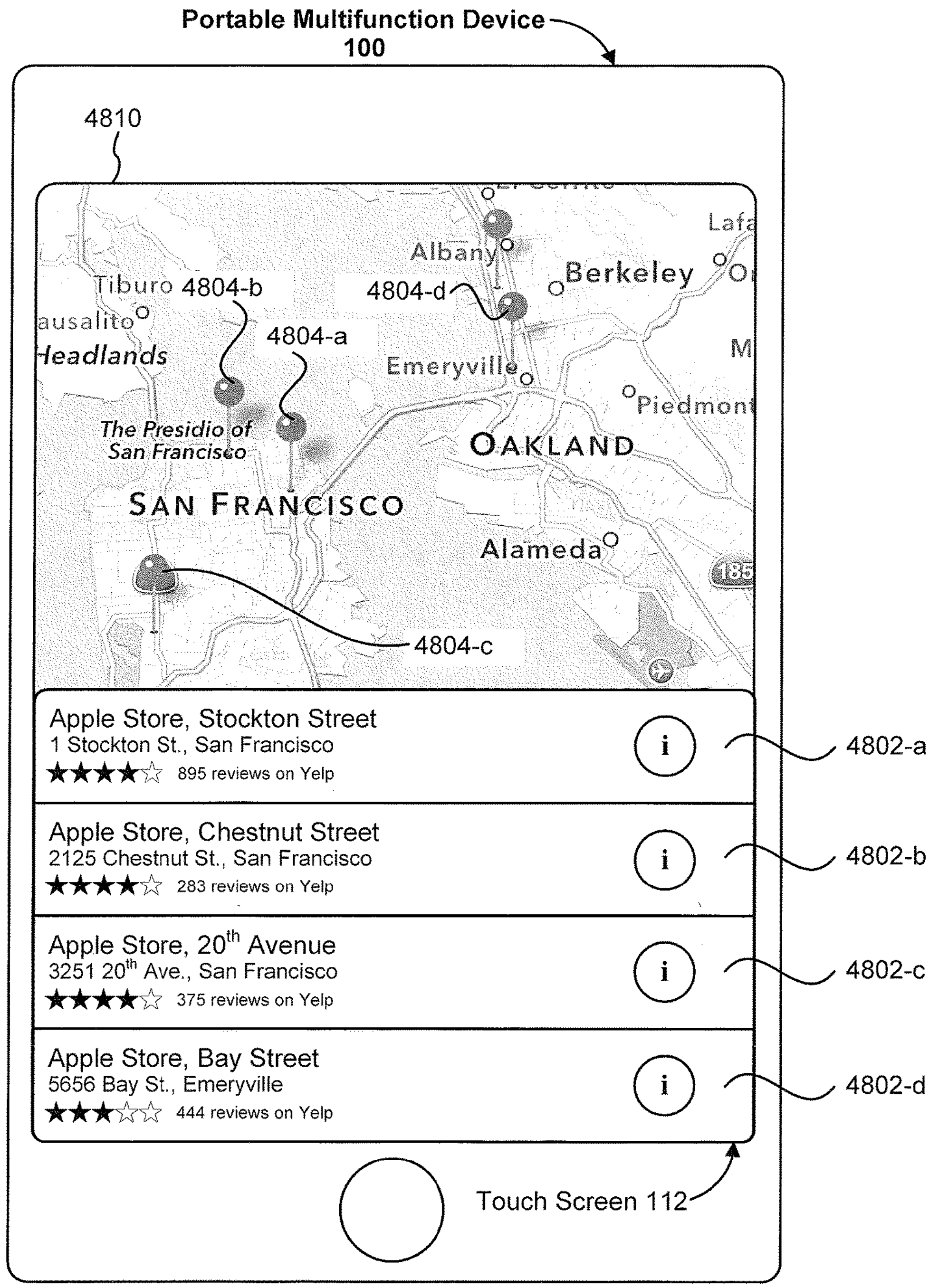
FIGS. 48A-48EE illustrate exemplary user interfaces for displaying a menu that includes contact information in accordance with some embodiments.

FIG. 48A illustrates an example of displaying a search results user interface 4810 of a map application (e.g., a map application, such as the Maps application by Apple Inc. of Cupertino, Calif.) on a display (e.g., touch screen 112) of a device (e.g., device 100). Search results user interface 4810 includes one or more selectable objects that are associated with contact information (e.g., representations of search results 4802-*a*, 4802-*b*, 4802-*c*, and 4802-*d*, and corresponding pins on a map, such as pins 4804-*a*, 4804-*b*, 4804-*c*, and 4804-*d*, respectively).

Figure 48B:
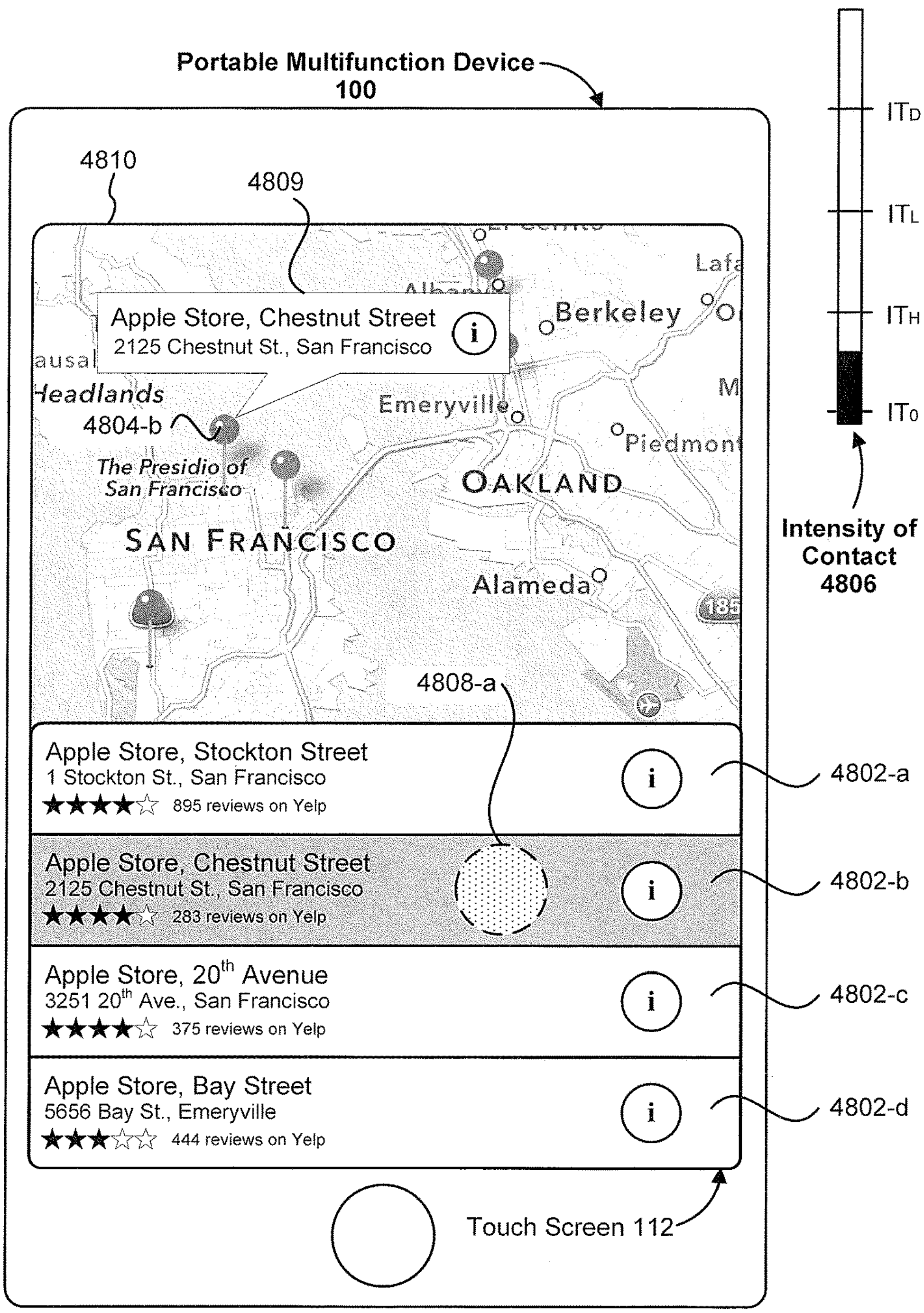

FIG. 48B illustrates an example of detecting an input that includes detecting a contact (e.g., contact 4808-*a*) on a respective selectable object (e.g., selectable object 4802-*b* for the row representing the Chestnut Street Apple Store) with an intensity of the contact (e.g., represented by intensity of contact 4806) above a contact detection intensity threshold $IT_0$. In some embodiments, in response to detecting a contact (e.g., above a contact detection intensity threshold) on the respective selectable object, an information bubble (e.g., 4809) is displayed on or near the corresponding pin on the map and/or the row representing the respective selectable object is highlighted.

Figure 48C:
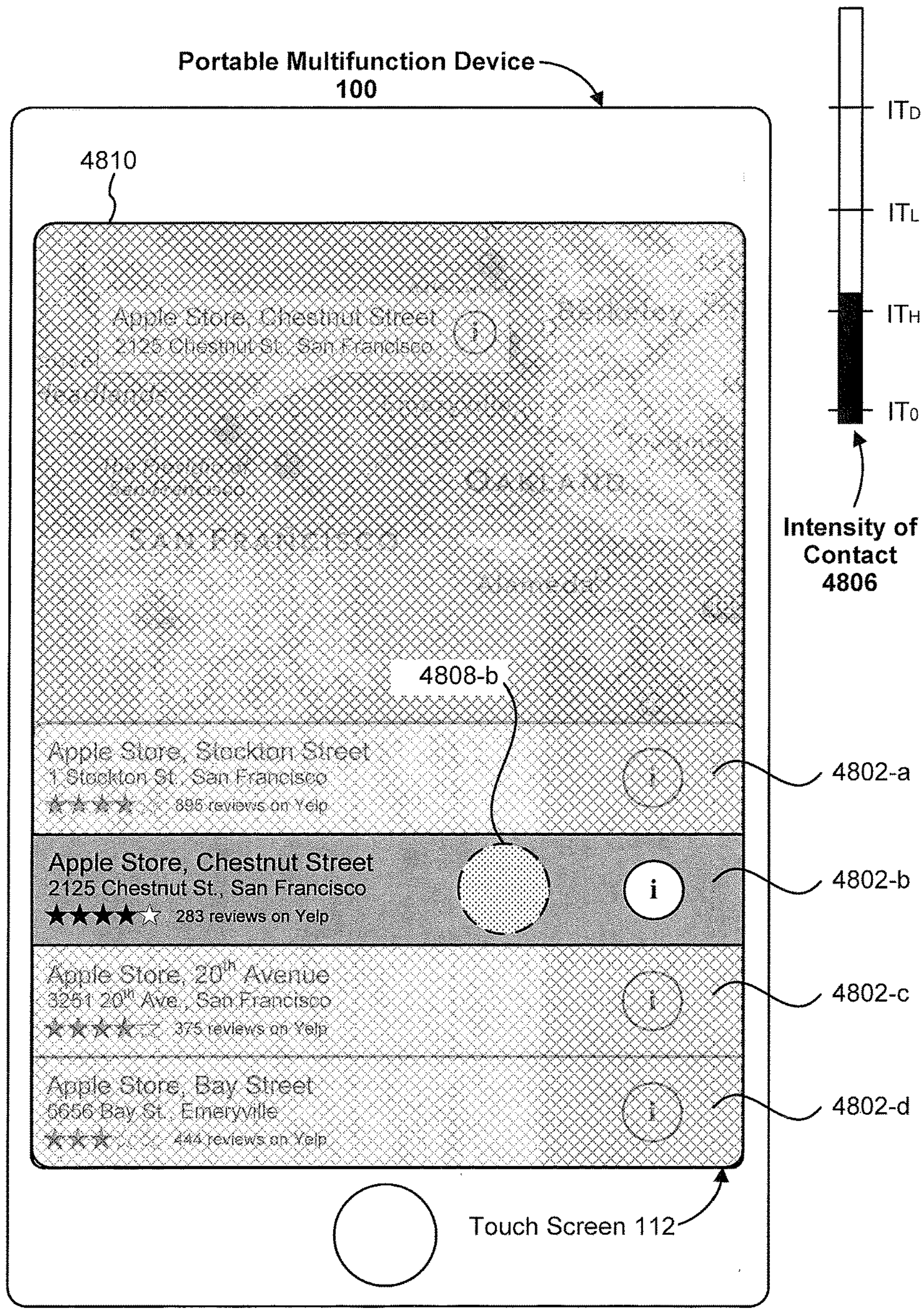
Figure 48D:
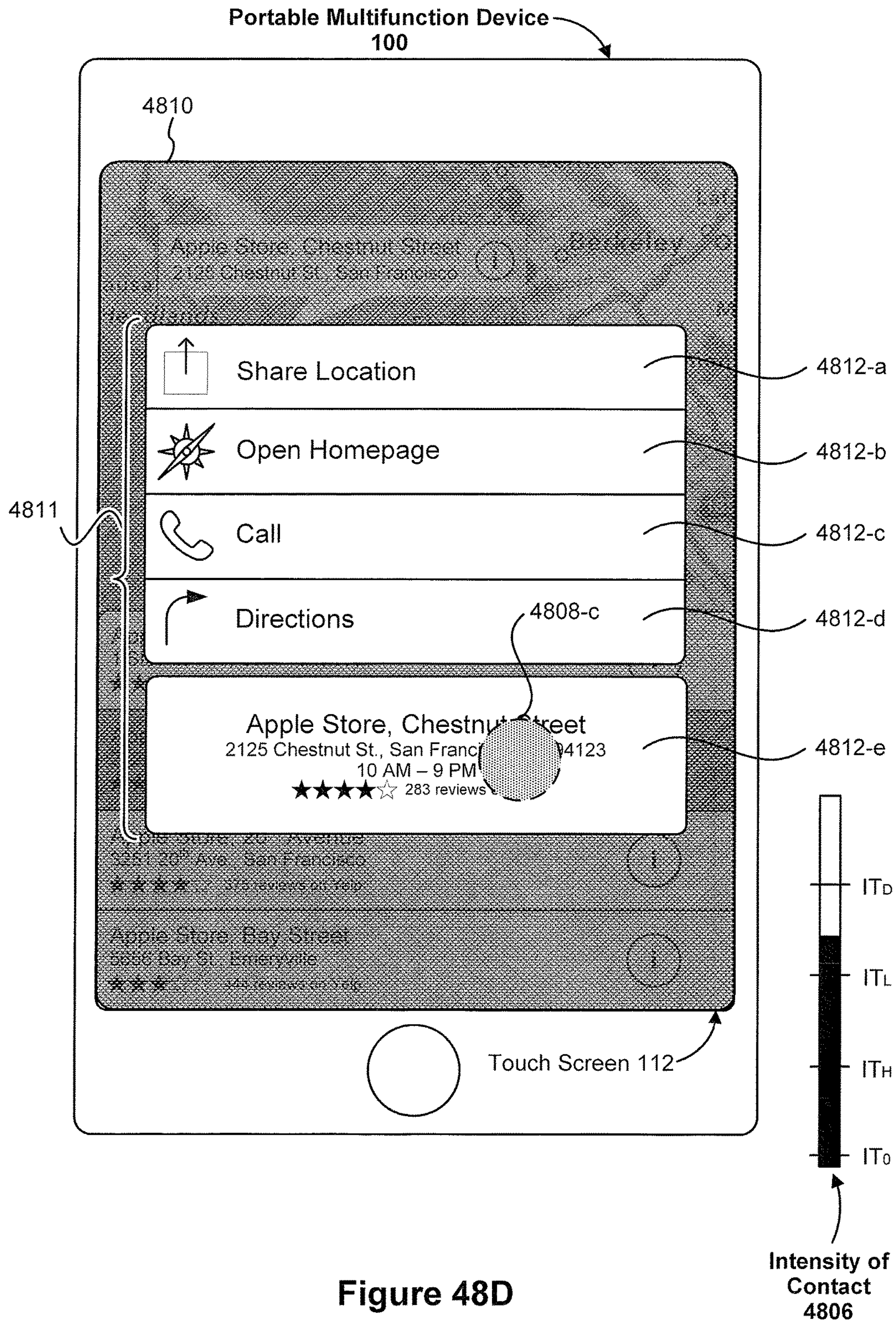

FIGS. 48C-48D illustrate an example of detecting an increase in intensity of the contact (e.g., contact 4808-*b* has an intensity above a "hint" intensity threshold $IT_H$ and contact 4808-*c* has an intensity above a light press intensity threshold $IT_L$, also sometimes called a "peek" intensity threshold) and displaying a menu (e.g., menu 4811) for the respective selectable object overlaid on top of search results user interface 4810. FIG. 48C illustrates applying a visual effect (e.g., blurring) to search results user interface 4810 (while keeping the respective selectable object 4802-*b* in focus) as the intensity of the contact increases above the "hint" intensity threshold $IT_H$. FIG. 48D illustrates an increase in a magnitude of the visual effect (e.g., more blurring) as the intensity of the contact increases above the "peek" intensity threshold $IT_L$ and the menu is displayed. In some embodiments, the menu includes a header (e.g., header 4812-*e*) and one or more objects for initiating action (e.g., share location with object 4812-*a*, open homepage with object 4812-*b*, call with object 4812-*c*, and get directions with object 4812-*d*). In some embodiments, the header (e.g., header 4812-*e*) includes additional descriptive information describing the respectable object (e.g., business hours, a rating, etc.).

Figure 48E:
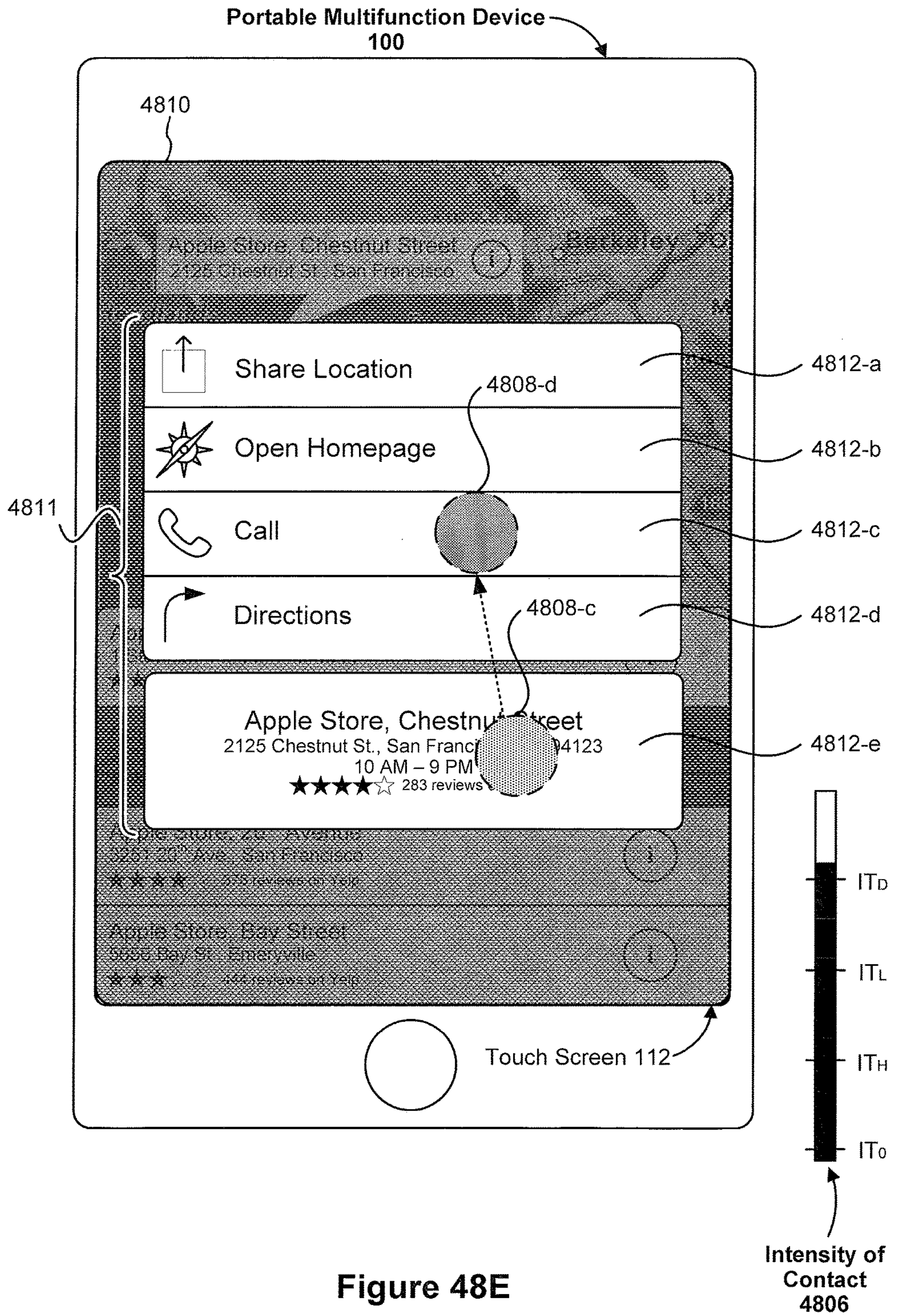
Figure 48F:
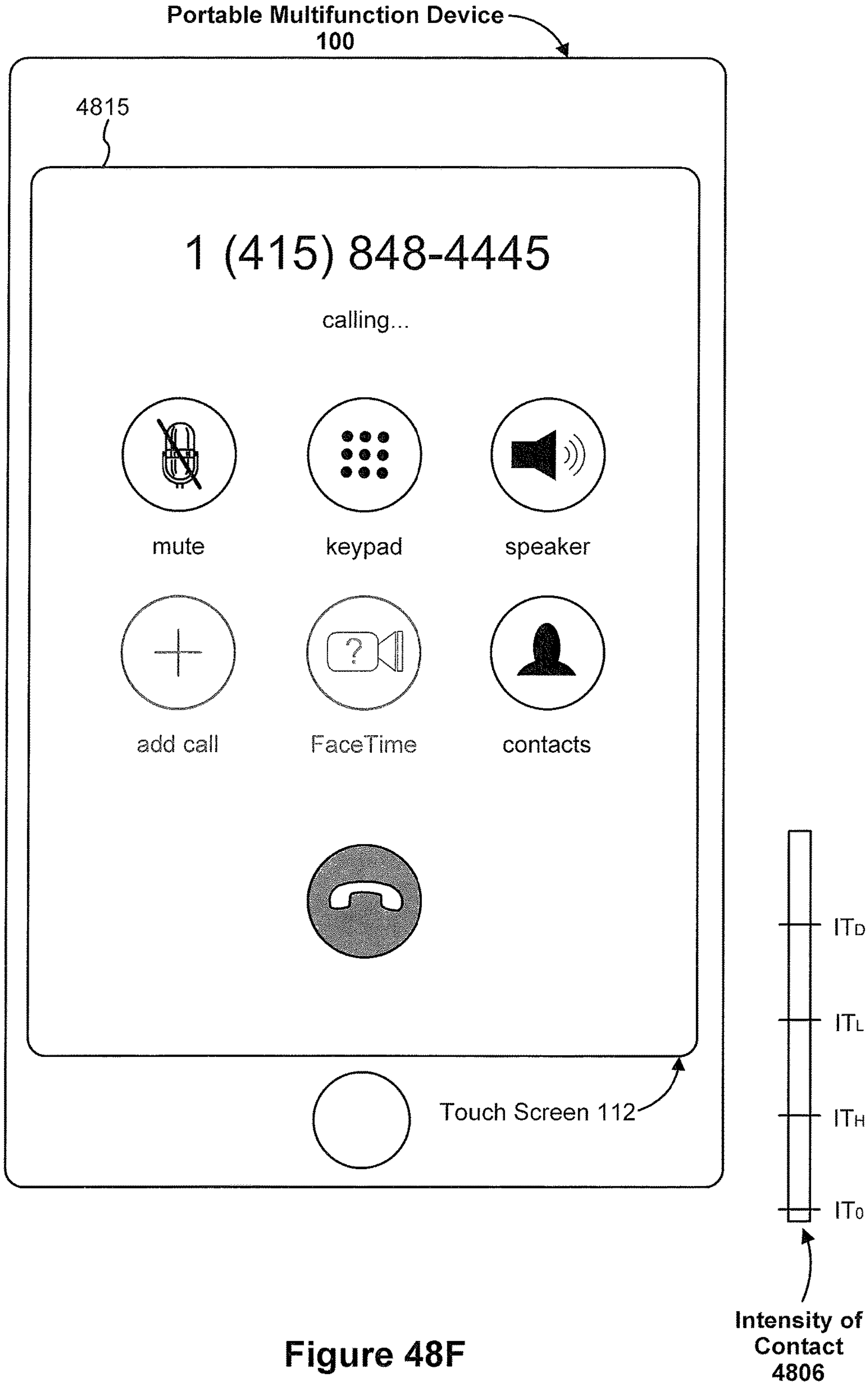

FIGS. 48E-48F illustrate an example of detecting an increase in intensity of the contact (e.g., contact 4808-*d* has an intensity above a deep press intensity threshold $IT_D$, also sometimes called a "pop" intensity threshold) on the option to call (e.g., by detecting selection of the "Call" object 4812-*c*) and initiating a call (in a phone user interface 4815) to the respective selectable object (e.g., initiating a call to the Chestnut Street Apple Store at 1 (415) 848-4445).

FIGS. 48D and 48G-48I illustrate an example of detecting a liftoff of the contact (e.g., liftoff of contact 4808-*c*, FIG. 48D) from menu 4811 (e.g., from header 4812-*e* of menu 4811) followed by a tap gesture (e.g., a tap gesture with contact 4814, FIG. 48H) directed to a location outside of menu 4811 to dismiss menu 4811 and restore display of search results user interface 4810.

Figure 48G:
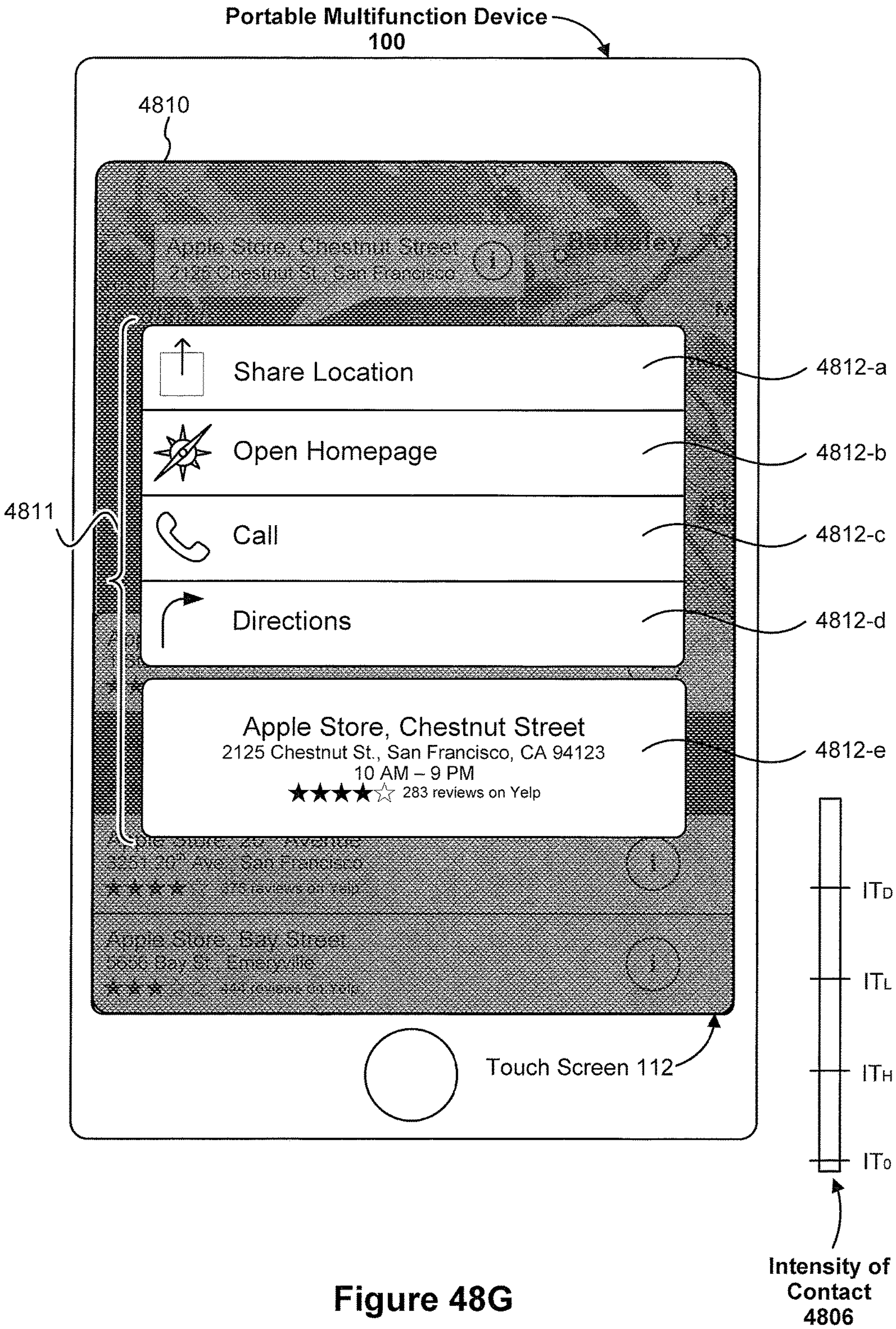
Figure 48H:
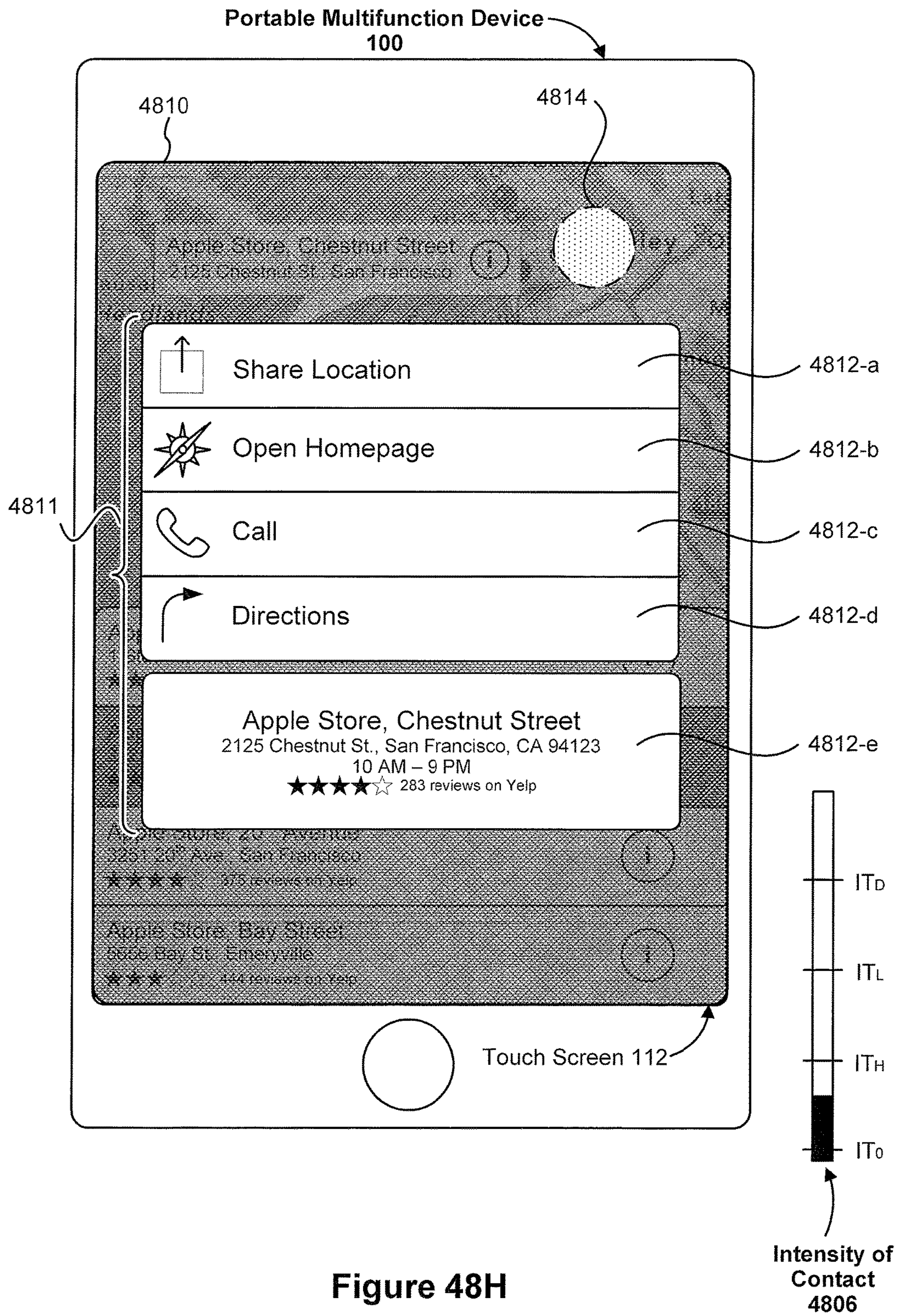
Figure 48I:
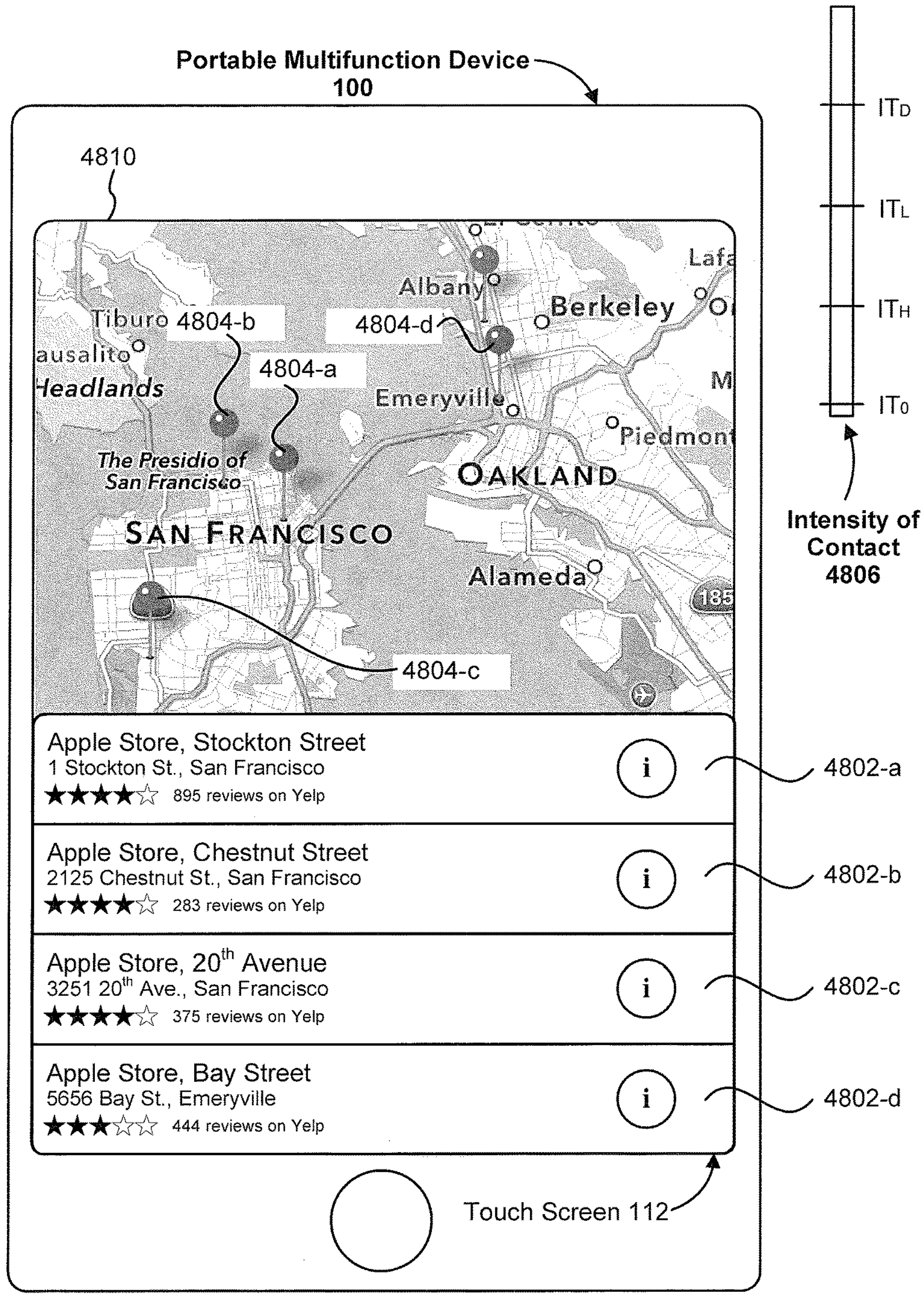
Figure 48J:
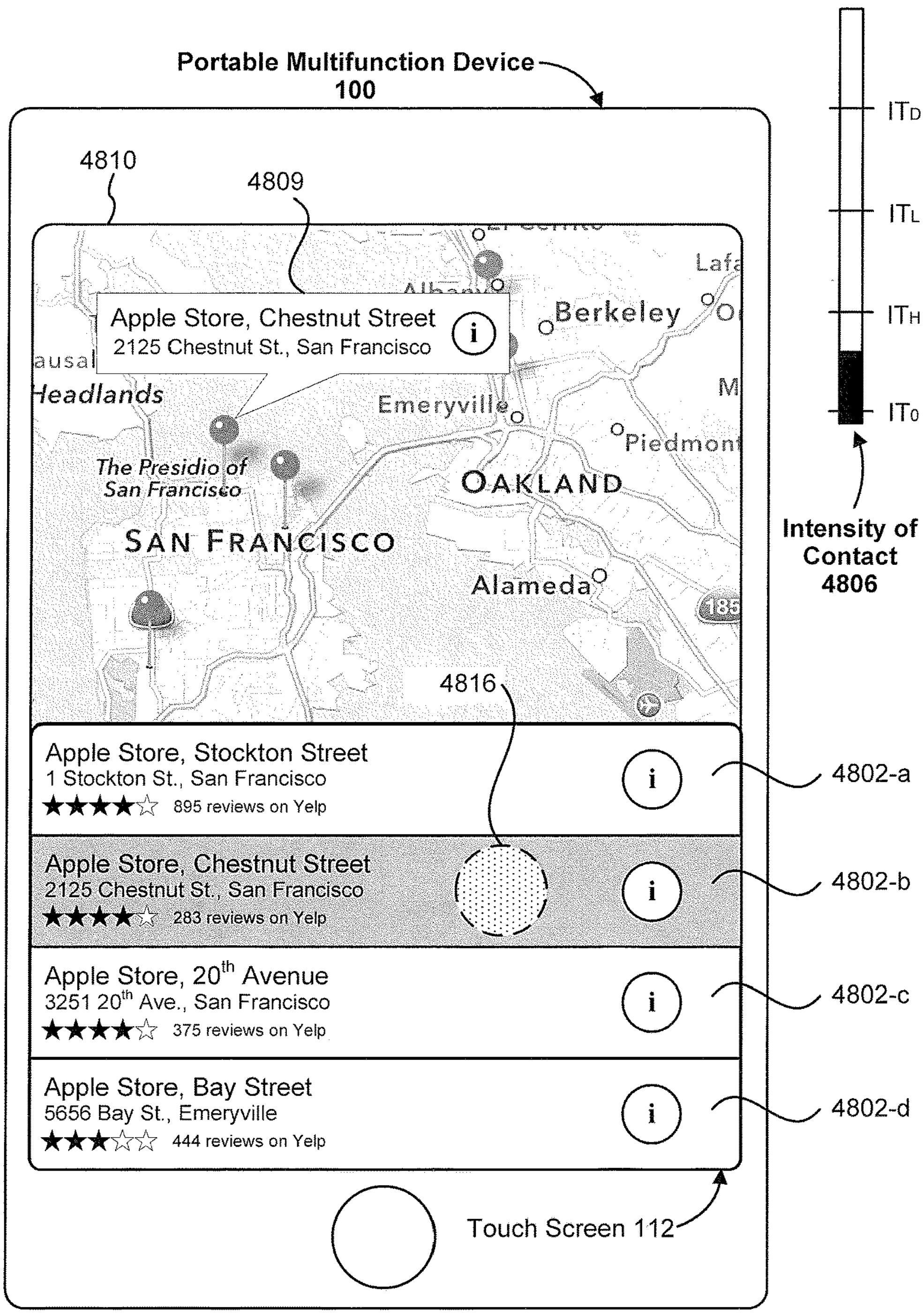
Figure 48K:
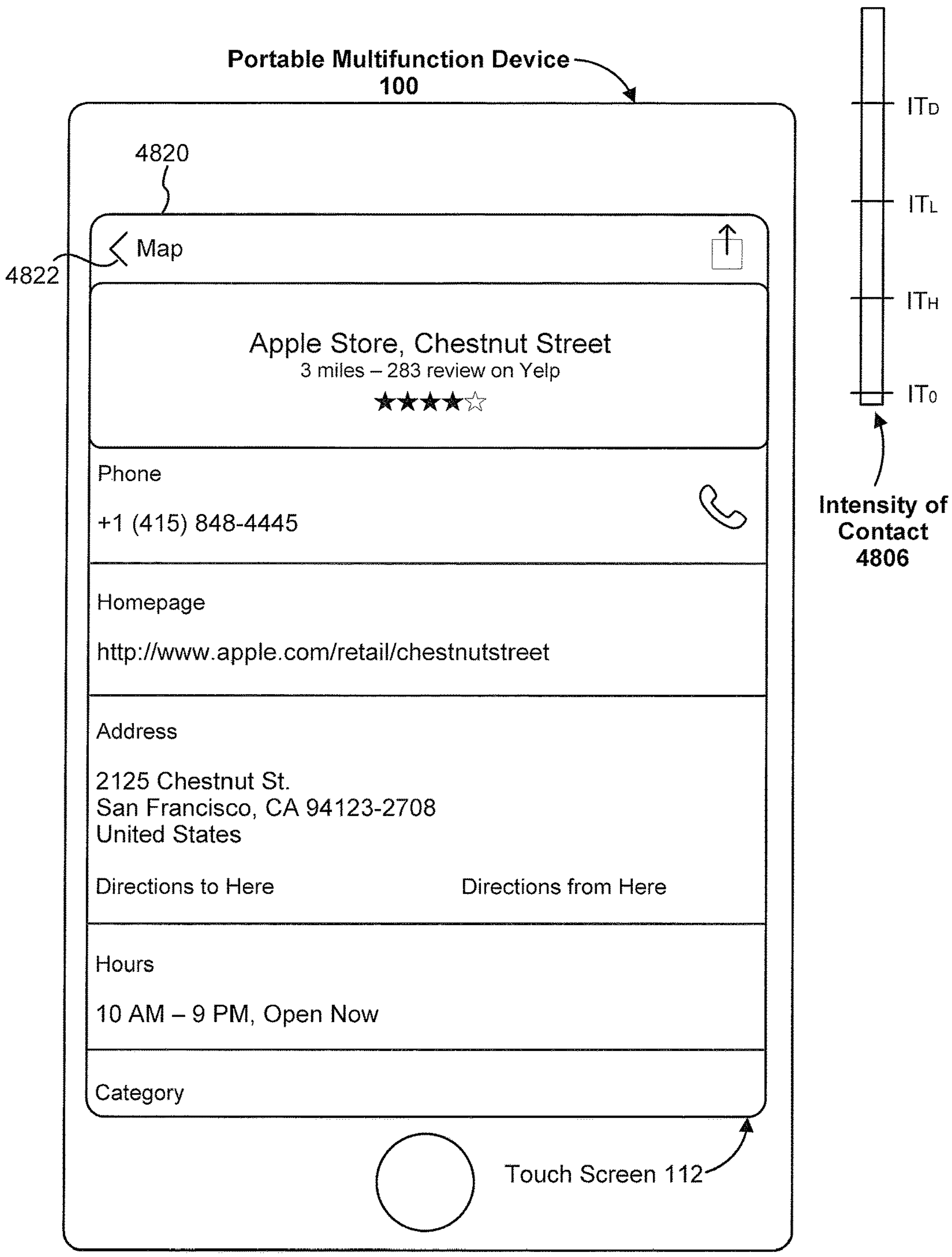

FIGS. 48I-48K illustrate an example of detecting a tap gesture (e.g., a tap gesture with contact 4816, FIG. 48J) on a row for a respective selectable object (e.g., selectable object 4802-*b* for the Chestnut Street Apple Store) and displaying an information page about the respective selectable object (e.g., information user interface 4820 with additional information about the Chestnut Street Apple Store, FIG. 48K). Information user interface 4820 includes "<Map" icon 4822. In some embodiments, when a gesture (e.g., a tap gesture) is detected on "<Map" icon 4822, information user interface 4820 is dismissed and search results user interface 4810 is displayed.

Figure 48L:
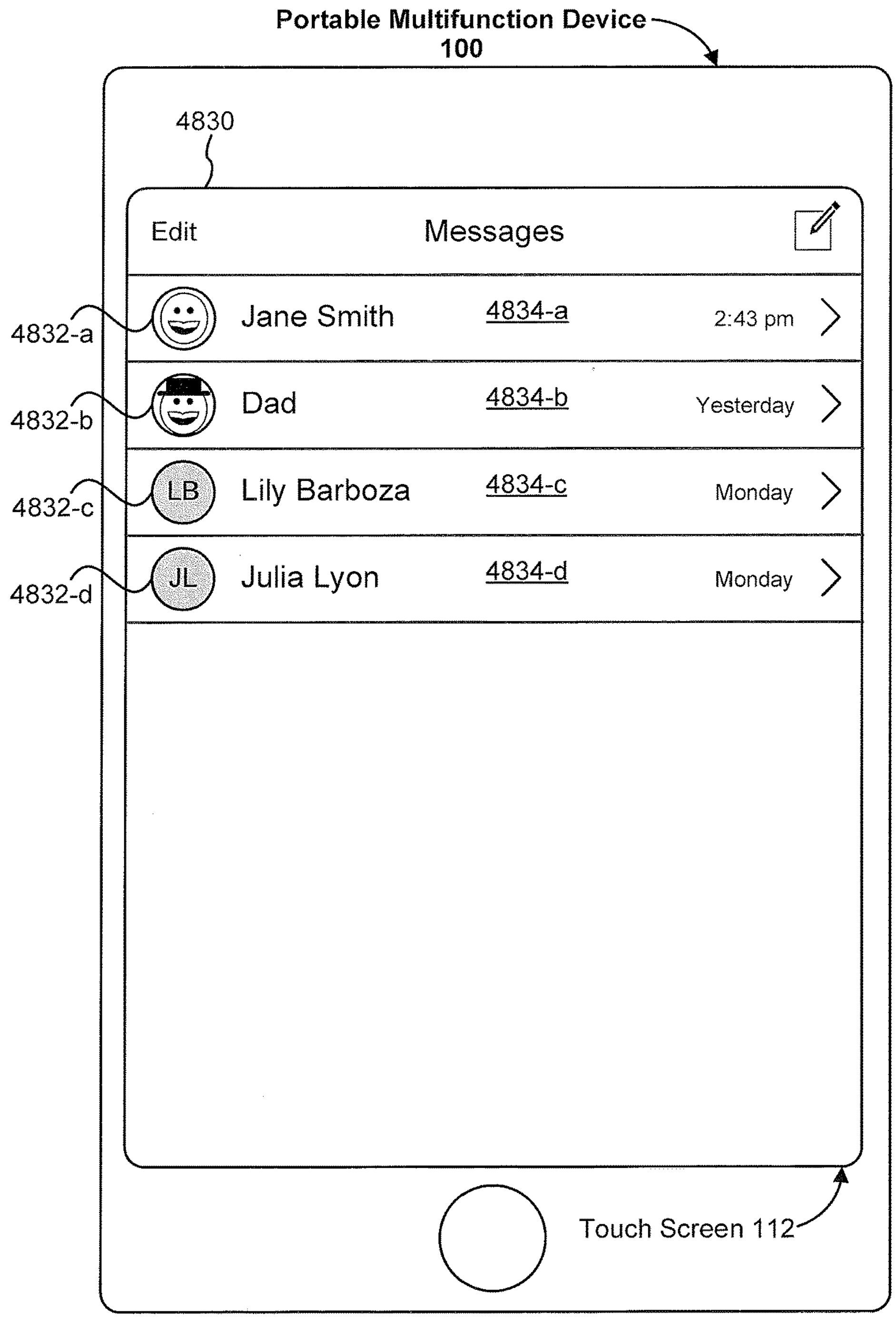

FIG. 48L illustrates an example of displaying a messages user interface 4830 of a messaging application (e.g., a messaging application, such as the Messages application by Apple Inc. of Cupertino, Calif.) on a display (e.g., touch screen 112) of a device (e.g., device 100). As shown in FIG. 48L, messages user interface 4830 includes one or more selectable objects that are associated with contact information (e.g., representations of messaging conversations 4834-*a*, 4834-*b*, 4834-*c*, and 4834-*d*, and corresponding avatars, such as avatars 4832-*a*, 4832-*b*, 4832-*c*, and 4832-*d*, respectively).

Figure 48M:
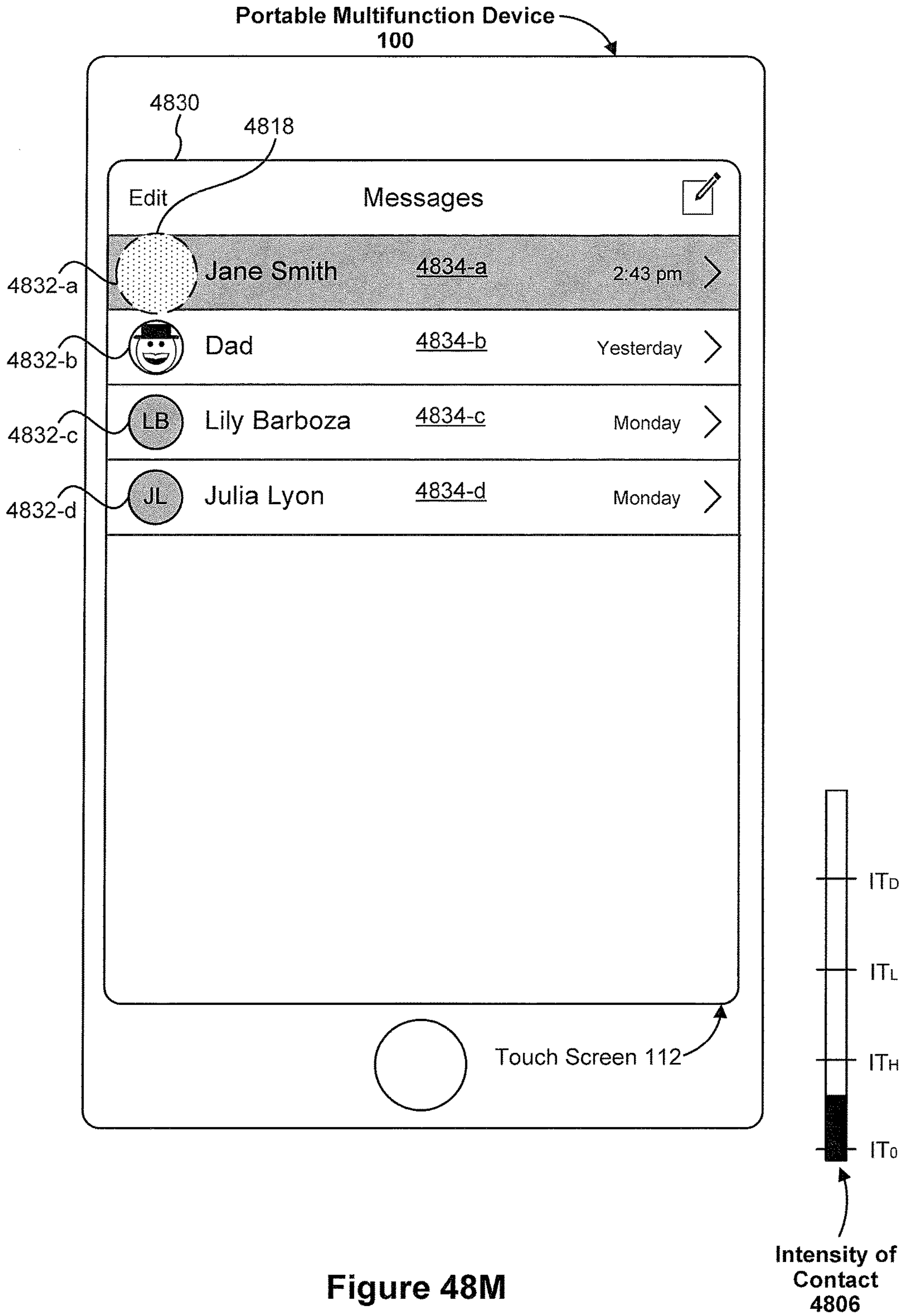
Figure 48N:
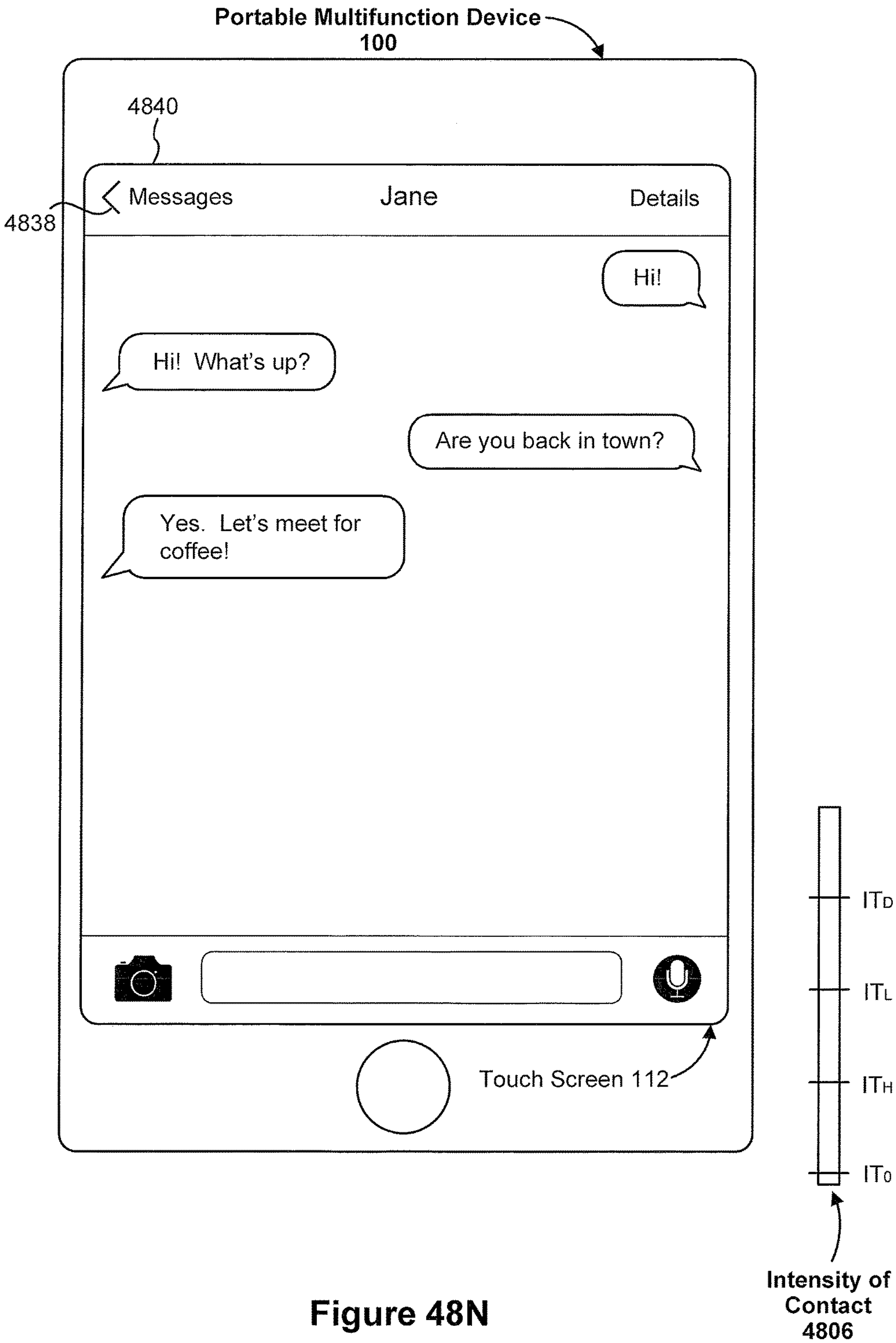

FIGS. 48M-48N illustrate an example of detecting a tap gesture (e.g., a tap gesture with contact 4818, FIG. 48M) on an avatar for a person (e.g., avatar 4832-*a* for Jane Smith) and in response to the tap gesture, displaying a conversation with the person (e.g., conversation user interface 4840, FIG. 48N). As shown in FIG. 48N, conversation user interface 4840 includes "<Messages" icon 4838. In some embodiments, when a gesture (e.g., a tap gesture) is detected on "<Messages" icon 4838, conversation user interface 4840 is dismissed and messages user interface 4830 is displayed.

Figure 48O:
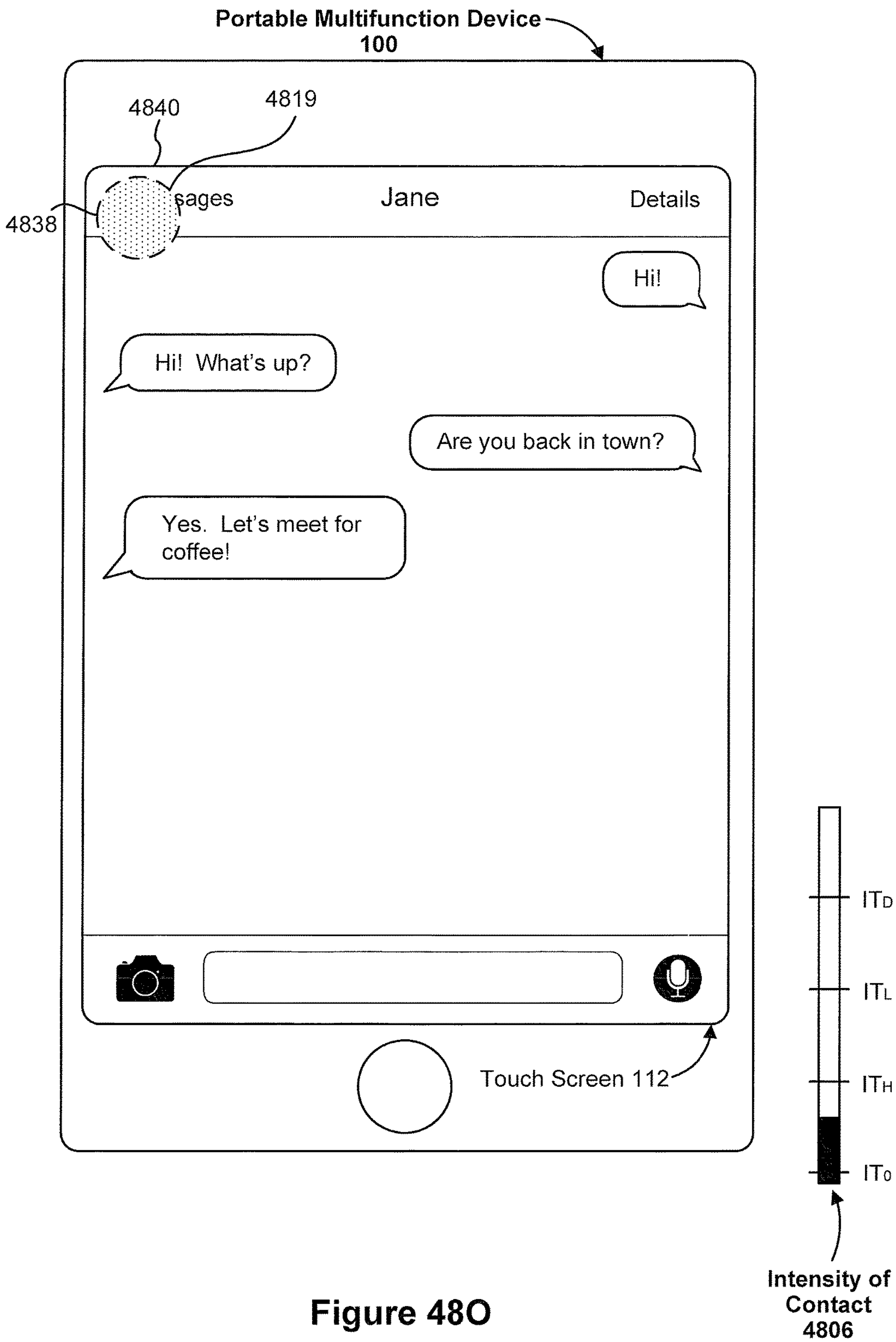
Figure 48P:
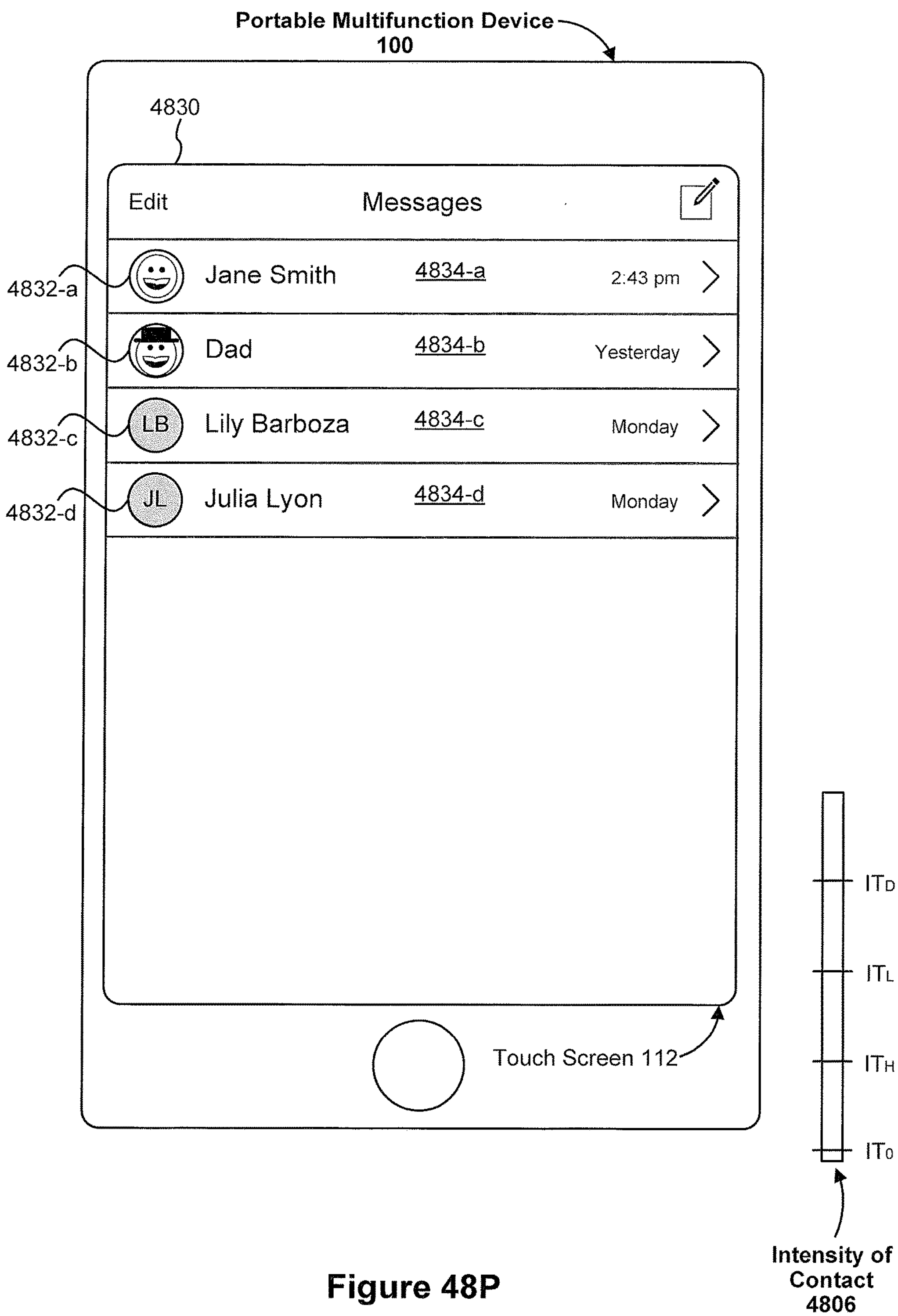

FIGS. 48O-48P illustrate an example of detecting a tap gesture (e.g., a tap gesture with contact 4819, FIG. 48O) on "<Messages" icon 4838 and in response to detecting the tap gesture, returning to the messages list (e.g., messages user interface 4830, FIG. 48P).

Figure 48Q:
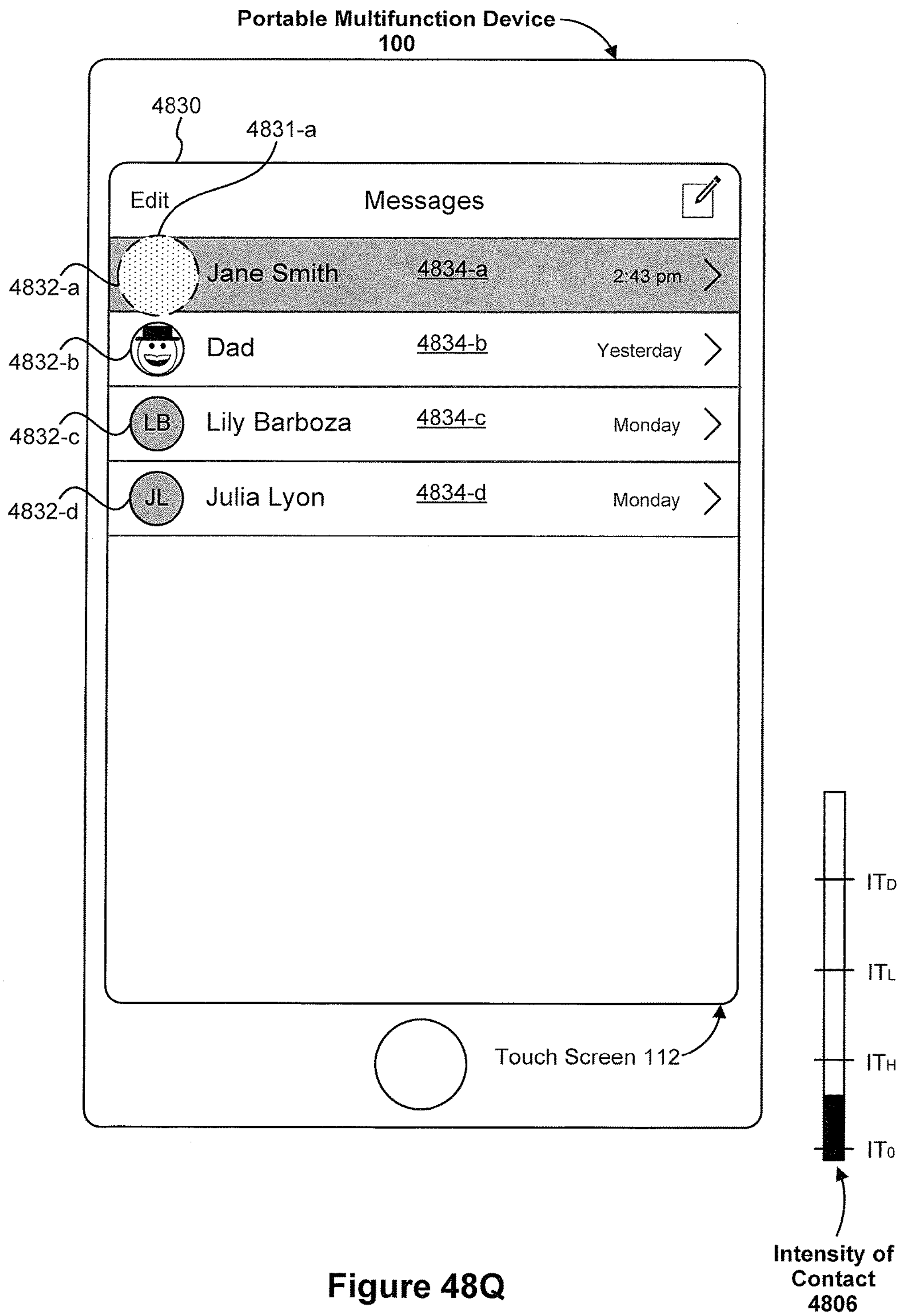

FIG. 48Q illustrates an example of detecting an input that includes detecting a contact (e.g., contact 4831-*a*) on a respective selectable object (e.g., avatar 4832-*a* for Jane Smith) with an intensity of the contact (e.g., represented by intensity of contact 4806) above a contact detection intensity threshold $IT_0$. In some embodiments, in response to detecting a contact (e.g., above a contact detection intensity threshold) on the respective selectable object, the row representing the respective selectable object is highlighted.

Figure 48R:
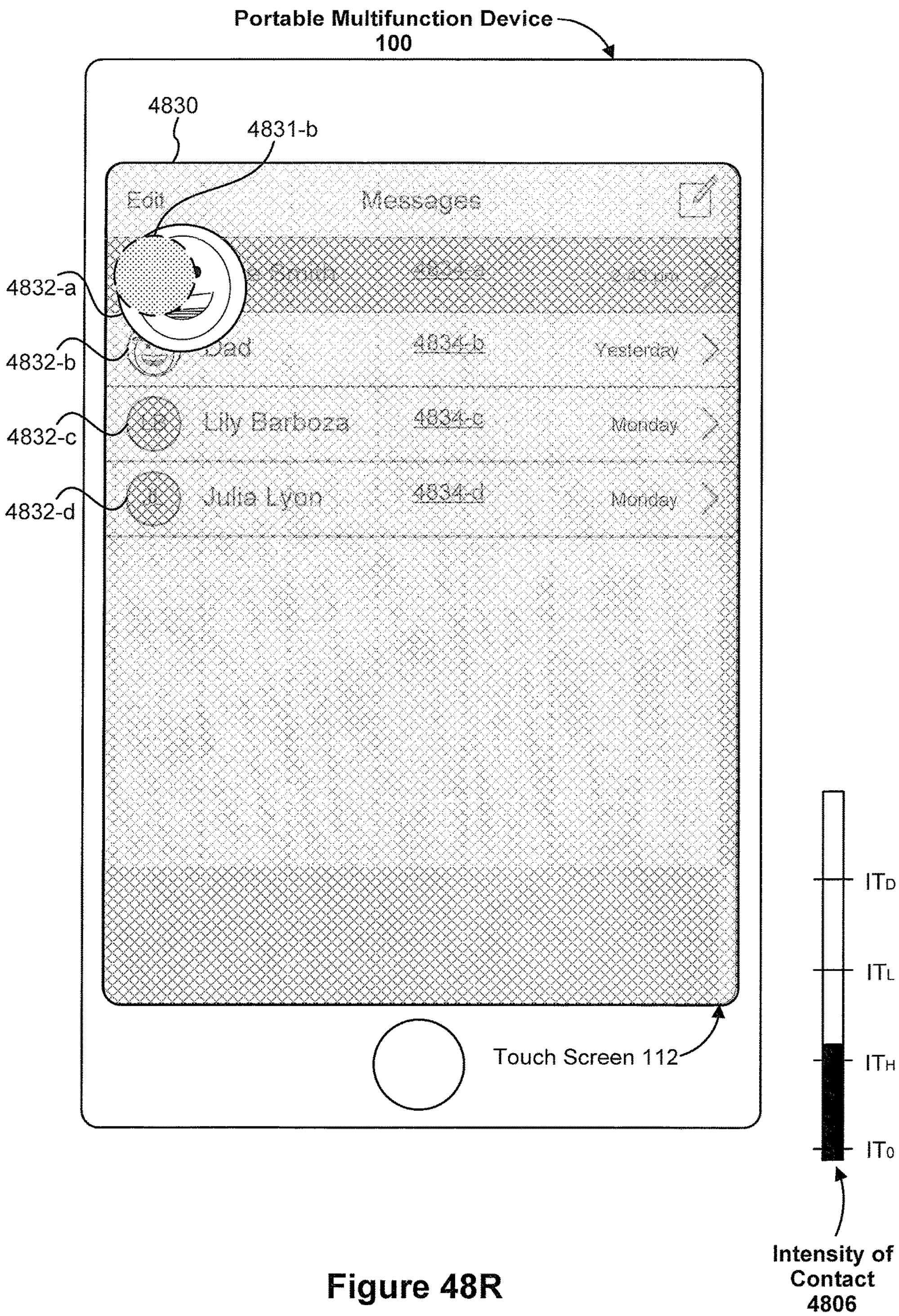
Figure 48S:
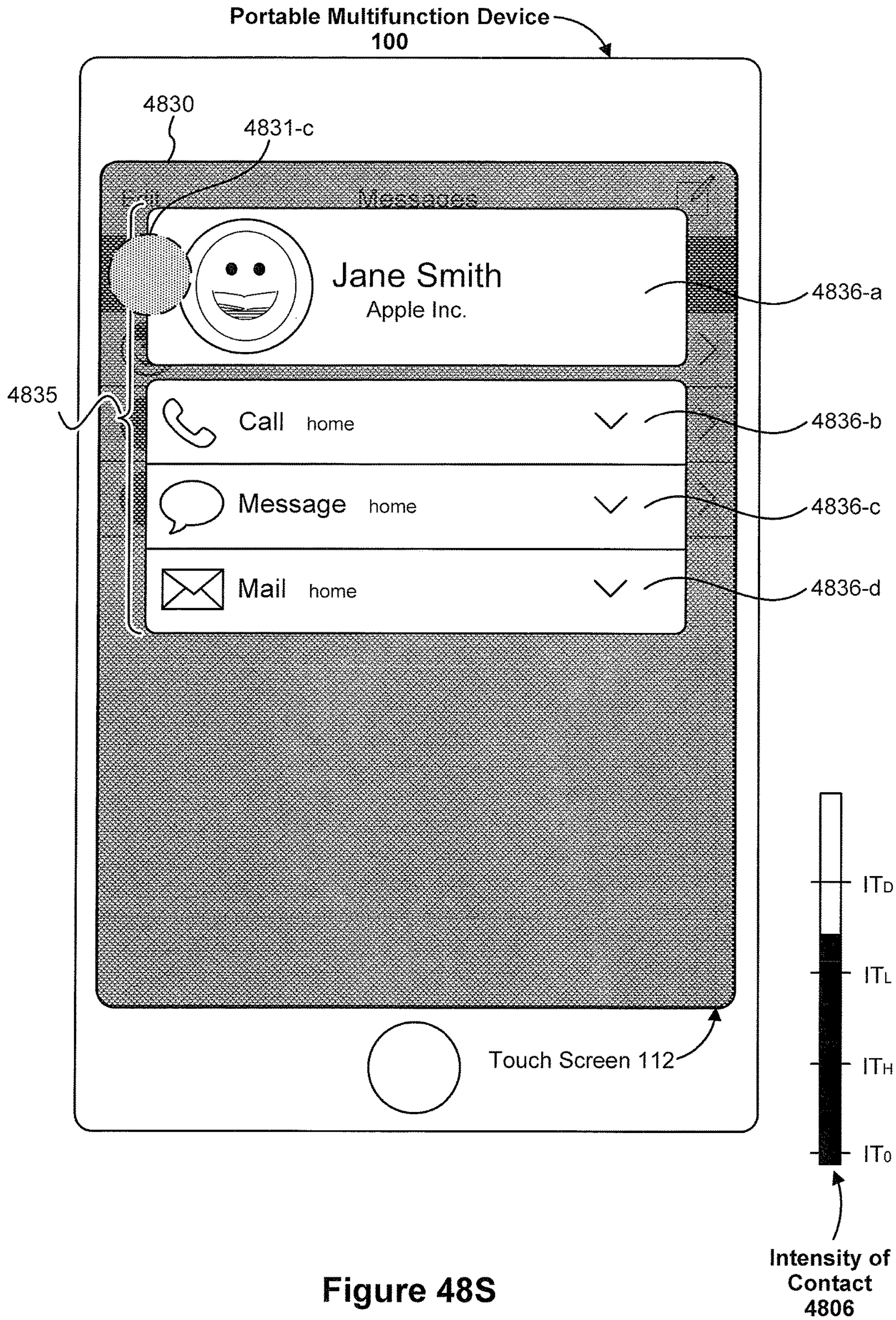

FIGS. 48R-48S illustrate an example of detecting an increase in intensity of the contact (e.g., contact 4831-*b* has an intensity above a "hint" intensity threshold $IT_H$ and contact 4831-*c* has an intensity above a light press intensity threshold $IT_L$, also sometimes called a "peek" intensity threshold) and displaying a menu (e.g., menu 4835) for the respective selectable object overlaid on top of messages user interface 4830. In some embodiments, as the intensity of the contact increases, the avatar (e.g., avatar 4832-*a*) is increasingly magnified. FIG. 48R illustrates applying a visual effect (e.g., blurring) to messages user interface 4830 (while keeping avatar 4832-*a* in focus) as the intensity of the contact increases above the "hint" intensity threshold $IT_H$. FIG. 48S illustrates an increase in a magnitude of the visual effect (e.g., more blurring) as the intensity of the contact increases above the "peek" intensity threshold $IT_L$ and the menu is displayed. In some embodiments, the menu includes a header (e.g., header 4836-*a*) and one or more objects for initiating action (e.g., call with object 4836-*b*, message with object 4836-*c*, and mail with object 4836-*d*). In some embodiments, the header (e.g., header 4836-*a*) includes additional descriptive information describing the respectable object (e.g., full name, business affiliation, etc. of Jane Smith).

Figure 48T:
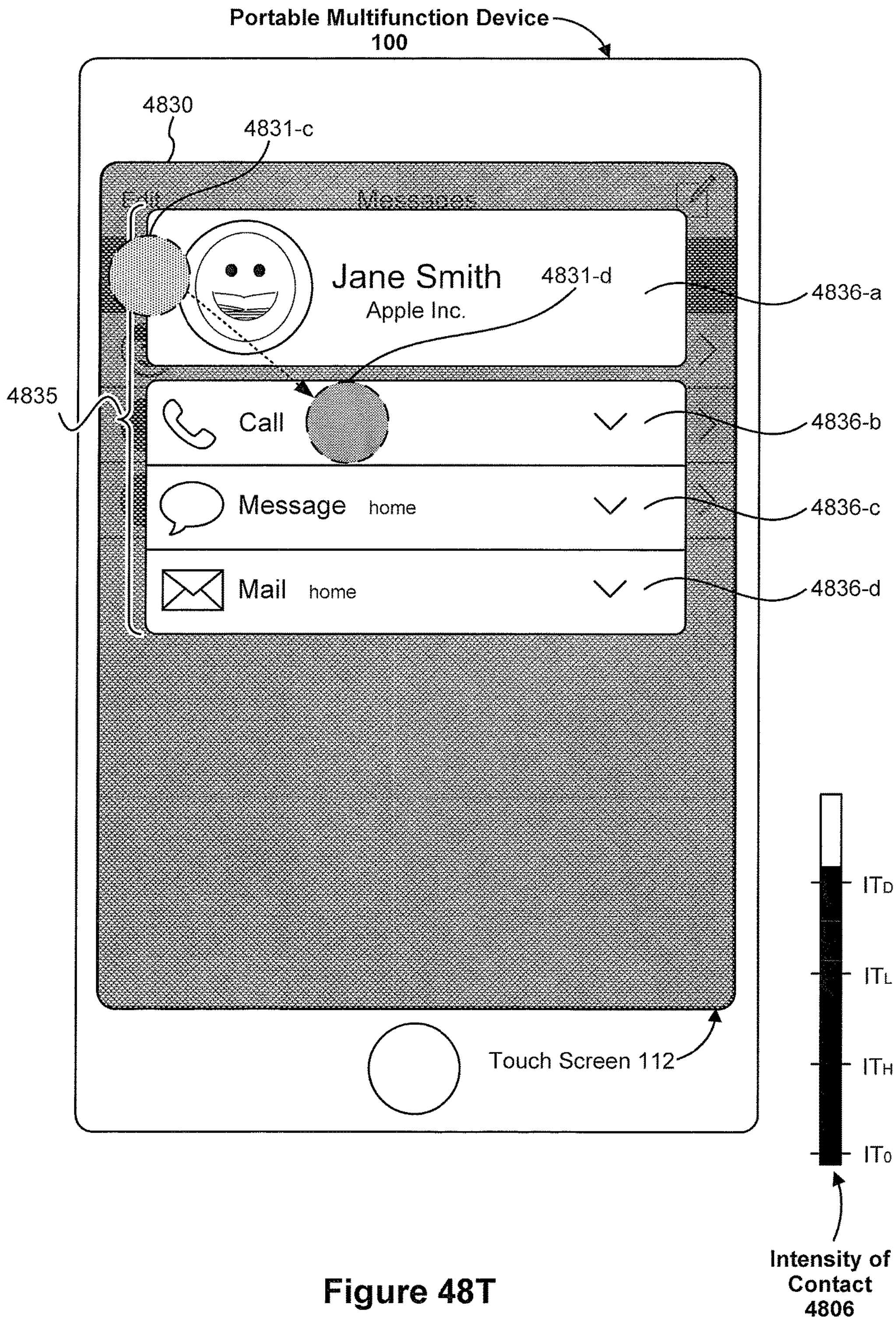
Figure 48U:
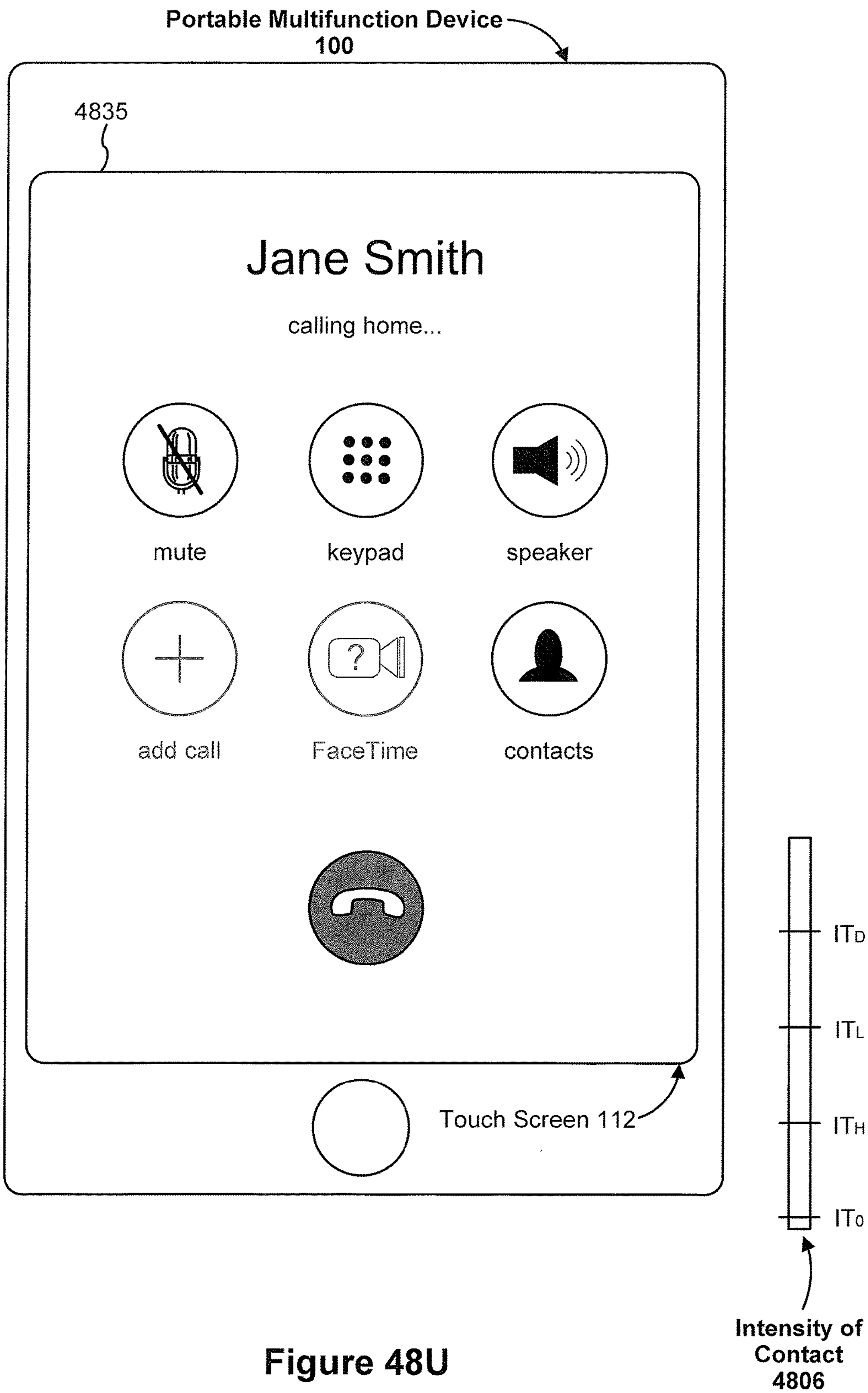

FIGS. 48T-48U illustrate an example of detecting an increase in intensity of the contact (e.g., contact 4831-*d* has an intensity above a deep press intensity threshold $IT_D$, also sometimes called a "pop" intensity threshold) on the option to call (e.g., by detecting selection of the "Call" object 4836-*b*) and initiating a call (in phone user interface 4835) with a default option (e.g., home). FIG. 48U illustrates initiating a call to Jane Smith's home phone number in phone user interface 4835. In some embodiments, if "Call" is the default action among all actions associated menu 4835, if response to detecting an increase in intensity of the contact (e.g., contact 4831-*d* has an intensity above a deep press intensity threshold $IT_D$, also sometimes called a "pop" intensity threshold) without movement of the contact over to the "Call" object 4836-*b* (e.g., while the contact remains substantially stationary over the object 4836-*a*), the device initiate a call with the default option (e.g., home).

Figure 48V:
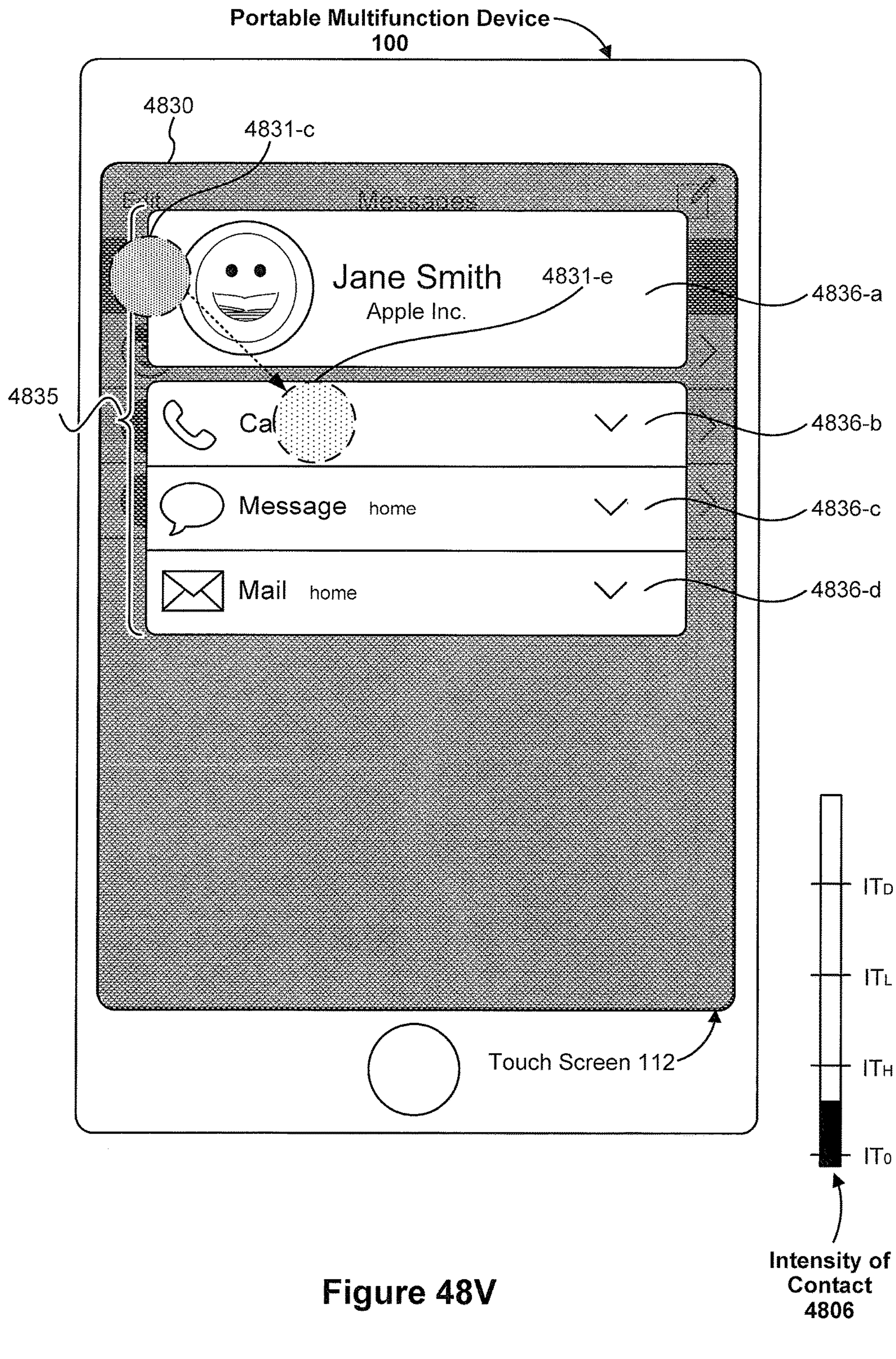
Figure 48W:
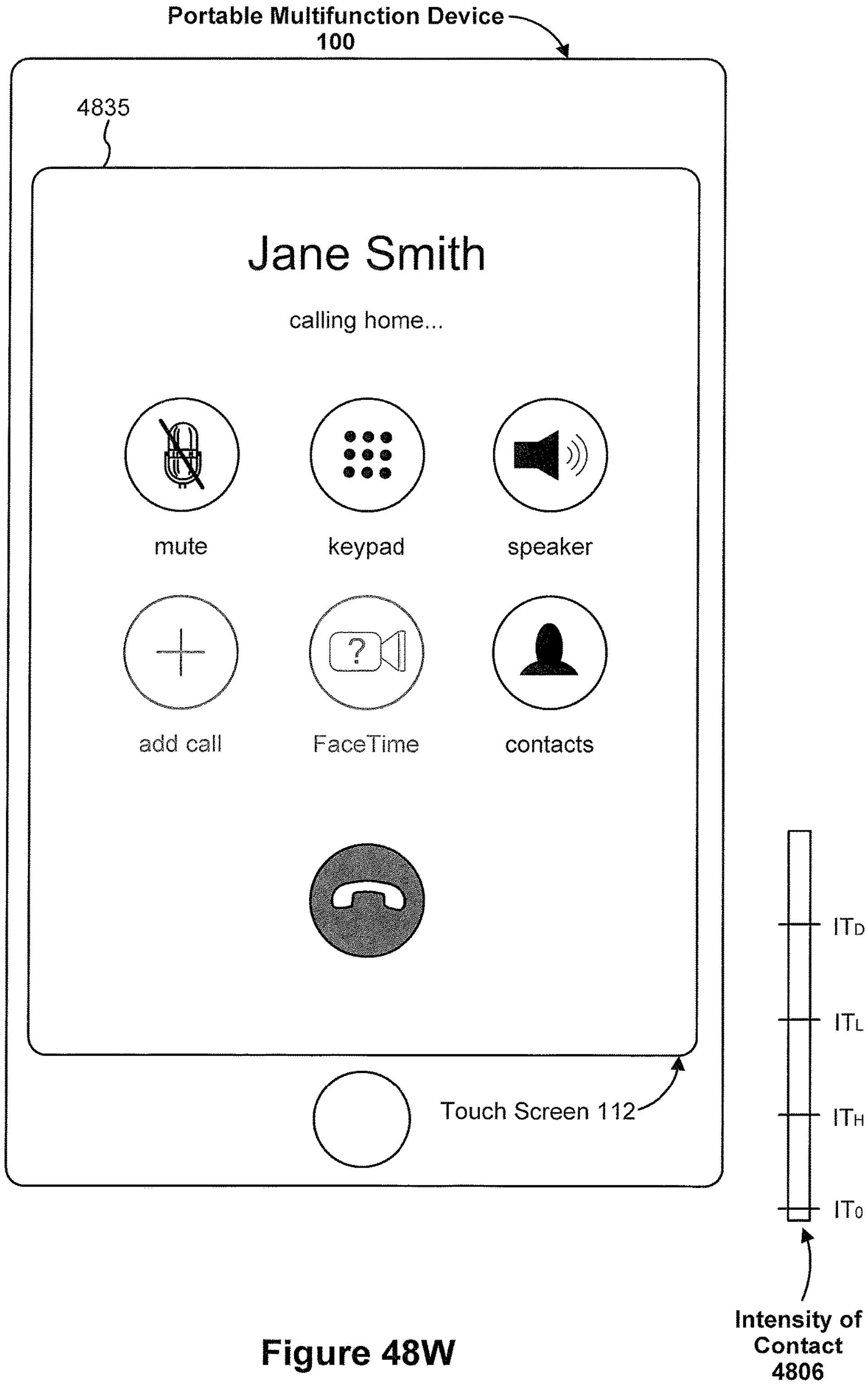

FIGS. 48V-48W illustrate an example of detecting a liftoff gesture (e.g., liftoff of contact 4831-*e*, FIG. 48V) on the option to call (e.g., by detecting selection of the "Call" object 4836-*b*) and initiating a call (in phone user interface 4835) with a default option (e.g., home). FIG. 48W illustrates initiating a call to Jane Smith's home phone number in phone user interface 4835.

Figure 48X:
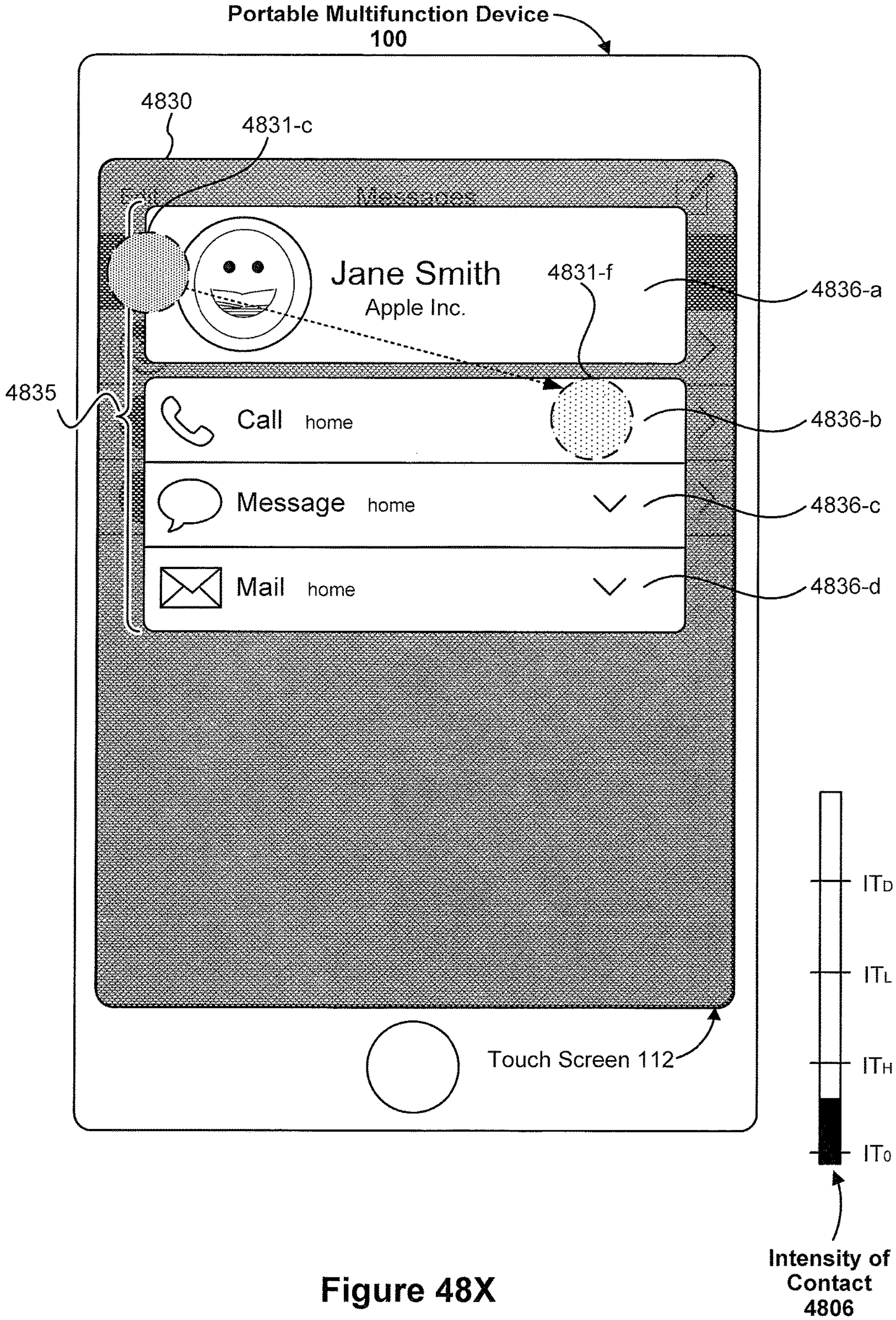
Figure 48Y:
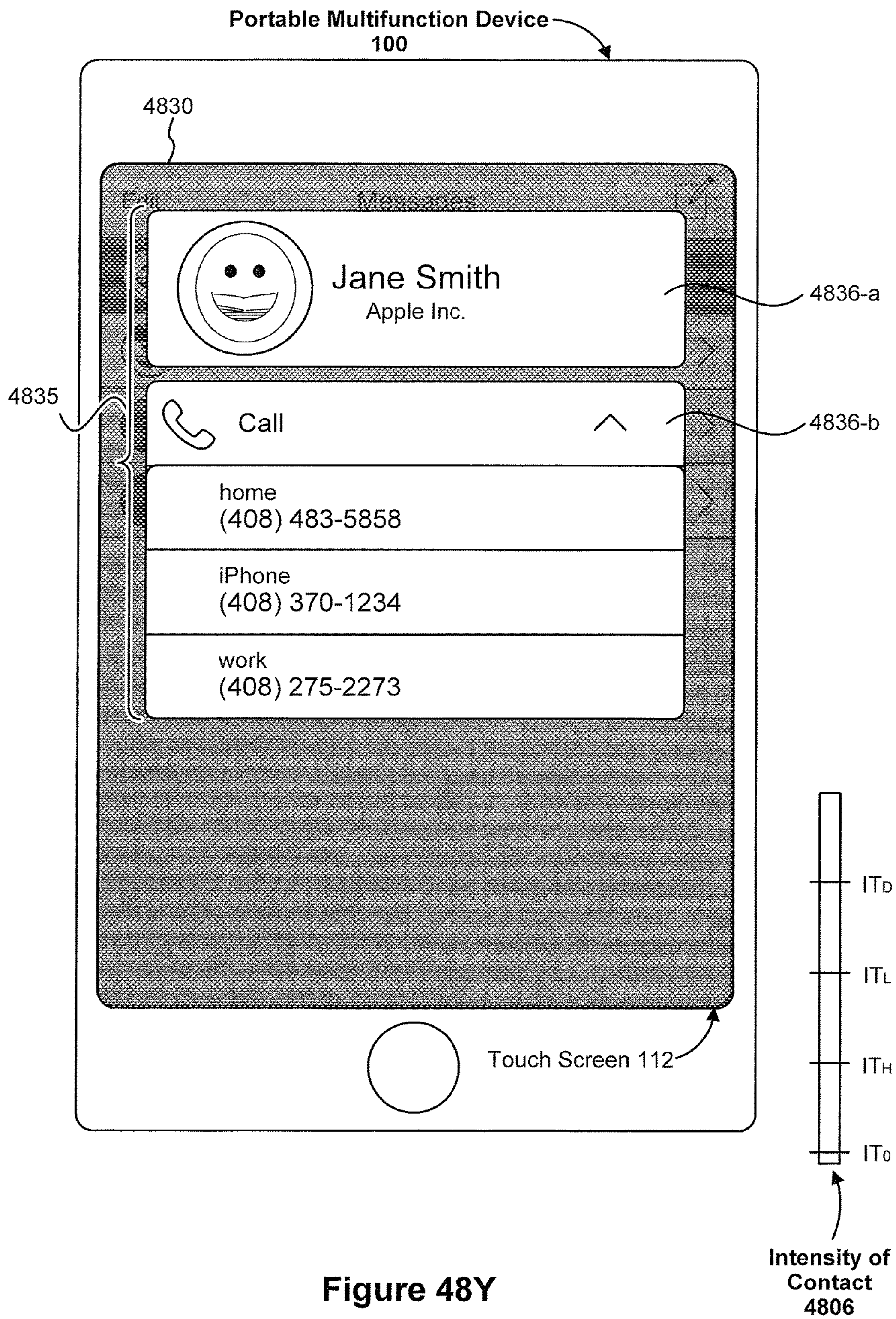

FIGS. 48X-48Y illustrate an example of detecting a liftoff gesture (e.g., liftoff of contact 4831-*f*, FIG. 48X) on the right side of the "Call" object 4836-*b* and displaying a plurality of options associated with calling Jane Smith. FIG. 48Y illustrates displaying three options associated with calling Jane Smith (e.g., home, iPhone, and work).

Figure 48Z:
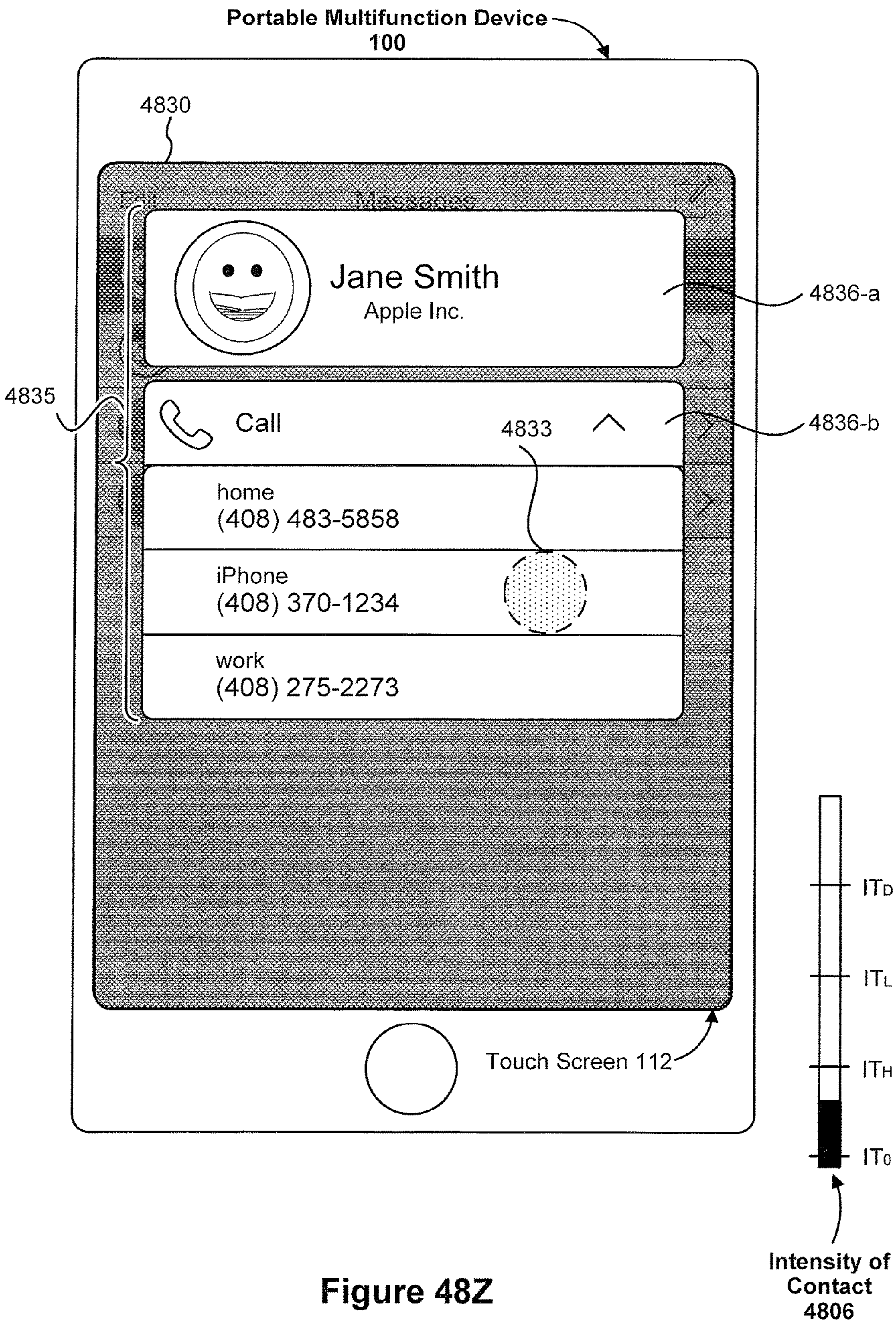
Figure 48A:
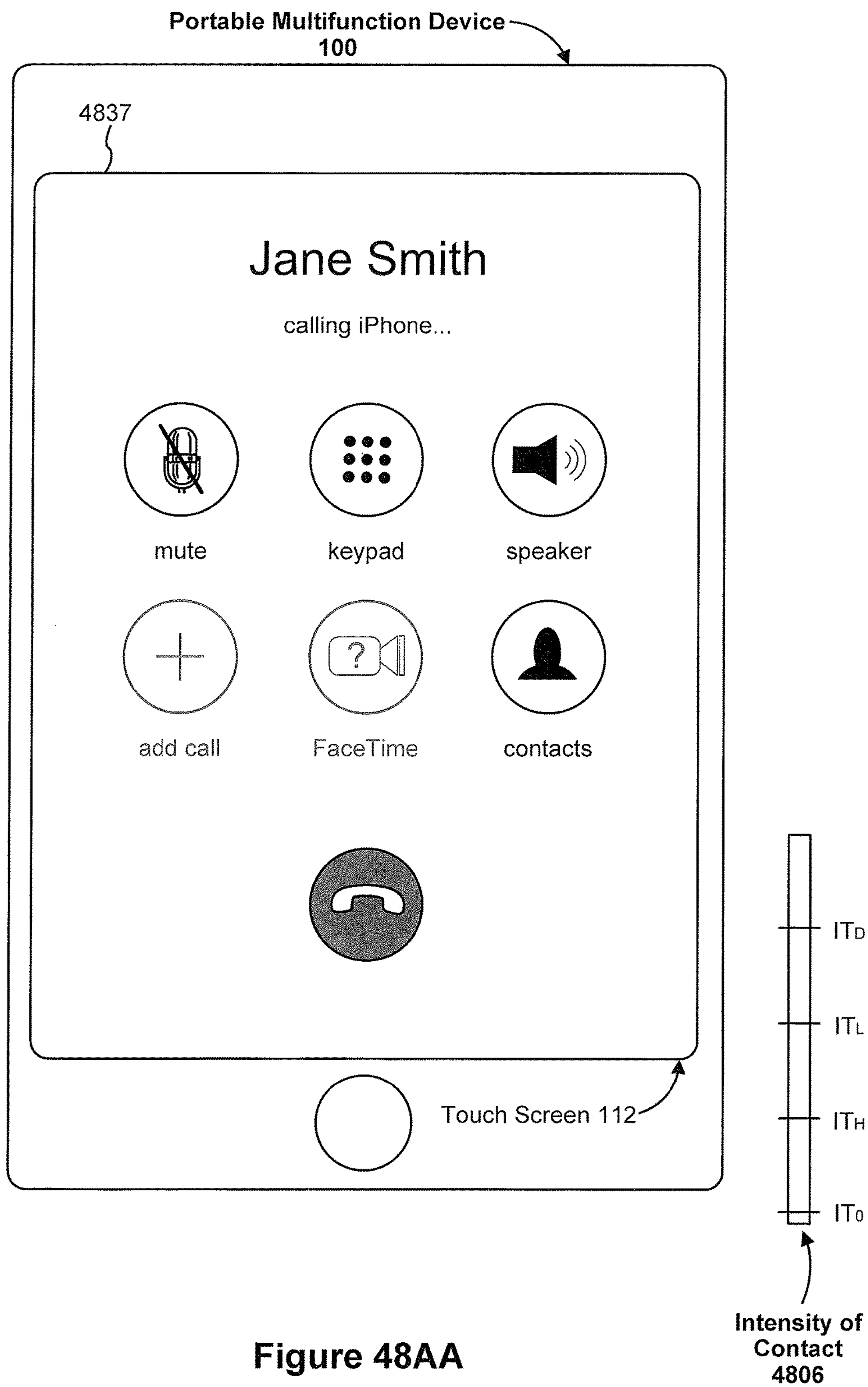
Figure 48B:
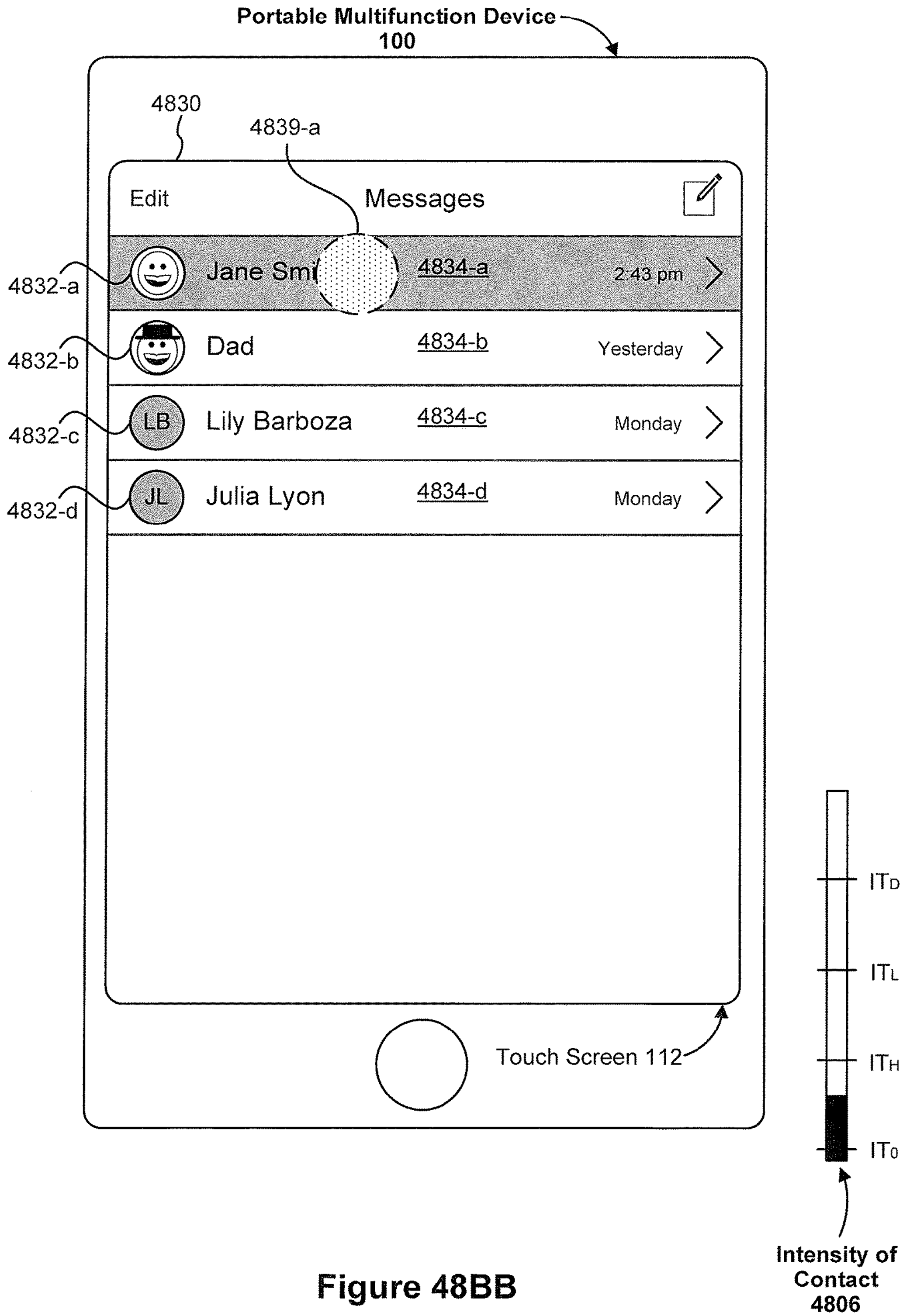
Figure 48C:
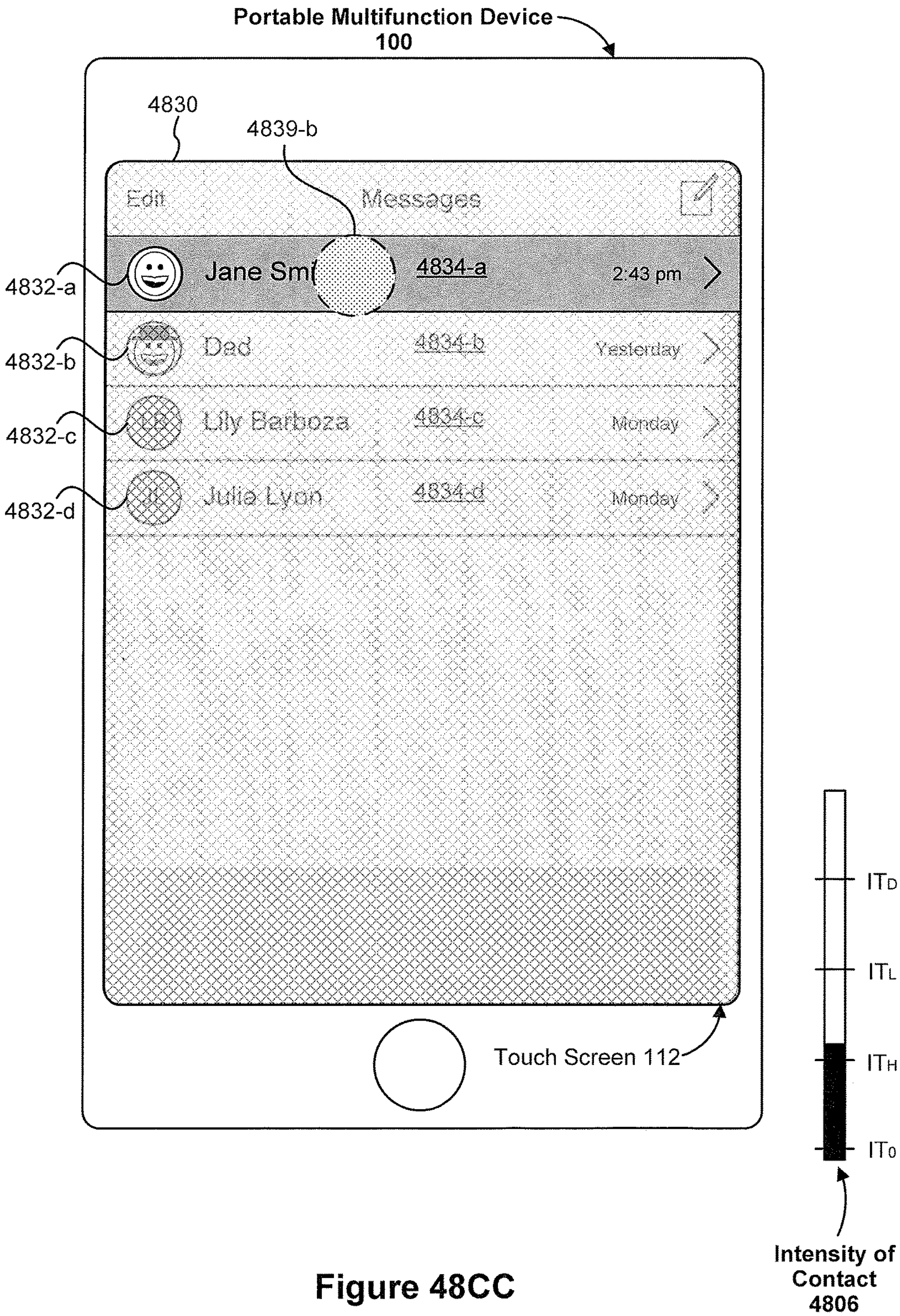
Figure 48D:
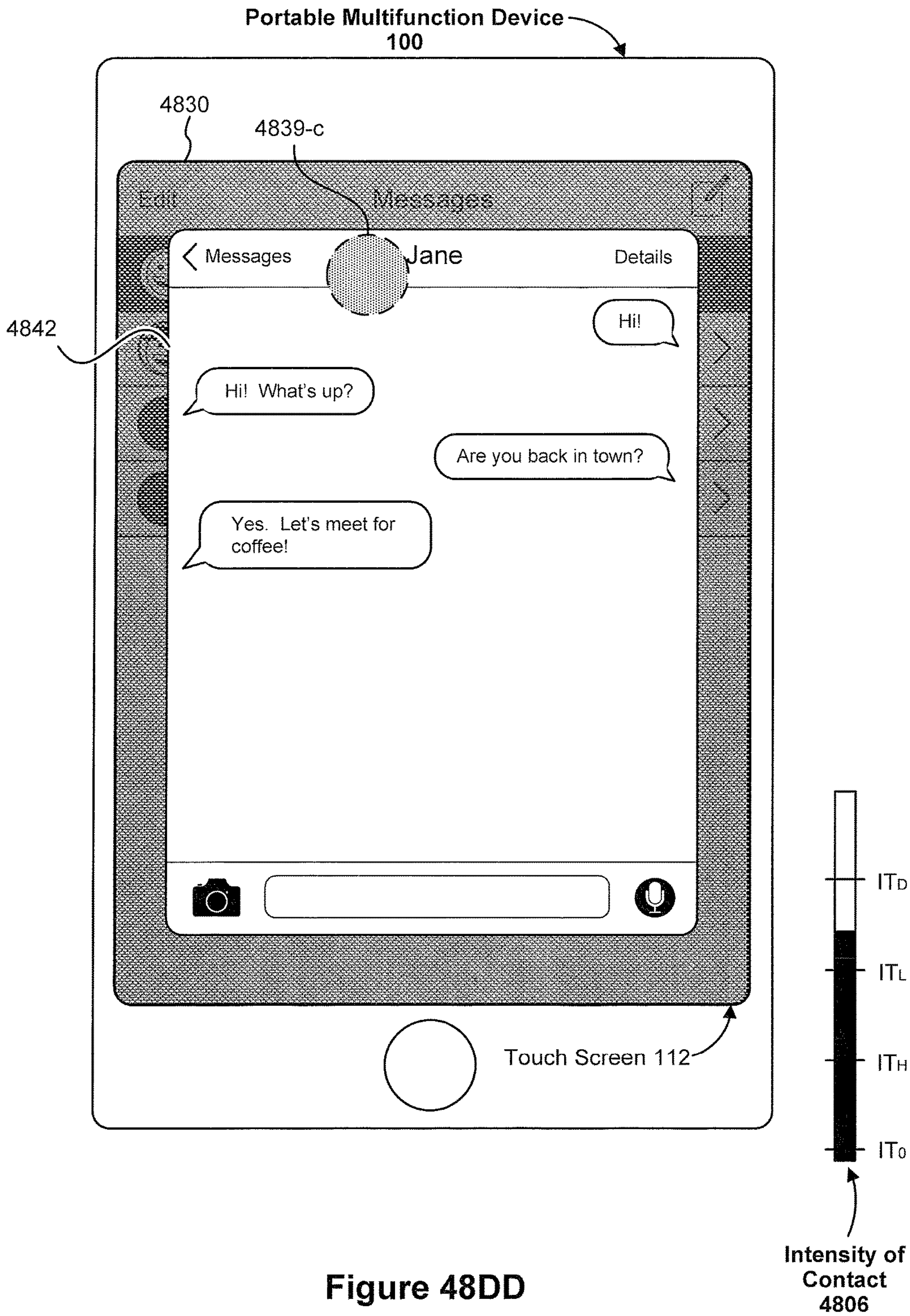
Figure 48E:
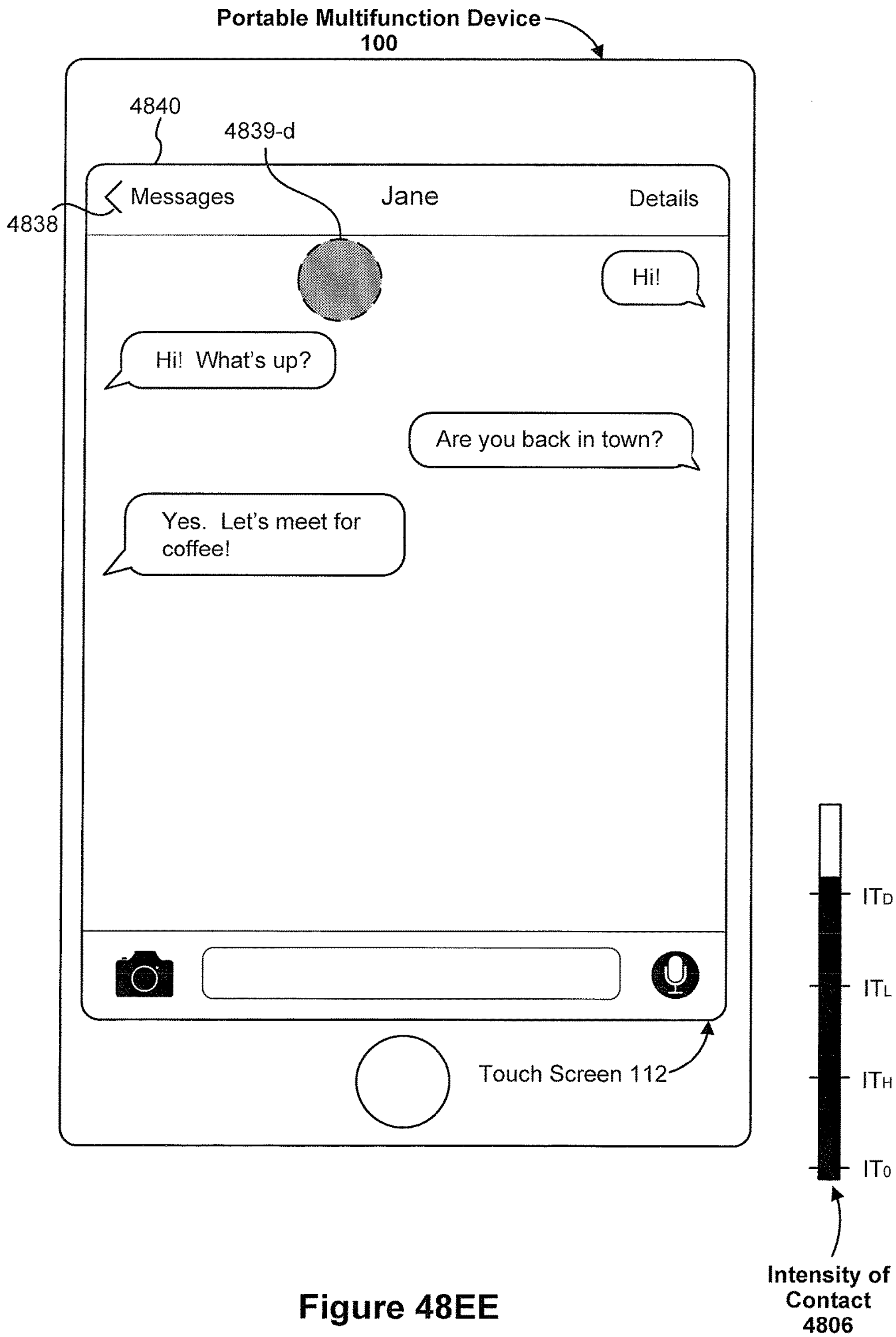

FIGS. 48Z-48AA illustrate an example of detecting a tap gesture (e.g., a tap gesture with contact 4833, FIG. 48Z) on the option to call Jane Smith's iPhone and initiating a call (in phone user interface 4837) with the selected option (e.g., iPhone). FIG. 48AA illustrates initiating a call to Jane Smith's iPhone number in phone user interface 4837.

FIG. 48BB illustrates an example of detecting an input that includes detecting a contact (e.g., contact 4839-*a*) on a respective selectable object (e.g., on a representation of messaging conversation 4834-*a* with Jane Smith, but not on avatar 4832-*a*) with an intensity of the contact (e.g., represented by intensity of contact 4806) above a contact detection intensity threshold $IT_0$. In some embodiments, in response to detecting a contact (e.g., above a contact detection intensity threshold) on the respective selectable object, the row representing the respective selectable object is highlighted.

FIGS. 48CC-48EE illustrate an example of detecting an increase in intensity of the contact (e.g., contact 4839-*b*, FIG. 48CC, has an intensity above a "hint" intensity threshold $IT_H$, contact 4839-*c*, FIG. 48DD, has an intensity above a light press intensity threshold $IT_L$, also sometimes called a "peek" intensity threshold, and contact 4839-*d*, FIG. 48EE, has an intensity above a deep press intensity threshold $IT_D$, also sometimes called a "pop" intensity threshold) and displaying a preview area (e.g., preview 4842, FIG. 48DD, which includes a reduced scale representation of conversation user interface 4840) overlaid on top of messages user interface 4830, followed by displaying conversation user interface 4840. FIG. 48CC illustrates applying a visual effect (e.g., blurring) to messages user interface 4830 (while keeping representation of messaging conversation 4834-*a* with Jane Smith in focus) as the intensity of the contact increases above the "hint" intensity threshold $IT_H$. FIG. 48DD illustrates an increase in a magnitude of the visual effect (e.g., more blurring) as the intensity of the contact increases above the "peek" intensity threshold $IT_L$ and the preview area is displayed. FIG. 48EE illustrates display of the user interface shown in the preview area as the intensity of the contact increases above the "pop" intensity threshold $IT_D$, and the preview area is removed.

FIGS. 49A-49F are flow diagrams illustrating a method 4900 of displaying a menu that includes contact information in accordance with some embodiments. Method 4900 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch screen display and the touch-sensitive surface is on or integrated with the display. In some embodiments, the display is separate from the touch-sensitive surface. Some operations in method 4900 are, optionally, combined and/or the order of some operations is, optionally, changed.

As described below, method 4900 provides an efficient way to display a menu that includes contact information. The method provides a fast way to initiate actions (e.g., for a person, calling, messaging, or emailing the person, or for a business, getting directions to the business, calling the business, opening a web page for the business, etc.) without having to open a separate application or enter search terms and perform a search. The method reduces the cognitive burden on a user when displaying a menu, thereby creating a more efficient human-machine interface. For battery-operated electronic devices, enabling a user to initiate actions faster and more efficiently conserves power and increases the time between battery charges.

The device displays (4902), on the display, a first user interface that includes a plurality of selectable objects that are associated with contact information. For example, the selectable objects include avatars, addresses, and/or telephone numbers of contactable entities (e.g., friends, social network contacts, business entities, points of interest, etc.) shown in a user interface of a messaging application (e.g., as shown in messages user interface 4830 of a messaging application, FIG. 48L) or other types of content (e.g., email messages, web pages, etc.), representations of search results of a map search (e.g., entities listed in a listing of nearby coffee shops, and corresponding pins on a map, etc.), avatars or icons representing location-sharing entities (e.g., friends and/or devices that are sharing their locations with the electronic device) in a user interface of a location-sharing application, etc.). FIG. 48A, for example, shows a plurality of selectable objects that are associated with contact information (e.g., representations of search results 4802-*a*, 4802-*b*, 4802-*c*, and 4802-*d*, and corresponding pins on a map, such as pins 4804-*a*, 4804-*b*, 4804-*c*, and 4804-*d*, respectively) in a first user interface (e.g., results user interface 4810) displayed on the display (e.g., touch screen 112). As another example, FIG. 48L shows a plurality of selectable objects that are associated with contact information (e.g., representations of messaging conversations 4834-*a*, 4834-*b*, 4834-*c*, and 4834-*d*, and corresponding avatars, such as avatars 4832-*a*, 4832-*b*, 4832-*c*, and 4832-*d*, respectively) in a first user interface (e.g., messages user interface 4830) displayed on the display (e.g., touch screen 112).

In some embodiments, the plurality of selectable objects that are associated with contact information include (4904) representations of users associated with the contact information (e.g., images/avatars of other users). FIG. 48L, for example, shows avatars (e.g., avatars 4832-*a*, 4832-*b*, 4832-*c*, and 4832-*d*) associated with other users (e.g., Jane Smith, Dad, Lily Barboza, and Julia Lyon).

In some embodiments, the plurality of selectable objects that are associated with contact information include (4906) representations of locations associated with the contact information (e.g., pins on a map or representations of restaurants, or data detected locations in the text of an electronic document or an electronic communication such as an email or other electronic message). FIG. 48A, for example, shows pins on a map (pins 4804-*a*, 4804-*b*, 4804-*c*, and 4804-*d*) associated with the Apple Store locations listed in the search results (e.g., Stockton Street Apple Store, Chestnut Street Apple Store, 20th Avenue Apple Store, and Bay Street Apple Store).

The device, while displaying the plurality of selectable objects and while a focus selector is at a location that corresponds to a respective selectable object (e.g., an avatar of a friend or a search result representation), detects (4908) an input that includes detecting a contact on the touch-sensitive surface. FIG. 48B, for example, shows detecting an input that includes detecting a contact (e.g., contact 4808-*a*) on the touch-sensitive surface (e.g., touch screen 112) while displaying the plurality of selectable objects (e.g., representations of search results 4802-*a*, 4802-*b*, 4802-*c*, and 4802-*d*) and while a focus selector is at a location that corresponds to a respective selectable object (e.g., representation of search result 4802-*b*). As another example, FIG. 48M shows detecting an input that includes detecting a contact (e.g., contact 4818) on the touch-sensitive surface (e.g., touch screen 112) while displaying the plurality of selectable objects (e.g., avatars 4832-*a*, 4832-*b*, 4832-*c*, and 4832-*d*) and while a focus selector is at a location that corresponds to a respective selectable object (e.g., avatar 4832-*a*).

The device, in response to detecting the input: in accordance with a determination that detecting the input includes detecting an increase in intensity of the contact that meets intensity criteria, the intensity criteria including a criterion that is met when a characteristic intensity of the contact increases above a respective intensity threshold (e.g., above a light press intensity threshold or a static or dynamically determined preview intensity threshold), displays (4910) a menu (e.g., an action platter or quick action menu for initiating one or more actions) for the respective selectable object that includes the contact information for the respective selectable object (e.g., available modes of contacting or communicating with the contactable entity represented by the respective selectable object and/or names, avatars, addresses, social network identities, telephone numbers, etc. associated with the respective selectable object) overlaid on top of the first user interface that includes the plurality of selectable objects. For example, for a respective selectable object that represents a restaurant, the one or more actions in the menu optionally include: getting directions to the restaurant, calling the restaurant, opening a web page for the restaurant, and sharing the location of the restaurant. For a respective selectable object that represents a business entity, the one or more actions in the menu optionally include: getting directions to the business, calling the business, opening a web page for the business, and sharing the location of the business, as shown in menu 4811 of FIG. 48D. For a respective selectable object that represents a person, the one or more actions in the menu optionally include: calling, messaging, or emailing the person, as shown in menu 4835 of FIG. 48S. In some embodiments, displaying a menu overlaid on top of the first user interface that includes the plurality of selectable objects includes obscuring a portion of the first user interface with the display of the menu (e.g., in FIG. 48D, menu 4811 obscures a portion of search results user interface 4810, and in FIG. 48S, menu 4835 obscures a portion of messages user interface 4830). In some embodiments, portions of the first user interface that are not obscured by the menu (optionally, not including the portion occupied by the respective selectable object) are blurred when the menu is displayed on top of the first user interface (e.g., as shown in FIGS. 48D and 48S). In some embodiments, avatars throughout multiple applications and/or views are selectable to display a menu with contact information for a person associated with the avatar (e.g., a press input on an avatar in a mail application displays the same menu as a press input on the same avatar in a messaging application or in an address book application). For example, although FIGS. 48Q-48S show displaying menu 4835 in response to a press input on avatar 4832-*a* in a messaging application, in some embodiments, an analogous menu is displayed in response to a press input on avatar 4832-*a* for Jane Smith in another application and/or view (e.g., in a mail application, address book application, etc.).

The device, in response to detecting the input: in accordance with a determination that detecting the input includes detecting a liftoff of the contact without meeting the intensity criteria (e.g., intensity of the contact does not reach the light press intensity threshold or the static or dynamically determined preview intensity threshold before lift-off of the contact (e.g., when the input is a tap gesture)), replaces display of the first user interface that includes the plurality of selectable objects with display of a second user interface that is associated with the respective selectable object. In some embodiments, the second user interface that is associated with the respective selectable object includes an information page for the respective selectable object (e.g., a web page for a restaurant, a full contact information sheet for a person, an information page for a business (e.g., information user interface 4820, FIG. 48K), etc.). In some embodiments, the second user interface that is associated with the respective selectable object includes a zoomed view of a map that is centered around a pin representing the respective selectable object (e.g., in an alternate version of FIG. 48B, if a zoomed view of the map was centered around pin 4804-*b* representing the Chestnut Street Apple Store). In some embodiments, the second user interface that is associated with the respective selectable object includes a display of one or more messages with a person or entity represented by the respective selectable object, such as in an instant messaging conversation interface (e.g., conversation user interface 4840, FIG. 48N) or an email message interface.

In some embodiments, the contact information includes (4912) one or more of: one or more phone numbers (e.g., home, work, cell, etc.), one or more email addresses (e.g., home, work, etc.), one or more geographic addresses (e.g., different business locations), and one or more messaging contact addresses or identities (e.g., text messaging through a cell phone, text messaging through an email address, etc.). FIG. 48S, for example, shows menu 4835 with contact information including a phone number (e.g., home), a messaging contact address (e.g., home), and an email address (e.g., home).

In some embodiments, the menu includes (4914) a header, wherein the header includes additional information about the respective selectable object. (e.g., for a restaurant: business hours, a rating, cost information, etc. or for a person: full name, business affiliation, etc.). FIG. 48D, for example, shows menu 4811 with header 4812-*e*, wherein the header includes additional information about the respective selectable object (e.g., address, business hours, and rating). FIG. 48S, for example, shows menu 4835 with header 4836-*a*, wherein the header includes additional information about the respective selectable object (e.g., full name, business affiliation, and magnified avatar).

In some embodiments, the device, in response to detecting the input: in accordance with the determination that detecting the input includes detecting an increase in intensity of the contact that meets the intensity criteria, displays (4916) additional descriptive information describing the respective selectable object. In some embodiments, the additional descriptive information is displayed in a header of the menu, as described above with respect to operation 4914. In some embodiments, the additional descriptive information includes business hours, a rating, and/or cost information for a restaurant. In some embodiments, the additional descriptive information includes a full address, business hours, and/or a rating (as shown in FIG. 48D). In some embodiments, the additional descriptive information includes the full name, business affiliation, and/or other information for a person (as shown in FIG. 48S).

In some embodiments, the respective selectable object is (4918) an avatar. In some embodiments, the device, in accordance with the determination that detecting the input includes detecting an increase in intensity of the contact that meets the intensity criteria, displays a magnified version of the avatar within the menu (e.g., overlaid on top of other portions of the user interface), as shown in FIG. 48S. In some embodiments, as the intensity of the contact increases (before meeting the intensity criteria), the avatar (e.g., avatar 4832-*a*) is increasingly magnified (e.g., as shown in FIGS. 48Q-48R) until it reaches the size of the magnified version of the avatar within the menu when the intensity of the contact meets intensity criteria (e.g., as shown in FIG. 48S).

In some embodiments, the device applies (4920) a visual effect to obscure the first user interface that includes the plurality of selectable objects while displaying the menu. In some embodiments, the first user interface is blurred or masked when the menu is displayed on top of the first user interface. For example, in FIG. 48D, menu 4811 obscures a portion of search results user interface 4810, and the remaining portion of search results user interface 4810 is blurred. As another example, in FIG. 48S, menu 4835 obscures a portion of messages user interface 4830, and the remaining portion of messages user interface 4830 is blurred. In some embodiments, the menu is gradually presented on the first user interface (e.g., gradually expanded out from the respective selectable object), and the first user interface becomes increasingly blurred as the menu is gradually presented. In some embodiments, a hint animation is started when the intensity of the contact increases above a "hint" intensity threshold (e.g., as shown in FIGS. 48C and 48R) that is below the respective intensity threshold (e.g., the preview intensity threshold), and the amount of the visual effect (e.g., blurring) applied to the first user interface is dynamically manipulated/controlled by the variations of the contact intensity such that increases in the intensity of the contact cause an increase in a magnitude of the visual effect while decreases in intensity of the contact cause a decrease in the magnitude of the visual effect.

In some embodiments, the device, while displaying the menu for the respective selectable object, detects (4922) a predefined dismissal gesture (e.g., detecting a tap gesture while the focus selector is located outside of the menu, or detecting a swipe gesture that causes a movement of the focus selector across the menu and ends outside of the menu) directed to a location outside of the menu on the first user interface; and in response to detecting the predefined dismissal gesture: ceases to display the menu for the respective selectable object (and ceases to display any additional descriptive information describing the respective selectable object that was displayed with the menu); and restores display of the first user interface that includes the plurality of selectable objects. In some embodiments, restoring display of the first user interface that includes the plurality of selectable objects includes removing the visual effect that was applied to the first user interface. FIGS. 48H-48I, for example, show a tap gesture (e.g., a tap gesture with contact 4814, FIG. 48H) while the focus selector is located outside of the menu (e.g., menu 4811, FIG. 48H), and in response to detecting the tap gesture, ceasing to display the menu and restoring display of the first user interface (e.g., search results user interface 4810, FIG. 48I). In some embodiments, the menu remains overlaid on the first user interface after the liftoff of the contact is detected and until a dismissal gesture or a selection input selecting one of the menu options is detected. FIG. 48G, for example, shows the menu remaining overlaid on the first user interface (e.g., menu 4811 remaining overlaid on search results user interface 4810) after liftoff of the contact (e.g., after liftoff of contact 4808-*c*, FIG. 48D) and until a dismissal gesture (as described above) or a selection input selecting one of the menu options is detected.

In some embodiments, the menu includes (4924) one or more communication objects (e.g., selectable user interface objects that represent available modes of contacting or communicating with the contactable entity represented by the respective selectable object and/or specific names, avatars, addresses, social network identities, telephone numbers, etc. associated with the respective selectable object). FIG. 48S, for example, shows menu 4835 with one or more communication objects (e.g., object 4836-*b* to "Call," object 4836-*c* to "Message," and object 4836-*d* to "Mail"). In some embodiments, the device, while the contact on the touch-sensitive surface is maintained, detects movement of the contact on the touch-sensitive surface that corresponds to movement of the focus selector to a respective communication object of the one or more communication objects (e.g., a call button, an email button, a message button, etc.) on the display; while the focus selector is on the respective communication object, detects a portion of the input that meets selection criteria (e.g., the selection criteria includes a criterion that is met when liftoff is detected when the focus selector is located over the respective communication object, and/or an alternative criterion that is met when a characteristic intensity of the contact increases above a first intensity threshold (e.g., a light press intensity threshold or a deep press intensity threshold) while the focus selector is located over the respective communication object; and in response to detecting the portion of the input that meets the selection criteria, initiates a communication function corresponding to the respective communication object. In some embodiments, initiating a communication function corresponding to the respective communication object includes starting a telephone call or draft email to the entity represented by the respective communication object, or displaying a menu of options (e.g., listing alternative phone numbers (e.g., home, work, cell, etc.) or email addresses) for starting a telephone call or draft email to the entity represented by the respective communication object. FIGS. 48T-48U, for example, show detecting movement of the contact (e.g., movement of contact 4831-*c* to contact 4831-*d*) on the touch-sensitive surface (e.g., touch screen 112) that corresponds to movement of the focus selector to a respective communication object (e.g., object 4836-*b* to "Call") and detecting an increase in intensity of the contact (e.g., contact 4831-*d* has an intensity above a deep press intensity threshold $IT_D$), and in response, initiating a communication function corresponding to the respective communication object (e.g., initiating a call to Jane Smith's home phone number in phone user interface 4835, FIG. 48U). Alternatively, FIG. 48V-48W, for example, show detecting movement of the contact (e.g., movement of contact 4831-*c* to contact 4831-*d*) on the touch-sensitive surface (e.g., touch screen 112) that corresponds to movement of the focus selector to a respective communication object (e.g., object 4836-*b* to "Call") and detecting liftoff of the contact (e.g., liftoff of contact 4831-*e*, FIG. 48V), and in response, initiating a communication function corresponding to the respective communication object (e.g., initiating a call to Jane Smith's home phone number in phone user interface 4835, FIG. 48W).

In some embodiments, the portion of the input that meets the selection criteria is (4926) a terminal portion of the input (e.g., liftoff of the contact from the touch-sensitive surface). For example, as shown in FIGS. 48V-48W, the portion of the input that meets the selection criteria is a liftoff of contact 4831-*e* from touch screen 112.

In some embodiments, the portion of the input that meets the selection criteria corresponds (4928) to a change in intensity of the contact. In some embodiments, the change in intensity of the contact includes a decrease in intensity of the contact followed by an increase in intensity of the contact over an intensity threshold that corresponds to selection of the respective communication object. In some embodiments, the change in intensity of the contact includes an increase in intensity of the contact to a second intensity threshold, greater than the respective intensity threshold at which the device displays the menu. For example, as shown in FIGS. 48T-48U, the portion of the input that meets the selection criteria corresponds to a change in intensity of the contact (e.g., from contact 4831-*c*, FIG. 48S, to contact 4831-*d*, FIG. 48T, the intensity increases from above a light press intensity threshold $IT_L$ to above a above a deep press intensity threshold $IT_D$).

In some embodiments, initiating the communication function corresponding to the respective communication object includes (4930) initiating a communication (e.g., a telephone call, an instant message, a draft email) corresponding to the respective communication object. FIG. 48U, for example, shows initiating a communication (e.g., a telephone call to Jane Smith's home phone number) corresponding to the respective communication object (e.g., object 4836-*b* to call Jane Smith's home phone number, FIG. 48S).

In some embodiments, initiating the communication function corresponding to the respective communication object in response to detecting the portion of the input that meets the selection criteria includes (4932): in response to detecting the portion of the input (e.g., the terminal portion of the input) that meets the selection criteria (e.g., liftoff of the contact): in accordance with a determination that the focus selector is located at a first portion (e.g., left side, as shown in FIG. 48V) of the respective communication object, initiating a communication with a default option (e.g., call the home number, as shown in FIGS. 48V-48W, or draft a message or email to a home address) among a plurality of options associated with the respective communication object for the respective selectable object; and in accordance with a determination that the focus selector is located at a second portion (e.g., right side, as shown in FIG. 48X) of the respective communication object, displaying the plurality of options associated with the respective communication object for the respective selectable object (e.g., displaying a submenu listing respective options to call the numbers for home, iPhone, mobile, work, etc., as shown in FIG. 48Y). In some embodiments, the one or more different options for the respective communication object are displayed while display of the menu is maintained on the display. In some embodiments, the one or more different options for the respective communication object replace a portion of the menu on the display. For example, the unselected communication objects are removed to make room for the menu of options associated with the selected communication object. FIG. 48Y, for example, shows the one or more different options for the "Call" communication object 4836-*b* (e.g., home, iPhone, and work) replace a portion of menu 4835 on the display (and replace the unselected communication objects 4836-*c* and 4836-*d*).

In some embodiments, the plurality of options associated with the respective communication object expand (4934) out from the respective communication object. FIG. 48Y, for example, shows the plurality of options (e.g., home, iPhone, work) associated with the "Call" communication object (e.g., object 4836-*b*) expanded out from the "Call" communication object.

In some embodiments, the device detects (4936) selection of a respective option of the plurality of options (e.g., selection by a tap gesture on the respective option, as shown in FIG. 48Z with a tap gesture on the iPhone option, or by a movement of the contact that corresponds to movement of the focus selector to the respective option followed by an increase in intensity of the contact above the first intensity threshold or liftoff of the contact) associated with the respective communication object; and in response to detecting the selection of the respective option, initiates a communication corresponding to the respective option (e.g., initiating a communication corresponding to the iPhone option, as shown in FIG. 48AA). In some embodiments, in response to detecting the selection of the respective option, the electronic device changes the default option to the selected respective option for the respective communication object for future activations. For example, in response to detecting the selection of the iPhone "Call" option in FIG. 48Z, the default option for "Call" in future displays of menu 4835 will be "Call iPhone" instead of "Call home" (as previously displayed in FIG. 48S).

In some embodiments, the respective selectable object occupies (4938) a portion of a second selectable object. In some embodiments, the second selectable object is a row in a plurality of rows in a list, an instant message conversation in a listing of instant messaging conversations, an email message in a listing of email messages, etc. In some embodiments, the second selectable object includes two selectable portions. For example, for a selectable object representing an instant messaging conversation (e.g., a rectangular-shaped user interface item, such as 4834-*a*, 4834-*b*, 4834-*c*, and 4834-*d*, FIG. 48P), a first selectable portion of the selectable object is an avatar of a participant of the conversation (e.g., avatars 4832-*a*, 4832-*b*, 4832-*c*, and 4832-*d*, FIG. 48P) and a second selectable portion is anywhere on the selectable object other than the portion occupied by the avatar. In some embodiments, the device, while displaying the plurality of selectable objects and while a focus selector is at a respective location that corresponds to a respective portion of the second selectable object, detects a second input that includes detecting an increase in a characteristic intensity of a second contact above the respective intensity threshold on the touch-sensitive surface; and in response to detecting the second input: in accordance with a determination that the respective location corresponds to the respective selectable object, displays the menu for the respective selectable object that includes the contact information for the respective selectable object overlaid on top of the first user interface that includes the plurality of selectable objects (e.g., as shown in FIGS. 48Q-48S); and in accordance with a determination that the respective location corresponds to a portion of the second selectable object other than the respective selectable object, displaying content associated with the second selectable object that is different from the menu for the respective selectable object (e.g., as shown in FIGS. 48BB-48EE). In some embodiments, in response to detecting a different intensity-independent input (e.g., a tap input) at a location that corresponds to the second selectable object, the device performs an operation associated with the second selectable object without regard to whether the intensity-independent input is detected at a location that corresponds to the respective user interface object or at a location that corresponds to a portion of the second selectable object other than the respective selectable object. For example, a tap input anywhere on a representation of a conversation causes the conversation to be displayed (e.g., as shown in FIGS. 48M-48N) while a press input that includes an increase of intensity of a contact on an avatar in the representation of the conversation causes a menu for the avatar to be displayed (e.g., as shown in FIGS. 48Q-48S) and a press input that includes an increase of intensity of a contact on a portion of the representation that is different from the avatar causes a preview of the conversation to be displayed (e.g., as shown in FIGS. 48BB-48EE).

In some embodiments, displaying content associated with the second selectable object that is different from the menu for the respective selectable object includes (4940): in accordance with a determination that a first portion of the second input meets preview criteria (e.g., the second input is a press input with a characteristic intensity in the first portion of the second input that meets preview criteria, such as a characteristic intensity that meets a "peek" intensity threshold at which the device starts to display a preview of another user interface that can be reached by pressing harder on the respective selectable object), displaying a preview area overlaid on at least some of the plurality of selectable objects in the first user interface, wherein the preview area includes a reduced scale representation of the second user interface (e.g., as shown in FIG. 48DD, noting that a response to an input may start before the entire input ends); in accordance with a determination that a second portion of the second input, detected after the first portion of the input, meets user-interface-replacement criteria (e.g., the second input is a press input with a characteristic intensity in the second portion of the second input that meets user-interface-replacement criteria, such as a characteristic intensity that meets a "pop" intensity threshold at which the device replaces display of the first user interface (with the overlaid preview area) with display of the second user interface), replacing display (e.g., as shown in FIG. 48EE) of the first user interface and the overlaid preview area with display of the second user interface (e.g., the user interface that is also displayed in response to detecting a tap gesture on the first selectable object, as shown in FIGS. 48M-48N); and in accordance with a determination that the second portion of the second input meets preview-area-disappearance criteria, ceasing to display the preview area and displaying the first user interface after the input ends (e.g., by liftoff of the contact). In some embodiments, in response to detecting liftoff, the preview area ceases to be displayed and the first user interface returns to its original appearance (e.g., as shown in FIG. 48P) when preview-area-disappearance criteria are met.

In some embodiments, determining that the first portion of the second input meets preview criteria includes (4942) detecting that the characteristic intensity of the second contact during the first portion of the second input increases to a first intensity threshold (e.g., a "peek" intensity threshold at which the device starts to display a preview of another user interface that can be reached by pressing harder on the respective selectable object), as shown in FIG. 48DD.

In some embodiments, determining that the second portion of the second input meets user-interface-replacement criteria includes (4944) detecting that the characteristic intensity of the second contact during the second portion of the second input increases to a second intensity threshold, greater than the first intensity threshold (e.g., a "pop" intensity threshold, greater than a "peek" intensity threshold, at which the device replaces display of the first user interface (with the overlaid preview area) with display of the second user interface), as shown in FIG. 48EE.

In some embodiments, determining that the second portion of the second input meets preview-area-disappearance criteria includes (4946) detecting a liftoff of the second contact without meeting the user-interface-replacement criteria during the second portion of the second input. For example, in FIG. 48DD, determining that the second portion of the second input meets preview-area-disappearance criteria includes detecting a liftoff of contact 4839-*c* without meeting the user-interface-replacement criteria (e.g., detecting liftoff of contact 4839-*c* before the intensity of contact 4839-*c* reaches the "pop" intensity threshold, $IT_D$).

In some embodiments, the device applies (4948) a visual effect to obscure the first user interface while displaying the preview area, as shown in FIG. 48DD.

It should be understood that the particular order in which the operations in FIGS. 49A-49F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 4900 described above with respect to FIGS. 49A-49F. For brevity, these details are not repeated here.

Figure 50:
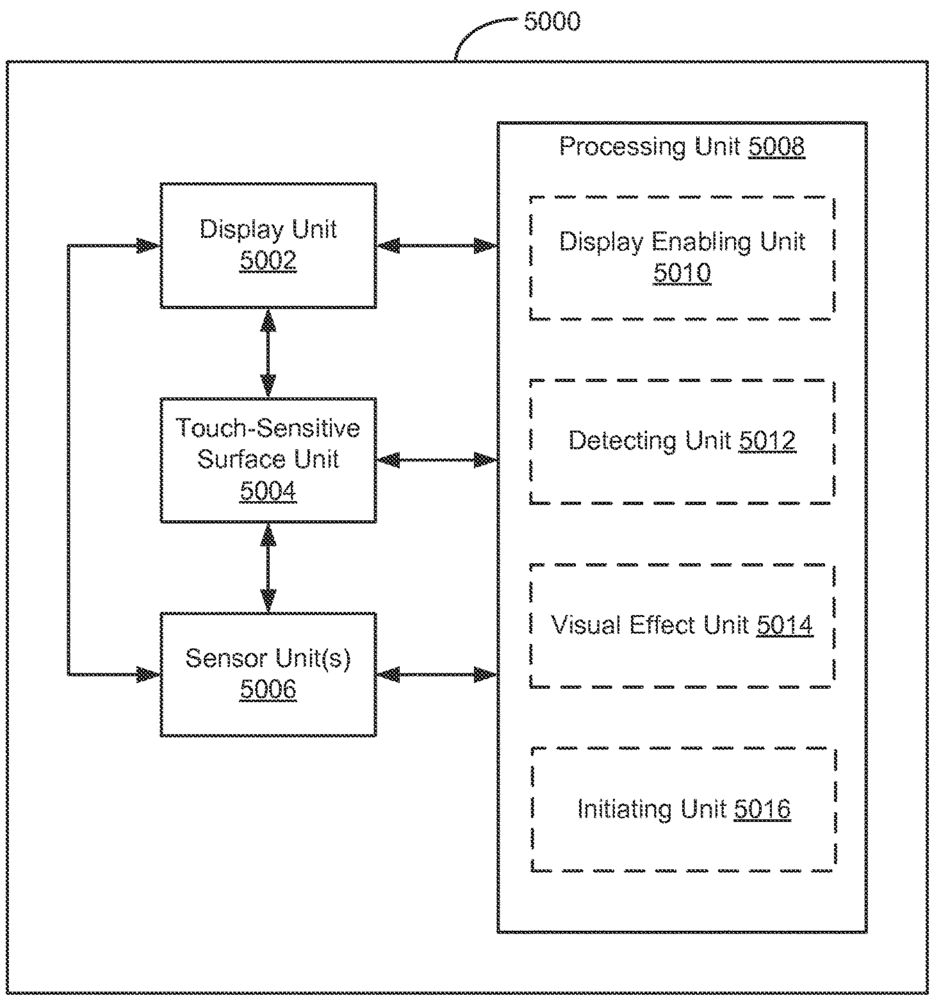
FIG. 50 is a functional block diagram of an electronic device in accordance with some embodiments.

In accordance with some embodiments, FIG. 50 shows a functional block diagram of an electronic device 5000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 50 are, optionally, combined or separated into sub-blocks to implement the principles of the various described embodiments. Therefore, the description herein optionally supports any possible combination or separation or further definition of the functional blocks described herein.

As shown in FIG. 50, an electronic device 5000 includes a display unit 5002 configured to configured to display a user interface; a touch-sensitive surface unit 5004 configured to receive user inputs; one or more sensor units 5006 configured to detect intensity of contacts with the touch-sensitive surface unit 5004; and a processing unit 5008 coupled to the display unit 5002, the touch-sensitive surface unit 5004 and the one or more sensor units 5006. In some embodiments, the processing unit 5008 includes a display enabling unit 5010, a detecting unit 5012, a visual effect unit 5014, and an initiating unit 5016.

The processing unit 5008 is configured to: enable display, on the display unit 5002, of a first user interface that includes a plurality of selectable objects that are associated with contact information (e.g., with the display enabling unit 5010); while enabling display of the plurality of selectable objects and while a focus selector is at a location that corresponds to a respective selectable object, detect an input that includes detecting a contact on the touch-sensitive surface unit 5004 (e.g., with the detecting unit 5012); and in response to detecting the input: in accordance with a determination that detecting the input includes detecting an increase in intensity of the contact that meets intensity criteria, the intensity criteria including a criterion that is met when a characteristic intensity of the contact increases above a respective intensity threshold, enable display of a menu for the respective selectable object (e.g., with the display enabling unit 5010) that includes the contact information for the respective selectable object overlaid on top of the first user interface that includes the plurality of selectable objects; and in accordance with a determination that detecting the input includes detecting a liftoff of the contact without meeting the intensity criteria, replace display of the first user interface that includes the plurality of selectable objects with display of a second user interface that is associated with the respective selectable object (e.g., with the display enabling unit 5010).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 49A-49F are, optionally, implemented by components depicted in FIGS. 1A-1B or FIG. 50. For example, display operation 4902, detection operation 4908, and display operation 4910 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device with a touch-sensitive surface, a display, and one or more sensors to detect intensities of contacts with the touch-sensitive surface:

displaying a first user interface on the display, wherein the first user interface includes:

a background with a first appearance, the background of the first user interface including a representative image in a sequence of images; and one or more foreground objects;

while displaying the first user interface on the display, detecting a first input by a first contact on the touch-sensitive surface while a first focus selector is at a location in the first user interface that corresponds to the background of the first user interface, wherein, when the first input is detected, the electronic device is in a locked state in which access to a plurality of different operations that are accessible when the electronic device is in an unlocked state is prevented;

in response to detecting the first input by the first contact, in accordance with a determination that the first contact has a characteristic intensity above a first intensity threshold, dynamically changing the appearance of the background of the first user interface without changing the appearance of the one or more foreground objects in the first user interface, wherein the dynamic change in the appearance of the background of the first user interface is based at least in part on the characteristic intensity of the first contact and wherein dynamically changing the appearance of the background of the first user interface includes displaying in sequence at least some of the sequence of images based at least in part on the characteristic intensity of the first contact;

while detecting the first input by the first contact, after determining that the first contact has a characteristic intensity above the first intensity threshold:

detecting a decrease in the characteristic intensity of the first contact; and, in response to detecting the decrease in the characteristic intensity of the first contact, reversing the changing of the appearance of the background of the first user interface;

detecting a second input, the second input meeting criteria to exit the locked state of the electronic device; and, in response to detecting the second input, replacing display of the first user interface with display of a second user interface that is distinct from the first user interface on the display, wherein the second user interface includes a background of the second user interface with a first appearance and one or more foreground objects.

2. The method of claim 1, wherein the first intensity threshold is associated with an operating system of the electronic device, and respective operations of respective applications on the electronic device are activated in response to detecting respective inputs that satisfy the first intensity threshold.

3. The method of claim 2, wherein:

respective operations of respective applications on the electronic device are activated in response to detecting respective inputs that satisfy a second intensity threshold;

the appearance of the background changes in a first manner when the characteristic intensity of the contact is between the first intensity threshold and the second intensity threshold; and the appearance of the background changes in a second manner, different from the first manner when the characteristic intensity of the contact is above the second intensity threshold.

4. The method of claim 1, including:

while displaying the second user interface on the display, detecting a third input by a third contact on the touch-sensitive surface while a focus selector is at a location in the second user interface that corresponds to the background of the second user interface, wherein the third contact has a characteristic intensity above the first intensity threshold; and, in response to detecting the third input by the third contact, maintaining the first appearance of the background of the second user interface.

5. The method of claim 1, wherein a respective foreground object of the one or more foreground objects responds to an input by a contact having a characteristic intensity below the first intensity threshold.

6. The method of claim 1, including:

while displaying the second user interface on the display, detecting a fourth input by a fourth contact on the touch-sensitive surface while a focus selector is at a location in the second user interface that corresponds to the background of the second user interface; and, in response to detecting the fourth input by the fourth contact, in accordance with a determination that the fourth contact has a characteristic intensity above the first intensity threshold, dynamically changing the appearance of the background of the second user interface without changing the appearance of the one or more foreground objects in the first user interface, wherein the dynamic change in the appearance of the background of the second user interface is based at least in part on the characteristic intensity of the fourth contact.

7. The method of claim 6, including:

while dynamically changing the appearance of the background of the second user interface, detecting termination of the fourth input by the fourth contact; and, in response to detecting termination of the fourth input by the fourth contact, reverting the background of the second user interface back to the first appearance of the background of the second user interface.

8. The method of claim 1, wherein reversing the change of the appearance of the background of the first user interface includes:

in accordance with a determination that a rate of change of the characteristic intensity of the first contact during the detected decrease in the characteristic intensity of the first contact does not exceeds a first rate of change threshold, dynamically reversing the change of the appearance of the background of the first user interface based on the rate of change of the characteristic intensity of the first contact; and, in accordance with a determination that a rate of change of the characteristic intensity of the first contact during the detected decrease in the characteristic intensity of the first contact exceeds a first rate of change threshold, animating reversal of the change of the appearance of the background of the first user interface independent of the rate of change of the characteristic intensity of the first contact.

9. The method of claim 1, wherein the dynamic change in the appearance of the background of the first user interface is based in part on a positive rate of change in the characteristic intensity of the first contact.

10. The method of claim 1, wherein a magnitude of the dynamic change in the appearance of the background of the first user interface decays following detection of an impulse force by the first contact.

11. The method of claim 1, including:

detecting termination of the first input by the first contact; and, in response to detecting termination of the first input by the first contact, reverting the background of the first user interface back to the first appearance of the background;

wherein reverting the background of the first user interface back to the first appearance of the background is based on a rate of change of the decrease in the characteristic intensity of the first contact prior to termination of the first input.

12. The method of claim 1, including:

in response to detecting the first input by the first contact, in accordance with the determination that the first contact has a characteristic intensity above the first intensity threshold, changing an aspect of the appearance of the background of the first user interface without changing the appearance of a respective foreground object of the one or more foreground objects in the first user interface, wherein the change of the aspect of the appearance of the background of the first user interface is independent of position of the first focus selector in the background.

13. The method of claim 1, wherein:

in response to detecting the first input by the first contact on the touch-sensitive surface, in accordance with a determination that the first input does not have a characteristic intensity above the first intensity threshold, maintaining the first appearance of the background of the first user interface.

14. An electronic device, comprising:

a display;

a touch-sensitive surface;

one or more sensors to detect intensities of contacts with the touch-sensitive surface;

one or more processors;

memory; and one or more programs, wherein the one or more programs are stored in the memory and configured to be executed by the one or more processors, the one or more programs including instructions for:

displaying a first user interface on the display, wherein the first user interface includes:

a background with a first appearance, the background of the first user interface including a representative image in a sequence of images; and one or more foreground objects;

while displaying the first user interface on the display, detecting a first input by a first contact on the touch-sensitive surface while a first focus selector is at a location in the first user interface that corresponds to the background of the first user interface, wherein, when the first input is detected, the electronic device is in a locked state in which access to a plurality of different operations that are accessible when the electronic device is in an unlocked state is prevented;

in response to detecting the first input by the first contact, in accordance with a determination that the first contact has a characteristic intensity above a first intensity threshold, dynamically changing the appearance of the background of the first user interface without changing the appearance of the one or more foreground objects in the first user interface, wherein the dynamic change in the appearance of the background of the first user interface is based at least in part on the characteristic intensity of the first contact and wherein dynamically changing the appearance of the background of the first user interface includes displaying in sequence at least some of the sequence of images based at least in part on the characteristic intensity of the first contact;

while detecting the first input by the first contact, after determining that the first contact has a characteristic intensity above the first intensity threshold:

detecting a decrease in the characteristic intensity of the first contact; and, in response to detecting the decrease in the characteristic intensity of the first contact, reversing the changing of the appearance of the background of the first user interface;

detecting a second input, the second input meeting criteria to exit the locked state of the electronic device; and, in response to detecting the second input, replacing display of the first user interface with display of a second user interface that is distinct from the first user interface on the display, wherein the second user interface includes a background of the second user interface with a first appearance and one or more foreground objects.

15. The electronic device of claim 14, wherein the first intensity threshold is associated with an operating system of the electronic device, and respective operations of respective applications on the electronic device are activated in response to detecting respective inputs that satisfy the first intensity threshold.

16. The electronic device of claim 15, wherein:

respective operations of respective applications on the electronic device are activated in response to detecting respective inputs that satisfy a second intensity threshold;

the appearance of the background changes in a first manner when the characteristic intensity of the contact is between the first intensity threshold and the second intensity threshold; and the appearance of the background changes in a second manner, different from the first manner when the characteristic intensity of the contact is above the second intensity threshold.

17. The electronic device of claim 14, wherein reversing the change of the appearance of the background of the first user interface includes:

in accordance with a determination that a rate of change of the characteristic intensity of the first contact during the detected decrease in the characteristic intensity of the first contact does not exceeds a first rate of change threshold, dynamically reversing the change of the appearance of the background of the first user interface based on the rate of change of the characteristic intensity of the first contact; and, in accordance with a determination that a rate of change of the characteristic intensity of the first contact during the detected decrease in the characteristic intensity of the first contact exceeds a first rate of change threshold, animating reversal of the change of the appearance of the background of the first user interface independent of the rate of change of the characteristic intensity of the first contact.

18. The electronic device of claim 14, wherein a magnitude of the dynamic change in the appearance of the background of the first user interface decays following detection of an impulse force by the first contact.

19. A non-transitory computer readable storage medium storing one or more programs, the one or more programs comprising instructions which, when executed by an electronic device with a display, a touch-sensitive surface, and one or more sensors to detect intensity of contacts with the touch-sensitive surface, cause the electronic device to:

display a first user interface on the display, wherein the first user interface includes:

a background with a first appearance, the background of the first user interface including a representative image in a sequence of images; and one or more foreground objects;

while displaying the first user interface on the display, detect a first input by a first contact on the touch-sensitive surface while a first focus selector is at a location in the first user interface that corresponds to the background of the first user interface, wherein, when the first input is detected, the electronic device is in a locked state in which access to a plurality of different operations that are accessible when the electronic device is in an unlocked state is prevented;

in response to detecting the first input by the first contact, in accordance with a determination that the first contact has a characteristic intensity above a first intensity threshold, dynamically change the appearance of the background of the first user interface without changing the appearance of the one or more foreground objects in the first user interface, wherein the dynamic change in the appearance of the background of the first user interface is based at least in part on the characteristic intensity of the first contact and wherein dynamically changing the appearance of the background of the first user interface includes displaying in sequence at least some of the sequence of images based at least in part on the characteristic intensity of the first contact;

while detecting the first input by the first contact, after determining that the first contact has a characteristic intensity above the first intensity threshold:

detect a decrease in the characteristic intensity of the first contact; and in response to detecting the decrease in the characteristic intensity of the first contact, reverse the changing of the appearance of the background of the first user interface;

detect a second input, the second input meeting criteria to exit the locked state of the electronic device; and, in response to detecting the second input, replace display of the first user interface with display of a second user interface that is distinct from the first user interface on the display, wherein the second user interface includes a background of the second user interface with a first appearance and one or more foreground objects.

20. The non-transitory computer readable storage medium of claim 19, wherein the first intensity threshold is associated with an operating system of the electronic device, and respective operations of respective applications on the electronic device are activated in response to detecting respective inputs that satisfy the first intensity threshold.

21. The non-transitory computer readable storage medium of claim 20, wherein:

respective operations of respective applications on the electronic device are activated in response to detecting respective inputs that satisfy a second intensity threshold;

the appearance of the background changes in a first manner when the characteristic intensity of the contact is between the first intensity threshold and the second intensity threshold; and the appearance of the background changes in a second manner, different from the first manner when the characteristic intensity of the contact is above the second intensity threshold.

22. The non-transitory computer readable storage medium of claim 19, wherein reversing the change of the appearance of the background of the first user interface includes:

in accordance with a determination that a rate of change of the characteristic intensity of the first contact during the detected decrease in the characteristic intensity of the first contact does not exceeds a first rate of change threshold, dynamically reversing the change of the appearance of the background of the first user interface based on the rate of change of the characteristic intensity of the first contact; and, in accordance with a determination that a rate of change of the characteristic intensity of the first contact during the detected decrease in the characteristic intensity of the first contact exceeds a first rate of change threshold, animating reversal of the change of the appearance of the background of the first user interface independent of the rate of change of the characteristic intensity of the first contact.

23. The non-transitory computer readable storage medium of claim 19, wherein a magnitude of the dynamic change in the appearance of the background of the first user interface decays following detection of an impulse force by the first contact.

* * * * *

UNITED STATES PATENT AND TRADEMARK OFFICE

CERTIFICATE OF CORRECTION

PATENT NO. : 10,067,645 B2
APPLICATION NO. : 14/871227
DATED : September 4, 2018
INVENTOR(S) : King et al.

It is certified that error appears in the above-identified patent and that said Letters Patent is hereby corrected as shown below:

In the Claims

Claim 8, Column 232, Line 63, please delete “not exceeds a” and insert --not exceed a--;

Claim 17, Column 234, Line 63, please delete “not exceeds a” and insert --not exceed a--;

Claim 22, Column 236, Line 35, please delete “not exceeds a” and insert --not exceed a--.

Signed and Sealed this
Thirtieth Day of October, 2018

Andrei Iancu
*Director of the United States Patent and Trademark Office*